US010075574B2

(12) United States Patent
Hosoi et al.

(10) Patent No.: US 10,075,574 B2
(45) Date of Patent: Sep. 11, 2018

(54) MOBILE TELEPHONE

(71) Applicants: Rohm Co., Ltd., Kyoto (JP); FINEWELL CO., LTD., Osaka (JP)

(72) Inventors: Hiroshi Hosoi, Osaka (JP); Yoji Hosoi, Osaka (JP); Masahide Tanaka, Osaka (JP)

(73) Assignees: Rohm Co., Ltd., Kyoto (JP); Finewell Co., Ltd., Osaka (JP)

( * ) Notice: Subject to any disclaimer, the term of this patent is extended or adjusted under 35 U.S.C. 154(b) by 0 days.

(21) Appl. No.: 15/616,144

(22) Filed: Jun. 7, 2017

(65) Prior Publication Data

US 2018/0124222 A1 May 3, 2018

Related U.S. Application Data

(60) Division of application No. 15/049,403, filed on Feb. 22, 2016, now Pat. No. 9,742,887, which is a (Continued)

(30) Foreign Application Priority Data

Aug. 23, 2013 (JP) ................................. 2013173595
Sep. 9, 2013 (JP) ................................. 2013186424
(Continued)

(51) Int. Cl.
*H04M 1/00* (2006.01)
*H04M 1/03* (2006.01)
(Continued)

(52) U.S. Cl.
CPC ............ *H04M 1/035* (2013.01); *H04M 1/03* (2013.01); *H04M 1/0264* (2013.01);
(Continued)

(58) Field of Classification Search
CPC ....... G02C 11/06; H04M 1/03; H04M 1/7259; H04M 1/05; H04M 1/72591;
(Continued)

(56) References Cited

U.S. PATENT DOCUMENTS 2,045,404 A 6/1936 Nicholides
4,351,166 A 9/1982 Belin
(Continued)

FOREIGN PATENT DOCUMENTS

CN 2198618 Y 5/1995
CN 1110857 A 10/1995
(Continued)

OTHER PUBLICATIONS

Office Action mailed for KR Patent Application No. 10-2017-7019074 dated Oct. 13, 2017 with English Translation.
(Continued)

*Primary Examiner* — Mahendra Patel
(74) *Attorney, Agent, or Firm* — Fish & Richardson P.C.

(57) ABSTRACT

A mobile telephone has a front wall, a rear wall, a top wall partly continuous with a side face, and a side wall, and includes a vibration-absorbing member between the top wall and each of the rear wall and the side wall, and a cartilage conduction vibration source on the inner side of the top wall. Opposite corner parts of the top wall partly continuous with the side face each serve as a cartilage conduction unit. Or a mobile telephone has a front wall, a rear wall, a top wall, and a side wall, and includes a cartilage conduction vibration source that has a thin shape, that vibrates in a direction perpendicular to the thin shape, and that is affixed to the middle, in the left/right direction, of the inner side of the top wall in a direction parallel to the thin shape.

13 Claims, 239 Drawing Sheets

Related U.S. Application Data continuation-in-part of application No. PCT/JP2014/071607, filed on Aug. 19, 2014.

(30) Foreign Application Priority Data

| | | |
|---|---|---|
| Sep. 20, 2013 | (JP) | 2013195756 |
| Oct. 31, 2013 | (JP) | 2013227279 |
| Jan. 20, 2014 | (JP) | 2014007843 |
| Feb. 20, 2014 | (JP) | 2014030835 |
| Mar. 19, 2014 | (JP) | 2014056175 |
| May 23, 2014 | (JP) | 2014107212 |

(51) Int. Cl.
*H04W 88/02* (2009.01)
*H04M 1/02* (2006.01)

(52) U.S. Cl.
CPC ..... *H04M 2250/12* (2013.01); *H04R 2460/13* (2013.01); *H04R 2499/11* (2013.01); *H04W 88/02* (2013.01)

(58) Field of Classification Search
CPC .............. H04M 1/6066; H04M 1/0258; H04R 25/554; H04R 2420/07; H04R 25/558; H04R 1/028; H04W 88/02; H04W 4/00; H04W 4/22; H04W 4/80; H04W 4/90; H04W 4/70; G09B 19/06; G06F 17/27; H04B 5/0031; H04B 5/0093; H04B 5/0037
USPC ......... 455/575.1, 41.3, 569.1, 566; 381/68.6, 381/155
See application file for complete search history.

(56) References Cited

U.S. PATENT DOCUMENTS 5,295,193 A 3/1994 Ono
5,323,468 A 6/1994 Bottesch
5,396,563 A 3/1995 Yoshimi
5,682,173 A 10/1997 Holakovszky et al.
5,687,244 A 11/1997 Untersander
5,956,682 A 9/1999 Loudermilk
6,028,556 A 2/2000 Shiraki
6,380,923 B1 4/2002 Fukumoto et al.
6,456,721 B1 9/2002 Fukuda
6,463,157 B1 10/2002 May
6,825,830 B1 11/2004 Kanesaka et al.
6,912,287 B1 6/2005 Fukumoto et al.
6,950,126 B1 9/2005 Homma et al.
7,231,235 B2 6/2007 Harrold
7,257,372 B2 8/2007 Kaltenbach
7,437,122 B2 10/2008 Choi
7,442,164 B2 10/2008 Berrang et al.
7,555,136 B2 6/2009 Wang
7,616,771 B2 * 11/2009 Lenhardt .............. H04R 25/353 381/312
7,822,215 B2 * 10/2010 Carazo .................. H04R 17/00 381/151
7,890,147 B2 2/2011 Tanada
8,433,080 B2 * 4/2013 Rader .................. H04R 25/606 381/151
8,521,239 B2 8/2013 Hosoi et al.
8,526,646 B2 9/2013 Boesen
8,532,322 B2 9/2013 Parker
8,886,263 B2 11/2014 Hosoi et al.
8,918,149 B2 12/2014 Hosoi et al.
9,020,168 B2 * 4/2015 Karkkainen ......... H04R 1/1075 381/151
9,020,170 B2 4/2015 Hosoi et al.
2001/0011951 A1 8/2001 Kimata et al.
2001/0026626 A1 10/2001 Athanas
2002/0001381 A1 1/2002 Mori
2002/0012441 A1 1/2002 Matsunaga et al.
2002/0068995 A1 6/2002 Yoshida
2002/0114214 A1 8/2002 Hansen et al.
2002/0115478 A1 8/2002 Fujisawa et al.
2002/0149561 A1 10/2002 Fukumoto et al.
2002/0183014 A1 12/2002 Takeda et al.
2003/0108209 A1 6/2003 McIntosh
2003/0118197 A1 6/2003 Nagayasu et al.
2003/0119566 A1 6/2003 Chen
2003/0174856 A1 9/2003 Johannsen et al.
2004/0013279 A1 1/2004 Takeda
2004/0048633 A1 3/2004 Sato et al.
2004/0086149 A1 5/2004 Johannsen et al.
2004/0087346 A1 5/2004 Johannsen et al.
2004/0105566 A1 6/2004 Matsunaga et al.
2004/0131211 A1 7/2004 Miyata et al.
2004/0132509 A1 * 7/2004 Glezerman ............ H04M 1/05 455/575.2
2004/0189151 A1 9/2004 Athanas
2004/0207542 A1 10/2004 Chang et al.
2004/0259513 A1 12/2004 Park
2005/0031152 A1 2/2005 Hansen et al.
2005/0046790 A1 3/2005 Jannard et al.
2005/0088530 A1 4/2005 Homma et al.
2005/0129257 A1 * 6/2005 Tamura ................. H04R 17/00 381/151
2005/0160270 A1 7/2005 Goldberg
2005/0176459 A1 * 8/2005 Fukuda .............. H04M 1/0202 455/550.1
2005/0184875 A1 8/2005 Schmandt et al.
2005/0185813 A1 8/2005 Sinclair et al.
2005/0207599 A1 9/2005 Fukumoto et al.
2005/0213432 A1 9/2005 Hoshuyama
2005/0232436 A1 10/2005 Nagayasu et al.
2005/0237685 A1 10/2005 Miyata
2005/0244020 A1 11/2005 Nakajima et al.
2005/0260969 A1 11/2005 Nagata et al.
2005/0275714 A1 12/2005 Ishikawa et al.
2005/0286734 A1 12/2005 Wang
2006/0079291 A1 * 4/2006 Granovetter .......... G06F 17/289 455/563
2006/0093161 A1 5/2006 Falcon
2006/0094464 A1 5/2006 Kyou et al.
2006/0113932 A1 6/2006 Mori et al.
2006/0120546 A1 6/2006 Tanaka et al.
2006/0121960 A1 6/2006 Wang
2006/0140439 A1 6/2006 Nakagawa
2006/0158064 A1 7/2006 Asakawa et al.
2006/0159297 A1 7/2006 Wirola et al.
2006/0171107 A1 8/2006 Yamamoto et al.
2006/0215873 A1 9/2006 Hansen et al.
2006/0216022 A1 9/2006 Lee et al.
2006/0227984 A1 10/2006 Sinclair
2006/0262951 A1 11/2006 Jun
2006/0286998 A1 12/2006 Fukuda
2007/0003098 A1 1/2007 Martenson
2007/0014423 A1 1/2007 Darbut et al.
2007/0015467 A1 1/2007 Nagayasu et al.
2007/0019452 A1 1/2007 Ohkubo et al.
2007/0025574 A1 2/2007 Azima et al.
2007/0036370 A1 2/2007 Granovetter et al.
2007/0053530 A1 3/2007 Ochiai et al.
2007/0057601 A1 3/2007 Kawase et al.
2007/0080951 A1 4/2007 Maruyama et al.
2007/0081679 A1 4/2007 Suzuki et al.
2007/0098200 A1 5/2007 Takei
2007/0160253 A1 7/2007 Takei et al.
2007/0249395 A1 10/2007 Kondo et al.
2007/0263893 A1 11/2007 Kim
2007/0269777 A1 11/2007 Fux
2007/0297637 A1 * 12/2007 Sugiyama ............... H04M 1/03 381/398
2008/0008344 A1 1/2008 Wakabayashi et al.
2008/0054862 A1 3/2008 Hara
2008/0106449 A1 5/2008 Doi
2008/0107290 A1 5/2008 Tamura
2008/0107300 A1 5/2008 Chen
2008/0123893 A1 5/2008 Lee
2008/0129703 A1 6/2008 Takeshita et al.

(56) References Cited

U.S. PATENT DOCUMENTS

| | | | | |
|---|---|---|---|---|
| 2008/0139254 | A1* | 6/2008 | Levy | H04B 1/385 455/569.1 |
| 2008/0143512 | A1 | 6/2008 | Wakisaka et al. | |
| 2008/0170725 | A1 | 7/2008 | Asada et al. | |
| 2008/0205679 | A1 | 8/2008 | Darbut et al. | |
| 2008/0227490 | A1 | 9/2008 | Homma et al. | |
| 2008/0227501 | A1 | 9/2008 | Joe et al. | |
| 2008/0239061 | A1 | 10/2008 | Cok et al. | |
| 2008/0240465 | A1 | 10/2008 | Shiraishi | |
| 2008/0247562 | A1 | 10/2008 | Nagayasu et al. | |
| 2008/0267433 | A1* | 10/2008 | Katou | H04R 1/1091 381/309 |
| 2008/0297373 | A1 | 12/2008 | Hayakawa et al. | |
| 2009/0002626 | A1 | 1/2009 | Wakabayashi | |
| 2009/0028356 | A1* | 1/2009 | Ambrose | H04R 1/1016 381/71.6 |
| 2009/0129620 | A1 | 5/2009 | Tagawa et al. | |
| 2009/0184884 | A1 | 7/2009 | Kyou et al. | |
| 2009/0226011 | A1 | 9/2009 | Abolfathi et al. | |
| 2009/0226017 | A1 | 9/2009 | Abolfathi et al. | |
| 2009/0226020 | A1 | 9/2009 | Abolfathi et al. | |
| 2009/0245556 | A1 | 10/2009 | Parker et al. | |
| 2009/0245557 | A1* | 10/2009 | Parker | H04R 25/606 381/326 |
| 2009/0288489 | A1 | 11/2009 | Lee | |
| 2009/0290730 | A1* | 11/2009 | Fukuda | H04R 1/1091 381/151 |
| 2009/0304210 | A1 | 12/2009 | Weisman | |
| 2009/0323976 | A1 | 12/2009 | Asada et al. | |
| 2010/0056227 | A1 | 3/2010 | Hayakawa et al. | |
| 2010/0061582 | A1 | 3/2010 | Takigawa et al. | |
| 2010/0061584 | A1 | 3/2010 | Lin et al. | |
| 2010/0098269 | A1 | 4/2010 | Abolfathi et al. | |
| 2010/0150368 | A1* | 6/2010 | Chang | H04R 1/1016 381/71.6 |
| 2010/0172519 | A1 | 7/2010 | Kimura et al. | |
| 2010/0178597 | A1 | 7/2010 | Ishida et al. | |
| 2010/0178957 | A1* | 7/2010 | Chen | G06F 1/1626 455/565 |
| 2010/0184487 | A1 | 7/2010 | Takada | |
| 2010/0216526 | A1 | 8/2010 | Chen et al. | |
| 2010/0238108 | A1 | 9/2010 | Rekimoto | |
| 2010/0246878 | A1 | 9/2010 | Sim et al. | |
| 2010/0254562 | A1 | 10/2010 | Koo | |
| 2010/0310086 | A1 | 12/2010 | Magrath et al. | |
| 2010/0311462 | A1 | 12/2010 | Endo et al. | |
| 2010/0320961 | A1 | 12/2010 | Castillo | |
| 2010/0322127 | A1 | 12/2010 | Nakajima | |
| 2010/0328033 | A1 | 12/2010 | Kamei | |
| 2010/0329485 | A1 | 12/2010 | Fukuda | |
| 2011/0059769 | A1 | 3/2011 | Brunolli | |
| 2011/0143819 | A1 | 6/2011 | Sugiyama et al. | |
| 2011/0158425 | A1 | 6/2011 | Hayakawa | |
| 2011/0159855 | A1 | 6/2011 | Cheng | |
| 2011/0169622 | A1* | 7/2011 | Billmaier | H04M 19/048 340/407.1 |
| 2011/0170718 | A1 | 7/2011 | Fukuda et al. | |
| 2011/0180542 | A1 | 7/2011 | Drollinger et al. | |
| 2011/0201301 | A1 | 8/2011 | Okada et al. | |
| 2011/0224481 | A1 | 9/2011 | Lee et al. | |
| 2011/0237306 | A1 | 9/2011 | Kamii | |
| 2011/0254616 | A1 | 10/2011 | Kawano | |
| 2011/0267551 | A1 | 11/2011 | Yokote et al. | |
| 2011/0280416 | A1 | 11/2011 | Abolfathi et al. | |
| 2011/0281617 | A1 | 11/2011 | Kim et al. | |
| 2011/0293105 | A1 | 12/2011 | Arie et al. | |
| 2011/0299695 | A1 | 12/2011 | Nicholson | |
| 2011/0301729 | A1 | 12/2011 | Heiman et al. | |
| 2012/0008793 | A1 | 1/2012 | Knox et al. | |
| 2012/0008807 | A1 | 1/2012 | Gran | |
| 2012/0010735 | A1 | 1/2012 | Gilboa | |
| 2012/0082329 | A1 | 4/2012 | Neumeyer et al. | |
| 2012/0082335 | A1 | 4/2012 | Duisters et al. | |
| 2012/0105192 | A1 | 5/2012 | Norieda | |
| 2012/0130660 | A1 | 5/2012 | Neumeyer | |
| 2012/0133213 | A1 | 5/2012 | Borke et al. | |
| 2012/0139750 | A1 | 6/2012 | Hayakawa et al. | |
| 2012/0140917 | A1 | 6/2012 | Nicholson et al. | |
| 2012/0162143 | A1 | 6/2012 | Kai et al. | |
| 2012/0182429 | A1 | 7/2012 | Forutanpour et al. | |
| 2012/0183163 | A1 | 7/2012 | Apfel | |
| 2012/0219161 | A1 | 8/2012 | Amada | |
| 2012/0221329 | A1 | 8/2012 | Harsch | |
| 2012/0237075 | A1 | 9/2012 | East et al. | |
| 2012/0244917 | A1* | 9/2012 | Hosoi | G02C 11/06 455/575.1 |
| 2012/0249223 | A1 | 10/2012 | Neugebauer | |
| 2012/0253236 | A1 | 10/2012 | Snow | |
| 2012/0289162 | A1 | 11/2012 | Hosoi et al. | |
| 2012/0298441 | A1 | 11/2012 | Lin et al. | |
| 2012/0300956 | A1 | 11/2012 | Horii | |
| 2012/0330654 | A1* | 12/2012 | Angell | G10L 15/06 704/231 |
| 2013/0039508 | A1 | 2/2013 | Chen et al. | |
| 2013/0051585 | A1 | 2/2013 | Karkkainen | |
| 2013/0100596 | A1 | 4/2013 | Yokote et al. | |
| 2013/0111346 | A1 | 5/2013 | Little | |
| 2013/0120311 | A1 | 5/2013 | Ichikawa | |
| 2013/0136279 | A1 | 5/2013 | Brown | |
| 2013/0142348 | A1 | 6/2013 | Weisman | |
| 2013/0169352 | A1 | 7/2013 | Kawano | |
| 2013/0169829 | A1 | 7/2013 | Homma et al. | |
| 2013/0191114 | A1 | 7/2013 | Gim | |
| 2013/0236043 | A1 | 9/2013 | Abolfathi et al. | |
| 2013/0242262 | A1 | 9/2013 | Lewis | |
| 2013/0242809 | A1 | 9/2013 | Tone et al. | |
| 2013/0252675 | A1 | 9/2013 | Nicholson | |
| 2013/0259221 | A1 | 10/2013 | Shusaku et al. | |
| 2013/0301860 | A1 | 11/2013 | Neumeyer et al. | |
| 2013/0308799 | A1 | 11/2013 | Lin et al. | |
| 2013/0316691 | A1 | 11/2013 | Forutanpour et al. | |
| 2013/0322670 | A1 | 12/2013 | Hosoi et al. | |
| 2013/0324193 | A1 | 12/2013 | Hosoi et al. | |
| 2013/0335210 | A1 | 12/2013 | Arai et al. | |
| 2013/0336507 | A1 | 12/2013 | Gran | |
| 2014/0003641 | A1 | 1/2014 | Neumeyer et al. | |
| 2014/0313280 | A1 | 10/2014 | Takuno et al. | |
| 2014/0342783 | A1 | 11/2014 | Suzuki et al. | |
| 2014/0378191 | A1 | 12/2014 | Hosoi et al. | |
| 2015/0054779 | A1 | 2/2015 | Horii et al. | |
| 2015/0065057 | A1 | 3/2015 | Hosoi et al. | |
| 2015/0070083 | A1 | 3/2015 | Kawano | |
| 2015/0078569 | A1 | 3/2015 | Magrath | |
| 2015/0086047 | A1 | 3/2015 | Horii et al. | |
| 2015/0131838 | A1 | 5/2015 | Horii | |
| 2015/0141088 | A1 | 5/2015 | Hosoi et al. | |
| 2015/0172588 | A1 | 6/2015 | Homma et al. | |
| 2015/0181338 | A1 | 6/2015 | Hosoi et al. | |
| 2015/0208153 | A1 | 7/2015 | Hosoi et al. | |
| 2015/0256946 | A1 | 9/2015 | Neumeyer et al. | |
| 2016/0007109 | A1 | 1/2016 | Neumeyer et al. | |
| 2016/0086594 | A1 | 3/2016 | Asada et al. | |
| 2016/0205233 | A1 | 7/2016 | Hosoi et al. | |
| 2016/0248894 | A1 | 8/2016 | Hosoi et al. | |
| 2016/0261299 | A1 | 9/2016 | Hosoi et al. | |
| 2016/0286296 | A1 | 9/2016 | Hosoi et al. | |
| 2016/0349803 | A1 | 12/2016 | Dusan | |
| 2017/0006144 | A1 | 1/2017 | Hosoi et al. | |
| 2017/0026727 | A1 | 1/2017 | Hosoi et al. | |
| 2017/0213452 | A1 | 7/2017 | Brunolli | |
| 2017/0230754 | A1 | 8/2017 | Dusan | |
| 2017/0302320 | A1 | 10/2017 | Hosoi et al. | |

FOREIGN PATENT DOCUMENTS

| | | | |
|---|---|---|---|
| CN | 1627864 | A | 6/2005 |
| CN | 1672114 | | 9/2005 |
| CN | 1679371 | A | 10/2005 |
| CN | 1723733 | A | 1/2006 |
| CN | 1791283 | | 6/2006 |
| CN | 2800681 | Y | 7/2006 |
| CN | 1843019 | A | 10/2006 |
| CN | 1984505 | A | 6/2007 |

(56) References Cited

FOREIGN PATENT DOCUMENTS

| | | | |
|---|---|---|---|
| CN | 101022678 | A | 8/2007 |
| CN | 201035260 | Y | 3/2008 |
| CN | 101267463 | | 9/2008 |
| CN | 101277331 | | 10/2008 |
| CN | 01355823 | A | 1/2009 |
| CN | 101360140 | | 2/2009 |
| CN | 101390440 | | 3/2009 |
| CN | 201216023 | | 4/2009 |
| CN | 101513081 | A | 8/2009 |
| CN | 101795143 | | 8/2010 |
| CN | 101897198 | A | 11/2010 |
| CN | 102075633 | | 5/2011 |
| CN | 201845183 | U | 5/2011 |
| EP | 1705875 | A2 | 3/2005 |
| EP | 1705075 | | 9/2006 |
| EP | 1705874 | A1 | 9/2006 |
| EP | 1 783 919 | | 5/2007 |
| EP | 1970792 | | 9/2008 |
| JP | S51-94220 | | 8/1976 |
| JP | S55-088497 | | 7/1980 |
| JP | S56-17780 | U | 2/1981 |
| JP | S56-089086 | | 7/1981 |
| JP | S5690018 | U | 7/1981 |
| JP | S58-182398 | | 10/1983 |
| JP | S60116800 | U | 8/1985 |
| JP | S62-208680 | | 9/1987 |
| JP | S63-115728 | U | 7/1988 |
| JP | 63-142981 | | 9/1988 |
| JP | 63140753 | U | 9/1988 |
| JP | H0212099 | | 1/1990 |
| JP | H02-62199 | | 3/1990 |
| JP | 2-182098 | | 7/1990 |
| JP | 3-29424 | | 2/1991 |
| JP | H03-117995 | U | 12/1991 |
| JP | 4-90298 | | 3/1992 |
| JP | H0573073 | | 3/1993 |
| JP | H05-41297 | | 6/1993 |
| JP | H05-183618 | | 7/1993 |
| JP | H05-207579 | | 8/1993 |
| JP | H05-292167 | | 11/1993 |
| JP | 06-030494 | | 2/1994 |
| JP | 3003950 | U | 8/1994 |
| JP | 3009206 | U | 1/1995 |
| JP | 07-107146 | | 4/1995 |
| JP | 07-131268 | A | 5/1995 |
| JP | H7-039150 | U | 7/1995 |
| JP | H07210176 | | 8/1995 |
| JP | 08-033026 | A | 2/1996 |
| JP | H879338 | | 3/1996 |
| JP | 8-102780 | | 4/1996 |
| JP | H08-090986 | | 4/1996 |
| JP | H08111703 | | 4/1996 |
| JP | 08-237185 | A | 9/1996 |
| JP | H08-256080 | | 10/1996 |
| JP | H09-023256 | | 1/1997 |
| JP | H10-042021 | | 2/1998 |
| JP | 3050147 | | 4/1998 |
| JP | 10-136480 | | 5/1998 |
| JP | H10-200608 | | 7/1998 |
| JP | 10-227 | U | 9/1998 |
| JP | H11-112672 | | 4/1999 |
| JP | H11-163980 | A | 6/1999 |
| JP | 3064055 | U | 9/1999 |
| JP | 11-298595 | | 10/1999 |
| JP | H11-352138 | | 12/1999 |
| JP | 2000-013294 | | 1/2000 |
| JP | 2000-031858 | | 1/2000 |
| JP | 2000-49935 | | 2/2000 |
| JP | 3070222 | U | 4/2000 |
| JP | 2000/217015 | A | 8/2000 |
| JP | 2000-295696 | | 10/2000 |
| JP | 2000-322186 | | 11/2000 |
| JP | 2000-324217 | | 11/2000 |
| JP | 2001125742 | | 5/2001 |
| JP | 2001-177809 | | 6/2001 |
| JP | 2001169016 | | 6/2001 |
| JP | 2001-268211 | | 9/2001 |
| JP | 2001-287183 | A | 10/2001 |
| JP | 2001287183 | | 10/2001 |
| JP | 2001-320790 | | 11/2001 |
| JP | 2001-333161 | A | 11/2001 |
| JP | 2001-339504 | | 12/2001 |
| JP | 2001-352395 | | 12/2001 |
| JP | 2002-016720 | | 1/2002 |
| JP | 2002-036158 | A | 2/2002 |
| JP | 2002-041411 | A | 2/2002 |
| JP | 2002-051111 | | 2/2002 |
| JP | 2002036158 | | 2/2002 |
| JP | 2002041411 | | 2/2002 |
| JP | 2002-84575 | | 3/2002 |
| JP | 2002-111822 | A | 4/2002 |
| JP | 2002-149312 | | 5/2002 |
| JP | 2002-164986 | A | 6/2002 |
| JP | 2002-171321 | A | 6/2002 |
| JP | 2002-223475 | | 8/2002 |
| JP | 2002-238262 | A | 8/2002 |
| JP | 2002-262377 | | 9/2002 |
| JP | 3090729 | U | 10/2002 |
| JP | 2002-359889 | A | 12/2002 |
| JP | 2002-368839 | | 12/2002 |
| JP | 2003-032768 | | 1/2003 |
| JP | 2003032343 | | 1/2003 |
| JP | 2003-037651 | | 2/2003 |
| JP | 2003-102094 | | 4/2003 |
| JP | 2003-103220 | A | 4/2003 |
| JP | 2003-111175 | A | 4/2003 |
| JP | 2003-125473 | A | 4/2003 |
| JP | 2003101625 | | 4/2003 |
| JP | 2003-143253 | | 5/2003 |
| JP | 2003-145048 | | 5/2003 |
| JP | 2003-169115 | | 6/2003 |
| JP | 2003-173375 | A | 6/2003 |
| JP | 2003-179988 | | 6/2003 |
| JP | 2003-188985 | | 7/2003 |
| JP | 2003-198719 | | 7/2003 |
| JP | 2003-211087 | | 7/2003 |
| JP | 2003-218989 | | 7/2003 |
| JP | 2003-274376 | | 9/2003 |
| JP | 2003-274470 | | 9/2003 |
| JP | 2003-300015 | | 10/2003 |
| JP | 2003-304308 | | 10/2003 |
| JP | 2003-319022 | | 11/2003 |
| JP | 2003-348208 | | 12/2003 |
| JP | 2004-064457 | | 2/2004 |
| JP | 2004-094389 | | 3/2004 |
| JP | 2004-128915 | | 4/2004 |
| JP | 2004-157873 | | 6/2004 |
| JP | 2004-158961 | A | 6/2004 |
| JP | 2004-173018 | A | 6/2004 |
| JP | 2004-173264 | | 6/2004 |
| JP | 2004-187031 | | 7/2004 |
| JP | 2004-205839 | | 7/2004 |
| JP | 2004190699 | | 7/2004 |
| JP | 2004208220 | | 7/2004 |
| JP | 2004233316 | | 8/2004 |
| JP | 2004-252626 | | 9/2004 |
| JP | 2004-266321 | A | 9/2004 |
| JP | 2004-274438 | | 9/2004 |
| JP | 2004-357198 | | 12/2004 |
| JP | 2005-020234 | | 1/2005 |
| JP | 2005-020730 | | 1/2005 |
| JP | 2005072643 | | 3/2005 |
| JP | 2005-311125 | | 4/2005 |
| JP | 2005-512440 | A | 4/2005 |
| JP | 2005-142835 | | 6/2005 |
| JP | 2005-159969 | | 6/2005 |
| JP | 2005142729 | | 6/2005 |
| JP | 2005151292 | A | 6/2005 |
| JP | 2005-184267 | | 7/2005 |
| JP | 2005-223717 | A | 8/2005 |
| JP | 2005-229324 | | 8/2005 |
| JP | 2005-237026 | | 9/2005 |
| JP | 2005-244968 | | 9/2005 |
| JP | 2005-328125 | A | 11/2005 |

(56) References Cited

FOREIGN PATENT DOCUMENTS

| | | | |
|---|---|---|---|
| JP | 2005-534269 | | 11/2005 |
| JP | 2005-340927 | | 12/2005 |
| JP | 2005-341543 | | 12/2005 |
| JP | 2005-348193 | | 12/2005 |
| JP | 2005-352024 | | 12/2005 |
| JP | 2006-007342 | A | 1/2006 |
| JP | 2006-007919 | | 1/2006 |
| JP | 2006-011591 | A | 1/2006 |
| JP | 2006-019812 | | 1/2006 |
| JP | 2006005625 | | 1/2006 |
| JP | 2006007342 | | 1/2006 |
| JP | 2006-050056 | A | 2/2006 |
| JP | 2006-051300 | | 2/2006 |
| JP | 2006-066972 | A | 3/2006 |
| JP | 2006-067049 | | 3/2006 |
| JP | 2006-074671 | A | 3/2006 |
| JP | 2006-086581 | | 3/2006 |
| JP | 2006-109326 | | 4/2006 |
| JP | 2006-115060 | | 4/2006 |
| JP | 2006-115476 | | 4/2006 |
| JP | 2006094158 | | 4/2006 |
| JP | 2006-129117 | | 5/2006 |
| JP | 2006-129404 | | 5/2006 |
| JP | 2006-148295 | | 6/2006 |
| JP | 2006-155734 | | 6/2006 |
| JP | 2006-157318 | | 6/2006 |
| JP | 2006-165702 | | 6/2006 |
| JP | 2006-166128 | | 6/2006 |
| JP | 2006-166300 | | 6/2006 |
| JP | 2006/186691 | A | 7/2006 |
| JP | 2006-197404 | | 7/2006 |
| JP | 2006197267 | | 7/2006 |
| JP | 2006-211317 | | 8/2006 |
| JP | 2006-217321 | | 8/2006 |
| JP | 2006-226506 | | 8/2006 |
| JP | 2006-229647 | A | 8/2006 |
| JP | 2006217088 | | 8/2006 |
| JP | 2006-238072 | | 9/2006 |
| JP | 2006-283541 | | 10/2006 |
| JP | 2006-295786 | | 10/2006 |
| JP | 2006303618 | | 11/2006 |
| JP | 2006-333058 | | 12/2006 |
| JP | 2006-339914 | | 12/2006 |
| JP | 2006-345025 | A | 12/2006 |
| JP | 2006-345471 | | 12/2006 |
| JP | 2006333058 | | 12/2006 |
| JP | 2007-003702 | | 1/2007 |
| JP | 2007-006369 | | 1/2007 |
| JP | 2007/010518 | | 1/2007 |
| JP | 2007-019898 | | 1/2007 |
| JP | 2007-019957 | | 1/2007 |
| JP | 2007-020051 | | 1/2007 |
| JP | 2007-028469 | | 2/2007 |
| JP | 2007-051007 | | 3/2007 |
| JP | 2007-051395 | A | 3/2007 |
| JP | 2007-072015 | | 3/2007 |
| JP | 2007/074663 | | 3/2007 |
| JP | 2007-081276 | | 3/2007 |
| JP | 2007505540 | A | 3/2007 |
| JP | 2007-096386 | | 4/2007 |
| JP | 2007-103989 | | 4/2007 |
| JP | 2007-104548 | | 4/2007 |
| JP | 2007-104603 | A | 4/2007 |
| JP | 2007-129740 | A | 5/2007 |
| JP | 2007-133698 | | 5/2007 |
| JP | 2007-142920 | | 6/2007 |
| JP | 2007-165938 | | 6/2007 |
| JP | 2007-180827 | | 7/2007 |
| JP | 2007-189578 | | 7/2007 |
| JP | 2007-195239 | | 8/2007 |
| JP | 2007-214883 | | 8/2007 |
| JP | 2007-228508 | | 9/2007 |
| JP | 2007-268028 | A | 10/2007 |
| JP | 2007-275819 | | 10/2007 |
| JP | 2007281916 | | 10/2007 |
| JP | 2007-306465 | | 11/2007 |
| JP | 2007-307124 | | 11/2007 |
| JP | 2007-330560 | A | 12/2007 |
| JP | 2007-336418 | | 12/2007 |
| JP | 2008-000709 | | 1/2008 |
| JP | 2008-006558 | A | 1/2008 |
| JP | 2008-017327 | | 1/2008 |
| JP | 2008-017398 | | 1/2008 |
| JP | 2008006558 | | 1/2008 |
| JP | 2008-042324 | A | 2/2008 |
| JP | 2008-046844 | | 2/2008 |
| JP | 2008-085417 | | 4/2008 |
| JP | 2008-092164 | | 4/2008 |
| JP | 2008-092313 | | 4/2008 |
| JP | 2008-511217 | | 4/2008 |
| JP | 2008-121796 | | 5/2008 |
| JP | 2008-135991 | | 6/2008 |
| JP | 2008-141589 | | 6/2008 |
| JP | 2008-141687 | | 6/2008 |
| JP | 2008-148086 | | 6/2008 |
| JP | 2008-149427 | A | 7/2008 |
| JP | 2008-153783 | | 7/2008 |
| JP | 2008-177629 | | 7/2008 |
| JP | 2008-177705 | | 7/2008 |
| JP | 2008149427 | | 7/2008 |
| JP | 3144392 | U | 8/2008 |
| JP | 2008-227123 | | 9/2008 |
| JP | 2008-227806 | | 9/2008 |
| JP | 2008-229531 | | 10/2008 |
| JP | 2008263383 | | 10/2008 |
| JP | 2008-301071 | | 12/2008 |
| JP | 2009-010593 | | 1/2009 |
| JP | 2009-044510 | | 2/2009 |
| JP | 2009-077260 | | 4/2009 |
| JP | 2009-094986 | A | 4/2009 |
| JP | 2009088942 | | 4/2009 |
| JP | 2009-117953 | | 5/2009 |
| JP | 2009-118396 | | 5/2009 |
| JP | 2009111820 | | 5/2009 |
| JP | 2009-147680 | | 7/2009 |
| JP | 2009-159402 | | 7/2009 |
| JP | 2009-159577 | | 7/2009 |
| JP | 2009-166213 | A | 7/2009 |
| JP | 2009166213 | | 7/2009 |
| JP | 2009171249 | | 7/2009 |
| JP | 4307488 | | 8/2009 |
| JP | 2009-207056 | | 10/2009 |
| JP | 2009-232443 | | 10/2009 |
| JP | 2009-246954 | | 10/2009 |
| JP | 2009246954 | | 10/2009 |
| JP | 2009-260883 | | 11/2009 |
| JP | 2009-542038 | | 11/2009 |
| JP | 2009267616 | | 11/2009 |
| JP | 2010-010945 | A | 1/2010 |
| JP | 2010-011117 | | 1/2010 |
| JP | 2010-054731 | | 3/2010 |
| JP | 2010-068299 | | 3/2010 |
| JP | 2010-087810 | | 4/2010 |
| JP | 2010-094799 | | 4/2010 |
| JP | 2010-094799 | A | 4/2010 |
| JP | 2010-109795 | | 5/2010 |
| JP | 2010-124287 | | 6/2010 |
| JP | 2010-147727 | | 7/2010 |
| JP | 2010-166406 | | 7/2010 |
| JP | 2010-524295 | | 7/2010 |
| JP | 4541111 | | 7/2010 |
| JP | 2010-528547 | | 8/2010 |
| JP | 2010-207963 | A | 9/2010 |
| JP | 2010207963 | | 9/2010 |
| JP | 2010-232755 | | 10/2010 |
| JP | 2010245854 | | 10/2010 |
| JP | 2010-258701 | | 11/2010 |
| JP | 2010-268336 | | 11/2010 |
| JP | 2010-283541 | | 12/2010 |
| JP | 2011-004195 | A | 1/2011 |
| JP | 2011-008503 | A | 1/2011 |
| JP | 2011-010791 | A | 1/2011 |
| JP | 2011-015193 | | 1/2011 |
| JP | 2011-017969 | | 1/2011 |

(56) References Cited

FOREIGN PATENT DOCUMENTS

| | | | |
|---|---|---|---|
| JP | 2011-035560 | A | 2/2011 |
| JP | 2011-048697 | | 3/2011 |
| JP | 2011-053744 | | 3/2011 |
| JP | 2011-059376 | | 3/2011 |
| JP | 2011-087142 | A | 4/2011 |
| JP | 2011-512745 | | 4/2011 |
| JP | 2011-130334 | | 6/2011 |
| JP | 2011114454 | | 6/2011 |
| JP | 2011-135489 | | 7/2011 |
| JP | 2011-139439 | | 7/2011 |
| JP | 2011-139462 | | 7/2011 |
| JP | 2011-212167 | A | 10/2011 |
| JP | 2011-223556 | | 11/2011 |
| JP | 2011-223824 | A | 11/2011 |
| JP | 2011-233971 | | 11/2011 |
| JP | 2011-234323 | A | 11/2011 |
| JP | 2012-508499 | A | 4/2012 |
| JP | 2012-109663 | | 6/2012 |
| JP | 2012-138770 | | 7/2012 |
| JP | 2012-515574 | A | 7/2012 |
| JP | 2012142679 | | 7/2012 |
| JP | 2012-156781 | | 8/2012 |
| JP | 2012150266 | | 8/2012 |
| JP | 2012-169817 | | 9/2012 |
| JP | 2012-178695 | A | 9/2012 |
| JP | 2012-249097 | | 12/2012 |
| JP | 2012-257072 | | 12/2012 |
| JP | 2012244515 | | 12/2012 |
| JP | 2013-005212 | | 1/2013 |
| JP | 2013-055492 | A | 3/2013 |
| JP | 2013-061176 | | 4/2013 |
| JP | 2013-078116 | | 4/2013 |
| JP | 2013078116 | | 4/2013 |
| JP | 2013-081047 | A | 5/2013 |
| JP | 2013105272 | | 5/2013 |
| JP | 2013115638 | | 6/2013 |
| JP | 2013-128896 | A | 7/2013 |
| JP | 2013130402 | | 7/2013 |
| JP | 2013-198072 | A | 9/2013 |
| JP | 2013-201560 | | 10/2013 |
| JP | 2013-235316 | A | 11/2013 |
| JP | 2013-255091 | A | 12/2013 |
| JP | 2013-255212 | A | 12/2013 |
| JP | 2013255091 | | 12/2013 |
| JP | 2013255212 | | 12/2013 |
| JP | 2014-003488 | A | 1/2014 |
| JP | 2014003488 | | 1/2014 |
| JP | 2014-089494 | A | 5/2014 |
| JP | 2014-116972 | | 6/2014 |
| JP | 2014-190965 | | 10/2014 |
| JP | 2014-229991 | A | 12/2014 |
| JP | 5676003 | | 2/2015 |
| JP | 2015-061285 | | 3/2015 |
| JP | 2015082818 | | 4/2015 |
| JP | 2015-084801 | A | 5/2015 |
| JP | 2015084801 | | 5/2015 |
| JP | 2015-139132 | | 7/2015 |
| KR | 970008927 | | 5/1997 |
| KR | 10-1998-0022845 | | 6/1998 |
| KR | 10-2005-0086378 | | 8/2005 |
| KR | 20060121606 | A * | 11/2006 |
| KR | 10-2007-0109323 | | 11/2007 |
| KR | 10-2008-0006514 | | 1/2008 |
| KR | 10-2008-0009602 | | 1/2008 |
| KR | 10-2008-0040962 | | 5/2008 |
| KR | 10-2009-0033564 | | 4/2009 |
| KR | 10-2009-0120951 | | 11/2009 |
| KR | 10-2010-0034906 | A | 4/2010 |
| KR | 10-2010-0041386 | A | 4/2010 |
| TW | 200423682 | | 11/2004 |
| TW | 200536415 | A | 11/2005 |
| TW | 200539664 | A | 12/2005 |
| TW | 200605621 | | 2/2006 |
| TW | I391880/200912814 | | 3/2009 |
| TW | 200922261 | A | 5/2009 |
| TW | 201018982 | | 5/2010 |
| TW | 201119339 | | 6/2011 |
| TW | M452360 | U | 5/2013 |
| TW | 201342313 | | 10/2013 |
| WO | 199805148 | | 2/1998 |
| WO | 2003/055183 | | 7/2003 |
| WO | 2004/034734 | | 4/2004 |
| WO | 2005/067339 | | 7/2005 |
| WO | 2005/069586 | | 7/2005 |
| WO | 2005/091670 | | 9/2005 |
| WO | 2005/096599 | | 10/2005 |
| WO | 2005/096664 | | 10/2005 |
| WO | WO 2006/006313 | A1 | 1/2006 |
| WO | 2006-021133 | | 3/2006 |
| WO | WO 2006/028045 | A1 | 3/2006 |
| WO | 2006/075440 | | 7/2006 |
| WO | 2007/034739 | | 3/2007 |
| WO | 2007-099707 | | 9/2007 |
| WO | 2008/007666 | | 1/2008 |
| WO | 2008/029515 | | 3/2008 |
| WO | 2009/104437 | | 8/2009 |
| WO | 2009/133873 | | 11/2009 |
| WO | 2009/136498 | | 11/2009 |
| WO | 2009/141912 | | 11/2009 |
| WO | 2010-005045 | | 1/2010 |
| WO | 2010/050154 | | 5/2010 |
| WO | 2010/060323 | | 6/2010 |
| WO | 2010/116510 | | 10/2010 |
| WO | 2010140087 | | 12/2010 |
| WO | 2011/007679 | | 1/2011 |
| WO | WO 2011/023672 | A1 | 3/2011 |
| WO | 2011/090944 | | 7/2011 |
| WO | 2011/121740 | | 10/2011 |
| WO | 2011/153165 | | 12/2011 |
| WO | 2011/159349 | | 12/2011 |
| WO | 2002/021881 | | 3/2012 |
| WO | 2012/090947 | | 7/2012 |
| WO | 2012/097314 | | 7/2012 |
| WO | 2012/114917 | | 8/2012 |
| WO | 2012114772 | | 8/2012 |
| WO | 2013/047609 | | 4/2013 |
| WO | 2013/121631 | | 8/2013 |
| WO | WO 2013/168628 | | 11/2013 |
| WO | 2014/156534 | | 10/2014 |
| WO | 2015/122879 | | 8/2015 |

OTHER PUBLICATIONS

Office Action mailed for Japanese Patent Application No. 2013-227279 dated Oct. 17, 2017 with English translation.
Office Action for Japanese Patent Application No. 2013-221303 dated Oct. 17, 2017 with English Translation.
Office Action for Japanese Patent Application No. 2013-237963 dated Nov. 7, 2017 with English Translation.
Office Action for Japanese Application No. 2017-004233 dated Nov. 21, 2017 with English Translation.
Office Action for Japanese Patent Application No. 2016-236604 dated Nov. 21, 2017 with English Translation.
Office Action for Japanese Patent Application No. 2014-010271 dated Nov. 28, 2017 with English Translation.
Office Action for Japanese Patent Application No. 2017-000580 dated Dec. 19, 2017 with English Translation.
Office Action for Korean Application No. 10-2016-7004740 dated Dec. 19, 2017 with English Translation.
Office Action for Japanese Patent Application No. 2013-221303 dated Dec. 26, 2017 with English Translation.
Office Action for Japanese Patent Application No. 2013-237963 dated Dec. 26, 2017 with English Translation.
Japan Patent Office, International Search Report for PCT/JP2016/070848 dated Sep. 6, 2016, with English translation.
Japan Patent Office, International Search Report for PCT/JP2016/076494 dated Nov. 29, 2016, with English translation.
SIPO Patent Office, Chinese Patent Application No. 2014800584218 dated Jan. 3, 2018, with English translation.
Japan Patent Office, Office Action for Japanese Patent Application No. 2013-106416 dated Jan. 9, 2018 with English translation.

(56) References Cited

OTHER PUBLICATIONS

European Patent Office, EESR for European Patent Application No. 15834516 dated Mar. 12, 2018.
Japan Patent Office, Office Action for Japanese Patent Application No. 2016-202733 dated Mar. 13, 2018 with English translation.
Japanese Patent Office, International Search Report for PCT/JP2013/067781 dated Oct. 1, 2013 (with English translation).
Japanese Office Action in Japanese Application No. 2016-051347, dated Feb. 14, 2017, 6 pages (English Translation).
Korean Office Action in Korean Application No. 10-2015-7005518, dated Mar. 20, 2017, 12 pages (English Translation).
Japanese Office Action in Japanese Application No. 2015-217421, dated Feb. 28, 2017, 6 pages (English Translation).
Japanese Office Action in Japanese Application No. 2013-028997, dated Mar. 21, 2017, 8 pages (English Translation).
International Search Report for International Application No. PCT/JP2017/000787, dated Mar. 28, 2017, 1 page.
Japanese Office Action in Japanese Application No. 2016-087027, dated Mar. 28, 2017, 9 pages (English Translation).
Japanese Office Action in Japanese Application No. 2016-097777, dated Mar. 21, 2017, 8 pages (English Translation).
Chinese Office Action in Chinese Application No. 201510148247.2, dated May 3, 2017, 39 pages (English Translation).
Japan Patent Office, International Search Report for PCT/JP2015/071490 dated Nov. 2, 2015 with English translation.
U.S. Patent and Trademark Office, Office Action in U.S. Appl. No. 15/174,746 dated Nov. 25, 2016.
Smartphone Black Berry Bold 9700, Operation guide (2010).
Office Action for JP Patent Application No. 2016-013411 dated Nov. 22, 2016 with English Translation.
Office Action for KR Patent Application No. 10-2016-7004740 dated Nov. 28, 2016 with English Translation.
Office Action for JP Patent Application No. 2012-252203 dated Dec. 20, 2016 with English Translation.
Office Action for JP Patent Application No. 2012-243480 dated Dec. 20, 2016 with English Translation.
Office Action for JP Patent Application No. 2012-229176 dated Dec. 27, 2016 with English Translation.
Office Action for JP Patent Application No. 2012-268649 dated Jan. 31, 2017 with English Translation.
Office Action for JP Patent Application No. 2012-054308 dated Feb. 7, 2017 with English Translation.
Final Office Action for JP Patent Application No. 2012-120173 dated Feb. 7, 2017 with English translation.
European Patent Office, Partial Search Report for EP 11 85 3443 dated Oct. 27, 2016.
Japanese Patent Office, official communication in Japanese Patent Application No. 2012-054308 dated Jun. 7, 2016 (and machine translation).
Japanese Patent Office, official communication in Japanese Patent Application No. 2015-056466 dated Jul. 12, 2016 (and machine translation).
Japanese Patent Office, official communication in Japanese Patent Application No. 2015-217427 dated Jul. 19, 2016 (and machine translation).
Japanese Patent Office, official communication in Japanese Patent Application No. 2015-217421 dated Jul. 19, 2016 (and machine translation).
SIPO of People's Republic of China, official communication for Chinese Patent Application No. 201180031904.5 dated Jul. 20, 2016 (and machine translation).
Japanese Patent Office, official communication in Japanese Patent Application No. 2012-120173 dated Jul. 26, 2016 (and machine translation).
Japanese Patent Office, official communication in Japanese Patent Application No. 2015-048052 dated Aug. 2, 2016 (and machine translation).
Japanese Patent Office, official communication in Japanese Patent Application No. 2012-147753 dated Aug. 23, 2016 (and machine translation).
Japanese Patent Office, official communication in Japanese Patent Application No. 2015-231478 dated Aug. 30, 2016 (and machine translation).
News Release, "New Offer of Smartphone Using Cartilage Conduction", Rohm Semiconductor, Kyoto, Japan, Apr. 23, 2012 (with translation).
Japan Patent Office, International Search Report for PCT/JP2014/077792 dated Dec. 16, 2014 (with English translation) (0291US).
Japanese Patent Office, International Search Report for PCT/JP2014/071607 dated Nov. 11, 2014 (with English translation).
Extended European Search Report for PCTJP2013067781 dated Feb. 19, 2016.
Japanese Patent Office, International Search Report for International Patent Application PCT/JP2012/066376 (dated Oct. 30, 2012).
International Search Report for International Patent Application PCT/JP2011/080095 (dated Apr. 3, 2012).
Taiwanese Patent Office, search report in application 100148983 (2 pages) (dated Jan. 17, 2013).
U.S. Patent and Trademark Office, Office Action in U.S. Appl. No. 13/556,367 (dated Oct. 19, 2012).
European Patent Office, official communication in Application No. EP 11 85 3718 (dated May 14, 2014).
U.S. Patent and Trademark Office, Office Action in U.S. Appl. No. 13/489,971 (dated Oct. 24, 2012).
Isaka et al., "Development of Bone Conduction Speaker by Using Piezoelectric Vibration," The JP Society of Mechanical Engineers (No. 04-5) Dynamics and Design Conference 2004 CD-ROM Compilation (Sep. 27-30, 2004; Tokyo) (and English translation).
Japanese Patent Office, International Search Report for International Patent Application PCT/JP2012/053231 (dated Mar. 13, 2012).
Extended European Search Report in European patent application No. 12866397.8 (dated Jul. 20, 2015).
Office Action for corresponding Japanese Patent Application No. 2016-185559 dated Jul. 25, 2017 (with English translation).
Office Action for corresponding Japanese Patent Application No. 2016-195560 dated Aug. 22, 2017 (with English translation).
Office Action for corresponding Japanese Patent Application No. 2016-197219 dated Aug. 22, 2017_(with English translation).
Office Action for corresponding Japanese Patent Application No. 2016-197225 dated Aug. 22, 2017 (with English translation).
Office Action for corresponding Japanese Patent Application No. 2013-186424 dated Sep. 26, 2017 (with English translation).
Office Action for corresponding Japanese Patent Application No. 2013-195756 dated Sep. 26, 2017 (with English translation).
Office Action for corresponding Japanese Patent Application No. 2013-173595 dated Oct. 10, 2017 (with English translation).
Fukumoto, M. and Sugimura, T., Fulltime-wear Interface Technology , NTT Technical Review, 8(1):77-81, (2003) (with English translation).
Sasaki C, Crusoe Supplementary Class note Which Condensed the Function Called for, ASCII, 12 pages (2001) (with partial English translation).
Chinese Office Action in Chinese Application No. 201510148247.2, dated May 3, 2017, 39 pages (with English Translation).
Japanese Office Action in Japanese Application No. 2016-114221 dated Jun. 13, 2017 (with English Translation).
Japanese Office Action in Japanese Application No. 2012-150941, dated May 9, 2017, English Translation.
Shimomura et al,, "Vibration and Acoustic Characteristics of Cartilage Transducer," Acoustical Society of Japan, 2010 (with Partial English Translation).
Rion Co. Ltd. ,"New-generation Vibration Level Meter Model VM-51," Acoustical Society of Japan, 1990 (with Partial English Translation).
Japanese Office Action in Japanese Application No. 2013-106416, dated May 30 2017 (with English Translation).
Japanese Office Action in Japmese Application No. 2012-197484, dated Jun. 13, 2017 (with English Translation).
Japanese Office Action in Japanese Application No. 2013-126623, dated Jun. 13, 2017 (with English Translation).

* cited by examiner

FIG.53A
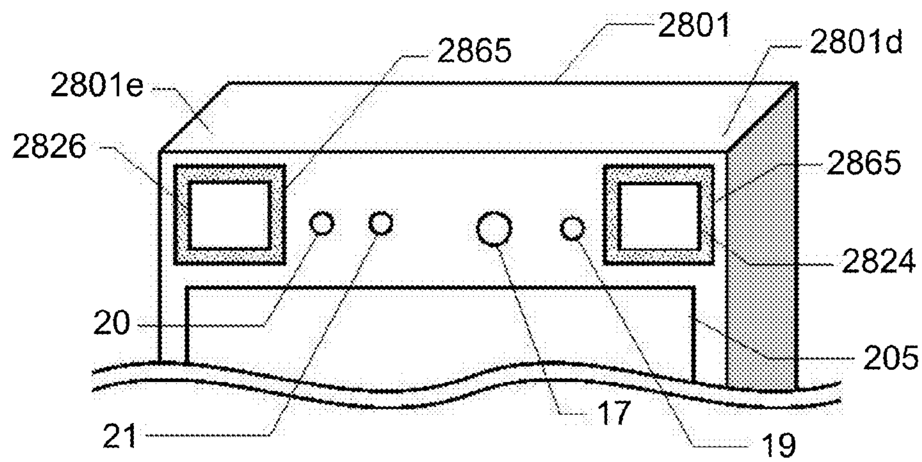
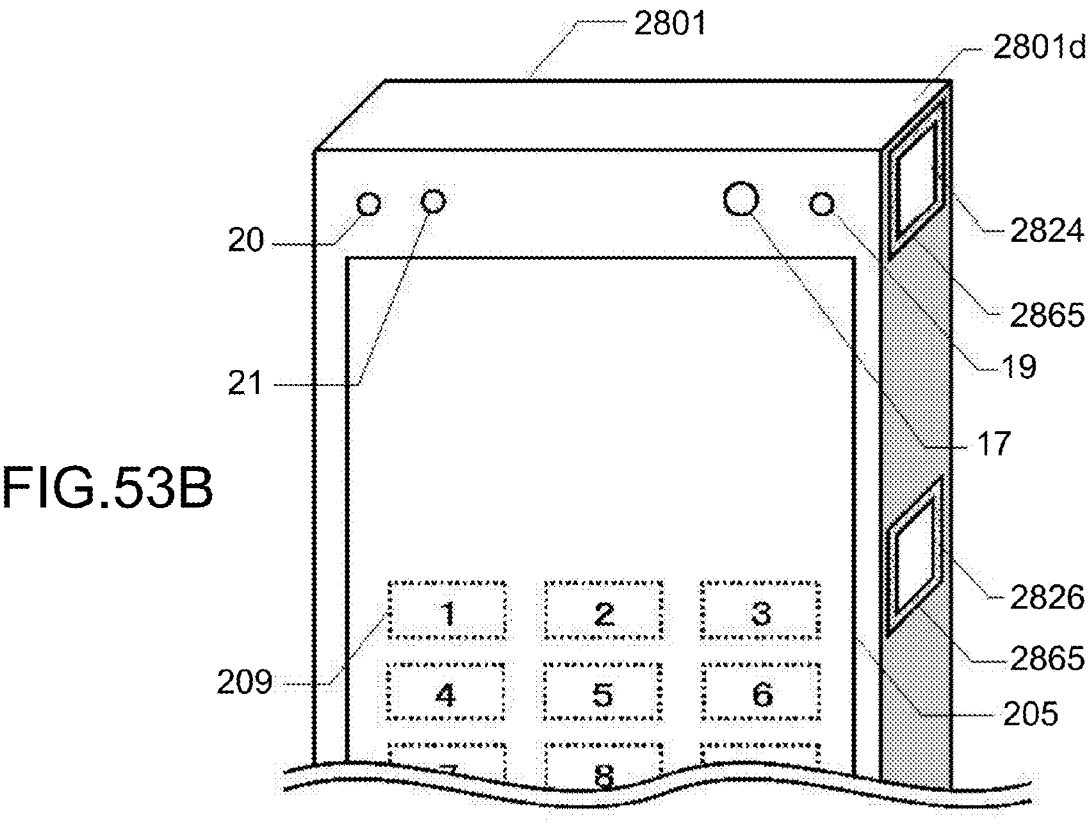
FIG.53B

FIG.62A
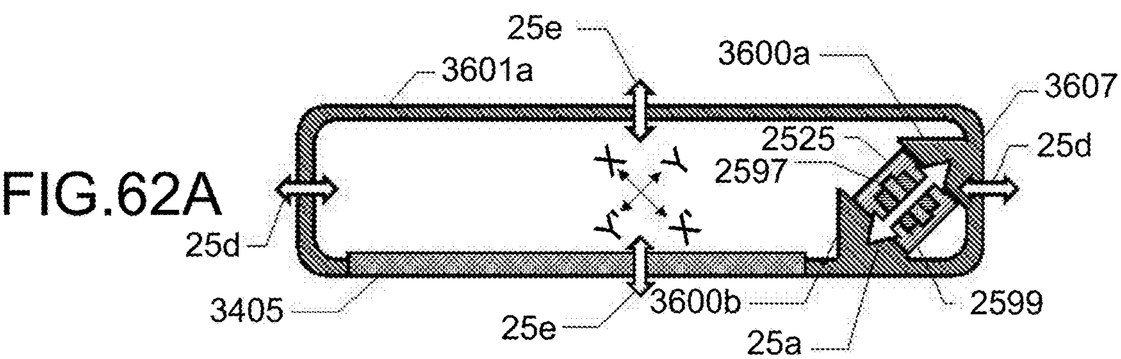
FIG.62B
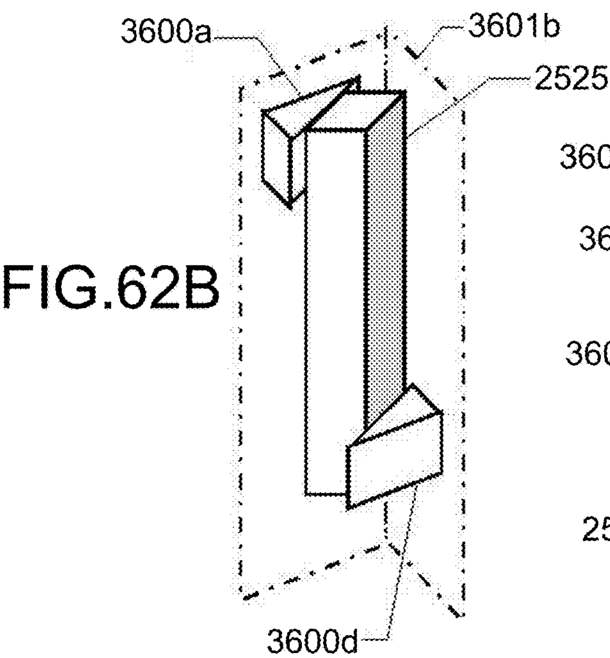
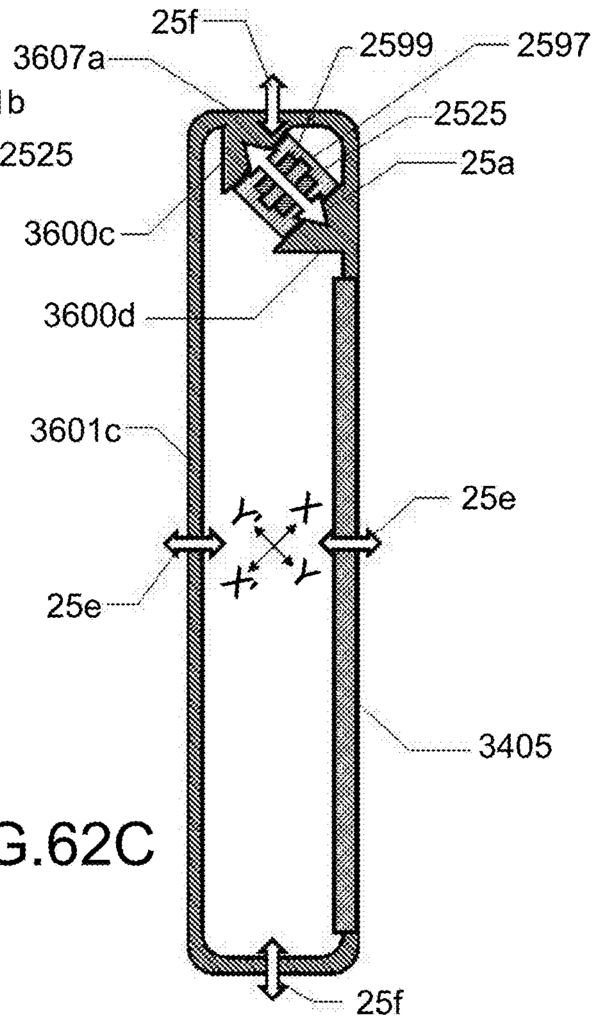
FIG.62C

FIG.65A
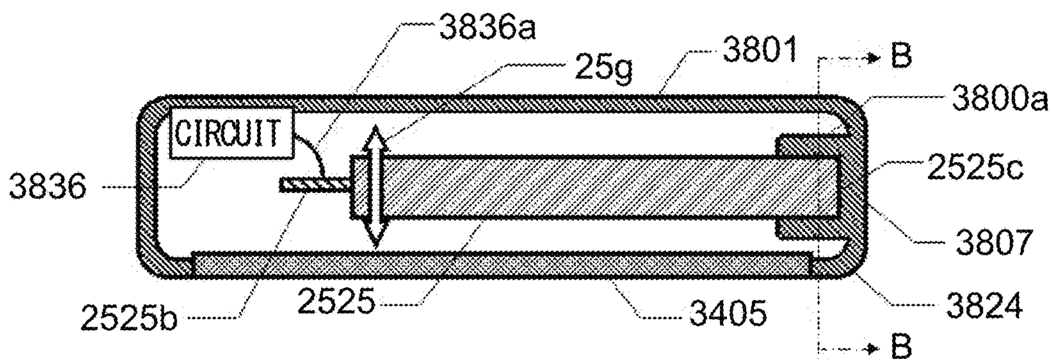
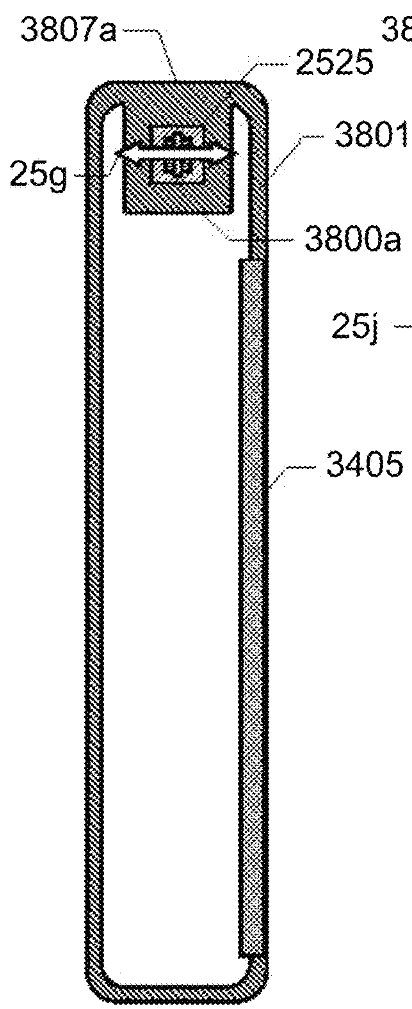
FIG.65B
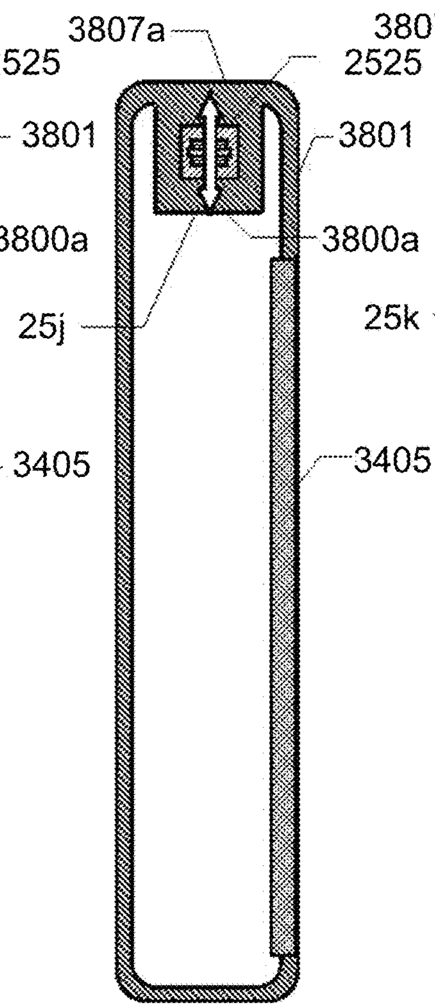
FIG.65C
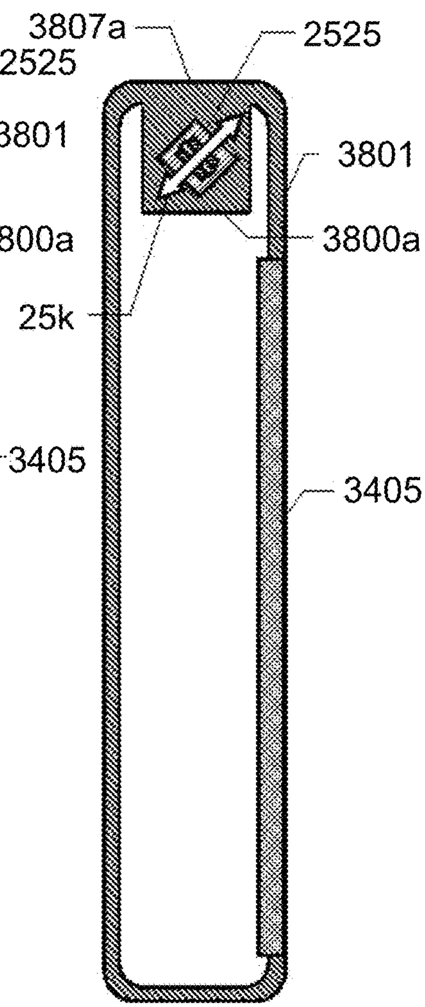
FIG.65D

FIG.68A
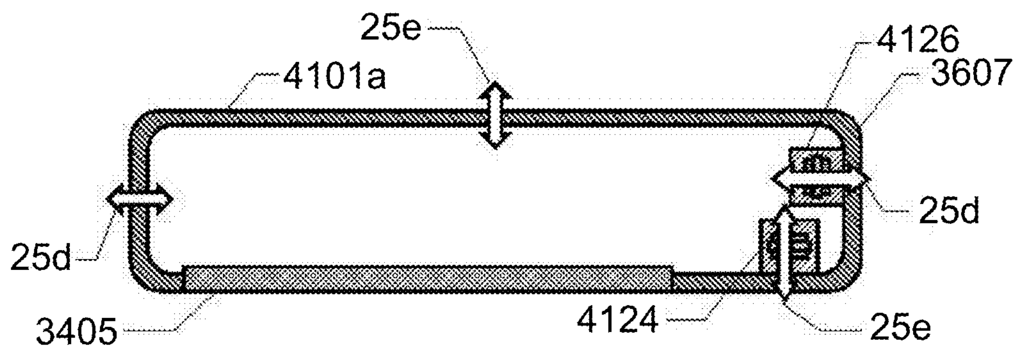
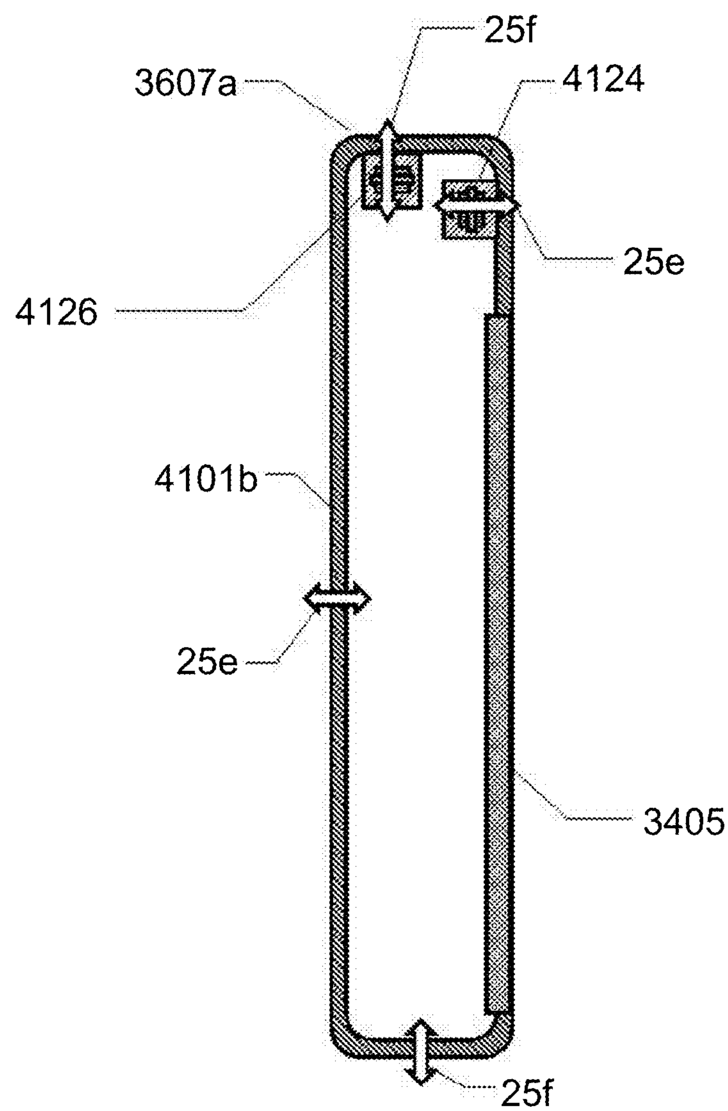
FIG.68B

FIG.78B
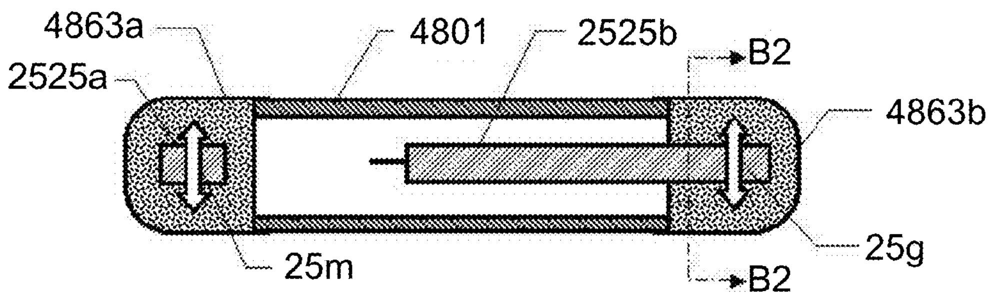
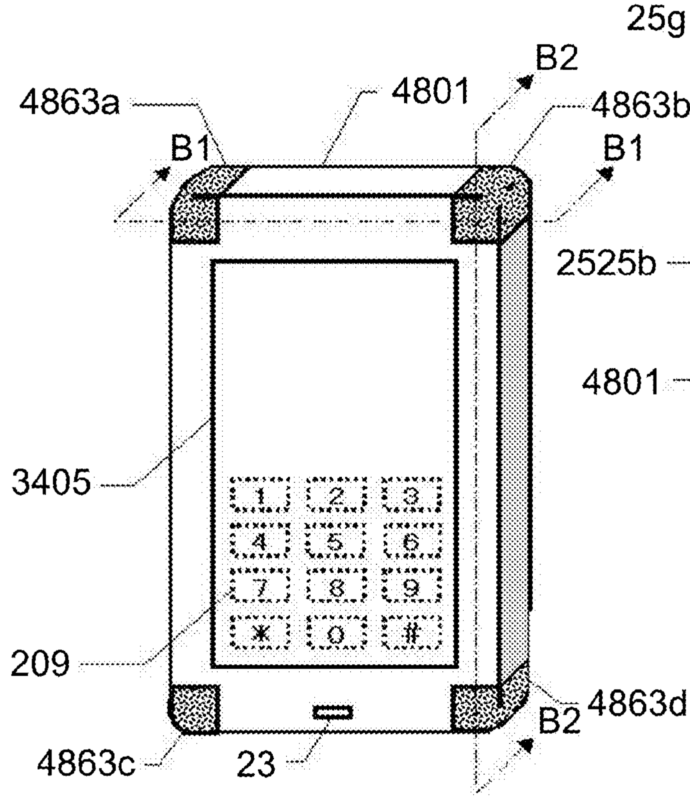
FIG.78A
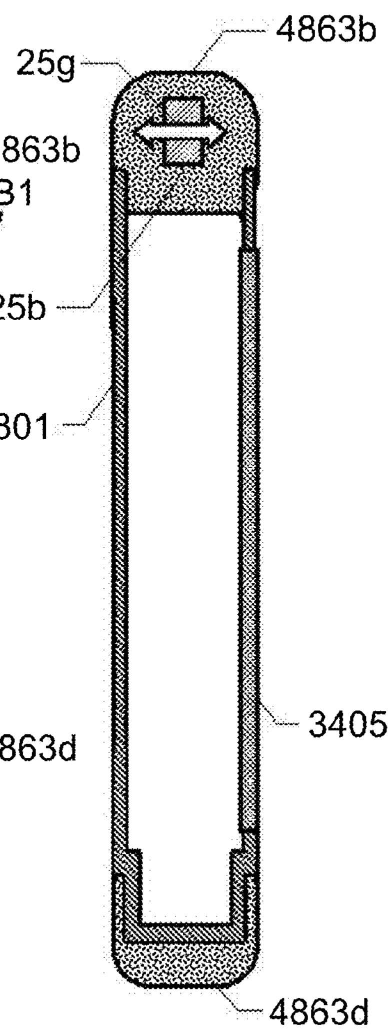
FIG.78C

FIG.86B
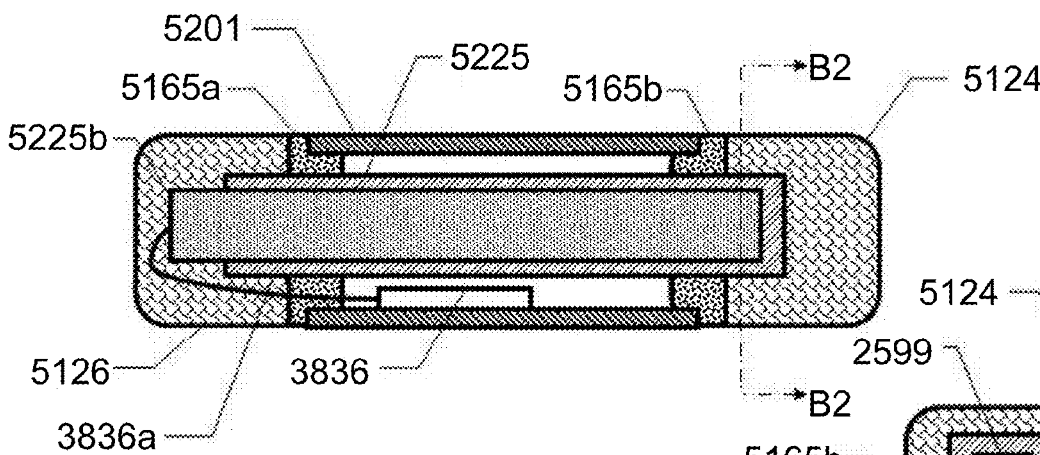
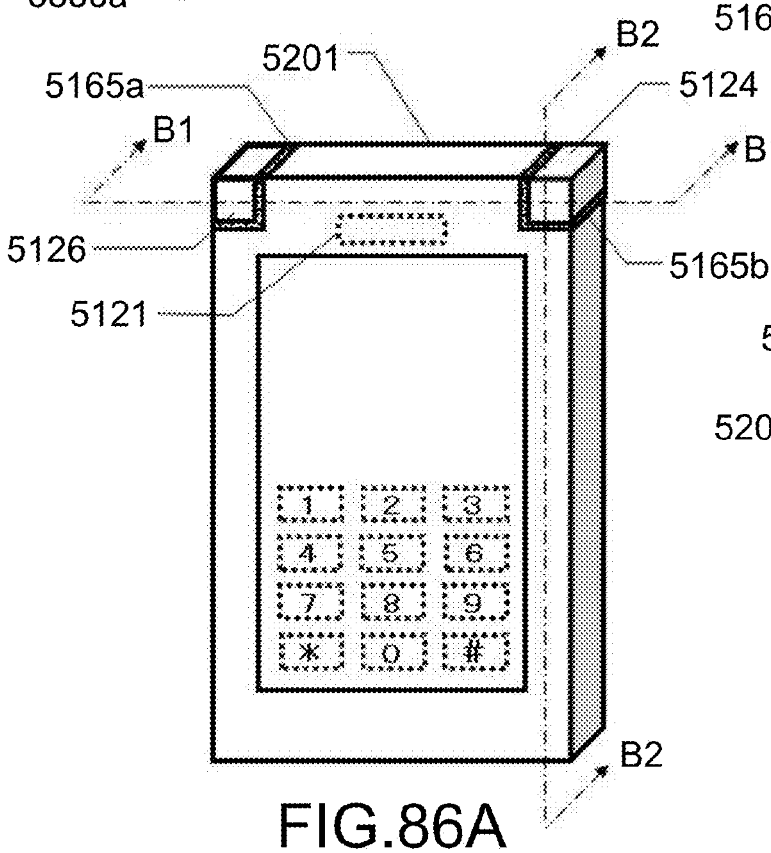
FIG.86A
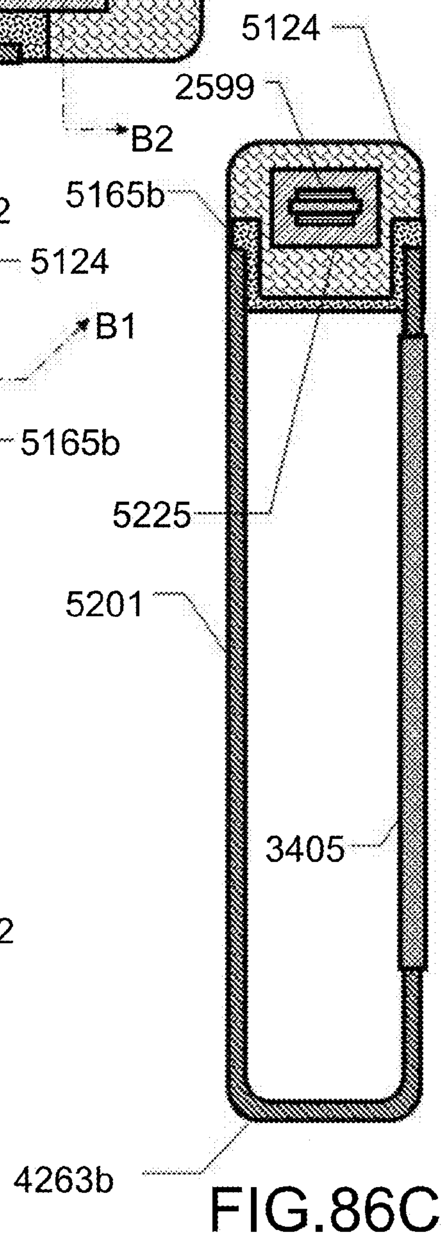
FIG.86C

FIG.88B
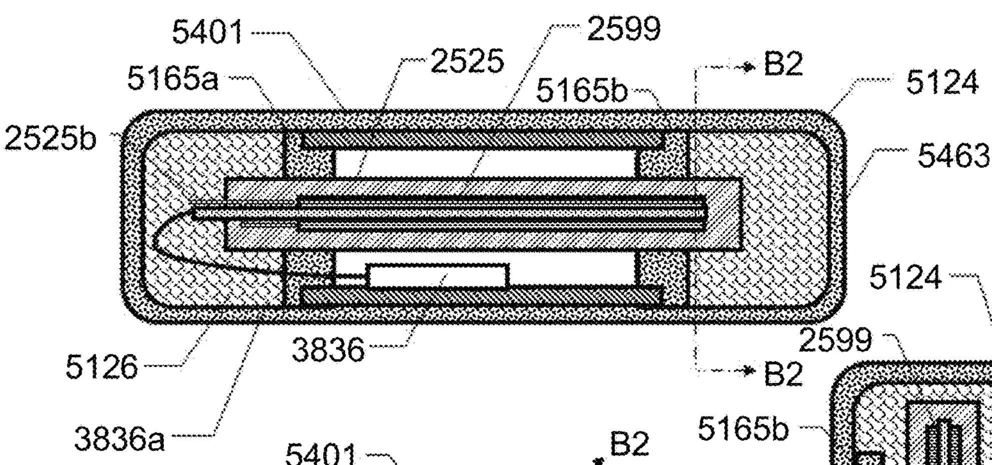
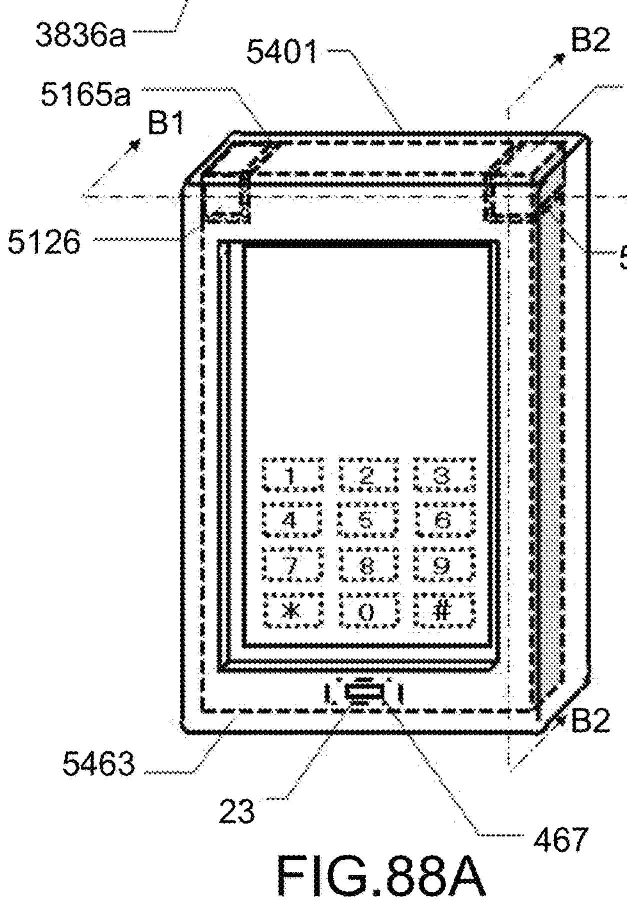
FIG.88A
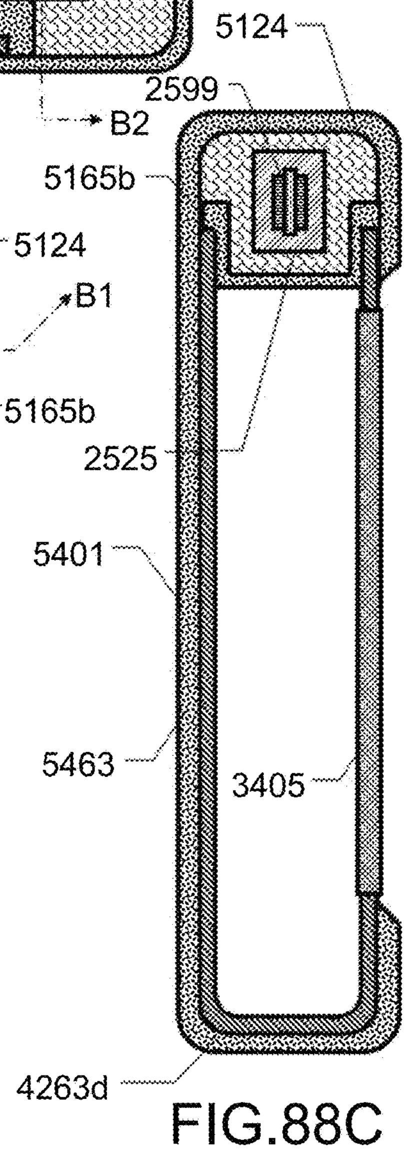
FIG.88C

FIG.89B
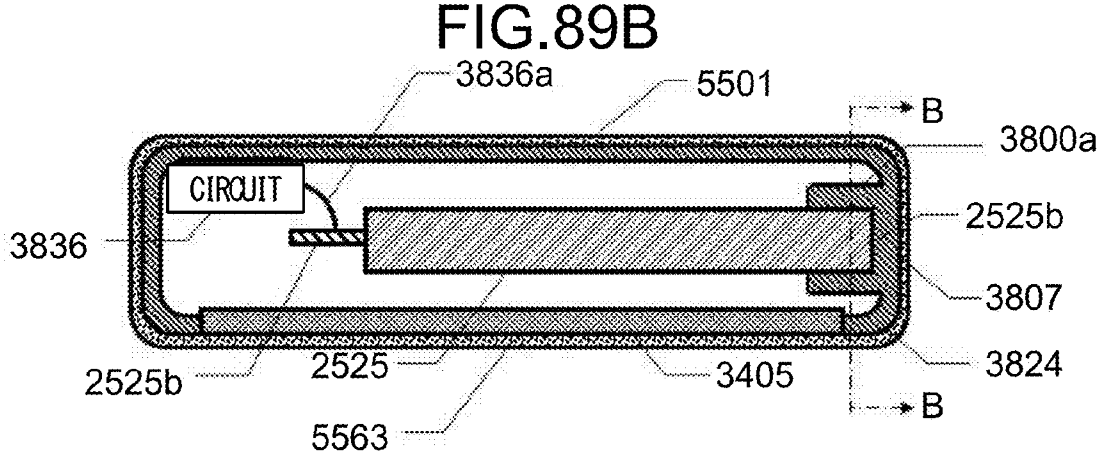
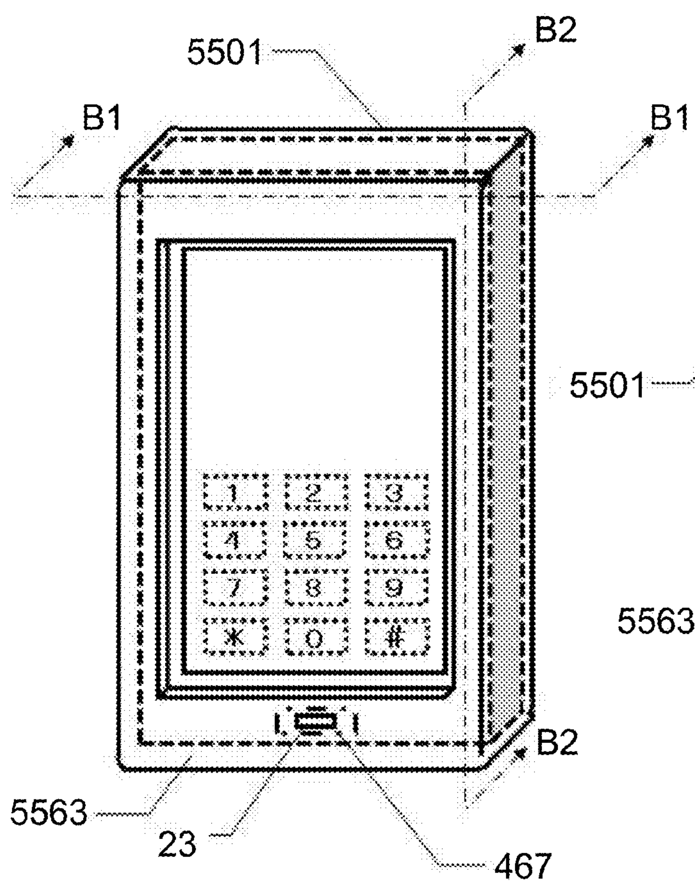
FIG.89A
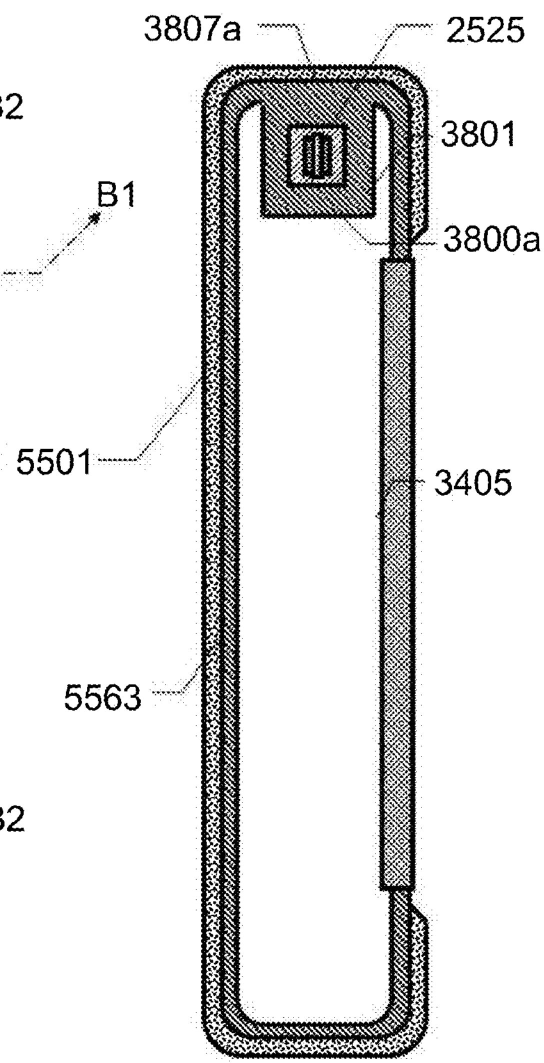
FIG.89C

FIG.90B
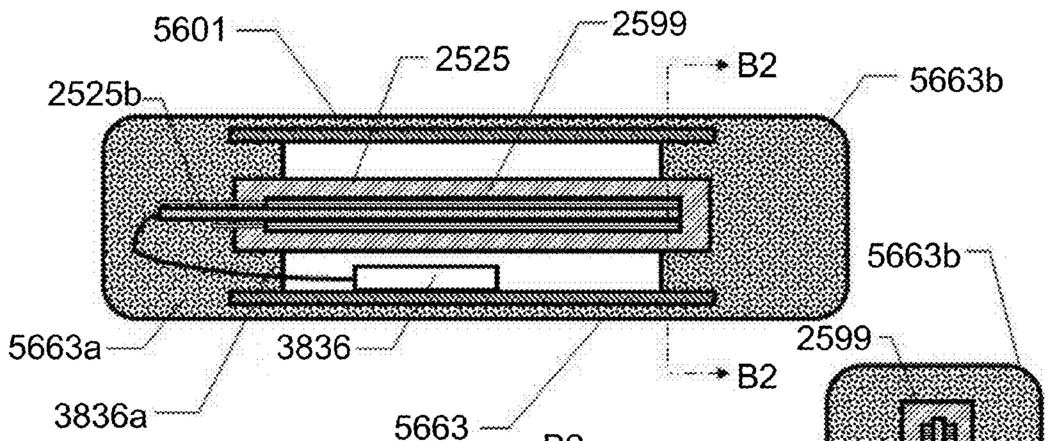
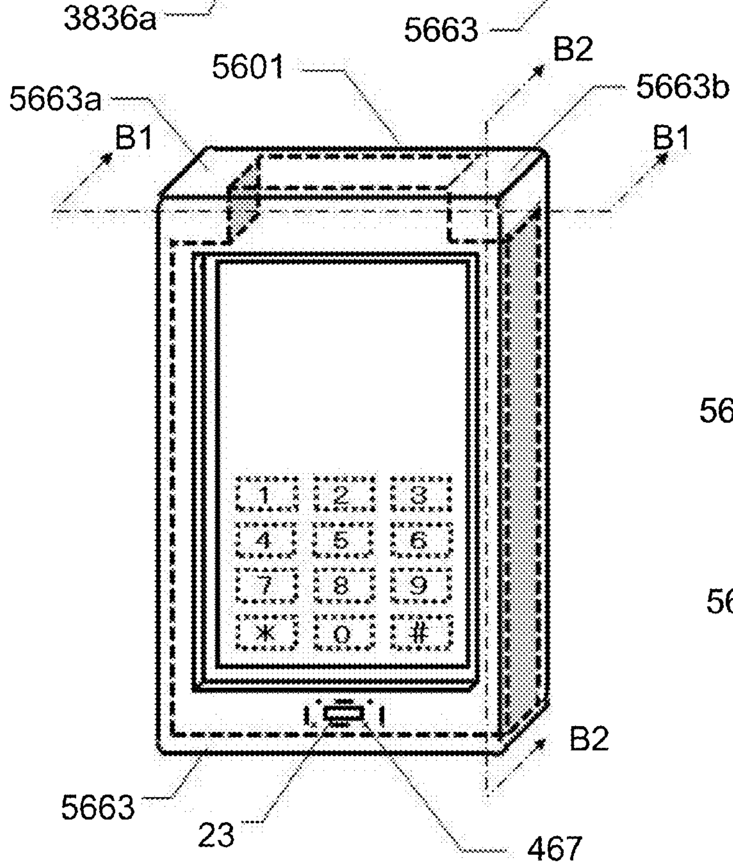
FIG.90A
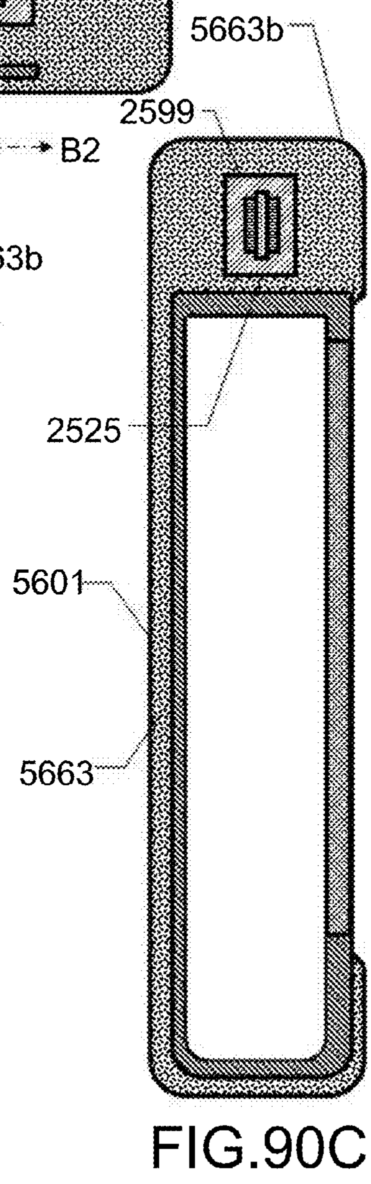
FIG.90C

FIG.91B
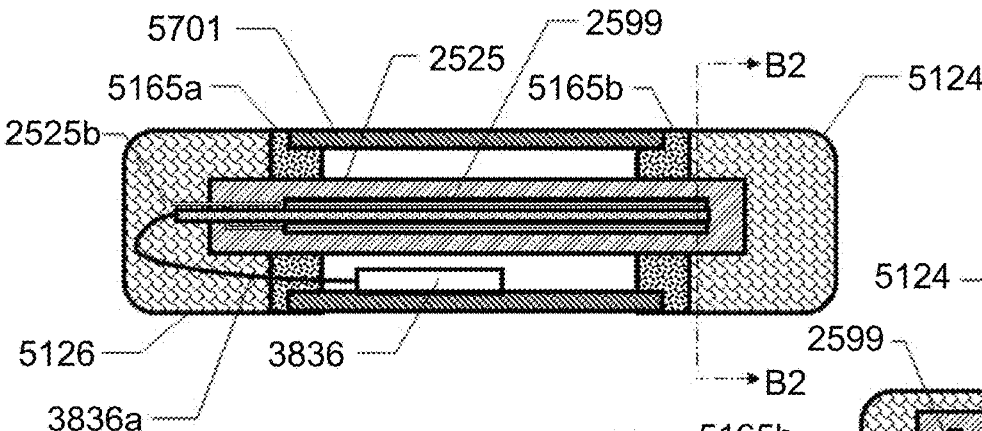
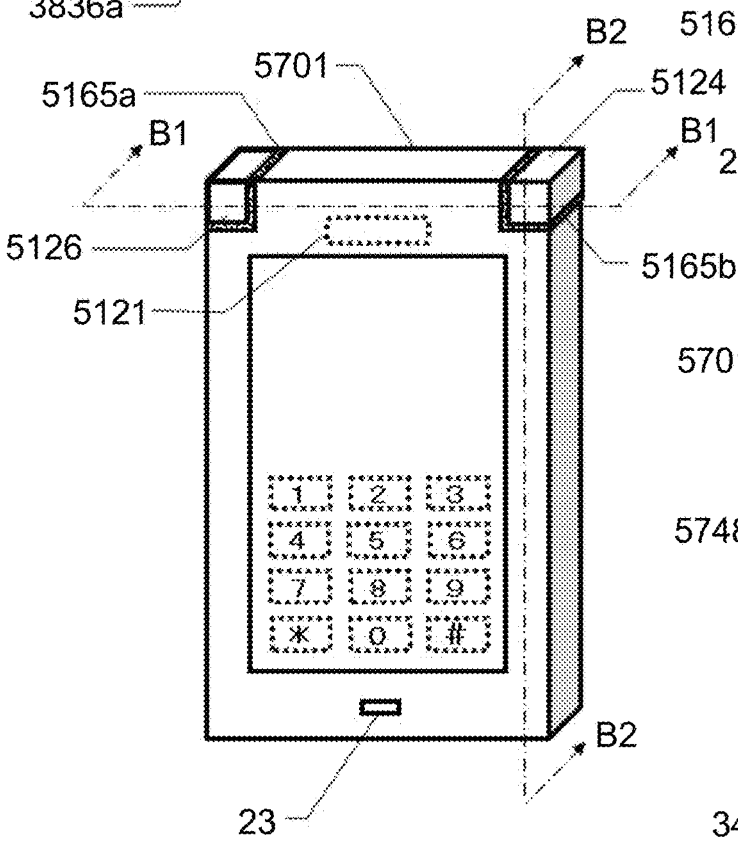
FIG.91A
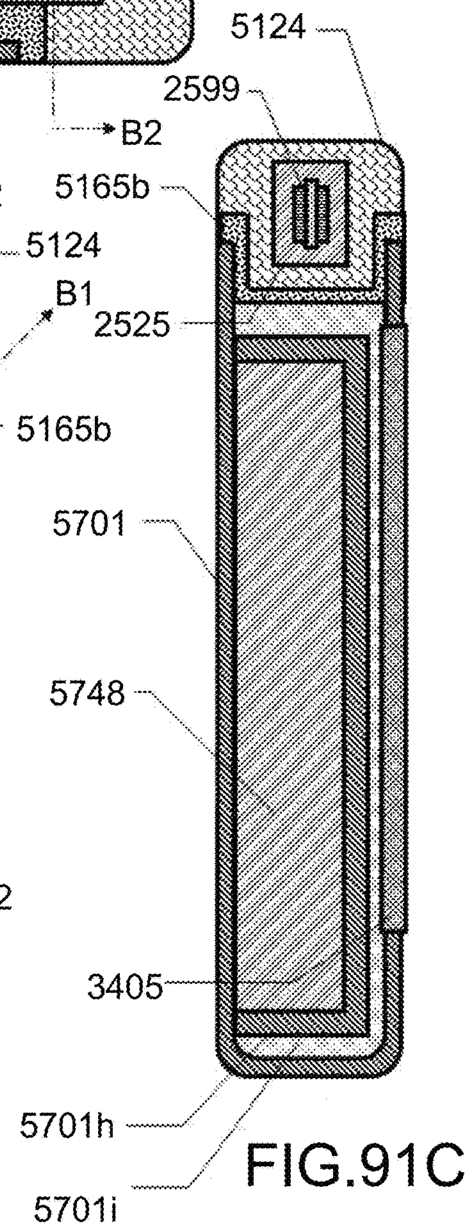
FIG.91C

FIG.92A
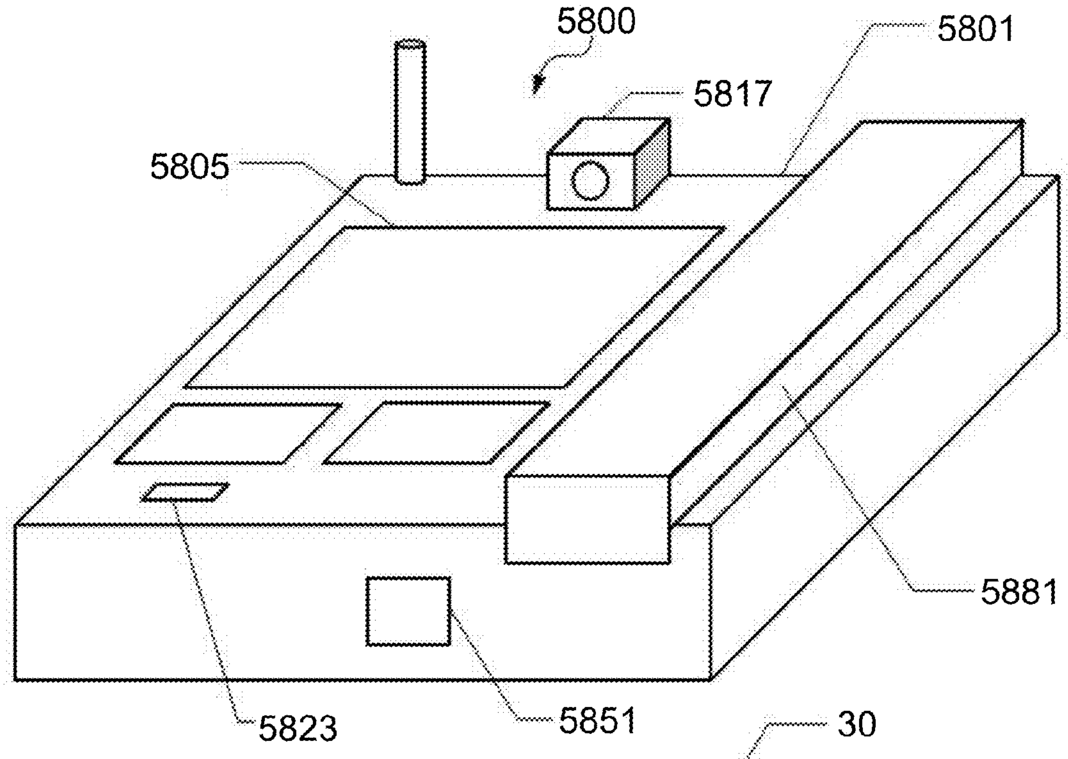
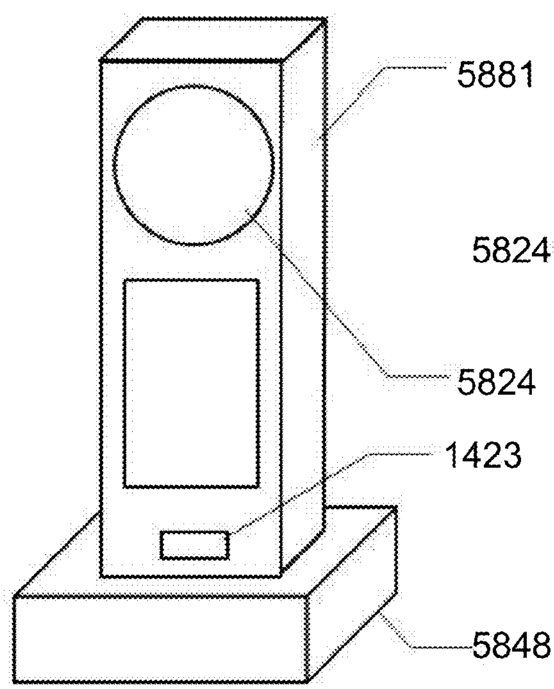
FIG.92B
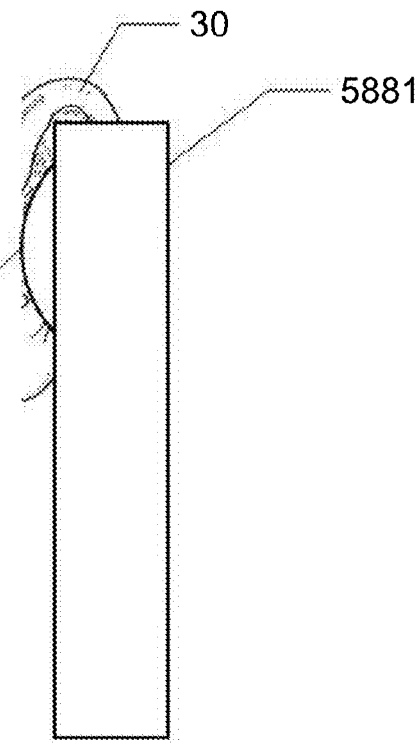
FIG.92C

FIG.97C
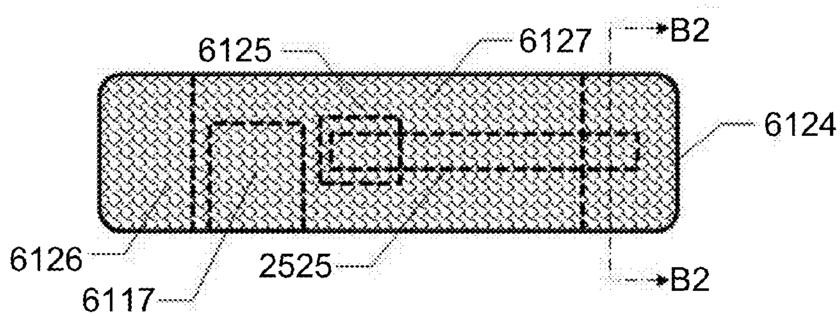
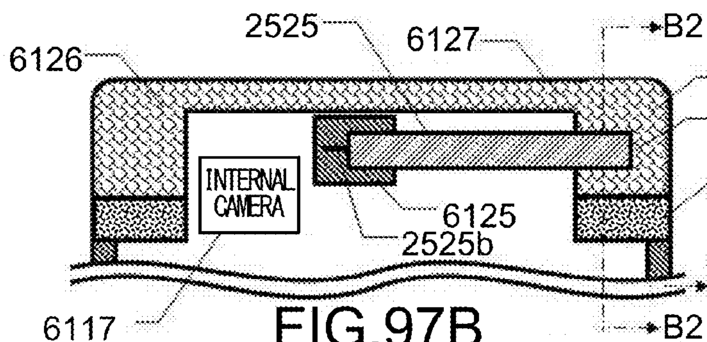
FIG.97B
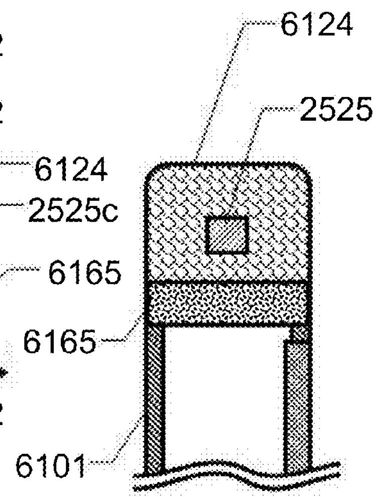
FIG.97D
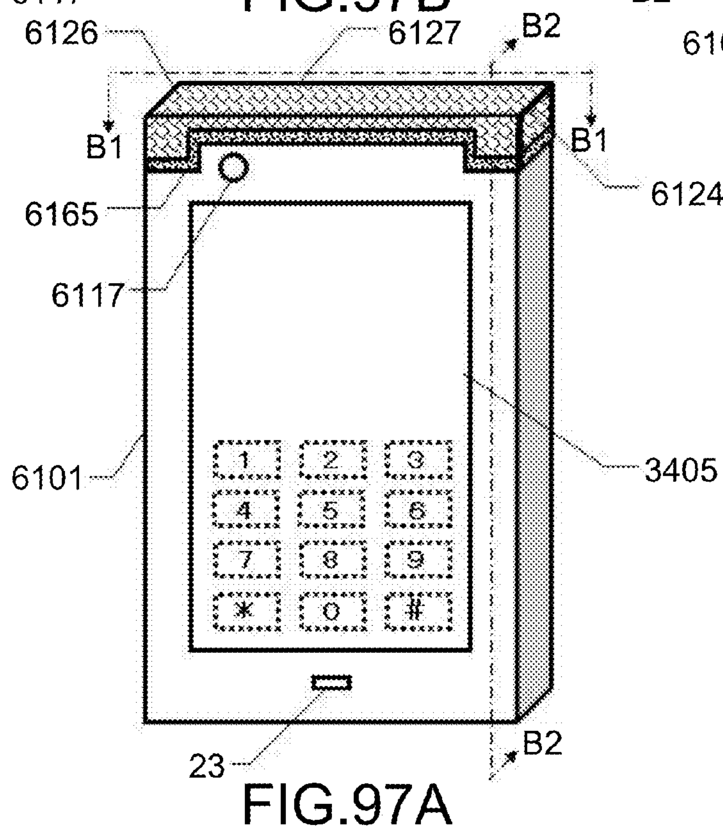
FIG.97A

FIG.98C
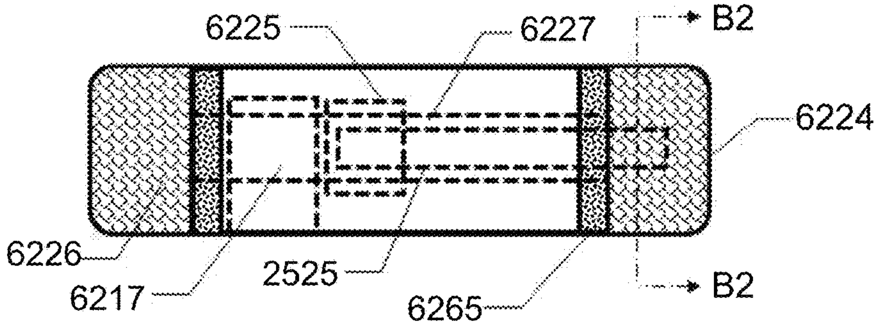
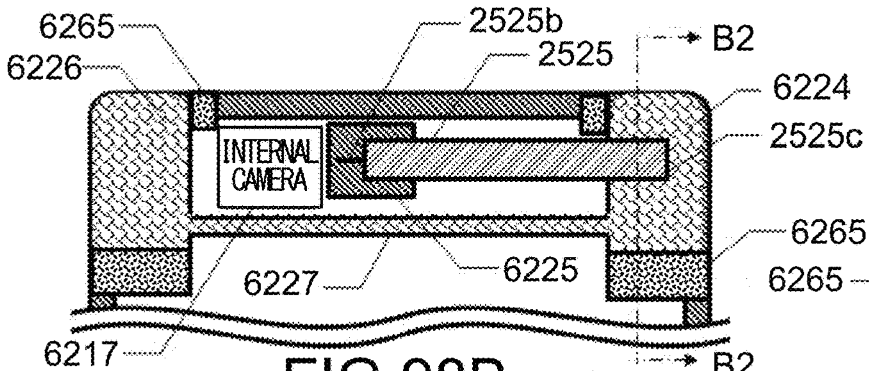
FIG.98B
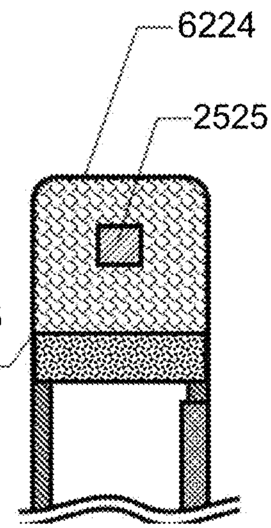
FIG.98D
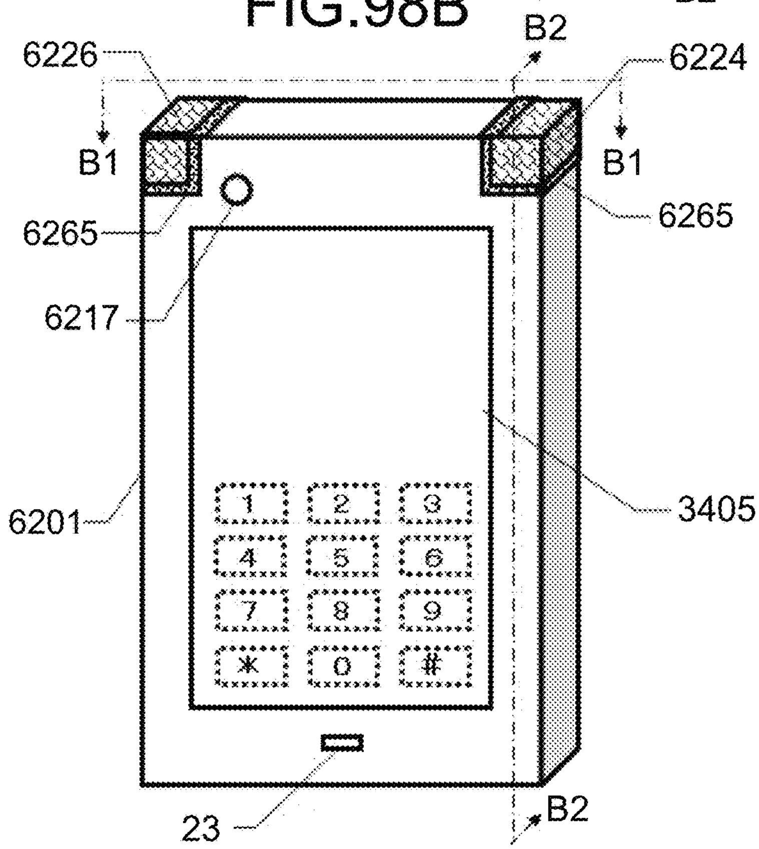
FIG.98A

FIG.99B
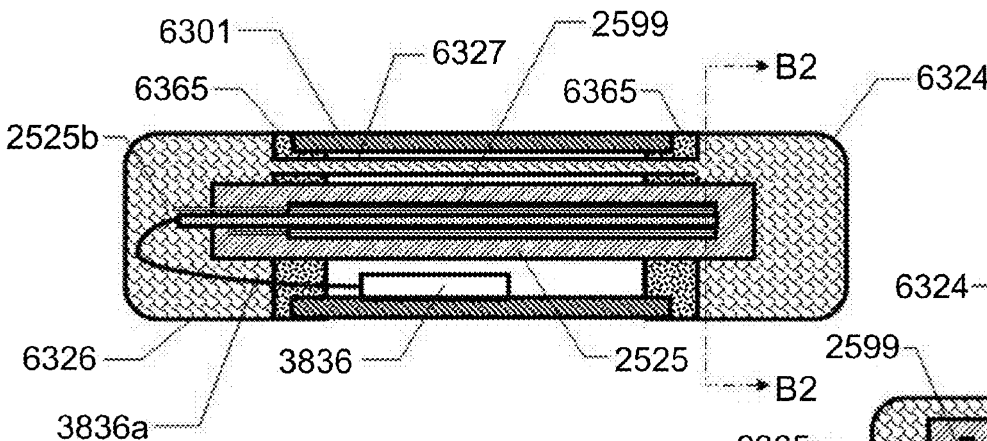
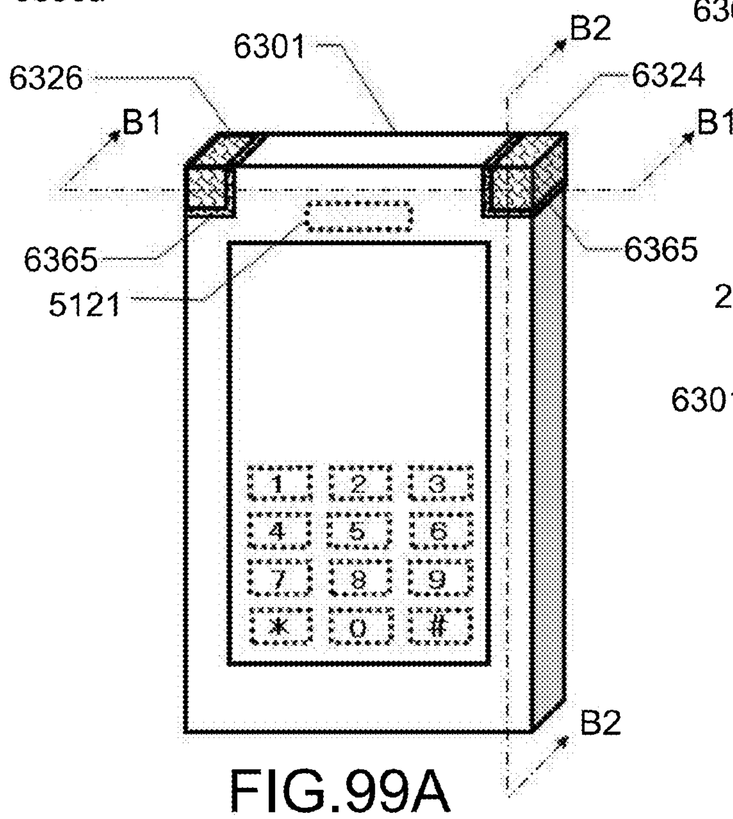
FIG.99A
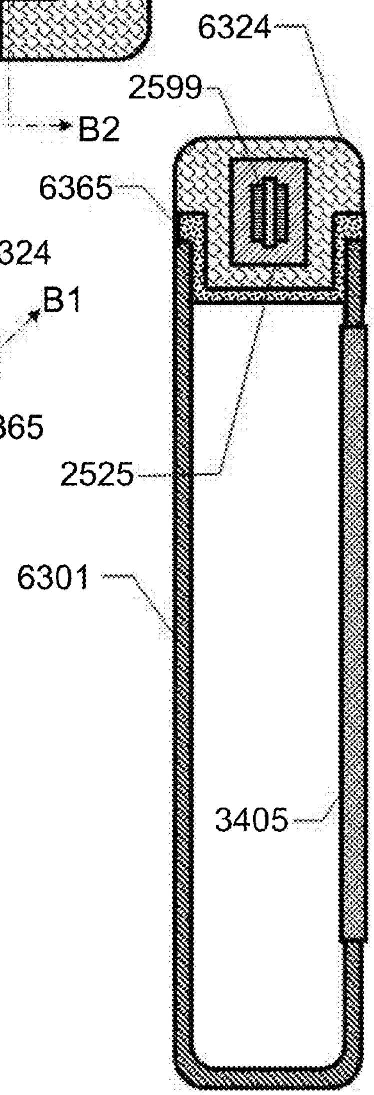
FIG.99C

FIG.126B
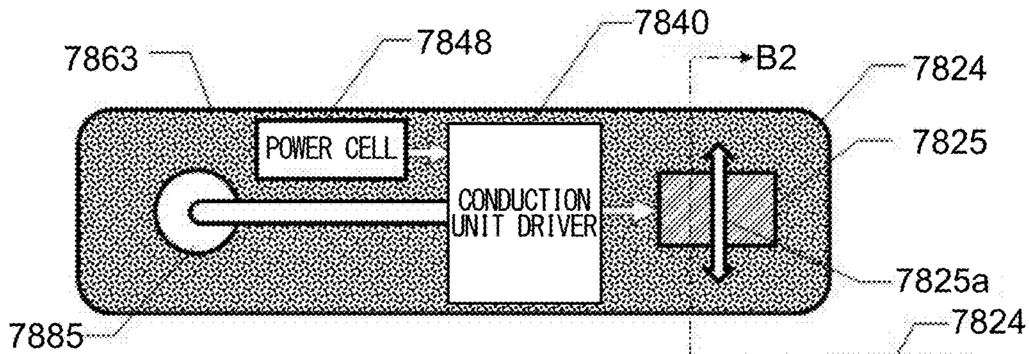
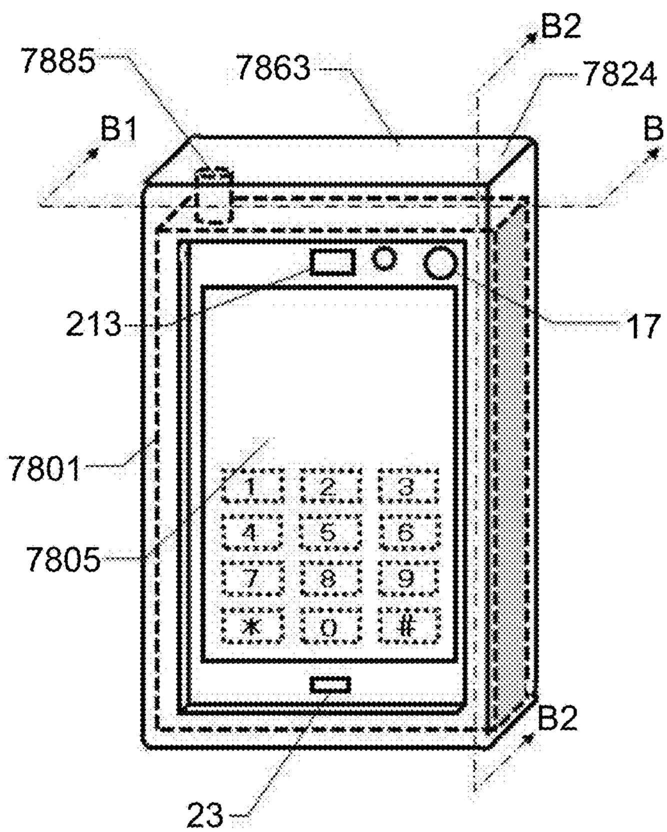
FIG.126A
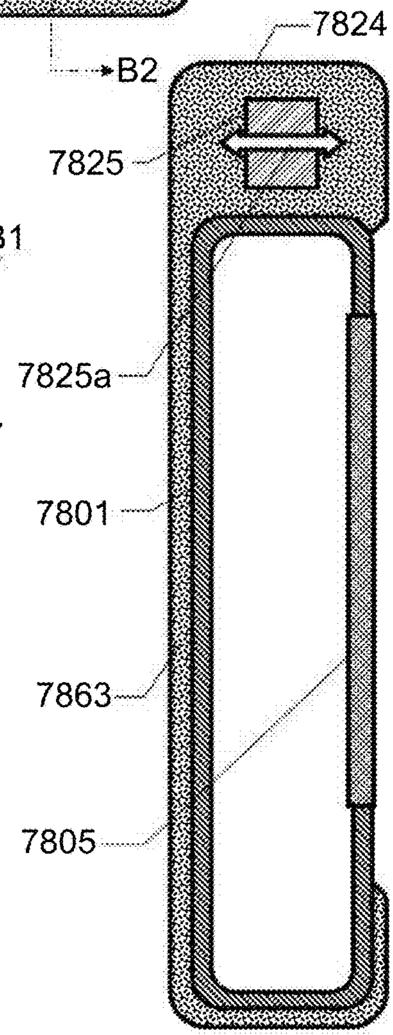
FIG.126C

FIG.139A
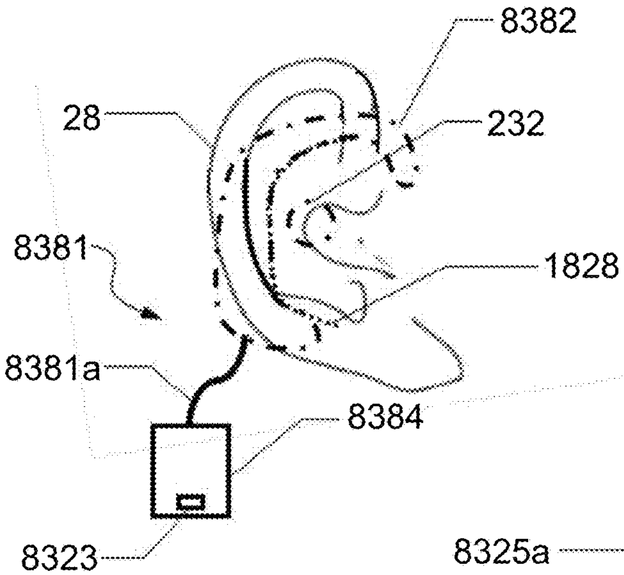
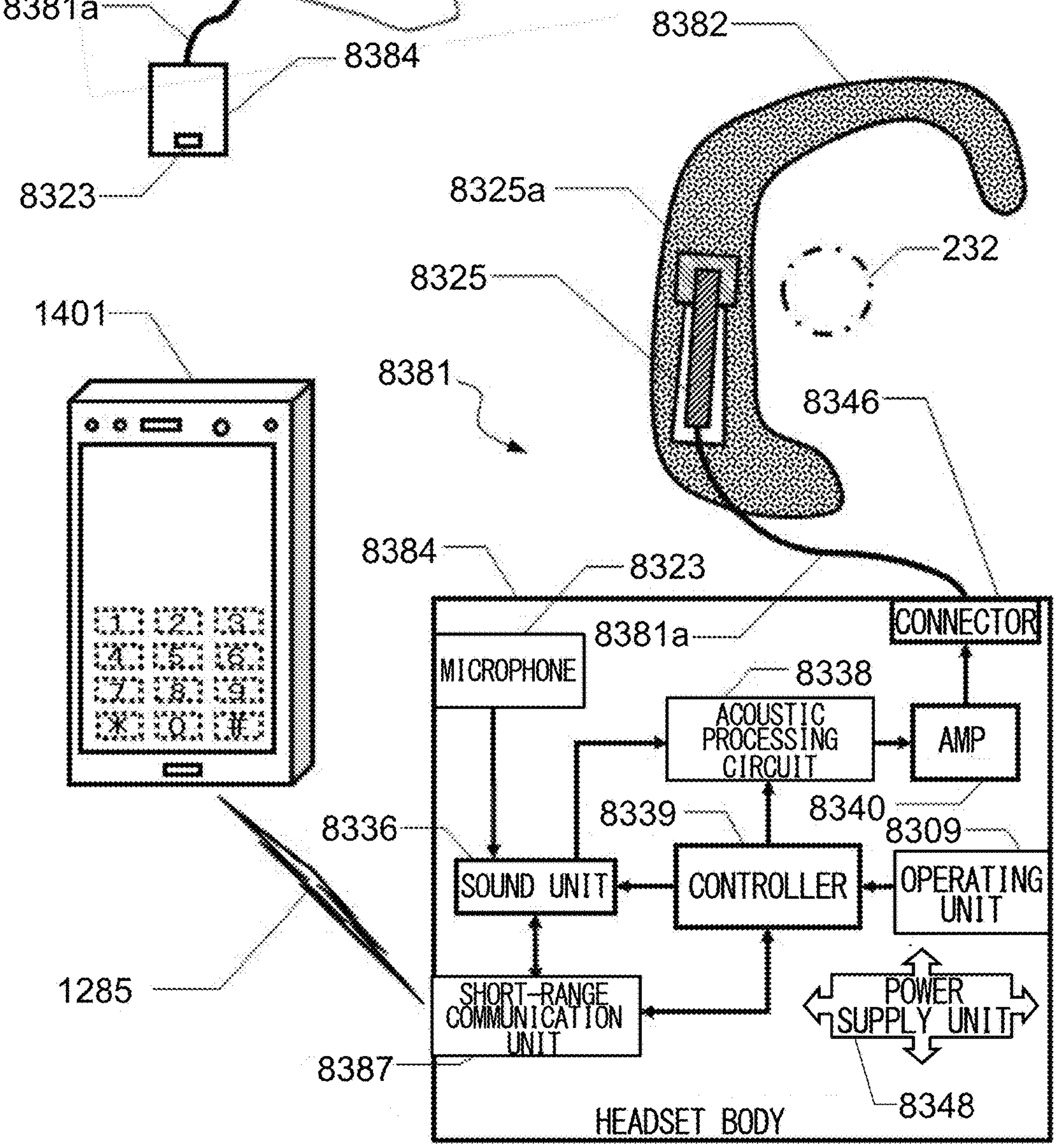
FIG.139B

FIG.140A
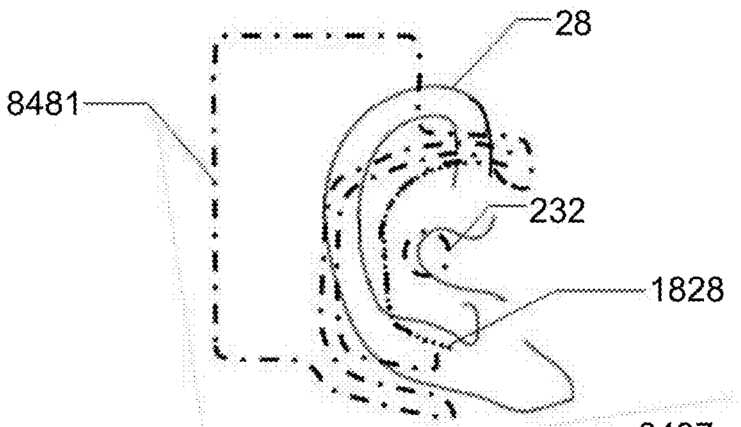
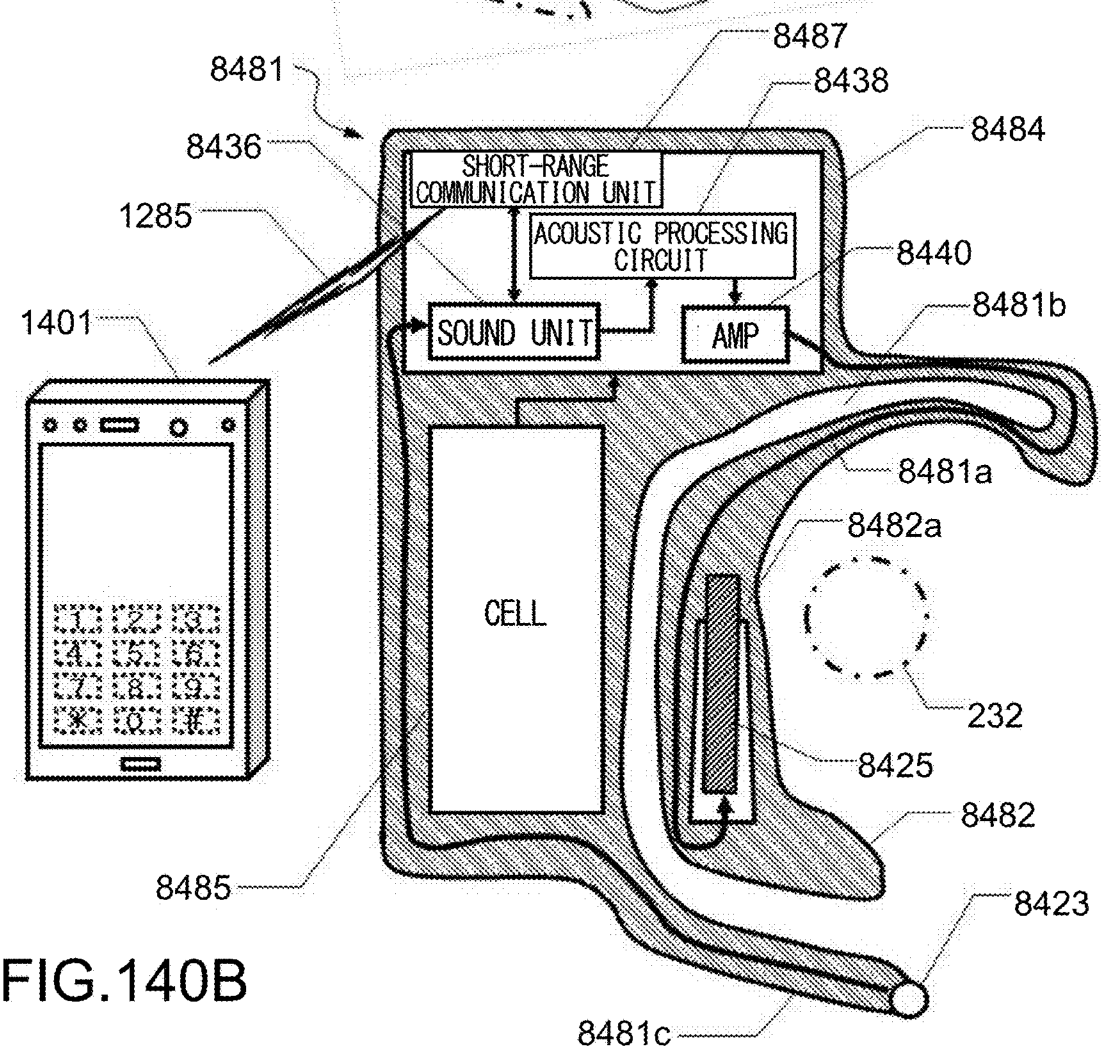
FIG.140B

FIG.142A
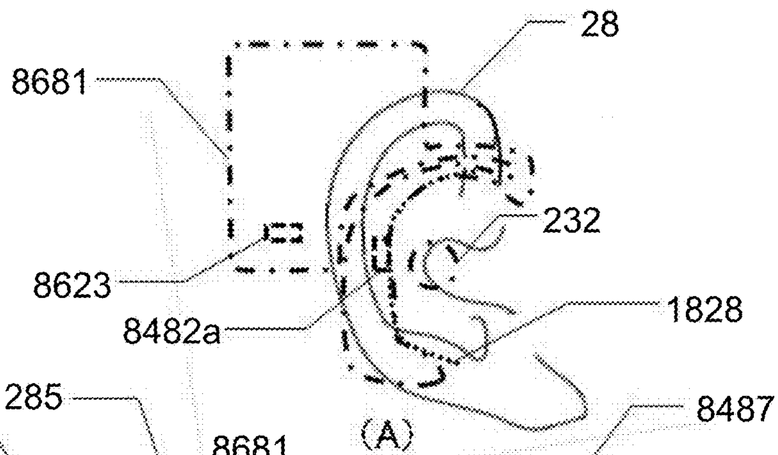
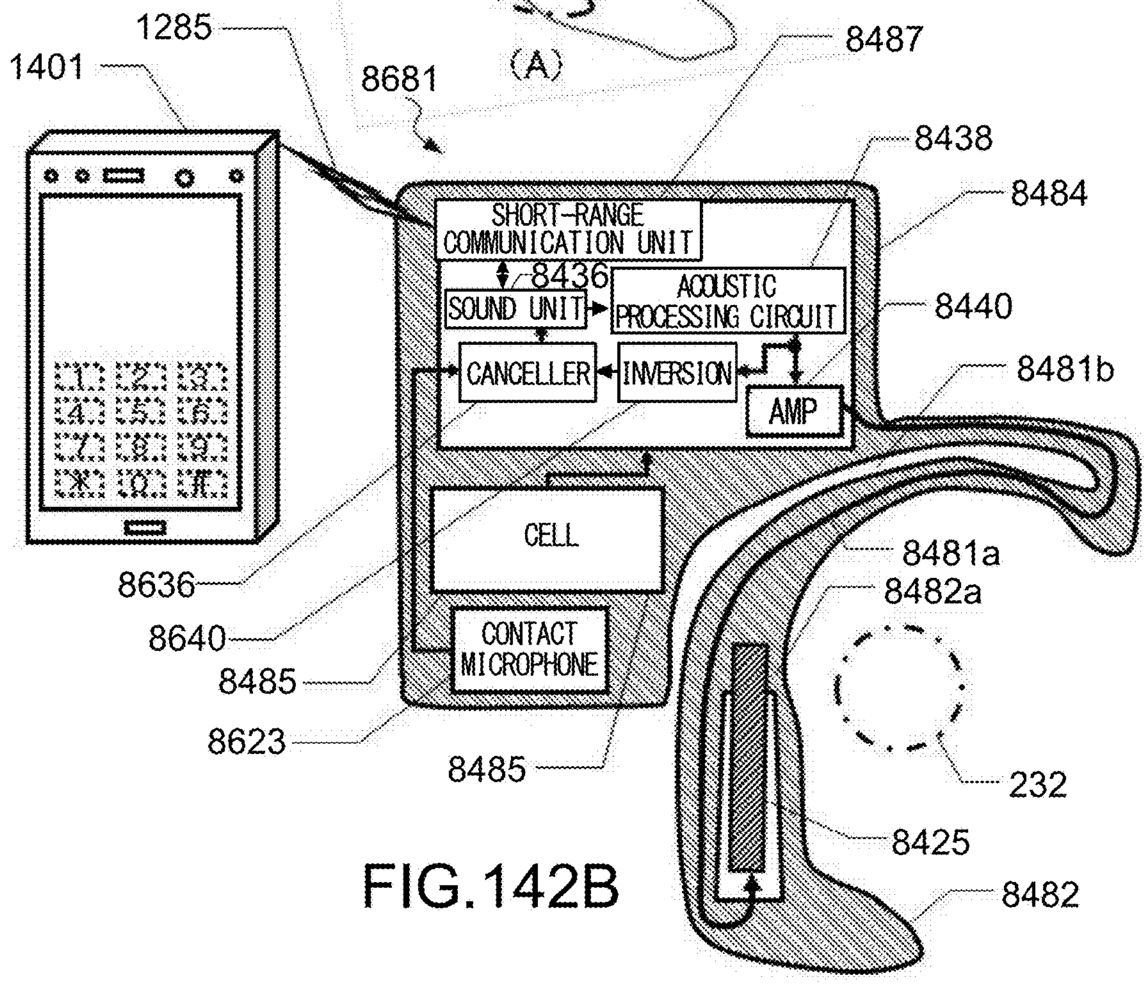
FIG.142B

FIG.145A
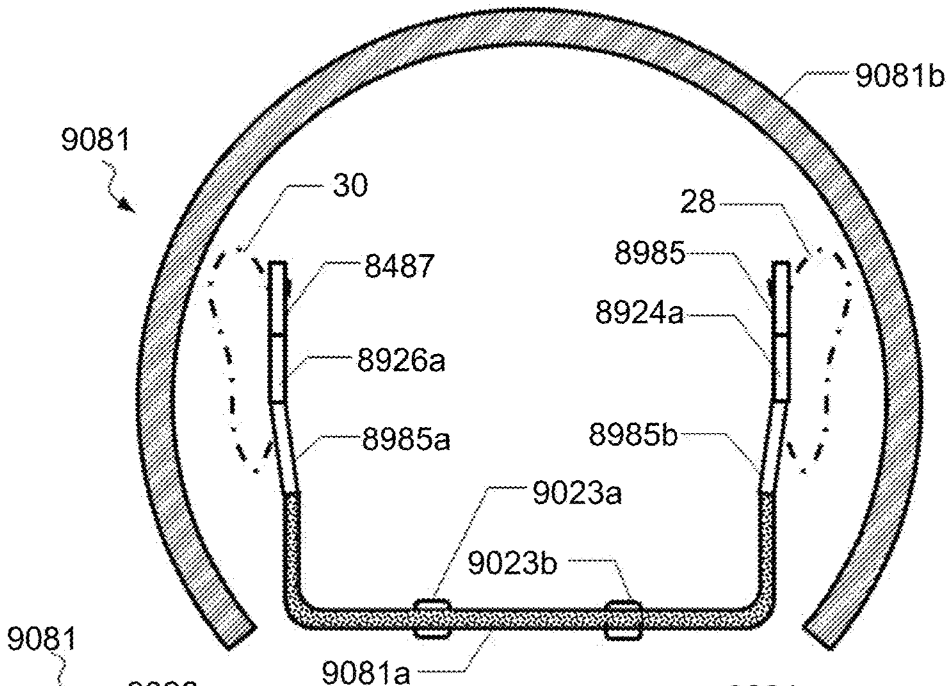
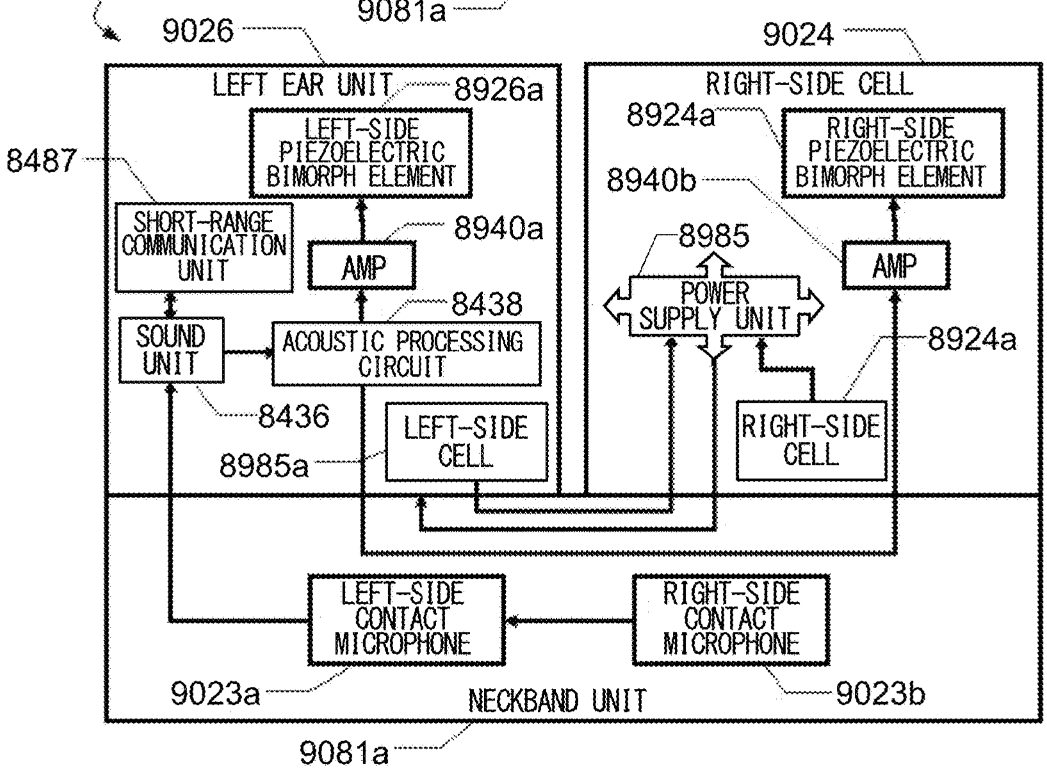
FIG.145B

FIG.147B
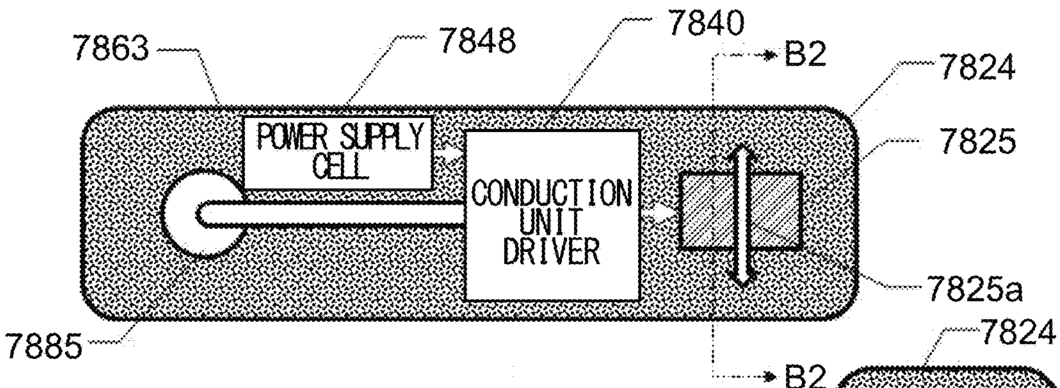
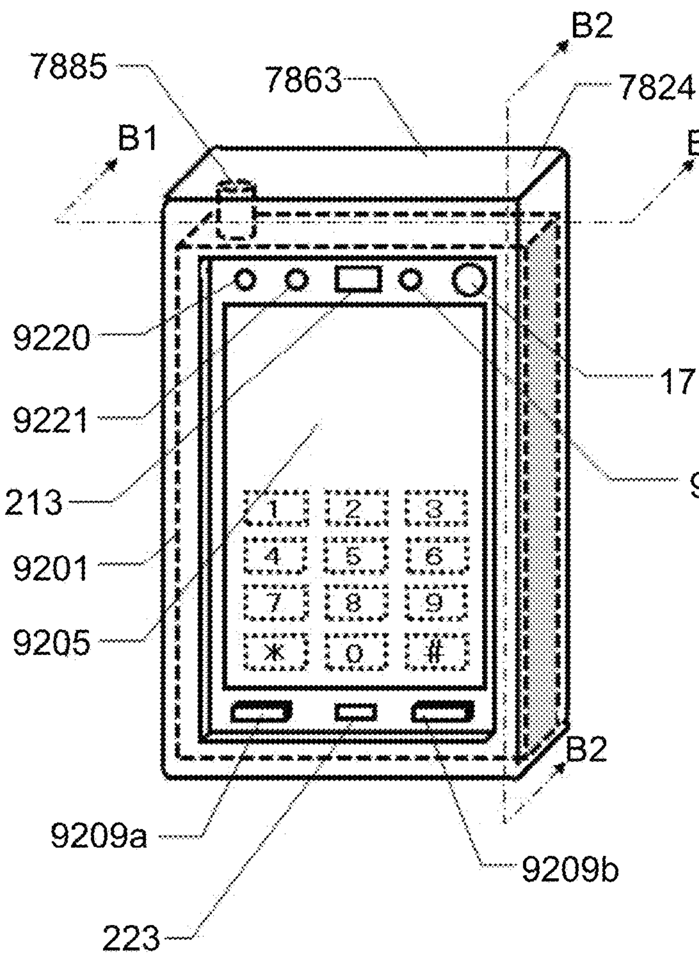
FIG.147A
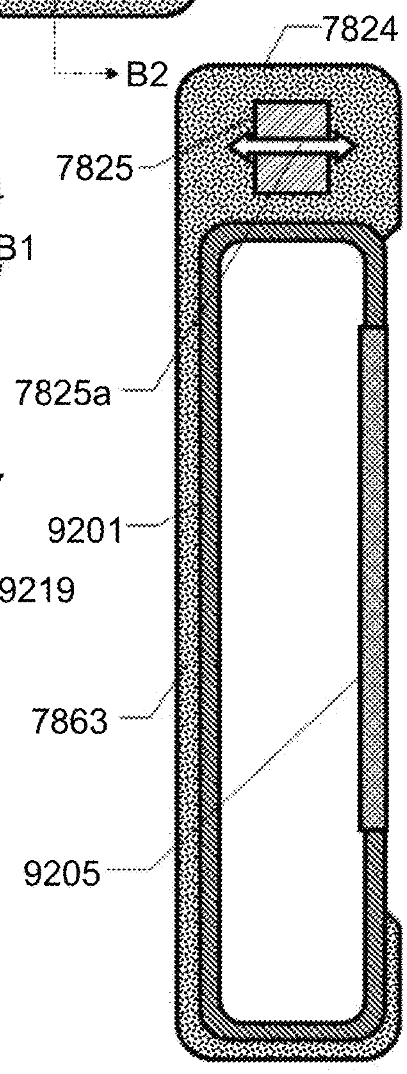
FIG.147C

FIG.150A
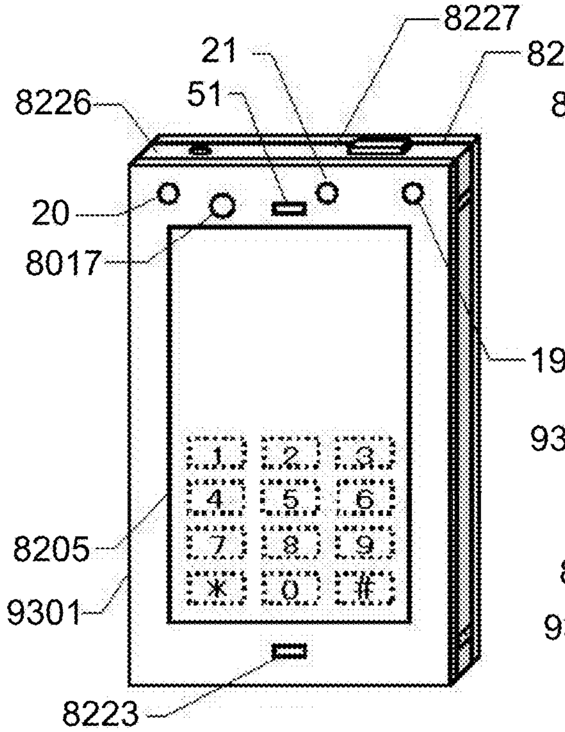
FIG.150B
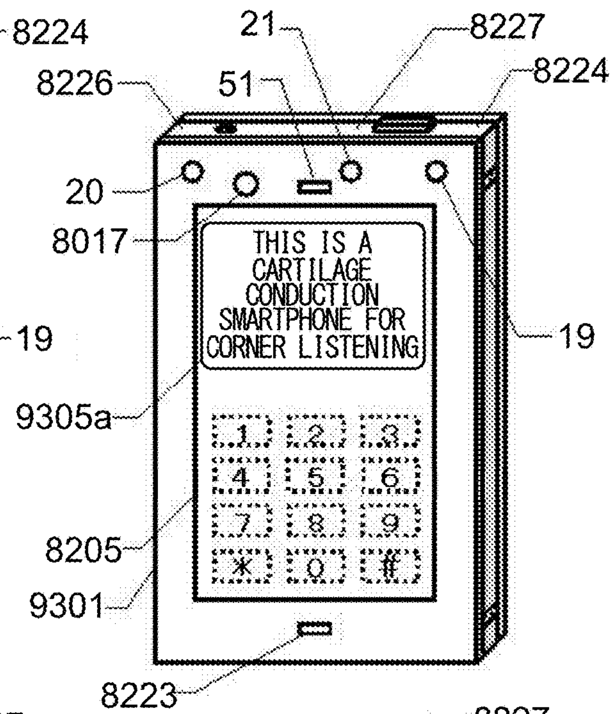
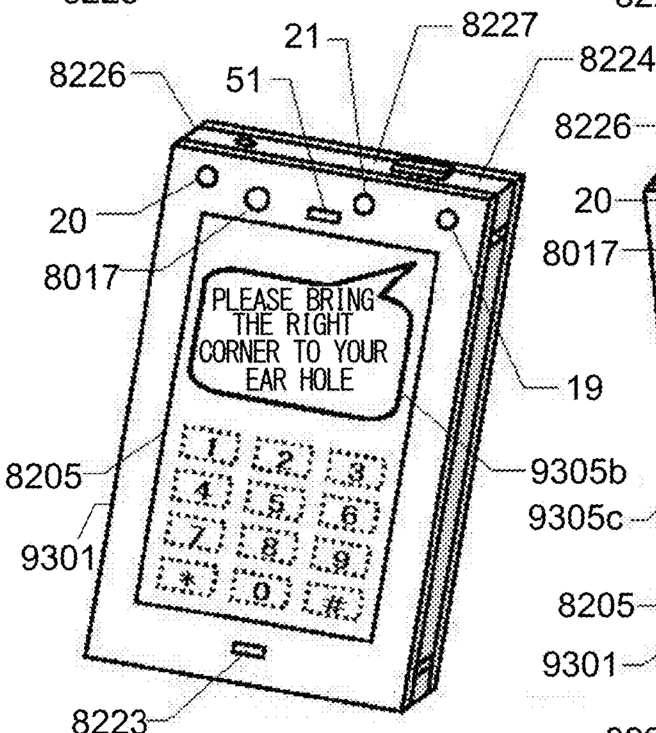
FIG.150C
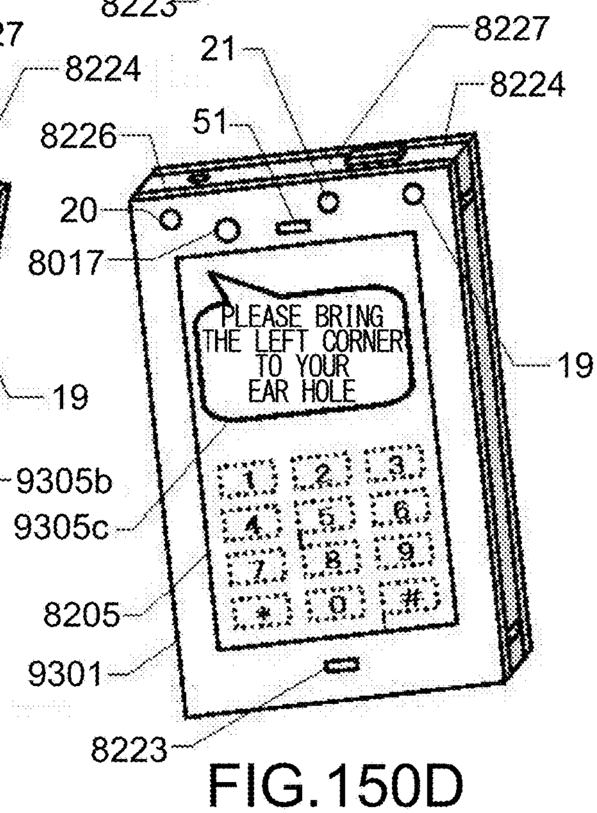
FIG.150D

FIG.154

PLEASANT MUSIC LISTENING BY CARTILAGE CONDUCTION

| VOLUME | OUTPUT VOLTAGE (mVrms) | VIBRATION ACCELERATION (dB) | PSYCHOLOGICAL RESPONSE (EXAMPLE) |
|---|---|---|---|
| 0 | 1000 | 67.7 | |
| 1 | 793 | 65.5 | |
| 2 | 630 | 63.4 | |
| 3 | 560 | 62.3 | |
| 4 | 400 | 59.2 | ← |
| 5 | 320 | 57.1 | |
| 6 | 250 | 54.8 | |
| 7 | 200 | 52.7 | |
| 8 | 160 | 50.6 | |
| 9 | 125 | 48.4 | |
| 10 | 100 | 46.3 | |
| 11 | 80 | 44.2 | |
| 12 | 63 | 42.0 | |
| 13 | 50 | 39.8 | |
| 14 | 40 | 37.9 | |
| 15 | 32 | 35.7 | |
| 16 | 25 | 33.4 | |
| 17 | 20 | 31.3 | |
| 18 | 16 | 29.2 | |
| 19 | 13 | 27.3 | |
| 20 | 10 | 24.9 | |
| 21 | 8.1 | 22.9 | |
| 22 | 6.5 | 20.9 | |
| 23 | 5.1 | 18.6 | |
| 24 | 4.1 | 16.6 | |
| 25 | 3.3 | 14.6 | ← |
| 26 | 2.1 | 10.4 | |
| 27 | 1.3 | 5.9 | |
| 28 | 09 | 2.5 | |

THRESHOLD VALUE OF 1-kHz PURE SOUND CARTILAGE CONDUCTION

FIG.156A
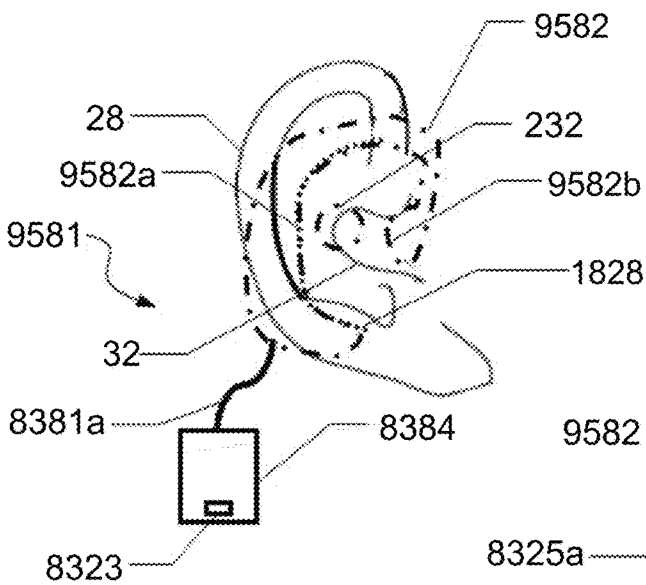
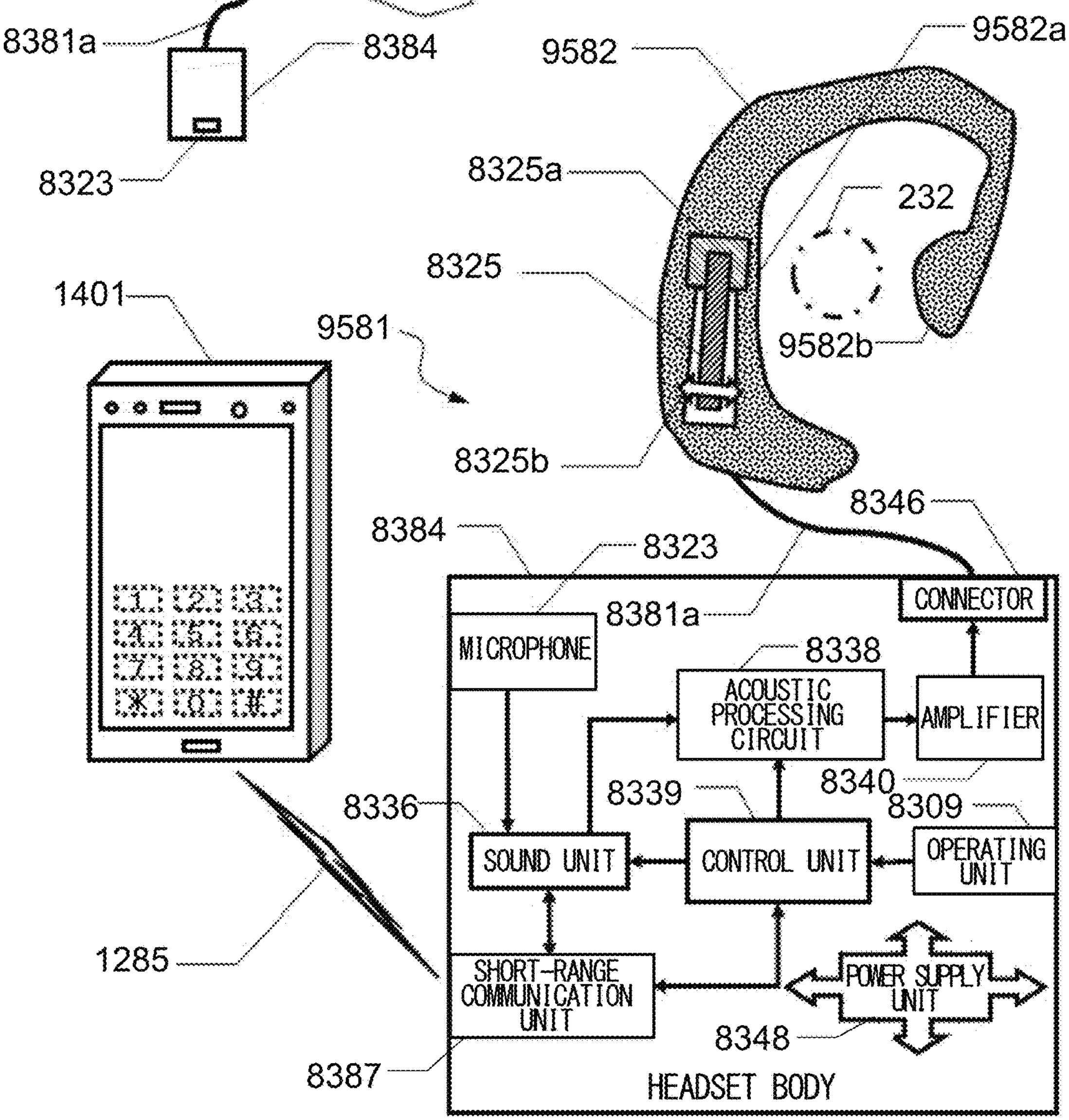
FIG.156B

FIG.157A
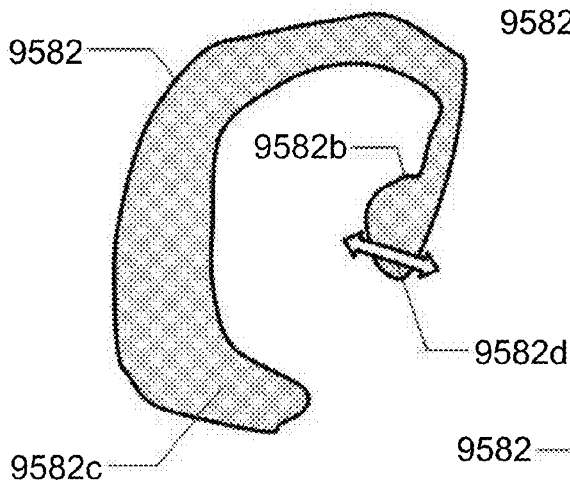
FIG.157B
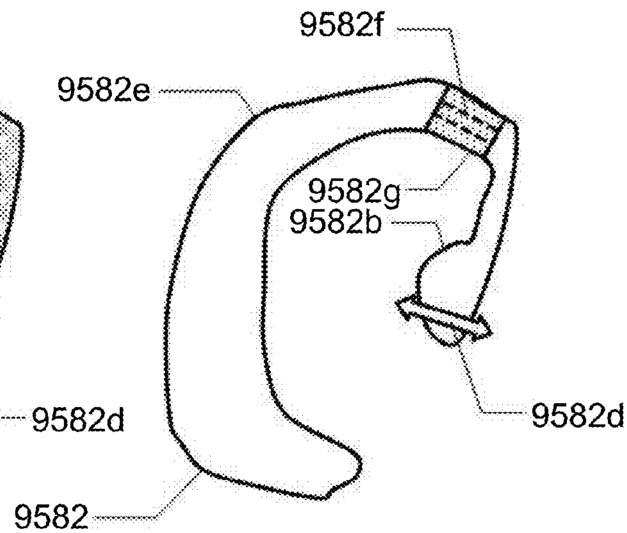
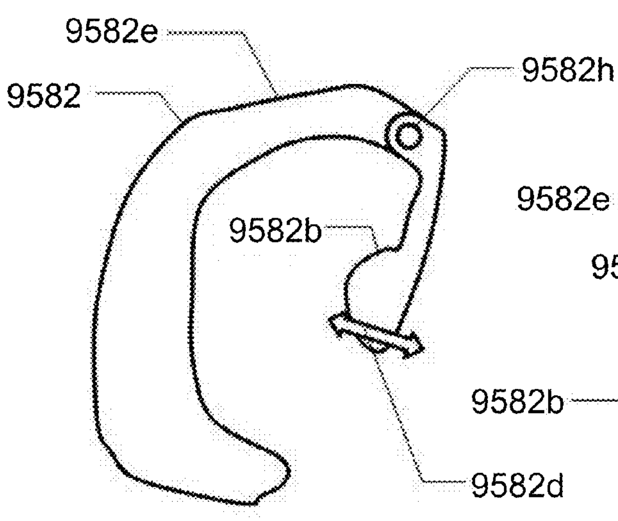
FIG.157C
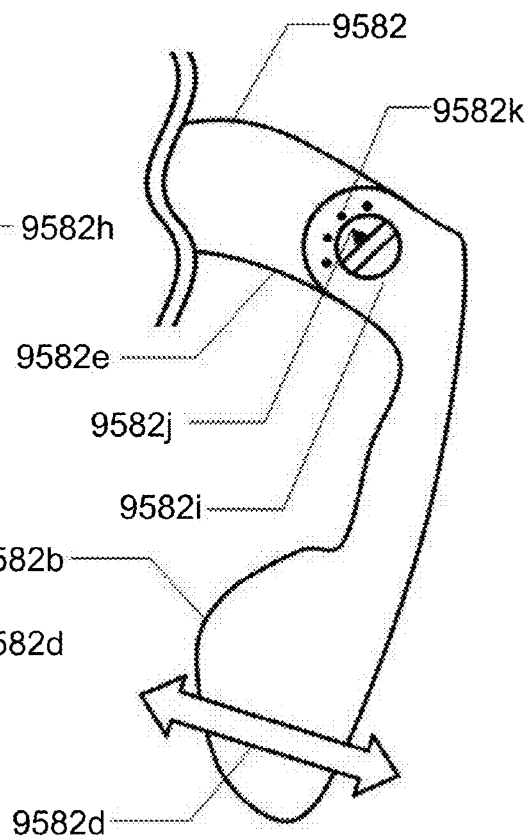
FIG.157D FIG.158B
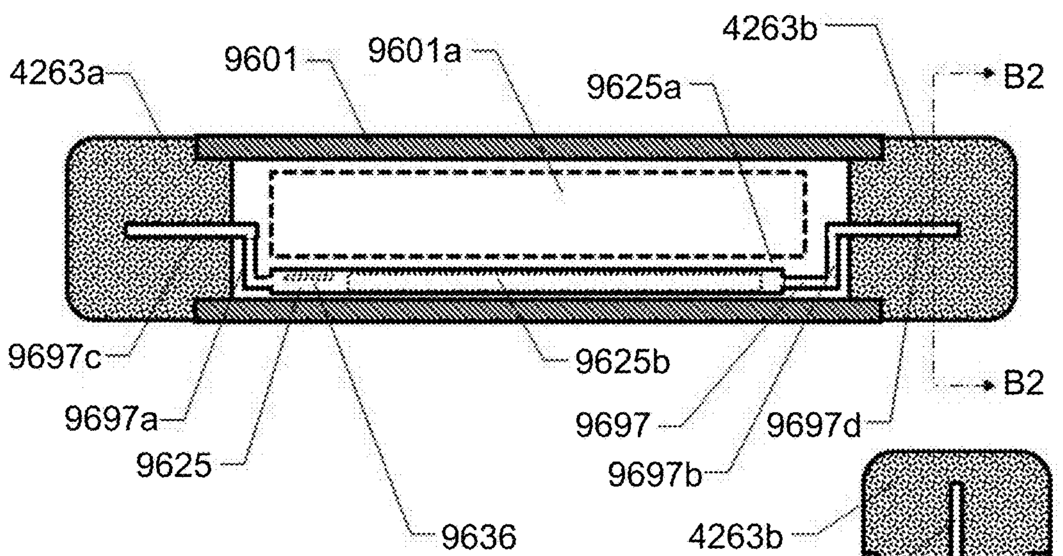
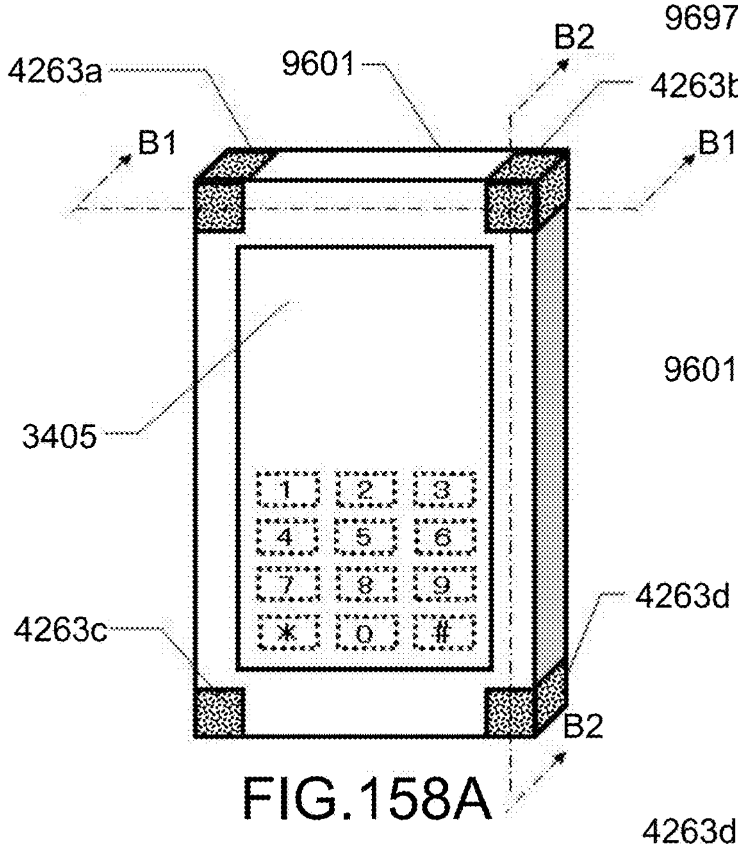
FIG.158A
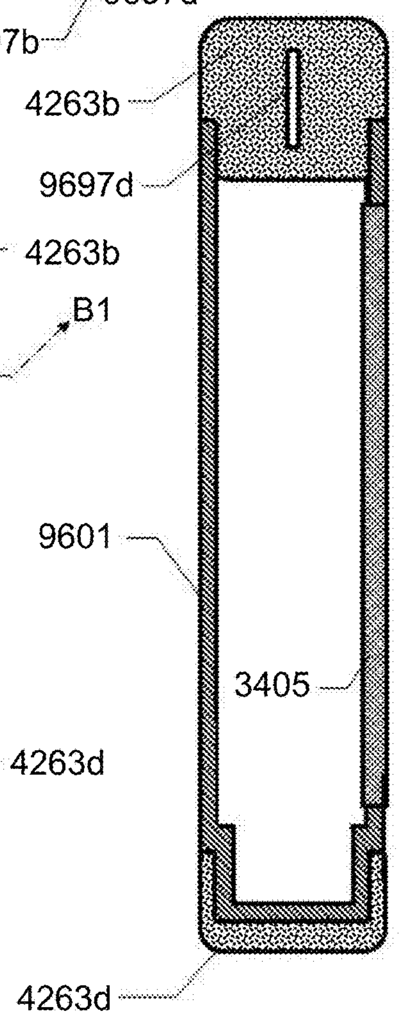
FIG.158C FIG.168C
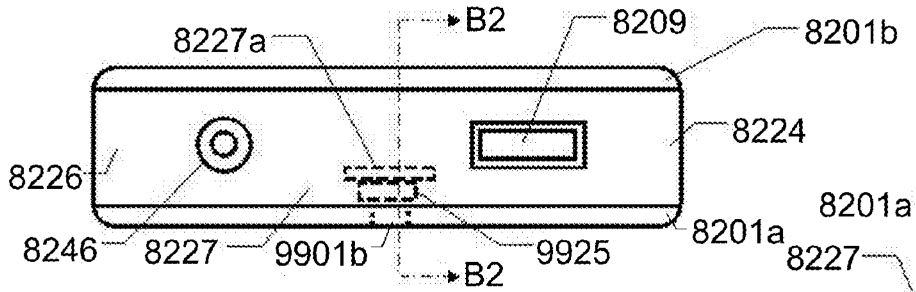
FIG.168B
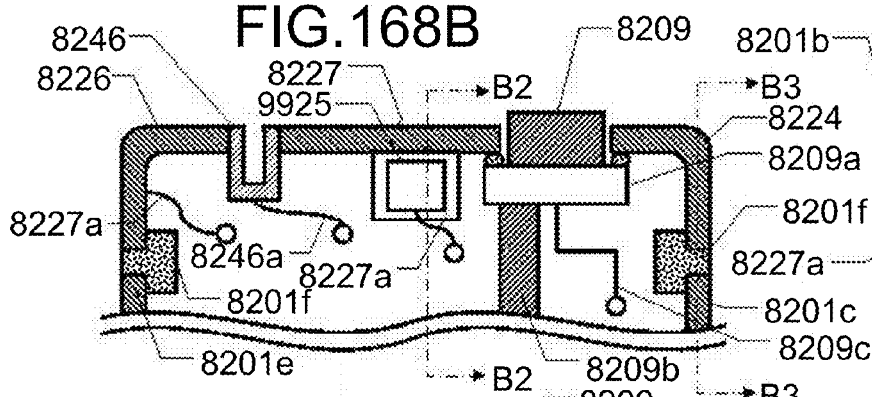
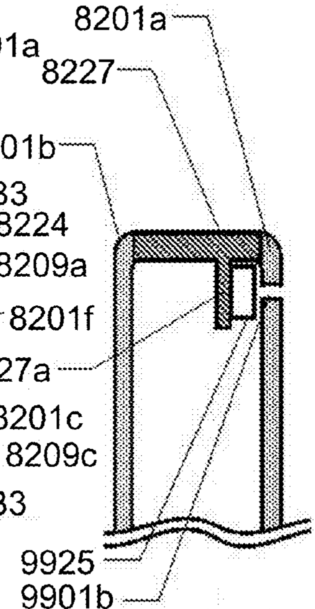
FIG.168D
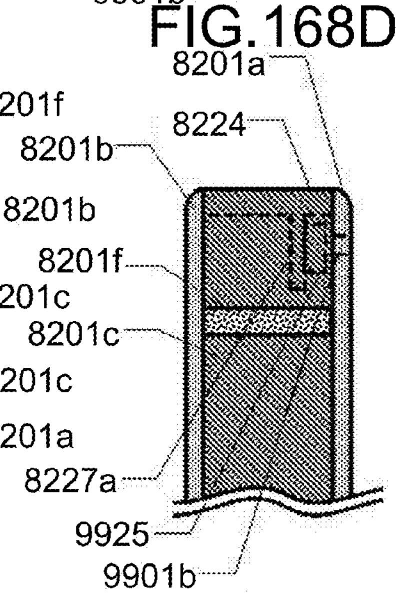
FIG.168E
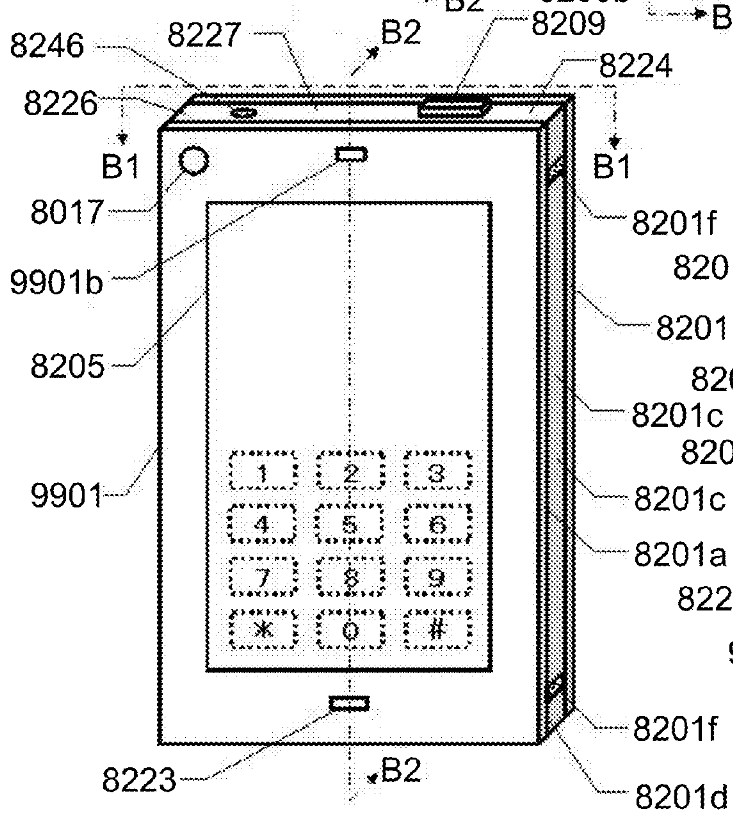
FIG.168A FIG.170C
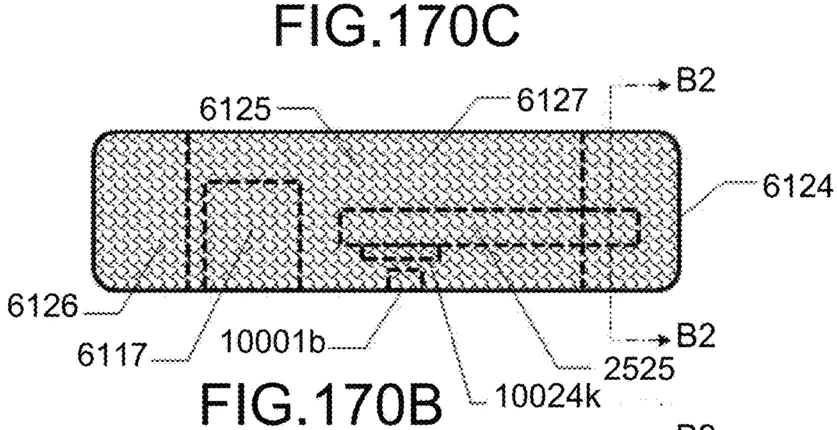
FIG.170B
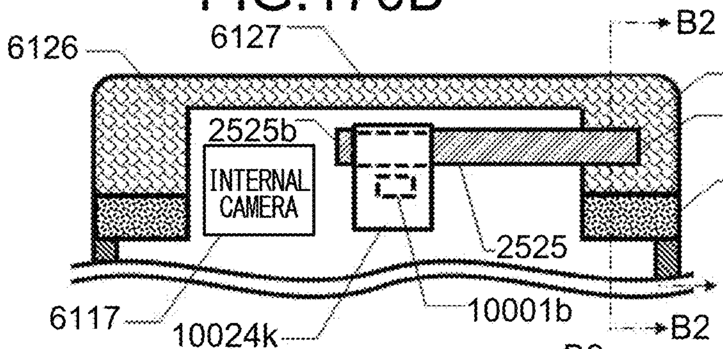
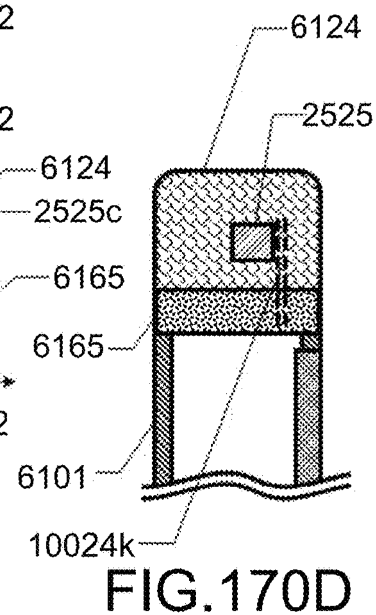
FIG.170D
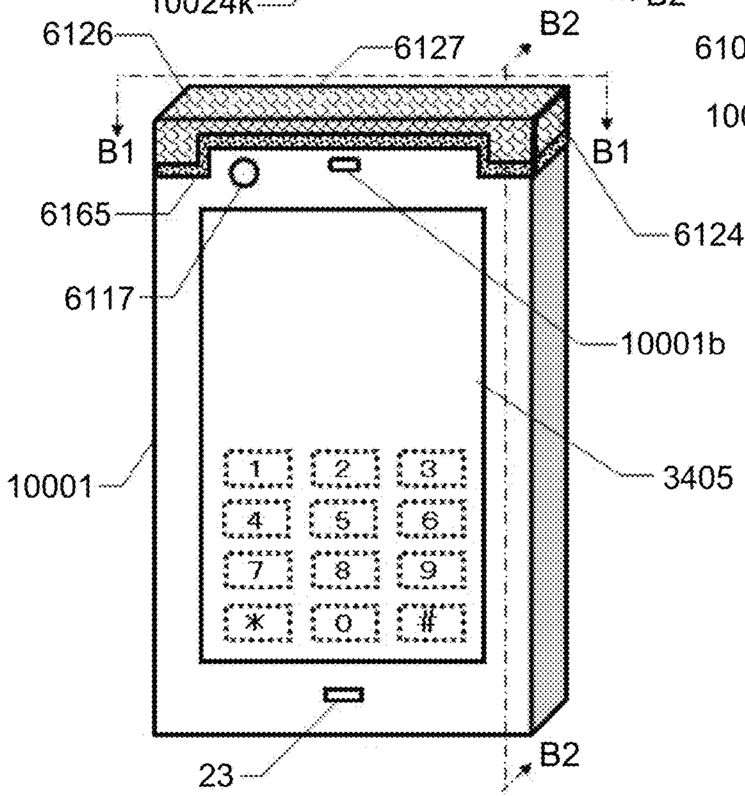
FIG.170A FIG.178C
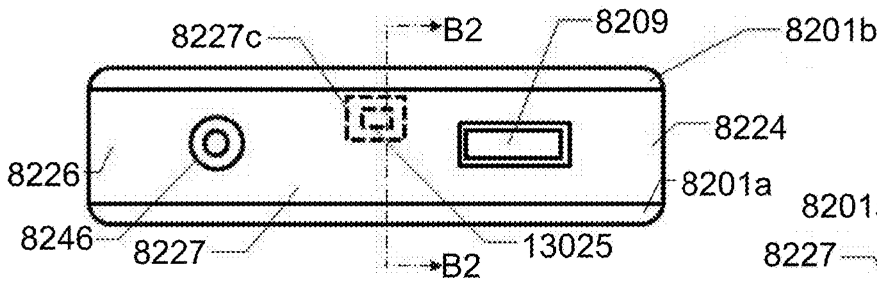
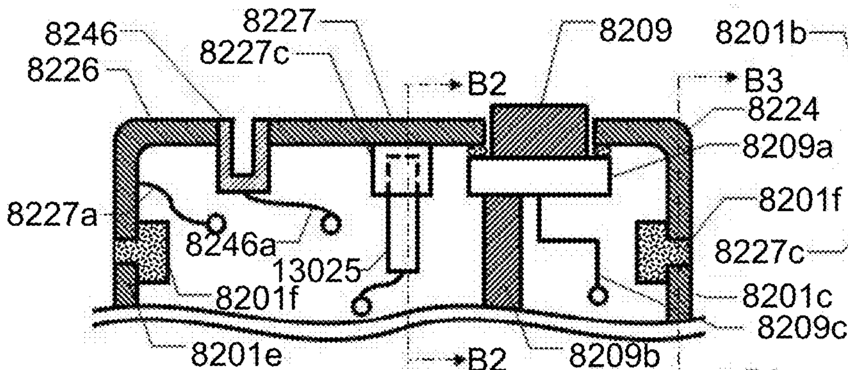
FIG.178B
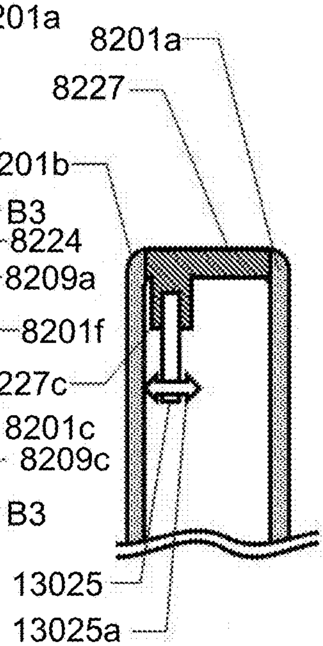
FIG.178D
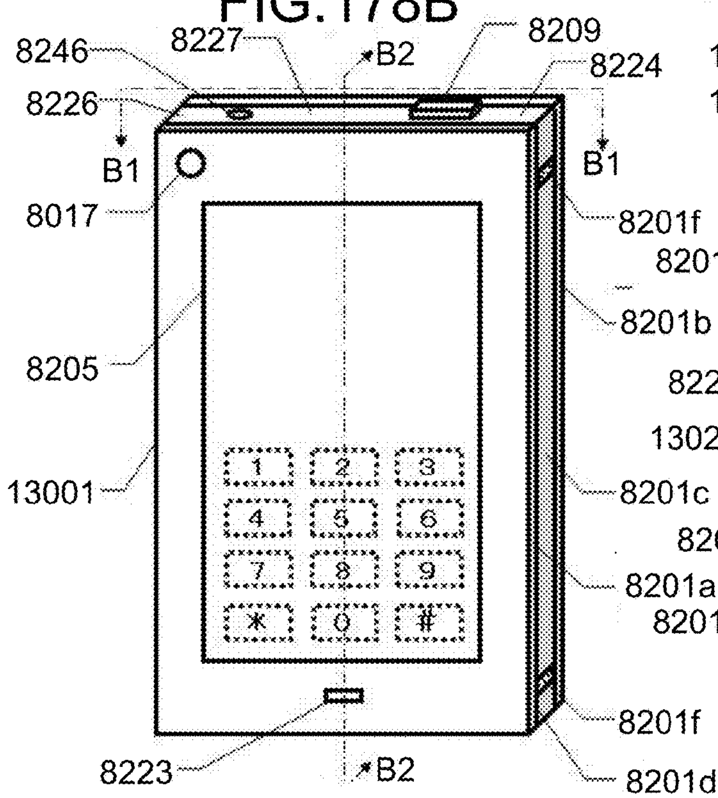
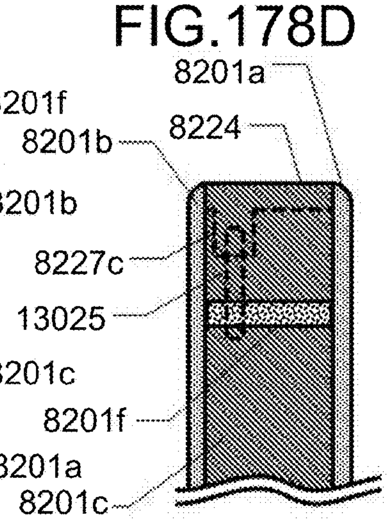
FIG.178E
FIG.178A FIG.181B
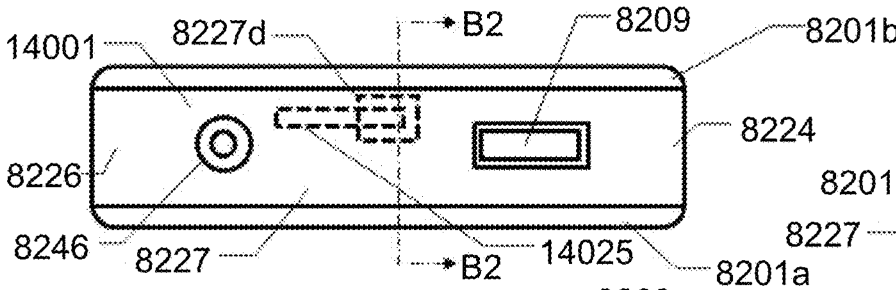
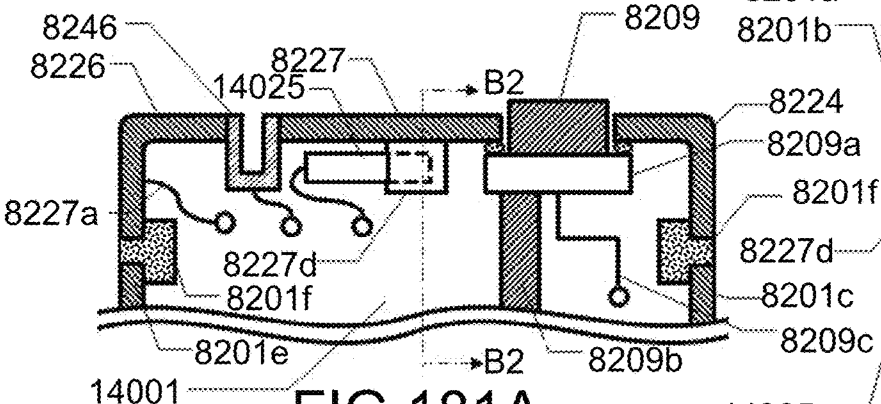
FIG.181A
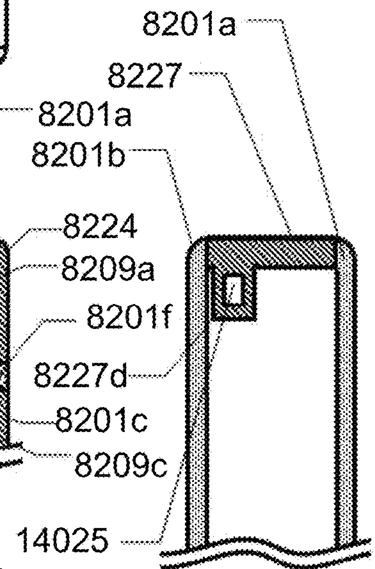
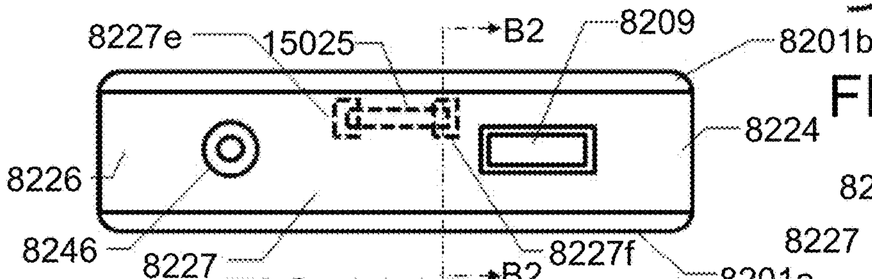
FIG.181C
FIG.181E
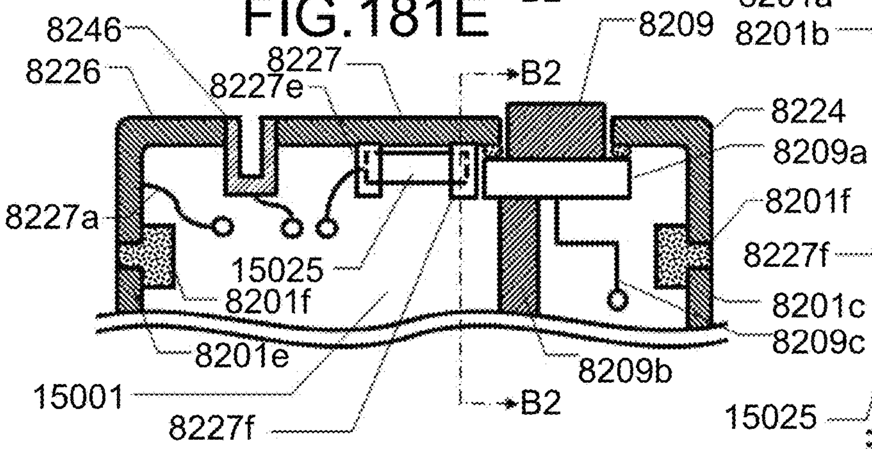
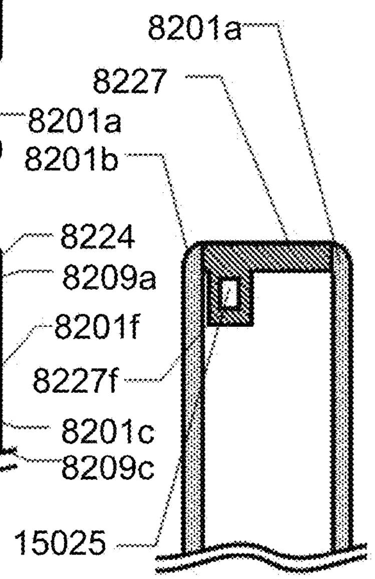
FIG.181D
FIG.181F

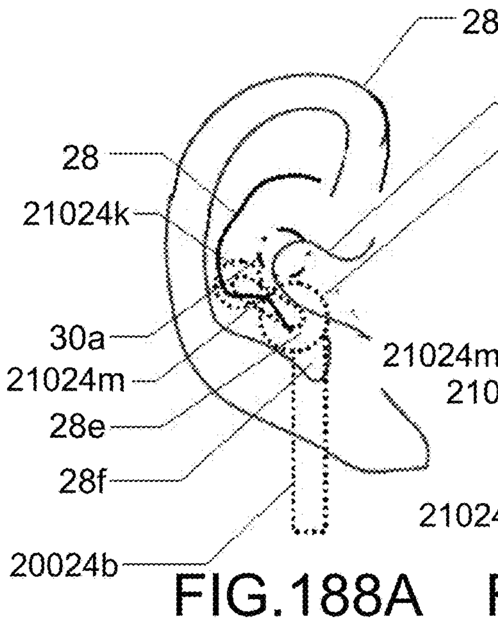
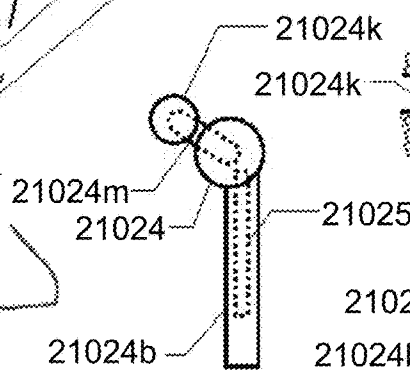
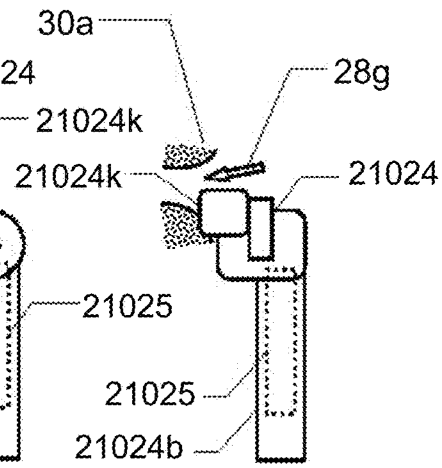
FIG.188A FIG.188C FIG.188E
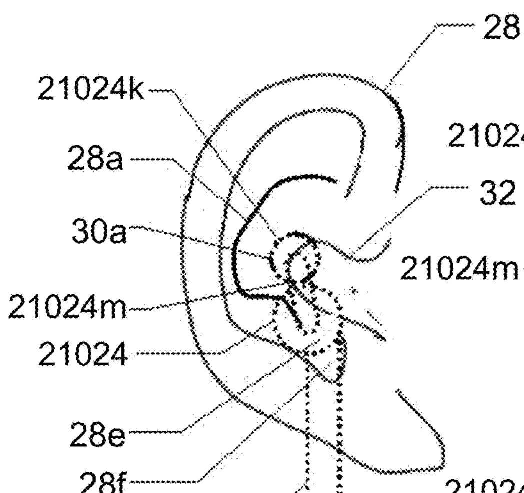
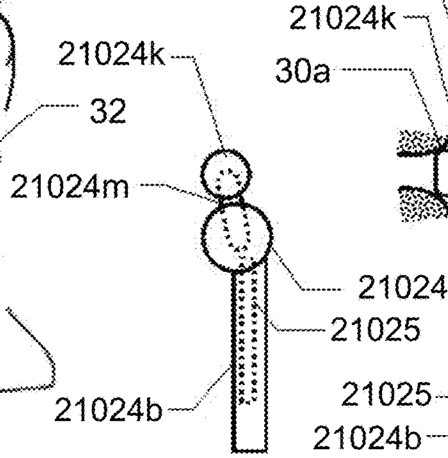
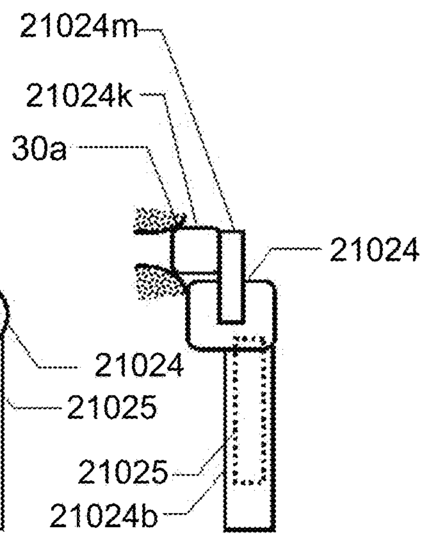
FIG.188B FIG.188D FIG.188F FIG.190A
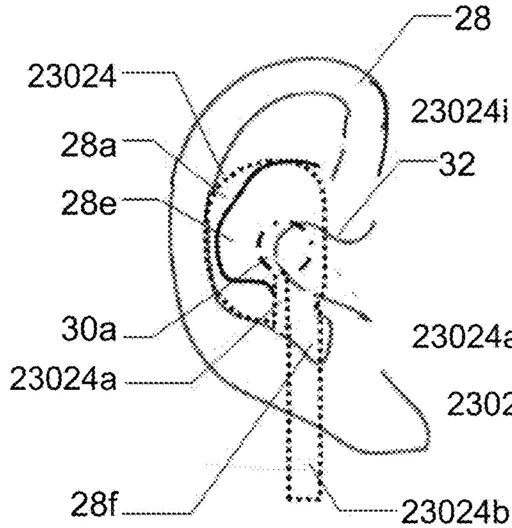
FIG.190B
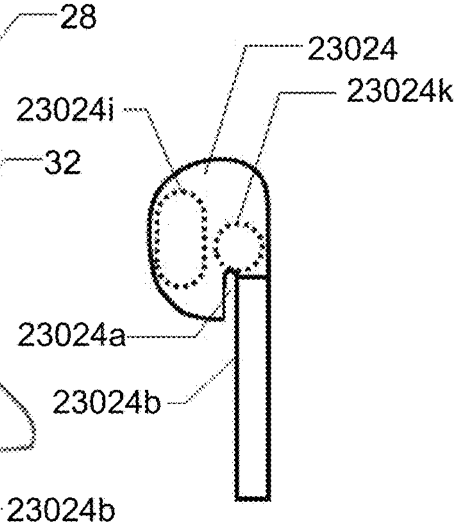
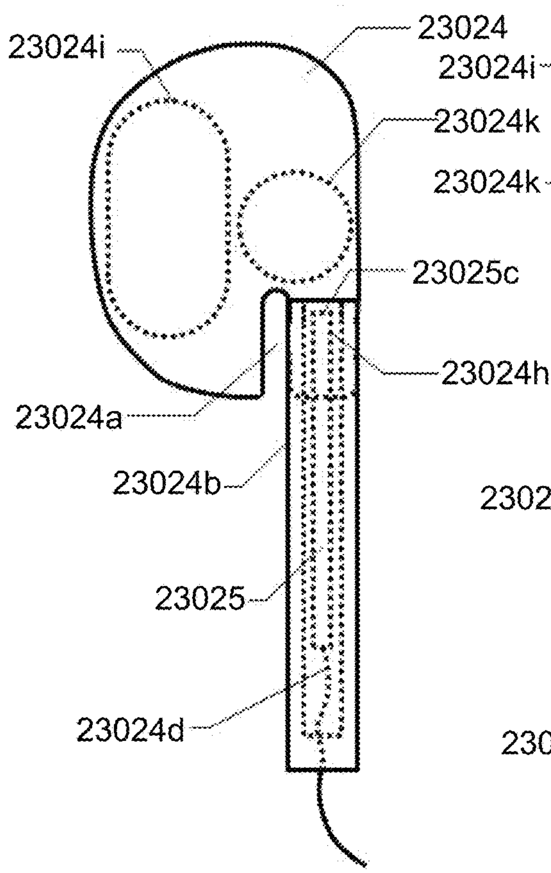
FIG.190C
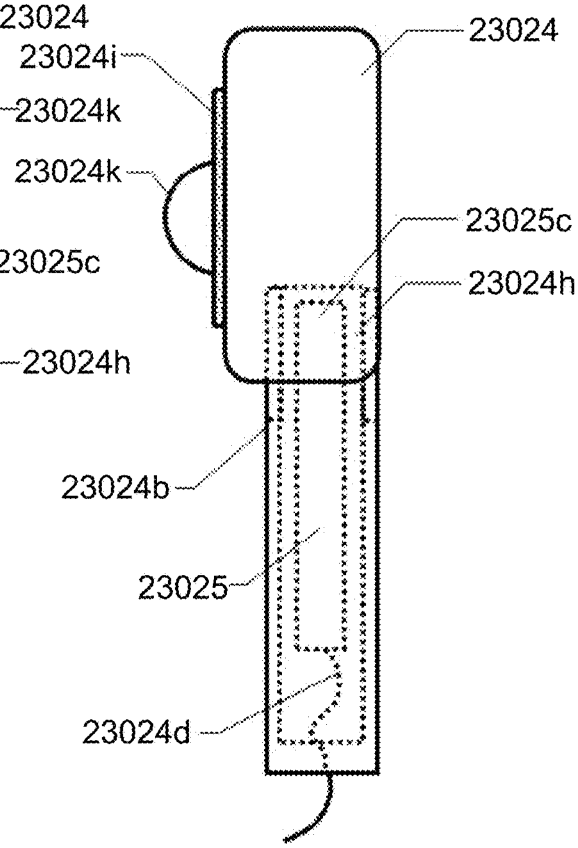
FIG.190D FIG.223B
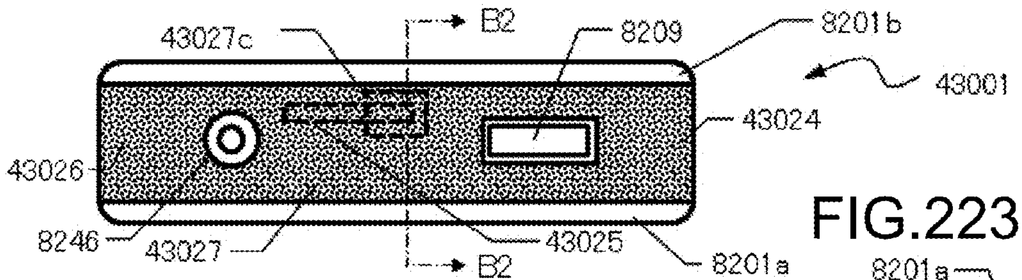
FIG.223A
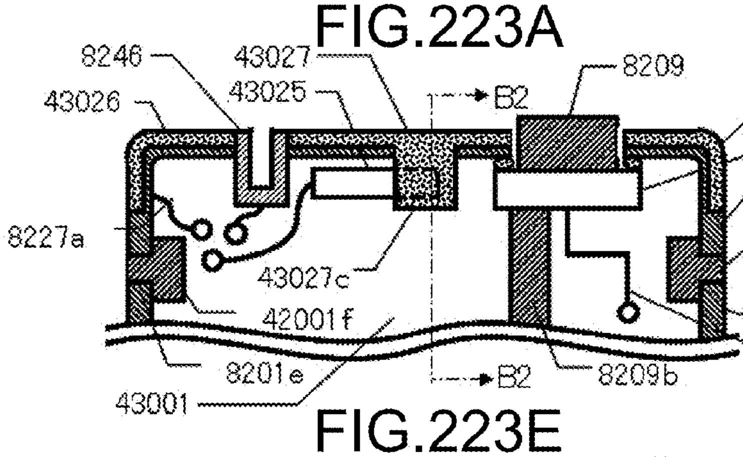
FIG.223C
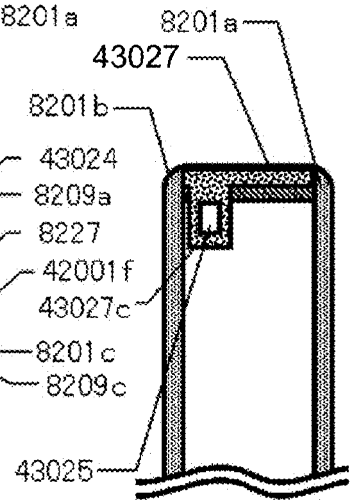
FIG.223E
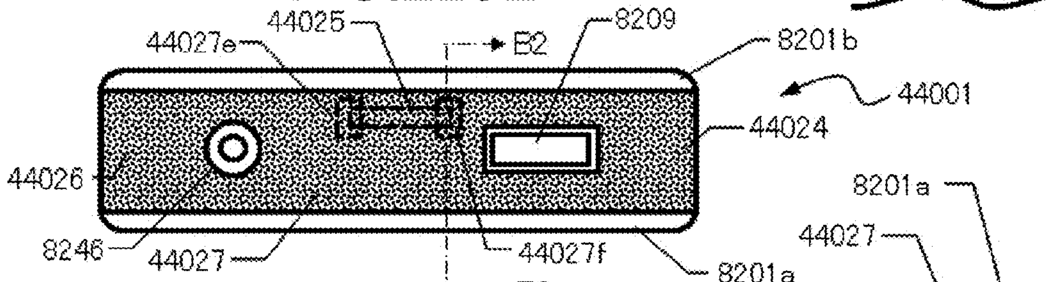
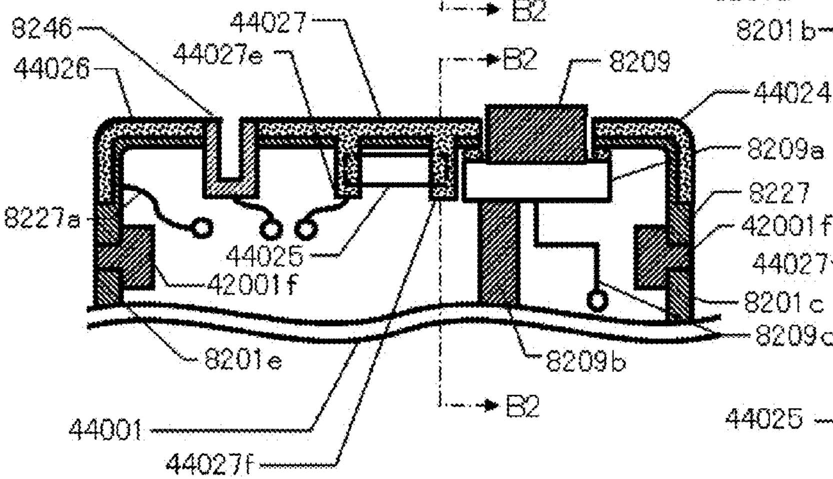
FIG.223D
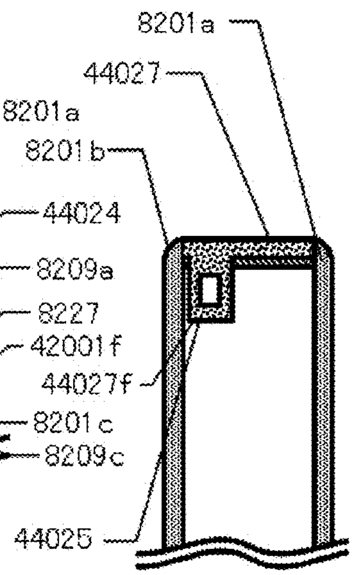
FIG.223F FIG.224C
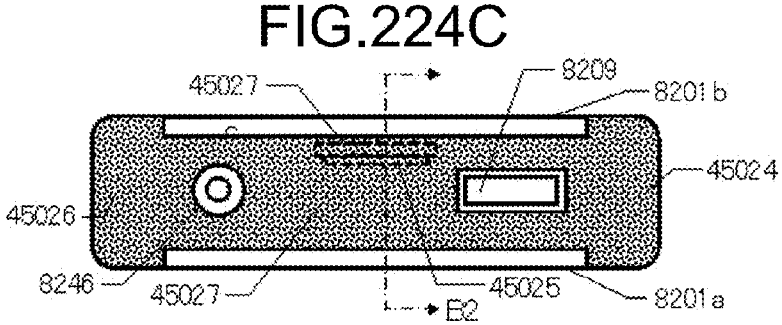
FIG.224B
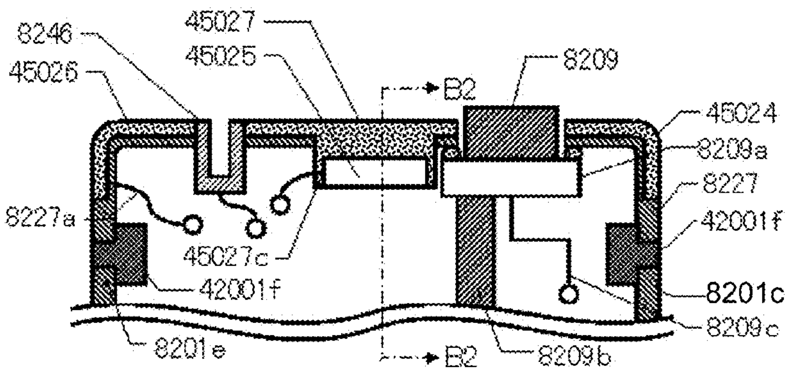
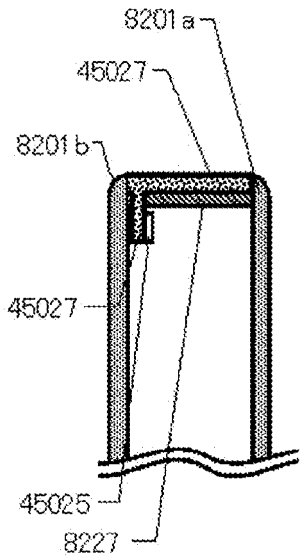
FIG.224D
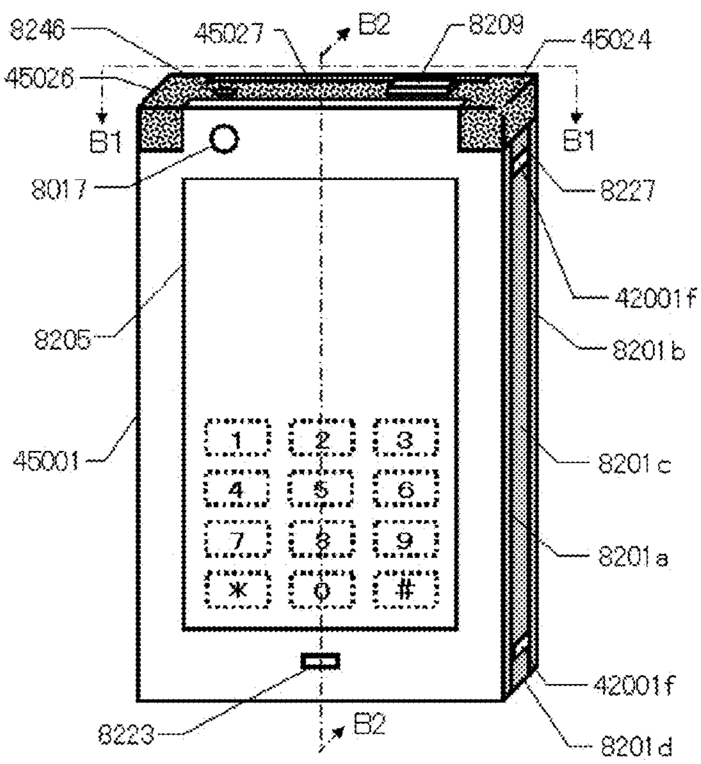
FIG.224A FIG.225C
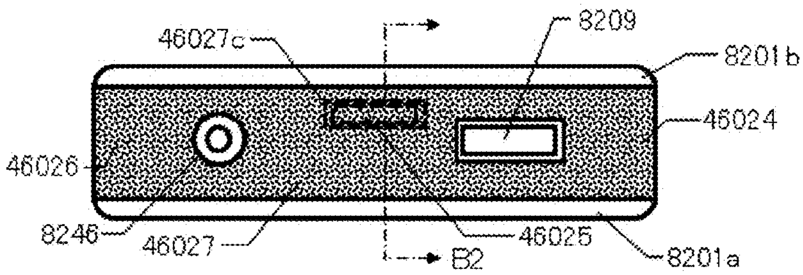
FIG.225B
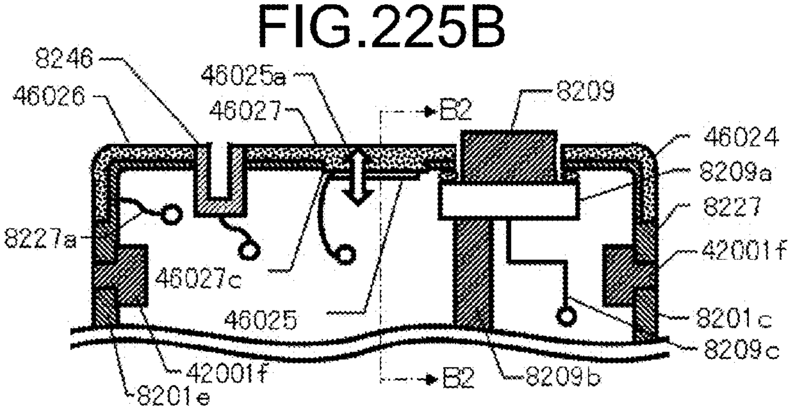
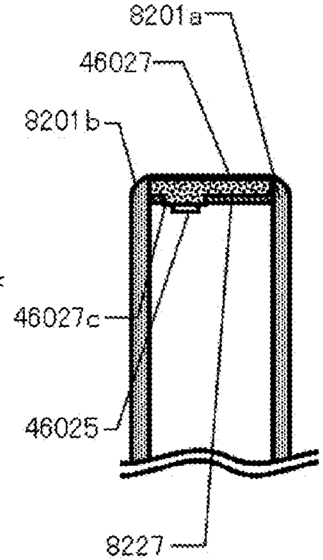
FIG.225D
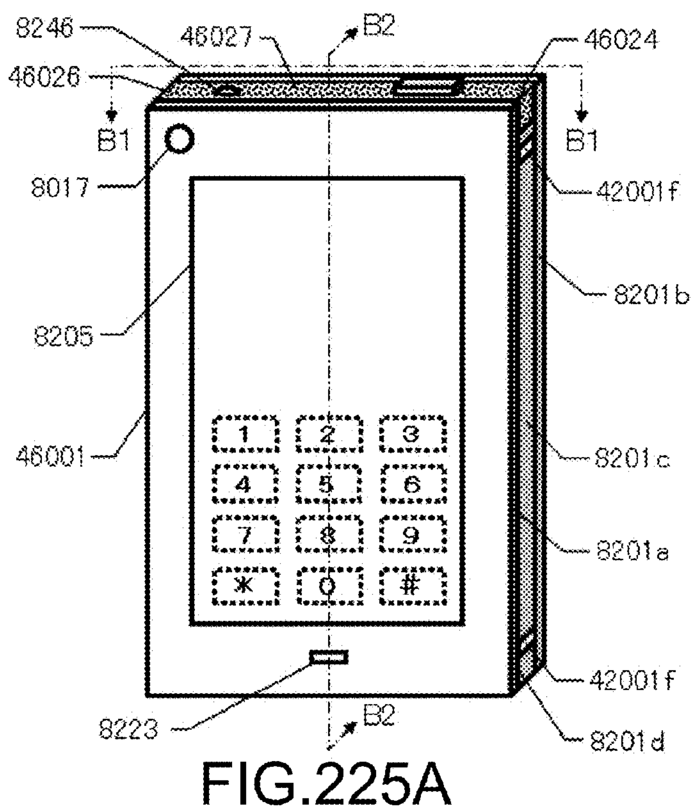
FIG.225A FIG.226C
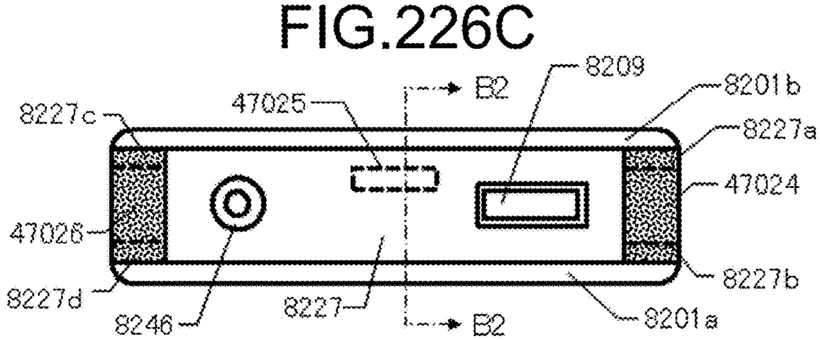
FIG.226B
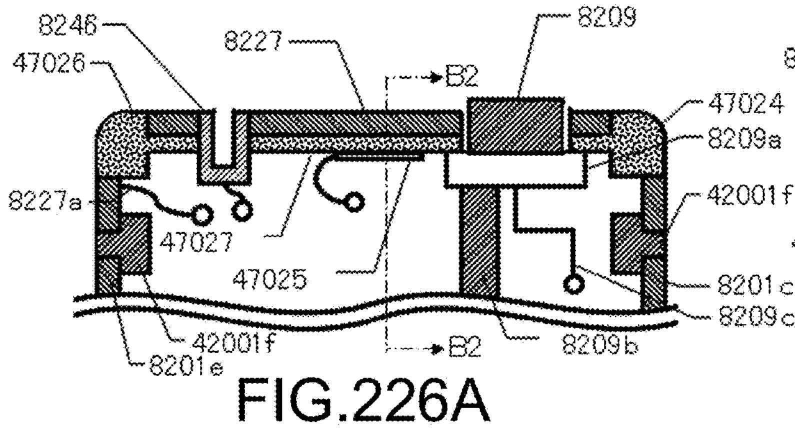
FIG.226A
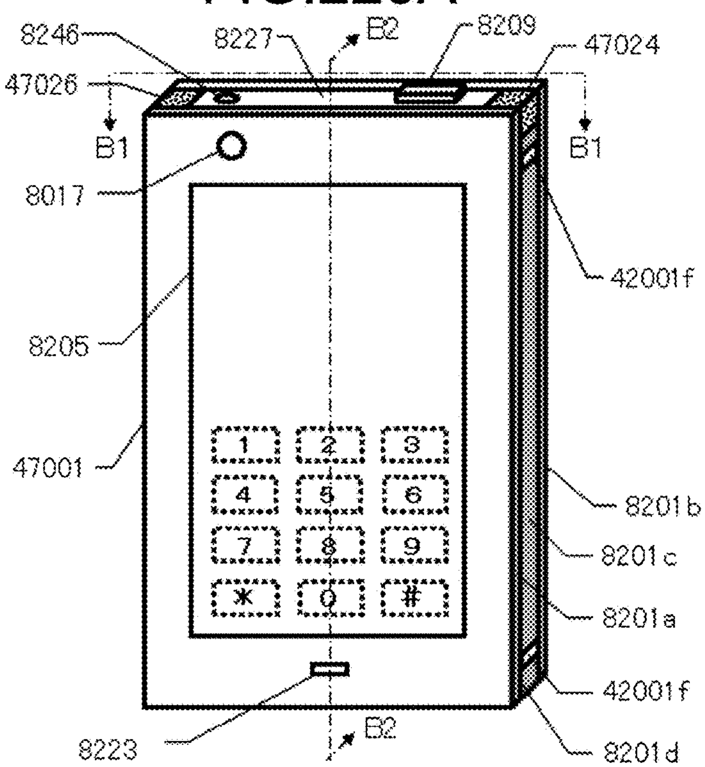
FIG.226D
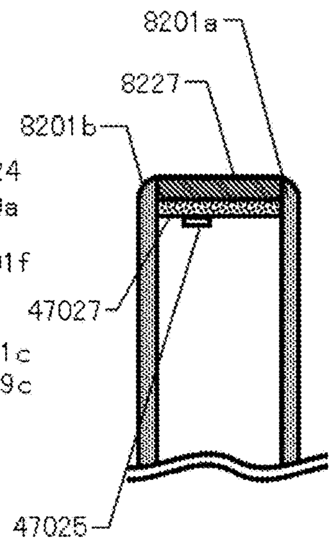
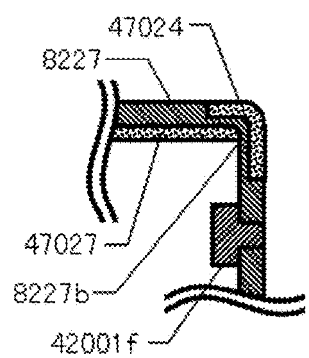
FIG.226E FIG.228C
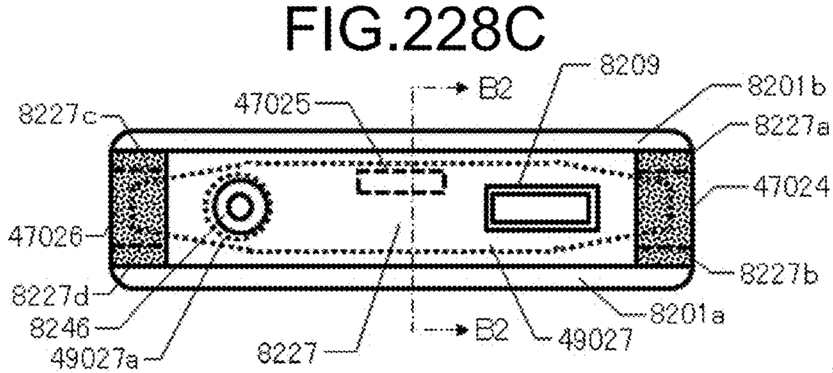
FIG.228B
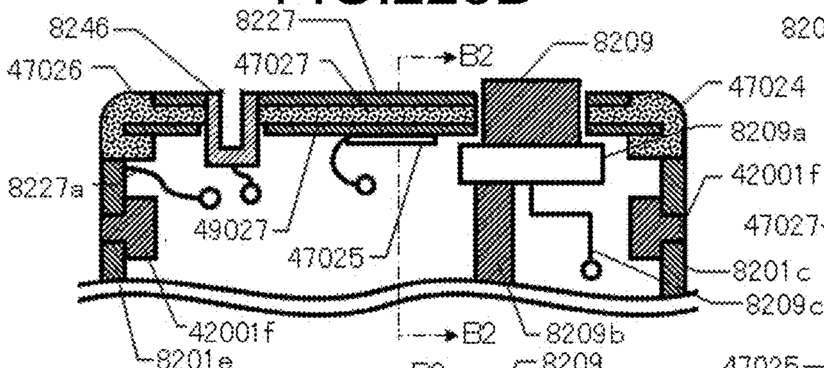
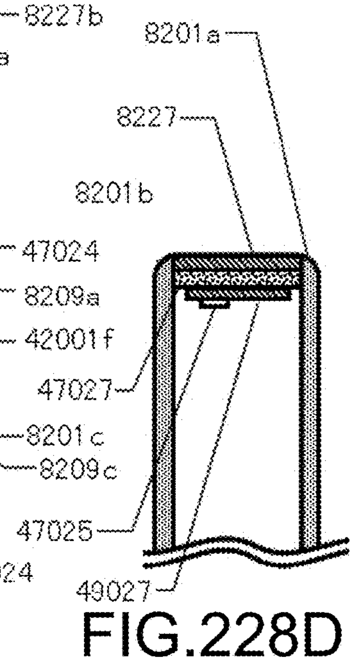
FIG.228D
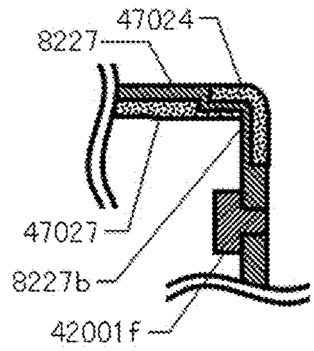
FIG.228E
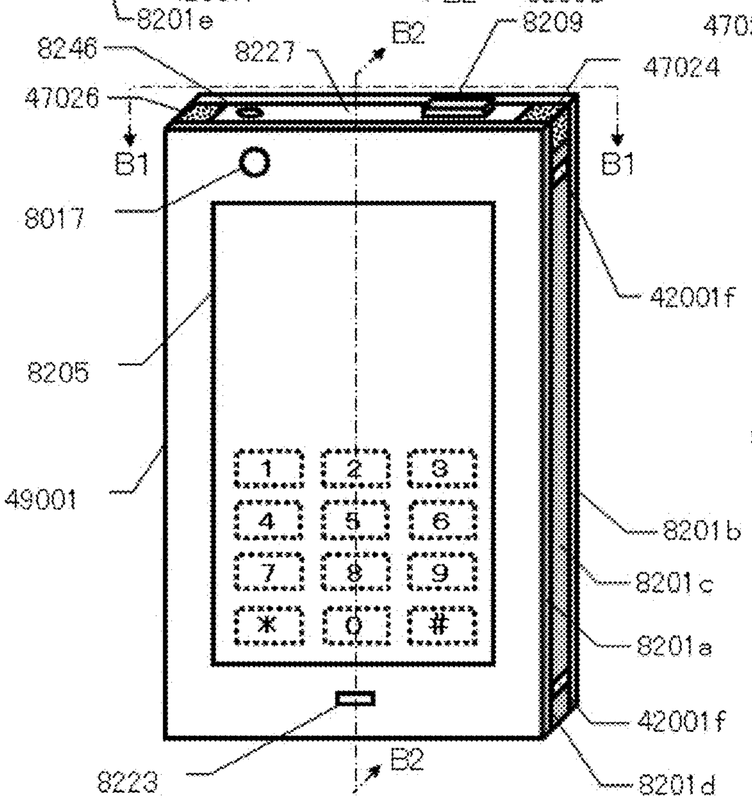
FIG.228A FIG.236C
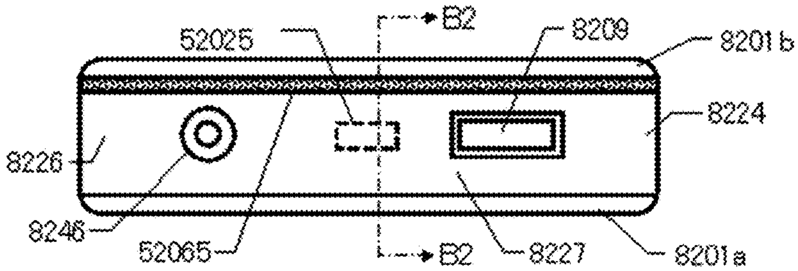
FIG.236D
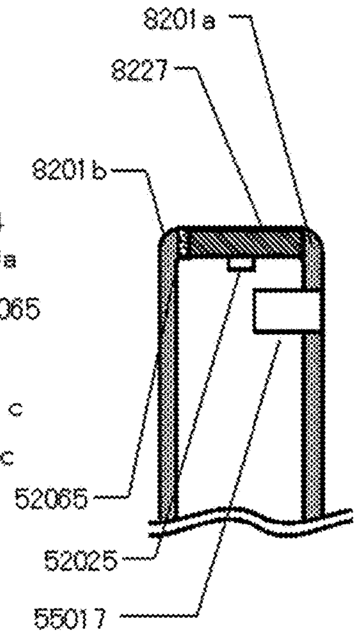
FIG.236B
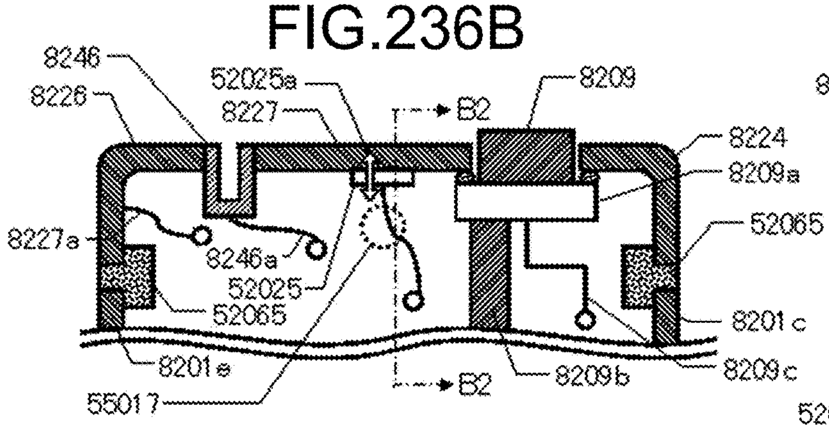
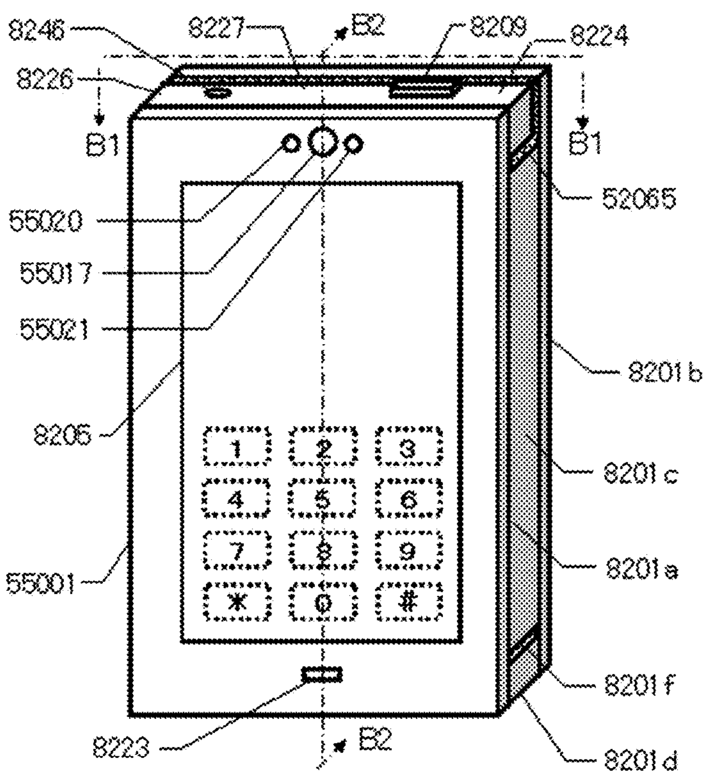
FIG.236A
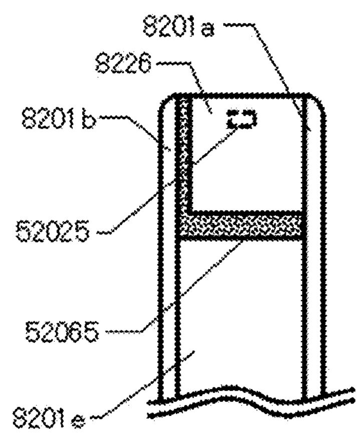
FIG.236E FIG.238A
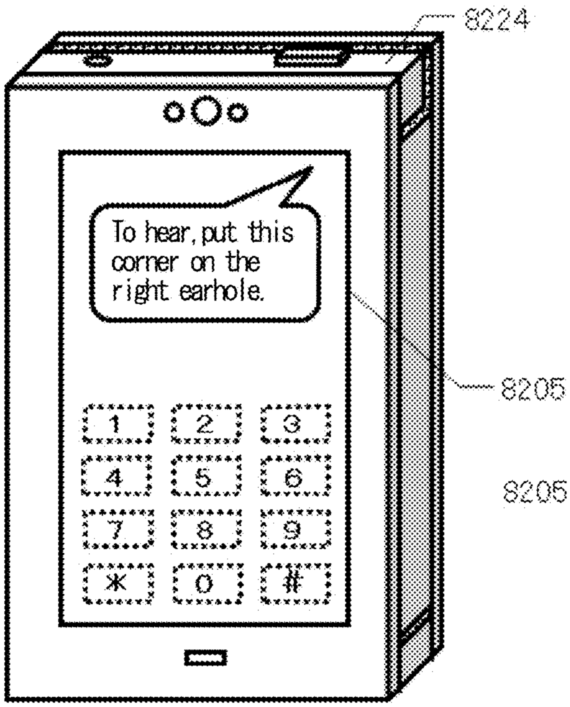
FIG.238B
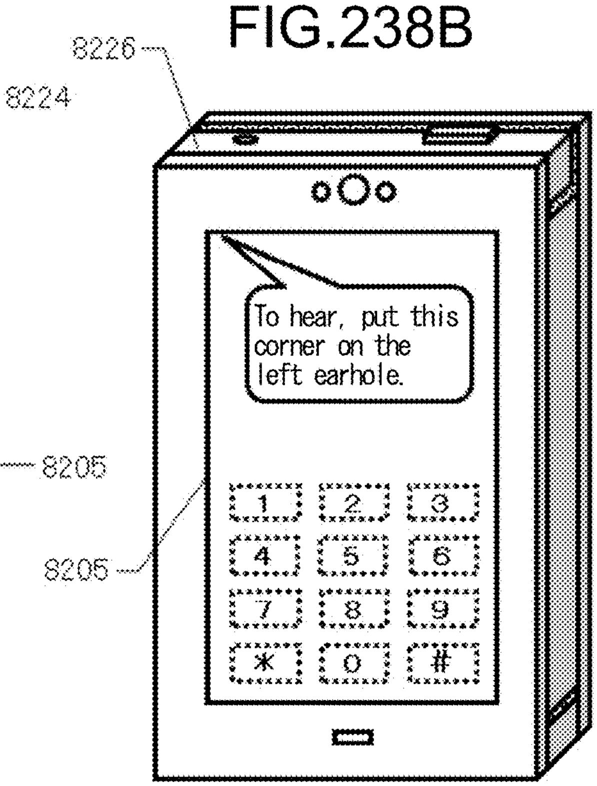
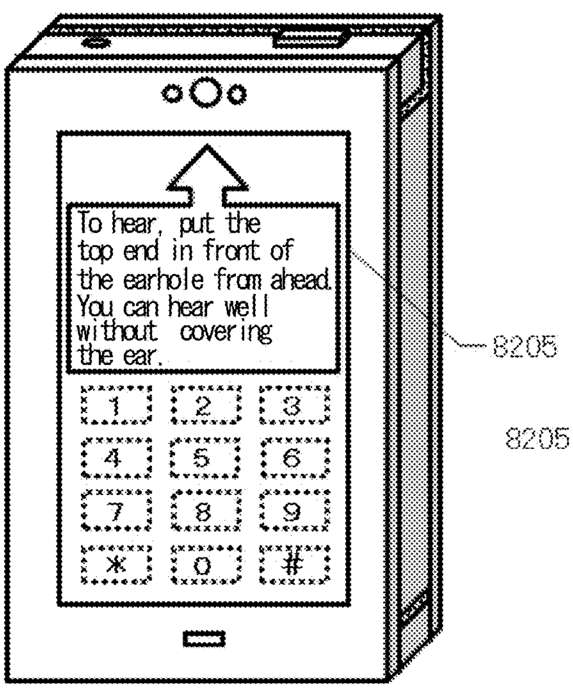
FIG.238C
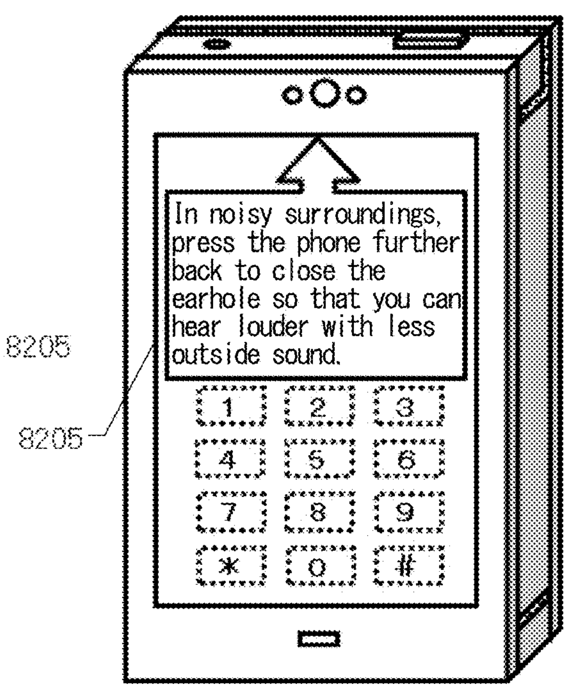
FIG.238D FIG.239C
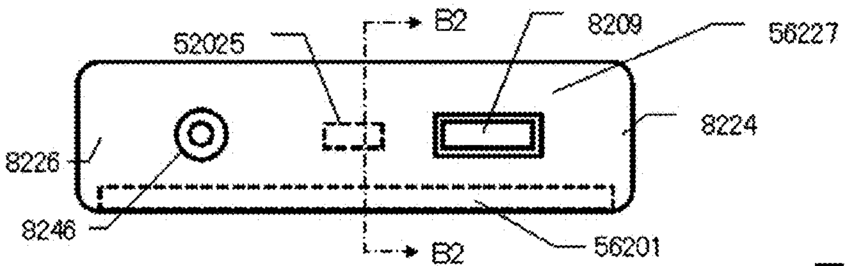
FIG.239B
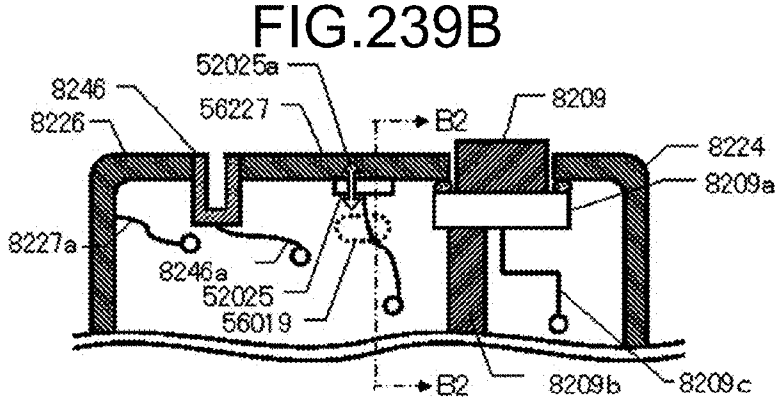
FIG.239D
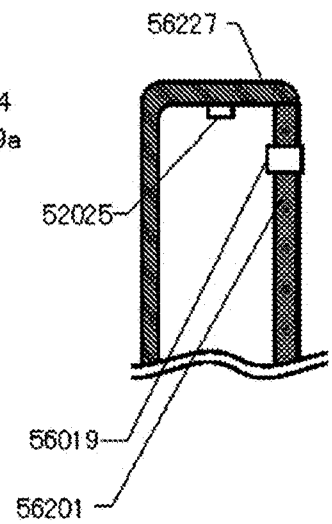
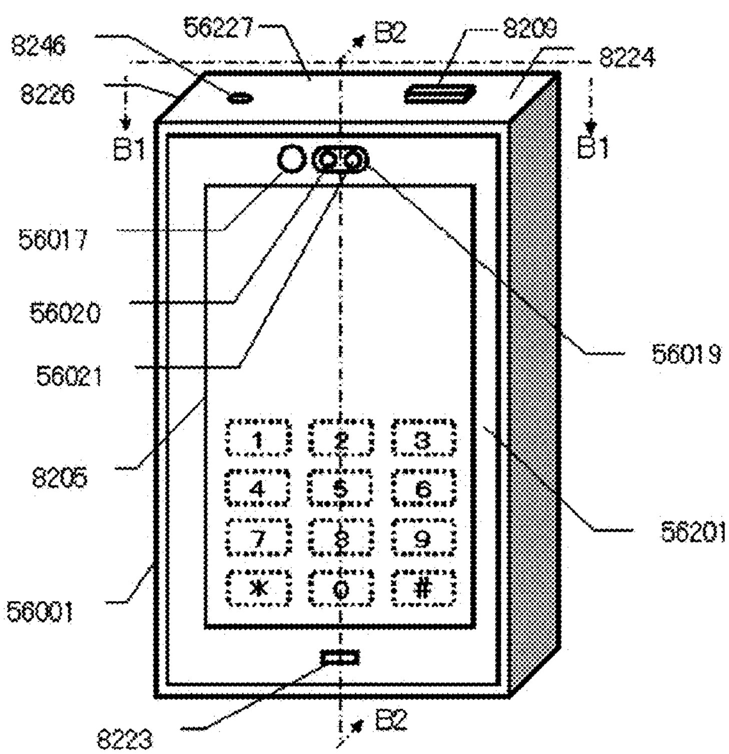
FIG.239A

MOBILE TELEPHONE

TECHNICAL FIELD

The various inventions disclosed in the present specification relate to a mobile telephone.

BACKGROUND ART

Conventionally, various different mobile telephones have been proposed for various different objectives. In the field of mobile telephones, for example, to provide a mobile telephone permitting clear listening even in the presence of loud noise, there has been proposed a mobile telephone in which a bone conduction speaker is employed, the mobile telephone being provided with the bone conduction speaker as well as with external auditory meatus stoppage means (Patent Document 1). On the other hand, in another proposed method for using a bone conduction speaker, a manual operation is used to adjust the pressure of contact between the tragus and a vibrating surface to be brought into contact with the tragus, whereby the ratio at which audio information through cartilage conduction and audio information through air conduction are transmitted can be altered in accordance with the magnitude of outside noise (Patent Document 2). In yet another proposal, a piezoelectric element is used as a vibration source of bone conduction. A further proposal for a mobile telephone is a wireless communication function headset that is wirelessly communicatively connected to a communication apparatus capable of audio communication via a communication network, the wireless communication function headset permitting audio communication with a party on the line via the communication apparatus (Patent Document 3). In yet another proposal, an eyeglasses-type interface device is provided with an audio unit that includes a bone conduction earphone, a microphone, and a display unit for displaying, on a lens, movie information that has been sent to a wireless communication unit from a mobile telephone or the like (Patent Document 4). It is typical for a "smartphone"-type mobile telephone to be sheathed in a soft cover, as an accessory device. Various other mobile telephone accessory devices, such as headsets for wired or short-range wireless communication with a mobile telephone, have also been proposed.

LIST OF CITATIONS

Patent Literature

[Patent Document 1] JP-A 2003-348208
[Patent Document 2] JP-B 4541111
[Patent Document 3] JP-A 2006-86581
[Patent Document 4] JP-A 2005-352024

SUMMARY OF INVENTION

Technical Problem

However, there are yet many problems to be reviewed in relation to mobile telephones.

In view of the above, an object of the present invention is to provide a mobile telephone that makes effective use of cartilage conduction.

Solution to Problem

According to one feature of the present invention, a mobile telephone has a front wall, a rear wall, a top wall partly continuous with a side face, and a side wall, and includes: a vibration-absorbing member between the top wall and each of the rear wall and the side wall; and a cartilage conduction vibration source on the inner side of the top wall. Here, opposite corner parts of the top wall partly continuous with the side face each serve as a cartilage conduction unit.

According to a specific feature, the vibration-absorbing member is arranged between the top wall and the front wall. According to another specific feature, the front wall, the rear wall, the top wall, and the side wall are formed of a hard material. According to another specific feature, the cartilage conduction vibration source is a piezoelectric bimorph element. According to another specific feature, the cartilage conduction vibration source is affixed to the inner side of the top wall.

According to another specific feature, in the above mobile telephone, the cartilage conduction vibration source is supported so as not to make contact with the front wall, and there is further provided a switching unit for switching whether or not to conduct the vibration of the cartilage conduction vibration source to the front wall.

According to another specific feature, the frequency characteristics of an audio signal that drives the cartilage conduction vibration source are determined based on the language of the audio signal. According to a more specific feature, there is further provided a display unit, and the frequency characteristics of the audio signal that drives the cartilage conduction vibration source are changed automatically according to the display language on the display unit.

According to another specific feature, in the above mobile telephone, there is further provided an adjusting means for adjusting the intensity of the vibration of the cartilage conduction vibration source at least between a first intensity and a second intensity. Here, the mobile telephone generates air-conduction sound whose volume changes as the intensity of the vibration changes. The first intensity is an intensity sufficient to generate air-conduction sound with a volume required in a measurement method conforming to a standard for a common mobile telephone. The second intensity is an intensity insufficient to generate air-conduction sound with the volume required in the measurement method conforming to the standard for a common mobile telephone, and is such that the sound pressure inside the external auditory meatus as measured with the mobile telephone in contact with the ear cartilage with the vibration at the second intensity is higher than the sound pressure inside the external auditory meatus as measured with the mobile telephone out of contact with but close to the entrance of the external auditory meatus with the vibration at the first intensity.

According to a more specific feature, the air-conduction sound is generated by conducting vibration from the top wall, on which the cartilage conduction vibration source is arranged, to the front wall. According to another specific feature, the cartilage conduction vibration source has a thin shape, vibrates in the direction perpendicular to the thin shape, and is affixed to the inner side of the top wall in the direction parallel to the thin shape.

According to another specific feature, the top wall serves as a cartilage conduction unit when, with a user's face pointing ahead, the mobile telephone is held transversely, roughly horizontally, and is put on a front edge part of the entrance of the external auditory meatus. According to a more specific feature, the top wall serves as a pressing part for bending the tragus to close the entrance of the external auditory meatus when, with the user's face pointing ahead, the mobile telephone is moved rearward.

According to another specific feature, in the above mobile telephone, there is further provided a explanation unit for explaining a method of use in which the top wall is used as a cartilage conduction unit or a method of use in which the top wall is used as a pressing part for bending the tragus to close the entrance of the external auditory meatus when, with the user's face pointing ahead, the mobile telephone is moved rearward.

According to another feature of the present invention, a mobile telephone has a front wall, a rear wall, a top wall, and a side wall, and includes: a cartilage conduction vibration source that has a thin shape, that vibrates in the direction perpendicular to the thin shape, and that is affixed to the middle, in the left/right direction, of the inner side of the top wall in the direction parallel to the thin shape; and a front camera arranged at the middle, in the left/right direction, of the inner side of the top wall. According to another specific feature, the rear wall, the top wall, and the side wall constitute an integral box-shaped casing, which, when combined with the front wall, permits vibration to conduct from the top wall to the front wall.

According to another feature of the present invention, a mobile telephone has a front wall, a rear wall, a top wall, and a side wall, and includes: a cartilage conduction vibration source that has a thin shape, that vibrates in a direction perpendicular to the thin shape, and that is affixed to the middle, in the left/right direction, of the inner side of the top wall in the direction parallel to the thin shape; and a proximity sensor unit arranged at the middle, in the left/right direction, of the inner side of the top wall. According to another specific feature, the rear wall, the top wall, and the side wall constitute an integral box-shaped casing, which, when combined with the front wall, permits vibration to conduct from the top wall to the front wall.

Advantageous Effects of the Invention

In accordance with the present invention, it is possible to provide a mobile telephone in which cartilage conduction is effectively used.

BRIEF DESCRIPTION OF DRAWINGS

FIG. 13A is a front perspective view, FIG. 13B is a rear perspective view, and FIG. 13C is a cross-sectional view along the B-B cross-section of the rear perspective view of FIG. 13B (sixth embodiment);

FIG. 15A is a front view, FIG. 15B is a rear view, and FIG. 15C is an elemental cross-sectional view along the B-B cross-section of the rear perspective view of FIG. 15B (seventh embodiment);

FIG. 17A is a front view, FIG. 17B is a rear view, and FIG. 17C is an elemental cross-sectional view along the B-B cross-section of the rear perspective view of FIG. 17B (eighth embodiment);

FIG. 18A is a front view, FIG. 18B is a rear view, and FIG. 18C is an elemental cross-sectional view along the B-B cross-section of the rear perspective view of FIG. 18B (ninth embodiment);

FIGS. 53A and 53B are external perspective views of the thirty-third embodiment and the modification example thereof;

FIGS. 62A, 62B and 62C are cross-sectional views and a transparent perspective views of the elements of a fortieth embodiment according to an aspect of the present invention as well as various modification examples thereof (fortieth embodiment);

FIGS. 65A, 65B, 65C and 65D are cross-sectional views relating to a forty-second embodiment according to an aspect of the present invention (forty-second embodiment);

FIGS. 67A, 67B1, 67B2 and 67C are cross-sectional views relating to a forty-fourth embodiment according to an aspect of the present invention (forty-fourth embodiment);

FIGS. 68A and 68B are cross-sectional views relating to a forty-fifth embodiment according to an aspect of the present invention (forty-fifth embodiment);

FIGS. 78A, 78B and 78C are perspective views and cross-sectional views relating to the fifty-second embodiment of FIG. 77;

FIGS. 86A, 86B and 86C are perspective views and cross-sectional views of a fifty-sixth embodiment according to an aspect of the present invention (fifty-sixth embodiment);

FIGS. 88A, 88B and 88C are perspective views and cross-sectional views of a fifty-eighth embodiment according to an aspect of the present invention (fifty-eighth embodiment);

FIGS. 89A, 89B and 89C are perspective views and cross-sectional views of a fifty-ninth embodiment according to an aspect of the present invention (fifty-ninth embodiment);

FIGS. 90A, 90B and 90C are perspective views and cross-sectional views of a sixtieth embodiment according to an aspect of the present invention (sixtieth embodiment);

FIGS. 91A, 91B and 91C are perspective views and a cross-sectional views of a sixty-first embodiment according to an aspect of the present invention (sixty-first embodiment)

FIGS. 92A, 92B and 92C are perspective views and side views of a sixty-second embodiment according to an aspect of the present invention (sixty-second embodiment);

FIGS. 97A, 97B, 97C and 97D are perspective views, cross sectional views, and a top view of a sixty-fifth embodiment according to an aspect of the present invention (sixty-fifth embodiment);

FIGS. 98A, 98B, 98C and 98D are perspective views, a cross sectional views, and a top view of a sixty-sixth embodiment according to an aspect of the present invention (sixty-sixth embodiment);

FIGS. 99A, 99B and 99C are perspective views and cross sectional views of a sixty-seventh embodiment according to an aspect of the present invention (sixty-seventh embodiment);

FIGS. 120A and 120B are cross sectional views of a front surface and a side surface relating to an eightieth embodiment according to an aspect of the present invention (eightieth embodiment);

FIGS. 121A, 121B and 121C are cross sectional views of a side surface relating to an eighty-first embodiment according to an aspect of the present invention, and a first modification example and second modification example thereof (eighty-first embodiment);

FIG. 122 is a block diagram relating to an eighty-second embodiment according to an aspect of the present invention (eighty-second embodiment);

FIG. 123 is a flowchart of an application processor in the eighty-second embodiment of FIG. 122;

FIGS. 124A and 124B are perspective views relating to an eighty-third embodiment according to an aspect of the present invention (eighty-third embodiment);

FIG. 125 is a perspective view showing a modification example of the eighty-third embodiment of FIG. 124;

FIGS. 126A, 126B and 126C are perspective views and cross sectional views relating to an eighty-fourth embodiment according to an aspect of the present invention (eighty-fourth embodiment);

FIG. 127 is a block diagram of the eighty-fourth embodiment of FIGS. 126A, 126B and 126C;

FIGS. 128A, 128B and 128C depict cross sectional views of a modification example of the eighty-fourth embodiment of FIGS. 126A, 126B and 126C;

FIG. 129 is a block diagram of a modification example of the eighty-fourth embodiment of FIGS. 128A, 128B and 128C;

FIGS. 130A, 130B and 130C are perspective views and cross sectional views relating to an eighty-fifth embodiment according to an aspect of the present invention and a modification example thereof (eighty-fifth embodiment);

FIG. 131 is a block diagram relating to an eighty-sixth embodiment of the present invention (eighty-sixth embodiment);

Figure 87:
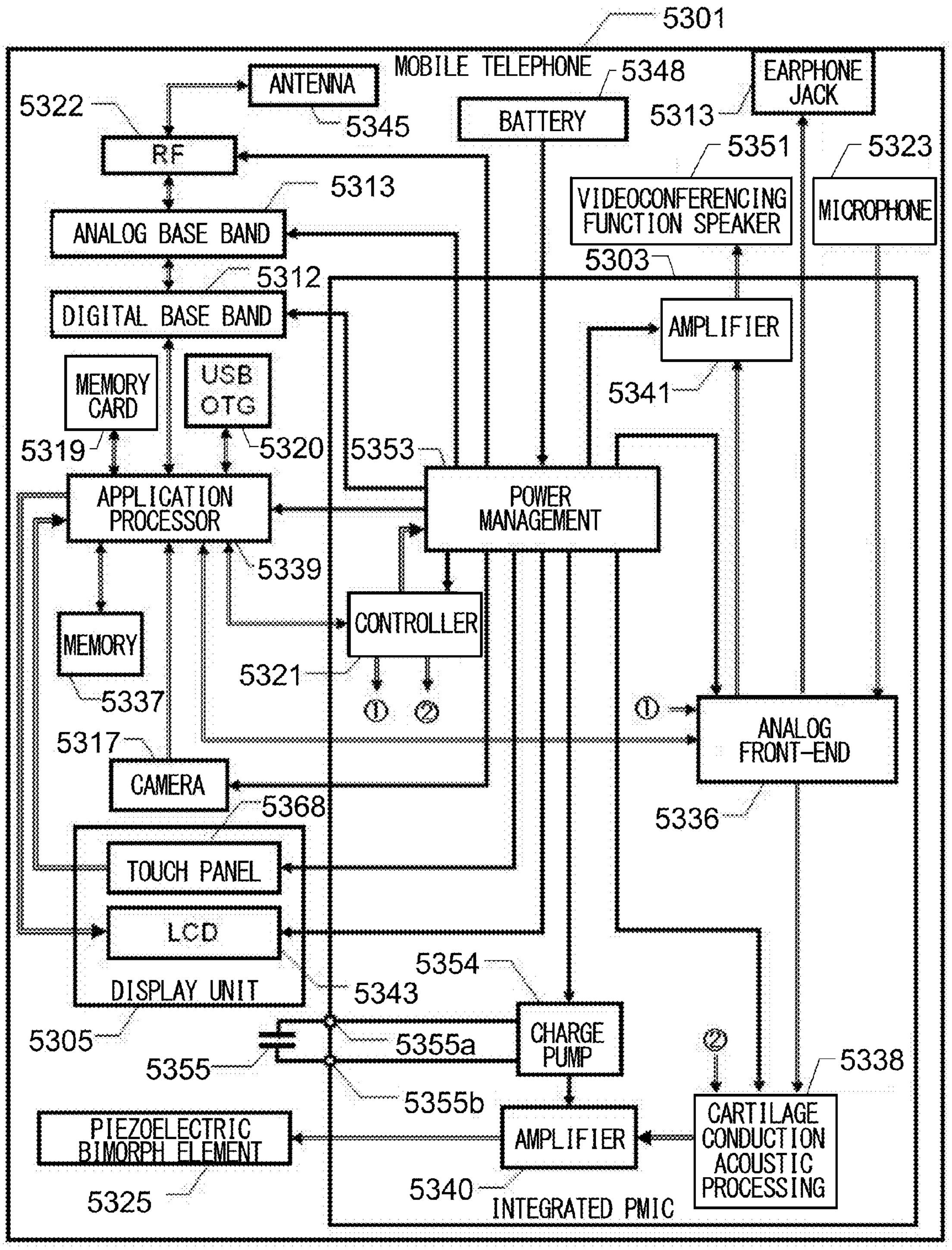
FIG. 87 is a block diagram of a fifty-seventh embodiment according to an aspect of the present invention (fifty-seventh embodiment)
Figure 114:
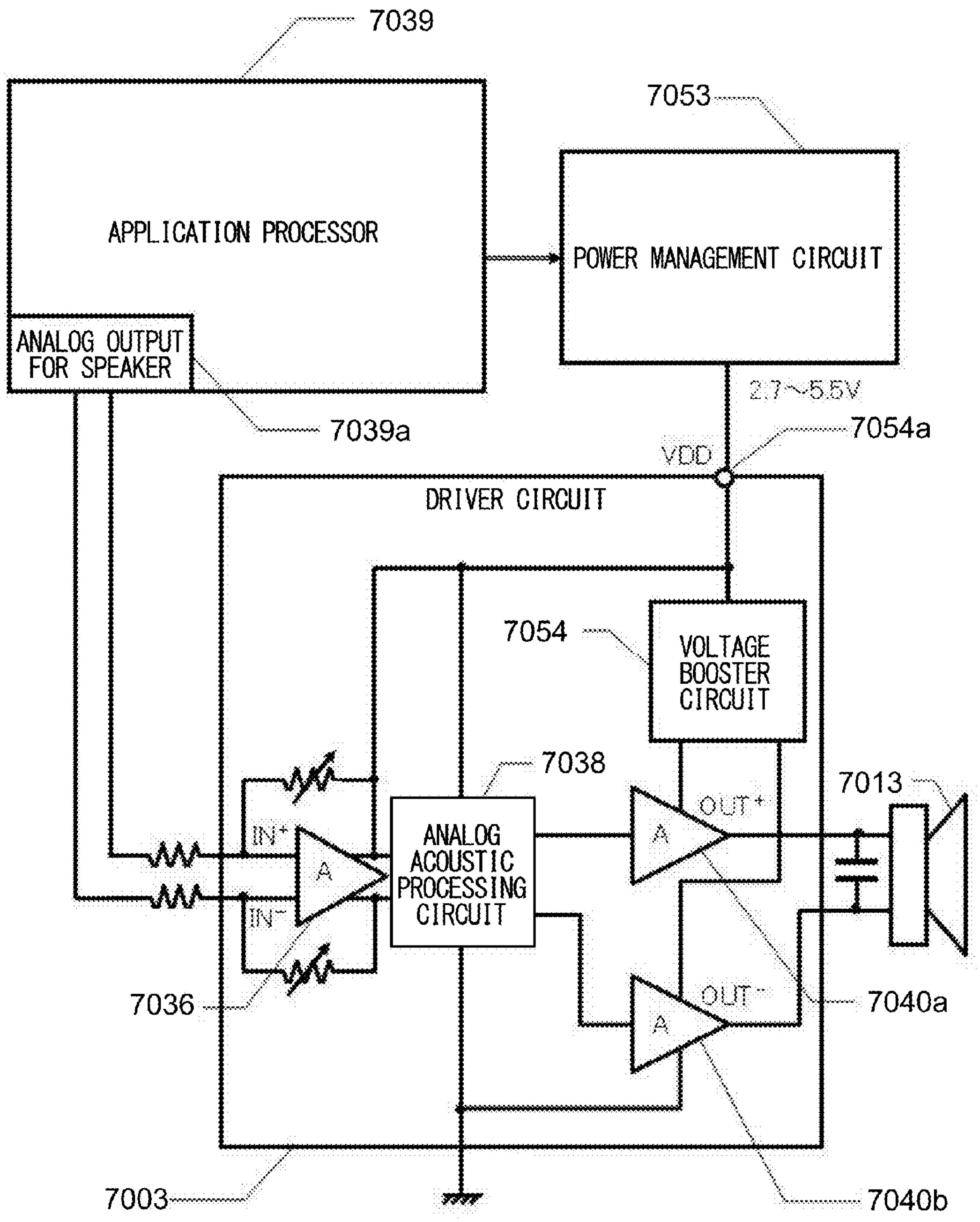
FIG. 114 is a block diagram relating to a seventy-fourth embodiment according to an aspect of the present invention (seventy-fourth embodiment)
Figure 115:
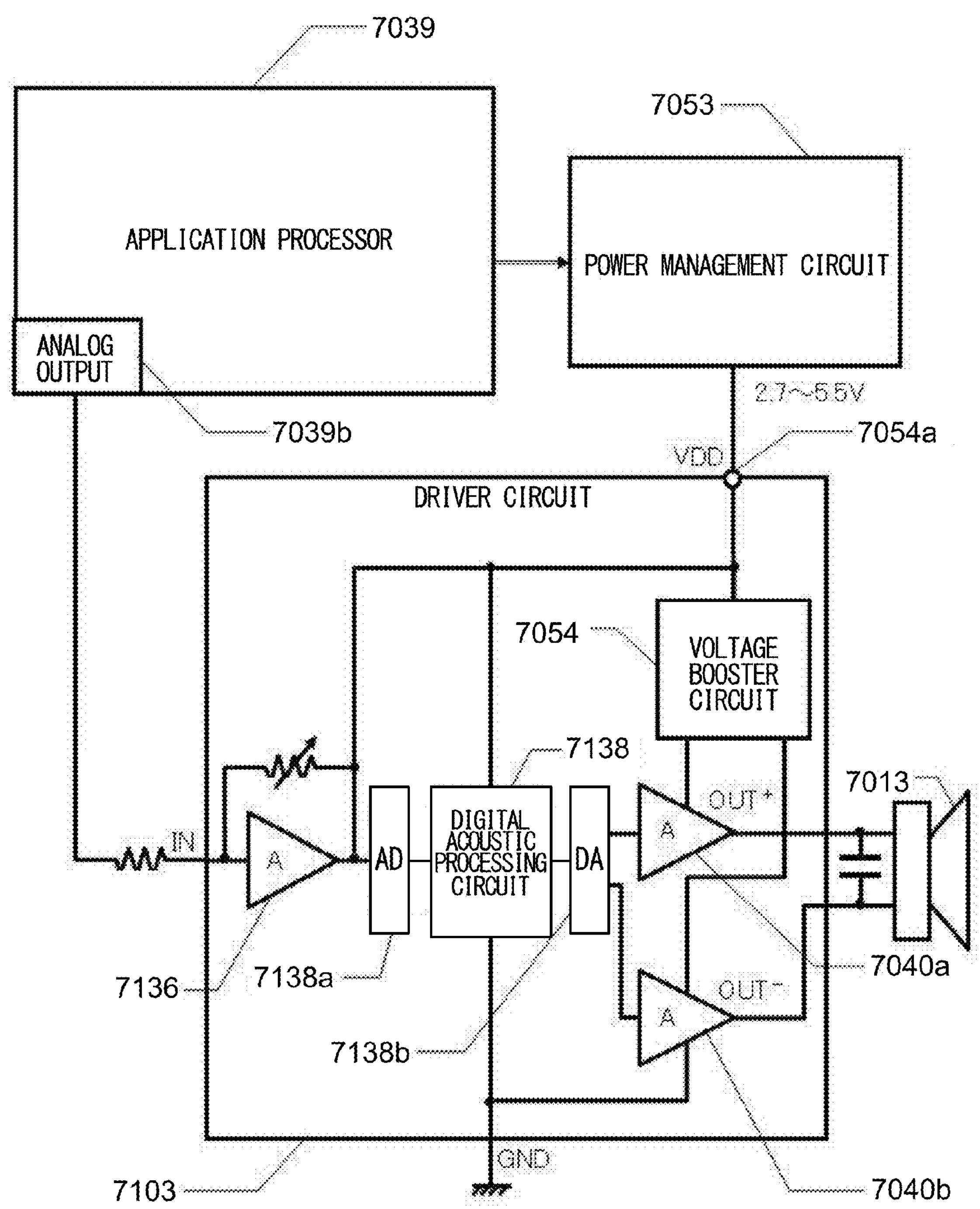
FIG. 115 is a block diagram relating to a seventy-fifth embodiment according to an aspect of the present invention (seventy-fifth embodiment)
Figure 131:
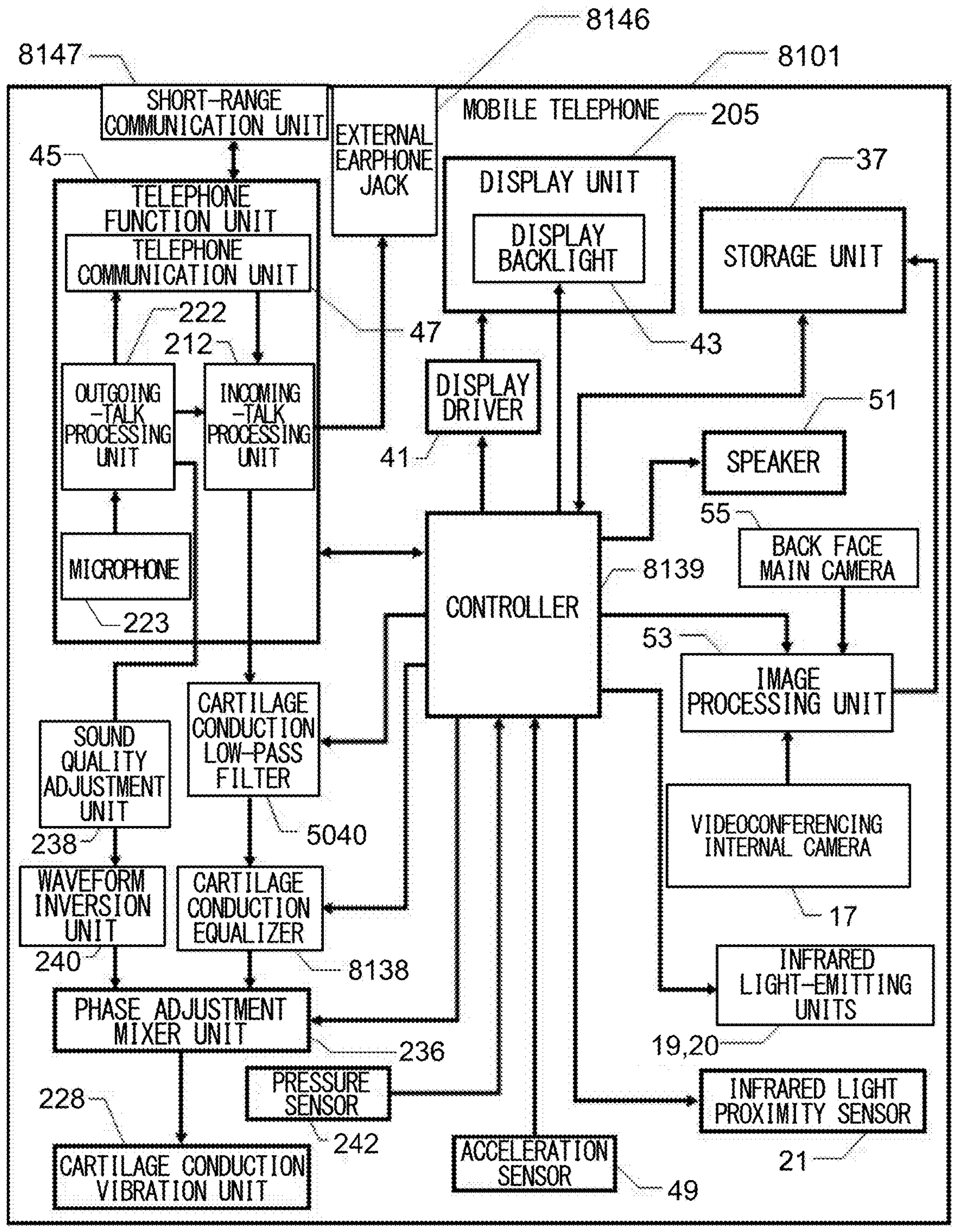
Figure 132A:
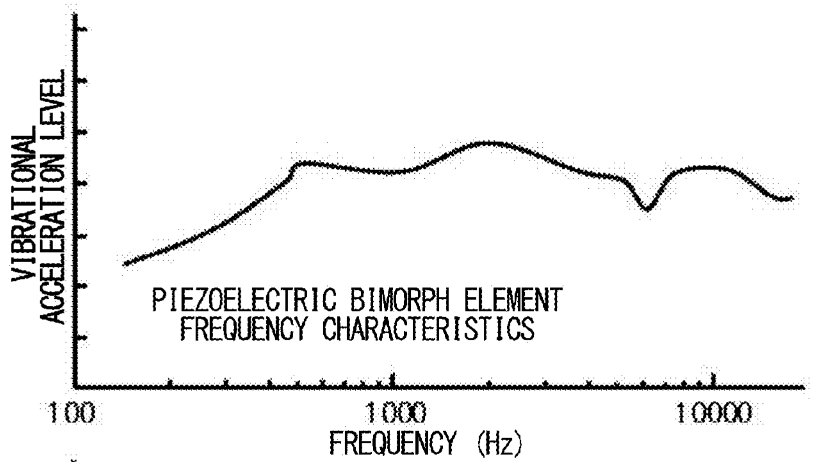
Figure 132B:
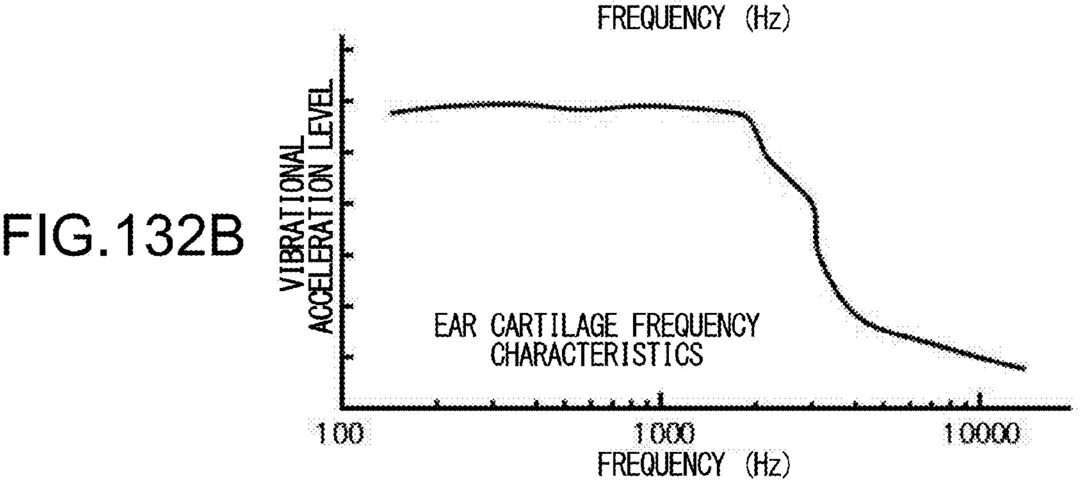
Figure 132C:
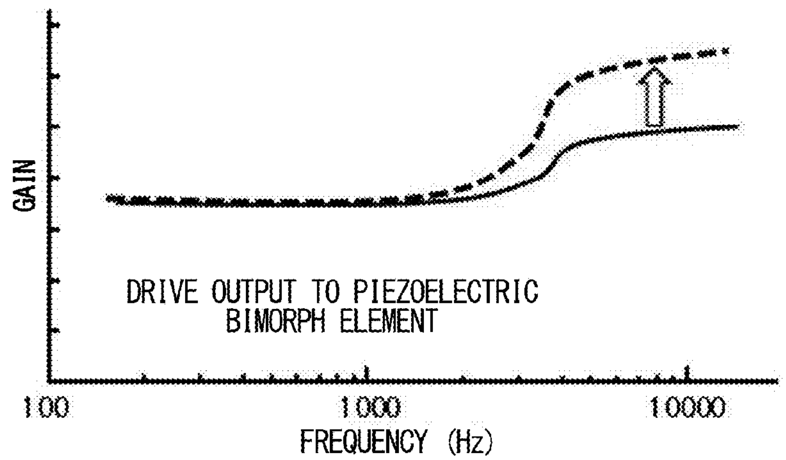
Figure 133:
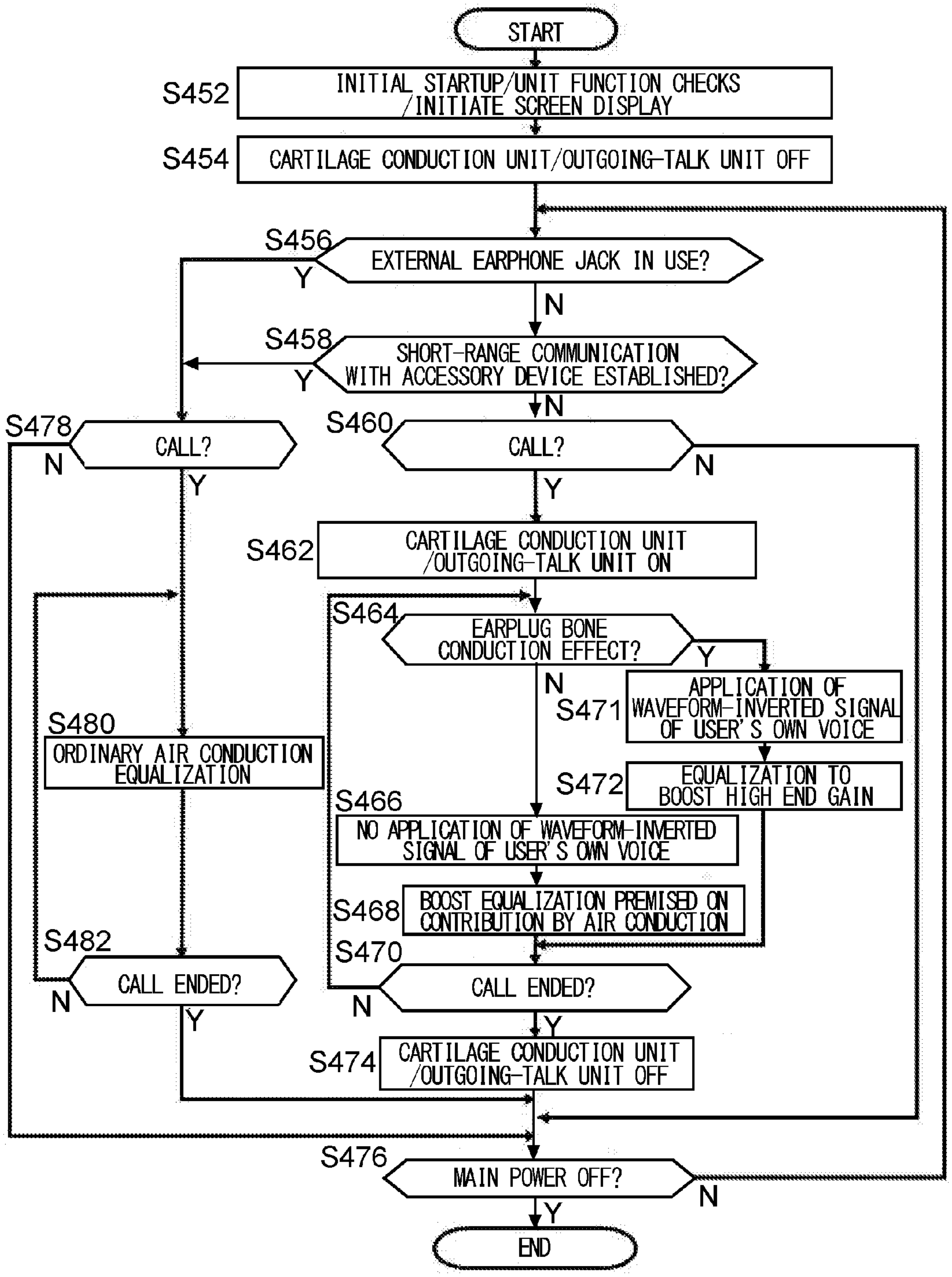
Figure 134A:
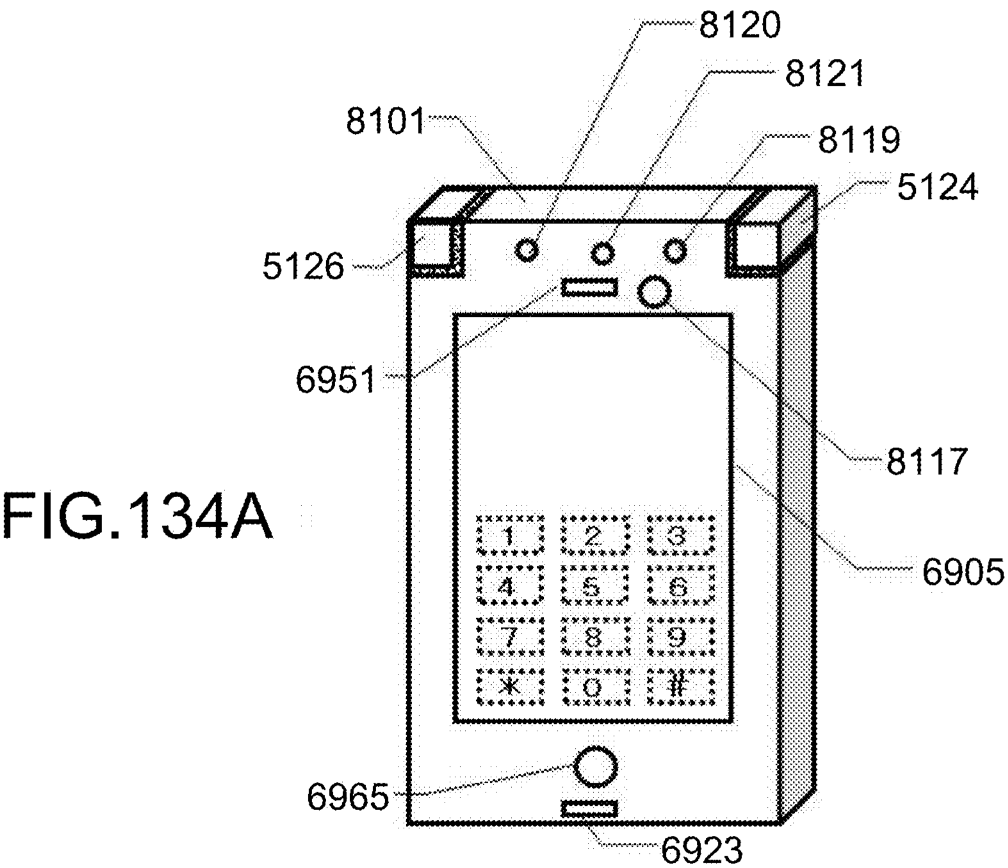
Figure 134B:
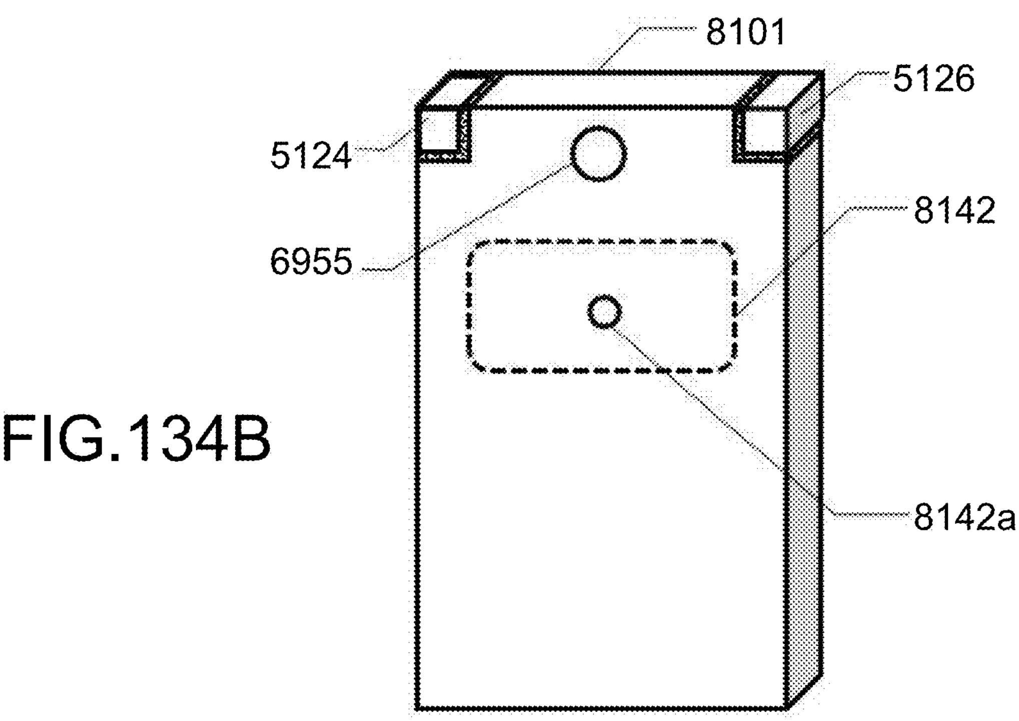
Figure 135:
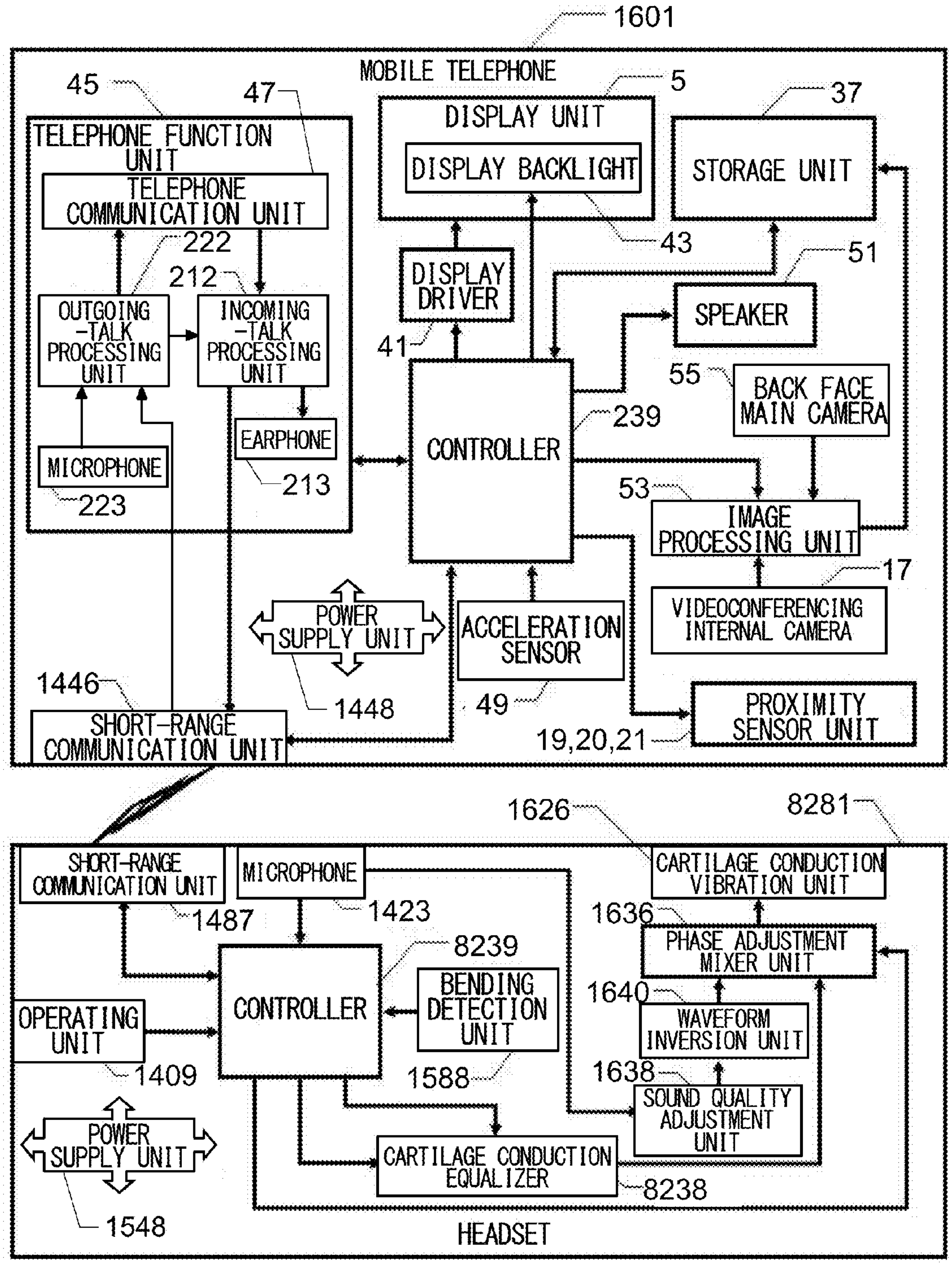
Figures 136A, 136B, 136C, 136D, 136E:
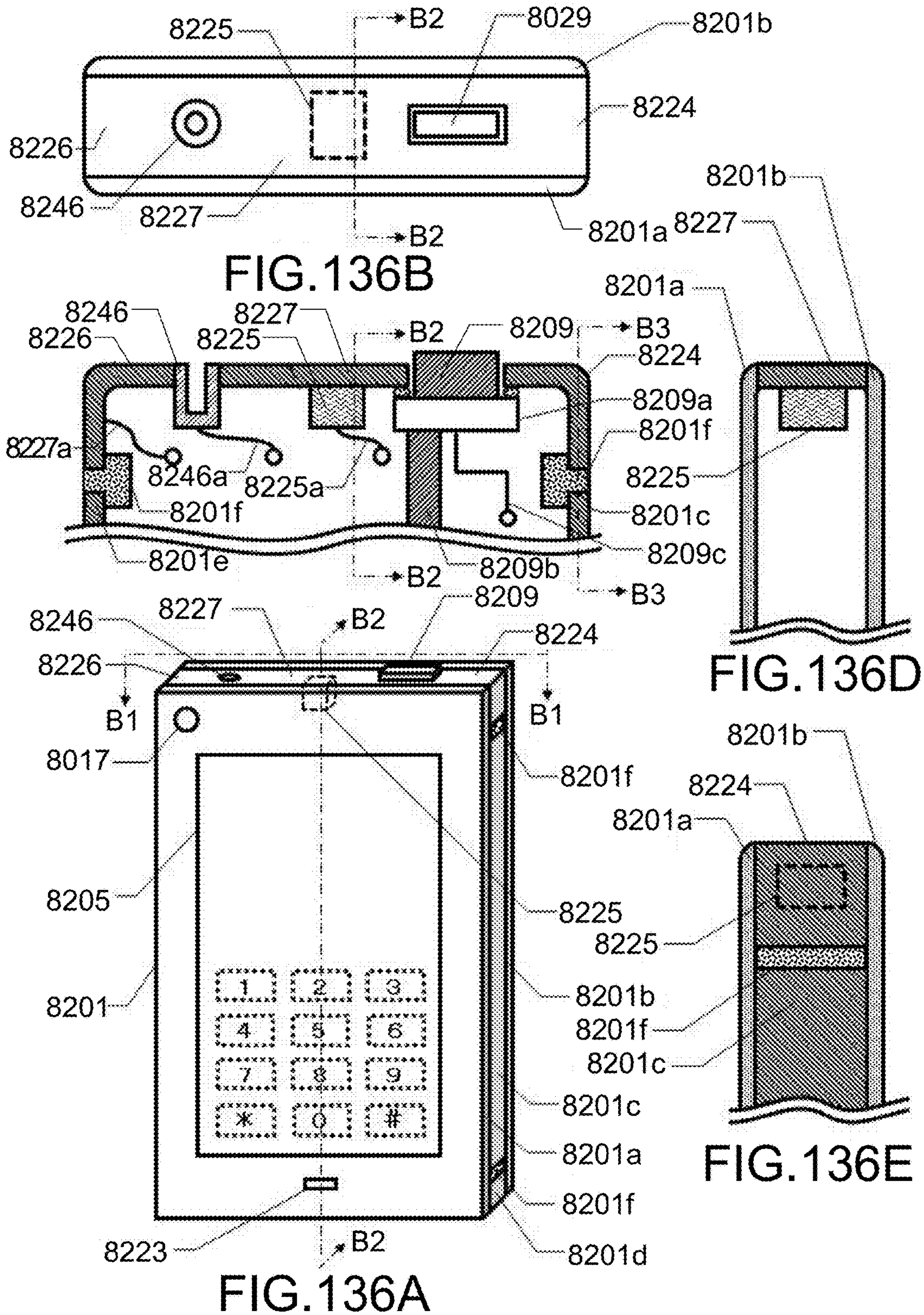
Figure 137A:
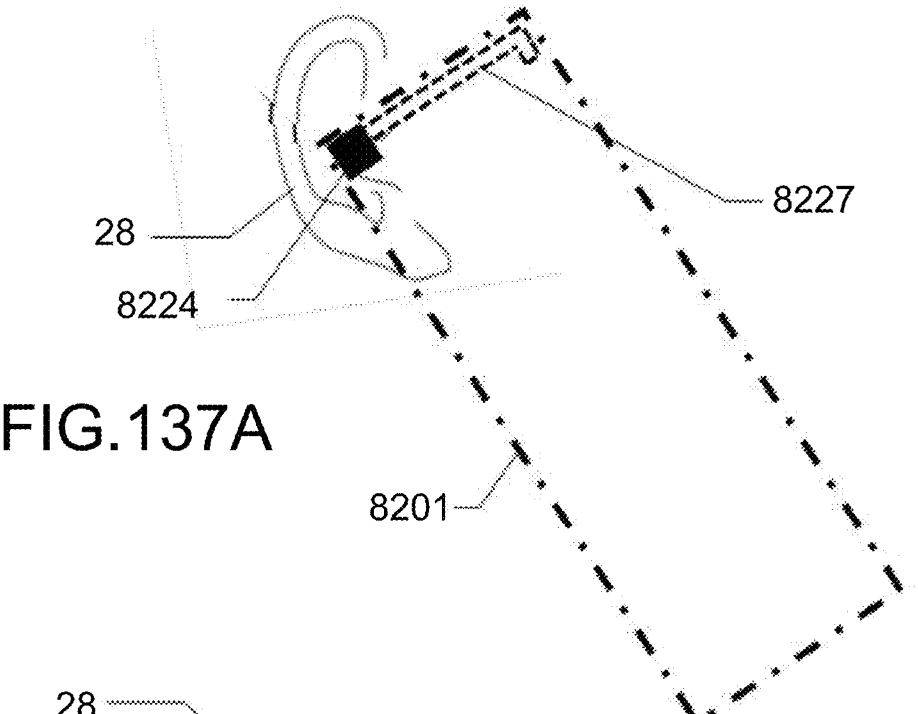
Figure 137B:
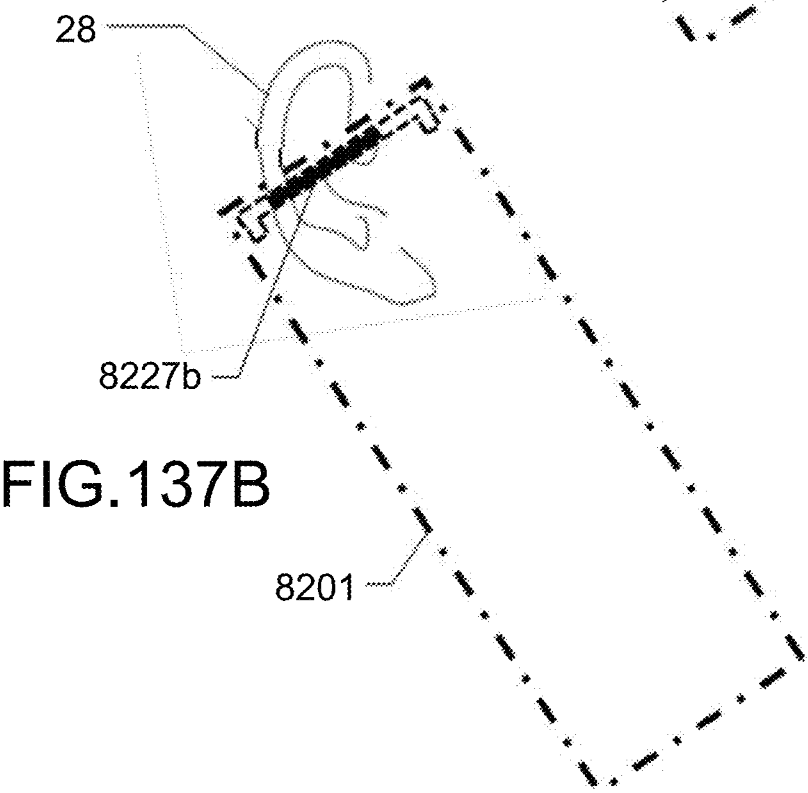
Figure 138A:
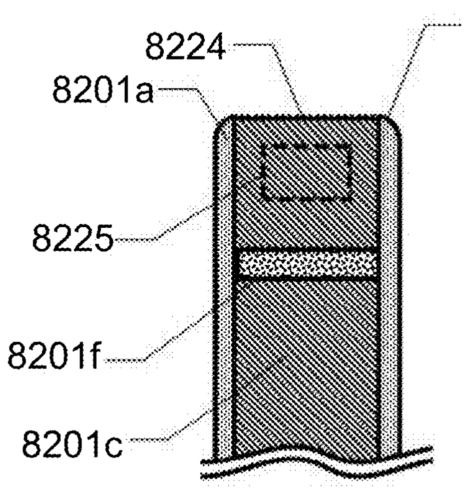
Figure 138B:
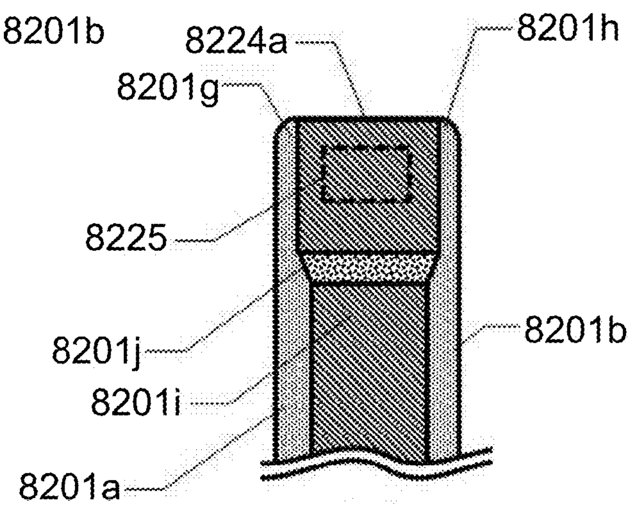
Figure 138C:
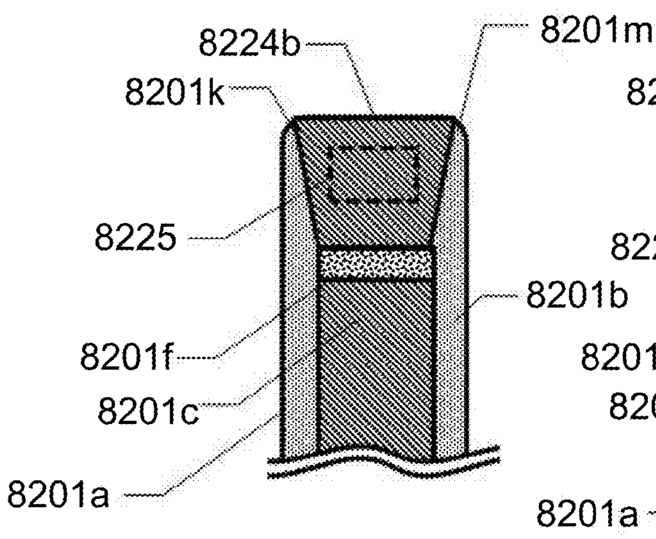
Figure 138D:
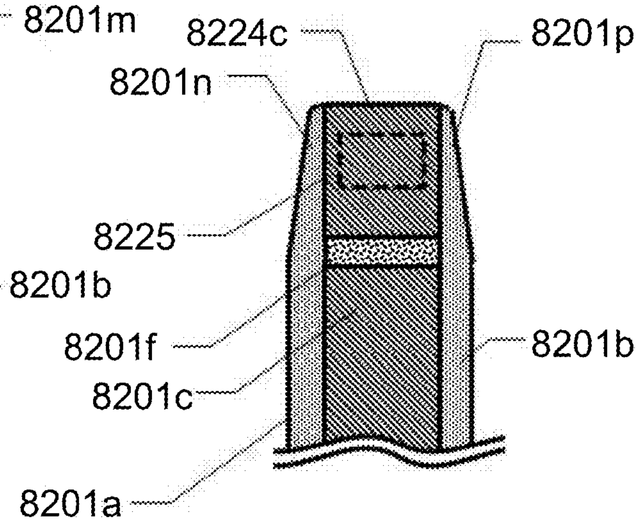
Figure 141A:
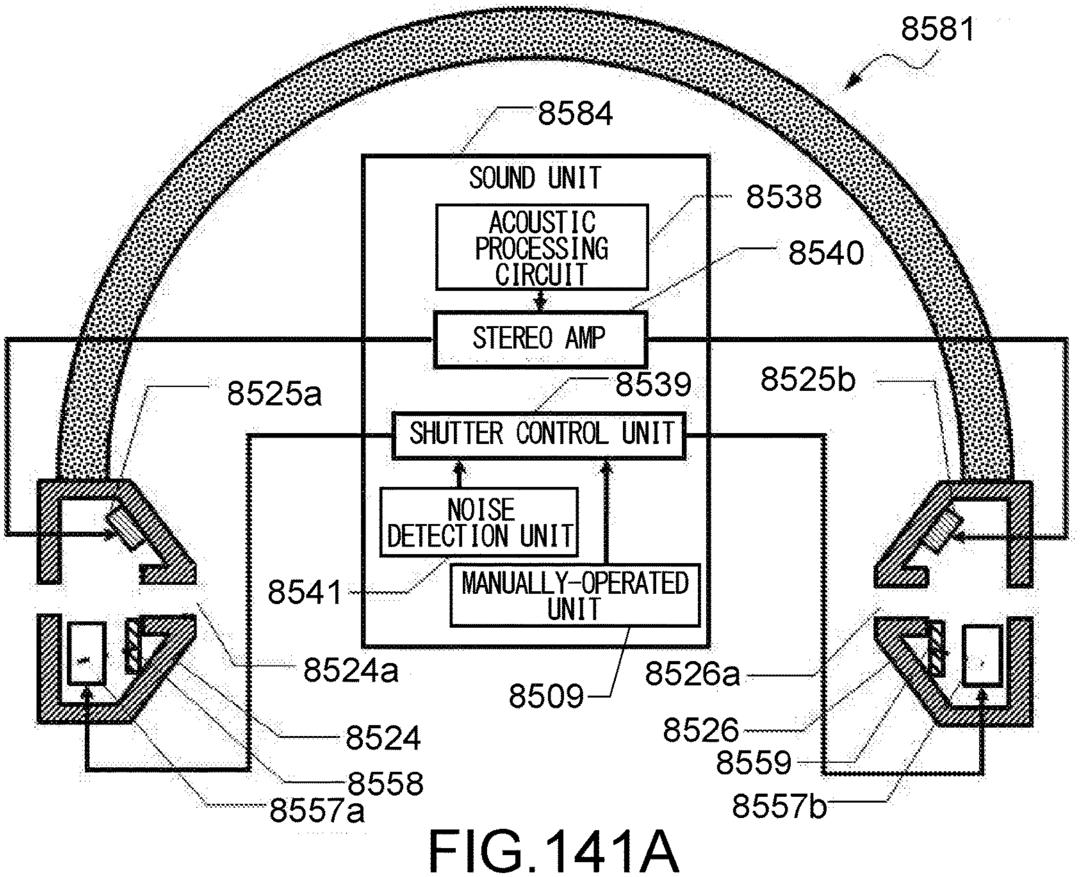
Figures 141B, 141C:
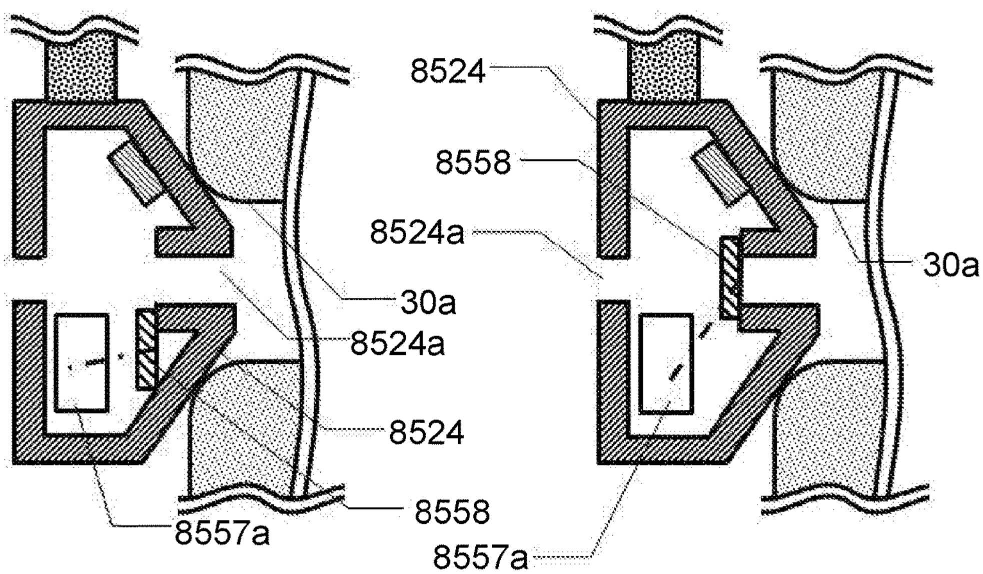
Figure 143A:
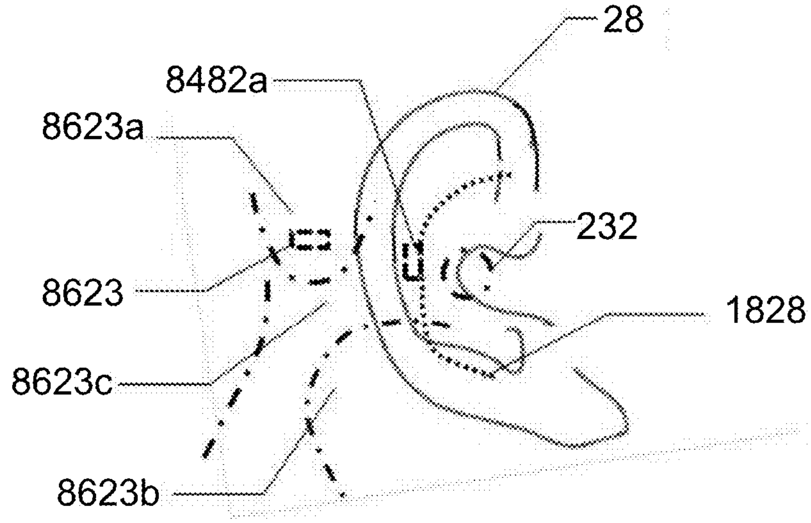
Figure 143B:
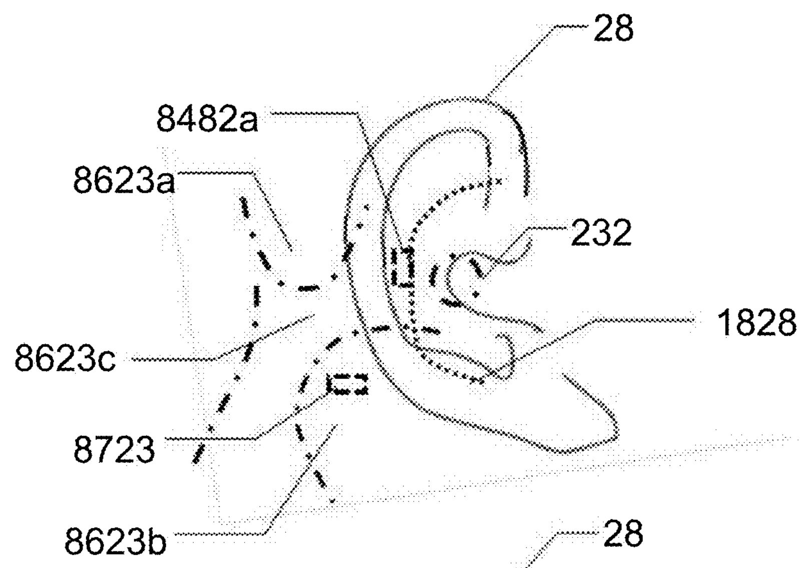
Figure 143C:
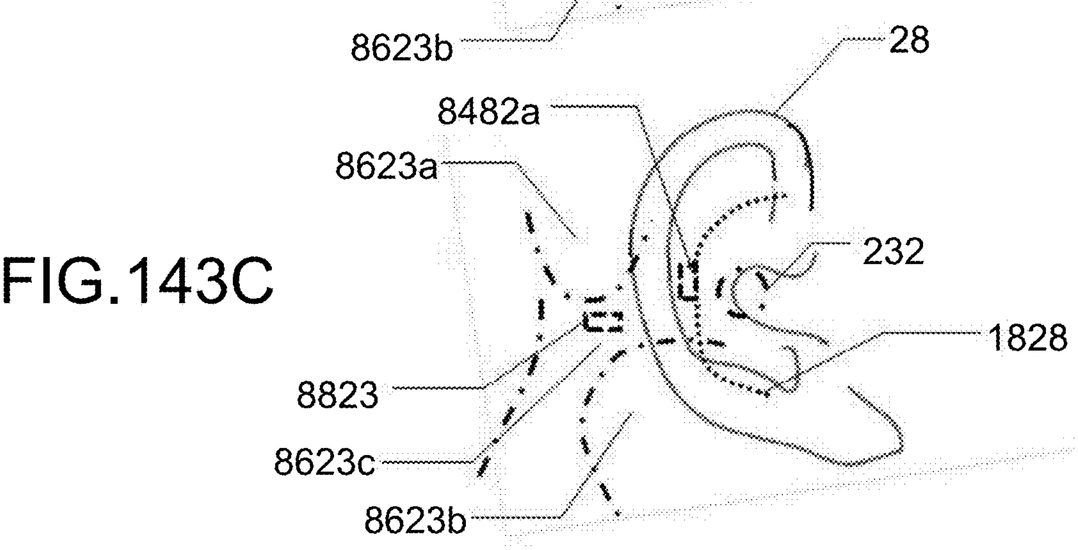
Figure 144A:
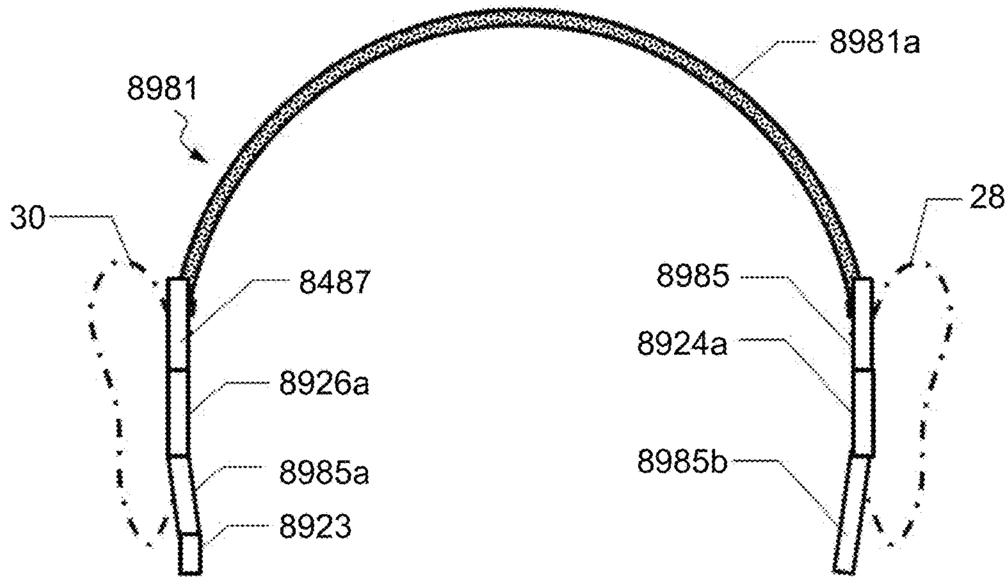
Figure 144B:
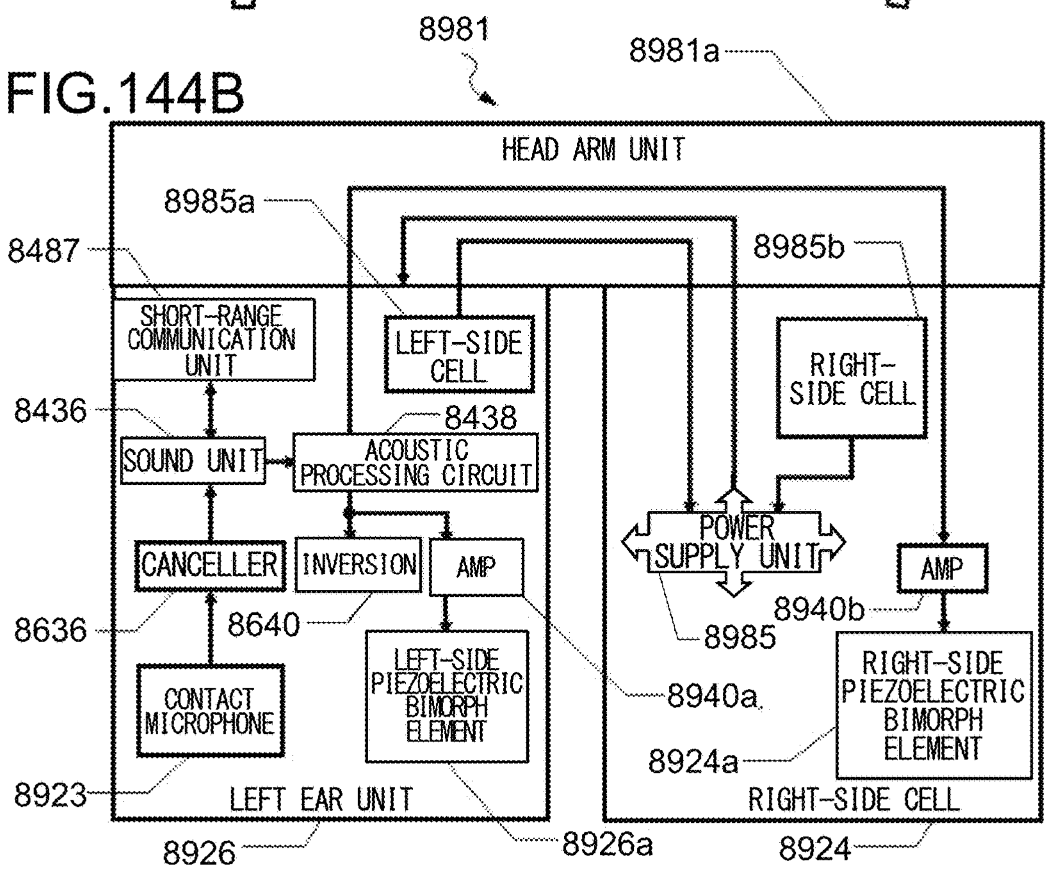
Figure 146:
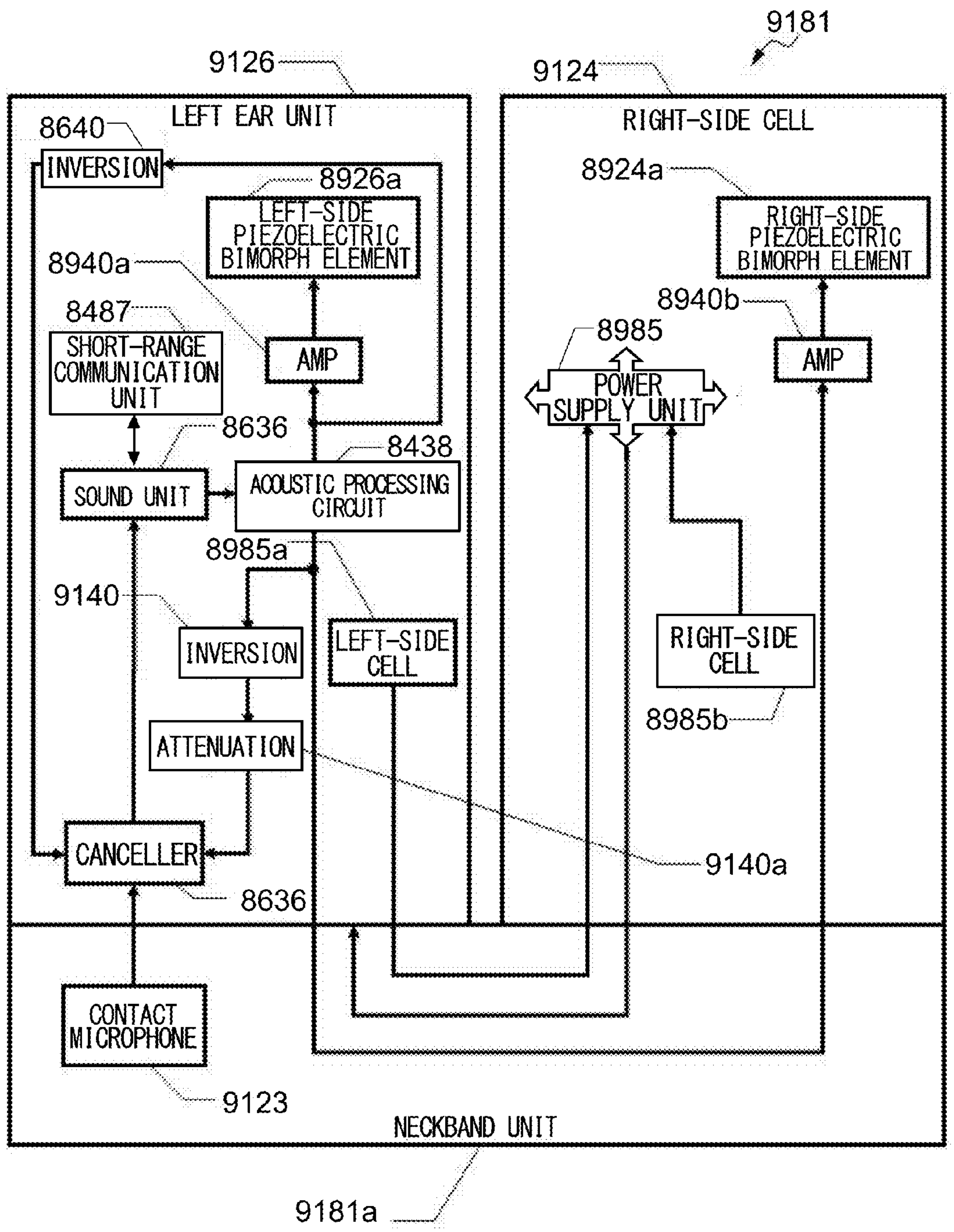
Figure 148:
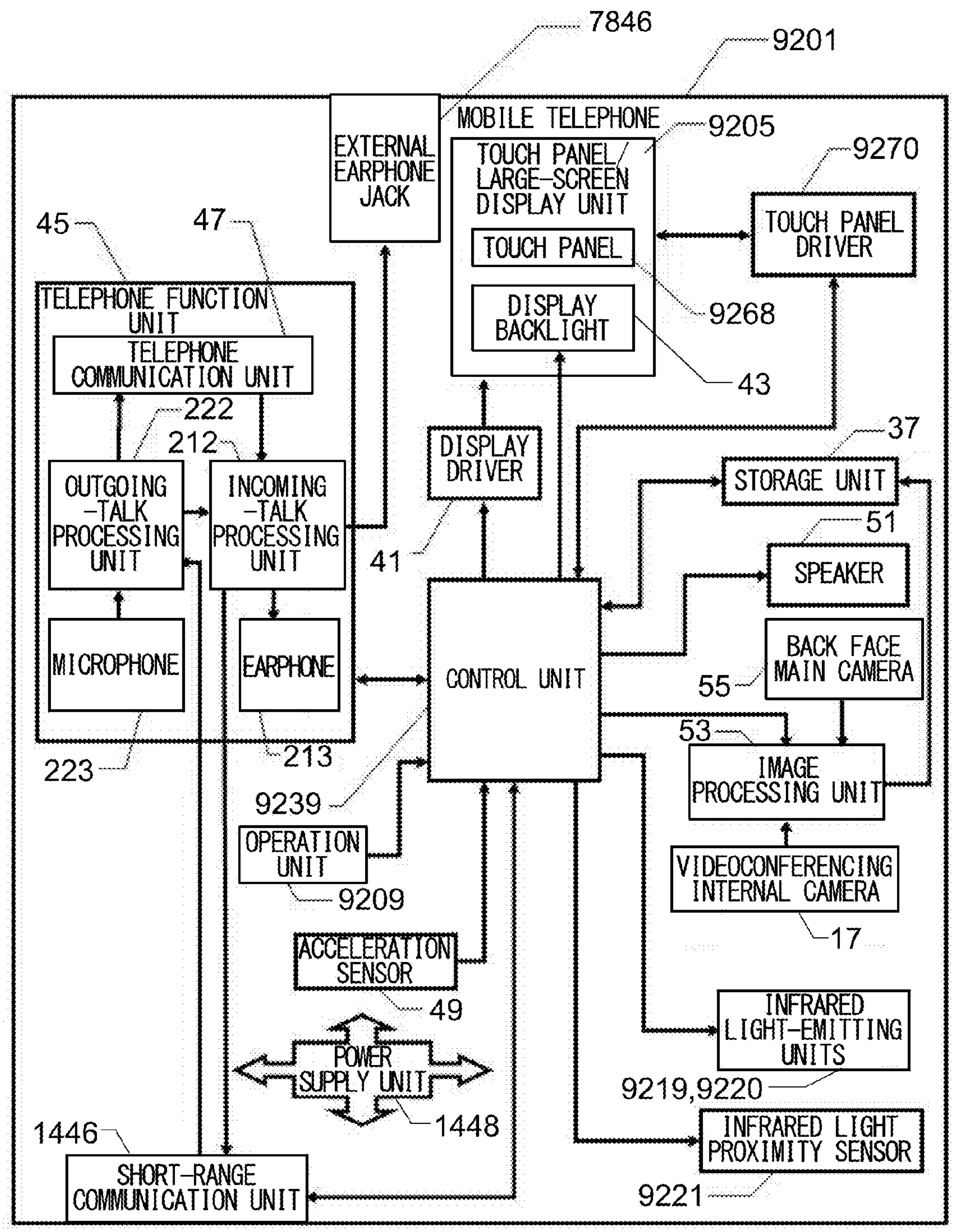
Figure 149:
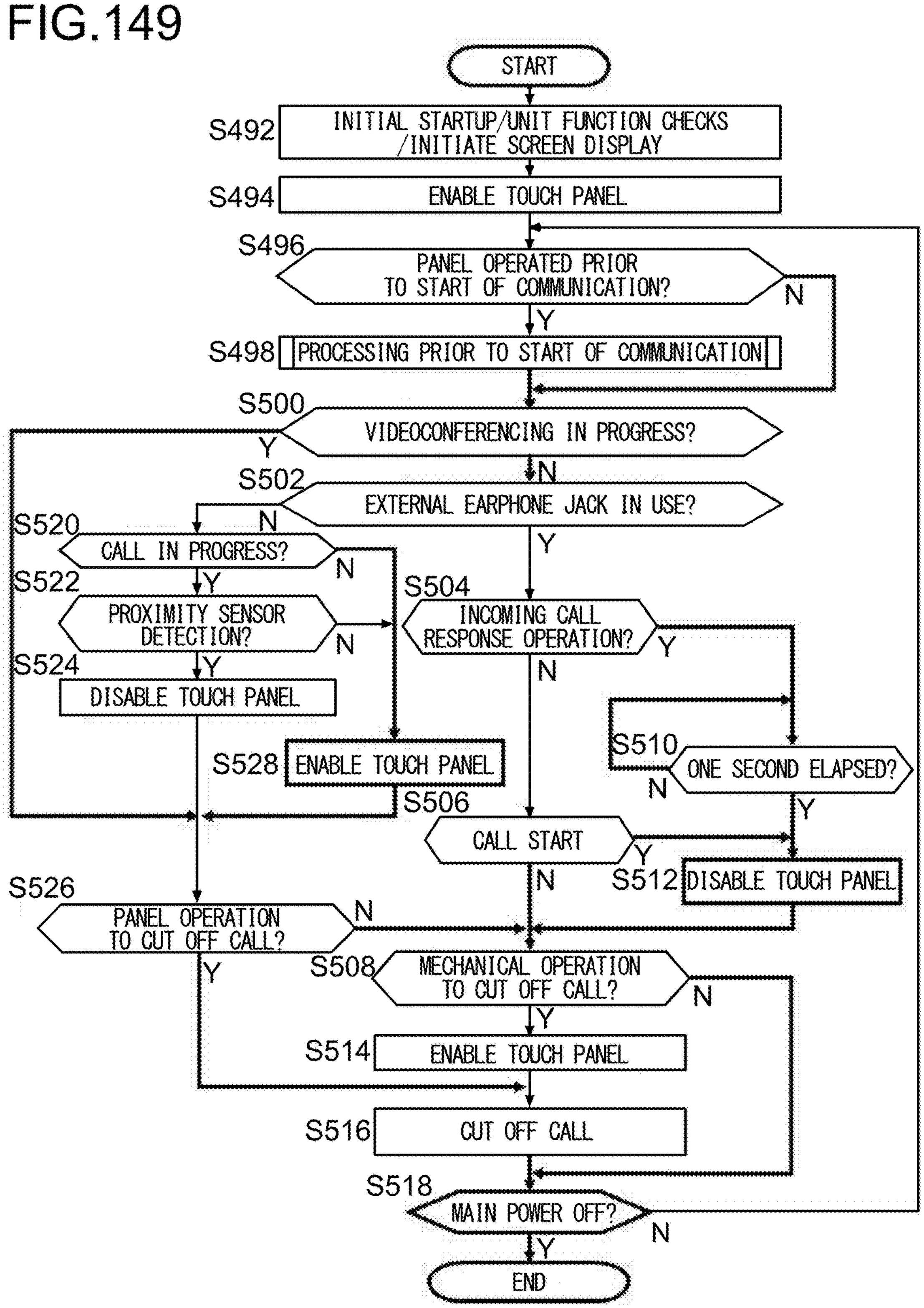
Figure 151:
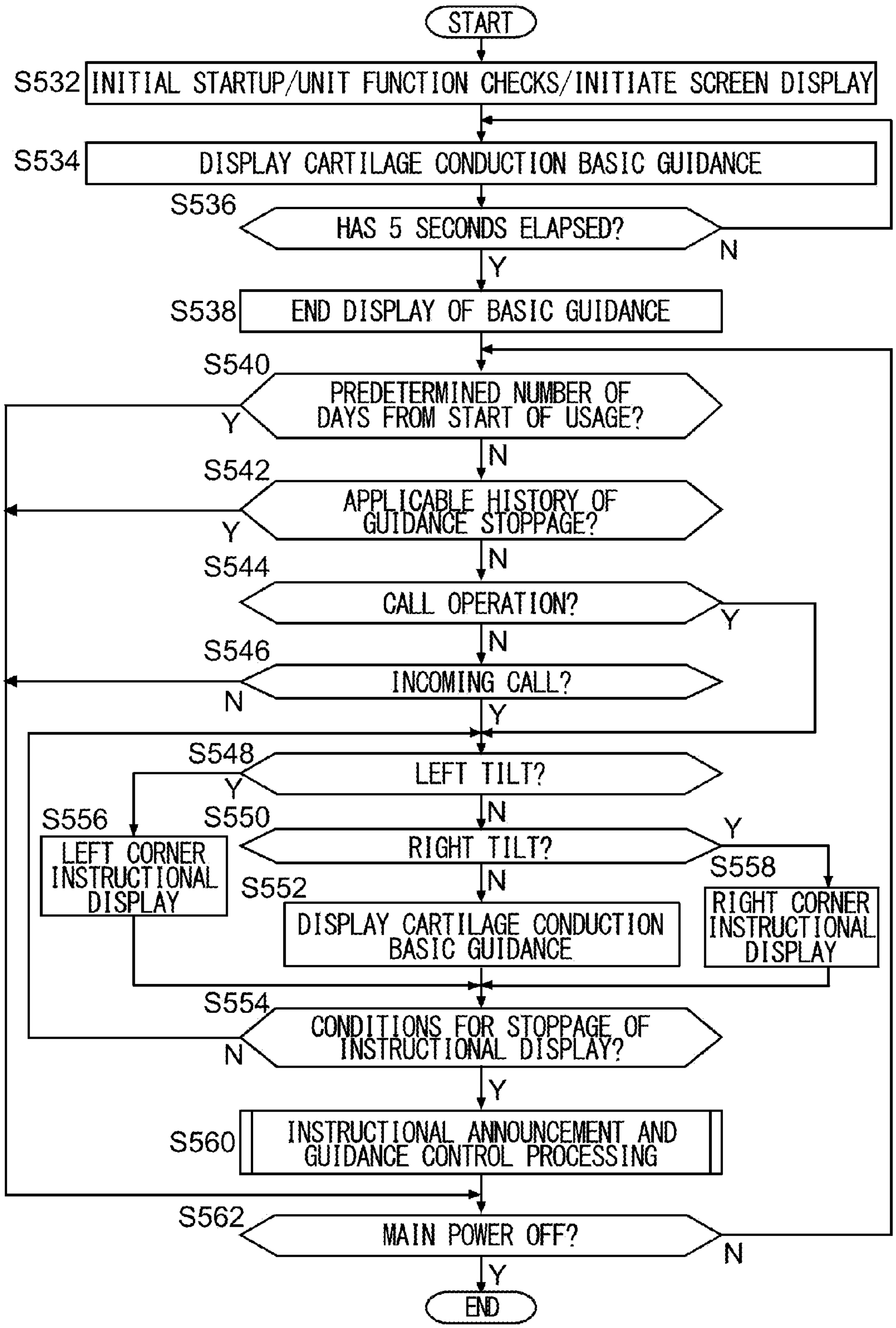
Figure 152:
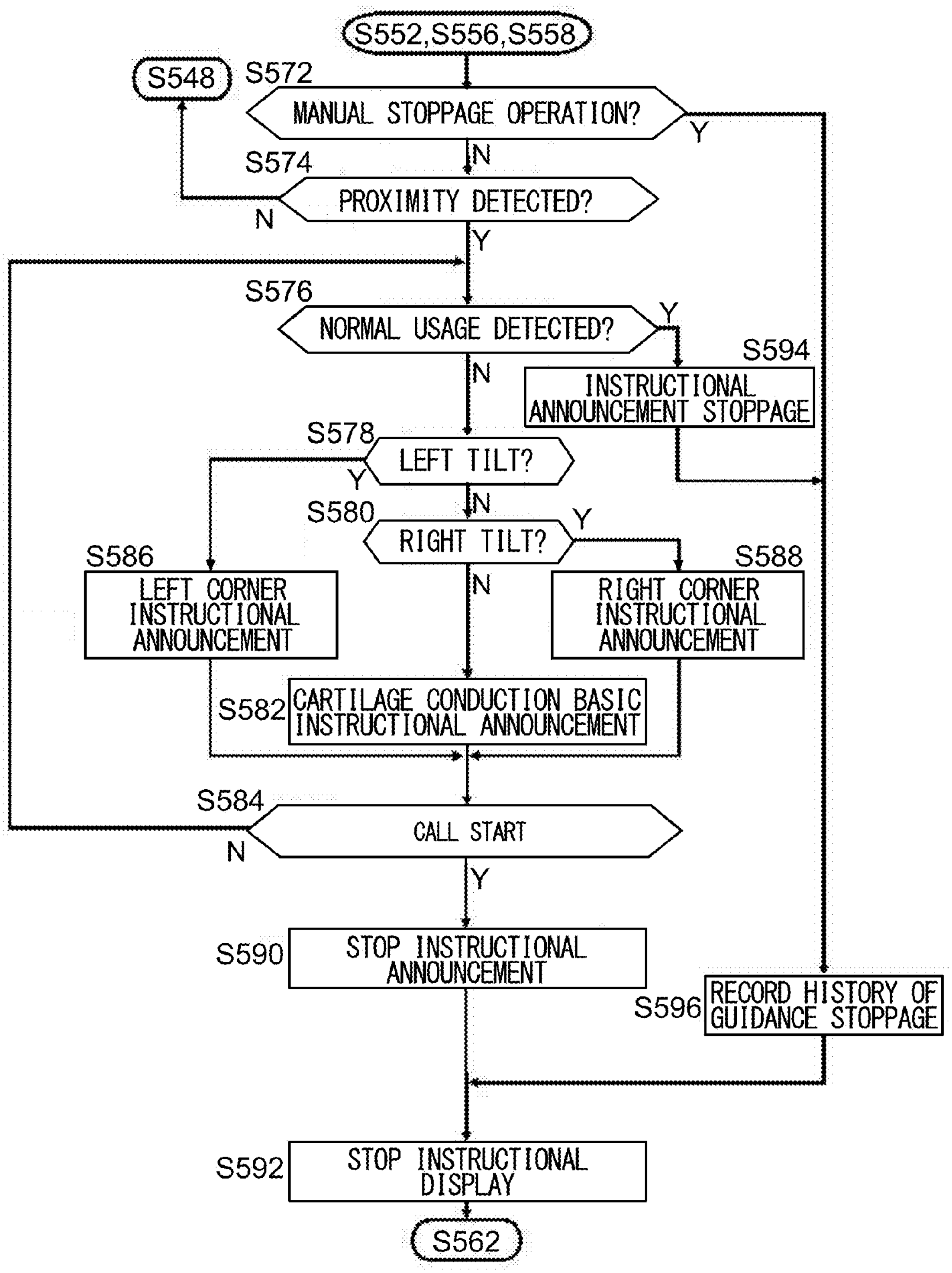
Figure 153A:
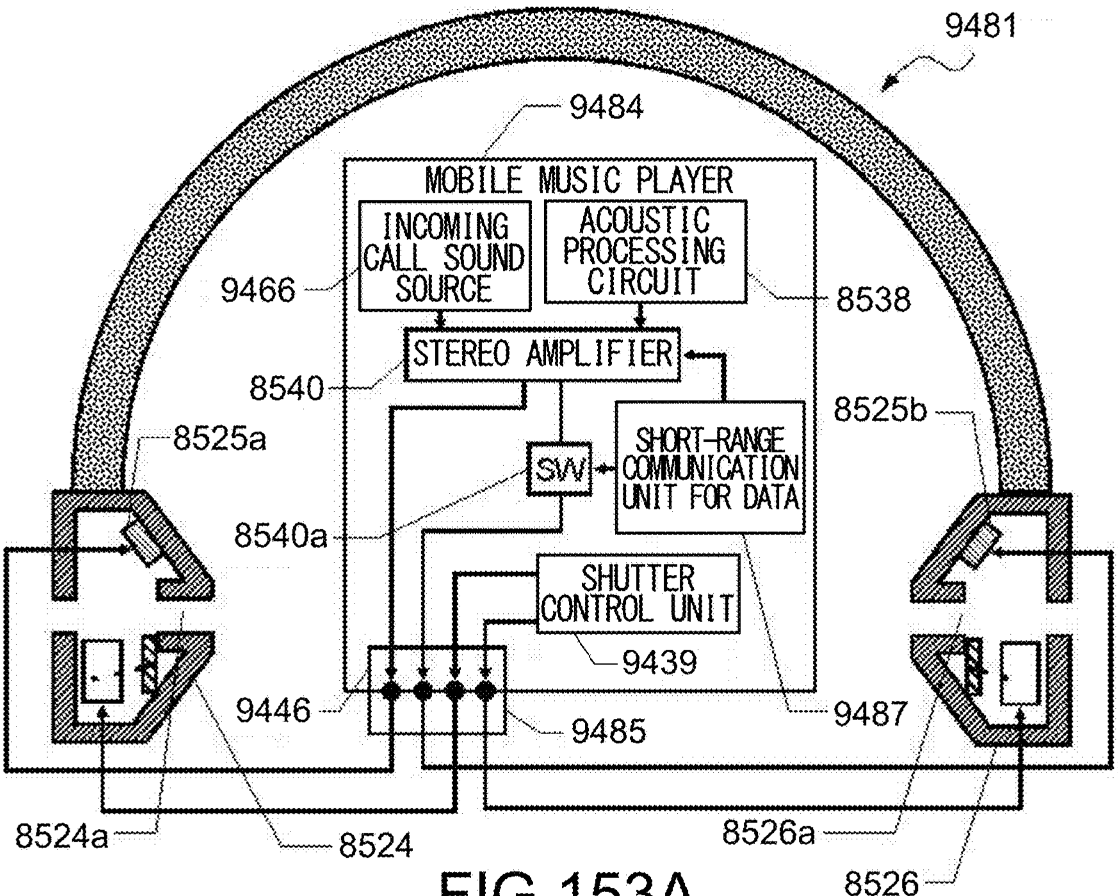
Figure 153B:
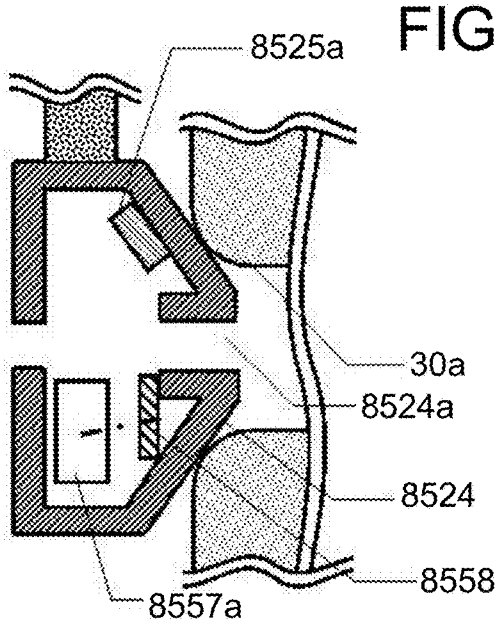
Figure 153C:
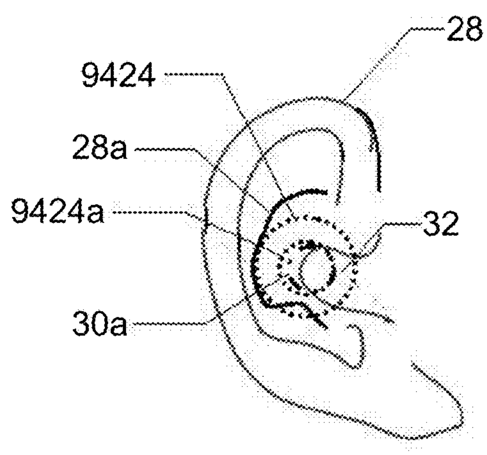
Figure 155:
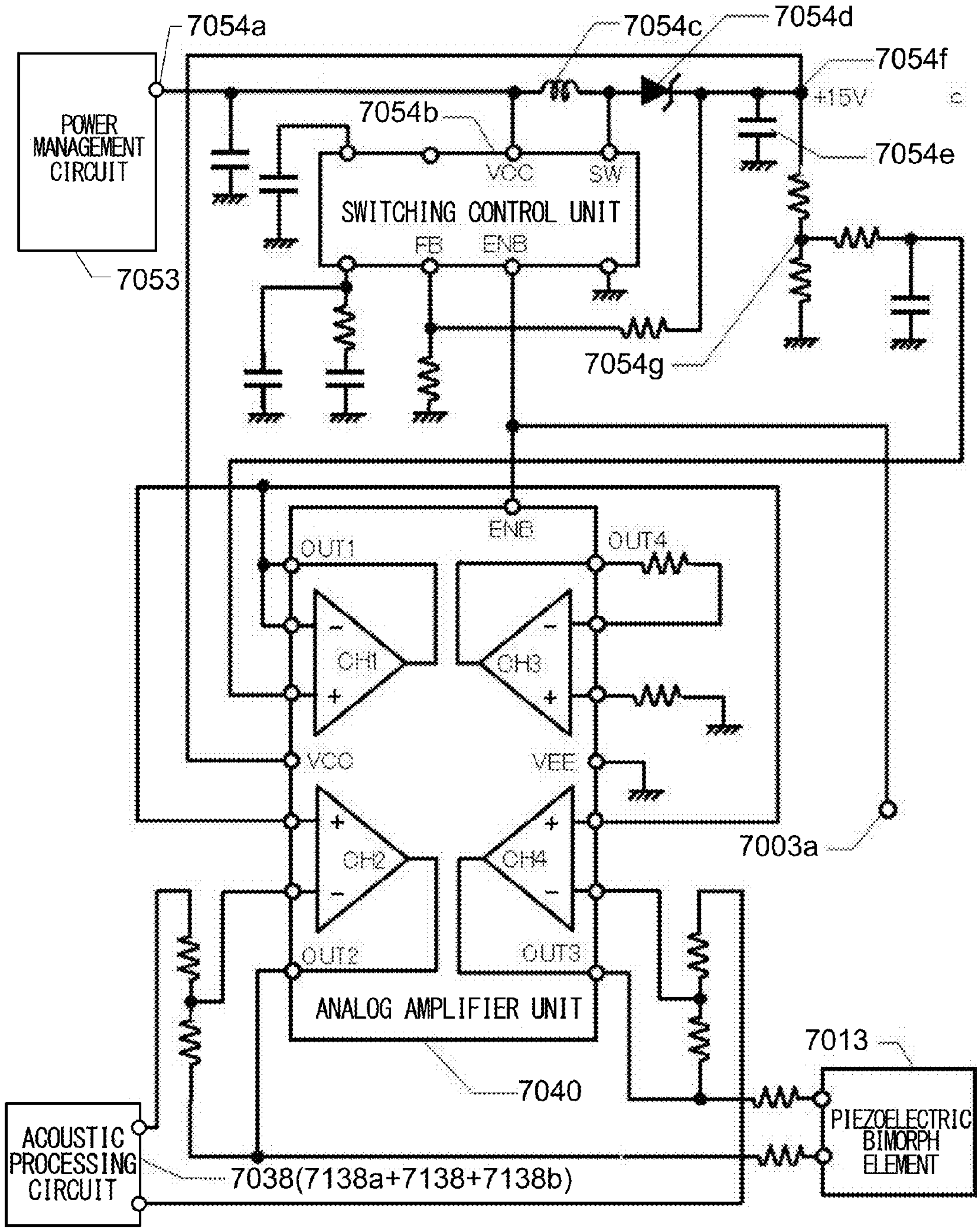
Figure 159A:
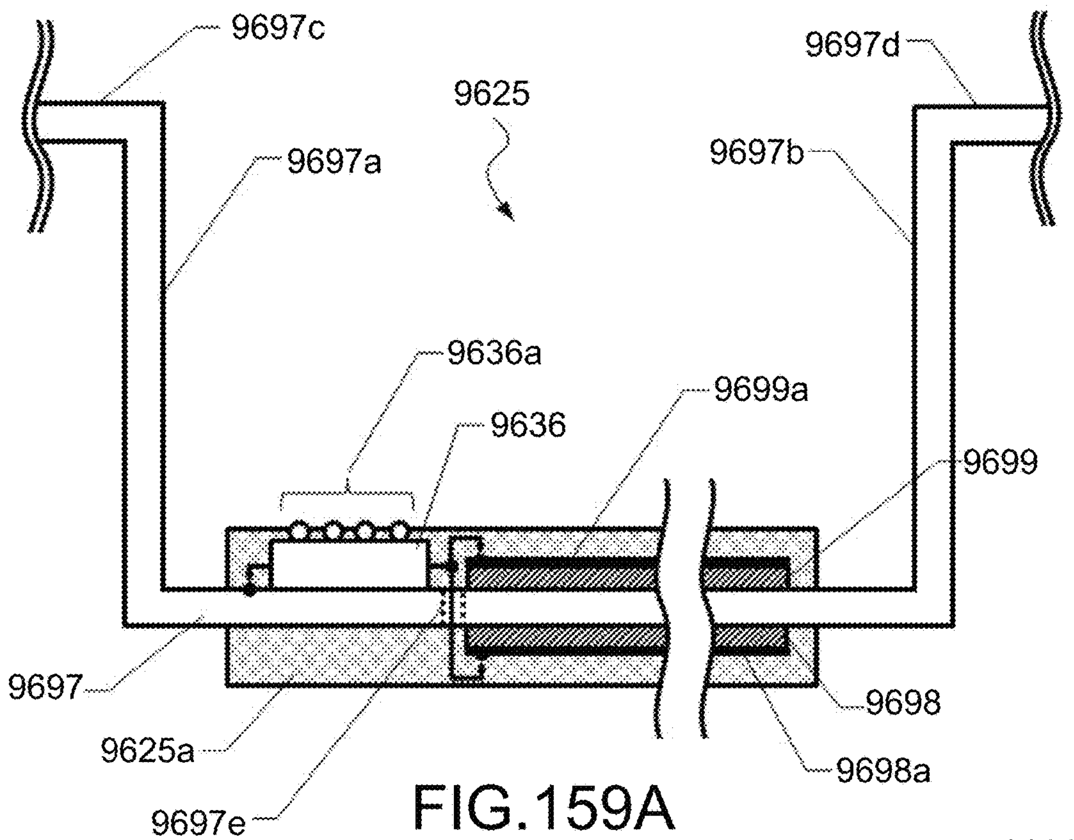
Figure 159B:
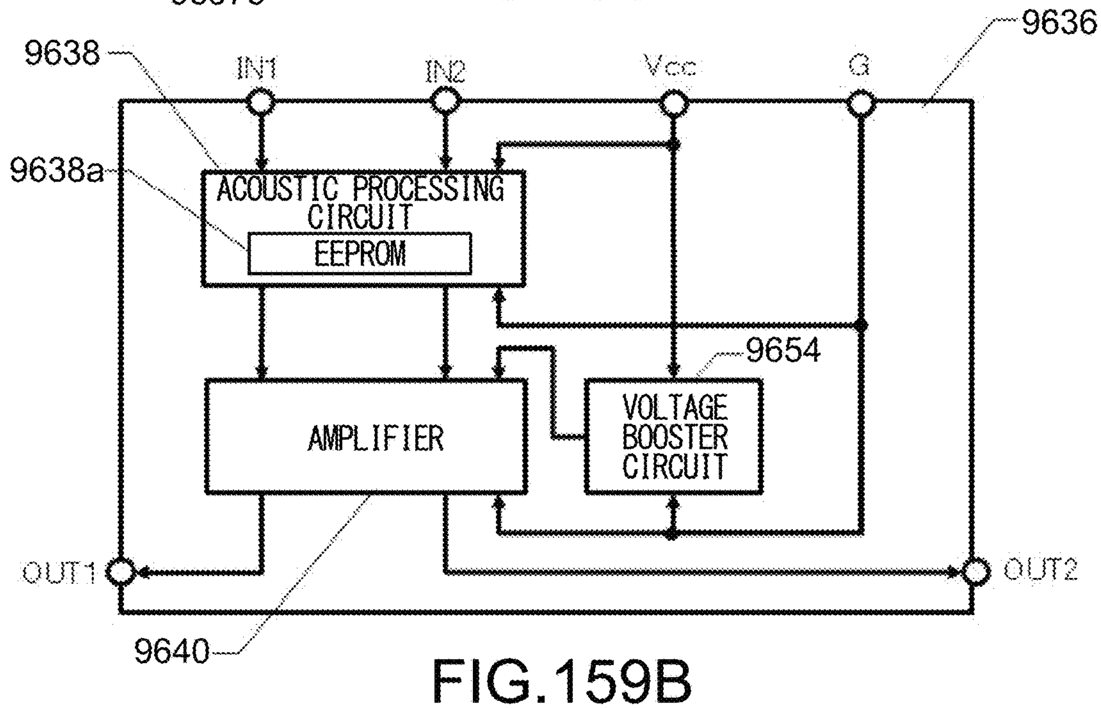
Figure 161:
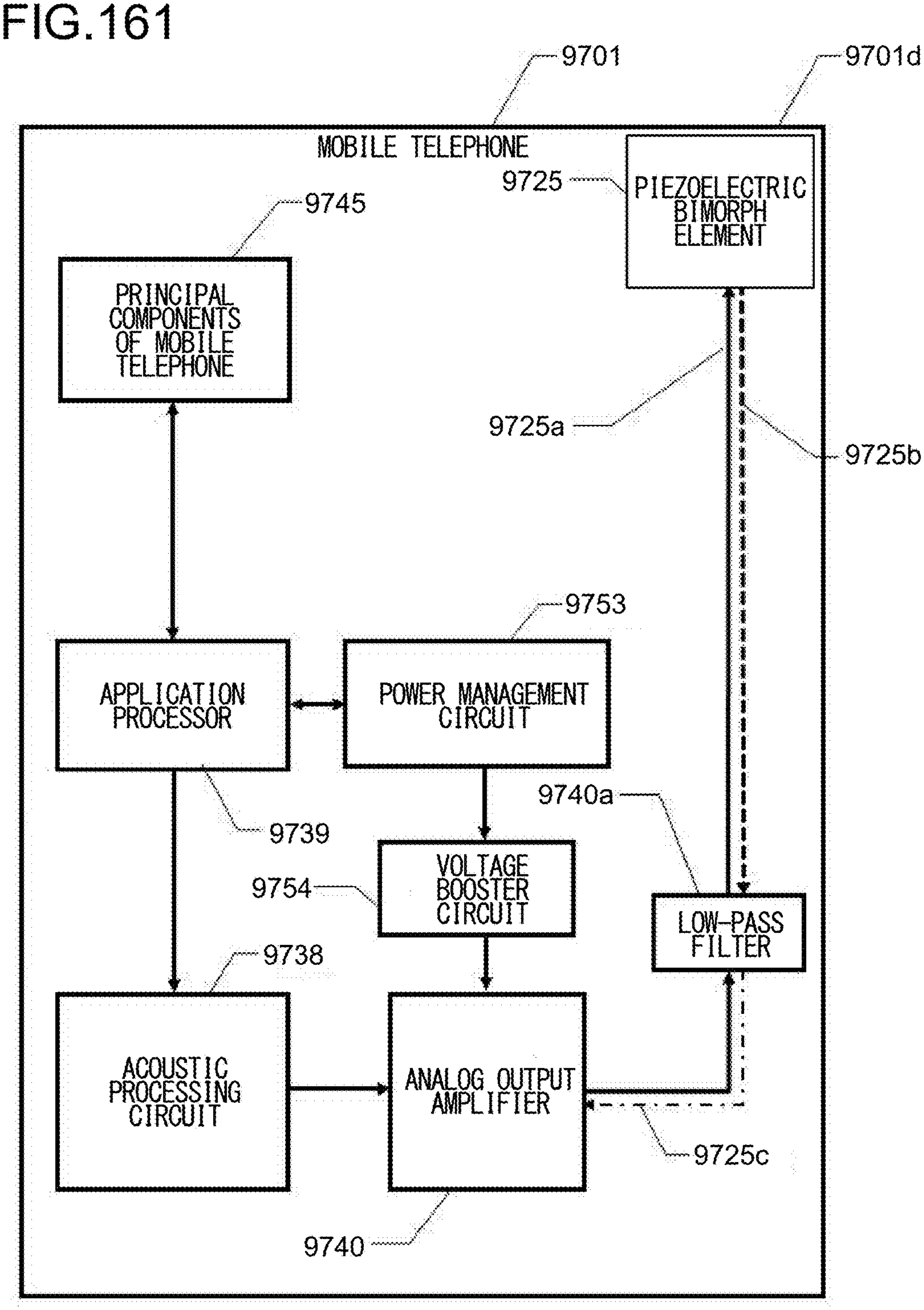
Figure 162:
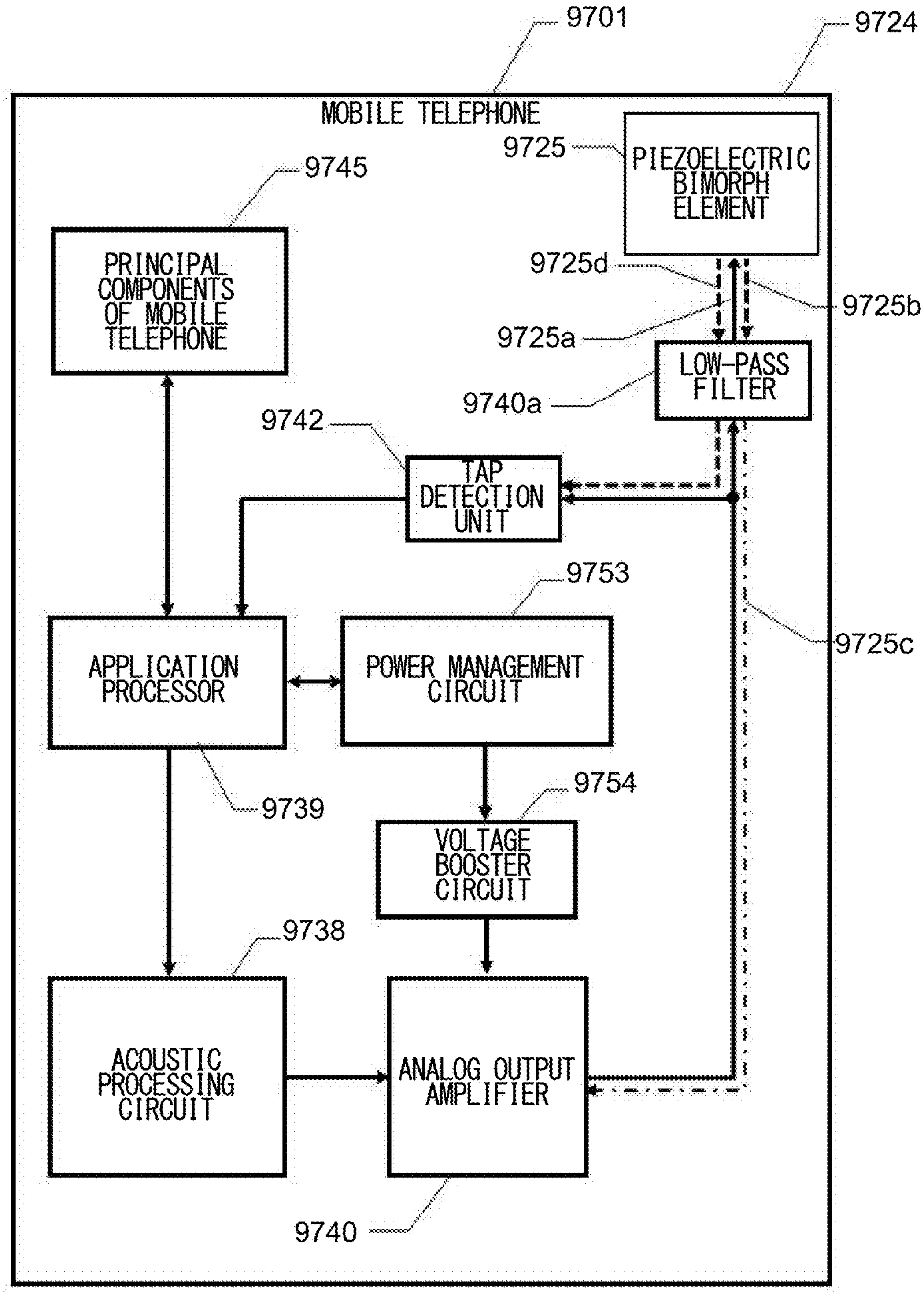
Figure 163:
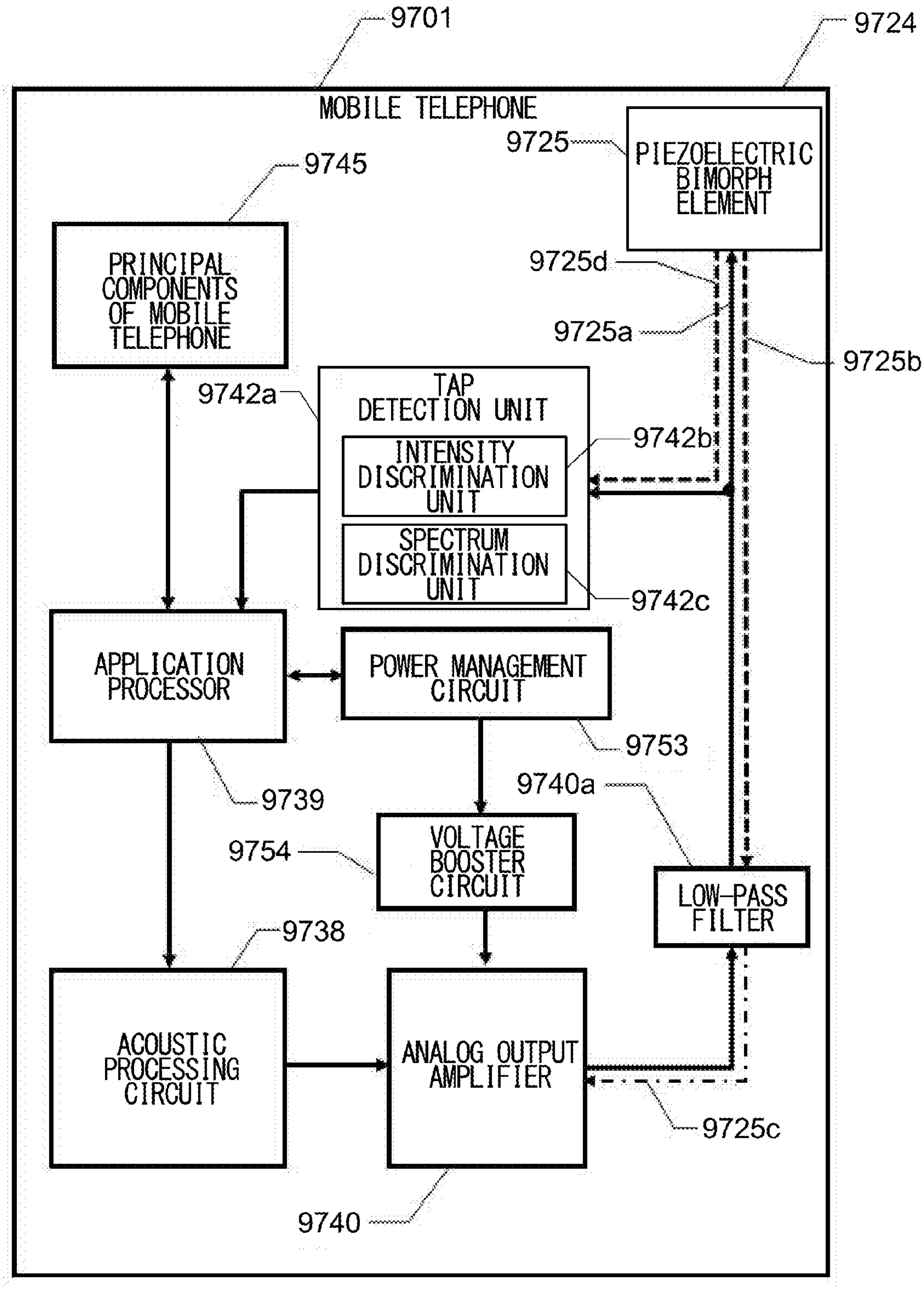
Figure 164A:
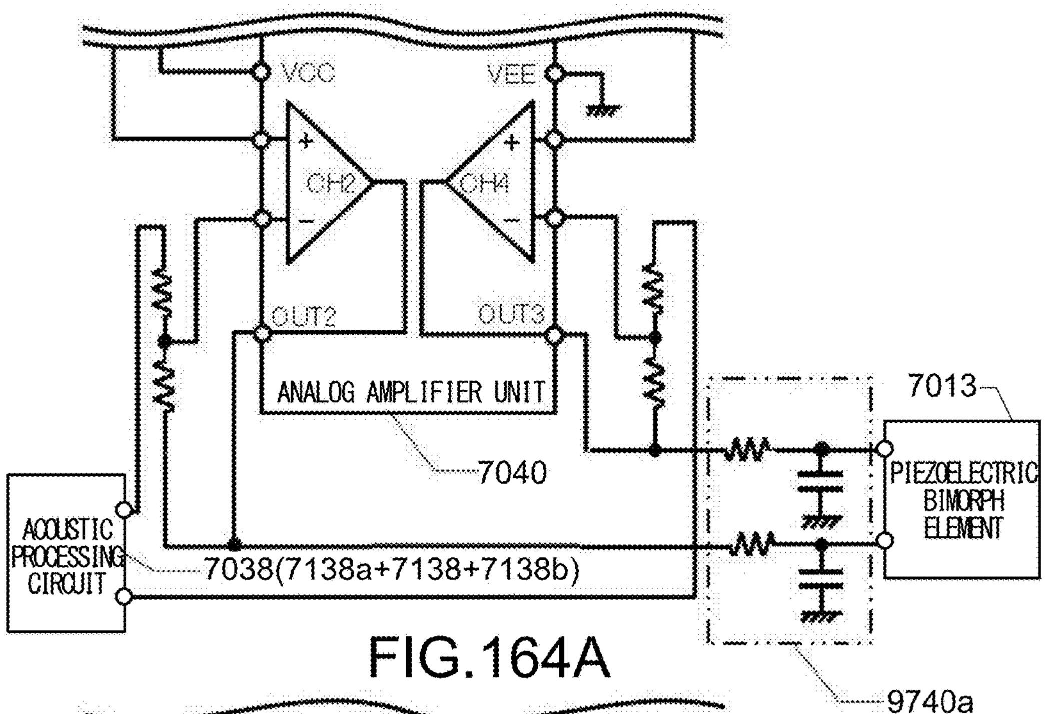
Figure 164B:
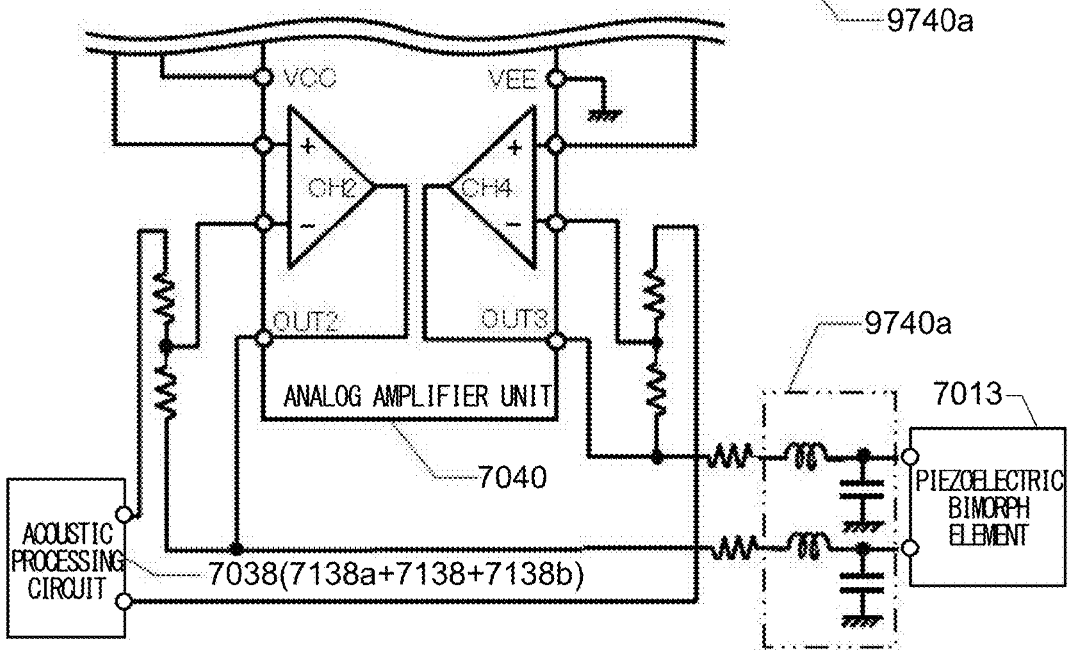
Figure 165:
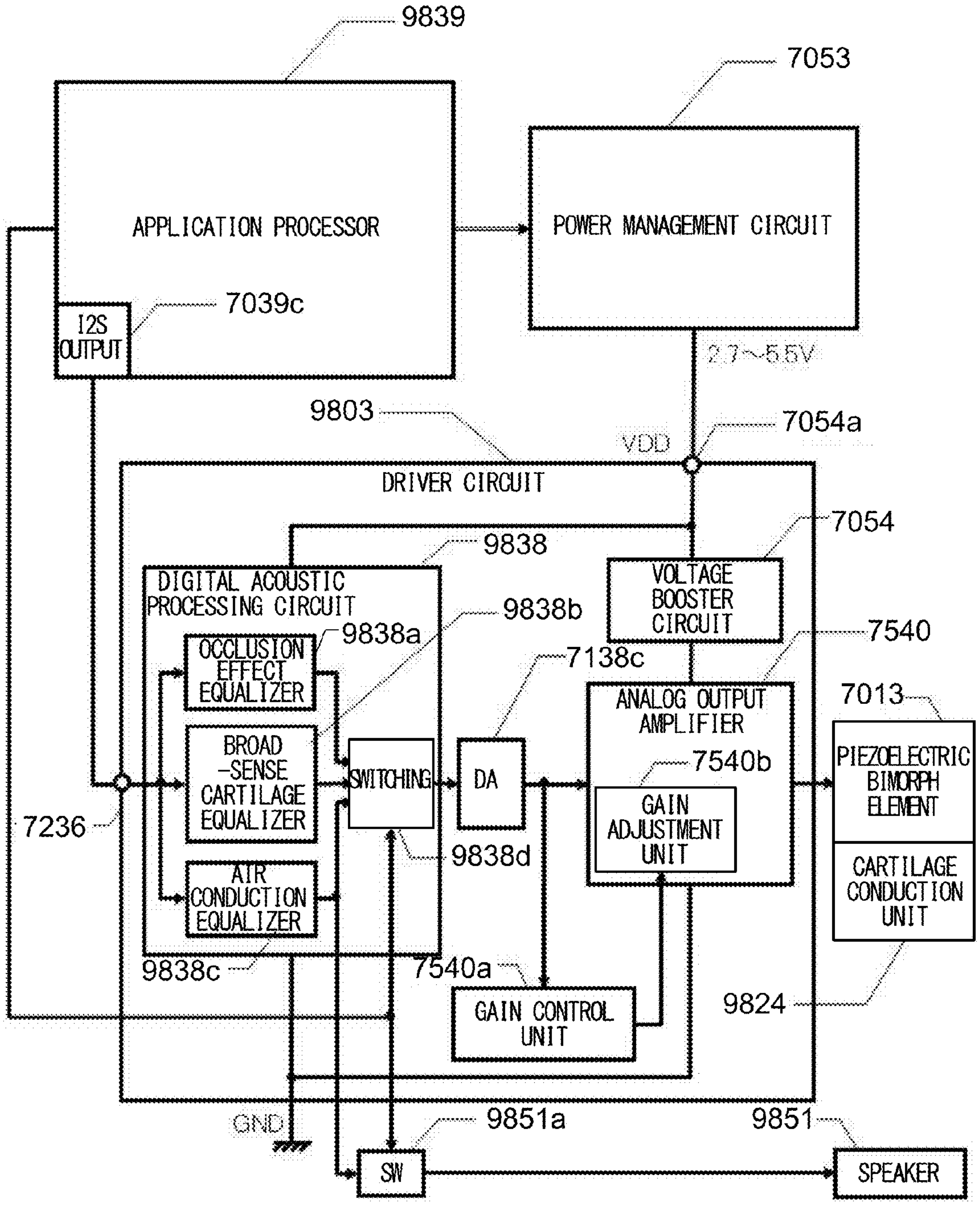
Figure 166:
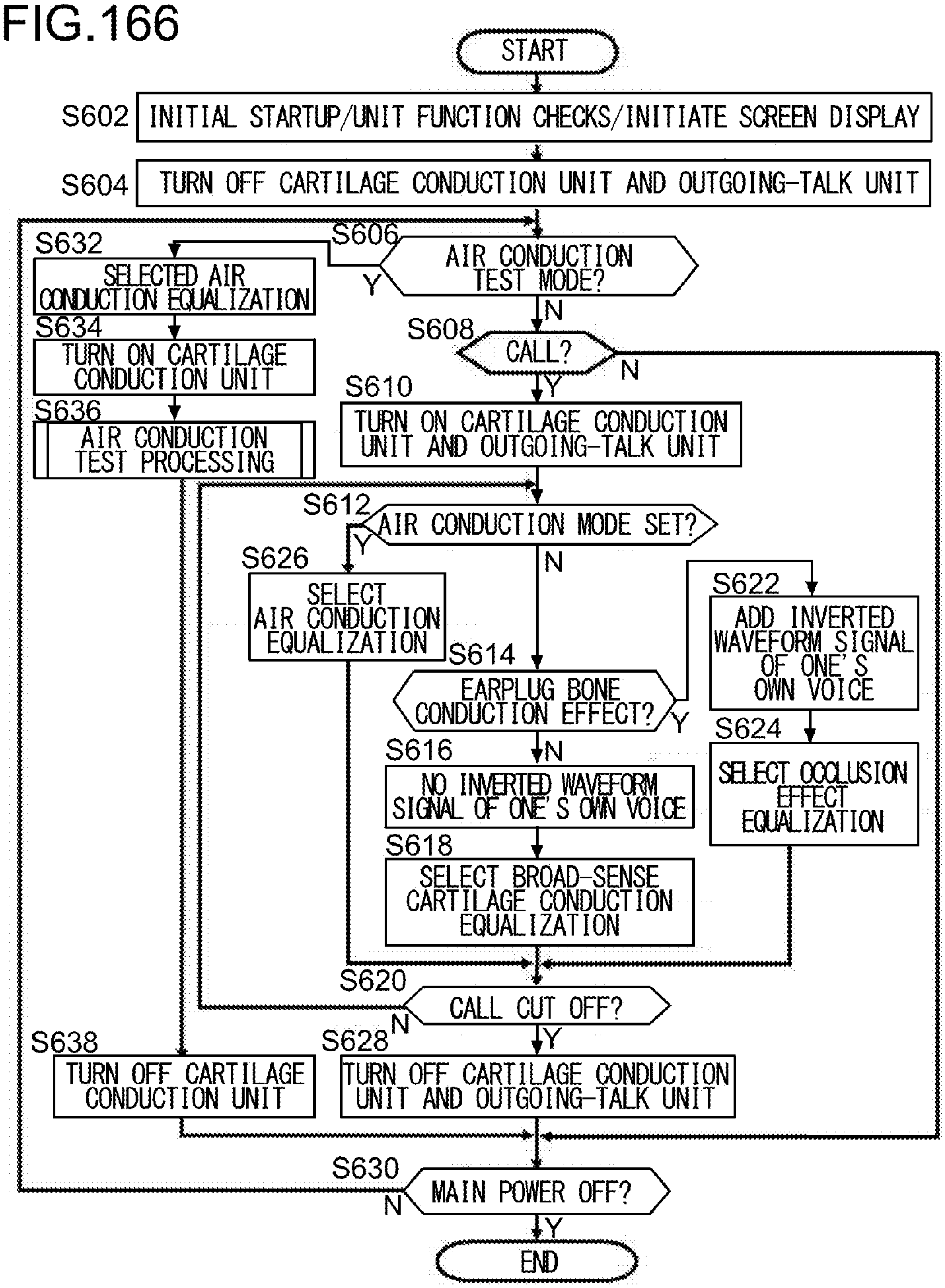
Figure 169:
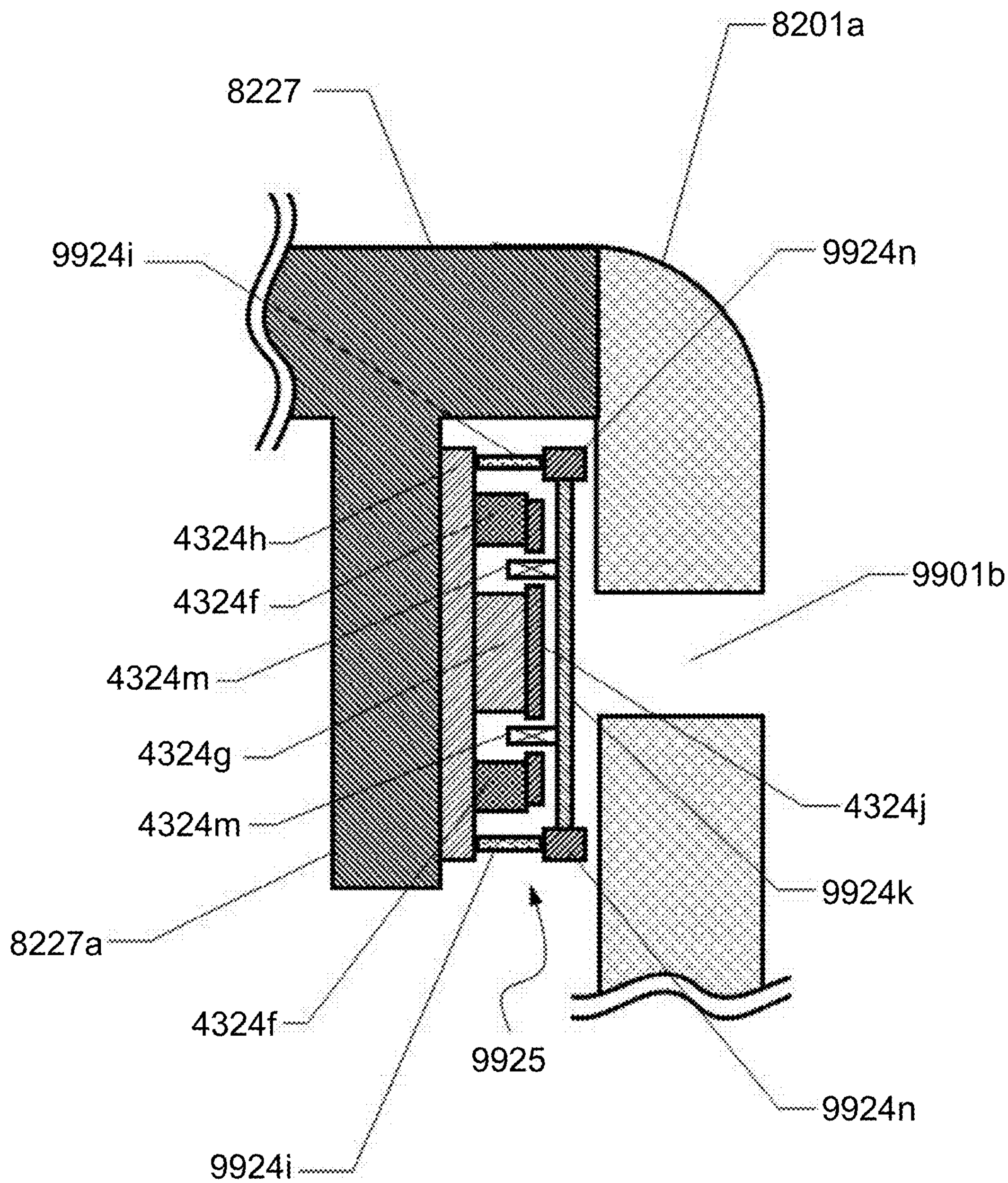
Figure 171:
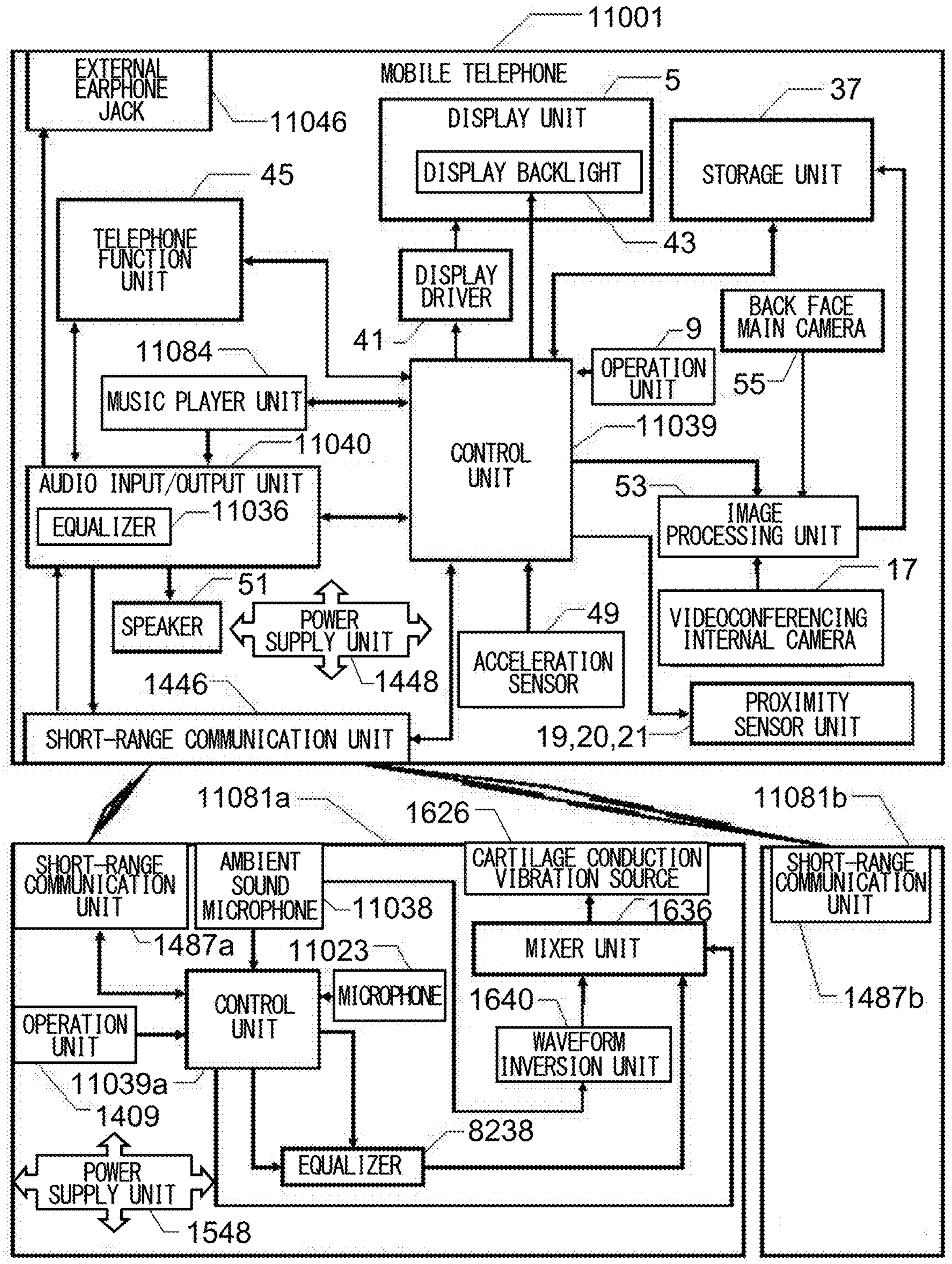
Figure 172:
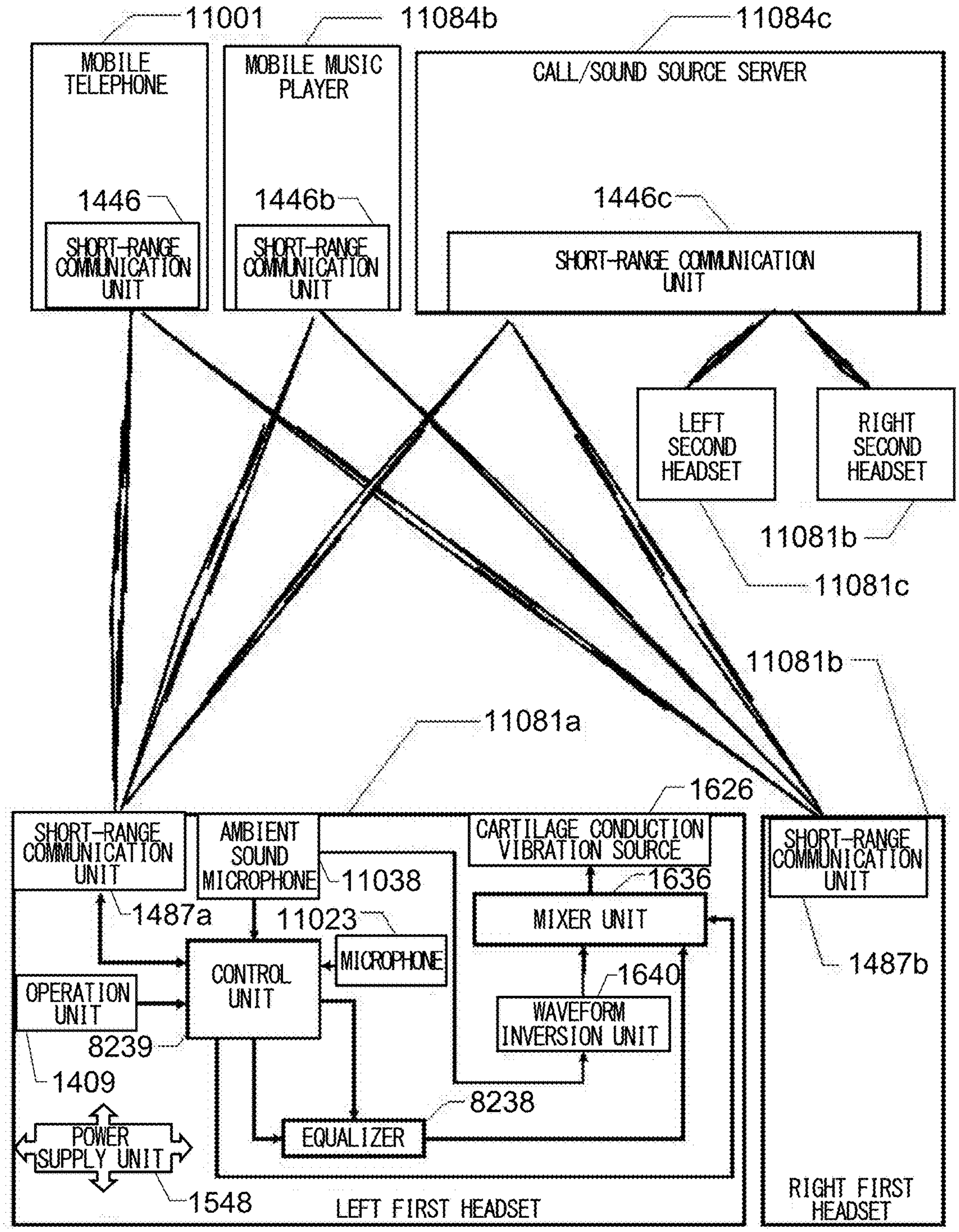
Figure 173:
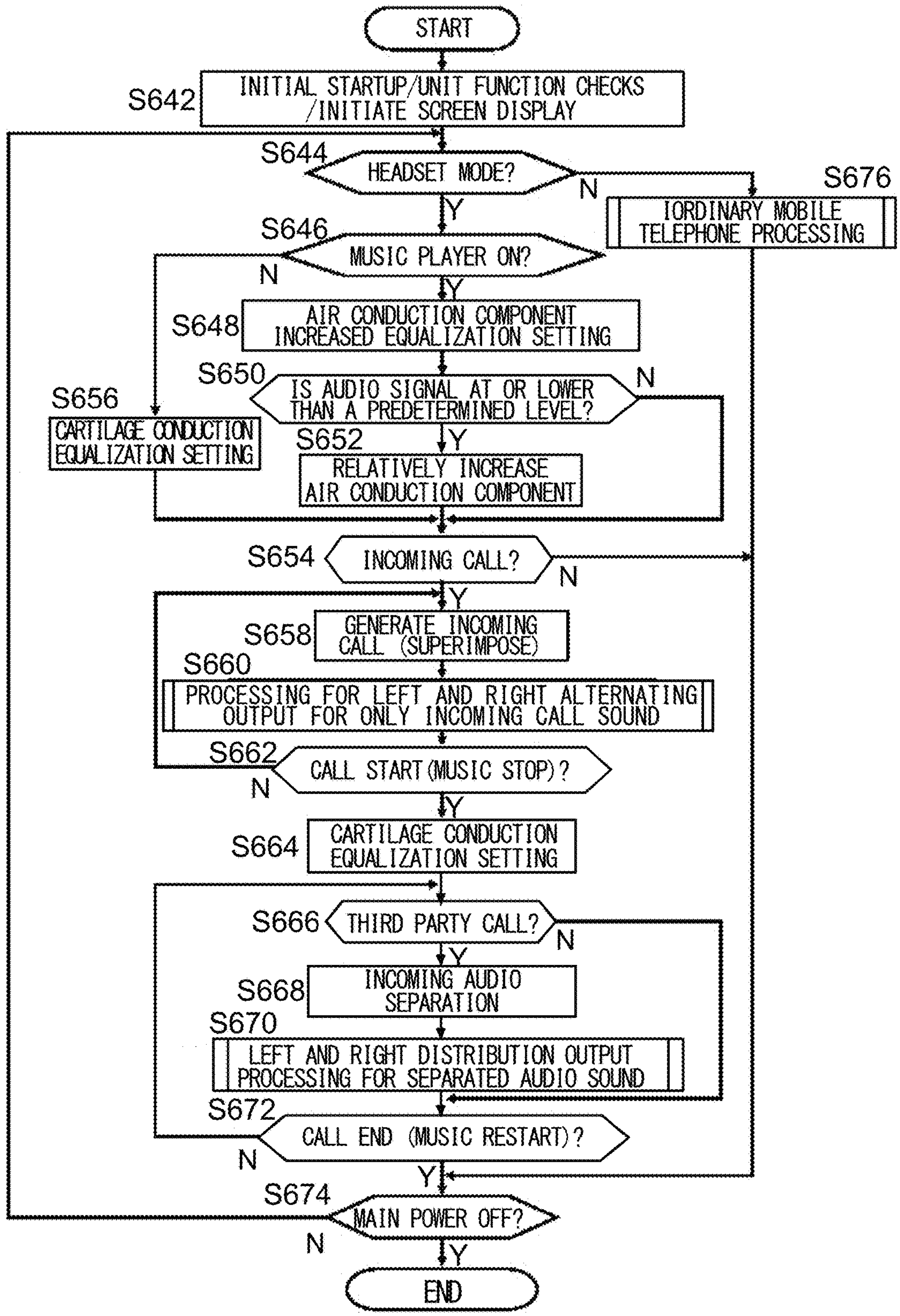
Figure 174:
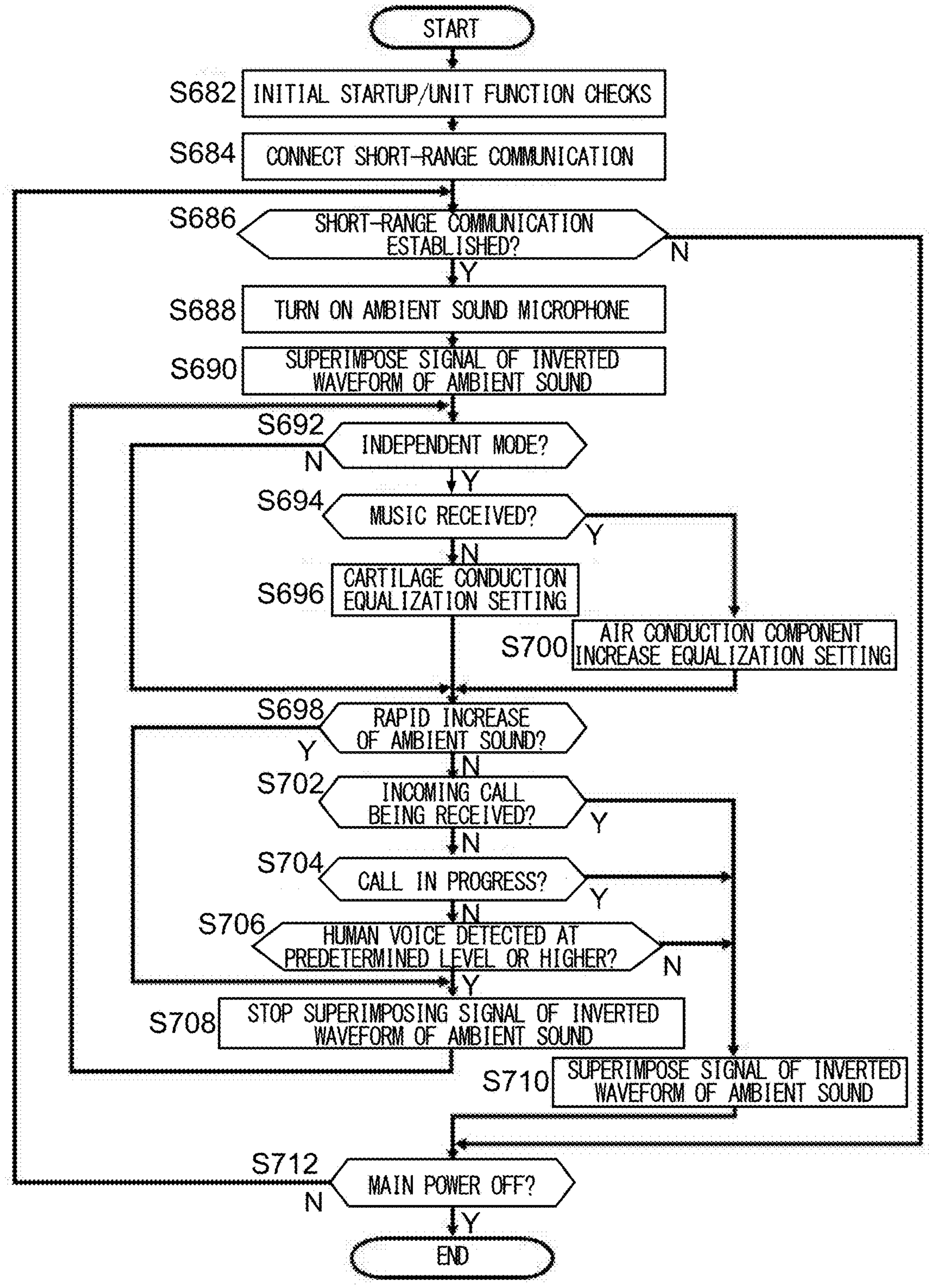
Figure 175:
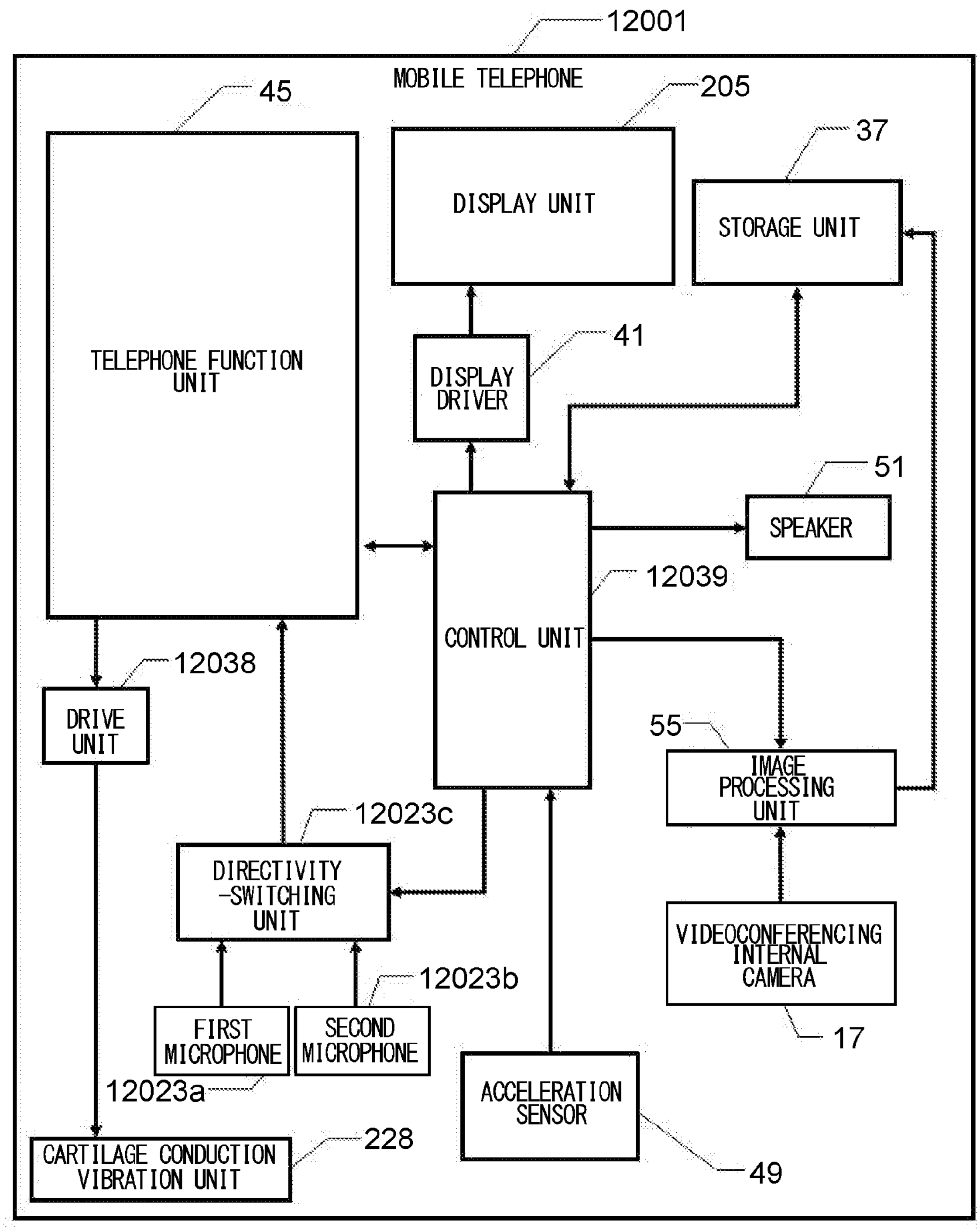
Figure 177:
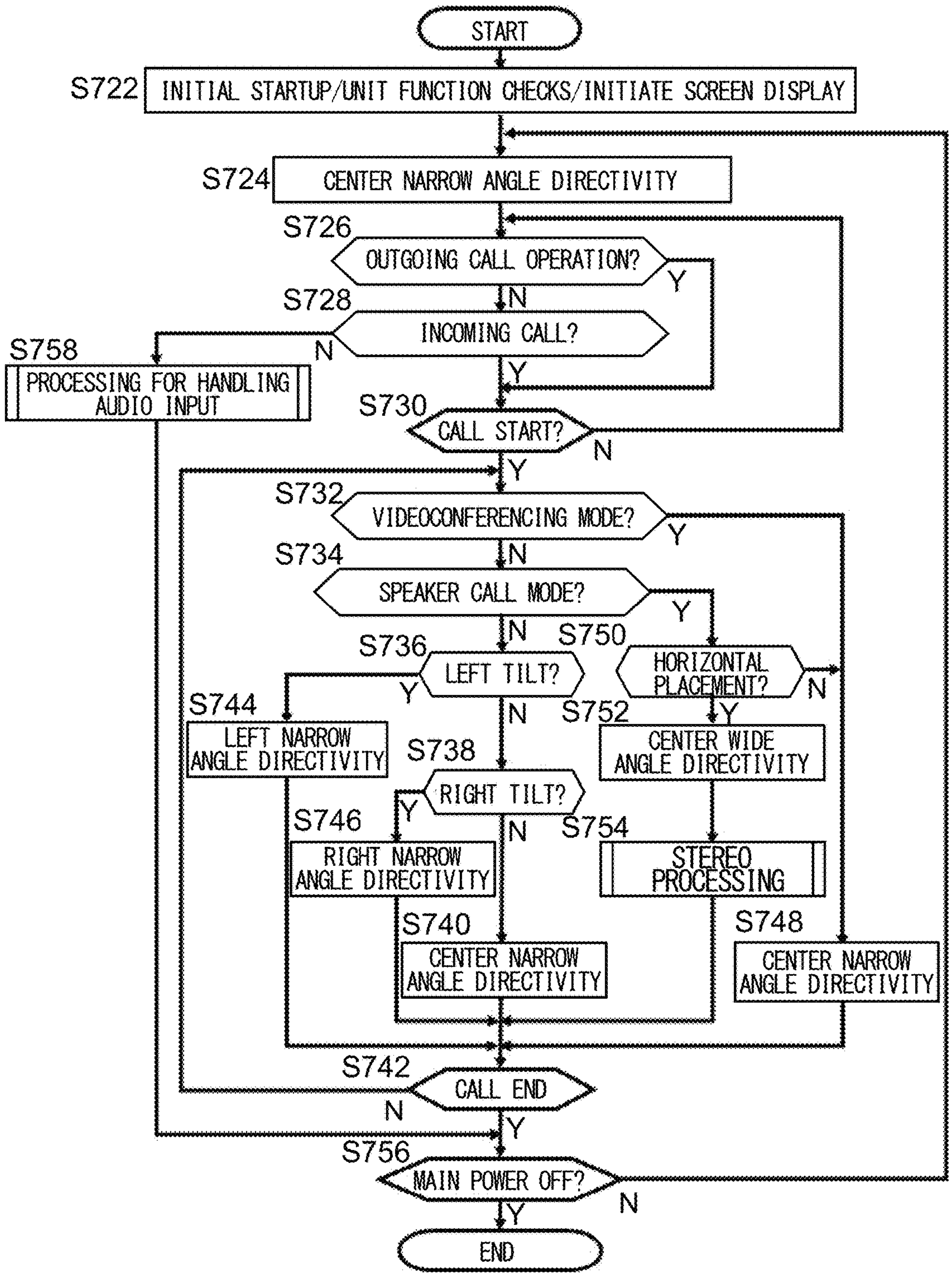
Figure 179:
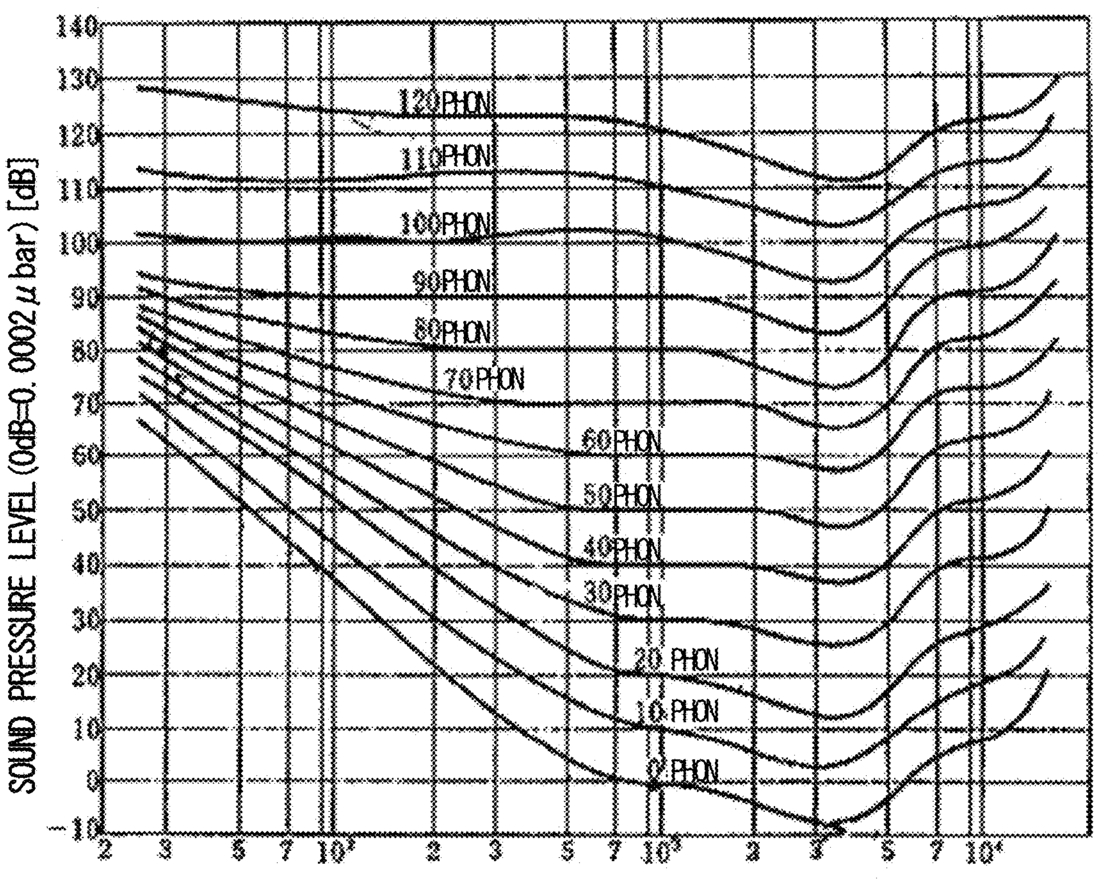
Figure 180:
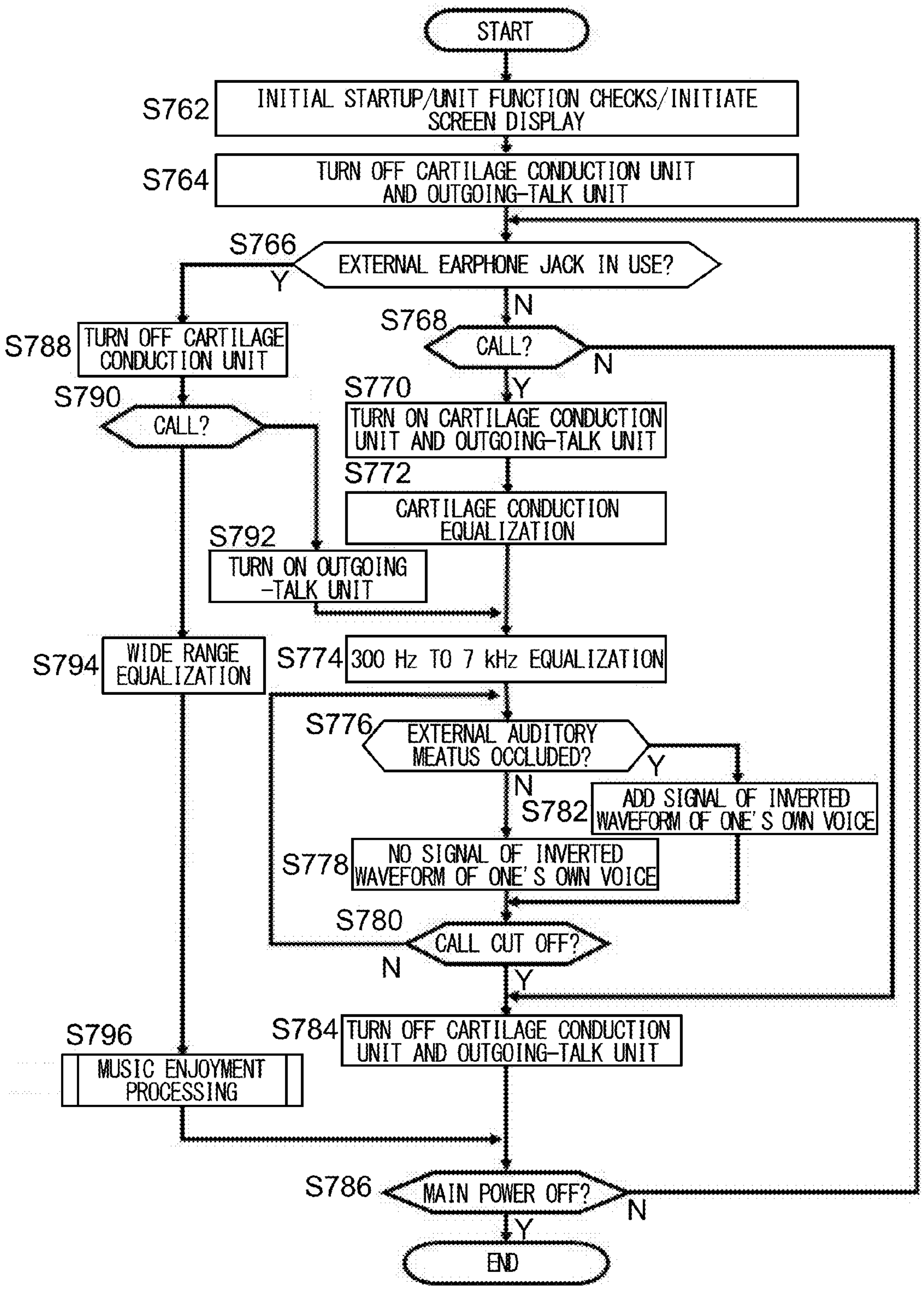
Figure 191A:
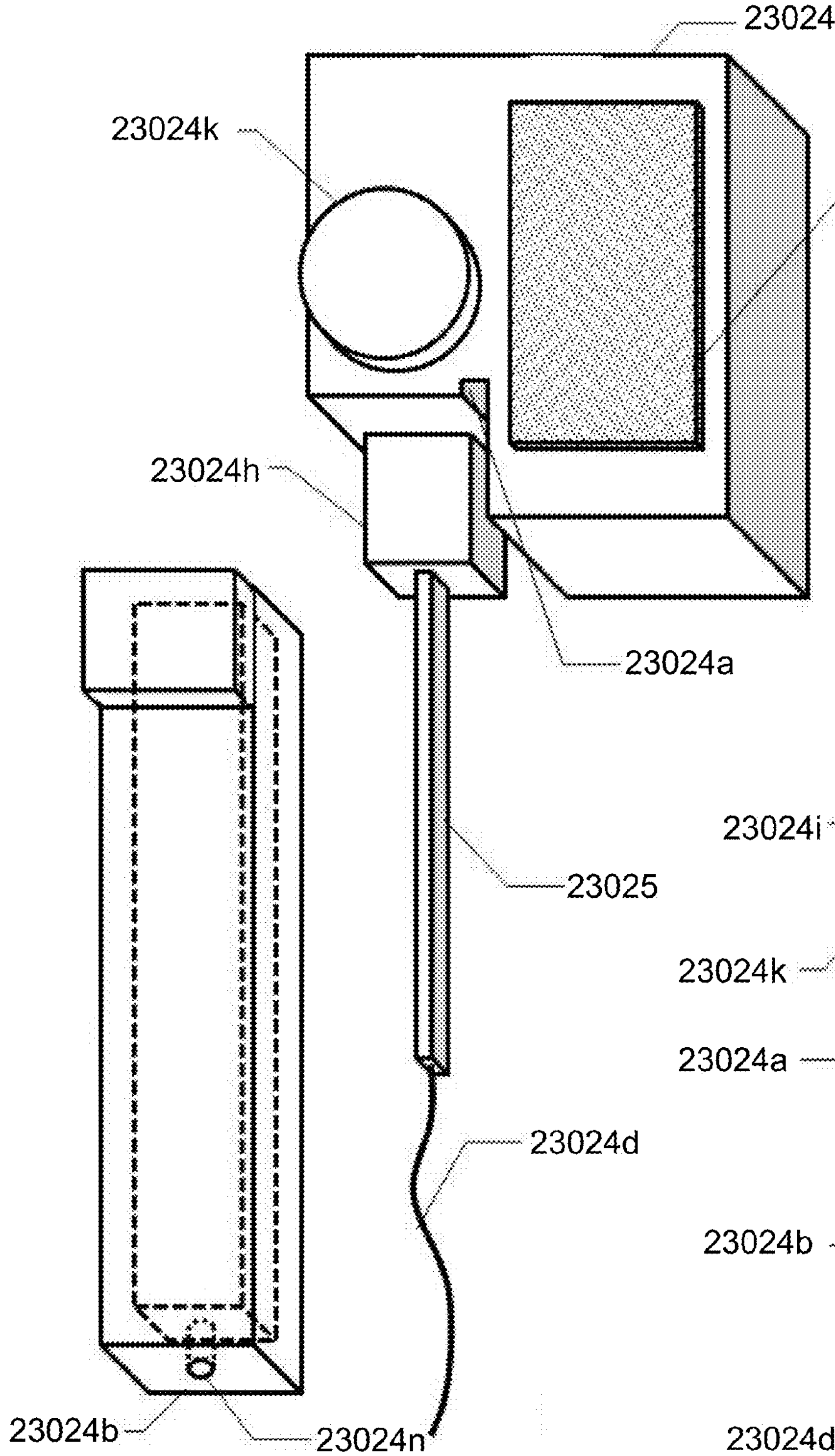
Figure 191B:
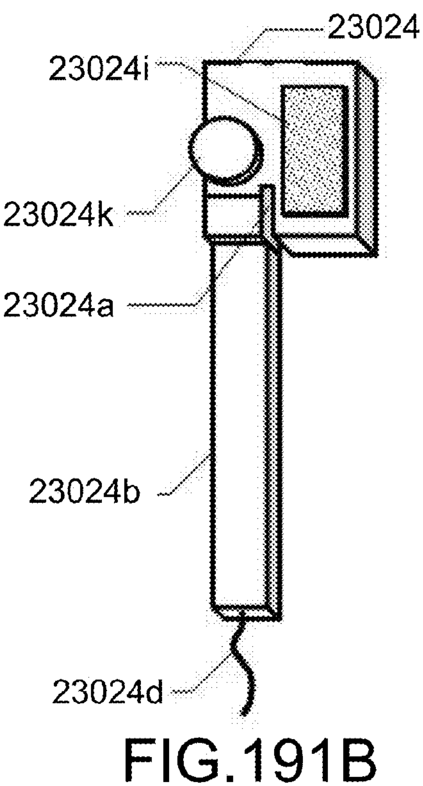
Figure 193A:
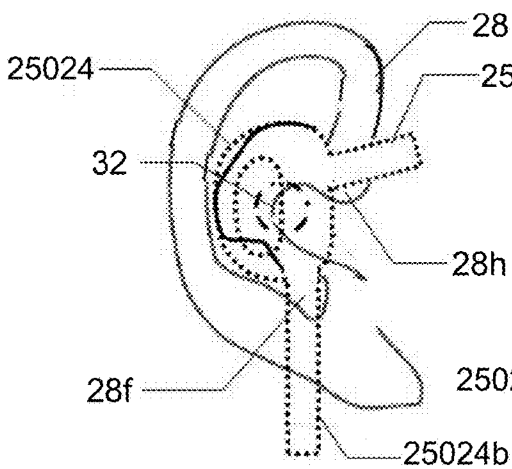
Figure 193B:
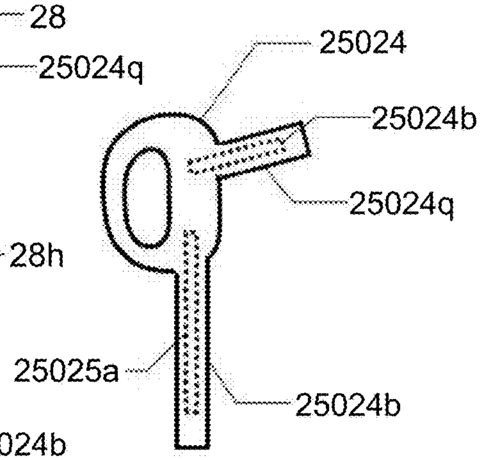
Figure 193C:
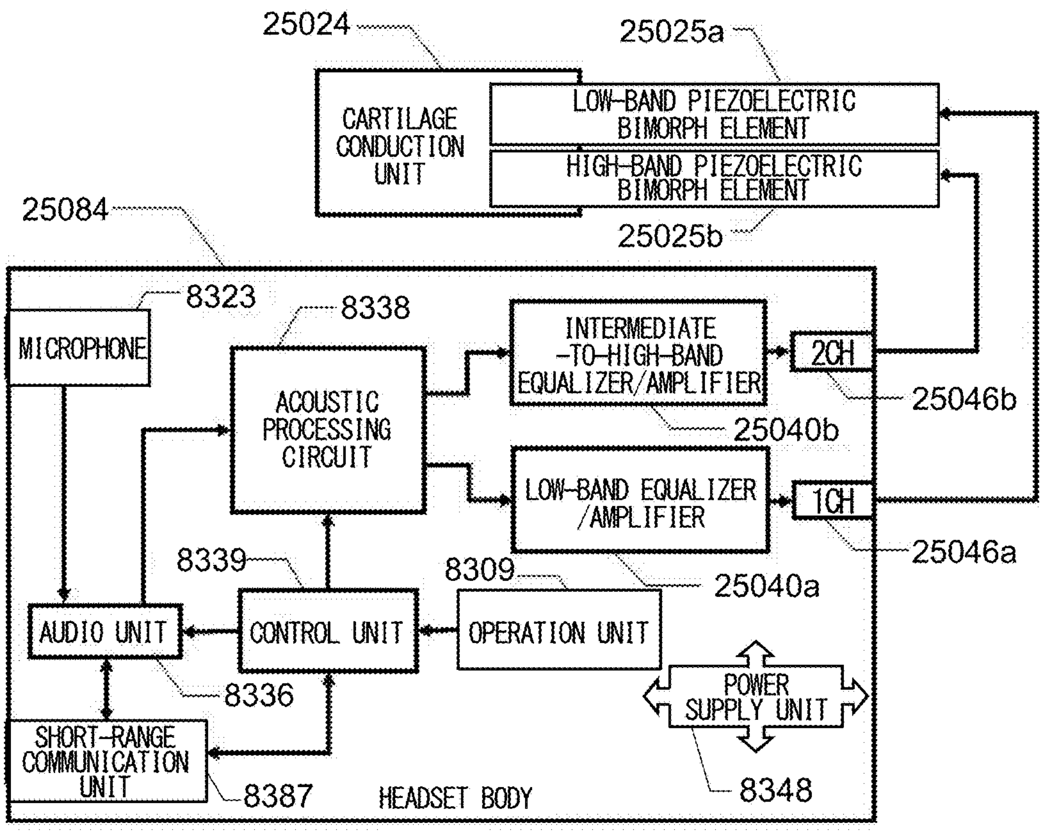
Figure 198:
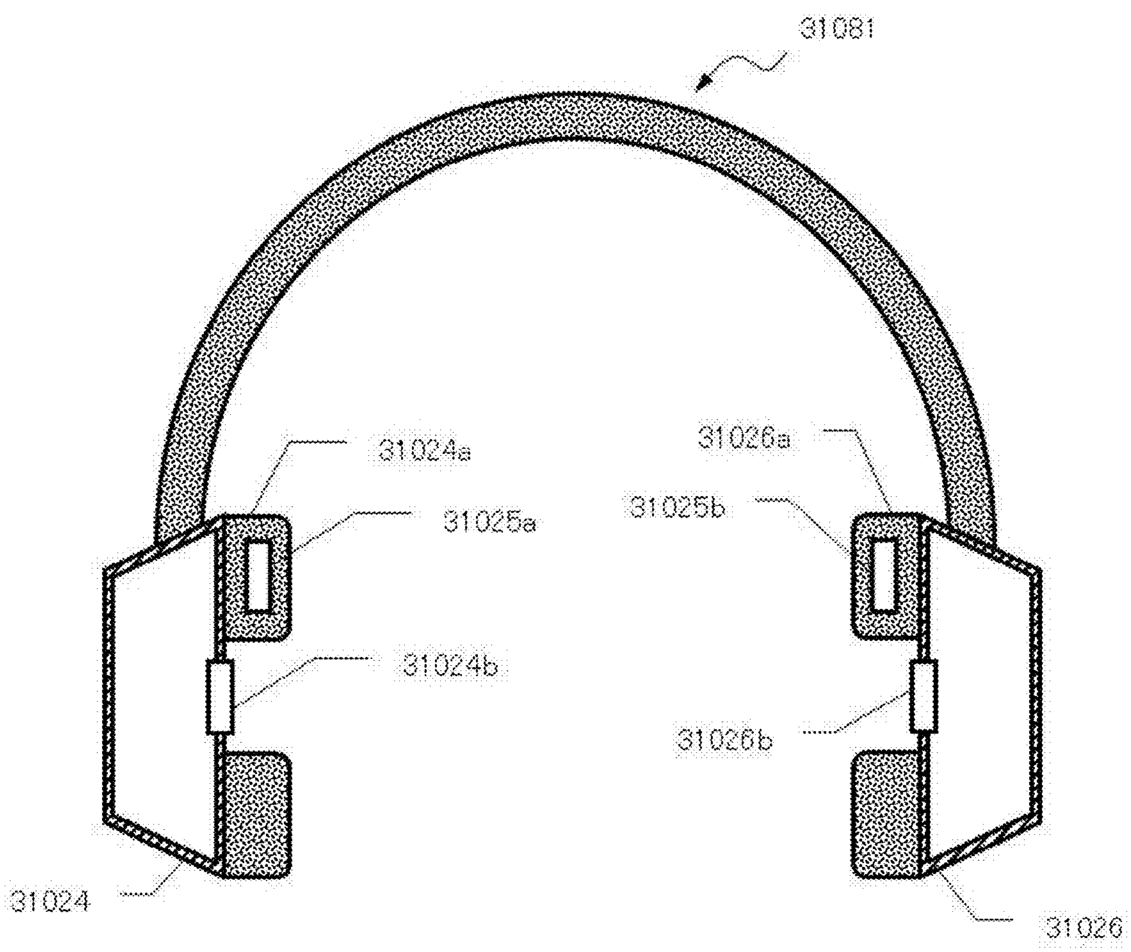
Figure 199:
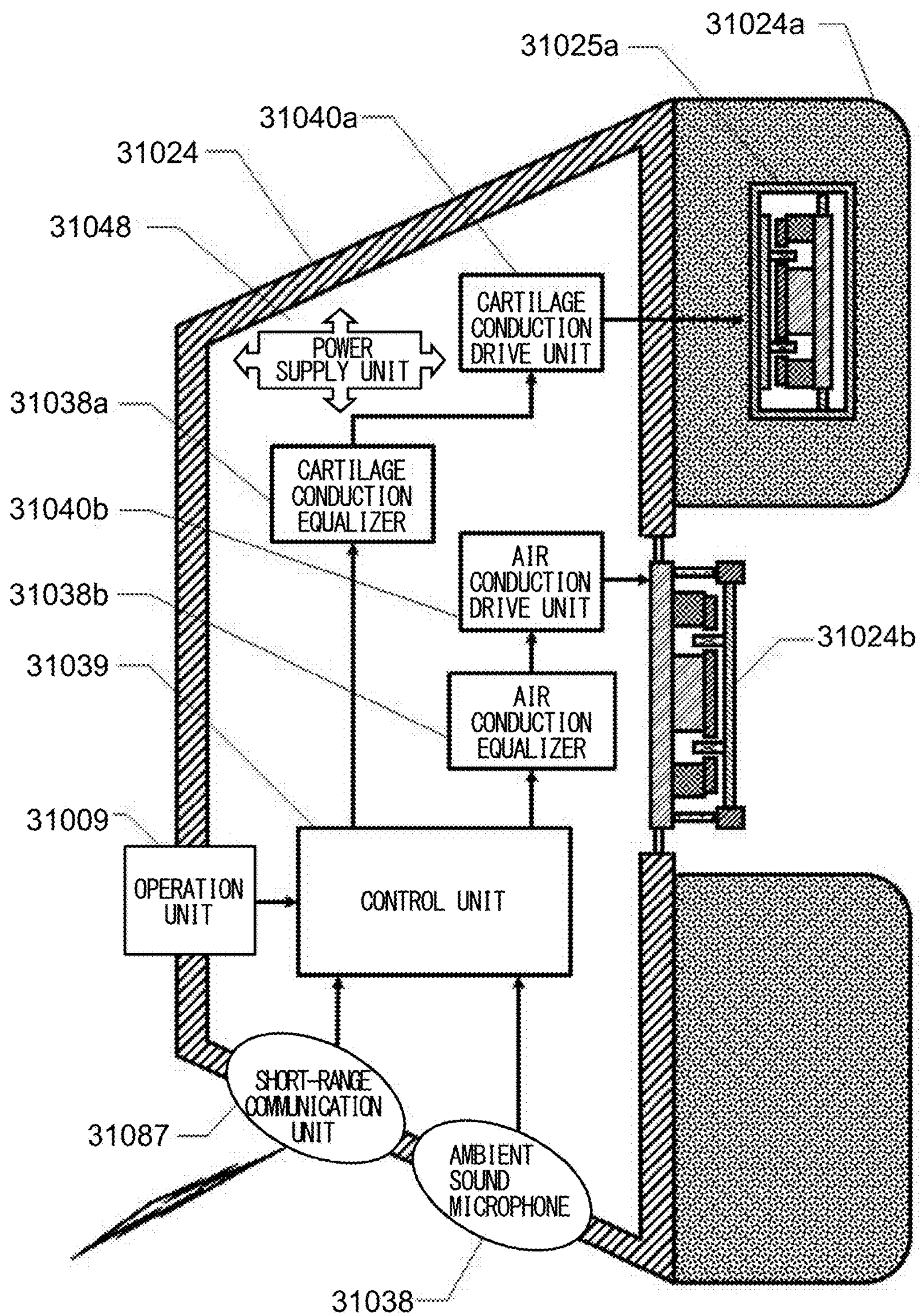
Figure 200:
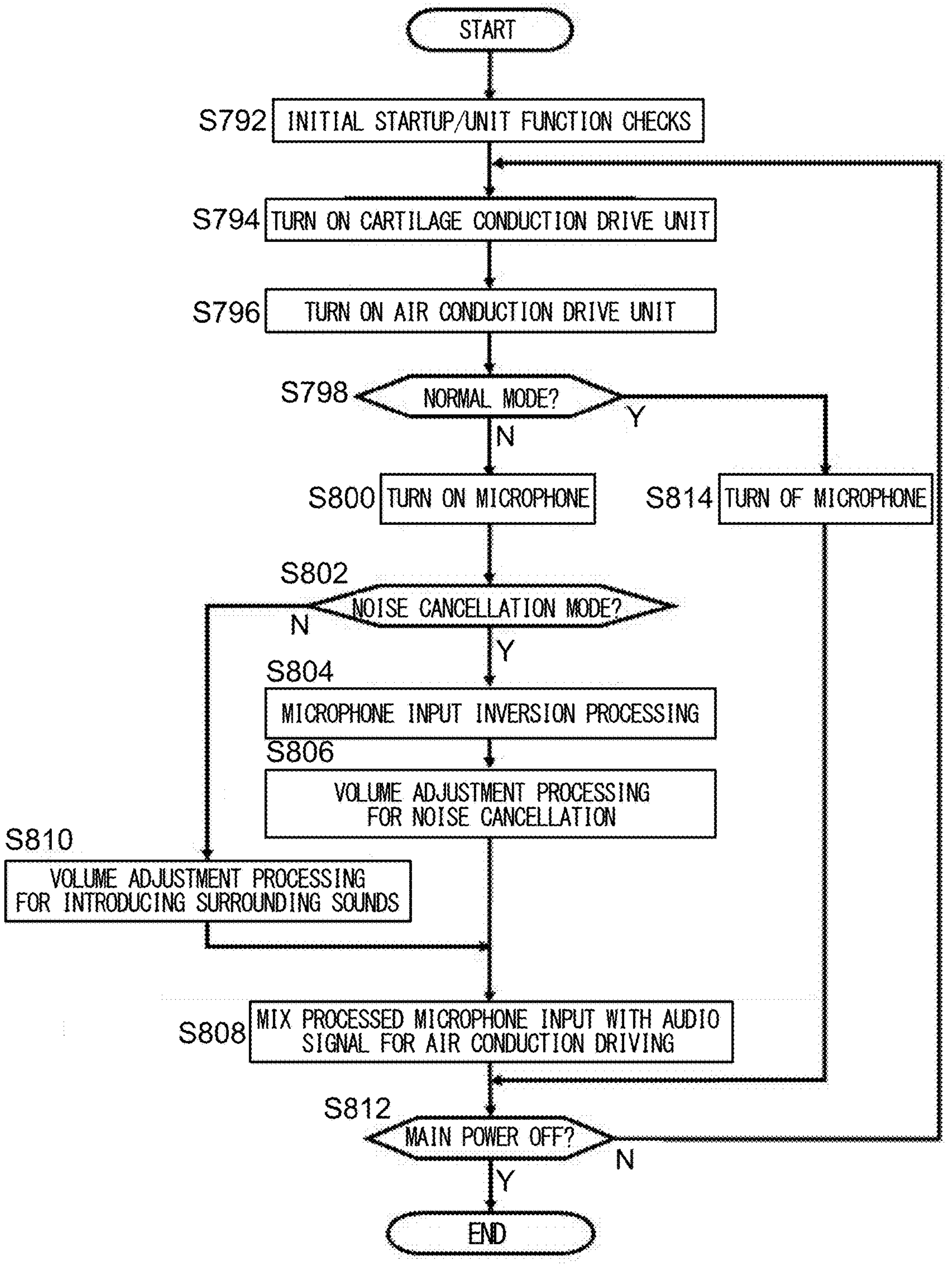
Figure 201:
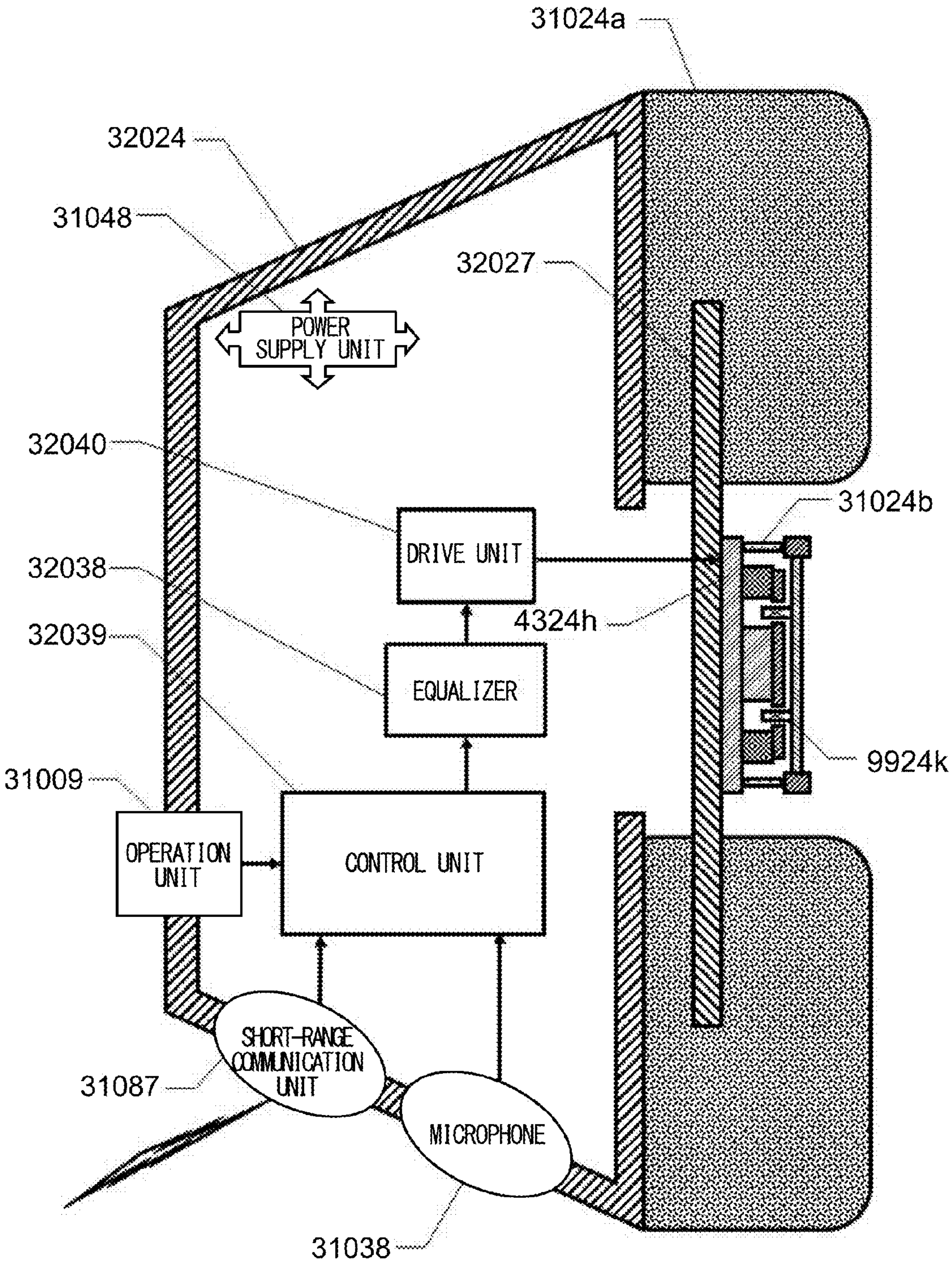
Figure 202:
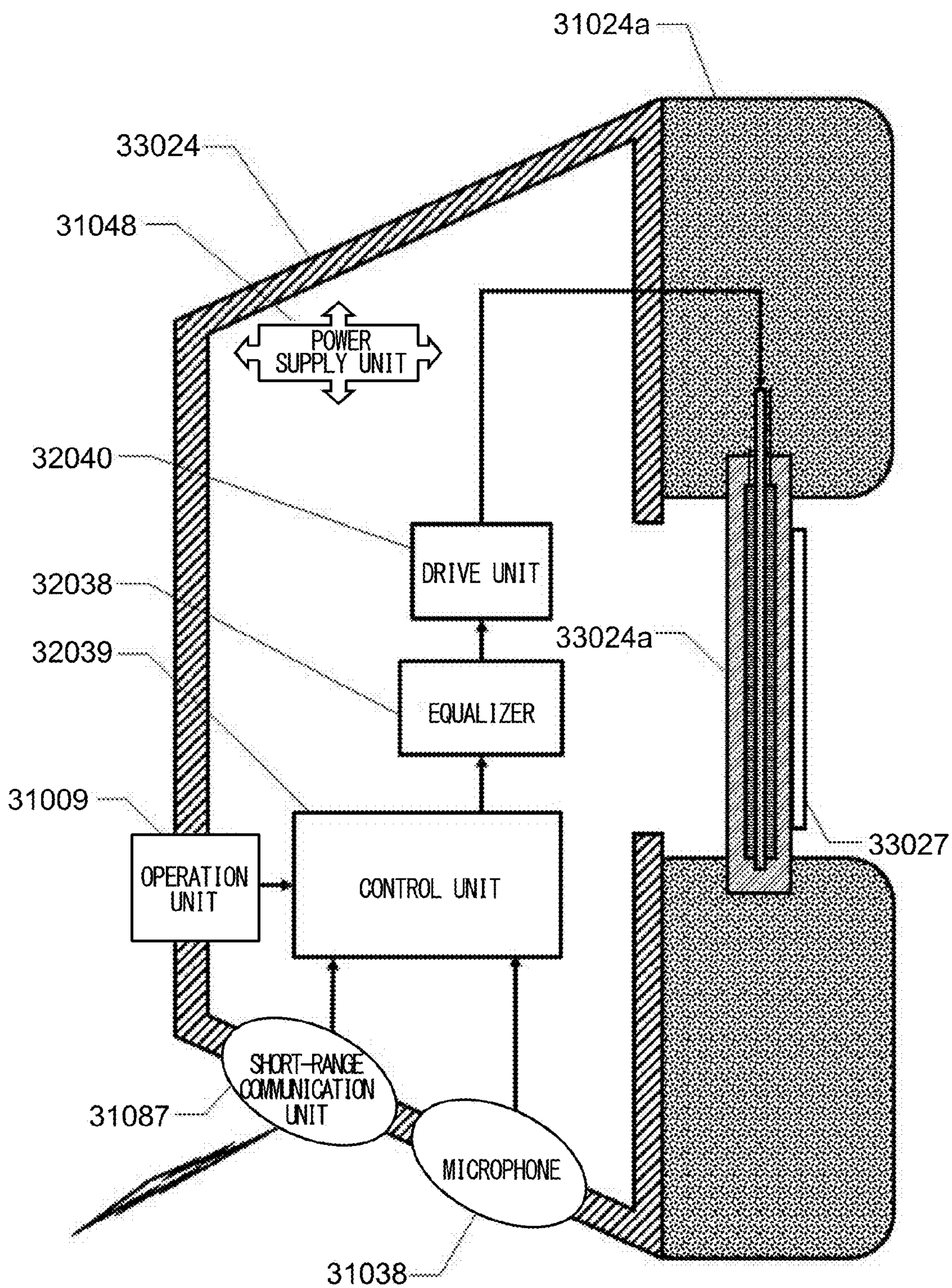
Figure 203:
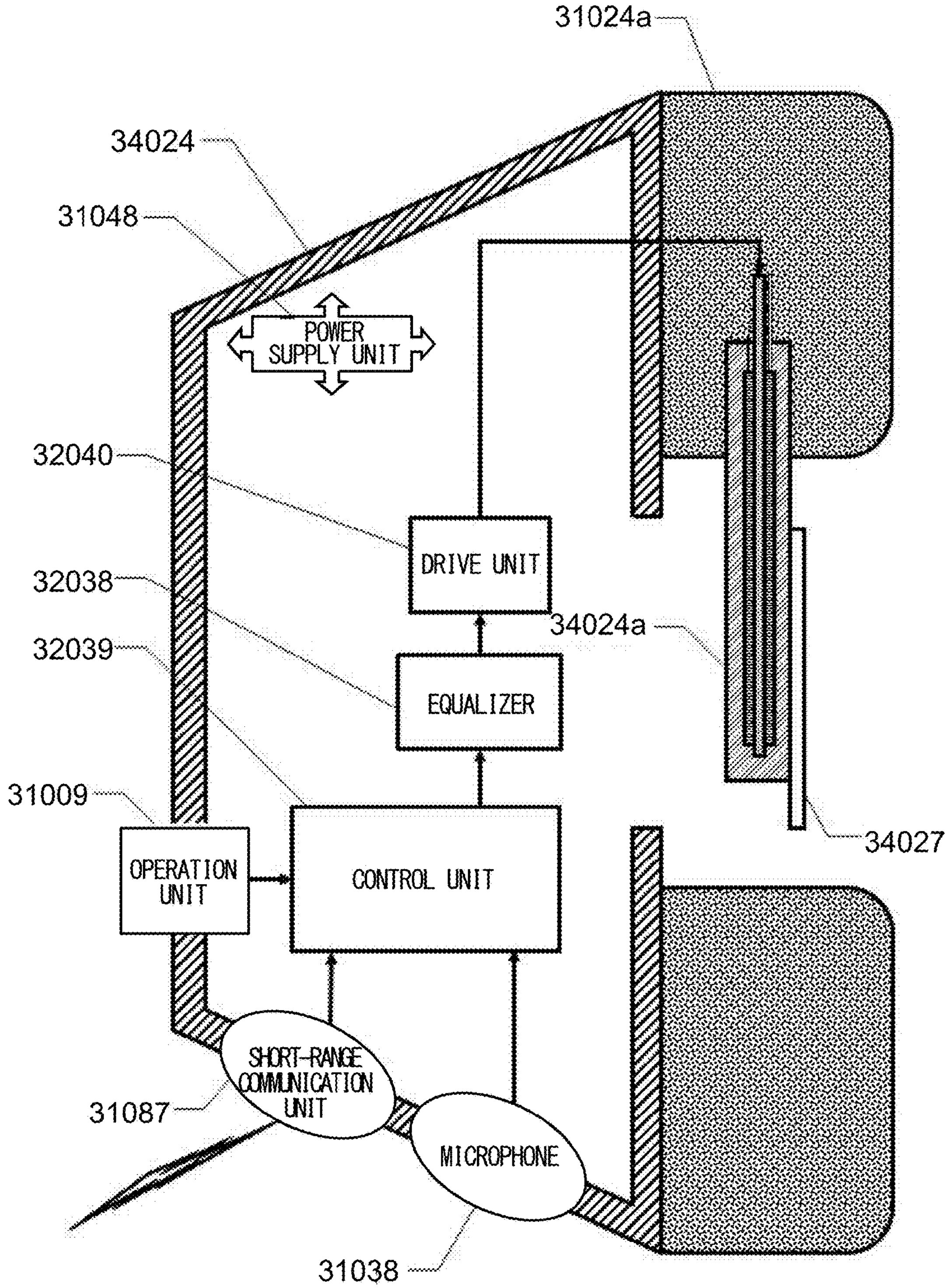
Figure 204:
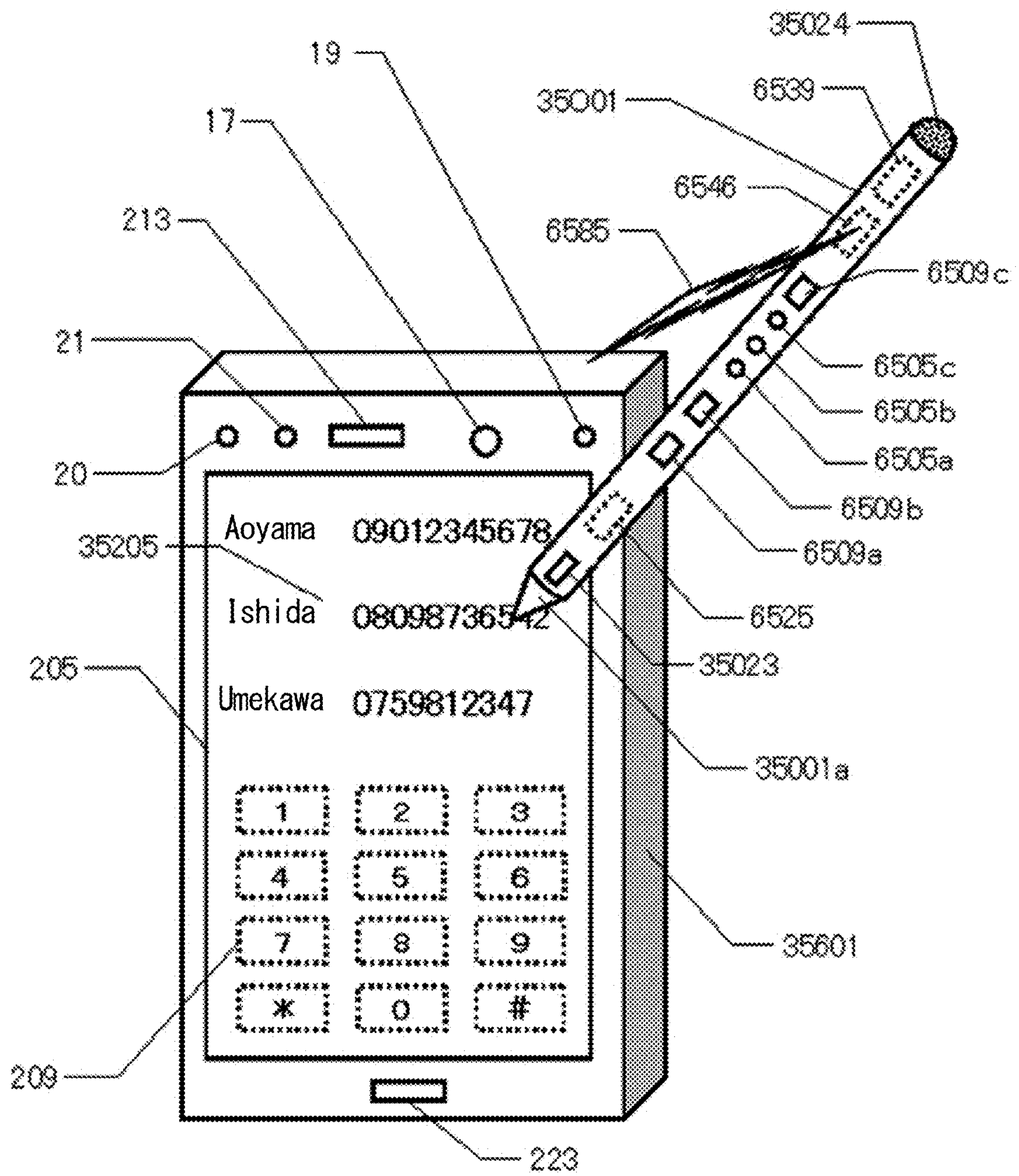
Figure 205:
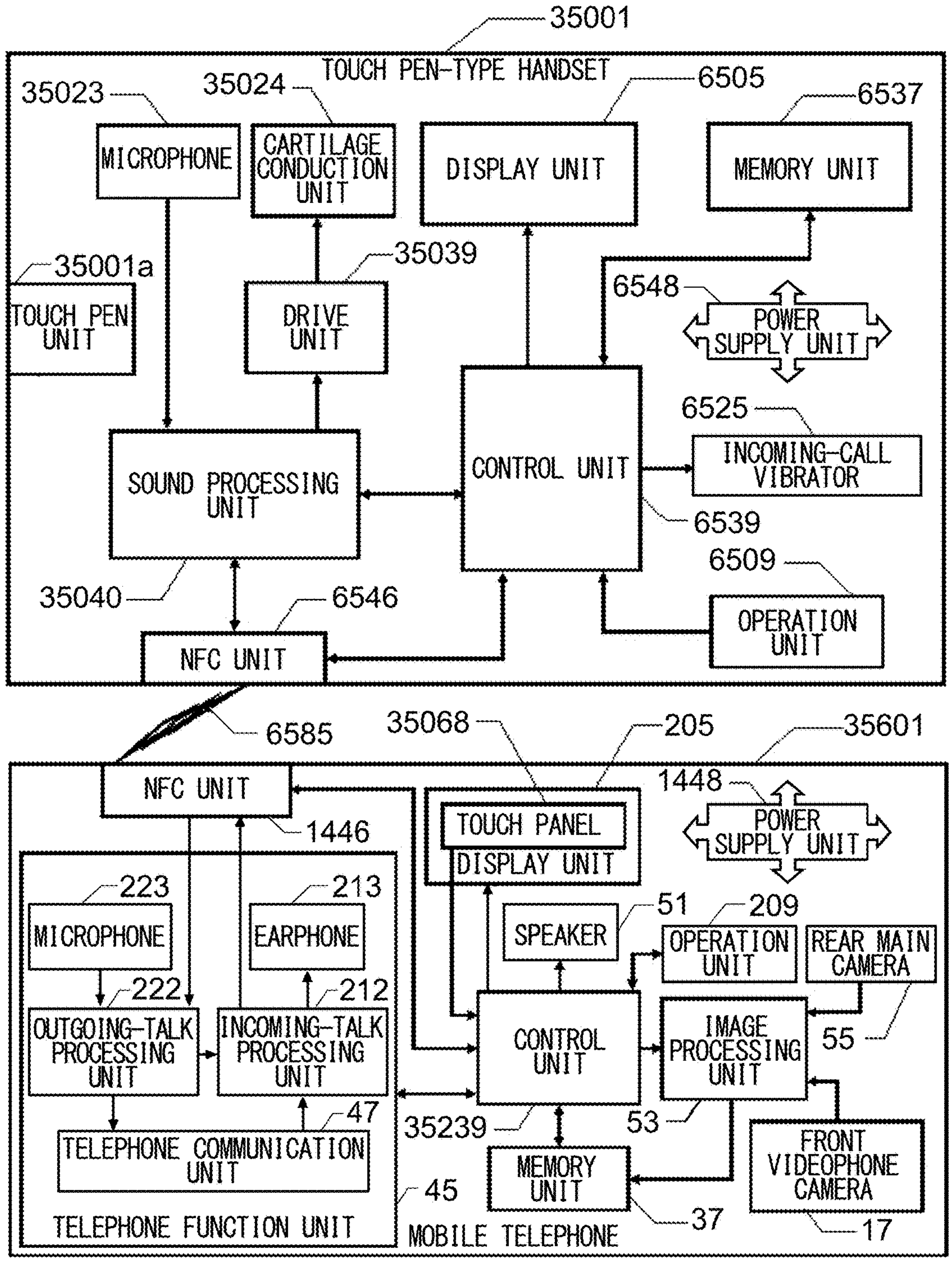
Figure 206:
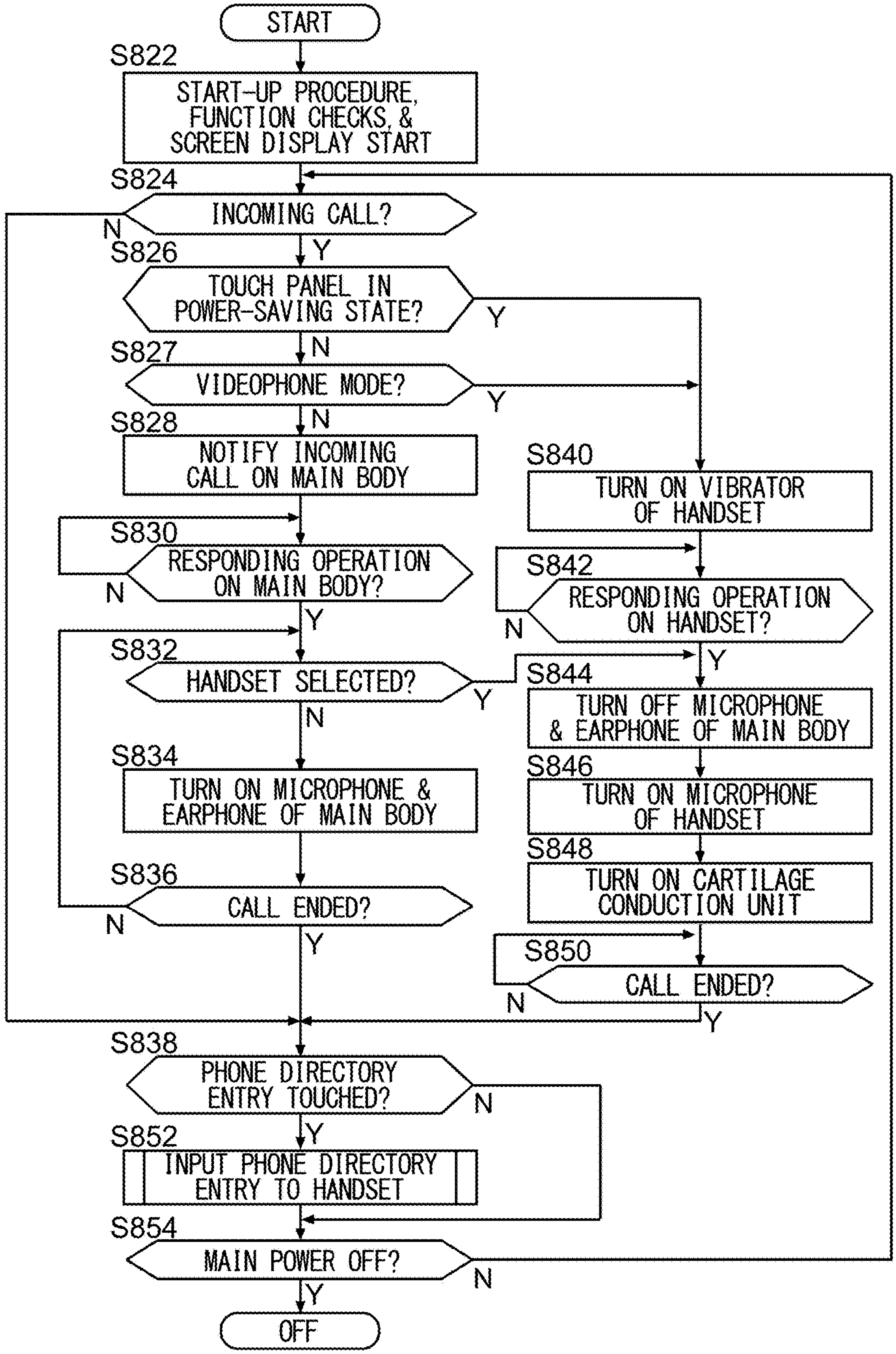
Figure 207:
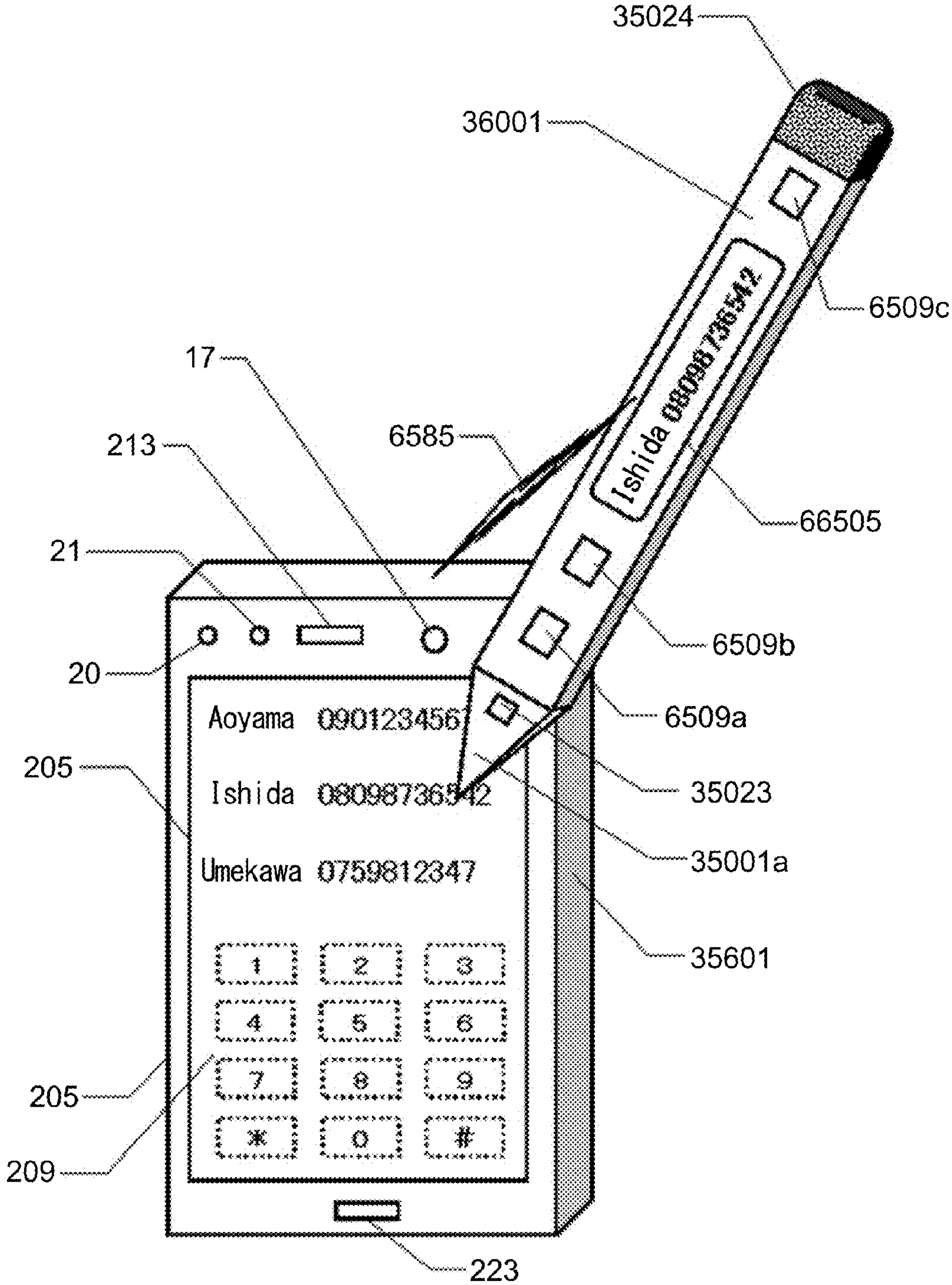
Figures 208A, 208B, 208C:
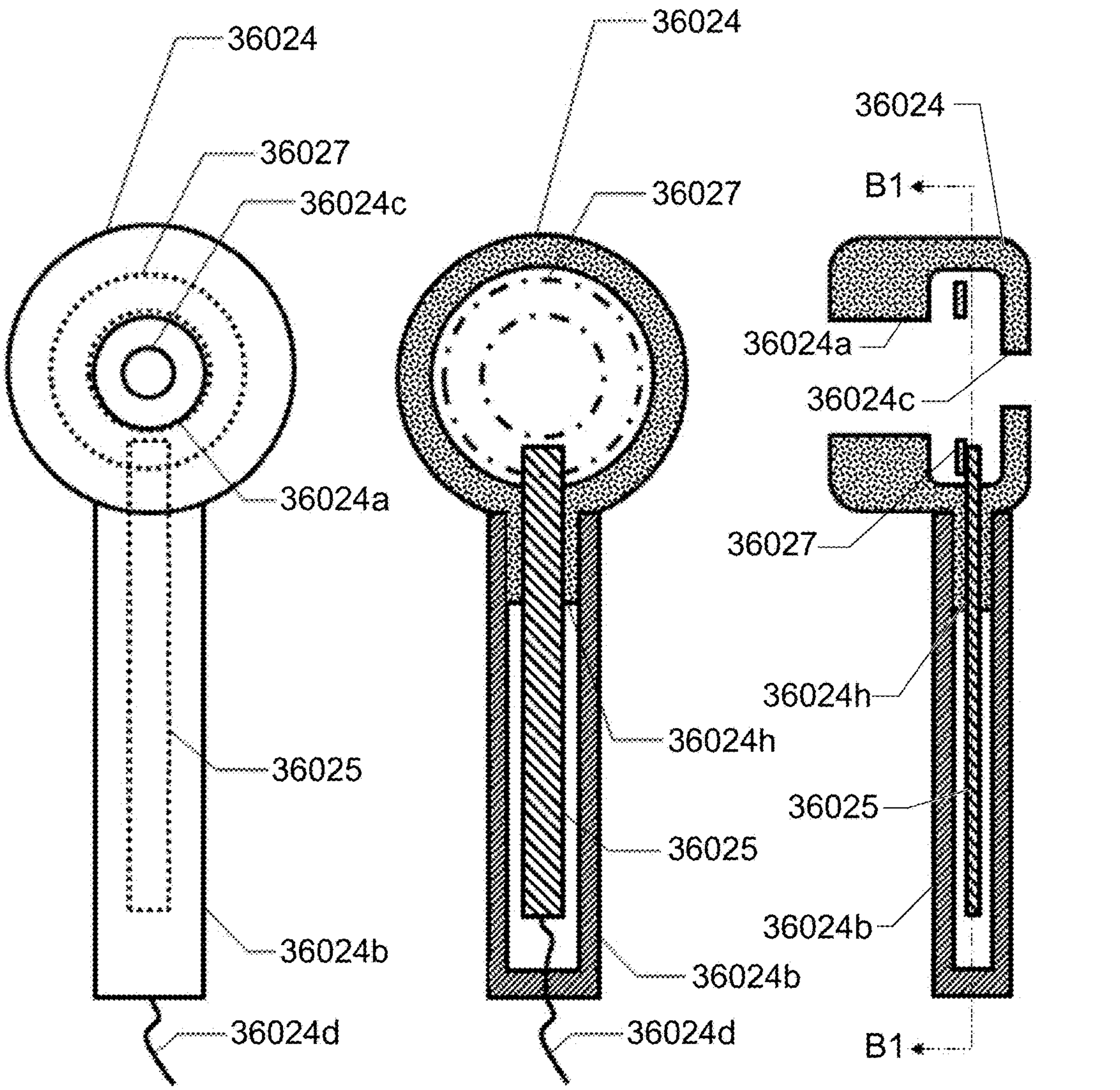
Figures 209A, 209B, 209C:
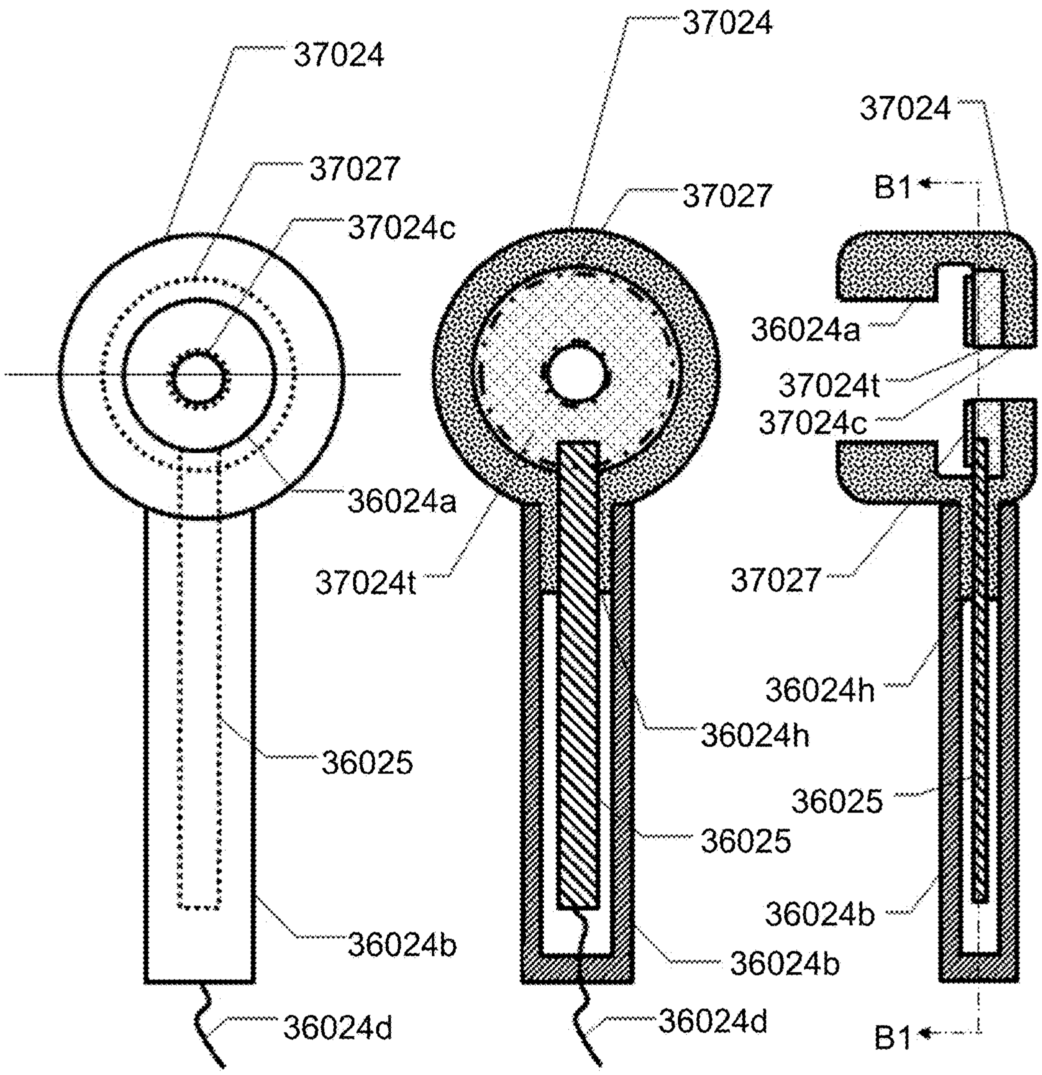
Figure 210A:
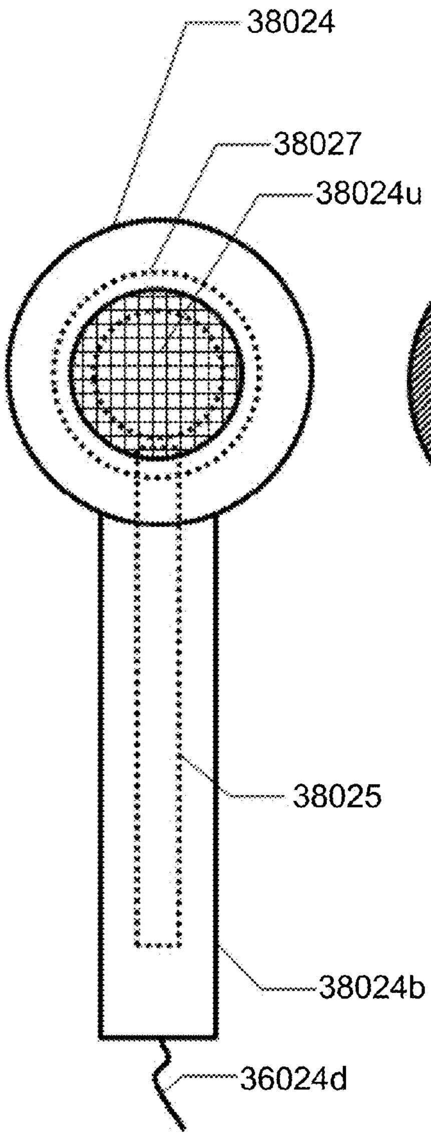
Figure 210B:
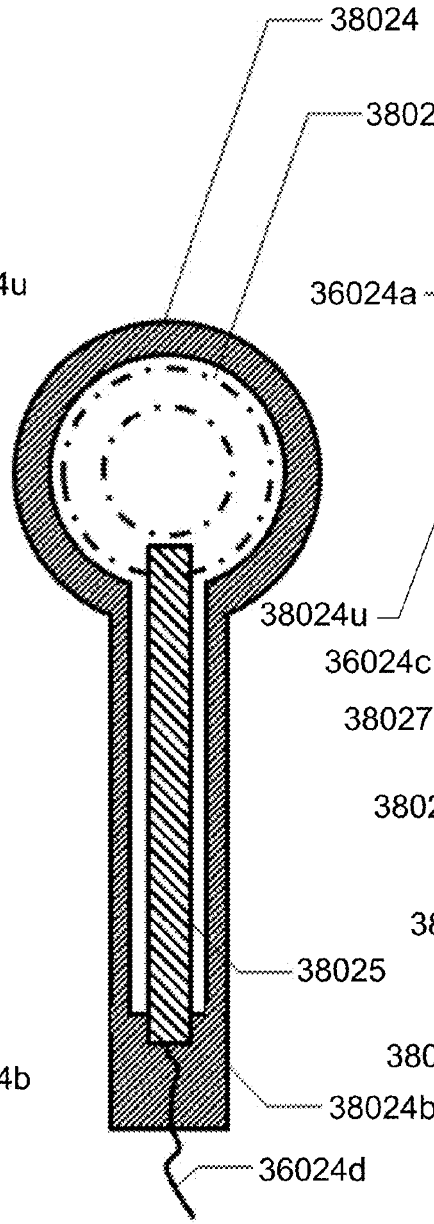
Figure 210C:
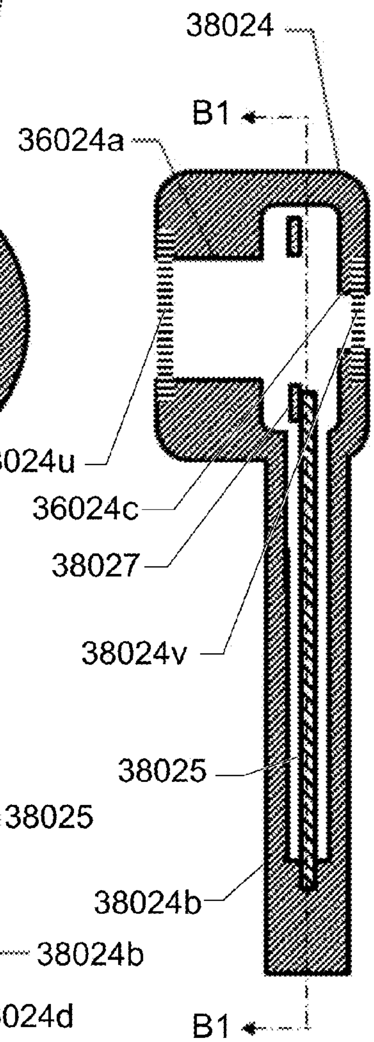
Figure 211A:
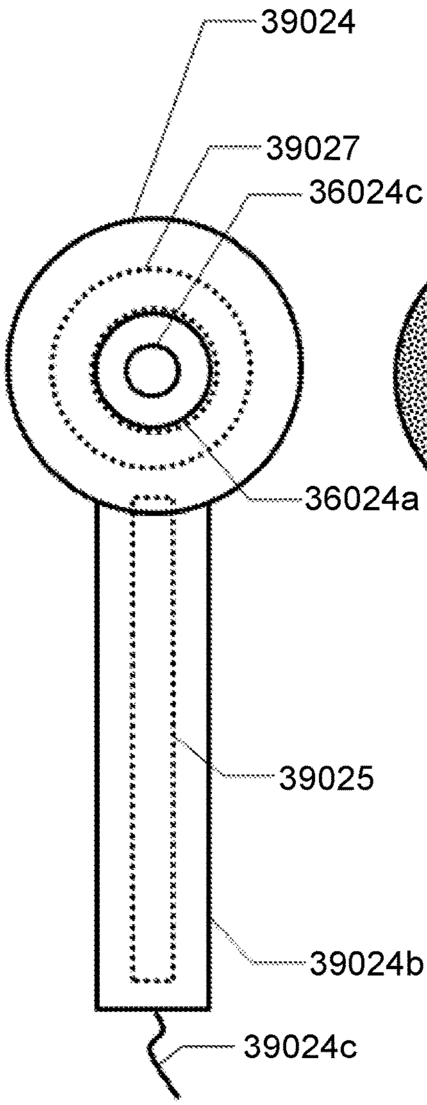
Figure 211B:
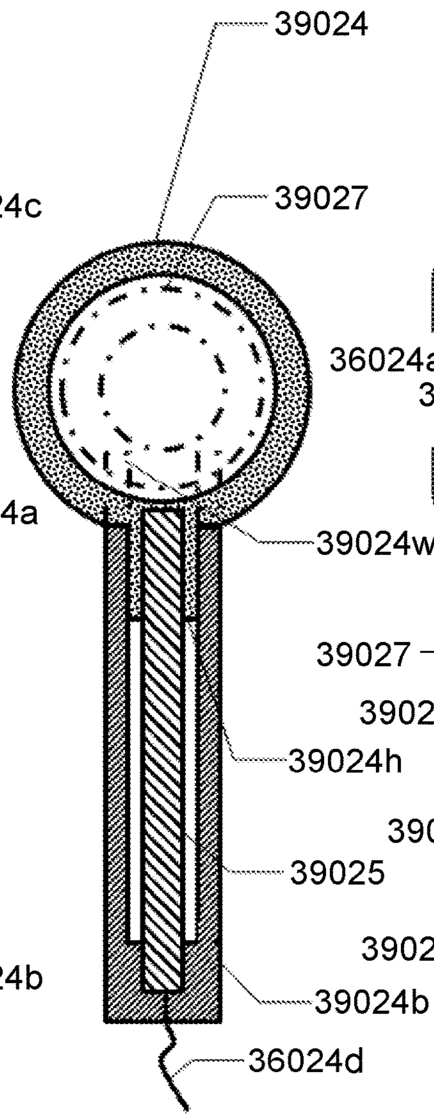
Figure 211C:
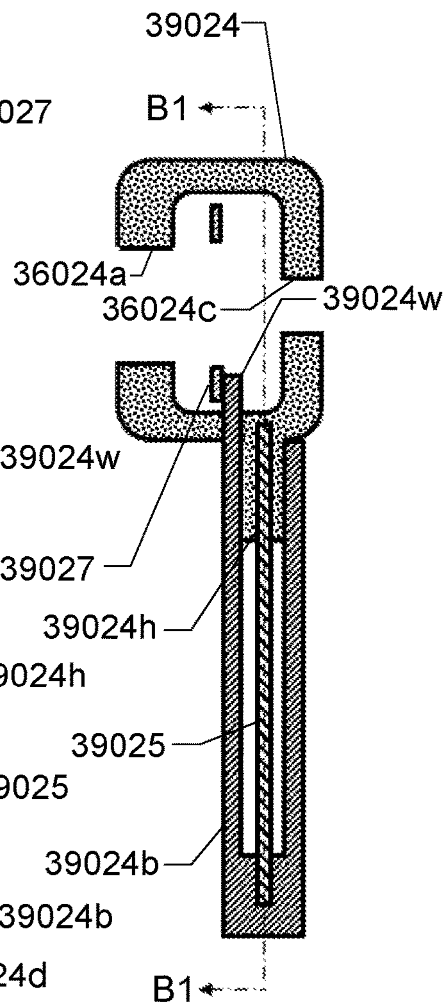
Figure 212:
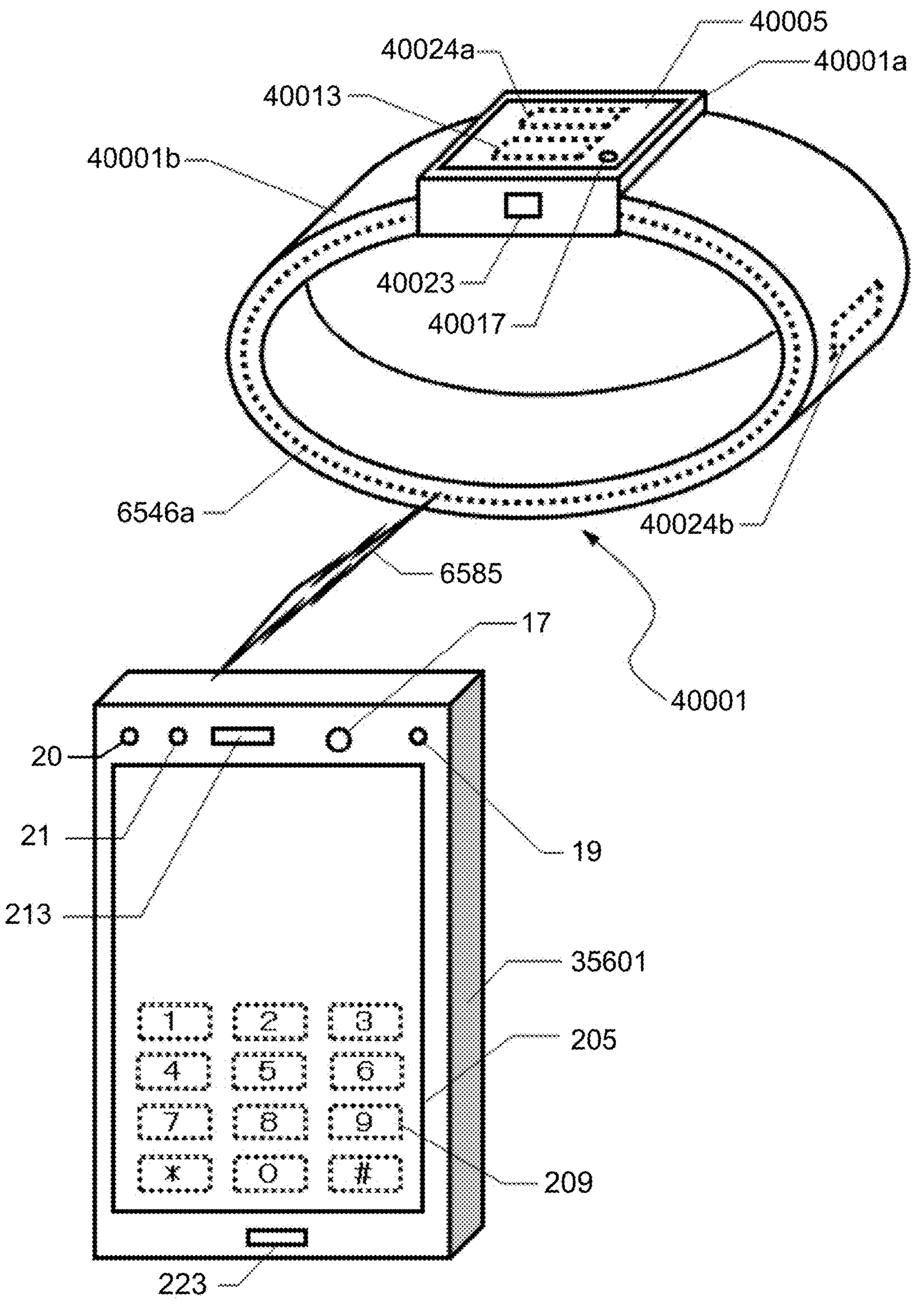
Figure 213A:
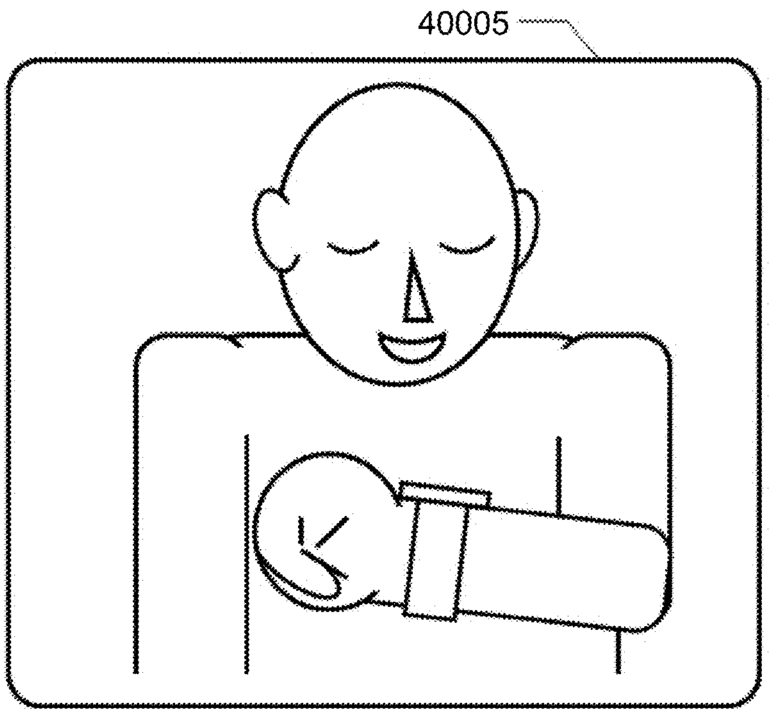
Figure 213B:
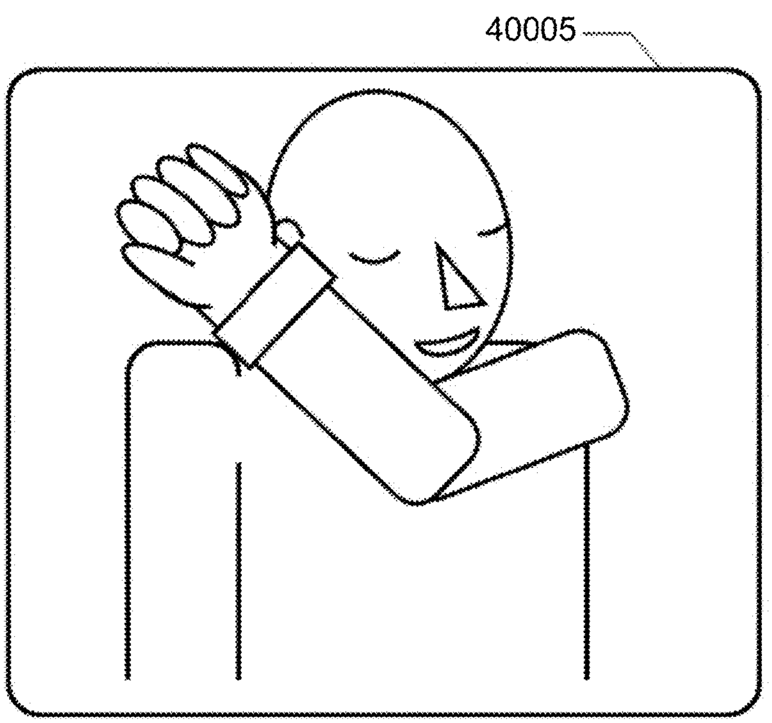
Figure 214A:
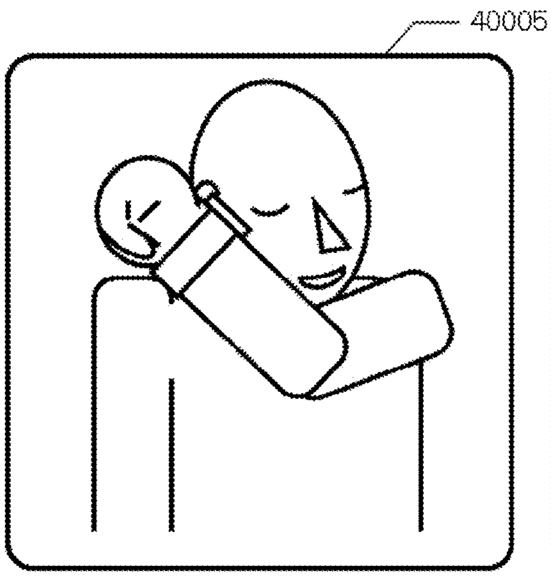
Figure 214B:
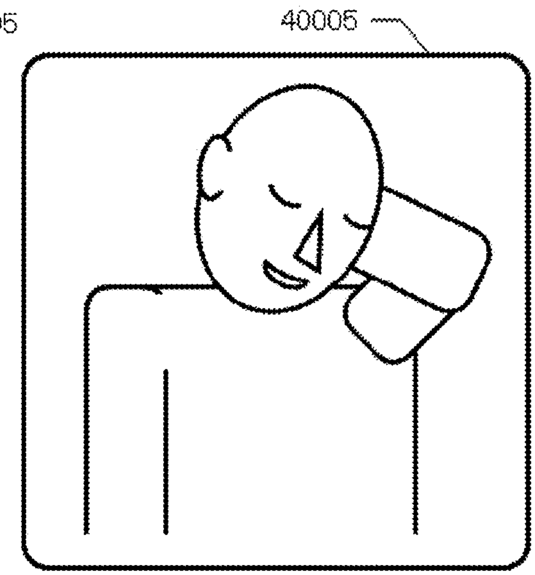
Figure 214C:
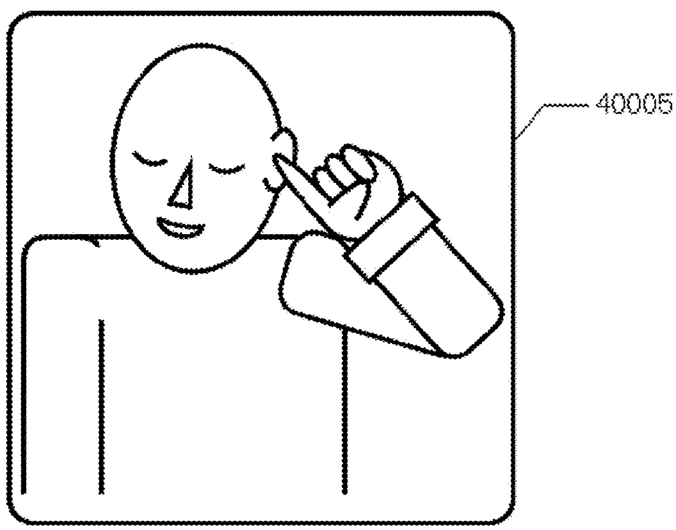
Figure 215:
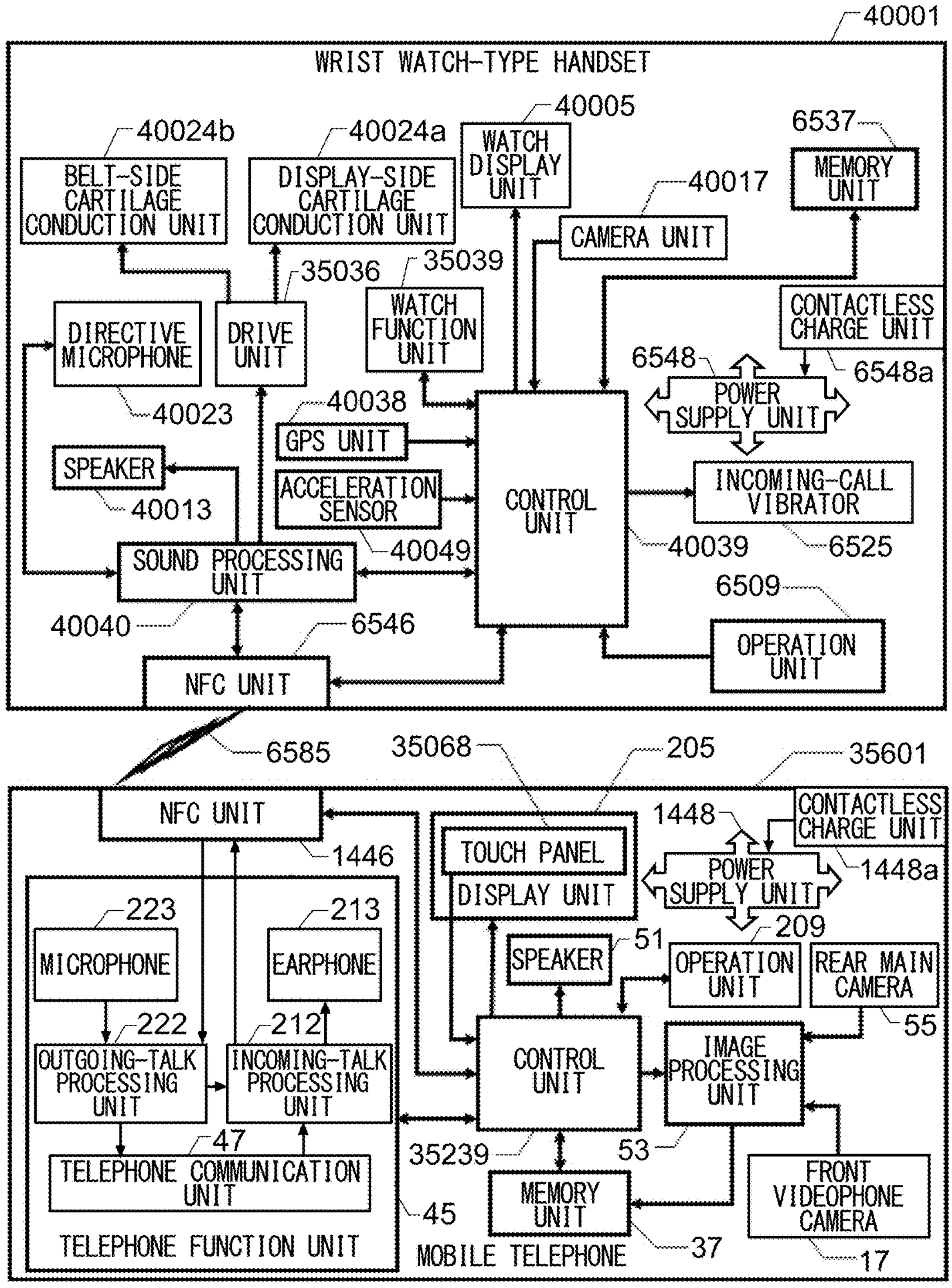
Figure 216:
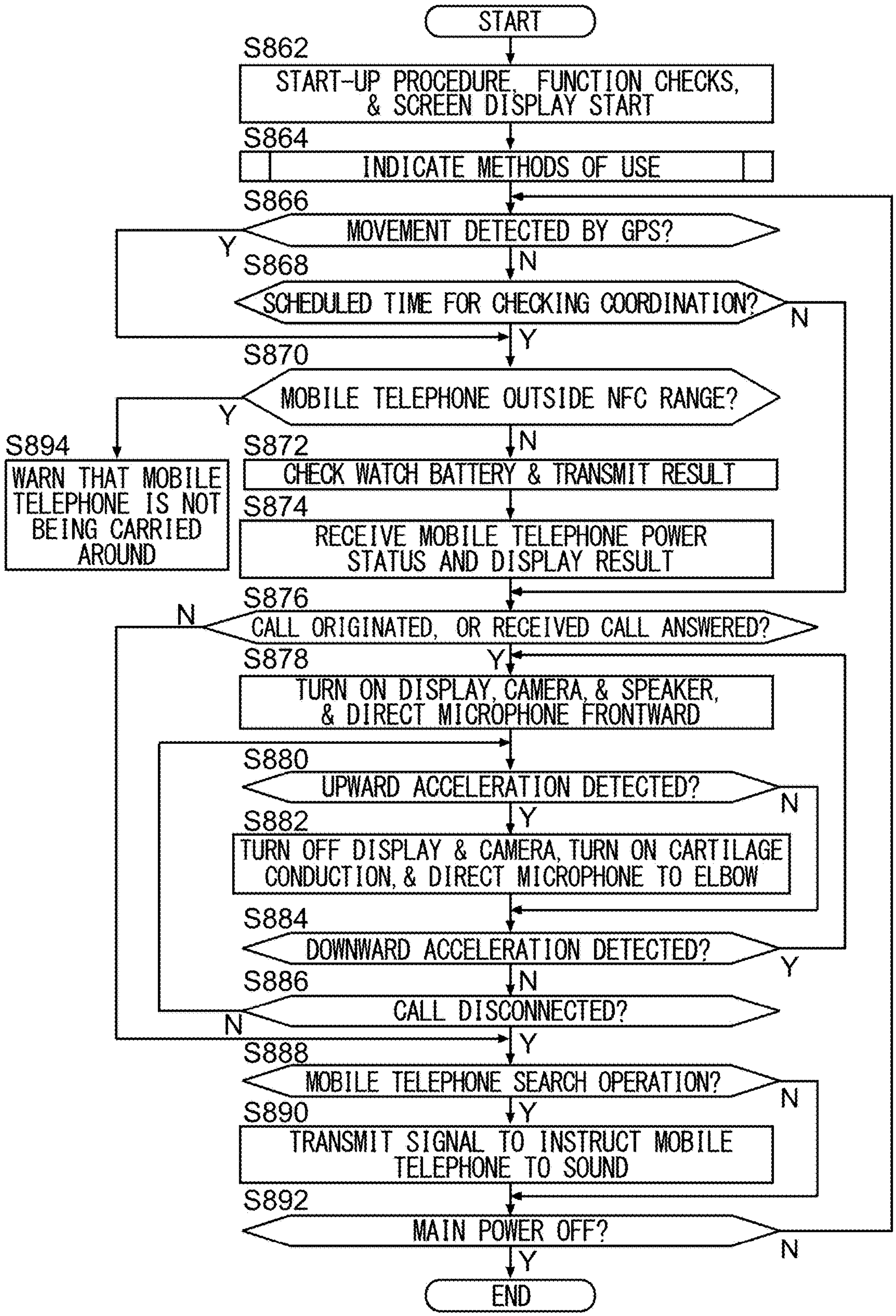
Figure 217:
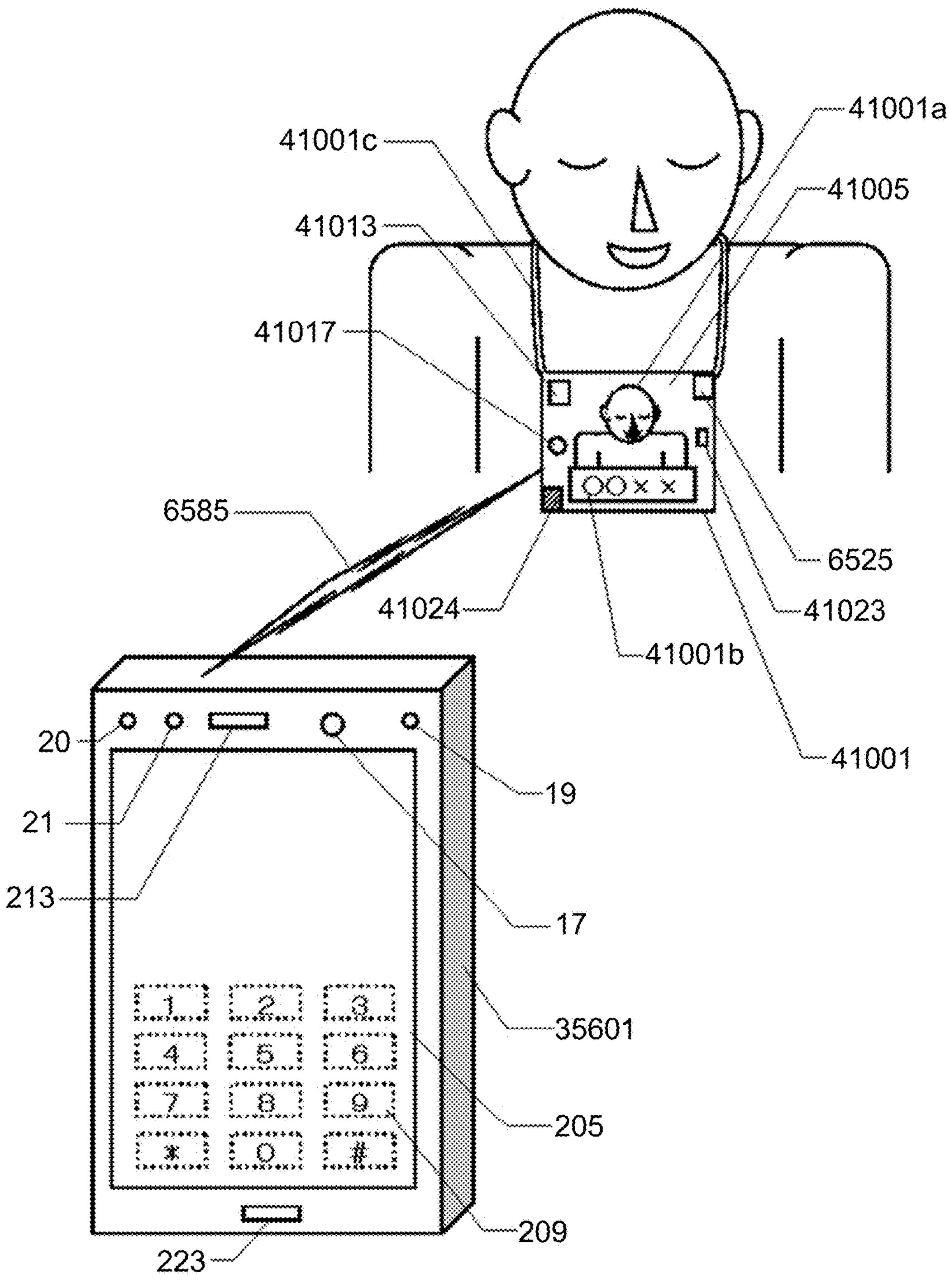
Figure 218A:
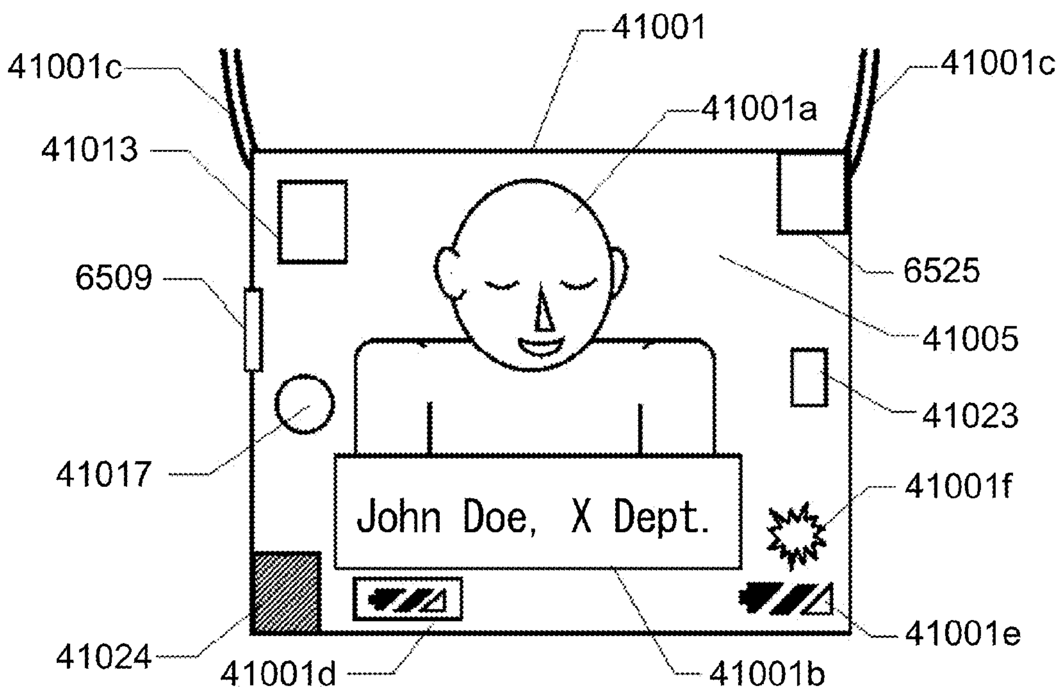
Figure 218B:
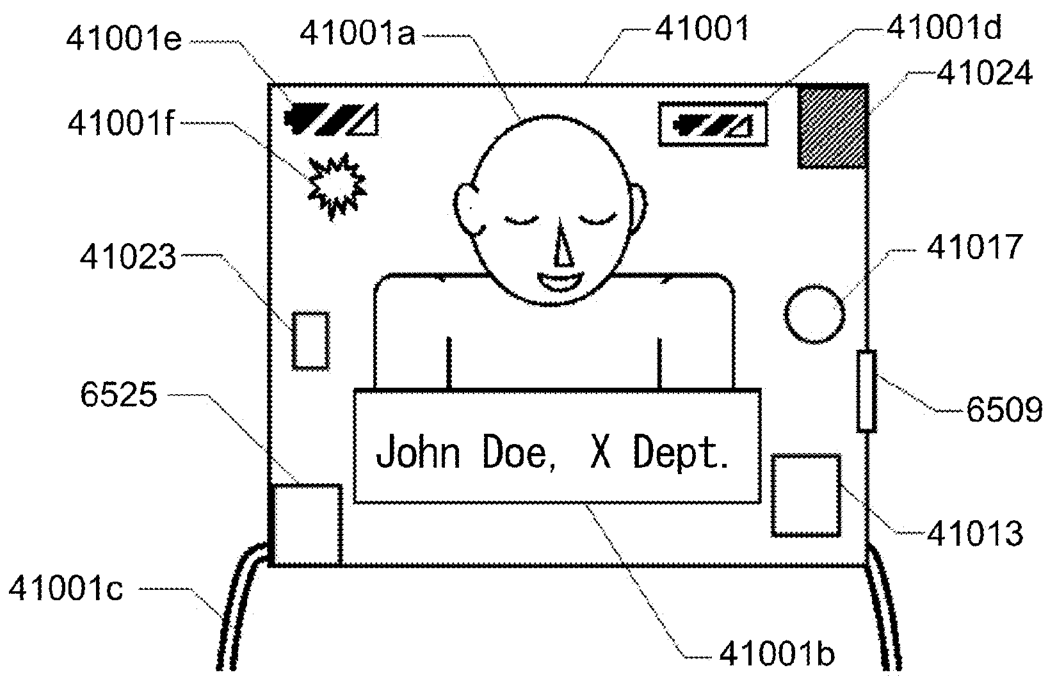
Figure 219A:
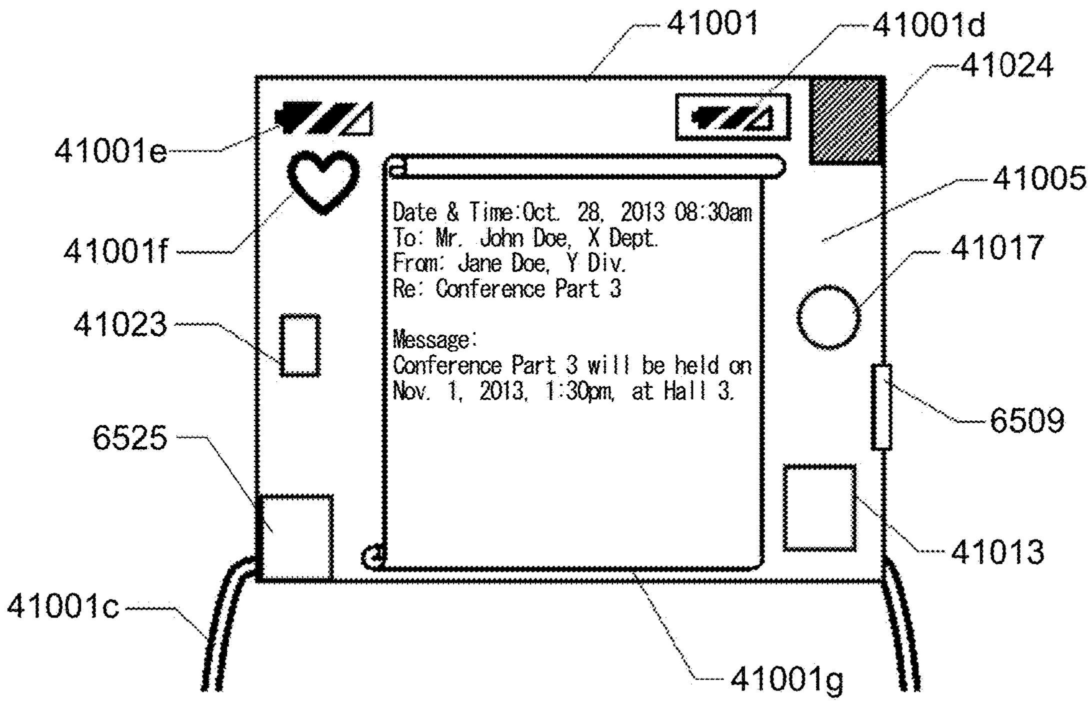
Figure 219B:
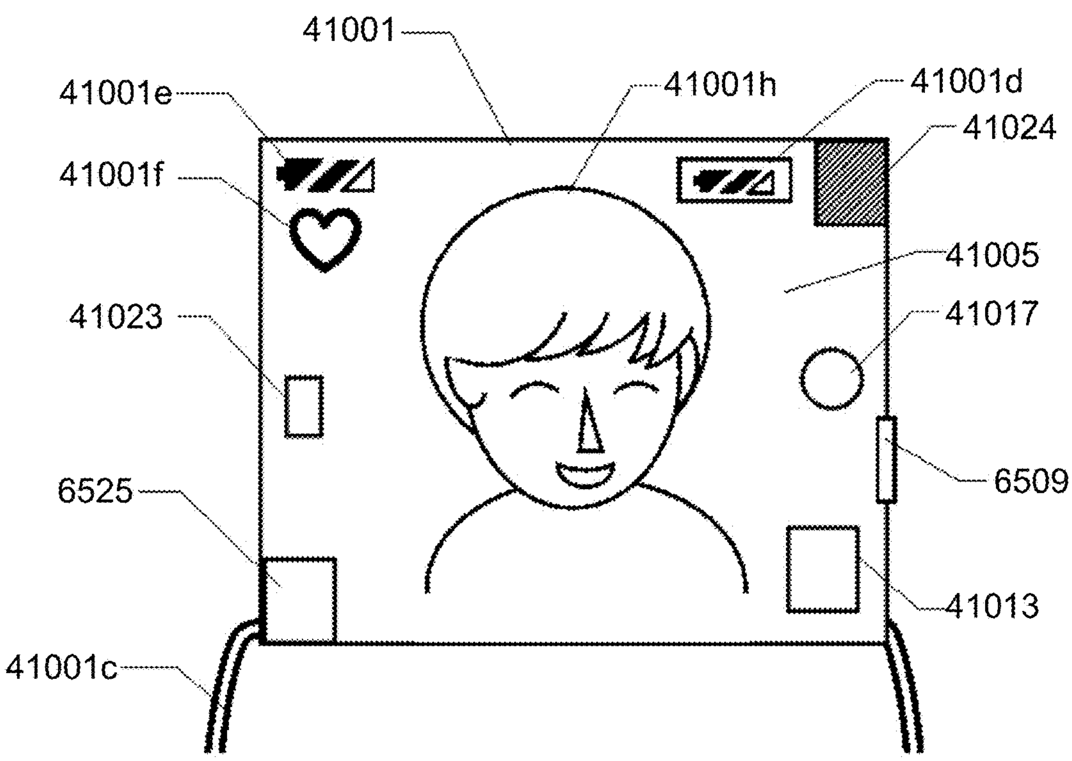
Figure 220:
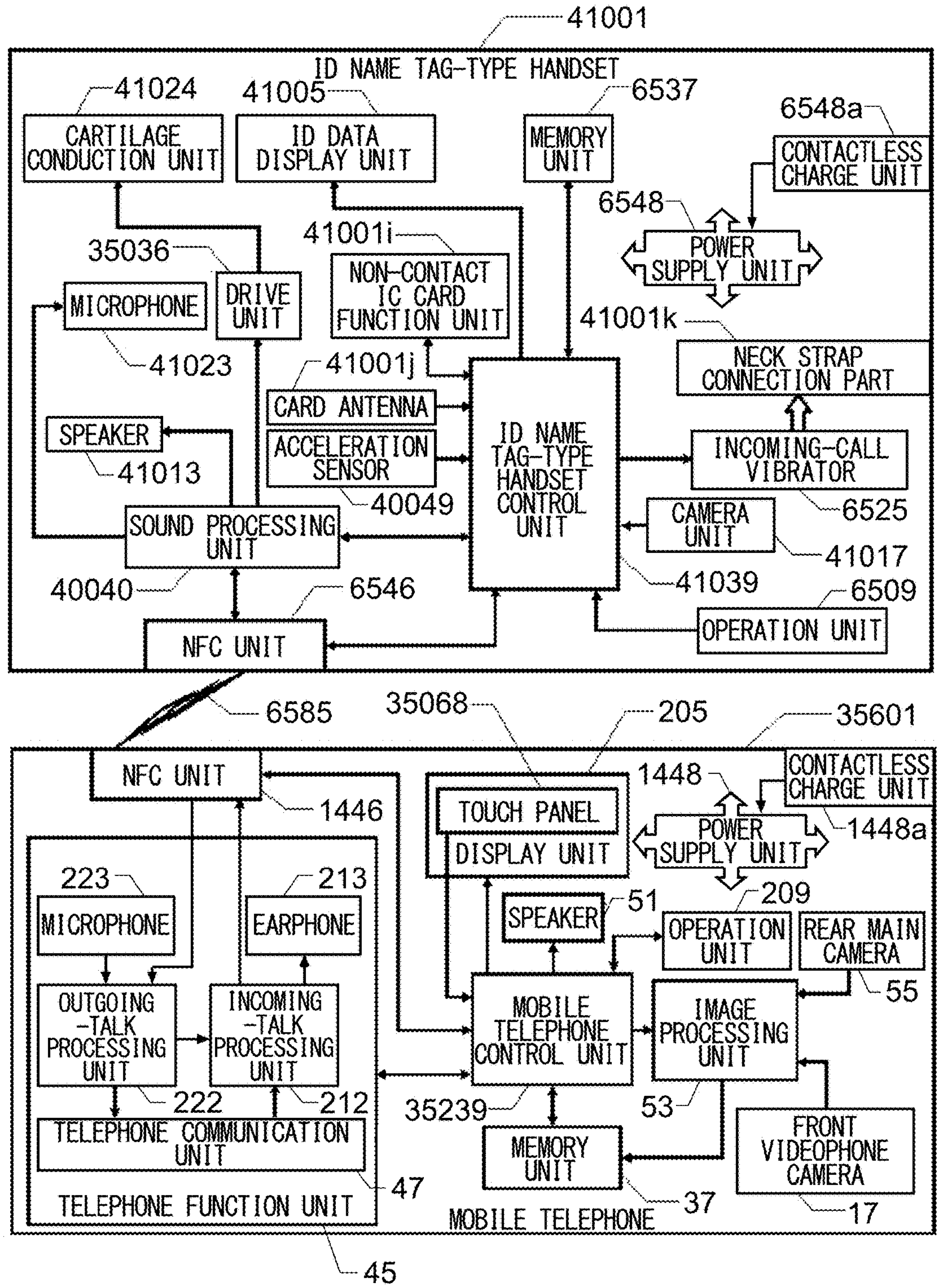
Figure 221:
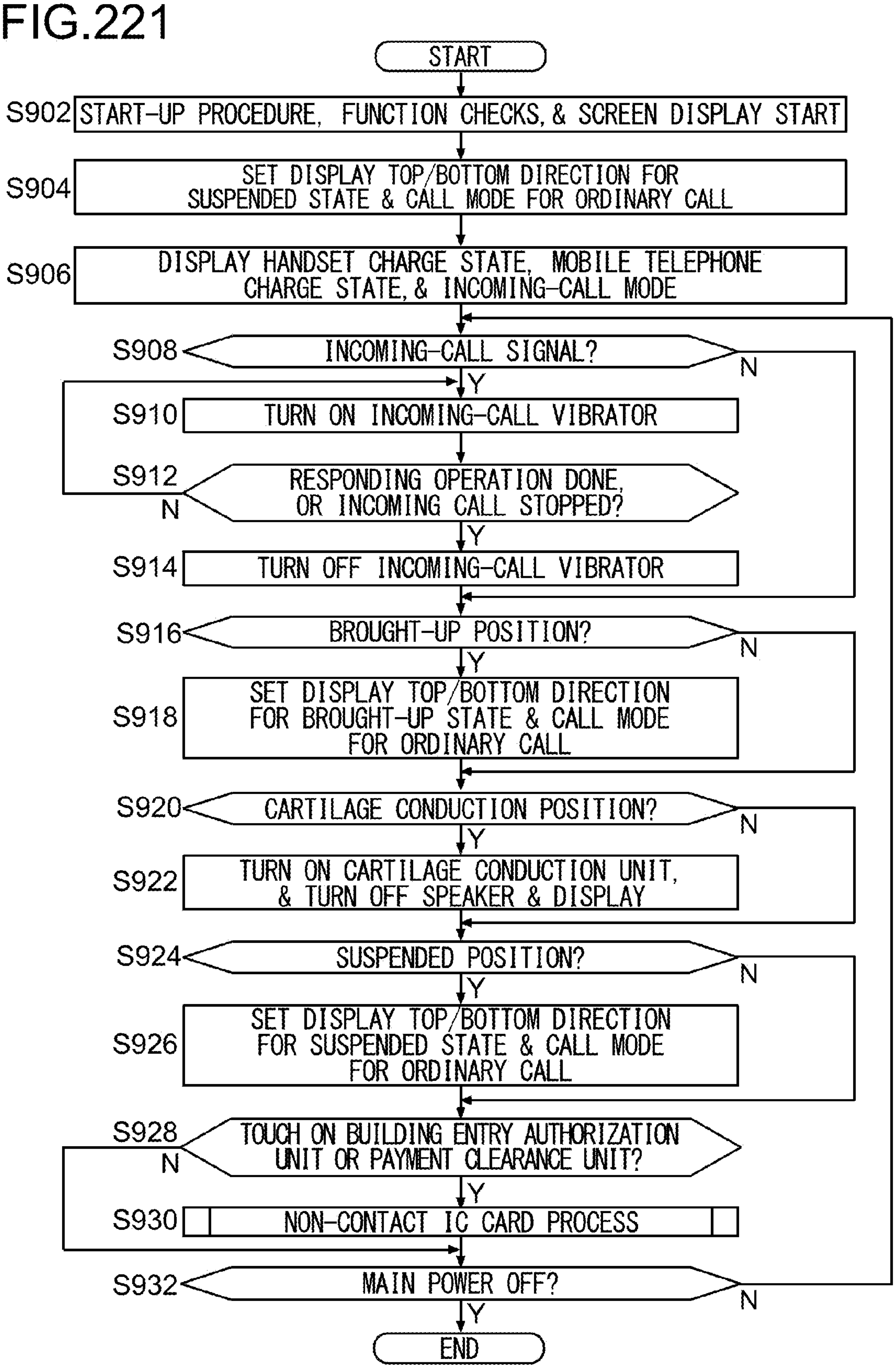
Figures 230A, 230B, 230C:
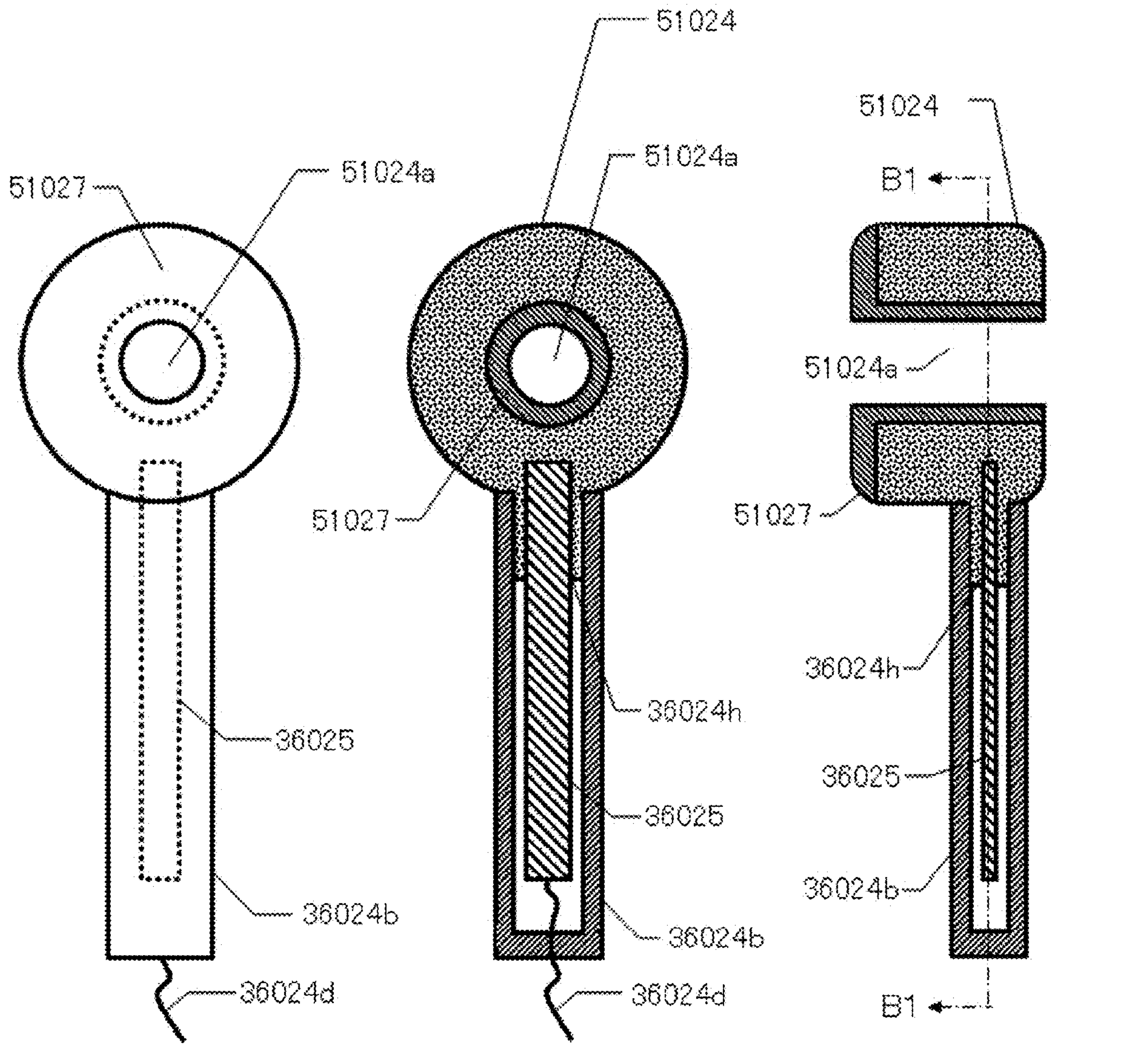
Figure 232C:
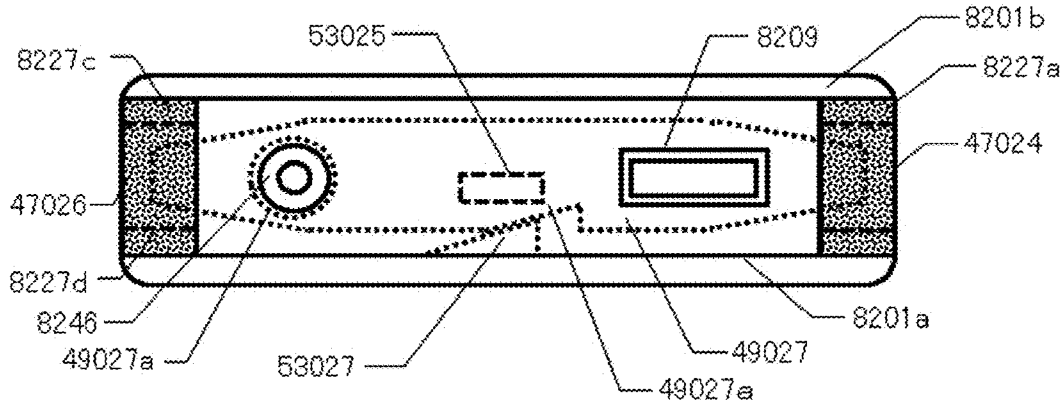
Figure 232B:
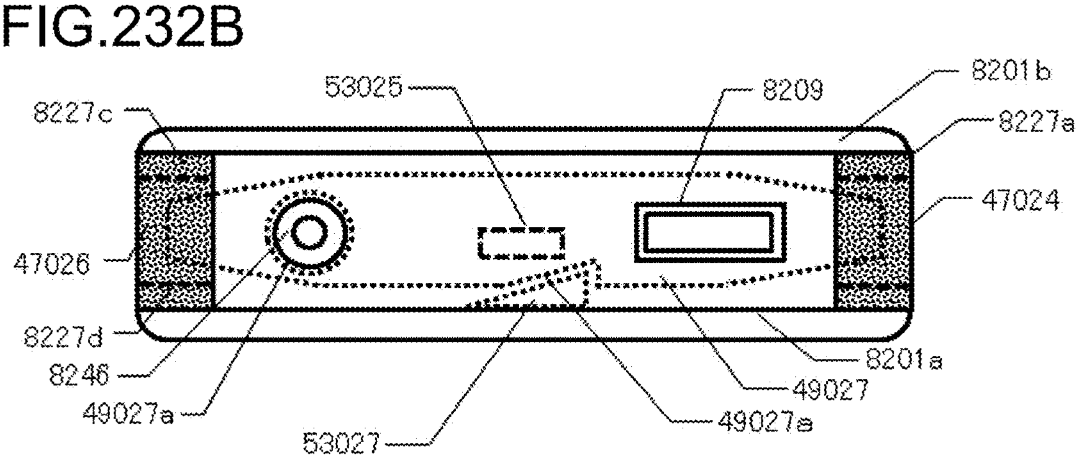
Figure 232A:
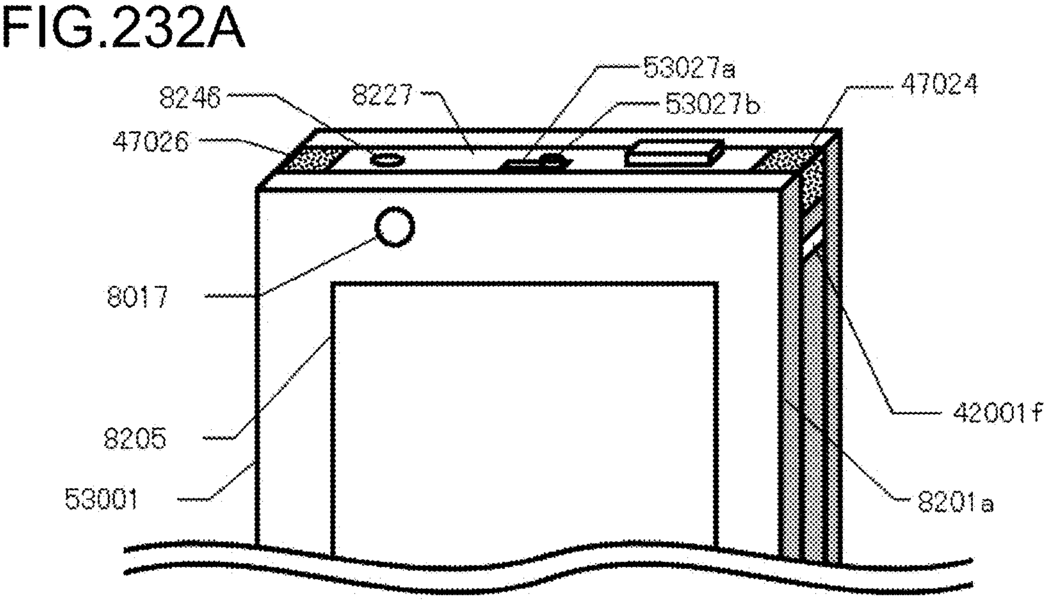
Figure 233:
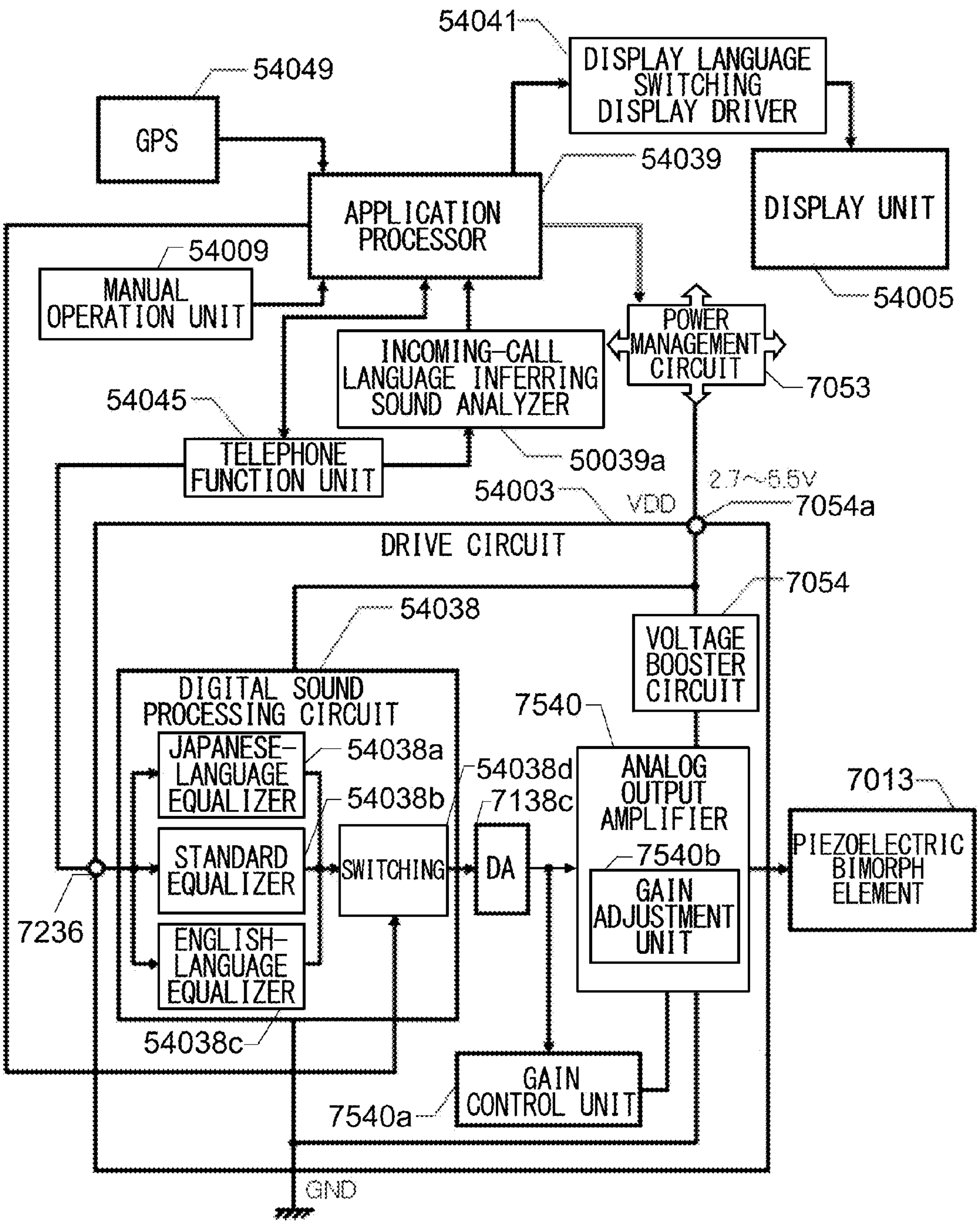
Figure 234:
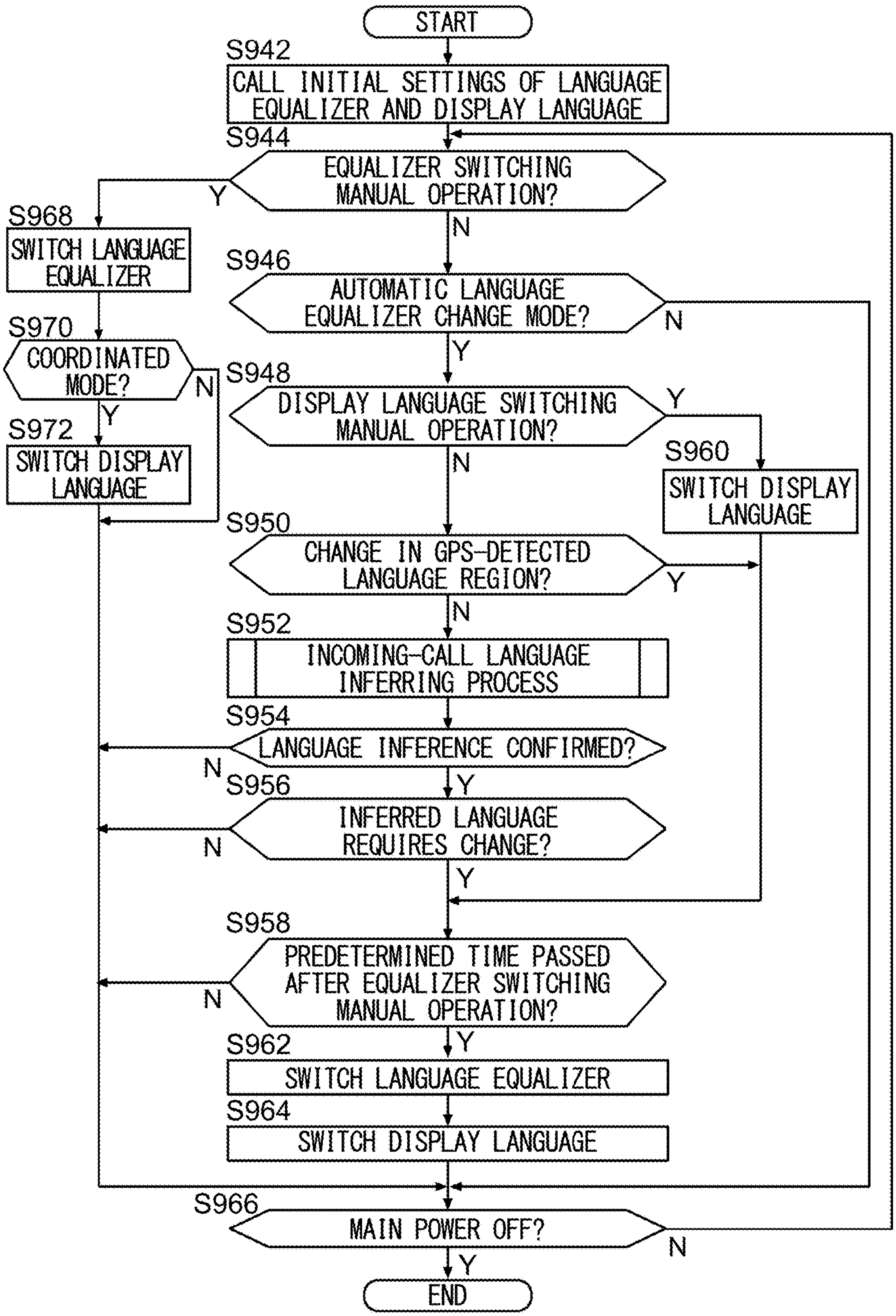
Figure 235C:
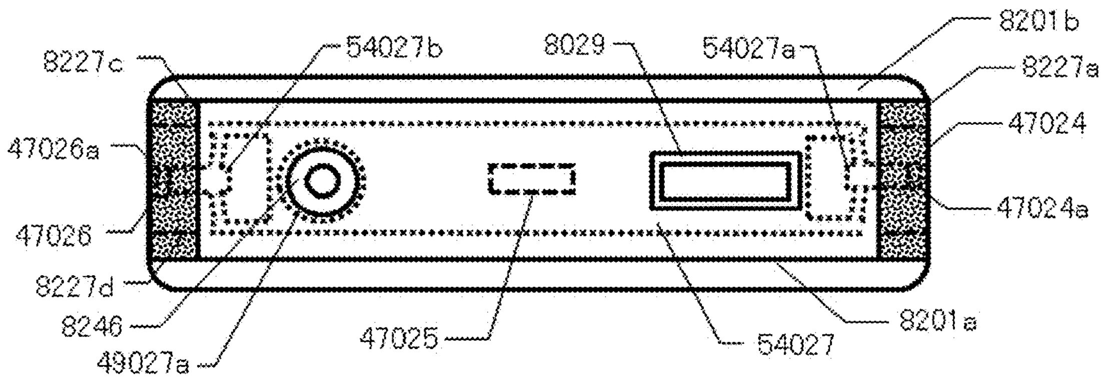
Figure 235B:
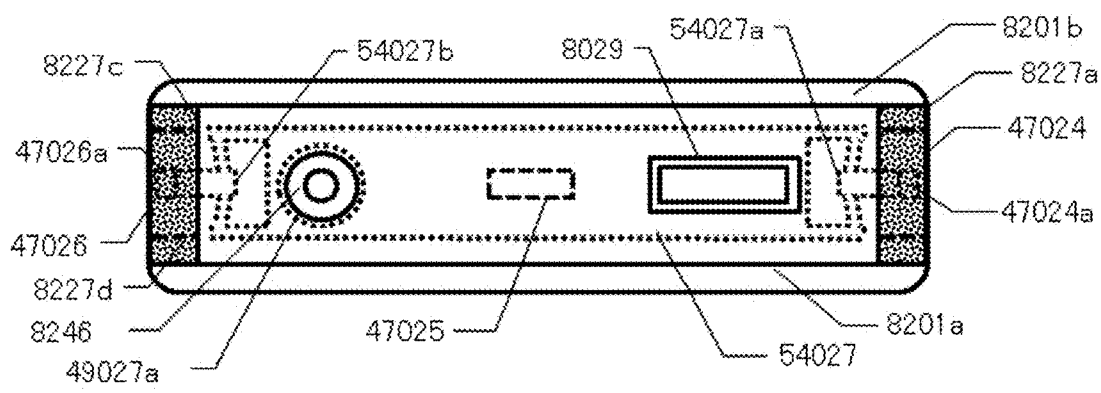
Figure 235A:
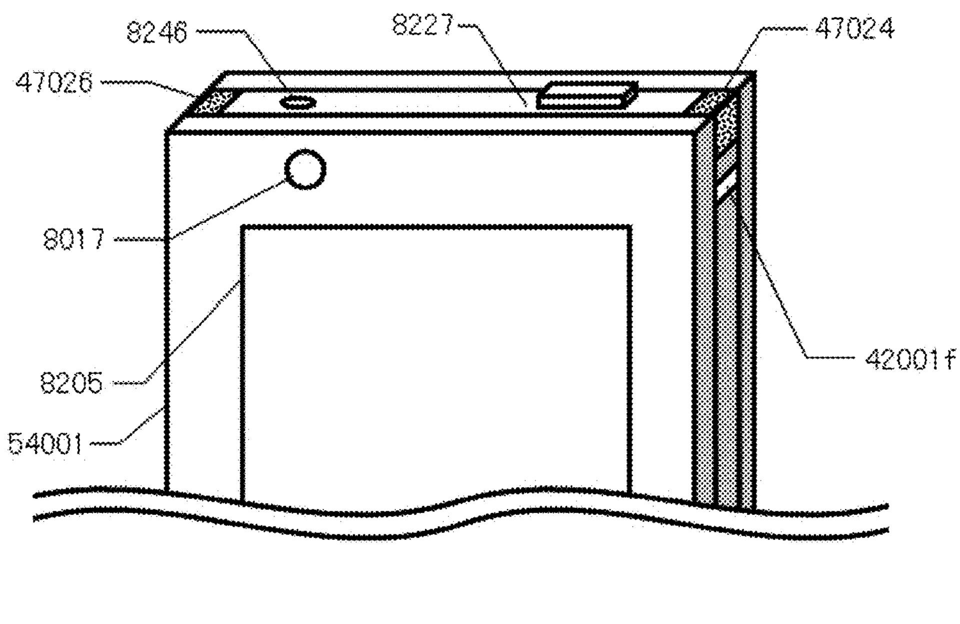

FIGS. 132A, 132B and 132C depict graphs relating to the eighty-sixth embodiment of FIG. 131, which show image depictions of frequency characteristics of a piezoelectric bimorph element, of ear cartilage, and of the drive output to the piezoelectric bimorph element;

FIG. 133 is a flowchart of a controller in the eighty-sixth embodiment of FIG. 131;

FIGS. 134A and 134B depicts perspective views showing a modification example of the eighty-sixth embodiment of FIG. 131;

FIG. 135 is a block diagram relating to an eighty-seventh embodiment of the present invention (eighty-seventh embodiment);

FIGS. 136A, 136B, 136C, 136D and 136E are perspective views and cross sectional views relating to an eighty-eighth embodiment of the present invention (eighty-eighth embodiment);

FIGS. 137A and 137B are side views describing a call condition in the eighty-eighth embodiment of FIGS. 136A, 136B, 136C. 136D and 136E;

FIGS. 138A, 138B, 138C and 138D depicts cross sectional views showing modification examples of the eighty-eighth embodiment of FIG. 136;

FIGS. 139A and 139B are system configuration diagrams of an eighty-ninth embodiment of the present invention (eighty-ninth embodiment);

FIGS. 140A and 140B are system configuration diagrams of a ninetieth embodiment of the present invention (ninetieth embodiment);

FIGS. 141A, 141B and 141C are cross sectional views and a block diagram relating to a ninety-first embodiment of the present invention (ninety-first embodiment);

FIGS. 142A and 142B are system configuration diagrams of a ninety-second embodiment of the present invention (ninety-second embodiment);

FIGS. 143A, 143B and 143C depict side views of an ear, for showing a modification example of the ninety-second embodiment;

FIGS. 144A and 144B are back views and block diagrams of a ninety-third embodiment of the present invention (ninety-third embodiment);

FIGS. 145A and 145B are back cross sectional views and block diagrams of a ninety-fourth embodiment of the present invention (ninety-fourth embodiment);

FIG. 146 is a block diagram of a ninety-fifth embodiment of the present invention (ninety-fifth embodiment);

FIGS. 147A, 147B and 147C are perspective views and cross-sectional views of a ninety-sixth embodiment of the present invention (ninety-sixth embodiment);

FIG. 148 is a block view of a mobile telephone portion of the ninety-sixth embodiment of FIGS. 147A, 147B, and 147C;

FIG. 149 is flowchart showing the function of a control unit of the ninety-sixth embodiment of FIG. 148;

FIGS. 150A, 150B, 150C and 150D are front perspective views of a ninety-seventh embodiment of the present invention (ninety-seventh embodiment);

FIG. 151 is a flowchart showing the control unit function of the ninety-seventh embodiment of the present invention;

FIG. 152 is a flowchart showing the details of step S554 and step S560 of FIG. 150;

FIGS. 153A, 153B and 153C are cross-sectional views and block views related to a ninety-eighth embodiment of the present invention (ninety-eighth embodiment);

FIG. 154 is a table showing measurement values of the ninety-eighth embodiment;

FIG. 155 is a circuit diagram showing the details of a combination circuit of a voltage booster circuit and an analog output amplifier that can be used in the seventy-fourth embodiment and the seventy-fifth embodiment shown in FIG. 114 and FIG. 115;

FIGS. 156A and 156B are diagrams of the system of a ninety-ninth embodiment of the present invention (ninety-ninth embodiment);

FIGS. 157A, 157B, 157C and 157D are side views of the ear-hooking unit in the various modifications of the ninety-ninth embodiment of FIGS. 156A, and 156B;

FIGS. 158A, 158B and 158C are perspective views and cross-sectional views of a one-hundredth embodiment of the present invention (one-hundredth embodiment);

FIGS. 159A and 159B are schematic cross-sectional views and circuit diagrams showing the details of the structure of the piezoelectric bimorph of the one-hundredth embodiment shown in FIGS. 158A, 158B and 158C;

FIGS. 160A, 160B, 160C, 160D and 160E are cross-sectional views for describing the configuration for mass-producing the piezoelectric bimorph module in the one-hundredth embodiment of FIGS. 158A, 158B and 158C;

FIG. 161 is a block view related to a one-hundred first embodiment of the present invention (one-hundred first embodiment);

FIG. 162 is a block view of a first modification of the one-hundred first embodiment shown in FIG. 161;

FIG. 163 is a block view of a second modification of the one-hundred first embodiment shown in FIG. 161;

FIGS. 164A and 164B are partially cutaway detailed circuit diagrams of when the feature of the one-hundred first embodiment of FIG. 161 has been applied to the circuit of FIG. 155;

FIG. 165 is a block view related to a one-hundred second embodiment of the present invention (one-hundred first embodiment);

FIG. 166 is a flowchart showing the function of the application processor in the one-hundred second embodiment;

FIGS. 167A, 167B, 167C, 167D, 167E and 167F are graphs for visually showing the frequency characteristics of the one-hundred second embodiment;

FIGS. 168A, 168B, 168C, 168D and 168E are perspective views and cross-sectional views of a one-hundred third embodiment of the present invention (one-hundred third embodiment);

FIG. 169 is an enlarged cross-sectional view of the principal elements of the one-hundred third embodiment shown in FIG. 168(D);

FIGS. 170A, 170B, 170C and 170D are perspective views and cross-sectional views of a one-hundred fourth embodiment of the present invention (one-hundred fourth embodiment);

FIG. 171 is a block view related to a one-hundred fifth embodiment of the present invention (one-hundred fifth embodiment);

FIG. 172 is an expanded system block view of the one-hundred fifth embodiment of FIG. 171;

FIG. 173 is a flowchart of the control unit of the mobile telephone in the one-hundred fifth embodiment of FIG. 171;

FIG. 174 is a flowchart of the control unit of the headset in the one-hundred fifth embodiment of FIG. 171;

FIG. 175 is a block view related to a one-hundred sixth embodiment of the present invention (one-hundred sixth embodiment);

FIGS. 176A, 176B, 176C and 176D are schematic views for describing an image of the automatic adjustment of the direction of directivity and the sharpness of the directivity of the microphone in the one-hundred sixth embodiment of FIG. 175;

FIG. 177 is a flowchart of the control unit of the mobile telephone in the one-hundred sixth embodiment of FIG. 175;

FIGS. 178A, 178B, 178C, 178D and 178E are perspective views and cross-sectional views related to a one-hundred seventh embodiment of the present invention (one-hundred seventh embodiment);

FIG. 179 is a graph of Fletcher and Munson equal-loudness curves;

FIG. 180 is a flowchart of the application processor in the one-hundred seventh embodiment of FIGS. 178A, 178B, 178C, 178D and 178E, which calls on FIG. 87;

FIGS. 181A, 181B, 181C, 181D, 181E and 181F are cross-sectional views relating to a one-hundred eighth embodiment and a modification thereof of the present invention (one-hundred eighth embodiment);

FIGS. 182A, 182B, 182C, 182D, 182E, 182F and 182G are schematic views of a one-hundred ninth embodiment of the present invention (one-hundred ninth embodiment);

FIGS. 183A, 183B, 183C, 183D and 183E are schematic views of one-hundred tenth embodiment of the present invention (one-hundred tenth embodiment);

FIGS. 184A, 184B, 184C and 184D are schematic views of one-hundred eleventh embodiment of the present invention (one-hundred eleventh embodiment);

FIGS. 185A, 185B, 186C and 185D are schematic views of one-hundred twelfth embodiment of the present invention (one-hundred twelfth embodiment);

FIGS. 186A, 186B, 186C, 186D and 186E are schematic views of one-hundred thirteenth embodiment of the present invention (one-hundred thirteenth embodiment);

FIGS. 187A, 187B, 187C, 187D and 187E are schematic views of a one-hundred fourteenth embodiment of the present invention (one-hundred fourteenth embodiment);

FIGS. 188A, 188B. 188C, 188D, 188E and 188F are schematic views of one-hundred fifteenth embodiment of the present invention (one-hundred fifteenth embodiment);

FIGS. 189A, 189B, 189C, 189D, 189E and 189F are schematic views of one-hundred sixteenth embodiment of the present invention (one-hundred sixteenth embodiment);

FIGS. 190A, 190B, 190C and 190D are schematic views of a one-hundred seventeenth embodiment of the present invention (one-hundred seventeenth embodiment);

FIGS. 191A and 191B are conceptual perspective views of the one-hundred seventeenth embodiment of FIGS. 190A, 190B, 190C and 190D;

FIGS. 192A, 192B, 192C and 192D are cross-sectional schematic views of a one-hundred eighteenth embodiment of the present invention (one-hundred eighteenth embodiment);

FIGS. 193A, 193B and 193C are schematic views and block views of a one-hundred nineteenth embodiment of the present invention (one-hundred nineteenth embodiment);

FIGS. 194A, 194B, 194C, 194D and 194E are schematic views of a one-hundred twentieth embodiment of the present invention (one-hundred twentieth embodiment);

FIGS. 195A, 195B, 195C and 195D are schematic views of a one-hundred twenty-first embodiment of the present invention (one-hundred twenty-first embodiment);

FIGS. 196A, 196B, 196C and 196D are schematic views of a one-hundred twenty-second embodiment of the present invention (one-hundred twenty-second embodiment);

FIGS. 197A, 197B, 197C and 197D are schematic views of a one-hundred twenty-third embodiment of the present invention (one-hundred twenty-third embodiment);

FIG. 198 is a schematic view of a one-hundred twenty-fourth embodiment of the present invention (one-hundred twenty-fourth embodiment);

FIG. 199 is an enlarged cross-sectional view of the elements and a block view of the one-hundred twenty-fourth embodiment shown in FIG. 198;

FIG. 200 is a flowchart of the control unit of the one-hundred twenty-fourth embodiment of FIG. 199;

FIG. 201 is an enlarged cross-sectional view of the elements and a block view of the one-hundred twenty-fifth embodiment of the present invention (one-hundred twenty-fifth embodiment);

FIG. 202 is an enlarged cross-sectional view of the elements and a block view of the one-hundred twenty-sixth embodiment of the present invention (one-hundred twenty-sixth embodiment);

FIG. 203 is an enlarged cross-sectional view of the elements and a block view of the one-hundred twenty-seventh embodiment of the present invention (one-hundred twenty-seventh embodiment);

FIG. 204 is a system configuration diagram of a one-hundred twenty-eighth embodiment of the present invention (one-hundred twenty-eighth embodiment);

FIG. 205 is a system block diagram of the one-hundred twenty-eighth embodiment shown in FIG. 204;

FIG. 206 is a flow chart showing the function of a mobile telephone according to the one-hundred twenty-eighth embodiment;

FIG. 207 is a system configuration diagram of a one-hundred twenty-ninth embodiment of the present invention (one-hundred twenty-ninth embodiment);

FIGS. 208A, 208B and 208C are schematic diagrams of a one-hundred thirtieth embodiment of the present invention (one-hundred thirtieth embodiment);

FIGS. 209A, 209B and 209C are schematic diagrams of a one-hundred thirty-first embodiment of the present invention (one-hundred thirty-first embodiment);

FIGS. 210A, 210B and 210C are schematic diagrams of a one-hundred thirty-second embodiment of the present invention (one-hundred thirty-second embodiment);

FIGS. 211A, 211B and 211C are schematic diagrams of a one-hundred thirty-third embodiment of the present invention (one-hundred thirty-third embodiment);

FIG. 212 is a system configuration diagram of a one-hundred thirty-fourth embodiment of the present invention (one-hundred thirty-fourth embodiment);

FIGS. 213A and 213B are diagrams illustrating a call-conducting posture in the one-hundred thirty-fourth embodiment in FIG. 212;

FIGS. 214A, 214B and 214C are diagrams illustrating another call-conducting posture in the one-hundred thirty-fourth embodiment in FIG. 212;

FIG. 215 is a system block diagram of the one-hundred thirty-fourth embodiment;

FIG. 216 is a flow chart showing the function of a wrist watch-type handset in the one-hundred thirty-fourth embodiment;

FIG. 217 is a system configuration diagram of a one-hundred thirty-fifth embodiment of the present invention (one-hundred thirty-fifth embodiment);

FIGS. 218A and 218B are enlarged front views of an ID name tag-type handset of the one-hundred thirty-fifth embodiment;

FIGS. 219A and 219B are enlarged front view of an ID name tag-type handset of the one-hundred thirty-fifth embodiment, in a different display state;

FIG. 220 is a system block diagram of the one-hundred thirty-fifth embodiment;

FIG. 221 is a flow chart of a control unit in an ID name tag-type handset of the one-hundred thirty-fifth embodiment;

FIGS. 222A, 222B, 222C and 222D comprise a perspective views and sectional views of a one-hundred thirty-sixth embodiment of the present invention (one-hundred thirty-sixth embodiment);

FIGS. 223A, 223B, 223C, 223D, 223E and 223F comprise sectional views of a one-hundred thirty-seventh embodiment of the present invention and a modified example thereof (one-hundred thirty-seventh embodiment);

FIGS. 224A, 224B, 224C and 224D comprise perspective views and sectional views of a one-hundred thirty-eighth embodiment of the present invention (one-hundred thirty-eighth embodiment);

FIGS. 225A, 225B, 225C and 225D comprise perspective views and sectional views of a one-hundred thirty-ninth embodiment of the present invention (one-hundred thirty-ninth embodiment);

FIGS. 226A, 226B, 226C, 226D and 226E comprise perspective views and sectional views of a one-hundred fortieth embodiment of the present invention (one-hundred fortieth embodiment);

FIGS. 227A, 227B, 227C and 227D comprise perspective views and sectional views of a one-hundred forty-first embodiment of the present invention (one-hundred forty-first embodiment);

FIGS. 228A, 228B, 228C, 228D and 228E comprise perspective views and sectional views of a one-hundred forty-second embodiment of the present invention (one-hundred forty-second embodiment);

FIGS. 229A, 229B, 229C, 229D and 229E comprise perspective views and sectional views of a one-hundred forty-third embodiment of the present invention (one-hundred forty-third embodiment);

FIGS. 230A, 230B and 230C are schematic diagrams of a one-hundred forty-fourth embodiment of the present invention (one-hundred forty-fourth embodiment);

FIGS. 231A, 231B, 231C, 231D and 231E comprise perspective views, sectional views, a top view, and a side view of a one-hundred forty-fifth embodiment of the present invention (one-hundred forty-fifth embodiment);

FIGS. 232A, 232B and 232C comprise perspective views and top views of a one-hundred forty-sixth embodiment of the present invention (one-hundred forty-sixth embodiment);

FIG. 233 is a block diagram of a one-hundred forty-seventh embodiment of the present invention (one-hundred forty-seventh embodiment);

FIG. 234 is a flow chart of an application processor in the one-hundred forty-seventh embodiment;

FIGS. 235A, 235B and 235C comprise perspective views and top views of a one-hundred forty-eighth embodiment of the present invention (one-hundred forty-eighth embodiment);

FIGS. 236A, 236B, 236C, 236D and 236E comprise perspective views, sectional views, a top view, and a side view of a one-hundred forty-ninth embodiment of the present invention (one-hundred forty-ninth embodiment);

FIGS. 237A, 237B, 237C and 237D comprise schematic diagrams of a side face of an ear and a top face of a head during use of the one-hundred forty-ninth embodiment in FIG. 236;

FIGS. 238A, 238B, 238C and 238D comprise perspective views showing examples of explanations of methods for using a mobile telephone in the one-hundred forty-ninth embodiment shown in FIGS. 237A, 237B, 237C and 237D; and FIGS. 239A, 239B, 239C and 239D comprise perspective views, sectional views, and a top view showing a one-hundred fiftieth embodiment of the present invention (one-hundred fiftieth embodiment).

SOLUTION TO PROBLEM

First Embodiment

Figure 1:
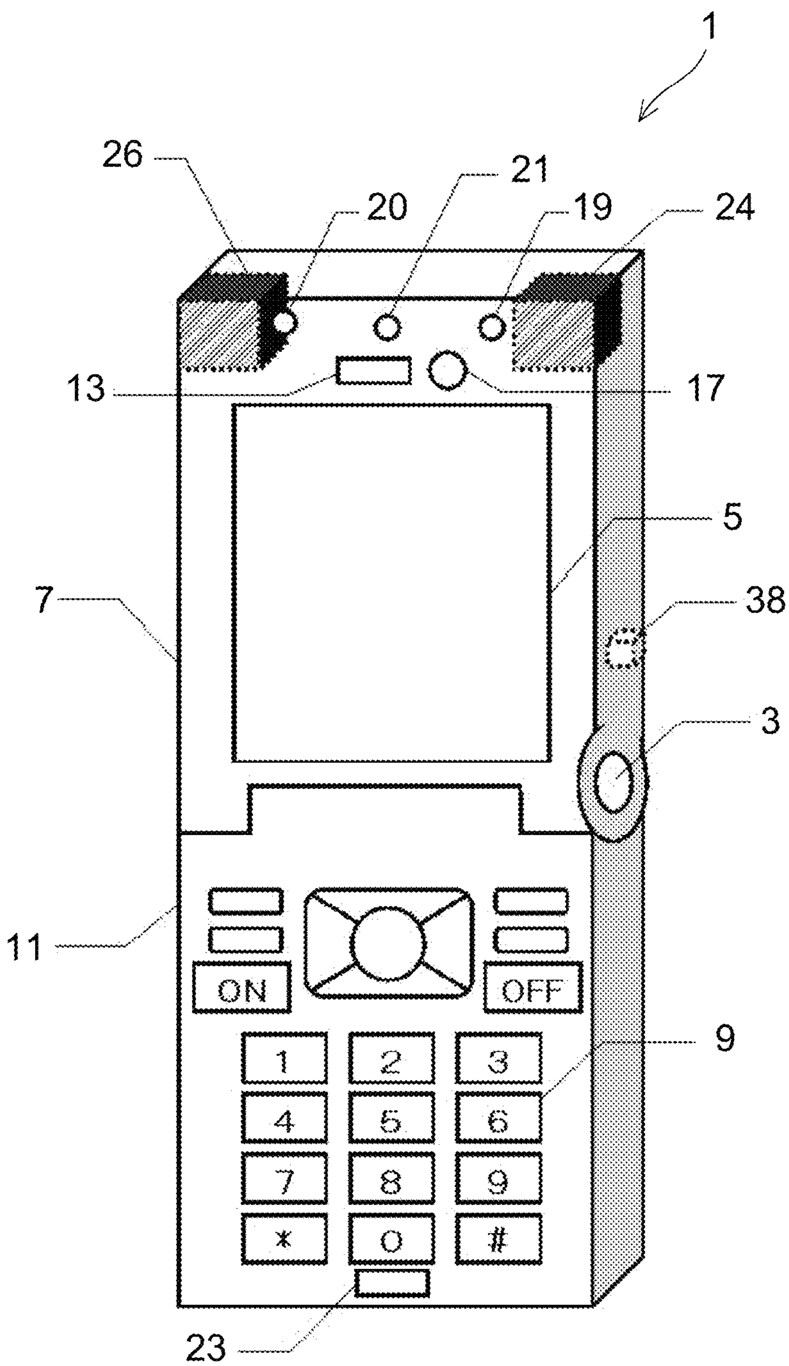
FIG. 1 is a perspective view illustrating a first embodiment of a mobile telephone according to an aspect of the present invention (first embodiment)

FIG. 1 is a perspective view illustrating a first embodiment of the mobile telephone according to an aspect of the present invention. In FIG. 1, a mobile telephone 1 comprises an upper part 7 having a display unit 5 or the like, and a lower part 11 having a keypad or other operation unit 9 and a microphone or other outgoing-talk unit 23 for picking up audio uttered from the mouth of an operator, and is configured such that the upper part 7 can be folded onto the lower part 11 by a hinge unit 3. An earphone or other incoming-talk unit 13 for transmitting audio to an ear of the operator is provided to the upper unit 7, and together with the outgoing-talk unit 23 of the lower part 11 constitutes a telephone function unit. A videoconferencing in-camera 17, which is able to photograph the face of an operator looking at the display unit 5 in a case in which the mobile telephone 1 is to be used as a video phone and which is also used when a self-portrait is taken, is also arranged on the upper part 7. The upper part 7 is further provided with a pair of infrared light emitting units 19, 20 constituting a proximity sensor for detecting that the mobile telephone 1 is abutting an ear for purposes of a call, and with a shared infrared light proximity sensor 21 for receiving infrared light reflected from the ear. Although not shown in FIG. 1, a backside camera is provided to the backside of the upper part 7, and the camera is able to capture an image of a subject that is on the backside of the mobile telephone 1 and is being monitored with the display unit 5.

The upper part 7 is further provided with a right-ear cartilage-conduction vibration unit 24 and a left-ear cartilage-conduction vibration unit 26, which comprise a piezoelectric bimorph element or the like for contacting the tragus, at the upper corner of the inside (the side that touches the ear). The right-ear cartilage-conduction vibration unit 24 and the left-ear cartilage-conduction vibration unit 26 are constituted so as not to protrude from the outer wall of the mobile telephone and hinder the design, but are provided to the corners of the outer wall of the mobile telephone whereby contact is effectively made with the tragus. It is thereby possible both to listen to the audio from the incoming-talk unit 13, and to listen by bone conduction from the cartilage of the tragus. Also, as has been disclosed in the above-mentioned Patent Document 2, the tragus is known to receive the greatest auditory sensation among the mastoid process of the ear, the cartilage surface of the rear of the opening of the outer ear, the tragus, the sideburn part, and all the other constituents of the ear cartilage; and is known to have a greater elevation in the bass register than other locations when pressure is increased by pushing. This knowledge is described in detail in Patent Document 2, for which reference can accordingly be made thereto.

The mobile telephone 1 rotates slightly clockwise when brought up against the right ear in FIG. 1, and takes on a downward-right state in FIG. 1. Providing the right-ear cartilage-conduction vibration unit 24 to the lower angle of incline of the upper end of the ear side of such a mobile telephone makes it possible to naturally bring the right-ear cartilage-conduction vibration unit 24 in contact with the tragus of the right ear without causing the vibration unit to protrude from the outer wall of the mobile telephone. This state is a posture approximating the normal state of a telephone call, and is awkward for neither the person making the telephone call nor any onlookers. Because the incoming-talk unit 13 is in the vicinity of the right-ear cartilage-conduction vibration unit 24, audio information through the tragus cartilage and audio information through the external auditory meatus will both be transmitted to the ear. At this time, because the same audio information will be transmitted by different sound-generating pairs and pathways, the phasing between the two is adjusted so as to prevent the same from canceling each other out.

On the other hand, the mobile telephone 1 rotates slightly counter-clockwise when brought up against the left ear in FIG. 1, and takes on a downward-left state in FIG. 1. The state becoming such that the left-ear cartilage-conduction vibration unit 26 is provided to the lower angle of incline of the upper end of the ear side of the mobile telephone, it is possible to naturally bring the left-ear cartilage-conduction vibration unit 26 into contact with the tragus of the left ear, as is the case with the right ear. Because this state is a posture approximating the normal state of a telephone call, and because the incoming-talk unit 13 is in the vicinity of the left-ear cartilage-conduction vibration unit 26 and both audio information through the tragus cartilage and audio information through the external auditory meatus are transmitted to the ear, the fact that the phasing between the two is adjusted is similar to the case of the right ear.

Because the pair of infrared light emitting units 19, 20 in the above-described proximity sensor emit light alternating in time division, the shared infrared light proximity sensor 21 is able to identify from which light-emitting unit the reflective light coming from the infrared light has been received, and is thereby able to judge which of the right-ear cartilage-conduction vibration unit 24 and the left-ear cartilage-conduction vibration unit 26 has been brought up against the tragus. It is thereby possible to determine at which ear the mobile telephone 1 is being used, and to cause the vibration unit of the side against which the tragus abuts to vibrate and to turn off the other one. However, because of the individual variations regarding up to which ear the mobile telephone 1 is brought and regarding the shape of the ear, the first embodiment is configured such that, as will be described later, an acceleration sensor is further housed, the direction in which the mobile telephone 1 is inclined being detected by the gravitational acceleration detected by the acceleration sensor, and the vibration unit on the side at the lower angle of incline is made to vibrate while the other is turned off. The aforementioned right ear use and left ear use will again be described, using the drawings adapted to the respective modes of use.

The upper part 7 is further provided with an environment-noise microphone 38, which is arranged on the outside (the back surface not brought up against the ear) so as to pick up environment noise, and which is implemented as means for preventing conduction of the vibration of the right-ear cartilage-conduction vibration unit 24 and the left-ear cartilage-conduction vibration unit 26. The environment-noise microphone 38 further picks up audio uttered from the mouth of the operator. The environment noise picked up by the environment-noise microphone 38 and the operator's own voice, upon undergoing wavelength inversion, are mixed into the right-ear cartilage-conduction vibration unit 24 and the left-ear cartilage-conduction vibration unit 26; the environment noise and the operator's own voice, which are contained in the audio information through the incoming-talk unit 13, are canceled to facilitate listening comprehension of the party on the line. A more detailed description of this function will be provided later.

Figure 2A:
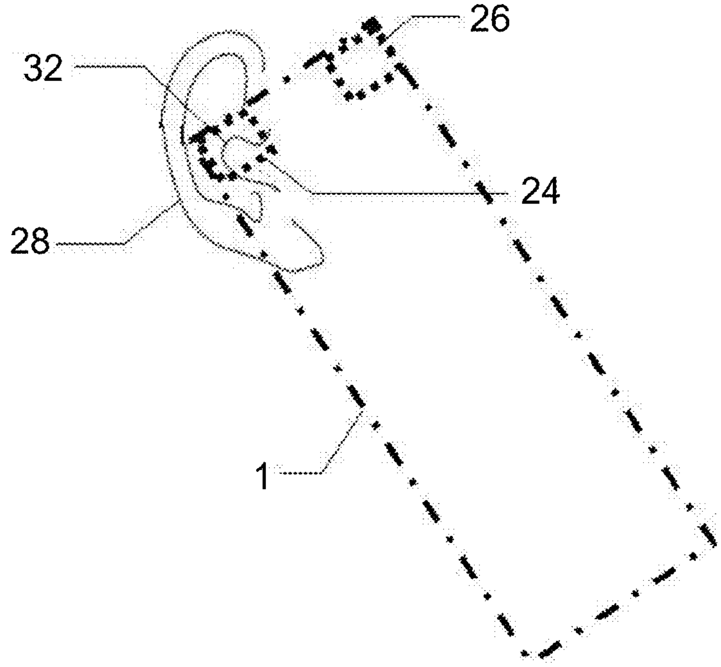
FIG. 2A and FIG. 2B are side views of the first embodiment illustrating the functions of the state of right ear use and the state of left ear use.
Figure 2B:
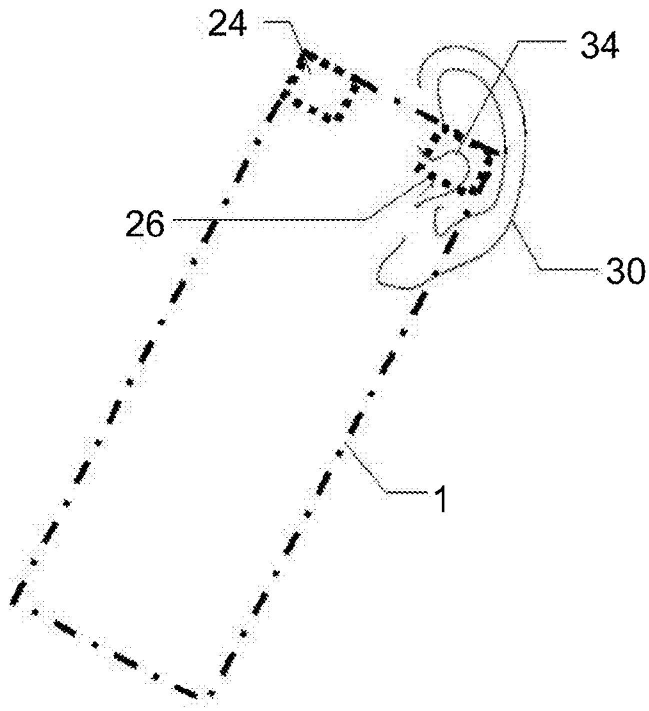

FIG. 2 is a side view of the mobile telephone 1 illustrating the functions of the right-ear cartilage-conduction vibration unit 24 and left-ear cartilage-conduction vibration unit 26; FIG. 2A illustrates a state in which the mobile telephone 1 is held in the right hand and brought up against the right ear 28. On the other hand, FIG. 2B illustrates a state in which the mobile telephone 1 is held in the left hand and brought up against the left ear 30. FIG. 2A is a drawing viewed from the right side of the face, and FIG. 2B is a drawing viewed from the left side of the face; therefore, each show the back surface of the mobile telephone 1 (the reverse side of FIG. 1). The mobile telephone 1 is indicated by dashed lines, in order to depict the relationship between the mobile telephone 1 and the right ear 28 and left ear 30.

As illustrated in FIG. 2A, the mobile telephone 1 is inclined slightly counterclockwise (the relationship of the reverse surface with FIG. 1) in FIG. 2 when the same is brought up against the right ear 28, and takes on a diagonally downward-left state in FIG. 2. Because the right-ear cartilage-conduction vibration unit 24 is provided to the lower angle of incline of the upper end of the ear side of such a mobile telephone, the same can naturally be brought into contact with the tragus 32 of the right ear 28. As has already been described, this state is a posture approximating the normal state of a telephone call, and is awkward neither to the person making the telephone call nor to onlookers. On the other hand, as illustrated in FIG. 2B, the mobile telephone 1 is inclined slightly clockwise (the relationship of the reverse side with FIG. 1) in FIG. 2 when the same is brought up against the left ear 30, and takes on a diagonally downward-right state in FIG. 2. Because the left-ear cartilage-conduction vibration unit 26 is provided to the lower angle of incline of the upper end of the ear side of such a mobile telephone, the same can naturally be brought into contact with the tragus 34 of the left ear 30. This state as well, as is the case with the right ear 28, is a posture approximating the normal state of a telephone call, and is awkward neither to the person making the telephone call nor to onlookers.

Figure 3:
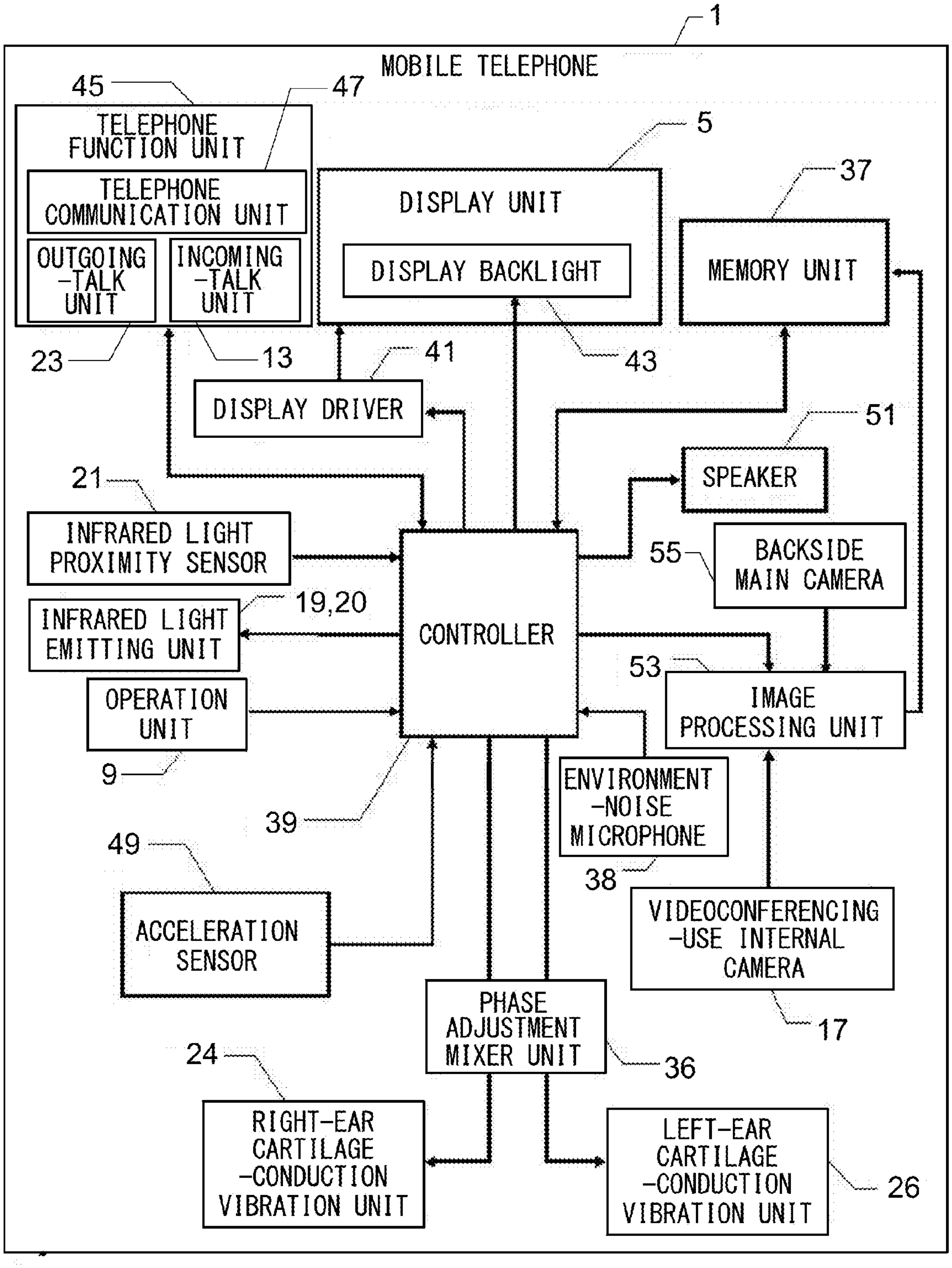
FIG. 3 is a block diagram of the first embodiment.

FIG. 3 is a block diagram of the first embodiment, the same portions being given the same reference numerals as in FIG. 1, and a description having been omitted unless necessary. The mobile telephone 1 is controlled by a controller 39, which operates in accordance with a program stored in a memory unit 37. The memory unit 37 is further able to temporarily store data needed for the control of the controller 39 and also to store various measurement data and/or images. The display unit 5 displays on the basis of the control of the controller 39 and on the basis of display data held by a display driver 41. The display unit 5 has a display backlight 43, the controller 39 adjusting the brightness thereof on the basis of the brightness of the surroundings.

A telephone function unit 45, which includes the incoming-talk unit 13 and the outgoing-talk unit 23, is capable of connecting with a wireless telephone line using a telephone communication unit 47, which is under the control of the controller 39. A speaker 51 provides ring alerts and various types of guidance by the control of the controller 39, and also outputs the other party's voice during a videoconferencing function. The audio output of the speaker 51 is not to be outputted from the right-ear cartilage-conduction vibration unit 24 and the left-ear cartilage-conduction vibration unit 26, because it is not possible to bring a cartilage conduction vibration unit up against the ear during a videoconferencing function. An image processing unit 53 is controlled with the controller 39 and processes an image photographed by a videoconferencing function in-camera 17 and a backside main camera 55, and inputs the image resulting from the processing into the memory unit 37.

As described above, the pair of infrared light emitting units 19, 20 in the proximity sensor emit light alternating in time division on the basis of the control of the controller 39. Accordingly, the reflected infrared light inputted into the controller 39 by the shared infrared light proximity sensor 21 allows for identification of reflected light by the infrared light from either light-emitting unit. When reflected light is detected from both the infrared light emitting units 19, 20, the controller 39 runs a cross comparison to determine which of the right-ear cartilage-conduction vibration unit 24 and left-ear cartilage-conduction vibration unit 26 has been brought up against the tragus. Further, the acceleration sensor 49 detects the orientation of the detected gravitational acceleration. The controller 39 determines, on the basis of the detection signal, whether the mobile telephone 1 is inclined in the state of FIG. 2A or FIG. 2B; as has been described with FIG. 2, the vibration unit on the side at the lower angle of incline is made to vibrate and the other is turned off The mobile telephone 1 further possesses a phase adjustment mixer unit 36 for running phase adjustment for the audio information from the controller 39 and for transmitting to the right-ear cartilage-conduction vibration unit 24 and left-ear cartilage-conduction vibration unit 26. More specifically, the phase adjustment mixer unit 36 uses the audio information transmitted to the incoming-talk unit 13 from the controller 39 as a benchmark to run phase adjustment for the audio information from the controller 39 and transmits to the right-ear cartilage-conduction vibration unit 24 and left-ear cartilage-conduction vibration unit 26, in order to prevent the mutual canceling out of the audio information generated from the incoming-talk unit 13 and transmitted via the tympanic membrane from the external auditory meatus and of the same audio information generated from either the right-ear cartilage-conduction vibration unit 24 or left-ear cartilage-conduction vibration unit 26 and transmitted via the cartilage of the tragus. The phase adjustment is a relative adjustment between the incoming-talk unit 13 and the right-ear cartilage-conduction vibration unit 24 and left-ear cartilage-conduction vibration unit 26, and therefore the configuration may be such that the audio information transmitted from the controller 39 to the right-ear cartilage-conduction vibration unit 24 and left-ear cartilage-conduction vibration unit 26 is used as a benchmark for adjusting the phase of the audio information transmitted from the controller 39 to the incoming-talk unit 13. In this case, the audio information to the speaker 51 is also adjusted in the same phase as the audio information to the incoming-talk unit 13.

In addition to having the first function described above of preventing the mutual canceling out of the audio information from the incoming-talk unit 13 and the identical audio information from the right-ear cartilage-conduction vibration unit 24 or the left-ear cartilage-conduction vibration unit 26, the phase adjustment mixer unit 36 also has a second function through collaboration with the environment-noise microphone 38. In this second function, the environment noise picked up by the environment-noise microphone 38 and the operator's own voice, upon undergoing wavelength inversion by the phase adjustment mixer unit 36, are mixed into the audio information of the right-ear cartilage-conduction vibration unit 24 or the left-ear cartilage-conduction vibration unit 26; the environment noise and the operator's own voice, which are contained in the audio information through the incoming-talk unit 13, are thereby canceled to facilitate listening comprehension of the audio information of the party on the line. At this time, the mixing is done also taking into consideration the phase adjustment that is based on the first function, so as to effectively cancel out the environment noise and the operator's own voice regardless of the different transmission routes of the audio information from the incoming-talk unit 13 and the audio information from either the right-ear cartilage-conduction vibration unit 24 or the left-ear cartilage-conduction vibration unit 26.

Figure 4:
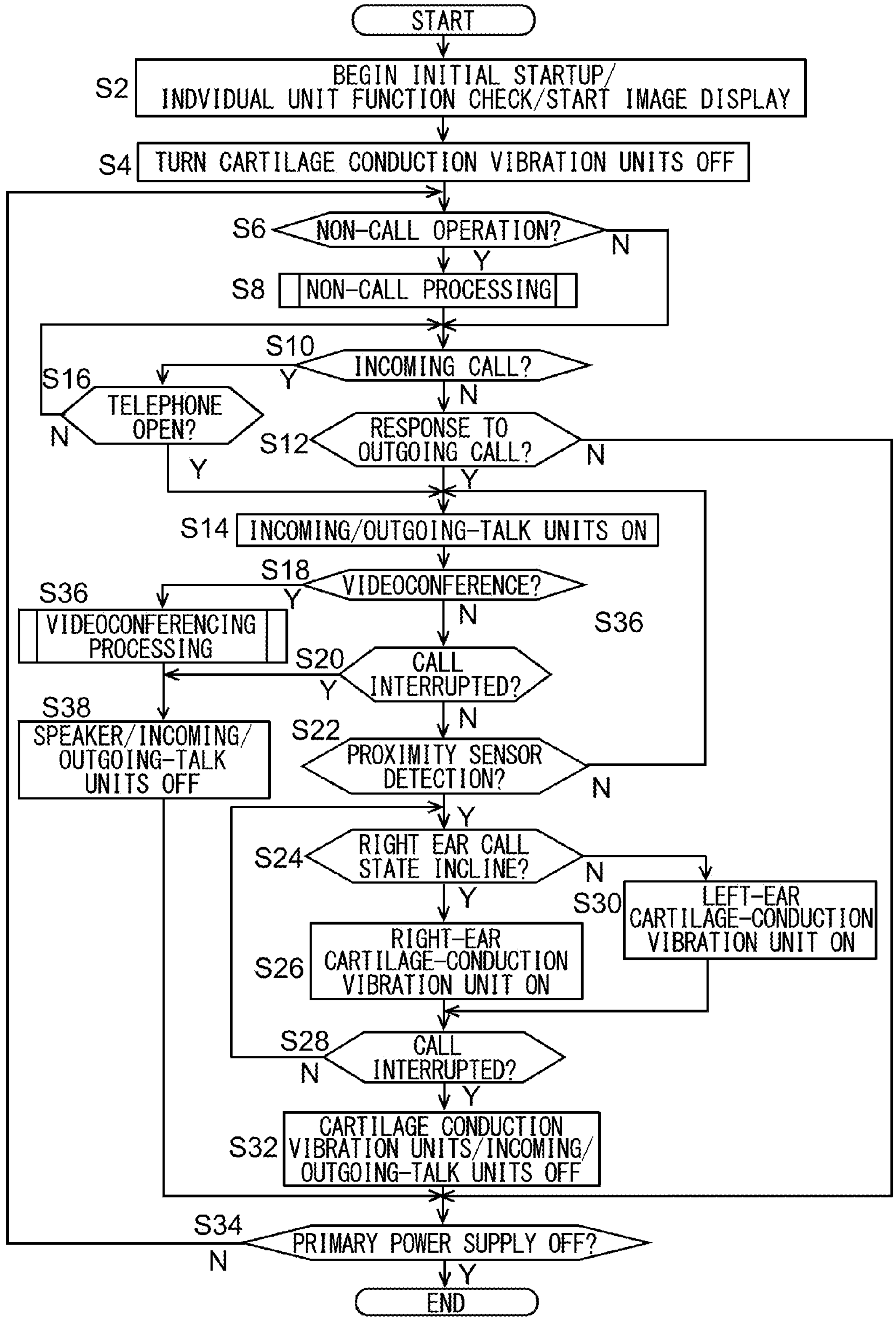
FIG. 4 is a flowchart of the operation of a controller in the first embodiment of FIG. 2A and FIG. 2B.

FIG. 4 is a flowchart of the operation of the controller 39 in the first embodiment of FIG. 2. To provide a description primarily of the function of the right-ear cartilage-conduction vibration unit 24 and the left-ear cartilage-conduction vibration unit 26, the flow of FIG. 4 illustrates an abstraction of the operation, focusing on related functions; the controller 39 also contains typical mobile telephone functions and other operations not represented in the flow of FIG. 4. The flow of FIG. 4 begins when a main power source is turned on by the operation unit 9 of the mobile telephone 1; and in step S2 an initial startup and a check of each unit function are performed and a screen display on the display unit 5 is started. Next, in step S4, the functions of the right-ear cartilage-conduction vibration unit 24 and left-ear cartilage-conduction vibration unit 26 are turned off to proceed on to step S6. Step S6 is a check of the presence or absence of an e-mail operation and/or Internet operation, as well as other operations in which radio operations are not used, such as various settings and also downloaded games (which hereinafter are collectively referred as "non-call operations"). In the case of these operations, execution proceeds on to step S8 for non-call processing, and then arrives at step S10. However, the function in non-call operations is not assumed to be a function of the incoming-talk unit 13 and/or the right-ear cartilage-conduction vibration unit 24 and left-ear cartilage-conduction vibration unit 26 in the upper part 7 of the mobile telephone 1 that is performed brought up against the ear. On the other hand, step S6 proceeds directly on to step S10 when no non-call operations are detected.

In step S10, there is performed a check for whether or not there is an incoming call by mobile radio waves. A case of no incoming call proceeds on to step S12; there is performed a check for whether or not there has been a response from the other party to a call request from the mobile telephone 1. A case in which a response is detected proceeds on to step S14. On the other hand, a case in which it is detected by mobile radio waves in step S10 that there is an incoming call moves on to step S16, in which there is performed a check for whether the mobile telephone 1 is open; i.e., a check for whether the upper part 7 has gone from a state of being folded over the lower part 11 to an opened state as in FIG. 1. A case in which it is not possible to detect that the mobile telephone 1 is open returns to step S10; thereafter, step S10 and step S16 are repeated and the flow pauses for the mobile telephone 1 to be open. However, when, during this repetition, the incoming call is terminated while the mobile telephone 1 remains unopened, the flow moves from step S10 to step S12. On the other hand, a case in which it has been detected in step S16 that the mobile telephone 1 is open proceeds to step S14. In step S14, the outgoing-talk unit 23 and the incoming-talk unit 13 are turned on to move on to step S18. In step S18, there is a check whether or not the call is a videoconferencing function, the flow moving on to step S20 when the call is not a videoconferencing function; at this point in time, there is a confirmation of whether or not the call is cut off, the flow moving on to step S22 when the call is not cut off In step S22, there is performed a check for whether or not the infrared light proximity sensor 21 detects contact with an ear, and the flow proceeds to step S24 when no contact is detected. On the other hand, in step S22 the flow returns to step S14 when the infrared light proximity sensor 21 does not detect contact with an ear; as follows, step S14 and from step S18 to S22 are repeated and detection by the proximity sensor in step S22 is awaited. In step S24, there is performed a check for whether an incline of the right ear call state has occurred as illustrated in FIG. 2A, on the basis of the detection signal of the acceleration sensor 49. In a case in which this is true, the flow proceeds to step S26; the right-ear cartilage-conduction vibration unit 24 is turned on, and the flow moves on to step S28. On the other hand, in a case in which it cannot be detected in step S24 that the incline of the right ear call state has occurred, the flow proceeds on to step S30 after the detection signal of the acceleration sensor 49 signifies that the left ear call state as illustrated in FIG. 2B has been detected; the left-ear cartilage-conduction vibration unit 26 is turned on, and the flow moves on to step S28.

In the above description of FIG. 4, the flow is described as proceeding on to step S24 regardless of whether the infrared reflected light detected by the infrared light proximity sensor 21 comes from the infrared light emitting unit 19 or 20, and in step S24 the signal of the acceleration sensor 49 is used to detect whether or not the incline is in the right ear call state. However, because the infrared light proximity sensor 21 can also be used to detect whether or not the incline is in the right ear call state, the configuration may be such that, instead of the signal of the acceleration sensor 49 in step S24, the incline is judged to be in the right ear call state when the output of the infrared light proximity sensor 21 in the light-emitting timing of the infrared light emitting unit 19 is greater than that in the light-emitting timing of the infrared light emitting unit 20. Also, the configuration in step S24 may be such that the judgment of whether or not the incline is in the right ear call state is made together with the signal of the acceleration sensor 49 and the results of a comparison of the outputs of the infrared light proximity sensor 21 in the light-emitting timings of the infrared light emitting units 19, 20.

In step S28, there is performed a check for whether or not the call state has been cut off, the flow returning to step S24 when the call has not been cut off; as follows, step S24 to step S30 are repeated until a call interruption is detected in step S28. Support is thereby provided for switching the hand holding the mobile telephone 1 during a call, between the right ear call state and the left ear call state. On the other hand, in a case in which a call interruption is detected in step S28, the flow moves on to step S32, in which either the right-ear cartilage-conduction vibration unit 24 or the left-ear cartilage-conduction vibration unit 26 that is in an on state, as well as the incoming-talk unit 13 and the outgoing-talk unit 23, are turned on, and the flow then moves on to step S34. On the other hand, in a case in which a call request response has been detected in step S12, the flow moves directly on to step S34. In a case in which there is detected to be a videoconferencing function in step S18, the flow moves on to the videoconferencing function processing of step S36. The videoconferencing function processing involves imaging one's face using the videoconferencing function in-camera 17, outputting the voice of the other party using the speaker 51, switching the sensitivity of the outgoing-talk unit 23, displaying the face of the other party on the display unit 5, or the like. Once such videoconferencing function processing has concluded, the flow proceeds to step S38, which turns off the speaker 51, the incoming-talk unit 13, and the outgoing-talk unit 23, whereupon the flow moves on to step S34. In a case in which a call interruption is detected in step S20, the flow also moves on to step S38, but since the speaker 51 is not originally turned on at that time, the incoming-talk unit 13 and the outgoing-talk unit 23 are turned off and the flow moves on to step S34.

In step S34, there is a check for the presence or absence of an operation to turn off the primary power source; the flow is terminated when there is a turning-off operation. On the other hand, when there is no detection of an operation to turn off the primary power source in step S34, the flow returns to step S6, whereupon steps S6 to step S38 are repeated. As described above, the right-ear cartilage-conduction vibration unit 24 or the left-ear cartilage-conduction vibration unit 26 will not be turned on when the mobile telephone 1 is not open, when the mobile telephone 1 is not in the call state, when the call state is enabled but is a videoconferencing function, or when an ordinary call state is enabled but the mobile telephone 1 is not brought up against the ear. Once the right-ear cartilage-conduction vibration unit 24 or the left-ear cartilage-conduction vibration unit 26 is in the on state, then as long as a call interruption is not detected, it will not be turned off except when on/off switching of the right-ear cartilage-conduction vibration unit 24 or the left-ear cartilage-conduction vibration unit 26 is performed.

Second Embodiment

Figure 5:
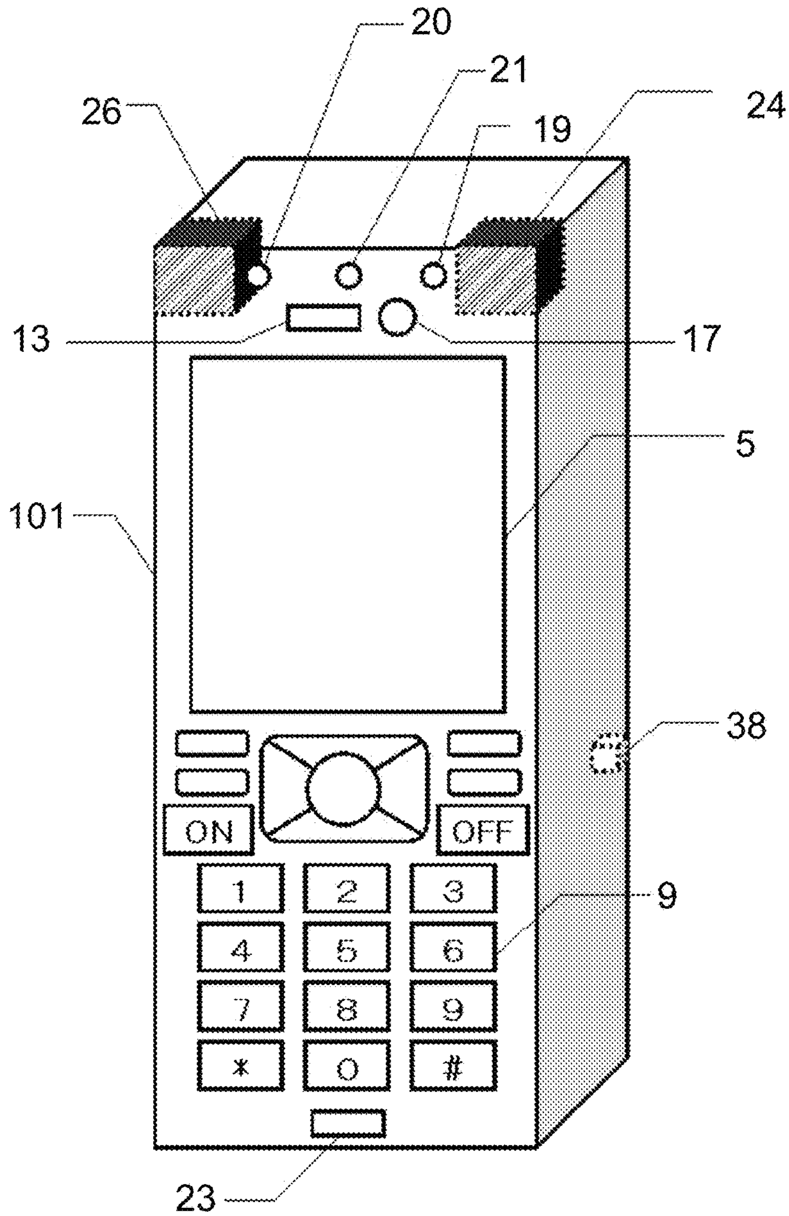
FIG. 5 is a perspective view illustrating a second embodiment of a mobile telephone according to an aspect of the present invention (second embodiment)

FIG. 5 is a perspective view depicting a second embodiment of the mobile telephone according to an aspect of the present invention. Structurally there is much in common in the second embodiment, and so corresponding portions have been given like reference numerals as in the first embodiment, and a description has been omitted. The mobile telephone 101 of the second embodiment has an integrated type with no movable parts, rather than a folding one separated into an upper part and a bottom part. Accordingly, the "upper part" in such a case does not signify a separated upper part but rather signifies the portion at the top of the integrated structure.

In the second embodiment, the right-ear cartilage-conduction vibration unit 24 and the left-ear cartilage-conduction vibration unit 26 assume a form of being constantly exposed on the outer wall of the mobile telephone 101, whereas in the first embodiment, the right-ear cartilage-conduction vibration unit 24 and the left-ear cartilage-conduction vibration unit 26 assume a form of being housed while sandwiched between the upper part 7 and the lower part 11 when the mobile telephone 1 is folded shut. The essential points of the internal structure of FIG. 3 and the flowchart of FIG. 4 can be applied to the second embodiment as well. Regarding the above-described structural differences, step S16 of the flowchart of FIG. 4 is left out; in a case in which an incoming telephone call is confirmed in step S10, the flow moves directly on to step S14.

Third Embodiment

Figure 6:
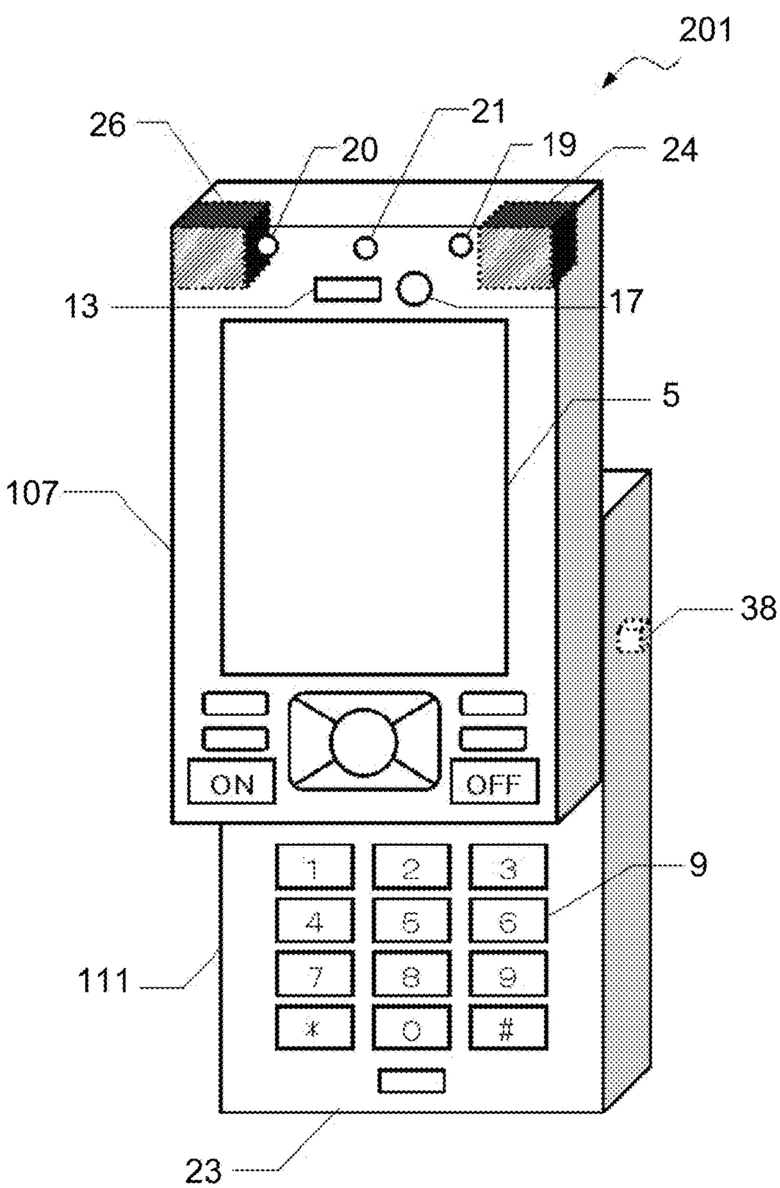
FIG. 6 is a perspective view illustrating a third embodiment of a mobile telephone according to an aspect of the present invention (third embodiment)

FIG. 6 is a perspective view illustrating a third embodiment of the mobile telephone according to an aspect of the present invention. Structurally there is much in common in the third embodiment, and so corresponding portions have been given like reference numerals as in the first embodiment, and a description has been omitted. The mobile telephone 201 of the third embodiment has a structure in which the upper part 107 is able to slide relative to the lower part 111. In the structure of the third embodiment, the up-down relationship is lost in the state in which the upper part 107 is placed on top of the lower part 111, but the "upper part" in the third embodiment signifies the portion that comes up when the mobile telephone 201 is extended.

In the third embodiment, full functionality is available in the state in which, as illustrated in FIG. 6, the upper part 107 is extended to expose the operation unit 9, and also basic functionality, such as responding to incoming calls and/or participating in a call, is also available in a case in which the upper part 107 is placed on top of the lower part 111 and the operation unit 9 is concealed. In the third embodiment as well, the right-ear cartilage-conduction vibration unit 24 and the left-ear cartilage-conduction vibration unit 26 assume a form of being constantly exposed on the outer wall of the mobile telephone 201 in both the state in which, as illustrated in FIG. 6, the mobile telephone 201 is extended, and the state in which the upper part 107 is placed on top of the lower part 111. The essential points of the internal structure of FIG. 3 and the flowchart of FIG. 4 can be applied to the third embodiment as well. However, as described above, the third embodiment allows calls to take place even when the upper part 107 is placed on top of the lower part 111, and therefore, similarly with respect to the second embodiment, step S16 of the flowchart in FIG. 4 is left out; in a case in which an incoming call is confirmed in step S10 the flow moves directly on to step S14.

The implementation of the variety of features of the present invention as described above is not to be limited to the above embodiments; they can be implemented in other aspects as well. For example, because the above embodiments support both right ear usage and left ear usage from changing hands and/or changing users, although the right-ear cartilage-conduction vibration unit 24 and the left-ear cartilage-conduction vibration unit 26 have been provided, the cartilage conduction vibration unit may be singular in a case that assumes usage of only the right ear or of only the left ear for cartilage conduction.

Also, although the right-ear cartilage-conduction vibration unit 24 and the left-ear cartilage-conduction vibration unit 26 have originally been provided with the assumption that each would abut the tragus of the right ear and the tragus of the left ear, respectively, cartilage conduction is also possible in an ear cartilage constituent other than the tragus, such as the mastoid process or the cartilage surface of the rear of the opening of the outer ear, as has been disclosed in Patent Document 2; therefore, both the right-ear cartilage-conduction vibration unit 24 and the left-ear cartilage-conduction vibration unit 26 may be used when, for example, the right ear is used, by simultaneously pushing against appropriate points on the right ear cartilage. In this sense, the two cartilage conduction vibration units 24, 26 need not be limited to right ear usage and left ear usage. Both are turned on at the same time in such a case, instead of only turning on either one of the two cartilage conduction vibration units 24, 26, as in the embodiments.

Further, although the incoming-talk unit 13 and the right-ear cartilage-conduction vibration unit 24 and left-ear cartilage-conduction vibration unit 26 are to be turned on at the same time in the embodiments above, the configuration may be such that the incoming-talk unit 13 is to be turned off when either the right-ear cartilage-conduction vibration unit 24 or the left ear cartilage conduction unit 26 is turned on. In such a case, there is no longer a need for phase adjustment of the audio information.

Fourth Embodiment

Figure 7:
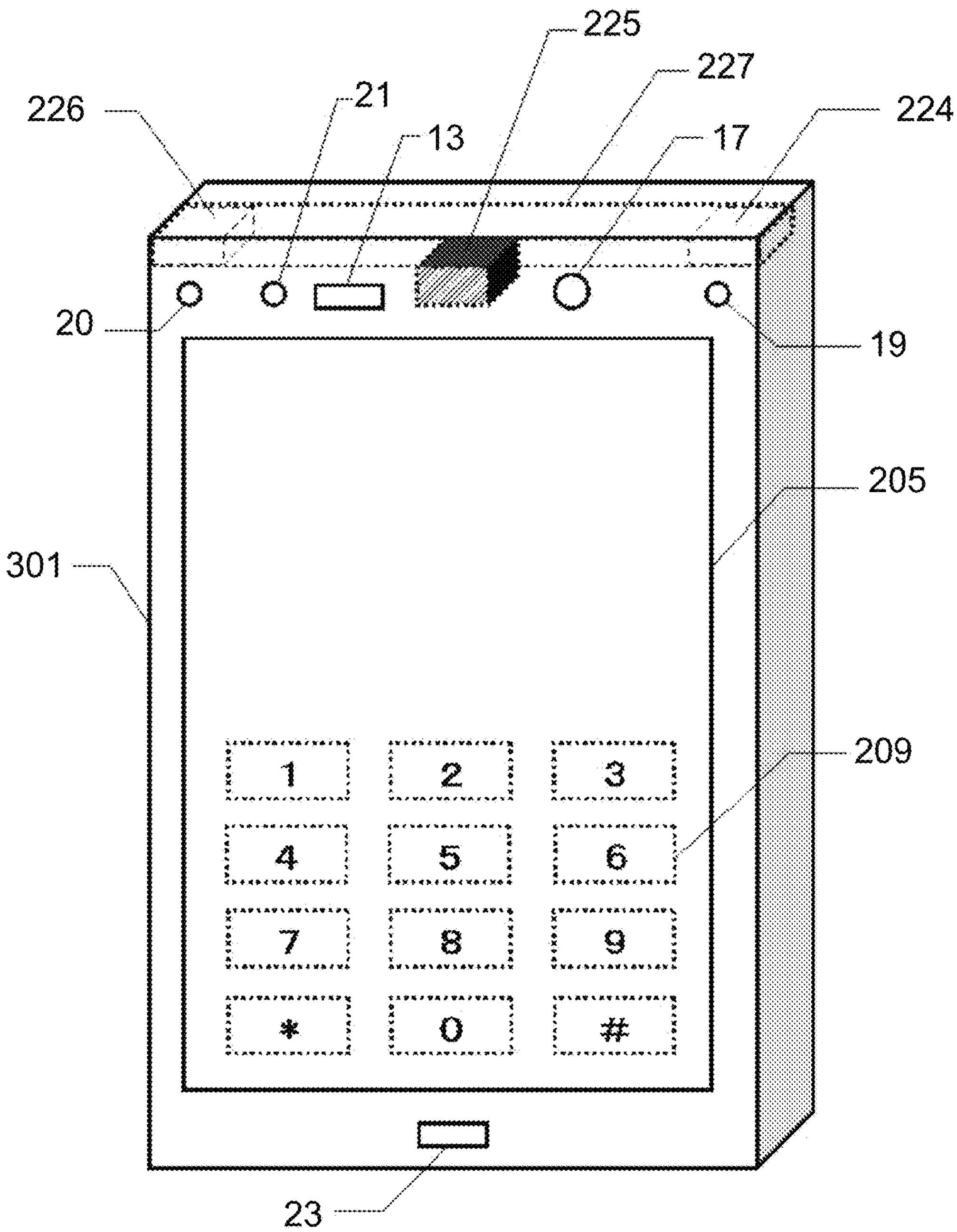
FIG. 7 is a perspective view illustrating a fourth embodiment of a mobile telephone according to an aspect of the present invention (fourth embodiment)

FIG. 7 is a perspective view illustrating a fourth embodiment of the mobile telephone according to an aspect of the present invention. Structurally there is much in common in the fourth embodiment; therefore, corresponding portions have been given like reference numerals as in the first embodiment, and a description has been omitted. A mobile telephone 301 of the fourth embodiment has an integrated type with no movable parts, rather than a folding one separated into an upper part and a bottom part, similarly with respect to the second embodiment. Also, this embodiment is configured as a "smartphone," which has a large-screen display unit 205 provided with graphical user interface (GUI) functionality. In the fourth embodiment as well, "upper part" does not signify a separated upper part but rather signifies the portion at the top of the integrated structure. However, in the fourth embodiment, a keypad or other operation unit 209 is displayed on the large-screen display unit 205, and the GUI is operated in accordance with how a finger is touched and/or swiped relative to the large-screen display unit 205.

The cartilage conduction vibration functionality in the fourth embodiment is assigned to a cartilage conduction vibration unit, which has a vibration conductor 227 and a cartilage conduction vibration source 225, comprising a piezoelectric bimorph or the like. The cartilage conduction vibration source 225 is arranged to be in contact with the lower part of the vibration conductor 227, the vibration thereof being conducted to the vibration conductor 227. The cartilage conduction vibration source 225 is constituted so as not to protrude from the outer wall of the mobile telephone (front view shown in FIG. 7) and hinder the design, similarly with respect to the first to third embodiments, but the vibration of the cartilage conduction vibration source 225 is transmitted laterally by the vibration conductor 227, causing the two ends 224 and 226 thereof to vibrate. The two ends 224 and 226 of the vibration conductor 227 are located on the inner angle of the top part 7 of the mobile telephone 301, which is in contact with the tragus, and therefore, similarly with respect to the first to third embodiments, effectively come into contact with the tragus without protruding from the outer wall of the mobile telephone. Thus, the right end part 224 and left end part 226 of the vibration conductor 227 respectively constitute the right-ear cartilage-conduction vibration unit 24 and left-ear cartilage-conduction vibration unit 26 mentioned in the first embodiment. However, because the vibration conductor 227 does not vibrate only at the right end 224 and left end 226 thereof but vibrates as a whole, it is possible in the fourth embodiment to transmit audio information regardless of where on the top inner edge of the mobile telephone 301 contact with the ear cartilage is made. Because the vibration of the cartilage conduction vibration source 225 is guided to a desired location by the vibration conductor 227, and no requirement is made that the cartilage conduction vibration source 225 itself be arranged on the outer wall of the mobile telephone 301, the configuration of such a cartilage conduction vibration unit is advantageous in that a greater amount of freedom is provided for the layout and in that the cartilage conduction vibration unit can be installed on a mobile telephone lacking any available extra space.

The fourth embodiment adds two further functionalities. However, these functionalities are not specific to the fourth embodiment, and can be applied to the first to third embodiments as well. One of the additional functionalities serves to prevent accidental operation of the cartilage conduction vibration unit. All of the first to fourth embodiments detect when the mobile telephone is brought up against an ear using the infrared light emitting units 19, 20 and the infrared light proximity sensor 21; however, in the first embodiment, for example, there is a concern that the proximity sensor will detect a case in which the inside of the mobile telephone 1 is lowered and placed on a desk or the like, and will accordingly falsely confirm that the mobile telephone 1 has been brought up against an ear, proceeding from step S22 of the flow of FIG. 4 to step S24. Because the same is not also true for the incline of the right ear call state detected in step S24, there is a possibility that the flow will proceed to step S30 and the left-ear cartilage-conduction vibration unit 26 will erroneously be turned on. The vibration of the cartilage conduction vibration unit results in a comparatively large amount of energy, so vibration noise may be created with the desk when such mistaken operation occurs. To prevent this, the fourth embodiment is configured such that a horizontal stationary state is detected using the acceleration sensor 49, and, when applicable, the cartilage conduction vibration source 225 is prohibited from vibrating. This point will be described in greater detail later.

Next, a description will be provided for the second additional functionality in the fourth embodiment. In each of the embodiments of the present invention, audio information is transmitted by having either the right-ear cartilage-conduction vibration unit 24 or the left-ear cartilage-conduction vibration unit 26 (in the fourth embodiment, the right end part 224 or left end part 226 of the vibration conductor 227) brought into contact with the tragus of the right ear or left ear; however, the contact pressure can be increased to obstruct the hole of the ear with the tragus, thereby creating an earplug bone conduction effect and conducting the audio information at an even higher volume. Further, because environment noise is blocked by the obstruction of the ear hole with the tragus, use in such a state achieves a listening status with dual effects, in which unnecessary environment noise is reduced and necessary audio information is increased; and is appropriate, for example, for calls to take place noisy environments or other situation. When the earplug bone conduction effect occurs, one's own voice becomes louder due to bone conduction from the vocal cords, and there is also a discomfort from the resulting imbalance in left and right auditory sensation. To ease the discomfort of one's own voice during the occurrence of such an earplug bone conduction effect, the fourth embodiment is configured such that the information of one's own voice picked up from the outgoing-talk unit 23 is subjected to phase inversion and transmitted to the cartilage conduction vibration source 225, canceling out the sound of one's own voice. This point will be described in greater detail later.

Figure 8:
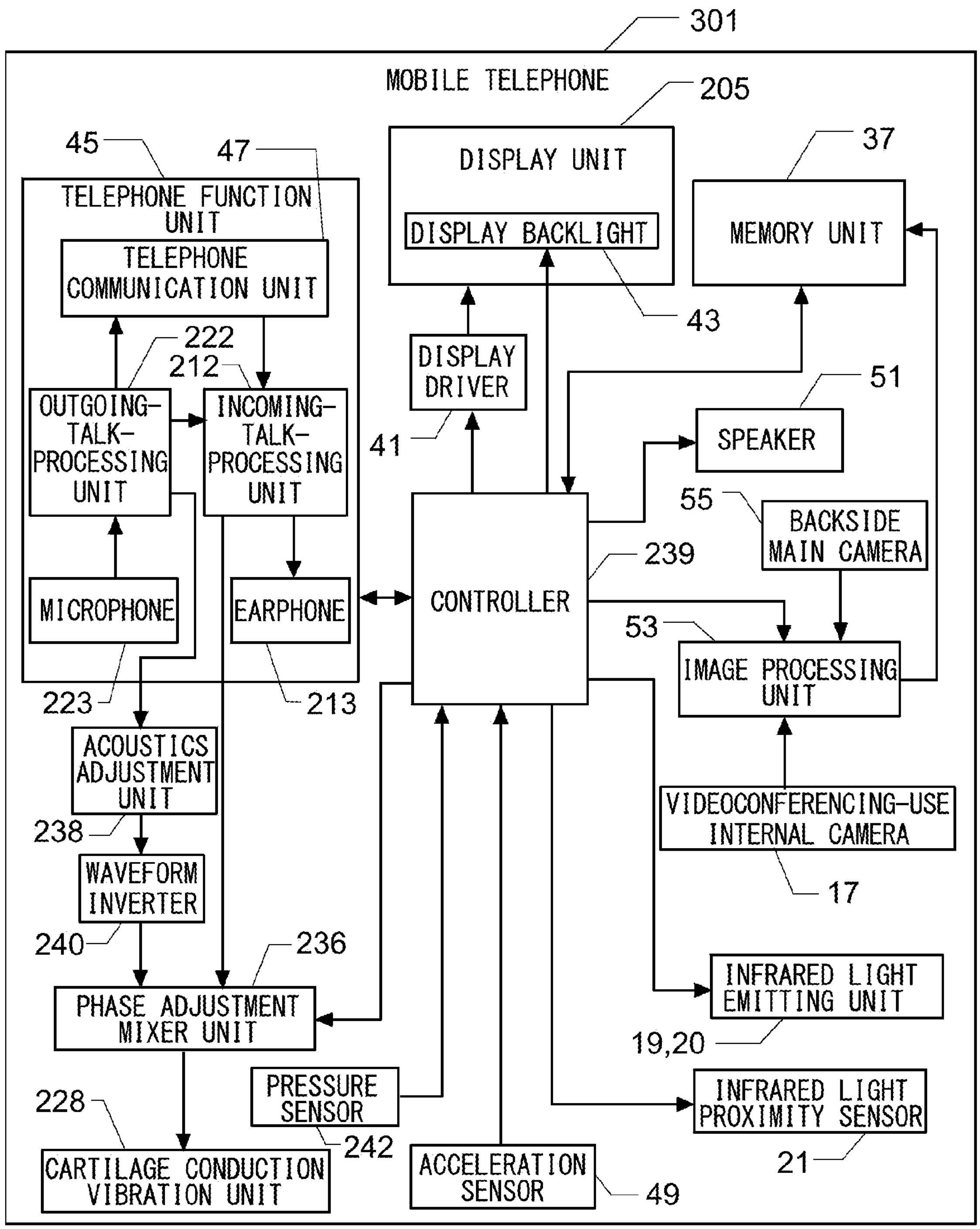
FIG. 8 is a block diagram of the fourth embodiment.

FIG. 8 is a block diagram of the fourth embodiment, in which the same reference numerals are assigned to the same parts from FIG. 7. Also, because there are many portions in common with the first to third embodiments, corresponding portions are each assigned these same reference numerals. A description has been omitted for these identical or shared portions, unless there is a particular need. Although the telephone function unit 45 is illustrated in somewhat greater detail in the fourth embodiment, the configuration is shared among the first to third embodiments. More specifically, the incoming-talk-processing unit 212 and the earphone 213 of FIG. 8 correspond to the incoming-talk unit 13 in FIG. 3, and the outgoing-talk-processing unit 222 and the microphone 223 in FIG. 8 correspond to the outgoing-talk unit 23 in FIG. 3. On the other hand, the cartilage conduction vibration source 225 and the vibration conductor 227 in FIG. 7 are depicted together in FIG. 8 as the cartilage conduction vibration unit 228. The outgoing-talk-processing unit 222 transmits a part of the audio from the operator picked up by the microphone 223 to the incoming-talk-processing unit 212 as a sidetone, and the incoming-talk-processing unit 212 superimposes the operator's own sidetone onto the voice of the calling party from the telephone communication unit 47 and outputs same to the earphone 213, whereby the balance between the bone conduction and air conduction of one's own voice in the state in which the mobile telephone 301 is brought up against an ear is made to approximate a natural state.

The outgoing-talk-processing unit 222 further outputs a part of the audio from the operator picked up by the microphone 223 to an acoustics adjustment unit 238. The acoustics adjustment unit 238 adjusts the acoustics of one's own voice, which are to be outputted from the cartilage conduction vibration unit 228 and transmitted to the cochlea, to acoustics approximating the operator's own voice transmitted to the cochlea by internal body conduction from the vocal cords during the occurrence of the earplug bone conduction effect; and effectively cancels out both. Also, a waveform inverter 240 subjects one's own voice, the acoustics of which have been adjusted in this manner, to waveform inversion, and outputs same to the phase adjustment mixer unit 236. When the pressure detected by a pressure sensor 242 is at or above a predetermined range and the state corresponds to one in which the ear hole is obstructed at the tragus by the mobile telephone 301, the phase adjustment mixer unit 236 mixes the output from the waveform inverter 240 according to an instruction from the controller 239 and drives the cartilage conduction vibration unit 228. The excessive amount of one's own voice that occurs during the earplug bone conduction effect is thereby cancelled out, thus easing the discomfort. At this time, the degree of cancellation is regulated such that an amount of one's own voice equivalent to the sidetone remains without being cancelled out. On the other hand, a case in which the pressure detected by the pressure sensor 242 is lower than the predetermined level corresponds to a state in which the ear hole is not obstructed at the tragus and the earplug bone conduction effect does not occur; therefore, the phase adjustment mixer unit 236 will not mix the wavelength inversion output of one's own voice from the waveform inverter 240, on the basis of the instruction of the controller 239. However, the configuration may reverse the positions of the acoustics adjustment unit 238 and the waveform inverter 240 in FIG. 8. Moreover, the acoustics adjustment unit 238 and the waveform inverter 240 may be integrated as a function within the phase adjustment mixer unit 236.

FIG. 9 is a conceptual block diagram illustrating the elements of the state in which the mobile telephone 301 is brought up against the tragus of the right ear in the fourth embodiment, and provides a description of how one's own voice is cancelled out during the occurrence of the earplug bone conduction effect. FIG. 9 also depicts a particular embodiment of the pressure sensor 242; the configuration assumes that the cartilage conduction vibration unit 225 is a piezoelectric bimorph element. Equivalent parts have been given like reference numerals as in FIGS. 7 and 8, and a description has been omitted unless there is a particular need.

Figure 9A:
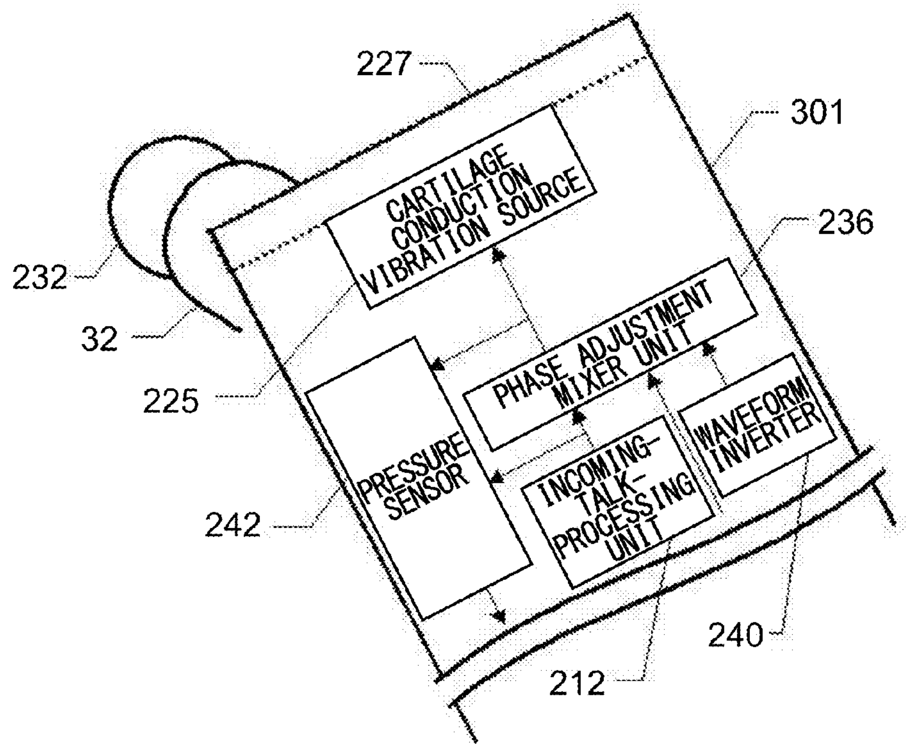
FIGS. 9A and 9B are conceptual block diagrams illustrating the elements of the configuration pertaining to an earplug bone conduction effect of the fourth embodiment.

FIG. 9A illustrates the state in which the mobile telephone 301 is brought up against the tragus 32 to such an extent that the tragus 32 does not obstruct the ear hole 232. In such a state, the phase adjustment mixer unit 236 drives the cartilage conduction vibration unit 225 on the basis of the audio information of the calling party from the incoming-talk-processing unit 212. The pressure sensor 242 is configured so as to monitor a signal appearing on a signal line linking the cartilage conduction vibration unit 225 to the phase adjustment mixer unit 236, and detects signal variations that are based on strain to the cartilage conduction vibration unit (a piezoelectric bimorph element) 225 that is applied depending on the pressure on the vibration conductor 227. Thus, when the cartilage conduction vibration unit 225 for transmitting audio information by being brought into contact with the tragus 32 comprises a piezoelectric bimorph element, the piezoelectric bimorph element can be made to also serve as a pressure sensor for detecting the pressure on the tragus 32. The pressure sensor 242 further monitors a signal appearing on a signal line linking the incoming-talk-processing unit 212 to the phase adjustment mixer unit 236. The signal appearing therein is not affected by the pressure on the tragus 32 and can therefore be utilized as a reference signal for determining the pressure.

Figure 9B:
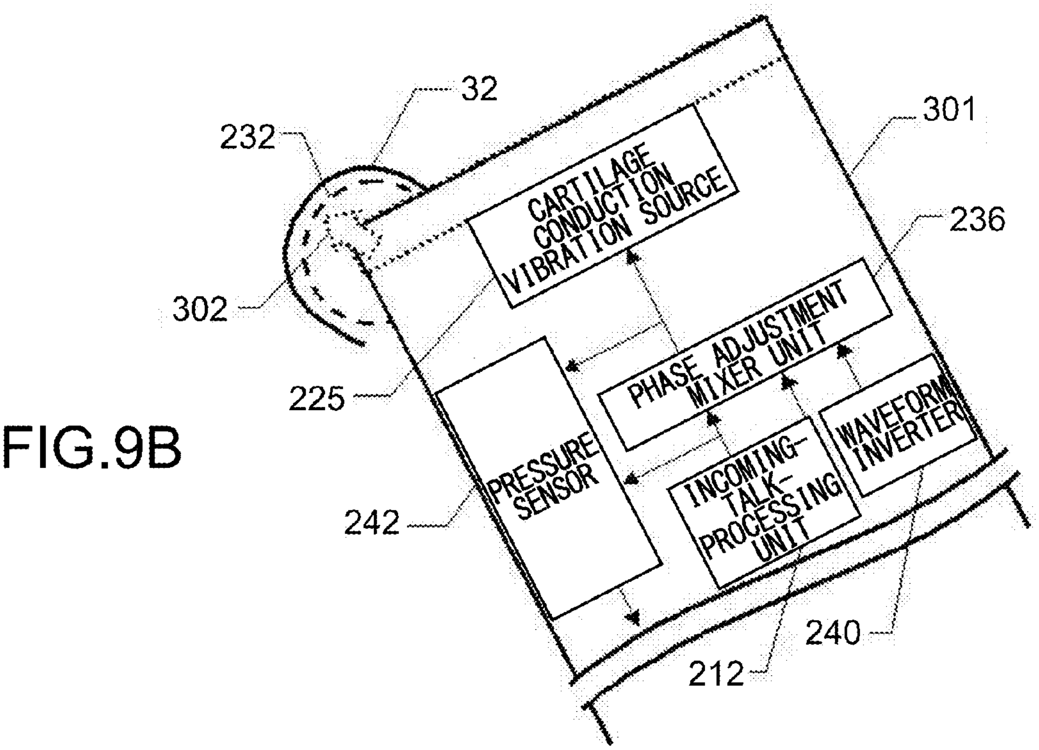

In FIG. 9A, as described above, the tragus 32 is in a state that does not obstruct the ear hole 232, and the pressure sensor 242 determines that the pressure is small; therefore, on the basis of this determination, the controller 239 instructs the phase adjustment mixer unit 236 not to mix one's own waveform-inverted voice from the waveform inverter 240 into the cartilage conduction vibration unit 225. On the other hand, FIG. 9B illustrates the state in which the mobile telephone 301 presses more strongly on the tragus 32 in the direction of arrow 302 and the tragus 32 obstructs the ear hole 232. This state generates the earplug bone conduction effect. The pressure sensor 242 determines that the ear hole 232 has been obstructed on the basis of a detection of an increase to or above a predetermined pressure, and, on the basis of this determination, the controller 239 instructs the phase adjustment mixer unit 236 to mix one's own waveform-inverted voice from the waveform inverter 240 into the cartilage conduction vibration unit 225. The discomfort of one's own voice during the occurrence of the earplug bone conduction effect is eased as described above. Conversely, when a reduction at or above a predetermined pressure from the state in FIG. 9B is detected by the pressure sensor 242, the state is determined to be one in which, as in FIG. 9A, the ear hole 232 is not obstructed, and the mixing of one's own waveform-inverted voice is discontinued. However, the pressure sensor 242 determines that there has been a transition between the states of FIGS. 9A and 9B on the basis of the absolute amount of pressure and the directionality of the pressure change. However, in a state of silence in which neither party speaks, the pressure sensor 242 detects the pressure by directly applying a pressure monitor signal, which is inaudible by ear, to the direct bone conduction vibration unit 225.

Figure 10:
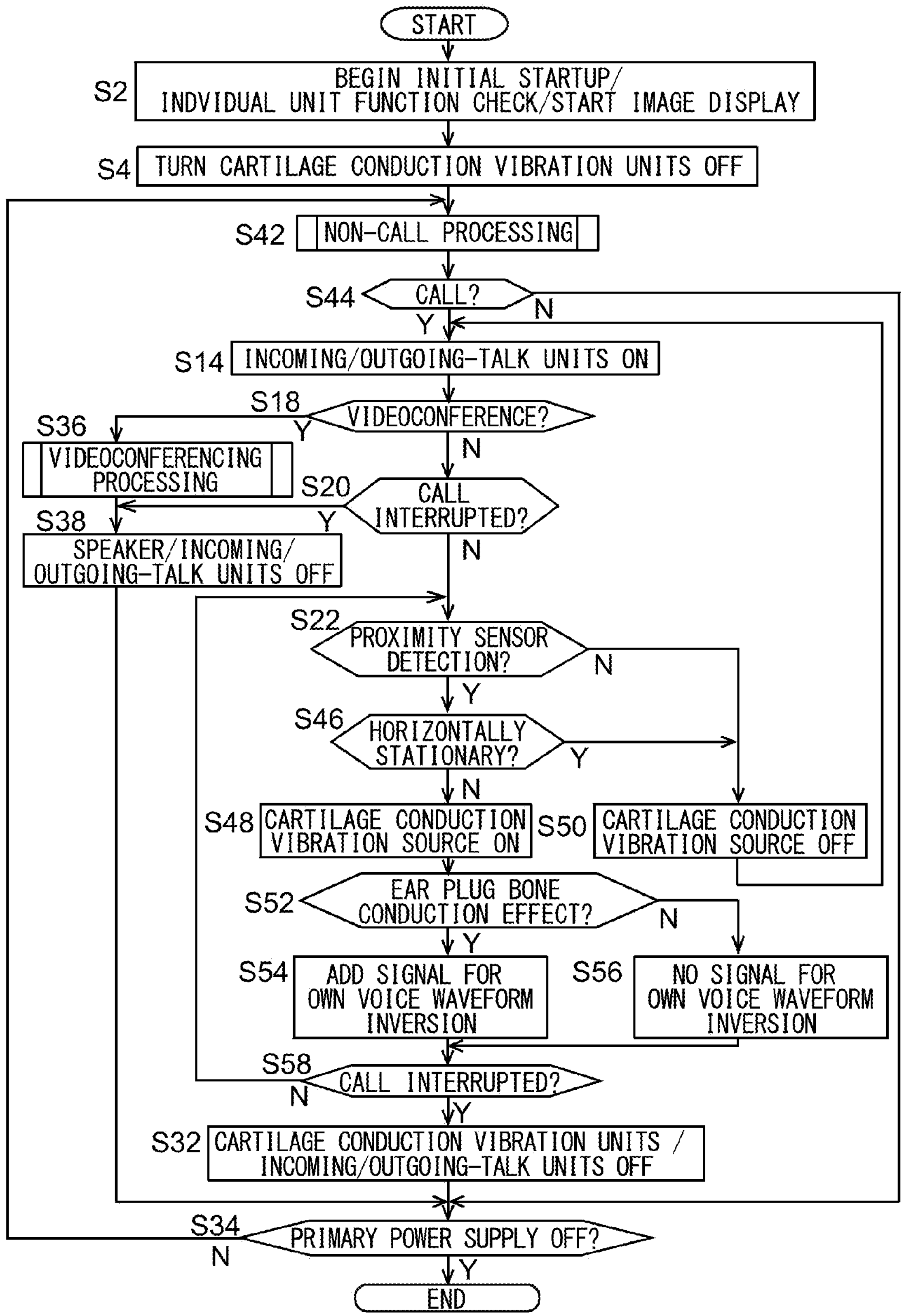
FIG. 10 is a flow chart of the operation of the controller in the fourth embodiment of FIG. 8.

FIG. 10 is a flow chart of the operation of the controller 239 in the fourth embodiment of FIG. 8. However, because the flow of FIG. 10 has many points in common with the flow of the first embodiment in FIG. 4, corresponding parts have been given like step numerals, and a description has been omitted unless needed. FIG. 10 also illustrates an abstraction of the operation that focuses on related functions, in order to primarily provide a description of the function of the cartilage conduction vibration unit 228. Accordingly, similarly with respect to the case in FIG. 4, the controller 239 also contains typical mobile telephone functions and other operations not represented by the flow of FIG. 10. FIG. 10 uses boldface print to illustrate points of difference with FIG. 4, and thus the following description focuses on these portions.

Step S42 integrates step S6 and step S8 of FIG. 4, and is therefore illustrated such that the non-call processing of step S42 includes the case of directly proceeding to the next step without any non-call operation, but the content thereof is identical to step S6 and step S8 in FIG. 4. Step S44 integrates step S10 and step S12 of FIG. 4, and is therefore illustrated as a step for checking the presence or absence of a call state between two parties regardless of whether the call is incoming from the other party or is outgoing from oneself, but the content thereof is identical to step S6 and step S8 in FIG. 4. However, the fourth embodiment does not contain a step that would correspond to step S16 in FIG. 4, because the configuration is not such that the mobile telephone 301 is opened or closed.

Step S46 relates to the first addition function in the fourth embodiment and therefore checks for whether the mobile telephone 301 has left the hand-held state and remained stationary in a horizontal state for a predetermined period of time (for example, 0.5 seconds). When the proximity sensor has made a detection in step S22, step S48 is first reached in a case in which it is confirmed in step S46 that there is no such horizontal stationary state; the cartilage conduction vibration source 225 is then turned on. On the other hand, in a case in which a horizontal stationary state is detected in step S46, the flow proceeds on to step S50, which turns off the cartilage conduction vibration source 225, and the flow returns to step S14. However, step S50 corresponds to when, in a flow repetition to be described later, the cartilage conduction vibration source 225 reaches step S46 in an on state and a horizontal stationary state has been detected; therefore, when the cartilage conduction vibration source 225 reaches step S50 in an off state, the flow returns to step S14 without any action being performed.

Step S52 relates to the second added function in the fourth embodiment, and checks for the occurrence of the earplug bone conduction effect, which is caused by the mobile telephone 301 pressing strongly on the tragus 32 and obstructing the ear hole 232. In particular, as illustrated in FIG. 9, this is checked by the presence or absence of a change at or above a predetermined pressure and the directionality thereof by the pressure sensor 242. In a case in which there is a detection of the state in which the earplug bone conduction effect is created, the flow proceeds to step S54, which adds the waveform-inversion signal of one's own voice to the cartilage conduction vibration source 225, and the flow then moves on to step S58. On the other hand, in a case in which there is a detection in step S52 of a state in which the earplug bone conduction effect is not created, the flow moves on to step S56, and then on to step S58 without adding the waveform-inversion signal of one's own voice to the cartilage conduction vibration source 225. In step S58, there is performed a check for whether or not a call state has been cut off; when the call is not cut off, the flow returns to step S22, following which step S22 and step S46 to S58 are repeated until a call interruption is detected in step S58. Support is thereby provided for the generation and elimination of the earplug bone conduction effect during a call.

The various features of each of the embodiments described above are not to be restricted to individual respective embodiments, but rather can be substituted or combined with other appropriate embodiments. For example, the flow chart of the fourth embodiment in FIG. 10 does not have the configuration in the flow chart of the first embodiment in FIG. 4 for switching the right-ear cartilage-conduction vibration unit 24 and the left-ear cartilage-conduction vibration unit 26, but the configuration may be such that the right-ear cartilage-conduction vibration unit 24 and the left-ear cartilage-conduction vibration unit such as in the first embodiment are utilized as the configuration of the cartilage conduction vibration unit 228 in the tenth embodiment; thus, in addition to support for the generation and elimination of the earplug bone conduction effect in repeating the loop of step S22 and steps S46 to S58, support is additionally provided for switching the mobile telephone to the other hand between the right ear call state and the left ear call state by the function according to steps S24 to S26 from FIG. 4. It is also possible to add to the first to third embodiments the functionality of checking for the horizontal stationary state and turning off the cartilage conduction vibration unit 228 in the fourth embodiment of FIG. 10. It is moreover possible in the first through third embodiments to utilize the cartilage conduction vibration unit 228 as in the fourth embodiment.

Fifth Embodiment

Figure 11:
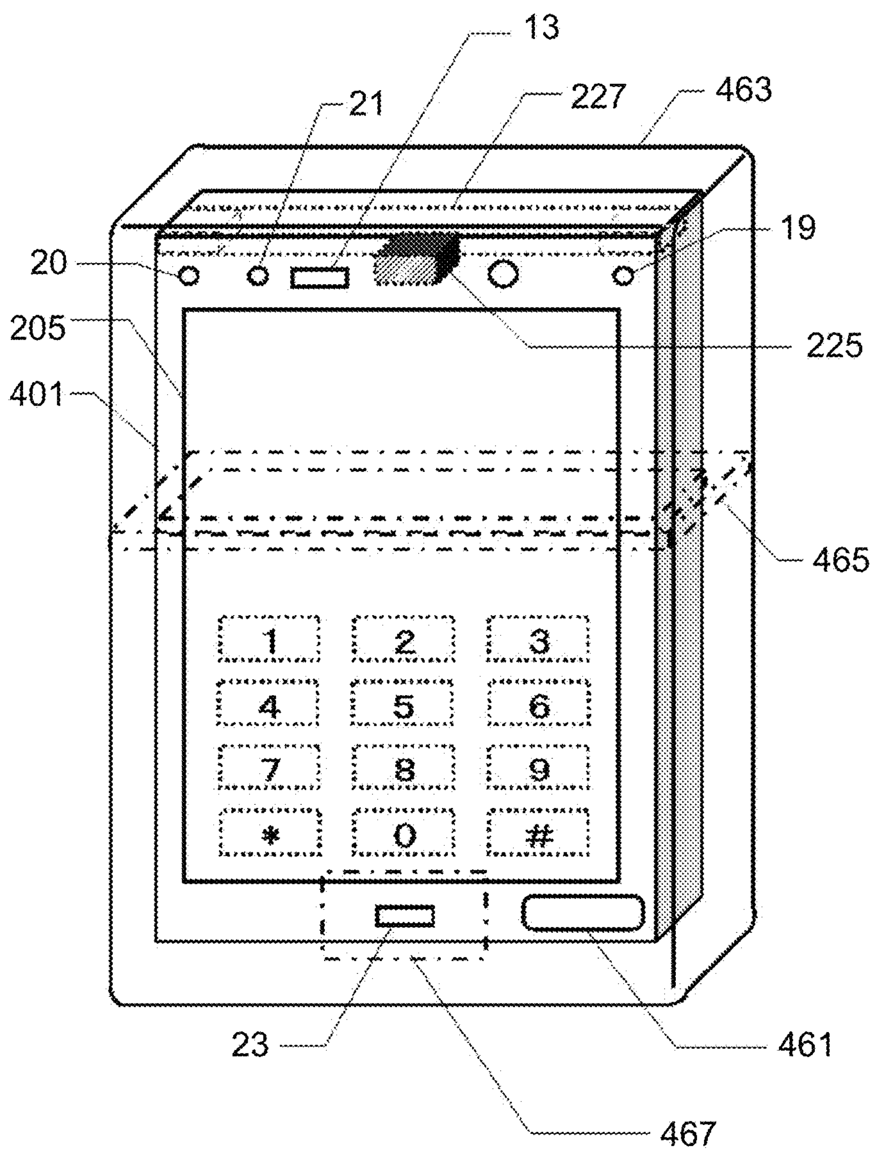
FIG. 11 is a perspective view illustrating a fifth embodiment of a mobile telephone according to an aspect of the present invention (fifth embodiment)

FIG. 11 is a perspective view illustrating a fifth embodiment of the mobile telephone according to an aspect of the present invention. The fifth embodiment is founded on the fourth embodiment of FIG. 7, and shares the majority of the structure thereof; thus, corresponding parts have been given like reference numerals, and a description thereof has been omitted. Also, to avoid complicating the illustration, the assignment of the reference numerals themselves has also been omitted for those portions for which the description has been omitted, but the functions and names of the common parts in the drawings are common with FIG. 7. However, a more detailed description of the configuration calls on the essential points of the block diagram of the fourth embodiment in FIGS. 8 and 9. A first point of difference in the fifth embodiment from the fourth embodiment lies in that a mobile telephone 401 is provided with a double-push button 461, which makes it possible to set a so-called touch panel function (a function in which the large-screen display unit 205, on which the key pad or other operation unit 209 is displayed, is touched with a finger and the GUI is operated by the detection of this touch position and/or the detection of this swipe) to off, and also which is only usable when this touch panel function has been set to off. The touch panel function can be set to off by operating the touch panel itself, and the touch panel can also be set to return to on by pressing the double-push button 461 for a predetermined period of time or longer. The double-push button 461, when usable, also has a function for initiating a call with a first push and for interrupting a call when there is a second push during the call (an alternate switching function performed by pushing whether the device is on or off). The above-described first push of the double-push button 461 is performed either to call a specific party or to respond to an incoming call, a call being initiated thereby in either case.

A second point of difference in the fifth embodiment from the fourth embodiment lies in that the fifth embodiment is configured so as to function by the combination of the mobile telephone 401 with a softcover 463 for housing same. Although FIG. 11, for the sake of describing the configuration, depicts the softcover 463 as if it were transparent, the softcover 463 is actually opaque, and the mobile telephone 401 cannot be seen from the outside in the state in which the mobile telephone 401 is housed in the softcover 463 as in FIG. 11.

The above-described double-push button 461 is also able to function when the double-push button 461 is pushed from on the softcover 463 in the state in which the mobile telephone 401 has been housed in the softcover 463. Furthermore, the softcover 463 is configured so as to interlock with the cartilage conduction vibration unit 228 comprising the cartilage conduction vibration source 225 and vibration conductor 227 of the mobile telephone 401, allowing for a call to take place in the state in which the mobile telephone 401 is housed in the softcover 463. The following provides a description thereof.

The softcover 463 is made using an elastic material that has acoustic impedance approximating that of ear cartilage (a silicone rubber; a mixture of a silicone rubber and a butadiene rubber; a natural rubber; a structure formed using these varieties of rubber in which air bubbles are sealed; a structure, such as can be seen in transparent packaging sheet materials or the like, in which a layer of groups of air bubbles is sealed separated by a thin film of synthetic resin; or the like). The vibration conductor 227 for transmitting vibration from the cartilage conduction vibration source 225 is in contact with the inside of the softcover when the mobile telephone 401 is housed therein. The outside of the softcover 463 is brought up against the ear with the mobile telephone 401 housed therein, whereby the vibration of the vibration conductor 227 is transmitted to the ear cartilage over a broad area of contact by the interposition of the softcover 463. Sound from the exterior of the softcover 463, which resonates in accordance with the vibration of the vibration conductor 227, is further transmitted to the tympanic membrane from the external auditory meatus. Sound source information from the cartilage conduction vibration source 225 can thereby be heard as a loud sound. Environment noise can also be blocked, because the softcover 463, which is brought up against the ear, has a form such that the external auditory meatus is obstructed. Increasing the force with which the softcover 463 is pressed against the ear furthermore gives the result of substantially completely obstructing the external auditory meatus, and sound source information from the cartilage conduction vibration source 225 can be heard as an even louder sound due to the earplug bone conduction effect. Detection is done via the softcover 463, but, similarly with respect to the fourth embodiment, in the state in which the earplug bone conduction effect is created, the waveform inversion signal from the outgoing-talk unit 23 (the microphone 223) is added to the signal of one's own voice, on the basis of the detection of pressure by the cartilage conduction vibration source 225.

In a call state in which the mobile telephone 401 remains housed in the softcover 463, the vibration of the vibration conductor 227, which is transmitted to the softcover 463, is also transmitted to the outgoing-talk unit 23, which has the potential to generate a Larsen effect. To block acoustic conduction between the vibration conductor 227 and the outgoing-talk unit 23 as a countermeasure therefor, the softcover 463 is provided in between the two with an insulation ring unit 465 having an acoustic impedance different from that of the body of the softcover. The insulation ring unit 465 can be formed by either integrating or joining a material different from the material of the body of the softcover. The insulation ring unit 465 may also be formed by joining a layer having a different acoustic impedance to either the outside or the inside of the softcover 463, which are molded with the same material. Moreover, a plurality of insulation ring units 465 may be interposed between the vibration conductor 227 and the outgoing-talk unit 23 so that the insulating effect may be increased.

In order for the softcover 463 to permit a call to take place in the state in which the mobile telephone 401 remains housed therein, the vicinity of the outgoing-talk unit 23 (the microphone 223) is configured as a microphone cover unit 467, which does not interfere with the air conduction of sound. Such a microphone cover unit 467 takes a sponge-like structure such as that of, for example, an earphone cover or the like.

Figure 12:
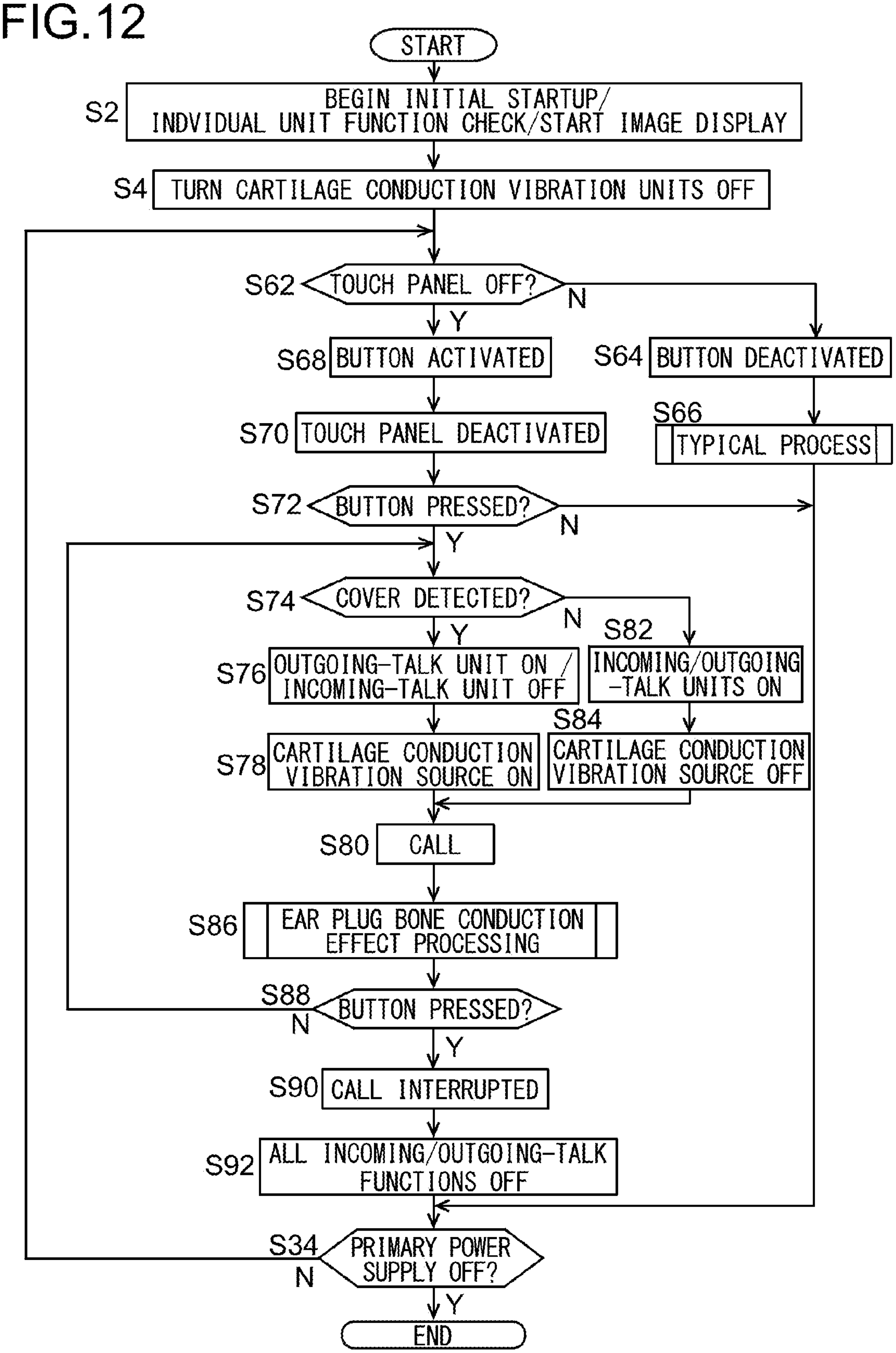
FIG. 12 is a flow chart of the operation of the controller in the fifth embodiment of FIG. 11.

FIG. 12 is a flow chart of the operation of the controller 239 (borrowing from FIG. 8) in the fifth embodiment of FIG. 11. However, parts that the flow of FIG. 12 shares with the flow of FIG. 10 have been given like step reference numerals, and a description thereof has been omitted. FIG. 12 also primarily serves to describe the functions of the cartilage conduction vibration unit 228 and therefore depicts an abstraction of the operation that focuses on the related functions. Accordingly, similarly with respect to FIG. 10 or the like, the controller 239 in the fifth embodiment also contains typical mobile telephone functions and other operations that are not represented in the flow in FIG. 12.

When the flow of FIG. 12 reaches step S62, a check is performed for whether or not the touch panel has been set to off by the operation described above. When same has not been set to off, the flow moves on to step S64, and the function of the double-push button 461 is deactivated, whereupon the flow moves on to step S66 before arriving at step S34. The portion illustrated as typical processing in step S66 collectively integrates step S14, steps S18 to S22, step S32, step S36, step S38, and steps S42 to S58 in FIG. 10 (i.e., the portions between steps S4 and S34). In other words, in a case in which step S62 transitions to step S64, the flow in FIG. 12 implements similar functions to those of FIG. 10.

On the other hand, when it is detected in step S62 that the touch panel has been set to off, the flow moves on to step S68, in which the function of the double-push button 461 is activated. The flow then proceeds to step S70. In step S70, the function of the touch panel is deactivated, and in step S72, the presence or absence of a first push on the double-push button 461 is detected. In a case in which herein no push is detected, the flow moves on directly to step S34. On the other hand, in a case in which a first push on the double-push button 461 is detected in step S72, the flow proceeds to step S74, which detects whether or not the mobile telephone 401 has been housed in the softcover 463. This detection is made possible, for example, by the function of the infrared light-emitting units 19, 20 and the infrared light proximity sensor 21, which constitute the proximity sensor.

When housing in the softcover 463 is detected in step S74, the flow proceeds to step S76, which turns the outgoing-talk unit 23 on, and turns the incoming-talk unit 13 off. Further, step S78 turns the cartilage conduction vibration source 225 on and the flow proceeds to step S80, which places the mobile telephone 401 in a call state. When a call state is already in effect, the same is continued. On the other hand, in a case in which housing in the softcover 463 is not detected in step S74, the flow moves on to step S82, which turns both the outgoing-talk unit 23 and the incoming-talk unit 13 on; further, step S84 turns the cartilage conduction vibration source 225 off and the flow proceeds to step S80. Step S86, which follows step S80, runs processing for the earplug bone conduction effect, and then the flow moves on to step S88. The processing for the earplug bone conduction effect in step S86 is collectively illustrated by steps S52 to S56 in FIG. 10.

In step S88, the presence or absence of a second push on the double-push button 461 is detected. When there is no detection, the flow returns to step S74, following which steps S74 to S88 are repeated until there is a detection of a second push on the double-push button 461. There is a constant check for whether the mobile telephone 401 is housed in the softcover 463 during this repetition during a call; therefore, when, for example, environment noise is loud and listening comprehension at the incoming-talk unit 13 is impaired, support is provided for the user to house the mobile telephone 401 in the softcover 463 and thereby block environment noise and further ease listening comprehension by the earplug bone conduction effect.

On the other hand, when a second push on the double-push button 461 is detected in step S88, the flow moves on to step S90, which interrupts the call; step S92 also turns all sending and receiving functions off and the flow arrives at step S34. In step S34, there is performed a check for whether the primary power source is off; therefore, when there is no detection of the primary power source being off, the flow returns to step S62, following which steps S62 to S92 and step S34 are repeated. Further, during this repetition, step S64 provides support for setting the touch panel to off by the previously described operation of the touch panel or for releasing the off setting by a long press on the double-push button 461, and therefore switch is possible with appropriate, ordinary processing.

Sixth Embodiment

Figure 13A:
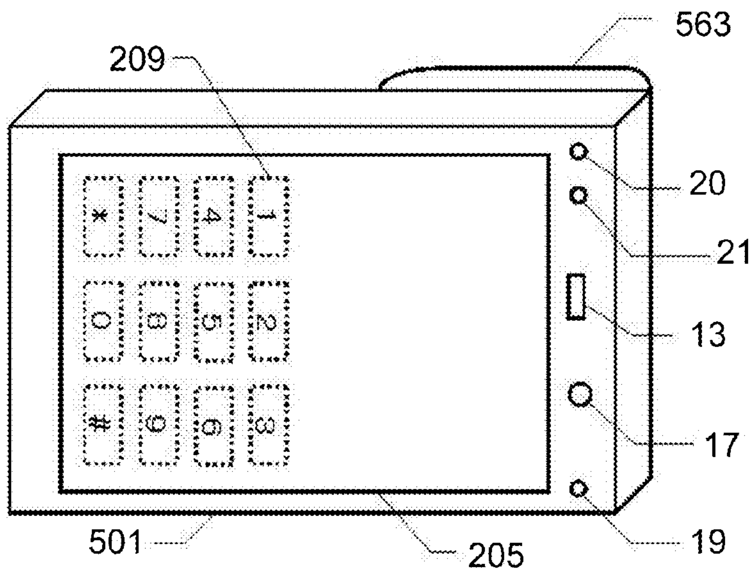
FIGS. 13A, 13B and 13C are perspective views illustrating a sixth embodiment of a mobile telephone according to an aspect of the present invention, where
Figure 13B:
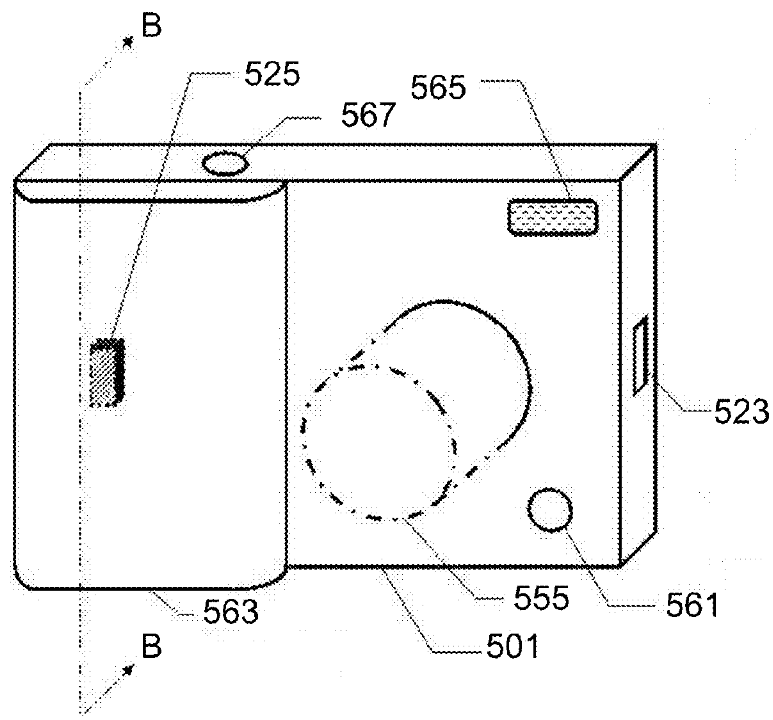
Figure 13C:
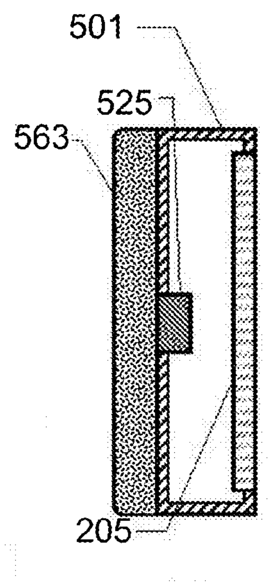

FIG. 13 is a perspective view illustrating a sixth embodiment of the mobile telephone according to an aspect of the present invention. FIG. 13A is a front perspective view similar to FIG. 7, but, as will be described later, because the sixth embodiment is constituted as a digital camera provided with mobile telephone functions, FIG. 13A is rotated 90 degrees relative to FIG. 7 and depicted at the angle of the state of use as a digital camera. FIG. 13B is a rear perspective view thereof (a front perspective view in a case viewed as a digital camera), and FIG. 13C is a cross-sectional view in the B-B sectional plane in FIG. 13B.

The sixth embodiment is founded on the fourth embodiment of FIG. 7, and has the majority of the structure thereof in common; thus, corresponding parts have been given like reference numerals, and a description thereof has been omitted. Also, to avoid complicating the illustration, the assignment of the reference numerals themselves has also been omitted for those portions for which the description has been omitted, but the functions and names of the common parts in the drawings are in common with those of FIG. 7. However, a more detailed description of the configuration calls on the essential points of the block diagram of the fourth embodiment in FIGS. 8 and 9. A first point of difference in the sixth embodiment from the fourth embodiment lies in that a mobile telephone 501 is constituted as a digital camera provided with mobile telephone functions. That is, as illustrated in FIG. 13B, the first point of difference is that a zoom lens 555 provided with high optical performance is utilized as the imaging lens of the backside main camera. The zoom lens 555 projects out during use in the state illustrated by the single dotted line in FIG. 13B, but, during non-use, takes a so-called collapsible lens configuration, which retracts to a position forming a plane identical to that of the outer surface of the mobile telephone 501. A strobe 565 and a shutter release button 567 for projecting auxiliary light when the subject is dark are also provided. The mobile telephone 501 also has a grip unit 563 suited for when the camera is held in the right hand.

A second point of difference in the sixth embodiment from the fourth embodiment lies in that the grip unit 563, similarly with respect to the softcover 463 in the fifth embodiment, is made using a material that has acoustic impedance approximating that of ear cartilage (a silicone rubber; a mixture of a silicone rubber and a butadiene rubber; a natural rubber; or a structure formed from these varieties of rubber in which air bubbles are sealed), and is provided with an elasticity suited for providing a satisfactory grip sensation. Also, unlike the arrangement in the fourth embodiment, a cartilage conduction vibration source 525 is arranged on the reverse side of the grip unit 563. As is clear from the cross-section in FIG. 13C, the cartilage conduction vibration source 525 is in contact with the rear side of the grip unit 563.

Accordingly, bringing the grip unit 563 up against the ear transmits the vibration of the cartilage conduction vibration source 525 to the ear cartilage over a broad area of contact by the interposition of the grip unit 563. Moreover, sound from the exterior of the grip unit 563, which resonates according to the vibration of the cartilage conduction vibration source 525, is transmitted to the tympanic membrane from the external auditory meatus. Sound source information from the cartilage conduction vibration source 525 can thereby be heard as a loud sound. Also, similarly with respect to the fifth embodiment, the grip unit 563, which is brought up against the ear, takes on a form such that the external auditory meatus is obstructed, and can therefore block environment noise. Further similarly with respect to the fifth embodiment, increasing the force for pressing the grip unit 563 gives the result of substantially completely obstructing the external auditory meatus, and sound source information from the cartilage conduction vibration source 525 can be heard as an even louder sound due to the earplug bone conduction effect. Detection is made via the grip unit 563, but, similarly with respect to the fifth embodiment, in the state in which the earplug bone conduction effect is created, the waveform inversion signal from a microphone or other outgoing-talk unit 523 is added to the signal of one's own voice, on the basis of the detection of pressure by the cartilage conduction vibration source 525.

Unlike the fourth embodiment, the outgoing-talk unit 523 is provided not to the front surface of the mobile telephone 501 but rather to the end surface thereof, as is clear from FIG. 13B. Accordingly, the outgoing-talk unit 523 can consistently pick up the user's voice both when the incoming-talk unit 13 is brought up against the ear for a call and when the grip unit 563 on the reverse side is brought up against the ear for a call. The settings can be switched using a switch button 561 for either activating the incoming-talk unit 13 or for activating the cartilage conduction vibration source 525. In the state in which the zoom lens 555 projects in the state illustrated by the single dotted line in FIG. 13B, it is inappropriate to bring the grip unit 563 up against the ear for a call; therefore, when the switch button is operated in such a state and the setting is changed to activate the cartilage conduction vibration source 525, the zoom lens 555 collapses automatically, the execution of this switch being reserved until the collapse is complete.

Figure 14:
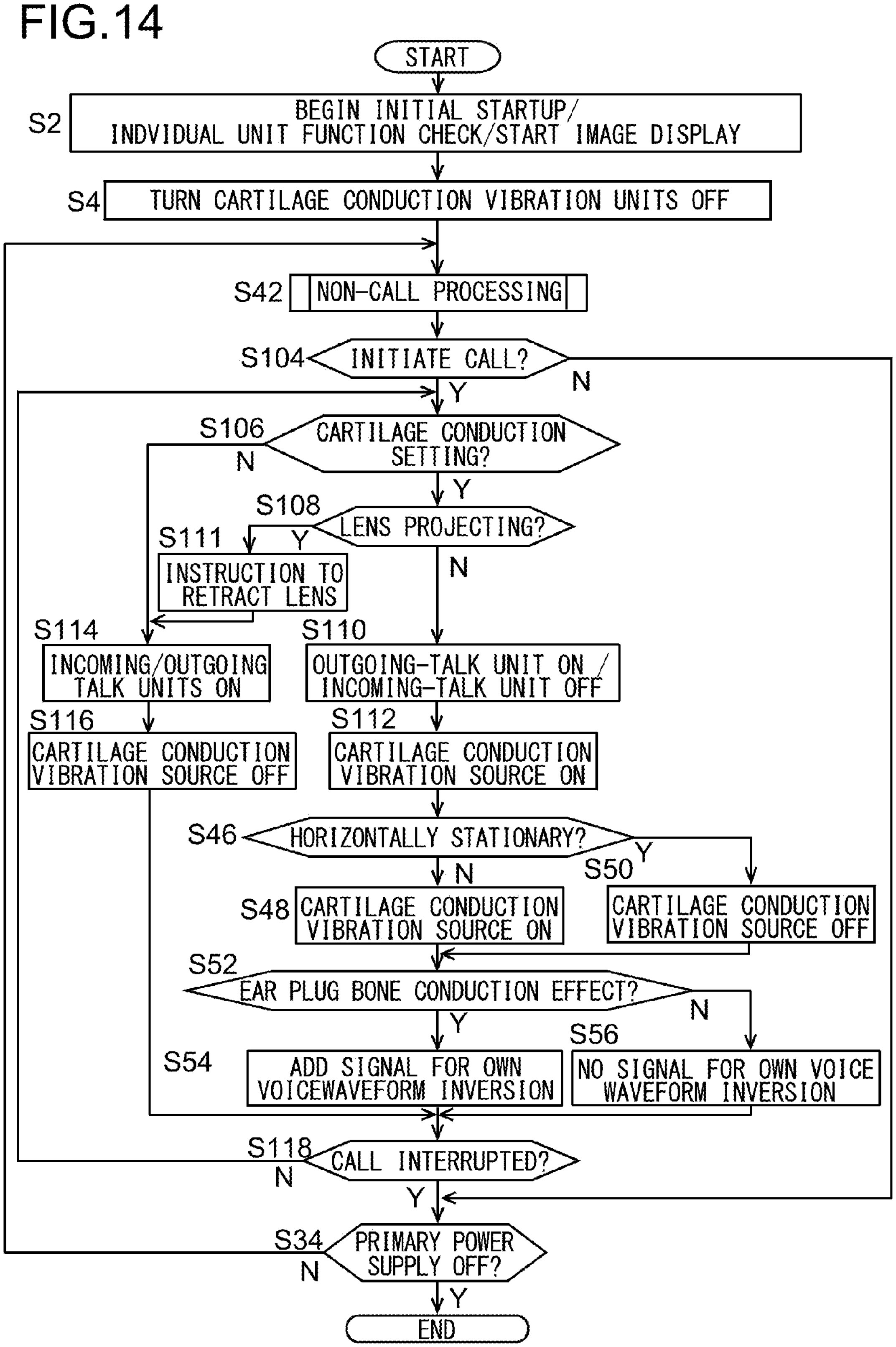
FIG. 14 is a flow chart of the operation of the controller in the sixth embodiment of FIG. 13.

FIG. 14 is a flow chart of the operation of the controller 239 (borrowing from FIG. 8) in the sixth embodiment of FIG. 13. However, parts that the flow of FIG. 14 shares with the flow of FIG. 10 have been given like step reference numerals, and a description thereof has been omitted. FIG. 14 also illustrates an abstraction of the operation that focuses on related functions, in order to primarily provide a description of the function of the cartilage conduction vibration unit 228. Accordingly, similarly with respect to FIG. 10 and the like, in the sixth embodiment as well, the controller 239 also contains typical mobile telephone functions and other operations not represented by the flow in FIG. 14.

In the flow of FIG. 14, there is performed a check for whether there has been an operation to initiate a call once step S104 is reached. In a case in which there has not been an operation, the flow moves directly on to step S34. On the other hand, in a case in which an operation to initiate a call is detected, the flow proceeds to step S106, in which there is performed a check for whether the cartilage conduction has been set using the switch button 561. When the cartilage conduction has been set, there is a check in step S108 for whether the zoom lens 555 is projecting out. A result in which the zoom lens 555 is not projecting out moves on to step S110, in which the outgoing-talk unit 523 is turned on and the incoming-talk unit 13 is turned off step S112 turns the cartilage conduction vibration source 525 on and then the flow moves on to step S46.

On the other hand, in a case in which no cartilage conduction setting is detected in step S106 the flow moves on to step S114, in which the outgoing-talk unit 523 and the incoming-talk unit 13 are turned on; step S116 turns the cartilage conduction vibration source 525 off and the flow moves on to step S118. Furthermore, in a case in which it is detected in step S108 that the zoom lens 555 is projecting out when it is also detected in step S106 that the cartilage conduction has been set, the flow moves on to step S111, which instructs that the zoom lens 555 be collapsed, and the flow moves on to step S114. However, in a case in which collapsing has already been initiated, the instruction is that same be continued. As will be described later, steps S106 to S116 are repeated until the call state is cut off. Thus, there is an instruction to collapse in step S111 in accordance with a cartilage conduction setting detection in step S106, and after the collapsing has been initiated, the state of steps S114 and S116 is maintained without the flow moving on to step S110 until the collapsing is completed and the projection of the zoom lens 555 is no longer detected in step S108.

Steps S46 to S56, which follow step S112, are consistent with FIG. 10 and therefore a description thereof has been omitted. Upon the move to step S54 or steps S56 to S118, a check is done for whether the call state has been cut off, and in a case in which a call interruption is not detected, the flow returns to step S106, following which steps S106 to S118 and steps S46 to S56 are repeated. When, for example, environment noise is loud and when listening comprehension is impaired at the incoming-talk unit 13, support can thereby be provided for the user to operate the switch button 561 during a call to switch to the cartilage conduction setting and thereby block environment noise or further ease listening comprehension by the earplug bone conduction effect, and the like. Also, at this time the zoom lens 555 is automatically collapsed when in the projecting state.

Seventh Embodiment

Figure 15A:
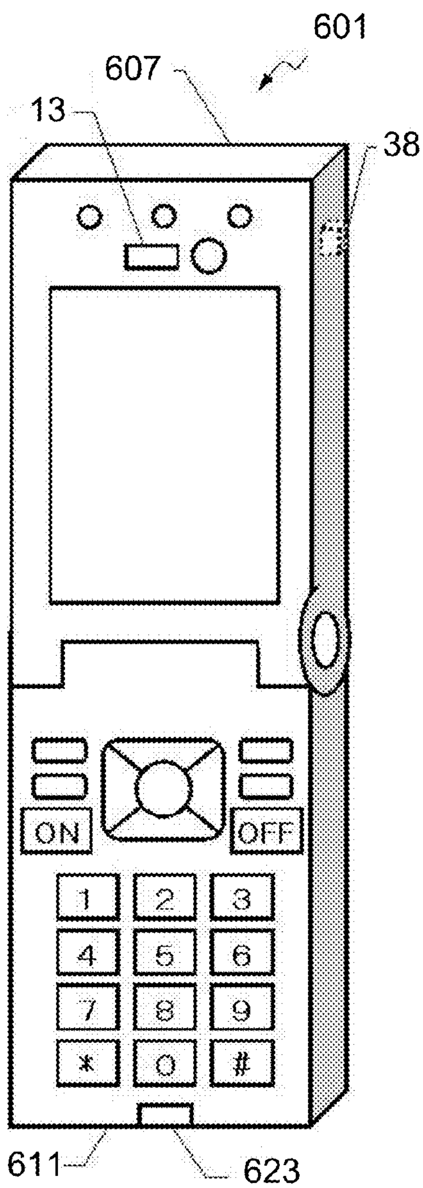
FIGS. 15A, 15B and 15C are perspective views illustrating a seventh embodiment of a mobile telephone according to an aspect of the present invention, where
Figure 15B:
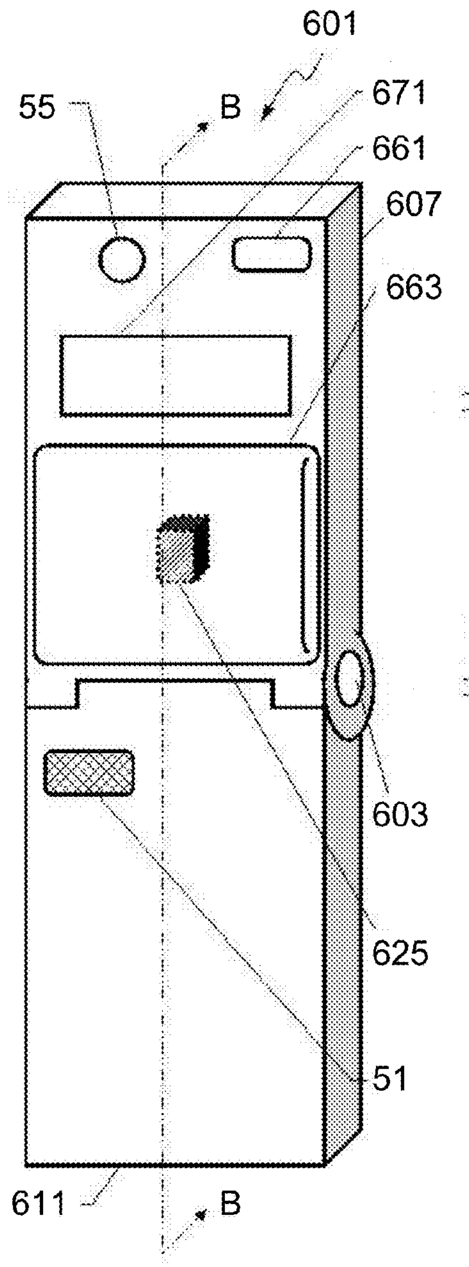
Figure 15C:
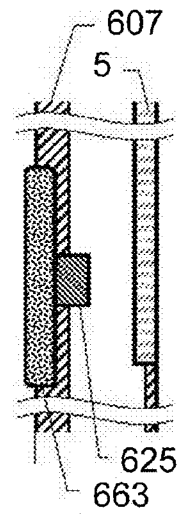

FIG. 15 is a perspective view illustrating a seventh embodiment of a mobile telephone according to an aspect of the present invention. A mobile telephone 601 of the seventh embodiment, similarly with respect to the first embodiment, is configured such that an upper part 607 can be folded onto a lower part 611 by a hinge unit 603. FIG. 15A is a front perspective view similar to FIG. 1, and FIG. 15B is a rear perspective view thereof. FIG. 15C is a cross-sectional view of the elements in the B-B sectional plane in FIG. 15B. The majority of the structure of the seventh embodiment is shared with that of the first embodiment, and therefore corresponding parts have been assigned the same reference numerals, and a description has been omitted. Also, to avoid complicating the illustration, the assignment of the reference numerals themselves has also been omitted for those portions for which the description has been omitted, but the functions and names of the common parts in the drawings are common with FIG. 1. Furthermore, although the overview is shared with the first embodiment, a more detailed description of the internal configuration calls on the essential points of the block diagram of the fourth embodiment in FIGS. 8 and 9.

A first point of difference in the seventh embodiment from the first embodiment lies in that, as depicted in FIG. 15B, a cartilage conduction output unit 663 having a broad surface area is provided in the vicinity of the hinge of the upper part 607. The cartilage conduction output unit 663 is similar to the softcover 463 in the fifth embodiment and/or to the grip unit 563 in the sixth embodiment, and is made using a material that has acoustic impedance approximating that of ear cartilage (a silicone rubber; a mixture of a silicone rubber and a butadiene rubber; a natural rubber; or a structure formed using these varieties of rubber in which air bubbles are sealed), and is provided with an elasticity suited for protecting against collision of a foreign object against the outer wall of the mobile telephone 601. Unlike the arrangement in the first embodiment, a cartilage conduction vibration source 625 is arranged behind the cartilage conduction output unit 663. As is clear from the cross-section of FIG. 15C, the cartilage conduction vibration source 625 is in contact with the rear surface of the cartilage conduction output unit 663.

Accordingly, folding the mobile telephone 601 and bringing the cartilage conduction output unit 663 up against the ear transmits the vibration of the cartilage conduction vibration source 625 to the ear cartilage over a broad area of contact by the interposition of the cartilage conduction output unit 663. Sound from the exterior of the cartilage conduction output unit 663, which resonates in accordance with the vibration of the cartilage conduction vibration source 625, is further transmitted to the tympanic membrane from the external auditory meatus. Sound source information from the cartilage conduction vibration source 625 can thereby be heard as a loud sound. Also, similarly with respect to the fifth embodiment and the sixth embodiment, the cartilage conduction output unit 663, which is brought up against the ear, takes on a form such that the external auditory meatus is obstructed, and can therefore block environment noise. Further similarly with respect to the fifth embodiment and the sixth embodiment, increasing the force with which the cartilage conduction output unit 663 is pressed to the ear gives the result of substantially completely obstructing the external auditory meatus, and sound source information from the cartilage conduction vibration source 625 can be heard as an even louder sound due to the earplug bone conduction effect. Detection is done via the cartilage conduction output unit 663, but, similarly with respect to the fifth embodiment and the sixth embodiment, in the state in which the earplug bone conduction effect is created, the waveform inversion signal from a microphone or other outgoing-talk unit 623 is added to the signal of one's own voice, on the basis of the detection of pressure by the cartilage conduction vibration source 625.

A second point of difference in the seventh embodiment from the first embodiment lies in that, as depicted in FIG. 15A, the outgoing-talk unit 623 is provided to the lower end surface of the lower part 611, rather than to the front surface of the lower part 611 of the mobile telephone 601. Accordingly, the outgoing-talk unit 623 can consistently pick up the user's voice both when the mobile telephone 601 is opened and the incoming-talk unit 13 is brought up against the ear for a call and when the mobile telephone 601 is closed and the cartilage conduction output unit 663 is brought up against the ear for a call. In a case in which the mobile telephone 601 is set to support switching cartilage conduction, switching occurs automatically such that the incoming-talk unit 13 is activated when the mobile telephone 601 is opened and a cartilage conduction vibration source 625 is activated when the mobile telephone 601 is closed. On the other hand, in a case in which there is no setting to support switching the cartilage conduction, the cartilage conduction vibration source 525 will not automatically be activated; rather, ordinary speaking and listening function regardless of whether the mobile telephone 601 is open or closed.

As is clear from the rear perspective view in FIG. 15B, the back surface of the mobile telephone 601 is provided with a backside main camera 55, a speaker 51, and a back surface display unit 671. The back surface of the mobile telephone 601 is further provided with a pushbutton 661, which becomes active when the cartilage conduction switching support is set and the mobile telephone 601 is closed. Similarly with respect to the fifth embodiment, the pushbutton 661 has the functions of initiating a call with a first push, and of interrupting a call when pushed a second time during a call. The first push of the pushbutton 661 is performed either to place an outgoing call to a specific party or to respond to an incoming call, a call being initiated thereby in either case.

Figure 16:
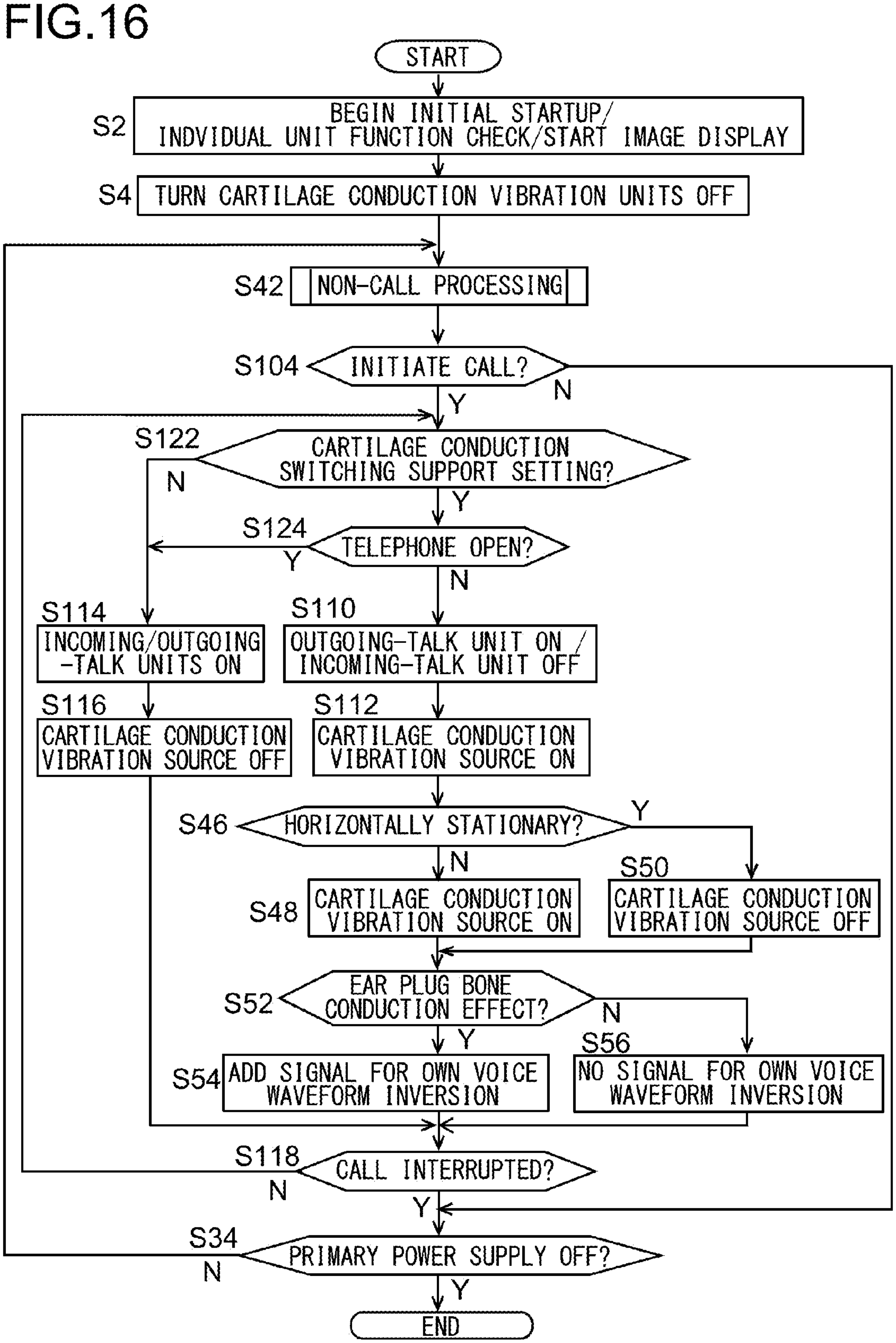
FIG. 16 is a flow chart of the operation of the controller in the seventh embodiment of FIG. 15.

FIG. 16 is a flow chart of the operation of the controller 239 (borrowing from FIG. 8) in the seventh embodiment of FIG. 15. However, parts that the flow of FIG. 16 shares with the flow of FIG. 14 have been given like step reference numerals, and a description thereof has been omitted. FIG. 16 also illustrates an abstraction of the operation that focuses on related functions, in order to primarily provide a description of the function of the cartilage conduction vibration unit 228. Accordingly, in the seventh embodiment, the controller 239 also contains typical mobile telephone functions and other operations not represented by the flow of FIG. 16, similarly with respect to FIG. 14 and the like.

In the flow of FIG. 16, a call is initiated and when step S122 is reached, there is performed a check for whether cartilage conduction switching support has been set. In a case in which cartilage conduction switching support is confirmed to have been set in step S122, the flow proceeds to step S124, which checks for whether or not the mobile telephone 601 has been opened; i.e., has gone from the state in which the upper part 607 is folded on top of the lower part 611 to the state of being opened as in FIG. 15. In a case in which it is confirmed that the mobile telephone 601 has not been opened and the upper part 607 is folded on top of the lower part 611, the flow moves on to step S110, which turns the outgoing-talk unit 623 on and turns the incoming-talk unit 13 off; step S112 turns the cartilage conduction vibration source 625 on and then the flow moves on to step S46. Thus, it becomes possible to listen using the cartilage conduction output unit 663 in the state in which the mobile telephone 601 is folded up.

On the other hand, in a case in which it is not detected in step S122 that the cartilage conduction switching support has been set, no question is posed as to whether or not the mobile telephone 601 is folded up, but rather the flow moves on to step S114, which turns the outgoing-talk unit 623 and the incoming-talk unit 13 on together; step S116 then turns the cartilage conduction vibration source 625 off and moves on to step S118. In a case in which it is detected in step S106 that the cartilage conduction switching support has been set, the flow moves on to step S114 even when it is confirmed in step S124 that the mobile telephone 601 is open.

The flow in FIG. 16 also has a check for whether or not the call state has been cut off in step S118; the flow returns to step S122 in a case in which a call interruption is not detected, following which step S122, step S124, steps S114 to S118 and steps S46 to S56 are repeated. Thus, in a case in which the cartilage conduction switching support has been pre-set, when, for example, environment noise is loud and when listening comprehension is impaired at the incoming-talk unit 13, support can be provided for the user to fold up the mobile telephone 601 during the course of a call and switch to listening by the cartilage conduction output unit 663, and thereby block environment noise or further ease listening comprehension by the earplug bone conduction effect, and the like.

To summarize the features of the aforementioned fifth to sixth embodiments, the mobile telephone comprises a cartilage conduction vibration source and a conductor for guiding the vibration of the cartilage conduction vibration source to the ear cartilage; the conductor either is configured as an elastic body, or is large enough to be in contact with the ear cartilage at a plurality of points or is large enough to be in contact with the ear cartilage and obstruct the external auditory meatus, or has a surface area at least approximating that of an earlobe, or has an auditory impedance approximating the auditory impedance of ear cartilage. Any of these features or a combination thereof makes it possible to listen effectively to sound information by the cartilage conduction vibration source. The use of these features is also not to be limited to the above-described embodiments. For example, it is also possible to constitute the present invention without having the conductor be an elastic body, by the use of the advantages of the materials, sizes, surface areas, arrangements, and structures disclosed in the above-described embodiments.

Eighth Embodiment

Figure 17A:
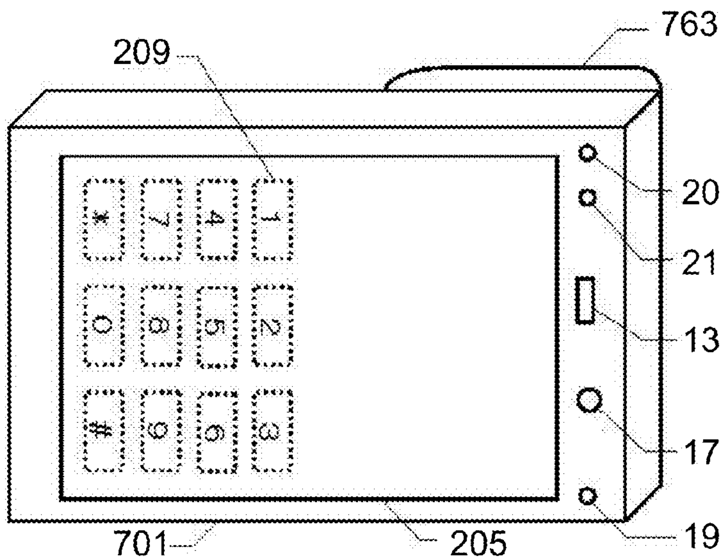
FIGS. 17A, 17B and 17C are perspective views illustrating an eighth embodiment of a mobile telephone according to an aspect of the present invention, where
Figure 17B:
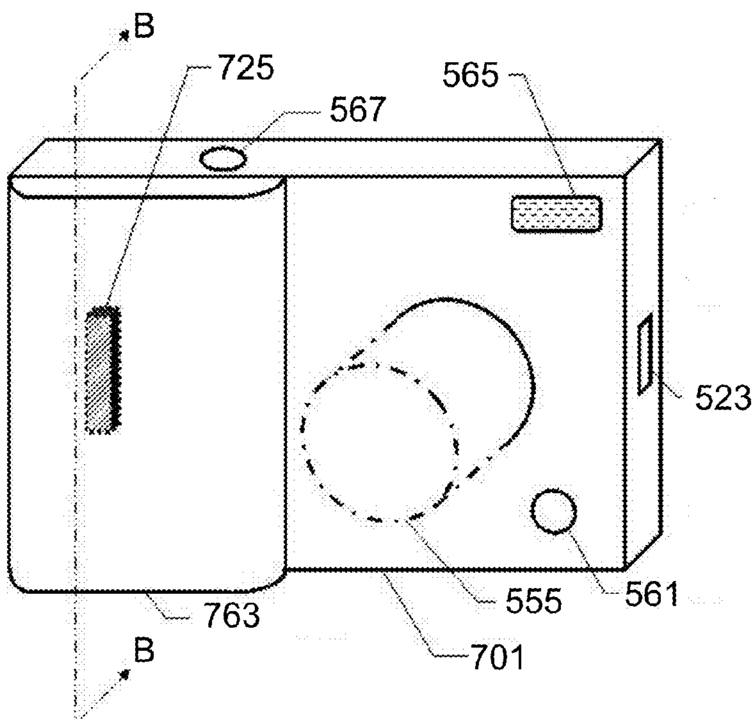
Figure 17C:
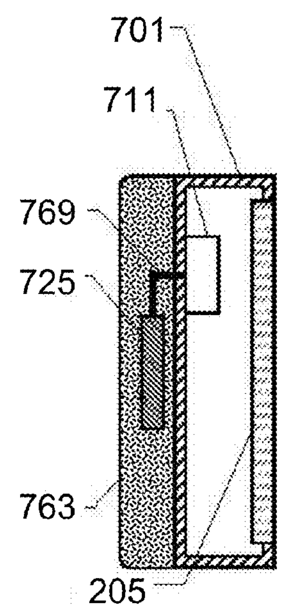

FIG. 17 is a perspective view illustrating an eighth embodiment of the mobile telephone according to an aspect of the present invention. The eighth embodiment is similar to the sixth embodiment of FIG. 13, and is configured as a digital camera provided with a mobile telephone function; similarly with respect to FIG. 13, FIG. 17A is a front perspective view, FIG. 17B is a rear perspective view, and FIG. 17C is a cross-sectional view in the B-B sectional plane in FIG. 17B. The eighth embodiment shares the majority of the structure with the sixth embodiment of FIG. 13; thus, corresponding parts have been given like reference numerals, and a description thereof has been omitted.

The point of difference in the eighth embodiment from the sixth embodiment lies in that, as is clear from the cross-section of FIG. 17C, a cartilage conduction vibration source 725 is embedded inside a grip unit 763. The grip unit 763, similarly with respect to the sixth embodiment in FIG. 13, is made using a material that has acoustic impedance approximating that of ear cartilage (a silicone rubber; a mixture of a silicone rubber and a butadiene rubber; a natural rubber; or a structure formed using these varieties of rubber in which air bubbles are sealed), and is provided with an elasticity suited for providing a satisfactory grip sensation. A more detailed description of the internal configuration, similarly with respect to the sixth embodiment, calls on the essential points of the block diagram of the fourth embodiment in FIGS. 8 and 9.

A flexible connection wire 769 in FIG. 17C connects the cartilage conduction vibration source 725, which is embedded inside the grip unit 763, with the phase adjustment mixer unit 236 of FIG. 8 or other circuit portion 771. The structure as illustrated by the cross-sectional view in FIG. 17C, for embedding the cartilage conduction vibration source 725 inside the grip unit 763, can be achieved by an integrated mold in which the cartilage conduction vibration source 725 and the flexible connection wire 769 are inserted into the grip unit 763. The same can also be achieved by dividing the grip unit 763 into two bodies, where the flexible connection wire 769 and the cartilage conduction vibration source 725 serve as a boundary, and by bonding the two grip units 763 across the flexible connection wire 769 and the cartilage conduction vibration source 725.

The eighth embodiment is similar to the sixth embodiment in that bringing the grip unit 763 up against the ear transmits the vibration of the cartilage conduction vibration source 725 to the ear cartilage over a broad area of contact by the interposition of the grip unit 763; in that sound from the exterior of the grip unit 763, which resonates in accordance with the vibration of the cartilage conduction vibration source 725, is further transmitted to the tympanic membrane from the external auditory meatus; in that environment noise can also be blocked, because the grip unit 763, which is brought up against the ear, has a form such that the external auditory meatus is obstructed; and in that increasing the force pressing the grip unit 763 to the ear furthermore gives the result of substantially completely obstructing the external auditory meatus, and sound source information from the cartilage conduction vibration source 725 can be heard as an even louder sound due to the earplug bone conduction effect. In the state in which the earplug bone conduction effect is created, the adding of the waveform inversion signal from the microphone or other outgoing-talk unit 523 to the signal of one's own voice, on the basis of the detection of pressure by the cartilage conduction vibration source 625, is the same as in the sixth embodiment. However, because the cartilage conduction vibration source 725 is embedded in the grip unit 763 in the eighth embodiment, the state in which the earplug bone conduction effect is created is detected by the strain to the cartilage conduction vibration source 725, which is caused by the strain to the grip unit 763 due to an increase in the pushing force.

The significance of embedding the cartilage conduction vibration source 725 inside an elastic body such as the grip unit 763 in the eighth embodiment lies not only in obtaining a favorable conduction of sound, as described above, but also in counteracting impact on the cartilage conduction vibration source 725. A piezoelectric bimorph element, which is used as the cartilage conduction vibration source 725 in the eighth embodiment, has properties for resisting impact. Herein, configuring the cartilage conduction vibration source 725 so as to be enveloped circumferentially, as in the eighth embodiment, can provide cushioning against impact resulting from the rigid structure of the mobile telephone 701, and can facilitate implementation in the mobile telephone 701, which is constantly exposed to such risks as being dropped. The elastic body enveloping the cartilage conduction vibration source 725 not only functions simply as a cushioning material, but also functions as a configuration for more effectively transmitting the vibration of the cartilage conduction vibration source 725 to the ear as described above.

Ninth Embodiment

Figure 18A:
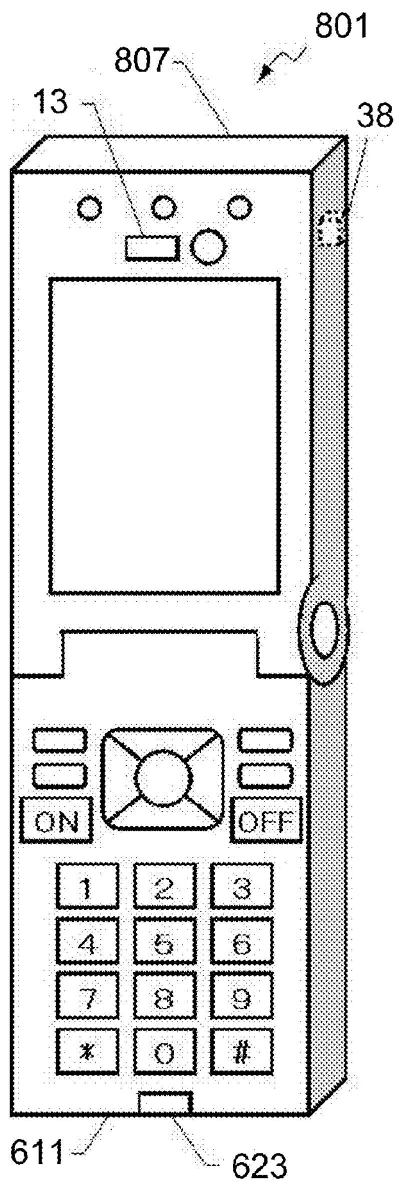
FIGS. 18A, 18B and 18C are perspective views illustrating a ninth embodiment of a mobile telephone according to an aspect of the present invention, where
Figure 18B:
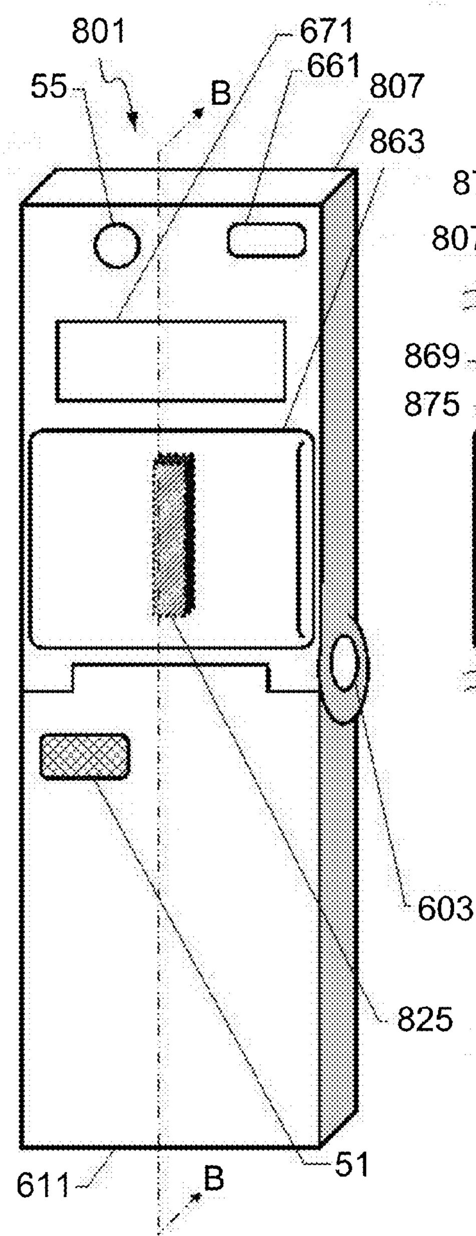
Figure 18C:
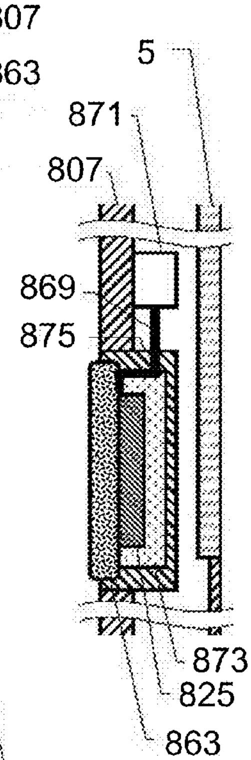

FIG. 18 is a perspective view illustrating a ninth embodiment of a mobile telephone according to an aspect of the present invention. A mobile telephone 801 of the ninth embodiment, similarly with respect to the seventh embodiment, is configured such that an upper part 807 can be folded onto the lower part 611 by a hinge unit 603. In FIG. 18, which is similar to FIG. 15, FIG. 18A is a front perspective view, FIG. 18B is a rear perspective view, and FIG. 18C is a cross-sectional view in the B-B sectional plane in FIG. 18B. The eighth embodiment in FIG. 18 shares the majority of the structure with the seventh embodiment of FIG. 15; thus, corresponding parts have been given like reference numerals, and a description thereof has been omitted.

A point of difference in the ninth embodiment from the seventh embodiment lies in that, as is clear from the cross-section of FIG. 18C, a cartilage conduction vibration source 825 is sandwiched between a cartilage conduction output unit 863 and an internal cushioning material 873. The cartilage conduction output unit 863, similarly with respect to the cartilage conduction output unit 663 in the seventh embodiment, is made using a material that has acoustic impedance approximating that of ear cartilage (a silicone rubber; a mixture of a silicone rubber and a butadiene rubber; a natural rubber; or a structure formed using these varieties of rubber in which air bubbles are sealed), and is provided with an elasticity suited for protecting against the collision of a foreign object against the outer wall of the mobile telephone 801. The internal cushioning material 873 can be constituted of any material provided that the material is an elastic body having the purpose of providing cushioning, but can also be made of the same material as the cartilage conduction output unit 863. A more detailed description of the internal configuration, which is similar to the seventh embodiment, calls on the essential points of the block diagram of the fourth embodiment in FIGS. 8 and 9.

As illustrated by the cross-section in FIG. 18C, the cartilage conduction vibration source 825 and a flexible connection wiring 869 are sandwiched in between the cartilage conduction output unit 863 and the internal cushioning material 873. The flexible connection wire 869, similarly with respect to the eighth embodiment, connects the cartilage conduction vibration source 825 with the phase adjustment mixer unit 236 of FIG. 8 or other circuit portion 871. These structures, in which the cartilage conduction vibration source 825 and the flexible connection wire 869 are sandwiched in between the cartilage conduction output unit 863 and the internal cushioning material 873, are integrated within a cartilage conduction output unit 875; such a cartilage conduction output unit 875 is fitted into the upper part 807 of the mobile telephone 801.

The ninth embodiment is also similar to the seventh embodiment in that bringing the cartilage conduction output unit 863 up against the ear transmits the vibration of the cartilage conduction vibration source 825 to the ear cartilage over a broad area of contact by the interposition of the cartilage conduction output unit 863; in that sound from the cartilage conduction output unit 863, which resonates in accordance with the vibration of the cartilage conduction vibration source 825, is transmitted to the tympanic membrane from the external auditory meatus; in that environment noise can be blocked, because the cartilage conduction output unit 863, which is brought up against the ear, has a form such that the external auditory meatus is obstructed; and in that increasing the force pressing the cartilage conduction output unit 863 to the ear gives the result of substantially completely obstructing the external auditory meatus, and sound source information from the cartilage conduction vibration source 825 can be heard as an even louder sound due to the earplug bone conduction effect. In the state in which the earplug bone conduction effect is created, the adding of the waveform inversion signal from the microphone or other outgoing-talk unit 623 to the signal of one's own voice, on the basis of the detection of pressure by the cartilage conduction vibration source 825, is the same as in the seventh embodiment. However, in the ninth embodiment, the cartilage conduction vibration source 825 is sandwiched in between the cartilage conduction output unit 863 and the internal cushioning material 873, which both are elastic bodies, and therefore, similarly with respect to the eighth embodiment, the state in which the earplug bone conduction effect is created is detected by the strain to the cartilage conduction vibration source 825, which accompanies the strain to the cartilage conduction output unit 863 due to an increase in the pushing force.

The significance of the structure in the ninth embodiment, in which the cartilage conduction vibration source 825 is sandwiched between the cartilage conduction output unit 863 and the internal cushioning material 873, which are both elastic bodies, lies not only in obtaining a favorable conduction of sound, as described above, but also in counteracting impact on the cartilage conduction vibration source 825, which is made of a piezoelectric bimorph element. In other words, similarly with respect to the eighth embodiment, configuring the cartilage conduction vibration source 825 so as to be enveloped circumferentially can provide cushioning against impact resulting from the rigid structure of the mobile telephone 801, and can facilitate implementation in the mobile telephone 801, which is constantly exposed to being dropped and other risks. The elastic body sandwiching the cartilage conduction vibration source 825 not only functions merely as a cushioning material, but also functions as a configuration for more effectively transmitting the vibration of the cartilage conduction vibration source 825 to the ear as described above, due to the fact that at least the outer elastic body is molded of a material having an acoustic impedance approximating that of ear cartilage.

Tenth Embodiment

Figure 19:
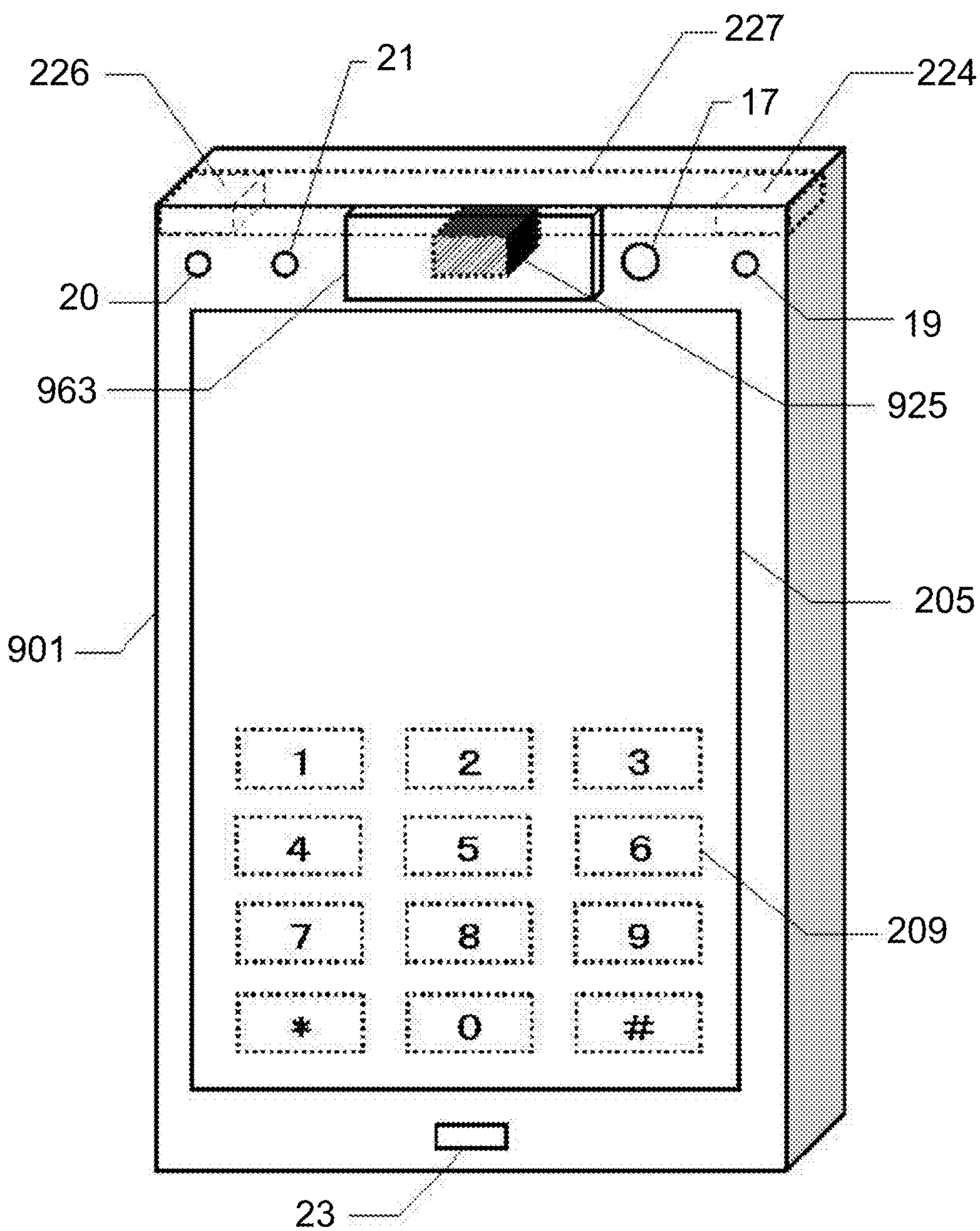
FIG. 19 is a perspective view illustrating a tenth embodiment of the mobile telephone according to an aspect of the present invention (tenth embodiment)

FIG. 19 is a perspective view illustrating a tenth embodiment of the mobile telephone according to an aspect of the present invention. A mobile telephone 901 of the tenth embodiment, similarly with respect to that of the fourth embodiment, is an integrated type with no moving parts, and is configured as a "smartphone," which has a large-screen display unit 205 provided with GUI functions. There is much in common with the structure thereof, and accordingly corresponding portions have been given like reference numerals as in the fourth embodiment, and a description has been omitted. However, similarly with respect to the fourth embodiment, the "upper part" in the tenth embodiment does not signify a separate upper part, but rather signifies the portion at the top of the integrated structure.

A point of difference in the tenth embodiment from the fourth embodiment lies in that a cartilage conduction vibration source 925, which is made up of a piezoelectric bimorph element or the like, serves as the cartilage conduction vibration source, and also takes on the role of a drive source of the incoming-talk unit for generating sound waves that are transmitted to the tympanic membrane by air conduction. To provide a more specific description, the vibration conductor 227, similarly with respect to the fourth embodiment, is in contact with the upper part of the cartilage conduction vibration source 925 and is arranged at the upper side of the mobile telephone. Furthermore, a cartilage conduction output unit 963, which, similarly with respect to the seventh embodiment, is made using a material that has acoustic impedance approximating that of ear cartilage (a silicone rubber; a mixture of a silicone rubber and a butadiene rubber; a natural rubber; or; a structure formed using these varieties of rubber in which air bubbles are sealed), is arranged at the front of the cartilage conduction vibration source 925. Because the cartilage conduction output unit 963, as will be described later, serves as an incoming-talk unit for generating sound waves that are transmitted to the tympanic membrane by air conduction, the tenth embodiment has no special setting for the incoming-talk unit 13 as in the fourth embodiment.

Due to the configuration described above, first, the vibration of the cartilage conduction vibration source 925 is transmitted laterally by the vibration conductor 227, causing the two ends 224 and 226 thereof to vibrate, and thus causing either one thereof to come into contact with the tragus allows sound to be heard by cartilage conduction. Also, similarly with respect to the fourth embodiment, the vibration conductor 227 vibrates not only at the right end 224 and left end 226 thereof but rather vibrates as a whole. Accordingly, it is possible in the tenth embodiment as well to transmit audio information regardless of where on the top inner edge of the mobile telephone 901 is contact made with the ear cartilage. Then, the vibration conductor 227 is in contact with the ear cartilage over a broad range and also the cartilage conduction output unit 963 is in contact with the tragus and other ear cartilage, when the mobile telephone 901 is brought up against the ear in such a form that a part of the cartilage conduction output unit 963 comes into the front of the entrance of the external auditory meatus, similarly with respect to an ordinary mobile telephone. Through such contact, sound can be heard by cartilage conduction. Similarly with respect to the fifth embodiment to the ninth embodiment, sound from the exterior of the cartilage conduction output unit 963, which resonates in accordance with the vibration of the cartilage conduction vibration source 925, is further transmitted to the tympanic membrane from the external auditory meatus as sound waves. Thus, the cartilage conduction output unit 963 can function as an incoming-talk unit by air conduction in the ordinary state of use of a mobile telephone.

Cartilage conduction conducts differently depending on the magnitude of force pushing on the cartilage; a more effective conduction state can be obtained when the pushing force is increased. This signifies that natural behavior, such as increasing the force pushing the mobile telephone against the ear when it is difficult to hear the incoming-talk unit sound, can be utilized to adjust the volume. Even when such a function is not explained to the user in, for example, the instruction manual, the user can still intuitively understand the function through natural behavior. Configuring the vibration of the cartilage conduction vibration source 925 in the tenth embodiment such that the vibration conductor 227, which is a rigid body, and the cartilage conduction output unit 963, which is an elastic body, can both simultaneously be in contact with the ear cartilage is intended to permit more effective volume adjustment primarily through adjusting the force pushing on the vibration conductor 227, which is a rigid body.

The employment of the present invention is not to be limited to the above-described embodiments; other aspects can also benefit from the various above-described advantages of the present invention. For example, a resonator that is appropriate as a speaker other than the material having an acoustic impedance approaching that of ear cartilage can be arranged at the position where the cartilage conduction output unit 963 is arranged, in a case in which the tenth embodiment is configured such that the combination of the cartilage conduction vibration source 925 and the cartilage conduction output unit 963 function as a dedicated incoming-talk unit by air conduction. Such a case is also able to benefit from the features and advantages of the tenth embodiment, in which the cartilage conduction vibration source 925, which is made up of a piezoelectric bimorph element or the like, serves as the cartilage conduction vibration source, and also serves as a drive source of the incoming-talk unit for generating sound waves that are transmitted to the tympanic membrane by air conduction.

Eleventh Embodiment

Figure 20:
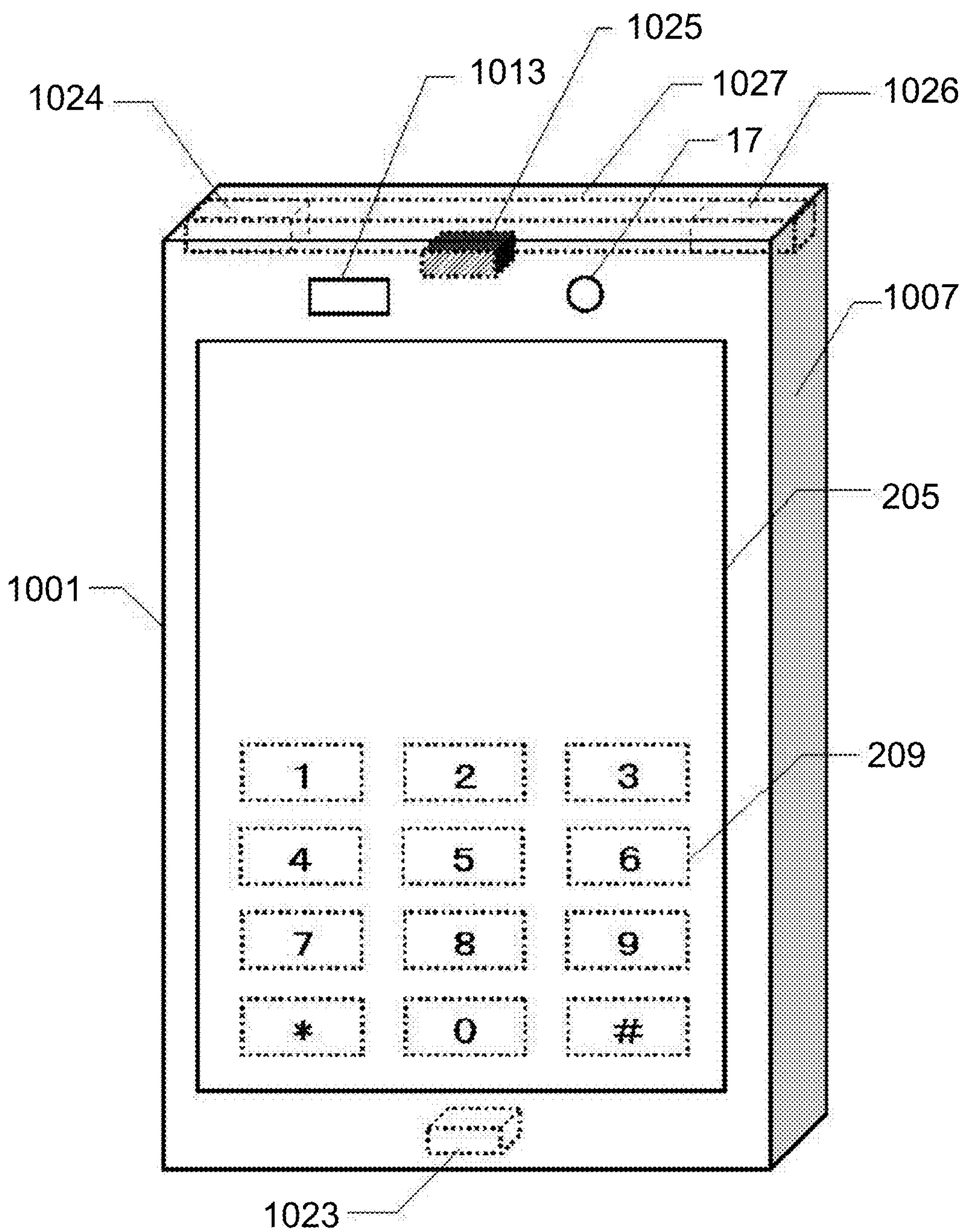
FIG. 20 is a perspective view illustrating an eleventh embodiment of a mobile telephone according to an aspect of the present invention (eleventh embodiment)

FIG. 20 is a perspective view illustrating an eleventh embodiment of the mobile telephone according to an aspect of the present invention. The mobile telephone 1001 of the eleventh embodiment, similarly with respect to that of the fourth embodiment, is an integrated type with no moving parts, and is configured as a "smartphone," which has a large-screen display unit 205 provided with GUI functions. There is much in common with the structure thereof, and so corresponding portions have been given like reference numerals as in the fourth embodiment, and a description has been omitted. However, similarly with respect to the fourth embodiment, the "upper part" in the eleventh embodiment does not signify a separate upper part, but rather signifies the portion at the top of the integrated structure.

A point of difference in the eleventh embodiment from the fourth embodiment lies in that a right ear vibration unit 1024 and a left ear vibration unit 1026 are provided not to the front of the mobile telephone 1001 but rather to a side surface 1007 and to the side surface of the opposite side, shown without a reference number with relation to the diagrams, respectively (it shall be noted that the right ear vibration unit 1024 and the left ear vibration unit 1026 are arranged in a left-right reversal relative to the fourth embodiment of FIG. 7). In a manner functionally similar to that of the fourth embodiment, the right ear vibration unit 1024 and the left ear vibration unit 1026 in the eleventh embodiment are also configured as the two end parts of the vibration conductor 1027; the cartilage conduction vibration source 1025, which is made up of a piezoelectric bimorph element or the like, is arranged in contact with the lower part of the vibration conductor 1027, the vibration thereof being transmitted to the vibration conductor 1027. The vibration of the cartilage conduction vibration source 1025 is thereby transmitted laterally by the vibration conductor 1027, causing the two ends 1024 and 1026 thereof to vibrate. The two ends 1024 and 1026 of the vibration conductor 1027 are provided so as to be in contact with the tragus when the upper end portion of a side surface (for example, 1007) of the mobile telephone 1001 is brought up against the ear.

A microphone or other outgoing-talk unit 1023 is provided to the lower surface of a mobile telephone 1001 such that audio uttered by the user can be picked up even in the state in which either of the right ear vibration unit 1024 or the left ear vibration unit 1026 is brought up against the tragus. In addition, the mobile telephone 1001 of the eleventh embodiment is provided with a speaker 1013 for videoconferencing functions occurring while the large-screen display unit 205 is being observed; the sensitivity of the microphone or other outgoing-talk unit 1023 is switched at the time of the videoconferencing function, and audio uttered by the user during the observation of the display monitor 205 can be picked up.

FIG. 21 is a side view of the mobile telephone 1001 illustrating the function of the right ear vibration unit 1024 and the left ear vibration unit 1026; the method illustrated is in accordance with FIG. 2. However, as depicted in FIG. 20, the right ear vibration unit 1024 and the left ear vibration unit 1026 in the eleventh embodiment are each provided to a side surface of the mobile telephone 1001. Accordingly, in the eleventh embodiment, the side surface of the mobile telephone 1001 is brought up against the tragus, as depicted in FIG. 21, when the mobile telephone 1001 is brought up against the ear. In other words, it is not that the surface of the display unit 5 of the mobile telephone 1 is brought up against the tragus, as in FIG. 2; therefore, the large-screen display unit 205 is not brought up against the ear and/or cheek and will not be fouled by sebum or the like.

Figure 21A:
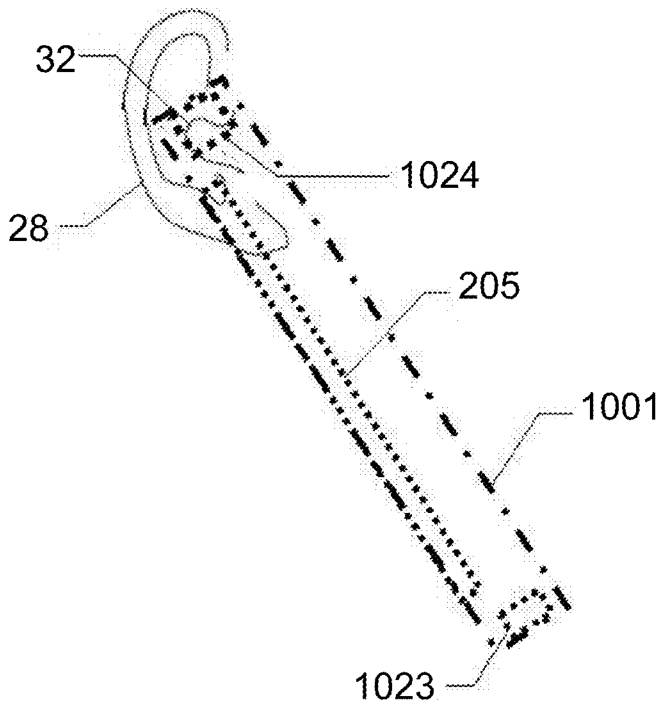
FIGS. 21A and 21B are side views of the eleventh embodiment illustrating the functions of the state of right ear use and the state of left ear use.
Figure 21B:
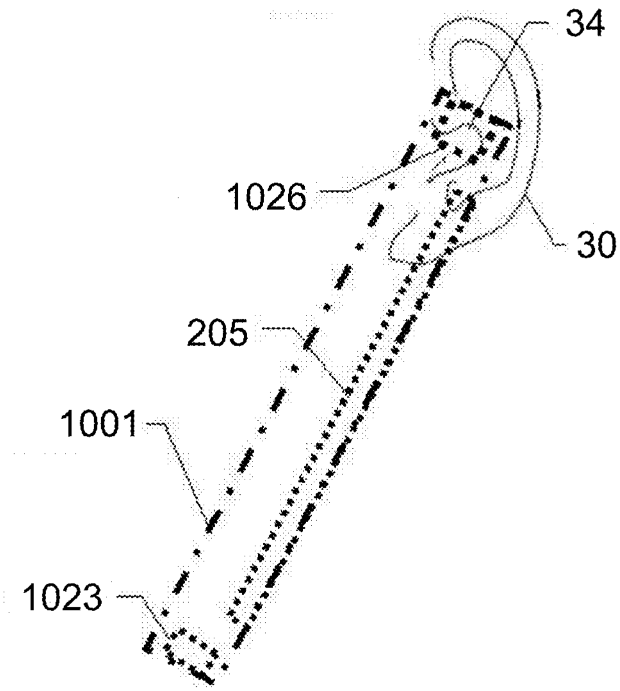

More specifically, FIG. 21A illustrates the state in which the mobile telephone 1001 is held in the right hand and is brought up against the tragus 32 of the right ear 28; the side surface in view is the side opposite to the one in the mobile telephone 1001 being brought up against the right ear 28, and the surface of the large-screen display unit 205 depicted by the cross-section is approximately perpendicular to the cheek and faces the lower rear of the face. The result is that, as described above, the large-screen display unit 205 is not brought up against the ear and/or cheek and does not get fouled with sebum or the like. Similarly, FIG. 21B illustrates the state in which the mobile telephone 1001 is held in the left hand and is brought up against the tragus 34 of the left ear 30; such a case is also similar to that of FIG. 21A in that, the large-screen display unit 205 being approximately perpendicular to the cheek and facing the lower rear of the face, the large-screen display unit 205 is not brought up against the ear and/or cheek and does not get fouled with sebum or the like.

However, such a state of use as in FIG. 21 is implemented from the state in which the mobile telephone 1001 is held with the right hand and the large-screen display unit 205 is observed, for example, in the case of FIG. 21A, by moving the mobile telephone 1001 without shaking the hand, and bringing the right ear vibration unit 1024 up against the tragus 32. Accordingly, transitioning between the state of observing the large-screen display unit 205 and the state in which the right ear vibration unit 1024 is brought up against the tragus 32 is possible by a natural movement of the right hand, such as by slightly altering the angle between the elbow and the wrist, without needing to switch the hand holding the mobile telephone 1001 nor to shake the hand. To simplify the above description, the state in FIG. 21 has the large-screen display unit 205 substantially perpendicular to the cheek, but the user can unrestrictedly select the angle of the hand or the posture for bringing the mobile telephone 1001 up against the ear; the angle of the large-screen display unit 205 with the cheek therefore need not be perpendicular, but rather may be moderately inclined. However, because each of the right ear vibration unit 1024 and the left ear vibration unit 1026 is provided to a side surface of the mobile telephone 1001 according to the configuration of the eleventh embodiment, the large-screen display unit 205 is not brought up against the ear and/or cheek and will not be fouled by sebum or the like, regardless of the posture in which the vibration units are brought up against the tragus 32 or 34.

As a result of the fact that the large-screen display unit 205 is not hidden by facing the direction of the cheek in the eleventh embodiment, it is possible that the call destination or other display content may be seen by other people in front or rear. Accordingly, to protect privacy in the eleventh embodiment, a switch is automatically made from an ordinary display to a privacy-protection display (where, for example, nothing is displayed) in the state in which the right ear vibration unit 1024 or the left ear vibration unit 1026 is brought up against the ear. This point will be described in greater detail later.

Twelfth Embodiment

Figure 22A:
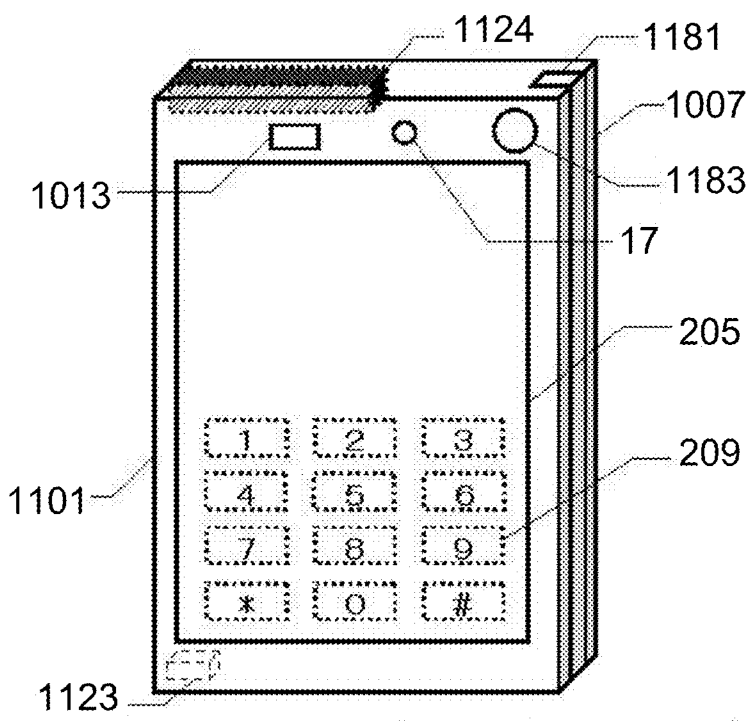
FIGS. 22A and 22B are perspective views illustrating a twelfth embodiment of a mobile telephone according to an aspect of the present invention (twelfth embodiment)
Figure 22B:
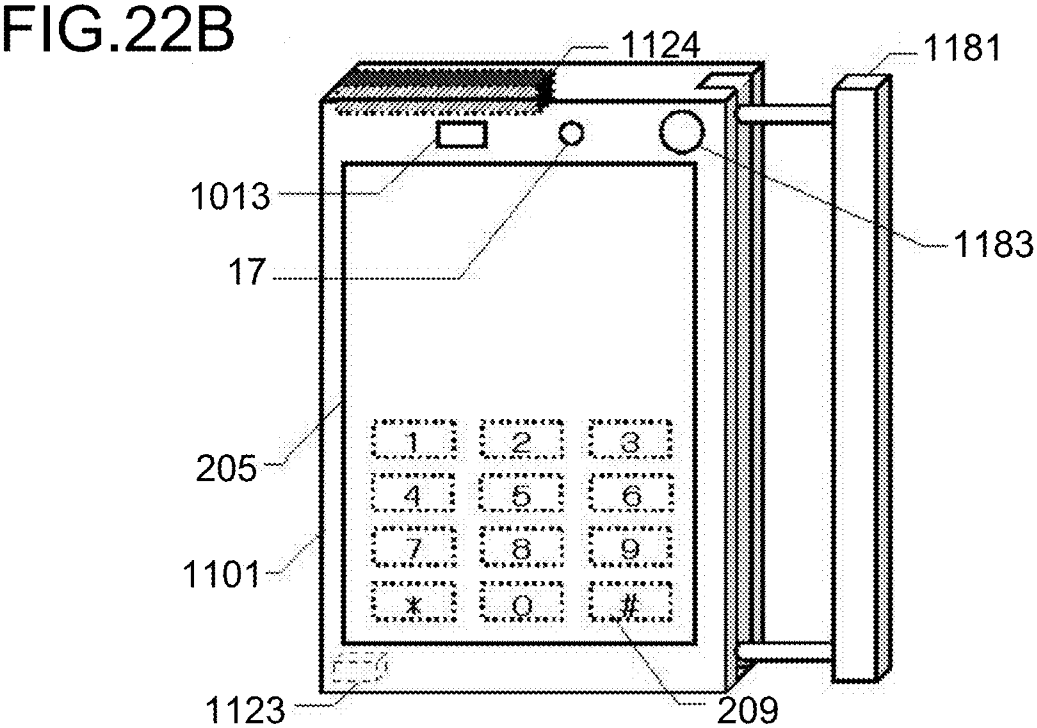

FIG. 22 is a perspective view illustrating a twelfth embodiment of the mobile telephone according to an aspect of the present invention. FIG. 22A illustrates the state in which a handle 1181 (to be described later) does not project out, and FIG. 22B illustrates the state in which the handle 1181 does project out. Similarly with respect to the eleventh embodiment, s cartilage conduction vibration unit 1124 of a mobile telephone 1101 of the twelfth embodiment is provided to a side surface of the mobile telephone 1101 (the side surface of the left side seen in FIG. 22, there being no reference numeral assigned thereto because the surface is hidden for convenience of illustration). The twelfth embodiment, being a mobile telephone, is based on an integrated type with no movable parts that is similar to the eleventh embodiment, and is configured as a "smartphone" having a large-screen display unit 205 provided with GUI functions. There is much in common with the structure thereof, and so corresponding portions have been given like reference numerals as in the eleventh embodiment, and a description has been omitted. However, similarly with respect to the eleventh embodiment, the "upper part" in the twelfth embodiment does not signify a separate upper part, but rather signifies the portion at the top of the integrated structure.

A point of difference in the twelfth embodiment from the eleventh embodiment lies in that, in addition to the configuration of the handle 1181 (to be described later), the cartilage conduction vibration unit 1124 is provided to one side surface on the left seen from FIG. 22 in the mobile telephone 1101. The element that is to be brought up against the ear is limited to being on the side surface of the left side, and therefore a microphone or other outgoing-talk unit 1123 is also provided to the lower surface close to the left side surface of the mobile telephone 1101, as illustrated in FIG. 22. However, in the twelfth embodiment as well, the outgoing-talk unit 1123 is switched at the time of a videoconferencing function occurring while the large-screen display unit 205 is being observed, and audio uttered by the user as they observe the large-screen display unit 205 can be picked up.

In the twelfth embodiment, similarly with respect to the eleventh embodiment, the cartilage conduction vibration unit 1124 can be brought up against the tragus of the right ear from the state in which the large-screen display unit 205 is being viewed, as in FIG. 22. On the other hand, to bring the cartilage conduction vibration unit 1124 up against the tragus of the left ear, the holding hand can be switched such that the mobile telephone 1101 faces backwards, the cartilage conduction vibration unit 1124 thereby being made to face the left ear. Use in such a manner is also possible in the state in which the handle 1181 does not project out, as in FIG. 22A.

The following is a description of the function of the handle. One natural way of holding when the cartilage conduction vibration unit 1124 is brought up against the ear at such an angle that the large-screen display unit 205 is approximately perpendicular to the cheek, as in FIG. 21, is embodied in a form such that the front surface of the mobile telephone 1101 on which the large-screen display unit 205 is provided and the back surface thereof are sandwiched by the thumb and the other four fingers, but the fingers at this time are in a state of touching the large-screen display unit 205; therefore, a concern is presented in that a mistaken operation is possible and the comparatively long-term and powerful contact during a call will result in fingerprint fouling.

In view whereof, to prevent the fingers from touching the large-screen display unit 205 while also facilitating holding the mobile telephone 1101, the twelfth embodiment is configured such that the handle 1181 projects out from the state in FIG. 22A to the state in FIG. 22B according to need, it being possible to use the handle 1181 to hold the mobile telephone. It thereby becomes possible in the state represented in FIG. 22B to sandwich the handle 1181 and the end parts of the body of the mobile telephone 1101 with the thumb and the other four fingers, and the mobile telephone 1101 can be readily held without the large-screen display unit 205 being touched. The handle 1181 can also be grasped to hold the mobile telephone 1101 in a case in which the degree of projection is configured so as to be comparatively larger. However, similarly with respect to the case of the state in FIG. 22A, the mobile telephone 1101 can also be held so as to face backwards, the cartilage conduction vibration unit 1124 thereby being brought up against the tragus of the left ear.

To cause the handle 1181 to project out from the state in FIG. 22A, a projection operation button 1183 is pushed and the handle is thereby unlocked and projects slightly outward; the state in FIG. 22B can therefore be achieved by pulling the handle out. Because the lock is engaged in the state in FIG. 22B, no problems are presented even when the handle 1181 is held and the cartilage conduction vibration unit 1124 is pushed up against the tragus. To house the handle 1181, the lock is undone when the projection operation button 1183 is pushed in the state in FIG. 22B; therefore, the lock is engaged when the handle 1181 is pushed in so as to assume the state in FIG. 22A.

Figure 23:
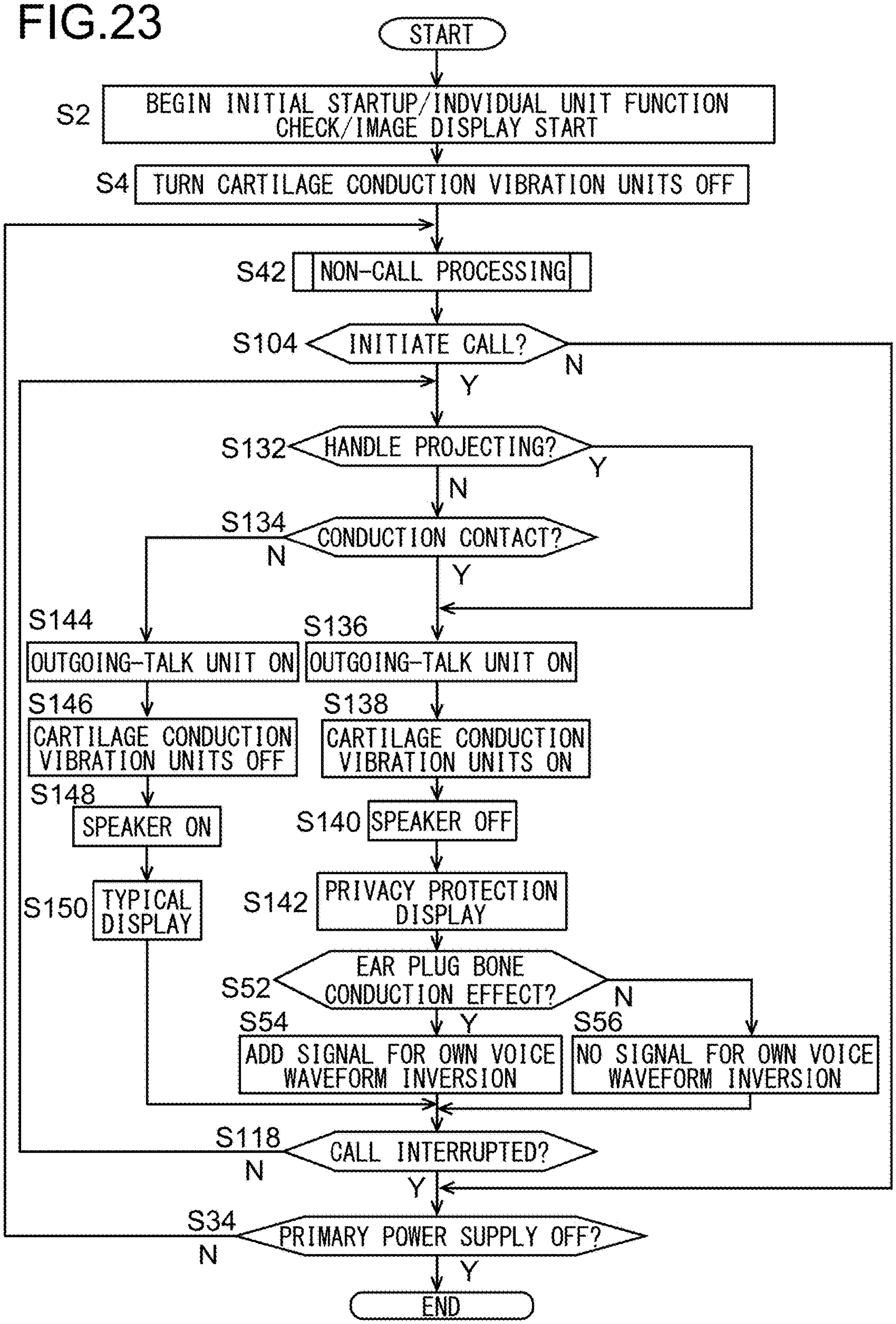
FIG. 23 is a flow chart of the operation of the controller in the twelfth embodiment of FIG. 22.

FIG. 23 is a flow chart of the operation of the controller 239 (borrowing from FIG. 8) in the twelfth embodiment of FIG. 22. However, parts that the flow of FIG. 23 shares with the flow of FIG. 14 have been given like step reference numerals, and a description thereof has been omitted. FIG. 23 also illustrates an abstraction of the operation that focuses on related functions, in order to primarily provide a description of the function of the cartilage conduction vibration unit 228. Accordingly, similarly with respect to FIG. 14 and the like, the controller 239 in the twelfth embodiment also contains typical mobile telephone functions and other operations not represented by the flow of FIG. 23. FIG. 23 uses boldface print to illustrate points of difference with FIG. 14, and thus the following description focuses on these portions.

In the flow of FIG. 23, there is performed a check for whether there has been an operation to initiate a call once step S104 is reached. A case in which there has not been an operation moves directly on to step S34. On the other hand, in a case in which an operation to initiate a call is detected, the flow proceeds to step S132, in which there is performed a check for whether the handle 1181 is in state of projecting. Then, in a case of the handle not being in a state of projecting out, the flow proceeds to step S134, in which there is performed a check for whether the cartilage conduction vibration unit 1124 is in a state of being in contact with the ear cartilage. Then, in a case in which a state of contact is detected, the flow proceeds to step S136. However, in a case in which it is detected in step S132 that the handle 1181 is in a state of projecting out, the flow moves directly on to step S136.

In step S136, the outgoing-talk unit 1123 is turned on, and in step S138, the cartilage conduction vibration unit 1124 is turned on. On the other hand, the speaker 1013 is turned off in step S140. Subsequently, proceeding on to step S142, the display of the large-screen display unit 205 is set to a privacy-protection display. The privacy-protection display is a state in which either there is a predetermined display that does not contain private information, or nothing is displayed at all. At this point in time, only the display content is altered, without the large-screen display unit 205 itself being turned off. After the display has been controlled in such a manner, the flow moves on to step S52. A case in which the desired state already exists in step S136 to S142 leads to step S52 without anything being done in these steps as a result.

On the other hand, in a case in which there is no detection in step S134 that the cartilage conduction vibration unit 1124 is in a state of being in contact with the ear cartilage, the flow moves on to step S144, which turns the outgoing-talk unit 1123 on; in step S146, the cartilage conduction vibration unit 1124 is turned off. Meanwhile, the speaker 1013 is turned on in step S148. Subsequently, the flow proceeds to step S150, and the display of the large-screen display unit 205 is set to an ordinary display. After the display has been controlled in such a manner, the flow moves on to step S118. A case in which the desired state already exists in step S144 to S150 also leads to step S118, without anything being done in these steps as a result.

Steps S52 to S56, step S118, and step S34, which follow step S142; as well as step S118 and step S34, which follow step S150, are shared with FIG. 14, and a description thereof has thereof been omitted. Upon moving on to step S118, there is performed a check for whether the call state has been cut off; in a case in which no call state interruption is detected, the flow returns to step S132, following which steps S132 to S150 and steps S52 to S56 are repeated. Switching between the cartilage conduction vibration unit 1124 and the speaker 1013 and also switching the display are thereby performed automatically, either by moving the handle 1181 in or out or by the contact or non-contact of the cartilage conduction vibration unit 1124. In the state in which the cartilage conduction vibration unit 1124 has been turned on, switching occurs automatically between whether or not the waveform inversion signal of one's own voice is added, which is based on the presence or absence of the earplug bone conduction effect.

In the repetition of the aforementioned steps, there may be an insertion in between steps S142 and S52 of a step for determining whether a predetermined period of time has passed after the display of the large-screen display unit 205 is initially changed to the privacy-protection display in step S142, and also of a step for turning the large-screen display unit 205 itself off with the purpose of saving electricity when the predetermined period of time has passed. At this time, in accordance therewith, there is an insertion in between steps S148 and S150 of a step for turning the large-screen display unit 205 on when same has been turned off. The flow in FIG. 23 can also be used for the eleventh embodiment in FIG. 20 by the omission of step S132.

Thirteenth Embodiment

Figure 24A:
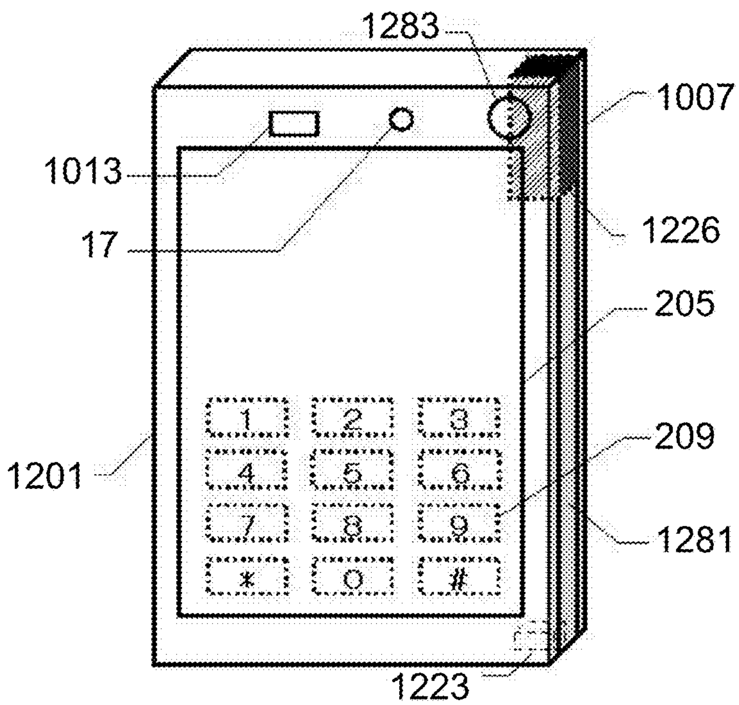
FIGS. 24A and 24B are perspective views illustrating a thirteenth embodiment of a mobile telephone according to an aspect of the present invention (thirteenth embodiment)
Figure 24B:
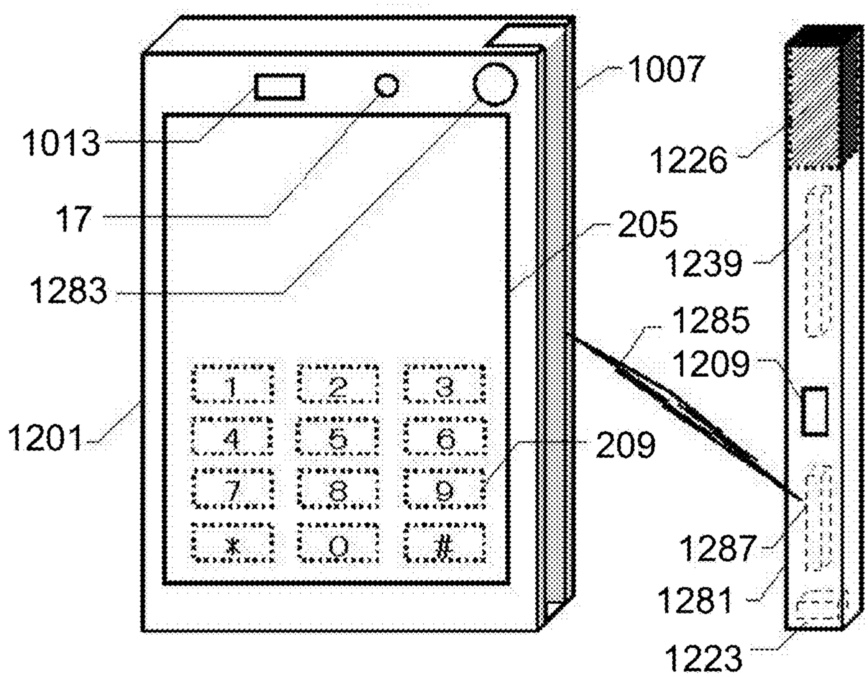

FIG. 24 is a perspective view illustrating a thirteenth embodiment of the mobile telephone according to an aspect of the present invention. FIG. 24A illustrates a state in which an incoming/outgoing-talk unit 1281 (to be described later) is integrated with a mobile telephone 1201, and FIG. 24B illustrates a state in which the incoming/outgoing-talk unit 1281 is separated. The mobile telephone 1201 of the thirteenth embodiment assumes a state in which a cartilage conduction vibration unit 1226 is arranged on the side surface 1007 of the mobile telephone 1201 in the state in FIG. 24A. This is a point of similarity with the eleventh and twelfth embodiments. The thirteenth embodiment, being a mobile telephone, is based on an integrated type with no movable parts that is similar to the eleventh embodiment and the twelfth embodiment, and is configured as a "smartphone" having a large-screen display unit 205 provided with GUI functions. There is much in common with the structure thereof, and so corresponding portions have been given like reference numerals as in the twelfth embodiment, and a description has been omitted. However, similarly with respect to the eleventh embodiment and the twelfth embodiment, the "upper part" in the thirteenth embodiment does not signify a separate upper part, but rather signifies the portion at the top of the integrated structure.

The thirteenth embodiment has a similar configuration to that of FIG. 22A of the twelfth embodiment, except in that, in the state in FIG. 24A, the cartilage conduction vibration unit 1226 and an outgoing-talk unit 1223 are arranged on the right when seen from FIG. 24. However, the cartilage conduction vibration unit 1226 is brought up against the tragus of the left ear from the state in which the large-screen display unit 205 is being viewed, as in FIG. 24. Then, to bring the cartilage conduction vibration unit 1226 up against the tragus of the right ear, the holding hand is switched such that the mobile telephone 1201 faces backwards, whereby the cartilage conduction vibration unit 1226 is made to face the left ear.

A point of difference in the thirteenth embodiment from the twelfth embodiment lies in that the incoming/outgoing-talk unit 1281, which comprises the cartilage conduction vibration unit 1226 and the outgoing-talk unit 1223, can be separated from the mobile telephone 1201, as in FIG. 24B. The incoming/outgoing-talk unit 1281 can be inserted into and released from the mobile telephone 1201 by the operation of an insertion/release locking button 1283. The incoming/outgoing-talk unit 1281 further possesses an incoming/outgoing-talk operation unit 1209, and also a controller 1239 for the cartilage conduction vibration unit 1226 and the outgoing-talk unit 1223, the controller comprising a power supply unit. The incoming/outgoing-talk unit 1281 also possesses a Bluetooth™ or other short-range communication unit 1287, which is capable of wireless communication with the mobile telephone 1201 using radio waves 1285; the user's voice, which is picked up from the outgoing-talk unit 1223, and also information on the state of the contact of the cartilage conduction vibration unit 1226 with the ear are sent to the mobile telephone 1201, and the cartilage conduction vibration unit 1226 vibrates on the basis of the audio information received from the mobile telephone 1201.

The incoming/outgoing-talk unit 1281 separated out in the manner described above functions as a pencil incoming/outgoing-talk unit; the cartilage conduction vibration unit 1226 is held unrestrictedly and brought into contact with the tragus of either the right ear or the left ear, whereby a call can take place. Increasing the contact pressure on the tragus can yield the ear plug bone conduction effect. The incoming/outgoing-talk unit 1281 being in the separated state, sound can be heard by air conduction even when either the surface around the long axis of the cartilage conduction vibration unit 1226 or the tip thereof is brought up against the ear. In addition to the method for using the incoming/outgoing-talk unit 1281, in which the incoming/outgoing-talk unit ordinarily is housed in the mobile telephone 1201 as in FIG. 24A and is then separated out as appropriate like in FIG. 24B, there is also a possible method for using the incoming/outgoing-talk unit such that, in the separated state as in FIG. 24B, for example, the mobile telephone 1201 being housed in an inner pocket or bag and the incoming/outgoing-talk unit 1281 being inserted into an outer breast pocket like a pencil, only the incoming/outgoing-talk unit 1281 is used for operation and for calls to take place when outgoing and incoming calls are made. The cartilage conduction vibration unit 1226 can also function as a vibrator for incoming calls.

A pencil incoming/outgoing-talk unit 1281 such as in the thirteenth embodiment is not to be limited to the case of comprising a combination with a specialized mobile telephone 1201 having a housing unit. For example, a configuration as an accessory of a typical mobile telephone having a short-range communication function using Bluetooth™ or the like is also possible.

Fourteenth Embodiment

Figure 25A:
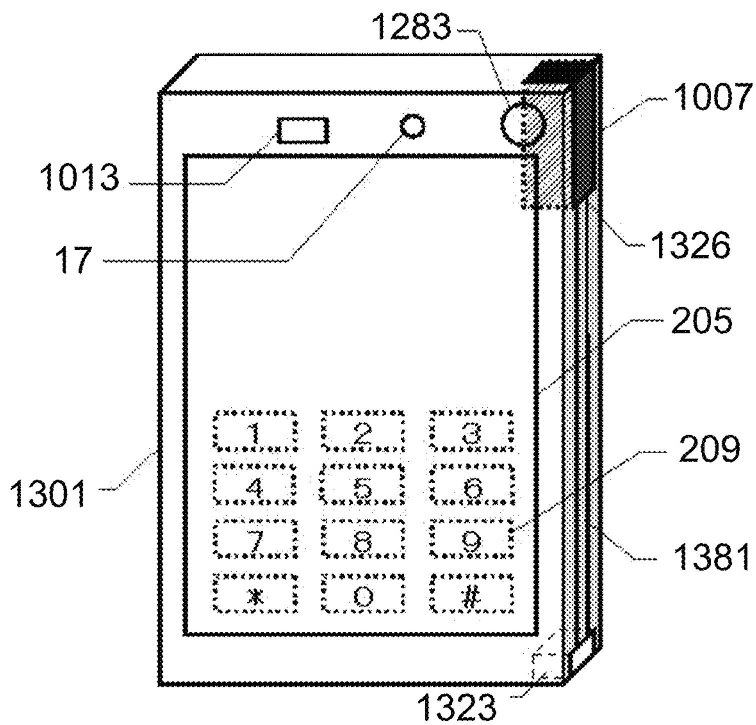
FIGS. 25A and 25B are perspective views illustrating a fourteenth embodiment of a mobile telephone according to an aspect of the present invention (fourteenth embodiment)
Figure 25B:
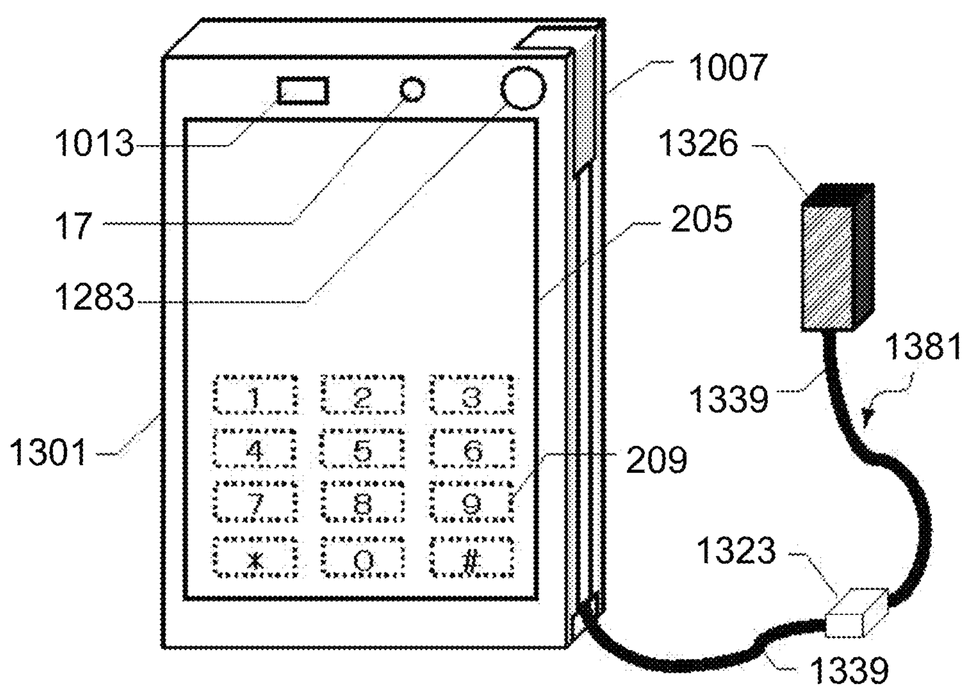

FIG. 25 is a perspective view illustrating a fourteenth embodiment of the mobile telephone according to an aspect of the present invention. FIG. 25A illustrates the state in which an incoming/outgoing-talk unit 1381 (to be described later) is housed in a mobile telephone 1301, and FIG. 25B illustrates the state in which the incoming/outgoing-talk unit 1381 is pulled out. The mobile telephone 1301 of the fourteenth embodiment assumes a state in which a cartilage conduction vibration unit 1326 is arranged on the side surface 1007 of the mobile telephone 1301 in the state in FIG. 25A. This is a point of similarity with the eleventh to thirteenth embodiments. The fourteenth embodiment, being a mobile telephone, is based on an integrated type with no movable parts that is similar to the eleventh to thirteenth embodiments, and is configured as a "smartphone" having a large-screen display unit 205 provided with GUI functions. There is much in common with the structure thereof, and so corresponding portions have been given like reference numerals as in the thirteenth embodiment, and a description has been omitted. However, similarly with respect to the eleventh to thirteenth embodiments, the "upper part" in the fourteenth embodiment does not signify a separate upper part, but rather signifies the portion at the top of the integrated structure.

The fourteenth embodiment, in the state in FIG. 25A, also has a similar configuration to that of FIG. 24A of the thirteenth embodiment. A point of difference in the fourteenth embodiment from the thirteenth embodiment lies in that, as illustrated in FIG. 25B, the incoming/outgoing-talk unit 1381 has a wired connection with the mobile telephone 1301 rather than a wireless one. Similarly with respect to the thirteenth embodiment, the incoming/outgoing-talk unit 1381 can be inserted into and released from the mobile telephone 1301 by the operation of the insertion/release locking button 1283. The incoming/outgoing-talk unit 1381 has a cable 1339 for respectively connecting the cartilage conduction vibration unit 1326 with the outgoing-talk unit 1323, and also the outgoing-talk unit 1323 with the mobile telephone 1301. In the housed state in FIG. 25A, the portion of the cable 1339 that is between the cartilage conduction vibration unit 1326 and the outgoing-talk unit 1323 is housed in a groove of the side surface 1007, and the portion thereof that is between the outgoing-talk unit 1323 and the mobile telephone 1301 is automatically wound up within the mobile telephone 1301 by a spring when the outgoing-talk unit 1323 is housed. The outgoing-talk unit 1323 is also provided with a remote control operation unit for operating at the time of outgoing and incoming calls. In the manner described above, in the fourteenth embodiment, the user's voice, which is picked up from the outgoing-talk unit 1323, and also information on the state of the contact of the cartilage conduction vibration unit 1326 with the ear are transmitted to the mobile telephone 1301 by wire, and the cartilage conduction vibration unit 1326 vibrates on the basis of the audio information received by wire from the mobile telephone 1301.

The incoming/outgoing-talk unit 1381 pulled out as in FIG. 25B is used by being hooked onto the cartilage of the lower part of the entrance to the external auditory meatus such that the portion of the cartilage conduction vibration unit 1326 is in contact with the tragus. Then, the outgoing-talk unit 1323 in this state is located close to the mouth, and can therefore pick up the user's voice. Holding the portion of the cartilage conduction vibration unit 1326 and increasing the contact pressure on the tragus can yield the ear plug bone conduction effect. In addition to the method for using the incoming/outgoing-talk unit 1381 in which the incoming/outgoing-talk unit ordinarily is housed in the mobile telephone 1301 as in FIG. 25A and is then pulled out as appropriate like in FIG. 25B, there is also a possible method for using the incoming/outgoing-talk unit such that, in the state in which the incoming/outgoing-talk unit 1381 is pulled out as in FIG. 25B, for example, the mobile telephone 1301 remains housed in an inner pocket or the like and the cartilage conduction vibration unit 1326 of the incoming/outgoing-talk unit 1381 remains hooked on the ear. The cartilage conduction vibration unit 1326 can also function as a vibrator for incoming calls, similarly with respect to the thirteenth embodiment.

A wired earphone-type incoming/outgoing-talk unit 1381 such as in the fourteenth embodiment is not to be limited to the case of comprising a combination with a specialized mobile telephone 1301 having a housing unit. For example, a configuration as an accessory of a typical mobile telephone having an external earphone-microphone connection terminal is also possible.

The various features indicated in each of the embodiments described above are not necessarily specific in each case to an individual embodiment; the features of each of the embodiments can be combined or rearranged with the features of other embodiments as appropriate, wherever it is possible to make use of the advantages thereof.

The implementation of the variety of features indicated in each of the embodiments described above is not to be limited to the above embodiments; the features can be implemented in other embodiments as well, wherever it is possible to benefit from the advantages thereof. For example, arranging the cartilage conduction vibration unit on the side surface relative to the display surface in the eleventh to fourteenth embodiments, being a configuration in which audio information is transmitted from the tragus by cartilage conduction, can thereby facilitate contact with the tragus and use the tragus as a conduction point for sound information. It is accordingly possible to achieve a listening posture free of discomfort, and approximating that of a conventional telephone in which one listens using the ear. The transmission of audio by cartilage conduction also does not require the formation of a closed space at the front of the entrance to the external auditory meatus, as is the case with air conduction, and is therefore appropriate for arrangement on the side surface. Furthermore, because audio information is conducted by cartilage conduction, there is a low percentage of air conduction caused by the vibration of the vibrator, and sound can be transmitted to the user's external auditory meatus without substantial sound leakage to the exterior, even though the cartilage conduction vibration unit is arranged on the side surface of the mobile telephone, which is narrow. This is due to the fact that, in cartilage conduction, sound does not enter the external auditory meatus as air conduction sound but rather is transmitted due to the contact of the sound energy with the cartilage, the sound being generated thereafter inside the external auditory meatus by the vibration of the tissue in the ear. Accordingly, the utilization of the cartilage conduction vibration unit in the eleventh to fourteenth embodiments is also very effective when a sound information output unit is arranged on the side surface relative to the display surface, there being no concern that the incoming-talk unit sound will be heard by neighboring people due to sound leakage, which would be annoying, nor that any sensitive information will be leaked.

However, from the standpoint of benefiting from the advantage of being able to prevent the display surface from being fouled by contact with the ear and/or cheek when audio information is being listened to, the arrangement on the side surface relative to the display surface is not to be limited to a case in which the audio information output unit that is to be arranged is the cartilage conduction vibration unit. For example, the configuration may be such that the audio information output unit is an earphone that works by air conduction, the earphone being provided to the side surface relative to the display surface. The configuration may also be such that the audio information output unit is a bone conduction vibration unit hitting against a bone at the front of the ear (the zygomatic arch), a bone at the rear of the ear (the mastoid part), or the forehead, the unit being arranged on the side surface relative to the display surface. Due to the arrangement on the side surface relative to the display surface, the display surface will not be in contact with the ear and/or cheek when audio information is being listened to; therefore, even in cases where these audio information output units are used, advantages can also accrue in regard to being able to prevent fouling of the display surface. In cases in which such units are used, moreover, a microphone can be arranged on the side surface relative to the display surface in a case in which the arrangement of the earphone and/or bone conduction vibration unit is limited to one side surface, as in the twelfth to fourteenth embodiments. Similarly with respect to the eleventh to fourteenth embodiments, when the earphone is brought up against the ear for a call in a posture such as is represented in FIG. 21, or, alternatively, when the bone conduction vibration unit is held to a bone at the front or rear of the ear for a call, setting the display surface to a privacy-protection display makes it possible to prevent a display containing private information from being viewed by other people, either in the front or rear or to the left or right.

Fifteenth Embodiment

Figure 26:
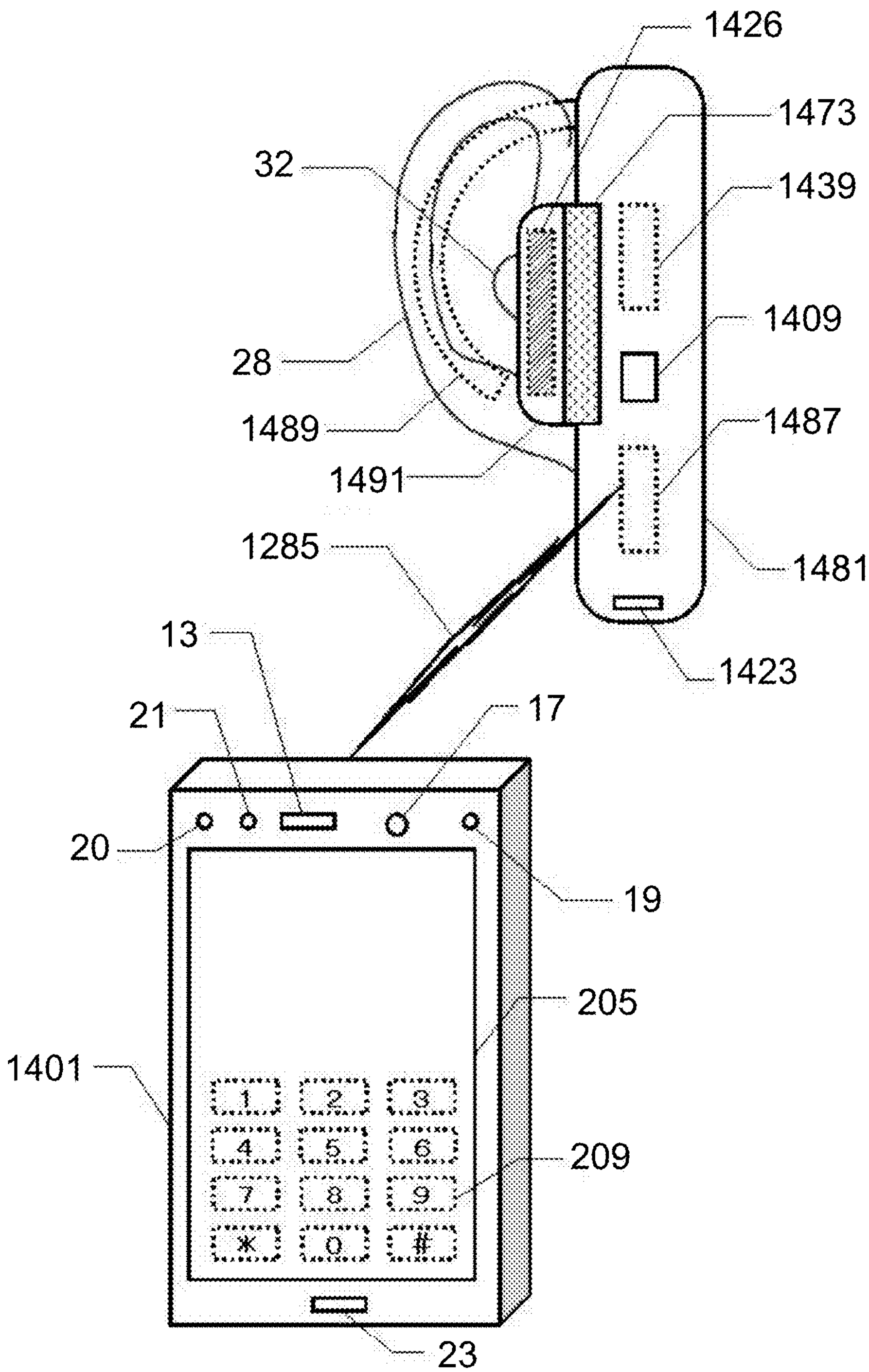
FIG. 26 is a diagram of the system of a fifteenth embodiment according to an aspect of the present invention (fifteenth embodiment)

FIG. 26 is a diagram of the system of a fifteenth embodiment according to an aspect of the present invention. The fifteenth embodiment is configured as an incoming/outgoing-talk unit for a mobile telephone, and forms a mobile telephone system together with a mobile telephone 1401. The fifteenth embodiment takes the configuration of a system in common with the configuration of the system in the state in which the incoming/outgoing-talk unit 1281 is separated from the mobile telephone 1201, as in FIG. 24B in the thirteenth embodiment; therefore, portions that are in common have been given like reference numerals, a description thereof being omitted unless there is a particular need. The mobile telephone 1401, similarly with respect to the mobile telephone 1201 of the thirteenth embodiment, is not to be limited to the case of being specially configured to be used in combination with an incoming/outgoing-talk unit; rather, the case may also be one of a configuration as a typical mobile telephone having, for example, a short-range communication function using Bluetooth™ or the like. The incoming/outgoing-talk unit in such a case then assumes a configuration as an accessory of such a typical mobile telephone 1401, similarly with respect to the thirteenth embodiment. A more detailed description of these two cases will be provided later.

A point of difference in the fifteenth embodiment from the thirteenth embodiment lies in that the incoming/outgoing-talk unit is configured as a headset 1481, rather than in a pencil-type format such as in the thirteenth embodiment. The incoming/outgoing-talk unit 1481 conforms with the thirteenth embodiment in being provided with an outgoing-talk unit 1423 and a cartilage conduction vibration unit 1426 comprising a piezoelectric bimorph element; in being provided with a controller 1439, which comprises a power supply unit for the cartilage conduction vibration unit 1426 and the outgoing-talk unit 1423; and in being provided with the incoming/outgoing-talk operation unit 1409. The incoming/outgoing-talk unit 1481 further conforms with the thirteenth embodiment in being provided a short-range communication unit 1487 compliant with Bluetooth™ or another scheme and capable of wireless communication with the mobile telephone 1401 using radio waves 1285; in sending to the mobile telephone 1401 the user's voice, which is picked up from the outgoing-talk unit 1423, and also information on the state of the contact made by the cartilage conduction vibration unit 1426 with the ear; and in causing the cartilage conduction vibration unit 1426 to vibrate on the basis of the audio information received from the mobile telephone 1401.

There shall next be provided a description of the configuration specific to the fifteenth embodiment. The headset 1481 is attached to the right ear 28 by an ear-hooking unit 1489. The headset 1481 is provided with a movable unit 1491 that is held by an elastic body 1473, and the cartilage conduction vibration unit 1426 is held by the movable unit 1491. The configuration is such that the cartilage conduction vibration unit 1426 is in contact with the tragus 32 in the state in which the headset 1481 is attached to the right ear 28 by the ear-hooking unit 1489. The elastic body 1473 makes it possible to bend the movable unit 1491 in the direction of the tragus 32, and also functions as a cushioning material for the cartilage conduction vibration unit 1426, protecting the cartilage conduction vibration unit 1426 against mechanical impact due to the headset 1481.

Sound information can be listened to via ordinary cartilage conduction in the state in FIG. 26. However, when listening comprehension of sound information is impaired due to environment noise, the movable unit 1491 is pushed from the exterior and thereby bent, and the pressure contact of the cartilage conduction vibration unit 1426 on the tragus 32 is increased, whereby the tragus 32 is made to block the hole of the ear. The ear plug conduction effect, which has also been described in the other embodiments, can thereby be generated, and even louder audio information can be transmitted. Obstructing the hole of the ear with the tragus 32 further allows environment noise to be blocked. Information on one's own voice, which is picked up from the outgoing-talk unit 1423, is also subjected to phase inversion on the basis of the mechanical detection of the bent state of the movable unit 1491, and is then transmitted to the cartilage conduction vibration unit 1426, to cancel out one's own voice. A more detailed description of the merits or other advantageous attributes thereof has been described in the other embodiments, and thus has been omitted.

Sixteenth Embodiment

Figure 27:
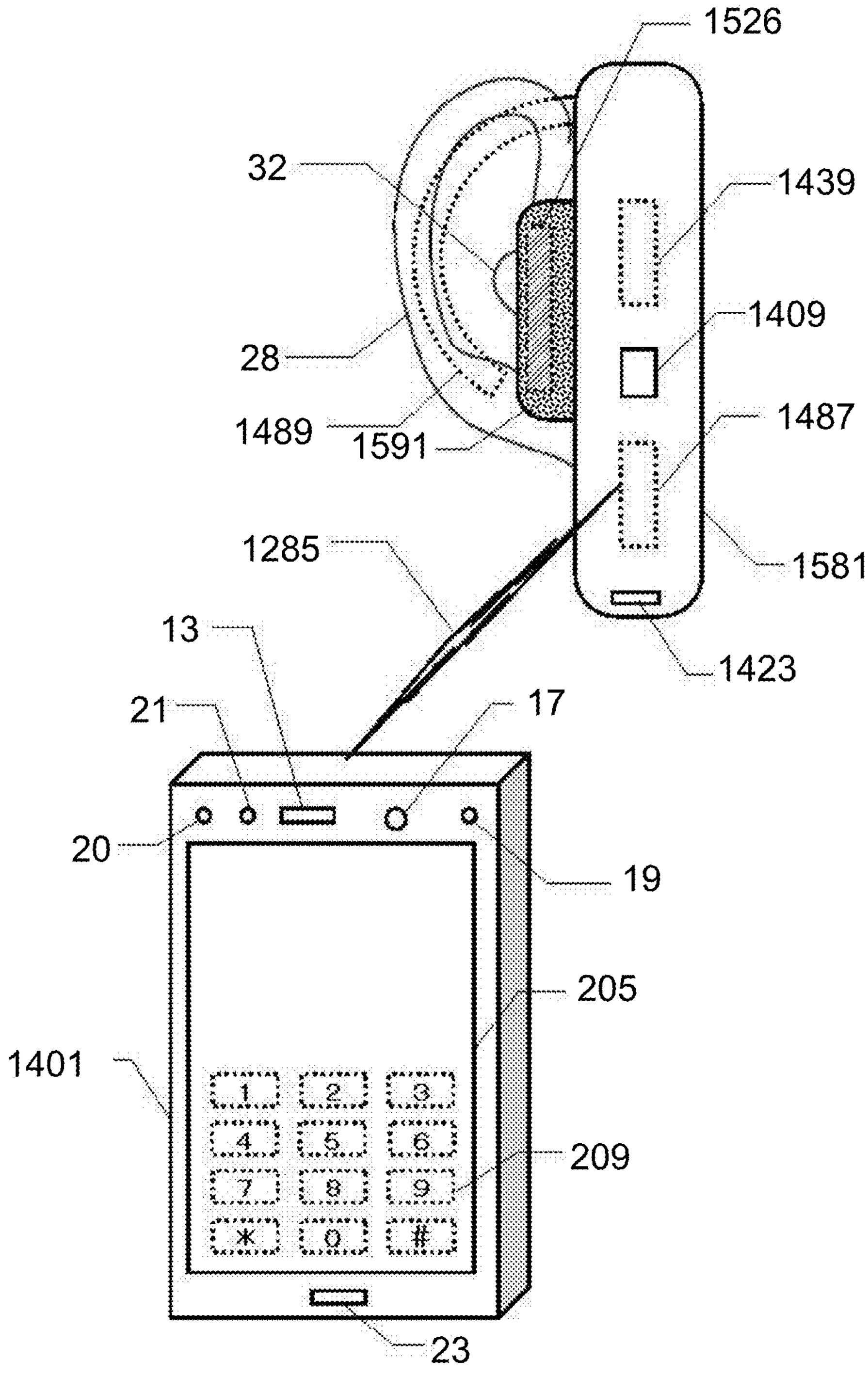
FIG. 27 is a diagram of the system of a sixteenth embodiment according to an aspect of the present invention (sixteenth embodiment)

FIG. 27 is a diagram of the system of a sixteenth embodiment according to an aspect of the present invention. The sixteenth embodiment is also configured as a headset 1581 for creating an incoming/outgoing-talk unit for the mobile telephone 1401, similarly with respect to the fifteenth embodiment, and forms a mobile telephone system together with the mobile telephone 1401. The sixteenth embodiment has much in common with the fifteenth embodiment, and therefore parts that are in common have been given like reference numerals, and a description thereof has been omitted unless there is a particular need. The mobile telephone 1401, as has been described in the fifteenth embodiment, may in some cases have a special configuration, and may in other cases be configured as a typical mobile telephone. A description of these two cases will be provided later.

A point of difference in the sixteenth embodiment from the fifteenth embodiment lies in that the entirety of a movable unit 1591 is made using an elastic material that has acoustic impedance approximating that of ear cartilage (a silicone rubber; a mixture of a silicone rubber and a butadiene rubber; a natural rubber; or a structure formed using these varieties of rubber in which air bubbles are sealed). A cartilage conduction vibration unit 1526, which comprises a piezoelectric bimorph element or the like, is embedded inside the movable unit 1591, similarly with respect to the eighth embodiment. Such a configuration allows the movable unit 1591, including the cartilage conduction vibration unit 1526, to be bent toward the tragus 32 under its own elasticity. Although omitted from the diagrams for simplicity, the circuit portions of the cartilage conduction vibration unit 1526, the controller 1439, and the like are connected by a connection wire similar to the flexible connection wire 769 in FIG. 17C.

In the sixteenth embodiment, the movable unit 1591 is in contact with the tragus 32 in the state represented in FIG. 27; sound information from the cartilage conduction vibration unit 1526 is conducted to the tragus 32 by cartilage conduction via the elastic material of the moveable unit 1591. The benefits from such a configuration are similar to those described in the fifth to tenth embodiments. Furthermore, when listening comprehension of sound information is impaired due to environment noise, the movable unit 1591 is pushed from the exterior and thereby bent, and the pressure contact of the cartilage conduction vibration unit 1526 on the tragus 32 is increased, whereby the tragus 32 is made to block the hole of the ear. The ear plug conduction effect can thereby be generated, and even louder sound information can thereby be transmitted, similarly with respect to the fifteenth embodiment. The fact that environment noise can be blocked by the obstruction of the hole of the ear by the tragus 32 is also similar to the fifteenth embodiment. Another similarity with the fifteenth embodiment is the fact that information on one's own voice, which is picked up from the outgoing-talk unit 1423, can also be subjected to phase inversion on the basis of the mechanical detection of the bent state of the movable unit 1591 and then transmitted to the cartilage conduction vibration unit 1526 to cancel out one's own voice.

Figure 28:
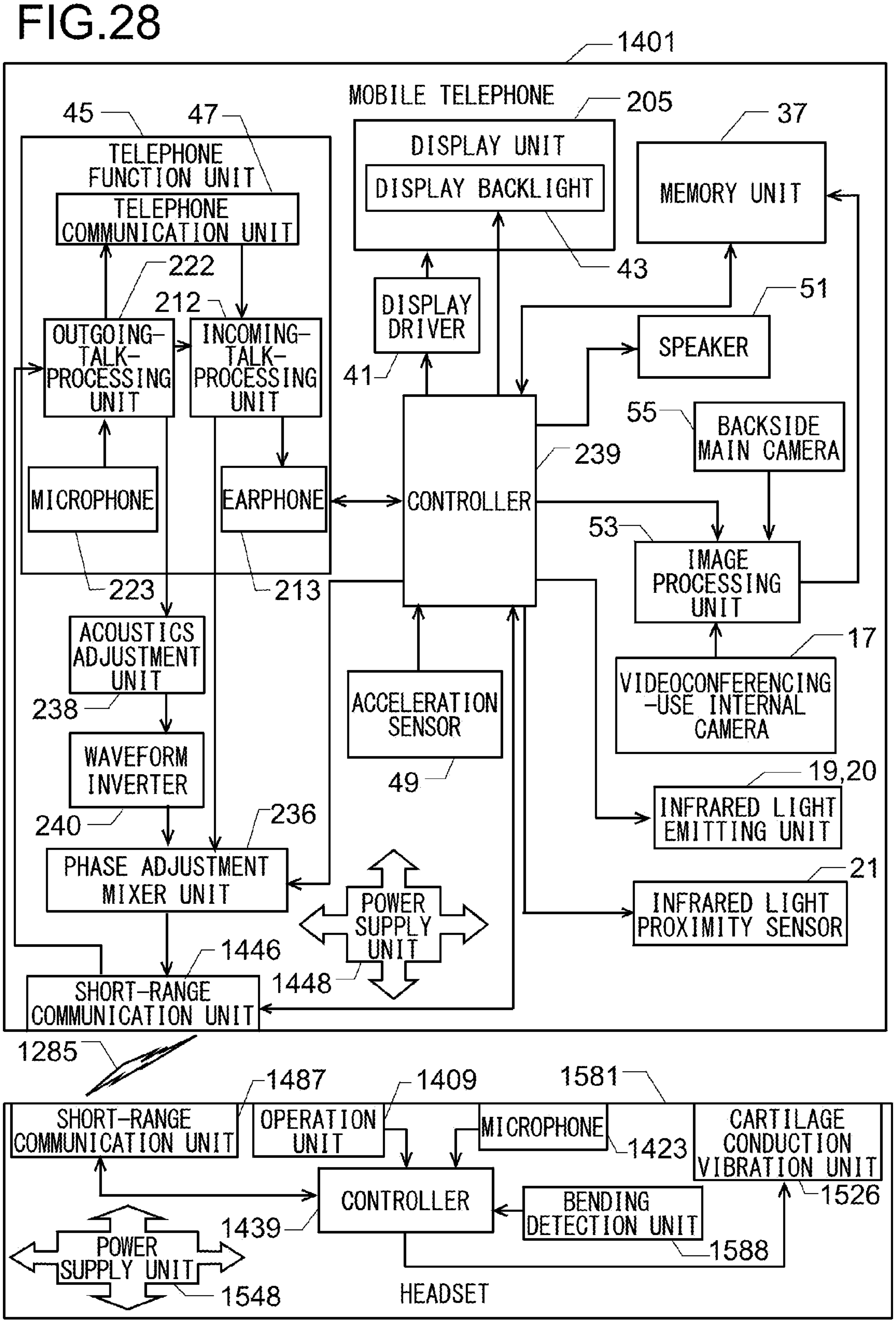
FIG. 28 is a block diagram of the sixteenth embodiment.

Furthermore, in the sixteenth embodiment, because the cartilage conduction vibration unit 1526 is embedded inside the movable unit 1591, the elastic material constituting the movable unit 1591 functions as a cushioning material for protecting the cartilage conduction vibration unit 1526 against mechanical impact to the headset 1581 and also for further protecting the cartilage conduction vibration unit 1526 against mechanical impact to the movable unit 1591 itself FIG. 28 is a block diagram of the sixteenth embodiment, identical portions being given identical reference numerals to those in FIG. 27. Also, because the configuration of the block diagram has many portions in common with the fourth embodiment, corresponding portions are each assigned the same reference numerals as each respective part. Also, a description has been omitted for these identical or shared portions, unless there is a particular need. In the sixteenth embodiment, the incoming-talk-processing unit 212 and the earphone 213 in FIG. 28 correspond to the incoming-talk unit 13 in FIG. 27, and the outgoing-talk-processing unit 222 and the microphone 223 in FIG. 28 correspond to the outgoing-talk unit 23 in FIG. 27. Similarly with respect to the fourth embodiment, the outgoing-talk-processing unit 222 transmits a part of the audio from the operator picked up by the microphone 223 to the incoming-talk-processing unit 212 as sidetone, and the incoming-talk-processing unit 212 superimposes the operator's own sidetone onto the voice of the calling party from the telephone communication unit 47 and outputs same to the earphone 213, whereby the balance between the bone conduction and air conduction of one's own voice in the state in which the mobile telephone 1401 is brought up against an ear is made to approximate a natural state.

A point of difference in the block diagram of the sixteenth embodiment in FIG. 28 from the block diagram of the fourth embodiment in FIG. 8 lies in that the mobile telephone 301 of the fourth embodiment in FIG. 8 is divided in the sixteenth embodiment of FIG. 28 into the mobile telephone 1401 and the headset 1581 for creating the incoming/outgoing-talk unit. Specifically, FIG. 28 corresponds to a block diagram of the case in the sixteenth embodiment in which the mobile telephone 1401 is specially configured to be used in combination with the headset 1581.

More specifically, in FIG. 28, the output of the phase adjustment mixer unit 236 is wirelessly sent externally by a short-range communication unit 1446 using Bluetooth™ or the like. The short-range communication unit 1446 also inputs audio signals received wirelessly from an external microphone into the outgoing-talk-processing unit 222. Furthermore, although a depiction and description has been omitted in the other embodiments, FIG. 28 depicts a power supply unit 1448, which has a storage battery for supplying power to the entire mobile telephone 1401.

On the other hand, the configuration of the headset 1581 has a short-range communication unit 1487 for intercommunication with the short-range communication unit 1446 of the mobile telephone 1401 using radio waves 1285, and also has a power supply unit 1548 for supplying power to the entire headset 1581. The power supply unit 1548 supplies power by a replaceable battery or by a built-in storage battery. The controller 1439 of the headset 1581 wirelessly sends audio picked up from the outgoing-talk unit (microphone) 1423 to the mobile telephone 1401 from the short-range communication unit 1487, and also controls the drive of the cartilage conduction vibration unit 1526 on the basis of audio information that has been received by the short-range communication unit 1487. Furthermore, the controller 1439 transmits an operation to receive an incoming call or to send an outgoing call, which is performed by the operation unit 1409, to the mobile telephone 1401 from the short-range communication unit 1487. A bending detection unit 1588 mechanically detects the bent state of the movable unit 1591, and the controller 1439 transmits the bending detection information from the short-range communication unit 1487 to the mobile telephone 1401. The bending detection unit 1588 can comprise, for example, a switch that is turned on mechanically when the bending reaches or exceeds a predetermined angle. The controller 239 of the mobile telephone 1401 controls the phase adjustment mixer unit 236 on the basis of the bending detection information received by the short-range communication unit 1446, and determines whether or not to add, to the audio information from the incoming-talk-processing unit 212, the signal of the waveform inverter 240 that is based on one's own voice transmitted from the outgoing-talk unit (microphone) 1423 to the outgoing-talk-processing unit 222.

Seventeenth Embodiment

Figure 29:
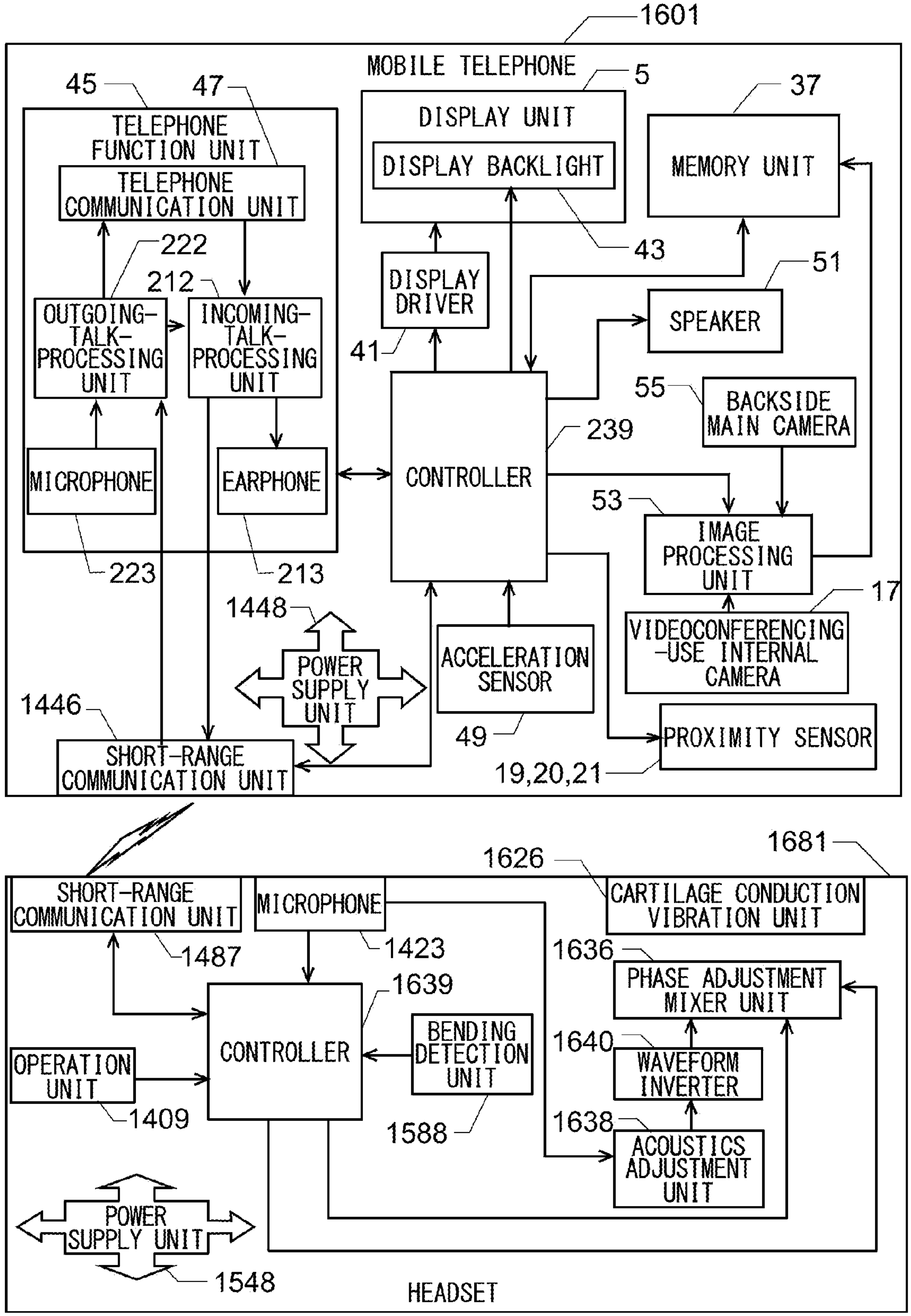
FIG. 29 is a block diagram of a seventeenth embodiment (seventeenth embodiment)

FIG. 29 is a block diagram of the case in which, in the sixteenth embodiment of FIG. 27, the mobile telephone 1401 is configured as a typical mobile telephone, and the headset 1581 is configured as an accessory thereof; the diagram serves to provide a description as the seventeenth embodiment in order to avoid confusion with FIG. 28. The configuration of FIG. 29 has much in common with FIG. 28, and therefore identical parts have been given reference numerals identical to those in FIG. 28, a description thereof having been omitted unless there is a particular need.

As described above, the mobile telephone 1601 in the seventeenth embodiment in FIG. 29 is configured as a typical mobile telephone comprising a short-range communication function using Bluetooth™ or the like. Specifically, the short-range communication unit 1446 inputs to the outgoing-talk-processing unit 222 audio information from an external microphone that is similar to what is inputted from the microphone 223, and also externally outputs audio information that is similar to what is outputted to the earphone 213. The controller 239 is used to switch the audio information that is inputted from and outputted to external elements through the short-range communication unit 1446 relative to the internal microphone 223 and earphone 213. As described above, in the seventeenth embodiment of FIG. 29, the functions of the acoustics adjustment unit 238, the waveform inverter 240, and the phase adjustment mixer unit 236 in the sixteenth embodiment in FIG. 28 are transferred to the headset 1681.

In accordance therewith, the configuration of the headset 1681 in the seventeenth embodiment of FIG. 29 differs from that of the sixteenth embodiment in FIG. 28 on the following points. The configuration is such that, although listening audio information received using the short-range communication unit 1487 by the control of a controller 1639 of the headset 1681 is inputted to the phase adjustment mixer unit 1636, audio information from the waveform inverter 1640 can also additionally be inputted thereto. Also, according to need, the phase adjustment mixer unit 1636 mixes the audio information from the waveform inverter 1640 into the received listening audio information and drives a cartilage conduction vibration unit 1626. More specifically, a part of the audio from the operator that has been picked up by the outgoing-talk unit (microphone) 1423 is inputted to the acoustics adjustment unit 1638, and the acoustics of one's own voice to be transmitted to the cochlea from a cartilage conduction vibration unit 1628, which comprises the cartilage conduction vibration unit 1626, are adjusted to acoustics approximating the operator's own voice transmitted to the cochlea by conduction in the body from the vocal cords when the ear plug bone conduction effect is generated, and the two are effectively canceled out. The waveform inverter 1640 subjects one's own voice, which has undergone acoustic adjustment in this manner, to waveform inversion, and outputs the same according to need to the phase adjustment mixer unit 1636.

The mixing control shall now be described in detail. When the bending of the movable unit 1591 detected by the bending detection unit 1588 reaches or exceeds a predetermined angle and a state is in effect in which the hole of the ear is obstructed by the tragus, which is pushed thereby, the phase adjustment mixer unit 1636 mixes the output from the waveform inverter 1640 and drives the cartilage conduction vibration unit 1628, depending on an instruction from the controller 1639. The excessive amount of one's own voice that occurs during the earplug bone conduction effect is thereby cancelled out, thus easing the discomfort. At this time, the degree of cancellation is regulated such that an amount of one's own voice equivalent to the sidetone remains without being cancelled out. On the other hand, when the bending detection unit 1588 does not detect a predetermined or greater amount of bending, the state in effect is one in which the hole of the ear is not obstructed by the tragus and the earplug bone conduction effect is not created; therefore, the phase adjustment mixer unit 1636 does not mix the waveform inversion output of one's own voice from the waveform inverter 1640, on the basis of an instruction from the controller 1639. Similarly with respect to the fourth embodiment, the configuration of the seventeenth embodiment of FIG. 29 may invert the positions of the acoustics adjustment unit 1638 and the waveform inverter 1640. Furthermore, the acoustics adjustment unit 1638 and the waveform inverter 1640 may be integrated as a function within the phase adjustment mixer unit 1636. It is a point of similarity with the sixteenth embodiment that the controller 1639 transmits an operation to receive an incoming call or to send an outgoing call, which is performed by the operation unit 1409, to the mobile telephone 1601 from the short-range communication unit 1487.

The block diagrams in FIGS. 28 and 29 can be applied not only to the configuration of the system diagram in FIG. 27, but also the system diagram of the fifteenth embodiment in FIG. 26. They can also be applied to the thirteenth embodiment of FIG. 24 and the fourteenth embodiment of FIG. 25 when the bending detection unit 1588 is read as the pressure sensor 242 as in FIG. 8. However, in the case of a reading as the thirteenth embodiment, in the case in which the incoming/outgoing-talk unit 1281 is incorporated into the mobile telephone 1201 as in FIG. 24A, a contact unit for directly connecting the two is provided to the mobile telephone 1201 and the incoming/outgoing-talk unit 1281. In the state in FIG. 24A, the wireless communication exchange between the mobile telephone 1201 and the incoming/outgoing-talk unit 1281 by a short-range communication unit is automatically switched to communication via such a contact unit. In the case of a reading as the fourteenth embodiment, a connector contact for establishing a wired connection between the two is provided to the mobile telephone 1301 and the incoming/outgoing-talk unit 1381 instead of the short-range communication unit.

Figure 30:
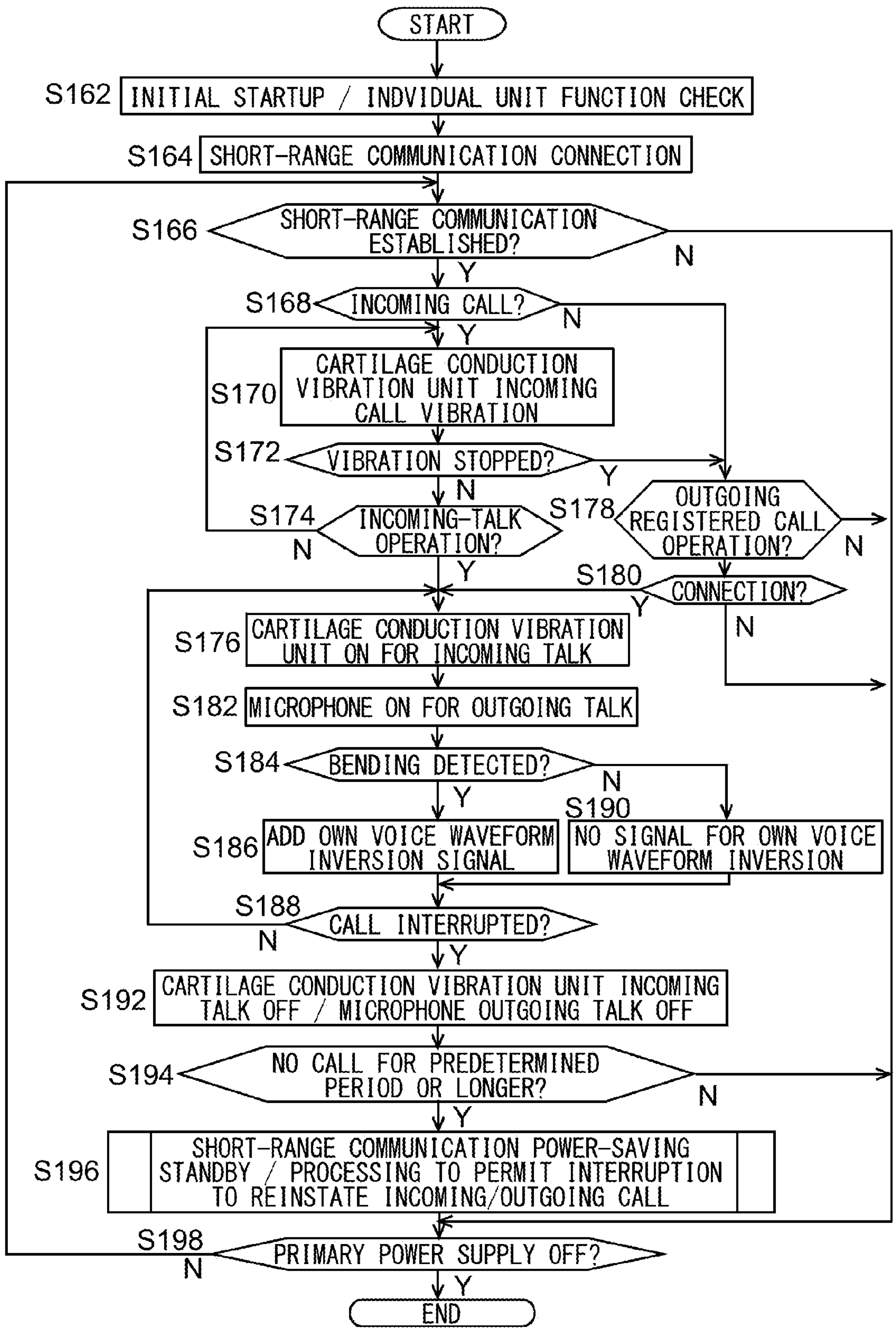
FIG. 30 is a flow chart of the operation of the controller of an incoming/outgoing-talk unit in the seventeenth embodiment of FIG. 29.

FIG. 30 is a flow chart of the operation of the controller 1639 of the headset 1681 in the seventeenth embodiment of FIG. 29. The flow in FIG. 30 starts when the primary power supply is turned on by the operation unit 1409; in step S162, there is performed a check for initial startup and for the functions of each unit. Next, in step S164, there is an instruction for a short-range communication connection with the mobile telephone 1601, and the flow moves on to step S166. When a short-range communication is established on the basis of the instruction in step S164, the headset 1681 enters a state of constant connection with the mobile telephone 1601 unless the primary power supply is subsequently turned off. In step S166, there is performed a check for whether short-range communication with the mobile telephone 1601 has been established; the flow moves on to step S168 when establishment is confirmed.

In step S168, there is performed a check for whether or not an incoming signal from the mobile telephone 1601 has been transmitted through a short-range communication. Then, when there is an incoming signal, the flow proceeds to step S170, in which a drive is performed such that the cartilage conduction vibration unit 1626 has an incoming signal vibration. This incoming signal vibration may have an audible frequency, or may vibrate in a low frequency region with a large enough amplitude that the vibration can be felt with the tragus 32. Next, in step S172, there is performed a check for whether an incoming signal has been stopped by an outgoing call stop operation or the like from the party making the call; when there is no stop, the flow proceeds to step S174, in which there is performed a check for whether there has been a receiving operation by the operation unit 1409. Then, when there is a receiving operation, the flow moves on to step S176. On the other hand, when there is no receiving operation in step S174, the flow returns to step S170, following which a loop of steps S170 to S174 is repeated unless either the incoming signal vibration of the cartilage conduction vibration unit 1626 is stopped or a receiving operation is performed.

On the other hand, in a case in which no incoming signal is detected in step S168, the flow moves on to step S178, in which there is performed a check for whether there has been a one-touch outgoing call operation to a registered call destination by the operation unit 1409. The flow proceeds to step S180 when an outgoing call operation is detected; the outgoing call operation is transmitted to the mobile telephone 1601 to make an outgoing call, and there is performed a check for whether or not a signal to the effect that a call connection has been established by a response from the other party thereto has been transmitted from the mobile telephone 1601. When it is confirmed that a call connection has been established in step S180, the flow moves on to step S176.

In step S176, the cartilage conduction vibration unit 1626 is turned on in order for audio information to be listened to, and in step S182 the outgoing-talk unit (microphone) 1423 is turned on in order for speaking to be performed; the flow then moves on to step S184. In step S184, there is performed a check for whether it has been detected that the movable unit 1591 is bent at or above a predetermined angle. When bending has been detected, the flow then proceeds to step S186, in which the waveform inversion signal of one's own voice is added to the cartilage conduction vibration unit 1626; the flow then moves on to step S188. On the other hand, when there is no detection in step S184 that the bending is at or above the predetermined angle, the flow moves on to step S190, and then on to step S188 without the waveform inversion signal of one's own voice being added to the cartilage conduction vibration unit 1626. In step S188, there is performed a check for whether or not a signal to the effect that the call state has been cut off has been received from the mobile telephone 1601; when the call has not been cut off, the flow returns to step S176, following which steps S176 to S188 are repeated until a call interruption is detected in step S188. Support is thereby provided for the generation and elimination of the earplug bone conduction effect that is based on the bending of the movable unit 1591 during a call.

On the other hand, when it is detected in step S188 that a call interruption signal has been received from the mobile telephone 1601, the flow proceeds to step S192, in which listening using the cartilage conduction vibration unit 1626 is turned off and speaking using the outgoing-talk unit (microphone) 1423 is turned off; the flow then moves on to step S194. In step S194, there is performed a check for whether a no-call state has continued for a predetermined period of time or longer; when this is true, the flow moves on to step S196. In step S196, there is a shift to a power-saving standby state, such as one in which the clock frequency is lowered to the minimum level required to maintain the standby state of the short-range communication unit 1487; processing is also done to permit an interruption for reinstating the short-range communication unit 1487 to an ordinary call state, in response to the receipt of an incoming call signal from the mobile telephone 1601 or an outgoing call operation of the operation unit 1409. Then, after such processing, the flow moves on to step S198. On the other hand, when there is no detection in step S194 of a no-call state lasting a predetermined period of time or longer, the flow moves directly on to step S198. However, the flow also moves directly on to step S198 when it is not possible in step S166 to confirm that short-range communication has been established, or when there is no detection in step S178 of an outgoing call operation, or when it is not possible in step S180 to confirm that a telephone connection has been established.

In step S198, there is performed a check for whether the primary power supply has been turned off by the operation unit 1409, the flow being terminated in a case in which it is detected that the primary power supply has been turned off. On the other hand, in a case in which it is not detected that the primary power supply has been turned off, the flow returns to step S166, following which steps S166 to S198 are repeated until primary power supply is turned off, to support various changes to the state of the headset 1681.

The flow in FIG. 30 can be applied not only to the configuration of the system diagram in FIG. 27, but also to the system diagram of the fifteenth embodiment in FIG. 26. The same can also be applied to the thirteenth embodiment in FIG. 24 or to the fourteenth embodiment in FIG. 25 when the "bending detection" in step S184 is read as a detection of the presence or absence of the state in which the "earplug bone conduction effect" is generated, as in step S52 of FIG. 10.

Eighteenth Embodiment

Figure 31:
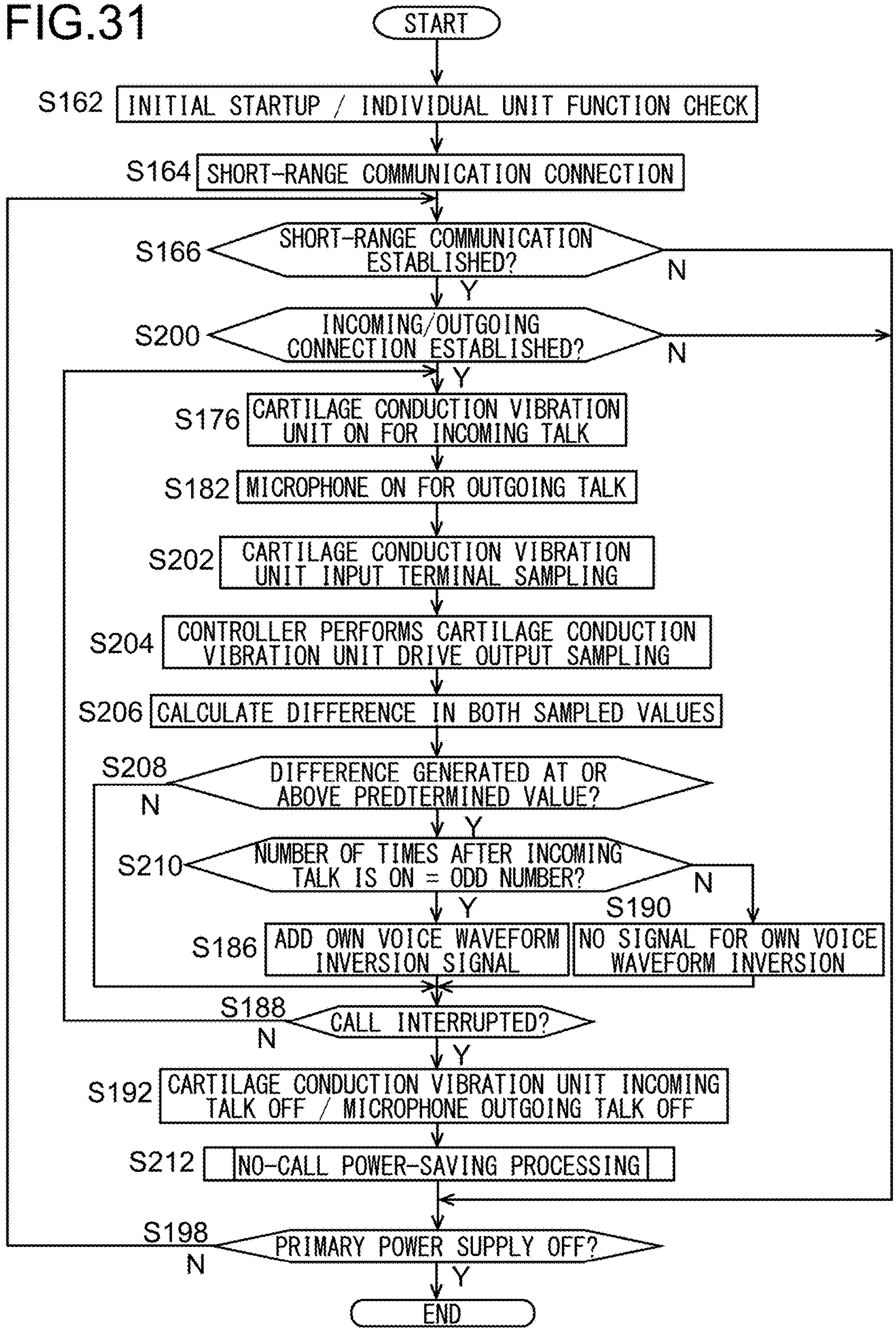
FIG. 31 is a flow chart of the operation of the controller of the incoming/outgoing talk unit in an eighteenth embodiment (eighteenth embodiment)

FIG. 31 is a flow chart of the controller of a headset in which, instead of having the bending be detected by a mechanical switch in the seventeenth embodiment of FIG. 30, the configuration is such that same is achieved using software; the description is provided as an eighteenth embodiment, in order to avoid confusion with FIG. 30. Steps that FIG. 31 has in common with FIG. 30 have been given like step reference numerals, a description thereof having been omitted unless there is a particular need. FIG. 31 uses boldface print and bold frames to illustrate points of difference, and thus the following description focuses on these portions. More specifically, the eighteenth embodiment is configured such that, with the assumption that the cartilage conduction vibration unit 1626 is a piezoelectric bimorph element and conforming to the fourth embodiment in FIG. 9, a signal appearing on a signal wire for connecting the phase adjustment mixer unit 1636 and the cartilage conduction vibration unit 1626 is monitored, and changes in the signal appearing for the cartilage conduction vibration unit (which is a piezoelectric bimorph element) 1626 are monitored by the strain that is based on the operational impact from the bending of the movable unit 1591 or at the moment of recovery from the bending thereof. The signal change is then processed by software, whereby the bending state is detected.

On the basis of the assumption above, there shall now be provided a description of how FIG. 31 is different from FIG. 30. First, step S200 is depicted by the consolidation of steps S170 to S174, step S178, and step S180 in FIG. 30, the content thereof being identical. Then, when a telephone connection is established on the basis of an operation to receive an incoming call or of the response of the other party to an outgoing call, the flow moves on to step S176; when there is no telephone connection, the flow moves on to step S198.

Steps S202 to S210 are steps that relate to detecting bending; once steps S182 to S202 are reached, first, a signal appearing on the input terminal of the cartilage conduction vibration unit 1626 (the signal wire connecting the phase adjustment mixer unit 1636 and the cartilage conduction vibration unit 1626) is sampled. In step S204, drive output of the cartilage conduction unit going from the controller 1639 to the phase adjustment mixer unit 1636 at the same timing is sampled at the same timing. Subsequently, in step S206, the difference between these sampling values is calculated, and in step S208, there is a detection for whether the calculated difference is at or above a predetermined value. This function corresponds to the function of the pressure sensor 242 in FIG. 9, but whereas the pressure state is continuously detected by the pressure sensor 242 of FIG. 9, the system in FIG. 27 uses operational impact from bending or at the moment of recovery from bending to perceive changes to the bending state.

When it is detected in step S208 that the two sampling values have generated a difference at or above the predetermined value, the flow moves on to step S210. It is not known at the stage in step S208 whether the difference in the two sampling values at or above the predetermined value has been generated due to bending or has been generated due to recovery from bending. However, after the cartilage conduction vibration unit 1626 has been turned on in step S176, there is a check in step S210 for whether the number of times a difference has been generated is an odd number, on the basis of the difference generation history. When the number of times is an odd number, the flow moves on to step S186, and when the number of times is an even number, the flow moves on step S190. Because the movable unit 1591 necessarily alternates between bending and recovering from bending, there can be an alternation between whether or not the phase-inverted signal of one's own voice is added each time there is an operational impact in the manner described above. However, the difference generation history can be reset using the operation unit 1409 in the event that the difference count is ever inverted by a mistaken operation.

Step S212 is depicted by the consolidation of step S194 and step S196 in FIG. 30, the content thereof being identical. As described above, similarly with respect to the fourth embodiment and the like, the sensor function of the cartilage conduction vibration unit 1626 itself is utilized in the eighteenth embodiment to detect the bending of the movable unit 1591, whereby the state in which the earplug bone conduction effect occurs is determined to be in effect. The flow of FIG. 31 can be applied not only to the configuration of the system diagram in FIG. 27, but also to the system diagram of the fifteenth embodiment in FIG. 26. Also, in a case such as in the fifth to tenth embodiments, in which the cartilage conduction vibration unit is held by an elastic body, the scheme in FIG. 31 for detecting the occurrence of the earplug bone conduction effect can also be utilized in a case in which there is no continuous strain on the cartilage conduction vibration unit in the state in which the earplug bone conduction effect occurs.

Nineteenth Embodiment

Figure 32:
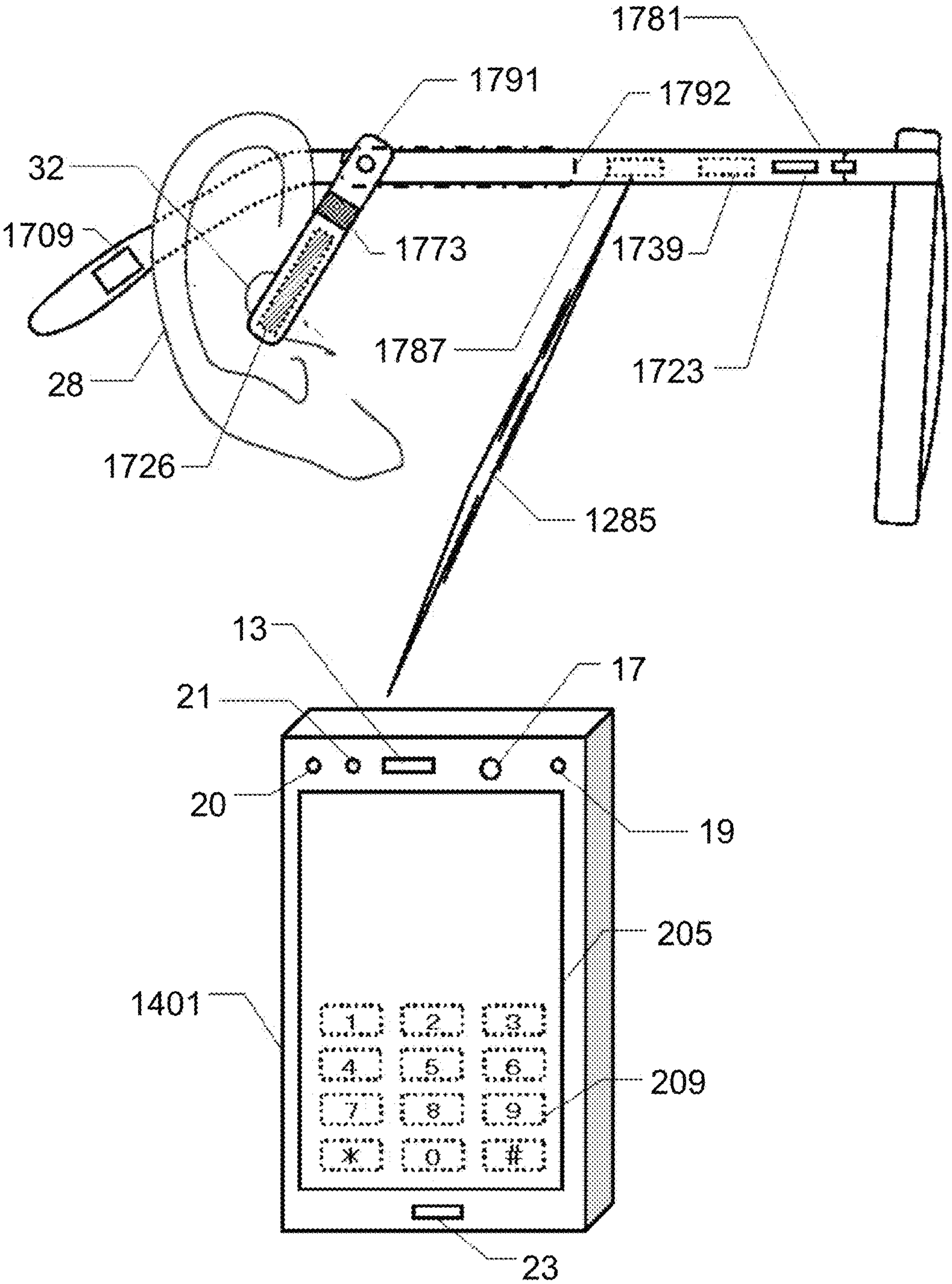
FIG. 32 is a diagram of the system of a nineteenth embodiment according to an aspect of the present invention (nineteenth embodiment)

FIG. 32 is a structural diagram illustrating the system of the nineteenth embodiment according to an aspect of the present invention. The nineteenth embodiment is also configured as an incoming/outgoing-talk unit for a mobile telephone, and together with the mobile telephone 1401 creates a mobile telephone system. In the nineteenth embodiment, as illustrated in FIG. 32, the incoming/outgoing-talk unit is configured as eyeglasses 1781. Because the nineteenth embodiment assumes a system configuration in common with that of the fifteenth embodiment, common parts have been given like reference numerals; in a case in which there is no particular description, that configuration is shared with that of the fifteenth embodiment. Also, in the nineteenth embodiment as well, the mobile telephone 1401 may in some cases have a special configuration to be used in combination with the eyeglasses 1781 creating an incoming/outgoing-talk unit, and may in other cases be configured as a typical mobile telephone having a short-range communication function. In the latter case, the eyeglasses 1781 take on a configuration as an accessory of the mobile telephone 1401, similarly with respect to the fifteenth embodiment.

In the nineteenth embodiment, as illustrated in FIG. 32, a movable unit 1791 is rotatably attached to the temple piece of the eyeglasses 1781; in the state depicted, a cartilage conduction vibration unit 1726 is in contact with the tragus 32 of the right ear 28. The movable unit 1791 can be rotationally withdrawn to a position along the temple of the eyeglasses 1781 as indicated by the single-dotted line 1792 in a case in which same is not to be used. The cartilage conduction vibration unit 1726 can be made to vibrate at low frequency in this withdrawn state as well; it can thereby be known that there is an incoming call when the vibration of the temple of the eyeglasses 1781 is felt on the face. The outgoing-talk unit (microphone) 1723 is arranged at the front portion of the temple of the eyeglasses 1781. The controller 1739, which comprises a power supply unit, is arranged at the portion of the temple on the eyeglasses 1781, and controls the cartilage conduction vibration unit 1726 and the outgoing-talk unit (microphone) 1723. A Bluetooth™ or other type of short-range communication unit 1787, which is capable of wireless communication with the mobile telephone 1401 by radio waves 1285, is further arranged at the portion of the temple on the eyeglasses 1781, sending audio from the user, which is picked up by the outgoing-talk unit (microphone) 1723, to the mobile telephone 1401, and also making it possible to cause the cartilage conduction vibration unit 1726 to vibrate on the basis of the audio information that is received from the mobile telephone 1401. The rear end part of the temple of the eyeglasses 1781 is provided with an incoming/outgoing-talk operation unit 1709. Since the temple of the eyeglasses 1781 is a portion that comes against a bone at the rear of the ear 28 (the mastoid part), it is supported in a backed state, and incoming/outgoing-talk operations, such as pressing on the temple from the front side, can be easily performed without causing the eyeglasses 1781 to deform. The arrangement of each of the aforementioned elements is not to be limited to the description above; all or a part of the elements may be integrated in the movable unit 1791 as appropriate.

The movable unit 1791, having an elastic body 1773 interposed partway therealong, is pushed from the outside and caused to bend when listening comprehension of audio information is impaired by environment noise; the cartilage conduction vibration unit 1726 is then pushed on the tragus 32 with greater pressure, whereby the tragus 32 more readily obstructs the hole of the ear. The ear plug conduction effect, which has also been described in the other embodiments, can thereby be generated, and even louder audio information can thereby be transmitted. Information on one's own voice, which is picked up from the outgoing-talk unit (microphone) 1723, is also subjected to phase inversion on the basis of the mechanical detection of the bent state of the movable unit 1791. The information is then transmitted to the cartilage conduction vibration unit 1726, and one's own voice is canceled out. These are points in common with the fifteenth embodiment.

The block diagrams of FIGS. 28 and 29 can be applied to the nineteenth embodiment by reading "headset" as "eyeglasses." The flow charts of FIGS. 30 and 31 can also be applied to the nineteenth embodiment.

Twentieth Embodiment

Figure 33:
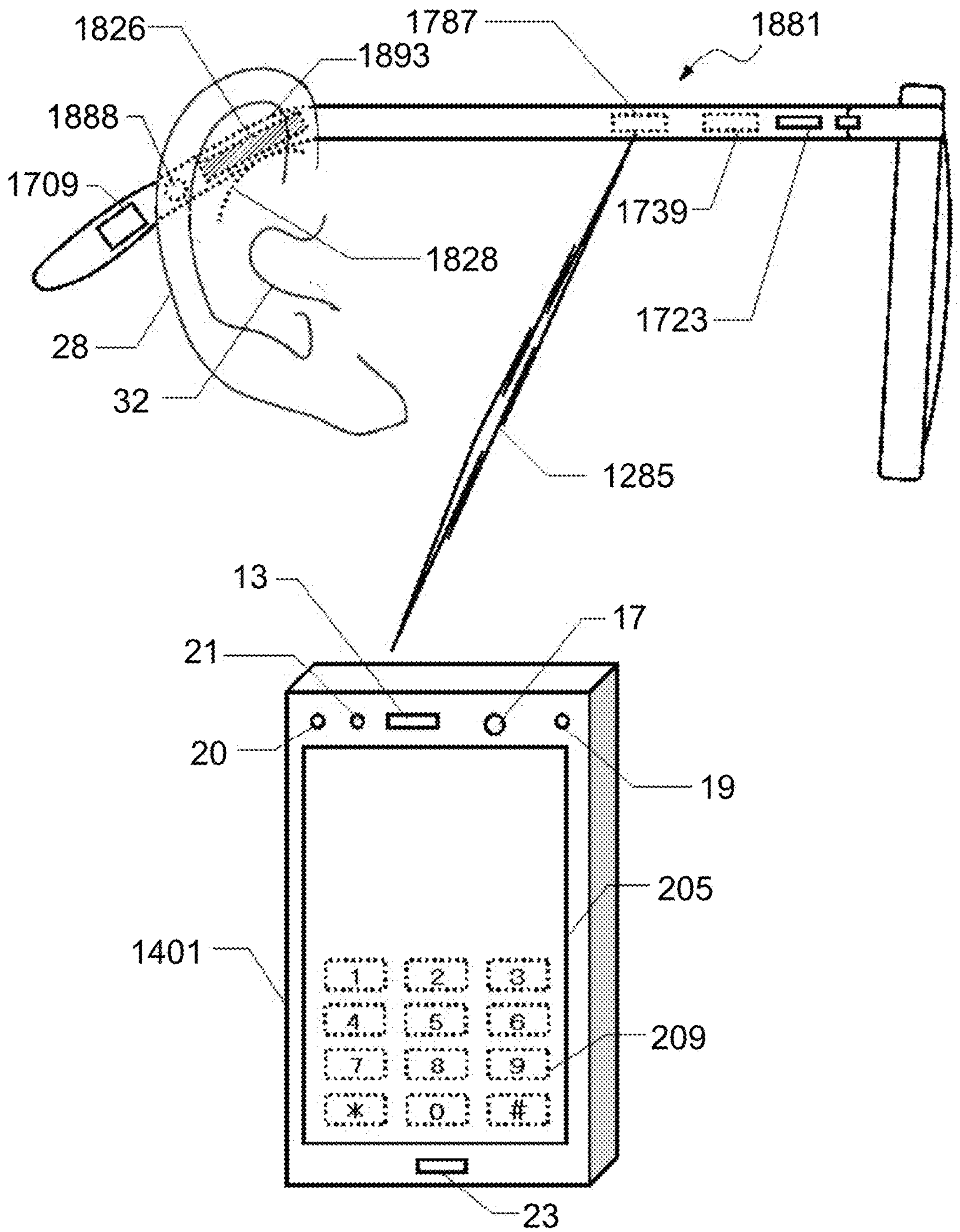
FIG. 33 is a diagram of the system of a twentieth embodiment according to an aspect of the present invention (twentieth embodiment)

FIG. 33 is a diagram of the system of the twentieth embodiment according to an aspect of the present invention. The twentieth embodiment is also configured as an incoming/outgoing-talk unit for a mobile telephone, and together with the mobile telephone 1401 creates a mobile telephone system. The twentieth embodiment takes the configuration of a system in common with that of the nineteenth embodiment in FIG. 32; therefore, portions that are in common have been given like reference numerals, a description thereof being omitted unless there is a particular need. Also similarly with respect to the nineteenth embodiment, the mobile telephone 1401 in the twentieth embodiment as well may in some cases have a special configuration to be used in combination with a pair of eyeglasses 1881 creating an incoming/outgoing-talk unit, and may in other cases be configured as atypical mobile telephone having a short-range communication function. In the latter case, the eyeglasses 1881 take on a configuration as an accessory of the mobile telephone 1401, similarly with respect to the nineteenth embodiment.

A point of difference in the twentieth embodiment from the nineteenth embodiment lies in that the cartilage conduction vibration unit 1826 is provided within an ear-hook unit 1893, by which the temple of the eyeglasses 1881 comes up against the base of the ear 28. As a result thereof, the vibration of the cartilage conduction vibration unit 1826 is transmitted to the outer side 1828 of the cartilage of the base of the ear 28; air conduction sound is generated from the inner wall of the external auditory meatus for transmission to the tympanic membrane via the cartilage around the entrance to the external auditory meatus, and a part is also transmitted directly to the inner ear through the cartilage. The outer side 1828 of the cartilage of the base of the ear 28, against which the temple of the eyeglasses 1881 comes, being close to the inner entrance of the external auditory meatus, is suitable for generating air conduction to the interior of the external auditory meatus from the cartilage around the entrance to the external auditory meatus and for direct conduction to the inner ear through the cartilage.

The ear-hook unit 1893 is further provided with an ear pushing detection unit 1888 at the portion coming up against the rear side of the ear lobe. The ear pushing detection unit 188 mechanically detects the state in which the ear lobe is pushed due to the palm of the hand coming against the ear 28 when there is loud external noise, in order to block same; the controller 1739 transmits this ear pushing detection information to the mobile telephone 1401 from the short-range communication unit 1787. The ear pushing detection unit 1888 can be made of, for example, a switch that is mechanically turned on when pushed by the rear side of the ear lobe. The controller 239 of the mobile telephone 1401 (in the case in which the configuration calls on that of FIG. 28) controls the phase adjustment mixer unit 236 on the basis of the bending detection information received by the short-range communication unit 1446, and determines whether or not to add, to the audio information from the incoming-talk-processing unit 212, the signal of the waveform inverter 240 that is based on one's own voice transmitted from the microphone 1723 to the outgoing-talk-processing unit 222 via the short-range communication unit 1446. A configuration relating to a countermeasure for when the earplug bone conduction effect is generated, similarly with respect to the nineteenth embodiment, can also be configured by calling on FIG. 29.

Twenty-first Embodiment

Figure 34:
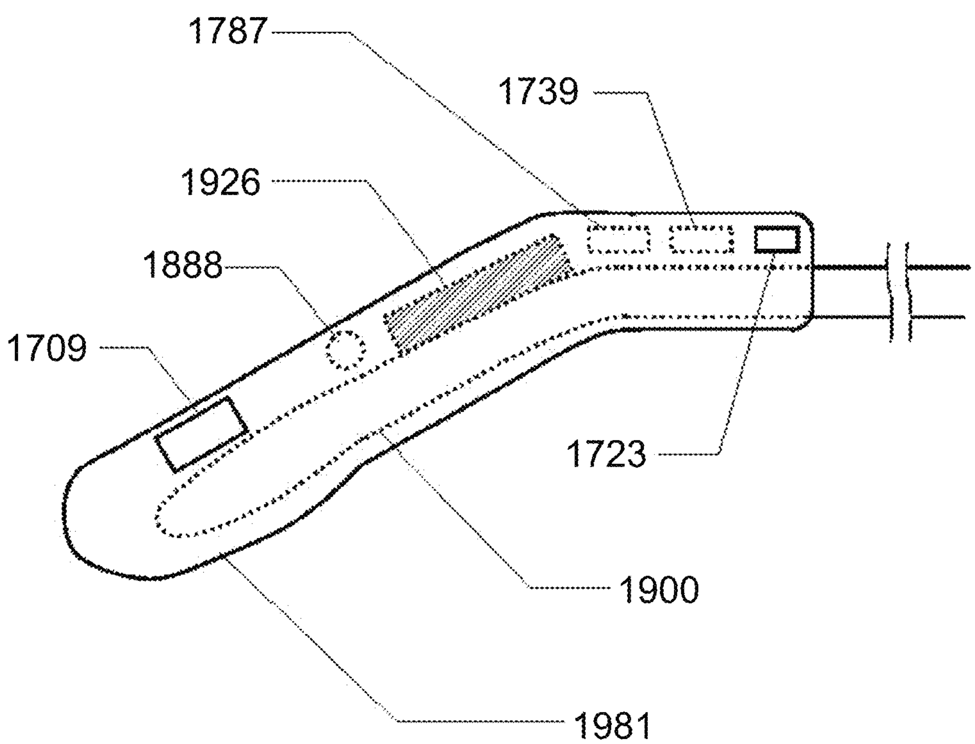
FIG. 34 is a side view of the elements of a twenty-first embodiment according to an aspect of the present invention (twenty-first embodiment)

FIG. 34 is a side view of the elements of the twenty-first embodiment according to an aspect of the present invention. The twenty-first embodiment is also configured as an incoming/outgoing-talk unit for a mobile telephone, and together with the mobile telephone 1401 (not shown) creates a mobile telephone system, similarly with respect to the twentieth embodiment. The twenty-first embodiment takes the configuration of a system analogous to that of the twentieth embodiment in FIG. 33; therefore, portions that are in common have been given like reference numerals, a description thereof being omitted unless there is a particular need. More specifically, a point of difference is that, whereas the incoming/outgoing-talk unit of the twentieth embodiment is configured as specialized eyeglasses, the incoming/outgoing-talk unit of FIG. 34 is configured as an eyeglasses attachment 1981 that can be attached to an ear-hook unit 1900 of the temple of ordinary eyeglasses. The configuration is otherwise consistent with that of the twentieth embodiment in FIG. 33. Also similarly with respect to the twentieth embodiment, the mobile telephone 1401 (not shown) in the twenty-first embodiment may in some cases have a special configuration to be used in combination with the eyeglasses attachment 1981 creating an incoming/outgoing-talk unit, and may in other cases be configured as a typical mobile telephone having a short-range communication function. In the latter case, the eyeglasses attachment 1981 takes on a configuration as an accessory of the mobile telephone 1401, similarly with respect to the twentieth embodiment.

The eyeglasses attachment 1981 is molded as a one-size-fits-all elastic body cover capable of covering the variously sized and/or shaped ear-hook unit 1900; when the ear-hook unit 1900 is inserted from the opening of one end thereof, the cartilage conduction vibration unit 1926 comes into contact with the top side of the ear-hook unit 1900. This contact may be achieved directly or via the coating of the elastic body of the eyeglasses attachment 1981. For this purpose, the elastic body is preferably selected to be of a material having an acoustic impedance that approximates that of ear cartilage. The aforementioned direct or indirect contact transmits the vibration of the cartilage conduction vibration unit 1926 to the ear-hook unit 1900, the vibration thereof then being transmitted to the outer side of the base of the ear 28; therefore, similarly with respect to the twentieth embodiment, air conduction sound is generated from the inner wall of the external auditory meatus for transmission to the tympanic membrane via the cartilage around the entrance to the external auditory meatus, and a part is also transmitted directly to the inner ear through the cartilage.

Each of the outgoing-talk unit (microphone) 1723, the controller 1739, the short-range communication unit 1787, the incoming/outgoing-talk operation unit 1709, and the ear pushing detection unit 1888 provided to the eyeglasses 1881 in the twentieth embodiment is arranged within the eyeglasses attachment 1981 in the twenty-first embodiment in FIG. 34; however, the functions thereof are shared and therefore a description has been omitted. Although not depicted, in a case in which, for example, the ear-hook unit 1900 on the right is covered with the eyeglasses attachment 1981, a dummy cover molded from an elastic body having the same outer shape, material, and weight is provided as an ear-hook unit on the left. Covering the eyeglasses attachment 1981 makes it possible to keep the left-right balance when the eyeglasses are worn. Since the eyeglasses attachment 1981 and the dummy cover are molded using the same elastic body, they can accordingly be configured such that each can be worn as desired as either the left or right ear-hook unit by being slightly deformed. For example, as the inverse of the description above, the left ear-hook unit can be covered with the eyeglasses attachment 1981 and the right ear-hook unit can be covered with the dummy cover. There is accordingly no need to market an assortment of eyeglasses attachments 1981 for either right ear use or left ear use.

Twenty-Second Embodiment

Figure 35:
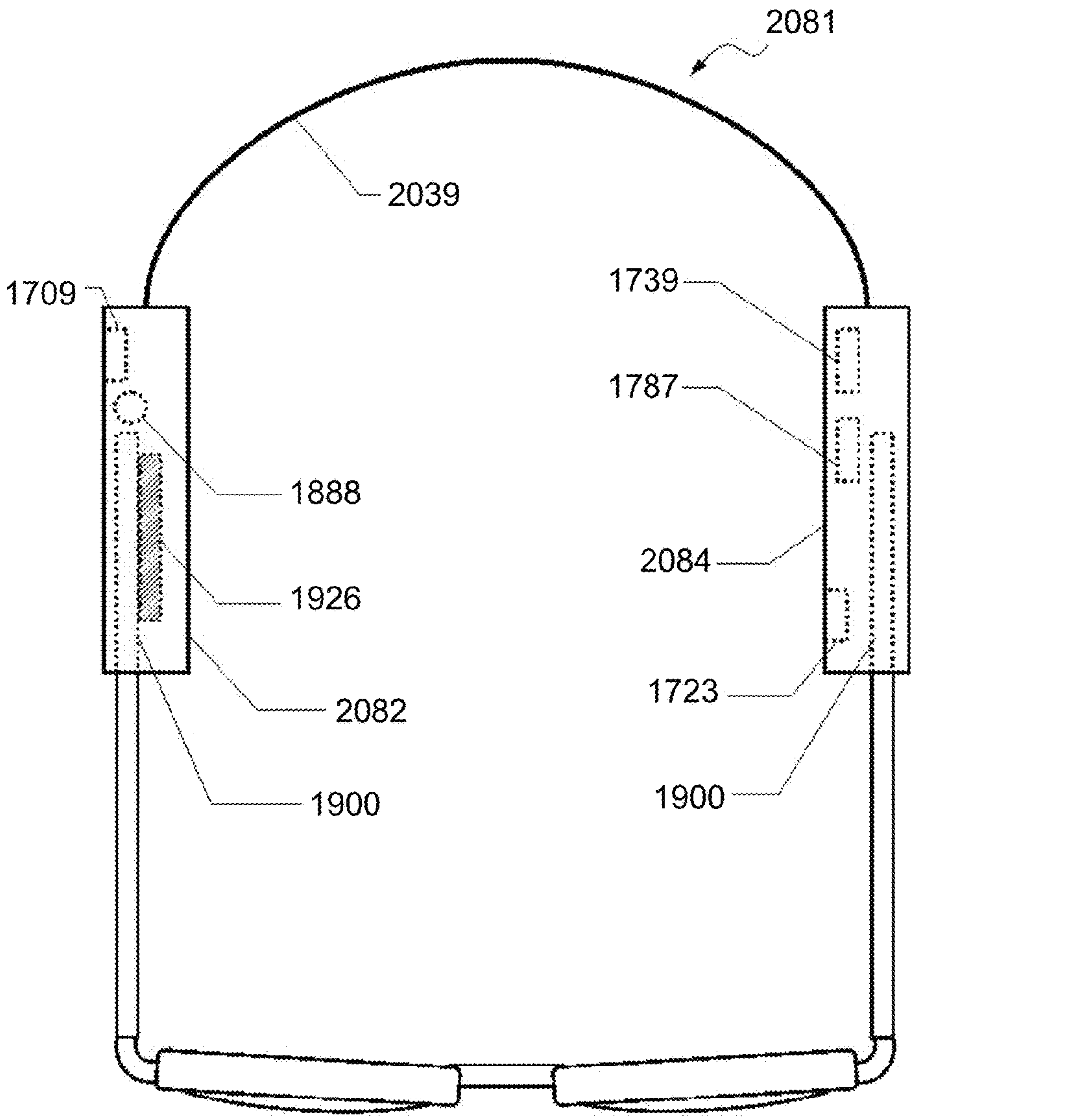
FIG. 35 is a top view of a twenty-second embodiment according to an aspect of the present invention (twenty-second embodiment)

FIG. 35 is a top view of the twenty-second embodiment according to an aspect of the present invention. The twenty-second embodiment is also configured as an incoming/outgoing-talk unit for a mobile telephone, and together with the mobile telephone 1401 (not shown) creates a mobile telephone system, similarly with respect to the twenty-first embodiment. The twenty-second embodiment takes the configuration of a system analogous to that of the twenty-first embodiment in FIG. 34; therefore, portions that are in common have been given like reference numerals, a description thereof being omitted unless there is a particular need. The incoming/outgoing-talk unit of the twenty-second embodiment, similarly with respect to the twenty-first embodiment, is also configured as an eyeglasses attachment 2081 that is molded as a one-size-fits-all elastic body cover capable of covering the variously sized and/or shaped ear-hook unit 1900 in ordinary eyeglasses.

A point of difference in the twenty-second embodiment in FIG. 35 from the twenty-first embodiment in FIG. 34 lies in that each of the constituent elements of the incoming/outgoing-talk unit, which in the twenty-first embodiment are arranged concentratedly in the eyeglasses attachment 1981, one side of which is covered with the ear-hook unit 1900, are distributed in the left and right ear-hook unit 1900. More specifically, the eyeglasses attachment 2081 of the twenty-second embodiment is made of a right-side elastic body cover 2082, a left-side elastic body cover 2084, and a dual-purpose glass-cord cable 2039 for connecting same to be able to communicate via a wire; each of the constituent elements of the incoming/outgoing-talk unit being arranged in a distributed fashion therein. For convenience of description, the elastic body cover 2082 is intended for use on the right ear and the elastic body cover 2084 is intended for use on the left ear, but each of the ear-hook units 1900 can be covered with this pair of elastic body covers in a left-right inversion.

In the aforementioned basic configuration, the cartilage conduction vibration unit 1926, the incoming/outgoing-talk operation unit 1709, and the ear pushing detection unit 1888 are arranged on the right-side elastic body cover 2082. Similarly with respect to the twenty-first embodiment, the vibration of the cartilage conduction vibration unit 1926 is thereby transmitted to the cartilage around the opening of the external auditory meatus via the ear-hook unit 1900. Air conduction sound is generated from the wall inside the external auditory meatus and transmitted to the tympanic membrane, and a part is transmitted directly to the inner ear through the cartilage.

On the other hand, the outgoing-talk unit (microphone) 1723, the controller 1739, and the short-range communication unit 1787 are arranged on the left-side elastic body cover 2084. The dual-use glass-cord cable 2039 has a glass cord design so that the eyeglasses can be hung on the neck when removed, and functions through wiring that connects each of the constituent elements of the incoming/outgoing-talk unit, which are arranged in a distributed fashion in the right-side elastic body cover 2082 and the left-side elastic body cover 2084. Connecting the right-side elastic body cover 2082 and the left-side elastic body cover 2084 using the dual-use glass-cord cable 2039 prevents one side from being misplaced when removed from the eyeglasses.

Twenty-third Embodiment

Figure 36:
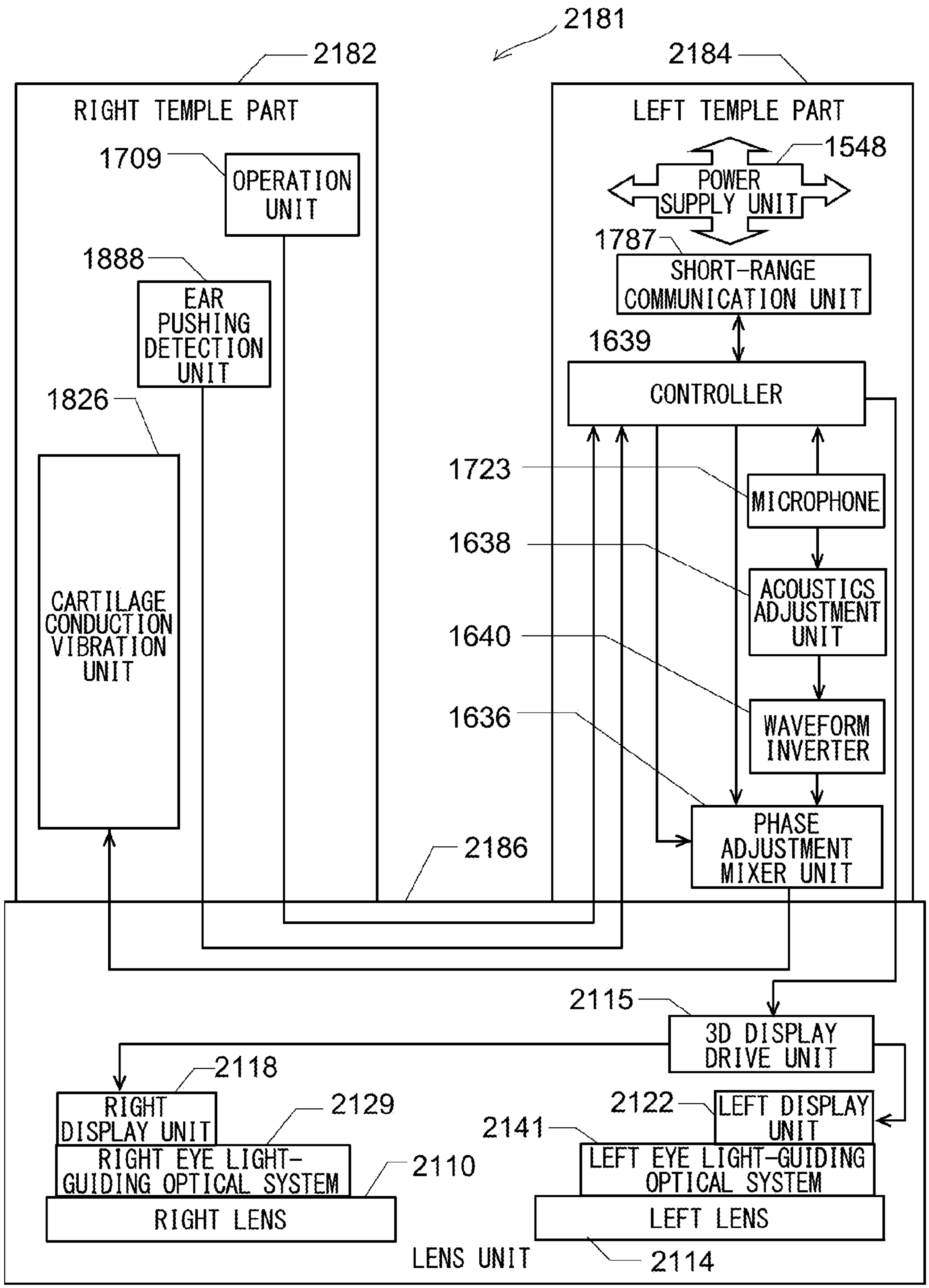
FIG. 36 is a block diagram of a twenty-third embodiment according to an aspect of the present invention (twenty-third embodiment)

FIG. 36 is a block diagram of the twenty-third embodiment according to an aspect of the present invention. The twenty-third embodiment, similarly with respect to either the nineteenth embodiment or the twentieth embodiment, includes eyeglasses 2181 configured as an incoming/outgoing-talk unit for a mobile telephone, and together with the mobile telephone 1401 (not shown) creates a mobile telephone system. Similarly with respect to the twenty-second embodiment, each element constituting the incoming/outgoing-talk unit in the twenty-third embodiment is arranged in a distributed fashion to a right temple unit 2182 and a left temple unit 2184. The individual constituent elements and the functions thereof can be understood in accordance with the block diagram of the seventeenth embodiment in FIG. 29 and that of the top view of the twenty-second embodiment in FIG. 35; therefore, portions that are in common have been given like reference numerals, a description thereof being omitted unless there is a particular need. In the twenty-third embodiment as well, the vibration of the cartilage conduction vibration unit 1826 arranged at the right temple unit 2182 is transmitted to the outer side of the cartilage of the base of the ear 28; this causes the cartilage around the entrance to the external auditory meatus to vibrate, whereby air conduction sound generated from the wall inside the external auditory meatus is transmitted to the tympanic membrane, and a part of the cartilage vibration is directly transmitted to the inner ear through the cartilage.

The twenty-third embodiment in FIG. 36 further has a configuration for visualizing a three-dimensional ("3D") image received from the mobile telephone 1401 in a lens unit 2186. The lens unit 2186 of the eyeglasses 2181 is provided with a right lens 2110 and a left lens 2114 originally intended for eyeglasses, and functions as ordinary eyeglasses. Furthermore, when the short-range communication unit 1787 receives 3D image information from the mobile telephone 1401, the controller 1639 instructs a 3D display drive unit 2115 to display same. The 3D display drive unit 2115, on the basis thereof, causes a right eye image and left eye image to be displayed on a right display unit 2118 and a left display unit 2122, respectively. These images are imaged on the retinas of the right eye and the left eye by a right eye light-guiding optical system 2129 and a left eye light-guiding optical system 2141, which comprise an imaging lens, a half mirror, and other components; and it will be possible to appreciate the 3D image in an aesthetic sense. This 3D image is viewed in a form that is synthesized with or superimposed on a raw image that enters the retinas from the right lens 2110 and the left lens 2114.

Twenty-fourth Embodiment

Figure 37:
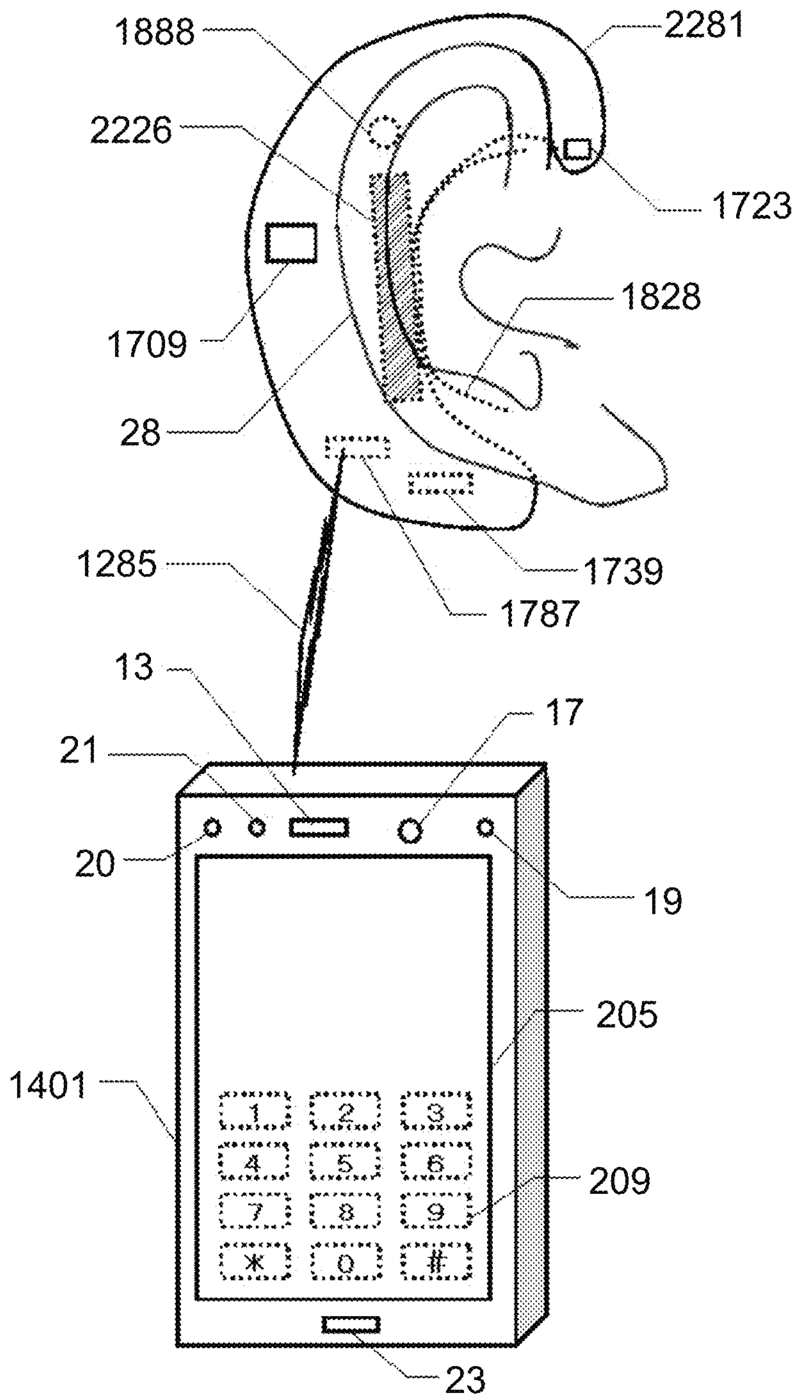
FIG. 37 is a diagram of the system of a twenty-fourth embodiment according to an aspect of the present invention (twenty-fourth embodiment)

FIG. 37 is a diagram of the system of the twenty-fourth embodiment according to an aspect of the present invention. The twenty-fourth embodiment is also configured as an incoming/outgoing-talk unit for a mobile telephone, and together with the mobile telephone 1401 creates a mobile telephone system. The incoming/outgoing-talk unit of the twenty-fourth embodiment, although being configured as an ear-hook unit 2281 used for hearing aids or the like, otherwise takes the configuration of a system in common with that of the twentieth embodiment in FIG. 33; therefore, portions that are in common have been given like reference numerals, a description thereof being omitted unless there is a particular need. Also similarly with respect to the twentieth embodiment, the mobile telephone 1401 in the twenty-fourth embodiment may in some cases have a special configuration to be used in combination with the ear-hook unit 2281 creating an incoming/outgoing-talk unit, and may in other cases be configured as a typical mobile telephone having a short-range communication function. In the latter case, the ear-hook unit 2281 takes on a configuration as an accessory of the mobile telephone 1401, similarly with respect to the twentieth embodiment.

In the twenty-fourth embodiment, the cartilage conduction vibration unit 2226 is arranged at a position coming up against the rear part of the outer side 1828 of the cartilage of the base of the ear 28. As a result thereof, similarly with respect to the twentieth embodiment, the vibration of the cartilage conduction vibration unit 2226 is transmitted to the outer side 1828 of the cartilage of the base of the ear 28; air conduction sound is generated from the inner wall of the external auditory meatus for transmission to the tympanic membrane via the cartilage around the entrance to the external auditory meatus, and a part is also transmitted directly to the inner ear through the cartilage. The outer side 1828 of the cartilage of the base of the ear 28, being close to the inner entrance of the external auditory meatus thereof, is suitable for generating air conduction to the interior of the external auditory meatus from the cartilage around the entrance to the external auditory meatus and for direct conduction to the inner ear through the cartilage. However, in the case in which the incoming/outgoing-talk unit is configured as an ear-hook unit 2281, as in the twenty-fourth embodiment, there is a great degree of freedom in the arrangement of the cartilage conduction vibration unit 2226 for making contact with the outer side 1828 of the cartilage of the base of the ear 28; therefore, the cartilage conduction vibration unit 2226 can be arranged at an optimum position, taking into consideration the mounting layout and vibration conduction effect for the structure of the incoming/outgoing-talk unit. Accordingly, similarly with respect to the twentieth embodiment, in the twenty-fourth embodiment there may also be employed an arrangement by which the cartilage conduction vibration unit 2226 comes up against the upper part of the outer side 1828 of the cartilage of the base of the ear 28.

The ear-hook unit 2281, similarly with respect to the case of the eyeglasses 1881 in the twentieth embodiment, is provided with an outgoing-talk unit (microphone) 1723, a controller 1739, a short-range communication unit 1787, an incoming/outgoing-talk operation unit 1709, and an ear pushing detection unit 1888, the associated functions being consistent therewith and an attendant description accordingly being omitted. In the case of the ear-hook unit 2281 of the twenty-fourth embodiment, the outgoing-talk unit (microphone) 1723 is arranged frontwardly with respect to the ear.

Twenty-fifth Embodiment

Figure 38:
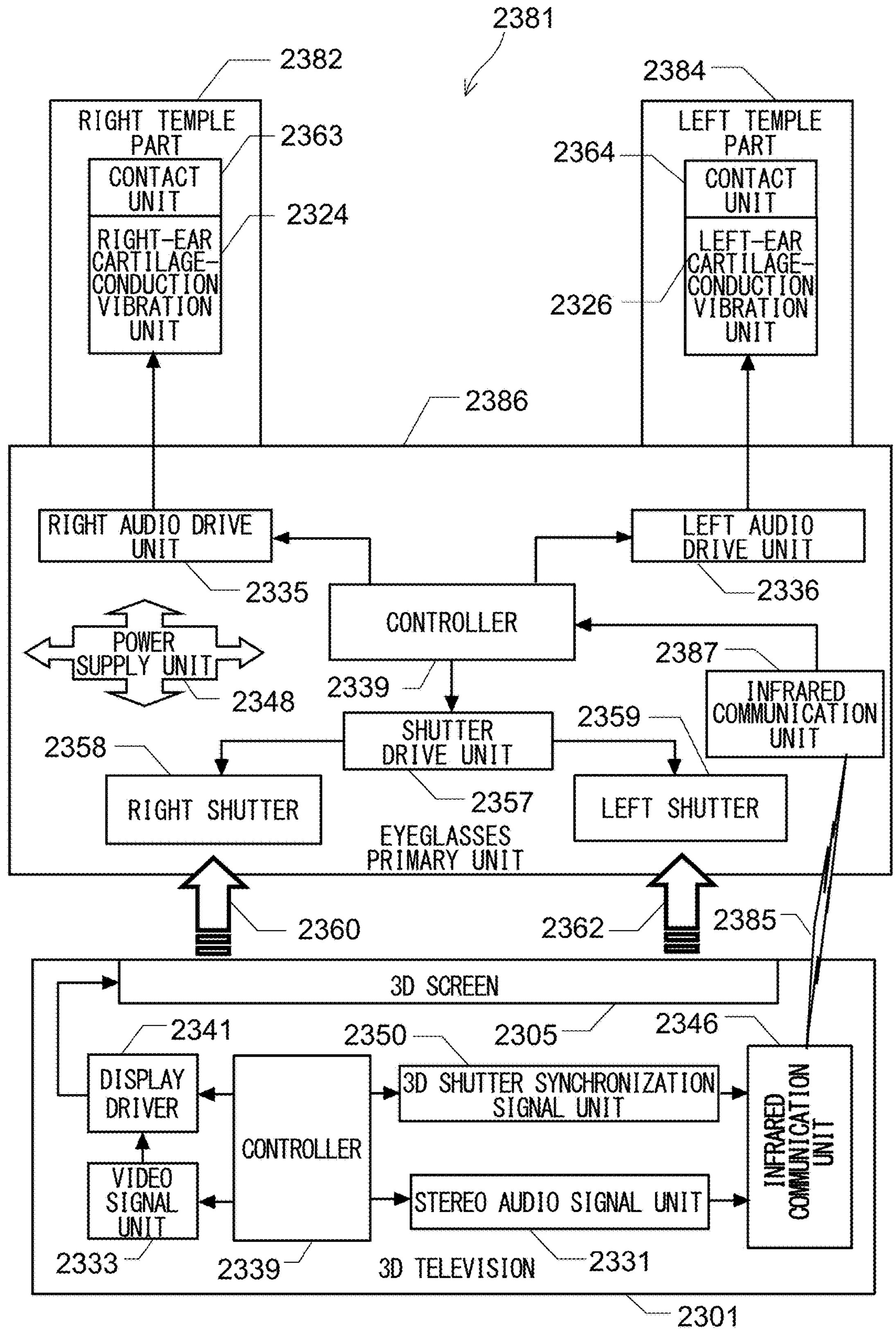
FIG. 38 is block diagram of a twenty-fifth embodiment according to an aspect of the present invention (twenty-fifth embodiment)

FIG. 38 is block diagram of the twenty-fifth embodiment according to an aspect of the present invention. The twenty-fifth embodiment is consistent with the twentieth to twenty-third embodiments in that the cartilage conduction vibration units 2324 and 2326 are arranged at the ear-fitting parts of the temples of an eyeglasses-type device and in that the vibration is transmitted to the outer side of the cartilage of the base of the ear 28; however, this embodiment is configured not as an incoming/outgoing-talk unit of a mobile telephone but rather as 3D television viewing eyeglasses 2381, and together with a 3D television 2301 creates a 3D television viewing system. The twenty-fifth embodiment makes it possible to experience stereo audio information; the vibration of a right-ear cartilage-conduction vibration unit 2324 arranged at the right temple unit 2382 is transmitted to the outer side of the cartilage of the base of the right ear via a contact unit 2363, and causes the cartilage around the entrance to the external auditory meatus to vibrate, air conduction sound that is thereby generated from the wall inside the external auditory meatus being transmitted to the right tympanic drum, and a part of the cartilage conduction being transmitted directly to the inner ear through the cartilage. Similarly, the vibration of a left-ear cartilage-conduction vibration unit 2326 arranged at the left temple unit 2384 is transmitted to the outer side of the cartilage of the base of the left ear via a contact unit 2364, and causes the cartilage around the entrance to the external auditory meatus to vibrate, whereby air conduction sound that is generated from the wall inside the external auditory meatus is transmitted to the left tympanic drum, and a part of the cartilage conduction is transmitted directly to the inner ear through the cartilage.

The viewing eyeglasses 2381 are configured to be wearable over ordinary eyeglasses by any person wearing the same; in this case, the vibrations of the right-ear cartilage-conduction vibration unit 2324 and the left-ear cartilage-conduction vibration unit 2326 are respectively transmitted to the cartilage of the base of the left and right ears, which are in direct contact therewith via the contact units 2363 and 2364, and are also respectively transmitted to the ear-hook units of the left and right temples of the ordinary eyeglasses and indirectly transmitted to the cartilage of the base of the ear via the ear-hook units. The contact units 2363 and 2364 are configured in a shape such that cartilage conduction appropriate for the cartilage of the base of the ear is generated, both in a case in which a person without eyeglasses wears the viewing eyeglasses 2381 and in a case in which they are worn over ordinary eyeglasses. A description thereof will be provided further below.

The 3D television 2301 generates an audio signal from a stereo audio signal unit 2331 on the basis of the control of the controller 2339; an infrared communication unit 2346 transmits this audio signal to an infrared communication unit 2387 of the viewing eyeglasses 2381 using infrared rays 2385. The controller 2339 of the viewing eyeglasses 2381 outputs a left and a right audio signal from a right audio drive unit 2335 and a left audio drive unit 2336 on the basis of the received audio signal, and causes the right-ear cartilage-conduction vibration unit 2324 and the left-ear cartilage-conduction vibration unit 2326 to vibrate. The aforementioned infrared communication unit 2387, the controller 2339, the right audio drive unit 2335, the left audio drive unit 2336, as well as a shutter drive unit 2357, a right shutter 2358 and a left shutter 2359 (to be described later), together with a power supply unit 2348, are arranged on an eyeglasses primary unit 2386.

On the other hand, the 3D television 2301 sends a video signal of a video signal unit 2333 to a display driver 2341 on the basis of the control of the controller 2339, and displays a 3D image on a 3D screen 2305 comprising a liquid crystal display unit or the like. The controller 2339 further synchronizes with the 3D image display to generate a synchronization signal from a 3D shutter synchronization signal unit 2350, and the infrared communication unit 2346 transmits this synchronization signal to the infrared communication unit 2387 of the viewing eyeglasses 2381 using the infrared rays 2385. The controller 2339 of the viewing eyeglasses 2381 controls the shutter drive unit 2357 on the basis of the received synchronization signal, and opens the right shutter 2358 and the left shutter 2359 in alternation. A right eye image 2360 and a left eye image 2362, which are displayed in alternation on the 3D screen 2305, are thereby made to be incident on the right eye and the left eye in synchronization. In the twenty-fifth embodiment, the stereo audio signal for driving the cartilage conduction vibration unit and the 3D shutter synchronization signal are thus transmitted by the infrared communication between the infrared communication units 2346 and 2387. These two signals are sent in parallel by either time division or by synthesis. The communication therebetween is not to be limited to communication by infrared rays, but rather may be achieved using short-range wireless communication, as in other embodiments.

Figure 39A:
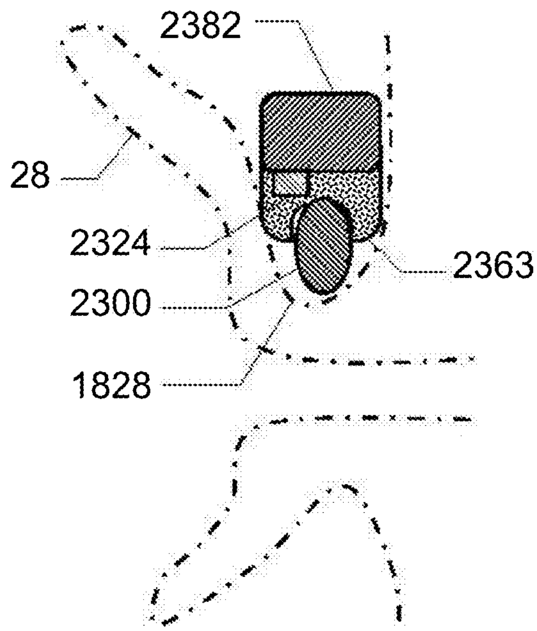
FIGS. 39A and 39B are cross-sectional views of the elements of the twenty-fifth embodiment.
Figure 39B:
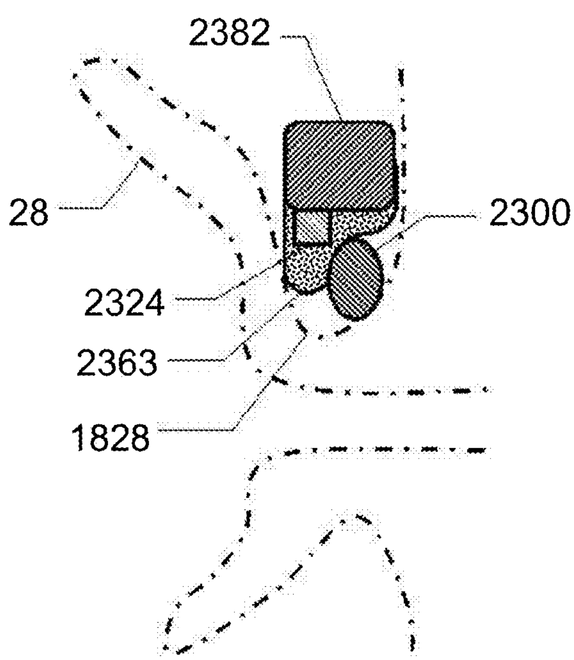

FIG. 39 is a cross-sectional view of the elements of the aforementioned twenty-fifth embodiment; the cross-section of the right temple unit 2382 is illustrated in a state in which the viewing eyeglasses 2381 have been worn since the ordinary eyeglasses were put on. FIG. 39A is a cross-section of the right temple unit 2382 relating to the twenty-fifth embodiment, and FIG. 39B illustrates a cross-section of a modification example thereof. First, a description of FIG. 39A shall be provided. A contact unit 2363 is provided to the portion of the bottom of the right temple unit 2382 that is worn on the ear 28. This contact unit 2363 comprises an elastic body having an acoustic impedance approximating that of ear cartilage, and the right-ear cartilage-conduction vibration unit 2324 is held in the right temple unit 2382 configured so as to be enveloped therein. The cross-section of the contact unit 2363, as is clear from FIG. 39A, is provided with a groove into which the ear-hook unit 2300 of the ordinary eyeglasses is to be fitted. The right temple unit 2382 of the viewing eyeglasses 2381 achieves reliable contact with the ear-hook unit 2300 of the temple of the ordinary eyeglasses, and the elasticity of the contact unit 2363 prevents the contacted portions of the right temple unit 2382 and the ear-hook unit 2300 from buzzing due to vibration. In the state of FIG. 39A, the vibration of the right-ear cartilage-conduction vibration unit 2324 is transmitted to the outer side 1828 of the cartilage of the base of the right ear 28, in direct contact therewith via the contact unit 2363, and is also transmitted to the ear-hook unit 2300 of the right temple of the ordinary eyeglasses, and indirectly transmitted to the outer side 1828 of the cartilage of the base of the ear 28 via this ear-hook unit 2300.

On the other hand, in a case in which a person without eyeglasses wears the viewing eyeglasses 2381 directly, the entire contact unit 2363 is in direct contact with the outer side 1828 of the cartilage of the base of the right ear 28, and transmits the vibration of the right-ear cartilage-conduction vibration unit 2324 thereto. The outer side of the contact unit 2363 is beveled, and therefore the right temple unit 2382 will fit to the ear 28 without discomfort even in this case.

Next, in a modification example in FIG. 39B, as is clear from the cross-sectional view thereof, a contact unit 2363 is provided to the portion of the bottom of the right temple unit 2382 that is worn on the ear 28, similarly with respect to FIG. 39A. Also similarly with respect to FIG. 39A, the contact unit 2363 comprises an elastic body having an acoustic impedance approximating that of ear cartilage, and the right-ear cartilage-conduction vibration unit 2324 is held at the right temple unit 2382 configured so as to be enveloped therein. As is clear from FIG. 39B, the cross-sectional shape of the contact unit 2363 is different in the modification example, a concave slope being provided instead of the groove; the right temple unit 2382 of the viewing eyeglasses 2381 thereby achieves reliable contact with the outer side of the ear-fitting part 2300 of the temple of the ordinary eyeglasses so as to be hooked on the ear 28, and the elasticity of the contact unit 2363 prevents the contact portions of the right temple unit 2382 and the ear-hook unit 2300 from buzzing due to vibration. In the state of FIG. 39B, the vibration of the right-ear cartilage-conduction vibration unit 2324 is transmitted to the outer side 1828 of the cartilage of the base of the right ear 28, in direct contact therewith via the contact unit 2363, and is also transmitted to the ear-hook unit 2300 of the right temple of the ordinary eyeglasses, and indirectly transmitted to the outer side 1828 of the cartilage of the base of the ear 28 via this ear-hook unit 2300.

On the other hand, in a case in which a person without eyeglasses wears the viewing eyeglasses 2381, the entire contact unit 2363 is in direct contact with the outer side 1828 of the cartilage of the base of the right ear 28, and transmits the vibration of the right ear conduction vibration unit 2324 thereto. The outer side of the contact unit 2363 is also beveled in the case of the modification example in FIG. 39B; the right temple unit 2382 is fitted to the ear 28 without discomfort even in a case in which the viewing eyeglasses 2381 are worn directly. As is clear from FIG. 39B, it is the contact with the ear cartilage of the bottom or the outer side of the temple of the eyeglasses that is essential in cartilage conduction, and not with the facial cartilage at the inner side of the temple of the eyeglasses; the shape of the contact unit is determined to meet this purpose.

As described above, in the twentieth to twenty-fifth embodiments, the vibration of the cartilage conduction vibration unit 2324 is transmitted to the outer side of the cartilage of the base of the ear. This causes the cartilage around the entrance to the external auditory meatus to vibrate, whereby air conduction sound that is generated from the wall inside the external auditory meatus is transmitted to the tympanic membrane, and a part of the cartilage conduction is directly transmitted to the right inner ear through the cartilage. Favorable conduction by contact with the outer side of the ear cartilage can accordingly be achieved merely by wearing the eyeglasses in an ordinary state. By contrast, in a case using conventional bone conduction, the bone at the front or the rear of the ear must be tightly tucked in by the portion of the inner side of the temple of the eyeglasses, which results in pain and renders long-term usage unbearable. The present invention does not have such a problem, it being possible to listen comfortably to audio information while experiencing a sensation similar to that of ordinary eyeglasses.

The various features of each of the embodiments described above are not to be restricted to individual embodiments, but rather can be substituted or combined with other appropriate embodiments. For example, in the description of the twenty-first embodiment in FIG. 34, the ear-hook unit of the other temple is covered with a dummy cover, but the configuration of FIG. 34 can be prepared as a pair; when the ear-hook units of the left and right temples are made to be each covered, it becomes possible to listen to stereo audio signals as in the twenty-fifth embodiment of FIG. 38. The two ear-hook units can also be connected by wireless connection at this time, but a connection by the dual-use glass-cord cable as in the twenty-second embodiment of FIG. 35 is also possible. Regarding the feature of the glass cord, a link between the configuration of FIG. 34 and the dummy cover in the twenty-first embodiment may be made with a glass cord, thus preventing misplacement. Regarding the aforementioned feature of achieving a stereo effect, when the twenty-third embodiment of FIG. 36 is also configured such that the constituent elements are not divided into left and right similarly with respect to the description above, but rather two sets of the required constituent elements are prepared and each is positioned at the left and right temple units, it becomes possible not only to make an image into 3D but also to listen to stereo audio signals, as in the twenty-fifth embodiment of FIG. 38. Referring to the twenty-fifth embodiment, a part the left-right configuration at this time can be shared as appropriate (for example, at least the controller and the power supply).

In the aforementioned embodiments, the effects of the present invention have been described by way of example using a mobile telephone and an incoming/outgoing-talk unit thereof or 3D video viewing eyeglasses. However, the advantages of the present invention are not to be limited thereto; the invention can be implemented in other applications. For example, the various features of the present invention described above would also be effective when implemented in a hearing aid.

Figure 40:
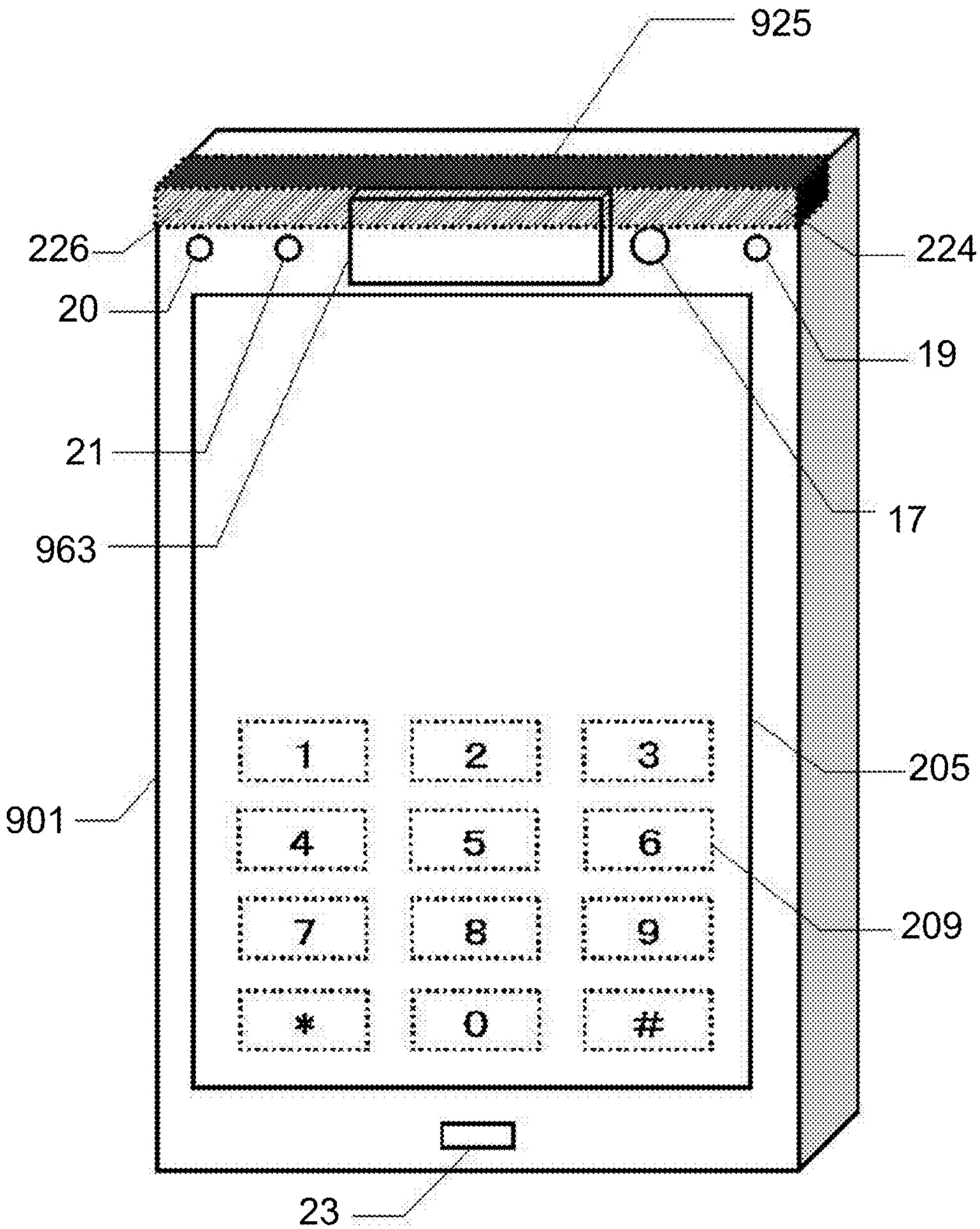
FIG. 40 is a perspective view illustrating a modification example of the tenth embodiment in FIG. 19.

The various features of each of the embodiments described above are not to be limited to the individual embodiments; rather, wherever it is possible to benefit from the feature of an embodiment, same may be variously implemented in an embodiment in which the feature has been modified. For example, FIG. 40 is a perspective view illustrating a modification example of the tenth embodiment in FIG. 19. In this modification example as well, similarly with respect to FIG. 19, the cartilage conduction vibration source 925, which comprises a piezoelectric bimorph element or the like, serves as the cartilage conduction vibration source, while also taking the role of a drive source of the incoming-talk unit for generating sound waves that are transmitted to the tympanic membrane by air conduction. However, the cartilage conduction vibration source 925 stretches to the side of the mobile telephone 901 in the modification example of FIG. 40, the right end 224 and left end 226 thereof being made to vibrate. Sound can accordingly be heard by cartilage conduction due to either one thereof being caused to contact the tragus, similarly with respect to the nineteenth embodiment. The cartilage conduction vibration source 925 vibrates as a whole, rather than vibrating at only the right end 224 and left end 226 thereof. Audio information can accordingly be transmitted regardless of where on the top inner edge of the mobile telephone 901 contact with the ear cartilage is made, similarly with respect to FIG. 19. Also, a point of similarity with FIG. 19 lies in that the cartilage conduction output unit 963, which is made of a material having an acoustic impedance approximating that of ear cartilage, is arranged frontwardly with respect to the cartilage conduction vibration source 925.

The following is a possible modification example for the twenty-third embodiment of FIG. 36. Namely, the outgoing-talk unit (microphone) 1723 in the twenty-third embodiment is an ordinary air conduction microphone, but when the outgoing-talk unit (microphone) 1723 is instead a bone conduction microphone (a microphone or pickup of the bone conduction contact type), it becomes possible to selectively pick up the audio of the speaking party without picking up any undesired sound when in the presence of noise. It further becomes possible to speak in an undertone that will not disturb the surroundings. It is natural that the temples of eyeglasses are generally in contact with the bone at the front of the ear (the zygomatic arch, or a part of the temporal bone on the zygomatic arch) or the bone at the rear of the ear (the mastoid process of the temporal bone). Accordingly, calling on FIG. 36, arranging the outgoing-talk unit (microphone) 1723, which is constituted of a microphone of the bone conduction contact type, at the contact unit with the aforementioned bones in the left temple unit 2184 of the eyeglasses makes it possible to pick up the audio of the speaking party by bone conduction. Dividing the cartilage conduction vibration unit 1826 and the outgoing-talk unit (microphone) 1723, constituted of a microphone of the bone conduction contact type, to the left and right temple units 2182 and 2184, as in FIG. 36, makes it possible to prevent the microphone of the bone conduction contact type from picking up the vibration from the cartilage conduction vibration unit 1826.

In the twenty-third embodiment of FIG. 36 or a modification example as described above, it is also possible to omit the configuration related to 3D display from the lens unit 2186 and to make an ordinary eyeglasses configuration with only the right lens 2110 and left lens 2114.

On the other hand, the following is another possible modification example, for the twenty-fifth embodiment of FIG. 38. Specifically, since the twenty-fifth embodiment is configured as the viewing eyeglasses 2381, the sound source of the stereo audio information resides in the 3D television 2301, and the right-ear cartilage-conduction vibration unit 2324 and the left-ear cartilage-conduction vibration unit 2326 are made to vibrate on the basis of the audio signal received by the infrared communication unit 2387. However, when the configuration is instead such that a stereo audio signal unit serving as the sound signal source unit of the stereo audio information, and an audio memory for providing data thereto, are housed in the eyeglasses primary unit 2386 or one of the right temple unit 2382 and the left temple unit 2384 of FIG. 38, or are divided and then housed in both, then the present invention can be configured as an independent portable music player. Calling on FIG. 38 to facilitate understanding of the configuration of such a modification example, the aforementioned stereo audio signal unit and audio memory for providing data thereto are to be included in the controller 2339. In the case of this modification example, there is no need for a link with the 3D television 2301; therefore, instead of the right shutter 2358, the left shutter 2359, and the shutter drive unit 2357 in FIG. 38, a right lens and left lens of ordinary eyeglasses such as in the twenty-third embodiment of FIG. 36 are arranged on the eyeglasses primary unit 2386.

In the case of the above-described modification example in which the right lens and left lens are arranged at the eyeglasses primary unit 2386 to make ordinary eyeglasses, the controller, the audio drive unit, the infrared communication units, the power supply unit, and the other respective constituent elements arranged at the eyeglasses primary unit 2386 in FIG. 38 may be divided and arranged at the right temple unit and the left temple unit as appropriate, as in the twenty-third embodiment of FIG. 36, thereby preventing any increase in the size of the eyeglasses primary unit 2386. The infrared communication unit 2387 in the modification example is responsible for functions such as inputting sound source data from a PC or other external sound source data holding device. Using a handheld remote control or the like, the infrared communication unit 2387 can be made to function as a wireless communication unit for adjusting the volume from the right-ear cartilage-conduction vibration unit 2324 and the left-ear cartilage-conduction vibration unit 2326, or for adjusting the balance of the left and right vibration output. It is furthermore possible to receive the audio information of a mobile telephone when the portable music player is linked to the mobile telephone. In such a case, when the portable music player is provided with an air conduction microphone or a bone conduction microphone, the portable music player can be made to function as a device of the mobile telephone used for incoming talk or outgoing talk made with an external party.

The above-described innovative arrangement of the constituent elements to the eyeglasses primary unit 2386 and to the right temple unit 2382 and left temple unit 2384 is not to be limited to the aforementioned modification example. For example, the controller 2339, the infrared communication unit 2387, the power supply unit 2348, the right audio drive unit 2335, and the left audio drive unit 2336 may also be divided and arranged in the right temple unit 2382 and the left temple unit 2384 as appropriate in the case of the actual viewing eyeglasses 2381 in the twenty-fifth embodiment of FIG. 38.

Twenty-sixth Embodiment

Figure 41:
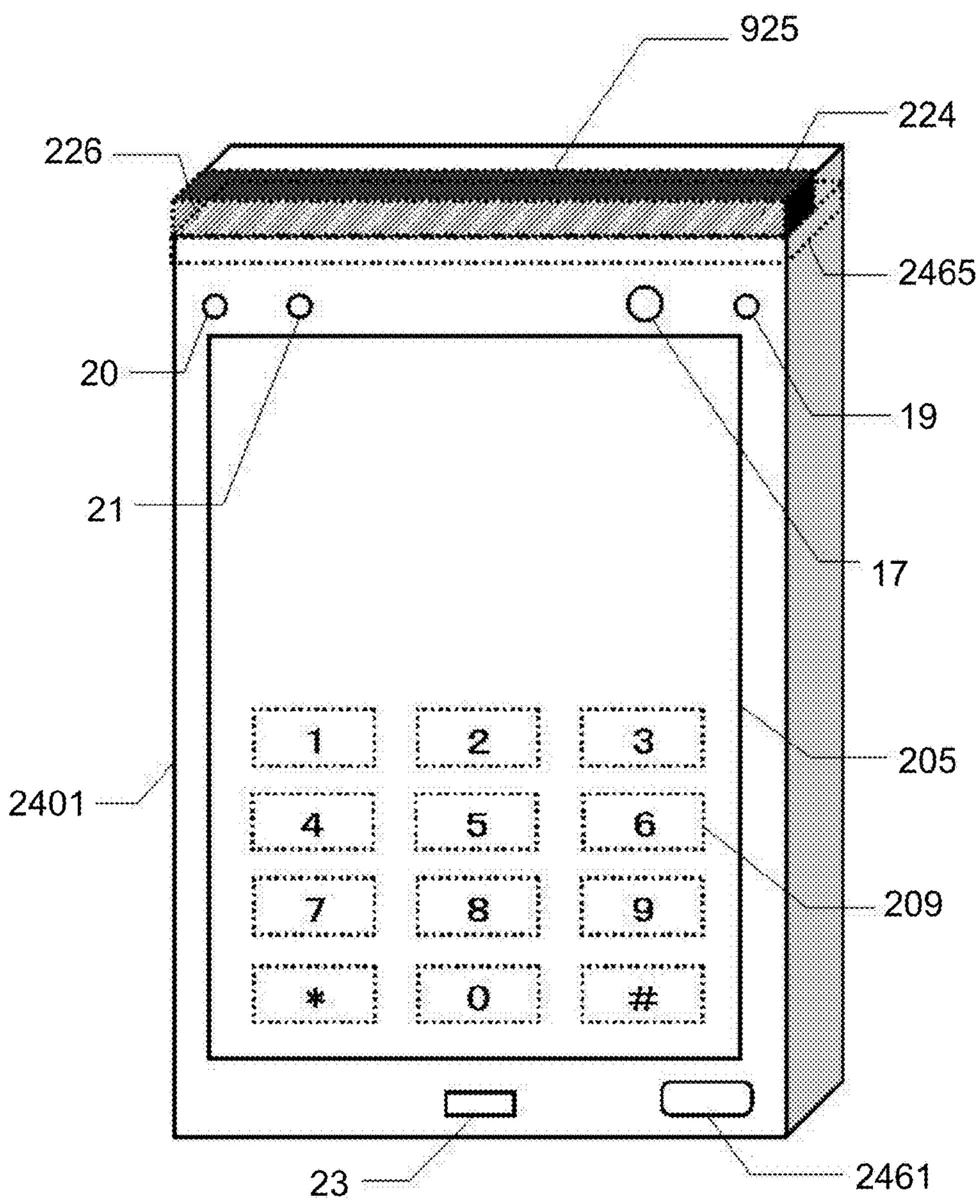
FIG. 41 is a perspective view of a twenty-sixth embodiment according to an aspect of the present invention (twenty-sixth embodiment)

FIG. 41 is a perspective view of the twenty-sixth embodiment according to an aspect of the present invention, and is configured as a mobile telephone. A mobile telephone 2401 of the twenty-sixth embodiment, similarly with respect to that of the modification example of the tenth embodiment depicted in FIG. 40, is an integrated type with no moving parts, and is configured as a "smartphone", which has the large-screen display unit 205 provided with GUI functions. There is much in common with the structure thereof, and so corresponding portions have been given like reference numerals as in FIG. 40, and a description has been omitted. Similarly with respect to the tenth embodiment and the modification example thereof, "upper part" in the twenty-sixth embodiment also does not signify a separated upper part but rather signifies the portion at the top of the integrated structure.

A point of difference in the twenty-sixth embodiment from the modification example of the tenth embodiment illustrated in FIG. 40 lies in that the vibration of the cartilage conduction vibration source 925 has a dual purpose as a vibration source for creating a feedback sensation for a touch operation in the touch panel function of the large-screen display unit 205. More specifically, a vibration isolation material 2465 made of a vinyl system, a urethane system, or another system is provided between the cartilage conduction vibration source 925 and the configuration located therebelow (the large-screen display unit 205), the configuration being such that an audio signal from the cartilage conduction is prevented from being likely to be transmitted to the large-screen display unit 205 or the like, due to the difference in acoustic impedance or the like. On the other hand, when the large-screen display unit 205 is touched and any type of input from the touch panel function thereof is thereby accepted, the cartilage conduction vibration source 925 is made to vibrate at a low frequency at or below the audible range, in order to provide feedback to the finger that has touched the same. The vibration frequency is selected to be a frequency that substantially matches the resonance frequency of the vibration isolation material 2465; therefore, the vibration isolation material 2465 resonates due to the vibration of the cartilage conduction vibration source 925, which vibration is then transmitted to the large-screen display unit 205. The vibration isolation material 2465, which prevents vibration in the audio region, thus functions as a vibration transmission material for low-frequency vibration for feedback. Low-frequency vibration can thereby be transmitted to the finger that touched the large-screen display unit 205, and it can be known that the touch input has been accepted. To prevent conflation of the impact of the touch operation itself with the feedback vibration in response thereto, the cartilage conduction vibration source 925 is provided with a predetermined delay from the moment of touch, and is made to provide the feedback vibration after the touch impact has settled.

The twenty-sixth embodiment is provided with an operation button 2461, which is used for operations such as turning the touch panel function of the large-screen display unit 205 on and off. Also, for the sake of simplifying the drawings, the configuration of the twenty-sixth embodiment omits the cartilage conduction output unit 963, which has been provided to the modification example of the tenth embodiment illustrated in FIG. 40; however, same can be provided as desired.

Figure 42:
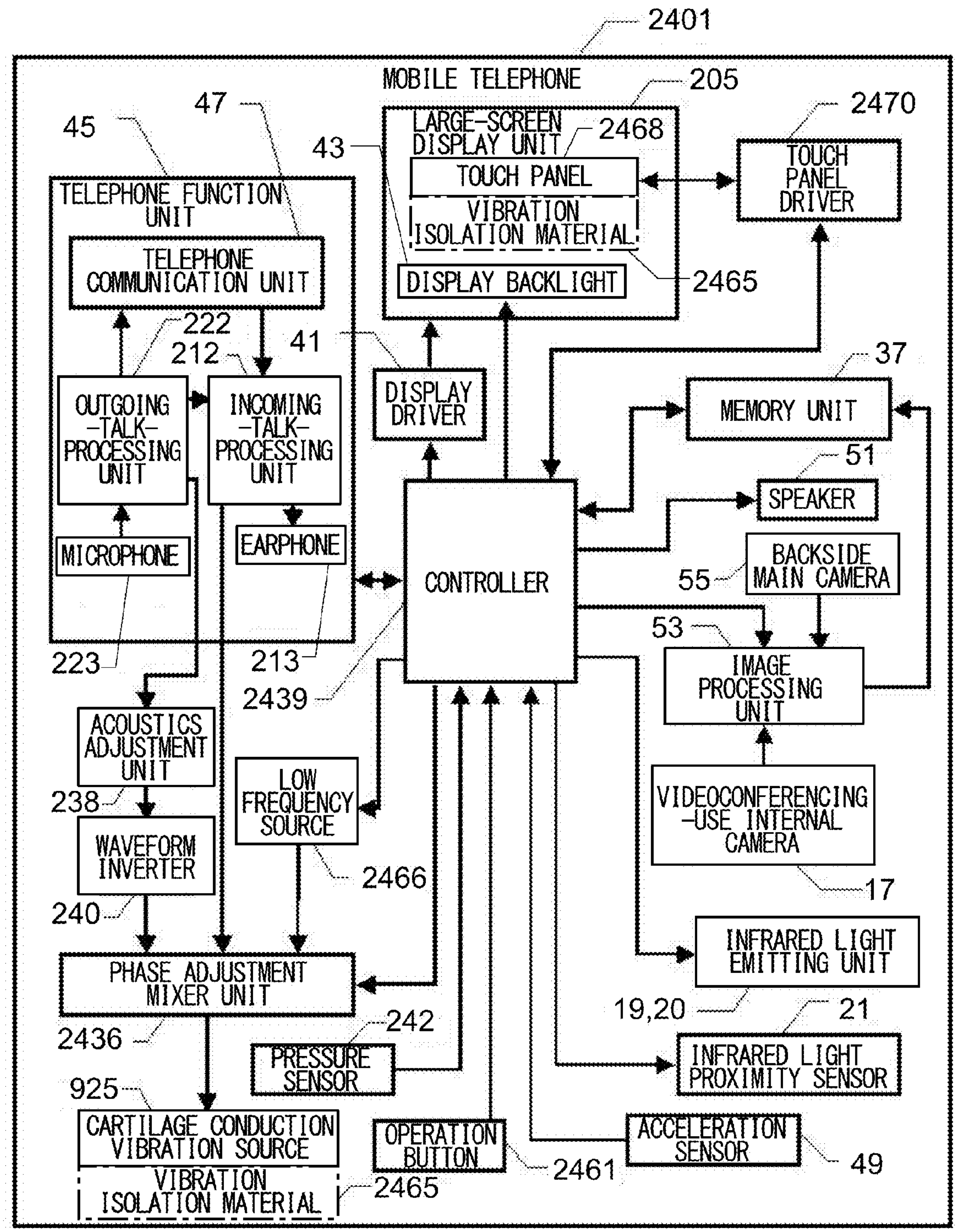
FIG. 42 is a block diagram of the twenty-sixth embodiment of FIG. 41.

FIG. 42 is a block diagram of the twenty-sixth embodiment; identical portions have been given like reference numerals to those in FIG. 41, and a description thereof has been omitted. The configuration of the block diagram in FIG. 42 has many points in common with the block diagram of the fourth embodiment in FIG. 8, and can call on the configuration of the conceptual block diagram of the elements in FIG. 9; therefore, parts of the configuration in common with FIG. 8 have been given like reference numerals and a description thereof has been omitted.

The large-screen display unit 205 of FIG. 42 is illustrated as having a touch panel 2468, and a touch panel driver 2470, which is controlled by a controller 2439 and drives the touch panel 2465; however, this is not specific to the twenty-sixth embodiment, but rather is shared with other embodiments in which the large-screen display unit 205 has a touch panel function, and has merely been omitted from the diagrams of the other embodiments in order to avoid complication. FIG. 42 illustrates vibration isolation materials 2465 respectively for the portions of the cartilage conduction vibration source 925 and the touch panel 2468, but this has been described in such a manner merely because of the space limitations of the block diagram. The vibration isolation material 2465 is the same, and the description does not mean that it is separated and provided to respective positions on the cartilage conduction vibration source 925 and the touch panel 2468. In other words, the intended illustration in FIG. 42 is that the vibration isolation material 2465 resonates due to the low-frequency vibration of the cartilage conduction vibration source 925, which vibration is transmitted to the touch panel 2468.

As illustrated in FIG. 42, the twenty-sixth embodiment is provided with a low-frequency source 2466 for generating a drive signal of a frequency that substantially matches the resonance frequency of the vibration isolation material 2465; the controller 2439 instructs that a low frequency be outputted from the low-frequency source 2466 after a predetermined delay has elapsed from when the touch panel driver 2470 senses the touch of a finger and accepts the input. The phase adjustment mixer unit 2436 drives the cartilage conduction vibration source 925 on the basis of a signal from the telephone function unit 45 in a call state; however, the signal from the telephone function unit 45 being blocked during a non-call operation state in which the touch panel 2468 is operated, the cartilage conduction vibration source 925 is instead driven on the basis of a signal from the low frequency source 2466. However, in a call state, the phase unit adjustment mixer unit 2436 blocks the signal from the low frequency source 2466.

The function of the controller 2439 of FIG. 42 in the twenty-sixth embodiment calls on the flow chart of the fourth embodiment in FIG. 10. Also, the dual purpose of the cartilage conduction vibration source 925 as a touch operation feedback sensation vibration source, which is a feature of the twenty-sixth embodiment, can be understood as a detailed function of step S42 in FIG. 10.

As described above, FIG. 43 serves to provide a detailed illustration of step S42 in FIG. 10; when the flow starts, step S222 first has a check for whether a non-call operation has been performed. This step is similar to step S6 in the first embodiment of FIG. 4, and is a check for the presence or absence of an e-mail operation and/or Internet operation, as well as other operations in which radio operations are not used, such as various settings and also downloaded games, and other non-call operations. Then, when there has been such an operation, the flow proceeds to step S224, in which there is performed a check for whether or not the touch panel 2468 is in a non-sensing state. When a non-sensing state is not in effect, the cartilage conduction vibration unit, including the cartilage conduction vibration source 925, is turned on in step S226. On the other hand, in a case in which it is detected in step S224 that the touch panel 2468 is in a non-sensing state, a non-call operation signifies one by the operation button 2461, and the flow therefore moves on to step S228, in which there is button setting processing corresponding to the operation. Subsequently, in step S230, there is performed a check for whether the touch panel 2468 has been set to be activated by the button operation; when this is true, the flow moves on to step S226. However, in either a case in which there is no detection in step S222 of a non-call operation, or a case in which there is no detection in step S230 of a setting to activate the touch panel 2468, the flow is immediately terminated.

When the cartilage conduction vibration unit is turned on in step S226, the flow proceeds to step S232, in which the phase adjustment mixer unit 2436 is controlled to sever the output from the telephone function unit 45; in step S234, the output of the low frequency source 2466 is connected to the cartilage conduction vibration source 925, and the flow arrives at step S236. In step S236 there is a check for the presence or absence of a touch panel operation; when there is a touch panel operation, the flow proceeds to step S238, and there is response processing in accordance with the operation. The flow then proceeds to step S240, in which a predetermined period of delay (for example, 0.1 seconds) is allowed to pass, and the flow moves on to step S242. In step S242, a low frequency is outputted from the low frequency source 2466 for a predetermined period of time (for example, 0.5 seconds), and the operation sensation is fed back to the finger with which the operation is performed; the flow then proceeds to step S244.

In step S244, there is performed a check for whether the touch panel 2468 has been in an operation-less state for a predetermined period of time (for example, 3 seconds) or longer after the latest touch panel operation; when this is not true, the flow returns to step S236. Afterwards, steps S236 to S244 are repeated as long as the touch panel 2468 is continuously operated for a predetermined period of time; the touch panel input and the operation sensation feedback by the cartilage conduction vibration source 925 are continued.

Figure 43:
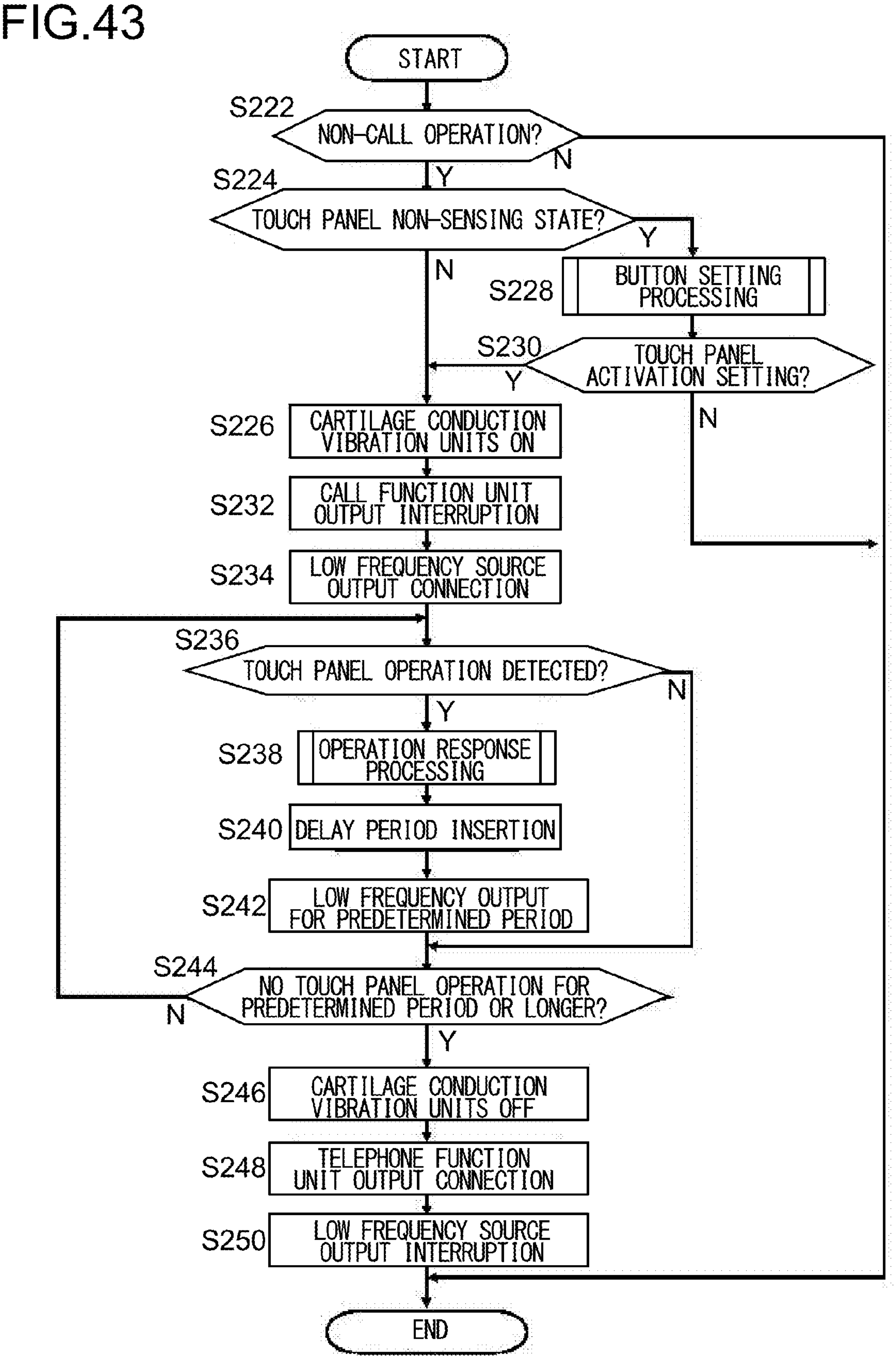
FIG. 43 is a flow chart relating to the operation of the controller in the twenty-sixth embodiment of FIG. 42, and shows step S42 of FIG. 10 in more detail.

On the other hand, when there is a detection in step S244 that the touch panel 2468 has remained in an operation-less state for the predetermined period of time or longer, the flow moves on to step S246, in which the cartilage conduction vibration unit is turned off; in step S248, the phase adjustment mixer unit 2436 is further controlled and the output from the telephone function unit 45 is connected to the cartilage conduction vibration source 925; and in step S250, the output of the low frequency source 2466 is severed, the flow then terminating for the time being. The flow thereafter being executed in accordance with FIG. 10, when no call is detected in step S44 of FIG. 10, the flow immediately moves to step S34; when the primary power supply is not off, the flow then returns to step S42; therefore, the flow in FIG. 43 is resumed. There is accordingly a swift return to step S236 whenever the operation of the touch panel lasts for the predetermined period of time and the flow in FIG. 43 from step S244 terminates, and the touch panel input and the operation sensation feedback by the cartilage conduction vibration source 925 can be continued.

The implementation of the present invention is not to be limited to the aforementioned embodiments; various modifications are possible. For example, the vibration isolation material 2465 in the twenty-sixth embodiment is not limited to a material having a band-pass filter function for transmitting the vibration of the resonance frequency, and may be a material having a low-pass filter function for blocking the vibration from the telephone function unit 45 at or above a predetermined frequency, which is in the audio signal region, and for transmitting the vibration of the low frequency source 2466 for the touch operation feedback, which is in a lower frequency region.

Twenty-seventh Embodiment

The following calls on FIGS. 41 to 43 in the twenty-sixth embodiment to provide a description of the twenty-seventh embodiment of the present invention. In this case, the "touch panel 2468" in FIG. 42 is to be read as a "motion sensor 2468," and the "touch panel driver 2470" is to be read as a "motion sensor driver 2470." The twenty-seventh embodiment, as with the twenty-sixth embodiment, is configured such that, in a case in which the cartilage conduction vibration source 925 has a dual purpose for a touch operation in the GUI function of the large-screen display unit 205, a configuration is presented in that the cartilage conduction vibration source, rather than merely being utilized as a low frequency output element for touch sensation feedback, is additionally used as an impact input element for detecting a touch on the mobile telephone 2401. For this purpose, the cartilage conduction vibration source 925 in the twenty-seventh embodiment is constituted of a piezoelectric bimorph element. The specific configuration for the dual purpose of the piezoelectric bimorph element as an impact input element can be configured calling on the block diagram of the fourth embodiment described in FIG. 9 and on the flow chart of the eighteenth embodiment described in FIG. 31.

More specifically, the GUI function of the large-screen display unit 205 in the twenty-seventh embodiment, as mentioned above, is configured to make use not of a contact-type touch panel, but rather of a motion sensor 2468 for contactless detection of the motion of a finger in the vicinity of the large-screen display unit 205. The impact detection function of the cartilage conduction vibration source 925, which comprises a piezoelectric bimorph element, is used as an impact sensor for detecting the touch of a finger (corresponding to the "click" of a mouse or the like) for determining a function that is selected without contact. As a more specific example, scrolling and the selecting of an icon on the large-screen display unit 205 are conducted by the detection of the contactless motion of a finger, and the touch impact on the mobile telephone 2401 corresponding to a "click" operation is detected by the dual purpose of the piezoelectric bimorph element, whereby an operation of "CONFIRM" or "ENTER" is performed. The touch at this time is not on the large-screen display unit 205 but rather may be at any desired place on the outer wall of the mobile telephone, and therefore a "click" operation can be performed without leaving a fingerprint on the large-screen display unit 205.

The vibration isolation material 2465 in the twenty-seventh embodiment, which calls on FIG. 41, blocks the vibration from the telephone function unit 45 in the audio signal region, and transmits the transmittable components of the impact vibration in the band-pass filter region or low-pass filter region to the cartilage conduction vibration source 925, which comprises a piezoelectric bimorph. A point in common with the twenty-sixth embodiment lies in that after the cartilage conduction vibration source 925 detects the touch impact of a finger, a low frequency is generated from the low frequency source 2466 after a predetermined period of delay has passed, and the cartilage conduction vibration source 925 is made to vibrate, providing feedback to the finger that performed the touch. Then, in such a case, there is a need to switch the piezoelectric bimorph element to function as an input element and function as an output element, but this switch can be performed utilizing the aforementioned period of delay.

The implementation of the present invention is not to be limited to the aforementioned embodiments; various modification examples are possible. For example, instead of the impact detection function of the piezoelectric bimorph element, the acceleration sensor 49 in FIG. 42 may be used for detecting the click impact in the contactless-type motion sensor as in the twenty-seventh embodiment. Both the function of the acceleration sensor 49 and the impact detection function of the piezoelectric bimorph element may also be used in combination as appropriate.

The dual purpose of the cartilage conduction vibration source 925 as a low frequency vibration source, which is a feature of the twenty-sixth embodiment and the twenty-seventh embodiment, is also not limited to the purpose of providing touch sensation feedback to a finger, but rather can also have the purpose of a dual use as a vibrator for providing a noiseless notification of an incoming call to the mobile telephone 2401. In such a case, as shall be apparent, the introduction of the vibration signal of the low frequency source 2466 to the cartilage conduction vibration source 925 is not a touch detection but rather a response to an incoming call signal, at which time a delay is unnecessary. The introduction of the vibration signal is repeated continuously (interspersed, for example, by an interval of 0.5 second in which vibration is stopped) for a comparatively long period of time (for example, 2 seconds).

Each of the various features indicated in each of the embodiments described above is not necessarily specific to an individual embodiment; the features of each of the embodiments can be combined or rearranged with the features of other embodiments as appropriate, wherever it is possible to make use of the advantages thereof. For example, it is possible to combine the aforementioned eyeglasses-type stereo portable music player described as a modification example of the twenty-fifth embodiment in FIG. 38, as an external incoming/outgoing-talk unit for a mobile telephone provided with such features as in the twenty-sixth embodiment or the twenty-seventh embodiment. In such a case, stereo playback from a sound source housed in the music player can be enjoyed, and also audio signals can be received from the sound source of the mobile telephone to enjoy stereo playback. A hands-free call with the mobile telephone can then be made using an air conduction microphone or bone conduction microphone housed in the eyeglasses-type portable music player.

Twenty-eighth Embodiment

Figure 44A:
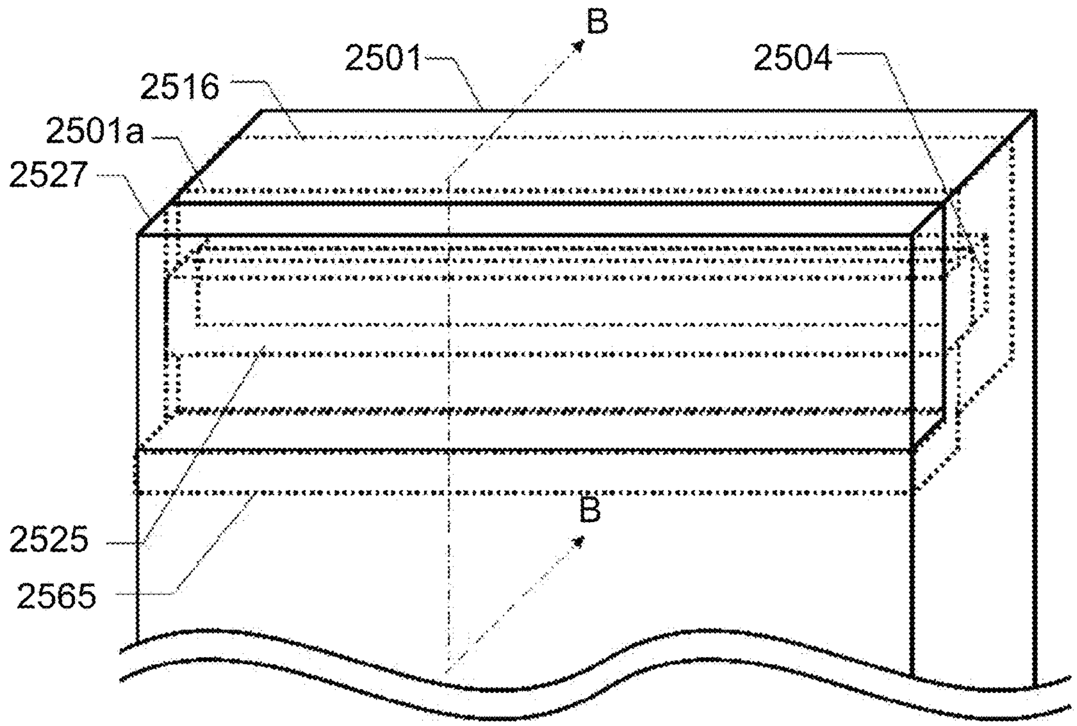
FIGS. 44A and 44B are perspective views and cross-sectional views of a twenty-eighth embodiment according to an aspect of the present invention (twenty-eighth embodiment)
Figure 44B:
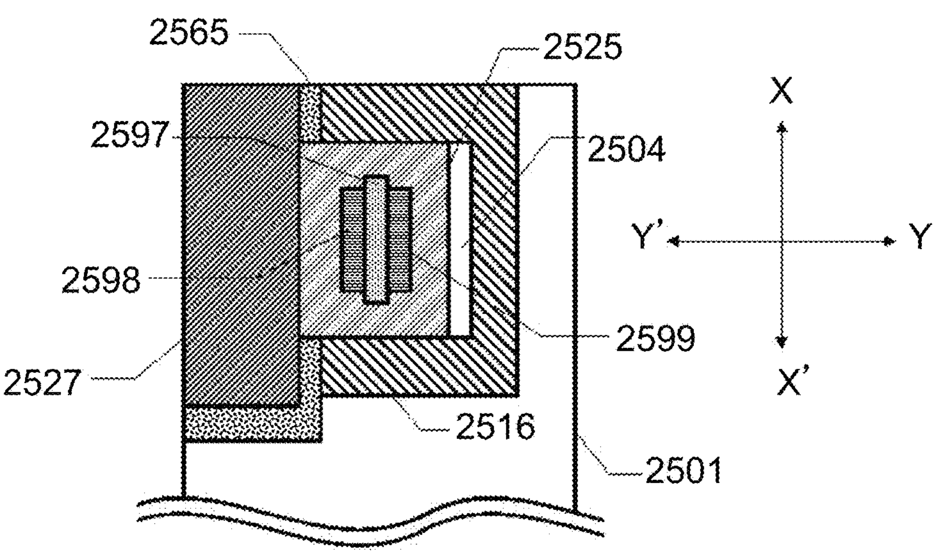

FIG. 44 relates to the twenty-eighth embodiment according to an aspect of the present invention; FIG. 44A is a perspective view illustrating a part of the upper end side thereof, and FIG. 44B is a cross-sectional view illustrating the B-B cross-section of FIG. 44A. The twenty-eighth embodiment is configured as a mobile telephone 2501, and is similar to the fourth embodiment illustrated in FIG. 7; the vibration of a cartilage conduction vibration source 2525 is transmitted to a vibration conductor 2527, the two end parts thereof being in respective contact with the right tragus and the left tragus, whereby sound can be listened to by cartilage conduction. Accordingly, the “upper part” in the twenty-eighth embodiment of FIG. 44 does not signify a separated upper part but rather signifies the portion at the top of the integrated structure.

A point of difference in the twenty-eighth embodiment of FIG. 44 from the fourth embodiment illustrated in FIG. 7 lies in the holding structure for holding the cartilage conduction vibration source 2525 and the vibration conductor 2527 in the mobile telephone 2501. For the configuration for inputting an audio signal into the cartilage conduction vibration source 2525 and the like there can be appropriately used the configuration according to the first to twenty-seventh embodiments, and therefore an illustration and description thereof has been omitted. The cartilage conduction vibration source 2525 of the twenty-eighth embodiment is configured as a piezoelectric bimorph element (and is hereinafter referred to as the “piezoelectric bimorph element 2525”), but, as in FIG. 44B, the structure piezoelectric bimorph element 2525 is one in which piezoelectric ceramic sheets 2598, 2599 are respectively bonded to the two sides of a metal sheet 2597, the circumference thereof being hardened using a resin. Vibration in this structure goes in the Y-Y' direction illustrated in FIG. 44B. Accordingly, the resin surface of the piezoelectric bimorph element 2525 has a larger Y-Y' direction component of vibration, and a smaller X-X' direction component of vibration.

Assuming the above-described structure for the piezoelectric bimorph element 2525, the holding structure of the twenty-eighth embodiment is such that, as is clear from the cross-sectional view of FIG. 44B, the piezoelectric bimorph element 2525 is sandwiched from the X-X' direction, which has a smaller vibration component, by a holding body 2516. The holding body 2516 and the piezoelectric bimorph element 2525 are joined using a bonding agent, and the holding body 2516 is rigidly coupled to the mobile telephone 2501. On the other hand, regarding the Y-Y' direction of the piezoelectric bimorph element 2525, a gap 2504 is provided in FIG. 44B in between the holding body 2516 and the inner surface side serving as the right side; vibration is unrestrictedly permitted in the Y-Y' direction in the piezoelectric bimorph element 2525, and the vibration component therein is less likely to be transmitted to the holding body 2516. A bonding agent is also used to join the vibration conductor 2527 rigidly to the outer surface side serving as the left side in FIG. 44B in the Y-Y' direction of the piezoelectric bimorph element 2525. The mobile telephone 2501 also has an opening part **2501*a* for exposing the vibration conductor 2527. Then, the vibration isolation material 2565 comprising an elastic body based on vinyl, urethane, or another substance is used to fill in the space between the vibration conductor 2527 and the holding body 2516, and the opening part 2501*a* of the mobile telephone 2501. Vibration is unrestrictedly permitted in the Y-Y' direction of the vibration conductor 2527, and the vibration component of the piezoelectric bimorph element 2525 is less likely to be transmitted to the holding body 2516 and the mobile telephone 2501. In the description above, the gap 2504 may also be configured so as to be filled in by an elastic body similar to the vibration isolation material 2565**.

Due to the holding structure as described above, the force of the hand holding the mobile telephone 2501 is rigidly applied to the vibration conductor 2527, whereby the contact with the right tragus or left tragus and the pressure thereof can be easily controlled. Because the structure is such that vibration is unrestrictedly permitted in the Y-Y' direction of the vibration conductor 2527, the vibration conductor 2527 vibrates efficiently and the vibration thereof is transmitted to the cartilage of the ear; also, the vibration of the vibration conductor 2527 can be effectively prevented from being transmitted to the mobile telephone 2501 and generating unneeded air conduction.

Figure 45A:
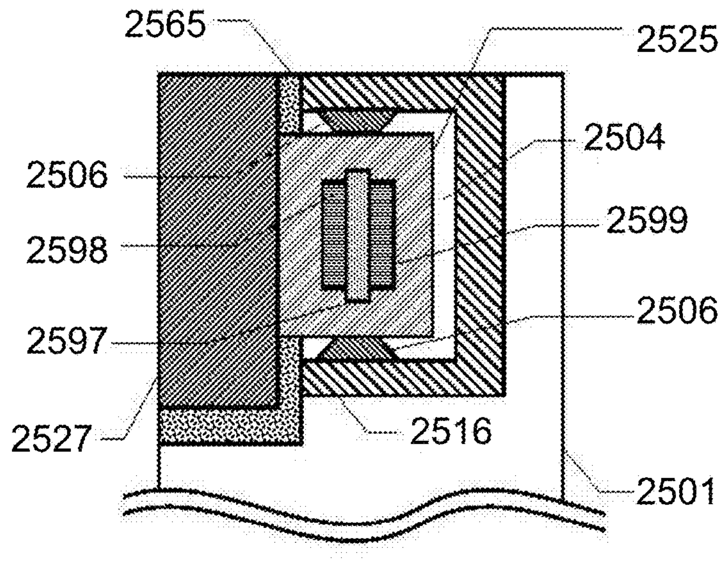
FIGS. 45A and 45B are cross-sectional views illustrating a first modification example and a second modification example of the twenty-eighth embodiment.
Figure 45B:
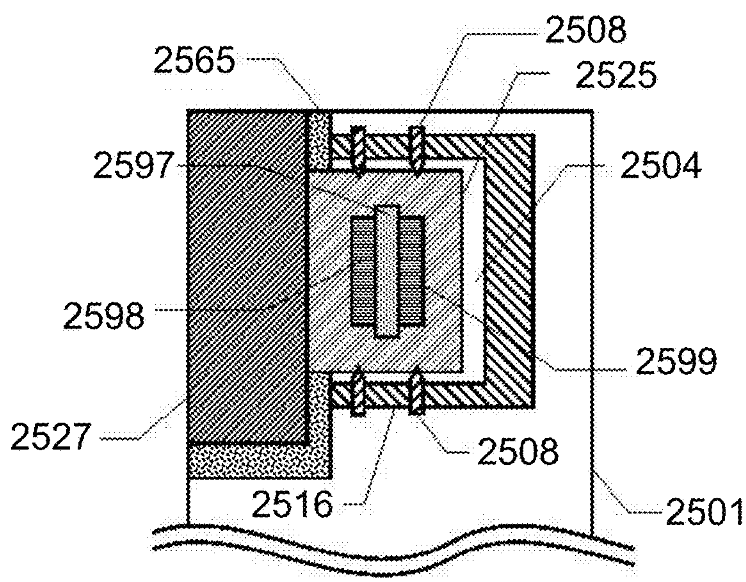

FIG. 45 is a cross-sectional view relating to modification examples of the twenty-eighth embodiment of FIG. 44. FIG. 45A is a cross-sectional view of a first modification example, and is illustrated in conformity with FIG. 44B, portions in common being given like reference numerals. Similarly, FIG. 45B illustrates a cross-sectional view of a second modification example. In the first modification example, illustrated by FIG. 45A, the gap 2504 is stretched over the entire space between the holding body 2516 and the piezoelectric bimorph element 2525, and an auxiliary holding unit 2506 for holding the piezoelectric bimorph element 2525 between the two from the X-X' direction is provided. The rigid material of the auxiliary holding unit 2506 is selected to have a different acoustic impedance from either both of or at least one of the holding body 2516 and the piezoelectric bimorph element 2525. The auxiliary holding unit 2506 may be an elastic body provided that there is no problem in terms of holding force. The auxiliary holding unit 2506 is configured to be arranged at the center part to avoid the vibration surface of the Y-Y' direction in the piezoelectric bimorph element 2525; therefore, even with an integrated molding of the same material, as a part of the holding body 2516, there is a more pronounced effect relative to FIG. 44(B) in permitting vibration in the Y-Y' direction in the piezoelectric bimorph element 2525 and in reducing the transmission of vibration to the mobile telephone 2501.

The second modification example of FIG. 45B also takes a configuration in which the gap 2504 is spread over the entire space between the holding body 2516 and the piezoelectric bimorph element 2525; however, a plurality of screws 2508 provided to important points in the middle part of the piezoelectric bimorph element 2525 are used to sandwich the piezoelectric bimorph element 2525 from the X-X' direction. The screws 2508 are threaded such that the sharp tips thereof are slightly wedged into the surface of the piezoelectric bimorph element 2525, ensuring the holding of the piezoelectric bimorph element 2525.

Figure 46A:
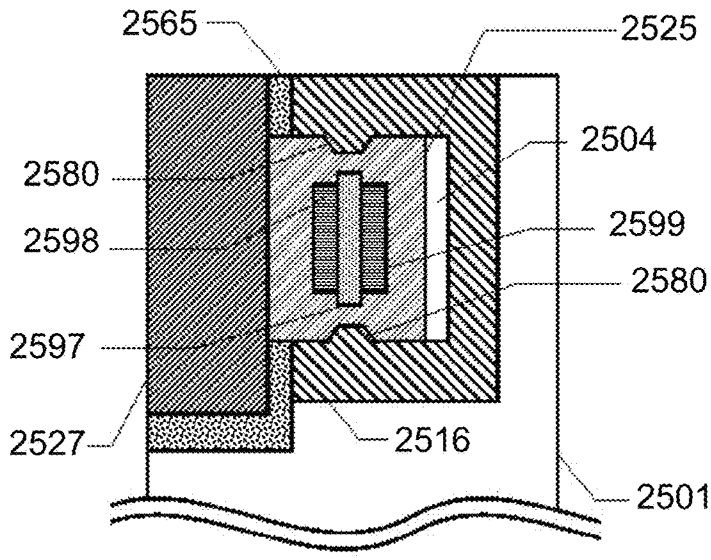
FIGS. 46A and 46B are cross-sectional views of a third modification example and a fourth modification example of the twenty-eighth embodiment.
Figure 46B:
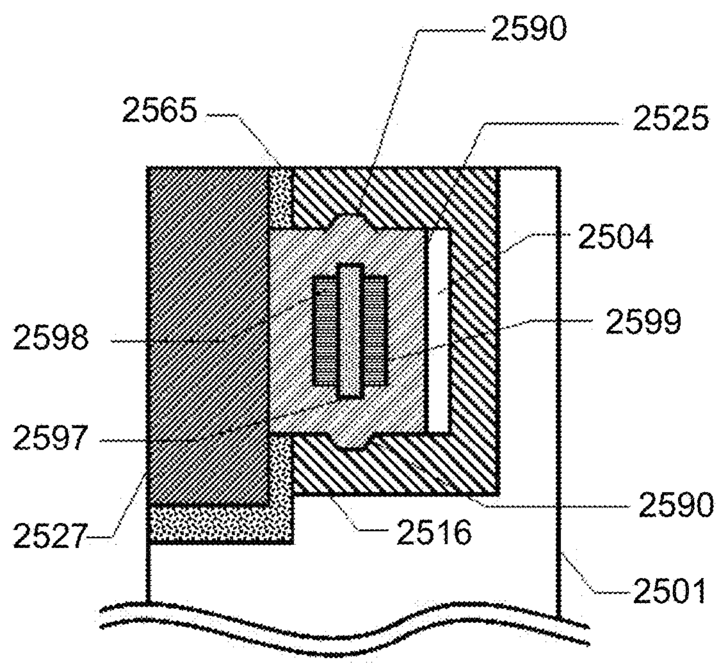

FIG. 46 is a cross-sectional view relating to yet further modification examples of the twenty-eighth embodiment of FIG. 44. FIG. 46A is a cross-sectional view of a third modification example, and, similarly with respect to FIG. 45, is illustrated in conformity with FIG. 44B, shared portions being given shared reference numerals. Similarly, FIG. 46B illustrates a cross-sectional view of a fourth modification example. In the third modification example illustrated in FIG. 46A, the surface of the piezoelectric bimorph element 2525 is molded using a resin such that a concavity 2580 is formed, and a convexity corresponding thereto is integrally molded in the holding body 2516. The engagement between these convex and concave parts ensures that the piezoelectric bimorph element 2525 is held by the holding body 2516. Upon assembly, the slight elasticity of the holding body 2516 may be utilized for fitting of the piezoelectric bimorph element 2525; alternatively, the configuration may be such that the holding body 2516 is constituted as two divided bodies, and after the piezoelectric bimorph element 2525 is sandwiched therebetween, same are integrally screwed together.

In the fourth modification example illustrated by FIG. 46B, the surface of the piezoelectric bimorph element 2525 is molded with a resin such that a convexity 2590 is formed, and a concavity corresponding thereto is integrally molded in the holding body 2516. Then, similarly with respect to FIG. 46A, the engagement of these convex and concave parts ensures the holding of the piezoelectric bimorph element 2525 by the holding body 2516. Upon assembly, similarly with respect to FIG. 46A, the configuration may be such that the piezoelectric bimorph element 2525 may be fitted using the slight elasticity of the holding body 2516, or such that the holding body 2516 is constituted as two divided bodies, and after the piezoelectric bimorph element 2525 is sandwiched therebetween, the same are integrally screwed together.

Twenty-ninth Embodiment

Figure 47A:
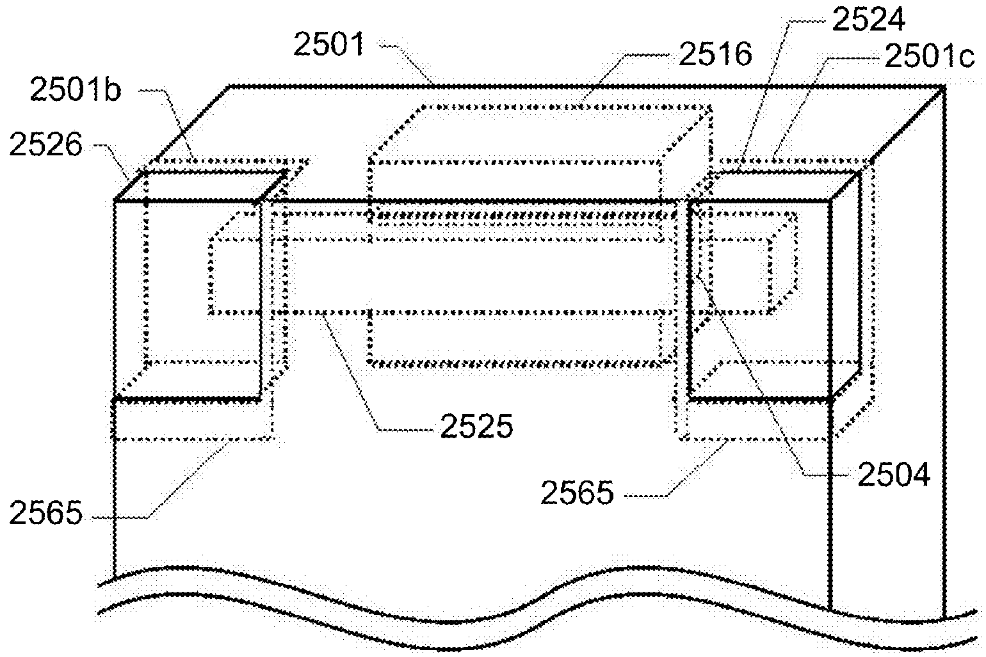
FIGS. 47A and 47B are perspective views illustrating a twenty-ninth embodiment according to an aspect of the present invention, and a modification example thereof (twenty-ninth embodiment)
Figure 47B:
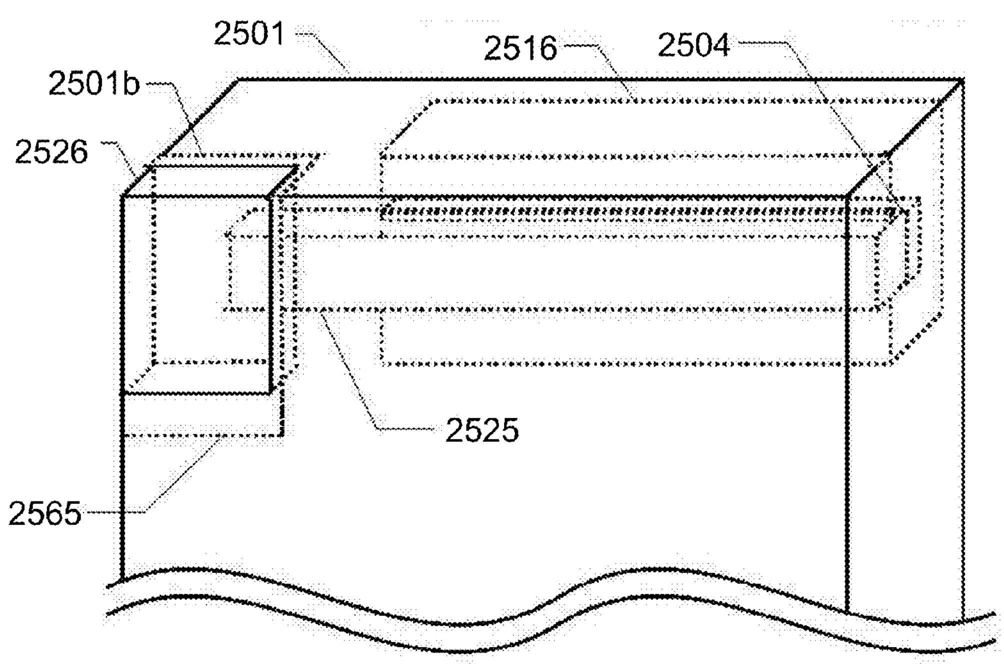

FIG. 47 relates to the twenty-ninth embodiment according to an aspect of the present invention; FIG. 47A is a perspective view illustrating a part of the upper end side thereof, and FIG. 47B is a perspective view illustrating a part of the upper end side in a modification example thereof. The twenty-ninth embodiment has a holding structure that is substantially the same as that of the twenty-eighth embodiment in FIG. 44, but has a different configuration, in which the vibration conductor in contact with the right tragus or the left tragus is exposed to the surface of the mobile telephone from openings 2501*b* and 2501*c* provided to the outer wall of the mobile telephone 2501. Portions in common with FIG. 44 are accordingly given the same reference numerals, and a description thereof has been omitted. The following provides only a description of the disparities relative to the twenty-eighth embodiment of FIG. 44.

The twenty-eighth embodiment of FIG. 44 is configured such that the vibration conductor 2527 is exposed in a strip on the entire upper end part of the mobile telephone 2501, both end parts thereof being in contact with the right tragus and left tragus respectively and also being capable of being in contact with the ear cartilage over a broad surface area. By contrast, the twenty-ninth embodiment of FIG. 47A is configured such that the vibration conductor is divided into a right ear vibration conductor 2524 and a left ear vibration conductor 2526, which are respectively bonded to the two ends of the piezoelectric bimorph element 2525. Then, only a portion of the separated right ear vibration conductor 2524 and left ear vibration conductor 2526 is made to be respectively exposed from the opening parts 2501*b* and 2501*c* of the two corner parts at the top end of the mobile telephone 2501. For this reason, the vibration isolation material 2565 for filling in the space between the mobile telephone 2501 and the right ear vibration conductor 2524 and left ear vibration conductor 2526 is also provided in respective separations.

On the other hand, the modification example of the twenty-ninth modification example illustrated by FIG. 47B is configured such that only the left ear vibration conductor 2526 is bonded to the piezoelectric bimorph element 2525. Then, only a portion of the left ear vibration conductor 2526 is exposed from the opening part 2501*b* of the corner part at the top end of the mobile telephone 2501. The vibration isolation material 2565 for filling in the space between the left ear vibration conductor 2526 and the mobile telephone 2501 is provided only to the left side corner part of the mobile telephone 2501. Also, the modification example of the twenty-ninth embodiment illustrated by FIG. 47B, although simplifying the configuration of FIG. 47A and being configured for dedicated left ear usage, is also capable of being configured such that the vibration conductor is exposed from an opening part provided to the right corner part for a configuration as a mobile telephone especially for right ear usage. As yet another modification of the modification example of the twenty-ninth embodiment illustrated by FIG. 47B, the piezoelectric bimorph element can also be directly exposed from the opening part, without the vibration conductor being interposed, in a case in which the surface of the piezoelectric bimorph element is fashioned into a shape suited for the outer surface of the mobile telephone. Such a modification is also possible in the twenty-ninth embodiment illustrated by FIG. 47A and in the twenty-eighth embodiment illustrated by FIG. 44.

Thirtieth Embodiment

Figure 48A:
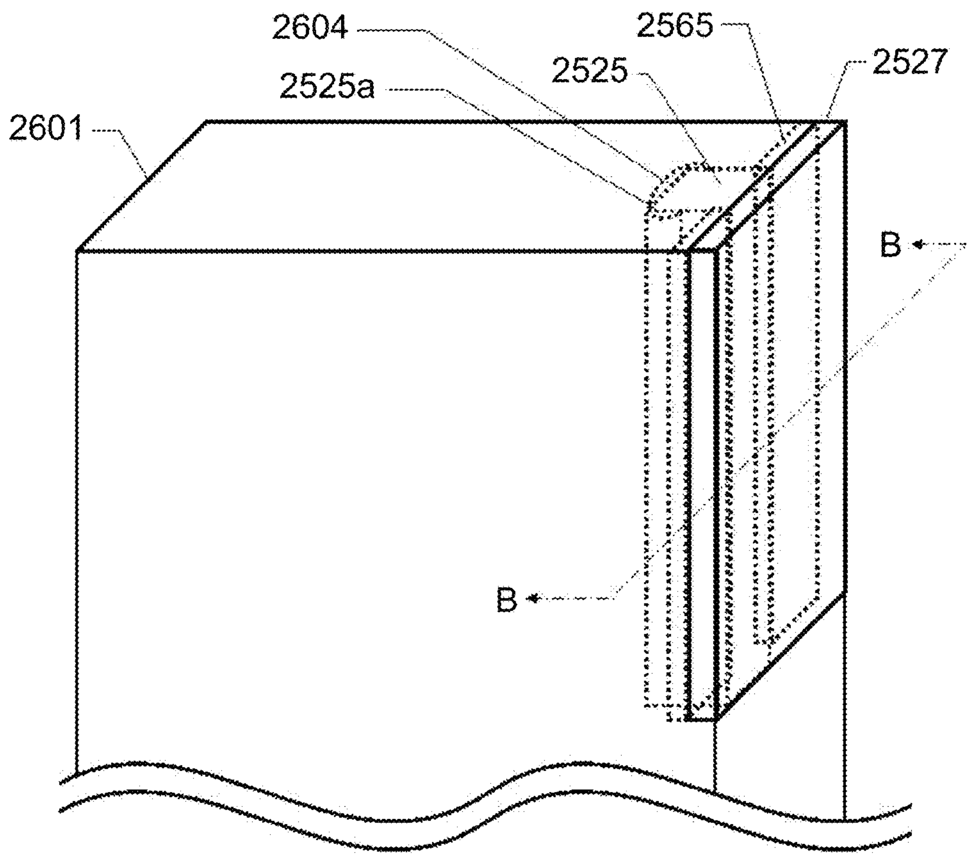
FIGS. 48A and 48B are perspective views and cross-sectional views of a thirtieth embodiment according to an aspect of the present invention (thirtieth embodiment)
Figure 48B:
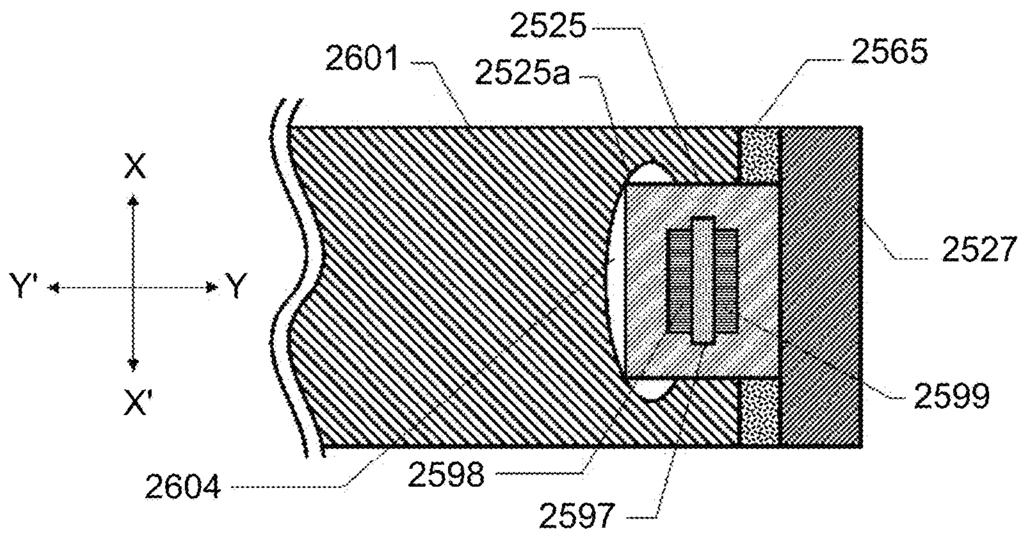

FIG. 48 relates to the thirtieth embodiment according to an aspect of the present invention; FIG. 48A is a perspective view illustrating a part of the upper end side thereof, and FIG. 48B is a cross-sectional view illustrating the B-B cross-section of FIG. 48A. The thirtieth embodiment is configured as a mobile telephone 2601 and is similar to the thirteenth embodiment illustrated by FIG. 24 and/or the fourteenth embodiment illustrated by FIG. 25. The cartilage conduction vibration unit is arranged on the side surface of the mobile telephone. The thirtieth embodiment of FIG. 48, similarly with respect to the twenty-eighth embodiment of FIG. 44, also features a holding structure for permitting vibration for ear cartilage conduction in the piezoelectric bimorph element and for reducing the transmission of vibration to the mobile telephone; therefore, portions in common with the twenty-eighth embodiment have been given like reference numerals, and a description thereof has been omitted. Another point of similarity with the twenty-eighth embodiment lies in the configuration for inputting an audio signal to the cartilage conduction vibration source 2525, of which a depiction and description has been omitted.

The thirtieth embodiment of FIG. 48 is configured such that the piezoelectric bimorph element 2525 is fitted into the side surface of the mobile telephone, but, as illustrated by FIG. 48B, the interior of the fitted-in part is curved; as a result thereof, a ridge part 2525*a* of the piezoelectric bimorph element 2525 is brought into contact with the inner surface of the curved part of the mobile telephone 2601. Due to such contact, the piezoelectric bimorph element 2525 is positioned in the fitting-depth direction, reinforcing the holding force relative to the direction pushing in on the piezoelectric bimorph element 2525. A crescent gap 2604 is created in the Y-Y' direction of the piezoelectric bimorph element 2525 due to the contact structure as described above, permitting free vibration. The piezoelectric bimorph element 2525 is fundamentally held from the X-X' direction in the thirtieth embodiment as well. For the sake of simplicity, the illustration in FIG. 48 is such that a part of the integral structure of the mobile telephone 2601 serves as the holding structure, but the configuration may also be such that a structure such as the holding body 2516 of the twenty-eighth embodiment and of the twenty-ninth embodiment is utilized, and anchored on the mobile telephone 2601. The structure can otherwise be understood with reference to FIG. 44, and therefore a description thereof has been omitted. The various modification examples illustrated in FIGS. 45 and 46 can also be applied to the thirtieth embodiment of FIG. 48.

Thirty-first Embodiment

Figure 49A:
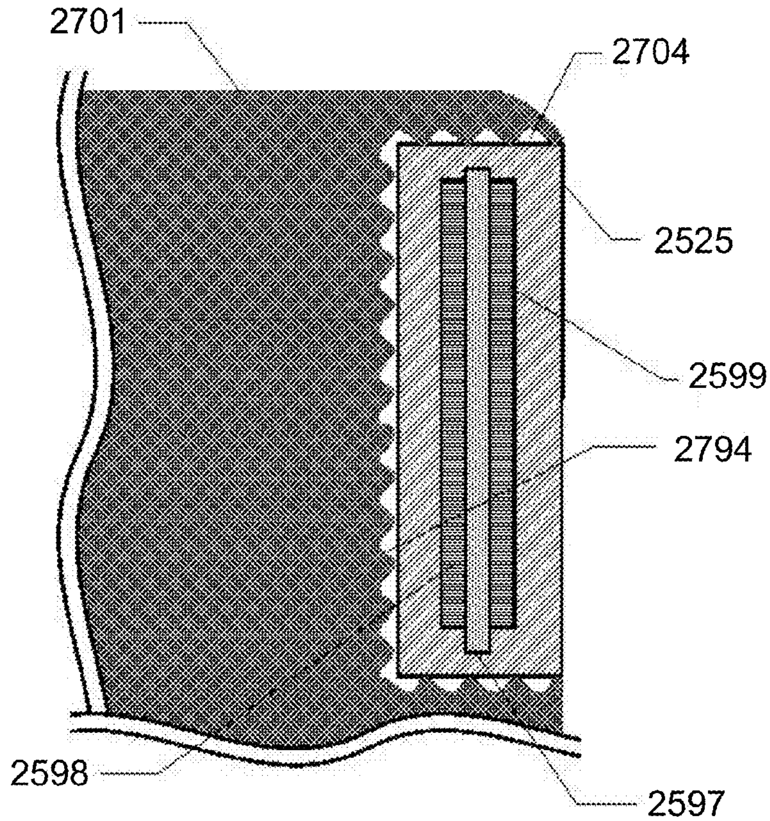
FIGS. 49A and 49B are longitudinal cross-sectional views and a latitudinal cross-sectional views of a thirty-first embodiment according to an aspect of the present invention (thirty-first embodiment)
Figure 49B:
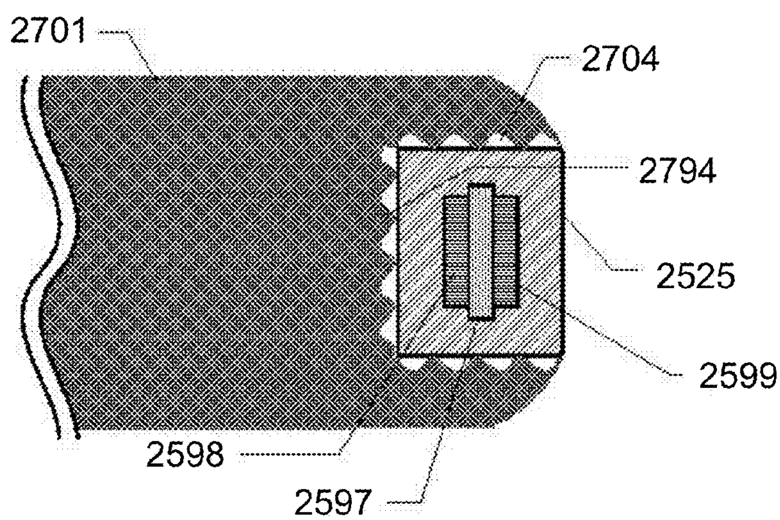

FIG. 49 relates to a thirty-first embodiment according to an aspect of the present invention; FIG. 49A is a longitudinal sectional view illustrating a part of the upper end side thereof. FIG. 49B is a transverse cross-sectional view of the same portions, and can be understood to be similar to FIG. 48B. The thirty-first embodiment is configured as a mobile telephone 2701, and is similar to the thirtieth embodiment illustrated in FIG. 48; the cartilage conduction vibration unit is arranged on the side surface of the mobile telephone. The feature thereof lies in the holding structure for permitting vibration for ear cartilage conduction in the piezoelectric bimorph element and for reducing the transmission of vibration to the mobile telephone; therefore, portions in common with the thirtieth embodiment of FIG. 48 have been given like reference numerals, and a description thereof has been omitted. Another point of similarity with the thirtieth embodiment lies in the configuration for inputting an audio signal to the cartilage conduction vibration source 2525 and the like, for which a depiction and description has been omitted.

A point of difference in the thirty-first embodiment of FIG. 49 from the thirtieth embodiment of FIG. 48 lies in the holding structure of the piezoelectric bimorph element 2525. The piezoelectric bimorph element 2525, similarly with respect to the thirtieth embodiment, takes a structure in which it is fitted into a groove in the side surface of the mobile telephone 2701, but as is clear from the longitudinal cross-sectional view of FIG. 49A and the transverse cross-sectional view of FIG. 49B, the inner surface of the groove becomes a corrugated surface 2794; as a result thereof, the piezoelectric bimorph element 2525 is held by a plurality of apices of the corrugated surface 2794, and a plurality of gaps 2704 are created in between the two. For the sake of simplicity, the illustration in FIG. 49 is also such that a part of the integral structure of the mobile telephone 2701 serves as the holding structure, but the configuration may also be one in which there is adopted a structure such as the holding body 2516 of the twenty-eighth embodiment and of the twenty-ninth embodiment, and same is anchored to the mobile telephone 2701. This is also a point of similarity with modification examples to be described later.

Figure 50A:
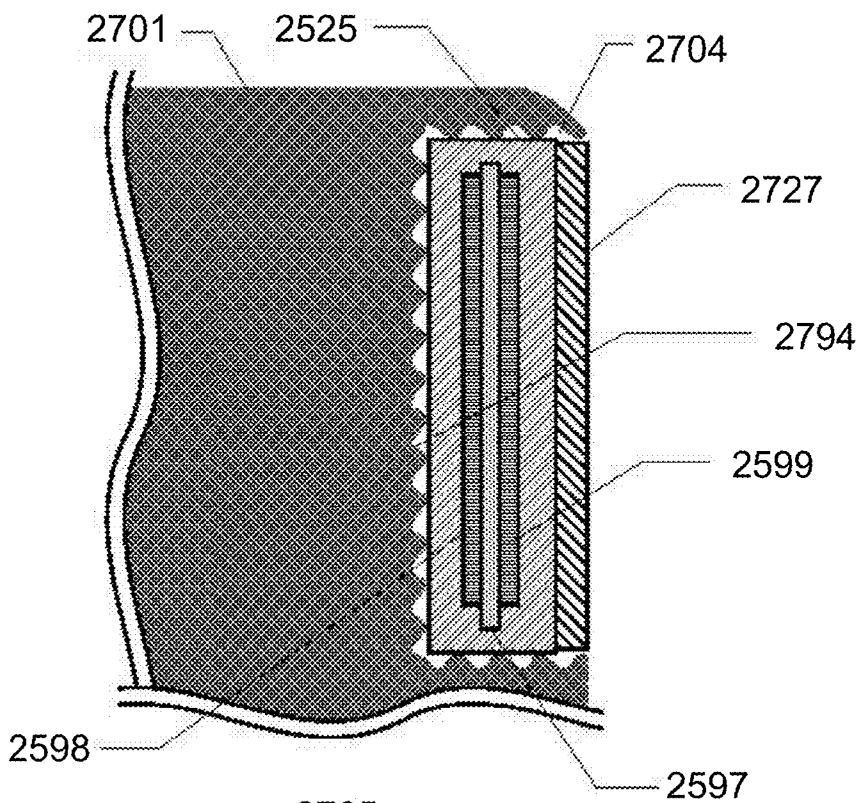
FIGS. 50A and 50B are cross-sectional views illustrating a first modification example and a second modification example of the thirty-first embodiment.
Figure 50B:
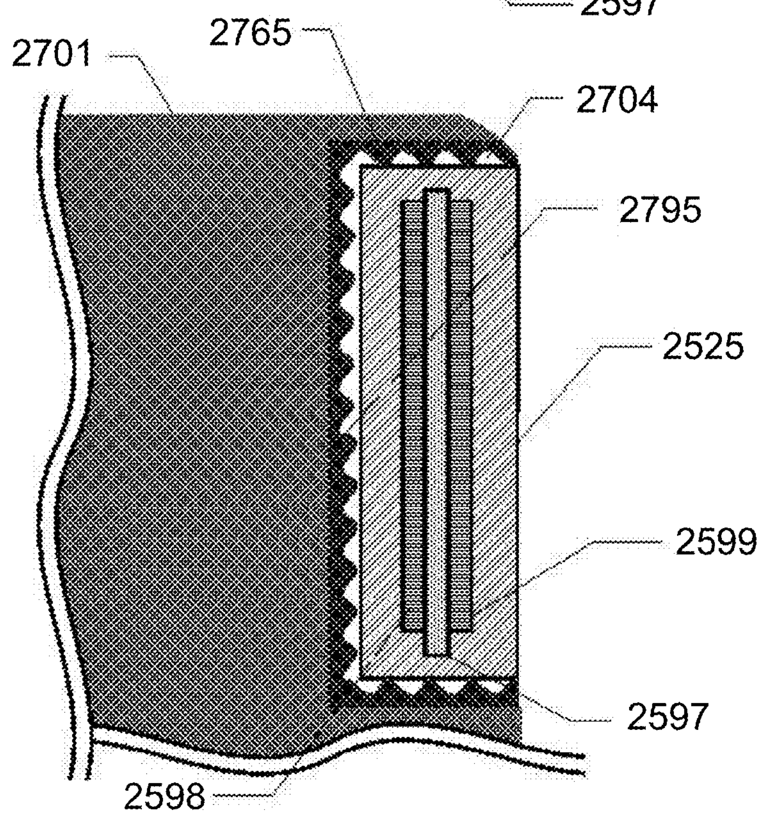

FIG. 50 is a longitudinal cross-sectional view illustrating modification examples of the thirty-first embodiment, and can be understood with reference to FIG. 49A. FIG. 50A is a first modification example, wherein a vibration conductor 2727 (silicon, urethane, or the like) is provided to the side of the piezoelectric bimorph element 2525 that comes up against the ear cartilage. FIG. 50B is a second modification example. A vibration isolation material 2765 is interposed between the piezoelectric bimorph element 2525 and the mobile telephone 2701, and the surface at which the vibration isolation material 2765 comes up against the piezoelectric bimorph element 2525 serves as the corrugated surface 2795. A modification example that combines the vibration conductor 2727 in the first modification example of FIG. 50A with the vibration isolation material 2765 in the second modification example of FIG. 50B is also possible.

Thirty-second Embodiment

Figure 51A:
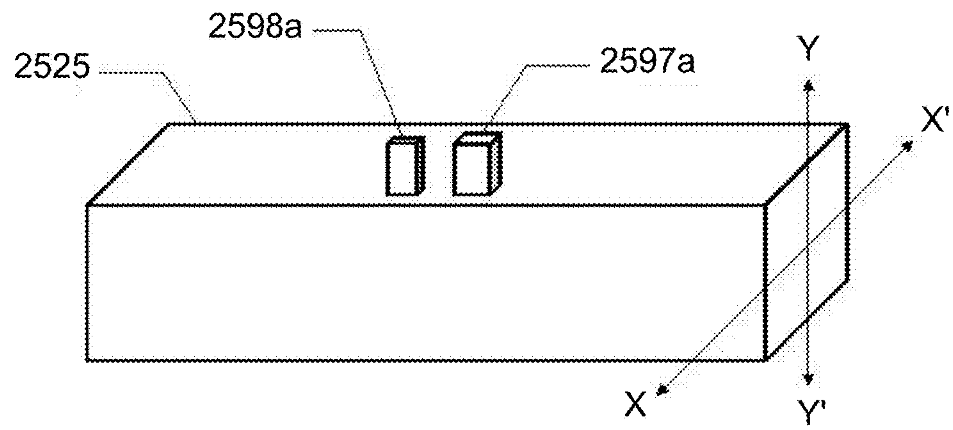
FIGS. 51A and 51B are perspective views of a thirty-second embodiment according to an aspect of the present invention, configured as a piezoelectric bimorph element adapted for use in the mobile telephone (thirty-second embodiment)
Figure 51B:
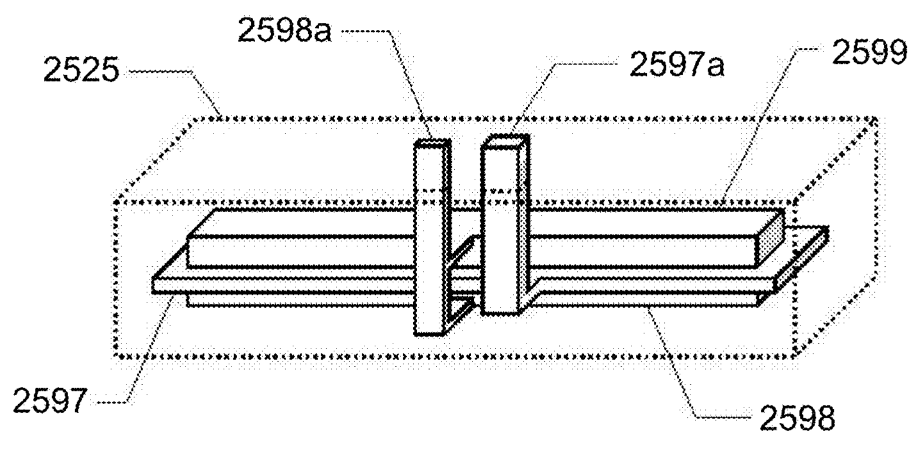

FIG. 51 is a perspective view of a thirty-second embodiment according to an aspect of the present invention. The thirty-second embodiment is configured as a piezoelectric bimorph element 2525 suited for use in, for example, the mobile telephone 2501 of the twenty-ninth embodiment illustrated in FIG. 47A. FIG. 51A is an external perspective view of the piezoelectric bimorph element 2525 of the thirty-second embodiment, and FIG. 51B is a transparent perspective view thereof. For convenience of illustration, FIG. 51 has been drafted such that the piezoelectric bimorph element 2525 is rotated 90 degrees from the state of FIG. 47A, where the Y-Y' direction becomes the vertical direction.

The holding body 2516 of the twenty-ninth embodiment of FIG. 47A, similarly with respect to that of the twenty-eighth embodiment of FIG. 44, sandwiches the piezoelectric bimorph element 2525 from the X-X' direction illustrated in FIG. 44B; vibration in the Y-Y' direction is unrestrictedly permitted, and the vibration component is prevented from being transmitted to the holding body 2516. Furthermore, the holding body 2516 is configured so as to sandwich the middle portion of the piezoelectric bimorph element 2525, in which the right ear vibration conductor 2524 and the left ear vibration conductor 2526 are respectively bonded to both ends.

The piezoelectric bimorph element 2525 illustrated in FIG. 51 assumes a configuration permitting the holding of the middle part of the piezoelectric bimorph element 2525 from the X-X' direction, as described above. Specifically, as illustrated in FIG. 51A, the piezoelectric bimorph element 2525 of the thirty-second embodiment is configured such that electrodes 2597*a* and 2598*a* for inputting a drive signal are positioned at the middle portion of the piezoelectric bimorph element 2525. Both end portions of the piezoelectric bimorph element 2525 are thereby released from a wired connection, and free vibration is permitted. Moreover, the direction in which the electrodes 2597*a* and 2598*a* project out is configured so as to assume a direction along the Y-Y' direction of the vibration direction. Thereby, when the middle portion of the piezoelectric bimorph element 2525 is sandwiched from the X-X' direction, the electrodes 2597*a* and 2598*a* are not obstructive and there is no need to provide the holding body 2516 with a special configuration, despite the arrangement of the electrodes 2597*a* and 2598*a* at the middle portion.

To permit such an arrangement of the electrodes, the piezoelectric bimorph element 2525 is configured, as illustrated in FIG. 51B, such that the electrode 2597*a*, which is drawn out from the middle portion of a metal sheet 2597, is curved upward at 90 degrees, and the electrodes 2598*a*, which are drawn out from piezoelectric ceramic sheets 2598 and 2599, and respectively connected to each one, are also curved upward at 90 degrees, each projecting from the upper surface of the resin. The middle portion of the piezoelectric bimorph element 2525 can thereby be readily supported sandwiched from the X-X' direction, without an electrode projecting out to the X-X' direction.

Also, as a modification of FIG. 51, the configuration can also be such that each of the electrode 2597*a* that is drawn out from the middle part of the metal sheet 2597 and the electrodes 2598*a* that are drawn out from the middle parts of the piezoelectric ceramic sheets 2598 and 2599 project out from the side surface of the resin. In such a case, to sandwich and support the middle portion of the piezoelectric bimorph element 2525 from the X-X' direction, the holding body 2516 is provided with a void for avoiding a portion that would interfere with the electrodes, and connects a signal line; alternatively, a socket structure is provided to the inner side of the holding body 2516 and a connection is made with the electrodes. In such a case as well, the holding body 2516 must be provided with a special configuration; however, no change is needed to provide the electrodes 2597*a* and 2598*a* to the middle part, and therefore it is possible to benefit from the advantage of releasing the two end portions of the piezoelectric bimorph element 2525 from wired connections and enabling free vibration.

Thirty-third Embodiment

Figure 52A:
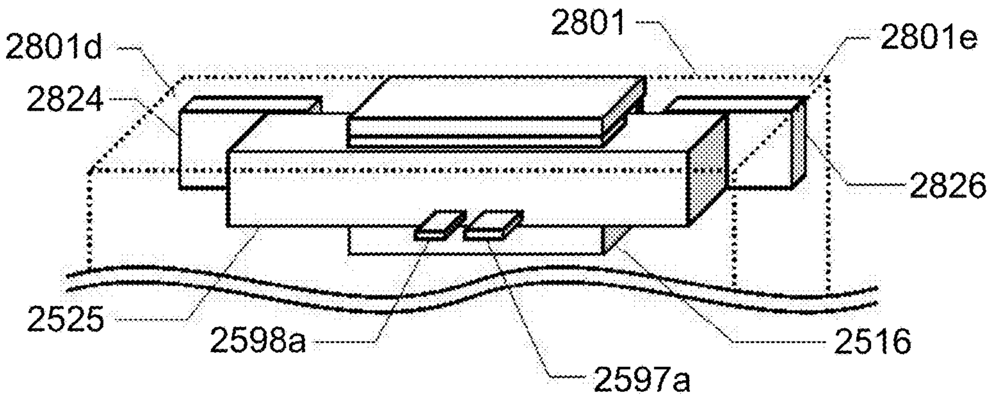
FIGS. 52A and 52B are transparent perspective views of a thirty-third embodiment according to an aspect of the present invention, and a modification example thereof (thirty-third embodiment)
Figure 52B:
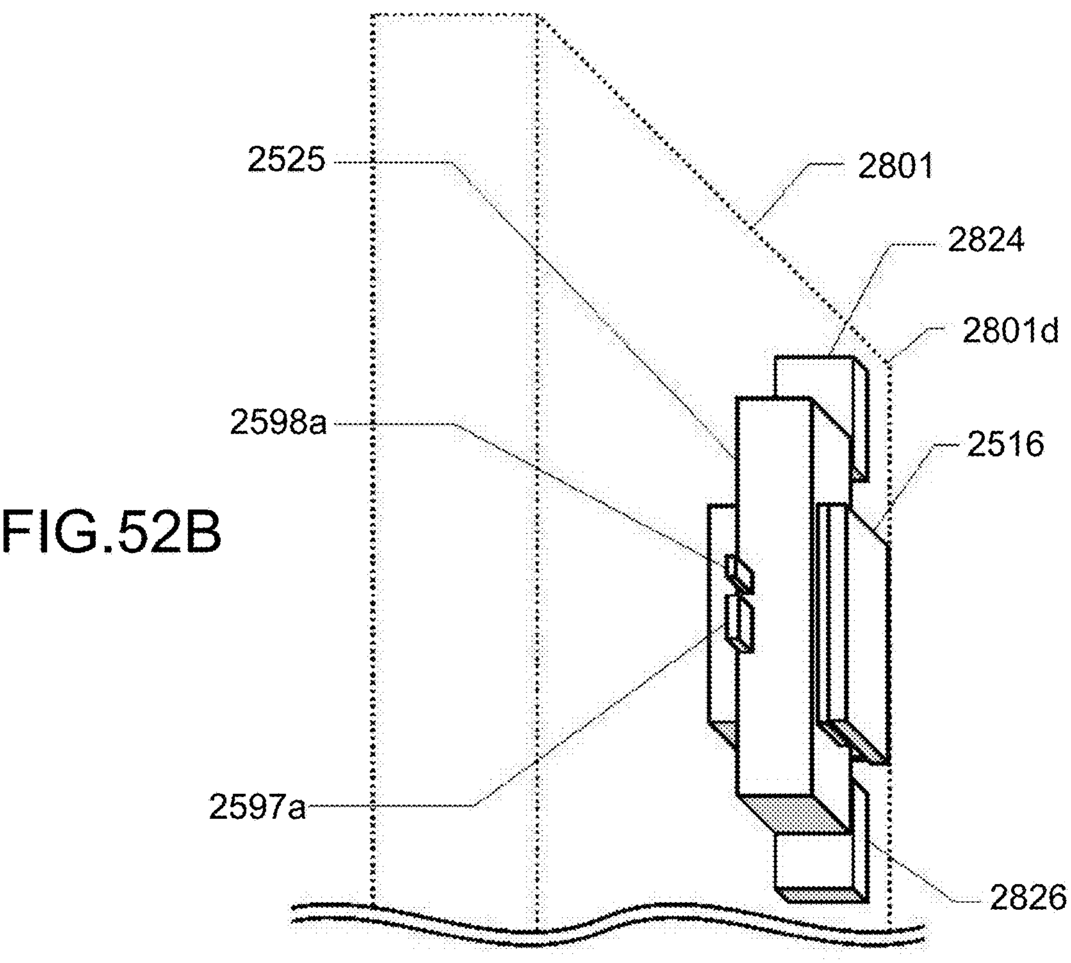

FIG. 52 relates to a thirty-third embodiment according to an aspect of the present invention, and is configured as a mobile telephone 2801. FIG. 52A is a transparent perspective view in which a part of the upper end side thereof is viewed from the rear, and FIG. 52B is a transparent perspective view in which a part of the upper end side in the modification example thereof is viewed from the side surface of the opposite side. The thirty-third embodiment illustrated in FIG. 52A has a holding structure that is substantially similar to that of the twenty-ninth embodiment in FIG. 47A, but has a different configuration in which a pair of vibration conductors 2824 and 2826 that are in contact with the ear cartilage are exposed on the surface of the mobile telephone.

Specifically, the vibration conductors 2524 and 2526 in the twenty-ninth embodiment of FIG. 47 are directly exposed at the upper corner parts of the mobile telephone 2501. By contrast, in the thirty-third embodiment of FIG. 52, corner parts 2801*d*, 2801*e* serve as a part of a sufficiently strong outer wall of the mobile telephone 2801 itself, and each of the vibration conductors 2824 and 2826 are exposed on the display surface side of the mobile telephone 2801 in such as form as to be guarded by the corner parts. A detailed description of this exposed state and the significance thereof will be provided later. The configuration is otherwise shared with that of the twenty-ninth embodiment of FIG. 47; therefore, in FIG. 52 portions that are in common have been given like reference numerals, and a description thereof has been omitted. The thirty-third embodiment also serves as an example of the implementation of the piezoelectric bimorph elements 2525 illustrated in the thirty-second embodiment, and also illustrates the positions of the electrodes 2597*a* and 2598*a* together.

In the modification example of the thirty-third embodiment in FIG. 52B, the same configuration as the vibration unit described with reference to FIG. 52A is attached such that the side surface of the mobile telephone 2801 is made to vibrate as in the thirtieth embodiment of FIG. 48 and/or the thirty-first embodiment of FIG. 49. In the modification example of the thirty-third embodiment in FIG. 52B as well, the vibration conductor 2824, which is the upper of the pair of vibration conductors, is guarded by the sufficiently strong corner part 2801*d* of the mobile telephone 2801 and is exposed to the side surface of the mobile telephone 2801. The vibration conductor 2826, which is lower, is not originally positioned at a corner part and is therefore guarded naturally.

FIG. 53 is an external perspective view in which each of the thirty-third embodiment of FIG. 52 and the modification example thereof is viewed from the front; FIG. 53A belongs to the thirty-third embodiment, and FIG. 53B belongs to the modification example thereof. The configuration in FIG. 53 also has much in common with the twenty-sixth embodiment of FIG. 41 and the like; therefore, portions that are in common have been given like reference numerals, and a description thereof has been omitted.

As is clear from FIG. 53A, a pair of vibration conductors 2824 and 2826 are respectively exposed on the surface of the large-screen display unit 205 of a mobile telephone 2801 in such a form as to be respectively guarded by the corner parts 2801*d* and 2801*e* of the mobile telephone 2801. Similarly with respect to the twenty-ninth embodiment of FIG. 47, a vibration isolation material 2865 is also used in the thirty-third embodiment of FIG. 53A to fill in the space between the pair of vibration conductors 2824 and 2826 and the mobile telephone 2801.

Herein, a description will be provided for the significance of the aforementioned configuration of the thirty-third embodiment illustrated in FIGS. 52 and 53. The corner parts 2801*d* and 2801*e* of the mobile telephone 2801 are at sites that are suitable for coming up against the tragus or other ear cartilage, but are simultaneously also at sites that facilitate the direct application of impact when a drop or other event occurs. Accordingly, in a case assuming a configuration such as, for example, that of the twenty-ninth embodiment of FIG. 47, the vibration conductors 2524 and 2526, the piezoelectric bimorph element 2525 to which same are bonded, the holding body 2516 thereof, and other vibration units must have a configuration that is resilient against collision. By contrast, according to the configuration of the thirty-third embodiment illustrated in FIGS. 52 and 53, the vibration conductors 2524 and 2526 are guarded by the original corner parts 2801*d* and 2801*e* of the mobile telephone 2801; therefore, a countermeasure for impacts is more readily realized than in the case of the twenty-ninth embodiment.

In the modification example of FIG. 53B as well, as is clear from the diagram, the vibration conductor 2824, which is the upper of the pair of vibration conductors, is guarded by the corner part 2801*d* of the mobile telephone 2801 and is exposed to the side surface of the mobile telephone 2801. The vibration conductor 2826, which is lower, is positioned at a side surface that is less prone to the direct application of impact. Similarly with respect to the case of FIG. 53A, the vibration isolation material 2865 is used to fill in the spaces between the pair of vibration conductors 2824 and 2826 and the mobile telephone 2801.

In a case in which, as in the modification examples of the thirty-third embodiment illustrated in FIGS. 52B and 53B, the vibration conductors 2824 and 2826 are provided to two points on the side surface (one point of which is in the vicinity of the upper part corner 2801), it becomes possible for both to come up against two points of the ear cartilage in the longitudinal direction. In such a case, when the space between the vibration conductor 2824 and the vibration conductor 2826 is on the order of 2 to 5 cm, the upper vibration conductor 2824 is also able to come up against the ear cartilage when the lower vibration conductor 2826 comes up against the tragus. As shall be apparent, the use such that the upper vibration conductor 2824 is brought up against the tragus for listening is discretionary. Similarly, in the case of the thirty-third embodiment illustrated in FIGS. 52A and 53A as well, the vibration conductors 2824 and 2826 can also be brought up against two points of the ear cartilage in the transverse direction. The divided use of the vibration conductor 2824 for abutting the right tragus and of the vibration conductor 2826 for abutting the right tragus, such as in the twenty-ninth embodiment of FIG. 47, is also discretionary.

In any event, abutting the ear cartilage at two points permits the energies of both the simultaneously vibrating vibration conductors 2824 and 2826 to be introduced to the ear cartilage; the transmission is therefore energy-efficient. On the other hand, in a case in which the mobile telephone 2801 is pushed strongly against the tragus to obtain the earplug bone conduction effect, the pushing on and obstructing of the tragus is more readily achieved by bringing merely a single vibration conductor at the corner part up against the tragus.

Thirty-fourth Embodiment

Figure 54:
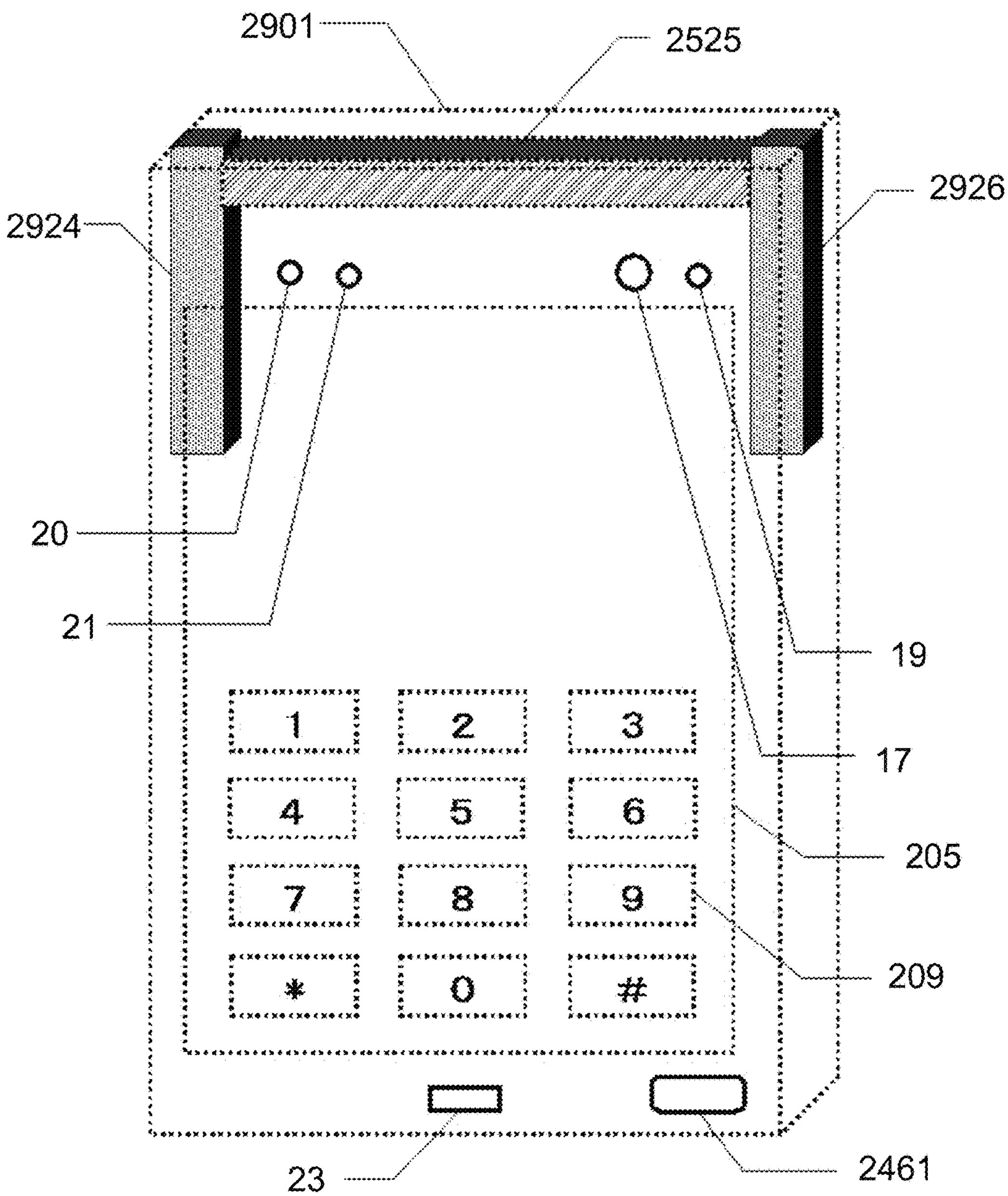
FIG. 54 is a transparent perspective view of a thirty-fourth embodiment according to an aspect of the present invention (thirty-fourth embodiment)

FIG. 54 is a transparent perspective view relating to a thirty-fourth embodiment according to an aspect of the present invention, the embodiment being configured as a mobile telephone 2901. The thirty-fourth embodiment is configured such that the side surface of the a mobile telephone 2901 is made to vibrate, as in the thirtieth embodiment of FIG. 48 and/or the thirty-first embodiment of FIG. 49, but both side surfaces are made to be capable of vibrating so as to be able to support both the case of right-hand-held and the case of left-hand-held usage. In other words, the thirty-fourth embodiment of FIG. 54 substitutes the pair of vibration conductors 2824 and 2826 in the thirty-third embodiment of FIG. 52A with a pair of vibration conductors 2924 and 2926 for a side surface arrangement; the vibration conductors 2924 and 2926 assume a vertically long shape so as to achieve contact with the ear cartilage over a broad range of the side surface. The holding structure of the piezoelectric bimorph element 2525 is shared with that of the thirty-third embodiment of FIG. 52A, but a more detailed illustration has been omitted in order to avoid complication.

In the thirty-fourth embodiment, the color of the vibration conductors 2924 and 2926 is made to be different from the color of the outer wall of the mobile telephone 2901, and the configuration may also be such that the user knows that the configuration is such that sound is listened to from the side surface and also knows what portion is thereupon brought up against the ear. On the other hand, in a case in which the user is notified that the configuration is such that sound is listened to from the side surface and what portion is thereupon brought up against the ear, there may be employed a design for implementing surface processing such that it is unknown whether the color of the vibration conductors 2924 and 2926 has been rendered as the same color as the color of the outer wall of the mobile telephone 2901, and such that the boundary with the outer wall of the mobile telephone 2901 is further unknown. The configuration of the thirty-fourth embodiment is otherwise shared with that of, for example, the twenty-sixth embodiment of FIG. 41, and therefore portions that are in common have been given like reference numerals, and a description thereof has been omitted.

Thirty-fifth Embodiment

Figure 55:
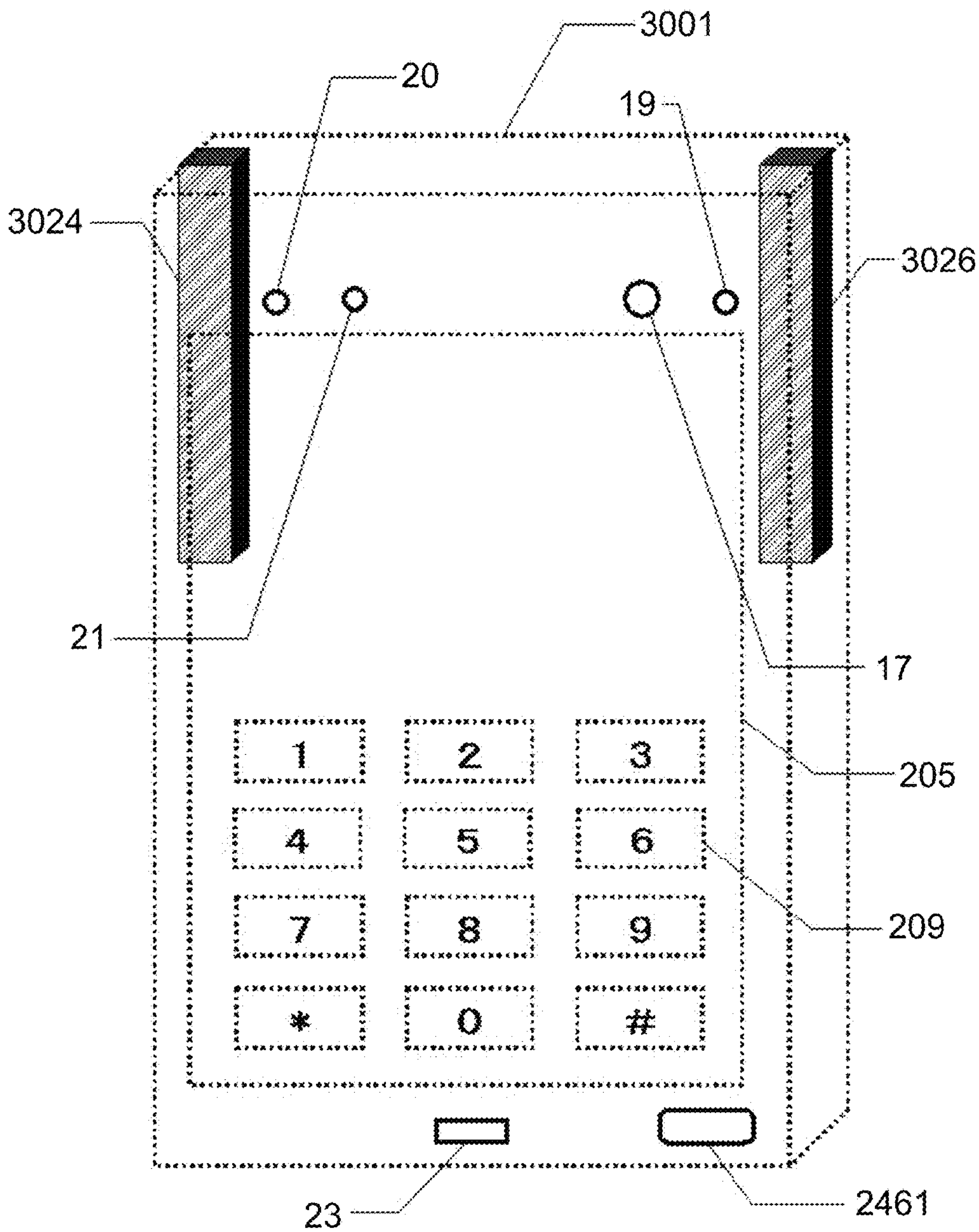
FIG. 55 is a transparent perspective view relating to a thirty-fifth embodiment according to an aspect of the present invention (thirty-fifth embodiment)

FIG. 55 is a transparent perspective view relating to a thirty-fifth embodiment according to an aspect of the present invention, the embodiment being configured as a mobile telephone 3001. The thirty-fifth embodiment is also configured such that the two side surfaces of the mobile telephone 3001 are made to vibrate across a broad range, similarly with respect to the thirty-fourth embodiment of FIG. 54. However, a point of difference from the thirty-fourth embodiment of FIG. 54 lies in that a pair of piezoelectric bimorph elements 3024 and 3026 are arranged in a vertically long position such that each of the two side surfaces can be independently controlled. It accordingly becomes possible to cause only the one piezoelectric bimorph element that is being used to vibrate automatically, similarly with respect to the first to third embodiments described in FIGS. 1 to 6. The holding of the piezoelectric bimorph elements 3024 and 3026 can utilize the holding structures in each of the embodiments described in FIGS. 44 to 52 and the like, as appropriate, and therefore a more detailed illustration has been omitted in order to avoid complexity.

The thirty-fifth embodiment may also be configured such that, when the piezoelectric bimorph elements 3024 and 3026 are arranged on the side surfaces, the piezoelectric bimorph elements 3024 and 3026 are covered with a material such as that of the vibration conductor 2527 in the thirtieth embodiment in FIG. 48, the color of the vibration conductor being made to be different from the color of the outer wall of the mobile telephone 3001, such that the user learns that the configuration is such that sound is listened to from the side surface and knows what portion is thereupon brought against the ear. On the other hand, similarly with respect to the thirty-fifth embodiment, in a case in which the user is notified that the configuration is such that sound is listened to from the side surface and is notified of what portion is thereupon brought up against the ear, there may be employed a design for implementing surface processing such that it is unknown whether the color of the vibration conductor has been rendered as the same color as the color of the outer wall of the mobile telephone 3001, and such that the boundary with the other side surface portion in the outer wall of the mobile telephone 3001 is unknown. The configuration of the thirty-fifth embodiment is otherwise shared with that of, for example, the twenty-sixth embodiment of FIG. 41, and therefore portions that are in common have been given like reference numerals, and a description thereof has been omitted.

Thirty-sixth Embodiment

Figure 56A:
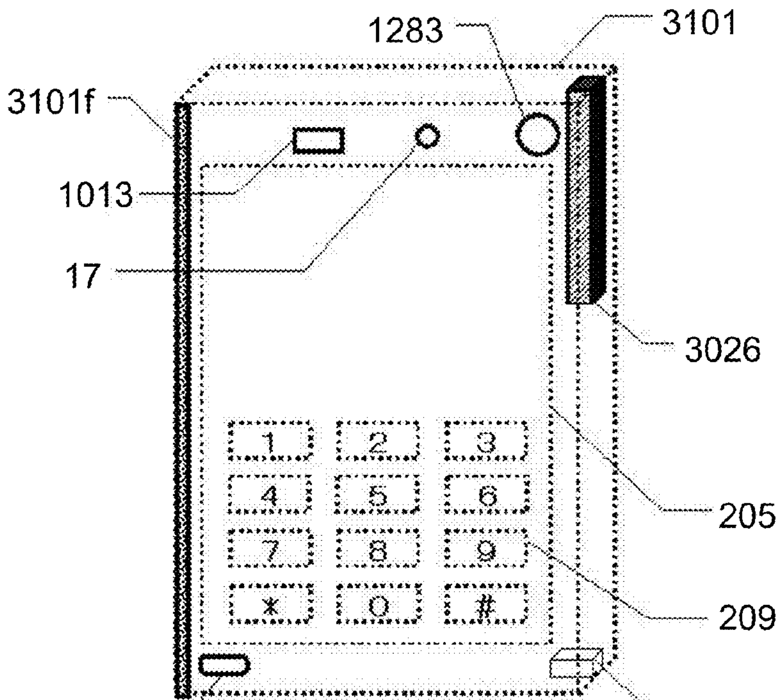
FIGS. 56A and 56B are transparent perspective views relating to a thirty-sixth embodiment according to an aspect of the present invention (thirty-sixth embodiment)
Figure 56B:
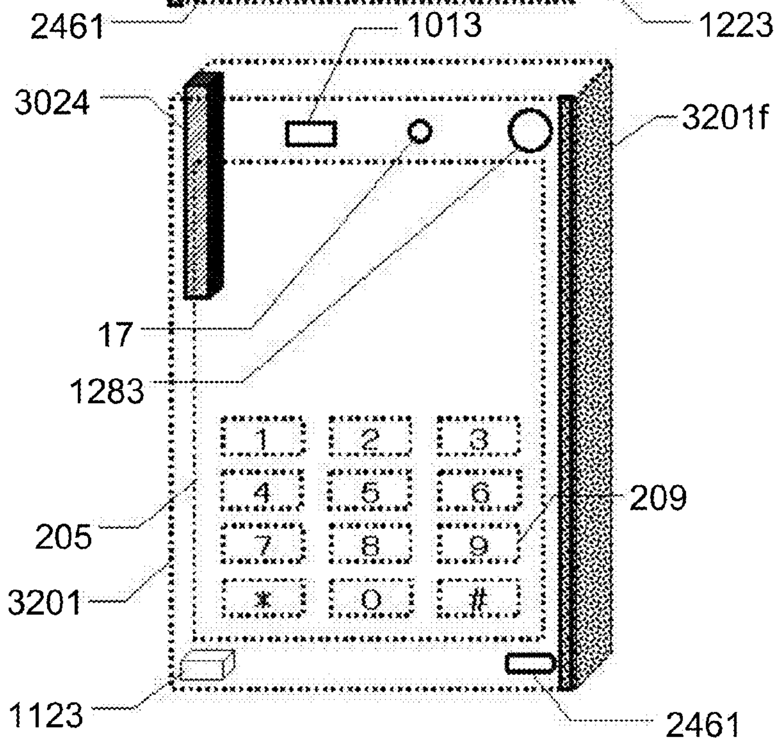

FIG. 56 is a transparent perspective view relating to a thirty-sixth embodiment according to an aspect of the present invention, and is configured as a mobile telephone 3101 and a mobile telephone 3201. The configuration of the thirty-sixth embodiment of FIG. 56 is substantially consistent with that of the thirty-fifth embodiment of FIG. 55, but the mobile telephone is configured as a left-handed mobile telephone 3101 illustrated in FIG. 56A and as a right-handed mobile telephone 3201 illustrated in FIG. 56B so as to provide the market with the ability to select either one. In other words, the left-handed mobile telephone 3101 of FIG. 56A is provided with a piezoelectric bimorph element 3024 for coming up against the left tragus, and the right-handed mobile telephone 3201 illustrated in FIG. 56B is provided with a piezoelectric bimorph element 3026 for coming up against the left tragus. Since usage is limited to a single side, for microphones and other outgoing-talk units, the left-handed mobile telephone 3101 of FIG. 56A is provided with an outgoing-talk unit (microphone) 1223 at the bottom of the left side surface, and the right-handed mobile telephone 3201 of FIG. 56B is provided with an outgoing-talk unit (microphone) 1123 at the bottom of the right side surface. The outgoing-talk units (microphones) 1123 or 1223 are similar to those of the twelfth embodiment or the thirteenth embodiment; during a videoconferencing function in which the large-screen display unit 205 is being observed, the outgoing-talk units (microphones) 1123 and 1223, which serve as outgoing-talk units, are switched, and are able to pick up audio uttered by the user while the large-screen display unit 205 is being observed.

In the thirty-sixth embodiment of FIG. 56, as described above, the piezoelectric bimorph elements and/or microphones and other audio-related configurations relating to listening and speaking are integrated at the side surface of the mobile telephone; and the visual-related configuration of the large-screen display unit 205 and the like is integrated at the front surface of the mobile telephone. Therefore, as the side surface is used when the mobile telephone 3101 or 3201 is brought up against the face at the ear or the like and the front surface is used when the mobile telephone 3101 or 3201 is being watched with the eyes, the two surfaces of the mobile telephone 3101 or 3201 describing a 90° angle can be used separately, and the front surface of the mobile telephone 3101 or 3201 can be prevented from having the display surface 205 or the like fouled by the face.

In the thirty-sixth embodiment of FIG. 56, the side surface that is the opposite side at which the piezoelectric bimorph element 3024 or 3026 is not arranged is primarily used to hold the mobile telephone, and therefore, in a natural manner of holding with the hands, the side surface is covered with a material **3101*f* or 3201*f* that is rough to the touch, facilitating holding and also permitting a clear understanding of which side is brought up against the ear. The thirty-sixth embodiment, similarly with respect to the thirty-fifth embodiment, may also be configured such that the color of the vibration conductor for covering the piezoelectric bimorph element 3024 or 3026 is different from the color of the outer wall of the mobile telephone 3101 or 3201. In a case in which the side surface of the opposite side in the thirty-sixth embodiment is covered with the material 3101*f* or 3201*f* that is rough to the touch, as described above, then the side surface of the side for listening to sound can be recognized, and accordingly there may be employed a design for implementing surface processing such that it is unknown whether the color of the vibration conductor has been rendered as the same color as the color of the outer wall of the mobile telephone 3101 or 3201, and such that the boundary with the other side surface portion in the outer wall of the mobile telephone 3101 or 3201 is further unknown. The configuration of the thirty-fifth embodiment is otherwise shared with that of, for example, the twenty-sixth embodiment of FIG. 41**, and therefore portions that are in common have been given like reference numerals, and a description thereof has been omitted.

However, the terms "right-handed" and "left-handed" in the thirty-sixth embodiment anticipate, for example, a state in which the side surface to which the piezoelectric bimorph element 3024 is provided comes up against the left ear cartilage when the side surface of the mobile telephone 3101 comes up against the ear, without the wrist being turned, directly out of the state in which the mobile telephone 3101 of FIG. 56A is held with the left hand and the display surface 205 is viewed. However, the user's method of use is discretionary; when the wrist is rotated 180° to turn the mobile telephone 3101 of FIG. 56A over when the mobile telephone 3101 is held in the right hand and brought up against the ear, the side surface of the side to which the piezoelectric bimorph element 3024 is provided can be brought up against the right ear cartilage. Accordingly, the terms "right-handed" and "left-handed" are merely provisional; the user is capable of purchasing either one and unrestrictedly selecting how to use same. The mobile telephone 3101 of FIG. 56A can accordingly be identified as being "right-handed" for a user who turns the wrist for use in the manner described above.

Thirty-seventh Embodiment

Figure 57:
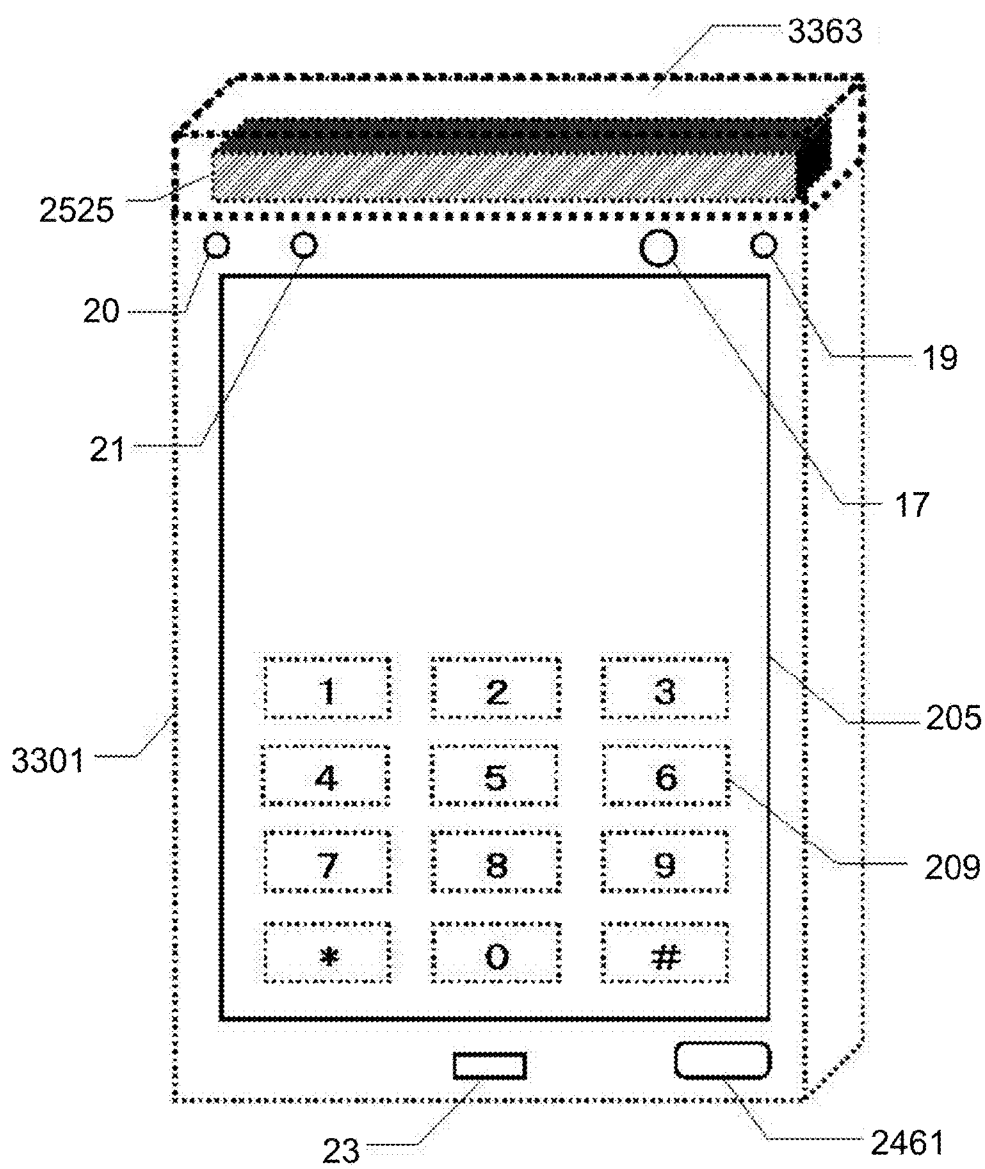
FIG. 57 is a transparent perspective view relating to a thirty-seventh embodiment according to an aspect of the present invention (thirty-seventh embodiment)

FIG. 57 is a transparent perspective view relating to a thirty-seventh embodiment according to an aspect of the present invention, and is configured as a mobile telephone 3301. The thirty-seventh embodiment of FIG. 57 has many portions in common with the modification example of the tenth embodiment in FIG. 40; therefore, portions in common have been given like reference numerals, and a description thereof has been omitted. A point of difference in the thirty-seventh embodiment from the modification example of the tenth embodiment lies in that the piezoelectric bimorph element 2525 is covered with a cartilage conduction output unit 3363, in which not only the front surface but also the upper side and the front, rear, left, and right sides at the top edge of the mobile telephone 3301 are formed of a material having an acoustic impedance approximating that of ear cartilage. This cartilage conduction output unit 3363, similarly with respect to the cartilage conduction output unit 963 in the tenth embodiment or in the modification example thereof, is formed using, for example, a silicone rubber; a mixture of a silicone rubber and a butadiene rubber; a natural rubber; or a material having a structure formed using these varieties of rubber in which air bubbles are sealed.

According to the configuration of the thirty-seventh embodiment, cartilage conduction can be obtained by any site anywhere on the top of the mobile telephone 3301 coming up against ear cartilage; therefore, sound can be listened to at an optimal volume merely by bringing the top part of the mobile telephone 3301 up against the ear, regardless of the location thereon.

The various features of each of the embodiments described above are not to be restricted to individual respective embodiments; they can be substituted or combined with other appropriate embodiments.

Thirty-eighth Embodiment

Figure 58:
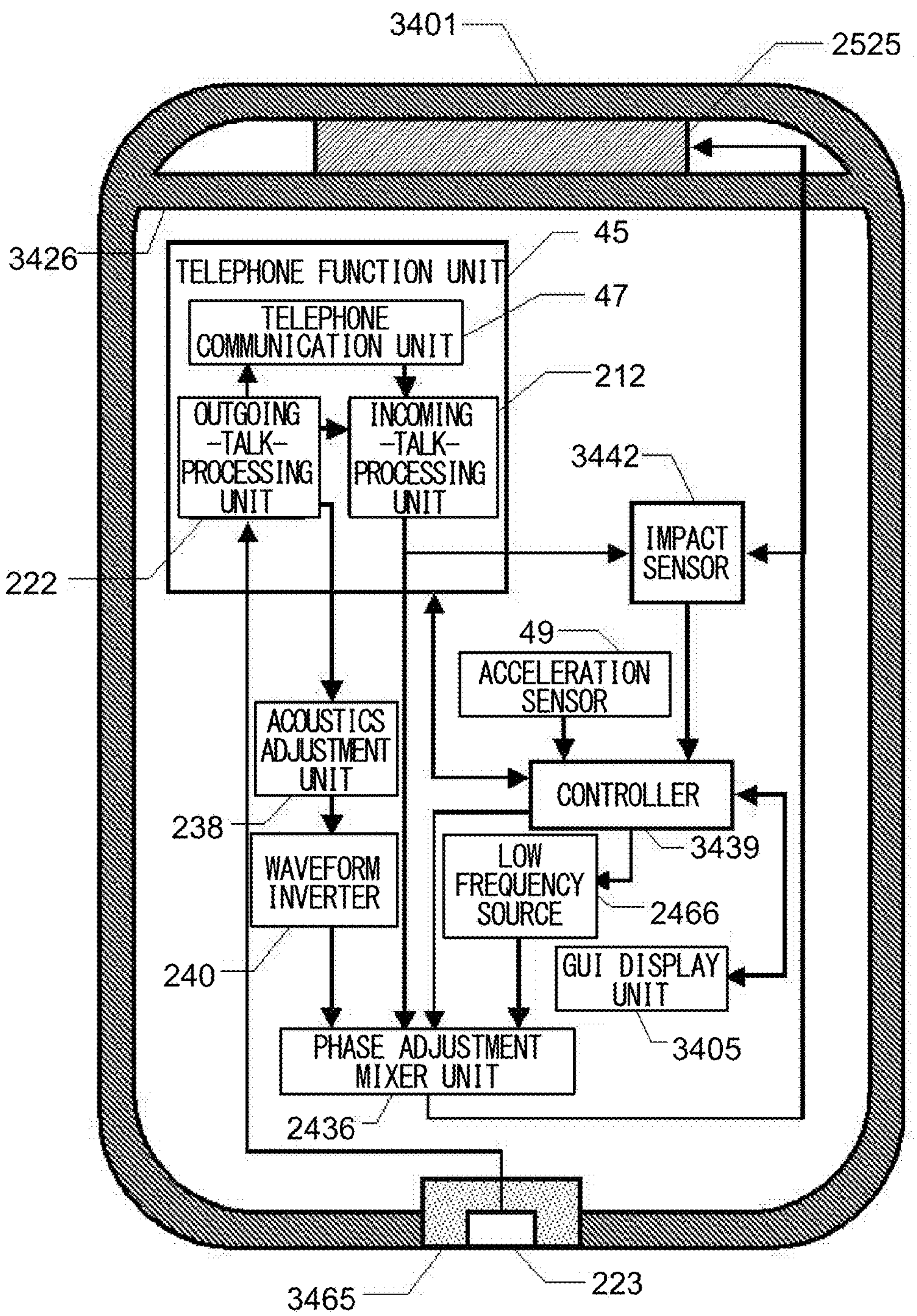
FIG. 58 is a cross-sectional block diagram relating a thirty-eighth embodiment according to an aspect of the present invention (thirty-eighth embodiment)

FIG. 58 is a cross-sectional block diagram relating to a thirty-eighth embodiment according to an aspect of the present invention, and is configured as a mobile telephone 3401. The thirty-eighth embodiment of FIG. 58 shares many portions with the twenty-sixth embodiment or the twenty-seventh embodiment, and therefore portions that are in common have been given the same reference numerals as in FIG. 42 and a description thereof has been omitted. A point of difference in the thirty-eighth embodiment from the twenty-sixth embodiment or from the twenty-seventh embodiment lies in it being configured such that the cartilage conduction vibration source 2525, which is constituted of a piezoelectric bimorph element, is anchored to a chassis structure 3426 of the mobile telephone 3401, and the vibration of the cartilage conduction vibration source 2525 is transmitted to the entire surface of the mobile telephone 3401. In anchoring the piezoelectric bimorph element constituting the cartilage conduction vibration source 2525, to actively transmit the vibration thereof, the gap 2504 such as in FIG. 44B is not provided, but rather there is a close bond to the chassis structure 3426, and the vibration in the primary vibration direction (the Y-Y' direction) is likely to be transmitted to the chassis structure 3426. The entire surface of the mobile telephone 3401 thereby acts as a vibration conductor, and cartilage conduction can be obtained regardless of what location on the surface of the mobile telephone 3401 is brought up against the ear cartilage.

Because the thirty-eighth embodiment has the aforementioned configuration, in a case in which a large portion of the surface area of the front surface or the back surface of the mobile telephone 3401 is brought up against the entire cartilage of the ear, similarly with respect to the fifth to ninth embodiments, the vibration of the cartilage conduction vibration source 2525 is transmitted to the ear cartilage over a broad contacted surface area of the surface of the mobile telephone 3401 via the chassis structure 3426. Air conduction sound that is generated by the vibration of the surface of the mobile telephone 3401 is also transmitted from the external auditory meatus to the tympanic membrane. Sound source information from the cartilage conduction vibration source 2525 can thereby be heard as a loud sound. The surface of the mobile telephone 3401 that is brought up against the ear assumes a form such that the external auditory meatus is obstructed, and therefore environment noise can be blocked. Increasing the force pushing the mobile telephone 3401 against the ear furthermore gives the result of substantially completely obstructing the external auditory meatus, and sound source information from the cartilage conduction vibration source 2525 can be heard as an even louder sound due to the earplug bone conduction effect.

In a case in which the side surface of the thirty-eighth embodiment is brought up against the ear cartilage, then the front surface of the mobile telephone to which the display surface and the like are provided can be prevented from being fouled by contact with the face, similarly with respect to the eleventh to fourteenth embodiments, the thirtieth embodiment, the thirty-first embodiment, the modification example of the thirty-third embodiment, and the thirty-fourth to thirty-sixth embodiments. Furthermore, in a case in which the upper edge corner of the thirty-eighth embodiment is brought up against the ear cartilage, contact with the tragus is readily achieved, and pushing on the tragus to obstruct the external auditory meatus can readily obtain the earplug bone conduction effect, similarly with respect to the first to fourth embodiments, the tenth embodiment and the modification example thereof, the twenty-sixth to twenty-ninth embodiments, and the thirty-third embodiment. The thirty-seventh embodiment of FIG. 57 is configured such that cartilage conduction can be obtained by any site anywhere on the top of the mobile telephone 3301 being brought up against ear cartilage, but the thirty-eighth embodiment of FIG. 58 expands on this feature; it is possible to listen to sound at an optimal volume merely by bringing the upper part of the mobile telephone 3401 up against the ear, at anywhere on the surface of the mobile telephone 3401, regardless of the place.

In the thirty-eighth embodiment of FIG. 58, the cartilage conduction vibration source 2525 is anchored to the chassis structure 3426 such that the primary vibration direction of the piezoelectric bimorph element (the Y-Y' direction) assumes an orientation orthogonal to that of a GUI display unit 3405 (conceptualized in the block diagram in FIG. 58, but is the large-screen display unit 205 having a touch panel function, when calling on the perspective view of FIG. 41, which relates to the twenty-sixth embodiment) (A cross-section of the anchoring is not illustrated in FIG. 58, but the manner of the anchoring will be described later). A large portion of the surface area of the front surface or the rear surface of the mobile telephone 3401, to which the GUI display unit 3405 is provided, thereby vibrates efficiently. There is comparatively less energy in the non-vibration direction of the piezoelectric bimorph element (the X-X' direction), due to the anchoring of the cartilage conduction vibration source 2525, but because vibration does occur, sound can be listened to by cartilage conduction whenever a side surface of the mobile telephone 3401 is brought up against the ear cartilage. It shall be noted that the GUI display unit 3405 of FIG. 58 is illustrated as a consolidation of the large-screen display unit 205 of FIG. 42, the display driver 41, and the touch panel driver 2470.

In the embodiment of FIG. 58, similarly with respect to the twenty-seventh embodiment, a function is selected by a motion sensor for the contactless detection of the motion of the finger in the vicinity of the GUI display unit 3405, and an impact detection function of the piezoelectric bimorph element constituting the cartilage conduction vibration source 2525 is utilized as an impact sensor for detecting the touch of a finger for determining the selected function. The impact sensor 3442 illustrated in FIG. 58 has a function similar to that of the pressure sensor 242 illustrated in FIG. 9, and extracts an impact detection signal of the piezoelectric bimorph element. The aforementioned arrangement of the primary vibration direction of the piezoelectric bimorph element (the Y-Y' direction) to be oriented orthogonally with respect to that of the GUI display unit 3405 is suited for detecting a touch from the front surface or the back surface of the mobile telephone 3401. The embodiment of FIG. 58, similarly with respect to the twenty-seventh embodiment, has the cartilage conduction vibration source 2525 serve a dual purpose as a low frequency output element for touch sensation feedback, but the aforementioned arrangement of the primary vibration direction of the piezoelectric bimorph element (the Y-Y' direction) is suited for efficiently transmitting feedback vibration to a finger for a touch from the front surface or back surface of the mobile telephone 3401. The embodiment of FIG. 58, similarly with respect to the description in the twenty-sixth embodiment, has the cartilage conduction vibration source 2525 serve a dual purpose as a vibration source of a vibrator for providing a noiseless notification of an incoming call to the mobile telephone 3401.

The embodiment of FIG. 58, further similarly with respect to the fourth embodiment and similarly with respect to the twenty-seventh embodiment, is configured such that a horizontal stationary state is detected by the acceleration sensor 49, and when this is true, the cartilage conduction vibration source 2525 is prohibited from vibrating. The potential generation of vibration noise with a desk due to the output of the other party's voice can thereby be prevented in a case in which the mobile telephone 3401 is placed on a desk or the like during a call. It is also appropriate to activate the aforementioned GUI operation or incoming call vibrator function in a case in which the mobile telephone 3401 is placed on a desk or the like, and thereof in such a case, the configuration is such that the cartilage conduction vibration source 2525 is not prohibited from vibrating whenever the horizontal stationary state is detected by the acceleration sensor 49. A more detailed description of this point will be provided later as a function of the controller 3439.

To configure the embodiment of FIG. 58 such that the chassis structure 3426 of the mobile telephone 3401 is actively made to vibrate, there is the possibility that such vibration will be transmitted to the microphone 223 and result in the Larsen effect. As a countermeasure thereof, in order to block acoustic conduction between the chassis structure 3426 and microphone 223 of the mobile telephone 3401, an insulation ring unit 3465 having an acoustic impedance different from that of the chassis structure 3426 is provided in between the two. A countermeasure for preventing the Larsen effect in a circuit-like manner is achieved using a signal conduction pathway from the outgoing-talk-processing unit 222 to the incoming-talk-processing unit 212 in the telephone function unit 45.

Figure 59A:
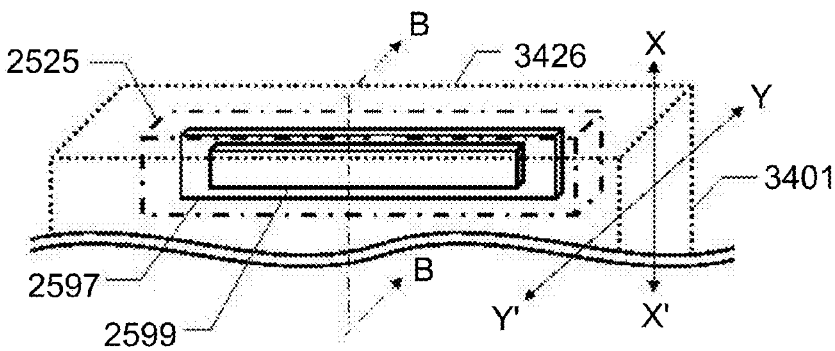
FIGS. 59A, 59B and 59C are back surface transparent views and cross-sectional views illustrating the manner in which a cartilage conduction vibration source is anchored to the mobile telephone in the thirty-eighth embodiment.
Figure 59B:
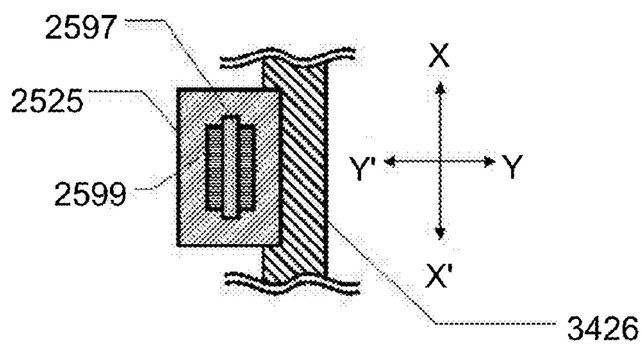
Figure 59C:
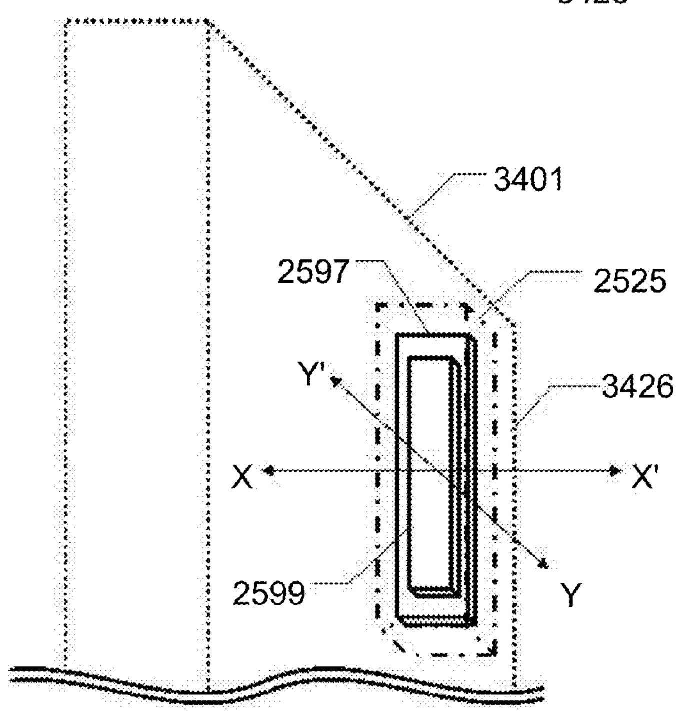

FIG. 59 is a back surface transparent view and cross-sectional view illustrating the manner in which the cartilage conduction vibration source 2525 is anchored to the chassis structure 3426 of the mobile telephone 3401 in the thirty-eighth embodiment of FIG. 58. FIG. 59A is a back surface perspective view illustrating a part of the top end side of the mobile telephone 3401 of the thirty-eighth embodiment, and FIG. 59B is a cross-sectional view illustrating the B-B cross-section of FIG. 59A. FIG. 59C is a transparent perspective view in which a part of the top end side in a modification example of the thirty-eighth embodiment is viewed from the side surface of the opposite side. The configuration of the piezoelectric bimorph element is similar to that in FIG. 44B, and therefore portions that are in common have been given like reference numerals.

As is clear from FIG. 59A, in the thirty-eighth embodiment, the metal sheet 2597 of the piezoelectric bimorph element constituting the cartilage conduction vibration source 2525 is arranged so as to be parallel to the front surface of the mobile telephone 3401; as a result thereof, the cartilage conduction vibration source 2525 is anchored to the chassis structure 3426 such that the Y-Y' direction, which is the primary vibration direction, is oriented to be orthogonal to the GUI display unit 3405. As is clear from FIG. 59B, the piezoelectric bimorph element constituting the cartilage conduction vibration source 2525 is tightly secured on the inner side of the chassis structure 3426 without any gap, the configuration being such that the vibration in the primary vibration direction (the Y-Y' direction) is prone to being transmitted to the surface of the chassis structure 3426.

In a modification example of the thirty-eighth embodiment in FIG. 59C, the metal sheet 2597 of the piezoelectric bimorph element constituting the cartilage conduction vibration source 2525 is arranged so as to be in parallel with the side surface of the mobile telephone 3401; as a result thereof, the cartilage conduction vibration source 2525 is anchored to the chassis structure 3426 such that the Y-Y' direction, which is the primary vibration direction, is oriented to be orthogonal to the side surface of the mobile telephone 3401. Cartilage conduction can thereby be efficiently obtained when the side surface of the mobile telephone 3401 is brought up against the ear. There is comparatively less energy in the non-vibration direction of the piezoelectric bimorph element (the X-X' direction), due to the anchoring of the cartilage conduction vibration source 2525, but because vibration does occur, sound can be listened to by cartilage conduction whenever the front surface or back surface of the mobile telephone 3401 is brought up against the ear cartilage. In the modification example of the thirty-eighth embodiment in FIG. 59C as well, similarly with respect to FIG. 59B, the piezoelectric bimorph element constituting the cartilage conduction vibration source 2525 is tightly secured to the inner side of the chassis structure 3426, without any gap, the configuration being such that the vibration in the primary vibration direction (the Y-Y' direction) is likely to be transmitted to the surface of the chassis structure 3426.

Figure 60:
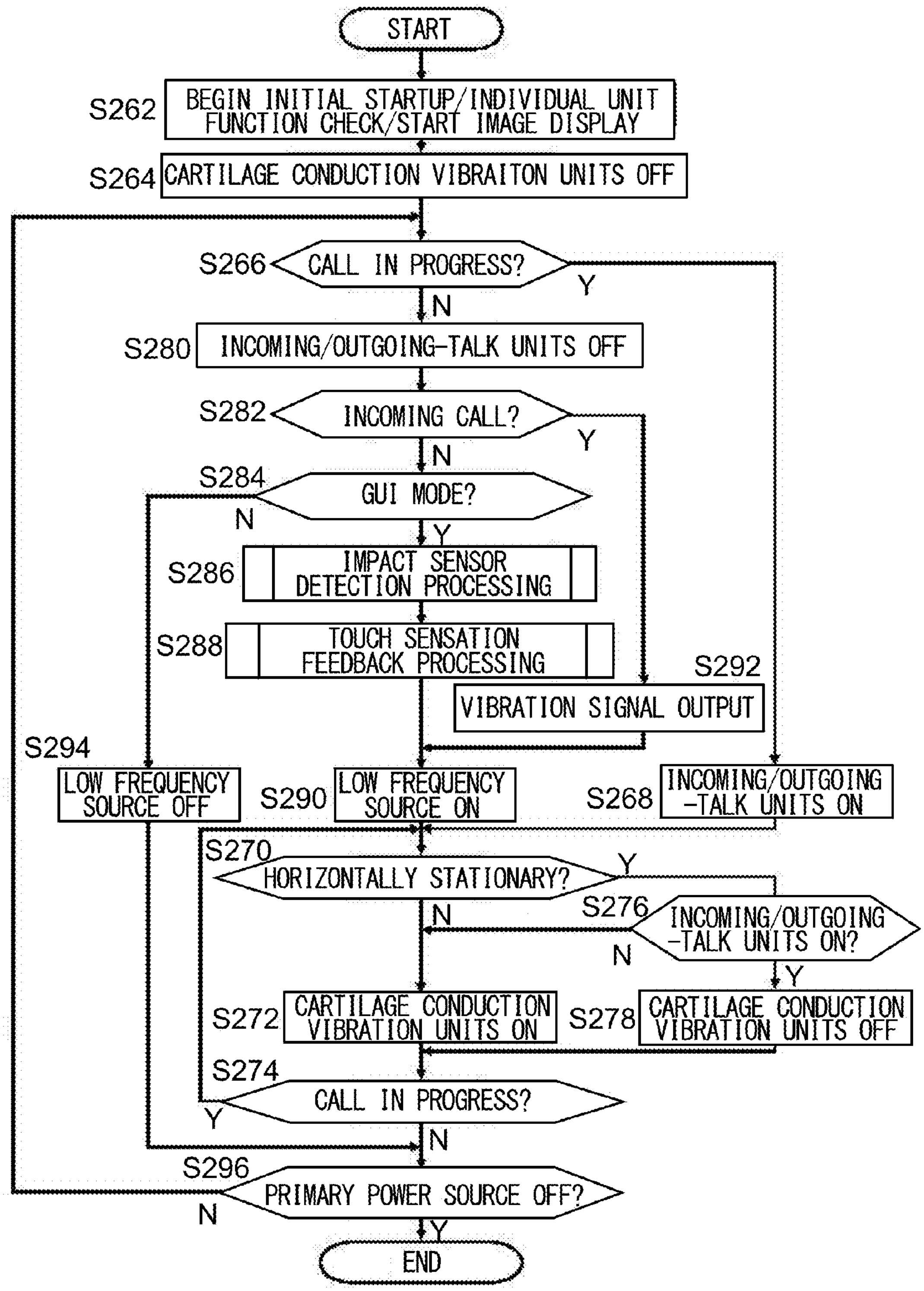
FIG. 60 is a flow chart of the operation of a controller 3439 in the thirty-eighth embodiment of FIG. 58.

FIG. 60 is a flow chart of the operation of a controller 3439 in the thirty-eighth embodiment of FIG. 58. The flow of FIG. 60 illustrates an abstraction of the operation that focuses on related functions, in order to primarily provide a description of the control of the cartilage conduction vibration source 2525; the controller 3439 also contains typical functions of mobile telephones and other operations not represented in the flow of FIG. 60. The flow of FIG. 60 begins when a main power source of the mobile telephone 3401 is turned on; in step S262 an initial startup and a check of each unit function are performed and a screen display on the GUI display unit 3405 is started. Subsequently, in step S264, the function of the cartilage conduction vibration source 2525 is turned off and the flow moves on to step S266.

In step S266, there is performed a check for whether or not the mobile telephone 3401 is in the middle of a call. When the line is newly connected, a call is in progress and therefore the flow proceeds to step S268, in which the outgoing-talk-processing unit 222 and the incoming-talk-processing unit 212 are turned on; the flow then moves on to step S270. In a case in which the line is connected and a call has already been in progress, the flow proceeds from step S266 to step S268; in such a case, the outgoing-talk-processing unit 222 and the incoming-talk-processing unit 212 are continuously kept on and the flow moves on to step S270.

In step S270, there is performed a check for whether or not a horizontal stationary state has been detected by the acceleration sensor 49; when there is no horizontal stationary state, the flow moves on to step S272, which turns on the cartilage conduction vibration source 2525, whereupon the flow moves on to step S274. However, when the cartilage conduction vibration source 2525 is already on, the on state continues. On the other hand, when there is a detection of a horizontal stationary state in step S270, the flow proceeds to step S276, which checks for whether the outgoing-talk-processing unit 222 and the incoming-talk-processing unit 212 are in an on state. Then, in such a case, since an on state is in effect, the flow proceeds to step S278. The cartilage conduction vibration source 2525 is turned off and the flow moves on to step S274. When the cartilage conduction vibration source 2525 is already off, the off state continues. In step S274, there is performed a check for whether or not a call is in progress; when a call is in progress, the flow returns to step S270. Thereafter, as long as a call is in progress, steps S270 to S278 are repeated. Thus, when the mobile telephone 3401 is temporarily placed on a desk or the like during a call, then whenever the voice of the other party is received, the vibration of the cartilage conduction vibration source 2525 is interrupted therebetween, and the generation of uncomfortable noise from vibration with the desk is prevented. As shall be apparent, when a horizontal stationary state is not detected in step S270, the cartilage conduction vibration source 2525 is turned on in step S272 and the call is reactivated.

On the other hand, when it is detected in step S266 that a state in which a call is not in progress is in effect or that a call is not in progress due to the termination of the call, the flow proceeds to step S280, the outgoing-talk-processing unit 222 and the incoming-talk-processing unit 212 are turned off, and the flow moves on to step S282. However, when the outgoing-talk-processing unit 222 and the incoming-talk-processing unit 212 are off, the off state continues and the flow moves on to step S282. In step S282, there is performed a check for whether there is an incoming call; when there is no incoming call, the flow moves on to step S284, in which there is performed a check for whether or not a GUI mode is in effect. Then, when a GUI mode is in effect, the flow proceeds to step S286, in which there is impact sensor detection processing; then, in step S288, there is touch sensation feedback processing, and the flow moves on to step S290. The flow moves directly on to step S290 when there is no operation at all, and when there is an operation, Steps S286 and S288 perform processing for implementing impact sensor detection and touch sensation feedback, which are based on the operation.

In step S290, the low frequency source 2466 is turned on and prepared for the input of a touch sensation feedback signal or the like. The flow then proceeds to step S270, in which there is a check for the presence or absence of a detection of a horizontal stationary state. Then, when there is no horizontal stationary state, the flow moves on to step S272, in which the cartilage conduction vibration source 2525 is turned on and prepared for the input of a touch sensation feedback signal or the like. The flow moves on to step S276 when a horizontal stationary state is detected in step S270, but in such a case, the outgoing-talk-processing unit 222 and the incoming-talk-processing unit 212 are not on, and therefore the flow still moves on to step S272, and the cartilage conduction vibration source 2525 is turned on. Thus, the cartilage conduction vibration source 2525 is turned on when the low frequency source 2466 is turned on, even when a horizontal stationary state is detected. When the cartilage conduction vibration source 2525 is turned on, the impact sensor function thereof is also maintained.

On the other hand, when an incoming call is detected in step S282, the flow proceeds to step S292, a "vibe" signal for providing a notification of the incoming call is outputted; the flow then moves on to step S290. In such a case as well, the low frequency source 2466 is turned on in step S290 and the cartilage conduction vibration source 2525 is turned on in step S272, but the flow also moves on to step S272 even when the horizontal stationary state is detected in step S270, and the fact that the cartilage conduction unit 2525 is turned on is a point of similarity with the case in which the GUI mode is in effect.

When it is detected in step S274 that no call is in progress, the flow moves on to step S296, in which there is performed a check for whether the primary power supply has been turned off. Once the low frequency source 2466 is turned on in step S290, no call is in progress even when step S274 is reached, and therefore the flow moves on to step S296. When there is no detection made in step S284 that a GUI mode is in effect, the flow proceeds to step S294, the low frequency source 2466 is turned off, and the flow then arrives at step 296. When it is detected in step S296 that the primary power supply has been turned off, the flow is terminated. On the other hand, in a case in which there is no detection made in step S296 that the primary power supply is off, the flow returns to step S266, following which steps S266 to S296 are repeated and various situational changes are supported.

The various features of each of the embodiments described above are not to be limited to the above embodiments; rather, wherever it is possible to benefit from the feature of an embodiment, same can also be implemented in other aspects. The various features of each of the embodiments described above are not to be restricted to individual respective embodiments, but rather can be substituted or combined with other appropriate embodiments. For example, regarding the control of the cartilage conduction vibration source 2525 relating to being horizontally stationary, the thirty-eighth embodiment described above can be configured such that, in a case in which there is check for whether or not a videoconferencing function mode is in effect and the mode is in effect, the videoconferencing function speaker is turned on in tandem with the cartilage conduction vibration source 2525 being turned off in step S278 of FIG. 60.

The mode in the thirty-eighth embodiment in which the cartilage conduction vibration source 2525 is supported by the chassis structure 3426 of the mobile telephone 3401 is not to be limited to a rigid, direct anchoring such as in the thirty-eighth embodiment. For example, the rigid support may be indirect, via another holding structure, provided that it remains possible to transmit vibration. The support is also not necessarily limited to being rigid; rather, holding may be achieved via an elastic body, provided that the acoustic impedance is approximated and vibration is transmitted to the chassis surface.

Thirty-ninth Embodiment

FIG. 61 is a cross-sectional view relating to a thirty-ninth embodiment according to an aspect of the present invention as well as to various modification examples thereof, and is configured as mobile telephones 3501*a* to 3501*d*. The thirty-ninth embodiment is consistent with, for example, the thirty-eighth embodiment illustrated in FIGS. 58 to 60, except for the arrangement of the cartilage conduction vibration source 2525, which is constituted of a piezoelectric bimorph element (and which hereinafter is described using the example of the piezoelectric bimorph element 2525). Therefore, the diagram does not contain those portions for which no description is needed, and of the illustrated portions, shared portions have been given like reference numerals, a description thereof having been omitted unless there is a particular need.

Figure 61A:
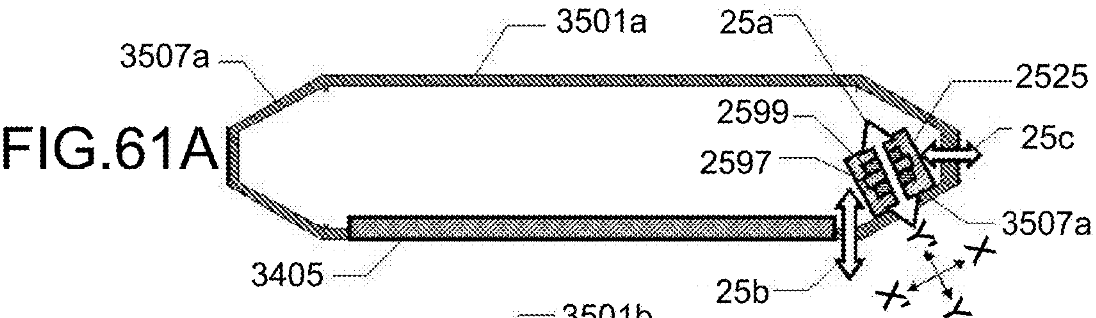
FIGS. 61A, 61B, 61C and 61D are cross-sectional views of a thirty-ninth embodiment according to an aspect of the present invention, and various modification examples thereof (thirty-ninth embodiment)

FIG. 61A relates to the thirty-ninth embodiment, and is a cross-sectional view in which the mobile telephone 3501*a* is viewed from above as being cut in a plane that is perpendicular to the side surface thereof and to the display surface of the GUI display unit 3405. As is clear from the diagram, the piezoelectric bimorph element 2525 is arranged along one side surface of the mobile telephone 3501*a* as in the modification example of the thirty-eighth embodiment in FIG. 59C. However, in the thirty-ninth embodiment of FIG. 61, the primary vibration direction of the piezoelectric bimorph element 2525 (the Y-Y' direction) is not perpendicular to the side surface, but rather is supported so as to incline relative to the side surface. More specifically, the side surface of the thirty-ninth embodiment is provided with an inclined side surface 3507*a* to which four beveled side surface ridge portions are provided; the piezoelectric bimorph element 2525 has a primary vibration surface (the "outer surface of the piezoelectric bimorph element 2525 that is in parallel with the metal sheet 2597" is defined as the "primary vibration surface") that is bonded to one inner side of the inclined side surface 3507*a* for support. The primary vibration direction (which is the Y-Y' direction, and is the direction perpendicular to the primary vibration surface) of the piezoelectric bimorph element 2525 thereby becomes perpendicular to the inclined side surface 3507*a*.

Due to such a structure, the user of the mobile telephone 3501*a* can prevent the display surface of the GUI display unit 3405 from being fouled by contact with the cheek, and can also readily bring the inclined side surface 3507*a* of the mobile telephone 3501*a* up against the ear cartilage. The configuration, which integrates the audio-related configuration into the side surface of the mobile telephone and integrates the visual-related configuration into the front surface of the mobile telephone, as has already been described in the other embodiments, is significant in that the uses of the two surfaces of the mobile telephone 3501*a* can be divided such that the side surface is utilized when the mobile telephone 3501*a* is brought up against the ear or other part of the face and the front surface is utilized when the mobile telephone is watched with the eyes, and in that the front surface of the mobile telephone 3501*a* can be prevented from having the display surface of the GUI display unit 3405 fouled by the face. However, rather than causing the side surface in its entirety to make perpendicular contact with the ear during the usage of the side surface, it is also possible to conceive of a usage state in which the mobile telephone 3501*a* is caused to make contact with the ear such that the display surface of the GUI display unit 3405 is turned slightly toward the face. The thirty-ninth embodiment of FIG. 61A is configured in anticipation of such usage.

As mentioned above, the thirty-ninth embodiment of FIG. 61A has the direction of arrow 25A serving as the primary vibration direction in the inclined side surface 3507*a*, in which the piezoelectric bimorph element 2525 is bonded to the inner side, but since the primary vibration direction is inclined, there is created a vibration component having a direction that is perpendicular to the display surface of the GUI display unit 3405, illustrated by arrow 25B. A side surface vibration component illustrated by arrow 25C is also created. Sound can thereby be listened to even in a case in which the front surface of the mobile telephone 3501*a* (the display surface of the GUI display unit 3405) or the back surface thereof, and, furthermore, either of the two side surfaces of the mobile telephone 3501*a*, is brought up against the ear cartilage. Any position of the mobile telephone 3501*a* can accordingly be discretionarily used, taking the direction of arrow 25A as the best direction. In the thirty-ninth embodiment of FIG. 61A, the inclined side surface 3507*a* assumes an incline that is close to the display surface of the GUI display unit 3405; therefore, the vibration component of the direction illustrated by arrow 25B is greater than the vibration component of the direction illustrated by arrow 25C.

Figure 61B:
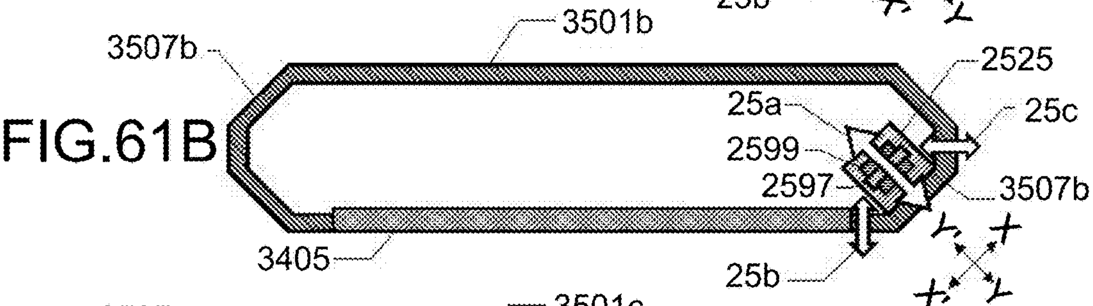
Figure 61C:
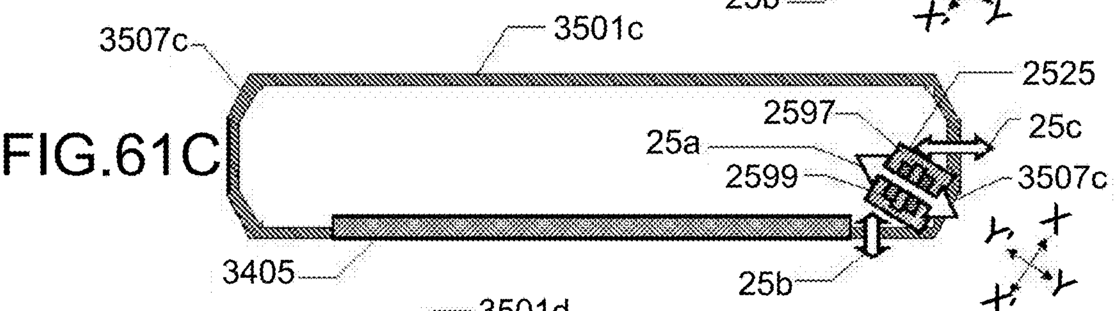

FIG. 61B is a first modification example of the thirty-ninth embodiment; the mobile telephone 3501*b* is configured such that the incline of the inclined side surface 3507*b* is substantially 45° relative to the display surface of the GUI display unit 3405, whereby the vibration component of the direction illustrated by arrow 25B becomes substantially even with the vibration component of the direction illustrated by arrow 25C. By contrast, FIG. 61C is a second modification example of the thirty-ninth embodiment. The mobile telephone 3501*c* is configured such that the inclined side surface 3507*c* assumes an incline that is close to the side surface, whereby the vibration component of the direction illustrated by arrow 25C becomes greater than the vibration component of the direction illustrated by arrow 25B.

FIGS. 61A to 61C are extreme illustrations for describing a broad overview of the inclines, but the extreme directivity in the vibration of the piezoelectric bimorph element 2525 is not maintained after having been transmitted to the mobile telephones 3501*a* to 3501*c*; therefore, subtle changes in the orientation of the primary vibration direction of the piezoelectric bimorph element 2525 provided to the side surface of the mobile telephone will not incur perceptible changes to the vibration components. However, there is great significance in adjusting the arrangement direction of the piezoelectric bimorph element 2525 as in the thirty-ninth embodiment and the modification examples thereof, when the best position of the contact with the ear cartilage is considered. For example, in a case as in FIGS. 61A to 61C in which a planar inclined side surface is provided, it is of practical utility for the front surface of the mobile telephones 3501*a* to 3501*c* (the display surface of the GUI display unit 3405) and the inclined side surfaces 3507*a* to 3507*c* to be imparted with an incline of between approximately 30 to 60°.

Figure 61D:
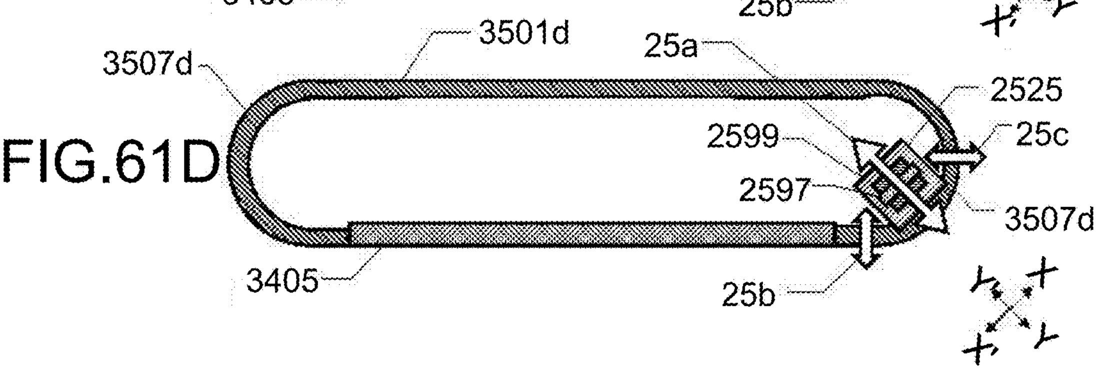

FIG. 61D is a third modification example of the thirty-ninth embodiment; the side surface of a mobile telephone 3501*d* serves as a semicylindrical surface 3507*d*. The configuration is such that support is provided by pushing on the inner side of the semicylindrical surface 3507*d* such that the primary vibration direction of arrow 25A assumes a substantially 45° angle relative to the display surface of the GUI display unit 3405, and the vibration component of the direction illustrated by arrow 25B becomes substantially equivalent to the vibration component of the direction illustrated by arrow 25C. The user is thereby able to bring up against the ear cartilage any desired place across the front surface of the mobile telephone 3501*d* (the display surface of the GUI display unit 3405) or across the back surface thereof, from the semicylindrical surface 3507*d* of the side surface. In the third modification example of the thirty-ninth embodiment of FIG. 61D, the primary vibration direction of arrow 25A is not limited to a case of having a substantially 45° angle relative to the display surface of the GUI display unit 3405, and can be established in various inclines such as in FIGS. 61A to 61C. Another possible configuration is one in which it is possible to adjust the incline of holding and in which a service for altering the incline in accordance with the user's desire can be provided.

Fortieth Embodiment

FIG. 62 represents cross-sectional views and a transparent perspective view of the elements relating to a fortieth embodiment according to an aspect of the present invention as well as to various modification examples thereof, and is configured as mobile telephones 3601*a* to 3601*c*. The fortieth embodiment is also consistent with the thirty-eighth embodiment illustrated in FIGS. 58 to 60, except for the arrangement of the cartilage conduction vibration source 2525, which is constituted of a piezoelectric bimorph element (and which hereinafter is described using the example of the piezoelectric bimorph element 2525). Therefore, the diagram does not contain those portions for which no description is needed, and of the illustrated portions, shared portions have been given like reference numerals, a description thereof having been omitted unless there is a particular need.

FIG. 62A relates to the fortieth embodiment, and is a cross-sectional view in which the mobile telephone 3601*a* is viewed from above as being cut in a plane that is perpendicular to a side surface 3607 thereof and to the display surface of the GUI display unit 3405. As is clear from the diagram, the piezoelectric bimorph element 2525 is arranged along one side surface 3607 of the mobile telephone 3601*a* as in the modification example of the thirty-eighth embodiment in FIG. 59C. However, in the fortieth embodiment of FIG. 62, similarly with respect to the thirty-ninth embodiment, the piezoelectric bimorph element 2525 has a primary vibration direction (the Y-Y' direction) that is not perpendicular to the side surface, the piezoelectric bimorph element 2525 being supported so as to be inclined relative to the side surface 3607. The fortieth embodiment is configured such that the vibrations from the primary vibration surfaces of the two sides of the piezoelectric bimorph element 2525 are respectively transmitted to the mutually orthogonal side surface 3607 and display surface of the GUI display unit 3405.

More specifically, the chassis of the mobile telephone 3601*a* of the fortieth embodiment in FIG. 62A is provided with a first support structure 3600*a* that extends to the inner side from the side surface 3607, and is bonded to one primary vibration surface of the piezoelectric bimorph element 2525; and is also provided with a second support structure 3600*b* that extends to the inner side from the chassis on the display surface of the GUI display unit 3405, and is bonded to the other primary vibration surface of the piezoelectric bimorph element 2525. The primary vibration in the direction illustrated by arrow 25A is thereby broken down into the vibration component illustrated by arrow 25D and the vibration component illustrated by arrow 25E having a direction orthogonal thereto, each of which being respectively transmitted to the side surface 3607 and the chassis surface on the display surface of the GUI display unit 3405. Thus, the vibration of the two primary vibration surfaces in the piezoelectric bimorph element 2525 is transmitted broken down into orthogonal directions of the mobile telephone 3601*a*; and the vibration of the piezoelectric bimorph element 2525 can be heard regardless of which portion of the front surface, the back surface, or the side surface of the mobile telephone 3601*a* is brought up against the ear cartilage. The fortieth embodiment in FIG. 62A is provided with the first support structure 3600*a* and the second support structure 3600*b* so as to sandwich the same portion of the piezoelectric bimorph element 2525 from two sides.

By contrast, FIG. 62B is a transparent perspective view in which the elements of the mobile telephone 3601*b* of a first modification example of the fortieth embodiment are viewed from within. As is clear from FIG. 62B, in the first modification example of the fortieth embodiment, the first support structure 3600*a* and the second support structure 3600*b* are provided so as to be bonded to the mobile telephone 3601*b* in positions where the primary vibration surfaces facing the piezoelectric bimorph element 2525 mutually cross. The operation to bond to the piezoelectric bimorph element 2525 is thereby facilitated, the degree of freedom with which the piezoelectric bimorph element 2525 vibrates is less inhibited, and the vibration thereof can be efficiently transmitted to the chassis of the mobile telephone 3601*b*.

FIG. 62C is a cross-sectional view in which the mobile telephone 3601*c* of a second modification example of the fortieth embodiment is viewed from the side having been cut along a plane that is perpendicular to a side surface 3607*a* and the top surface. In the fortieth embodiment of FIG. 62A, the primary vibration directions of the piezoelectric bimorph element 2525 are broken down into vibration components having directions perpendicular to the front surface and the side surfaces respectively, but in the second modification example of the fortieth embodiment in FIG. 62C, the primary vibration directions of the piezoelectric bimorph element 2525 are broken down into vibration components having directions that are perpendicular to the front surface and the top surface respectively.

More specifically, as is clear from FIG. 62C, the chassis of the mobile telephone 3601*c* in the second modification example of the fortieth embodiment is provided with a first support structure 3600*c* that extends to the inner side from the top surface, and is bonded to one primary vibration surface of the piezoelectric bimorph element 2525. The chassis of the mobile telephone 3601*c* in the second modification example of the fortieth embodiment is also provided with a second support structure 3600*d* that extends to the inner side from the chassis on the display surface of the GUI display unit 3405, and is bonded to the other primary vibration surface of the piezoelectric bimorph element 2525. The primary vibration in the direction illustrated by arrow 25A is thereby broken down into the vibration component illustrated by arrow 25F and the vibration component illustrated by arrow 25E having a direction orthogonal thereto, each being respectively transmitted to the top surface and the chassis surface on the display surface of the GUI display unit 3405. Thus, the vibration of the two primary vibration surfaces in the piezoelectric bimorph element 2525 is transmitted broken down into orthogonal directions of the mobile telephone 3601*c*; the vibration of the piezoelectric bimorph element 2525 can be heard regardless of which portion of the front surface, the back surface, the top surface, or the bottom surface of the mobile telephone 3601*c* is brought up against the ear cartilage. The second modification example of the fortieth embodiment in FIG. 62C has a cross-sectional view of a form in which the first support structure 3600*c* and the second support structure 3600*d* are provided such that the same portion of the piezoelectric bimorph element 2525 is sandwiched from both sides, similarly with respect to FIG. 62A; however, the configuration may be such that, as in FIG. 62B, crossing portions of the two surfaces of the piezoelectric bimorph element 2525 are respectively bonded.

The second modification example of the fortieth embodiment in FIG. 62C is not only suited for listening to sound by bringing the front surface or the rear surface of the mobile telephone 3601*c* alongside the ear cartilage, but is also appropriate for usage in which the top surface of the mobile telephone 3601*c* is brought up against the ear cartilage in such a form as to lightly push upward. This embodiment is also appropriate in that by such usage, not only is the display surface prevented from being fouled by contact with the face, but increasing the force pushing upward on the top surface obstructs the external auditory meatus with the tragus, and the earplug bone conduction effect is readily created.

Forty-first Embodiment

FIG. 63 is a cross-sectional view relating to a forty-first embodiment according to an aspect of the present invention, and is configured as a mobile telephone 3701. The forty-first embodiment is also consistent with the thirty-eighth embodiment illustrated in FIGS. 58 to 60, except for the arrangement of the cartilage conduction vibration source 2525, which is constituted of a piezoelectric bimorph element (and which hereinafter is described using the example of the piezoelectric bimorph element 2525); therefore, the diagram does not contain those portions for which no description is needed, and of the illustrated portions, shared portions have been given like reference numerals, a description thereof having been omitted unless there is a particular need.

Figure 63A:
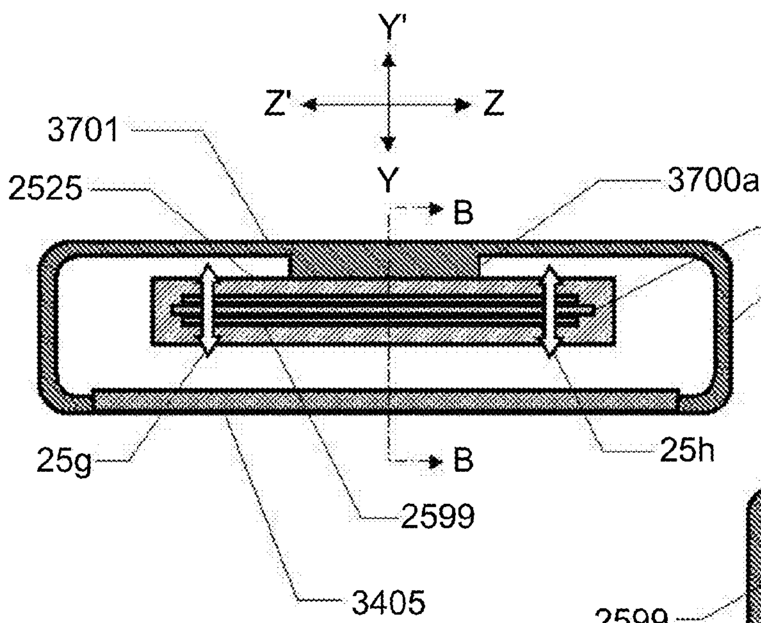
FIGS. 63A and 63B are cross-sectional views of a forty-first embodiment according to an aspect of the present invention (forty-first embodiment)

FIG. 63A is a cross-sectional view in which the mobile telephone 3701 of the forty-first embodiment is viewed from above as being cut in a plane that is perpendicular to a side surface 3707 thereof and to the display surface of the GUI display unit 3405. As is clear from the diagram, the piezoelectric bimorph element 2525 is arranged along the top surface of the mobile telephone 3701 as in the thirty-eighth embodiment in FIG. 59A. The primary vibration direction of the piezoelectric bimorph element 2525 (the Y-Y' direction) is a direction that is perpendicular to the display surface of the GUI display unit 3405. Specifically, the middle portion of the piezoelectric bimorph element 2525 is bonded to a support structure 3700*a* that extends to the inner side from the back surface of the mobile telephone 3701, and the two end portions of the piezoelectric bimorph element 2525 are supported together as free ends in a state in which vibration is not hampered. As a result, the counteraction of the free vibration of the two end portions of the piezoelectric bimorph element 2525 as illustrated by arrow 25G and arrow 25H is transmitted to the chassis of the mobile telephone 3701 via the support structure 3700*a* from the middle portion of the piezoelectric bimorph element 2525.

Figure 63B:
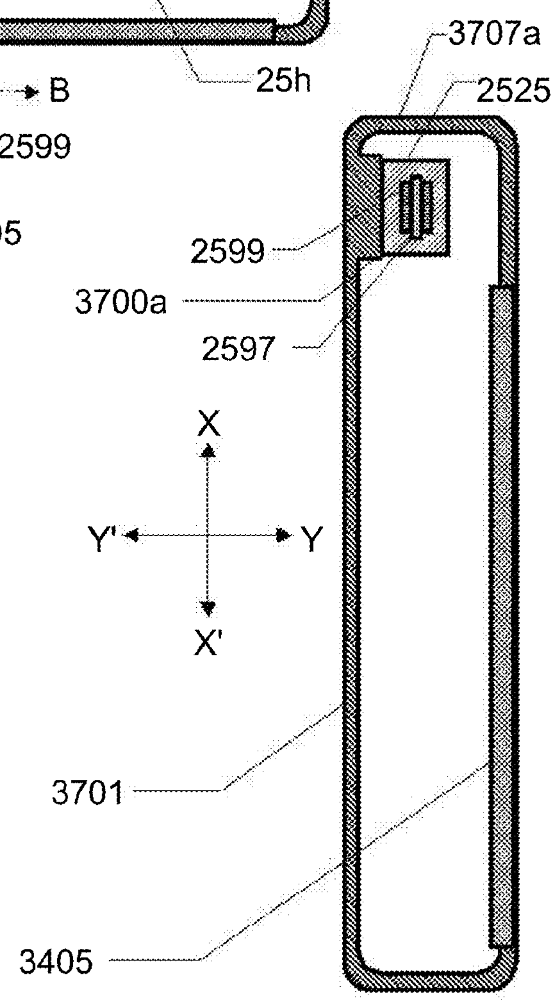

FIG. 63B is a cross-sectional view in which the B-B cross-section of FIG. 63A is viewed from the side of the mobile telephone 3701; it can be understood that the piezoelectric bimorph element 2525 is supported by the support structure 3700*a* in which the piezoelectric bimorph element 2525 extends to the inner side from the back surface of the mobile telephone 3701, and also that the piezoelectric bimorph element 2525 is arranged along the top surface of the mobile telephone 3701. As shown in FIG. 63, the structure, in which a part of the primary vibration surface of the piezoelectric bimorph element 2525 is supported on the inner side of the chassis of the mobile telephone 3701 and a part of the primary vibration surface is permitted to unrestrictedly vibrate in an unsupported manner, is appropriate for efficiently transmitting the vibration of the piezoelectric bimorph element 2525 to the chassis of the mobile telephone without adding any substantive change to the acoustic properties thereof. The support at the middle of the piezoelectric bimorph element 2525 such as in the forty-first embodiment is also particularly appropriate in a case of a piezoelectric bimorph element having a terminal positioned at the middle of the element, as in the thirty-second embodiment illustrated in FIG. 51.

FIG. 64 illustrates various modification examples of the forty-first embodiment of FIG. 63, and, similarly with respect to FIG. 63A, is a cross-sectional view in which the mobile telephone 3701 is viewed from above as being cut in a plane that is perpendicular to the side surface 3707 thereof and to the display surface of the GUI display unit 3405.

Figure 64A:
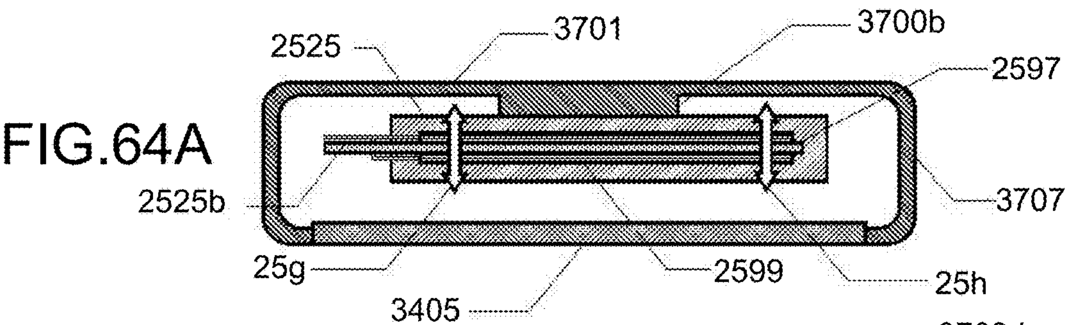
FIGS. 64A, 64B, 64C and 64D are cross-sectional views of various modification examples of the forty-first embodiment.

FIG. 64A is a first modification example of the forty-first embodiment, and is particularly suited to a case in which the terminal 2525*b* of the piezoelectric bimorph element 2525 is positioned at an end part of the element, the center of gravity is unbalanced, and the free vibration of the terminal 2525*b* illustrated by arrow 25G is slightly confined by the electrode connection to the element, compared to the vibration of the entire free end illustrated by arrow 25H. To compensate for the unbalancing, the first modification example of FIG. 64A shifts the position of the support structure 3701*b* to the left in the diagram compared to the support structure 3700*a* of the forty-first embodiment of FIG. 63.

Figure 64B:
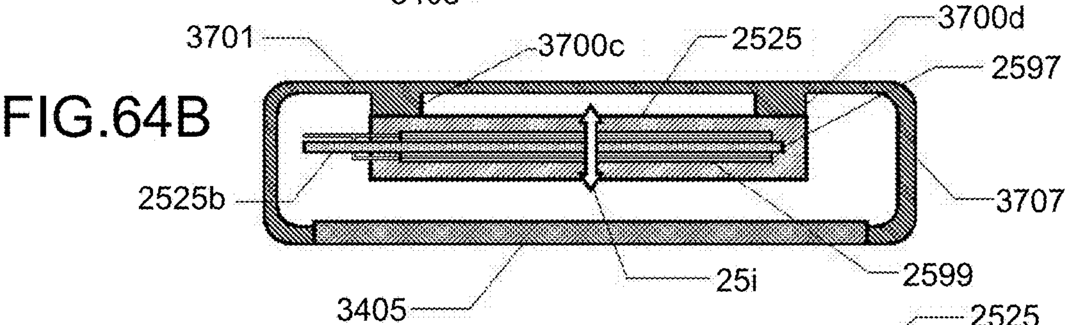

FIG. 64B is a second modification example of the forty-first embodiment; each of the two ends of the piezoelectric bimorph element is bonded to a pair of support structures 3700*c* and 3700*d* that extend to the inner side from the back surface of the mobile telephone 3701. The vibration of the middle portion of the piezoelectric bimorph element illustrated by arrow 25I is thereby freed, and the counteraction of this vibration is transmitted to the chassis of the mobile telephone 3701 via the support structures 3700*c* and 3700*d*.

Figure 64C:
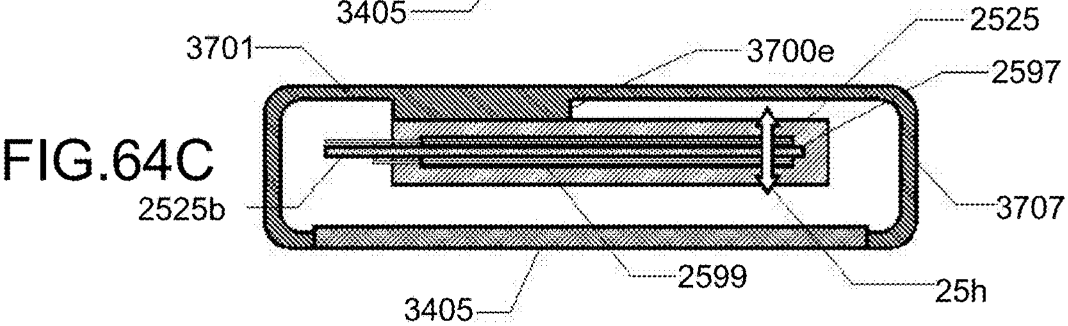

FIG. 64C is a third modification example of the forty-first embodiment, the terminal 2525*b* being bonded to a support structure 3700*e* extending inward from the back surface of the mobile telephone 3701, whereby the piezoelectric bimorph element 2525 is supported on a cantilever structure. The counteraction of the vibration of the free ends of the piezoelectric bimorph element 2525 illustrated by arrow 25H is thereby transmitted to the chassis of the mobile telephone 3701 via the support structure 3700*e*.

Figure 64D:
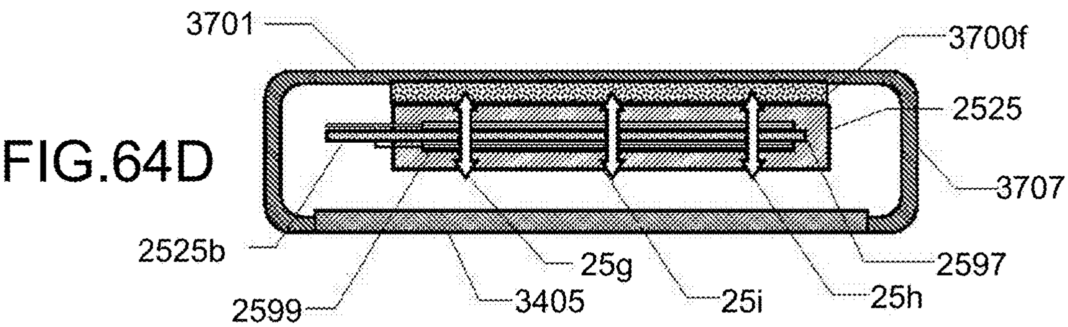

FIG. 64D is a fourth modification example of the forty-first embodiment; the piezoelectric bimorph element 2525 is bonded to the inner side of the chassis of the back surface of the mobile telephone 3701 interposed by a two-sided bonding sheet 3700*f* comprising an elastic body. The two-sided bonding sheet 3700*f* comprising an elastic body is made using an elastic body that has conductivity from the piezoelectric bimorph element 2525 to the chassis (a silicone rubber; a mixture of a silicone rubber and a butadiene rubber; a natural rubber; a structure formed using these varieties of rubber in which air bubbles are sealed; or the like) or the like. Due to such elastic bonding, each portion of the piezoelectric bimorph element 2525 obtains a degree of free vibration illustrated by arrows 25G, 25H, and 25I, and the vibration thereof is transmitted to the chassis of the mobile telephone 3701 via the two-sided bonding sheet 3700*f*.

The various features of each of the embodiments described above are not to be restricted to individual respective embodiments, but rather can be substituted or combined with other appropriate embodiments. For example, the support structure of the forty-first embodiment in FIGS. 63 and 64, in which consideration is given to the free vibration of the piezoelectric bimorph element 2525, can also be applied to the case of the inclined holding of the piezoelectric bimorph element 2525 in the thirty-ninth embodiment of FIG. 61 and the fortieth embodiment of FIG. 62. Specifically, the support structure in FIG. 62B has a point in common in the sense that the two ends of the piezoelectric bimorph element 2525 are supported and the middle part is freed. There is no limitation to this example; for example, rather than bonding the entire vibration plane to the inner side of the inclined side surface, it is also possible in the thirty-ninth embodiment of FIG. 61 and the modification examples thereof to provide a projection unit analogous to the support structure 3700*a* of FIG. 63A to the inclined side surface, only the middle portion of the piezoelectric bimorph element 2525 being bonded thereto to make the two end parts thereof into free ends. Alternatively, it is also possible in the thirty-ninth embodiment of FIG. 61 and the modification examples thereof to interpose an elastic body, as in the fourth modification example of the forty-first embodiment in FIG. 64D, when the piezoelectric bimorph element 2525 is bonded.

The implementation of the features of the present invention described above is not to be limited to the aspects in the above embodiments; the invention can be implemented using other aspects as well, wherever it is possible to benefit from the advantages thereof. For example, although the thirty-ninth embodiment of FIG. 61 has been described with the piezoelectric bimorph element 2525 being bonded to and supported by the inner side of the inclined side surface inside the mobile telephone, the specific structure for support is not to be limited thereto. For example, referring to the thirty-first embodiment of FIG. 49, the structure may be one in which a groove may be provided to the outer side of the inclined side surface and the piezoelectric bimorph element 2525 is fitted into this groove from the outer side.

Forty-second Embodiment

FIG. 65 is a cross-sectional view relating to a forty-second embodiment according to an aspect of the present invention, and is configured as a mobile telephone 3801. The forty-second embodiment is consistent with the thirty-eighth embodiment illustrated in FIGS. 58 to 60, except for the arrangement of the cartilage conduction vibration source 2525, which is constituted of a piezoelectric bimorph element (and which hereinafter is described using the example of the piezoelectric bimorph element 2525), and except for the holding structure thereof therefore, the diagram does not contain those portions for which no description is needed, and of the illustrated portions, shared portions have been given like reference numerals, a description thereof having been omitted unless there is a particular need.

FIG. 65A is a cross-sectional view in which the mobile telephone 3801 of the forty-second embodiment is viewed from above as being cut in a plane that is perpendicular to a side surface 3807 thereof and to the display surface of the GUI display unit 3405. FIG. 65B is a cross-sectional view in which the B-B cross-section of FIG. 65A is viewed from the side of the mobile telephone 3801. As is clear from FIG. 65A, the piezoelectric element 2525 is arranged along the top surface of the mobile telephone 3801, similarly with respect to the thirty-eighth embodiment in FIG. 59A, the forty-first embodiment in FIG. 63, or the like. The primary vibration direction of the piezoelectric bimorph element 2525 is the direction perpendicular to the display surface of the GUI display unit 3405, as illustrated by arrow 25G. Thus, the forty-second embodiment of FIG. 65, in essence, has one side of the piezoelectric bimorph element 2525 supported by a cantilever structure, similarly with respect to the modification example of the forty-first embodiment illustrated in FIG. 64C. The counteraction of the vibration of the free end of the piezoelectric bimorph element 2525 illustrated by arrow 25G is thereby transmitted to the chassis of the mobile telephone 3801.

A point of difference in the forty-second embodiment of FIG. 65 from the modification example of the forty-first embodiment illustrated in FIG. 64C lies in it being configured such that an upper part corner 3824, which is a site on the chassis of the mobile telephone 3801 that is appropriate for being brought up against the tragus or other ear cartilage, is made to vibrate particularly efficiently, and also such that it is possible for the structure of the upper part corner 3824, which is also a site that is likely to bear the direct application of impact when a drop or the like occurs, to avoid having a structure that is low in terms of collision resistance. Specifically, as illustrated in FIGS. 65A and 65B, one end of the piezoelectric bimorph element 2525 is inserted and held in a hole of a support structure 3800*a* extending inward from the side surface 3807 and the top surface 3807*a* of the mobile telephone 3801, as a holding end 2525*c*. The holding end 2525*c* is an end to which the terminal 2525*b* is not provided. Thus, making the one end to which the terminal 2525*b* is not provided into a holding end 2525*c* permits the support position to be brought closer to the vicinity of the upper part corner 3824. By contrast, the other end to which the terminal 2525*b* is provided is made to vibrate as a free end. The terminal 2525*b* is connected to a circuit 3836 and flexible wiring 3836*a* installed in the chassis; the free vibration of the other end to which the terminal 2525*b* is provided will not be substantively hampered. The circuit 3836 comprises an amp or the like for boosting the drive voltage of the piezoelectric bimorph element 2525.

Due to the configuration described above, the counteraction of the free vibration of the other end of the piezoelectric bimorph element 2525 illustrated by arrow 25G is transmitted to the chassis of the mobile telephone 3801 via the support structure 3800*a* from the holding end 2525*c* of the piezoelectric bimorph element 2525. At this time, the support structure 3800*a*, as described above, is configured so as to extend to the inner side from the side surface 3807 and the top surface 3807*a* of the mobile telephone 3801 at the upper part corner 3824 of the chassis; therefore, the counteraction of the free vibration of the other end of the piezoelectric bimorph element 2525 is efficiently transmitted to the upper part corner 3824. As described above, the piezoelectric bimorph element 2525 is held in the inner side of the chassis of the mobile telephone 3801, and therefore the structure of the upper part corner 3824, which is also a site that is prone to the direct application of an impact, will not have low resistance to collision.

FIG. 65C is a first modification example of the forty-second embodiment; the piezoelectric bimorph element 2525 is held such that the primary vibration direction becomes the direction perpendicular to the top surface 3807*a*, as illustrated by arrow 25J. The structure is otherwise similar to that of the forty-second embodiment of FIGS. 65A and 65B, and therefore a description thereof has been omitted. The first modification example in FIG. 65C has a large vibration component in the direction perpendicular to the top surface 3807*a*, and is therefore suited for usage in which the top surface side of the upper part corner 3824 of the mobile telephone 3801 is brought up against the ear cartilage in such a form as to push lightly upward. This embodiment is also appropriate in that, due to such use, not only can the display surface of the GUI display unit 3405 be prevented from being fouled by contact with the face, but also increasing the force pushing upward on the top surface 3807*a* obstructs the external auditory meatus with the tragus, and the earplug bone conduction effect is readily created. The first modification example in FIG. 65C, similarly with respect to the forty-second embodiment of FIGS. 65A and 65B, can be used upon the display surface side of the upper part corner 3824 of the mobile telephone 3801 being brought up against the ear cartilage. In such a case as well, increasing the force with which the display surface is pushed against the ear cartilage makes it possible for the external auditory meatus to be obstructed with the tragus, and the earplug bone conduction effect can readily be created.

FIG. 65D is a second modification example of the forty-second embodiment. The primary vibration direction is inclined 45° relative to the top surface 3807*a*, as illustrated by arrow 25K. The vibration components are thereby broken down into the direction that is perpendicular to the top surface 3807*a* and the direction that is perpendicular to the display surface of the GUI display unit 3405, which is orthogonal thereto, and comparable cartilage conduction can be obtained regardless of the direction from which the upper part corner 3824 comes into contact with the ear cartilage.

Forty-third Embodiment

FIG. 66 is a cross-sectional view relating to a forty-third embodiment according to an aspect of the present invention, and is configured as a mobile telephone 3901. The forty-third embodiment is consistent with the thirty-eighth embodiment illustrated in FIGS. 58 to 60, except for the arrangement of the cartilage conduction vibration source 2525, which is constituted of a piezoelectric bimorph element (and which hereinafter is described using the example of the piezoelectric bimorph element 2525), and except for the holding structure thereof. Therefore, the diagram does not contain those portions for which no description is needed, and of the illustrated portions, shared portions have been given like reference numerals, a description thereof having been omitted unless there is a particular need.

Figures 66A, 66B, 66C, 66D:
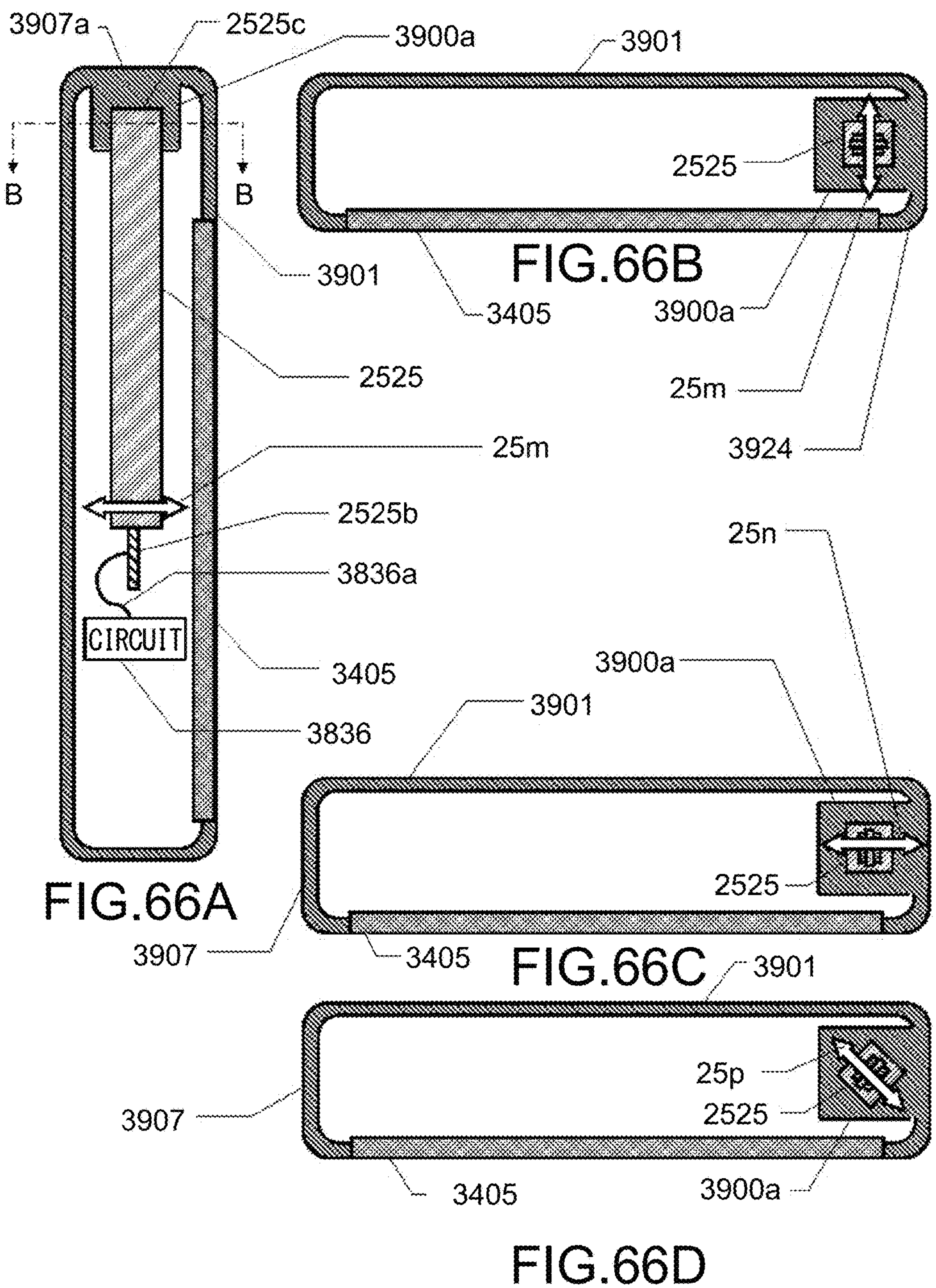
FIGS. 66A, 66B, 66C and 66D are cross-sectional views relating to a forty-third embodiment according to an aspect of the present invention (forty-third embodiment)

FIG. 66A is a cross-sectional view in which the mobile telephone 3901 of the forty-third embodiment is viewed in profile as being cut in a plane that is perpendicular to the upper surface 3907*a* thereof and to the display surface of the GUI display unit 3405. FIG. 66B is a cross-sectional view in which the B-B cross-section of FIG. 66A is viewed from above the mobile telephone 3901. In the forty-third embodiment of FIG. 66, similarly with respect to the forty-second embodiment of FIG. 65, the one end in the piezoelectric bimorph element 2525 to which the terminal 2525*b* is not provided serves as a holding end 2525*c* and is supported by a cantilever structure. A point of difference in the forty-third embodiment from the forty-second embodiment lies in that, as is clear from FIG. 66A, the piezoelectric bimorph element 2525 is arranged in parallel to the side surface of the mobile telephone 3901, similarly with respect to the thirty-ninth embodiment in FIG. 61 and the modification examples thereof. Further, the primary vibration direction of the piezoelectric bimorph element 2525 is the direction that is perpendicular to the display surface of the GUI display unit 3405, as illustrated by arrow 25M.

Accordingly, in the forty-third embodiment of FIG. 66 as well, an upper part corner 3924, which is a site on the chassis of the mobile telephone 3901 appropriate for being brought up against the tragus or other ear cartilage, vibrates particularly efficiently, and the structure of the upper part corner 3924 can avoid being low in terms of collision resistance. Specifically, similarly with respect to the forty-second embodiment, as illustrated in FIGS. 66A and 66B, one end of the piezoelectric bimorph element 2525 is inserted into and held in a hole of the support structure 3900*a* extending inward from the side surface and the top surface of the mobile telephone 3901, as a holding end 2525*c*. Accordingly, the one end of the piezoelectric bimorph element 2525 to which the terminal 2525*b* is not provided is made into a holding terminal 2525*c* in the forty-third embodiment as well, whereby the support position can be brought closer to the vicinity of the upper part corner 3924. This embodiment is otherwise consistent with the forty-second embodiment, and therefore a description has been omitted.

FIG. 66C is a first modification example of the forty-third embodiment; the piezoelectric bimorph element 2525 is held such that the primary vibration direction becomes the direction perpendicular to the side surface 3907, as illustrated by arrow 25N. The configuration is otherwise similar to that of the forty-third embodiment in FIGS. 66A and 66B, and therefore a description thereof has been omitted. The first modification example in FIG. 66C has a large vibration component in the direction perpendicular to the side surface 3907, and is therefore suited for usage in which the side surface 3907 of the mobile telephone 3901 is brought up against the ear cartilage and contact between the face and the display surface of the GUI display unit 3405 is avoided. In the first modification example in FIG. 66C, similarly with respect to the forty-third embodiment in FIGS. 66A and 66B, the display surface side of the mobile telephone 3901 can be brought up against the ear cartilage for use. In such a case as well, in a case in which the upper part corner 3924 is pushed against the ear cartilage, increasing the force thereof makes it possible to obstruct the external auditory meatus with the tragus, and to readily create the earplug bone conduction effect.

FIG. 66D is a second modification example of the forty-third embodiment. The primary vibration direction is inclined 45° relative to the side surface 3907, as illustrated by arrow 25P. The vibration components are thereby broken down into the direction that is perpendicular to the side surface 3907 and to the direction that is perpendicular to the display surface of the GUI display unit 3405, which is orthogonal thereto, and comparable cartilage conduction can be obtained regardless of the direction from which the upper part corner 3924 comes into contact with the ear cartilage.

Forty-fourth Embodiment

FIG. 67 is a cross-sectional view relating to a forty-fourth embodiment according to an aspect of the present invention, and is configured as a mobile telephone 4001. The forty-fourth embodiment is consistent with the thirty-eighth embodiment illustrated in FIGS. 58 to 60, except for the structure and arrangement of the cartilage conduction vibration source 2525, which is constituted of a piezoelectric bimorph element, and except for the holding structure thereof. Therefore, the diagram does not contain those portions for which no description is needed, and of the illustrated portions, shared portions have been given like reference numerals, a description thereof having been omitted unless there is a particular need.

Figure 67A:
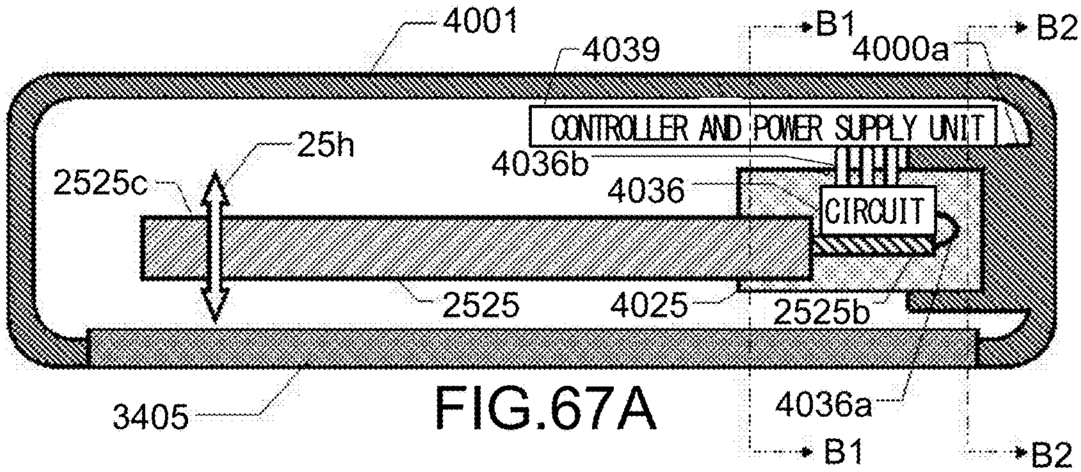
Figure 67C:
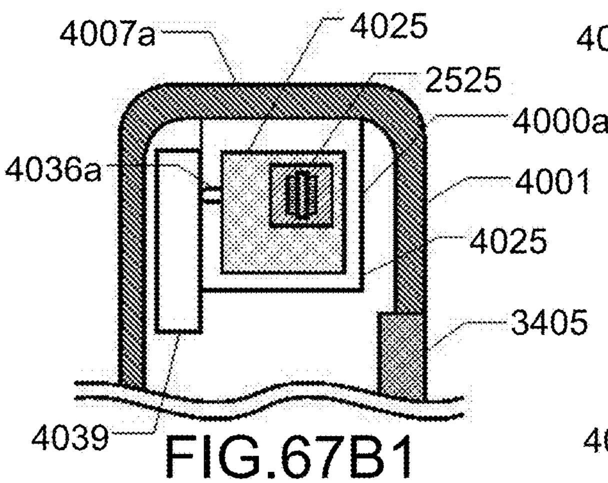
Figure 67C:
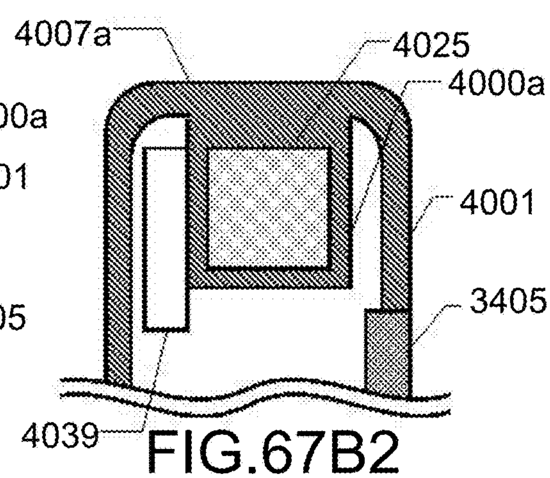
Figure 67C:
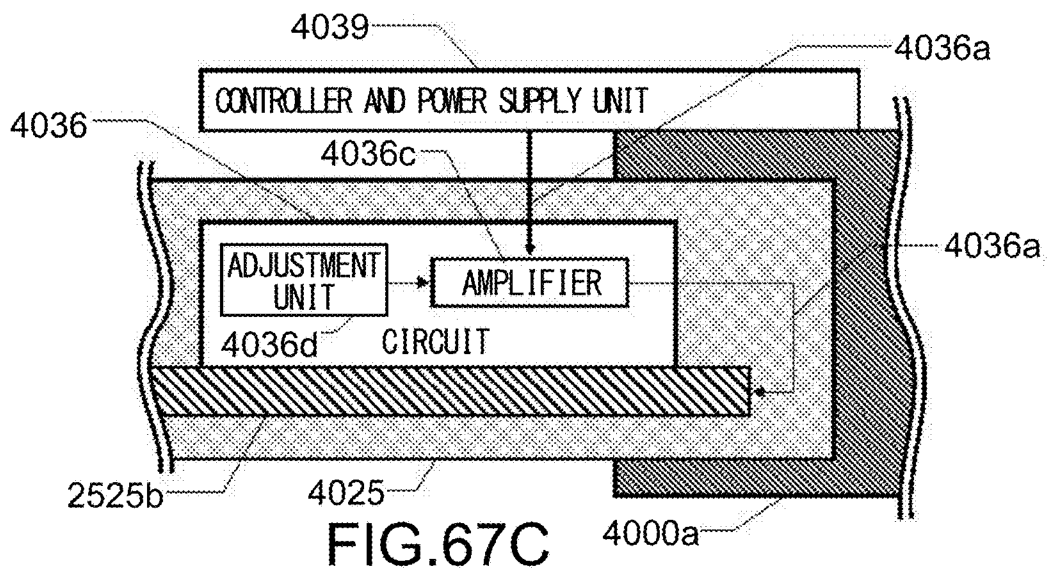

FIG. 67A is a cross-sectional view (which includes a partial conceptual block diagram) in which the mobile telephone 4001 of the forty-fourth embodiment is viewed from above as being cut in a plane that is perpendicular to the side surface thereof and to the display surface of the GUI display unit 3405, and is a cross-sectional view that can be understood to be similar with respect to the forty-second embodiment of FIG. 65A. FIGS. 67B1 and 67B2 are cross-sectional views in which the B1-B1 cross-section and B2-B2 cross-section of the elements in FIG. 67A are viewed from the side of the mobile telephone 4001, respectively. FIG. 67C is a detailed cross-sectional view of the important elements of FIG. 67A (including a partial conceptual block diagram). Portions in FIGS. 67B1, 67B2, and 67C that correspond to FIG. 67A have been given like reference numerals, and a description thereof has been omitted unless there is a particular need.

The forty-fourth embodiment of FIG. 67, similarly with respect to the forty-second embodiment of FIG. 65, has the piezoelectric bimorph element 2525 supported in parallel with the top surface, but differs from the forty-second embodiment in that the one end side to which the terminal 2525*b* is provided is supported by the cantilever structure, and in that a circuit 4036 for driving the piezoelectric bimorph element 2525 is integrated with the piezoelectric bimorph element 2525 for a configuration as a vibration unit. This embodiment is consistent with the forty-second embodiment in that the upper part corner, which is an appropriate site on the chassis of the mobile telephone 4001 to be brought up against the tragus or other ear cartilage, vibrates particularly efficiently, and also in that the upper part corner avoids having a structure that is low in terms of collision resistance.

Specifically, as illustrated in FIGS. 67A and 67C, the terminal 2525*b* of the piezoelectric bimorph element 2525 is connected to a circuit 4036 that is mounted onto the terminal 2525*b* using a wire 4036*a*. The terminal 2525*b* of the piezoelectric bimorph element 2525 and the circuit 4036 are re-packaged using a resin package 4025 having an acoustic impedance approximating that of the resin in which the piezoelectric bimorph element 2525 has been packaged, and are integrated as a vibration unit. A connection pin 4036*b* penetrates the resin package 4025, projects outward from the circuit 4036, and makes contact with a controller and power supply unit 4039 secured to the chassis of the mobile telephone 4001.

As illustrated in FIG. 67C, the circuit 4036 comprises an amp 4036*c* for boosting the drive voltage of the piezoelectric bimorph element 2525, and an adjustment unit 4036*d* for electrically compensating for the variances of the piezoelectric bimorph element 2525. The adjustment unit 4036*d* performs adjustments so as to operate to prevent variances in the piezoelectric bimorph element 2525 relative to the power feed and control from the controller and power supply unit 4039; therefore, after adjustments are done, repackaging is done with the resin 4024. As an alternative configuration, it is possible for repackaging to be performed so that an adjustment operation unit or adjustment circuit pattern of the adjustment unit 4036*d* is exposed on the surface of the resin package 4025, and so that adjustments can be performed after assembly.

In the forty-fourth embodiment of FIG. 67, similarly with respect to the forty-second embodiment, a support structure 4000*a* extending inward from the side surface and top surface 4007*a* of the mobile telephone 4001 is provided, a portion of the resin package 4025 of the vibration unit formed by repackaging being inserted into a hole thereof, whereby the piezoelectric bimorph element 2525 is held. As has already been described, in the forty-fourth embodiment, one end side to which the terminal 2525*b* is provided is supported, and one end 2525*c* to which the terminal 2525*b* is not provided serves as a unrestrictedly vibrating end. The counteraction of the free vibration of the one end 2525*c* is then transmitted to the chassis of the mobile telephone 4001 via the support structure 4000*a* from the resin package 4025.

The various features indicated in the embodiments of the present invention can be unrestrictedly substituted or combined whenever the benefits thereof can be utilized. For example, in the forty-fourth embodiment of FIG. 67, the piezoelectric bimorph element 2525 is supported in parallel with the top surface, and the primary vibration direction thereof becomes the direction perpendicular to the display surface of the GUI display unit 3405, as illustrated by arrow 25H. However, the integrated packaging structure of the piezoelectric bimorph element 2525 and the circuit 4036 illustrated in the forty-fourth embodiment is not to be limited to the arrangement of FIG. 67, but rather can be utilized in a support arrangement such as in the modification example of the forty-second embodiment illustrated in FIGS. 65C and 65D, and in the forty-third embodiment illustrated in FIGS. 66A to 66D and the modification example thereof. The utilization thereof may be done in conformity with the relationships between FIGS. 65A and 67A, and in each case, the one end of the side of the piezoelectric bimorph element 2525 to which the terminal 2525*b* is provided serves as the support side, similarly with respect to FIG. 65A.

The support structures 3800*a*, 3900*a*, and 4000*a* in the forty-second embodiment of FIG. 65 to the forty-fourth embodiment in FIG. 67 are also not limited as extending inward from the side surface and top surface of the mobile telephone 4001; rather, a variety of support structures are possible. For example, a support structure may be configured so as to extend from only one of either the side surface or the top surface. Moreover, a variety of other structures are possible, including one extending from either the front surface or the back surface, one extending from the front surface and the top surface; one extending from the rear surface and the top surface; one extending from the side surface and the front surface; one extending from the side surface and the rear surface; or one extending from the rear side of the corner part as an elongation from all three of the top surface, the side surface, and the front surface. In each case, providing the piezoelectric bimorph element 2525 or the support unit of the resin packaging 4025 integrated therewith to the inner side of the chassis in the vicinity of the corner part can allow the corner part to avoid having a structure that is low in terms of collision resistance while also causing the corner part to vibrate efficiently due to the counteraction of the free vibration of the other end.

The various features indicated in each of the embodiments of the present invention are also not necessarily specific to individual embodiments; rather, the features of each respective embodiment can be modified and used or combined and used as appropriate, whenever it is possible to utilize the benefits thereof. For example, in the first embodiment of FIG. 1, the second embodiment of FIG. 5, the third embodiment of FIG. 6, and the thirty-fifth embodiment of FIG. 55, the interior of the mobile telephone is provided with two piezoelectric bimorph elements respectively for right ear use and left ear use. However, examples in which each of a plurality of piezoelectric bimorph elements is provided to a plurality of places in the mobile telephone in order to obtain desired cartilage conduction from a plurality of directions are not to be limited to these embodiments. On the other hand, in the thirty-ninth embodiment of FIG. 61, the fortieth embodiment of FIG. 62, the second modification example of the forty-second embodiment in FIG. 65D, and the second modification example of the forty-third embodiment in FIG. 66D, a single primary vibration direction of the piezoelectric bimorph element is given an incline and the vibration component is divided in a case in which cartilage conduction is to be generated in a plurality of directions, such as between the side surface and the front surface or between the top surface and the front surface; however, configurations for generating cartilage conduction in a plurality of directions are not to be limited to these embodiments.

Forty-fifth Embodiment

FIG. 68 is a cross-sectional view relating to the forty-fifth embodiment according to an aspect of the present invention, and serves to illustrate another example relating to the configuration described above in which cartilage conduction is generated in a plurality of directions, such as between the side surface and front surface, and between the top surface and the front surface. Specifically, in a mobile telephone 4101*a* of the forty-fifth embodiment illustrated in FIG. 68A and a mobile telephone 4101*b* of a modification example thereof illustrated in FIG. 68B, two piezoelectric bimorph elements are utilized in imitation of the thirty-fifth embodiment of FIG. 55 and the like, instead of the dividing of the vibration component of a single piezoelectric bimorph elements such as in the fortieth embodiment of FIG. 62. Then, the primary vibration directions of these piezoelectric bimorph elements 4124 and 4126 are set off from each other by 90° so as to become parallel to the front surface and side surface or to the front surface and top surface, respectively, the bimorph elements being supported on the inner side of the chassis of the mobile telephone. Similarly with respect to the fortieth embodiment of FIG. 62, cartilage conduction is thereby generated in a plurality of directions, such as between the side surface and front surface or between the top surface and front surface. The configuration of the forty-fifth embodiment of FIG. 68 is shared with that of the fortieth embodiment of FIG. 62, other than the fact that two piezoelectric bimorph elements are utilized; therefore, identical portions have been given like reference numerals, and extraneous description has been omitted. It shall be noted that FIGS. 68A and 68B correspond to FIGS. 62A and 62C, respectively.

In FIG. 68, the longitudinal directions of the two piezoelectric bimorph elements illustrate a parallel arrangement, but the arrangement of the plurality of piezoelectric bimorph elements is not limited thereto. For example, another possible arrangement is one in which the longitudinal directions of the two piezoelectric bimorph elements are mutually orthogonal, where one is along the top surface and the other is along the side surface. Furthermore, the support of the plurality of piezoelectric bimorph elements in which the primary vibration directions are set off from each other is not limited to the inner side of the chassis of the mobile telephone as in FIG. 68; rather, for example, the support may be on the outer side of the chassis, as in the thirtieth and thirty-first embodiments and the modification examples thereof illustrated in FIGS. 48 to 50.

Forty-sixth Embodiment

FIG. 69 is a perspective view and a cross-sectional view relating to a forty-sixth embodiment according to an aspect of the present invention, and is configured as a mobile telephone 4201. The forty-sixth embodiment is consistent with the thirty-eighth embodiment illustrated in FIGS. 58 to 60, except for the arrangement of the cartilage conduction vibration source 2525, which is constituted of a piezoelectric bimorph element, and except for the holding structure thereof; therefore, the diagram does not contain those portions for which no description is needed, and of the illustrated portions, shared portions have been given like reference numerals, a description thereof having been omitted unless there is a particular need.

Figure 69B:
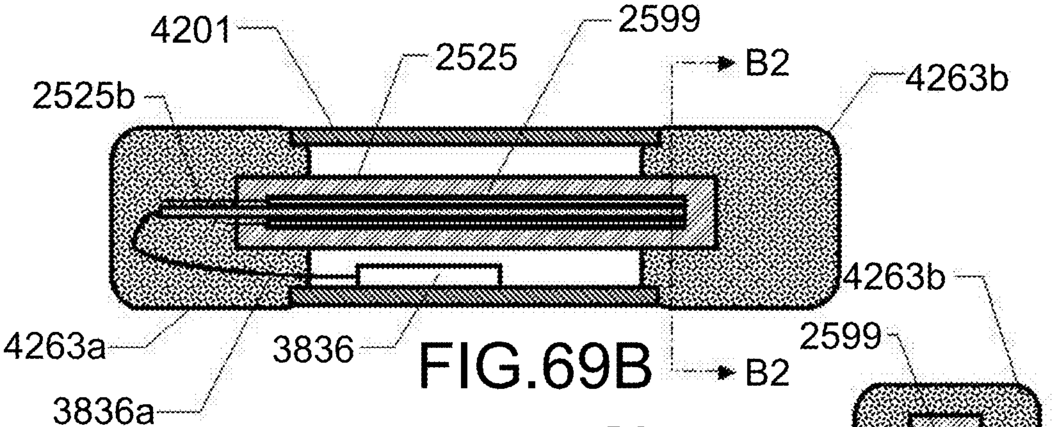
FIGS. 69A, 69B, and 69C are perspective views and a cross-sectional views relating to a forty-sixth embodiment according to an aspect of the present invention (forty-sixth embodiment)
Figure 69A:
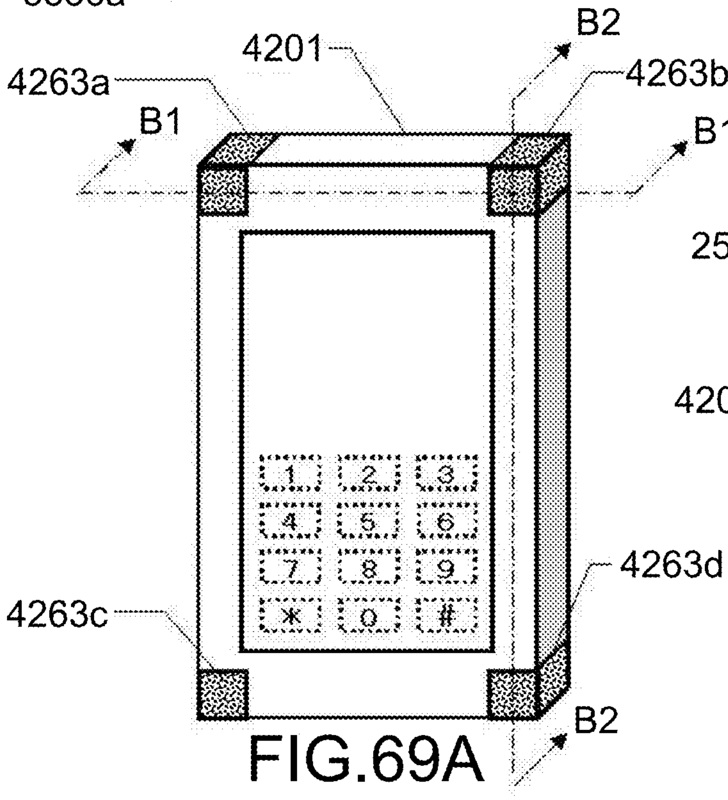

FIG. 69A is a perspective view in which the mobile telephone 4201 of the forty-fourth embodiment is viewed from the front surface; the four corner parts, which are susceptible to collision when the mobile telephone 4201 is dropped by mistake or in other circumstances, are provided with elastic body units 4263*a*, 4263*b*, 4263*c*, 4263*d*, which serve as protectors. The inner sides of the elastic body units 4263*a* and 4263*b* found at the two upper corner parts have a dual purpose as units for holding the piezoelectric bimorph element, and the outer sides of the elastic body units 4263*a* and 4263*b* have a dual purpose as cartilage conduction units for making contact with the ear cartilage. For this reason, at least the elastic body units 4263*a* and 4263*b* utilize an elastic material having an acoustic impedance approximating that of ear cartilage (a silicone rubber; a mixture of a silicone rubber and a butadiene rubber; a natural rubber; a structure formed using these varieties of rubber in which air bubbles are sealed; a structure, such as can be seen in transparent packaging sheet materials and the like, in which a layer of groups of air bubbles is sealed separated by a thin film of synthetic resin; or the like).

FIG. 69B is a cross-sectional view in the B1-B1 sectional plane of FIG. 69A, with a cross-section of the mobile telephone 4201 in the plane perpendicular to the front surface and the side surface. As is clear from FIG. 69B, the two ends of the piezoelectric bimorph element 2525 are supported by the inner sides of the elastic body units 4263*a* and 4263*b*. The elastic body unit 4263*a* supports the terminal 2525*b* side of the piezoelectric bimorph element 2525, and a flexible wiring 3836*a* for establishing a connection between the terminal 2525*b* and the circuit 3836 passes through the elastic body unit.

The elastic body units 4263*a* and 4263*b* are anchoringly supported on the chassis of the mobile telephone 4201, but the two ends of the piezoelectric bimorph element 2525 are ensured a certain degree of freedom to move by vibration, due to the elasticity of the elastic body units 4263*a* and 4263*b*, and the vibration of the piezoelectric bimorph element 2525 is less hampered. The middle part of the piezoelectric bimorph element 2525 is not in contact with anything and is free to vibrate. The outer sides of the elastic body units 4263*a* and 4263*b*, serve as an outer wall of the corner parts of the mobile telephone 4201, and have a dual purpose in acting as protectors for collisions with an external unit, and as cartilage conduction units for making contact with the ear cartilage. The mobile telephone 4201 can thereby be brought into contact with either of the right ear or the left ear for the purpose of cartilage conduction, as has been described in, for example, the first embodiment in FIGS. 2A and 2B. Furthermore, because the elastic body units 4263*a* and 4263*b* have a different acoustic impedance from that of the chassis of the mobile telephone 4201, the conduction component from the elastic body units 4263*a* and 4263*b* to the chassis of the mobile telephone 4201 can be reduced, and efficient cartilage conduction from the elastic body unit 4263*a* or 4263*b* to the ear cartilage can be achieved.

Figure 69C:
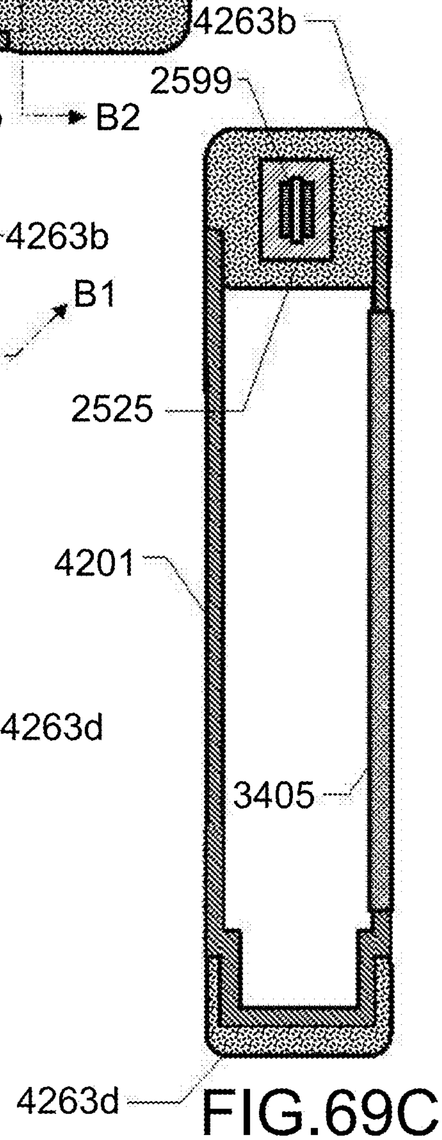

FIG. 69C is a cross-sectional view in the B2-B2 sectional plane illustrated in FIG. 69A or FIG. 69B, with a cross-section of the mobile telephone 4201 in the plane perpendicular to the front surface and the top surface. It can be understood from FIG. 69C as well that the elastic body units 4263*a* and 4263*b* hold the piezoelectric bimorph element 2525 and are anchoringly supported on the chassis of the mobile telephone 4201, and also that the outer sides thereof, without the outer wall of the corner parts of the mobile telephone 4201, serve as protectors for collisions with an external unit, and have a dual purpose as cartilage conduction units for making contact with the ear cartilage. As is clear from FIG. 69C, the forty-sixth embodiment assumes a structure in which the elastic body units 4263*c* and 4263*d*, which are at the lower two corners, function exclusively as protectors, and are covered by the chassis of the mobile telephone 4201.

Forty-seventh Embodiment

Figure 70A:
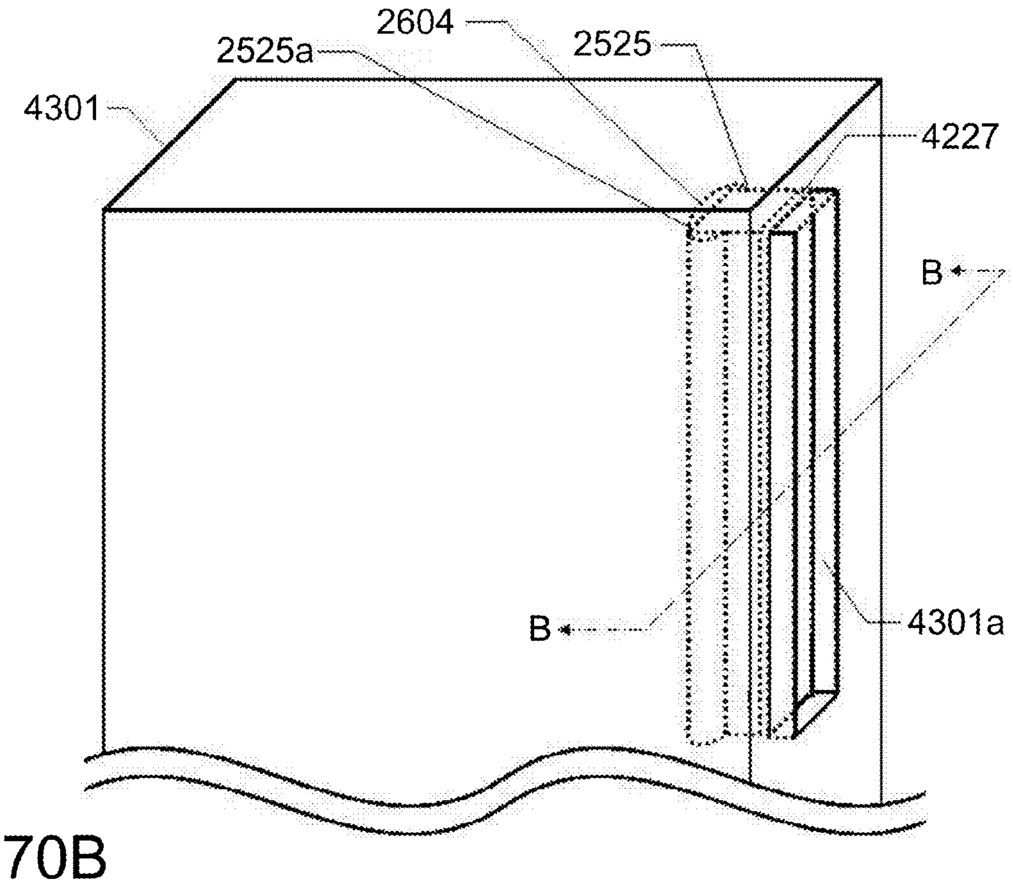
FIGS. 70A and 70B are perspective views and a cross-sectional views relating to a forty-seventh embodiment according to an aspect of the present invention (forty-seventh embodiment)
Figure 70B:
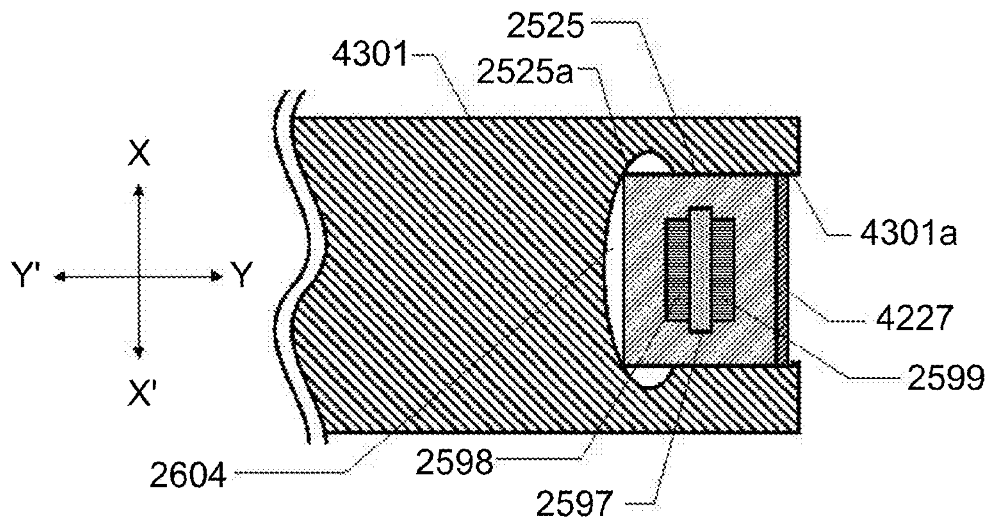

FIG. 70 relates to the forty-seventh embodiment according to an aspect of the present invention; FIG. 70A is a perspective view illustrating a part of the upper end side thereof, and FIG. 70B is a cross-sectional view illustrating the B-B cross-section of FIG. 70A. The seventieth embodiment is configured as a mobile telephone 4301, and assumes a structure in which the piezoelectric bimorph element 2525 is fitted into the side surface of the mobile telephone. Such a structure has much in common with the thirtieth embodiment illustrated in FIG. 48, and therefore common portions have been given like reference numerals, and a description thereof has been omitted. Further, similarly with respect to FIG. 48, FIG. 70 omits an illustration and description of the configuration for inputting an audio signal into the cartilage conduction vibration source 2525, and the like.

A point of difference in the forty-seventh embodiment of FIG. 70 from the thirtieth embodiment of FIG. 49 lies in the structure of the portions for transmitting the vibration of the piezoelectric bimorph element 2525 to the ear cartilage. Namely, in the forty-seventh embodiment of FIG. 70, the side surface of the mobile telephone 4301 is provided with a concavity 4301*a* that has a very slight step (for example, 0.5 mm), and is arranged such that the vibration plane of the piezoelectric element 2525 comes to a bottom part of this concavity 4301*a*. The vibration plane of the piezoelectric bimorph element 2525 may be exposed at the bottom part of the concavity 4301*a*, but in the forty-seventh embodiment, the piezoelectric bimorph element 2525 is covered with a thin protective layer 4227. This protective layer 4227 is applied or coated on with an elastic material, in order to prevent stretching of the vibration plane due to vibration of the piezoelectric bimorph element 2525 from being hampered.

Due to the structure described above, it is possible to bring the vibration plane of the piezoelectric bimorph element 2525 into direct contact with the ear cartilage wherever possible, and also it is possible to provide protection against damage to the piezoelectric bimorph element 2525 from any collision with an external unit. Specifically, the piezoelectric bimorph element 2525 is arranged at the bottom of the concavity 4301*a* and is at a position that is lower only by the step from the outer surface of the chassis of the mobile telephone 4301; because of the step, the piezoelectric bimorph element 2525 will not directly collide with an external unit even were the side surface of the chassis of the mobile telephone to collide with an external unit. As illustrated in FIG. 70A, in the forty-seventh embodiment, the concavity 4301*a* is provided to a place slightly lowered from the corner part in the side surface of the mobile telephone 4301, to prevent any damage to the piezoelectric bimorph element 2525 due to collision at the corner part. Ear cartilage is soft; therefore, it is readily deformed at the place of the very slight step and can be brought into contact with the vibration plane of the piezoelectric bimorph element 2525 or the covered surface thereof, even with an arrangement such that the vibration plane of the piezoelectric bimorph element 2525 comes to the bottom part of the concavity 4301*a*.

The various features indicated in the various embodiments of the present invention can be unrestrictedly modified, substituted or combined whenever the benefits thereof can be utilized. For example, the elastic body units 4263*a* and 4263*b* are arranged in the forty-sixth embodiment of FIG. 69 so as to be symmetrical relative to the center of the piezoelectric bimorph element 2525, but the support of the piezoelectric bimorph element 2525 is not to be limited to such an arrangement; another possible arrangement is an eccentric one in which the center of the piezoelectric bimorph element 2525 is closer to either of the opposing corner parts. For example, the piezoelectric bimorph element 2525, rather than being completely symmetrical relative to the center thereof, has a slightly different weight and degree of freedom to vibrate at the side that is not the side that has the terminal 2525*b*. The wiring 3836*a* also passes through the elastic body unit 4263*a* for supporting the terminal 2525*b*, and passes through to the circuit 3836. The configuration for eccentrically supporting the piezoelectric bimorph element 2525 between the two corner parts is effective in compensation for asymmetry such as described above. The respective lengths of the elastic body units 4263*a* and 4263*b* must be determined depending on the length of the piezoelectric bimorph element 2525 and on the width of the chassis of the mobile telephone 4201. In other words, the elastic body units 4263*a* and 4263*b* require enough length to reach up to the two ends of the piezoelectric bimorph element 2525 from the outer surface of the two corner parts of the chassis of the mobile telephone 4201. The configuration for eccentrically supporting the piezoelectric bimorph element 2525 between the two corner parts is effective in that the length can be adjusted as above while keeping the layout of the implemented parts inside the mobile telephone in consideration. In a case in which the elastic body unit 4263*a* or 4263*b* becomes longer, the configuration is such that the elastic body unit 4263*a* or 4263*b* is elongated inward so as not to make contact with the inner surface of the chassis, and reaches the end part of the piezoelectric bimorph element 2525, whereby it is also possible to increase the degree of freedom with which the end part of the piezoelectric bimorph element 2525 vibrates.

Figures 71A, 71B, 71C:
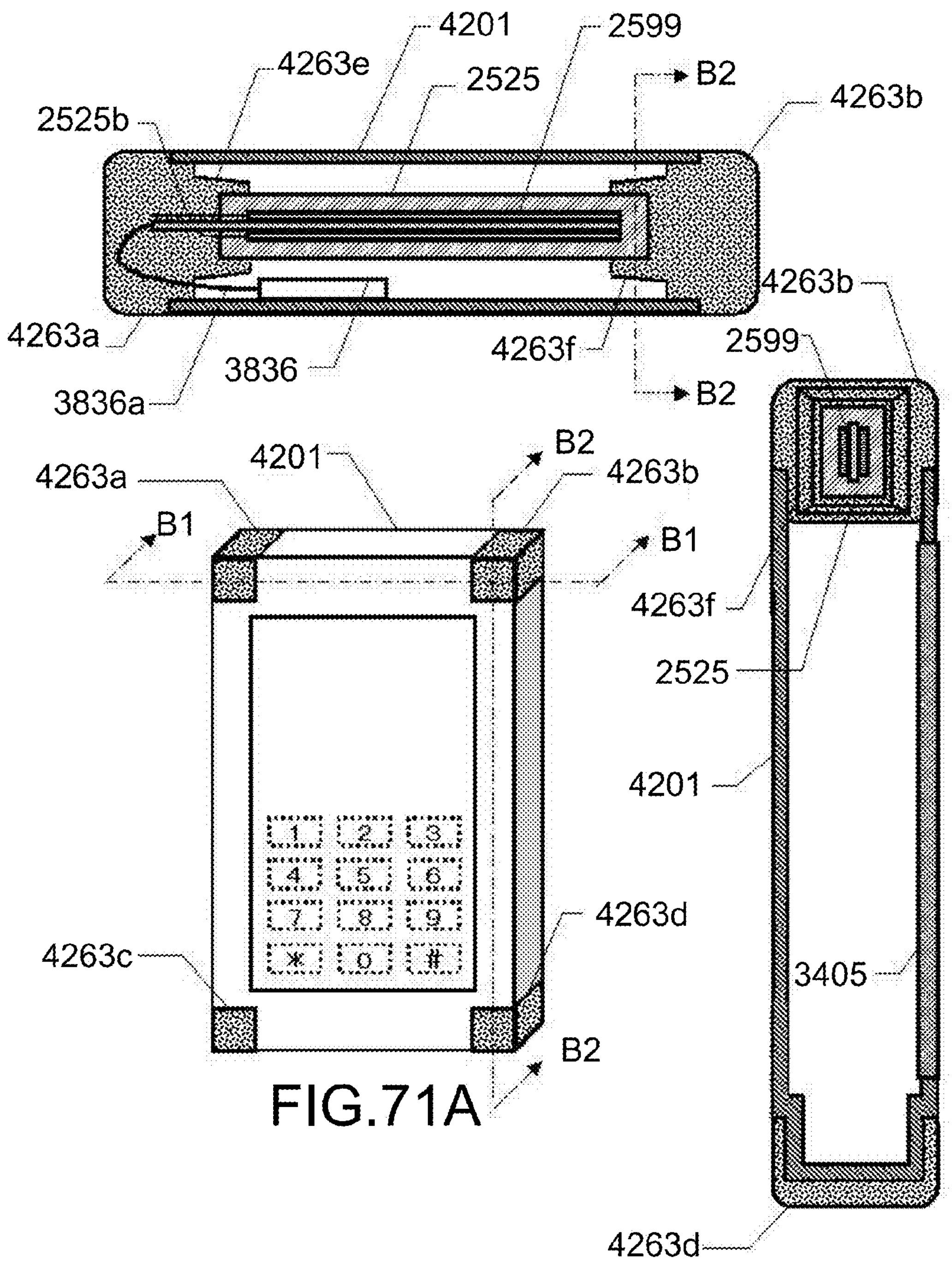
FIGS. 71A, 71B and 71C are perspective views and a cross-sectional views relating to a modification example of the forty-sixth embodiment according to an aspect of the present invention.

FIG. 71 is a perspective view and a cross-sectional view relating to a modification example of the forty-sixth embodiment according to an aspect of the present invention, and serves to illustrate the implementation of a configuration in a case in which the elastic body unit is longer, as described above. Specifically, a case in which, as illustrated in FIG. 71, the elastic body units 4263*a* and 4263*b* become longer utilizes a configuration in which there are provided elongation units 4263*e* and 4263*f*, by which the elastic body units 4263*a* and 4263*b* are elongated inward so as not to make contact with the inner surface of the chassis of the mobile telephone 4201, the two end parts of the piezoelectric bimorph element 2525 being held by these elongation units 4263*e* and 4263*f* According to such a configuration, the elongation units 4263*e* and 4263*f* do not make contact with the inner surface of the chassis of the mobile telephone 4201, and therefore elastic deformation is readily possible, and the two end parts of the piezoelectric bimorph element 2525 can be held by such elongation units 4263*e* and 4263*f*, whereby the degree of freedom with which the piezoelectric bimorph element 2525 vibrates can be increased. The configuration of FIG. 71 is otherwise consistent with that of FIG. 69, and therefore shared portions have been given like reference numerals, and a description thereof has been omitted.

The various features indicated in the various embodiments of the present invention can be unrestrictedly modified, substituted, or combined whenever the benefits thereof can be utilized. For example, each of the embodiments above has been described with the cartilage conduction vibration source comprising a piezoelectric bimorph element or the like. However, barring particular cases described as pertaining to a configuration specific to the piezoelectric bimorph element, the various features of the present invention are not to be limited to cases in which a piezoelectric bimorph element is utilized as the cartilage conduction vibration source; the advantages thereof can also be realized in a case in which an electromagnetic vibrating element, a super magnetostrictive element, or other diverse elements are used for the cartilage conduction vibration source.

Forty-Eighth Embodiment

Figures 72A, 72B, 72C, 72D, 72E:
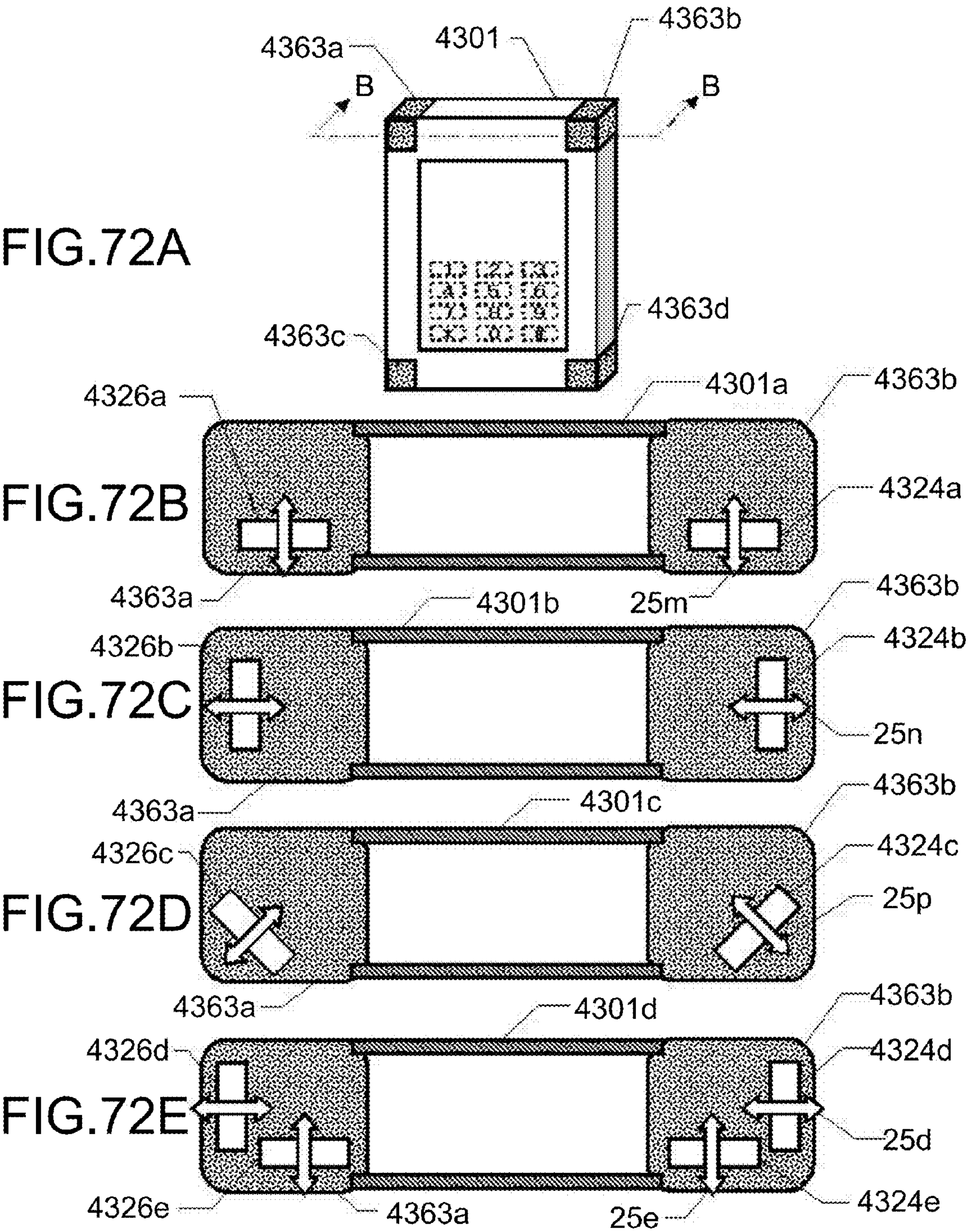
FIGS. 72A, 72B, 72C 72D and 72E are perspective views and a cross-sectional views relating to a forty-eighth embodiment according to an aspect of the present invention (forty-eighth embodiment)

FIG. 72 is a perspective view and a cross-sectional view relating to a forty-eighth embodiment according to an aspect of the present invention, and is configured as a mobile telephone 4301. The forty-eighth embodiment serves as an example of a case in which an electromagnetic vibrating element is used as the cartilage conduction vibration source in the configuration of the forty-sixth embodiment in FIG. 69. FIG. 72A is a perspective view in which the mobile telephone 4301 of the forty-eighth embodiment is viewed from the front surface thereof; the outer appearance is similar to that of the perspective view of the forty-sixth embodiment in FIG. 69A. In other words, in the forty-eighth embodiment as well the four corner parts, which are susceptible to collision when the mobile telephone 4301 is dropped by mistake or in other circumstances, are provided with elastic body units 4363*a*, 4363*b*, 4363*c*, and 4363*d*, which serve as protectors. The elastic body units 4363*a* and 4363*b*, which are at the upper two corners, have a dual purpose as units for holding the cartilage conduction vibration source, and the outer sides of the elastic body units 4363*a* and 4363*b* have a dual purpose as cartilage conduction units for making contact with the ear cartilage. Then, the elastic body units 4363*a* and 4363*b*, similarly with respect to the forty-sixth embodiment, utilize an elastic material having an acoustic impedance approximating that of ear cartilage (a silicone rubber; a mixture of a silicone rubber and a butadiene rubber; a natural rubber; a structure formed using these varieties of rubber in which air bubbles are sealed; a structure, such as can be seen in transparent packaging sheet materials and the like, in which a layer of groups of air bubbles is sealed separated by a thin film of synthetic resin; or the like).

FIG. 72B is a cross-sectional view in the B-B sectional plane of FIG. 72A, wherein the mobile telephone 4301 (represented as 4301*a* in FIG. 72B) is sectioned along the plane perpendicular to the front surface and the side surface. As is clear from FIG. 72B, each of electromagnetic vibrating elements 4326*a* and 4324*a* is embedded in the elastic body units 4363*a* and 4363*b*, respectively. The primary vibration direction thereof is the direction perpendicular to the front surface of the mobile telephone 4301 to which a GUI display unit is provided, as illustrated by arrow 25M. In the configuration in which the electromagnetic vibrating elements 4326*a* and 4324*a* or other cartilage conduction vibration sources are embedded in the elastic body units 4363*a* and 4363*b*, the elastic body units 4363*a* and 4363*b* have a dual purpose as a protector function and a cartilage conduction unit function, as described above, and also, as described in the embodiment of FIG. 17, additionally have yet another purpose as a cushioning function for guarding the cartilage conduction vibration source against impact.

In the configuration in which, as in the forty-eighth embodiment in FIG. 72B, the separate electromagnetic vibrating elements 4326*a* and 4324*a* are provided to the elastic body unit 4363*a* and 4363 respectively, the electromagnetic vibrating elements 4326*a* and 4324*a* can be controlled independently. Accordingly, similarly with respect to the first embodiment illustrated in FIGS. 1 to 4, the configuration can be made to be such that the inclined direction of the mobile telephone 4301 is detected according to the gravity acceleration detected by the acceleration sensor, and, in accordance with which of the elastic body units 4363*a* and 4363*b* is brought up against the ear (in other words, in accordance with against which among the right ear and left ear the corner part of the mobile telephone has been brought, as illustrated in FIG. 2), the electromagnetic vibrating element on the side at the lower angle of inclination is made to vibrate, and the other is turned off. This is also similar to a modification example that will be described later.

FIG. 72C is a cross-sectional view of the first modification example of the forty-eighth embodiment, and, similarly with respect to FIG. 72B, is a cross-sectional view in the B-B sectional plane of FIG. 72A, wherein the mobile telephone 4301 (represented as 4301*b* in FIG. 72C) is sectioned along the plane perpendicular to the front surface and the side surface. Similarly with respect to the forty-eighth embodiment, the first modification example also has the electromagnetic vibrating elements 4326*b* and 4324*b* embedded in the elastic body units 4363*a* and 4363*b*, respectively. However, the primary vibration direction thereof becomes the direction perpendicular to the side surface of the mobile telephone 4301, as illustrated by arrow 25N. This modification example is otherwise similar to the forty-eighth embodiment of FIG. 72B.

FIG. 72D is a cross-sectional view of the second modification example of the forty-eighth embodiment, and, similarly with respect to FIG. 72B, is a cross-sectional view in the B-B sectional plane of FIG. 72A, wherein the mobile telephone 4301 (represented as 4301*c* in FIG. 72D) is sectioned along the plane perpendicular to the rear surface and the side surface. In the second modification example, similarly with respect to the forty-eighth embodiment, each of the electromagnetic vibrating elements 4326*c* and 4324*c* is embedded in the elastic body units 4363*a* and 4363*b*, respectively. However, the primary vibration direction thereof becomes a direction inclined 45° from the side surface of the mobile telephone 4301, as illustrated by arrow 25P. For this reason, similarly with respect to the second modification example of the forty-third embodiment in FIG. 66D, the vibration components are broken down into the direction that is perpendicular to the side surface and to the direction that is perpendicular to the front surface, which is orthogonal thereto, and comparable cartilage conduction can be obtained regardless of the direction from which the either the elastic body unit 4363*a* or 4363*b* comes into contact with the ear cartilage. This modification example is otherwise similar to the forty-eighth embodiment of FIG. 72B.

FIG. 72E is a cross-sectional view of the third modification example of the forty-eighth embodiment, and, similarly with respect to FIG. 72B, is a cross-sectional view in the B-B sectional plane of FIG. 72A, wherein the mobile telephone 4301 (represented as 4301*d* in FIG. 72E) is sectioned along the plane perpendicular to the front surface and the side surface. In the third modification example, electromagnetic vibrating elements 4326*d*, 4326*e*, and 4324*d*, 4324*e* are embedded in the elastic body units 4363*a*, 4363*b*, respectively. The vibration direction of the electromagnetic vibrating elements 4326*d* and 4324*d* is the direction perpendicular to the side surface, illustrated by arrow 25D, and that of the electromagnetic vibrating elements 4326*e* and 4324*e* becomes the direction perpendicular to the front surface, illustrated by arrow 25E. Similarly with respect to the forty-fifth embodiment illustrated in FIG. 68, earplug bone conduction is thereby generated to the side surface and the front surface from a plurality of different cartilage conduction vibration sources.

In the configuration in which, as in the third modification example of the forty-eighth embodiment in FIG. 72E, vibration that is directed perpendicularly with respect to the side surface is generated from the electromagnetic vibrating element 4324*d* and the like and vibration that is directed perpendicularly with respect to the front surface is generated from the electromagnetic vibrating element 4324*e* and the like, it is possible to independently control the electromagnetic vibrating elements 4324*d* and 4324*e* having different vibration directions. Specifically, a possible configuration is one in which the incline direction of the mobile telephone 4301 is detected by gravity acceleration, which is detected by an acceleration sensor such as the acceleration sensor 49 of the first embodiment illustrated in FIG. 3, where, in accordance with whether the elastic body unit 4363*b* is brought up against the ear from the side surface or the front surface, the electromagnetic vibrating element on the side brought up against the ear is made to vibrate and the vibration of the other one is turned off. Such independent control of the plurality of cartilage conduction vibration sources having different vibration directions is not limited to the case of the electromagnetic vibrating elements in FIG. 72D; rather, there are other possible cases of configurations in which, for example, the piezoelectric bimorph elements 4124 and 4126 of the forty-fifth embodiment illustrated in FIG. 68 are utilized.

Figure 73A:
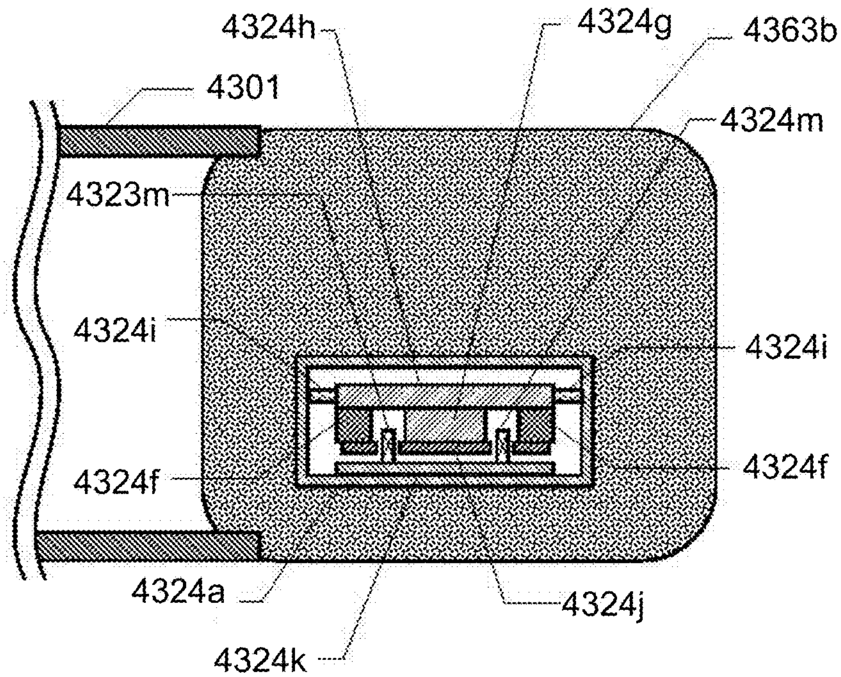
FIGS. 73A and 73B are enlarged cross-sectional views of the elements of the forty-eighth embodiment and a modification example thereof.

FIG. 73 is an enlarged cross-sectional view of the elements of the forty-eighth embodiment and the modification examples thereof. FIG. 73A enlarges the portions of the elastic body unit 4363*b* and the electromagnetic vibrating element 4324*a* of FIG. 72B, and in particular provides a detailed illustration of the electromagnetic vibrating element 4324*a*. The electromagnetic vibrating element 4324*a* has a yoke 4324*h* for holding a magnet 4324*f* and a central magnetic pole 4324*g* in a housing thereof, the yoke being suspended midair in a corrugation damper 4324*i*. A top plate 4324*j*, which has a gap, is anchored to the magnet 4324*f* and the central magnetic pole 4324*g*. The magnet 4324*f*, the central magnetic pole 4324*g*, the yoke 4324*h*, and the top plate 4324*j* become integrally movable in the vertical direction when viewed in FIG. 73 relative to the housing of the electromagnetic vibrating element 4324*a*. On the other hand, a voice coil bobbin 4324*k* is anchored to the inside of the housing of the electromagnetic vibrating element 4324*a*, and a voice coil 4323*m* wrapped therearound penetrates into the gap of the top plate 4324*j*. In such a configuration, when an audio signal is inputted into the voice coil 4323*m*, relative displacement occurs between the yoke 4324*h* and the like, and the housing of the electromagnetic vibrating element 4324*a*; the vibration thereof is transmitted to the ear cartilage in contact therewith via the elastic body unit 4363*b*.

Figure 73B:
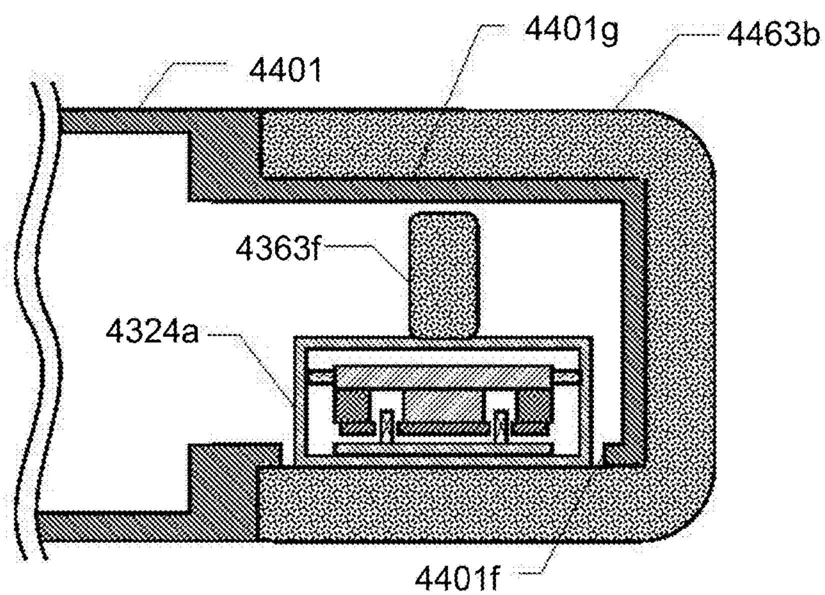

FIG. 73B illustrates a fourth modification example of the forty-eighth embodiment, and provides an enlarged illustration of the portions corresponding to FIG. 73A. The internal configuration of the electromagnetic vibrating element 4324*a* is similar to that of FIG. 73A; therefore, to avoid complication, an illustration of the reference numerals of each unit has been omitted, and the description thereof has also been left out. The fourth modification example in FIG. 73B assumes a configuration in which the corner part of the mobile telephone 4401 is provided with a stepped unit 4401*g*, the outer side thereof being covered by the elastic body unit 4463*b*. The front surface side of the stepped unit 4401*g* is provided with a window unit 4401*f*, the electromagnetic vibrating element 4324*a* being bonded to the rear side of the elastic body unit 4463*b* that faces the portion of the window unit 4401*f*. A cushioning unit 4363*f* comprising an elastic body is also bonded to the opposite side of the electromagnetic vibrating element 4324*a*. The cushioning unit 4363*f* is provided with a gap so as to not be in contact with the rear side of the stepped unit 4401*g* in the ordinary vibrating state, and acts as a cushioning material for preventing the elastic body unit 4463*b* thereabove from making contact with and being unrestrictedly pushed into the rear side of the stepped unit 4401*g* when there is an excessive push against the elastic body unit 4463*b* from collision with an external unit or the like. Adverse events such as when the electromagnetic vibrating element 4324*a* detaches due to deformation of the elastic body unit 4463*b* are thereby prevented. The cushioning unit 4363*f* functions as a balancer in the ordinary vibrating state, and therefore the shape and weight thereof or the like can be adjusted to design the electromagnetic vibrating element 4324*a* to have optimal acoustic properties. The cushioning unit 4363*f* may be a rigid body rather than an elastic body in a case of functioning only as a balancer. Although not depicted in FIG. 73B, the corner part of the opposite side in the fourth modification example of the forty-eighth embodiment (corresponding to the position of the elastic body unit 4363*a* in FIG. 72B) also assumes a configuration having left-right symmetry with FIG. 73B.

The fourth modification example in FIG. 73B is based on the arrangement of the electromagnetic vibrating elements in the orientation in FIG. 72B. However, a configuration such as that of the fourth modification is not limited thereto, and can also be applied to the arrangement of the electromagnetic vibrating elements in the various orientations in FIGS. 72C to 72E.

In the forty-eighth embodiment illustrated in FIGS. 72 and 73A, the elastic body unit 4363*b* and the electromagnetic vibrating element 4324*a* are configured as replaceable unit parts. When the outer appearance of the elastic body unit 4363*b* is sullied by collision with an external unit, in terms of aesthetics, the elastic body unit 4363*b* and the electromagnetic vibrating element 4324*a* can be replaced as a unit. This is a point of similarity with the fourth modification example of the forty-eighth embodiment illustrated in FIG. 73B as well; the elastic body unit 4463*b*, the electromagnetic vibrating element 4324*a*, and the cushioning unit 4363*f* are configured as a replaceable unit part. When the outer appearance of the elastic body unit 4463*b* is damaged in terms of aesthetics, the whole can be replaced as a unit. Such a configuration as a unit part is a useful feature that is consistent with the fact that the elastic body unit 4463*b* or the like is configured as a protector and is a part positioned at a corner part predicted to collide with an external unit. The configuration is also a useful feature that is consistent with the fact that the corner susceptible to collision is a suitable location for making contact for cartilage conduction. Furthermore, the feature in which the cartilage conduction vibration units are configured as replaceable unit parts is fundamentally consistent with the configuration of the other portions of the mobile telephone, and is useful in providing a commercial product to which cartilage conduction vibration units having acoustic properties that are optimized in accordance with the user's age or other parameters (for example, where the shape and/or weight of the cushioning unit 4363*f* illustrated in FIG. 73B are adjusted) are attached. The feature is also fundamentally consistent with the configuration of the other portions of the mobile telephone and is useful in providing a commercial product that can be modified not only for acoustic properties but also in accordance with user preferences; for example, in accordance with a request regarding which of the cartilage conduction vibration units from FIGS. 72B to 72E is used.

The specific configuration in which the cartilage conduction vibration source is provided to the elastic body unit of the corner part is not limited to what is illustrated in FIG. 73; the design can be modified where appropriate. For example, the cushioning unit 4363*f* illustrated in FIG. 73B may be bonded to the rear side of the stepped unit 4401*g*, instead of being bonded to the opposite side of the electromagnetic vibrating element 4324*a*. In such a case, the cushioning unit 4363*f* is provided with a gap so as to prevent contact with the opposite side of the electromagnetic vibrating element 4324*a* in the ordinary vibrating state. The cushioning unit 4363*f* may also be omitted in a case in which the elastic body unit 4463*b* is able to withstand pushing due to collision with an external unit or another cause.

The various features of each of the embodiments described above are not to be limited to the above embodiments; rather, wherever it is possible to benefit from the feature of an embodiment, same can also be implemented in other embodiments. The various features of each of the embodiments described above are not to be restricted to individual respective embodiments, but rather can be substituted or combined with other appropriate embodiments. The forty-eighth embodiment and the modification examples thereof serve as illustrations of examples in which the electromagnetic vibrating element is utilized as a cartilage conduction vibration unit and in which independently controllable and separate electromagnetic vibrating elements are provided to the elastic body units at different corners. However, the implementation of the present invention is not to be limited thereto. For example, in a case in which, as has already been described, a piezoelectric bimorph element is utilized as the cartilage conduction vibration unit, the cartilage conduction vibration units separately provided to different corners as in the first embodiment of FIG. 1 can be controlled independent of each other. In such a case, referring to the forty-eighth embodiment, the piezoelectric bimorph element can also be provided to the elastic body units at different corners. Conversely, even a case in which an electromagnetic vibrating element is utilized as the cartilage conduction vibration unit can be configured such that the vibration of a single electromagnetic vibrating element is transmitted to the left and right corners, as in the fourth embodiment of FIG. 7, the fifth embodiment of FIG. 11, the tenth embodiment of FIG. 19, the eleventh embodiment of FIG. 20, and the like. In such a case, referring to the forty-eighth embodiment, the vibration conductors to the left and right corner parts can be constituted of elastic bodies regardless of whether the cartilage conduction vibration unit is a piezoelectric bimorph element or an electromagnetic vibrating element. Also, referring to the forty-sixth embodiment and the modification examples thereof, the configuration may be such that the two sides of the electromagnetic vibrating element are supported by elastic bodies provided to the left and right corner parts, depending on the shape of the electromagnetic vibrating element.

Forty-ninth Embodiment

Figures 74A, 74B, 74C, 74D, 74E:
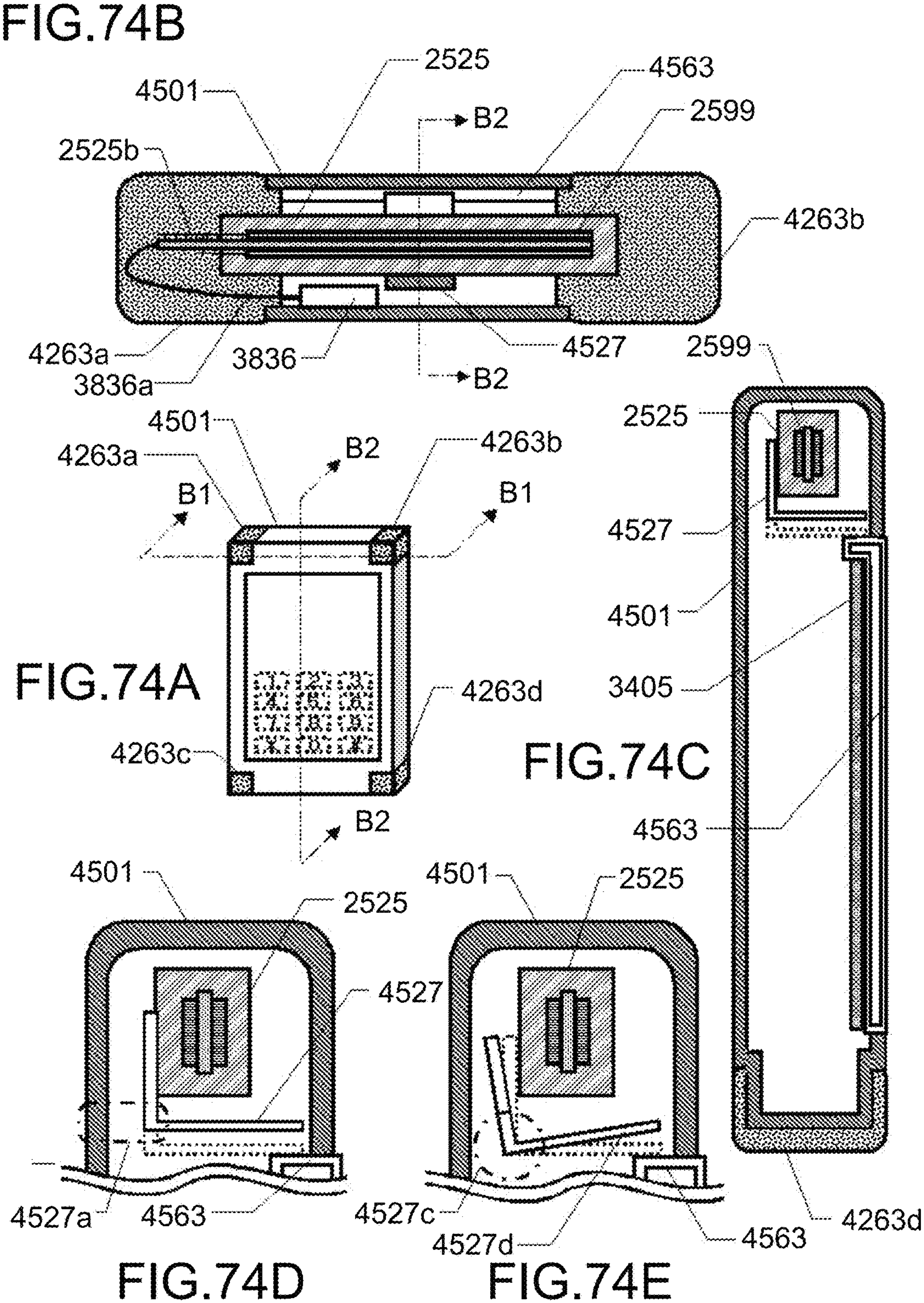
FIGS. 74A, 74B, 74C, 74D and 74E are perspective views and a cross-sectional views relating to a forty-ninth embodiment according to an aspect of the present invention, and a modification example thereof (forty-ninth embodiment)

FIG. 74 is a perspective view and a cross-sectional view relating to a forty-ninth embodiment according to an aspect of the present invention as well as to a modification example thereof, and is configured as a mobile telephone 4501. The forty-ninth embodiment is consistent with the forty-sixth embodiment of FIG. 69 except for the configuration for switching air conduction (to be described later); therefore, like reference numerals have been assigned and the description thereof is called upon. More specifically, the forty-ninth embodiment is illustrated in FIGS. 74A to 74D, of which FIGS. 74A to 74C correspond to FIGS. 69A to 69C, which relate to the forty-sixth embodiment. FIG. 74D is an enlarged view of the elements of FIG. 74C. FIG. 74E is an enlarged view of the elements relating to a modification of the forty-ninth embodiment.

As is clear from the B2-B2 cross-sectional view of FIG. 74C, the forty-ninth embodiment is provided with a transparent resonance chamber 4563 such that the display unit 3405 is covered. The transparent resonance chamber 4563 has air removal holes partially provided to the interior side of the mobile telephone 4501 in the hollow. The transparent resonance chamber 4563 is extremely thin, and therefore the user can observe the display unit 3405 through the transparent resonance chamber 4563. As is clear from FIGS. 74B and 74C, the middle portion of the piezoelectric bimorph element 2525 is provided with a vibration conductor 4527 that can slide in the vertical direction. When the vibration conductor 4527 is at the position indicated by the solid line illustrated in FIG. 74C, the transmission of vibration from the middle portion of the piezoelectric bimorph element 2525 to the transparent resonance chamber 4563 is cut off, and when the vibration conductor 4527 is at the position indicated by the dotted line in FIG. 74C and comes into contact with the upper part of the transparent resonance chamber 4563, the vibration of the middle portion of the piezoelectric bimorph element 2525 is transmitted to the transparent resonance chamber 4563 via the vibration conductor 4527, whereby air conduction sound is generated from the entire transparent resonance chamber 4563 and the entire transparent resonance chamber 4563 becomes a surface speaker. This aspect is clearly illustrated by the enlarged view of the elements of FIG. 74D. The up and down of the vibration conductor 4527 is performed by causing an external manual operation knob 4527*a* of the mobile telephone 4501 to slide up and down. The manual operation knob 4527*a* has a click function for determining the two up-down positions. The vibration conductor 4527 also is resilient so as to effectively make contact with the transparent resonance chamber 4563 when made to slide to the position of the dotted line.

As described above, air conduction sound is generated from the entire transparent resonance chamber 4563 and cartilage conduction is generated from the elastic body units 4263*a* and 4263*b* in the state in which the vibration conductor 4527 is at the position indicated by the dotted line in FIGS. 74C to 74D. The user can accordingly bring the elastic body unit 4263*a* or 4263*b* up against to ear to listen to sound by cartilage conduction, and can also bring any desired portion of the display unit 3405 to which the transparent resonance chamber 4563 is provided close to or up against the ear to listen to sound by air conduction. Thus, a variety of uses become possible in accordance with the user's preferences and status. On the other hand, the transmission of vibration to the transparent resonance chamber 4563 is cut off and the generation of air conduction sound from the transparent resonance chamber 4563 can be stopped in the state in which the vibration conductor 4527 is at the position indicated by the solid line illustrated in FIGS. 74C to 74D; therefore, because sound leakage by air conduction is prevented, particularly in the state in which the environment is quiet, it is possible to listen to sound by cartilage conduction while preventing any disturbance to the surroundings or leakage of sensitive information.

The modification example of the forty-ninth embodiment in FIG. 74E is configured such that a vibration conductor 4527*b* is made to rotate, whereby vibration from the middle portion of the piezoelectric bimorph element 2525 is intermittently transmitted to the transparent resonance chamber 4563. Specifically, when the vibration conductor 4527*b* is at the position indicated by the solid line illustrated in FIG. 74E, the vibration conductor 4527*b* separates from both the middle portion of the piezoelectric bimorph element 2525 and the transparent resonance chamber 4563, and the transmission of vibration is cut off. On the other hand, when the vibration conductor 4527*b* is rotated clockwise and is at the position indicated by the dotted line in FIG. 74E, the vibration conductor 4527*b* is in contact with both the middle portion of the piezoelectric bimorph element 2525 and the upper part of the transparent resonance chamber 4563, and the vibration of the middle portion of the piezoelectric bimorph element 2525 is transmitted to the transparent resonance chamber 4563 via the vibration conductor 4527*b*. This modification example is otherwise similar to the forty-ninth embodiment of FIGS. 74A to 74D. The rotation of the vibration conductor 4527*b* is performed by the rotation of an external manual operation dial 4527*c* of the mobile telephone 4501. The manual operation dial 4527*c* has a click function for determining the two positions of the rotation. The vibration conductor 4527*b* is resilient as well, and, when rotated to the position of the dotted line, presses effectively against the middle portion of the piezoelectric bimorph element 2525 and the upper part of the transparent resonance chamber 4563.

Switching between cartilage conduction and air conduction in the manner described above is not to be limited to the forty-ninth embodiment illustrated in FIG. 74 and to the modification examples thereof various configurations are possible. For example, in FIG. 74, the piezoelectric bimorph element 2525 and the transparent resonance chamber 4563 are secured, and the vibration conductor 4527 or 4527*b* is moved therebetween, whereby intermittent vibration is performed. However, intermittent vibration between the two can also be performed instead by rendering at least one of the piezoelectric bimorph element 2525 and the transparent resonance chamber 4563 movable. The movement at this time may be performed by at least a part of either the piezoelectric bimorph element 2525 or the transparent resonance chamber 4563. Furthermore, FIG. 74 serves to illustrate an example of switching between the case of cartilage conduction together with air conduction and the case of only cartilage conduction (to be precise, there is also a slight air conduction component, but for the sake of simplicity, this case is hereinafter referred to as "only cartilage conduction"), but another possible configuration is one in which, in exchange, the switching is between a case of only cartilage conduction and a case of only air conduction or the switching is between a case of cartilage conduction together with air conduction and a case of only air conduction. Also, FIG. 74 serves to illustrate an example of manual switching, but another possible configuration is one in which a noise sensor for differentiating between whether the environment is quiet or not is provided and the vibration conductor 4527 or 4527*b* is automatically driven on the basis of the output of the noise sensor, whereby a case of cartilage conduction together with air conduction is automatically switched to a case of cartilage conduction only when the noise detected by the noise sensor is at or above a predetermined level.

Fiftieth Embodiment

Figure 75:
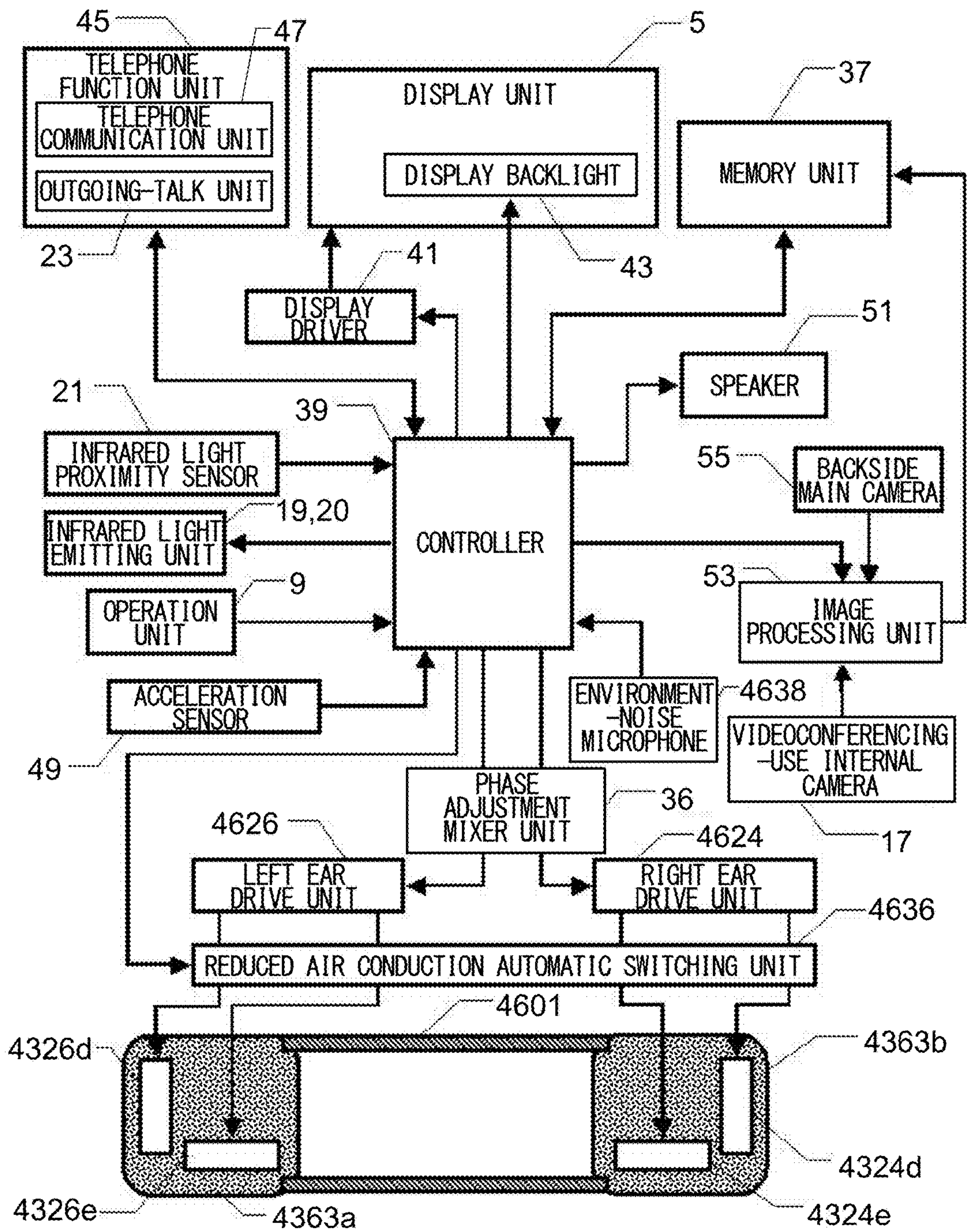
FIG. 75 is a block diagram combining a partial cross-sectional view relating to a fiftieth embodiment according to an aspect of the present invention (fiftieth embodiment)

FIG. 75 is a block diagram relating to a fiftieth embodiment according to an aspect of the present invention, and is configured as a mobile telephone 4601. The fiftieth embodiment is based on the configuration of the third modification example of the forty-eighth embodiment, the cross-section of which is illustrated in FIG. 72E; the electromagnetic vibrating elements 4326*d*, 4326*e*, 4324*d*, and 4324*e* thereof are controlled by a configuration that is substantially consistent with the block diagram of the first embodiment in FIG. 3. In terms of the need to describe the arrangement, the portions of the electromagnetic vibrating elements are illustrated by a composite of the cross-sectional views. Because the fiftieth embodiment is configured as described above, portions in FIG. 75 that are shared with FIGS. 3 and 72E are assigned shared reference numerals, and a description thereof has been left out, except where necessary. The fiftieth embodiment is not provided with any incoming-talk unit other than the electromagnetic vibrating elements 4326*d*, 4326*e*, 4324*d*, and 4324*e*, and therefore the phase adjustment mixer unit 36, a right ear drive unit 4624, a left ear drive unit 4626, a reduced air conduction automatic switching unit 4636, and the electromagnetic vibrating elements 4326*d*, 4326*e*, 4324*d*, and 4324*e* (which are illustrated in FIG. 75) constitute the incoming-talk unit in the telephone function unit 45 (which in FIG. 3 is the incoming-talk unit 13). The fiftieth embodiment configured in the manner described above assumes separate embodiments relating to the switch between cartilage conduction and air conduction illustrated in the forty-ninth embodiment, the switch being performed both electrically and automatically. The following description focuses on this point.

As described in FIG. 72E as well, the fiftieth embodiment of FIG. 75 assumes a configuration in which cartilage conduction is respectively generated from a plurality of different electromagnetic vibrating elements 4326*e*, 4326*d*, 4324*e*, and 4324*d*, to the side surface and the front surface. The pair of electromagnetic vibrating elements 4326*d* and 4326*e*, which are embedded in the elastic body unit 4363*a*, are controlled by the left ear drive unit 4262, and the pair of electromagnetic vibrating elements 4324*d* and 4324*e*, which are embedded in the elastic body unit 4363*b*, are controlled by the right ear drive unit 4264. In such a configuration, similarly with respect to the first embodiment, the acceleration sensor 49 is used to detect which of the elastic body unit 4363*a* and the elastic body unit 4363*b* is in a state of being brought up against an ear, where either the right ear drive unit 4624 or the left ear drive unit 4626 is turned on and the other is turned off. In addition, either the pair of electromagnetic vibrating elements 4326*d* and 4326*e* or the pair of electromagnetic vibrating elements 4324*d* and 4324*e* is rendered able to vibrate and the other is rendered unable to vibrate.

The fiftieth embodiment of FIG. 75 is further provided with an environment-noise microphone 4638 for differentiating between whether or not the environment is quiet. When the noise detected by the environment-noise microphone 4638 is at or above a predetermined level, the reduced air conduction automatic switching unit 4636 functions according to a command from the controller 39 and causes the pair of electromagnetic vibrating elements 4326*d* and 4326*e* or the pair of electromagnetic vibrating elements 4324*d* and 4324*e* to vibrate. On the other hand, in a quiet situation, which is determined by the controller 39 when the noise detected by the environment-noise microphone 4638 is at or below a predetermined level, only the electromagnetic vibrating element 4326*d* or the only the electromagnetic vibrating element 4324*d* is made to vibrate, according to the function of the reduced air conduction switching unit 4636, and the vibration of the electromagnetic vibrating elements 4326*e* and 4324*e* is stopped. However, for the purpose of detecting the magnitude of environment noise, instead of there being separately provided a dedicated environment-noise microphone 4638 such as in FIG. 75, the microphone output in the outgoing-talk unit 23 of the telephone function unit 45 may be used to extract the noise component. The extracting can be performed by analyzing the frequency spectrum of the microphone output, utilizing the microphone output from when audio is interrupted, or the like.

The following is a description of the significance of the configuration described above. As illustrated in FIG. 72E as well, the vibration direction of the electromagnetic vibrating elements 4326*d* and 4324*d* in the fiftieth embodiment of FIG. 75 is the direction perpendicular to the side surface, and the vibration direction of the electromagnetic vibrating elements 4326*e* and 4324*e* is the direction perpendicular to the front surface. Because the electromagnetic vibrating elements 4326*e* and 4324*e* vibrate in the direction perpendicular to the front surface on which the display unit 5 or the like is arranged, the entire front surface, which in the mobile telephone 4601 has a large surface area, resonates and has a larger vibration component than the vibration of the side surface from the electromagnetic vibrating elements 4326*d* and 4324*d*. For this reason, and with respect to the forty-ninth embodiment, the case in which the pair of electromagnetic vibrating elements 4326*e* and 4326*d* vibrate or the case in which the pair of electromagnetic vibrating elements 4324*e* and 4324*d* vibrate corresponds to the "case of cartilage conduction plus air conduction." On the other hand, the case in which only the electromagnetic vibrating element 4326*d* vibrates or the case in which only the electromagnetic vibrating element 4324*d* vibrates corresponds to the "case of cartilage conduction only." However, a certain amount of an air conduction component remains in the "case of cartilage conduction only," as has been described in the forty-ninth embodiment, and therefore the distinction between these cases is based on a strictly relative comparison of the size of the air conduction component.

As has been described above, in a case in which the electromagnetic vibrating elements 4326*e* and 4326*d* vibrate or in a case in which the electromagnetic resonators 4324*e* and 4324*d* vibrate, the user can bring the elastic body unit 4263*a* or 4263*b* against the ear to listen to sound by cartilage conduction, and can also bring any desired portion of the front surface of the mobile telephone 4601 close to or up against the ear to listen to sound by air conduction. Thus, a variety of uses become possible in accordance with the user's preferences and status. On the other hand, in a case in which only the electromagnetic vibrating element 4326*d* vibrates or in a case in which only the electromagnetic vibrating element 4324*d* vibrates, because relatively less air conduction is generated and sound leakage by air conduction is prevented, particularly in the state in which the environment is quiet, it is possible to listen to sound by cartilage conduction while preventing any disturbance to the surroundings or leakage of sensitive information. In the fiftieth embodiment, air conduction is automatically reduced in a state in which the environment is quiet, due to the functions of the environment-noise microphone 4638 and the reduced air conduction automatic switching unit 4636.

Although the fiftieth embodiment of FIG. 75 is configured using electromagnetic vibrating elements, the configuration for electrically and automatically switching between cartilage conduction and air conduction is not limited to the case in which the electromagnetic vibrating elements are used as cartilage conduction vibration sources. For example, as in the forty-fifth embodiment of FIG. 68, in a case in which a plurality of independently controllable piezoelectric bimorph elements are provided to mutually different directions, the same can be automatically controlled in conformity with the fiftieth embodiment. Another possible configuration in the fiftieth embodiment of FIG. 75 is one in which a transparent resonance chamber 4563 for generating air conduction is provided, such as in the forty-ninth embodiment of FIG. 74, and one or both of the electromagnetic vibrating element 4326*e* and the electromagnetic vibrating element 4324*e* is brought into constant contact with such a transparent resonance chamber 4563, whereby air conduction is actively generated from the front surface of the mobile telephone 4601.

The various features of the embodiments described above are not limited to implementation in the aforedescribed embodiments, and may be implemented in other aspects as well, provided that the advantages thereof can be enjoyed by doing so. Moreover, the various features of the embodiments are not limited to implementation in their individual embodiments, and combinations which incorporate features of other embodiments, as appropriate, are acceptable. For example, in the present invention, ear-contacting units for cartilage conduction are provided to the corner parts of the mobile telephone. This feature will now be considered, for example, for the mobile telephone 301 configured as a smartphone as in the fourth embodiment of FIG. 7 (which hereinafter is referred to as the smartphone 301, for the sake of simplicity). The smartphone 301 as in FIG. 7 has a large-screen display unit 205 provided with GUI functions on the front surface thereof, and assumes an arrangement in which an ordinary incoming-talk unit 13 is relegated to the upper angled region of the smartphone 301. Moreover, since the ordinary incoming-talk unit 13 is provided to the middle portion of the part of the smartphone 301, there is assumed an arrangement in which it is difficult to bring the large-screen display unit 205 up against the cheek bone and to bring the incoming-talk unit 13 close to the ear in a case in which the smartphone 301 is brought up against the ear; and pressing the ordinary incoming-talk unit 13 strongly against the ear so that the voice of the other party can be better heard incurs a result where the large-screen display unit 205 is in contact with the ear or cheek and is fouled by sebum or the like. By contrast, when the right ear vibration unit 224 and the left ear vibration unit 226 are arranged at the corner parts of the smartphone 301 in FIG. 7, as is illustrated in FIG. 2 which relates to the first embodiment, the corner parts of the smartphone 301 are accommodated in the recess around the entrance to the external auditory meatus in the vicinity of the tragus 32. It thereby becomes possible to readily push the audio output unit of the smartphone 301 against the area around the entrance to the external auditory meatus, and contact made by the large-screen display unit 205 with the ear or cheek can be naturally avoided even in a case of strong pushing. Such an arrangement of the audio output unit at the corner part of the mobile telephone is not limited to the case of using cartilage conduction, and is useful also in a case of an incoming-talk unit that uses an ordinary air conduction speaker. In such a case, air conduction speakers for right ear use and left ear use are preferably provided to the two corners of the upper part of the smartphone.

As has already been described, cartilage conduction conducts differently depending on the amount of force pushing on the cartilage, and a state of effective conduction can be obtained by increasing the amount of force that is pushing. This means that when it is difficult to hear the incoming sound, a natural behavior such as increasing the force pushing the mobile telephone against the ear can be utilized to adjust the volume. Furthermore, when the amount of pushing force is increased until a state in which the hole of the ear is obstructed, the volume is further increased due to the earplug bone conduction effect. Even when such a function is not explained to the user in, for example, the instruction manual, the user can still intuitively understand the function through natural behavior. Such an advantage in terms of usage can also be achieved in an artificial sense in a case of an incoming-talk unit in which an ordinary air conduction speaker is used, without the cartilage conduction vibration unit being used as the audio output unit, and can serve as a useful feature of the mobile telephone.

Fifty-first Embodiment

Figure 76:
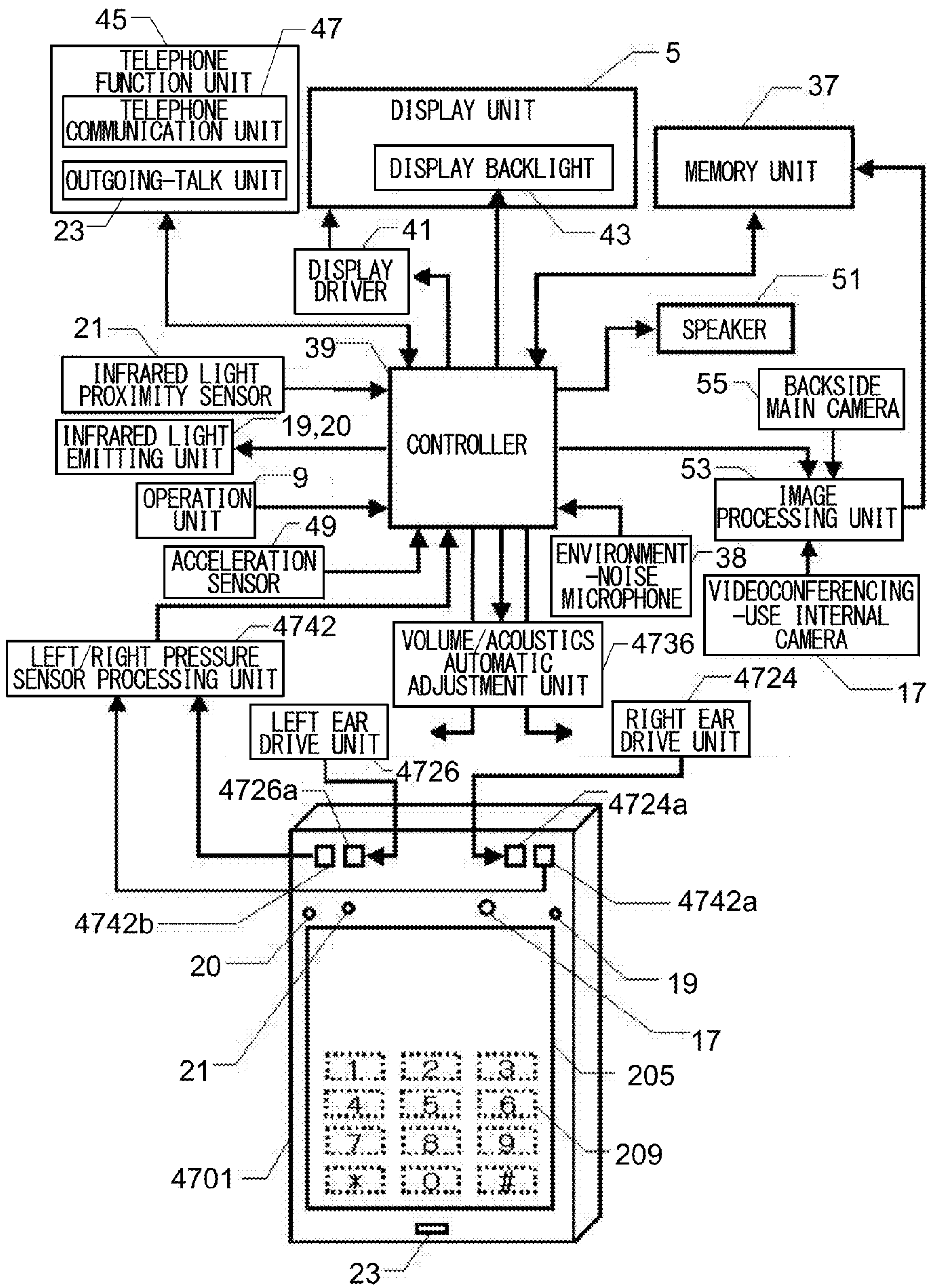
FIG. 76 is a block diagram combining a partial cross-sectional view relating to a fifty-first embodiment according to an aspect of the present invention (fifty-first embodiment)

FIG. 76 is a block diagram relating to a fifty-first embodiment according to an aspect of the present invention, and is configured as a mobile telephone 4701. The fifty-first embodiment does not utilize a cartilage conduction vibration unit as the audio output unit as described above but rather uses an ordinary air conduction speaker, and is configured such that automatic volume adjustment can be artificially achieved by a natural behavior. In terms of the need to describe the arrangement of the outer appearance, a composite schematic view of the mobile telephone is illustrated in the block diagram. The majority of the block diagram of FIG. 76 is consistent with the first embodiment of FIG. 3, and the majority of the general overview is consistent with the fourth embodiment of FIG. 7; therefore, portions in common have been given like reference numerals, and a description thereof has been left out except where necessary. A volume/acoustics automatic adjustment unit 4736, a right ear drive unit 4724, a left ear drive unit 4726, a right ear air conduction speaker 4724*a*, and a left ear air conduction speaker 4726*a* illustrated in FIG. 76 constitute the incoming-talk unit in the telephone function unit 45 (which in FIG. 3 is the outgoing-talk unit 13).

The right ear air conduction speaker 4724*a* of the fifty-first embodiment in FIG. 76 is controlled by the right ear drive unit 4524, and the left ear air conduction speaker 4726*a* is controlled by the right ear drive unit 4526. Also, similarly with respect to the fiftieth embodiment, the acceleration sensor 49 is used to detect which of the right ear air conduction speaker 4724*a* and the left ear air conduction speaker 4726*a* is in a state of being brought up against an ear, where either the right ear drive unit 4524 or the left ear drive unit 4526 is turned on and the other is turned off. In addition, either the right ear air conduction speaker 4724*a* or the left ear air conduction speaker 4726*a* is turned on and the other is turned off A right ear pressure sensor 4742*a* and a left ear pressure sensor 4742*b* are respectively provided to the vicinity of the right ear air conduction speaker 4724*a* and the left ear air conduction speaker 4726*a* and detect pressure on whichever of the right ear air conduction speaker 4724*a* or left ear air conduction speaker 4726*a* is turned on. A left/right pressure sensor processing unit 4742 analyzes the magnitude of the detected pressure and sends volume/acoustics control data to the controller 39. The controller 39 commands a volume/acoustics automatic adjustment unit 4736 on the basis of the volume/acoustics control data and automatically adjusts the volume of whichever of the right ear drive unit 4524 or left ear drive unit 4526 is on. The volume is basically adjusted such that the volume increases with an increase in pressure and, when it is difficult to listen to the incoming-talk unit sound, is set so as to be a suitable response to a natural behavior such as increasing the force pushing the mobile telephone 4701 against the ear.

A supplementary detailed description of the function of the volume/acoustics automatic adjustment unit 4736 will now be provided. To avoid unstable volume changes due to changes in pressure, first, volume changes are configured such that the volume only undergoes stepwise changes in the increasing direction and in accordance only with an increase in pressure. Furthermore, to avoid unintentional volume changes, the volume/acoustics automatic adjustment unit 4736 is configured such that volume increases in a stepwise manner in reaction only to when a predetermined pressure increase lasts on average for a predetermined period of time (for example, 0.5 seconds) or longer. The volume/acoustics automatic adjustment unit 4736 is also configured such that volume is instantaneously lowered to a baseline state in a case in which it is detected that the state in which the pressure has fallen to a predetermined value (corresponding to the state in which whichever of the right ear air conduction speaker 4724*a* or left ear air conduction speaker 4726*a* is turned on is brought away from the ear) or lower has lasted for a predetermined period of time (for example, 1 second) or longer. The user is thereby able to intentionally bring the mobile telephone 4701 slightly away from the ear in a case in which the volume has been excessively increased or the like (which is also consistent with a natural operation such as bringing a sound source away from the ear when the sound is too loud), and once the volume has been reset to the baseline state, the force of the pressure is again increased to achieve a desired volume.

The volume/acoustics automatic adjustment unit 4736 is further able to automatically adjust the acoustics. This function is related to the environment-noise microphone 38 described in relation to the first embodiment in FIG. 3. Namely, in the first embodiment, the environment noise picked up by the environment-noise microphone 38, is mixed into the right-ear cartilage-conduction vibration unit 24 and the left-ear cartilage-conduction vibration unit 26 upon undergoing wavelength inversion; the environment noise, which is contained in the audio information through the incoming-talk unit 13, is canceled and the audio information of the party on the line becomes easier to comprehend through listening. The volume/acoustics automatic adjustment unit 4736 in the fifty-first embodiment utilizes this function to turn the noise-canceling function off when the pressure is equal to or less than a predetermined value and to turn the noise-canceling function on when the pressure is equal to or above a predetermined value. The degree to which the environment noise inversion signal is mixed can also be adjusted in a stepwise manner, whereby the noise-canceling function, rather than merely being turned on and off, can also undergo continuous or stepwise increases and decreases. Thus, the volume/acoustics automatic adjustment unit 4736 is capable of automatically adjusting not only the volume but also the acoustics, on the basis of the output of the left/right pressure sensor processing unit 4742. The fifty-first embodiment of FIG. 76 is an embodiment that serves to illustrate that the aforementioned advantage, in which the right ear audio output unit and the left ear audio output unit are arranged at the corner parts of the smartphone, is not limited to a case in which cartilage conduction is used; benefits may also accrue therefrom in a case in which an outgoing-talk unit using ordinary air conduction speakers is utilized.

The various features of the embodiments described above are not limited to implementation in the aforedescribed embodiments, and may be implemented in other aspects as well, provided that the advantages thereof can be enjoyed by doing so. Moreover, the various features of the embodiments are not limited to implementation in their individual embodiments, and combinations which incorporate features of other embodiments, as appropriate, are acceptable. The various features of each of the embodiments described above are not to be limited to the above embodiments; rather, wherever it is possible to benefit from the feature of an embodiment, the same can also be implemented in other embodiments. The various features of each of the embodiments are not to be restricted to individual respective embodiments, but rather can be substituted or combined with other appropriate embodiments. For example, in the fifty-first embodiment of FIG. 76, a determination is made as to which of the right ear air conduction speaker 4724*a* or left ear air conduction speaker 4726*a* is to be turned on according to the output of the acceleration sensor 49, but the configuration may be such that the outputs of the right ear pressure sensor 4742*a* and left ear pressure sensor 4742*b* are used to turn on whichever of the right ear air conduction speaker 4724*a* or left ear air conduction speaker 4726*a* has more pressure, and to turn the other off Also, the fifty-first embodiment of FIG. 76 is provided with the right ear air conduction speaker 4724*a* and the left ear air conduction speaker 4726*a* as well as the right ear pressure sensor 4742*a* and left ear pressure sensor 4742*b* corresponding thereto, but when there is only the purpose of automatic volume/acoustics adjustment by pressure, then a single conventional air conduction speaker may be provided to the middle of the upper part of the mobile telephone, and a single pressure sensor may be provided correspondingly with respect thereto. Furthermore, the fifty-first embodiment of FIG. 76 has illustrated how environment noise is canceled out by waveform inversion as a fundamental configuration of the automatic adjustment of acoustics by the volume/acoustics automatic adjustment unit 4736, but such a configuration is not provided by way of limitation. For example, the configuration may be such that the volume/acoustics automatic adjustment unit 4736 is provided with a filter for cutting out environment noise (for example, a low-frequency-band-cutting filter), the filter being turned off when the pressure is at or below a predetermined value and the filter function being turned on when the pressure is at or above a predetermined value. The configuration may also be such that, instead of a low-frequency band or the like being cut out by the filter, the gain of the low-frequency band is dropped (or the gain of a high frequency area is raised). The filter function or the frequency-band-selective gain function can also be adjusted in a stepwise manner, whereby the filter function or the frequency-selective gain function, rather than merely being turned on and off, can also alter the environment noise reduction capability in a stepwise or continuous manner in accordance with the pressure.

[Modes for Carrying out the Invention]

[Fifty-second Embodiment]

Figure 77:
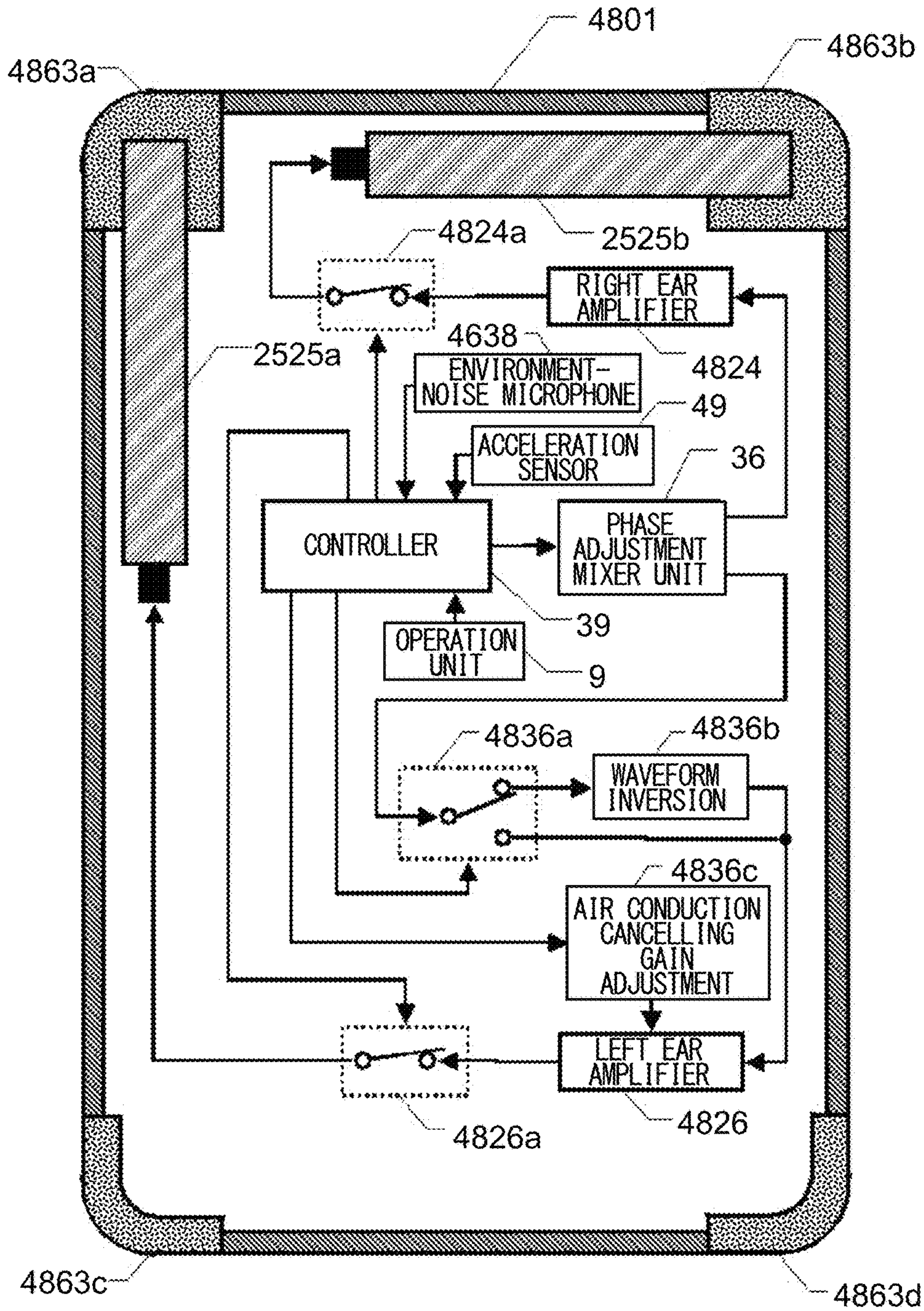
FIG. 77 is a cross-sectional view and interior block diagram relating to a fifty-second embodiment according to an aspect of the present invention (fifty-second embodiment)

FIG. 77 is a cross-sectional view relating to a fifty-second embodiment according to an aspect of the present invention, and is configured as a mobile telephone 4801. FIG. 77 provides a cross-sectional view of the mobile telephone 4801, depicted in order to describe the support structure and arrangement of piezoelectric bimorph elements 2525*a* and 2525*b* serving as cartilage conduction vibration sources, while the interior of the cross-sectional view, which relates to the control of the mobile telephone, depicts not an actual arrangement but rather a block diagram. The block diagram portion, being founded on the block diagram of the first embodiment illustrated in FIG. 3, essentially omits a depiction of shared portions, with the exception of those needed to understand the interrelationships, and like portions, when depicted, have been assigned like reference numerals, a description thereof being omitted unless needed.

The fifty-second embodiment of FIG. 77, similarly with respect to the forty-ninth embodiment of FIG. 74 and the fiftieth embodiment of FIG. 75, is configured as an embodiment permitting the interchange of "the case of cartilage conduction plus air conduction" and "the case of cartilage conduction only. "Further, the fifty-second embodiment of FIG. 77, similarly with respect to the forty-sixth embodiment of FIG. 69, has elastic body units 4863*a*, 4863*b*, 4863*c*, and 4863*d* serving as protectors provided to the four corners susceptible to impact when the mobile telephone 4801 is accidentally dropped. However, rather than a two-sided support structure for the elastic body units 4863*a*, 4863*b* to support the piezoelectric bimorph elements 2525*a* and 2525*b*, a single side thereof is supported on a cantilever structure, similarly with respect to the forty-second embodiment of FIG. 65 and the forty-third embodiment of FIG. 66. As above, the fifty-second embodiment of FIG. 77 is related to features of various embodiments having already been described, wherefore a repetitive description of the individual features has been avoided unless needed, since the same are readily understood from the descriptions of the corresponding embodiments.

First, the structure and arrangement of the fifty-second embodiment of FIG. 77 will now be described. As has already been mentioned, the four corners of the mobile telephone 4801 are provided with the elastic body units 4863*a*, 4863*b*, 4863*c*, and 4863*d*, serving as protectors. The outer sides of the corners of such elastic members are beveled in a smooth convex shape to prevent the occurrence of slight pain when held against the ear cartilage. Although a more detailed description will also be provided later, the shape of the corner parts allows for a suitable fit with the cartilage around the external auditory meatus and for comfortable listening by cartilage conduction.

In the fifty-second embodiment of FIG. 77, the piezoelectric bimorph element 2525*b* for the right ear and the piezoelectric bimorph element 2525*a* for the left ear are employed as described above, and can be controlled separately, similarly with respect to the first embodiment illustrated in FIGS. 1 to 4. The piezoelectric bimorph elements 2525*b* and 2525*a* are appropriately long enough to obtain suitable frequency output properties, but in order for both to be compactly arranged within the mobile telephone 4801, the piezoelectric bimorph element 2525*b* for the right ear, as illustrated in FIG. 77, is laid horizontally, the end to which no terminal is provided being supported by the elastic body unit 4863*b*. On the other hand, the piezoelectric bimorph element 2525*a* for the left ear is stood upright, the end to which no terminal is provided being supported by the elastic body unit 4863*a* (however, the vertical and horizontal arrangement of the piezoelectric bimorph elements for the right ear and for the left ear may be inverted from the description above). A terminal is provided to the other ends of each of the piezoelectric bimorph elements 2525*b* and 2525*a*, but serves as a free end in terms of the support structure due to the connection thereof with the controller 39 by a flexible lead. Thus, the vibration of the free ends of the piezoelectric bimorph elements 2525*b* and 2525*a* exhibits opposite actions on the elastic body unit 4863*b* and the elastic body 4863*a*, and cartilage conduction can be obtained by bringing the same into contact with the ear cartilage. The primary vibration direction of the piezoelectric bimorph elements 2525*b* and 2525*a* is the direction perpendicular to the plan in FIG. 77.

Next, the manner in which the piezoelectric bimorph elements 2525*b* and 2525*a* are controlled will be described. The piezoelectric bimorph element 2525*b* for the right ear, which is supported by the elastic body unit 4863*b*, is driven by a right ear amplifier 4824 via a switch 4824*a*. On the other hand, the piezoelectric bimorph element 2525*a* for the left ear, which is supported by the elastic body unit 4863*a*, is driven by a left ear amplifier 4826 via a switch 4826*a*. An audio signal from the phase adjustment mixer unit 36 is inputted into the right ear amplifier 4824 and the left ear amplifier 4826; the audio signal to the left ear amplifier 4826 is phase-inverted by a waveform inverter 4836*b* and then inputted via a switch 4836*a*. As a result, in the state depicted in FIG. 77, vibrations having mutually inverted phases are conducted to and mutually canceled out in the chassis of the mobile telephone 4801 from the elastic body unit 4863*a* and the elastic body unit 4863*b*, and the generation of air conduction sound from the entire surface of the chassis of the mobile telephone 4801 is substantially eliminated.

In a case where, for example, the cartilage of the right ear is brought into contact with the elastic body unit 4863*b*, there will be direct cartilage conduction to the ear cartilage from the elastic body 4863*b*, whereas, by contrast, the vibration of the elastic body unit 4863*a* reaches the elastic body unit 4863*b* and is conducted to the ear cartilage as cartilage conduction only after having been first conducted to the chassis of the mobile telephone 4801. Accordingly, since a difference emerges in the intensities of the phase-inverted vibrations, the difference will be conducted to the ear cartilage as cartilage conduction from the elastic body unit 4863*b* without having been canceled out. The same is also true of a case where the cartilage of the left ear is brought into contact with the elastic body unit 4863*a*. Accordingly, the state depicted in FIG. 77 in the fifty-second embodiment becomes a state corresponding to the "case of cartilage conduction only" in the forty-ninth embodiment of FIG. 74 and the fiftieth embodiment of FIG. 75. An air conduction eliminating gain adjustment unit 4836*c* serves to adjust the gain of the left ear amplifier 4826 so as to cancel out vibration to the chassis of the mobile telephone 4801 from the elastic body unit 4863*a* and the elastic body unit 4863*b* as described above, whereby the generation of air conduction sound will be minimized. Also, rather than being provided to the left ear amplifier 4826 side, the aforesaid switch 4836*a*, waveform inverter 4836*b*, and air conduction eliminating gain adjustment unit 4836*c* may also be instead provided to the right ear amplifier 4824 side. Alternatively, the air conduction eliminating gain adjustment unit 4836*c* only may be provided to the right ear amplifier 4824 side.

The fifty-second embodiment of FIG. 77 is provided with the environment-noise microphone 4638 for determining whether or not the environment is silent. When the noise detected by the environment-noise microphone 4638 is at or above a predetermined amount, the switch 4836*a* is switched to a signal pathway (the lower one in FIG. 77) by a command from the controller 39. An audio signal from the phase adjustment mixer unit 36 is thereby conducted to the left ear amplifier 4826 without waveform inversion. At such a time, the vibration conducted to the chassis of the mobile telephone 4801 from the elastic body unit 4863*a* and the elastic body unit 4863*b* is not canceled out, but rather air conduction sound from the entire surface of the chassis of the mobile telephone 4801 is conversely generated at a two-fold increase. Such a state serves as a state corresponding to the "case of cartilage conduction plus air conduction" in the forty-ninth embodiment of FIG. 74 and the fiftieth embodiment of FIG. 75. Because of the two-fold increase in air conduction sound from the entire surface of the chassis, such a state is suitable for a case where the mobile telephone 4801 is taken away from the ear and audio is listened to, as is done during a videoconferencing function or similar circumstances; in the case of the videoconferencing function mode, the switch 4836*a* is switched to the signal pathway (the lower one in FIG. 77) by a command from the controller 39 irrespective of the detection of the environment-noise microphone 4638.

In circumstances determined to be silent by the controller 39 when the noise detected by the environment-noise microphone 4638 is at or below a predetermined amount, the switch 4836*a* is switched to the state depicted in FIG. 77 by a command from the controller 39. As described above, the vibrations conducted to the chassis of the mobile telephone 4801 from the elastic body unit 4863*a* and the elastic body unit 4863*b* are thereby mutually canceled out, substantially eliminating the generation of air conduction sound, which serves as a state corresponding to the "case of cartilage conduction only."

Further, similarly with respect to the first embodiment, it is possible in the fifty-second embodiment of FIG. 77 for the state of whether the elastic body unit 4863*a* or the elastic body unit 4863*b* has been brought up against the ear to be detected by an acceleration sensor 49, and for the switch 4824*a* and a switch 4826*a* to be controlled by the control of the controller 39. Then, the operation unit 9 can be used to switch between a two-sided always-on mode in which both the switch 4824*a* and the switch 4826*a* are on irrespective of the state detected by the acceleration sensor 49, and a one-sided on mode in which one of either the switch 4824*a* or the switch 4826*a* is turned on and the other is turned off on the basis of the state detected by the acceleration sensor 49. In the one-sided on mode, for example, the switch 4824*a* is turned on and the switch 4826*a* is turned off when the right ear is brought up against the elastic body unit 4863*b*. The inverse occurs when the left ear is brought up against the elastic body unit 4863*a*.

The one-sided on mode further incorporates the function of the environment-noise microphone 4638; when the environmental noise detected by the environment-noise microphone 4638 is at or above a predetermined amount, one of either the switch 4824*a* or the switch 4826*a* is turned on and the other is turned off on the basis of the state detected by the acceleration sensor 49. In circumstances determined to be silent by the controller 39 when the noise detected by the environment-noise microphone 4638 is at or below a predetermined amount, both the switch 4824*a* and the switch 4826*a* are turned on by a command from the controller 39 irrespective of the state detected by the acceleration sensor 49, the switch 4836*a* being switched to the state depicted in FIG. 77, and the vibrations conducted to the chassis of the mobile telephone 4801 from the elastic body unit 4863*a* and the elastic body unit 4863*b* are thus mutually canceled out.

FIG. 78 is a perspective view and cross-sectional views relating to the fifty-second embodiment of FIG. 77. FIG. 78A is a perspective view in which the mobile telephone 4801 of the fifty-second embodiment is seen from the front surface, and illustrates the manner in which the outer surfaces of the corners of the elastic body units 4863*a*, 4863*b*, 4863*c*, and 4863*d* provided as protectors to the four corners of the mobile telephone 4801 are beveled so as to have a smooth, convex shape. As described above, such an outer surface shape of the corner parts of the mobile telephone 4801 prevents the occurrence of slight pain when the elastic member 4863*a* or 4863*b* is brought up against the ear cartilage, and also allows for the corner parts of the mobile telephone 4801 to be suitably fitted to the cartilage around the entrance part of the external auditory meatus inside the auricle, permitting comfortable listening by cartilage conduction. The occlusion of the entrance part of the external auditory meatus by the beveled corner parts produces the earplug bone conduction effect, which intensifies the audio signal from the mobile telephone 4801 in the external auditory meatus and also makes it easier to listen to the audio signal in the presence of noise, due to the noise of the external environment being blocked by the occlusion of the entrance part of the external auditory meatus.

FIG. 78B is a cross-sectional view cutting through the mobile telephone 4801 on the B1-B1 cross-sectional plane of FIG. 78A, on the plane perpendicular to the front view and side view; FIG. 78C is a cross-sectional view cutting through the mobile telephone 4801 on the B2-B2 cross-sectional plane illustrated in FIG. 78A or 78B, on the plane perpendicular to the plan view and the top view. The manner in which the outer surfaces of the corners of the elastic body units 4863*a*, 4863*b*, 4863*c*, and 4863*d* are beveled so as to have a smooth, convex shape will be readily understood from either of FIG. 78B or 78C. As illustrated by the arrow 25*g* in FIGS. 78B and 78C, the primary vibration direction of the piezoelectric bimorph element 2525*b* is the direction perpendicular to the display surface of the GUI display unit 3405. Further, as illustrated by the arrow 25*m* in FIG. 78B, the primary vibration direction of the piezoelectric bimorph element 2525*a* is the direction perpendicular to the display surface of the GUI display unit 3405.

Although each of the switches 4824*a*, 4826*a*, and 4836*a* in the fifty-second embodiment are symbolically depicted in FIG. 77 as mechanical switches, in practice the same are preferably constituted of electrical switches. Also, except in the case of switching between the two-sided always-on mode and the one-sided on mode, the switches in the fifty-second embodiment have been depicted by way of the example of automatically switching on the basis of the results detected by the acceleration sensor 49 and/or the environment-noise microphone 4638, but the configuration may also permit manual switching as desired, by the operation unit 9. It is also possible to omit the switches, as appropriate. For example, when the fifty-second embodiment is simplified so as to always be in the connection state depicted in FIG. 77, a mobile telephone is obtained in which the generation of air conduction sound from the entire surface of the chassis is substantially eliminated and cartilage conduction occurs when the elastic body unit 4863*a* or the elastic body unit 4863*b* is brought into contact with the ear cartilage.

The various features of each embodiment described above are not to be restricted to individual respective embodiments, but rather can be substituted or combined with other appropriate embodiments. For example, although the fifty-second embodiment of FIGS. 77 and 78 employs the piezoelectric bimorph elements as cartilage conduction vibration sources, the cartilage conduction vibration sources may be substituted for other vibrators, such as with the magnetic vibrators in the forty-eighth embodiment of FIGS. 72 and 73, the fiftieth embodiment of FIG. 75, or the fifty-first embodiment of FIG. 76.

Figure 79:
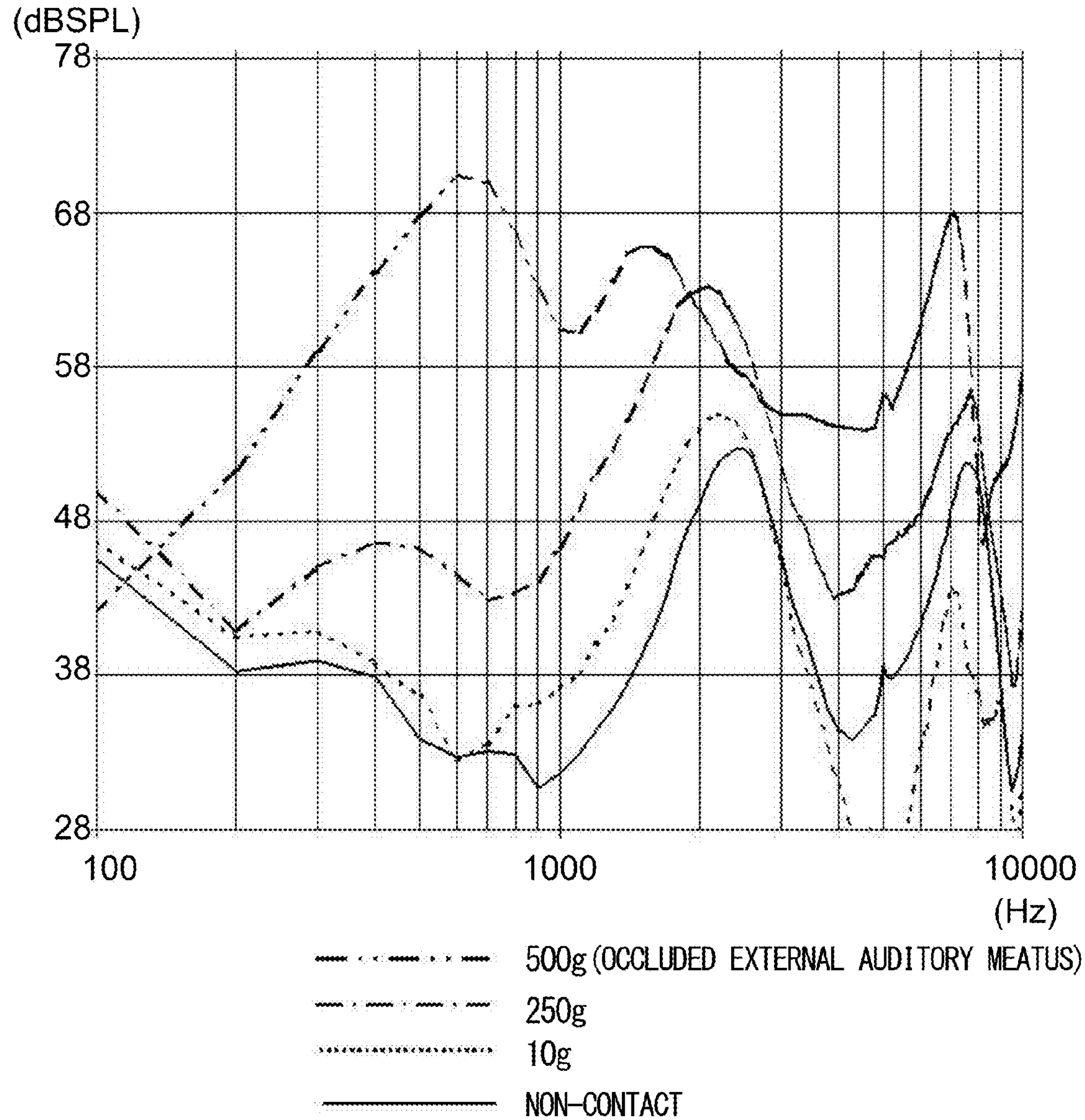
FIG. 79 is a graph illustrating an example of measurement data of the mobile telephone configured on the basis of the forty-sixth embodiment of FIG. 69.

FIG. 79 is a graph illustrating an example of measurement data of the mobile telephone configured on the basis of the forty-sixth embodiment of FIG. 69. In the graph of FIG. 79, the mobile telephone 4201 of the forty-sixth embodiment (in which configuration the vibration from the vibration source inside the outer wall is transmitted to the surface of the outer wall) is used to illustrate, in relation to the frequency, the sound pressure within the external auditory meatus 1 cm from the entrance part of the external auditory meatus when, without contact with the auricular helix, the surface of the outer wall of the corner parts of the mobile telephone 4201 is brought into contact with at least a part of the ear cartilage around the entrance part of the external auditory meatus, according to FIGS. 2A and 2B, which have been used to describe the first embodiment. In the graph, the vertical axis is the sound pressure (in dBSPLs), and the horizontal axis is the frequency on a logarithmic scale (in Hz). In terms of the contact pressure relationship between the surface of the outer wall of the corner parts of the mobile telephone 4201 and the cartilage around the entrance part of the external auditory meatus, the graph uses a solid line to illustrate the sound pressure during a non-contact state, a short-dashed line to illustrate the sound pressure in a state of slight contact (10 grams of contact pressure), a single-dotted line to illustrate the sound pressure in a state in which the mobile 4201 is being used normally (250 grams of contact pressure), and a double-dotted line to illustrate the sound pressure in a state in which the external auditory meatus is occluded by increased contact pressure (500 grams of contact pressure). As illustrated, the sound pressure increases from the non-contact state due to contact of 10 grams of contact pressure and increases further due to the contact pressure increasing to 250 grams; the sound pressure increases even more when the contact pressure is increased further from such a state to 500 grams.

It will be readily understood from the graph of FIG. 79 that when the surface of the outer wall of the mobile telephone 4201, which has the vibration source arranged inward from the surface of the outer wall and is configured such that the vibration of the vibration source is transmitted to the surface of the outer wall, is brought into contact with at least a part of the ear cartilage around the entrance part of the external auditory meatus without making contact with the auricular helix, the sound pressure in the external auditory meatus about 1 cm from the entrance part of the external auditory meatus has an increase of at least 10 dB in the main frequency range of speech (500 Hz to 2,300 Hz), compared to the non-contact state (to be contrasted with the non-contact state illustrated by the solid line and the state in which the mobile telephone 4201 is being used normally, illustrated by the single-dotted line).

It will also be readily understood from the graph of FIG. 79 that when the surface of the outer wall of the mobile telephone 4201 is brought into contact with at least a part of the ear cartilage around the entrance part of the external auditory meatus without making contact with the auricular helix, the sound pressure in the external auditory meatus about 1 cm from the entrance part of the external auditory meatus has an at least 5 dB change in the main frequency range of speech (500 Hz to 2,500 Hz) according to the change in contact pressure (to be contrasted with the slight contact state illustrated by the short-dashed line and the contact state in the state in which the mobile telephone 4201 is being used normally, illustrated by the single-dotted line).

It will further be readily understood from the graph of FIG. 79 that when the entrance part of the external auditory meatus is occluded by the surface of the outer wall of the mobile telephone 4201 being brought into contact with at least a part of the ear cartilage around the entrance part of the external auditory meatus without making contact with the auricular helix (for example, when the surface of the outer wall of the mobile telephone 4201 is strongly pressed against the outside of the tragus, thus folding the tragus over and occluding the external auditory meatus), the sound pressure in the external auditory meatus about 1 cm from the entrance part of the external auditory meatus has an increase of at least 20 dB in the main frequency range of speech (300 Hz to 1,800 Hz) compared to the non-contact state (to be contrasted with the non-contact state illustrated by the solid line and the state in which the external auditory meatus is occluded, illustrated by the double-dotted line).

The measurements in FIG. 79 are all in a state in which the output of the vibration source does not change. The measurements in FIG. 79 for the state where the surface of the outer wall is brought into contact with at least a part of the ear cartilage around the external auditory meatus without making contact with the auricular helix are performed in a state where the surface of the outer wall was in contact from the outside of the tragus. The measurements in FIG. 79 made in a state of the external auditory meatus being occluded were performed by creating a state where the external auditory meatus was occluded by the tragus being folded due to being more strongly pressed against from the outside, as described above.

As described above, the measurements in FIG. 79 were performed in a state where the surface at the corner parts of the outer wall in the mobile telephone 4201 of the forty-sixth embodiment illustrated in FIG. 69 was brought into contact with the outside of the tragus, but the corner parts of the forty-sixth embodiment serve as the elastic body units 4263*a*, 4263*b* acting as protectors, and are constituted of a material different from the other portions of the outer wall. The vibration source is supported on the inner surface of the corner parts of the outer wall constituted of the elastic body units 4263*a*, 4263*b*. The corner parts of the outer wall of the mobile telephone 4201 are susceptible to impact from the outside, and are firmly bonded to prevent the occurrence of relative deviation between the outer wall and the other portions even in a case of being constituted of the elastic body units 4263*a*, 4263*b*.

The measurement graph of FIG. 79 is merely an example; upon further scrutiny, there are individual differences. Also, the measurement graph of FIG. 79 was measured in a state where the surface of the outer wall was brought into contact only with a small surface area of the outside of the tragus, for the sake of simplifying and standardizing the phenomenon. However, an increase in sound pressure due to contact also relies on the area of contact with the cartilage, and in a case where the surface of the outer wall is brought into contact with the ear cartilage around the entrance part of the external auditory meatus without making contact with the auricular helix, the increase in sound pressure is elevated further when there is contact with a portion of the cartilage wider than around the entrance part of the external auditory meatus. In consideration of the facts above, the values illustrated in the measurement graph of FIG. 79 have a certain universality in illustrating the configuration of the mobile telephone 4201, and can be reproduced by a non-specific number of test subjects. Further, the measurement graph of FIG. 79 was achieved by the tragus being pressed from the outside when the entrance part of the external auditory meatus is occluded, thus increasing the contact pressure and folding the tragus over, but similar results are also obtained in a case where the corner parts of the mobile telephone 4201 are pressed on the entrance part of the external auditory meatus, which is then occluded. The measurements in FIG. 79 were measured by the vibration source being held on the inside of the corner parts of the outer wall, as in the mobile telephone 4201 of the forty-sixth embodiment of FIG. 69, but there is no limitation thereto, and the measurements are also reproducible in other embodiments as well. For example, the measurements are also reproducible with a configuration in which the vibration source is held on the interior of the elastic body units 4363*a*, 4363*b* serving as protectors, as illustrated in FIG. 72 (for example, an embedded configuration).

In other words, the measurement graph of FIG. 79 suffices to explain the characteristic of the mobile telephone of the present invention, in that when the surface of the outer wall of the mobile telephone, which has the vibration source arranged inward from the surface of the outer wall and is configured such that the vibration of the vibration source is transmitted to the surface of the outer wall, is brought into contact with at least a part of the ear cartilage around the entrance part of the external auditory meatus without making contact with the auricular helix, the sound pressure inside the external auditory meatus about 1 cm from the entrance part of the external auditory meatus has an at least 10 dB increase in at least a part (for example, 1,000 Hz) of the main frequency range of speech (500 Hz to 2,300 Hz), compared to the non-contact state.

The graph in FIG. 79 also suffices to explain the characteristic of the mobile telephone of the present invention, in that when the surface of the outer wall of the mobile telephone is brought into contact with at least a part of the ear cartilage around the entrance part of the external auditory meatus without making contact with the auricular helix, the sound pressure inside the external auditory meatus about 1 cm from the entrance part of the external auditory meatus has an at least 5 dB increase in at least a part (for example, 1,000 Hz) of the main frequency range of speech (500 Hz to 2,500 Hz) due to the increase in contact pressure.

The graph in FIG. 79 further suffices to explain the characteristic of the mobile telephone of the present invention, in that when the entrance part of the external auditory meatus is occluded by the surface of the outer wall of the mobile telephone 4201 being brought into contact with at least a part of the ear cartilage around the entrance part of the external auditory meatus without making contact with the auricular helix, the sound pressure in the external auditory meatus about 1 cm from the entrance part of the external auditory meatus has an increase of at least 20 dB in at least a part (for example, 1,000 Hz) of the main frequency range of speech (300 Hz to 1,800 Hz) compared to the non-contact state.

The mobile telephone of the present invention as confirmed by the measurements in the graph of FIG. 79 is significant in the following manner. Namely, the present invention provides a mobile telephone having a vibration source arranged inward from the surface of an outer wall, and volume adjustment means, the vibration of the vibration source being transmitted to the surface of the outer wall, and sound being listened to by bringing the surface of the outer wall into contact with at least a part of the ear cartilage around the entrance part of the external auditory meatus without making contact with the auricular helix; the features thereof are defined as follows. Namely, in a room where the noise level (the A-weighted sound pressure level) is 45 dB or less, the mobile telephone being brought into proximity with the entrance part of the external auditory meatus and the surface of the outer wall being arranged so as to not be in contact, the volume is minimized and pure sound at 1,000 Hz is generated from the vibration source. In addition, narrow-band noise at 1,000 Hz (⅓ octave-band noise) at a marginal level where the pure sound at 1,000 Hz is masked and cannot be heard is generated from a loudspeaker at a position separated from the entrance part of the external auditory meatus by 1 m. This can be confirmed by sequentially increasing narrow-band noise at 1,000 Hz and determining the magnitude at which pure sound at 1,000 Hz is masked and can no longer be heard. The narrow-band noise at 1,000 Hz is subsequently increased by 10 dB from the marginal level, but according to the mobile telephone of the present invention, bringing the surface of the outer wall into contact with at least a part of the ear cartilage around the entrance part of the external auditory meatus without making contact with the auricular helix makes it possible to listen to pure sound at 1,000 Hz without the need to adjust or change the volume adjusting means.

When the narrow-band noise at 1,000 Hz is further increased by 20 dB from the marginal level as determined above, according to the mobile telephone of the present invention, bringing the surface of the outer wall into contact with at least a part of the ear cartilage around the entrance part of the external auditory meatus without making contact with the auricular helix makes it possible to listen to pure sound at 1,000 Hz without the need to adjust or change the volume adjusting means.

Figure 80A:
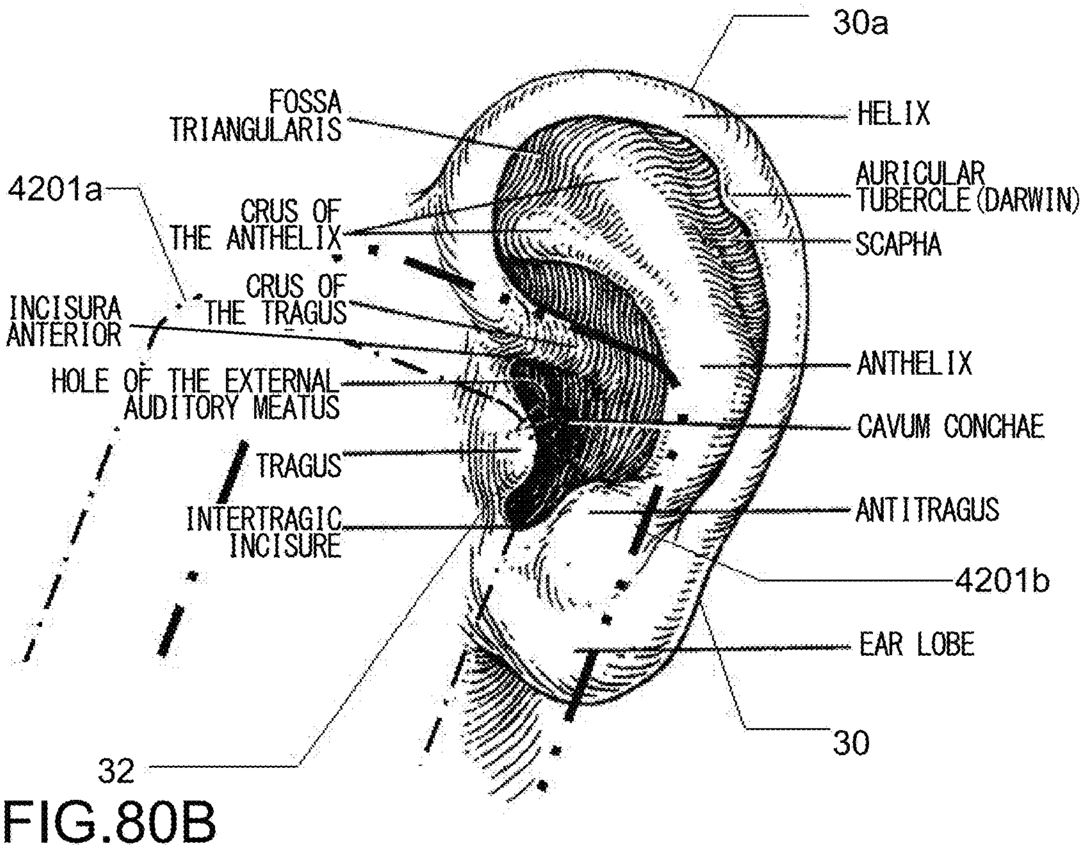
FIGS. 80A and 80B are side views and a cross-sectional views of an ear, intended to illustrate the relationship between the detailed structure of the ear and the mobile telephone of the present invention.

FIG. 80 is a side view and a cross-sectional view of an ear, intended to illustrate the relationship between the detailed structure of the ear and the mobile telephone of the present invention. FIG. 80A is a side view of the left ear 30, where a position 4201*a* shown with a single-dotted line depicts the state where the corner part of the mobile telephone 4201 is brought into contact with the outside of the tragus. The position 4201*a* corresponds to the state in which the measurements of FIG. 79 were performed. Meanwhile, a position 4201*b* shown by the double-dotted line is a depiction of the state where the corner part of the mobile telephone 4201 is brought into contact with a portion of cartilage wider than that around the entrance part of the external auditory meatus. At the position 4201*b*, an increase in sound pressure greater than what is illustrated in FIG. 79 can be achieved through the contact with the ear cartilage.

Figure 80B:
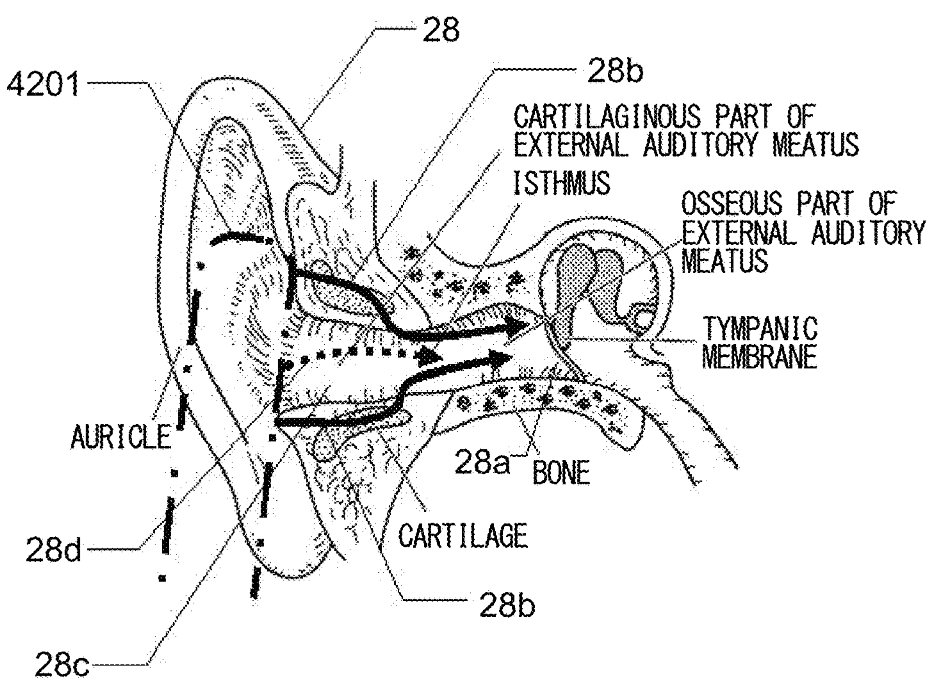

FIG. 80B is a cross-sectional view of the right ear 28, and depicts the manner in which the vibration of the vibration source generated from the corner part of the mobile telephone 4201 is conducted to the tympanic membrane 28*a*. The mobile telephone 4201 in the state in FIG. 80B has been brought into contact with a portion of cartilage wider than that around the entrance part of the external auditory meatus, according to the position 4201*b* in FIG. 80A (though it may not be evident from the portion of the cross-sectional view alone, the entrance part of the external auditory meatus is not occluded in such a state). A vibration 28*b* generated from the corner part of the mobile telephone 4201 is conducted to the cartilage around the entrance part of the external auditory meatus from the portion of contact, and air conduction sound is subsequently generated in the external auditory meatus 28*c* from the cartilage part external auditory meatus surface. The air conduction sound then proceeds through the inside of the external auditory meatus 28*c* and reaches the tympanic membrane 28*a*. Direct air conduction 28*d* is also generated from the corner part of the mobile telephone 4201, and naturally also proceeds through the inside of the external auditory meatus 28*c* and reaches the tympanic membrane 28*a*. In the state where the mobile telephone 4201 is not in contact with the cartilage, solely the direct air conduction 28 reaches the tympanic membrane 28*a*.

An additional description shall now be provided for the frequency characteristics of the piezoelectric bimorph element 2525 used in the forty-sixth embodiment of FIG. 69 and elsewhere. The frequency characteristics of the piezoelectric bimorph element 2525 used in embodiments of the present invention in regard to the generation of direct air conduction are not flat; rather, the generation of air conduction at frequencies below substantially approximately 1 kHz is correspondingly less than at frequencies above the boundary. Such a frequency characteristic in the piezoelectric bimorph element 2525 in regard to the generation of direct air conduction is ideally matched to the frequency characteristic in a case where there is air conduction sound from the piezoelectric bimorph element 2525 in the external auditory meatus directly via the cartilage. Namely, the sound pressure in the external auditory meatus according to the frequency characteristics in air conduction sound through cartilage conduction is greater in frequencies below about 1 kHz than frequencies that are higher than this boundary. Therefore, in a case involving the use of the piezoelectric bimorph element 2525 of the frequency characteristic described above for the generation of direct air conduction, the fact that the two are complementary results in the frequency characteristic of sound reaching the tympanic membrane being approximately flat. Thus, the cartilage conduction vibration source used in the present invention exhibits a frequency characteristic for the generation of air conduction sound that trends inversely with respect to the frequency characteristic in cartilage conduction.

FIG. 79, which is the measurement data from the forty-sixth embodiment of FIG. 69, provides a specific description of such facts. In the graph of FIG. 79, sound pressure is viewed by applying a sine wave with a varying frequency at the same voltage to the piezoelectric bimorph element 2525 having the structure illustrated in FIG. 69, wherefore the sound pressure in non-contact illustrated by the solid line in the graph of FIG. 79 substantially exhibits the frequency characteristic for generating air conduction sound generated from the piezoelectric bimorph element 2525. In other words, as is clear from the solid line in the graph of FIG. 79, the frequency characteristic for generating air conduction sound by the piezoelectric bimorph element 2525 is not flat, but rather, when there is a focus on a band between, for example, 100 Hz and 4 kHz, then the comparative sound pressure is low primarily in the low-frequency band (for example, 200 Hz to 1.5 kHz), and the sound pressure is high primarily in the high-frequency band (for example, 1.5 kHz to 4 kHz) (the sound pressure measured in FIG. 79 is that in the external auditory meatus at about 1 cm from the entrance part of the external auditory meatus, and therefore the influence of the effect of unoccluded ear gain in increasing sound pressure is observed between 2.5 kHz and 3.5 kHz, but it is clear that the high-frequency band has a relatively higher sound pressure than the low-frequency band even when interpreted with this portion subtracted). Thus, viewed from FIG. 79 as well, the frequency characteristic of the piezoelectric bimorph element 2525 used in the forty-sixth embodiment of FIG. 69 and elsewhere is not flat, but rather the generated air conduction sound at low frequencies will be readily understood to be relatively less than that at high frequencies, the boundary being substantially at about 1 kHz.

Next, in the graph of the normal state of contact 250*g* shown in FIG. 79 with a single-dotted line, a marked increase in sound pressure compared to the state of non-contact is observed beginning at a few hundred Hz, closer to the lower-frequency region than to 1 kHz; the increase persists until at least about 2.5 kHz. Accordingly, the frequency characteristic of sound measured in the external auditory meatus for the piezoelectric bimorph element 2525, which is the same vibration source, exhibits a clear difference between direct air conduction and air conduction through cartilage conduction (that is, air conduction through cartilage conduction has a large increase in sound pressure, particularly at a few hundred Hz to 2.5 kHz, compared to direct air conduction). As a result, as illustrated by the graph of the normal state of contact 250*g* shown in FIG. 79 by the single-dotted line, as regards the sound pressure in the external auditory meatus in the case of air conduction through cartilage conduction, the frequency characteristic of the sound that reaches the tympanic membrane as a result is closer to being flat than in the case of direct air conduction illustrated by the solid line.

Additionally, a state of external auditory meatus occlusion 500*g* illustrated by FIG. 79 with a double-dotted line has a further pronounced increase in sound pressure between a few hundred Hz to 1 kHz, due to the earplug bone conduction effect, and the piezoelectric bimorph element 2525, which is the same vibration source, exhibits disparate frequency characteristic clearly different from both the state of normal contact 250*g* and the state of non-contact. However, because unoccluded ear gain ceases to be present in the state of external auditory meatus occlusion 500*g* illustrated with the double-dotted line, presumably there appears a result such that the effect from the peak sound pressure at 2.5 kHz to 3.5 kHz observed in the state of open external auditory meatus has disappeared.

[Fifty-third Embodiment]

Figure 81:
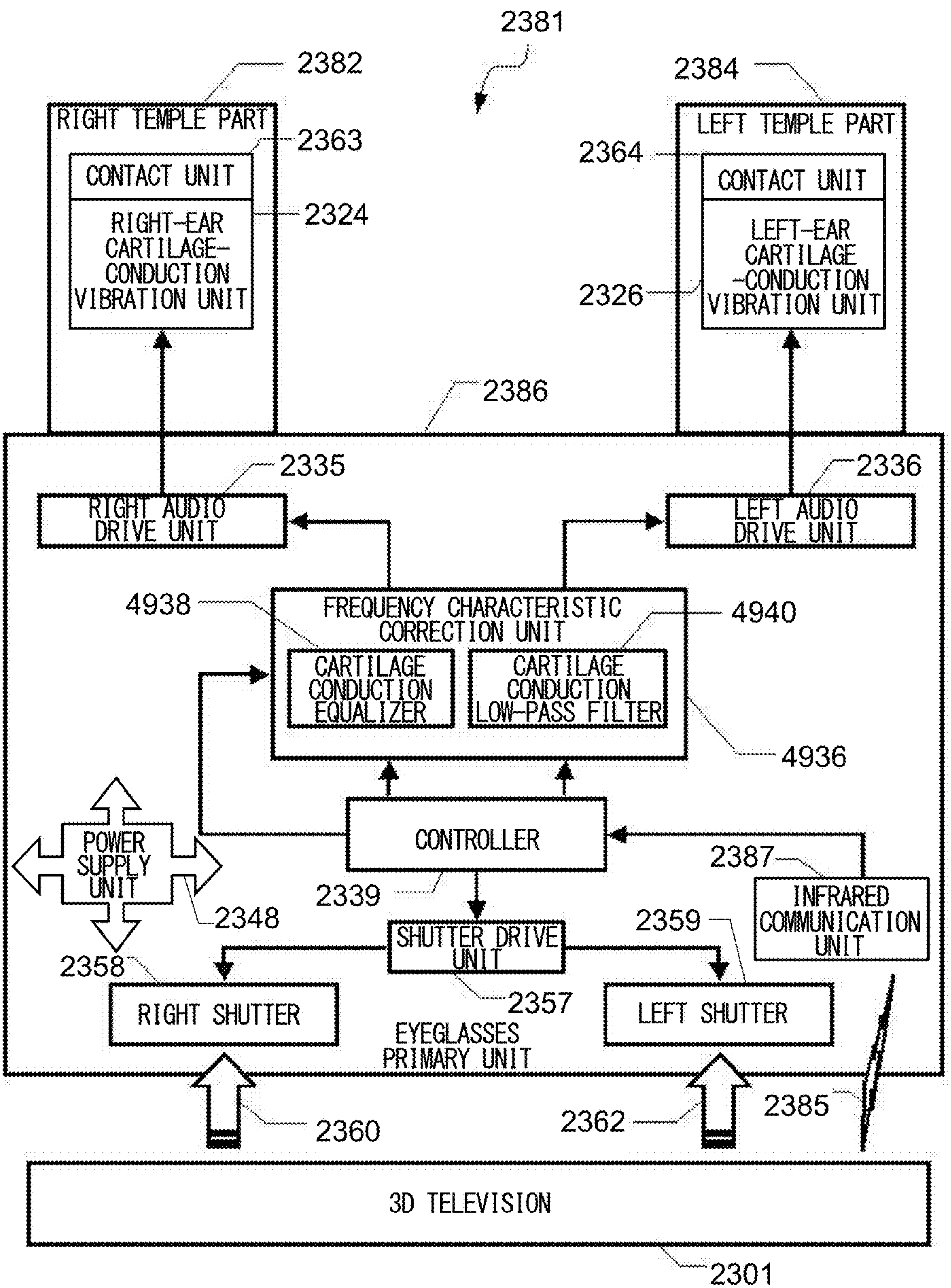
FIG. 81 is a block diagram of a fifty-third embodiment according to an aspect of the present invention (fifty-third embodiment)

FIG. 81 is a block diagram of a fifty-third embodiment according to an aspect of the present invention. The fifty-third embodiment, similarly with respect to the twenty-fifth embodiment of FIG. 38, is configured as 3D television viewing eyeglasses 2381 by which stereo audio information can be experienced, and forms a 3D television viewing system together with a 3D television 2301. Also similarly with respect to the twenty-fifth embodiment, the vibration of a right-ear cartilage-conduction vibration unit 2324 arranged at a right temple unit 2382 is transmitted to the outer side of the cartilage of the base of the right ear via a contact unit 2363, and the vibration of a left-ear cartilage-conduction vibration unit 2326 arranged at a left temple unit 2384 is transmitted to the outer side of the cartilage of the base of the left ear via a contact unit 2364. The fifty-third embodiment has much in common with the twenty-fifth embodiment, and shared portions have therefore been given like reference numerals, a description thereof having been omitted unless there is a particular need. Further, although a depiction in FIG. 81 has been omitted, the internal configuration of the 3D television 2301 is the same as is illustrated in FIG. 38.

The fifty-third embodiment of FIG. 81, similarly with respect to the twenty-fifth embodiment of FIG. 38, uses the piezoelectric bimorph element 2525 having a similar structure to that of the forty-sixth embodiment of FIG. 69, as the right-ear cartilage-conduction vibration unit 2324 and the left-ear cartilage-conduction vibration unit 2326. In other words, the right-ear cartilage-conduction vibration unit 2324 and the left-ear cartilage-conduction vibration unit 2326 exhibit a frequency characteristic for the generation of direct air conduction that trends inversely with regard to the frequency characteristic in cartilage conduction, the generation of air conduction at frequencies below substantially approximately 1 kHz being correspondingly less than at frequencies above the boundary. Specifically, the right-ear cartilage-conduction vibration unit 2324 and the left-ear cartilage-conduction vibration unit 2326 employed in the fifty-third embodiment of FIG. 81 have a difference of 5 dB or greater between the mean air conduction output from 500 Hz to 1 kHz and the mean air conduction output from 1 kHz to 2.5 kHz, compared to an average, typical speaker designed in consideration of air conduction, and exhibit a frequency characteristic that would be undesirable for a typical speaker.

A point of difference in the fifty-third embodiment of FIG. 81 from the twenty-fifth embodiment of FIG. 38 lies in that the driving of the above-described right-ear cartilage-conduction vibration unit 2324 and left-ear cartilage-conduction vibration unit 2326 is performed via a frequency characteristic correction unit 4936. The frequency characteristic correction unit 4936 is provided with a cartilage conduction equalizer 4938 for correcting the frequency characteristic of the sound pressure serving as air conduction sound in the external auditory meatus so as to approach flatness, in consideration of the frequency characteristic specific to cartilage conduction. The cartilage conduction equalizer 4938 fundamentally corrects the frequency characteristic of the drive signals to the right-ear cartilage-conduction vibration unit 2324 and to the left-ear cartilage-conduction vibration unit 2326 equally, but it is also possible to utilize separately corrections for the variations between the right-ear cartilage-conduction vibration unit 2324 and the left-ear cartilage-conduction vibration unit 2326. The frequency characteristic correction unit 4936 is further provided with a cartilage conduction low-pass filter 4940 for trimming higher frequencies (e.g., trimming 10 kHz and higher). The cartilage conduction low-pass filter 4940 is intended to prevent the unpleasant outward divergence of air conduction, because the right-ear cartilage-conduction vibration unit 2324 and the left-ear cartilage-conduction vibration unit 2326 in the fifty-third embodiment are shaped such that the ear is not covered. The characteristics of the low-pass filter have been determined in consideration that the frequency region advantageous for cartilage conduction (for example, 10 kHz and lower) not be trimmed. In terms of acoustics, it is disadvantageous for an audio device to trim out the audible range (for example, 10 kHz to 20 kHz) and the frequency band thereabove, and the configuration is therefore such that the functions of the cartilage conduction low-pass filter 4940 can be turned off manually in an environment where consideration need not be given to the unpleasant outward divergence of air conduction.

[Fifty-fourth Embodiment]

Figure 82:
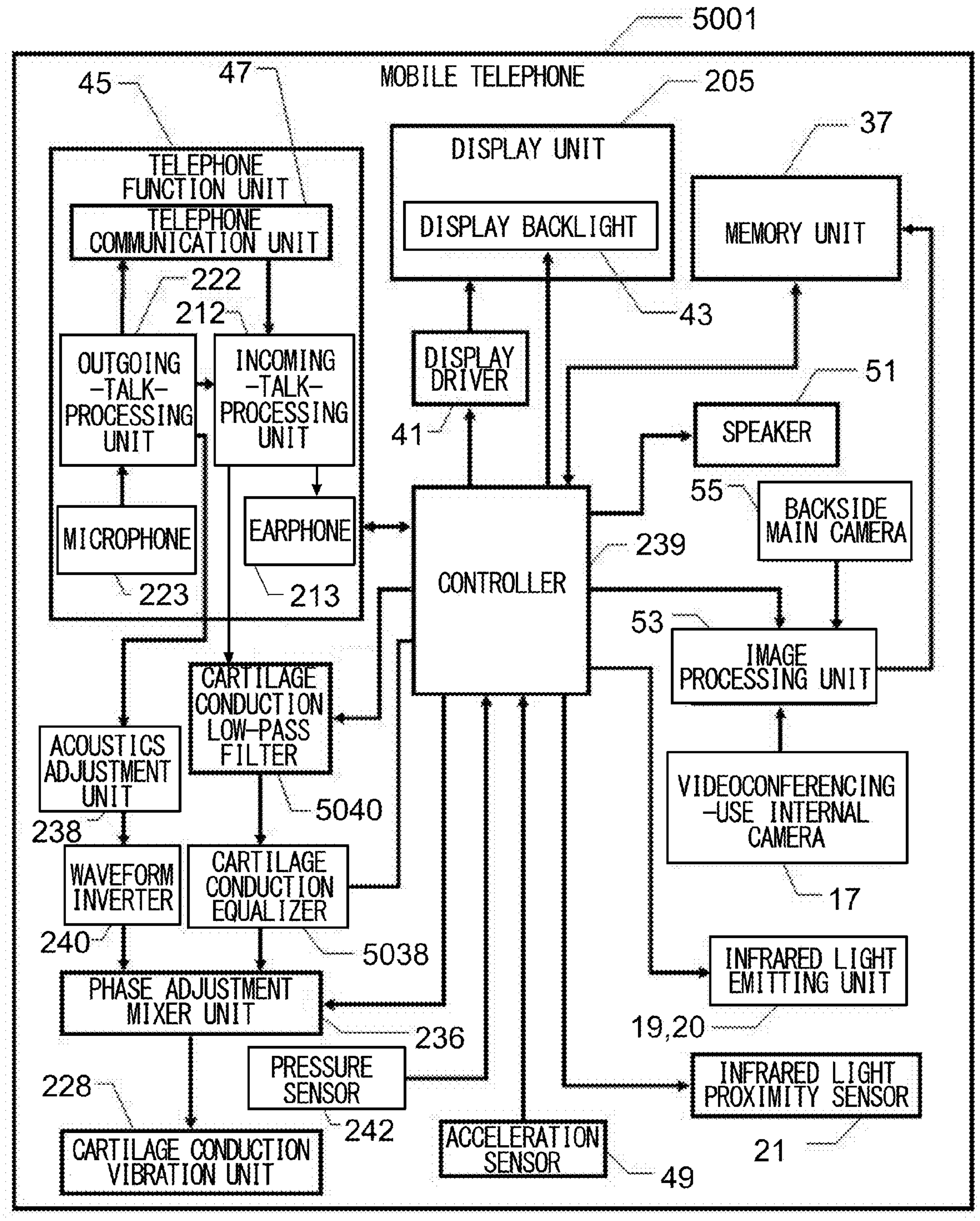
FIG. 82 is a block diagram of a fifty-fourth embodiment according to an aspect of the present invention (fifty-fourth embodiment)

FIG. 82 is a block diagram of a fifty-fourth embodiment according to an aspect of the present invention. The fifty-fourth embodiment, similarly with respect to the fourth embodiment of FIG. 8, is configured as a mobile telephone 5001. The fifty-fourth embodiment has much in common with the fourth embodiment, and shared portions have therefore been given like reference numerals, a description thereof having been omitted unless there is a need. The fifty-fourth embodiment of FIG. 82, similarly with respect to the fifty-third embodiment of FIG. 81, uses the piezoelectric bimorph element 2525 having a similar structure to that of the forty-sixth embodiment of FIG. 69, serving as the vibration source of the cartilage conduction vibration unit 228. In other words, the vibration source of the cartilage conduction vibration unit 228 exhibits a frequency characteristic for the generation of direct air conduction that trends inversely with regard to the frequency characteristic in cartilage conduction, the generation of air conduction at frequencies below substantially approximately 1 kHz being correspondingly less than at frequencies above the boundary. Specifically, as with the fifty-second embodiment, the piezoelectric bimorph element employed in the fifty-fourth embodiment of FIG. 82 has a difference of 5 dB or greater between the mean air conduction output from 500 Hz to 1 kHz and the mean air conduction output from 1 kHz to 2.5 kHz, compared to an average, typical speaker designed with the expectation of air conduction, and exhibits a frequency characteristic that would be undesirable for a typical speaker.

A point of difference in the fifty-fourth embodiment of FIG. 82 from the fourth embodiment of FIG. 8 lies in the manner in which the above-described piezoelectric bimorph element of the vibration source of the cartilage conduction vibration unit 228 is driven, being performed via a cartilage conduction low-pass filter 5040 for trimming higher frequencies (e.g., trimming 2.5 kHz and higher) and via a cartilage conduction equalizer 5038. The cartilage conduction equalizer 5038, similarly with respect to the fifty-third embodiment, corrects the frequency characteristic of the sound pressure serving as air conduction sound in the external auditory meatus so as to approach flatness, in consideration of the frequency characteristic specific to cartilage conduction. An audio signal passed via the cartilage conduction equalizer 5038 will have undergone a frequency characteristic correction in consideration of the frequency characteristic specific to cartilage conduction, and therefore has a different frequency characteristic from an audio signal to the speaker 51 for a videoconferencing function, in which the generation of direct air conduction is presumed.

The cartilage conduction equalizer 5038 of the fifty-fourth embodiment, upon detection by the pressure sensor 242 of the state where the ear hole is blocked and the earplug bone conduction effect occurs, automatically switches the frequency characteristic to be corrected from the frequency characteristic used in the normal state of contact to the frequency characteristic used in the state where the earplug bone conduction effect is generated. The difference in correction for the frequency correction to which a switch is thereupon made corresponds to, for example, the difference between the single-dotted line (normal contact 250*g*) and double-dotted line (external auditory meatus occlusion 500*g*) in FIG. 79. Specifically, the frequency characteristic is corrected so as to prevent an over-emphasis of the lower sound region when the earplug bone conduction effect occurs and so as to compensate for the loss of unoccluded ear gain due to the occlusion of the external auditory meatus, thus attenuating the change in acoustics between the presence and absence of the earplug bone conduction effect.

The cartilage conduction low-pass filter 5040 in the fifty-fourth embodiment has the objectives of preventing sound in the band that can be heard by ear from leaking out and of protecting privacy, and is particularly useful at times of silence. The characteristics of the cartilage conduction low-pass filter 5040 have been determined in consideration that the frequency band at which contact with the ear cartilage has a pronounced effect in increasing sound pressure (for example, 2.5 kHz and lower) not be trimmed. The audio of the mobile telephone, from the start, is trimmed at 3 kHz or higher, but the band from a few hundred Hz to about 2.5 kHz, where the effect of cartilage conduction in increasing sound pressure is high even without unoccluded ear gain, is actively used; frequencies at 2.5 kHz and higher, other than the band at which the effect specific to cartilage conduction emerges, are trimmed, whereby the aforementioned privacy protection can reasonably be fulfilled. As noted above, the effects of the cartilage conduction low-pass filter 5040 are particularly important at times of silence, and therefore, in a preferred configuration, can be turned on and off manually, or can be automatically turned on only in times of silence by the environment-noise microphone 4638 provided in the fiftieth embodiment of FIG. 75 or a similar element. In the configuration in which the cartilage conduction low-pass filter 5040 can be turned on and off manually, there is the expectation that noise is louder when the cartilage conduction equalizer 5038 uses the frequency characteristic of the state where the earplug bond conduction effect occurs; therefore, the cartilage conduction low-pass filter 5040 is configured so as to be forcibly turned off when turned on manually.

The implementation of the features of the present invention illustrated by the embodiments above is not to be limited to the respective embodiments above. For example, the fifty-third embodiment and fifty-fourth embodiment above combine the cartilage conduction vibration source and cartilage conduction equalizer for imparting the generation of air conduction sound having a frequency characteristic that differs from the normal frequency characteristic for generating air conduction in that the final frequency characteristic of air conduction sound having passed through cartilage conduction approaches flatness; however, it is also possible to omit either one thereof. For example, the cartilage conduction equalizer can be omitted when the cartilage conduction vibration source used is well suited for the frequency characteristic of cartilage conduction. Conversely, another possible configuration is one where the cartilage conduction vibration source employed has a frequency characteristic for imparting the generation of air conduction sound according to a normal air conduction speaker, and the function adapted to bring the final frequency characteristic of air conduction having passed through cartilage conduction closer to flatness is concentrated in the cartilage conduction equalizer.

[Fifty-fifth Embodiment]

FIG. 83 is a perspective view and a cross-sectional view relating to a fifty-fifth embodiment according to an aspect of the present invention, which is configured as a mobile telephone 5101. The fifty-fifth embodiment is consistent with the forty-sixth embodiment illustrated in FIG. 69, except for the holding structure of the cartilage conduction vibration source 2525, which is constituted of a piezoelectric bimorph element, and except for the addition of a T-coil (described later), and therefore shared portions have been assigned like reference numerals and a description thereof has been omitted unless there is a need.

First, the holding structure for the cartilage conduction vibration source 2525 in the fifty-fifth embodiment shall now be described. As is clear from the perspective view in FIG. 83A, the left and right corner parts of the mobile telephone 5101 are provided with cartilage conduction units 5124 and 5126 composed of a hard material. Examples of suitable materials for the cartilage conduction units 5124 and 5126 include an ABS resin, fiber-reinforced plastic, or high-toughness fine ceramic. Elastic bodies 5165*b* and 5165*a* made of a vinyl-based, urethane-based, or other type of material are interposed between the cartilage conduction units 5124 and 5126 and the chassis of the mobile telephone 5101, and function as a vibration isolation material and as a cushioning material.

Figures 83A, 83B, 83C:
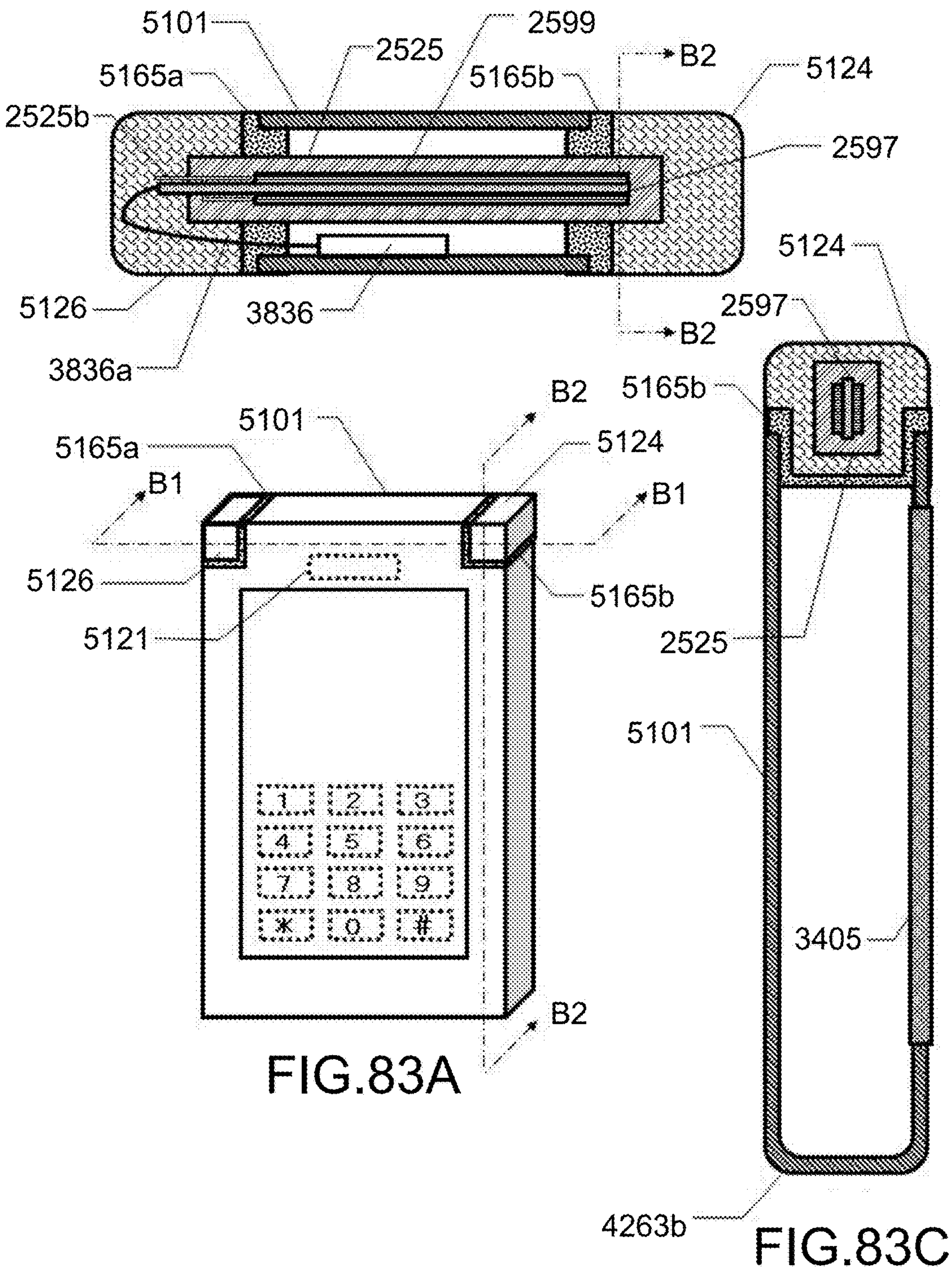
FIGS. 83A, 83B and 83C are perspective views and a cross-sectional views of a fifty-fifth embodiment according to an aspect of the present invention (fifty-fourth embodiment)

As is also clear from FIGS. 83B and 83C, the cartilage conduction units 5124 and 5126 are structured to hold the piezoelectric bimorph element 2525 at the inside thereof. The piezoelectric bimorph element 2525 is also structured to be held at the chassis of the mobile telephone 5101, without making direct contact, by the interposed elastic bodies 5165*b* and 5165*a*. The vibration energy of the piezoelectric bimorph element 2525 is thereby concentrated on the cartilage conduction units 5124 and 5126, and also thereby prevented from being dispersed to the chassis of the mobile telephone 5101.

Further, as illustrated in FIG. 83A by the short-dashed line, a T-coil 5121 is arranged inside the center of the upper part of the mobile telephone 5101 in the fifty-fifth embodiment. The T-coil 5121 is intended to transmit audio information by electromagnetic induction to a hearing aid provided with a corresponding T-coil. A description of the relationship between the manner in which the T-coil transmits audio information and the manner in which cartilage conduction transmits audio information will be provided later.

Figure 84:
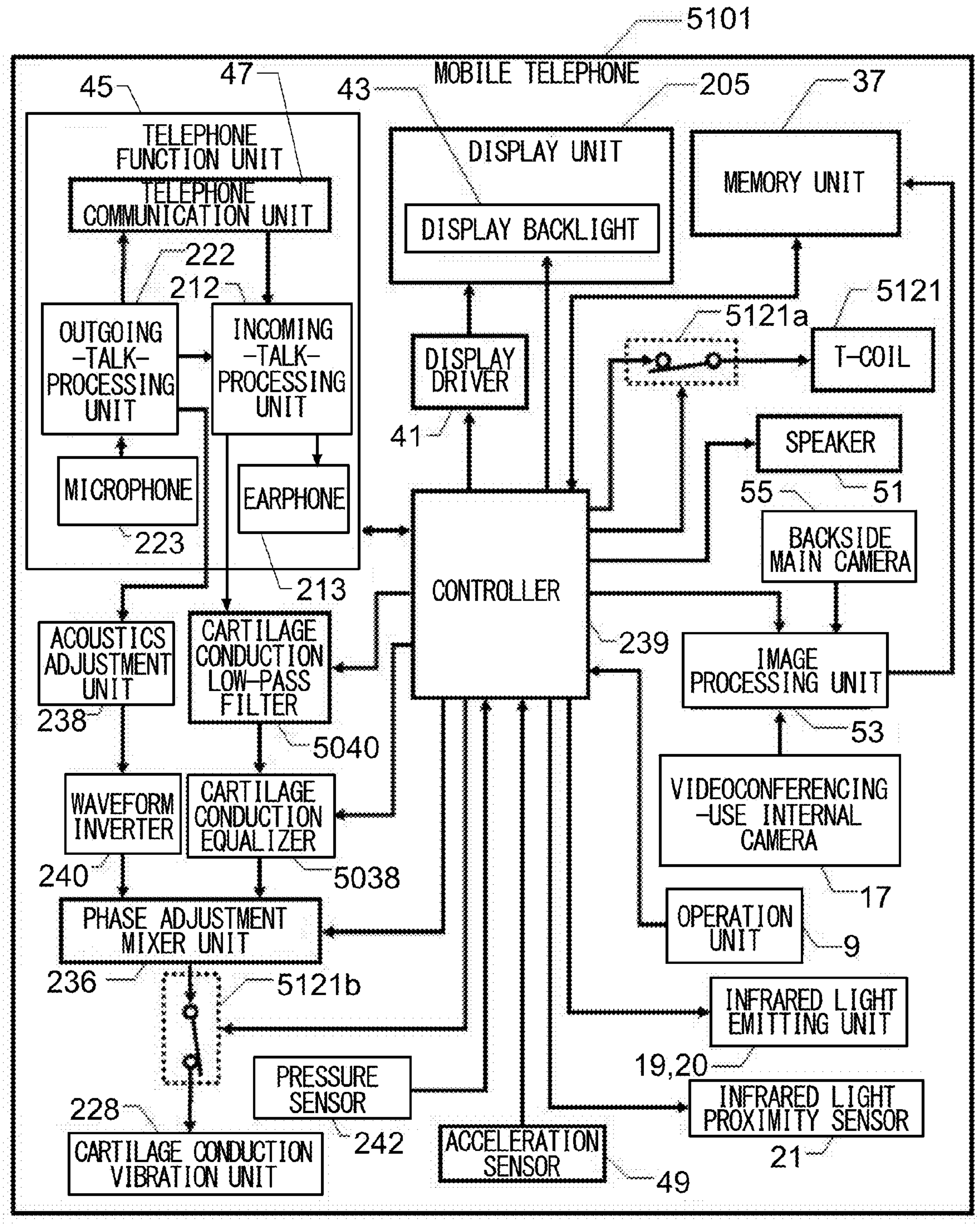
FIG. 84 is a block diagram of the fifty-fifth embodiment of FIG. 83.

FIG. 84 is a block diagram of the fifty-fifth embodiment of FIG. 83, in which like portions have been assigned like reference numerals to those in FIG. 83 and a description thereof has been omitted. The configuration of the block diagram of FIG. 84 has much in common with the block diagram of the fifty-fourth embodiment in FIG. 82. Since these elements can be referenced, shared parts of the configuration have been given like reference numerals and a description thereof has been omitted.

The fifty-fifth embodiment includes the T-coil 5121, as has already been described, and in a case where the user of the mobile telephone 5101 is wearing a hearing aid provided with a T-coil, audio information can be transmitted to the hearing aid by electromagnetic induction through the T-coil 5121. The T-coil function of the hearing aid provided with a T-coil can be turned on and off, the configuration being such that a selection can be made to turn the microphone of the hearing aid on or off in a case where the T-coil has been turned on. Correspondingly, a switch 5121*a* of the mobile telephone 5101 of the fifty-fifth embodiment can be turned on or off in response to an operation of the operation unit 9 and a selection can be made as to whether or not to cause the T-coil 5121 to function. In a case where a selection is made to turn the T-coil 5121 on, there is provided a switch 5121*b* for forcibly turning off, in conjunction therewith, the cartilage conduction vibration unit 228, which includes the piezoelectric bimorph element 2525.

As has already been described, in the state where the ear is plugged as well, cartilage conduction generates air conduction sound within the external auditory meatus along with the earplug bone conduction effect. As a result, in a case where the entrance to the external auditory meatus is blocked by the hearing aid, sound can still be heard without the T-coil 5121 being turned on, due to cartilage conduction, the vibration source of which is the piezoelectric bimorph element 2525. The cartilage conduction occurs fundamentally due to the cartilage conduction unit 5124 or 5126 being brought into contact with the ear cartilage, but bringing the cartilage conduction unit 5124 or 5126 into contact with the hearing aid also makes cartilage conduction possible due to the generation of air conduction sound inside the external auditory meatus due to the vibration thereof being conducted to the ear cartilage around the hearing aid. Also, depending on the manner in which the cartilage conduction unit 5124 or 5126 is held thereagainst, contact can be made with both the ear cartilage and the hearing aid, air conduction sound being generated inside the external auditory meatus in such a state of concurrence. Thus, the mobile telephone 5101 of the present invention can be utilized by the user of the hearing aid even in the state where the T-coil 5121 has been turned off The switch 5121*b* is intended to prevent the simultaneous occurrence of the above-described cartilage conduction when the switch 5121*a* has been turned on to cause the T-coil 5121 to function, and the occurrence of any awkwardness compared to sound normally listened to with the T-coil, and is also intended to prevent the unnecessary consumption of power due to cartilage conduction during the operation of the T-coil 5121. To prevent accidental confusion where cartilage conduction is turned off when the T-coil 5121 is turned on by a mistaken operation, the configuration is such that typically a menu to turn the T-coil 5121 on will not appear in the operation menu of the operation unit 9 displayed on the large-screen display unit 205; in a preferred configuration, the T-coil 5121 will not turn on unless a predetermined procedure is followed to intentionally operate the operation unit 9.

FIG. 85 is a side view for describing the manner in which the vibration energy is distributed in the mobile telephone 5101 in the fifty-fifth embodiment described above, and has much in common with FIG. 2; shared portions have therefore been given like reference numerals and a description thereof has been omitted. As illustrated in FIG. 83, the cartilage conduction units 5124 and 5126, which directly hold the piezoelectric bimorph element 2525, are held at the chassis of the mobile telephone 5101 by the interposed elastic bodies 5165*b* and 5165*a*. The vibration of the piezoelectric bimorph element 2525 is thereby effectively conducted to the ear cartilage from the cartilage conduction units 5124 and 5126, and moreover the vibration is less prone to be conveyed to the chassis of the mobile telephone 5101, because the piezoelectric bimorph element 2525 is not in direct contact therewith. In other words, the structure is such that the vibration energy of the piezoelectric bimorph element 2525 is concentrated on the cartilage conduction units 5124 and 5126, and is not dispersed to the chassis of the mobile telephone 5101.

Figure 85A:
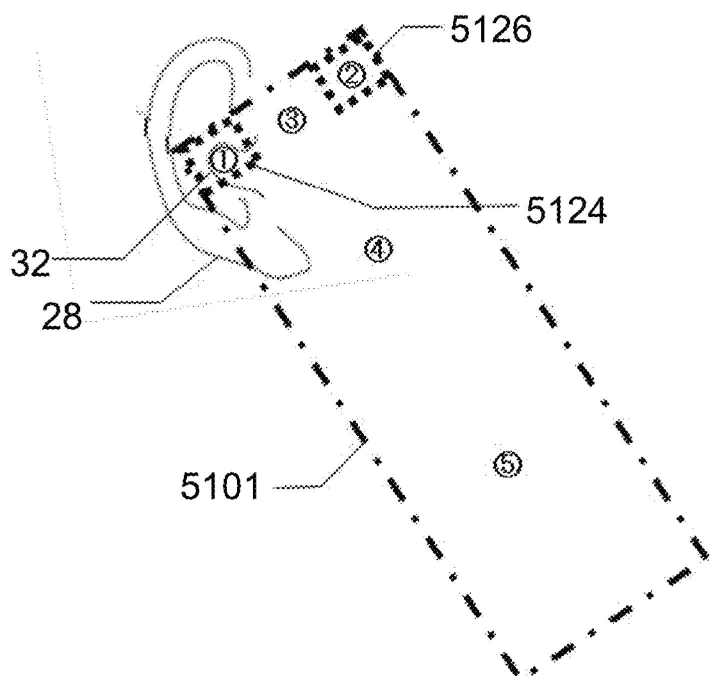
FIGS. 85A and 85B are side views intended to describe the distribution of vibration energy in a mobile telephone in the fifty-fifth embodiment of FIGS. 83A and 83B.
Figure 85B:
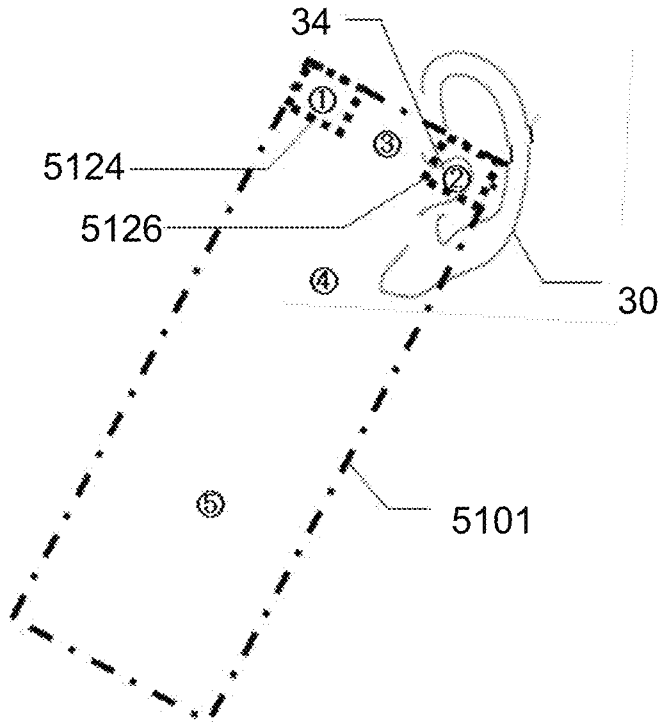

A specific description by way of FIG. 85 shall now be provided. Because the vibration energy is concentrated on the cartilage conduction units 5124 and 5126, the amplitude and acceleration of vibration are greatest at positions (1) and (2) on the surface of the chassis of the mobile telephone 5101 (see the encircled numbers 1, 2 in FIG. 85), and a position (3) between the cartilage conduction units 5124 and 5126 on the chassis of the mobile telephone 5101 (see the encircled number 3 in FIG. 85) has somewhat less amplitude and acceleration of vibration. Also, a position (4) and a position (5) (see the encircled numbers 4, 5 in FIG. 85) are separated from the positions (1) and (2) in that order, and have correspondingly decreasing amplitude and acceleration of vibration on the surface of the chassis of the mobile telephone 5101. For example, the amplitude and acceleration of vibration on the surface of the chassis of the mobile telephone 5101 at the position (5), which is separated from each of the positions (1) and (2) by 5 cm or more, become ¼ or less (25% or less) of the amplitude and acceleration of vibration on the surface at the cartilage conduction units 5124 and 5126. FIG. 85A illustrates the state where the mobile telephone 5101 in which vibration is thus distributed is held up to the right ear 28 and suitable cartilage conduction is obtained, and FIG. 85B illustrates the state where the mobile telephone 5101 is held up to the left ear 30 and similarly suitable cartilage conduction is obtained.

The feature by which the vibration energy for the cartilage conduction described above is concentrated at the parts of expected contact with the ear cartilage at the entrance part of the external auditory meatus is not limited to the fifty-fifth embodiment illustrated in FIGS. 83 to 85, and also appears in several other embodiments that have already been described. For example, the first to third, eleventh to fourteenth, twenty-ninth to thirty-third, thirty-fifth, thirty-sixth, forty-second to forty-fourth, forty-sixth to fiftieth, fifty-second, and fifty-fifth embodiments are examples where the vibration acceleration or amplitude of vibration at the parts of expected contact is greater than the vibration acceleration or amplitude of vibration at portions separated from the parts of expected contact, this effect being particularly pronounced in configurations as in the twenty-ninth, thirtieth to thirty-third, forty-second to forty-third, forty-sixth to fiftieth, fifty-second, and fifty-fifth embodiments, as will be described later. For reasons that will be described later, the vibration acceleration or amplitude of vibration decreases monotonically, relative to the parts of expected contact, as the distance from the parts of expected contact increases.

The parts of expected contact, at which the vibration energy for cartilage conduction is concentrated in the present invention, do not protrude from the chassis, and are not shaped so as to hinder the use of the mobile telephone. Further, the parts of expected contact are found at positions removed from both the central up-down axis and central left-right axis of the chassis, and are suitably disposed in contact with the ear cartilage at the entrance part of the external auditory meatus. Specifically, the parts of expected contact are found at corner parts or an upper side part or side surface part in the vicinity of the corner parts of the mobile telephone. In other words, the arrangement configuration described above obtains a suitable configuration by which the surface of the outer wall is brought into contact with at least a part of the ear cartilage around the entrance part of the external auditory meatus without making contact with the auricular helix.

As described above, in the present invention, the vibration energy can be concentrated at the parts of expected contact with the ear cartilage at the entrance part of the external auditory meatus not only in the fifty-fifth embodiment of FIGS. 83 to 85 but also in other embodiments. To classify this feature, firstly, the twenty-ninth embodiment, the thirtieth embodiment, the second modification example of the thirty-first embodiment, the thirty-second embodiment, the thirty-third embodiment, and the fifty-fifth embodiment are first examples where elastic bodies create an isolation between the parts of expected contact and the chassis of the mobile telephone, whereby the feature is realized. The twenty-ninth embodiment, the thirtieth embodiment, the thirty-second embodiment, and the thirty-third embodiment are second examples where the primary vibration direction of the piezoelectric bimorph element is avoided and the same is supported on the chassis of the mobile telephone, whereby the vibration energy is concentrated at the parts of expected contact. The thirtieth embodiment, the thirty-first embodiment, and the forty-seventh embodiment are third examples where there is a reduced surface area of contact between the parts of expected contact and the chassis of the mobile telephone supporting the same, whereby the vibration energy is concentrated at the parts of expected contact. The forty-second to forty-fourth embodiment, the forty-sixth embodiment and the modification example thereof, the forty-eighth to fiftieth embodiments, the fifty-second embodiment, and the fifty-fifth embodiment are fourth examples where the holding position of the vibrator is limited to the vicinity of the parts of contact, whereby the vibration energy is concentrated at the parts of expected contact. The forty-sixth embodiment and the modification example thereof, the forty-eighth to fiftieth embodiments, the fifty-second embodiment, and the fifty-fifth embodiment are fifth examples where the parts of expected contact have a different material from that of the chassis of the mobile telephone, whereby the vibration energy is concentrated at the parts of expected contact. However, as is clear from the fact that some embodiments are duplicated in the classifications described above, the features classified as above can in practice be employed in a plurality of combinations.

The various features of the present invention described above are not limited to the embodiments described above. For example, as a modification example of the fifty-fifth embodiment, another possible configuration is one where a hole having a greater cross-sectional area than that of the piezoelectric bimorph element 2525 is opened at each of the elastic bodies 5165*b* and 5165*a*, the cross-section of which is illustrated by FIG. 83B, the piezoelectric bimorph element 2525 being held through the holes by the cartilage conduction units 5124 and 5126. Such a case is structured such that the piezoelectric bimorph element 2525 does not make direct contact with the elastic bodies 5165*b* and 5165*a*, and it becomes possible to prevent the vibration energy of the piezoelectric bimorph element 2525 from being dispersed to the chassis of the mobile telephone 5101 via the elastic bodies 5165*b* and 5165*a*.

The fifty-fifth embodiment described above, similarly with respect to the forty-sixth embodiment illustrated in FIG. 69, is structured such that the vibration of both ends of a single piezoelectric bimorph element 2525 is conducted to the left and right cartilage conduction units 5124 and 5126; however, the implementation of a feature such as that of the fifty-fifth embodiment is not to be limited thereto. For example, the holding structure of the fifty-fifth embodiment of FIG. 83 may be applied to the structure in which one side of the piezoelectric bimorph element 2525 is supported by the cantilever structure, as in the forty-second embodiment of FIG. 65. Furthermore, in a configuration as in the fifty-second embodiment of FIG. 77, where the right ear piezoelectric bimorph element 2525*b* and the left ear piezoelectric bimorph element 2525*a* are employed, the holding structure of the fifty-fifth embodiment of FIG. 83 may be applied to the manner in which the same are each supported by the cantilever structure.

As has already been described, the ability to independently control the right ear and left-ear cartilage-conduction vibration unit s, as in the first to third embodiments in FIGS. 1 to 7 and the fifty-second embodiment in FIG. 77, makes it possible to stop the vibration of the vibration unit, which is not brought into contact with the ear cartilage. In such a case, in the distribution of vibration energy in the case where the vibration of the cartilage conduction unit 5126 is stopped in FIG. 85A illustrating the state where the cartilage conduction unit 5124 is held against the right ear 28, the amplitude and acceleration of vibration are greatest at the position (1); the amplitude and acceleration of vibration subsequently decrease at the position (3), the position (2), the position (4), and the position (5), in this order. By contrast, in the distribution of vibration energy in the case where the vibration of the cartilage conduction unit 5124 is stopped in FIG. 85B illustrating the state where the cartilage conduction unit 5126 is held against the left ear 30, the amplitude and acceleration of vibration are greatest at the position (2); the amplitude and acceleration of vibration subsequently decrease at the position (3), the position (1), the position (4), and the position (5), in this order.

[Fifty-sixth Embodiment]

FIG. 86 is a perspective view and a cross-sectional view relating to a fifty-sixth embodiment according to an aspect of the present invention, which is configured as a mobile telephone 5201. The fifty-sixth embodiment is consistent with the fifty-fifth embodiment illustrated in FIG. 83, except for the holding direction of the cartilage conduction vibration source 2525 constituted of the piezoelectric bimorph element; shared portions have been given like reference numerals, and a description thereof has been omitted unless there is a need.

In the fifty-fifth embodiment of FIG. 83, the metal sheet 2597 of the cartilage conduction vibration source 2525 is arranged so as to be parallel to the front surface of the mobile telephone 5101, and the primary vibration direction is oriented orthogonal to the GUI display unit 3405. By contrast, in the fifty-sixth embodiment of FIG. 86, a metal sheet 2599 of a cartilage conduction vibration unit 5225 is arranged so as to be perpendicular to the front surface of the mobile telephone 5201, as a result of which the primary vibration direction of the cartilage conduction vibration unit 5225 becomes parallel to the GUI display unit 3405, similarly with respect to the first modification example of the forty-second embodiment illustrated in FIG. 65C. The configuration of the fifty-sixth embodiment is suitable for usage where, the front surface side of a corner part (the cartilage conduction unit 5124 or 5126) of the mobile telephone 5201 being held against the ear cartilage identically with respect to the case illustrated in FIG. 85, the top surface side of the corner part is held against the ear cartilage in such a form as to lightly push upward, similarly with respect to the first modification example of the forty-second embodiment. Because the vibration is concentrated on the cartilage conduction unit 5124 or 5126, sufficient cartilage conduction can be obtained merely by bringing only the front surface side of a corner part (the cartilage conduction unit 5124 or 5126) up against the ear cartilage.

In the fifty-sixth embodiment of FIG. 86, because the primary vibration direction of the cartilage conduction vibration unit 5225 is parallel to the front surface of the mobile telephone 5201 (which includes the GUI display unit 3405), there is a smaller vibration component transmitted to the front surface and rear surface, which account for a large surface area of the outer surfaces of the mobile telephone 5201. As a result, there can be a further reduction in sound leakage due to air conduction sound generated at such portions of the large surface area.

The cartilage conduction vibration unit 5225 oriented in the manner described above as in the fifty-sixth embodiment of FIG. 86 is not limited to the fifty-sixth embodiment, but rather can also be employed in the forty-sixth embodiment of FIG. 69, the forty-sixth embodiment of FIG. 71, the forty-ninth embodiment of FIG. 74, and other embodiments.

[Fifty-seventh Embodiment]

FIG. 87 is a block diagram relating to a fifty-seventh embodiment according to an aspect of the present invention, which is configured as a mobile telephone 5301. A piezoelectric bimorph element 5325 constituting the cartilage conduction vibration unit in the fifty-seventh embodiment has a drive circuit configured as a power management circuit for supplying, together with a single-chip integrated power management IC 5303, power to each of the parts of the mobile telephone 5301.

The integrated power management IC 5303 has a power management unit 5353 and supplies different, respectively predetermined power voltages to an RF circuit unit 5322 connected to an analog baseband unit 5313 and an antenna 5345 and coupled to a digital baseband unit 5312, and to other elements constituting the telephone communication unit, on the basis of the power supply from a battery 5348. The power management unit 5353 further supplies different, respectively predetermined power voltages to: an application processor 5339 corresponding to the controller 39 or the like illustrated in other embodiments, a camera unit 5317 (depicted as a consolidation of the backside main camera and videoconferencing function in-camera illustrated in other embodiments), a liquid crystal display device 5343 and touch panel 5368 in a display unit 5305, and other elements. The application processor 5339, which is linked with a memory 5337 (depicted as a consolidation of a program holding function and a data writing and holding function), controls the entirety of the mobile telephone 5301 and is capable transferring signals with external apparatuses via a memory card 5319 (depicted as a consolidation of a slot and a card) and a USB™ connection terminal 5320.

The power management unit 5353 also supplies different, respectively predetermined power voltages to a controller 5321, an analog front-end unit 5336, an amplifier 5341 for a videoconferencing function speaker 5351, a cartilage conduction acoustic signal processing unit 5338, a charge pump circuit 5354, and other elements within the integrated power management IC 5303. The charge pump circuit 5354 is intended to boost the voltage for the piezoelectric bimorph element 5325, which requires high voltage.

The analog front-end unit 5336 receives an analog audio signal from the application processor 5339, which is outside the integrated power management IC 5303 and supplies the same to the videoconferencing function speaker 5351 via the amplifier 5341, also supplying the analog audio signal to an earphone jack 5314 and the cartilage conduction acoustic signal processing unit 5338. The analog front-end unit 5336 also transmits an analog audio signal picked up from the user by the microphone 5323 to the outside application processor 5339.

The charge pump circuit 5354 operates to boost voltage in cooperation with an exterior attached condenser 5355, which is connected via exterior attached terminals 5355*a* and 5355*b*, and supplies to the amplifier 5340 the voltage needed to drive the piezoelectric bimorph element 5325. The audio signal from the analog front-end unit 5336 thereby drives the piezoelectric bimorph element 5325 via the cartilage conduction acoustic signal processing unit 5338 and the amplifier 5340. Examples corresponding to the functions of the cartilage conduction acoustic signal processing unit 5338 include the acoustics adjustment unit 238 and waveform inverter 240 illustrated in the fourth embodiment of FIG. 8, the cartilage conduction low-pass filter 5040 and cartilage conduction equalizer 5038 illustrated in the fifty-fourth embodiment of FIG. 82, but there is no limitation thereto.

The controller 5321 transfers digital control signals with the application processor 5339, which is outside the integrated power management IC 5303, and controls the power management unit 5353. The controller 5321 controls the analog front-end unit 5336 on the basis of a command from the application processor 5339, and performs such operations as switching between sending the analog audio signal received from the application processor 5339 to the amplifier 5341 or sending the same to the cartilage conduction acoustic signal processing unit 5338, in order to drive the videoconferencing function speaker 5351. The analog front-end unit 5336 also performs such processing as preventing the "popping sound" that accompanies the switching from being outputted to the earphone jack 5314 and other elements.

The controller 5321 also transfers digital control signals with the application processor 5339, which is outside the integrated power management IC 5303, and controls the cartilage conduction acoustic signal processing unit in a manner relating to the acoustics adjustment, waveform inversion, the cartilage conduction low-pass filter, and the cartilage conduction equalizer, among others as exemplified above.

Because the fifty-seventh embodiment of FIG. 87, as described above, has the drive circuit of the cartilage conduction vibration unit configured as a single-chip integrated IC together with a power management circuit, the cartilage conduction vibration unit can be driven directly, and power voltage can be supplied to the cartilage conduction vibration unit integratedly with the supply of power voltage to the various constituent elements inside the mobile telephone, it being possible to also integrate the control thereof. Also, having the cartilage conduction acoustic signal processing unit for the cartilage conduction vibration unit configured as a single-chip integrated IC together with a power management part further allows for the control of the audio signals of the piezoelectric bimorph element to be integrated. In a case where the piezoelectric bimorph element is employed as the cartilage conduction vibration unit, although high voltage is needed to drive the same, having the drive circuit of the cartilage conduction vibration unit configured as a single-chip integrated IC together with a power management unit, as in the fifty-seventh embodiment of FIG. 87, makes it possible to drive the piezoelectric bimorph element without the need to add a separate chip for a boosted-voltage circuit. Having the cartilage conduction acoustic signal processing unit dedicated to driving the cartilage conduction vibration unit configured as a single-chip integrated IC together with a power management part further allows for the control of the audio signals of the piezoelectric bimorph element to be integrated. It is accordingly possible to endow the mobile telephone with a suitable cartilage conduction function merely by inputting an ordinary audio signal to the integrated IC and connecting the cartilage conduction vibration unit to the integrated IC.

Further, having the analog-front end unit configured as a single-chip integrated IC together with the power management unit allows for the output of audio signals to be collectively switched and adjusted. Specifically, the transfer of digital control signals between the integrated IC and the application processor, relating to the functions of the overall mobile telephone inclusive of the functions of the cartilage conduction vibration unit, can be integrated with the transfer of analog audio signals between the integrated IC and the application processor.

The circuit configuration in which the drive circuit of the cartilage conduction vibration unit is configured as the power management unit and the single-chip integrated IC, as in the fifty-seventh embodiment of FIG. 87, can also be applied to the various other embodiments that have already been described.

[Fifty-eighth Embodiment]

FIG. 88 is a perspective view and a cross-sectional view relating to a fifty-eighth embodiment according to an aspect of the present invention, which is configured as a mobile telephone 5401. The fifty-eighth embodiment is consistent with the fifty-fifth embodiment illustrated in FIG. 83, except for a configuration intended as a countermeasure against sound leakage due to air conduction sound (described later), and therefore shared portions have been given like reference numerals and a description thereof has been omitted unless there is a need.

In the fifty-eighth embodiment of FIG. 88, similarly with respect to the fifty-fifth embodiment illustrated in FIG. 83, there is slight vibration conducted to the chassis of the mobile telephone 5401 via the elastic bodies 5165*b* and 5165*a* from the cartilage conduction units 5124 and 5126 composed of a hard material, which hold the cartilage conduction vibration source 2525. The front surface and rear surface of the mobile telephone 5401, which account for a large surface area of the outer surfaces thereof, are thereby made to vibrate, and slight sound leakage due to air conduction sound is generated. In the fifty-eighth embodiment of FIG. 88, the outer surface of the chassis of the mobile telephone 5401, except for the portions of the GUI display unit 3405 and the microphone 23, is covered by an elastic body 5463, as a countermeasure against such sound leakage. Herein, the elastic body 5463 is bonded so as to be integrated with the chassis of the mobile telephone 5401. The portion of the GUI display unit 3405 then becomes an opening part so as not to hinder GUI operation. The portion of the microphone 23 is configured as the microphone cover unit 467 having a sponge-like or similar structure that will not hinder the air conduction of audio, similarly with respect to the fifth embodiment of FIG. 11

The elastic body 5463 for covering the outer surface of the chassis of the mobile telephone 5401 is preferably made of the same vinyl-based, urethane-based, or other type of vibration insulation material and cushioning material as the elastic bodies 5165*b* and 5165*a*, or such a material similar thereto. The cartilage conduction units 5124 and 5126 composed of a hard material, which hold the cartilage conduction vibration source 2525, are, in the fifty-eighth embodiment of FIG. 88, thereby in contact with the chassis of the mobile telephone 5401 through being included via the elastic bodies 5165*b*, 5165*a* and the elastic body 5463. The cartilage conduction vibration source 2525 accordingly does not make direct contact with the chassis of the mobile telephone 5401.

Also, because the elastic body 5463 is not an insertable/releasable cover as in the fifth embodiment of FIG. 11, but is bonded so as to be integrated with a large portion of the surface area of the surface of the chassis of the mobile telephone 5401, the vibration of the large portion of the surface area of the surface of the chassis of the mobile telephone 5401 is suppressed by the weight and elasticity thereof in both the interior and exterior directions over the amplitude of vibration, and vibration energy is also absorbed. The surface of the mobile telephone 5401, which is contact with the air, is also given elasticity. The air conduction sound generated from the surface of the chassis of the mobile telephone 5401, caused by the vibration of the cartilage conduction vibration source 2525 across the chassis of the mobile telephone 5401, is thereby attenuated. On the other hand, because the elastic body 5463 has an acoustic impedance approximating that of the ear cartilage, there is favorable cartilage conduction to the ear cartilage from the cartilage conduction units 5124 and 5126. The manner in which the elastic body 5463 covers the surface of the chassis of the mobile telephone 5401 also functions as a protection for when the mobile telephone 5401 collides with an external unit.

[Fifty-ninth Embodiment]

FIG. 89 is a perspective view and a cross-sectional view relating to a fifty-ninth embodiment according to an aspect of the present invention, which is configured as a mobile telephone 5501. The fifty-ninth embodiment is consistent with the forty-second embodiment illustrated in FIG. 65, except for a configuration intended as a countermeasure against sound leakage due to air conduction sound, and therefore portions shared by cross-sectional views in FIGS. 89B and 89C with the cross-sectional views in FIGS. 65A and 65B have been assigned like reference numerals, and a description thereof has been omitted unless there is a need. The perspective view of FIG. 89A is consistent with the fifty-eighth embodiment of FIG. 88A, and therefore shared portions have been assigned like reference numerals and a description thereof has been omitted unless there is a need.

In the fifty-ninth embodiment of FIG. 89, one end of the piezoelectric bimorph element 2525 is held in a hole in a support structure 3800*a* for holding the cartilage conduction vibration source 2525, the support structure 3800*a* extending inward from a side surface 3807 and top surface 3807*a* of the mobile telephone 5501. The vibration of the cartilage conduction vibration source 2525 is therefore conducted to the chassis of the mobile telephone 5501 via the side surface 3807 and top surface 3807*a* of the mobile telephone 5501 from the support structure 3800*a*, and the front surface and rear surface of the mobile telephone 5501, which account for a large surface area of the outer surfaces thereof, are therefore made to vibrate. There is also greater sound leakage due to the air conduction sound generated thereby than there is in the case of the fifty-sixth embodiment of FIG. 86. However, in the fifty-ninth embodiment of FIG. 89, similarly with respect to the fifty-eighth embodiment of FIG. 88, the outer surface of the chassis of the mobile telephone 5501, except for the portions of the GUI display unit 3405 and the microphone 23, is covered by an elastic body 5563, as a countermeasure against such sound leakage. Herein, the elastic body 5563 is bonded so as to be integrated with the chassis of the mobile telephone 5501. The portion of the GUI display unit 3405 then becomes an opening part so as not to hinder GUI operation. The portion of the microphone 23 is configured as the microphone cover unit 467 having a sponge-like or similar structure that will not hinder the air conduction of audio, similarly with respect to the fifth embodiment of FIG. 11. This is a point of similarity with the fifty-eighth embodiment of FIG. 88.

The elastic body 5563 for covering the outer surface of the chassis of the mobile telephone 5501 is preferably made of a vinyl-based, urethane-based, or other type of vibration insulation material and cushioning material, similarly with respect to the fifty-eighth embodiment of FIG. 88. Due to the above configuration, in the fifty-ninth embodiment of FIG. 89 as well, the vibration of a large portion of the surface area of the surface of the chassis of the mobile telephone 5501 is suppressed by the weight and elasticity of the covering elastic body 5563 in both the interior and exterior directions over the amplitude of vibration, and vibration energy is also absorbed. The surface of the mobile telephone 5501, which is contact with the air, is also given elasticity. The air conduction sound generated from the surface of the chassis of the mobile telephone 5501, caused by the vibration of the cartilage conduction vibration source 2525, is thereby attenuated. On the other hand, because the elastic body 5563 has an acoustic impedance approximating that of the ear cartilage, there is favorable cartilage conduction to the ear cartilage from the upper part corner 3824, which is a suitable site to be brought up against the tragus or other part of the ear cartilage. A further point of similarity with the fifty-eighth embodiment of FIG. 88 is that the manner in which the elastic body 5563 covers the surface of the chassis of the mobile telephone 5501 also functions as a protection for when the mobile telephone 5501 collides with an external unit.

[Sixtieth Embodiment]

FIG. 90 is a perspective view and a cross-sectional view relating to a sixtieth embodiment according to an aspect of the present invention, which is configured as a mobile telephone 5601. The sixtieth embodiment is consistent with the forty-sixth embodiment illustrated in FIG. 69, except for a configuration intended as a countermeasure against sound leakage due to air conduction sound, and therefore shared portions are given like reference numerals, and a description thereof has been omitted unless there is a need.

In the sixtieth embodiment of FIG. 90, similarly with respect to the forty-sixth embodiment of FIG. 69, elastic body units 5663*a* and 5663*b*, serving as protectors, are provided to the two corners of the upper part of the mobile telephone 5601. The inner sides thereof have a dual purpose as units for holding both ends of the cartilage conduction vibration source 2525, and the outer sides have a dual purpose as cartilage conduction units for making contact with the ear cartilage. The elastic body units 5663*a* and 5663*b* utilize an elastic material having an acoustic impedance approximating that of ear cartilage (a silicone rubber; a mixture of a silicone rubber and a butadiene rubber; a natural rubber; a structure formed using these varieties of rubber in which air bubbles are sealed; a structure, such as can be seen in transparent packaging sheet materials and the like, in which a layer of groups of air bubbles is sealed separated by a thin film of synthetic resin; or the like).

In the sixtieth embodiment of FIG. 90 as well, a substantial component of the vibration of the elastic body units 5663*a* and 5663*b* for holding the cartilage conduction vibration source 2525 is conducted to the chassis of the mobile telephone 5601, and the front surface and rear surface of the mobile telephone 5601, which account for a large surface area of the outer surfaces thereof, are made to vibrate, thus generating air conduction sound. However, in the sixtieth embodiment of FIG. 90 as well, there extends in a sheet-shaped manner from the elastic body units 5663*a* and 5663*b* an elastic body 5663 composed of the same material, as a countermeasure against sound leakage caused by the aforesaid air conduction sound; the elastic body 5663 covers the outer surfaces of the mobile telephone 5601 except for the portions of the GUI display unit (the same part as a GUI display unit 3405 in FIGS. 88 and 99) and the microphone 23. In the sixtieth embodiment of FIG. 90 as well, similarly with respect to the fifty-eighth embodiment of FIG. 88 and the fifty-ninth embodiment of FIG. 89, the elastic body 5663 is bonded so as to be integrated with the chassis of the mobile telephone 5601. The portion of the GUI display unit 3405 then becomes an opening part so as not to hinder GUI operation. The portion of the microphone 23 is configured as the microphone cover unit 467 having a sponge-like or similar structure that will not hinder the air conduction of audio, similarly with respect to the fifth embodiment of FIG. 11. This is a point of similarity with the fifty-eighth embodiment of FIG. 88 and the fifty-ninth embodiment of FIG. 89.

Due to the above configuration, in the sixtieth embodiment of FIG. 90 as well, the vibration of a large portion of the surface area of the surface of the chassis of the mobile telephone 5601 is suppressed by the weight and elasticity of the covering elastic body 5663 in both the interior and exterior directions over the amplitude of vibration, and vibration energy is also absorbed. The surface of the mobile telephone 5601, which is in contact with the air, is also given elasticity. The air conduction sound generated from the surface of the chassis of the mobile telephone 5601, caused by the vibration of the cartilage conduction vibration source 2525, is thereby attenuated. The manner in which the elastic body 5663 covers the surface of the chassis of the mobile telephone 5601 also functions as a protection for those portions other than the elastic body units 5663*a* and 5663*b*.

[Sixty-first Embodiment]

FIG. 91 is a perspective view and a cross-sectional view relating to a sixty-first embodiment according to an aspect of the present invention, which is configured as a mobile telephone 5701. The sixty-first embodiment is consistent with the fifty-fifth embodiment illustrated in FIG. 83, except for a configuration intended as a countermeasure against sound leakage due to air conduction sound, and therefore shared portions are given like reference numerals, and a description thereof has been omitted unless there is a need.

In the sixty-first embodiment of FIG. 91, similarly with respect to the fifty-fifth embodiment illustrated in FIG. 83, both ends of the cartilage conduction vibration source 2525 are held by the cartilage conduction units 5124 and 5126 composed of a hard material, and are supported by the chassis of the mobile telephone 5701 via the elastic bodies 5165*b* and 5165*a*. In such a structure, as has already been described in the fifty-eighth embodiment of FIG. 88, there is slight vibration conveyed to the chassis of the mobile telephone 5701, thus generating sound leakage due to air conduction sound generated from the front surface and rear surface thereof. As a countermeasure to this sound leakage, the sixty-first embodiment of FIG. 91 has a pressure-fixation structure 5701*h* made of a screwed-in metal sheet or the like for pressing and affixing internal configuration components 5748 of the mobile telephone 5701, including a battery and the like, to the inner surface of the chassis of the mobile telephone 5701. The weight of the internal configuration 5748, including the battery and the like, is thereby integrated with the chassis of the mobile telephone 5701, and the vibration of a large portion of the surface area of the chassis is thereby suppressed across both the interior and exterior directions in the amplitude thereof, wherefore the generation of air conduction sound is attenuated.

In the sixty-first embodiment of FIG. 91, there is further a surplus space within the chassis of the mobile telephone 5701, which is filled in with a sound-absorbent packing material 5701*i* composed of nonwoven cloth or the like. The surplus space within the chassis of the mobile telephone 5701 is thereby finely sub-divided and the air within the chassis is prevented from resonating, thus attenuating the generation of air conduction sound. To facilitate understanding, FIG. 91C provides a simplified depiction of the manner in which the internal configuration 5748, the pressure fixation structure 5701*h*, and the sound-absorbent packing material 5701*i* are packed, but the structure therefor is in practice very complex; also, the pressure fixation structure 5701*h* is not limited to pressing and fixing the internal configuration 5748 only to the rear surface side of the mobile telephone 5701, as is depicted. For the fine sub-division of the surplus space within the chassis of the mobile telephone 5701, a barrier wall also may be provided to the inner side of the chassis, instead of packing in the sound-absorbing packing material 5701*i*.

The implementation of the various features of the present invention illustrated by the embodiments above is not to be limited to the respective embodiments above. For example, in FIGS. 88 to 90 above, on the rear surface and other portions accounting for a large surface area of the outer surfaces of the mobile telephone, the width of the cross-sections of the elastic bodies for covering has been depicted as being approximately equivalent to the width of the cross-section of the chassis. However, as long as the strength of the chassis is maintained, the thickness of the cross-section of the chassis can be reduced as much as possible, and the thickness of the cross-section of the elastic body for covering the same can be increased as much as possible, so that the chassis theoretically comprises the elastic body, and the effect of preventing sound leakage is improved. At such a time, a configuration in which the barrier wall for finely sub-dividing the surplus space is provided to the interior of the chassis is further advantageous in retaining strength, and contributes to rendering the chassis thinner.

In the sixtieth embodiment illustrated in FIG. 90, the elastic body units 5663*a* and 5663*b* having multiple purposes as protectors, as parts for holding both ends of the cartilage conduction vibration source 2525, and as cartilage conduction units are contiguous with the elastic body 5663, being of the same material, but there is no limitation to such a configuration. For example, the elastic body units 5663*a* and 5663*b* may be components that are separated from the elastic body 5663, or may necessarily not be in contact. The elastic body units 5663*a* and 5663*b* may also be constituted of a different material from that of the elastic body 5663.

Further, for the sake of simplicity, the fifty-eighth to sixtieth embodiments illustrated in FIGS. 88 to 90 depict configurations in which the vibration of the chassis of the mobile telephone is covered and suppressed by an exterior elastic body, and the sixty-first embodiment of FIG. 91 depicts a configuration in which the vibration of the chassis of the mobile telephone is suppressed by the pressure fixation of the weight of the internal configuration of the mobile telephone. However, there is no limitation to the case where these elements are employed separately, as in the embodiments, but rather the configuration may be such that the two are used concurrently and the vibration of the interior and exterior of the chassis of the mobile telephone is suppressed therefrom.

(Sixty-second Embodiment)

FIG. 92 is a perspective view and a side view of a sixty-second embodiment according to an aspect of the present invention, configured as a land-line telephone 5800. As shown in perspective view in FIG. 92 (A), the land-line telephone 5800 includes a telephone base station 5801 and a cordless handset 5881. The telephone base station 5801 is furnished with a display unit 5805, a videoconferencing camera 5817, a videoconferencing microphone 5823, a videoconferencing speaker 5851, and the like.

FIG. 92 (B) shows the handset 5881 of the land-line telephone 5800 in a state positioned upright in a charger 5848. This handset 5881 is identical to the cordless handset 5881 in FIG. 92 (A), and is therefore illustrated with the same symbol. As shown in FIG. 92 (B), the cordless handset or the handset 5881 (hereinafter, both shall be denoted as "cordless handset 5881") has a cartilage conduction unit 5824 that defines a gentle convex face; when the cordless handset 5881 is placed against the ear, this cartilage conduction unit 5824 fits naturally into a depression of the ear having the external auditory meatus as the bottom, coming into contact with the ear cartilage over a wide area. The cordless handset (or handset) 5881 also has an outgoing-talk unit 1423 comparable to that shown in the mobile telephone embodiment.

FIG. 92 (C) illustrates a side surface of the cordless handset (or handset) 5881, and shows the cordless handset (or handset) 5881 placed against an ear 30, at which time the gentle convex face of the cartilage conduction unit 5824 fits into the depression of the ear having the external auditory meatus as its bottom, and comes into contact with the ear cartilage over a wide area. As will be clear from the side view in FIG. 92 (C), in the sixty-second embodiment, the cartilage conduction unit 5824 has a shape defined by a portion of a spherical face. In an ordinary handset, the ear-contacting part has a concave face for forming a closed space to the front of the ear; however, the handset for cartilage conduction according to the present invention conversely has a convex face, and can be given a natural shape readily fitting into the depression of the ear having the external auditory meatus as its bottom.

Figure 93:
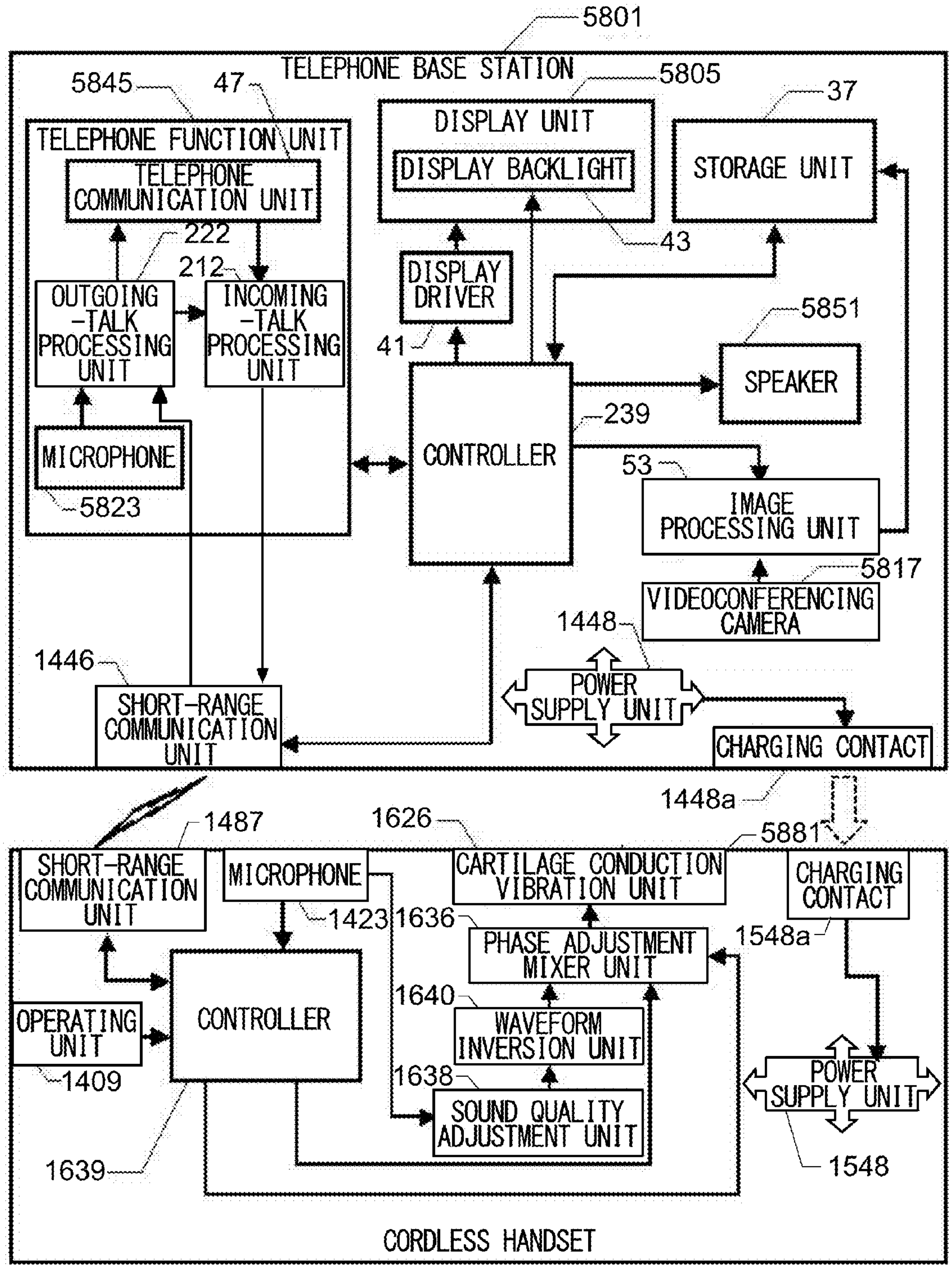
FIG. 93 is a block diagram of the sixty-second embodiment of FIG. 93.

FIG. 93 is a block diagram of the sixty-second embodiment, in which identical components have been assigned the same reference numerals as in FIG. 92. Additionally, as the configuration shown in the block diagram has much in common with the seventeenth embodiment of FIG. 29, the same reference numerals as those assigned to these parts have been assigned to corresponding portions. Descriptions of these identical or corresponding portions are omitted, unless there is a particular need. Even for portions not assigned identical numerals, for example, the videoconferencing camera 5817, the portion corresponds to the videoconferencing inside camera 17 in the mobile telephone 1601 of FIG. 29, and the functions thereof are basically identical. Moreover, while the sixty-second embodiment pertains to a land-line telephone and therefore represents a different system from a mobile telephone, the telephone functionality is basically identical, and therefore the illustration of a telephone function unit 5845 in FIG. 93 is similar. This is true of the power supply unit as well: while the power source differs, the functions are basically identical, and therefore the same reference numeral as in FIG. 29 is assigned. FIG. 93 also illustrates charging contacts 1448*a* and 1548*a*, for charging the cordless handset (or handset) 5881 while placed in the telephone base station 5801 or the charger 5848.

FIG. 94 shows side cross sectional views of cordless handsets in the sixty-second embodiment of FIG. 92 and modification examples thereof, showing the relationship of a piezoelectric bimorph element constituting the cartilage conduction vibration source, and the cartilage conduction unit having a convex face. FIG. 94 (A) shows a side cross sectional view of the cordless handset 5881 of the sixty-second embodiment, in which a vibration conductor 5827 is affixed to the inside of a cartilage conduction unit 5824, with the center part of a piezoelectric bimorph element 2525*d* being supported by this vibration conductor 5827. Both ends of the piezoelectric bimorph element 2525*d* can vibrate freely, the counteraction thereof being transmitted to the cartilage conduction unit 5824 via the vibration conductor 5827.

FIG. 94 (B) is a side cross sectional view of a cordless handset 5881*a* in a first modification example of the sixty-second embodiment. Whereas the cartilage conduction unit 5824 in the cordless handset 5881*a* of the sixty-second embodiment was a partial spherical face, the cartilage conduction unit 5824*a* in the first modification example has an acute-angled conical (cone) shape. The configuration whereby the vibration conductor 5827*a* is affixed to the inside of the cartilage conduction unit 5824*a*, and supports the center part of a piezoelectric bimorph element 2525*e*, is shared with the sixty-second embodiment.

FIG. 94 (C) is a side cross sectional view of a cordless handset 5881*b* in a second modification example of the sixty-second embodiment. As in the first modification example, the cartilage conduction unit 5824*b* in the cordless handset 5881*b* of the second modification example has an acute-angled conical (cone) shape. In the second modification example of FIG. 94 (C), a vibration conductor 5827*b* is affixed to the inside of the cartilage conduction unit 5824*b*, and supports one end of a piezoelectric bimorph element 2525*f*. The other end of the piezoelectric bimorph element 2525*f* can vibrate freely, the counteraction thereof being transmitted to the cartilage conduction unit 5824*b* via the vibration conductor 5827*b*.

FIG. 94 (D) is a side cross sectional view of a cordless handset 5881*c* in a third modification example of the sixty-second embodiment. As in the first modification example and the second modification example, the cartilage conduction unit 5824*c* in the cordless handset 5881*c* of the third modification example has an acute-angled conical (cone) shape. In the third modification example of FIG. 94 (D), a low-end piezoelectric bimorph element 2525*g* and a high-end piezoelectric bimorph element 2525*h* are respectively bonded directly to the inside of the cartilage conduction unit 5824*c*, such that the vibrating surface side thereof is in contact therewith. In so doing, vibration of the piezoelectric bimorph element 2525*g* and the piezoelectric bimorph element 2525*h* is transmitted directly to the cartilage conduction unit 5824*c*. In this way, through the complementary use of multiple cartilage conduction vibration sources of different frequency characteristics, the frequency characteristics of cartilage conduction can be improved.

In the modification examples of FIG. 94 (B) to FIG. 94 (D), the convex-faced cartilage conduction unit is of conical (cone) shape. By adopting such a configuration, the side surface of the conical element (cone) fits into the external auditory meatus, irrespective of individual differences in the size of the external auditory meatus, so that cartilage conduction from the entire circumference of the external auditory meatus can be achieved.

(Sixty-third Embodiment)

Figures 94A, 94B, 94C, 94D:
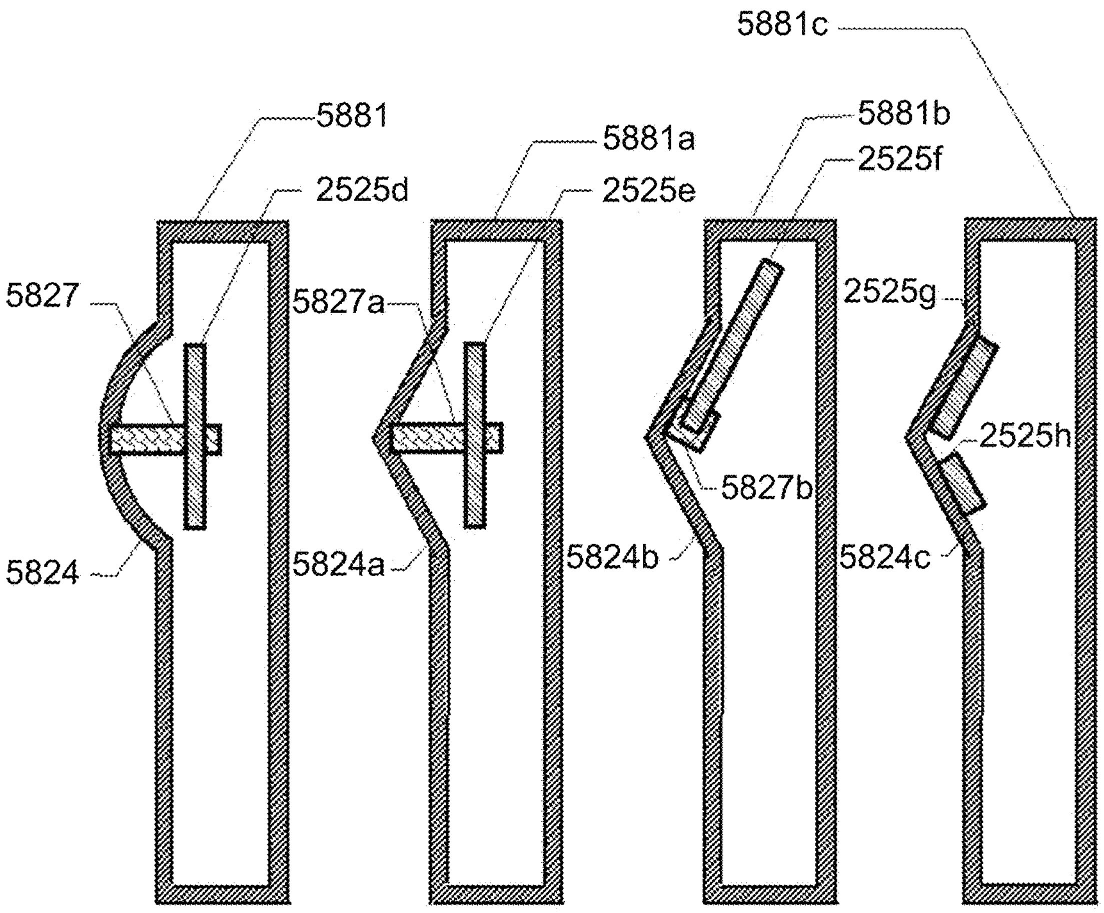
FIGS. 94A, 94B, 94C and 94D are side cross sectional views of cordless handsets in the sixty-second embodiment of FIGS. 92A, 92B and 92C and modification examples thereof.
Figure 95A:
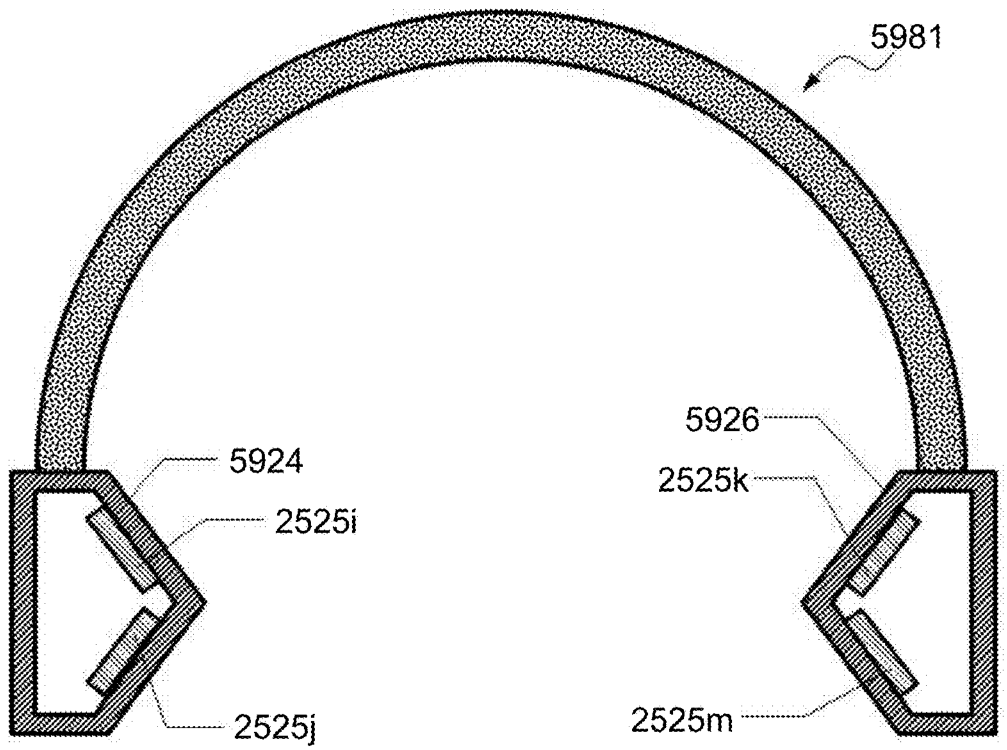
FIGS. 95A, 95B and 95C are cross sectional views of a sixty-third embodiment according to an aspect of the present invention (sixty-third embodiment)
Figure 95B:
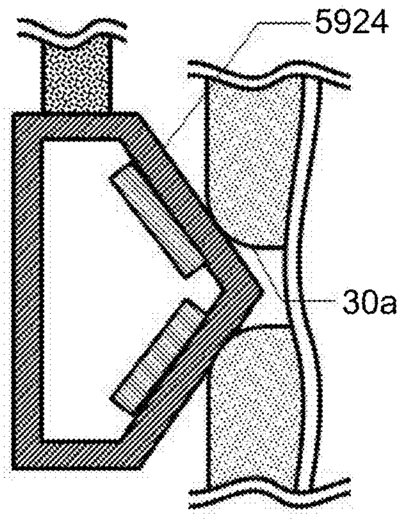
Figure 95C:
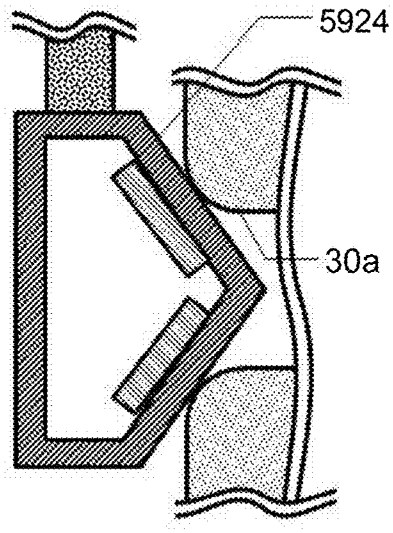

FIG. 95 is a cross sectional view relating to a sixty-third embodiment according to an aspect of the present invention, which is configured as stereo headphones 5981. FIG. 95 (A) is a cross sectional view of the stereo headphones 5981 in their entirety, which have a right ear cartilage conduction unit 5924 and a left ear cartilage conduction unit 5926. The right ear cartilage conduction unit 5924 and the left ear cartilage conduction unit 5926 are respectively of conical (cone) convex shape. A piezoelectric bimorph element 2525*i* and a piezoelectric bimorph element 2525*j* are respectively bonded to the inside of the right ear cartilage conduction unit 5924, such that the vibrating surface side thereof is in contact therewith. This construction is basically one shared with the third modification example of the sixty-second embodiment in FIG. 94 (D). Likewise, a piezoelectric bimorph element 2525*k* and a piezoelectric bimorph element 2525*m* are respectively bonded to the inside of the left ear cartilage conduction unit 5926, such that the vibrating surface side thereof is in contact therewith.

FIG. 95 (B) and FIG. 95 (C) describe a feature whereby, by adopting a convex face of conical (cone) shape for the right ear cartilage conduction unit 5924 (and the left ear cartilage conduction unit 5926), the right ear cartilage conduction unit 5924 (and the left ear cartilage conduction unit 5926) can be made to fit into an external auditory meatus 30*a*, irrespective of individual differences in the size of the external auditory meatus 30*a*; and respectively show a representative enlarged section of the right ear cartilage conduction unit 5924 in the sixty-third embodiment. FIG. 95 (B) shows a case of use of the stereo headphones 5981 by an individual whose external auditory meatus 30*a* is relatively small, in which case a section comparatively towards the distal end of the conical element of the right ear cartilage conduction unit 5924 contacts the entire circumference of the external auditory meatus 30*a*. In contrast to this, FIG. 95 (C) shows a case of use of the stereo headphones 5981 by an individual whose external auditory meatus 30*a* is relatively large, in which case the conical element of the right ear cartilage conduction unit 5924 slips more deeply into the external auditory meatus, so that a section comparatively towards the basal end of the conical element contacts the entire circumference of the external auditory meatus 30*a*. However, as will be clear from an examination of FIG. 95 (B) and FIG. 95 (C), the depth to which the conical element of the right ear cartilage conduction unit 5924 slips into external auditory meatus 30*a* has no significant effect on cartilage conduction, and by adopting a conical shape for the right ear cartilage conduction unit 5924, the right ear cartilage conduction unit 5924 can be made to unfailingly contact the entire circumference of the external auditory meatus 30*a* in satisfactory fashion, irrespective of individual differences in the size of the external auditory meatus 30*a*. Like the right ear cartilage conduction unit 5924, the left ear cartilage conduction unit 5926 will also be made to contact the entire circumference of the external auditory meatus 30*a* in satisfactory fashion, irrespective of individual differences in the size of the external auditory meatus 30*a*.

By configuring a stereo audio output device by using a pair of sound output devices like those of the sixty-third embodiment, having a cartilage conduction unit with a convex face of conical shape, and a cartilage conduction vibration source for transmitting vibration to the cartilage conduction unit, the cartilage conduction units can be slipped in from the left and the right and pressed respectively into the external auditory meatus of each ear, whereby satisfactory contact of the convex face of conical shape of the cartilage conduction unit against the entire circumference of the external auditory meatus can be achieved.

In the sixty-third embodiment, the conical elements of the right-ear cartilage conduction unit 5924 and the left-ear cartilage conduction unit 5926 are configured with an obtuse angle like that in the third modification example of the sixty-second embodiment in FIG. 94 (D); however, a configuration having an acute angle would be acceptable if needed. In this case, the distal end would be rounded to avoid posing any danger. In the sixty-third embodiment, two piezoelectric bimorph elements each having identical frequency characteristics are bonded to the right-ear cartilage conduction unit 5924 and the left-ear cartilage conduction unit 5926; however, ones having different frequency characteristics, like those in the third modification example of the sixty-second embodiment in FIG. 94 (D), would be acceptable as well. A configuration in which the right-ear cartilage conduction unit 5924 and the left-ear cartilage conduction unit 5926 are each furnished with a single piezoelectric bimorph element would be acceptable as well. In this case, instead of direct adhesion, a configuration in which the element is supported via the vibration conductor, as in the sixty-second embodiment and modification examples thereof in FIG. 94 (A) to FIG. 94 (C), would also be acceptable.

The features of the several inventions described above are not limited to the aforedescribed embodiments, and implementation in other embodiments is possible. For example, in the aforedescribed sixty-second embodiment and sixty-third embodiment, it would be possible to adopt, as the cartilage conduction vibration source thereof, another vibration source such as an electromagnetic vibrator of the sort shown in other aforedescribed embodiments, instead of piezoelectric bimorph elements. Moreover, whereas the aforedescribed sixty-second embodiment described configuration as a handset of a land-line telephone, and the aforedescribed sixty-third embodiment as headphones, respectively, implementation of the features described above is not limited to these. That is, it is possible for the various features described in relation to providing a convex face to the cartilage conduction vibration unit in the aforedescribed embodiments to be implemented, for example, in a configuration for earphones or in a configuration for a headset, as shown in other aforedescribed embodiments. Implementation in a land-line telephone is not limited to the features shown in the aforedescribed sixty-second embodiment, and it is possible for various features which are shown in yet other embodiments by way of an embodiment such as a mobile telephone, to be implemented in the handset of a land-line telephone, as appropriate.

(Sixty-fourth Embodiment)

Figures 96A, 96B, 96C, 96D:
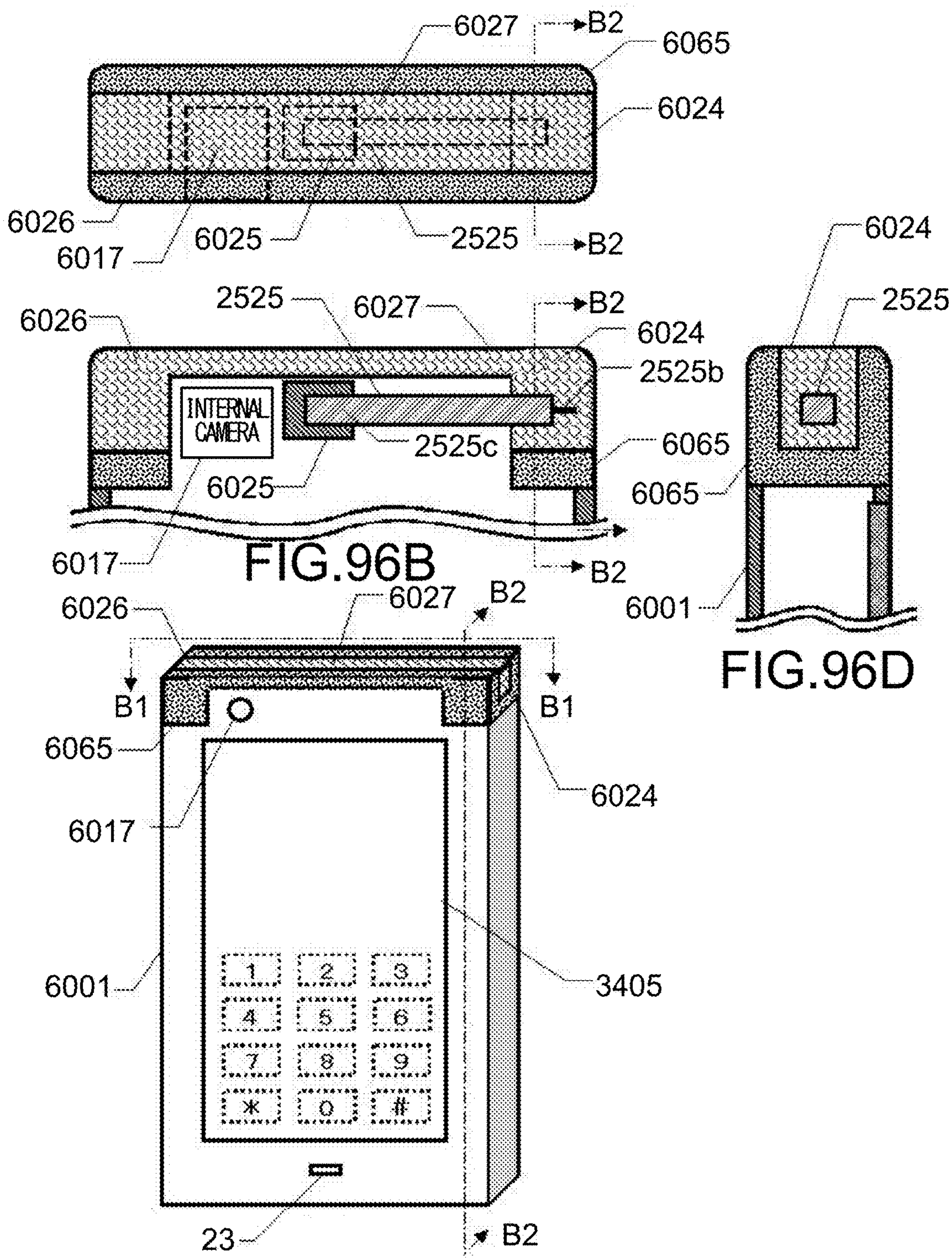
FIGS. 96A, 96B, 96C and 96D are perspective views, cross sectional views, and a top view of a sixty-fourth embodiment according to an aspect of the present invention (sixty-fourth embodiment)

FIG. 96 is a perspective view, a cross sectional view, and a top view relating to a sixty-fourth embodiment according to an aspect of the present invention, configured as a mobile telephone 6001. The sixty-fourth embodiment has much in common with the fifty-fifth embodiment shown in FIG. 83, except for the holding structure of the cartilage conduction unit 2525 (hereinafter denoted as piezoelectric bimorph element 2525) which is constituted by a piezoelectric bimorph element; therefore corresponding portions have been given like reference numerals, and a description has been omitted unless necessary.

In the sixty-fourth embodiment of FIG. 96, as in the fifty-fifth embodiment of FIG. 83, the main vibration direction of the piezoelectric bimorph element 2525 is oriented orthogonal to a GUI display unit 3405, and features a characteristic holding structure. FIG. 96 (A) is a perspective view of the mobile telephone 6001 of the sixty-fourth embodiment seen from the front face; the structure for holding the piezoelectric bimorph element 2525 is produced by integral molding of a right-ear cartilage conduction unit 6024, a left-ear cartilage conduction unit 6026, and a linking unit 6027 linking these, from a hard material. The piezoelectric bimorph element 2525 is supported at the inside of the right-ear cartilage conduction unit 6024, whereby it is possible for vibration thereof to be transmitted directly to the right ear cartilage contacted by the right-ear cartilage conduction unit 6024. Further, vibration of the piezoelectric bimorph element 2525 supported by the right-ear cartilage conduction unit 6024 is transmitted as well to the left-ear cartilage conduction unit 6026 through the linking unit 6027 which serves as a vibration conductor, whereby it is possible to achieve cartilage conduction, without the left-ear cartilage conduction unit 6026 contacting the left ear cartilage.

Further, the aforedescribed hard, integrally molded structure is attached to the chassis of the mobile telephone 6001 via an elastic body 6065 made of ethylene resin, urethane resin, or the like, so that the hard, integrally molded structure directly contacts the chassis of the mobile telephone 6001. Consequently, the elastic body 6065 functions as a vibration isolating material and a cushioning material, and also mitigates transmission of vibration of the piezoelectric bimorph element 2525 to the chassis of the mobile telephone 6001. In so doing, the risk of bothering people nearby, or loss of privacy, due to audible receiver sounds caused by air-conducted sound generated by vibration of the chassis of the mobile telephone 6001 can be prevented. Moreover, because the elastic body 6065 transmits vibration for the purpose of cartilage conduction, good cartilage conduction can be obtained even when the front surface side of a corner of the elastic body 6065 is placed against the ear cartilage.

FIG. 96 (B) is a top cross sectional view of the mobile telephone 6001 taken in the B1-B1 cross section in FIG. 96 (A) (a cross section of the mobile telephone 6001 cut through the center). FIG. 96 (B) shows a top center cross section, from which it may be appreciated that the piezoelectric bimorph element 2525 is supported in cantilever fashion to the inside of the right-ear cartilage conduction unit 6024 in the integrally molded structure, with the side thereof at which a terminal 2525*b* is furnished serving as the held end. While the details of the structure are omitted from the illustration, the inside of the right-ear cartilage conduction unit 6024, which holds the piezoelectric bimorph element 2525 via the terminal 2525*b*, is provided with a connection space and a connecting wire leadout slot therefor.

Meanwhile, as will be clear from FIG. 96 (B), the other end 2525*c* of the piezoelectric bimorph element 2525 is a free vibrating end, to which an inertial weight (inertial bob) 6025 has been attached. The inertial weight 6025 increases the eight of the other end 2525*c*, thereby suppressing movement of the other end 2525*c* through inertia, and increasing the vibration energy drawn from the held end side through vibration of the piezoelectric bimorph element 2525 as counteraction thereof. Stated another way, the held end side of the piezoelectric bimorph element 2525 increases the component that vibrates together with the hard, integrally molded structure with the inertial weight 6025 side as the fulcrum point.

Moreover, as will be clear from FIG. 96 (B), the linking unit 6027 is thinner than the right-ear cartilage conduction unit 6024 and the left-ear cartilage conduction unit 6026, so that the right-ear cartilage conduction unit 6024 and the left-ear cartilage conduction unit 6026 are linked in "shoulder pole" fashion so as to bypass the internal components of the mobile telephone 6001. In so doing, it is possible to devise a layout for an in-camera 6017 and the like, which are preferably situated in the upper part of the mobile telephone 6001. The thickness of the linking unit 6027 need merely be one sufficient to achieve rigid fastening of the positional relationships of the right-ear cartilage conduction unit 6024 and the left-ear cartilage conduction unit 6026, so linking structures other than that shown in FIG. 96 are possible. Moreover, seen from the standpoint of functionality as a cartilage conduction unit as well, it is sufficient for the linking unit 6027 to have a relatively small cross sectional area, and therefore there is a greater degree of freedom in relation to placement of components inside the mobile telephone 6001 in relation to the linking unit 6027.

FIG. 96 (C) is an exterior view of the mobile telephone 6001 seen from the top face, in which the integrally molded structure including the right-ear cartilage conduction unit 6024, the left-ear cartilage conduction unit 6026, and the linking unit 6027 linking these is exposed. An elastic body 6065 sandwiching these from both sides is exposed as well. In FIG. 96 (C), the interrelationships of the internal piezoelectric bimorph element 2525, the inertial weight 6025, and the in-camera 6017, as well as the boundary lines of the right-ear cartilage conduction unit 6024, the linking unit 6027, and the left-ear cartilage conduction unit 6026, are shown by broken lines.

FIG. 96 (D) is an upper part cross sectional side view of the mobile telephone 6001 taken in the B2-B2 cross section in FIG. 96 (A)-(C). In this cross sectional side view as well, the right-ear cartilage conduction unit 6024 is attached to the chassis of the mobile telephone 6001 via the elastic body 6065 serving as an isolating material and a cushioning material, so as to have no direct contact with the mobile telephone 6001 chassis.

(Sixty-fifth Embodiment)

FIG. 97 is a perspective view, a cross sectional view, and a top view of a sixty-fifth embodiment according to an aspect of the present invention, configured as a mobile telephone 6101. The sixty-fifth embodiment has much in common with the sixty-fourth embodiment of FIG. 96, except for a different shape for a right-ear cartilage conduction unit 6124, a left-ear cartilage conduction unit 6126, and a linking unit 6127, and in association therewith, a different shape for an elastic body 6165. Therefore, the discussion focuses mainly on the different portions, assigning like symbols to and the common portions and omitting descriptions thereof unless necessary.

From the perspective view in FIG. 97 (A) it will be clear that in the sixty-fifth embodiment, the right-ear cartilage conduction unit 6124, the left-ear cartilage conduction unit 6126, and the linking unit 6127 linking these are integrally molded from hard material, to a shape covering the upper part of the mobile telephone 6101. In association therewith, the elastic body 6165 is interposed at a location sandwiched vertically between the integrally molded structure and the chassis of the mobile telephone 6101, so that there is no direct contact between the two.

FIG. 97 (B) is an upper part cross sectional view of the mobile telephone 6101 in the B1-B1 cross section in FIG. 97 (A). Because the B1-B1 cross section is a cross section taken of the mobile telephone 6101 cut from the center, there is basically no difference from the sixty-fourth embodiment of FIG. 96 (B); however, when the B1-B1 cross section is shifted in parallel fashion to approach towards the front surface side or the back face side of the mobile telephone 6101, the resultant cross section differs from the sixty-fourth embodiment of FIG. 96, as will be clear from FIG. 97 (A). As will be appreciated from FIG. 97 (B), in the sixty-fifth embodiment, the piezoelectric bimorph element 2525 is supported in cantilever fashion to the inside of the right-ear cartilage conduction unit 6124, with an end part **2525*c* not furnished with a terminal 2525*c* serving as the held end. Meanwhile, the end part of the piezoelectric bimorph element 2525 where the terminal 2525*b* is furnished constitutes a free vibrating end, to which an inertial weight 6125 is attached. While the details of the structure are omitted from the illustration, the piezoelectric bimorph element 2525 is attached via the terminal 2525*b* to the inside of the inertial weight 6125**, which is provided with a connection space and a connecting wire leadout slot therefor. Selection of the held end and the inertial weight attachment end in this manner is not a characteristic feature of the sixty-fifth embodiment, and the attachment method of the sixty-fifth embodiment may be adopted in the sixty-fourth embodiment, or vice-versa.

As will be clear from FIG. 97 (B), in the sixty-fifth embodiment as well, the linking unit 6127 is thinner than the right-ear cartilage conduction unit 6124 and the left-ear cartilage conduction unit 6126, so that the right-ear cartilage conduction unit 6124 and the left-ear cartilage conduction unit 6126 are linked in "shoulder pole" fashion to bypass the internal components of the mobile telephone 6101. In the sixty-fifth embodiment, it is possible in terms of strength for the linking unit 6127 to be even thinner, as the linking unit 6127 has considerable width and covers the entire top face. Further, depending on the design, it is possible to configure the linking unit 6127 to cover not only the top face, but also to wrap around to the front surface side and the back face side, so that the linking unit 6127 can be even thinner.

FIG. 97 (C) is an exterior view of the mobile telephone 6101 seen from the top face, in which the integrally molded structure including the right-ear cartilage conduction unit 6124, the left-ear cartilage conduction unit 6126, and the linking unit 6127 linking these is visible. In FIG. 97 (C) as well, the interrelationships of the internal piezoelectric bimorph element 2525, an inertial weight 6125, and an in-camera 6117, as well as the boundary lines of the right-ear cartilage conduction unit 6124, the linking unit 6127, and the left-ear cartilage conduction unit 6126, are shown by broken lines.

FIG. 97 (D) is an upper part cross sectional side view of the mobile telephone 6101 taken in the B2-B2 cross section in FIG. 97 (A)-(C). In the cross sectional side view of the sixty-fifth embodiment as well, the right-ear cartilage conduction unit 6124 is attached to the chassis of the mobile telephone 6101 via an elastic body 6165 serving as an isolating material and a cushioning material, so as to have no direct contact with the mobile telephone 6101 chassis.

(Sixty-sixth Embodiment)

FIG. 98 is a perspective view, a cross sectional view, and a top view relating to a sixty-sixth embodiment according to an aspect of the present invention, configured as a mobile telephone 6201. The sixty-sixth embodiment likewise has much in common with the sixty-fourth embodiment of FIG. 96 and the sixty-fifth embodiment of FIG. 97, except for a different shape for a right-ear cartilage conduction unit 6224, a left-ear cartilage conduction unit 6226, and a linking unit 6227, and in association therewith, a different shape for an elastic body 6265. Therefore, the discussion focuses mainly on the different portions, assigning like symbols to and the common portions and omitting descriptions thereof unless necessary.

From the perspective view in FIG. 98 (A) it will be clear that in the sixty-sixth embodiment, the right-ear cartilage conduction unit 6224 and the left-ear cartilage conduction unit 6226 are exposed to the outside, while the linking unit 6227 which links these inside the chassis is not visible from the outside. In association therewith, from the outside, the elastic body 6265 is visible only in portions isolating the right-ear cartilage conduction unit 6224 and the left-ear cartilage conduction unit 6226 from the chassis of the mobile telephone 6201, and there is no direct contact between the right-ear cartilage conduction unit 6224 and the left-ear cartilage conduction unit 6226 and the chassis of the mobile telephone 6201. Consequently, the sixty-sixth embodiment may be said to have an external appearance in common with that of the fifty-fifth embodiment of FIG. 83, albeit in relation to the external appearance only. The internal structure does differ however, in the manner described below.

FIG. 98 (B) is an upper part cross sectional side view of the mobile telephone 6201 taken in the B1-B1 cross section in FIG. 98 (A). From FIG. 98 (B), it will be clear that in the sixty-sixth embodiment, the right-ear cartilage conduction unit 6224 and the left-ear cartilage conduction unit 6226 are linked inside the chassis by the linking unit 6227. The linking unit 6227 does not contact the chassis interior. A function of transmitting to the left-ear cartilage conduction unit 6226 the vibration of the right-ear cartilage conduction unit 6224 which supports the piezoelectric bimorph element 2525, and a function of rigid integration of the right-ear cartilage conduction unit 6224 and the left-ear cartilage conduction unit 6226, are possible with the linking unit 6227 inside the chassis as in the sixty-sixth embodiment.

FIG. 98 (C) is an exterior view of the mobile telephone 6201 from the top face; at both corners in the upper part of the mobile telephone 6201, the elastic body 6265 is visible, blocking the right-ear cartilage conduction unit 6224 and the left-ear cartilage conduction unit 6226, respectively, as well as vibration thereof, from the chassis. In FIG. 98 (C) as well, the interrelationships of the internal piezoelectric bimorph element 2525, an inertial weight 6225, an in-camera 6217, and the linking unit 6227 are shown by broken lines.

FIG. 98 (D) is an upper part cross sectional side view of the mobile telephone 6201 taken in the B1-B1 cross section in FIG. 98 (A)-(C) The cross sectional side view of the ninety-eighth embodiment is basically no different from the sixty-fifth embodiment of FIG. 97 (B); however, when the B2-B2 cross section is shifted in parallel fashion to approach towards the center side from a side surface of the mobile telephone 6201, the resultant cross section differs from the sixty-fifth embodiment of FIG. 97, as is clear from FIG. 98 (A).

In the sixty-fourth to sixty-sixth embodiments of the preceding FIGS. 96 to 98, the main vibration direction of the piezoelectric bimorph element 2525 was described as being oriented orthogonal to the GUI display unit 3405. However, the orientation at which the piezoelectric bimorph element 2525 is held in these embodiments is not limited to this, and the main vibration direction of the piezoelectric bimorph element 2525 may be oriented parallel to the GUI display unit 3405 (the vertical direction of the mobile telephone). Setting of the main vibration direction of the piezoelectric bimorph element 2525 is accomplished in the manner discussed in detail previously in the fifty-sixth embodiment of FIG. 86 in relation to the fifty-fifth embodiment of FIG. 83.

(Sixty-seventh Embodiment)

FIG. 99 is a perspective view and a cross sectional view relating to a sixty-seventh embodiment according to an aspect of the present invention, configured as a mobile telephone 6301. In the sixty-seventh embodiment, the structure of the sixty-sixth embodiment of FIG. 98, in which the right-ear cartilage conduction unit and the left-ear cartilage conduction unit are rigidly linked by a linking unit, is applied in the fifty-fifth embodiment of FIG. 83; however, other features are common to both, and therefore these common portions have been assigned the same symbols as in the fifty-fifth embodiment of FIG. 83, omitting descriptions thereof unless necessary.

As will be clear from FIG. 99 (B), in the sixty-seventh embodiment, a right-ear cartilage conduction unit 6324 and a left-ear cartilage conduction unit 6326 are linked rigidly into an integrated body inside the chassis by a linking unit 6327. The linking unit 6327 does not contact the chassis interior. This feature of the sixty-seventh embodiment may be said to belong in common to the sixty-sixth embodiment of FIG. 98. However, viewed in terms of functionality, in the sixty-seventh embodiment of FIG. 99, vibration of the piezoelectric bimorph element 2525 is transmitted directly to the right cartilage conduction unit 6324 and the left cartilage conduction unit 6326, respectively, and in this sense alone, the vibration transmission path afforded by the linking unit 6327 is redundant.

However, even in cases in which, as the sixty-seventh embodiment, it is not necessary to transmit vibration between the right cartilage conduction unit 6324 and the left cartilage conduction unit 6326, integration of the two by the linking unit 6327 is highly significant in terms of achieving stable attachment to the chassis. To describe in more specific terms, ordinarily, when an elastic body 6365 disposed between the chassis, and the right cartilage conduction unit 6324 and the left cartilage conduction unit 6326, is made softer or thicker in order to suppress transmission of vibration between the two, the result of doing so is that the hold of the right cartilage conduction unit 6324 and the left cartilage conduction unit 6326 on the chassis becomes unstable. In contrast to this, when the right cartilage conduction unit 6324 and the left cartilage conduction unit 6326 are rigidly linked by the linking unit 6327 as in the sixty-seventh embodiment, the relative positions of both are maintained, so that both can be more stably attached to the chassis, even when the elastic body 6365 is made softer or thicker.

(Sixty-eighth Embodiment)

Figure 100:
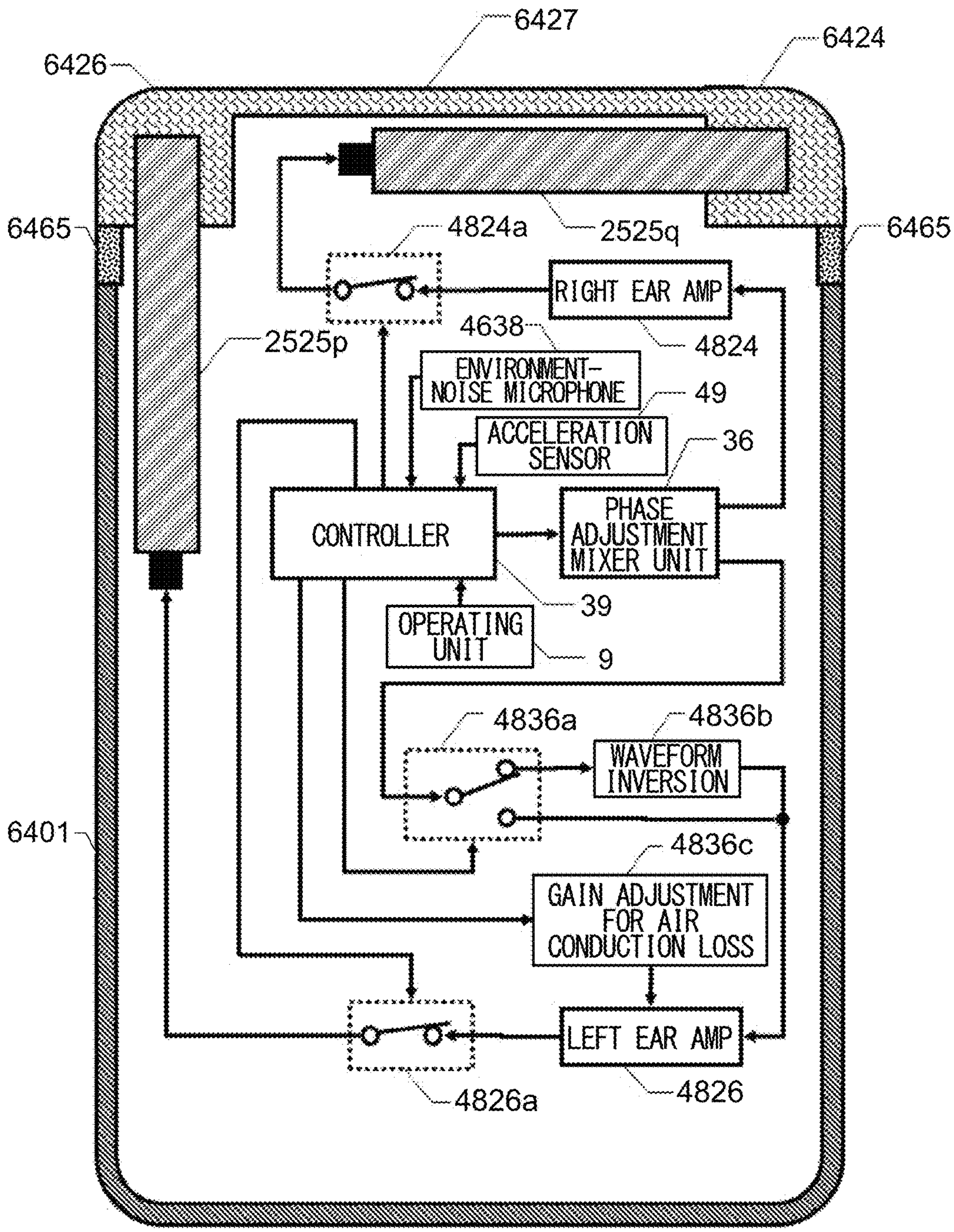
FIG. 100 is a cross sectional view of a sixty-eighth embodiment according to an aspect of the present invention (sixty-eighth embodiment)

FIG. 100 is a cross sectional view relating to a sixty-eighth embodiment according to an aspect of the present invention, configured as a mobile telephone 6401. In the sixty-eighth embodiment, the structure of the sixty-fifth embodiment of FIG. 97, in which the right-ear cartilage conduction unit and the left-ear cartilage conduction unit are rigidly linked by a linking unit, is applied in the fifty-second embodiment of FIG. 77; however, other features are shared by both, and therefore these common portions have been assigned the same symbols as in the fifty-second embodiment of FIG. 77, omitting descriptions thereof unless necessary.

In the sixty-eighth embodiment of FIG. 100, in the same manner as in the sixty-fifth embodiment of FIG. 97, a right-ear cartilage conduction unit 6424, a left-ear cartilage conduction unit 6426, and a linking unit 6427 linking these are integrally molded from a hard material, to a shape covering the upper part of the mobile telephone 6401. An elastic body 6465 is interposed at a location sandwiched vertically between this integrally molded structure and the chassis of the mobile telephone 6401, so that there is no direct contact between the two. A right-ear piezoelectric bimorph element 2525*q* is attached to the right-ear cartilage conduction unit 6424, and a left-ear piezoelectric bimorph element 2525*p* to the left-ear cartilage conduction unit 6426, respectively, doing so such that the elements are supported at one side thereof by a cantilever structure. As in the seventy-seventh embodiment, the right-ear piezoelectric bimorph element 2525*q* and the left-ear piezoelectric bimorph element 2525*p* are controllable in mutually independent fashion.

In the sixty-eighth embodiment of FIG. 100, in the same manner as in the sixty-seventh embodiment of FIG. 99, the primary significance of the linking unit 6427 is to rigidly link the right-ear cartilage conduction unit 6424 and the left-ear cartilage conduction unit 6326, to maintain the relative positions of both, so that both can be attached in a more stable manner to the chassis, even when the elastic body 6465 is made softer or thicker.

In the sixty-eighth embodiment of FIG. 100, further, vibration of the left-ear piezoelectric bimorph element 2525*p* is transmitted towards the direction of the right-ear cartilage conduction unit 6424, and vibration of the right-ear piezoelectric bimorph element 2525*q* is transmitted towards the direction of the left-ear cartilage conduction unit 6426, via the linking unit 6427. In this manner, in the sixty-eighth embodiment, vibration of the left-ear piezoelectric bimorph element 2525*p* and vibration of the right-ear piezoelectric bimorph element 2525*q* become admixed within the integrally molded structure of the right-ear cartilage conduction unit 6424, the left-ear cartilage conduction unit 6426, and the linking unit 6427 linking these. As a result, when vibrations of mutually reversed waveform are generated by the left-ear piezoelectric bimorph element 2525*p* and the right-ear piezoelectric bimorph element 2525*q*, the vibrations cancel out each other within the integrally molded structure, suppressing the occurrence of air-conducted sound based on vibration transmitted from the integrally molded structure to the chassis of the mobile telephone 6401. In this state as well, when either the right-ear cartilage conduction unit 6424 or the left-ear cartilage conduction unit 6426 is placed in contact with ear cartilage, the vibration of the right-ear piezoelectric bimorph element 2525*q* or the right-ear piezoelectric bimorph element 2525*p*, which are directly held thereby, will be greater than the vibration traveling through the linking unit 6427, and therefore the differential thereof will be conducted to the ear cartilage in satisfactory fashion.

The various features shown in the preceding embodiments are not limited to implementation in the respective embodiments, and implementation in various other embodiments is possible. For example, by modifying the sixty-eighth embodiment of FIG. 100 to omit the right-ear piezoelectric bimorph element 2525*q*, implementation in accordance with the sixty-fifth embodiment of FIG. 97 is possible. Stated another way, because vibration of the piezoelectric bimorph element 2525*p*, which is supported by the left-ear cartilage conduction unit 6426, is transmitted to the right-ear cartilage conduction unit 6424 as well through the linking unit 6427, it is possible to achieve good cartilage conduction, despite the fact that the right-ear cartilage conduction unit 6424, which does not hold a piezoelectric bimorph element, is placed in contact against the cartilage of the right ear. As may be seen from this modification example, the arrangement for holding the cartilage conduction vibration source which transmits vibration through the linking unit is not limited to an arrangement in which the piezoelectric bimorph element 2525 is held in a sideways long direction as in the sixty-fifth embodiment of FIG. 97, and it would be possible for the piezoelectric bimorph element 2525*p* to be held in a vertical long direction as in the aforedescribed modification example of the sixty-eighth embodiment of FIG. 100. These are merely examples, and it would be possible for cartilage conduction vibration sources to be to arranged and held in any of various other formats and orientations, according to the layout of the various components inside the mobile telephone.

(Sixty-ninth Embodiment)

Figures 101A, 101B, 101C:
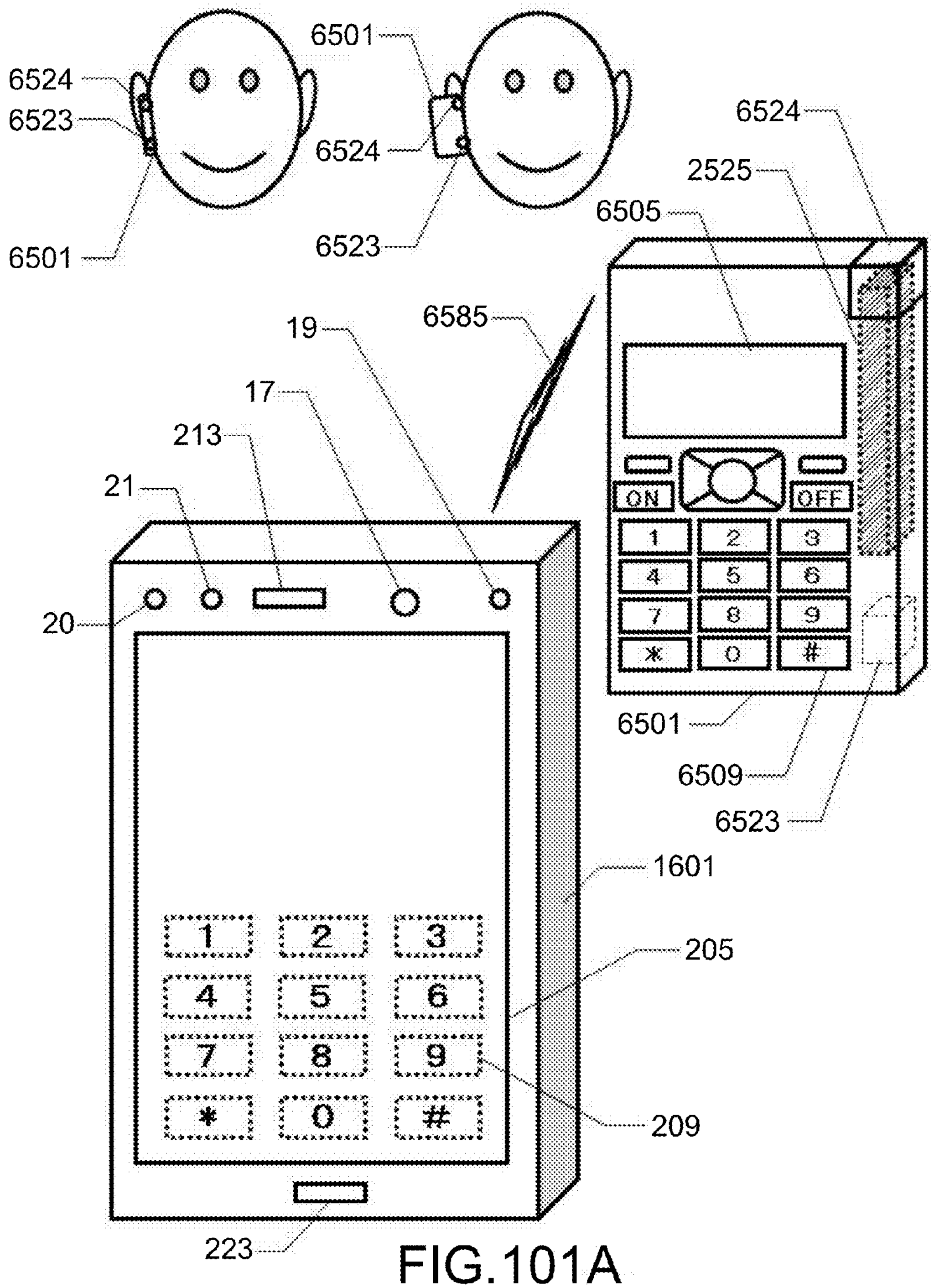
FIGS. 101A, 101B and 101C are system configuration diagram and a usage description diagram of a sixty-ninth embodiment according to an aspect of the present invention (sixty-ninth embodiment)

FIG. 101 is a system configuration diagram and a usage description diagram of a sixty-ninth embodiment according to an aspect of the present invention. As shown in FIG. 101 (A), the sixty-ninth embodiment is constituted as a mobile telephone system comprising an ordinary mobile telephone 1601, and an ultra-compact mobile telephone 6501 having a cartilage conduction unit 6524. The two are capable of short-range communication by radio waves 6585 of a communication system such as Bluetooth™ or the like. The mobile telephone system of the sixty-ninth embodiment has much in common with the sixteenth embodiment of FIG. 27 and FIG. 28 and with the seventeenth embodiment shown in the block diagram of FIG. 29. Therefore, the description of the sixty-ninth embodiment, as relates to the external appearance, is based on FIG. 27; and in as relates to the internal configuration, is based on the block diagram of FIG. 29, assigning the same reference numerals to the common portions, and omitting descriptions unless necessary.

As mentioned above, the sixty-ninth embodiment of FIG. 101 differs from the sixteenth embodiment and the seventeenth embodiment in that a cartilage conduction output portion capable of short-range communication with the ordinary mobile telephone 1601 is constituted as the ultra-compact mobile telephone 6501 which is capable of functioning independently. It is possible, using the ultra-compact mobile telephone 6501, to make call operations directed to the ordinary mobile telephone, through an operating unit 6509 and a display unit 6505. The characteristic features of this embodiment reside in the outgoing-talk unit and the incoming-talk unit thereof. First, with regard to the incoming-talk unit, the cartilage conduction unit 6524 is situated in a corner of the upper part of the ultra-compact mobile telephone 6501, and a piezoelectric bimorph element 2525 is held in cantilever fashion in a longitudinal direction in the interior thereof. In this sense, the configuration of the ultra-compact mobile telephone 6501 of the sixty-ninth embodiment is shared with the forty-third embodiment of the FIG. 66. Meanwhile, the outgoing-talk unit is furnished with a contact type bone conduction microphone 6523 situated close to a corner of the lower part of the ultra-compact mobile telephone 6501. The ultra-compact mobile telephone 6501 is used by placing the cartilage conduction unit 6524 in contact with the ear cartilage of the tragus or the like, while placing the bone conduction microphone 6523 against the cheekbone or lower jawbone.

FIG. 101 (B) shows a state in which, just as shown in FIG. 2 (A), the cartilage conduction unit 6524 is placed in contact with the ear cartilage of the tragus or the like, with the display unit 6505 oriented to face the cheek, and the bone conduction microphone 6523 is placed against the cheekbone. In FIG. 101 (B), the cartilage conduction unit 6524 and the bone conduction microphone 6523 are illustrated in order to show their vertical positional relationships; however, in the case of usage as shown in the drawing, these would be positioned to the rear, and therefore would not actually be visible from the front.

Meanwhile, FIG. 101 (C) shows a state in which, just as shown in FIG. 21 (A), the cartilage conduction unit 6524 is placed in contact with the ear cartilage of the tragus or the like, from the side surface side with the display unit 6505 oriented to face frontward, and the bone conduction microphone 6523 is placed against the cheekbone. Due to the small size of the ultra-compact mobile telephone 6501 of the sixty-ninth embodiment, the ultra-compact mobile telephone 6501 can be used in whichever direction is easiest to hold, either as shown above in FIG. 101 (B) or FIG. 101 (C). When used as shown in FIG. 101 (C), by taking care not to grip the display screen 6505 with the fingers, soiling of the display screen 6505 due to contact of the display screen 6505 against the cheek can be prevented. By varying the angle at which the ultra-compact mobile telephone 6501 is placed against the face, the bone conduction microphone 6523 can also be positioned against the upper part of the lower jawbone while keeping the cartilage conduction unit 6524 in contact with the ear cartilage of the tragus or the like.

Because the ordinary mobile telephone 1601 and the ultra-compact mobile telephone 6501 each have separate phone numbers, it is possible for them to be used independently from one another. Pairing of the ordinary mobile telephone 1601 and the ultra-compact mobile telephone 6501 by short-range communication will be described next. The ordinary mobile telephone 1601, due to its size, is not infrequently stowed inside a purse or the like when not being used, while the ultra-compact mobile telephone 6501 can be easily placed in a shirt pocket or the like, and kept in possession at all times.

In a first example of pairing of the two devices, the ultra-compact mobile telephone 6501, while kept in possession in the aforedescribed manner, may be used as an incoming call vibrator for the ordinary mobile telephone 1601. That is, when there is an incoming call to the ordinary mobile telephone 1601, it is transferred to the ultra-compact mobile telephone 6501 through the radio waves 6585 of the short-range wireless system, whereupon the ultra-compact mobile telephone 6501 is operated as a incoming call vibrator, and can reliably alert the user of an incoming call to the ordinary mobile telephone 1601 which is being carried in a purse or the like. In the sixty-ninth embodiment, a dedicated incoming call vibrator, such as an eccentric motor, is employed as the incoming call vibrator of the ultra-compact mobile telephone 6501; however, as will be discussed below, it is possible for the cartilage conduction vibration unit to be vibrated to be employed concomitantly as an incoming call vibrator, as shown in the thirteenth embodiment.

In a second example of pairing of the two devices, the ultra-compact mobile telephone 6501, while kept in possession in the aforedescribed manner, may be used as a handset for the ordinary mobile telephone 1601. That is, when there is an incoming call to the ordinary mobile telephone 1601, it is transferred to the to the ultra-compact mobile telephone 6501 through the radio waves 6585 of the short-range wireless system, whereupon after call answer operation has been performed on the ultra-compact mobile telephone 6501, it possible for the call to take place through the cartilage conduction unit 6524 and the bone conduction microphone 6523. In so doing, it is possible for a call to take place in a manner taking full advantage of cartilage conduction in the ordinary mobile telephone 1601. Naturally, the ordinary mobile telephone 1601 may remain in the purse or the like at this time.

In a third example of pairing of the two devices, the ultra-compact mobile telephone 6501 may be used as a handset when the ordinary mobile telephone 1601 is in videoconferencing mode. In videoconferencing mode, conversation takes place with the ordinary mobile telephone 1601 held away from the face, and therefore there is a considerable distance from microphone to mouth, and also the voice of the other caller is output from a speaker situated away from the ear; thus, from an acoustic standpoint, there are numerous problems in terms of the effects of noise, loss of privacy, and the like. In contrast to this, by using the ultra-compact mobile telephone 6501 as a handset, it is possible for a call to take place in a manner that takes full advantage of cartilage conduction, with the ordinary mobile telephone 1601 in videoconferencing mode. The details of the above pairing will be discussed below.

Figure 102:
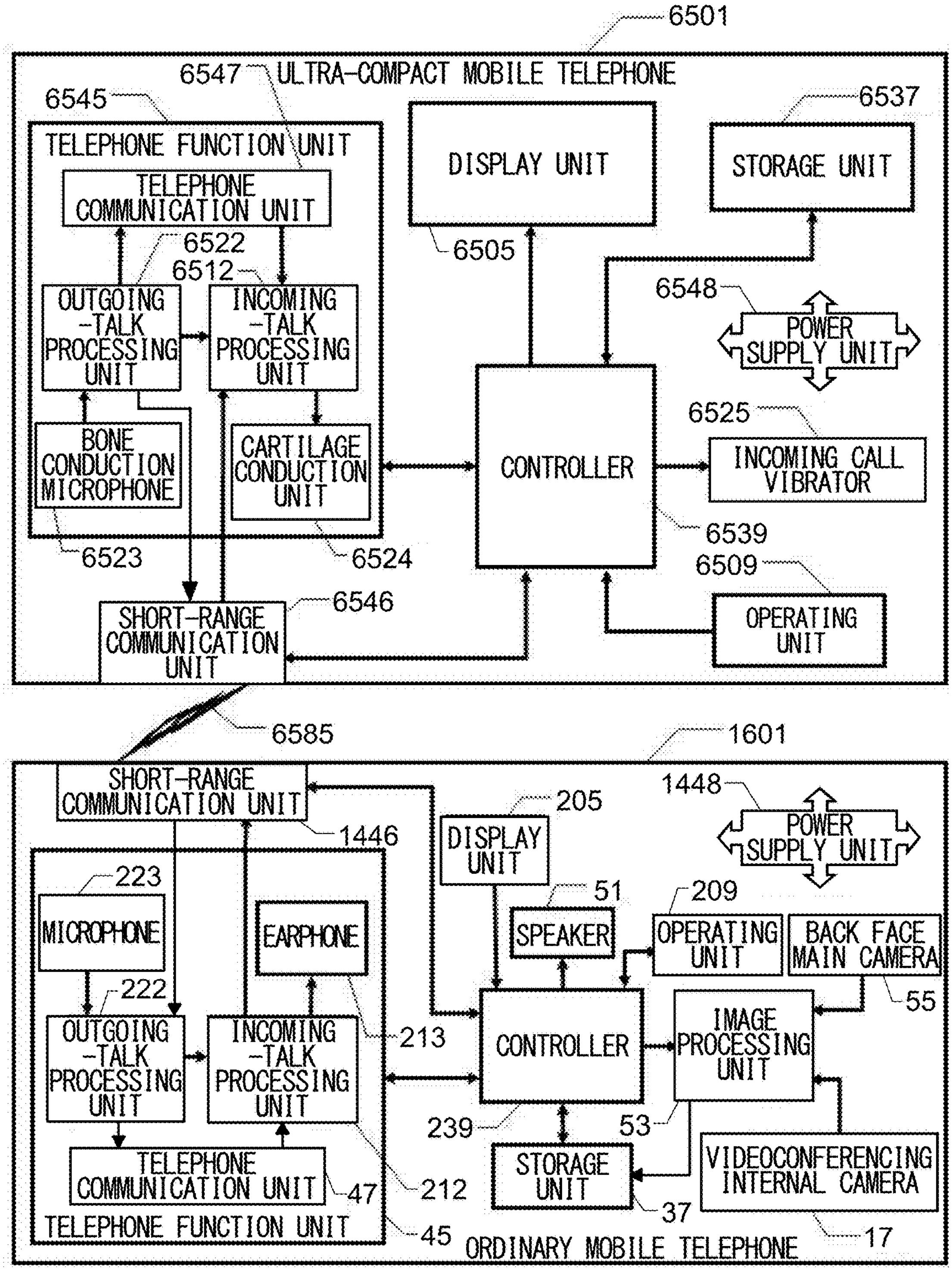
FIG. 102 is a block diagram of the sixty-ninth embodiment.

FIG. 102 is a block diagram of the sixty-ninth embodiment, in which like portions are assigned the same symbols as in FIG. 101. As described above, the block diagram of FIG. 102 has much in common with the block diagram of FIG. 29, and therefore the same reference numerals as those assigned to these parts have been assigned to the corresponding portions. In particular, the ordinary mobile telephone 1601 in FIG. 102 has the same configuration as in FIG. 29. However, a portion of the configuration is omitted in FIG. 102. For convenience in description, the ordinary mobile telephone 1601, which is depicted as being situated at the top in FIG. 29, is depicted as being situated at the bottom in FIG. 102.

When there is an incoming call to the ordinary mobile telephone 1601, this is transferred from a short-range communication unit 1446 to a short-range communication unit 6546 by the radio waves 6585, whereupon a controller 6539 prompts an incoming call vibrator 6525 to vibrate according to a pre-established ordinary mobile telephone incoming call alert pattern. The controller 6539 also prompts the display unit 6505 to display an alert of an incoming call to the ordinary mobile telephone 1601.

When a call answer operation is input from the operating unit 6509, this is transferred from the short-range communication unit 6546 to the short-range communication unit 1446 by the radio waves 6585, whereupon a controller 239 of the ordinary mobile telephone 1601 initiates the call by a telephone function unit 45. In so doing, an incoming-talk tone signal is transferred from an incoming-talk processing unit 212 of the ordinary mobile telephone 1601 to the short-range communication unit 6546 of the ultra-compact mobile telephone 6501 via the short-range communication unit 1446. In response to this, the incoming-talk processing unit 6512 of the ultra-compact mobile telephone 6501 prompts the cartilage conduction unit 6524 to vibrate. Meanwhile, an outgoing-talk tone picked up by the bone conduction microphone 6523 is transferred from an outgoing-talk processing unit 6522 of the ultra-compact mobile telephone 6501 to the short-range communication unit 1446 of the ordinary mobile telephone 1601 via the short-range communication unit 6546. In response, the ordinary mobile telephone 1601 transmits an outgoing-talk tone signal via a telephone communication unit 47.

On the other hand, when there is an incoming call to the ultra-compact mobile telephone 6501, the controller 6539 prompts the incoming call vibrator 6525 to vibrate according to a pre-established ultra-compact mobile telephone incoming call alert pattern. The controller 6539 also prompts the display unit 6505 to display an alert of an incoming call to the ultra-compact mobile telephone 6501.

When a call answer operation is performed from the operating unit 6509, the controller 6539 initiates the call through a telephone communication unit 6545. In so doing, the incoming-talk processing unit 6512 prompts the cartilage conduction unit 6524 to vibrate in response to the incoming-talk signal received by the telephone communication unit 6547. Meanwhile, on the basis of the outgoing-talk tone picked up by the bone conduction microphone 6523, the outgoing-talk processing unit 6522 transmits an outgoing-talk tone signal via the telephone communication unit 6547.

By establishing different vibration patterns for the incoming call vibrator 6525 in the above manner, it is possible to distinguish which device is being called. Additionally, the device being called is displayed on the display unit 6505 in the aforedescribed manner. Regardless of which device is called, call reception can be initiated by the same operation to the operating unit 6509 in the aforedescribed manner. As in the other embodiments, the controller 6539 operates according a program stored in a memory unit 6537. The memory unit 6537 can temporarily store data necessary for control by the controller 6539, as well as store measurement data and images of various kinds. A power supply unit 6548 supplies each part of the ultra-compact mobile telephone 6501 with the necessary power.

(Seventieth Embodiment)

Figure 103A:
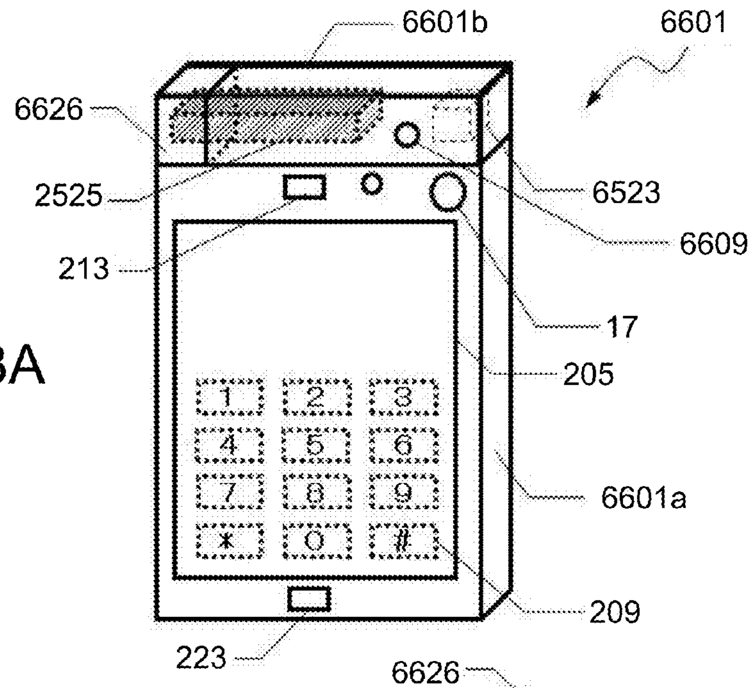
FIGS. 103A and 103B are perspective views of a seventieth embodiment according to an aspect of the present invention (seventieth embodiment)
Figure 103B:
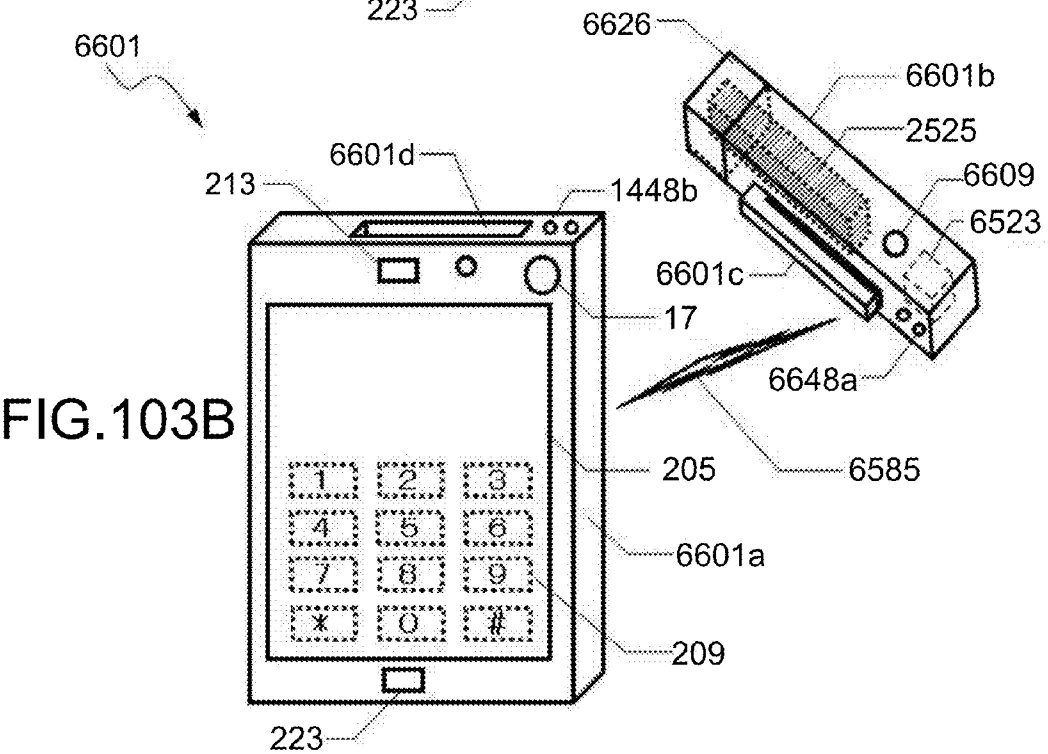

FIG. 103 is a perspective view of a seventieth embodiment according to an aspect of the present invention, constituted as a mobile telephone 6601. The mobile telephone 6601 of the seventieth embodiment has much in common with the mobile telephone system of the sixty-ninth embodiment in FIG. 101 and FIG. 102, and therefore the same reference numerals are assigned to the common portions, omitting descriptions unless necessary.

A point of difference between the seventieth embodiment of FIG. 103 and the sixty-ninth embodiment is that the short-range communication-enabled cartilage conduction output portion, rather than being configured as a mobile telephone capable of functioning independently, is instead configured as an outgoing-talk/incoming-talk unit that is part of the mobile telephone 6601. In this sense, the configuration of the seventieth embodiment is shared with that of the thirteenth embodiment of FIG. 24. The following specific description is based on FIG. 103.

As shown in FIG. 103 (A), a mobile telephone 6601 comprises a mobile telephone lower part 6601*a* and a mobile telephone upper part 6601*b*, the two being separable. An appropriate known means, such as a planar fastener, mating structure, or the like, is utilized for joining and separation of the mobile telephone lower part 6601*a* and the mobile telephone upper part 6601*b*. As in other embodiments, the mobile telephone upper part 6601*b* is furnished with a cartilage conduction unit 6626 situated in a corner of the upper portion of the mobile telephone 6601, in the interior of which a piezoelectric bimorph element 2525 is held in cantilever fashion in a lateral/longitudinal direction. This structure is shared with the forty-second embodiment of FIG. 65, but with the left-right orientation reversed. On the one hand, the incoming-talk unit is furnished with a contact type bone conduction microphone 6523 situated close to the other corner of the upper part of the mobile telephone 6601. An upper part operating unit 6609 is used to perform call answer operation and the like, while separated from the mobile telephone lower part 6601*a*; as shown in FIG. 103 (A), when joined to the mobile telephone lower part 6601*a*, operation is disabled, to prevent operation by mistake.

The mobile telephone 6601 is normally used in the state shown in FIG. 103 (A), with the mobile telephone lower part 6601*a* and the mobile telephone upper part 6601*b* joined. At this time, vibration of a piezoelectric bimorph element 2525 and operation of an ordinary microphone 223 are enabled, while a bone conduction microphone 6523 and an ordinary earphone 213 are disabled. The way in which the device is used in this state is shared with other mobile telephone embodiments.

It is possible for the mobile telephone 6601 of the seventieth embodiment to be further used with the mobile telephone upper part 6601*b* separated from the mobile telephone lower part 6601*a* as shown in FIG. 103 (B). At this time, in the mobile telephone upper part 6601*b*, vibration of the piezoelectric bimorph element 2525 as well as operation for the bone conduction microphone 6523 and the upper part operating unit 6609, are enabled. In the mobile telephone lower part 6601*a* as well, the ordinary microphone 22 and the ordinary earphone 213 are enabled. Switching of the aforedescribed bone conduction microphone 6523, the ordinary earphone 213, and the upper part operating unit 6609 between the enabled and disabled states takes place automatically, based on a determination as to whether the mobile telephone lower part 6601*a* and the mobile telephone upper part 6601*b* are joined or separated, as discussed below. In this way, in the state shown in FIG. 103 (B), the mobile telephone lower part 6601*a* functions independently as an ordinary mobile telephone, while the mobile telephone upper part 6601*b* functions as a wireless outgoing-talk/incoming-talk unit for the mobile telephone lower part 6601*a*.

The way in which the device is used in the state of FIG. 103 (B) in the aforedescribed manner can be understood according to the sixty-ninth embodiment of FIG. 101. Specifically, like the ultra-compact mobile telephone 6501 of the sixty-ninth embodiment, it is possible for the separated mobile telephone upper part 6601*b* to function firstly as an incoming call vibrator; secondly, to make possible cartilage conduction calling while the mobile telephone lower part 6601*a* is kept in a purse or the like for example; and thirdly, to make possible cartilage conduction calling in videoconferencing mode with the mobile telephone lower part 6601*a* held away from the face. During cartilage conduction calling, in the same manner as with the ultra-compact mobile telephone 6501 of the sixty-ninth embodiment, the cartilage conduction unit 6626 is placed in contact with the with the ear cartilage of the tragus or the like, and the bone conduction microphone 6523 is placed against the cheekbone or lower jawbone.

As shown in FIG. 103 (B), the mobile telephone upper part 6601*b* is furnished with a clip 6601*c* for clipping to the mouth of a pocket of clothing or the like. While joined to the mobile telephone lower part 6601*a*, this clip 6601*c* is accommodated within a housing recess 6601*d* and is not visible from the outside, as shown in FIG. 103 (A). The mobile telephone upper part 6601*b* is further furnished with a pair of charging contacts 6648*a* which, in the joined state, contact auxiliary charging contacts 1448*b* provided to the mobile telephone lower part 6601*a*. In the joined state shown in FIG. 103 (A), when the mobile telephone lower part 6601*a* is being charged, the mobile telephone upper part 6601*b* is charged at the same time, via contact between the auxiliary charging contacts 1448*b* and the charging contacts 6648*a*. Contact versus non-contact by the auxiliary charging contacts 1448*b* and the charging contacts 6648*a* is a parameter utilized in determining whether the mobile telephone lower part 6601*a* and the mobile telephone upper part 6601*b* are joined or separated as mentioned above, and automatically switches the bone conduction microphone 6523, the ordinary earphone 213, and the upper part operating unit 6609 between the enabled and disabled states.

Figure 104:
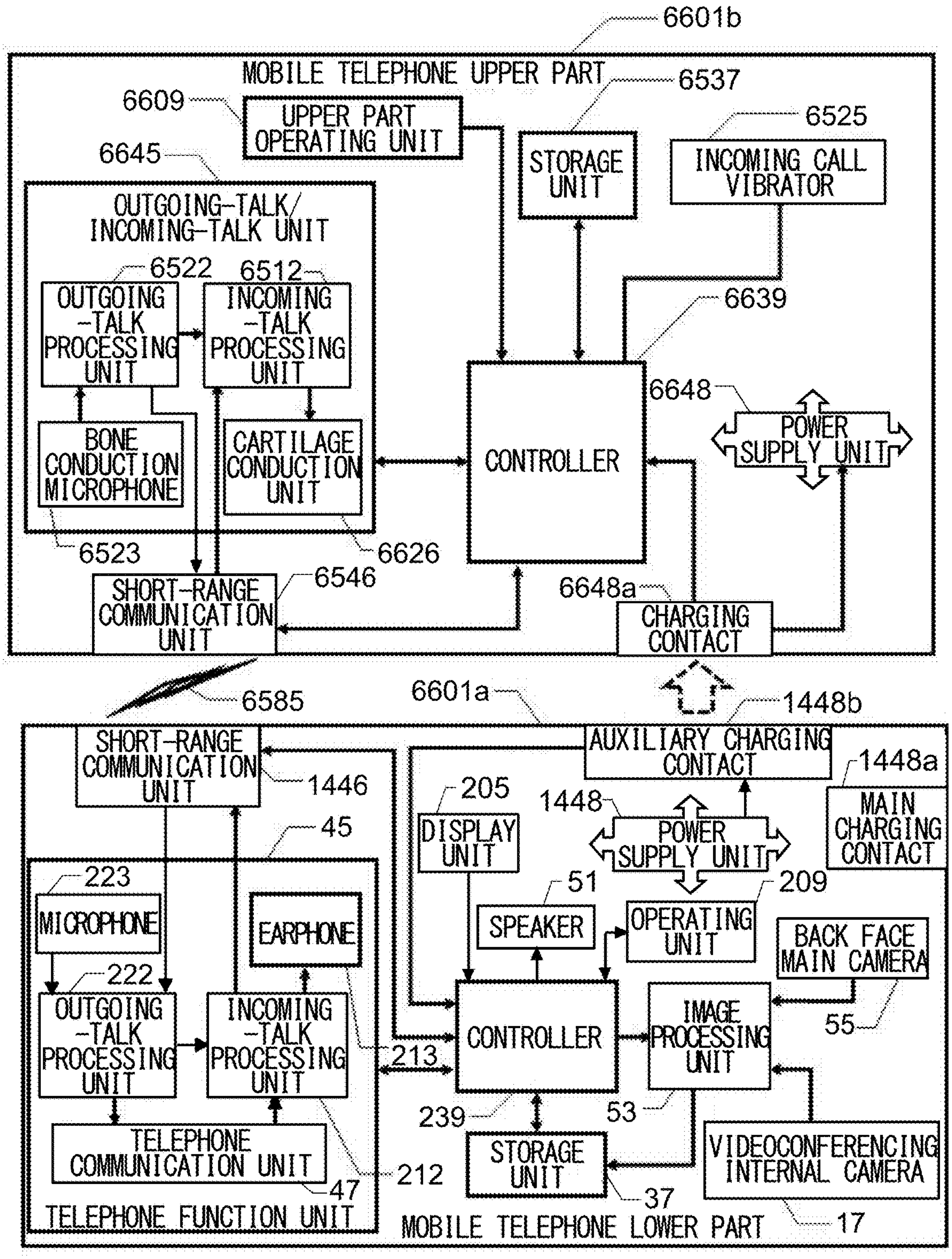
FIG. 104 is a block diagram of the seventieth embodiment.

FIG. 104 is a block diagram of the seventieth embodiment, in which like portions are assigned the same symbols as in FIG. 102. FIG. 104 has much in common with the block diagram of the sixty-ninth embodiment of FIG. 102, and therefore the same reference numerals as those assigned to these parts have been assigned to the corresponding portions.

A first point of difference between the mobile telephone upper part 6601*b* of FIG. 104 and the ultra-compact mobile telephone 6501 of FIG. 102 resides in a feature whereby a power supply unit 6648 is charged from the charging contacts 1448*a*. A second point resides in a feature of providing the upper part operating unit 6609, which transmits to a controller 6638 a call answer operation during separation in the aforedescribed manner. On the basis of the state of the charging contacts 6648*a*, the controller 6638 determines whether a contact state or a non-contact state exists, and in a state in which the contact state is determined to exist, the controller 6639 disables the operating unit 6609, and does not accept operations therefrom. A third point resides in a feature whereby the mobile telephone upper part 6601*b* is not constituted as an independently functioning telephone function unit, but rather serves as an outgoing-talk/incoming-talk unit 6645 for the mobile telephone upper part 6601*b*. A fourth point resides in a feature whereby, in a state like that described above, in which the charging contacts 6648*a* have been determined to be in the contact state, the controller 6639 enables the bone conduction microphone 6523 of the outgoing-talk/incoming-talk unit 6645.

A first point of difference between the mobile telephone lower part 6601*a* of FIG. 104 and the ordinary mobile telephone 1601 of FIG. 102 resides a feature whereby, when the power supply unit 1448 is charged by an external charger via the main charging contacts 1448*a*, a portion thereof can be supplied to the charging contacts 6648*a* of the mobile telephone upper part 6601*b* via the auxiliary charging contacts 1448*b*. A second point resides a feature whereby, when the auxiliary charging contacts 1448*b* are determined to be in the contact state, the controller 239 enables the ordinary earphone 213 of the outgoing-talk/incoming-talk unit 45.

(Seventy-first Embodiment)

Figure 105A:
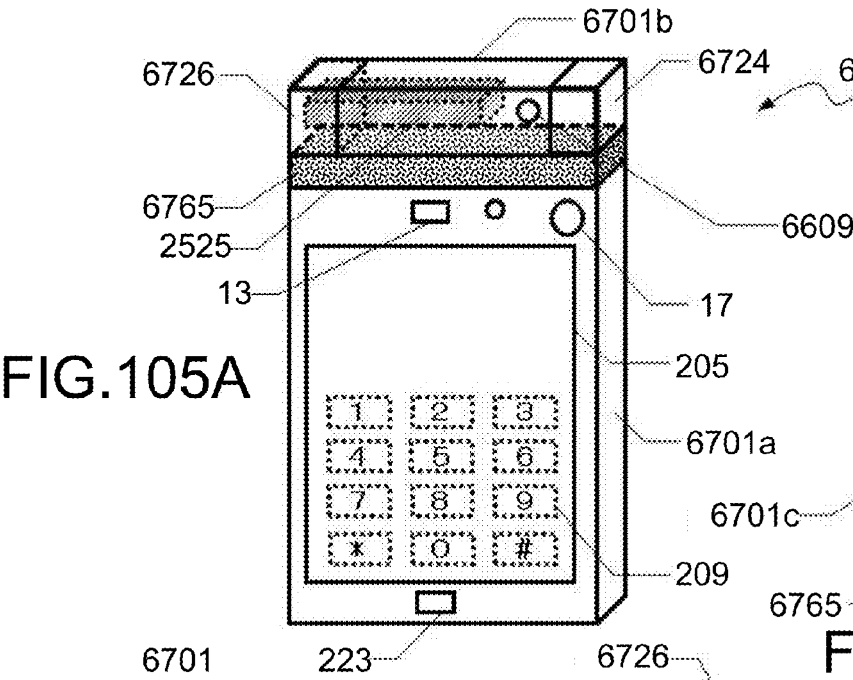
FIGS. 105A, 105B and 105C are perspective views and cross sectional views of a seventy-first embodiment according to an aspect of the present invention (seventy-first embodiment)
Figure 105B:
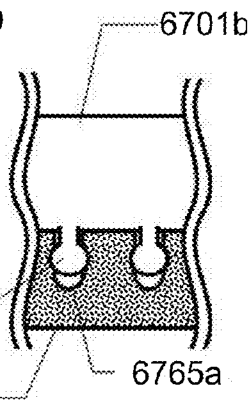
Figure 105C:
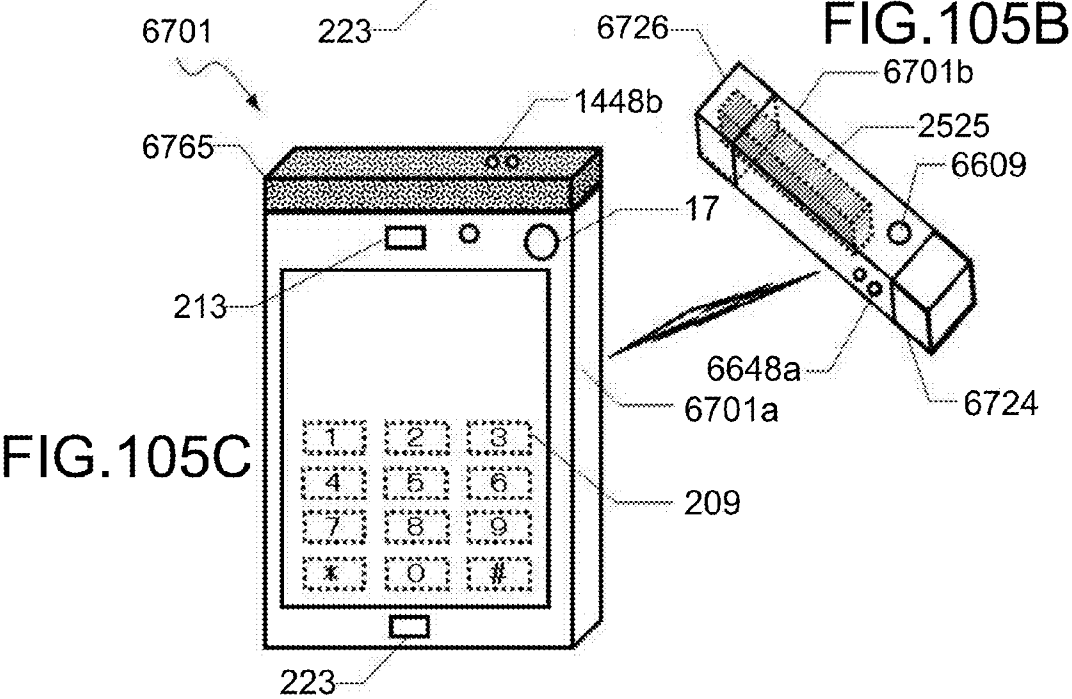

FIG. 105 is a perspective view and a cross sectional view of a seventy-first embodiment according to an aspect of the present invention, constituted as a mobile telephone 6701. The mobile telephone 6701 of the seventy-first embodiment has much in common with the mobile telephone 6601 of the seventieth embodiment in FIG. 103 and FIG. 104, and therefore the same reference numerals are assigned to the common portions, omitting descriptions unless necessary.

A main difference between the seventy-first embodiment of FIG. 105 and the seventieth embodiment is a structure in which the fact that the mobile telephone is separable into an upper part and a lower part is utilized to largely prevent vibration of a cartilage conduction unit furnished in the upper part from being transmitted to the lower part when the two are joined. The following specific description is based on FIG. 105.

As shown in FIG. 105 (A), the mobile telephone 6701 of the seventy-first embodiment, like the seventieth embodiment, comprises a mobile telephone lower part 6701*a* and a mobile telephone upper part 6701*b*, the two being separable. In the mobile telephone upper part 6701*b*, the mobile telephone 6701 upper part is furnished with a hard left-ear cartilage conduction unit 6726 in the left corner of the upper part of the mobile telephone 6701, and in the interior thereof a piezoelectric bimorph element 2525 is held in cantilever fashion in a lateral/longitudinal direction. Further, the mobile telephone upper part 6701*b* is furnished with a hard right-ear cartilage conduction unit 6724 in the right corner of the upper part of the mobile telephone 6701 upper part. The left-ear cartilage conduction unit 6726 and the right-ear cartilage conduction unit 6724 are integrally linked by a hard linking unit of the same material, so that vibration of the piezoelectric bimorph element 2525 received by the left-ear cartilage conduction unit 6726 is transmitted to the right-ear cartilage conduction unit 6724 as well. In this sense, the seventy-first embodiment has aspects in common with the sixty-fourth to sixty-seventh embodiments in FIG. 96 to FIG. 99. While not depicted in FIG. 105 in order to avoid complexity, the linking unit for linking the left-ear cartilage conduction unit 6726 and the right-ear cartilage conduction unit 6724 can be one for which the structure of the linking units 6027, 6127, 6227, and 6327 in FIG. 96 to FIG. 99, or an analogous structure, is adopted, as appropriate. The mobile telephone upper part 6701*b* of the seventy-first embodiment is not furnished with a bone conduction mic.

In the seventy-first embodiment, as shown in FIG. 105 (A), transmission of vibration of the piezoelectric bimorph element 2525 of the mobile telephone upper part 6701*b* to the mobile telephone lower part 6701*a* is largely prevented by anchoring an elastic body 6765 to the upper end of the mobile telephone lower part 6701*a*. The significance of the elastic body 6765 is comparable to that of the elastic bodies 6065, 6165, 6265, and 6365 in the sixty-fourth to sixty-seventh embodiments of FIG. 96 to FIG. 99. In the case of the seventy-first embodiment, in view of the fact that the one side of the joined section is made up by the elastic body 6765, it would be possible to utilize the elasticity thereof to constitute a planar fastener. For example, as shown in fragmentary cross sectional view in FIG. 105 (B), the joining face on the mobile telephone upper part 6701*b* side may be furnished with a plurality of fungiform protrusions 6701*c*, while the surface on the opposing elastic body 6765 side may be furnished with a plurality of small openings 6765*a* at corresponding locations. The diameter of the openings 6765*a* is set to one smaller than the head section of the fungiform protrusions 6701*c*, but larger than the root section. By means of such a configuration, the mobile telephone upper part 6701*b* and the elastic body 6765 can be joined through respective fitting of the fungiform protrusions 6701*c* into the openings 6765*a* in opposition to the elasticity of the elastic body 6765. The planar fastener structure shown in FIG. 105 (B) can in principle be utilized for anchoring the elastic body 6765 and the mobile telephone lower part 6701*a* as well. In this case, the heads of the fungiform protrusions 6701*c* to be furnished to the upper surface of the mobile telephone lower part 6701*a* would not be smoothly spherical in shape as in FIG. 105 (B), but instead, for example, a sharp triangular shape, to provide a so-called "fixed" structure which, once driven into the openings of the elastic body 6765, will not become dislodged.

FIG. 105 (C) shows a state in which the mobile telephone upper part 6701*b* is separated from the mobile telephone lower part 6701*a*. From the drawing it is clear that the auxiliary charging contacts 1448*b* are furnished to the surface of the elastic body 6765. In order to avoid complexity, in FIG. 105 (C), the fungiform protrusions 6701*c* and the openings 6765*a* shown in FIG. 105 (B) have been omitted from the illustration. In the seventy-first embodiment, when the mobile telephone upper part 6701*b* has been separated, to listen to a call, either the right-ear cartilage conduction unit 6724 or the left-ear cartilage conduction unit 6726 is placed in contact with the ear cartilage, while to speak, the ordinary microphone 223 of the mobile telephone lower part 6701*a* is used, just as in the joined state of FIG. 105 (A). For videoconferencing use, the ordinary microphone 223 is used while placed in videoconferencing mode. Neither the right-ear cartilage conduction unit 6724 nor the left-ear cartilage conduction unit 6726 is designed for exclusive use in the right ear or the left ear, and therefore can be placed in contact with any ear cartilage. Moreover, both of the cartilage conduction units could be utilized instead of just one, for use while placed in contact with cartilage at two locations.

Figure 106:
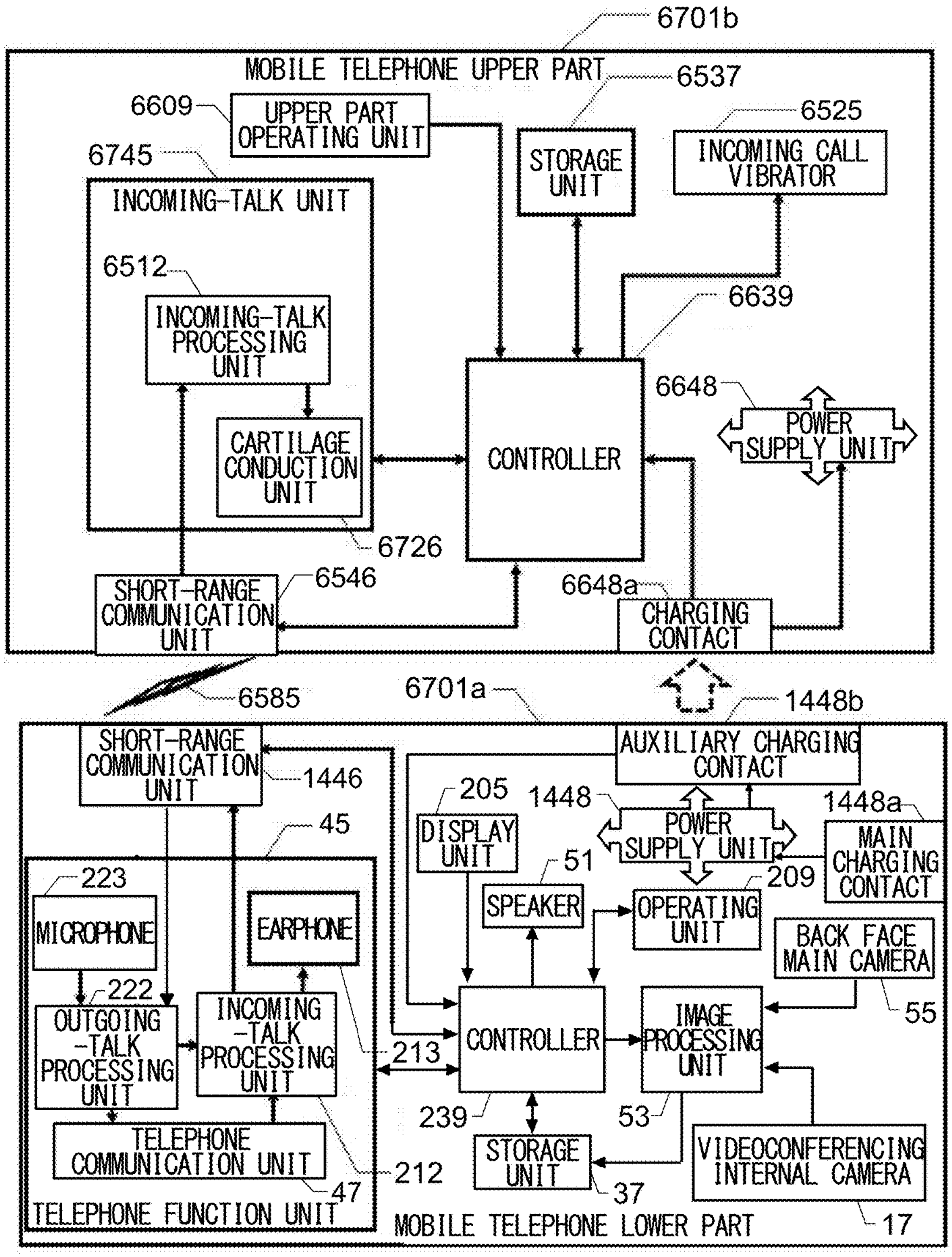
FIG. 106 is a block diagram of the seventy-first embodiment.

FIG. 106 is a block diagram of the seventy-first embodiment, in which like portions have been assigned the same symbols as in FIG. 105. The block diagram of FIG. 106 has much in common with the block diagram of the seventieth embodiment in FIG. 104, and therefore the same reference numerals as those assigned to these parts have been assigned to the corresponding portions, and descriptions omitted. FIG. 106 differs from FIG. 104 in that the outgoing-talk processing unit and the bone conduction microphone are omitted.

The various features shown in the embodiments of the present invention are not necessarily unique to the individual embodiments in which they appear, and insofar as it is possible to utilize the advantages thereof, the features of the respective embodiments may be utilized in modified form, or utilized in combination, as appropriate. For example, the bone conduction microphone in the sixty-ninth to seventy-first embodiments may instead be configured as an ordinary microphone for picking up air-conducted sound. In the seventieth embodiment, the bone conduction microphone may be omitted, as in the seventy-first embodiment. Conversely, it would be possible to adopt a bone conduction microphone in the seventy-first embodiment. At this time, it would be preferable to situate the bone conduction microphone in the center of the mobile telephone upper part 6710*b* between the right cartilage conduction unit 6724 and the left cartilage conduction unit 6726. In this case, because the cartilage conduction units and the bone conduction microphone are close together, a method of use in which the bone conduction microphone is placed against to bone behind the ear, and the cartilage conduction units are placed against the back side of the ear cartilage, as in the twentieth embodiment of FIG. 33 and the twenty-fourth embodiment of FIG. 37, would be possible as well.

The cartilage conduction units in the sixty-ninth to seventy-first embodiments are configured using piezoelectric bimorph elements as the cartilage conduction vibration sources, but there is no limitation to this, and electromagnetic vibrators like those shown in other aforedescribed embodiments may be adopted as the cartilage conduction vibration sources. In the seventieth embodiment, the cartilage conduction vibration source is supported at one corner of the mobile telephone upper part, while the bone conduction microphone is situated at the other; however, in a case in which cartilage conduction vibration sources for the right ear and the left ear, respectively, are furnished at both corners of the mobile telephone upper part, it would be preferable to situate the bone conduction microphone in the center of the mobile telephone upper part between the pair of cartilage conduction vibration sources.

Further, the means for charging the mobile telephone upper part from the mobile telephone lower part in the seventieth embodiment or seventy-first embodiment is not limited to the electrical contacts shown in these embodiments, and may instead be configured to involve contactless charging through electromagnetic induction, for example.

In the seventy-first embodiment, the elastic body 6765 is anchored to the mobile telephone lower part 6701*a* side, with the mobile telephone upper part 6701*b* being detachably attached to the elastic body 6765; however, there is no limitation to this particular implementation. For example, in an arrangement opposite that of the seventy-first embodiment, it would be possible to configure the elastic body 6765 to be anchored to the mobile telephone upper part 6701*b* side, with the mobile telephone lower part 6701*a* being detachably attached to the elastic body 6765.

(Seventy-second Embodiment)

Figure 107:
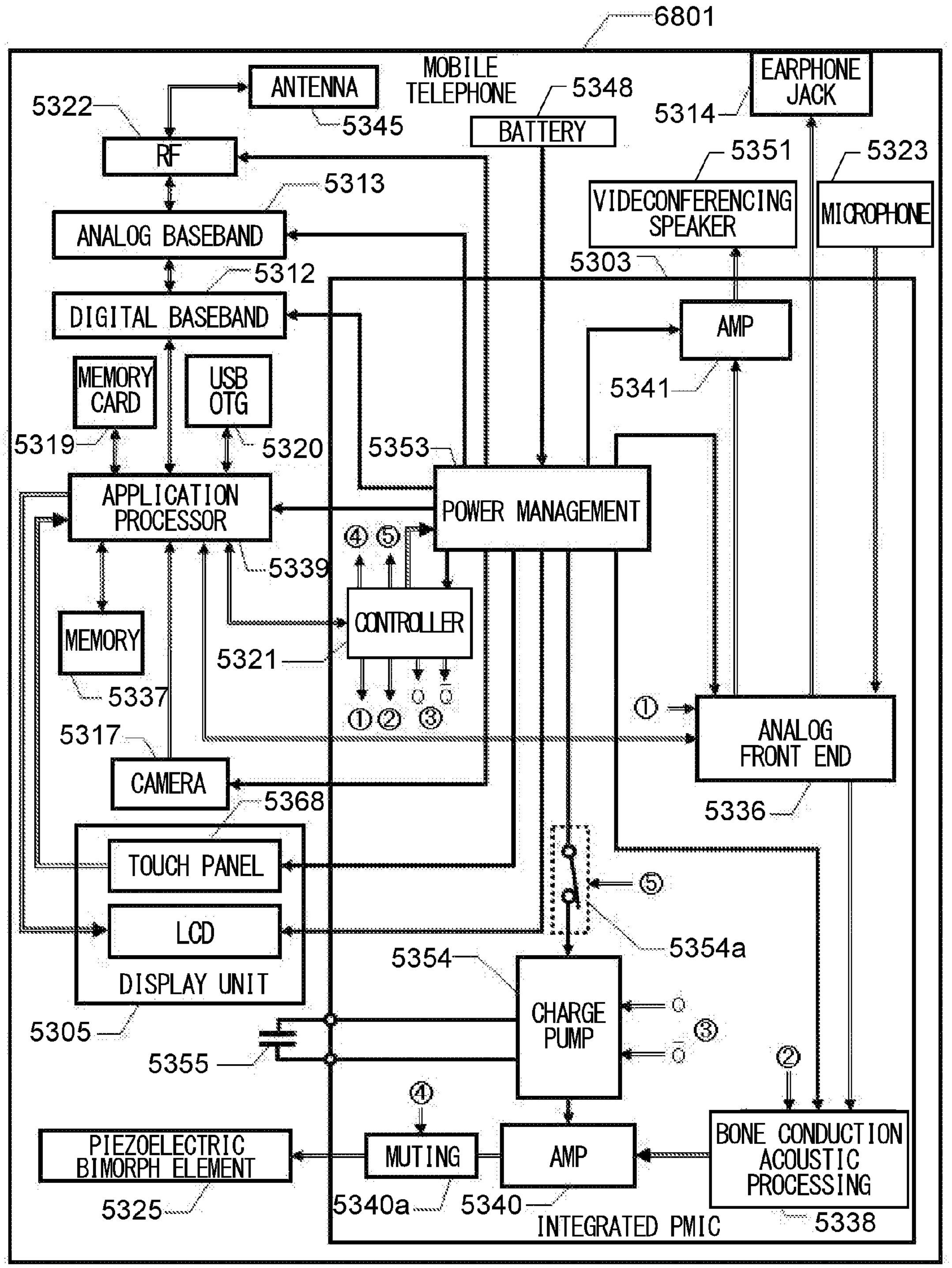
FIG. 107 is a block diagram relating to a seventy-second embodiment according to an aspect of the present invention (seventy-second embodiment)

FIG. 107 is a block diagram relating to a seventy-second embodiment according to an aspect of the present invention, configured as a mobile telephone 6801. Like the fifty-seventh embodiment of FIG. 87, in the seventy-second embodiment, the drive circuit for a piezoelectric bimorph element 5325 serving as the cartilage conduction vibration source is configured as a single-chip integrated power management IC 5303, together with a power management circuit for supplying power to each of the parts of the mobile telephone 6801. The block diagram of FIG. 107 has much in common with the block diagram of FIG. 87, and therefore the same reference numerals are assigned to like parts, and descriptions are omitted. In the mobile telephone 6801 of the seventy-second embodiment, the cartilage conduction units are not separable as in the seventieth embodiment and the seventy-first embodiment; instead, as in the sixty-fifth embodiment of FIG. 97 for example, the cartilage conduction units 6124, 6126 are anchored to the mobile telephone body, and the piezoelectric bimorph element or other cartilage conduction vibration source 2525 are held thereby. Consequently, during videoconferencing, the cartilage conduction unit is held away from the ear, and instead air-conducted sound is emitted from a videoconferencing speaker 5351.

The seventy-second embodiment of FIG. 107 and the fifty-seventh embodiment of FIG. 87 differ in terms of control of the power supply to a charge pump circuit 5354, and in control associated therewith. Set forth in specific terms, the charge pump circuit 5354 is connected, via a switch circuit 5354*a*, to a power management circuit 5353, the power supply being controlled through on/off switching of the switch circuit 5354*a* by a controller 5321. Specifically, supply of power to the charge pump circuit 5354 is initiated by turning on the switch circuit 5354*a* in response to an incoming call signal or a call request signal, and is halted by turning off the switch circuit 5354*a* in response to call disconnect operation. In interlocking fashion with switching off of the switch circuit 5354*a*, the controller 5321 also halts a pair of phase inversion clocks (3) which are supplied to the charge pump circuit 5354 by the controller 5321.

During on/off switching of the charge pump circuit 5354, the voltage becomes unstable in transient fashion, and this causes popping sounds to be generated by the piezoelectric bimorph element 5325. In order to prevent this, a muting circuit 5340*a* is inserted between an amplifier 5340 and the piezoelectric bimorph element 5325. Then, under the control of the controller 5321, the muting circuit 5340*a* is turned on for a predetermined time interval prior to on/off switching of the charge pump circuit 5354, so that voltage fluctuations of the amp 5340*a* are not transmitted to the piezoelectric bimorph element 5325. The muting circuit 5340*a* stays on for a somewhat longer time interval than the time interval needed for the charge pump circuit 5354 to stabilize, then unmutes by turning off at a timing at which the voltage can be expected to have stabilized. Through such on/off switching of the muting circuit 5340*a*, it is possible to prevent generation of popping sounds during on/off switching of the charge pump circuit 5354, as well as to drive the piezoelectric bimorph element 5325 once the charge pump circuit 5354 has reached a power supply state with no popping sounds.

Figure 108A:
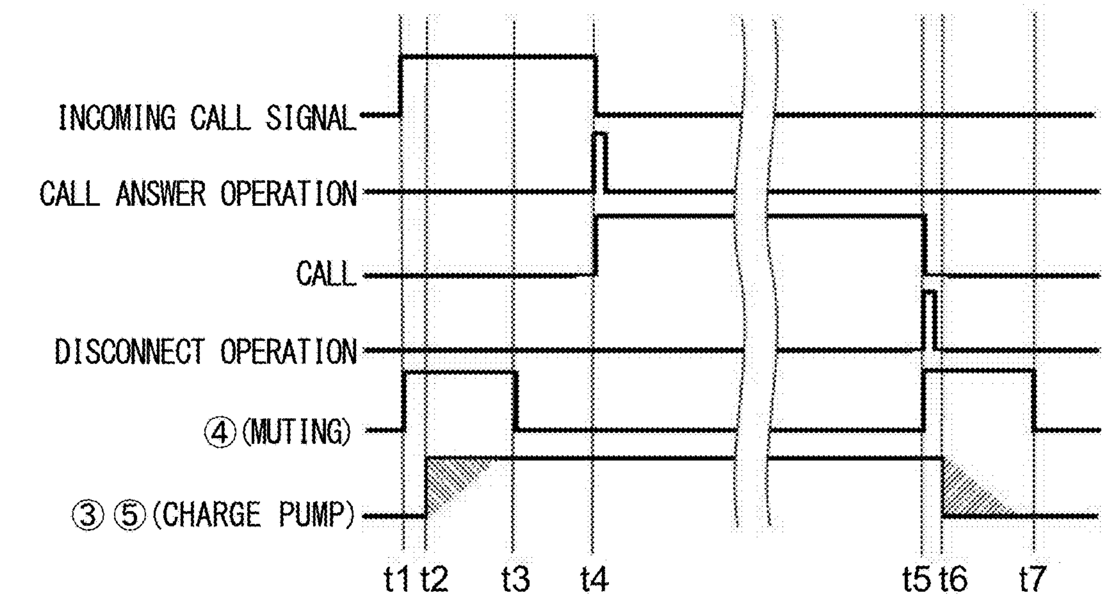
FIGS. 108A and 108B are timing charts of power supply control to a charge pump circuit in the seventy-second embodiment.
Figure 108B:
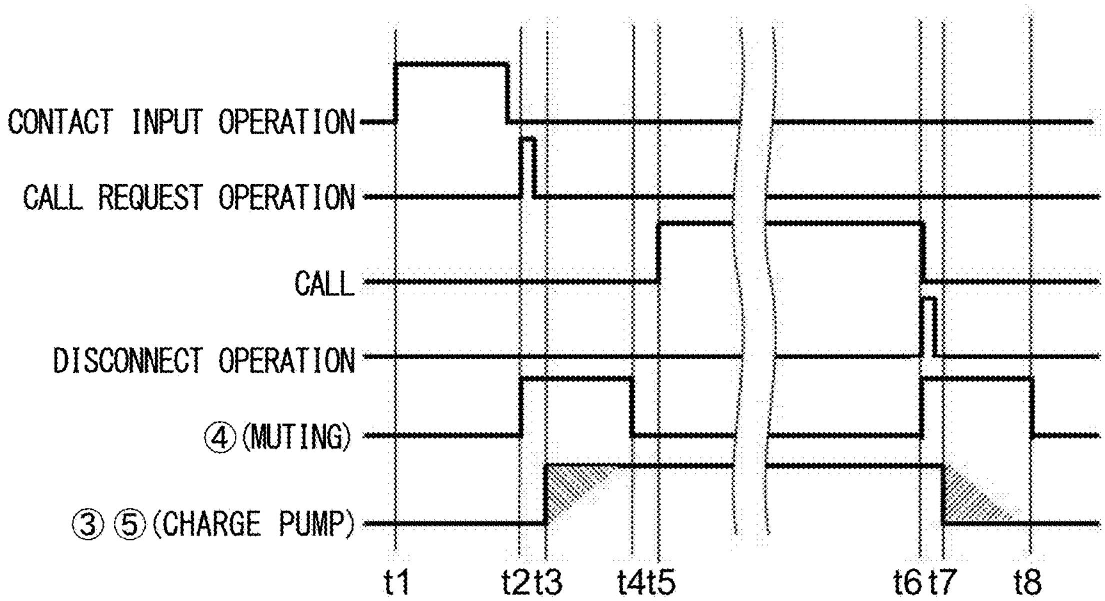

FIG. 108 is timing charts showing power supply control to the charge pump circuit 5354 in the seventy-second embodiment. FIG. 108 (A) is a timing chart in a case in which a telephone receives an incoming call; firstly, at timing t1 at which an incoming call is received in the standby state, the muting circuit 5340*a* switches on. Upon entering a state at timing t2, in which the piezoelectric bimorph element 5325 is thereby unaffected by voltage fluctuations of the amp 5340, the switch circuit 5354*a* switches on, and supply of power from the power management circuit 5353 to the charge pump circuit 5354 is initiated, initiating supply of phase inversion clocks (3) from the controller 5321 as well. As shown conceptually by diagonal lines in FIG. 108 (A), from initial startup until reaching a predetermined voltage, the output voltage of the charge pump circuit 5354 is not stable during a transient period. The muting circuit 5340*a* goes on and maintains a muted state during a time slot sufficient to cover this transient period, then unmutes by turning off at a timing t3 at which the voltage can be expected to have stabilized. In so doing, regardless of when a call answer operation is performed, the piezoelectric bimorph element 5325 will be in a state of readiness that enables cartilage conduction calling. The reason for prompting such an operation at the point in time that an incoming call signal is received is so that the piezoelectric bimorph element 5325 reliably enters the activated state when the call is initiated, as there are conceivably cases in which the call answer operation is performed very rapidly.

Next, the call is initiated at arbitrary timing t4 once a call answer operation is performed. Then, when a call disconnect operation is made at timing t5, in response to this, firstly, the muting circuit 5340*a* turns on. Then, upon entering a state at timing t6, in which the piezoelectric bimorph element 5325 will not be affected by voltage fluctuations of the amp 5340, the switch circuit 5354*a* switches off, power supply from the power management circuit 5353 to the charge pump circuit 5354 is interrupted, and supply of phase inversion clocks (3) from the controller 5321 is halted as well. As shown conceptually by diagonal lines in FIG. 108 (A), during halting of function of the charge pump circuit 5354, the output voltage is not stable during a transient period. The muting circuit 5430*a* stays on during a time slot sufficient to cover this transient period, then turns off at a timing t7 at which stability can be expected to have halted. In so doing, generation of popping sounds from the piezoelectric bimorph element 5325 can be prevented, even when the charge pump circuit 5354 turns off FIG. 108 (B) is a timing chart in the case of placing a telephone call. At timing t1, a contact input operation is initiated by selecting phonebook data or through manual input. At this point in time, as it is not certain whether a call will actually be placed, the power supply to the charge pump circuit 5354 is suspended. At arbitrary timing t2, at which the contact input operation is completed and a call request operation is performed, in response to this, firstly, the muting circuit 5340*a* turns on. Then, in the same manner as in FIG. 108 (A), upon entering a state at timing t3 in which the piezoelectric bimorph element 5325 will not be affected by voltage fluctuations of the amp 5340, the switch circuit 5354*a* switches on, and power supply from the power management circuit 5353 to the charge pump circuit 5354 is initiated, initiating supply of phase inversion clocks (3) from the controller 5321 as well. In the same manner as in FIG. 108 (A), the muting circuit 5430*a* turns off at timing t4, at which the voltage can be expected to have stabilized. The call is then initiated at timing t5, by a call answer operation performed by the called party in response to the call request. Due to the sufficient length of time until a call answer operation is performed by the called party in response to the call request, upon entering the startup process of the pump charge circuit 5354 in response to the call request operation, the piezoelectric bimorph element 5325 can reliably be anticipated to be in the activated state in reliable fashion at the time of initiation of the call, as shown in FIG. 108 (B). Even when the piezoelectric bimorph element 5325 enters the activated state due to a call request operation, the call is not initiated unless the called party performs a call answer operation; however, because it is conceivable that call setup would not take place in time if the piezoelectric bimorph element 5325 does not start up until after the called party performs a call answer operation, the piezoelectric bimorph element 5325 is placed in the activated state without waiting for the call to be set up.

Next, when a call disconnection operation is performed at timing t6, in response to this, firstly, the muting circuit 5340*a* turns on, in the same manner as in FIG. 108 (A). Then, upon entering a state at timing t7, in which the piezoelectric bimorph element 5325 will not be affected by voltage fluctuations of the amp 5340, the switch circuit 5354*a* switches off, supply of power from the power management circuit 5353 to the charge pump circuit 5354 is interrupted, and supply of phase inversion clocks (3) from the controller 5321 is halted as well. In the same manner as in FIG. 108 (A), the muting circuit 5430*a* stays on during a time slot sufficient to cover the transient period when functioning of the charge pump circuit 5354 halts, then turns off at a timing t8 at which stability can be expected to have halted. In so doing, in the same manner as in FIG. 108 (A), generation of popping sounds or the like from the piezoelectric bimorph element 5325 can be prevented, even when the charge pump circuit 5354 turns off. As described above, there may be cases in which the called party fails to perform a call answer operation in response to the call request operation, and at such times a disconnect operation is performed without setting up the call. In this case, FIG. 108 (B) may be understood to mean that no call state exists from t5 to t6 which are depicted between the call request operation at t2 and the disconnect operation at t6.

Figure 109:
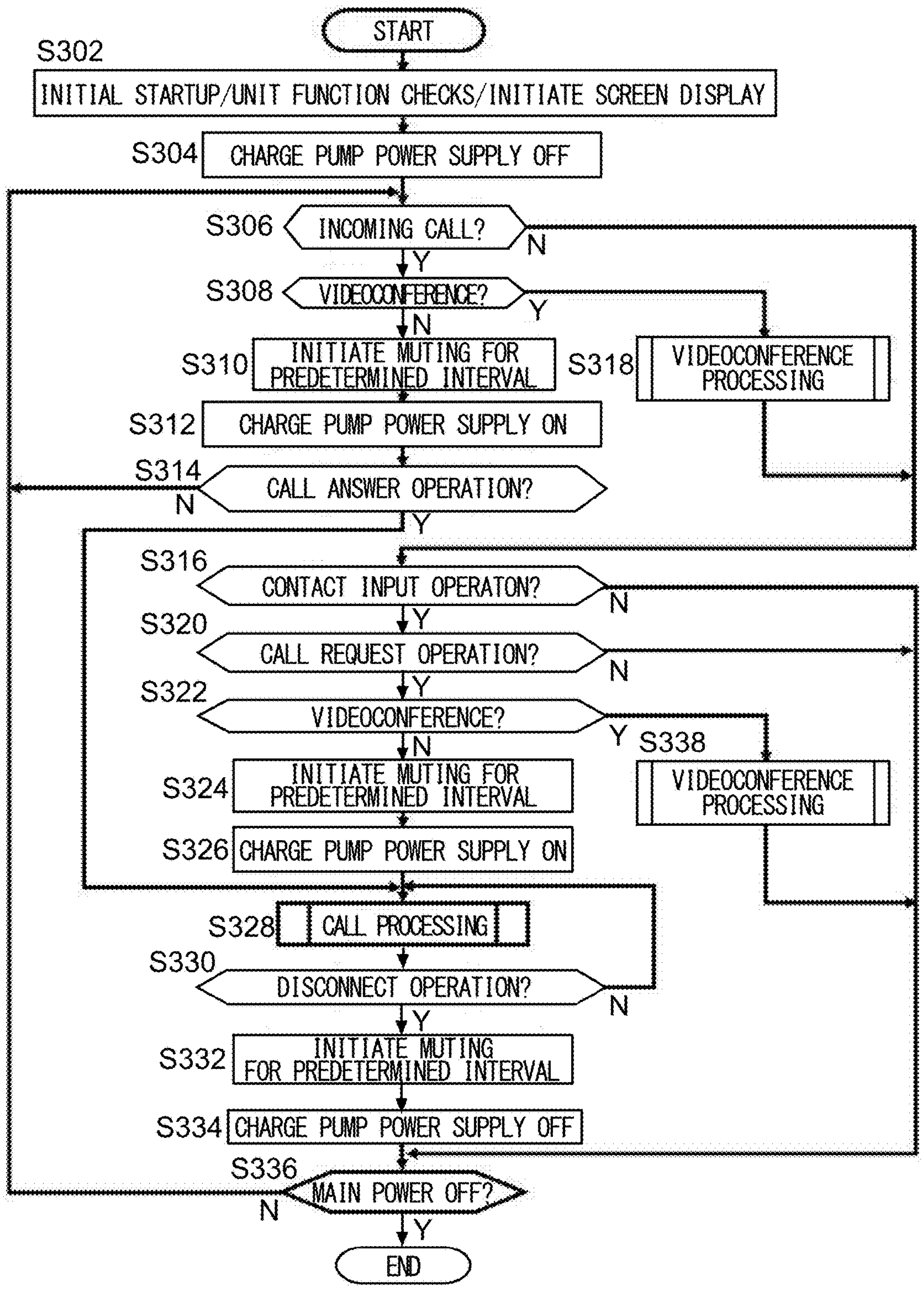
FIG. 109 is flowchart of operation of an application processor in the seventy-second embodiment.
Figure 110A:
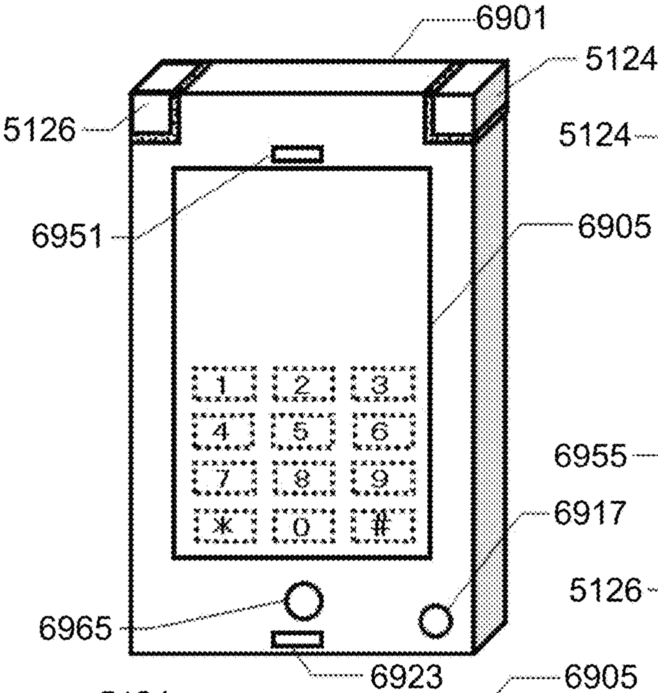
FIGS. 110A, 110B, 110C and 110D are perspective views relating to a seventy-third embodiment according to an aspect of the present invention (seventy-third embodiment)
Figure 110B:
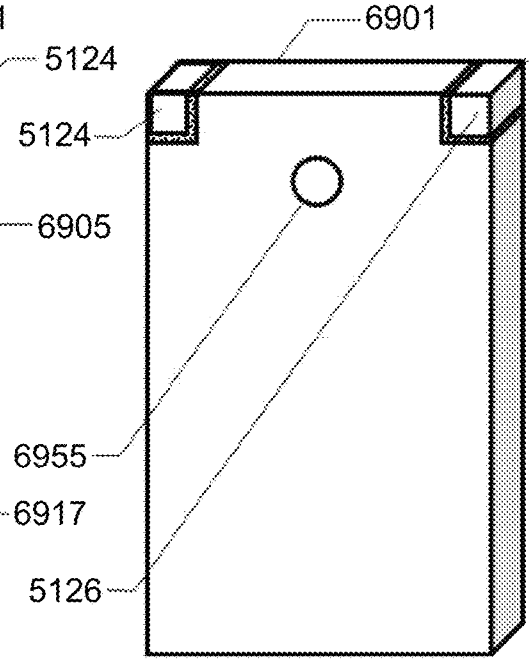
Figure 110C:
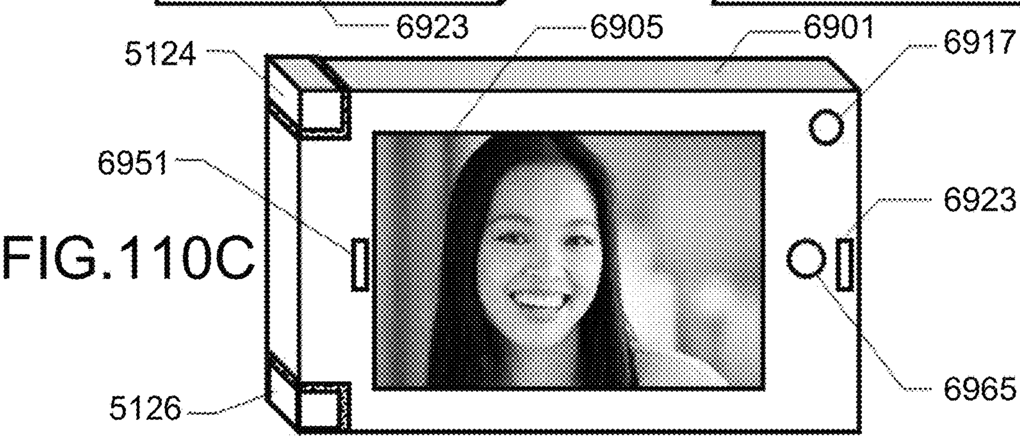
Figure 110D:
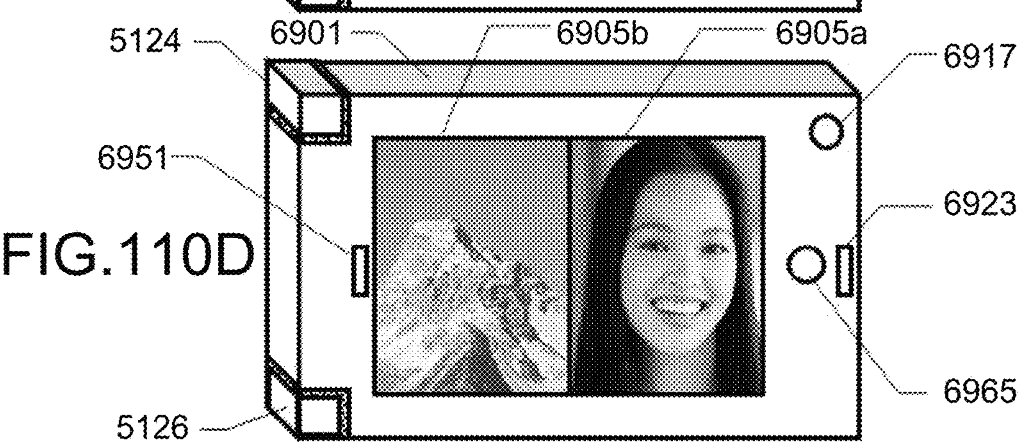

FIG. 109 is a flowchart of operation of an application processor 5339 in the seventy-second embodiment shown in FIG. 107 and FIG. 108. The flow in FIG. 109 primarily describes the functions of power supply control to the charge pump circuit 5354, and therefore operations centered on related functions have been extracted for illustration. Consequently, in the seventy-second embodiment, there are other operations of the application processor 5339, such as typical functions of mobile telephones and like, which are not represented in the flow of FIG. 109. The flow of FIG. 109 starts when the main power source of the mobile telephone 6801 is turned on, and in Step S302, initial startup and a function check of each unit are performed, as well as initiating screen display on a display unit 5305. Next, in Step S304, supply of power to the charge pump circuit 5354 turns off, and the routine advances to Step S306. Thus, the mobile telephone 6801 of the seventy-second embodiment firstly turns off the supply of power to the charge pump circuit 5354 and starts up.

In Step 306, a check for an incoming call is performed, and in the event there is an incoming call, the routine advances to Step S308, and checks whether or not there is a videoconference. In event there is no videoconference, the routine advances to Step S310, and the muting circuit 5340*a* is instructed to initiate muting for a predetermined time interval. Next, advancing to Step S312, an instruction to turn on the charge pump circuit 5354 is issued, and the routine advances to Step S314. To facilitate understanding, Step S310 and Step S312 are described as being functions of the application processor 5339; however, in actual practice, sequence control to mute for a predetermined time interval and to power on the charge pump circuit 5354 is delegated to the integrated power management IC 5303. In this case, in Step S310, an instruction to turn on the charge pump circuit 5354 is simply issued from the application processor 5339 to the controller 5321, and the routine advances to Step S314.

In Step S314, a check is made to determine whether or not a call answer operation has been performed, and in the event that no operation is detected, the routine returns to Step S306, and repeats Step S306 to Step S312 for as long as the incoming call is ongoing. In this case, in the event that the muting for a predetermined time interval and powering on of the charge pump circuit 5354 have been completed, Step S310 and Step S312 are omitted. On the other hand, when a call answer operation has been detected in Step S314, the routine advances to the call process of Step S328.

On the other hand, in the case that no incoming call is detected in Step S306, the routine advances to Step S316. When an incoming videoconference is detected in Step S308, the routine advances to Step S318, performs videoconferencing processes, and advances to Step S316. The videoconferencing processes of Step S318 correspond to processes lasting from initiation of videoconferencing to calling and disconnection thereof. Consequently, advance from Step S318 to Step S316 takes place when the videoconference is disconnected. The videoconferencing processes include a process for emitting the voice of the other caller from an air-conduction speaker during the call. In this way, in cases in which a videoconference is detected, the telephone is used with the piezoelectric bimorph element 5325 held away from the ear cartilage, and therefore from the outset, no power is fed to the charge pump circuit 5354.

In Step S316, a check is made to determine whether or not a contact input operation has been performed, and in the event that an input operation has been performed, the routine proceeds to Step S320, and checks whether a call request operation has been performed. In the event that a call request operation has been performed, the routine advances to Step S322, and checks whether a videoconference request operation has been performed. In the event that there is no videoconference request, the routine advances to Step S324, and the muting circuit 5340*a* is instructed to initiate muting for a predetermined time interval. Next, advancing to Step S326, an instruction to turn on the charge pump circuit 5354 is issued, and the routine advances to Step S328. As in Step S310 and Step S312, sequence control in relation to Step S324 and Step S326 is delegated to the controller 5321 of the integrated power management IC 5303.

On the other hand, in the event that contact input is not detected in Step S316, or in a case in which no call request operation has been detected in Step S320, the routine advances to Step S336. When an incoming videoconference is detected in Step S322, the routine advances to Step S338, performs videoconferencing processes, and advances to Step S336. The case of videoconferencing processes of Step S338 corresponds to the process of awaiting a call answer operation by the called party, and processes based on a call answer operation, lasting from initiation of videoconferencing to calling and disconnection thereof. Consequently, advance from Step S338 to Step S336 occurs when the videoconference is disconnected, or when a call request is disconnected in the absence of a call answer operation by the called party. As in Step S318, the videoconferencing processes in Step S338 include emitting the voice of the other caller from an air-conduction speaker during the call, and from the outset, no power is fed to the charge pump circuit 5354.

In Step S328, call processes based on a call answer operation in Step S314 or a call request operation in Step S320 are performed. In more specific terms, the call processes in Step S328 refer, in the case of a routine via Step S314, to functions taking place during the call, and include management to advance to Step S330 at each of predetermined time intervals and check whether there has been a disconnect operation. Step S328 and Step S330 are repeated in this fashion in the absence of a disconnect operation. On the other hand, in the case of a routine via a call request operation made in Step S320, the processes refer to the function of awaiting a call answer operation by called party, and functions taking place during the call after a call answer operation. In this case as well, the routine advances to Step S330 at each of predetermined time intervals, and checks whether there has been a disconnect operation. At this time, when a disconnect operation has been detected in Step S330 in the absence of a call answer process by the called party, as a result, only the called party call answer operation wait function will have taken place in Step S328.

Once a disconnect operation is detected in Step S330, the routine advances to Step S322, and the muting circuit 5430*a* is instructed to initiate muting for a predetermined time interval. Next, the routine advances to Step S334, the charge pump circuit 5354 is instructed to turn off, and the routine advances to Step S336. As in Step S310 and Step S312, sequence control in relation to Step S332 and Step S334 is delegated to the controller 5321 of the integrated power management IC 5303.

In Step S336, a check is performed to determine whether or not the main power source has been turned off, and in the event the power is not detected to be off, the routine returns to Step S306, and thereafter repeats the aforedescribed series of flows until detected that the main power source has been turned off. Once detected that the main power source has been turned off, the flow terminates.

The various features shown in the embodiments of the present invention are not necessarily unique to the individual embodiments in which they appear, and insofar as it is possible to utilize the advantages thereof, the features of the respective embodiments may be utilized in modified form, or utilized in combination, as appropriate. For example, in the seventy-second embodiment, a charge pump circuit is adopted as the voltage booster circuit for driving the piezoelectric bimorph elements, and while this is a suitable selection, there is no limitation to this, and employment of other voltage booster circuit, as appropriate, is not precluded.

(Seventy-third Embodiment)

FIG. 110 is a perspective view relating to a seventy-third embodiment according to an aspect of the present invention, configured as a mobile telephone 6901. In terms of external appearance, the seventy-third embodiment has much in common with the fifty-fifth embodiment shown in FIG. 83, and in terms of internal configuration and function has much in common with the fourth embodiment shown in FIG. 8 and FIG. 10; therefore, the common portions are assigned the same reference numerals as in these embodiments, and discussions are omitted.

A point of difference between the seventy-third embodiment of FIG. 110 and the fourth embodiment of FIG. 55 is that, as shown in perspective view from the front in FIG. 110 (A), the videoconferencing in-camera 6917 is situated in proximity to the lower right corner of the mobile telephone 6901. In the seventy-third embodiment, there is no extra available space in the upper part of the mobile telephone 6901, due to the placement of cartilage conduction units 5124 and 5126 and internal cartilage conduction vibration sources for transmitting vibration thereto. Therefore, in the seventy-third embodiment, the videoconferencing in-camera 6917 is situated in proximity to the lower right corner of the mobile telephone 6901, on the opposite side from the cartilage conduction units 5124 and 5126, with a display screen 6905 therebetween.

The seventy-third embodiment is furnished with a display lamp 6965 comprising an LED or the like, for notifying of incoming calls or emails, and the videoconferencing in-camera 6917 is situated in proximity to this display lamp 6965. By prompting the display lamp 6965 to blink randomly during videoconferencing, the user's line of sight can be directed towards the videoconferencing in-camera 6917. In so doing, the line of sight of the user's face displayed on the display unit of the other caller's video phone will be oriented squarely frontward. This feature will be further discussed below. FIG. 110 (B) is a rear perspective view of the mobile telephone 6901, and shows the placement of a rear main camera 6955.

As shown in FIG. 110 (C), the mobile telephone 6901 of the seventy-third embodiment is used while held in landscape orientation with the long edges of the display screen 6905 oriented on the horizontal. Because the videoconferencing in-camera 6917 is situated in proximity to the lower right corner of the mobile telephone 6901 as seen in FIG. 110 (A), when held in landscape orientation as shown in FIG. 110 (C), the camera is at the upper right corner. In so doing, the videoconferencing in-camera 6917 is able to capture the user's face at a natural angle from the upper right during a videoconference. Additionally, the videoconferencing in-camera 6917 is situated such that a direction perpendicular to the long edges of the display screen 6905 is aligned with a vertical direction of a captured image as shown in FIG. 110 (C). In cases in which the other caller's video phone is held in landscape orientation as well, the other caller's face will be displayed on the display screen 6905. The user's own face is also displayed as shown in FIG. 110 (C), on the display screen of the other caller's mobile telephone which is being held in landscape orientation. With regard to portrait orientation versus landscape orientation, the orientation in which the mobile telephone is held can be detected through detection of gravitational acceleration by an ordinary acceleration sensor 49, and the orientation of an image rotated automatically by 90°; due to the seventy-third embodiment being configured in this fashion, in videoconferencing mode, the image rotation function of the acceleration sensor 49 is halted. When the other caller's mobile telephone is not being held in landscape orientation, the left and right sides of the user's own face are cropped at left and right to produce a vertically elongated image, which is displayed on the display unit of the other caller's mobile telephone. Moreover, when the other caller's mobile telephone is not being held in landscape orientation, the long edge direction of the display screen becomes the vertical direction of the image, and therefore if nothing were done, the other caller's face would be displayed in landscape orientation. Consequently, as discussed below, an image from a mobile telephone not held in landscape orientation will be automatically rotated by 90°, for display on the display screen 6905. At this time, the other caller's face will be displayed at the center of the vertically elongated image, and therefore there is empty space in which nothing is displayed at the left and right of the display screen 6905. This empty space can be utilized for display of data. The user's own voice is captured by a microphone 6923 of the video phone, while the other caller's voice is output from a speaker 6951.

At this time, the display lamp 6965 is made to blinked randomly in the manner discussed above (for example, flashed randomly in several sets per minute, blinking on and off several times per set, for about 0.5 second each time). An ordinary videoconference is made while looking at the other caller's face on the display screen 6905, but this means that the line of sight is not facing towards the videoconferencing in-camera 6917. Consequently, on the other caller's screen as well, the line of sight will not be looking towards the other caller. In contrast to this, when the user's line of sight, attracted by random flickering in the aforedescribed manner, is drawn to the display lamp 6965, his or her line of sight becomes directed towards the videoconferencing in-camera 6917 which is situated nearby, thus producing the effect that his or her line of sight is facing the other caller, on the other caller's screen.

FIG. 110 (D) shows a state in which the display screen 6905 is split, with the other caller's face being displayed in a right side screen 6905*a*, and an image captured by the rear main camera 6955 being monitor-displayed in a left side screen 6905*b*. The monitor-displayed image is transmitted to the other caller, together with the user's own face captured by the videoconferencing in-camera 6917. In so doing, a videoconference conversation can take place while sending the other caller an image of the user's own face, together with scenery or the like currently viewed by the user.

Figure 111A:
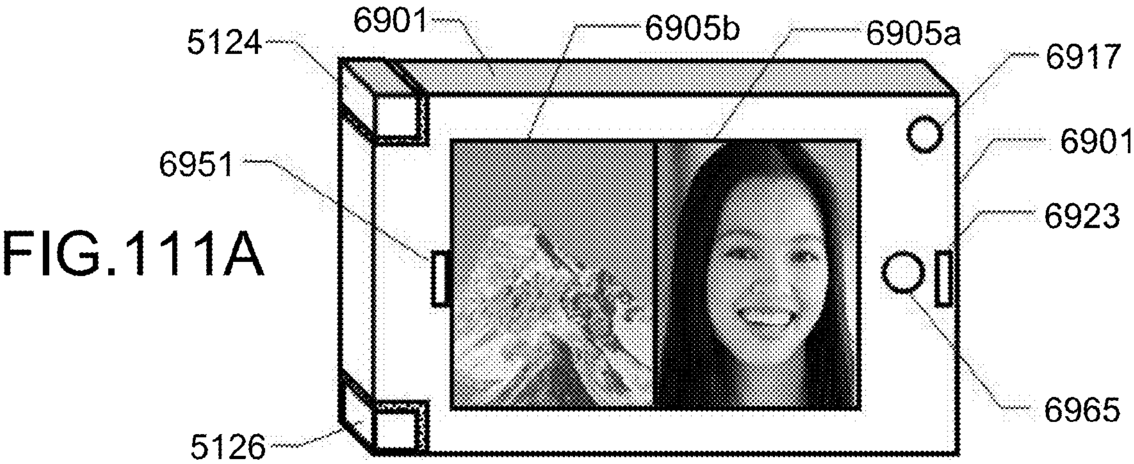
FIGS. 111A, 111B and 111C are perspective views showing several video phone modes in the seventy-third embodiment.
Figure 111B:
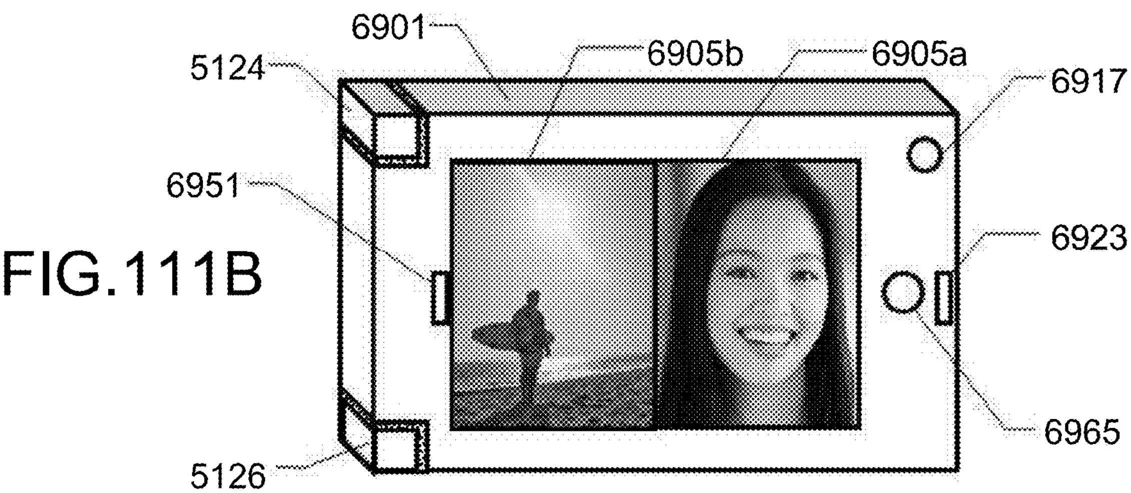
Figure 111C:
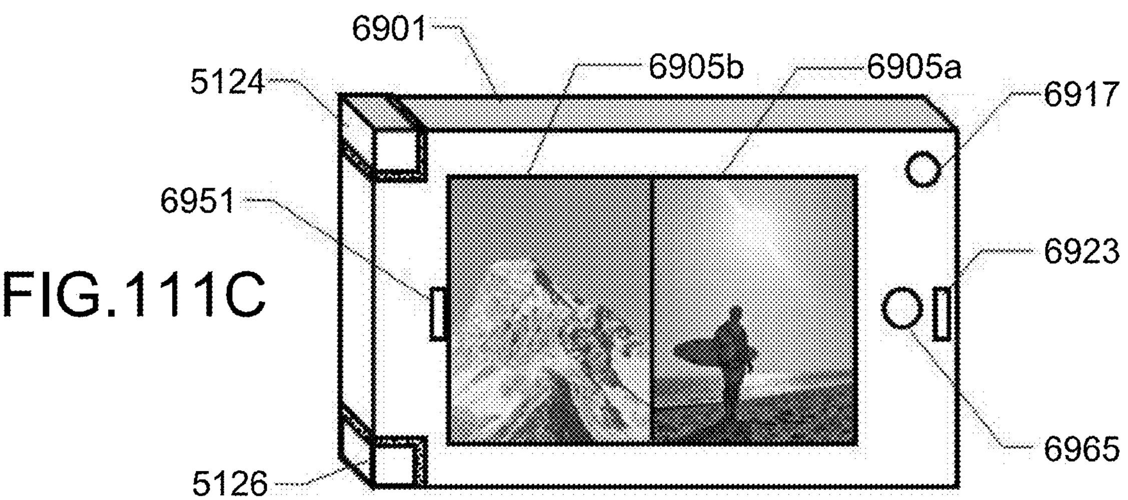

FIG. 111 is perspective views showing various videoconferencing modes in the seventy-third embodiment in the aforedescribed manner. FIG. 111 (A) is the same as FIG. 110 (D), and shows a mode in which the other caller's face is displayed in the right side screen 6905*a*, while an image captured by the rear main camera 6955 monitor-displayed in the left side screen 6905*b*.

In contrast to this, FIG. 111 (B) shows a mode in which the other caller's face is displayed in the right side screen 6905*a*, while an image transmitted by the other caller is displayed in the left side screen 6905*b*. Switching between the modes of FIG. 111 (A) and FIG. 111 (B) is accomplished by operation of the mobile telephones in mutual agreement with the other caller during the call. It is possible for sent and received images to be still images, not just video images. When sent or received images contain large amounts of data, during intervals that images from the rear main camera 6955 are sent and received, sending and receiving of images takes place on a time-division basis, stopping transmission of face image data to one another.

As will be discussed below, during transmission of a user's own face, together with scenery or the like currently viewed by the user, picture quality drops, but is it possible for images from the rear main camera 6955 and image from the videoconferencing in-camera 6917 to transmitted in synthesized form. In this case, an image containing a user's own face and scenery or the like currently viewed by the user can be transmitted to a mobile telephone that is not compatible with transmission/reception of images on two screens.

FIG. 111 (C) shows a state in which an image of scenery or the like transmitted by the other caller is displayed on the right side screen 6905*a*, and an image from the rear main camera 6955 to be sent to the other caller is monitor-displayed on the left side screen 6905*b*. In this case, landscapes or the like viewed by the callers can be exchanged with one another during a videoconference.

Figure 112:
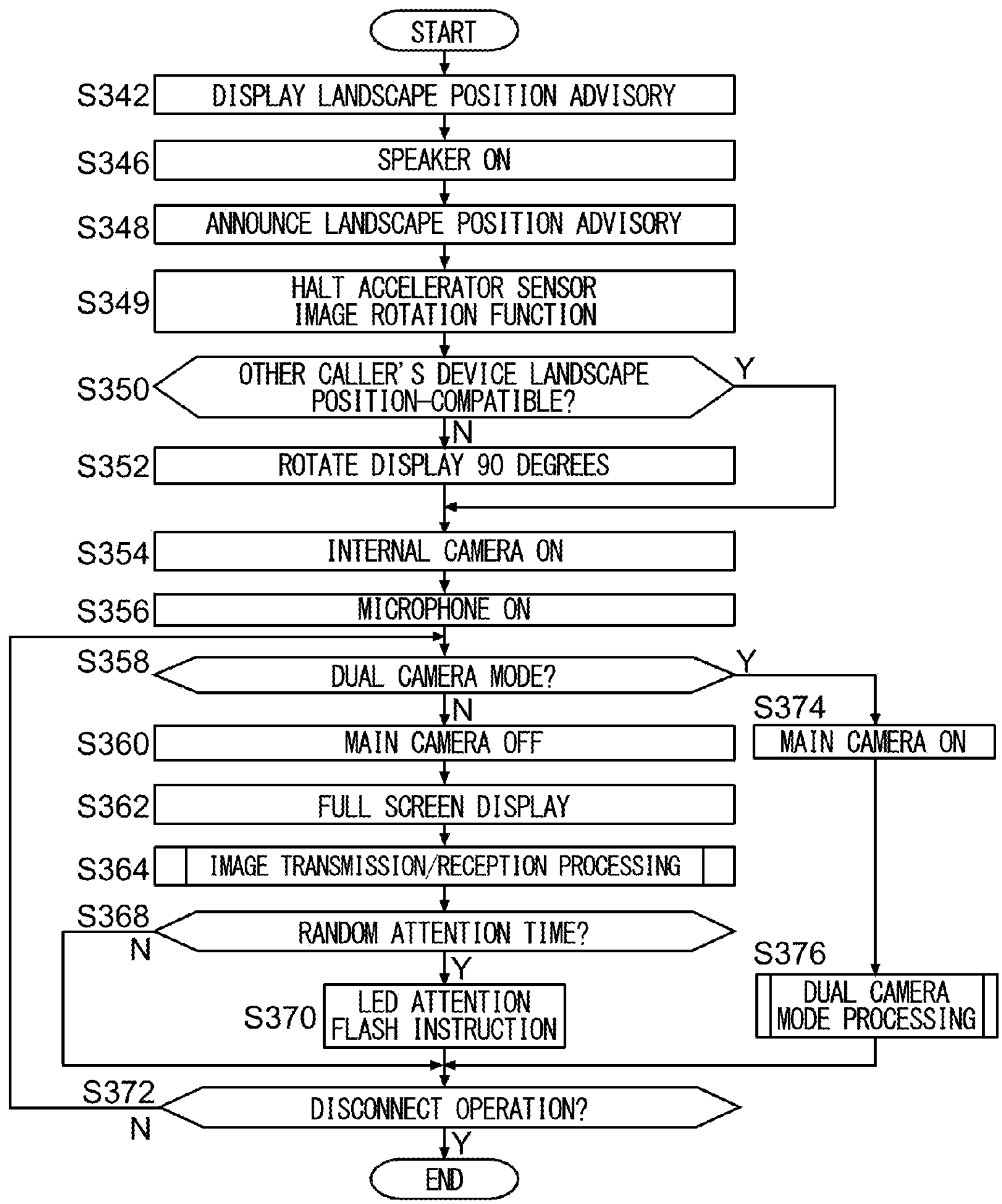
FIG. 112 is a flowchart showing videoconferencing processing in the seventy-third embodiment.

FIG. 112 is a flowchart showing videoconferencing processing in the seventy-third embodiment, and can be understood to describe the details of videoconferencing processing in Step S36 of the fourth embodiment shown in FIG. 10. When videoconferencing processing starts, in Step S342, an advisory to the effect that the mobile telephone 6905 should be used while held in landscape orientation is displayed on the display screen 6905. This display continues for a short while, and in parallel therewith, the flow proceeds directly to Step S346, and the speaker 6901 is turned on. Then, in Step S348, an advisory announcement to the effect that the mobile telephone 6905 should be used held in landscape orientation is made. In parallel with initiating the announcement, the flow proceeds directly to Step S349, and the function of auto-rotation of the image according to the orientation of the mobile telephone 6901 detected by the acceleration sensor 49 is halted. Next, proceeding to Step S350, a check is performed to determine whether the other caller's mobile telephone is landscape orientation-compatible. In the event that it is not landscape orientation-compatible, the flow proceeds to Step S352, in which the received image display is rotated by 90° so that the other caller's face appears upright in landscape orientation, then advances to Step S354. If the phone is one that is landscape orientation-compatible, the flow advances directly to Step S354.

In Step S354, the videoconferencing in-camera 6917 is turned on, and in Step S356, the microphone 6923 is turned on. Then, in Step S358, a check is performed to determine whether or not the device is in a "dual camera mode" in which both the videoconferencing in-camera 6917 and the rear main camera 6955 are used. The mode can be set manually beforehand, or changed in the course of a videoconference. In the event that the device is not in the "dual camera mode," in Step S360, the rear main camera 6955 is turned off; when already off, nothing is done in this step. Next, the display screen 6905 is set to full-screen display, and image transmission/reception processing is performed in Step S364. This processing is the same as that for an ordinary video phone, with processing being performed in time units of procedures.

Once the processing of Step S364 is finished, the routine proceeds to Step S368, and checks whether or not a time interval has arrived to randomly flash the display lamp 6965 on the basis of a simple random number process or the like. Upon arriving at a flash time, in Step S370, an instruction prompting a single set of flashes by the LED is issued in order to catch the user's attention to direct his or her line of sight towards the videoconferencing in-camera 6917, and the routine advances to Step S372. When the routine has not yet arrived at a flash time, it proceeds directly to Step S372. On the other hand, when detected in Step S358 that the device is in the "dual camera mode," the routine proceeds to Step S374 in which the rear main camera 6955 is turned on, then proceeds to the "dual camera mode" processing of Step S376, and when this process finishes, advances to Step S372. The details of the "dual camera mode" processing of Step S376 will be discussed below. In Step S372, it is checked whether a videoconference disconnect operation has been performed, and in the event that no such operation has been performed, the routine returns to Step S358. Step S358 to Step S376 are repeated subsequently until a disconnect operation is performed. Mode changes can be accommodated during this repetition as well. On the other hand, in the event that a disconnect operation is detected in Step S372, the flow terminates, and the routine advances to Step S38 of FIG. 10.

Figure 113:
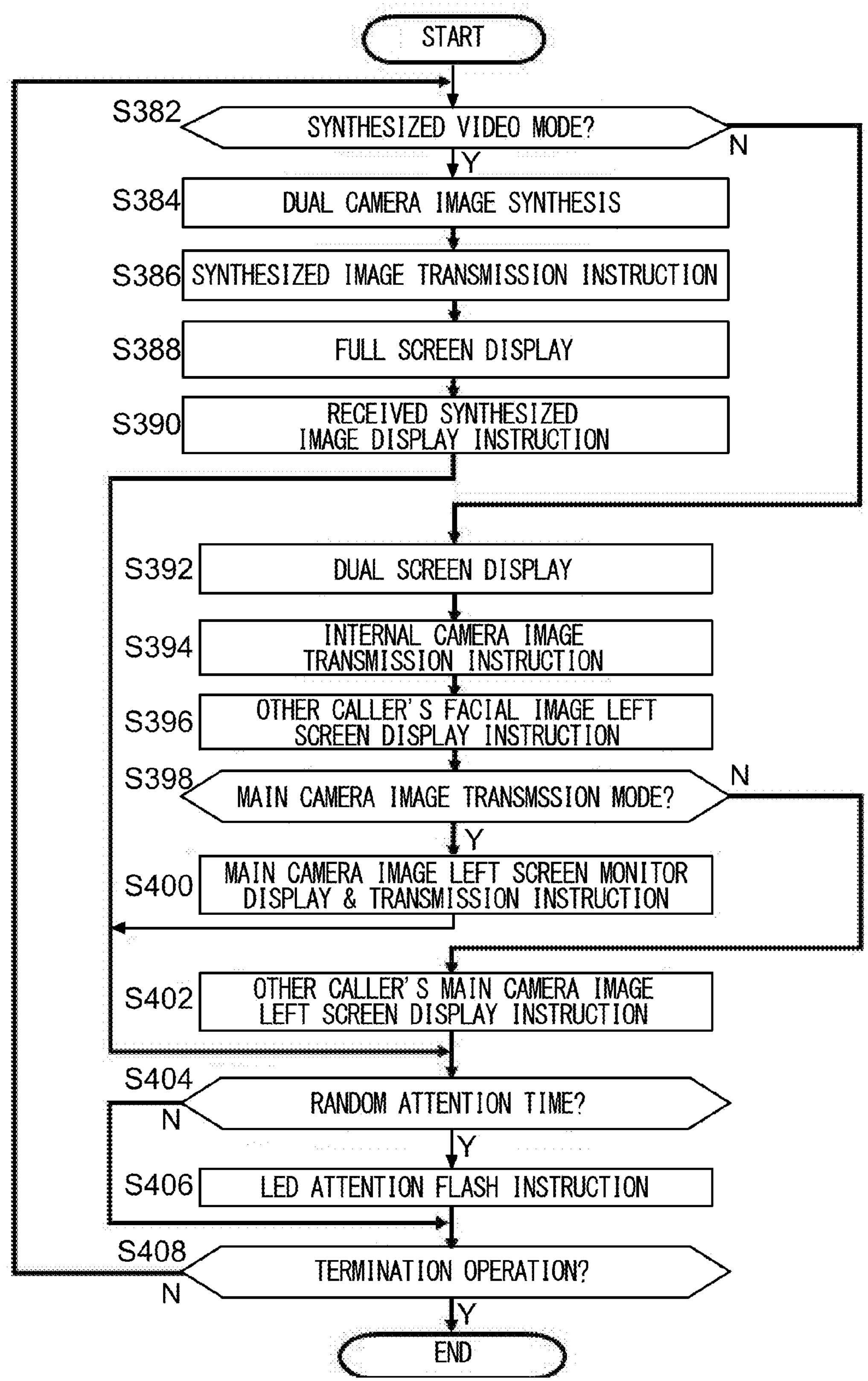
FIG. 113 is a flowchart showing the details of Step S376 of FIG. 112.

FIG. 113 shows the details of "dual camera mode" processing in Step S376 of FIG. 112. When the flow starts, in Step S382, a check is performed to determine if the device is in a synthesized video mode, and when this is the case, proceeds to Step S384, in which the images from the videoconferencing in-camera 6917 and the rear main camera 6955 are synthesized, and an instruction to transmit synthesized video is issued in Step S386. Further, in Step S388, a full-screen display instruction is issued, in Step S390 an instruction to display the received synthesized video is issued, and the routine advances to Step S404. On the other hand, in the event that the synthesized video mode has not been detected in Step S382, the routine advances to Step S392.

In Step S392, a dual screen display instruction is issued, and in Step S394 an instruction to transmit images from the videoconferencing in-camera 6917 is issued. Further, in Step S396, an instruction is issued to display a received image of the other caller's face on the right side display screen 6905*a*, whereupon the routine advances to Step S398. In Step S398, it is checked whether the mode is one of transmitting images from the rear main camera 6955, and when this is the case, in Step S400, an instruction is issued to monitor-display images from the rear main camera 6955 on the left side display screen 6905*b*, as well as to transmit the images to the other caller's mobile telephone. The routine then advances to Step S404.

On the other hand, in the case of a confirmation in Step S398 that the device is not in a mode of transmitting images from the rear main camera 6955, this means that the mode is one of receiving images from the other caller, and therefore the routine proceeds to Step S402, whereupon an instruction to display images received from the other caller's rear main camera on the left side display screen 6905*b* is issued, and the routine proceeds to Step S404. In Step S404, a check is performed to determine whether or not a time interval to randomly flash the display lamp 6965 has arrived, and upon arriving at such a flash time, in Step S406, an instruction to attract attention by blinking the display lamp 6965 is issued, and the routine advances to Step S408. When the routine has not yet arrived at a flash time, it proceeds directly to Step S408. The purpose is the same as in Step S368 and Step S370 in FIG. 112.

In Step S408, a check is performed to determine if a "dual camera mode" videoconference termination change has been made, and in the event that no such operation has been performed, the routine returns to Step S382. Step S382 to Step S408 are repeated subsequently until a termination operation is performed. Mode changes can be accommodated during this repetition as well. On the other hand, in the event that a termination operation is detected in Step S408, the flow terminates, and the routine advances to Step S372 of FIG. 112.

Implementation of the present invention is not limited to the aforedescribed embodiments, and the various advantages of the present invention can be enjoyed in other embodiments as well. Further, these features may be interchanged or utilized in combination among various embodiments. For example, the flowcharts shown in FIG. 112 and FIG. 113 can be adopted in the videoconferencing processing of Step S318 and Step S338 of the seventy-second embodiment shown in FIG. 109 as well.

Whereas conventional videoconferencing in-cameras are arranged such that a direction parallel to the long edges of the rectangular display screen 6905 coincides with a vertical direction of image capture, the videoconferencing in-camera 6917 in the aforedescribed seventy-third embodiment is arranged such that a direction perpendicular to the long edges of the rectangular display screen 6905 coincides with the vertical direction of image capture, as shown in FIG. 110 (C). In order avoid confusion in relation to displayed image rotation stemming from this situation, in the seventy-third embodiment, once videoconferencing has been established, the displayed image auto-rotate function based on the acceleration sensor 49 performed in Step S349 of FIG. 112 is halted. Then, during a videoconference with another caller, an ordinary mobile telephone rotates the displayed image by 90° by performing Step S350 and Step S352. However, countermeasures for preventing confusion stemming from the arrangement whereby a direction perpendicular to the long edges of the rectangular display screen 6905 coincides with the vertical direction of image capture in the videoconferencing in-camera 6917 are not limited to this. For example, a configuration whereby, utilizing the display image auto-rotate function based on the acceleration sensor 49, the orientation of the displayed image by the auto-rotate function is corrected by 90°, on the basis of whether or not information indicating that the vertical direction of the videoconferencing in-camera 6917 diverges by 90° from normal is available, would also be acceptable. Further, a configuration whereby, in the same manner as a conventional device, the videoconferencing in-camera 6917 is arranged such that the direction parallel to the long edges of the rectangular display screen 6905 coincides with the vertical direction of image capture, and during videoconferencing, the display image is always rotated 90° by the auto-rotate function, would also be acceptable.

Additionally, in cases in which the vibration source of the cartilage conduction unit 5124 in the seventy-third embodiment is configured as a piezoelectric bimorph element, it is possible for the element to also function as an impact sensor in the manner described in the fourth embodiment, and therefore a configuration whereby switching between main camera image transmission mode and reception mode during a videoconference is performed by detecting the impact produced by lightly tapping the cartilage conduction unit 5124 with the index finger, with the mobile telephone 6901 held sideways. Further, in the thirteenth embodiment and the seventeenth embodiment, the cartilage conduction unit functions as an incoming call vibrator, and it is possible for the cartilage conduction unit 5124 or 5126 of the seventy-third embodiment to likewise be concomitantly employed as a vibrating unit for notification purposes. For example, the cartilage conduction unit 5124 or 5126 could be configured to produce predetermined vibration every minute, thereby transmitting passage of time during a videoconference, to a hand holding the mobile telephone 6901 sideways.

(Seventy-fourth Embodiment)

FIG. 114 is a block diagram relating to a seventy-fourth embodiment according to an aspect of the present invention, configured as a cartilage conduction vibration source device for a mobile telephone. The seventy-fourth embodiment has, as its foundation, considerations based on the structure of the ear and on actual measurement data for the mobile telephone reviewed in FIG. 79 and FIG. 80, as well as a review of the frequency characteristic correction unit (the cartilage conduction equalizer 5038 and the cartilage conduction low-pass filter 5040) in the fifty-fourth embodiment of FIG. 82 configured on the basis thereof. Configuration-wise, it relates to functions corresponding to the analog front end unit 5336 of the integrated power management IC 5303, the cartilage conduction acoustic signal processing unit 5338, the charge pump circuit 5354, and the amp 5340 in the fifty-seventh embodiment of FIG. 87 and the seventy-second embodiment of FIG. 107. Consequently, the details of the significance of this configuration may be understood through reference to the disclosures, and description is omitted where redundant.

The seventy-fourth embodiment of FIG. 114 provides a cartilage conduction vibration source device controllable by an application processor 7039 and a power management circuit 7053 in an ordinary mobile telephone, and specifically is configured as a piezoelectric bimorph element 7013 (illustrated as an equivalent circuit, together with a capacitor) as the cartilage conduction vibration source, and a driver circuit 7003 therefor. The driver circuit is basically a drive amp for the piezoelectric bimorph element 7013, and incorporates therein an analog acoustic processing circuit 7038 serving as the frequency characteristic correction unit. Driving at suitable frequency characteristics, with the piezoelectric bimorph element 7013 as the cartilage conduction vibration source, is possible simply by connecting an audio output from the ordinary application processor 7039.

Stated in more specific terms, an analog sound signal output by a differential from a speaker analog output unit 7039*a* of the application processor 7039 is input to an analog input amp 7036, and is output through the analog acoustic processing circuit 7038 to analog output amps 7040*a* and 7040*b*, then used for differential driving of the piezoelectric bimorph element 7013. The driver circuit 7003 incorporates a voltage booster circuit 7054 (in specific terms, one comprising a charge pump circuit) for the analog output amps 7040*a* and 7040*b*, whereby driving is possible by inputting, as a power source voltage from a power input unit 7054*a*, an output voltage (2.7-5.5 V) of the ordinary power management circuit 7053.

The analog acoustic processing circuit 7038 has functions comparable to the cartilage conduction equalizer 5038 and the cartilage conduction low-pass filter 5040 in the fifty-fourth embodiment of FIG. 82, and also functions as a startup sequence circuit for automatically reducing clicking noises and popping noises. In some cases, correction of frequency characteristics by the cartilage conduction equalizer 5038 and the cartilage conduction low-pass filter 5040 may be established across the board, while in other cases, custom settings or adjustments are possible according to factors such as the age of the ear.

(Seventy-fifth Embodiment)

FIG. 115 is a block diagram relating to a seventy-fifth embodiment according to an aspect of the present invention. The seventy-fifth embodiment, like the seventy-fourth embodiment, is configured as a cartilage conduction vibration source device for a mobile telephone, and has much in common therewith; therefore, the same reference numerals are assigned to comparable configurations, omitting descriptions thereof. Whereas the seventy-fourth embodiment of FIG. 114 is configured as an all-analog circuit, the seventy-fifth embodiment of FIG. 115 differs therefrom in that a digital acoustic processing circuit 7138 is adopted in the driver circuit 7103.

However, as in the seventy-fourth embodiment, the input and output of the driver circuit 7103 are analog, and input analog signal is converted to a digital signal by a DA conversion circuit 7138*a* and input to the digital acoustic processing circuit 7138, while a digital output of the digital acoustic processing circuit 7138 is converted to an analog signal by a DA conversion circuit 7138*b*, and transferred to the analog output amps 7040*a* and 7040*b*. The input to the driver circuit 7103 is not a differential input; instead, an analog sound signal from an analog output 7039*b* of the application processor 7039 is input. The issue of whether input takes place by differential signaling or not is not a respective characterizing feature of the seventy-fourth and seventy-fifth embodiments, and therefore an appropriate configuration may be selected, according to the circumstances of connection to the application processor 7039.

(Seventh-sixth Embodiment)

Figure 116:
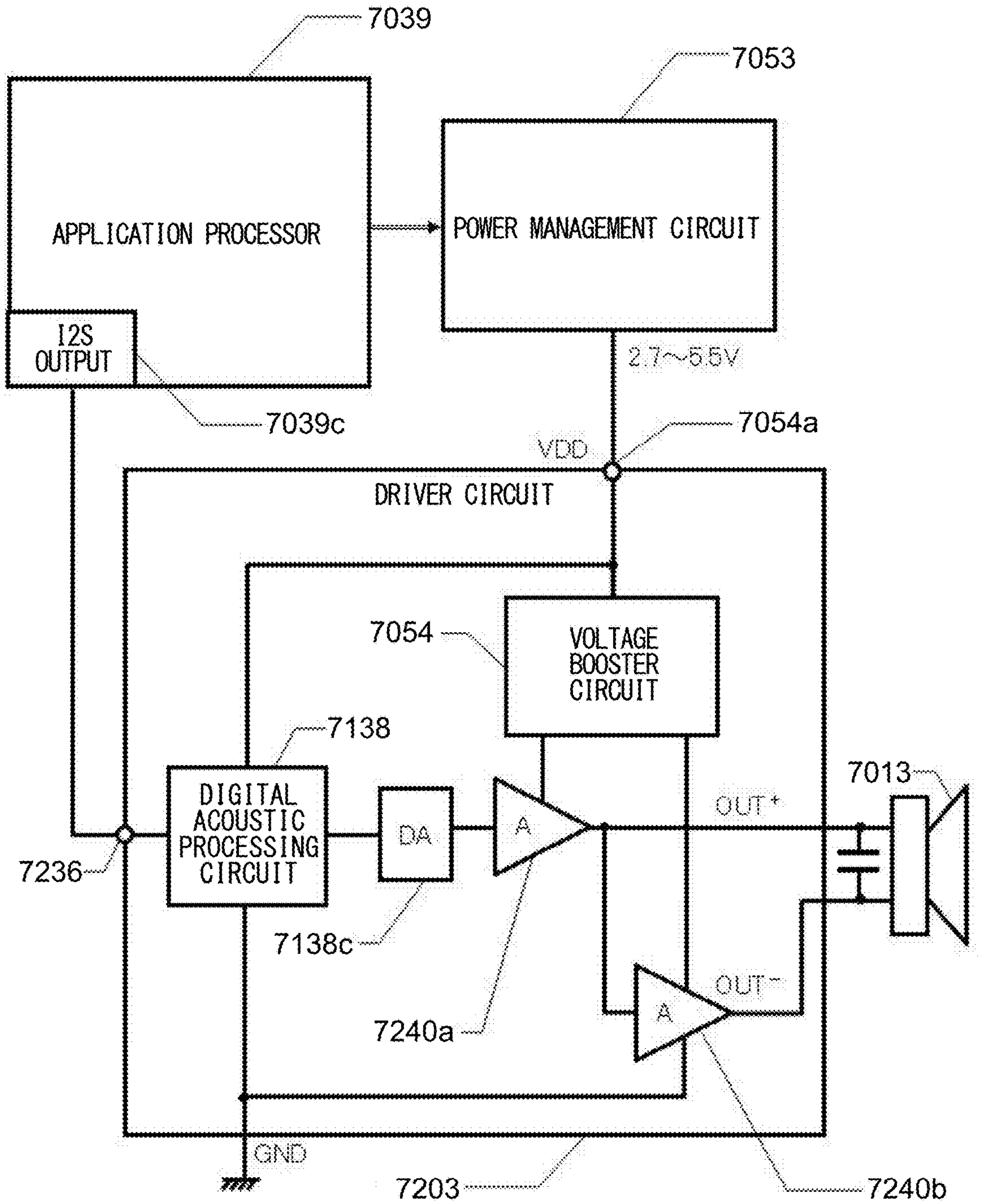
FIG. 116 is a block diagram relating to a seventy-sixth embodiment according to an aspect of the present invention (seventy-sixth embodiment)

FIG. 116 is a block diagram relating to a seventy-sixth embodiment according to an aspect of the present invention. The seventy-sixth embodiment, like the seventy-fourth and seventy-fifth embodiments, is configured as a cartilage conduction vibration source device for a mobile telephone, and has much in common therewith; therefore, the same reference numerals are assigned to comparable configurations, omitting descriptions thereof. A point of difference between the seventy-sixth embodiment of FIG. 116 and the seventy-fourth or seventy-fifth embodiment is that a digital sound signal from a digital output unit (12S) 7039*c* of the application processor 7039 is input to a driver circuit 7203. Then, in the same manner as in the seventy-fifth embodiment, a digital sound signal from the application processor 7038 is directly input to the digital acoustic processing circuit 7138 by an input unit 7236.

Digital output from the digital acoustic processing circuit 7138 is converted by a DA conversion circuit 7138*c* to an analog signal, which is transferred to an output amp 7240*a*, as well as being inverted by an analog output amp 7240*b*, and employed for differential driving of the piezoelectric bimorph element 7013. The issue of whether the analog output of the DA conversion circuit 7138*c* is inverted by the analog output amp 7240*b* as in the seventy-sixth embodiment, or whether two analog signals inverted by the DA conversion circuit 7138*b* itself are output as in the seventy-fifth embodiment, is not a respective characterizing feature of the seventy-fifth and seventy-sixth embodiments, and any appropriate configuration may be selected.

(Seventy-seventh Embodiment)

Figure 117:
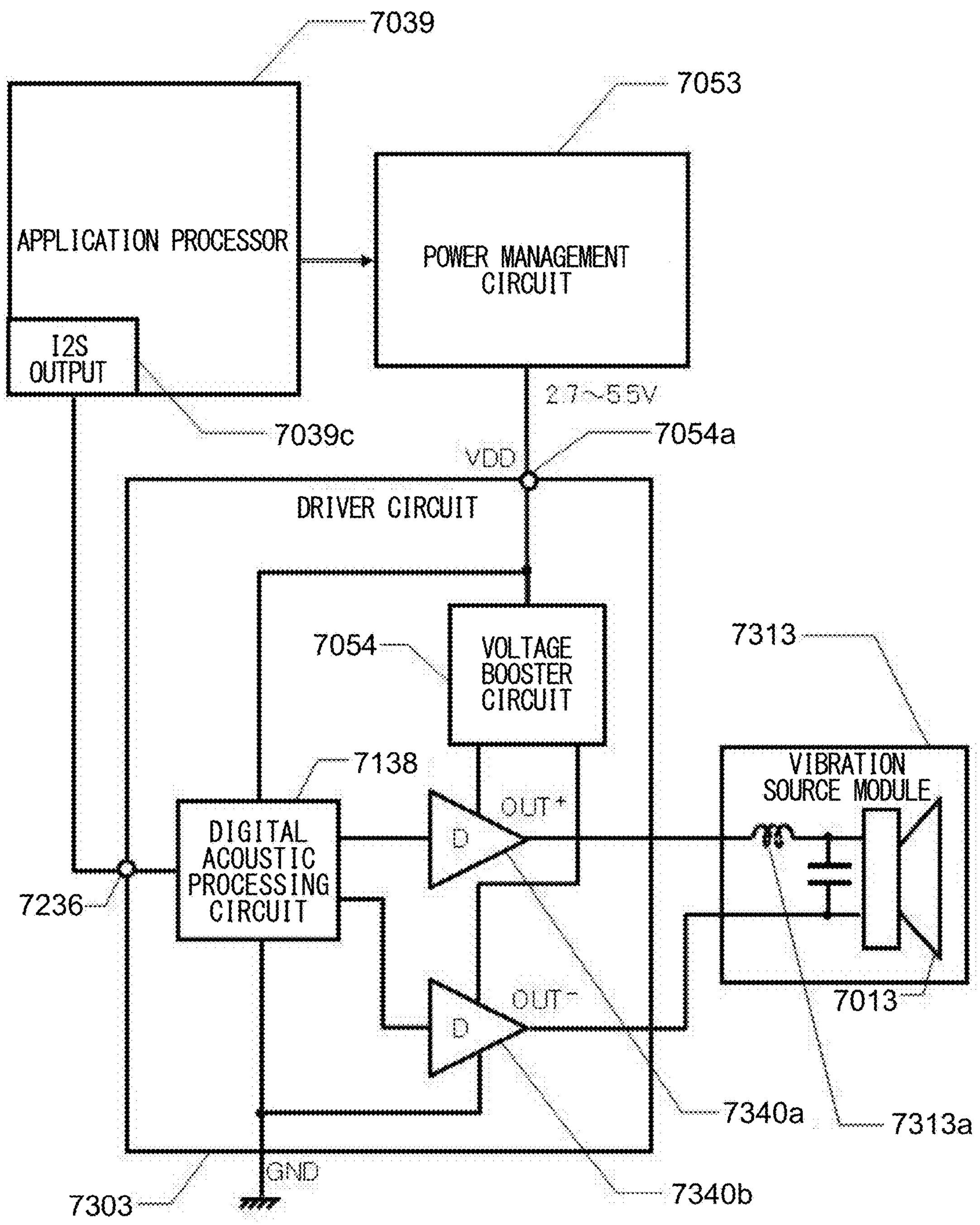
FIG. 117 is a block diagram relating to a seventy-seventh embodiment according to an aspect of the present invention (seventy-seventh embodiment)

FIG. 117 is a block diagram relating to a seventy-seventh embodiment according to an aspect of the present invention. The seventy-seventh embodiment, like the seventy-fourth to seventy-sixth embodiments, is configured as a cartilage conduction vibration source device for a mobile telephone, and has much in common therewith; therefore, the same reference numerals are assigned to comparable configurations, omitting descriptions thereof. A point of difference between the seventy-seventh embodiment of FIG. 117 and the seventy-fourth to seventy-sixth embodiments is that a driver circuit 7303 has an all-digital configuration. Consequently, a digital sound signal output from the digital output unit (12S) 7039*c* of the application processor 7039 is input directly to the digital acoustic processing circuit 7138 by the input unit 7236, and digital output from the digital acoustic processing circuit 7138 is transferred to class-D power amps 7340*a* and 7340*b*.

A vibration source module 7313 is provided in combination with a driver circuit 7303 for outputting a digital drive signal as in the seventy-seventh embodiment, and is configured as a piezoelectric bimorph element module incorporating a low-pass filter (in specific terms, a choke coil for smoothing PWM signals) 7313*a* for differential PWM signals output from the class-D power amps 7340*a* and 7340*b*. In so doing, even in cases in which the all-digital driver circuit 7303 has been adopted, by providing this in combination with the vibration source module 7313, there can be provided a cartilage conduction vibration source device controllable by the application processor 7039 and the power management circuit 7053 in an ordinary mobile telephone, without the burden of having to provide an external smoothing choke coil with matched characteristics, or the like.

In the forty-fourth embodiment of FIG. 67, there is shown a structure in which the piezoelectric bimorph element and the circuit form a resin package which is held as an integrated vibration unit, and the choke coil 7313*a* of the seventy-seventh embodiment of FIG. 117 can be thought of as the most simple example of a circuit that is integrated with a piezoelectric bimorph element into a resin package, as in the forty-fourth embodiment. Consequently, the shape and holding structure reviewed in the forty-fourth embodiment of FIG. 67 could be adopted for the vibration source module 7313 of the seventy-seventh embodiment.

In the above manner, the seventy-fourth to seventy-seventh embodiments can provide a cartilage conduction vibration source device controllable by the application processor 7039 and the power management circuit 7053 in an ordinary mobile telephone, without the burden of adjustment and review to achieve good cartilage conduction, even in the absence of any knowledge or information about cartilage conduction. The specific configuration is not limited to those of the seventy-fourth to seventy-seventh embodiments, and provided that the advantages thereof can be enjoyed, it is possible to make appropriate changes to the combination of circuit components. The present invention does not just feature configuration as a single driver circuit as in the seventy-fourth to seventy-seventh embodiments, and configurations involving incorporation as part of a large-scale circuit, such as the integrated power management IC 5303 in the fifty-seventh embodiment of FIG. 87 or the seventy-second embodiment of FIG. 107, are also acceptable.

(Seventy-eighth Embodiment)

Figure 118A:
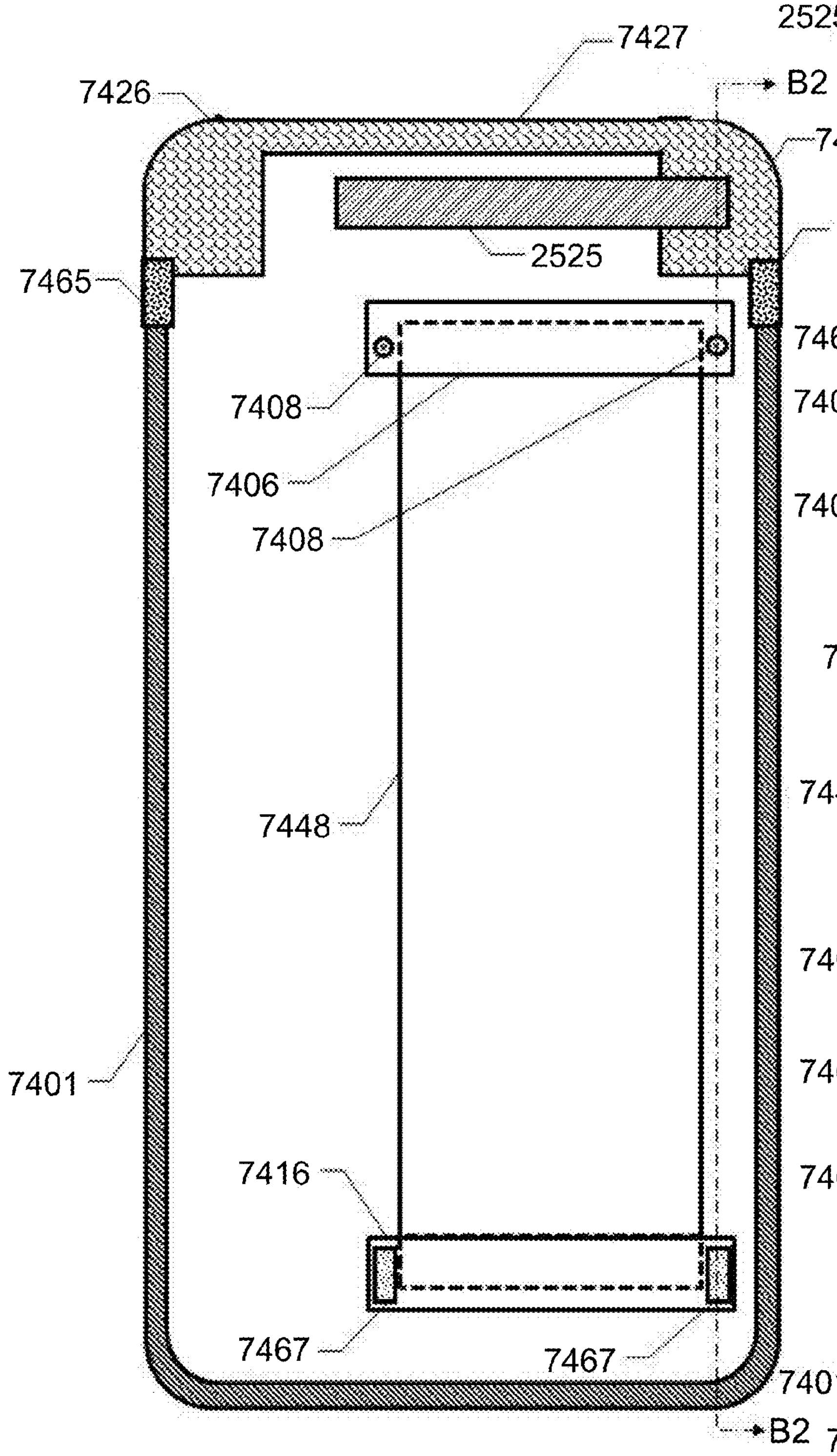
FIGS. 118A and 118B are cross sectional views of a front surface and a side surface relating to a seventy-eighth embodiment according to an aspect of the present invention (seventy-eighth embodiment)
Figure 118B:
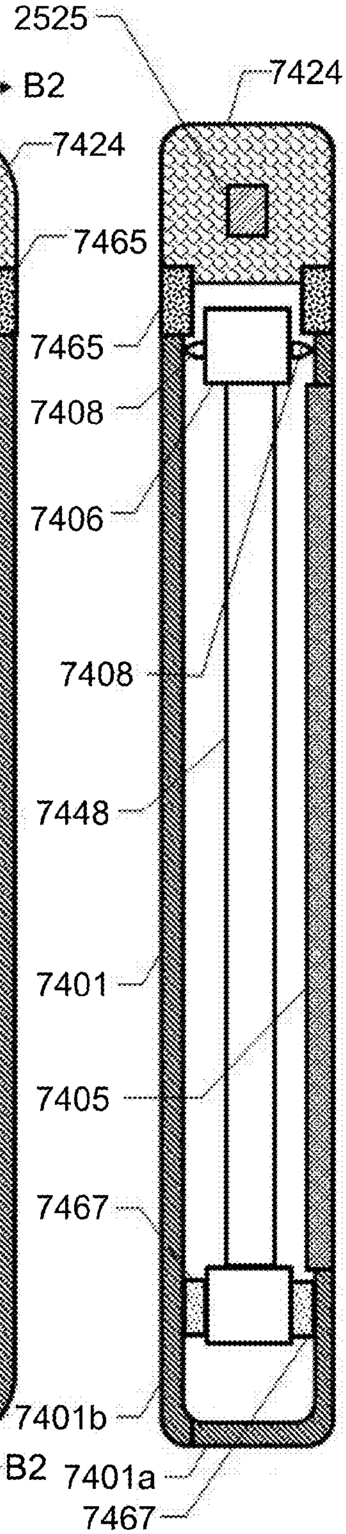

FIG. 118 is a cross sectional view relating to a seventy-eighth embodiment according to an aspect of the present invention, and is configured as a mobile telephone 7401. FIG. 118 (A) is a front cross sectional view of the mobile telephone 7401, and FIG. 118 (B) is a side cross sectional view of the mobile telephone 7401 taken in the B2-B2 cross section of FIG. 118 (A). As shown in FIG. 118 (A), the configuration of cartilage conduction units 7424, 7426 and a linking unit 7427 in the seventy-eighth embodiment, as well as the structure by which the cartilage conduction unit 7424 holds in cantilever fashion a piezoelectric bimorph element 2525 as a cartilage conduction vibration source for transmitting vibration to the cartilage conduction unit 7424, are shared inter alia with the structure of the sixty-fifth embodiment shown in FIG. 97 (B). Consequently, to avoid redundancy, descriptions of the significance of these structures are omitted. Like the sixty-first embodiment of FIG. 91, a feature of the seventy-eighth embodiment of FIG. 118 is that the internal weight of the mobile telephone 7410 is utilized in order to suppress a modicum of sound leakage due to transfer of vibration of the cartilage conduction vibration source 2525 to the chassis of the mobile telephone 7401. The details of the other internal configuration of the mobile telephone 7401 are shared with the embodiments described up to this point (for example, the fifty-fourth embodiment of FIG. 82, the seventy-second embodiment of FIG. 107, and the like), and therefore in FIG. 118, illustrations of these have been omitted to avoid complexity.

A sound leakage suppression structure employed in the seventy-eighth embodiment of FIG. 118 is described below. In the same fashion as in the sixty-fifth embodiment of FIG. 97, cartilage conduction units 7424, 7426 and a linking unit 7427 are integrally molded from a hard material. This hard material is a material of different acoustic impedance than the chassis of the mobile telephone 7401. An elastic body 7465 is interposed, as a vibration isolating material, between the chassis of the mobile telephone 7401 and the integrally molded structure of the cartilage conduction units 7424, 7426 and the linking unit 7427, and connects the two such that there is not direct contact between them. This structure provides acoustic blocking between the chassis of the mobile telephone 7401, and the integrally molded structure of the cartilage conduction units 7424, 7426 and the linking unit 7427. The preceding structure is shared with embodiments described previously, but as it constitutes the base of the sound leakage suppression structure in the seventy-eighth embodiment, the significance thereof has been summed up once again.

A cell 7448 is held at top and bottom by hard cell holders (an upper holder 7406 and a lower holder 7416). In a center part of the cell 7448, containment by the rigid holders is avoided, so as to permit swelling associated with the passage of time during use. The upper holder 7406 is furnished with a plurality of pins 7408 for connection to the front surface and rear surface of the mobile telephone 7401, in sections of small cross-sectional area. Meanwhile, the lower holder 7416, which is situated at a location away from the plurality of pins 7408, is furnished with a plurality of elastic bodies 7467 which hold it in a vibration-isolated state, to the front surface and rear surface of the mobile telephone 7401.

In so doing, as shown in FIG. 118 (B), the cell 7448 installed in the cell holders (the upper holder 7406 and the lower holder 7416) is placed within a front side chassis 7401*a* (GUI display part 7405 side), and when covered up with a rear side chassis 7401*b*, the plurality of pins 7408 are respectively sandwiched between the front side chassis 7401*a* and the rear side chassis 7401*b* and become pressed into contact thereagainst, whereby the load of the cell 7448 is connected, via the upper holder 7406, to the chassis of mobile telephone 7401, in proximity to the cartilage conduction unit 7424. The significance of the small-cross-sectional area connections afforded by the pins 7408 is that the load connection locations are specifically concentrated in proximity to the cartilage conduction unit 7424 in the chassis of the mobile telephone 7401. This load connection serves to suppress vibration of the chassis of the mobile telephone 7401 in proximity to the cartilage conduction unit 7424, which corresponds to the entrance section for vibration transmission. The effect of this is comparable, for example, to that of a damper attached to the bridge of a stringed instrument corresponding to the entrance section for vibration of the strings, and serves to suppress resonance of the entire chassis of the mobile telephone 7401.

Because the cartilage conduction unit 7424 is constituted by a material of different acoustic impedance than the chassis of the mobile telephone 7401, and is vibration-isolated with respect to the chassis of the mobile telephone 7401 by the elastic body 7465, a high degree of freedom of vibration is ensured, the effect of vibration suppression due to load connection of the cell 7448 are minimal, and satisfactory cartilage conduction can be obtained.

Meanwhile, the plurality of elastic bodies 7467 furnished to the lower holder 7416 are likewise sandwiched between the front side chassis 7401*a* and the rear side chassis 7401*b* and become pressed into contact thereagainst, in which state, due to the elasticity thereof, the lower holder 7416 has a high degree of freedom with respect to the chassis of the mobile telephone 7401, and the load connection is weak. Consequently, despite fact that the lower holder 7416 is held by the plurality of elastic bodies 7467 in a section situated away from the plurality of pins 7408, specific concentration of the load connection locations provided by the plurality of pins 7408 is not diminished.

(Seventy-ninth Embodiment)

Figures 119A, 119B:
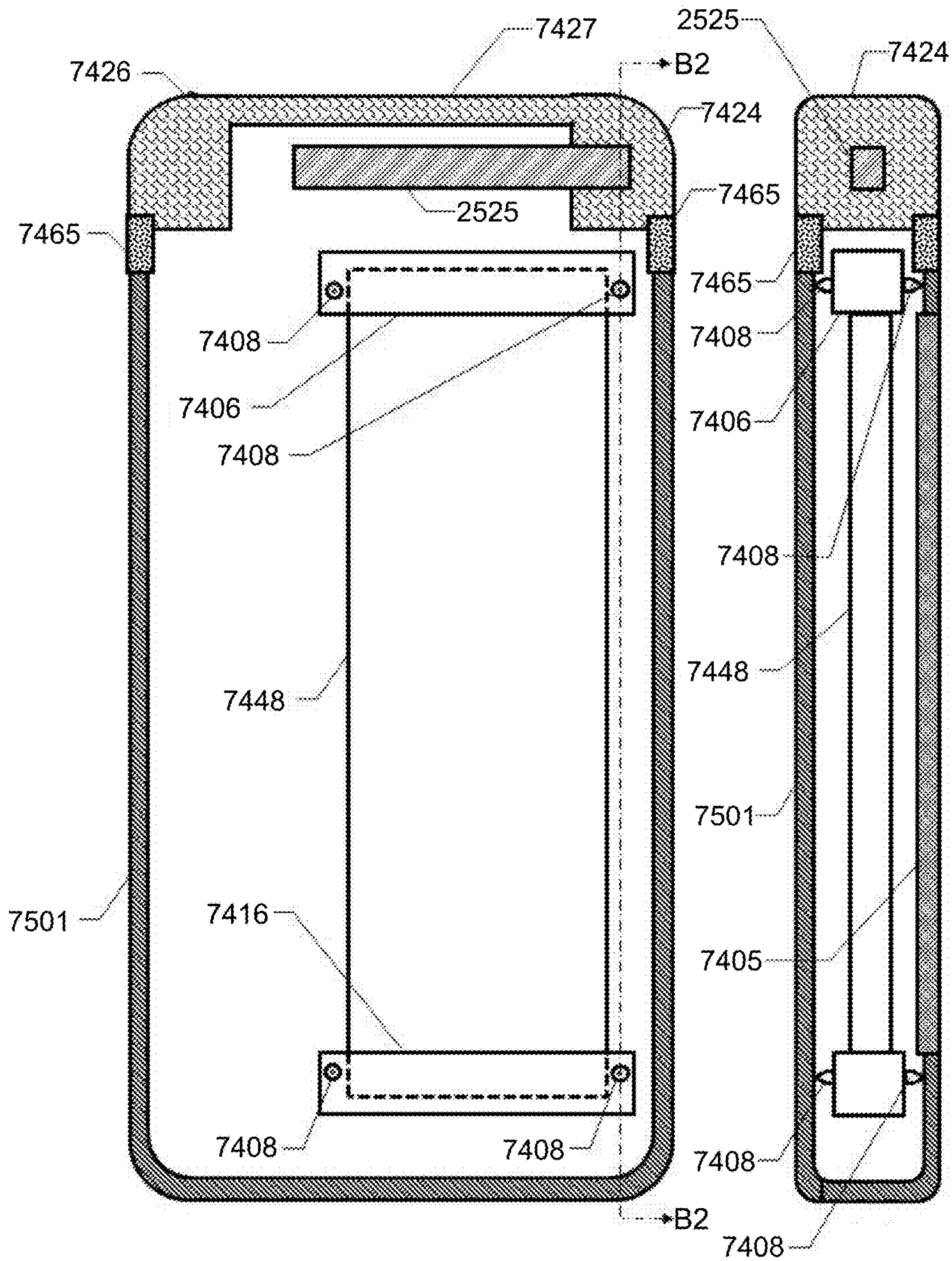
FIGS. 119A and 119B are cross sectional views of a front surface and a side surface relating to a seventy-ninth embodiment according to an aspect of the present invention (seventy-ninth embodiment)

FIG. 119 is a cross sectional view relating to a seventy-ninth embodiment according to an aspect of the present invention, configured as a mobile telephone 7501. The seventy-ninth embodiment has much in common with the seventy-eighth embodiment in FIG. 118, and therefore the same reference numerals are assigned to common portions, and descriptions thereof are omitted.

A point of difference between the seventy-ninth embodiment and the seventy-eighth embodiment lies is that the lower holder 7416 is also furnished with a plurality of pins 7408, in place of the plurality of elastic bodies 7467. In so doing, when sandwiched by the front side chassis 7401*a* and the rear side chassis 7401*b*, the lower holder 7416 is also provided with a small cross-sectional area connection by the pins 7408. In the case of the seventy-ninth embodiment, the load connection locations of the cell are dispersed, but as the vibration suppressing effect is dependent upon the distance between the load connection locations and the cartilage conduction unit 7424, the load connection afforded by the plurality of pins 7408 of the upper holder 7406 remains effective. Consequently, in cases in which priority is given to using common parts for the structures of both the upper holder 7406 and the lower holder 7416 in order to reduce the number of parts, even at the expense of some vibration suppressing effect, it is possible to adopt the configuration of the seventy-ninth embodiment.

(Eightieth Embodiment)

Figure 120A:
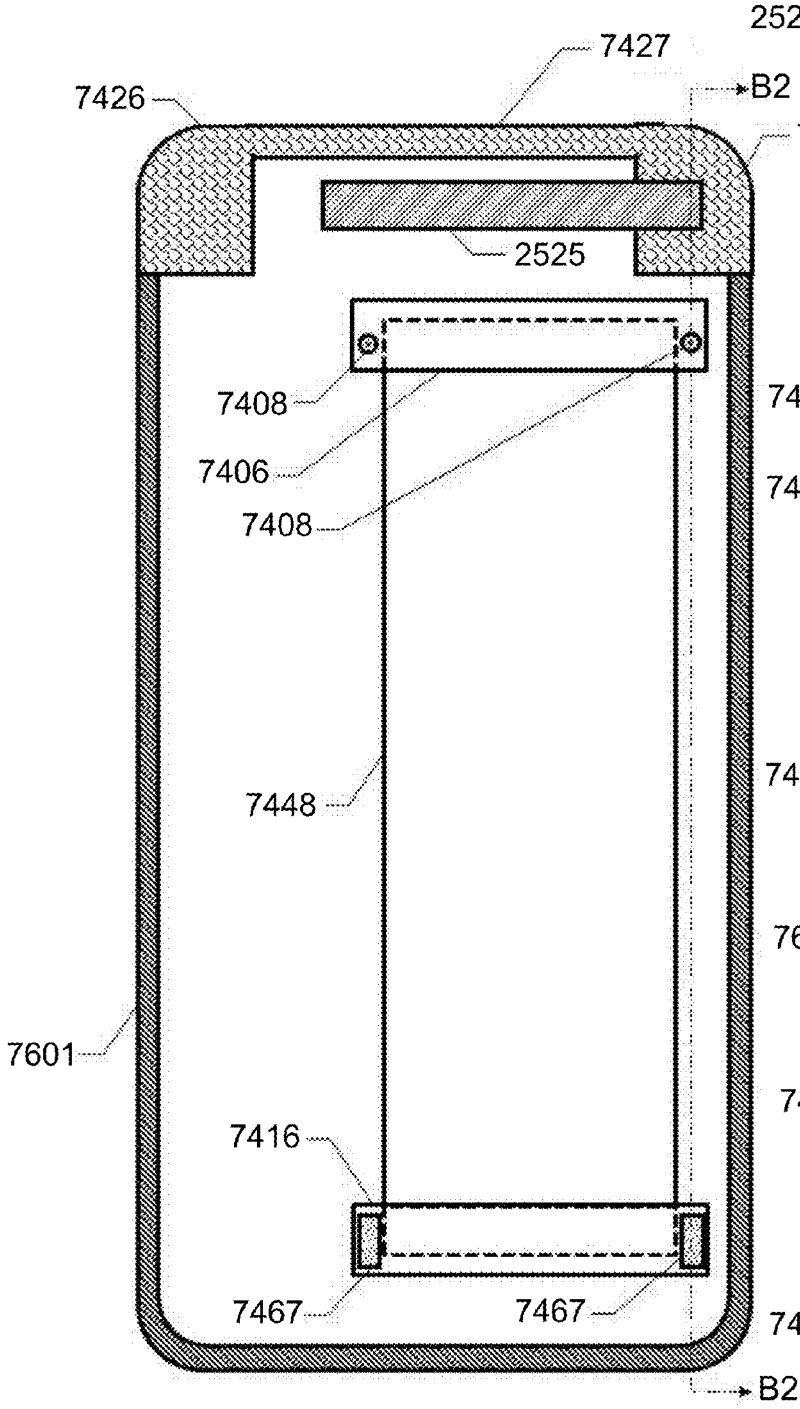
Figure 120B:
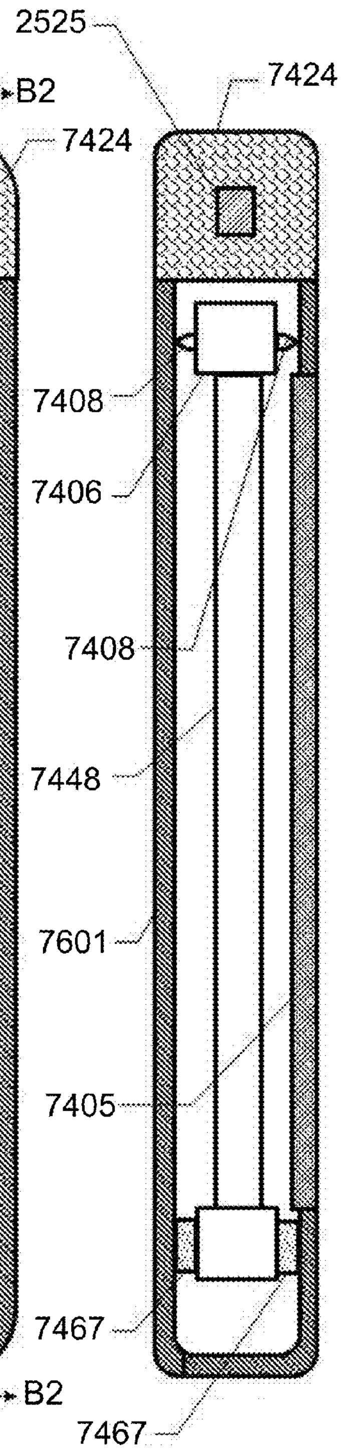

FIG. 120 is a cross sectional view relating to an eightieth embodiment according to an aspect of the present invention, configured as a mobile telephone 7601. The eightieth embodiment has much in common with the seventy-eighth embodiment in FIG. 118, and therefore the same reference numerals are assigned to common portions, and descriptions thereof are omitted.

A point of difference between the eightieth embodiment and the seventy-eighth embodiment lies is that the elastic body 7465 between the chassis of the mobile telephone 7401 and the integrally molded structure of the cartilage conduction units 7424, 7426 and the linking unit 7427 has been omitted. In cases in which sufficient vibration isolating effect can be obtained simply from the difference in acoustic impedance between the aforedescribed integrally molded structure and the chassis, the vibration suppression of the chassis by load connection of the cell 7448 does not appreciably extend to the integrally molded structure, and satisfactory cartilage conduction can be ensured. Consequently, in cases in which priority is given to reducing the number of parts, even at the expense of some cartilage conduction efficiency, to simplify the connection structure of the integrally molded structure and the chassis, it is possible to adopt the configuration of the eightieth embodiment.

(Eighty-first Embodiment)

Figure 121A:
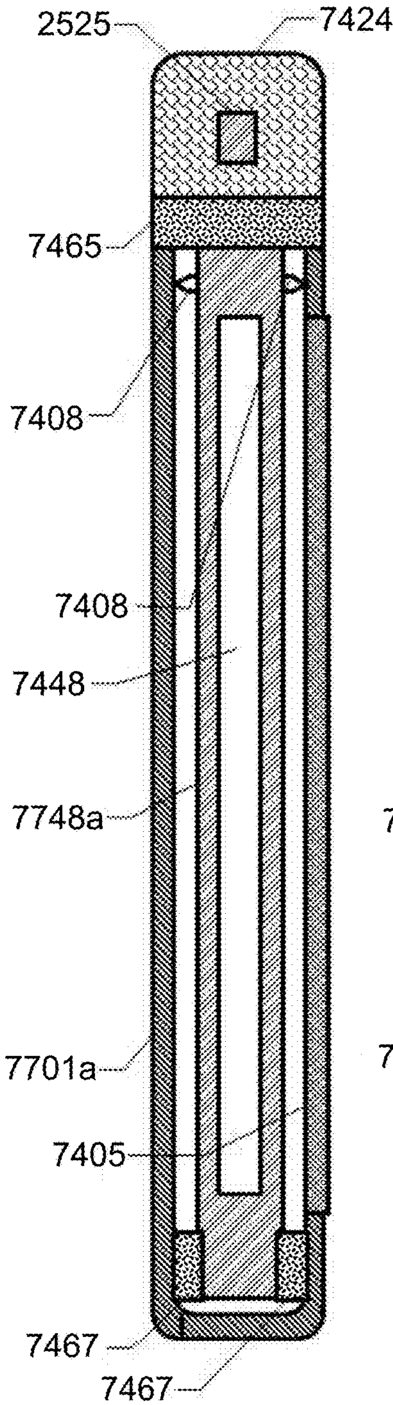
Figure 121B:
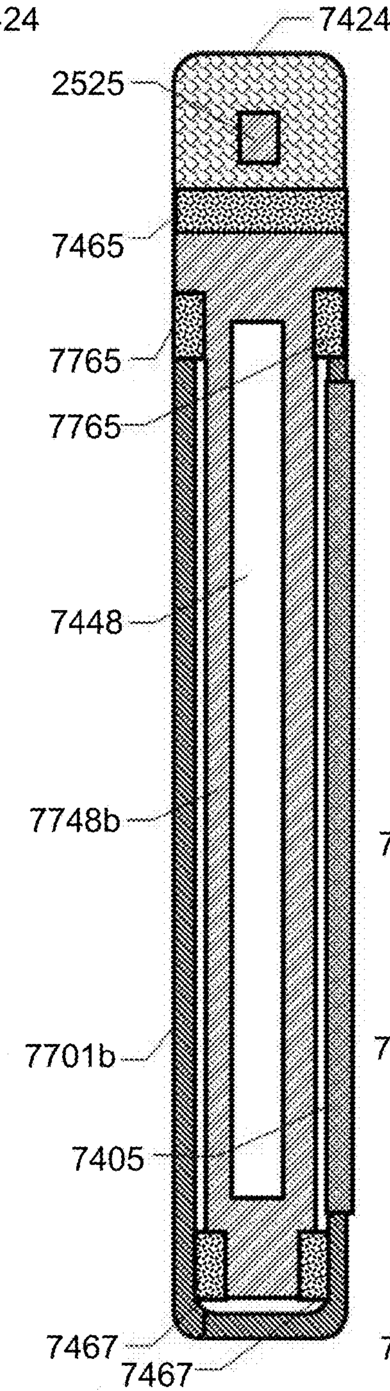
Figure 121C:
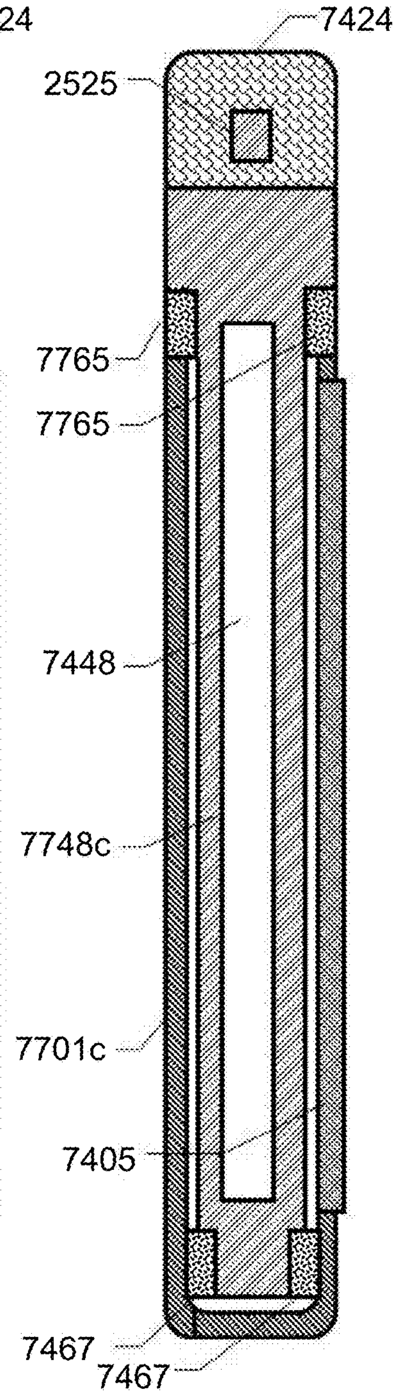

FIG. 121 is a side sectional view relating to the eighty-first embodiment and a modification thereof according to an aspect of the present invention. The eighty-first embodiment and a modification thereof have much in common with the seventy-eighth embodiment in FIG. 118.

A point of difference between the eighty-first embodiment and the modification thereof and the seventy-eighth embodiment is that the weight used for suppressing sound leakage is used as an internal frame structure of the mobile telephone. The internal frame structure 7748*a* constitutes the majority of the weight of the mobile telephone and is therefore suitable for suppressing sound leakage.

FIG. 121(A) is a side sectional view relating to an eighty-first embodiment, and is configured as a mobile telephone 7701*a*. The eighty-first embodiment has much in common with the seventy-eighth embodiment in FIG. 118 as described above, and therefore the same reference numerals are assigned to common portions, and descriptions thereof are omitted.

In the eighty-first embodiment (A), the weight used for suppressing sound leakage as described above has the internal frame structure 7748*a* of the mobile telephone 7701*a*. The internal frame structure 7748*a* holds the cell 7448, holds the circuits and other internal structures, and constitutes the majority of the weight of the mobile telephone. The internal frame structure 7748*a* is connected, via the elastic body 7465, to the integrally molded structure of the cartilage conduction units 7424, 7426 and the linking unit 7427, and constitutes the principal skeletal structure of a mobile telephone 7701*b*. For this reason, the internal frame structure 7748*a*, by virtue of the weight thereof, suppresses vibration of the chassis constituting the surface of the mobile telephone 7701*a* in the vicinity of the cartilage conduction unit 7424 in the same manner as the seventy-eighth embodiment of FIG. 118.

FIG. 121 (B) is a side sectional view relating to the eighty-first embodiment according to an aspect of the present invention, configured as a mobile telephone 7701*b*. The first modification example of FIG. 121 (B) has much in common with the eighty-first embodiment in FIG. 121 (A), and therefore the same reference numerals are assigned to common portions, and descriptions thereof are omitted.

In the first modification example of FIG. 121 (B), as in the eighty-first embodiment of FIG. 121 (A), an internal frame structure 7748*b* is connected, via the elastic body 7465, to the integrally molded structure of the cartilage conduction units 7424, 7426 and the linking unit 7427. However, the chassis of the mobile telephone 7701*b* in the first modification example simply functions as an exterior component covering the perimeter of the mobile telephone 7701*b*, and is not directly connected to the integrally molded structure of the cartilage conduction units 7424, 7426 and the linking unit 7427, but is instead held by the internal frame structure 7748*b* via an elastic body 7765 which constitutes the vibration isolating material. For this reason, portions of the internal frame structure 7784*b* in proximity to the cartilage conduction unit 7424 intervene between the integrally molded structure and the chassis, in the form of exterior facing integrated with the internal frame structure 7748*b*. Thus, in the first modification example of FIG. 121 (B), the internal frame structure 7748*b* which constitutes the majority of the weight of the mobile telephone 7701*b* is connected to the integrally molded structure of the cartilage conduction units 7424, 7426 and the linking unit 7427, serving to suppress vibration of the chassis constituting the outer face of the mobile telephone 7701*b*, due to the chassis being held by the internal frame structure 7748*b* via the vibration isolating material 7765.

FIG. 121 (C) is a side sectional view relating to a second modification example of the eighty-first embodiment according to an aspect of the present invention, configured as a mobile telephone 7701*c*. The second modification example of FIG. 121 (C) has much in common with the first modification example of FIG. 121 (B), and therefore the same reference numerals are assigned to common portions, and descriptions thereof are omitted.

A point of difference between the second modification example of FIG. 121 (C) and the first modification example of FIG. 121 (B) is that the elastic body interposed between an internal frame structure 7748*c* and the integrally molded structure of the cartilage conduction units 7424, 7426 and the linking unit 7427 has been omitted. In cases in which vibration suppression due to an acoustic impedance differential of the integrally molded structure and the internal frame structure 7748*c* does not appreciably extend to the integrally molded structure, and satisfactory cartilage conduction can be ensured, it is possible to adopt such a simplified, direct-connection configuration. That is, in cases in which priority is given to reducing the number of parts, even at the expense of some cartilage conduction efficiency, to simplify the connection structure of the integrally molded structure and the internal frame structure 7748*c*, it is possible to adopt the configuration of the second modification example.

In the above manner, in the first modification example of FIG. 121 (B) or the second modification example of FIG. 121 (C), in the first instance, the internal frame structure 7748*b* or 7748*c*, which constitutes a majority of the weight, is connected to the integrally molded structure of the cartilage conduction units 7424, 7426 and the linking unit 7427, suppressing vibration. The chassis, which represents a small proportion of the weight, is then connected to the internal frame structure 7748*b* or 7748*c* via the vibration isolating material, suppressing vibration of the chassis constituting the outside surface of the mobile telephone 7701*b* or 7701*c*.

Various modifications of the aforedescribed embodiments are possible provided that the advantages thereof can be enjoyed while doing so. For example, in the seventy-eighth embodiment of FIG. 118, in cases in which the elastic body 7465 has high vibration isolating effect, the integrally molded structure of the cartilage conduction units 7424, 7426 and the linking unit 7427, and the chassis of the mobile telephone 7401, may be configured of materials having the same acoustic impedance (for example, a common material for both). In cases in which the elastic body 7465 has high vibration isolating effect, there can be achieved a state comparable to one of different acoustic impedance between the integrally molded structure of the cartilage conduction units 7424, 7426 and the linking unit 7427, and the chassis of the mobile telephone 7401, due to interposition of the elastic body 7465, whereby satisfactory cartilage conduction can be obtained, in spite of vibration suppression of the chassis due to the weight of the cell 7448 being connected thereto.

The features of the present invention described above are not limited to implementation in the aspects in the aforedescribed embodiments, and may be implemented in other aspects as well, provided that the advantages thereof can be enjoyed by doing so. For example, the structures of the eightieth embodiment shown in FIG. 120 and the second modification example of the eighty-first embodiment shown in FIG. 121 (C) are not limited to cases in which the cartilage conduction units are made of hard material, and are also suitable in cases in which the cartilage conduction units are elastic bodies, as in, for example, the forty-sixth embodiment of FIG. 69, and the modification example thereof in FIG. 71. The reason is that a cartilage conduction unit made of an elastic body will have greatly different acoustic impedance from the chassis, and even when the weight of the internal structure of the mobile telephone is connected to the chassis in proximity to the cartilage conduction unit, cartilage conduction by the cartilage conduction unit will not be impaired. In a case of applying the eightieth embodiment of FIG. 120 to a structure in which the cartilage conduction vibration source (piezoelectric bimorph element) 2525 is supported from both sides by left and right cartilage conduction units (the elastic body units 4263*a*, 4263*b*) as in the forty-sixth embodiment and the modification example thereof, the upper holder 7406 may be extended towards the left-ear cartilage conduction unit (elastic body unit 4263*a*) side, and the pins 7408 arranged not just in proximity to the elastic body unit 4263*b*, but in proximity to the elastic body unit 4263*a* as well.

(Eighty-second Embodiment)

Figure 122:
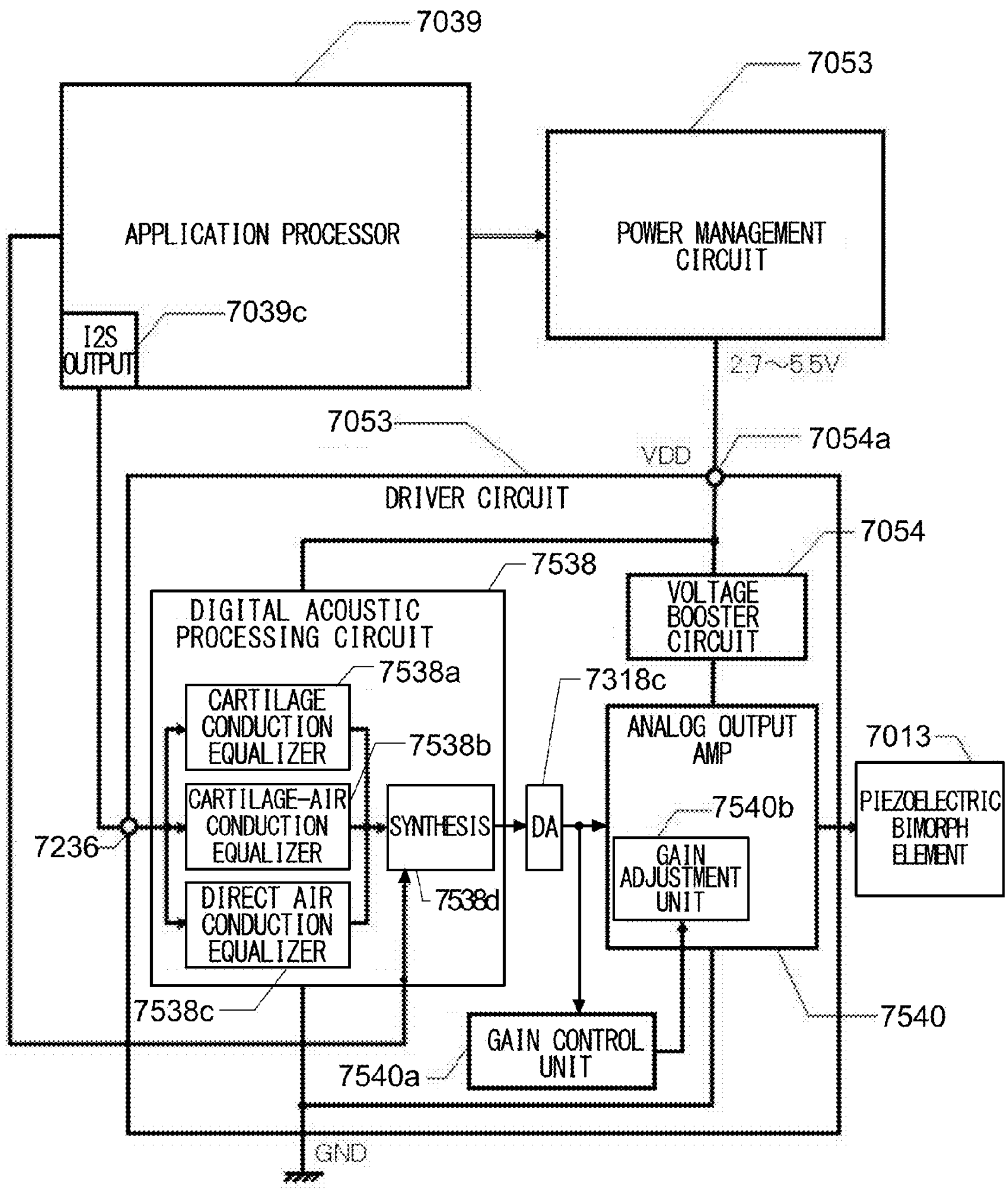

FIG. 122 is a block diagram relating to an eighty-second embodiment according to an aspect of the present invention, and is constituted as a cartilage conduction vibration source device for a mobile telephone. The eighty-second embodiment has much in common with the seventy-sixth embodiment of FIG. 116, and therefore the same reference numerals are assigned to common portions, omitting descriptions thereof unless necessary. Like the seventy-sixth embodiment of FIG. 116, the eighty-second embodiment provides a cartilage conduction vibration source device controllable by the application processor 7039 and the power management circuit 7053 in an ordinary mobile telephone, and more specifically, one in which the cartilage conduction vibration source device is configured as a piezoelectric bimorph element 7013 and a driver circuit 7503 therefor. There are differences between the eighty-second embodiment of FIG. 122 and the seventy-sixth embodiment of FIG. 116, in terms of the configuration of a digital acoustic processing circuit 7538, and of gain control in an analog output amp 7540.

Firstly, the configuration of the digital acoustic processing circuit 7538 is described. Cartilage conduction can be defined as cartilage conduction in a broad sense or as cartilage conduction in a narrow sense. Cartilage conduction in a broad sense may be defined as sound output from a cartilage conduction unit, including cartilage-air conduction (the rate at which vibration transmitted from a cartilage conduction unit to cartilage of the ear changes to air conduction within the external auditory meatus, and is propagated to the inner ear through the eardrum), cartilage-bone conduction (the rate at which vibration transmitted from a cartilage conduction unit to cartilage of the ear is propagated directly to the inner ear through bone), and direct air conduction (the rate at which air-conducted sound generated from a cartilage conduction unit reaches the eardrum directly without going through cartilage, and is propagated to the inner ear). In contrast to this, cartilage conduction in the narrow sense is defined as sound propagated to the inner ear through cartilage, and includes the aforedescribed cartilage-air conduction and cartilage-bone conduction.

In a normal individual, the proportions of cartilage-air conduction and cartilage-bone conduction in cartilage conduction in the narrow sense are such that the latter is about 1/10 or less of the former, and thus cartilage-air conduction is extremely important. This is due to extremely poor impedance matching from cartilage to bone. In contrast to this, in a person with conductive hearing loss due to an abnormality of the external auditory meatus or middle ear, the proportion of cartilage-bone conduction is greater, as compared with a normal individual. This due to impaired cartilage-air conduction (and of course direct air conduction as well).

Next, with regard to the rate of participation by cartilage-air conduction in the broad sense, as described above, in a normal individual, participation by cartilage-bone conduction is small, and therefore one may focus substantially upon the proportions of cartilage-air conduction and direct air conduction. As a rule of thumb, cartilage-air conduction predominates in low-pitched regions, while direct air conduction predominates in high-pitched regions; at 500 Hz, substantially all conduction is cartilage-air conduction, while at 4000 Hz, substantially all conduction is direct air conduction. The frequency components necessary to discriminate some consonants such as the "sh" sound lie in a high frequency band close to 4000 Hz in which direct air conduction predominates. In mobile telephones, due to the fact that there are no problems whatsoever in terms of language discrimination during conversation, and to concerns relating to the amount of information, frequency components of about 3000 Hz and above are cut, so the importance of cartilage-air conduction is great.

With regard to cartilage-bone conduction, as described above, in a normal individual, the participation of cartilage-bone conduction in the broad sense is small, and it is thought that the frequency characteristics thereof are substantially close to flat from a low-frequency range to a high-frequency range. Incidentally, when there is a transition from an occluded condition to an unoccluded condition in the external auditory meatus, in low-frequency bands (500 Hz or the like), sound pressure within the external auditory meatus drops, but loudness (the perceived magnitude of sound) does not drop as much as the sound pressure. When there is a transition from an unoccluded condition to an occluded condition in the external auditory meatus, in high-frequency bands, sound pressure within the external auditory meatus drops, but loudness does not drop as much as the sound pressure within the external auditory meatus. This fact suggests that cartilage-bone conduction exists in both low-frequency bands and high-frequency bands, albeit to a very small extent.

In the digital acoustic processing circuit 7538 of FIG. 122, taking into account the frequency characteristics of cartilage-air conduction, cartilage-bone conduction, and direct air conduction in cartilage conduction in the broad sense described above, in combination with the degrees of participation thereof, a digital sound signal output from the application processor 7039 is input respectively to a cartilage-bone conduction equalizer 7538*a*, a cartilage-air conduction equalizer 7538*b*, and a direct air conduction equalizer 7538*c*, which respectively perform optimal equalization in cases of cartilage-bone conduction only, cartilage-air conduction only, and direct air conduction only. Equalization here does not refer to equalization for the purpose of obtaining sounds closely approximating natural sounds, but rather to acoustic processing taking into account the frequency characteristics of the piezoelectric bimorph element 7013 serving as the cartilage conduction vibration source, in combination with the frequency characteristics in the respective transmission rates of cartilage-bone conduction, cartilage-air conduction, and direct air conduction, to propagate sound in the most efficient manner in terms of language discrimination ability. Consequently, equalization would include cases in which precedence is given to language discrimination ability, modifying the voice quality somewhat from its natural state, but not to the extent that the ability to identify the person is impaired.

In accordance with an instruction from the application processor 7039, a synthesis unit 7538*d* of the digital acoustic processing circuit 7538 determines a mixing ratio of the outputs from the cartilage-bone conduction equalizer 7538*a*, the cartilage-air conduction equalizer 7538*b*, and the direct air conduction equalizer 7538*c*, and modifies this ratio according to changes in conditions. The mixing ratio, which is directed in the first instance to a normal individual, is determined based on the frequency characteristics of a conversation taking place in a case in which the cartilage conduction unit is contacting the ear cartilage and the external auditory meatus is not occluded, but is modified when there is a change from this state. In specific terms, since sound not produced in the course of a call, such as playback of a voice memo, will not be cut off at 3000 Hz and above, the extent of participation of the direct air conduction equalizer 7538*c* is boosted. In a case in which the device has been set for use by a person with conductive hearing loss, the element relying on bone conduction is greater, and therefore the extent of participation of the cartilage-bone conduction equalizer 7538*a* is boosted. Further, when the occurrence of an earplug bone conduction effect has been detected, this means that external auditory meatus is occluded and that there is no direct air conduction, and therefore the participation of the direct air conduction equalizer 7538*c* is halted. The details of these processes are discussed below.

Next, automatic gain adjustment by the analog output amp 7540 will be described. A maximum input rating at which the piezoelectric bimorph element 7013 is capable of vibrating has been specified, and in the event that a signal exceeding this is output from the analog output amp 7540, the sound becomes distorted, and bone conduction at the desired frequency characteristics cannot be achieved. On the other hand, in a case in which the maximum output from the analog output amp 7540 falls below the maximum input rating of the piezoelectric bimorph element 7013, cartilage conduction that fully exploits the capabilities of the piezoelectric bimorph element 7013 cannot be achieved. A gain control unit 7540*a* sequentially monitors the average output of the DA converter 7138*c* for a predetermined duration, and controls a gain adjustment unit 7540*b* of the analog output amp 7540, doing so in such a way that the output level of the analog output amp 7540 equals the maximum input rating level of the analog output amp 7540. In so doing, the capabilities of the piezoelectric bimorph element 7013 can be utilized to the maximum, and bone conduction at the desired frequency characteristics can be achieved.

Figure 123:
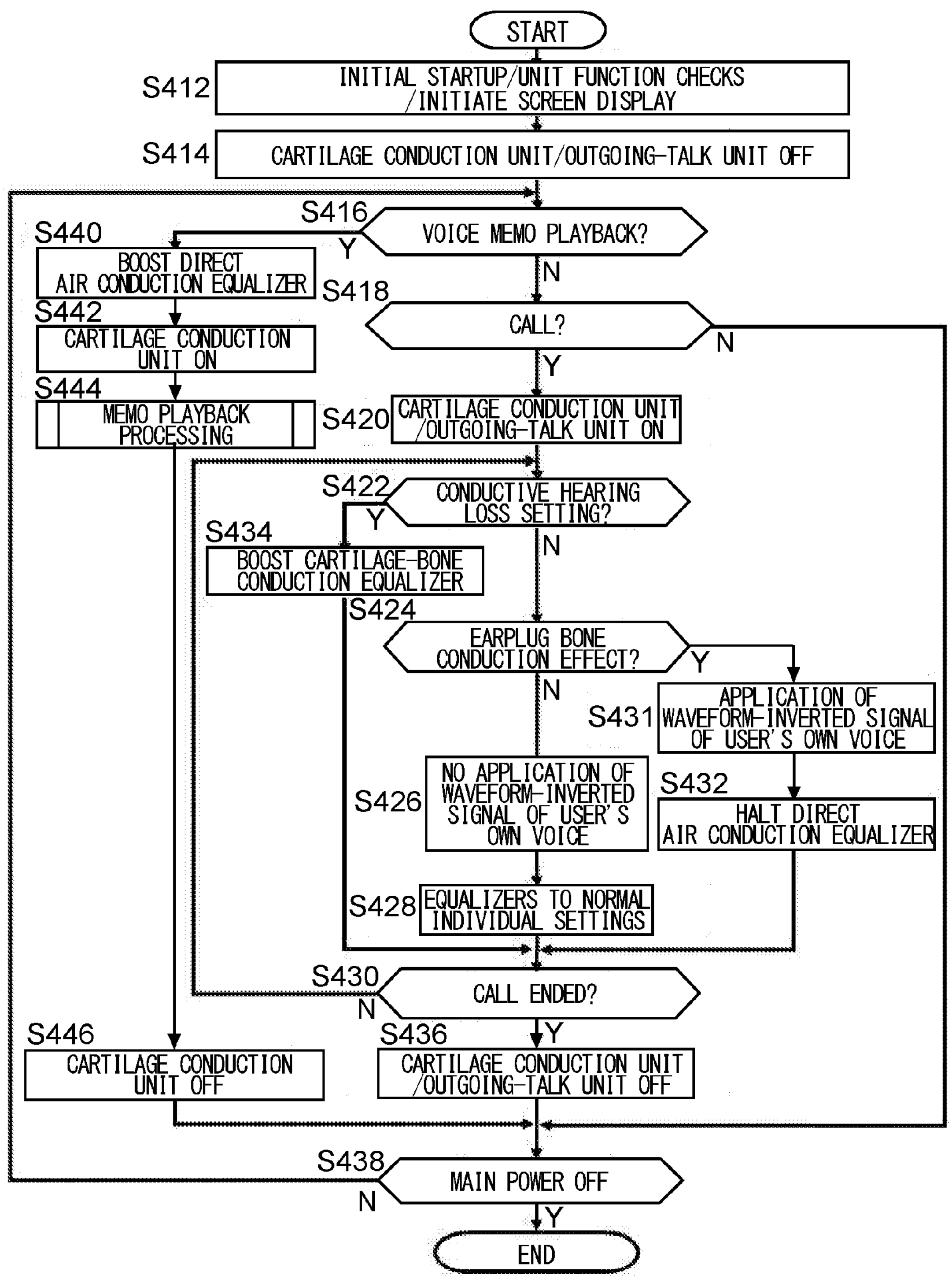

FIG. 123 is a flowchart showing the functions of the application processor 7039 in the eighty-second embodiment of FIG. 122. The flow in FIG. 123 describes the functions of the driver circuit 7503, and therefore operations centered on related functions have been extracted for illustration; however, there are other operations of the application processor 7039, such as typical functions of mobile telephones and like, which are not represented in the flow of FIG. 123. The flow of FIG. 123 starts when the main power source of the mobile telephone is turned on. In Step S412, initial startup and a function check of each unit are performed, as well as initiating screen display on a display unit of the mobile telephone. Next, in Step S414, the cartilage conduction unit and mobile telephone outgoing-talk unit functions are turned off, and the routine advances to Step S416. Turning off of the cartilage conduction units is accomplished by turning off the power supply to the driver circuit 7503 from the power management circuit 7053 of FIG. 122.

In Step S416, a check is performed to determine if an operation to playback a previously recorded voice memo has been performed. In the event that no voice memo playback operation has been detected, the routine proceeds to Step S418, and a check is performed to determine if the current state is one in which another caller's answer to a telephone call request, or a call through mobile radio waves based on an incoming call, is in progress. When the current state is the talk state, the routine proceeds to Step S420, the cartilage conduction units and the outgoing-talk unit are turned on, and routine proceeds to Step S422.

In Step S422, a check is performed to determine if a setting for a person with conductive hearing loss has been made, and in the event that this setting has not been made, the routine advances to Step S424. In Step S424, a check is performed to determine if the current state is one in which an earplug bone conduction effect has arisen due to closing of the external auditory meatus, and in the event this is not the case, the routine proceeds to Step S426, and advances to Step S428, without applying a signal in which the waveform of the user's own voice is inverted. The process of application/non-application of a waveform-inverted signal of the user's own voice has been described in Step S52 to Step S56 in the flow of FIG. 10, and therefore the details are omitted here. In Step S428, proportions of participation by the respective outputs of the equalizers 7538*a*, 7538*b*, and 7538*c* are set to optimal values for the talk state appropriate to a normal individual, and the routine advances to Step S430.

On the other hand, when a state in which the earplug bone conduction effect has occurred due to closing of the external auditory meatus is detected in Step S424, the routine advances to Step S431, and a waveform-inverted signal of the user's own voice is added; also, in Step S432, participation by the direct air conduction equalizer 7538*c* is halted, whereupon the routine advances to Step S430. As noted previously, the reason for doing so is that there is no direct air conduction, due to closure of the external auditory meatus. In a case in which it has been detected in Step S422 that a setting for a person with conductive hearing loss has been made, the routine advances to Step S434, the extent of participation by the cartilage-bone conduction equalizer 7538*a* is boosted, and routine advances to Step S430.

In Step S430, a check is performed to determine whether the call has ended, and in the event this is not the case, returns to Step S422, and repeats Step S422 to Step S434 for as long as the call has not ended. In so doing, participation by the respective outputs of the equalizers 7538*a*, 7538*b*, and 7538*c* can be modified in response to changes in settings or conditions during a call. On the other hand, in the event that the call is detected to have ended in Step S430, the routine advances to Step S436, the cartilage conduction unit and the outgoing-talk unit functions are turned off, and routine proceeds to Step S438.

In contrast to this, in the event that a voice memo playback operation has been detected in Step S416, the routine advances to Step S440, and the extent of participation by the direct air conduction equalizer 7538*c* is boosted. The reason is that, in the aforedescribed manner, since sound not produced in the course of a call, such as that of playback of a voice memo, is not cut off at 3000 Hz and above, in terms of sound quality, it is appropriate to boost participation by direct air conduction. Next, in Step S442, the cartilage conduction units are turned on, the routine advances to Step S444, and a voice memo playback process is performed. Then, once the voice memo playback process is finished, the routine advances to Step S446, the cartilage conduction unit is turned off, and routine advances to Step S438. When the talk state is not detected in Step S418, the routine advances directly to Step S438.

In Step S438, a check performed to determine whether the main power source of the mobile telephone has been turned off, and in the event that the main power source is not off, Step S416 to Step S446 are subsequently repeated according to circumstances, for as long as turning off of the main power source is not detected in Step S438. In contrast to this, in the event that turning off of the main power source is detected in Step S438, the flow terminates.

(Eighty-third Embodiment)

Figure 124A:
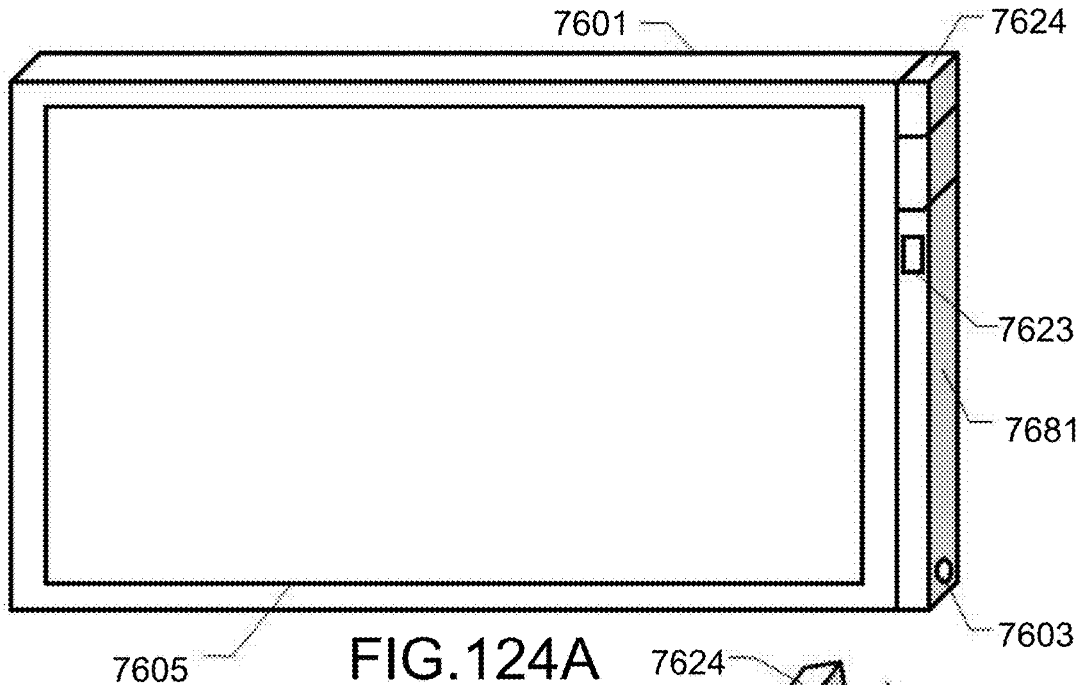
Figure 124B:
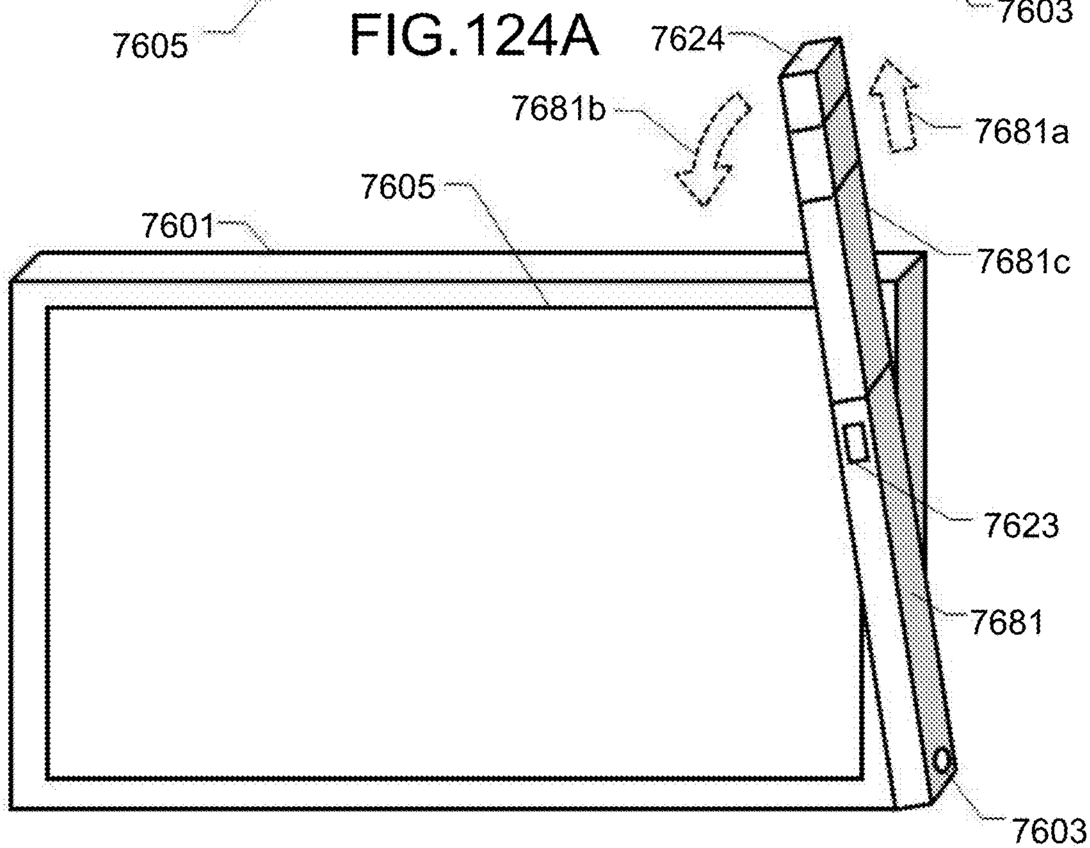

FIG. 124 is a perspective view relating to an eighty-third embodiment of an aspect of the present invention, and is configured as a notebook-type large-screen mobile telephone 7601 equipped with mobile telephone functionality. FIG. 124 (A) is a front view of the mobile telephone 7601. The mobile telephone 7601 is provided with a large-screen display unit 7605 that doubles as a touch panel. The mobile telephone 7601 is further provided with a cartilage conduction outgoing-talk/incoming-talk unit 7681 connected to the right edge thereof by a universal joint 7603. The cartilage conduction outgoing-talk/incoming-talk unit 7681, at its upper end, constitutes a cartilage conduction unit 7624, and is furnished in its medial section with a microphone 7623. As discussed below, the cartilage conduction outgoing-talk/incoming-talk unit 7681 has as structure whereby it is possible for the cartilage conduction unit 7624 to be withdrawn upward; in FIG. 124 (A), however, the cartilage conduction outgoing-talk/incoming-talk unit 7681 is shown in the stowed state in which it is basically not being used.

FIG. 124 (B) shows a state in a case in which the mobile telephone functionality of the mobile telephone 7601 is being utilized; it will be appreciated that it is possible for the cartilage conduction unit 7624 to be withdrawn upward as shown by an arrow 7681*a*, as well as for the cartilage conduction unit 7624 to be lowered forward as shown by an arrow 7681*b*. Because the cartilage conduction outgoing-talk/incoming-talk unit 7681 is connected to the mobile telephone 7601 by the universal joint 7603 in the aforedescribed manner, the direction of lowering is not limited to the forward direction, and lowering can take place in any direction.

Due to the aforedescribed configuration, with the mobile telephone 7601, for example, placed on a desktop and maintained in an orientation such that content displayed on the large-screen display unit 7605 (such as newspapers, e-books, graphics, or the like) can be viewed, the withdrawn cartilage conduction unit 7624 can be placed by hand against the cartilage of the ear, so that calls can be made by the mobile telephone. At this time, one's own voice can be picked up by the microphone 7623, which is positioned close to the mouth during the call state. However, there is no limitation to this orientation, and it would be possible, while holding the mobile telephone 7601 in the hand, to appropriately adjust the withdrawn length and direction of the cartilage conduction outgoing-talk/incoming-talk unit 7681, to place the cartilage conduction unit 7624 against the cartilage of the ear. The cartilage conduction unit 7624 is designed such that, even with the mobile telephone 7601 placed on the knees, by virtue of a structure resembling that of an antenna, the withdrawn length thereof is likewise sufficient to deal with such a case.

When the mobile telephone 7601 is used in the state shown in FIG. 124 (A), when there is an incoming call to the mobile telephone, the call can be answered instantaneously by withdrawing the cartilage conduction outgoing-talk/incoming-talk unit 7681. Further, when the operation of withdrawing the cartilage conduction outgoing-talk/incoming-talk unit 7681 is interlinked to the operation of answering the incoming call, one-touch operation is possible, further improving the ease of use. Likewise, when one wishes to place a mobile telephone call while using the mobile telephone 7601 in the state shown in FIG. 124 (A), after performing an operation from the touch panel/large-screen display unit 7605 to choose a contact to be called, the cartilage conduction outgoing-talk/incoming-talk unit 7681 is withdrawn and placed against the ear. At this time, when the operation of withdrawing the cartilage conduction outgoing-talk/incoming-talk unit 7681 is interlinked to the call request operation, the call can be placed through a one-touch operation.

In FIG. 124 (B), the mobile telephone is shown being used in an orientation in which the screen is viewed in landscape mode, but it would be possible to use the unit in portrait mode as well. For example, when used in portrait mode with the cartilage conduction outgoing-talk/incoming-talk unit 7681 side upward, the cartilage conduction outgoing-talk/incoming-talk unit 7681 may be used by extending it to reach the cartilage of the ear from the upper right corner of the portrait-oriented screen. Both in the case of a landscape-oriented screen and portrait-oriented screen, the cartilage conduction unit 7624 may be used while placed against the cartilage of the right ear, but the mobile telephone 7601 can be rotated to an orientation affording ease of listening with the left ear. For example, when the unit is used in landscape mode with the cartilage conduction outgoing-talk/incoming-talk unit 7681 side downward, the cartilage conduction outgoing-talk/incoming-talk unit 7681 can be used by extending it to reach the cartilage of the left ear from the lower left corner of the portrait-oriented screen. Further, when used in landscape mode flipped top to bottom from the state shown in FIG. 124 (B), the cartilage conduction outgoing-talk/incoming-talk unit 7681 can be used by extending it to reach the cartilage of the left ear from the upper left corner of the landscape-oriented screen. In either case, because the cartilage conduction unit 7624 is linked to the mobile telephone 7601 by the universal joint 7603 and the cartilage conduction outgoing-talk/incoming-talk unit 7681, which is extendable and retractable from the mobile telephone 7601 without being separated therefrom, the configuration is easy to use, even during use while being carried around.

Figure 125:
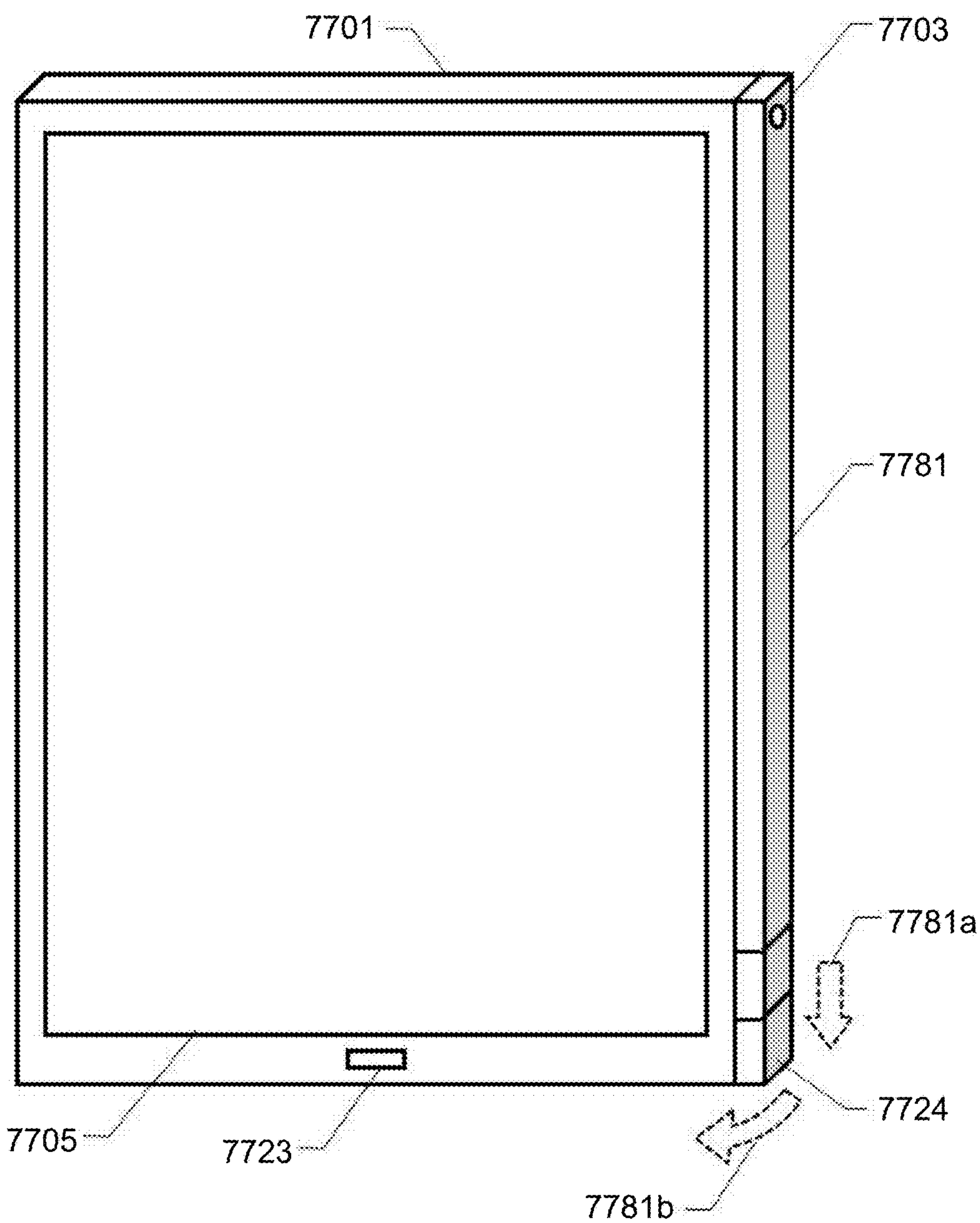

FIG. 125 is a perspective view showing a modification example of the eighty-third embodiment of FIG. 124, and like the eighty-third embodiment, is configured as a notebook-type large-screen mobile telephone 7701 equipped with mobile telephone functionality. A point of difference between the modification example of FIG. 125 and the eighty-third embodiment of FIG. 124 is that the device is provided with a cartilage conduction outgoing-talk/incoming-talk unit 7781 connected by a universal joint 7703 at the upper right corner of the right edge of a touch panel/large-screen display unit 7705 when used in portrait mode. As a result, the cartilage conduction unit 7624 is situated at the bottom end of the cartilage conduction outgoing-talk/incoming-talk unit 7781. In this modification example, a microphone 7723 is furnished on the main body side of the mobile telephone 7701.

Due to the aforedescribed structure, it is possible for the cartilage conduction unit 7724 to be drawn downward as shown by an arrow 7781a, as well as raised forward as shown by an arrow 7781b. As the cartilage conduction outgoing-talk/incoming-talk unit 7781 is connected to the mobile telephone 7701 by the universal joint 7701 in the same manner as in the eighty-third embodiment of FIG. 124, the direction of raising is not limited to a forward direction, and raising can take place in any direction. In the case of the modification example of FIG. 125, when used as illustrated in the portrait mode, the cartilage conduction outgoing-talk/incoming-talk unit 7781 is used by extending it to reach the cartilage of the right ear from the upper right corner of the portrait-oriented screen. In contrast to this, when, for example, used in landscape screen mode with the cartilage conduction outgoing-talk/incoming-talk unit 7781 side down, the cartilage conduction outgoing-talk/incoming-talk unit 7781 is used by extending it to reach the cartilage of the right ear from the lower right corner of the landscape-oriented screen. The modification example of FIG. 125, like the eighty-third embodiment of FIG. 124, can be used easily while placed against the left ear in either portrait screen mode or landscape screen mode, through appropriate rotation of the screen.

In both the eighty-third embodiment of FIG. 124 and the modification example thereof in FIG. 125, the cartilage conduction unit may be configured from a piezoelectric bimorph element, or configured from an electromagnetic vibrator. The structure of the eighty-third embodiment of FIG. 124 and the modification example thereof in FIG. 125 is not limited to a cartilage conduction system, and a configuration in which an earphone comprising an ordinary air-conduction speaker is attached at the location of the cartilage conduction unit would also be acceptable.

Implementation of the present invention is not limited to the aforedescribed embodiments, and the various advantages of the present invention can be enjoyed in other embodiments as well. Further, these features may be interchanged or utilized in combination among various embodiments. For example, in the eighty-second embodiment shown in FIG. 122 and FIG. 123, the cartilage-bone conduction equalizer 7538a, the cartilage-air conduction equalizer 7538b, and the direct air conduction equalizer 7538c are respectively shown as hardware blocks, but identical functions could be accomplished through digital acoustic processing circuit software as well. Further, in the configuration in the eighty-second embodiment, modification of the equalizers according to conditions entails modifying the mixing ratios of the outputs of three equalizers; however, provided that the final output of the digital acoustic processing circuit 7538 is comparable, modification of the equalizers may be performed in block.

(Eighty-fourth Embodiment)

FIG. 126 is a perspective view and a cross sectional view relating to an eighty-fourth embodiment according to an aspect of the present invention, configured as an ordinary mobile telephone 7801 and cartilage conduction soft cover 7863 therefor. FIG. 126 (A) is a perspective view of the ordinary mobile telephone 7801 of the eighty-fourth embodiment and the sheathing cartilage conduction soft cover 7863, seen from the front face. Due to the elasticity of the cartilage conduction soft cover 7863, the ordinary mobile telephone 7801 is protected in the event that the ordinary mobile telephone 7801 is dropped by accident or the like, and the upper right side corner of the cover also serves as a cartilage conduction unit 7824, as will be discussed below. The ordinary mobile telephone 7801 is a mobile telephone of ordinary smartphone type, having a microphone 23 and an earphone 213 comprising an air-conduction speaker. The left upper part of the mobile telephone 7801 is furnished with an external earphone jack for an external earphone. Meanwhile, the cartilage conduction soft cover 7863 is furnished with an external earphone plug 7885; sound signals for vibrating the cartilage conduction unit 7824 are conducted from the external earphone plug 7885 which is plugged into the external earphone jack.

To sheath the ordinary mobile telephone 7801 in the cartilage conduction soft cover 7863, firstly, the cartilage conduction soft cover 7863 is turned nearly inside-out, and the external earphone plug 7885 is inserted into the external earphone jack; thereafter, the ordinary mobile telephone 7801 in its entirety is sheathed in the cartilage conduction soft cover 7863. Once the external earphone plug 7885 has been inserted into the external earphone jack from the outside, sound output from the earphone 213 turns off, and sound signals for vibrating the cartilage conduction unit 7824 are output from the external earphone jack. Because a portion of the cartilage conduction soft cover 7863 constitutes the cartilage conduction unit 7824, an elastic material having acoustic impedance close to that of ear cartilage (silicone rubber, mixtures of silicone rubber and butadiene rubber, natural rubber, or structure of these with air bubbles sealed therein) is adopted.

FIG. 126 (B) is a cross-sectional view of an upper part of the cartilage conduction soft cover 7863 taken in B1-B1 cross section in FIG. 126 (A), through a plane perpendicular to the front surface and the side faces of the cartilage conduction soft cover 7863. From FIG. 126 (B) it will be clear that the upper right side corner of the cartilage conduction soft cover 7863 constitutes the cartilage conduction unit 7824, and an electromagnetic vibrator 7825 constituting a cartilage conduction vibration source is embedded to the inside thereof. The upper part of the cartilage conduction soft cover 7863 is furnished with a conduction part driver 7840 for driving the electromagnetic vibrator 7825, and with a replaceable power source cell 7848 for supplying power thereto. The electromagnetic vibrator 7825 vibrates when driven by the conduction part driver 7840 on the basis of a sound signal input from the external earphone plug 7885. The direction of vibration is a direction perpendicular to a large-screen display unit 7805 of the ordinary mobile telephone 7801 (see FIG. 126 (A)) as shown by an arrow 7825a.

FIG. 126 (C) is a cross-sectional view of an upper part of the cartilage conduction soft cover 7863 taken in B21-B2 cross section in FIG. 126 (A) or FIG. 126 (B), through a plane perpendicular to the front surface and the top face of the ordinary mobile telephone 7801 and the cartilage conduction soft cover 7863. As will be appreciated from FIG. 126 (C), by sheathing the ordinary mobile telephone 7801 in the cartilage conduction soft cover 7863, the electromagnetic vibrator 7825 serving as the cartilage conduction vibration source is integrated with the ordinary mobile telephone 7801, and vibrates in response to the sound signal supplied by the external earphone plug 7885. In so doing, simply by sheathing the ordinary mobile telephone 7801 in the cartilage conduction soft cover 7863 without making any additional modifications, the unit can be transformed into a cartilage conduction type mobile telephone similar, for example, to the sixtieth embodiment of FIG. 90.

In the eighty-fourth embodiment of FIG. 126, when the ordinary mobile telephone 7801 is sheathed in the cartilage conduction soft cover 7863 in the aforedescribed manner, the cartilage conduction unit 7824 is formed exclusively in the right side corner as seen in the drawing. This state is one suitable for making a call while holding the ordinary mobile telephone 7801 with the right hand and listening with the right ear. To hold the unit with the left hand and listen with the left ear, the ordinary mobile telephone 7801 would be switched between hands so as to face it rearward and thereby face the cartilage conduction unit 7824 towards the left ear, in the manner described in the twelfth embodiment of FIG. 22 and the thirty-sixth embodiment of FIG. 56.

Figure 127:
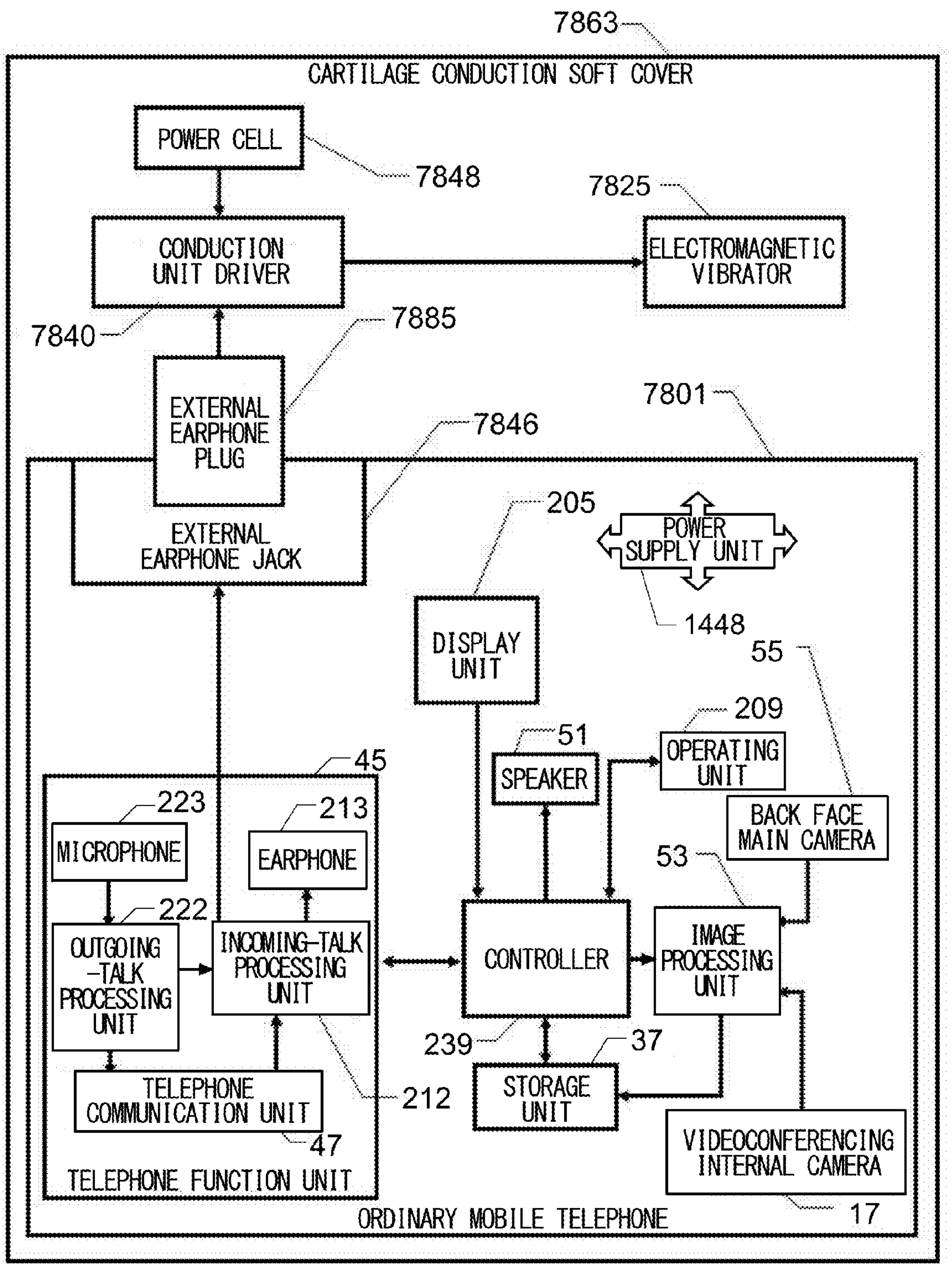

FIG. 127 is a block diagram of the eighty-fourth embodiment of FIG. 126. In the block diagram, the ordinary mobile telephone 7801 has much in common with the ordinary mobile telephone 1601 in the sixty-ninth embodiment of FIG. 102, and therefore the same reference numerals have been assigned to common parts, and descriptions are omitted. A point of difference between FIG. 127 and FIG. 102 is that the short-range communication unit 1446 has been omitted from the illustration in FIG. 127, while an external earphone jack 7846 is illustrated. However, this does not mean that the ordinary mobile telephone 1601 of FIG. 102 and the ordinary mobile telephone 7801 of FIG. 127 are in fact different, but merely that appropriate omission of illustration has been made, as required by the description.

As will be clear from the block diagram of FIG. 127, in a state in which the ordinary mobile telephone 7801 has been sheathed in the cartilage conduction soft cover 7863, the external earphone plug 7885 is inserted into the external earphone jack 7846 of the ordinary mobile telephone 7801, and the conduction unit driver 7840 drives the electromagnetic vibrator 7825 on the basis of sound signals output from an incoming-talk-processing unit 212 of the ordinary mobile telephone 7801.

Figure 128B:
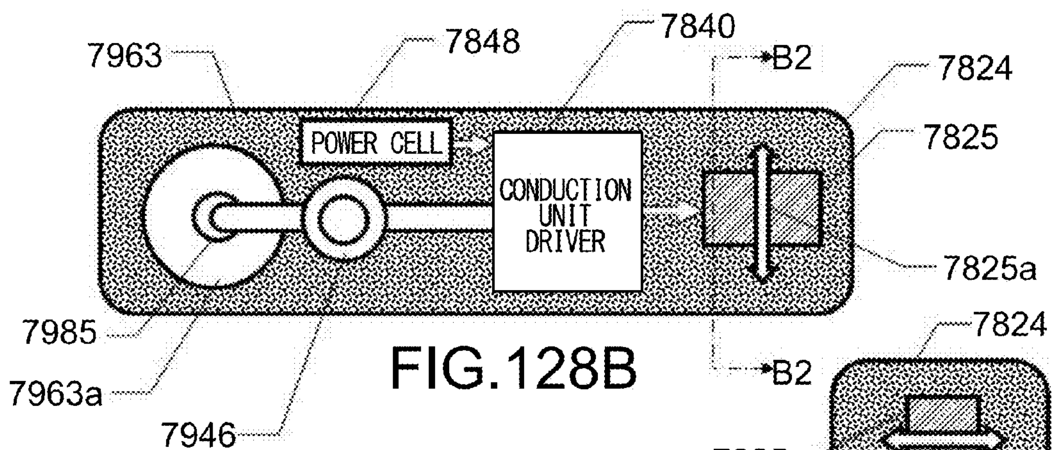
Figure 128A:
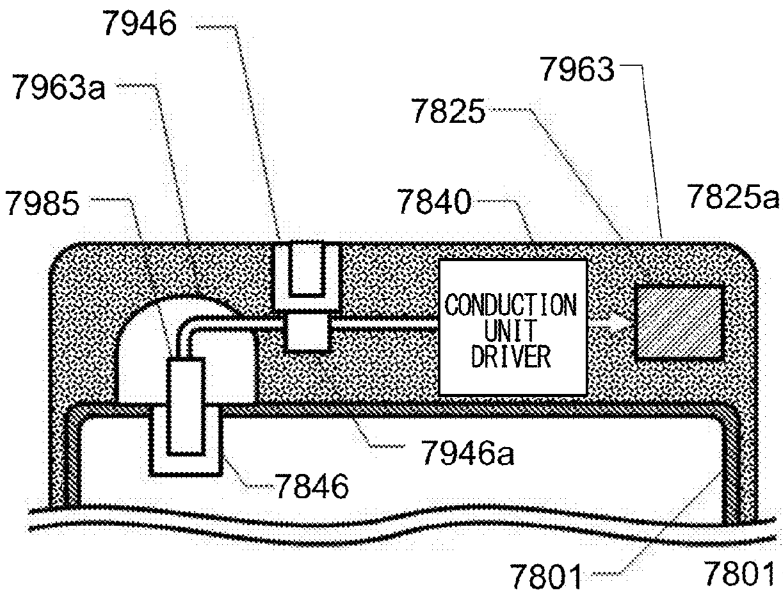
Figure 128C:
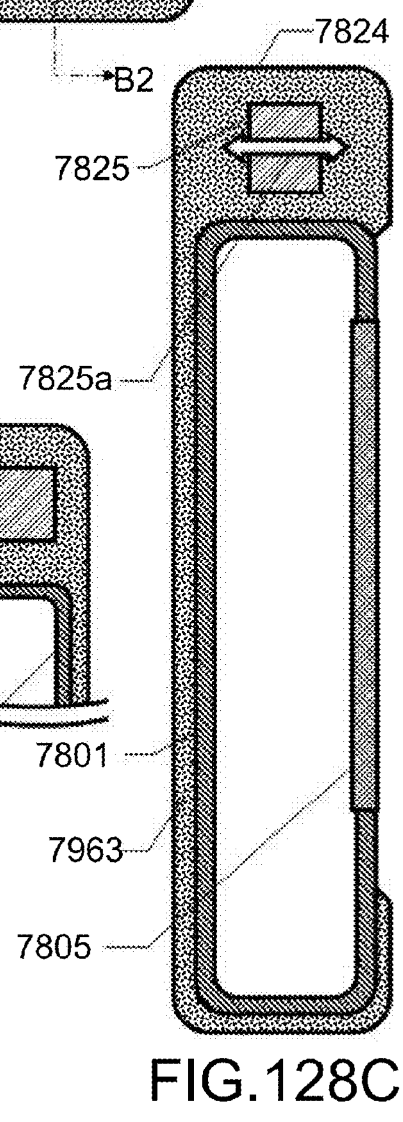

FIG. 128 is cross sectional views showing a modification example of the eighty-fourth embodiment of FIG. 126. Common reference numerals have been assigned to portions in common with FIG. 126, omitting descriptions thereof, and describing only the different portions. FIG. 128 (A) is a cross sectional view of the cartilage conduction soft cover 7963 sheathing the ordinary mobile telephone 7801, seen from the front face, with the upper part split lengthwise. As will be clear from FIG. 128 (A) and FIG. 128 (B), the cartilage conduction soft cover 7863 of the modification example is furnished with a cavity 7963*a*, and an external earphone plug 7985 is arranged in such a way as to be able move freely within the cavity 7963*a*. Consequently, prior to sheathing the ordinary mobile telephone 7801 in the cartilage conduction soft cover 7963, the external earphone plug 7985 readily inserts into the external earphone jack 7846. Then, once it is confirmed that the external earphone plug 7985 has been correctly inserted into the external earphone jack 7846 of the ordinary mobile telephone 7801, the ordinary mobile telephone 7801 can be sheathed within the cartilage conduction soft cover 7863.

A second point of difference between the modification example of FIG. 128 and the eighty-fourth embodiment of FIG. 126 is that the cartilage conduction soft cover 7963 is furnished with a relay external earphone jack 7946. In so doing, despite the fact that the original external earphone jack 7846 of the ordinary mobile telephone 7801 is obstructed, in cases in which it is desired to listen to music or the like, it is possible to use the unit in the customary manner, through insertion of an ordinary external earphone or the like into the relay external earphone jack 7946. The relay external earphone jack 7946 is furnished with a switch 7946*a* which, in a case in which a sound signal is being propagated from the external earphone plug 7985 to the conduction unit driver 7840, and an ordinary external earphone or the like has been inserted into the relay external earphone jack 7946, will ordinarily switch the sound signal from the external earphone plug 7985 so as to be output from the relay external earphone jack 7946.

Figure 129:
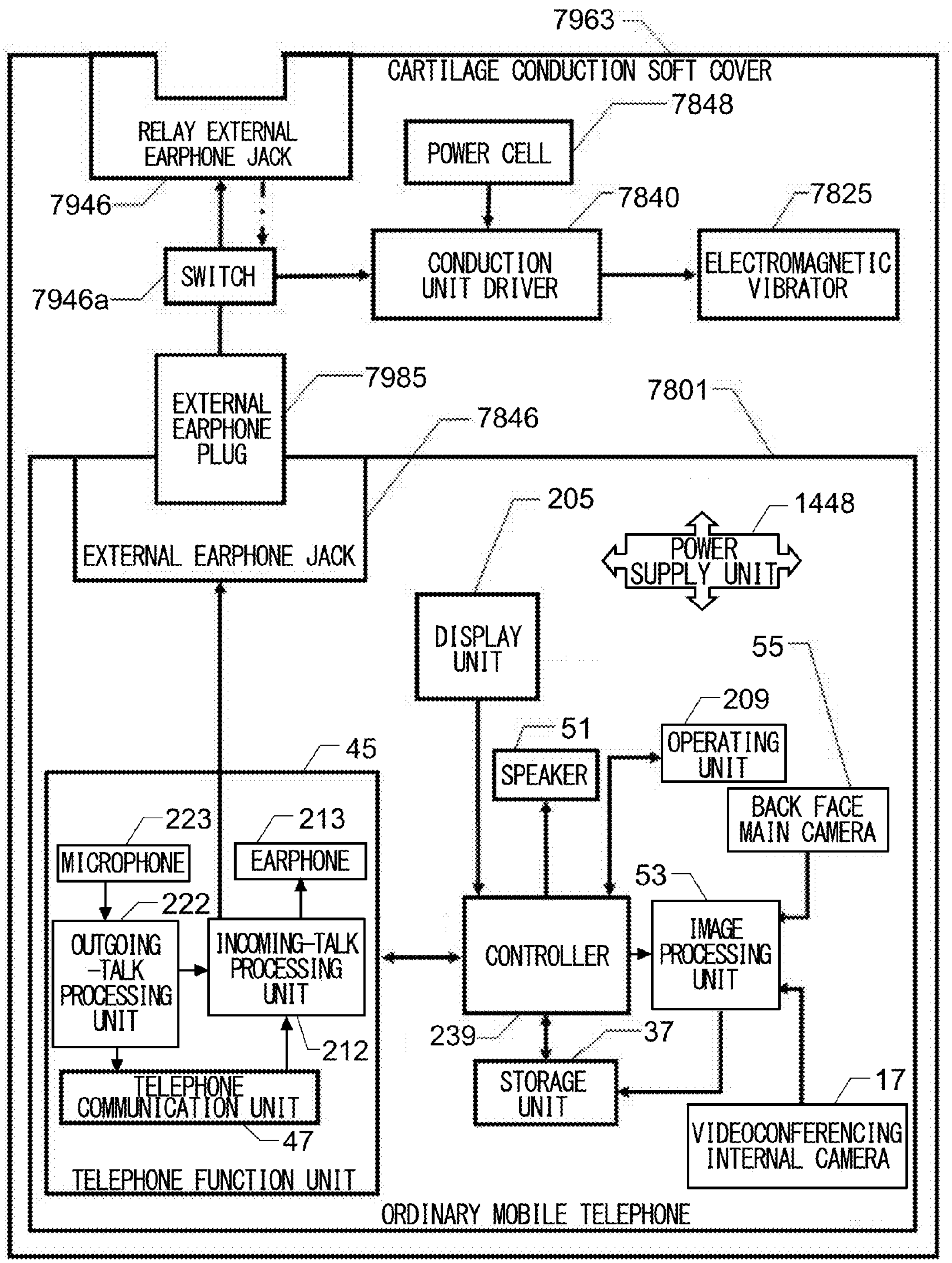

FIG. 129 is a block diagram of a modification example of the eighty-fourth embodiment of FIG. 128. Common reference numerals have been assigned to portions in common with ones in the eighty-fourth embodiment of FIG. 127, and descriptions thereof are omitted. Identical reference numerals have been assigned also to portions identical to FIG. 128, omitting descriptions unless necessary. As will be clear from FIG. 129, a sound signal from the external earphone plug 7985 is branched by the switch 7946*a*; ordinarily, the sound signal will be propagated from the external earphone plug 7985 to the conduction unit driver 7840 while mechanically detecting insertion of an ordinary external earphone or the like into the relay external earphone jack 7946, to thereby switch the sound signal from the external earphone plug 7985 by a mechanical switch, so as to be output from the relay external earphone jack 7946.

(Eighty-fifth Embodiment)

Figure 130B:
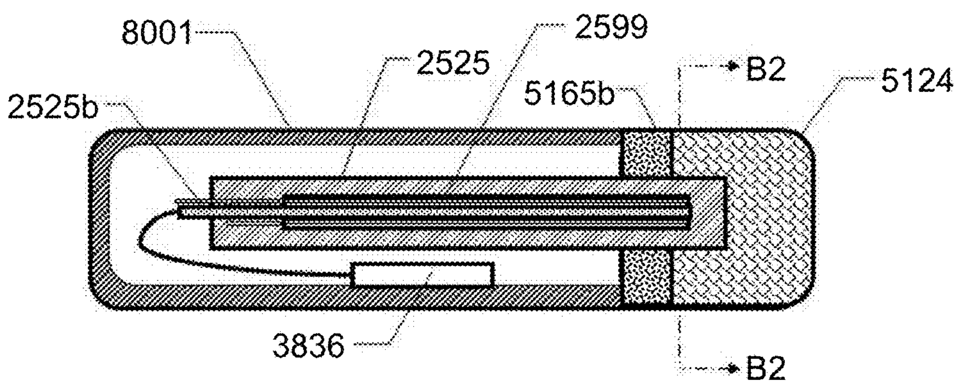
Figure 130A:
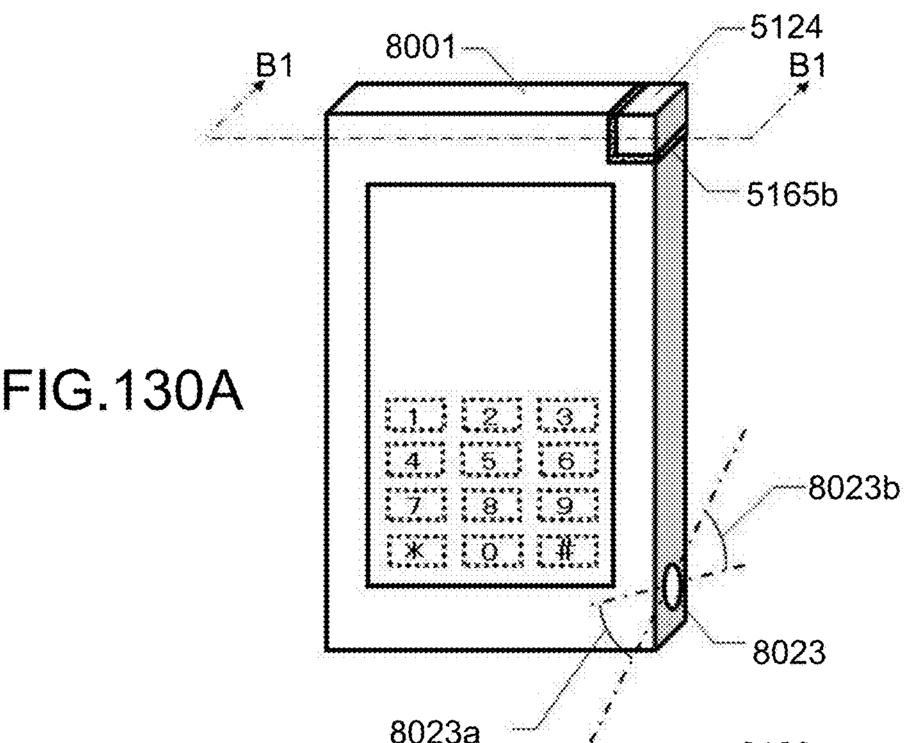
Figure 130C:
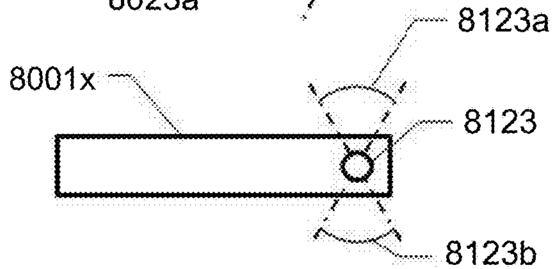

FIG. 130 is a perspective view and a cross sectional view relating to an eighty-fifth embodiment according to an aspect of the present invention, and to a modification example thereof, configured as a mobile telephone 8001 or 8001*x*. The eighty-fifth embodiment of FIG. 130 has much in common with the fifty-fifth embodiment of FIG. 83, and therefore the same reference numerals have been assigned to common parts, and descriptions are omitted. The eighty-fifth embodiment of FIG. 130 differs from the fifty-fifth embodiment of FIG. 83 in that only the right cartilage conduction unit 5124 at the right side in the drawing is provided, and in terms of the associated configuration of a microphone 8023 or 8123.

As will be clear from FIG. 130 (A) and from FIG. 130 (B) showing a B1-B1 cross section thereof, in the eighty-fifth embodiment, the cartilage conduction unit 5124 is furnished at one side only. Consequently, in the same manner as the twelfth embodiment of FIG. 22, the thirty-sixth embodiment of FIG. 56, and the eighty-fourth embodiment of FIG. 126, in the illustrated state, the cartilage conduction unit 5124 is used while held against the right ear, but may be switched between hands so that the mobile telephone faces 8001 rearward, in order to use the cartilage conduction unit 5124 while held against the left ear. In association therewith, the user's mouth will be positioned to the front surface side, or to the rear surface side, of the mobile telephone 8001.

As will be clear from FIG. 130 (A), to accommodate use of the cartilage conduction unit 5124 from both the front and back sides in this manner, the microphone 8023 is furnished in lower part of the right side surface of the mobile telephone 8001. The microphone 8023 is configured such that directionality 8023*a* to pick up sound from the front surface side and directionality 8023*b* to pick up sound from the rear surface side are symmetrical, and such that the voice is picked up evenly from the rear side. In so doing, the user's voice can be picked up evenly, both in cases in which a call is made with the cartilage conduction unit 5124 placed against the right ear so that the front surface side of the mobile telephone 8001 is opposed to the face, and in cases in which a call is made with the cartilage conduction unit 5124 placed against the left ear so that the rear surface side of the mobile telephone 8001 is opposed to the face.

FIG. 130 (C) is a modification example of the eighty-fifth embodiment, showing the mobile telephone 8001*x* viewed from the bottom surface side. This modification example of the eighty-fifth embodiment differs only in the placement of the microphone 8123, and in other respects is identical to the eighty-fifth embodiment; therefore only the bottom surface is shown in FIG. 130 (C), omitting the rest from the illustration. As will be clear from FIG. 130 (C), in the modification example of the eighty-fifth embodiment, the microphone 8123 is furnished at the right side of the lower surface of the mobile telephone 8001$x$. In the same manner as in the eighty-fifth embodiment, the microphone 8123 is constituted such that directionality 8123$a$ to pick up sound from the front surface side and directionality 8123$b$ to pick up sound from the rear surface side are symmetrical. In so doing, in the modification example as well, the user's voice can be picked up evenly, both in cases in which a call is made from the front surface side of the mobile telephone 8001$x$, and cases in which a call is made from the rear surface side. It goes without saying that the cartilage conduction unit 5124 can be employed in common, in both instances.

The features of the present invention described above are not limited to implementation in the aforedescribed embodiments, and are implementable in other aspects provided that the advantages thereof can be enjoyed. For example, in the eighty-fourth embodiment of FIG. 126, the left side in the drawing is not furnished with a cartilage conduction unit, in order that the external earphone plug 7885 may be placed there; however, in cases in which no connection terminal for a sound signal from the external earphone pack 7846 or the like is present at the upper surface of the ordinary mobile telephone 7801, it would be possible, utilizing the space on the upper surface, to have cartilage conduction units at both the left and right corners. While a separate power source cell 7848 was provided for operation of the conduction unit driver 7840, in cases in which the external output level of the ordinary mobile telephone 7801 is sufficient for direct driving of the cartilage conduction unit 7824, it would be possible to omit the power source. In cases in which power source supply is not necessary for operation of the conduction unit driver 7840, or in cases in which an output terminal of the ordinary mobile telephone 7801 is configured such that power source supply together with the sound signal is possible, there is no need to have the separate power source cell 7848. Further, in the eighty-fourth embodiment, the electromagnetic vibrator 7825 was adopted as the cartilage conduction vibration source, but there is no limitation to this, and a piezoelectric bimorph element may be adopted as the cartilage conduction vibration source, as in other embodiments, as long as it is possible for the conduction unit driver 7840 to operate on the basis of power supply from a separate power source or from the ordinary mobile telephone 7801.

In the eighty-fourth embodiment of FIG. 126, the mobile telephone accessory device for vibrating the cartilage conduction unit on the basis of external audio output of the ordinary mobile telephone was configured as a soft cover; however, implementation of the present invention is not limited to this. For example, depending on the shape of the mobile telephone and the placement of the external audio output terminal, the device may be configured as a hard case type mobile telephone accessory device of a shape that clips onto the upper part of the mobile telephone. In this case, when an external earphone jack is situated in the upper part of the mobile telephone, it is possible to utilize an external earphone plug section inserted into the external earphone jack, to position the mobile telephone accessory device and to support it in the clipped state.

In the eighty-fifth embodiment of FIG. 130, depending on the directionality settings of the microphone 8023 or 8123, there is a significant possibility of picking up outside noise; however, in cases in which the environment-noise microphone of the first example of FIG. 1 or the fiftieth embodiment of FIG. 75 is provided, this could be utilized to cancel the outside noise.

(Eighty-sixth Embodiment)

FIG. 131 is a block diagram relating to an eighty-sixth embodiment according to an aspect of the present invention, configured as a mobile telephone 8101. The block diagram of FIG. 131 relating to the eighty-sixth embodiment has much in common with the block diagram of FIG. 82 relating to the fifty-fourth embodiment, and therefore identical reference numerals have been assigned to identical portions, and descriptions are omitted. The eighty-sixth embodiment of FIG. 131 differs from the fifty-fourth embodiment of FIG. 82 in terms of the configuration of a cartilage conduction equalizer 8138, the details of which are discussed below. Additionally, FIG. 131 depicts an external earphone jack 8146 for connecting an earphone to listen to sound from an incoming-call processing unit 212, and a short-range wireless communication unit 8147 for short-range wireless communication with a mobile telephone accessory device, such as a headset designed to be worn on the head.

Next, employing FIG. 132, the functions of the cartilage conduction equalizer 8138 in the eighty-sixth embodiment of FIG. 131 will be described. FIG. 132 (A) is an image diagram of the frequency characteristics of a piezoelectric bimorph element constituting a cartilage conduction vibration source in a cartilage conduction vibration unit 228 employed in the eighty-sixth embodiment, showing the results of measurements of vibrational acceleration level at each frequency. As will be clear in FIG. 132 (A), the piezoelectric bimorph element vibrates strongly in a frequency band of 800 Hz and above, but exhibits generally flat frequency characteristics up to about 10 kHz, aside from a few peaks and valleys.

FIG. 132 (B) is an image diagram of results of measurements of vibrational acceleration level of ear cartilage at each frequency, while a piezoelectric bimorph element like that described above has been placed into contact with ear cartilage. As will be clear from FIG. 132 (B), ear cartilage exhibits large vibrational acceleration levels approaching those of the 1-2 kHz band, even in a band of 1 kHz or below, in which vibration of the piezoelectric bimorph element serving as the vibration source is relatively weak. This means that, in the frequency characteristics of ear cartilage, there is satisfactory transmission of vibration in a band of 1 kHz or below. Further, as will be clear from FIG. 132 (B), despite the fact that vibration of the piezoelectric bimorph element serving as the vibration source is generally flat, ear cartilage exhibits a drop in vibrational acceleration level in a high frequency band starting from around 3 kHz. This means that, in the frequency characteristics of ear cartilage, vibration transmission efficiency drops in a high frequency band starting from around 3 kHz.

From examination of a graph showing an example of empirical data for the mobile telephone of the forty-sixth embodiment shown in FIG. 79 on the basis of the above results, it is understood that the amplification of sound pressure, for example, in a 300 Hz-2500 Hz band, due to a transition from non-contact state shown by a solid line to a contact state shown by a single-dotted broken line, represents an aggregation of air-conducted sound in the non-contact state, plus air-conducted sound arriving via cartilage conduction through ear cartilage having the frequency characteristics shown in FIG. 132 (B). The fact that the difference between the non-contact state shown by the solid line and the contact state shown by the single-dotted line is smaller in a band to the high-frequency end of 2500 Hz is consistent with the drop in the vibrational acceleration level in the high frequency band starting from around 3 kHz, which is observed in the frequency characteristics of ear cartilage shown in FIG. 132 (B).

Further, in FIG. 79, in a frequency band from about 1 kHz to above 2 kHz, sound pressure in the non-contact state shown by the solid line and sound pressure in an unoccluded external auditory meatus state shown by the single-dotted line exhibit a tendency to increase or decrease in substantially identical directions, with respect to frequency change. In contrast to this, sound pressure in the non-contact state shown by the solid line and sound pressure in a occluded external auditory meatus state shown by the double-dotted line in FIG. 79 exhibit a tendency to increase or decrease in opposite directions overall, with respect to frequency change. This means that the direct air-conducted sound component, which has strong effect from about 1 kHz to above 2 kHz, disappears upon closure of the entrance of the external auditory meatus, so that the effect of the frequency characteristics of ear cartilage, in which vibration transmission efficiency drops in the high frequency band, is expressed directly. As shown above, because the frequency characteristics of sound pressure in the unoccluded external auditory meatus state and the frequency characteristics of sound pressure in the occluded external auditory meatus state differ as a result of the frequency characteristics of ear cartilage shown in FIG. 132 (B), there is a change in the quality of sound heard when the external auditory meatus is occluded.

FIG. 132 (C) further shows an image of equalization of the drive output to a piezoelectric bimorph element for the purpose of correcting the frequency characteristics of ear cartilage shown in FIG. 132 (B). The solid line shows equalization performed in the unoccluded external auditory meatus state, and the dashed line equalization performed in the occluded external auditory meatus state. This equalization, as well as shifting between gain shown by the solid line and gain shown by the broken line, are performed by the cartilage conduction equalizer 8138 which is controlled by a controller 8139.

As shown in FIG. 132 (C), in the unoccluded external auditory meatus state, gain in the drive output is increased in the high frequency band from around 2500 Hz. Gain shift opposite in tendency from that in the frequency characteristics of ear cartilage shown in FIG. 132 (B) with respect to frequency change is applied thereby, correcting the small difference between the non-contact state shown by the solid line and the contact state shown by the single-dotted line in FIG. 79.

In the high frequency band from around 2500 Hz, the effect of direct air conduction entering from the entrance of the external auditory meatus is large, whereas sound pressure produced by cartilage conduction is relatively small with respect thereto. Consequently, in cases in which this can be ignored, assuming the gain shown by the solid line in FIG. 132 (C) to be flat, the eighty-six embodiment can be modified so as to perform equalization identical to equalization for ordinary direct air conduction.

In contrast to this, in the occluded external auditory meatus state shown by the dashed line in FIG. 132 (C), in the high frequency band from around 2500 Hz, gain in the drive output is greatly elevated above that in the unoccluded external auditory meatus state shown by the solid line, as shown by an arrow. This corrects the frequency characteristics of sound pressure in the occluded external auditory meatus state, in which the effect of the frequency characteristics of ear cartilage are expressed directly, preventing changes in sound quality when the external auditory meatus is occluded.

As shown in FIG. 132 (B), whereas ear cartilage exhibits a drop in vibrational acceleration level in a high frequency band starting from around 3 kHz, vibration per se is still possible, and therefore drop in sound pressure can be ameliorated by increasing the gain in the drive output in this frequency band. The extent to which to increase the gain is decided upon taking into consideration the fact that, in frequency band, the vibrational acceleration level of ear cartilage is low, and the efficiency with which sound pressure is increased despite increasing the drive output is poor. Moreover, because the sound signal sampling cycle in the telephone is 8 kHz and audio information above 4 kHz is absent from the outset, the fact that ear cartilage has frequency characteristics such that sound signals on the high-frequency band end are propagated with difficulty as shown in FIG. 132 (C) does not pose a problem, and the principal components of the sound signal frequency band can be transmitted efficiently. By increasing the gain at the high-frequency end in a frequency band of 4 kHz and below in the aforedescribed manner, the sound quality of the sound signal can be improved.

The gain shift shown by the solid line and the dashed line in FIG. 132 (C) may be performed automatically, for example, through detection by the pressure sensor 242 such as in the fifty-fourth embodiment. Alternatively, a microphone like the environment-noise microphone 4638 of the fiftieth embodiment could be furnished, switching automatically according to whether or not noise is greater than a predetermined level. In this case, on the assumption that, when noise is greater than a predetermined level, occlusion of the entrance of the external auditory meatus by the tragus or the like will have occurred with stronger pressing force against the ear cartilage naturally occurring as the user attempts to listen closely, the noise level at which automatic switching takes place may be set based on average values obtained through experimentation.

In preferred practice, the gain shifts shown by the solid line and the dashed line in FIG. 132 (C) will be performed while employing a moving average value for pressure sensor output or environment-noise microphone output within a predetermined time interval, to avoid cumbersome shifting between the two. However, when the external auditory meatus becomes occluded, due to an earplug bone conduction effect (herein, the phenomenon designated thusly is the same as that known as the “external auditory meatus occlusion effect”), sound becomes louder, and there tends to be a noticeable change in sound quality; therefore, gain shifting may incorporate an element of hysteresis whereby, through a configuration in which shifting takes place relatively slowly, for example by performing gain shifts in a direction from the solid line to the dashed line in FIG. 132 (C) rapidly in response to a detected increase in pressing force or environment noise, but holding back from performing gain shifts in a direction towards the solid line from the dashed line associated with softer sound, until change in a decreasing direction has been detected a predetermined number of times.

FIG. 133 is a flowchart showing functions of a controller 8139 the eighty-sixth embodiment of FIG. 131. The flow of FIG. 133 primarily describes control of the cartilage conduction equalizer 8138, and therefore operations centered on related functions have been extracted for illustration, and there are other operations of the controller 8139, such as typical functions of mobile telephones and like, which are not represented in the flow of FIG. 133. While it is possible for the controller 8139 to concomitantly accomplish functions shown in various other embodiments, to avoid complexity, illustrations and descriptions of these functions as well have been omitted in FIG. 133.

The flow of FIG. 133 starts when the main power source of the mobile telephone 8101 is turned on, and in Step S452, initial startup and a function check of each unit are performed, as well as initiating screen display on a large-screen display unit 8205 of the mobile telephone 8101. Next, in Step S454, the functions of the cartilage conduction unit (the cartilage conduction vibration unit 228) and the outgoing-talk unit (the outgoing-talk-processing unit 222) of the mobile telephone 8101 are turned off, and the routine advances to Step S456.

In Step S456, a check is performed to determine whether an earphone or the like has been inserted in the external earphone jack 8146. Then, in the event that insertion into the external earphone jack 8146 is not detected, the routine proceeds to Step S458, in which a check is performed to determine whether short-range communication has been established with a mobile telephone accessory device, such as a headset, by a short-range communication unit 8147. In the event this is not the case either, the routine proceeds to Step S460, and a check is performed to determine whether the current state is one in which another caller's answer to a telephone call request, or a call through mobile radio waves based on an incoming call, is in progress. When the current state is the talk state, the routine proceeds to Step S462, the cartilage conduction unit (the cartilage conduction vibration unit 228) and the outgoing-talk unit (the outgoing-talk-processing unit 222) are turned on, and routine proceeds to Step S464.

In Step S464, a check is performed to determine whether the current state is one an earplug bone conduction effect has occurred due to occlusion of entrance of the external auditory meatus, and in the event this is not the case, the routine advances to Step S466, then proceeds to Step S468 without applying a signal in which the waveform of the user's own voice is inverted. The process of application/non-application of a waveform-inverted signal of the user's own voice has been described in Step S52 to Step S56 in the flow of FIG. 10, and therefore the details are omitted here. In Step S468, the equalization indicated by the solid line in FIG. 132 (C) is established, and the routine advances to Step S470. The equalization performed in Step S468 involves increasing the gain in drive output in the high-frequency band from around 2500 Hz, the equalization being premised on significant participation by direct-air conduction entering from the entrance of the external auditory meatus. As a modified embodiment, a configuration like that described above, in which equalization in Step S468 and equalization for the purpose of ordinary direct air conduction are the same, would be acceptable.

On the other hand, when occurrence of an earplug bone conduction effect due to occlusion of the entrance of the external auditory meatus has been detected in Step S464, the routine advances to Step S471, applying a waveform-inverted signal of the user's own voice, as well as establishing equalization involving increased gain in drive output in the high-frequency band from around 2500 Hz in Step S472, and advances to Step S470.

In Step S470, a check is performed to determine whether the call has ended, and in the event this is not the case, returns to Step S464, repeating Step S464 to Step S472 for as long as the call has not ended. In so doing, equalization can be shifted between the solid line and the dash line of FIG. 132 (C) in response to changes in settings or conditions during a call. On the other hand, in the event that the call is detected to have ended in Step S470, the routine advances to Step S474, the functions of the cartilage conduction unit (the cartilage conduction vibration unit 228) and the outgoing-talk unit (the outgoing-talk-processing unit 212) of the mobile telephone 8101 are turned off, and the routine proceeds to Step S476. When the talk state is not detected in Step S460, the routine advances directly to Step S476.

In contrast to this, when insertion into the external earphone jack 8146 has been detected in Step S456, or establishment of short-range communication with a mobile telephone accessory device has been detected in Step S458, the routine advances to Step S478. In Step S478, a check is performed in the same manner as in Step S460, to ascertain whether a call through mobile radio waves is in progress. In the event that the device is not currently in the talk state, the routine proceeds to Step S480, equalization for the purpose of normal air conduction is established, and the routine advances to Step S482.

In Step S482, a check is performed to determine whether the call has ended, and in the event this is not the case, returns to Step S480, repeating Step S480 to Step S482 for as long as the call has not ended. On the other hand, in the event that the call is detected to have ended in Step S482, the routine advances to Step S476. When the talk state is not detected in Step S478, the routine advances directly to Step S476.

In Step S476, a check is performed to determine whether or not the main power source of the mobile telephone 8101 has been turned off, and in the event the main power source is not off, the routine returns to Step S456, and thereafter repeats Step S456 to Step S482 for as long as turning off of the main power source is not detected in Step S476. In contrast to this, once it is detected in Step S456 that the main power source has turned off, the flow terminates.

FIG. 134 is perspective views showing a modification example of the eighty-sixth embodiment shown in FIG. 131. For the description of FIG. 134, borrowing from FIG. 110 (A) and FIG. 100 (B) of the seventy-third embodiment which is similar in external appearance, common portions have been assigned the same reference numerals, and descriptions have been omitted. FIG. 134 (A) is a front perspective view of the mobile telephone 8101, and FIG. 134 (B) is a back perspective view of the mobile telephone 8101. In FIG. 134, unlike in the seventy-third embodiment, the in-camera 8117 is situated in an upper part of the mobile telephone 8101.

In the modification example of the eighty-sixth embodiment shown in FIG. 134, the back surface of the mobile telephone 8101 is furnished with a pressing force sensing unit 8142 for detecting obstruction of the external auditory meatus, as shown in FIG. 134 (B). This pressing force sensing unit 8142 is positioned at a location of spontaneous touching by the index finger of the hand when the mobile telephone 8101 is held against the ear by the user. When the user presses the mobile telephone 8101 forcefully against the ear to the extent that the external auditory meatus becomes obstructed, the intensity with which the index finger supporting this action presses against the pressing force sensing unit 8142 increases. Obstruction of the external auditory meatus is thereby detected on the basis of the output of the pressing force sensing unit 8142.

In order to avoid unintentional operation, as shown in FIG. 134 (A), the upper part of the mobile telephone 8101 is furnished with a pair of infrared light-emitting units 8119, 8120 constituting proximity sensors for detecting that the mobile telephone 8101 is contacting the ear for the purpose of a call, and a common infrared light proximity sensor 8121 for picking up reflected infrared light from the ear. In so doing, the pressing force sensing unit 8142 is functional only when the mobile telephone 8101 is contacting the ear, so that in the event that the user applies force to the pressing force sensing unit 8142 while, for example, looking at the display screen 6905 or the like, the mobile telephone 8101 will not react.

The pressing force sensing unit 8142 is furnished near a central portion thereof with a pressure-sensitive protrusion 8142*a*, not only as a means for detecting when the intensity of spontaneous pressing by the index finger exceeds as predetermined level, but also to enable intentional pressing operations thereof. In this way, the pressing force sensing unit 8142 can also function as a manual switch for equalization switching.

(Eighty-seventh Embodiment)

FIG. 135 is a block diagram relating to an eighty-seventh embodiment according to an aspect of the present invention, configured as a typical mobile telephone 1601 and a headset 8281 capable of short-range communication therewith. FIG. 135 has much in common with the seventeenth embodiment of FIG. 29, and therefore the same reference numerals are assigned to the common portions, omitting descriptions unless necessary.

The eighty-seventh embodiment of FIG. 135 differs from the seventeenth embodiment of FIG. 29 in that the headset 8281 has a cartilage conduction equalizer 8238 controlled by a controller 8239. The cartilage conduction equalizer 8238 has functions resembling those of the cartilage conduction equalizer 8138 of the eighty-sixth embodiment of FIG. 131, and adopts a piezoelectric bimorph element having frequency characteristics in common with that shown in FIG. 132 (A), as a vibration source for a cartilage conduction vibration unit 1626. The device is configured to perform the equalization shown in FIG. 132 (C), in order to handle the frequency characteristics of ear cartilage shown in FIG. 132 (B). Switching between the solid line and the dashed line of FIG. 132 (C) is performed on the basis of detection by a bending detection unit 1588.

In the eighty-seventh embodiment of FIG. 135, the sound signal on which equalization on the premise of normal air conduction has been performed is transmitted to the headset 8281 by the mobile telephone 1601 from the short-range communication unit 1446. The headset 8281 is configured to have the cartilage conduction vibration unit 1626, and therefore the equalization shown in FIG. 132 (C) is performed by the cartilage conduction equalizer 8238, on the basis of the received sound signal.

Returning to the eighty-sixth embodiment of FIG. 86 to supplement the description, when insertion of the external earphone jack 8146 has been detected in Step S456 of the flowchart of FIG. 133, or when establishment of short-range communication with a mobile telephone accessory device has been detected in Step S458, normal air equalization is performed. The reason for doing so is that the device is assumed to be compatible with normal air type earphones and headsets or, in the case of a cartilage conduction type headset, to be paired with a headset which is itself provided with the cartilage conduction equalizer 8238, as in the eighty-seventh embodiment of FIG. 135.

(Eighty-eighth Embodiment)

FIG. 136 is a perspective view and cross sectional views relating to an eighty-eighth embodiment according to an aspect of the present invention, configured as a mobile telephone 8201. A feature of the eighty-eighth embodiment resides in the structure of the cartilage conduction unit, and therefore the description shall center thereon; configurations shown in the other embodiments can be adopted, as appropriate, for the other portions, so illustrations and descriptions of these are omitted. FIG. 136 (A) is a front perspective view of the eighty-eighth embodiment. The configuration of chassis of the mobile telephone 8201 is one in which a front panel 8201*a* of plastic or the like and a back panel 8201*b* of plastic or the like sandwich a metal frame. The metal frame is divided into an upper frame 8227, a right frame 8201*c*, a lower frame 8201*d*, and a left frame 8201*e* (not visible in FIG. 136 (A)), with elastic bodies 8201*f* respectively interposed therebetween. The front panel 8201*a* is furnished with a window for a large-screen display unit 8205, and with a window for a microphone 8223 and a window for an in-camera 8017.

At an inside center part of the upper frame 8227 an electromagnetic vibrator 8225 serving as a cartilage conduction vibration source is anchored in such a way as to vibrate in a direction perpendicular to the front panel 8201*a*. The electromagnetic vibrator 8225 has substantially no contact with parts other than the upper frame 8227, so vibration of the electromagnetic vibrator 8225 is propagated only to the upper frame 8227. Vibration of the electromagnetic vibrator 8225 propagated to the center part of the upper frame 8227 is transmitted to a right side corner part 8224 and a left side corner part 8226 of the electromagnetic vibrator 8225, which serve as cartilage conduction units. In this way, according to the eighty-eighth embodiment, the metal upper frame 8227 is concomitantly employed for cartilage conduction, and in the same manner as in other embodiments, upper corner parts at the left and right of the chassis of the mobile telephone 8201 (the right side corner part 8224 and the left side corner part 8226) function as cartilage conduction units. However, in the eighty-eighth embodiment, in the same manner as in the fourth embodiment of FIG. 7, the upper frame 8227 does not vibrate solely at the right side corner part 8224 at the right edge and the left side corner part 8226 at the left edge, but rather vibrates in its entirety, whereby audio information can be transmitted regardless of which part of the inside upper edge side of the mobile telephone 8201 is placed against the ear cartilage. This will be discussed in detail below.

The configuration of the eighty-eighth embodiment is properly described as one whereby, when the inside upper edge of the mobile telephone 8201 is placed against the ear cartilage, an area proximate to the upper edge of the front panel 8201*a* actually contacts the ear cartilage. That is, vibration of the upper frame 8227 (including the right side corner part 8224 and the left side corner part 8226) is propagated to an area proximate to the upper edge part of the front panel 8201*a*, from whence it is transmitted to the ear cartilage. Moreover, as vibration of the upper frame 8227 entails vibration of an area proximate to the upper edge part of the front panel 8201*a* over a relatively large surface area, required air conduction is generated from the upper edge part of the front panel 8201*a* as well. The eighty-eighth embodiment can be said to share this feature in common with the tenth embodiment of FIG. 19. Specifically, the electromagnetic vibrator 8225 serves as the cartilage conduction vibration source, and concomitantly as a drive source for the incoming-call unit, for generating sound waves which are propagated to the eardrum through ordinary air conduction. Consequently, in the same manner as in other embodiments, it is possible to make calls in a manner benefiting from the advantages of cartilage conduction, in a style in which an upper corner part of the mobile telephone 8201 placed against the ear cartilage, such as the tragus; while at the same time it is possible to make calls in the ordinary style, i.e., with the vicinity of an upper edge center part of the mobile telephone 8201 placed against the ear. Further, because the upper edge part of the front panel 8201*a* vibrates over a relatively wide surface area in the aforedescribed manner, air-conducted sound can be generated at the required level from an ordinary mobile telephone, even one not furnished with an incoming-call unit that relies on air conduction, such as a speaker. The details of this will be discussed below.

Moreover, due to being isolated from the right frame 8201*c* and the left frame 8201*e* by the elastic bodies 8201*f*, transmission of vibration the upper frame 8227 to the lower part of the chassis is suppressed, so in the same manner as in other embodiments, the vibration energy of the electromagnetic vibrator 8225 serving as the cartilage conduction vibration source can be efficiently contained within the upper frame 8227. Vibration of the upper frame 8227, by virtue of the contact thereof with the front panel 8201*a* in the aforedescribed manner, is manifested as vibration over a relatively wide surface area in the vicinity of an upper edge thereof. However, vibration of a lower part of the front panel 8201*a* is suppressed by the right frame 8201*c*, the lower frame 8201*d*, and the left frame 8201*e* which, due to the interposed elastic bodies 8201*f*, have low vibration transmission, whereby vibration of the front panel 8201*a* is reduced in the course of traveling downward (through a portion including the large-screen display unit 8205), where sound generation is unwanted.

The upper frame 8227 also concomitantly performs the function of the antenna 5345 of the telephone function unit shown in the fifty-seventh embodiment of FIG. 87. In specific terms, the antenna 5345 includes a transmission antenna and a reception antenna; in the eighty-eighth embodiment of FIG. 136, the upper frame 8227 which serves as a cartilage conduction unit is employed concomitantly as an antenna for reception as well.

Further, an external earphone jack 8246 like that in the eighty-fourth embodiment of FIG. 127 is anchored to the upper frame 8227. In so doing, the upper frame 8227 can be furnished with the external earphone jack 8246 by means of a structure of utmost simplicity. In the aforedescribed structure, when the upper frame 8227 vibrates, the external earphone jack 8246 will vibrate as well; however, when an external earphone plug has been inserted into the external earphone jack 8246, this is detected, whereby vibration of the upper frame 8227 is halted. Consequently, in a state in which cartilage conduction is propagated to ear cartilage, vibration of the external earphone jack 8246 does not pose a problem because no external earphone plug is inserted, whereas when an external earphone plug is inserted, vibration of the upper frame 8227 is halted, so there is no problem in this case either. Likewise, when the upper frame 8227 vibrates, this vibration is propagated to the in-camera 8017 as well via internal structures and the front panel 8201*a* or the like, but when the device is in videoconferencing mode using the in-camera 8017, vibration of the upper frame 8227 is halted, and therefore there is no problem in this case either.

Further, a power switch 8209 is situated on the upper frame 8227. To make it possible to slide the power switch 8209 up and down with respect to the upper frame 8227, it is positioned within a window in the upper frame 8227, leaving a small gap, so as to not contact the upper frame 8227. In so doing, when the upper frame 8227 vibrates, the vibration thereof will not be propagated to the power switch 8209, nor will the inside edge of the window of the vibrating upper frame 8227 strike or chatter against the power switch 8209.

FIG. 136 (B) is a B1-B1 cross sectional view of FIG. 136 (A), in which identical portions are assigned the same reference numerals, omitting discussion thereof unless necessary. As will be clear from FIG. 136 (B), the electromagnetic vibrator 8225 is anchored to an inside center part of the upper frame 8227, and connected to a driver circuit terminal by a flexible connector cable 8225*a*. Moreover, as will be clear from FIG. 136 (B), the electromagnetic vibrator 8225 has substantially no contact with parts other than the upper frame 8227. Further, because the elastic bodies 8201*f* have been respectively interposed between the upper frame 8227, the right frame 8201*c*, and the left frame 8201*e*, transmission of vibration of the upper frame 8227 to the lower part of the chassis is suppressed. In this way, the upper frame 8227 may be employed concomitantly in suitable fashion as a cartilage conduction unit.

As will be clear from FIG. 136 (B), the upper frame 8227 is connected to an antenna terminal of the telephone function unit by a flexible connector cable 8227*a*, and thereby employed concomitantly as a reception antenna. Moreover, the external earphone jack 8246 is anchored to the upper frame 8227, and connected to an external output circuit terminal by a flexible connector cable 8246*a*. The upper frame 8227 is moreover furnished with a window for placement of the power switch 8209, making it possible for the power switch 8209, which has been furnished to a waterproof power switch unit 8209*a*, to move up and down without contacting the upper frame 8227 due to a small gap relative to the inner edge of the window. The waterproof power switch unit 8209*a* is supported by an internal structure 8209*b*, and connected to a controller terminal by a wire 8209*c*. A waterproof packing is sandwiched between the inside edge of the window of the upper frame 8227 and the waterproof power switch unit 8209*a*, making it possible for the upper frame 8227 to vibrate independently of the waterproof power switch unit 8209*a*, as well as to prevent water from infiltrating between the two.

FIG. 136 (C) is a top view of FIG. 136 (A), in which identical portions are assigned the same reference numerals, omitting discussion thereof unless necessary. As will be clear from FIG. 136 (C), an upper edge of the front panel 8201*a* and an upper edge of the back panel 8201*b* are configured to sandwich the upper frame 8227. The external earphone jack 8246 and the power switch 8209 are exposed on the upper frame 8227.

FIG. 136 (D) is the B2-B2 cross sectional view shown in FIG. 136 (A) to FIG. 136 (C), in which identical portions are assigned the same reference numerals, omitting discussion thereof unless necessary. As will be clear from FIG. 136 (D), the front panel 8201*a* and the back panel 8201*b* are configured to sandwich the upper frame 8227. The electromagnetic vibrator 8225 is anchored to the inside center part of the upper frame 8227. As will be clear from FIG. 136 (D), the electromagnetic vibrator 8225 has substantially no contact with any parts other than the upper frame 8227.

FIG. 136 (E) is the B3-B3 cross sectional view shown in FIG. 136 (B), in which identical portions are assigned the same reference numerals, omitting discussion thereof unless necessary. As will be clear from FIG. 136 (E), the front panel

8201*a* and the back panel 8201*b* are configured to sandwich a right corner part 8224 of an edge part of the upper frame 8227. As will be clear from FIG. 136 (E), an elastic body 8201*f* is interposed between the right corner part 8224 of the edge part of the upper frame 8227 and the right frame 8201*c*, suppressing transmission of vibration of the upper frame 8227 (including the right corner part 8224) to the lower part of the chassis (including the right frame 8201*c*).

FIG. 137 is side views of the mobile telephone 8201, describing a talk state in the eighty-eighth embodiment of FIG. 136. FIG. 137 (A) is a view substantially similar to FIG. 2 (A) shown in the first embodiment, and shows the mobile telephone 8201 placed against the right ear 28 while held in the right hand. Like FIG. 2, FIG. 137 (A) is a view of the face seen from the right side, in which the back surface side (the rear side in FIG. 136 (A)) of the mobile telephone 8201 is visible. As in FIG. 2, the mobile telephone 8201 is shown by single-dotted lines in order to depict the relationship of the mobile telephone 8201 and the right ear 28.

In the mobile telephone 8201 of the eighty-eighth embodiment, the entire upper frame 8227 vibrates, and in the talk state of FIG. 137 (A), as in FIG. 2 (A), the right corner part 8224 contacts the left ear 28 in proximity to the tragus, whereby the advantages of cartilage conduction during a call are realized in the same manner as in other embodiments.

In contrast to this, FIG. 137 (B) shows a call being made in the ordinary style, with an area proximate to the upper edge center part of the mobile telephone 8201 pressed against the ear. At this time as well, because a relatively long area 8227*b* in a center portion of the upper frame 8227 contacts the cartilage surrounding the entrance of the external auditory meatus, talk through the agency of cartilage conduction is possible. Further, as described previously, because the upper edge part of the mobile telephone 8201 vibrates through a relatively wide surface area, air-conducted sound can be generated at the required level from an ordinary mobile telephone. Consequently, in the talk state as in FIG. 137 (B), talk is possible through the agency of cartilage conduction from the center portion of the upper frame 8227, and through the agency of air-conducted sound entering through the entrance of the external auditory meatus. An air-conducted sound component entering through the entrance of the external auditory meatus is present in the talk state shown in FIG. 137 (A) as well, but the proportion thereof is greater in FIG. 137 (B).

The mobile telephone 8201 of the eighty-eighth embodiment shares in common with other embodiments the fact that the advantages of cartilage conduction can be utilized to the maximum in the call style shown in FIG. 137 (A). However, with the mobile telephone 8201 of the eighty-eighth embodiment, when used as shown in FIG. 137 (B), whether out of user preference or a misunderstanding of how the device should be used, the device can nevertheless be used without any problem as an ordinary mobile telephone, and air-conducted sound can be generated at the required level, even when the device is not furnished with an incoming-call unit that relies on air conduction, such as a speaker, and as such is a commercially viable configuration meeting specifications for an ordinary mobile telephone.

While FIG. 137 describes the case of use with the right ear, in the case of using the mobile telephone 8201 with the left ear, in exactly the same manner, use in a style with the left corner part 8226 placed in contact with an area proximate to the tragus of the left ear, as well as talk in the ordinary style with the upper center part of the mobile telephone 8201 pressed against the ear, are possible.

FIG. 138 is cross sectional views showing modification examples of the eighty-eighth embodiment of FIG. 136. The modification examples relate to configurations whereby vibration energy may be further concentrated in the proximity to the upper edge of the front panel 8201*a* which actually contacts the ear cartilage when the inside upper edge of the mobile telephone 8201 is pressed against the ear cartilage. FIG. 138 (A) is exactly the same as FIG. 136 (E), and is illustrated again for reference. Consequently, FIG. 138 (A) is the B3-B3 cross section in FIG. 136 (B), in which the upper frame 8227 and the right corner part 8224 thereof are visible in cross section. The modification examples are configured such that upper edge-proximate portions of the front panel 8201*a* and the back panel 8201*b* are thinner than other portions, thereby modifying the width and shape of the right corner part 8224, but in the modification examples, the cross section proximate to the upper edges of the front panel 8201*a* and the back panel 8201*b*, and the width of the upper surface of the upper frame 8227, in both the left corner part 8226 and the center part are identical to those in the right corner part 8224.

FIG. 138 (B) is configured such that an upper edge-proximate portion 8201*g* of the front panel 8201*a* is thinner than other portions, and likewise for the back panel 8021*b* as well, an upper edge-proximate portion 8201*h* thereof is thinner than other portions. In correspondence therewith, the width of the right corner part 8224*a* of the upper frame 8227 is greater than that of a right frame 8201*i*. In association with this, the cross section of an elastic body 8201*j* is trapezoidal so as to connect the two. By configuring the upper edge-proximate portion 8201*g* of the front panel and the upper edge-proximate portion 8201*h* of the back panel 8201*b*, which contact the vibrating upper frame 8227 in this way, to respectively be thinner than other portions, these upper edge-proximate portions vibrate more easily, and better propagate vibration of the upper frame 8227. The lower parts of the front panel 8201*a* and the back panel 8201*b* are more resistant to vibration, due to the difference in thickness.

FIG. 138 (C) is configured such that the inside of an upper edge-proximate portion 8201*k* of the front panel 8201*a* has a tapered shape becoming thinner towards the top, and likewise in the back panel 8021*b* as well, the inside of an upper edge-proximate portion 8201*m* thereof has a tapered shape becoming thinner towards the top. In association with this, a right corner part 8224*b* of the upper frame 8227 is trapezoidal. With this configuration as well, the upper edge-proximate portion 8201*k* of the front panel 8201*a* and the upper edge-proximate portion 8201*m* of the back panel 8201*b* which contact the vibrating upper frame 8227 vibrate more easily, and better propagate vibration of the upper frame 8227. The lower parts of the front panel 8201*a* and the back panel 8201*b* are more resistant to vibration, due to their increasing thickness in the downward direction.

FIG. 138 (D) is configured such that the outside of an upper edge-proximate portion 8201*n* of the front panel 8201*a* has a tapered shape becoming thinner towards the top, and likewise in the back panel 8021*b* as well, the outside of an upper edge-proximate portion 8201*p* thereof has a tapered shape becoming thinner towards the top. With this configuration as well, the upper edge-proximate portion 8201*n* of the front panel 8201*a* and the upper edge-proximate portion 8201*p* of the back panel 8201*b* which contact the vibrating upper frame vibrate more easily, and better propagate vibration of the upper frame 8227. The lower parts of the front panel 8201*a* and the back panel 8201*b* are more resistant to vibration, due to their increasing thickness in the downward direction.

The various features of the embodiments described above are not limited to implementation in the aforedescribed embodiments, and may be implemented in other embodiments as well, provided that the advantages thereof can be enjoyed by doing so. For example, in the eighty-eighth embodiment, the cartilage conduction vibration source was configured as an electromagnetic vibrator. An electromagnetic vibrator is suited to in layouts which members are closely packed on the upper part of a mobile telephone. However, the cartilage conduction vibration source adopted in the eighty-eighth embodiment is not limited to one of electromagnetic type, and a piezoelectric bimorph element like those shown in other embodiments, for example, would be acceptable.

(Eighty-ninth Embodiment)

FIG. 139 is a system configuration diagram of an eighty-ninth embodiment of an aspect according to the present invention. The eighty-ninth embodiment is configured as a headset for use as an outgoing-talk/incoming-talk unit for a mobile telephone, which, together with an ordinary mobile telephone 1401, makes up a mobile telephone system. In the eighty-ninth embodiment, as in the twenty-fourth embodiment of FIG. 37, a cartilage conduction unit is situated at a location touching an anterior region at the outside 1828 of the cartilage of the base of the ear 28 (the mastoid process side of the auricle attachment region), and a headset 8381 incorporating the cartilage conduction unit is capable of communicating with the ordinary mobile telephone 1401 through a short-range communication unit 8387 such as a Bluetooth™ device or the like. Consequently, portions in common with FIG. 37 have been assigned common reference numbers, and descriptions thereof are omitted. Also, reference numbers have not been assigned to the mobile telephone 1401 portions.

FIG. 139 (A) is a side view showing a relationship of the headset 8381 and the ear 28 in the eighty-ninth embodiment. As will be clear from FIG. 139 (A), the headset 8381 of the eighty-ninth embodiment comprises an ear-hook unit 8382 incorporating the cartilage conduction unit, and headset body 8384, the two being connected by a detachable cable 8381*a*. The headset body 8384 has a microphone 8323 or the like, and clips to a breast pocket or the like. In FIG. 139 (A), to avoid complexity while providing a clear overview of the interrelationships, the ear 28 is depicted by solid lines, and the ear-hook unit 8382 for hooking onto the outside 1828 of the base thereof is depicted by imaginary lines, with the internal configuration omitted.

In contrast to this, FIG. 139 (B) is a system configuration diagram from which illustration of the ear, except for the entrance of the external auditory meatus (the earhole) 232, has been omitted, and which shows the details of the headset 8381 of the eighty-ninth embodiment, together with the mobile telephone 1401. Portions identical to those in FIG. 139 (A) have been assigned the same reference numerals. The ear-hook unit 8382, shown in cross section in FIG. 139 (B), is constituted of elastic material of acoustic impedance approximating that of ear cartilage. As will be clear from FIG. 139 (B), the inner edge of the ear-hook unit 8382 constitutes a contact part for linear contact hooked around the base of the ear 28 along the outside 1828 thereof. A holding part 8325*a* made of hard material is furnished in proximity to a portion closest to the external auditory meatus entrance (the earhole) 232, at the outside 1828 of the cartilage of the base of the ear 28, with one end of a piezoelectric bimorph element 8325 being supported in cantilever fashion by this holding part 8325*a*.

As will be clear from FIG. 139 (B), the piezoelectric bimorph element 8325 does not contact the interior of the ear-hook unit 8382 in any portion thereof other than the support part 8325*a*, whereby the other end side (connection terminal side) of the piezoelectric bimorph element 8325 vibrates freely, the counteraction thereof being transmitted as vibration to the support part 8325*a*. Vibration of the support part 8325*a* is then transmitted from the inner edge of the ear-hook unit 8382 to the outside 1828 of the base of ear 28 in linear contact therewith, this vibration producing air-conducted sound from the external auditory meatus inner wall through the agency of the cartilage surrounding the external auditory meatus opening, which sound is transmitted to the eardrum. The outside 1828 of the cartilage of the base of ear is close to the external auditory meatus entrance 232 to the inside thereof, providing suitable conditions for producing air conduction in the external auditory meatus interior, from the cartilage surrounding the external auditory meatus opening.

Meanwhile, the headset body 8384 has the short-range communication unit 8387 such as a Bluetooth™ device or the like, which is capable of communicating with the mobile telephone 1401. A sound signal received by radio waves 1285 through the short-range communication unit 8387 from the mobile telephone 1401 is presented from a sound unit 8336 to an amplifier 8340 via an acoustic processing circuit 8338. The amp 8340 drives the piezoelectric bimorph element 8325 from a connector 8346 via a cable 8381*a*. A sound signal picked up by the microphone 8323 is transmitted to the mobile telephone 1401 from the short-range communication unit 8387 by the radio waves 1285 via the sound unit 8336. A controller 8339 controls the short-range communication unit 8387, the acoustic processing circuit 8338, and the sound unit 8336, as well as transmitting operation signals from an operating unit 8309 to the mobile telephone 1401 from the short-range communication unit 8387. A power supply unit 8348 including a rechargeable cell supplies power to the entire headset 8381.

In the preceding eighty-ninth embodiment, the piezoelectric bimorph element 8325 for cartilage conduction is situated in the ear-hook unit 8382 while the microphone 8323 is situated in the headset body 8384, the two being separated from one another and connected only by the flexible cable 8381*a*, so that the microphone 8323 is unaffected by vibration of the piezoelectric bimorph element 8325. Moreover, in the eighty-ninth embodiment, vibration for the purpose of cartilage conduction is transmitted from the rear side of the ear 28, and therefore the external auditory meatus entrance (the earhole) 232 is completely free, so entry of sounds, such as a car horn, into the ear in an emergency situation is unimpeded, nor is there the discomfort associated with inserting an earphone or the like into the external auditory meatus entrance (the earhole) 232. An external auditory meatus occluding effect can readily be obtained by covering the ear 28 with the hand in order to enhance the cartilage conduction effect, whereby increased volume and blockage of outside noise can be achieved.

In FIG. 139, for simplicity, only one ear-hook unit 8382, that for the right ear, is illustrated; however, it would be possible for an ear-hook unit of similar configuration for the left ear to be connected in common to the headset body 8384, and the respective ear-hook units hooked on both ears to afford a stereo reception unit. In so doing, ordinary calls are easier to hear, and the configuration is one suited to enjoyment of music as well.

(Ninetieth Embodiment)

FIG. 140 is a system configuration diagram of a ninetieth embodiment of an aspect according to the present invention. The ninetieth embodiment is likewise configured as a headset for use as an outgoing-talk/incoming-talk unit for a mobile telephone, which, together with the ordinary mobile telephone 1401, makes up a mobile telephone system. In the ninetieth embodiment, as in the eighty-ninth embodiment of FIG. 139, a cartilage conduction unit is situated at a location touching an anterior region at the outside 1828 of the cartilage of the base of the ear 28, and a headset 8481 incorporating the cartilage conduction unit is capable of communicating with the ordinary mobile telephone 1401 through a short-range communication unit 8487 such as a Bluetooth™ device or the like. Consequently, portions in common with FIG. 139 have been assigned common reference numbers, and descriptions thereof are omitted.

FIG. 140 (A) is a side view showing a relationship of the headset 8481 and the ear 28 in the ninetieth embodiment. As will be clear from FIG. 140 (A), a point of difference between the ninetieth embodiment and the eighty-ninth embodiment of FIG. 139 is that the headset 8481 is configured as an integrated unit. That is, in the ninetieth embodiment, the microphone and other configurations are situated within the headset 8481. In FIG. 140 (A), adopting the same convention as in the eighty-ninth embodiment, the ear 28 is shown by solid lines, and the ear-hook unit 8482 for hooking onto the outside 1828 of the base thereof is depicted by imaginary lines, with the internal configuration omitted.

In contrast to this, FIG. 140 (B), like FIG. 139 (B), is a system configuration diagram from which illustration of the ear 28, except for the entrance of the external auditory meatus (the earhole) 232, has been omitted, and which shows the details of the headset 8481 of the ninetieth embodiment, together with the mobile telephone 1401. Portions identical to those in FIG. 140 (A) have been assigned the same reference numerals. The headset 8481, shown in cross section in FIG. 140 (B), has the ear-hook unit 8482 constituted of elastic material, the inner edge of which constitutes a contact part for linear contact while hooked around the base of the ear 28 along the outside 1828 thereof. Moreover, as in the eighty-ninth embodiment, a piezoelectric bimorph element 8325 is supported at one end in cantilever fashion by a holding part 8482*a* situated closest to the external auditory meatus entrance (the earhole) 232, at the outside 1828 of the cartilage of the base of the ear 28.

As will be clear from FIG. 140 (B), in the ninetieth embodiment as well, the piezoelectric bimorph element 8425 does not contact the interior of the ear-hook unit 8482 in any portion thereof other than the support part 8482*a*, whereby the other end side (connection terminal side) of the piezoelectric bimorph element 8425 vibrates freely, the counteraction thereof being transmitted as vibration to the support part 8482*a*. Vibration of the support part 8482*a* is then transmitted in the same manner as in the eighty-ninth embodiment, from the inner edge of the ear-hook unit 8482 to the outside 1828 of the base of ear 28 in linear contact therewith, this vibration producing air-conducted sound from the external auditory meatus inner wall through the agency of the cartilage surrounding the external auditory meatus opening, which sound is transmitted to the eardrum.

An upper part of the ear-hook unit 8482 is continuous with an anterior part 8484 comprising the same hard material, and situated across a gap 8481*b* therefrom. The anterior part 8484 is furnished with the short-range communication unit 8487 such as a Bluetooth™ device or the like, capable of communicating with the mobile telephone 1401. A sound signal received by the short-range communication unit 8487 by radio waves 1285 from the mobile telephone 1401 is presented from a sound unit 8436 to an amplifier 8440 via an acoustic processing circuit 8438, in an arrangement identical to the eighty-ninth embodiment. The amp 8440 drives the piezoelectric bimorph element 8425 through a cable 8481*a* passing from the anterior part 8484 and through a connecting part to the ear-hook unit 8482. While omitted from the illustration in FIG. 140 (B), the ninetieth embodiment also has a controller and an operating unit analogous to those in the eighty-ninth embodiment.

The microphone 8423, which is furnished to a distal end of an extension part 8481*c* a considerable distance below a portion connecting to the ear-hook unit 8482, is connected to the sound unit 8486. In so doing, sound signals picked up by the microphone 8423 are transmitted to the mobile telephone 1401 by the radio waves 1285, from the short-range communication unit 8487 via the sound unit 8436.

A rechargeable cell 8485 of a power supply unit for supplying power to the headset 8481 as a whole is situated intervening between the ear-hook unit 8482 and the extension part 8481*c* within the anterior part 8484. According to the ninetieth embodiment, the headset 8481 is of integrated configuration, and therefore vibration of the piezoelectric bimorph element 8425 is propagated to the anterior part 8484 from the ear-hook unit 8482. However, due to the cell 8485 being situated in the aforedescribed manner, vibration of the anterior part 8484 is suppressed midway by weight of the cell 8485, and the vibration component transmitted to the extension part 8481*c* is small. Consequently, the effects of vibration of the piezoelectric bimorph element 8425 on the microphone 8423 are minimal.

(Ninety-first Embodiment)

FIG. 141 is cross sectional views and a block diagram relating to a ninety-first embodiment according to an aspect of the present invention, configured as a stereo headphone system 8581. The ninety-first embodiment is based on the sixty-third embodiment of FIG. 95, and therefore descriptions of elements common to both are omitted to the greatest possible extent, focusing the description on the elements being added. FIG. 141 (A) shows a cross sectional view of the entirety of the stereo headphone system 8581 which is similar to the sixty-third embodiment. The stereo headphone system 8581 has a right-ear cartilage conduction unit 8524 and a left-ear cartilage conduction unit 8526, which respectively are conical (cone)-shaped convex shapes. Piezoelectric bimorph elements 8525*a* and 8525*b* are respectively attached such that the vibrating surface side thereof contacts the unit. FIG. 141 (A) also shows a block diagram of a sound signal source unit 8584 in the headphone system 8581, for better understanding of the system in its entirety.

An added feature of the ninety-first embodiment resides in passage holes 8524*a* and 8526*a* which are respectively furnished at the center in the right-ear cartilage conduction unit 8524 and the left-ear cartilage conduction unit 8526, a configuration that allows outside air-conducted sound to reach the eardrum from the external auditory meatus entrance even while the headphone system 8581 is being worn. The system is further furnished with shutters 8558 and 8559 driven by shutter drive units 8557*a* and 8557*b*, whereby the passage holes 8524*a* and 8526*a* may be respectively occluded as needed, so that an external auditory meatus occluding effect can be obtained. In FIG. 141 (A), the passage holes 8524*a* and 8526*a* are depicted in the unoccluded state.

A sound signal output from an acoustic processing circuit 8538 of the sound unit 8584 drives the piezoelectric bimorph elements 8525*a* and 8525*b* via a stereo amp 8540, the vibration thereof being propagated to the inner wall of the external auditory meatus entrance by the right-ear cartilage conduction unit 8524 and the left-ear cartilage conduction unit 8526, giving rise to good cartilage conduction. The sound unit 8584 is further furnished with a shutter control unit 8539, and when outside noise at or above a predetermined level is detected by a noise detection unit 8541, or when manually-operated unit 8509 is manually operated as needed, an occlusion signal is presented to the shutter drivers 8557*a* and 8557*b*, whereby the shutters 8558 and 8559 slide, and respectively occlude the passage holes 8524*a* and 8526*a*. On the other hand, when the noise detection unit 8541 does not detect outside noise at or above a predetermined level, or when the manually-operated unit 8509 is manually operated once more, an unocclusion signal is presented to the shutter drivers 8557*a* and 8557*b*, whereby the shutters 8558 and 8559 slide, and the passage holes 8524*a* and 8526*a* are respectively unoccluded.

FIG. 141 (B) and FIG. 141 (C) are enlarged fragmentary views of FIG. 141 (A), showing opening and closing of the aforedescribed shutters. Identical portions have been assigned the same reference numerals. For simplicity, only the right-ear cartilage conduction unit 8524 is illustrated, but the left-ear cartilage conduction unit 8526 is similar in design. FIG. 141 (B) is the same as FIG. 141 (A), showing the passage hole 8524*a* in the unoccluded state. In contrast to this, FIG. 141 (C) shows the shutter 8558 slid upwards, occluding the passage hole 8524*a*. In so doing, in the state shown in FIG. 141 (B), while obtaining cartilage conduction, it is possible at the same time for outside air-conducted sound to be transmitted to the eardrum from the external auditory meatus opening 30*a*. In the state shown in FIG. 141 (C) on the other hand, an external auditory meatus occlusion effect may be obtained in cartilage conduction. According to the configuration of the ninety-first embodiment as above, appropriate external auditory meatus occlusion effect may be obtained automatically, or through hand operation, without having to press the cartilage conduction unit or block the ear with the hand.

The various features of the embodiments described above are not limited to implementation in the aforedescribed embodiments, and may be implemented in other aspects as well, provided that the advantages thereof can be enjoyed by doing so. For example, the advantages of a configuration in which an external auditory meatus occlusion effect is obtained through occlusion and unocclusion of the external auditory meatus entrance by shutters as shown in the ninety-first embodiment are not limited to cases of cartilage conduction. Specifically, in the case of ordinary bone conduction as well, it is possible for appropriate external auditory meatus occlusion effect to be obtained automatically, or through hand operation, without having to block the ear with the hand.

In the eighty-ninth embodiment and the ninetieth embodiment, piezoelectric bimorph elements were adopted as the cartilage conduction vibration sources, but it would be possible to employ vibrators of electromagnetic type instead. In this case, the electromagnetic vibrator would suitably be situated in proximity to a portion closest to the external auditory meatus entrance (the earhole) 232, at the outside 1828 of the cartilage of the base of the ear 28 (a location equivalent to that of the holding part 8325*a* of FIG. 139).

(Ninety-second Embodiment)

FIG. 142 is a system configuration diagram of a ninety-second embodiment of an aspect according to the present invention. The ninety-second embodiment is configured as a headset for use as an outgoing-talk/incoming-talk unit for a mobile telephone, which, together with the ordinary mobile telephone 1401, makes up a mobile telephone system. In the ninety-second embodiment, as in the ninetieth embodiment of FIG. 140, a cartilage conduction unit is situated at a location touching an anterior region at the outside 1828 of the cartilage of the base of the ear 28, and a headset 8681 incorporating the cartilage conduction unit is capable of communicating with the ordinary mobile telephone 1401 through a short-range communication unit 8487 such as a Bluetooth™ device or the like. As FIG. 142 has much in common with FIG. 140, corresponding portions have been assigned common reference numbers, and descriptions thereof are omitted.

A point of difference between the ninety-second embodiment and the ninetieth embodiment of FIG. 140 is the use of a contact microphone 8623 placed in direct contact against the head or the like of the user to sense vibration thereof, rather than an air-conduction microphone, for picking up audio. As shown in side view in FIG. 142 (A), the contact microphone 8623 is situated touching the mastoid, which is situated in proximity to the rear from the holding part 8482*a* for the piezoelectric bimorph element. In so doing, an output unit for sound signals by cartilage conduction, and a sound input unit relying on the contact microphone 8623, are accommodated compactly in integrated fashion within a space rearward from the auricle. In so doing, the headset 8681 will not get in the way when, for example, a helmet is worn from above.

FIG. 142 (B), like FIG. 140 (B), is a system configuration diagram showing the details of the headset 8681, together with the mobile telephone 1401. As will be clear from FIG. 142 (B), in the ninety-second embodiment, as in the ninetieth embodiment, the cell 8485 is situated intervening between the ear-hook unit 8482 and the contact microphone 8623. Consequently, vibration of the anterior part 8484 is suppressed midway due to the weight of the cell 8485, so the vibration component of the piezoelectric bimorph element 8425 that is ultimately transmitted to the contact microphone 8624 is small.

However, because the contact microphone 8624 directly senses vibration, despite the aforedescribed countermeasures, there is a possibility of it picking up vibration of the anterior part 8484, transmitted from the piezoelectric bimorph element 8425. To deal with this, as shown in FIG. 142 (B), the signal from an acoustic processing circuit 8438 is subjected to waveform inversion by an inversion circuit 8640, and applied to a canceller 8636. A sound signals picked up by the contact microphone 8623 is propagated to the sound unit 8436 via the canceller 8636, and the signal from the inversion circuit 8640 is applied to the canceller 8636 in aforedescribed manner, synthesizing the signals whereby the vibration component originating in the piezoelectric bimorph element 8425 picked up by the contact microphone 8623 is canceled, so that only sound signals generated by the vocal chords are propagated to the sound unit 8436.

FIG. 143 is side views of the ear 28, showing a modification example of the aforedescribed ninety-second embodiment. In the modification example, the position of the contact microphone is modified. Consequently, in FIG. 143, in order to describe this, the configuration of the head in proximity to the ear 28 is illustrated in detail, while in order to avoid complexity, illustration of the headset 8681, except for the contact microphone, is omitted. FIG. 143 (A) uses the aforedescribed method of illustration to show, for reference purposes, the ninety-second embodiment of FIG. 142 (A) in which the contact microphone 8683 is situated contacting an area in proximity to a mastoid 8623*a*.

In contrast to this, FIG. 143 (B) is a first modification example of the ninety-second embodiment, in which a contact microphone 8723 is situated contacting an area in proximity to a lower jawbone 8623*b*. Because the lower jawbone 8623*b* is close to the vocal chords, it vibrates during speech, making this a suitable location for the contact microphone 8723 to be situated. However, as the jawbone moves somewhat according to changes in the words uttered, the headset 8681 is supported flexibly in order for the contact microphone 8723 to conform to these movements.

FIG. 143 (C) is a second modification example of the ninety-second embodiment, in which a contact microphone 8823 is situated contacting an area in proximity the mastoid 8623*c* side of a sternomastoid muscle. Vibration of the vocal cords is propagated well through the sternomastoid muscle, and the mastoid 8623*a* side thereof vibrates during speech as well. Consequently, this region is also a suitable one for the contact microphone 8883 to be situated. However, as the mastoid 8623*a* side of a sternomastoid muscle also moves somewhat according to changes in the words uttered, the headset 8681 is supported flexibly in order for the contact microphone 8823 to conform to these movements.

(Ninety-third Embodiment)

FIG. 144 is a back view and a block diagram of a ninety-third embodiment of an aspect of the present invention. The ninety-third embodiment is configured as a headset 8981 serving as an outgoing-talk/incoming-talk unit for a mobile telephone, and is of headphone type designed such that stereo listening is possible. The ninety-third embodiment has much in common with the ninety-second embodiment of FIG. 142, and therefore corresponding portions have been assigned the same reference numerals, omitting descriptions thereof. In the ninety-third embodiment, as in the ninety-second embodiment, cartilage conduction units are situated at locations touching an anterior part of the outside of the cartilage of the base of the ear, and a contact microphone is employed to pick up sound.

FIG. 144 (A) is a view of the headset 8981 of the ninety-third embodiment worn on the head, seen from the back; in order to avoid complexity, the right ear 28 and the left ear 30 are illustrated by hypothetical lines by way of the head. In the headset 8981, a right ear unit 8924 having a right-side piezoelectric bimorph element 8924*a* and the like, and a left ear unit 8926 having a left-side piezoelectric bimorph element 8926*a* and the like, are supported on a head arm unit 8981*a*. In the ninety-third embodiment, constituent elements are apportioned between the right ear unit 8924 and the left ear unit 8926, affording a compact configuration overall which makes it possible, for example, for a helmet to be worn from above.

To describe in more specific terms, as shown in FIG. 144 (A), control circuitry, such as a short-range communication unit 8487 and the like, is situated in the left ear unit 8926, and the left-side piezoelectric bimorph element 8926*a* is supported there as well. The left-side piezoelectric bimorph element 8926*a* supported in this fashion propagates cartilage conduction from the mastoid side of the region of attachment of the auricle. Further, a contact microphone 8923, supported by a flexible structure via an intervening left-side cell 8985*a*, contacts the lower jawbone. Meanwhile, power source circuitry, such as a power supply unit 8985 and the like, is arranged in the right ear unit 8924, and the right-side piezoelectric bimorph element 8924*a* is supported there as well. The right-side piezoelectric bimorph element 8924*a*, like the left-side piezoelectric bimorph element 8926*a*, propagates cartilage conduction from the mastoid side of the region of attachment of the auricle. Stereo listening is possible thereby. Further, a right-side cell 8985*b* is supported on the right ear unit 8924. In this way, the cells, which take up space, are apportioned to the right ear unit 8924 and the left ear unit 8926.

FIG. 144 (B) is a block diagram showing details of the ninety-third embodiment; portions in common with the ninety-second embodiment of FIG. 142 (B) are assigned the same symbols, omitting descriptions. As will be clear from FIG. 144 (B), in the ninety-third embodiment, the left-side piezoelectric bimorph element 8926*a* and the contact microphone 8923 are close together within the left ear unit 8926, and therefore in the same manner as in the ninety-second embodiment, an inversion circuit 8640 and a canceller 8636 are furnished for canceling of vibration components originating in the piezoelectric bimorph element 8926*a* and picked up by the contact microphone 8923. In the right ear unit 8924 on the other hand, the right-side power supply unit 8985 receives supply of power from the right-side cell 8985*b*, as well as receiving supply of power from the left-side cell 8985*a* via a connecting cable inside the head arm unit 8981*a*. Carrying out any necessary voltage boosting or the like on the basis of the voltage and charge capacity of the right-side cell 8985*b* and the left-side cell 8985*a*, power is fed to an amplifier 8940*b* of the right ear unit 8924, while also supplying power to the constituent components of the left ear unit 8926 through the connecting cable inside the head arm unit 8981*a*. Further, an acoustic processing circuit 8438 of the left ear unit 8926 transmits left ear sound signals to an amplifier 8940*a* of the left ear unit 8926, and transmits right ear sound signals to the amp 8940*b* of the right ear unit 8924 via the connecting cable inside the head arm unit 8981*a*. In the ninety-third embodiment, vibration of the right-side piezoelectric bimorph element 8924*a* is propagated through the head arm unit 8981*a*, so the component picked up by the contact microphone 8923 is sufficiently small.

(Ninety-fourth Embodiment)

FIG. 145 is a back cross sectional view and a block diagram of a ninety-fourth embodiment of an aspect of the present invention. The ninety-fourth embodiment is likewise configured as a headset 9081 serving as an outgoing-talk/incoming-talk unit for a mobile telephone, and is of headphone type designed such that stereo listening is possible. The ninety-fourth embodiment has much in common with the ninety-second embodiment of FIG. 143, and therefore corresponding portions have been assigned the same reference numerals, omitting descriptions thereof. In the ninety-fourth embodiment, as in the ninety-second embodiment and ninety-third embodiment, cartilage conduction units are situated at locations touching an anterior part of the outside of the cartilage of the base of the ear, and a contact microphone is employed to pick up sound.

A point of difference between the ninety-fourth embodiment and the ninety-third embodiment is that the headset 9081 is a stereo headset of neckband type, and in association therewith, is furnished with contact microphones 9023*a* and 9023*b* and with a neckband unit 9081*a*, the pair of contact microphones 9023*a* and 9023*b* being designed to pick up, from both sides, vibration of the sternomastoid muscle from the back surface of the neck. This region is close to the vocal chords and vibrates well, and as such is suited to being furnished with the contact microphones 9023*a* and 9023*b*. Moreover, as discussed below, these do not pose an obstacle when wearing a helmet or the like.

The following specific description is based on FIG. 145 (A). FIG. 145 (A) is a view of the headset 9081 of the ninety-fourth embodiment worn on the head, seen from the back; as in FIG. 144 (A), in order to avoid complexity, the right ear 28 and the left ear 30 are illustrated by hypothetical lines by way of the head. In the ninety-fourth embodiment of FIG. 145 (A), a right ear unit 9024 having a right-side piezoelectric bimorph element 8924*a* and the like, and a left ear unit 9026 having a left-side piezoelectric bimorph element 8926*a* and the like, are supported from below by the neckband unit 9081*a*. The neckband unit 9081*a* is shaped to conform to the back of the neck, the pair of contact microphones 9023*a* and 9023*b* being furnished to the inside thereof so as to lie to either side of the back surface of the neck. In so doing, vibration of the sternomastoid muscle at the back surface of the neck can be picked up in satisfactory fashion. Contact of the pair of contact microphones 9023*a* and 9023*b* against the back surface of the neck is stabilized, and vibration of the sternomastoid muscle due to vocalization from the vocal chords can be picked up in complementary fashion from both sides.

Like the ninety-second embodiment and the ninety third embodiment, the ninety-fourth embodiment is suited to use while wearing a helmet. In order to describe the effects of use, a cross section of a helmet 9081*b* is illustrated in FIG. 145 (A). As is clear from FIG. 145 (A), the inner surface of the helmet 9081*b* is of a shape loosely covering the right ear 28 and the left ear 30, and therefore the energy of air-conducted sound generated inside the external auditory meatus of both ears 28 and 30 on the basis of cartilage conduction from the right-side piezoelectric bimorph element 8924*a* and the left-side piezoelectric bimorph element 8926*a* is prevented from dissipating to the outside from the external auditory meatus entrance, making it possible to hear sounds produced by cartilage conduction at higher volume. Moreover, because sound is not produced outside the external auditory meatus entrance due to vibration of the helmet 9081*b* or the like, external sounds audible through the helmet 9081*b* are not masked within the helmet 9081*b*.

FIG. 145 (B) is a block diagram showing details of the configuration of the ninety-fourth embodiment, with portions in common with the ninety-third embodiment of FIG. 144 (B) being assigned the same reference numerals, omitting descriptions thereof. As will be clear from FIG. 145 (B), in the ninety-fourth embodiment, components of vibration of the right-side piezoelectric bimorph element 8924*a* and the left-side piezoelectric bimorph element 8926*a* propagated through the neckband unit 9081*a* and picked by the left-side contact microphone 9023*a* and the right-side contact microphone 9023*b* are sufficiently small. Consequently, the configuration involving the inversion circuit 8640 and the canceller 8683 furnished in the ninety-third embodiment for the purpose of canceling these vibration components has been omitted.

(Ninety-fifth Embodiment)

FIG. 146 is a block diagram of a ninety-fifth embodiment of an aspect of the present invention. The ninety-fifth embodiment is likewise configured as a headset 9181 serving as an outgoing-talk/incoming-talk unit for a mobile telephone, and is of headphone type designed such that stereo listening is possible. The ninety-fifth embodiment has much in common with the ninety-fourth embodiment of FIG. 145, and therefore corresponding portions have been assigned the same reference numerals, omitting descriptions thereof. In the ninety-fifth embodiment, as in the ninety-second to ninety-fourth embodiments, cartilage conduction units are situated at locations touching an anterior part of the outside of the cartilage of the base of the ear, and a contact microphone is employed to pick up sound.

A difference between the ninety-fifth embodiment and the ninety-fourth embodiment is that, in order to cancel components of vibration of the right-side piezoelectric bimorph element 8924*a* and the left-side piezoelectric bimorph element 8926*a* propagated through a neckband unit 9181*a* and picked by a contact microphone 9123, the inversion circuit 8640 and the canceller 8636 are furnished as in the ninety-third embodiment of FIG. 144. Further, in the ninety-fifth embodiment, unlike the ninety-fourth embodiment, the contact microphone 9123 is furnished in left-right asymmetric fashion to the neckband unit 9181*a*. In specific terms, the contact microphone 9123 is furnished to a location closer to the left-side piezoelectric bimorph element 8926*a* than to the right-side piezoelectric bimorph element 8926*a*.

As will be clear from FIG. 146, to counter vibration picked up from the left-side piezoelectric bimorph element 8926*a*, the inversion circuit 8640 and the canceller 8636 are furnished in the same manner as in the ninety-third embodiment, and vibration components originating in the left-side piezoelectric bimorph element 8926*a* and picked up by the contact microphone 9123 are canceled. Further, in the ninety-fifth embodiment of FIG. 146, by furnishing an inversion circuit 9140 to counter vibration picked up from the right-side piezoelectric bimorph element 8924*a*, and applying this inverted signal to the canceller 8636, vibration components originating in the right-side piezoelectric bimorph element 8924*a* and picked up by the contact microphone 9123 are canceled. This configuration is useful for stereo listening in cases in which different sound signals are input to the right-side piezoelectric bimorph element 8924*a* and the left-side piezoelectric bimorph element 8926*a*.

Further, in the ninety-fifth embodiment, in consideration of the fact that the right-side piezoelectric bimorph element 8924*a* is further away from the contact microphone 9123 than is the left-side piezoelectric bimorph element 8926*a*, the inverted output from the inversion circuit 9140 is attenuated by an attenuation circuit 9140*a* before application to the canceller 8636. In so doing, canceling does not become excessive at times that the picked up vibration is small.

The various features of the embodiments described above are not limited to the aforedescribed embodiments, and may be implemented in other aspects as well, provided that the advantages thereof can be enjoyed by doing so. For example, the features relating to concomitant use of a helmet, shown in the ninety-second to ninety fifth embodiments, can be utilized in cases not limited to ones of use in combination with a mobile telephone. For example, exchange of audio signals with outside equipment from a sound unit is not limited to short-range wireless communications, and comparable advantages can be achieved in cases of exchange through a wired connection as well.

Ninety-sixth Embodiment

FIG. 147 is a perspective view and cross-sectional view relating to a ninety-sixth embodiment of the present invention according to an aspect of the present invention, configured as a mobile telephone 9201 and a cartilage conduction soft cover 7863 therefor in the same manner as the eighty-fourth embodiment of FIG. 126. The configuration of the ninety-sixth embodiment is substantially consistent with that of the eighty-fourth embodiment, and therefore the same reference numerals have been assigned to common parts, and descriptions are omitted.

A pair of infrared light-emitting unit 9219, 9220 constituting a proximity sensor for detecting that the mobile telephone 9201 is abutting an ear for purposes of a call, and with a shared infrared light proximity sensor 9221 for receiving infrared light reflected from the ear. When the proximity sensor detects that the mobile telephone 9201 has abutted the ear, the display backlight in the touch panel/large-screen display unit 9205 is switched off in order to conserve electricity, and the touch panel function is disabled in order to prevent accidental operation. This is due to the fact that the touch panel/large-screen display unit 9205 is in contact with the cheek or the like when the mobile telephone 9201 is brought up against the ear, and the touch panel may execute an undesired operation in response thereto.

In contrast, when an earphone plug is inserted into the external earphone jack provided to the upper left part of the mobile telephone 9201, it is not ordinarily envisioned that the mobile telephone 9201 will be brought up against the ear and used, and therefore the possibility that touch panel/large-screen display unit 9205 is in contact with the cheek and that accidental operation will occur is low. Furthermore, were the proximity sensor to detect the finger or the like and switch off the touch panel function, this rather would also result in an undesired operation. For these reasons, the configuration is such that the touch panel function is disabled by the proximity sensor when the earphone plug has been inserted.

However, when the cartilage conduction soft cover 7863 is mounted in the manner of the ninety-sixth embodiment and the external earphone plug 7885 is inserted into the external earphone jack and used, the touch panel/large-screen display unit 9205 is in contact with the cheek or the like and it is possible that the touch panel will execute an undesired operation in response thereto because the cartilage conduction part 7824 is brought into contact with the ear cartilage in order to transmit vibrations thereof. Having stated such, when the configuration is such that the touch panel function is disabled by the proximity sensor when the earphone plug has been inserted, it is possible that the proximity sensor will detect a finger or the like and disable the touch panel function when an ordinary earphone is inserted into the external earphone jack in the manner described above and the mobile telephone 9201 is used. In order to solve such a problem, the ninety-sixth embodiment retains original disablement control of touch panel function based on the use a proximity sensor and an external earphone jack, and is yet configured so as to prevent accidental operation caused by the touch panel/large-screen display unit 9205 being in contact with the cheek or the like when the cartilage conduction soft cover 7863 is mounted and the cartilage conduction part 7824 is brought into contact with the ear cartilage.

Specifically, when a call is initiated by performing a call operation or the like by inputting the telephone number of the other party or by operating the touch panel or call button 9209*a* in order to make a call, or when there is an incoming call and the touch panel operation or a response operation using the call button 9209*a* has been performed in order to respond thereto, the touch panel function is disabled when a predetermined time (e.g., one second) has elapsed after the operation. This is due to the fact that, in these conditions, it is envisioned that the mobile telephone 9201 on which the cartilage conduction soft cover 7863 has been mounted will be brought up against the ear, and the touch panel functions are thought to be unnecessary. In order to conserve energy and notify the user that the touch panel functions are disabled, the display of the large-screen display unit 9205 is switched off and the display backlight is switched off when the touch panel functions are disabled.

On the other hand, a call-cutoff button 9209*b* or another mechanical switch is pressed when the call has ended, whereby the touch panel functions are enabled, and in order to notify the user of this, the display of the large-screen display unit 9205 is restarted and the display backlight is switched on.

It is not envisioned that the cartilage conduction part 7824 will be placed in contact with the ear cartilage during videoconferencing, even when the cartilage conduction soft cover 7863 has been mounted and the external earphone plug 7885 is inserted in the external earphone jack and used. For this reason, control for disabling and enabling the touch panel in the manner described above is not carried out during videoconferencing, and, in the same manner as in normal cases, the touch panel functions are not disabled by the proximity sensor when the earphone plug is inserted. Operation related to a call is not carried out in a state in which the earphone plug has been inserted for ordinary enjoyment of music, functions related to a call do not occur, and therefore, in the same manner as ordinary cases, the touch panel functions are not disabled by the proximity sensor when the earphone plug is inserted.

FIG. 148 is a block view of a mobile telephone 9201 portion of the ninety-sixth embodiment in FIG. 147. The mobile telephone 9201 in the ninety-sixth embodiment has much in common with the eighty-sixth embodiment in FIG. 131, except that the mobile telephone itself does not have cartilage conduction-related functions, so corresponding portions have been given the same reference numerals, and a description has been omitted. The ninety-sixth embodiment has a pair of infrared light-emitting units 9219, 9220 constituting a proximity sensor, and a shared infrared light proximity sensor 9221 for receiving infrared light reflected from the ear, as shown in FIG. 148. A display backlight 43 and a touch panel 9268 are provided to the touch panel/large-screen display unit 9205, and the touch panel functions are implemented by a touch panel driver 9270 controlled by a control unit 9239. Operations when the touch panel functions are disabled are carried out by an operating unit 9209, which includes a call button 9209*a*, a call-cutoff button 9209*b*, and the like.

FIG. 149 is flowchart showing the function of the control unit 9239 of the ninety-sixth embodiment in FIG. 148. To facilitate understanding, the flowchart of FIG. 149 mainly illustrates an abstraction of the functions for disabling and enabling the touch panel, and the ordinary functions of the mobile telephone 9201 are omitted. Therefore, various other related functions operating in parallel with and before and after the functions illustrated in FIG. 149 are present in the ninety-sixth embodiment.

The flow of FIG. 149 starts when the main power source provided to the operating unit 9209 is turned on, and in Step S492, initial startup and a function check of each unit are performed, as well as initiating screen display on the large-screen display unit 9205. Next, in Step S494, the functions of the touch panel 9268 are enabled, and the routine advances to Step S496. In Step 496, a check is performed to determine whether any of various panel operations have been performed prior to start of communications of the mobile telephone 9201. This panel operation includes not only menu selection and other basic operations, music enjoyment, camera functions, and other operations unrelated to communication, but also input of telephone numbers and email addresses for communication, and start operations for calls and communication. When any of these operations are detected, the routine advances to Step S498 and performs preprocessing for communication startup corresponding to the operation, and the routine advances to Step S50. In the case that a panel operation corresponding to Step S496 is not detected, the routine advances directly to Step S500.

In Step S500, a check is performed to determine whether communication has started and videoconferencing is in progress, and if not, the routine advances to Step S502. In Step 502, a check is performed to determine whether the external earphone jack 7846 is in use. This applies whether any earphone plug has been inserted into the external earphone jack 7846. When the external earphone jack 7846 is in use, the routine advances to Step S504, and a check is performed to determine whether there has been an incoming call and an operation for responding thereto has been performed. If not, the routine advances to Step S506, and naturally, when there is no incoming call and when an operation for answering has not been performed even when there is an incoming call, the routine advances to Step S506. In Step S506, a check is performed to determine whether the call function has been started on the basis of a call operation, and if not, the routine advances to Step S508. When the external earphone jack 7846 is being used in this manner, the routine arrives at Step S508 with the touch panel 9268 remaining enabled as long as the process has not entered the communication execution stage due to an incoming call or a call operation.

In contrast, when it has been detected in Step S504 that an operation for answering an incoming call has been performed, the routine advances to Step S510 and waits for one second to elapse in Step S510, after which the touch panel 9268 is disabled in step S512 and the routine advances to Step S508. When it has been detected in Step S506 on the basis of a call operation that the call function has been started, the routine advances immediately to Step S512, the touch panel 9268 is disabled, and the routine advances to Step S508.

As described above, when an incoming call answering operation or when the call function has been started, it can be considered that the touch panel functions are not required, and the touch panel 9268 is therefore disabled in Step S512. Although omitted from FIG. 149 to avoid complexity, the display of the large-screen display unit 9205 is turned off and the display backlight 43 is switched off in Step S512 at the same time that the touch panel functions are disabled, as described above.

The reason for waiting one second in Step S510 is that incoming call is a passive one based on operation from another party, and the operator is therefore not necessarily prepared to answer a call in advance. Therefore, the operator may experience discomfort were the touch panel 9268 to be disabled and the display of the large-screen display unit 9205 turned off immediately after an answering operation, so the display is continued for a moment. This also has significance in that when a call is accidentally answered, a call cutoff operation can be performed immediately thereafter using the touch panel 9268. On the other hand, when the waiting time is excessively long, it is possible that the touch panel 9268 will make contact with the cheek and produce an accidental operation as a result of the mobile telephone 9201 being brought against the ear, so the waiting time is kept to a short time to balance against these other factors. On the other hand, a call operation is an active final operation that follows an operation for choosing a contact or other required operation, and when a call is started on the basis thereof, the configuration is such that waiting time is not provided because the operator is not made to feel unsure and feel discomfort even when the display of the touch panel/large-screen display unit 9205 is turned off and the operation of the touch panel 9268 is disabled. Thus, the ninety-sixth embodiment is provided with a difference in the process of arriving at disabling the touch panel when answering an incoming call and making a call.

In step S508, a check is performed to determine whether a mechanical operation has been made to cut off a call using the call-cutoff button 9209*b* or the like, and if a mechanical operation has been made to cut off a call, the routine advances to Step S514, the touch panel 9268 is enabled, the call cutoff is executed in Step S516, and the routine arrives at Step S518. Although not shown in the drawing, when the touch panel functions are enabled, the display of the touch panel/large-screen display unit 9205 is restored and the display backlight 43 is simultaneously switched on in Step S514. On the other hand, when a mechanical operation to cut off a call in not detected in Step S508, the routine advances directly to Step S518.

When use of the external earphone jack 7846 is not detected in Step S502, the routine advances to Step S502 and a check is performed to determine whether a call is in progress. When a call is in progress, the routine advances to Step S522, and a check is performed by the proximity sensor to determine whether the mobile telephone 9201 has been brought up against the ear. When the mobile telephone is detected to be abutted against the ear, the routine advances to Step S524, the touch panel 9268 is disabled, and the routine advances to Step S526. When the routine has arrived at Step S524 and the touch panel 9268 is already disabled, the routine does nothing in Step S524 and advances to Steps S526.

On the other hand, when a call in progress has not been detected in Step S520, or when the proximity sensor has made no detection in Step S522, the routine advances to Step S528, the touch panel 9268 is enabled, and the routine advances to Step S526. When the routine has arrived at Step S528 and the touch panel 9268 is already enabled, the routine does nothing in Step S528 and advances to Steps S526.

When videoconferencing is in progress in Step S500, control for enabling and disabling the touch panel 9268 by the proximity sensor as described above is not carried out, and the routine advances immediately to Step S526 with the touch panel 9268 remaining enabled. Steps S500 also serves a function for keeping the touch panel 9268 enabled without control for disabling and enabling the touch panel 9268 being carried out due to an incoming call answering operation, a call start, or a mechanical operation to cut off a call when the external earphone jack 7846 is being used.

In step S526, a check is performed to determine whether an operation to cutoff a call has been made using the touch panel 9268. When an operation to cut off a call has been made, the routine advances to Step S516 and the call cutoff is executed. On the other hand, when an operation to cut off a call is not detected by the touch panel 9268 in Step S526, the routine advances to Step S508. While the touch panel 9268 is disabled, the routine must naturally advance from Step S526 to Step S508. In step S508, a check is performed to determine whether a mechanical operation has been made to cut off a call as previously described.

In Step S518, a check is performed to determine whether an operation has been performed to turn off the main power source, and if such an operation has occurred, the flow ends. On the other hand, when an operation has been performed to turn off the main power source has not been detected, the routine returns to Step S496, repeats Step S496 to Step S526, and in accordance with conditions, performs control to enable and disable the touch panel 9268, to display the large-screen display unit 9205 in accompaniment therewith, and to switch the display backlight 43 on and off. On the other hand, when an operation for turning off the main power source has been detected in Step S518, the flow ends.

The implementation of the present invention is not to be limited to the aforementioned embodiments, and various modifications are possible. For example, in the ninety-sixth embodiment, a difference is provided to the process by which the routine arrives as disabling the touch panel when responding to an incoming call and making a call. However, the embodiment for disabling the touch panel is not to be limited to such a configuration, and the configuration may be such that the touch panel 9268 is disabled by way of the same process when responding to an incoming call and making a call.

In the ninety-sixth embodiment, Step S502, Step S520 to Step S524, and Step S528 were omitted, and when videoconferencing is not in progress, the configuration may be such that the control of Step S504 to Step S516 is carried out regardless of the use of the external earphone jack 7846.

Furthermore, in the ninety-sixth embodiment, it is possible to: modify the routine so that Step S502 is substituted by a check about whether a "call-related function is in operation," and if so, the routine advances to Step S520, and if not, the routine immediately advances to Step S18; and use a configuration in which Step S504 to S516, and Step S526 are omitted and control carried out by the proximity sensor in Step S520 to Step S524, and Step S528 is performed regardless of the use of the external earphone jack 7846 when a call-related function, excluding videoconferencing, is in operation.

Ninety-seventh Embodiment

FIG. 150 is a front perspective view of a ninety-seventh embodiment according to an aspect of the present invention, and is configured as a mobile telephone 9301. The mobile telephone 9301 of the ninety-seventh embodiment is substantially consistent with the mobile telephone 8201 of the eighty-eighth embodiment, and therefore the same reference numerals have been assigned to common parts, and descriptions are omitted. The internal configuration invokes the block diagram of the twenty-sixth embodiment in FIG. 42.

The ninety-seventh embodiment differs from the eighty-eighth embodiment in that a function for describing the method for using the cartilage conduction function has been added. In similar fashion to the eighty-eighth embodiment, the ninety-seventh embodiment presents no problems to a call even when the upper edge center part is brought into contact with the ear in the manner of an ordinary mobile telephone. However, the right-side corner part 8224 and the left-side corner part 8226, which are cartilage conduction parts, must be brought into contact with the ear in order to more effective use the functions of cartilage conduction, which is different from normal circumstances. For this reason, the ninety-seventh embodiment has a function for describing the method of use to a user who is unaccustomed to the use of a cartilage conduction mobile telephone.

FIG. 150(A) is the same configuration as FIG. 136(A), except that the videoconferencing speaker 51, and the pair of infrared light-emitting units 19, 20 and the infrared light proximity sensor 21 constituting the proximity sensor, which are omitted from FIG. 136(A), are illustrated. These functions are the same as those already described in the first embodiment and elsewhere and a description of each is omitted.

FIG. 150(B) shows a cartilage conduction basic instructional display 9305*a* being displayed on a large-screen display unit 8205 in the ninety-seventh embodiment. The mobile telephone 9301 of the ninety-seventh embodiment displays "This is a cartilage conduction smartphone for corner listening" or another cartilage conduction basic instructional display 9305*a* for a predetermined time (e.g., five seconds) when the power is switched on. A similar display is performed when the mobile telephone 9301 is not tilted until a call is made and the other party answers, or until there is an incoming call and an operation is made to receive the call.

FIG. 150(C) shows a right-corner instructional display 9305*b* being displayed on the large-screen display unit 8205 in the ninety-seventh embodiment. The mobile telephone 9301 of the ninety-seventh embodiment displays "Please bring the right corner to your ear hole" or another right-corner instructional display 9305*b* when the mobile telephone 9301 is tilted right until a call is made and the other party answers, or until there is an incoming call and an operation is made to receive the call. Being tilted to the right envisions that the mobile telephone 9301 is being held in the right hand and will be brought into contact with the right ear for a call, and such a display is carried out for urging that the right-side corner part 8224 be brought into contact with the right ear. As is clear from FIG. 150(C), the right-corner instructional display 9305*b* is a graphic display indicating the right-side corner part 8224 that is to be brought to the ear.

Similarly, FIG. 150(D) shows a left-corner instructional display 9305*c* being displayed on the large-screen display unit 8205 in the ninety-seventh embodiment. In the same manner is FIG. 150(C), "Please bring the left corner to your ear hole" or another left-corner instructional display 9305*c* is displayed when the mobile telephone 9301 is tilted left until a call is made and the other party answers, or until there is an incoming call and an operation is made to receive the call. In this case, it is envisioned that the mobile telephone 9301 is being held in the left hand and will be brought into contact with the left ear, and such a display is therefore carried out for urging that the left-side corner part 8226 be brought into contact with the left ear. In similar fashion to FIG. 150(C), the left-corner instructional display 9305*c* is a graphic display indicating the left-side corner part 8226 that is to be brought to the ear.

FIG. 151 is a flowchart showing the function of the control unit 2439 in the block view of the twenty-sixth embodiment of FIG. 26 called on in the ninety-seventh embodiment of FIG. 150. To facilitate understanding, the flowchart of FIG. 151 mainly illustrates an abstraction of the usage guidance function, and the ordinary functions of the mobile telephone 9301 are omitted. Therefore, various other related functions operating in parallel with and before and after the functions illustrated in FIG. 151 are present in the ninety-seventh embodiment.

The flow of FIG. 151 starts when the main power source provided is turned on, and in Step S532, initial startup and a function check of each unit are performed, as well as initiating screen display on the large-screen display unit 8205. Next, in Step S534, the cartilage conduction basic instructional display 9305*a* is shown, and this is continued while the routine advances to Step SS536 and performs a check of whether five seconds have elapsed. If five seconds have not elapsed, the routine returns to Step S534, Step S534 and Step S536 are repeated and display is continued. On the other hand, when it has been detected that five seconds have elapsed in Step S536, the routine advances to Step S538 and the cartilage conduction basic instructional display 9305*a* is stopped.

Next, in Step S540, a check is performed to determine whether a predetermined number of days (e.g., two weeks)

have elapsed since the start of usage of the mobile telephone 9301; if two weeks have not elapsed, a check is performed in Step S542 to determine whether a function history applicable to guidance stoppage has been stored away, and when there is no applicable history, the routine advances to Step S544. The details of applicable history for guidance stoppage are later described. In Step S544, a check is performed to determine whether a call operation has been made, and if no such operation has been made, the routine advances to Step S546 to check whether there has been an incoming call. When there has been an incoming call, the routine advances to Step S548. Also, when a call operation has been detected in Step S544, the routine advances to Step S548. At this point, a call has not yet started, the mobile telephone 9301 has not been brought up to the ear, and the user is viewing the large-screen display unit 8205.

Next, in Step S548, a check is performed to determine whether the mobile telephone 9301 is tilted leftward on the basis of the acceleration of gravity detected by the acceleration sensor 49 (see FIG. 42). If there is not leftward tilt, the routine advances to Step S550, and a check is performed in similar fashion to determine whether the mobile telephone 9301 is tilted rightward on the basis of the acceleration sensor 49. If there is no rightward tilt, the routine advances to Step S552, the cartilage conduction basic instructional display 9305*a* is performed in the same manner as in Step S534, and the routine advances to Step S554.

On the other hand, when a leftward tilt of the mobile telephone 9301 is detected in Step S548, the routine advances to Step S556, the left-corner instructional display 9305*c* (see FIG. 150(D)) is performed, and the routine advances to Step S554. Similarly, when a rightward tile of the mobile telephone 9301 is detected in Step S550, the routine advances to Step S556, the right-corner instructional display 9305*b* (see FIG. 150(C)) is performed, and the routine advances to Step S554.

In Step S554, a check is performed to determine whether conditions have been satisfied for stopping instructional display started in Step S552, Step S556, or Step S558, and when the conditions have not been satisfied, the routine advances to Step S548, and Steps S548 to S558 are thereafter repeated until the conditions are satisfied. If tilting is detected during this repetition, the routine advances from the cartilage conduction basic instructional display 9305*a* to the left-corner instructional display 9305*c* of FIG. 150(D) or the right-corner instructional display 9305*b* of FIG. 150(C). The user is able to view the instructional display and suitably judge the angle for bringing the mobile telephone into contact with the ear.

Although omitted from the illustration in FIG. 151 to avoid complexity, when the instructional display is being performed in Step S552, Step S556, or Step S558, an audio instructional announcement of the same content is made from the videoconferencing speaker 51 in coordination therewith. It is also possible to set a silence mode in which such audio is not produced. Such audio guidance from the videoconferencing speaker 51 is stopped at the same time that the corresponding display on the large-screen display unit 8205 is stopped.

In contrast, when it has been detected that instructional display stoppage conditions have been satisfied in Step S554, the routine advances to Step S560, instructional announcement processing and control processing are executed, and the routine advances to Step S562. The processing of Step S560 stops the instructional display, controls the cartilage conduction instructional announcement by cartilage conduction from the upper frame 8227, and furthermore performs guidance control processing such as processing of guidance stoppage applicable history. The details thereof are later described.

The routine immediately advances to Step S562 when it has been detected that a predetermined number of days has elapsed from the start of usage of the mobile telephone 9301 in Step S540, when it has been detected that guidance stoppage applicable history has been stored in Step S542, or when an incoming call has been detected in Step S546. In other words, instructional display is not performed in any of these cases. Unneeded long-term display is bothersome to a disinterested user, and it is appropriate to avoid providing guidance when there is guidance stoppage applicable history, and furthermore, it is not timely to perform guidance when a call is not about to occur.

A check is performed to determine whether an operation has been performed in Step S562 to turn off the main power source, and if such an operation has occurred, the flow ends. On the other hand, if it has been detected that an operation has been performed in to turn off the main power source, the routine returns to Step S540, repeats Step S540 to Step S562, and performs guidance control that corresponds to conditions. On the other hand, when an operation for turning off the main power source has been detected in Step S562, the flow ends.

FIG. 152 is a flowchart showing the details of step S554 and step S560 shown in bold in FIG. 151. When the routine arrives at Step S554 in FIG. 151, the flow of FIG. 152 starts, and a check is performed in Step S572 to determine whether an operation has been manually performed to stop instructional display using the touch panel 2468 (see FIG. 42) provided to the large-screen display unit 8205. This operation is performed in order to delete an unneeded display for a user who has understood the guidance or who has no interest in the guidance. If there is no such operation, the routine advances to Step S574, and a check is performed by the proximity sensor (19, 20, 21) to determine whether the mobile telephone 9301 has been brought to the ear. When such is not detected, the routine returns to Step S548 of FIG. 15. Thus, Step S572 and Step S574 of FIG. 152 correspond to the detailed contents of a check of the instructional display stoppage conditions in Step S554 of FIG. 151.

When a proximity detection has been made in Step S574, the flow advances to Step S576. Step S576 and thereafter corresponds to the detailed contents of Step S560 of FIG. 151. In Step S576, a check is performed to determine whether the cartilage conduction function has been used in a normal manner. Specifically, a check is performed to determine whether the right-side corner part 8224, the left-side corner part 8226, or the center part thereof of the mobile telephone 9301 has been brought to the ear by the determination of the output of the proximity sensor (19, 20, 21), and when the right-side corner part 8224 or the left-side corner part 8226 has been brought to the ear, a detection is made as to whether this matches correct corner part (the right-side corner part 8224 during a right tilt or the left-side corner part 8226 during a left tilt) indicated by the tilting detected by the acceleration sensor 49. When a normal usage state has not been detected, the flow advances to Step S578.

In Step S578, a check is performed to determine whether the mobile telephone 9301 is tilted leftward on the basis of gravity acceleration detected by the acceleration sensor 49. If there is no leftward tilt, the routine advances to Step S580, and a check is similarly performed to determine whether the mobile telephone 9301 is tilted rightward on the basis of the acceleration sensor 49. If there is no rightward tilt, the routine advances to Step S582, a cartilage conduction basic instructional announcement having the same content as in Step S552 of FIG. 151 is performed by cartilage conduction from the upper frame 8227. The state arrived at in Step S578 is the case in which the mobile telephone 9301 has been brought to the ear, and therefore, the routine does not ordinarily arrive at Step S582, and Step S582 for announcing general information is provided because so that errant information is not announced when leftward tilt and rightward tilt cannot be judged by a special way the mobile telephone 9301 is brought to the ear.

On the other hand, when a leftward tilt of the mobile telephone 9301 has been detected in Step S578, the routine advances to Step S586, a left-corner instructional announcement (e.g., same text as displayed in FIG. 150(D)) is made by cartilage conduction from the upper frame 8227, and the routine advances to Step S584. In similar fashion, when a rightward tilt of the mobile telephone 9301 has been detect in Step S580, the routine advances to Step S588, a right-corner instructional announcement (e.g., same text as displayed in FIG. 150(C)) is made by cartilage conduction from the upper frame 8227, and the routine advances to Step S584.

In Step S584, a check is performed to determine whether a call has been started by response by another party to a call or by an operation to respond an incoming call, and if a call has not been started, the routine advances to Step S576, and the routine thereafter repeats Step S576 to Step S584 as long as a call start has been detected in Step S584 or normal usage is not detected in Step S576. If the manner in which the mobile telephone is brought to the ear has been modified during this repetition and a state of normal usage is detected, instructional announcement is stopped as described below, and when tilting has been detected, a specific announcement of the angle to be used is started. Furthermore, if the mobile telephone is switched between left and right, the angle indicated in the announcement is modified. The user using the wrong manner of contact can thereby become aware of the correct manner of contact against the ear.

On the other hand, an instructional announcement is stopped even when the manner of contact is not correct when a call start is detected in Step S584. This is to ensure that an instructional announcement does not interfere with a call. Furthermore, the routine advances to Step S592, instructional display started in Steps S552, S556, S558 of FIG. 151 is stopped, and the routine advances to Step S562 of FIG. 151. At this point, when an instructional announcement is in progress from the videoconferencing speaker 51, this instructional announcement is also stopped.

In the flow of FIG. 152, the instructional display is continued until the routine arrives at Step S592, and there is no problem even were the display to be continued up until the start of a call when the mobile telephone 9301 is in contact with the ear. Also, if an instructional announcement from the videoconferencing speaker 51 is in progress, this instructional announcement is also continued in similar fashion until a call is started, and there is no problem because the announcement is of the same content synchronized with that being provided by cartilage conduction from the upper frame 8227. Since an instructional display as described above and an instructional announcement from the videoconferencing speaker 51 are not particularly required when the mobile telephone 9301 is in contact with the ear, and a step for stopping instructional display similar to Step S592 may be furthermore inserted between Step S574 and Step S579.

On the other hand, when normal usage of the cartilage conduction function has been performed in Step S576, the instructional announcement is stopped in Step S594 and the routine advances to Step S596. At this point, when the routine has arrived at Step S574 from Step S576 without going through Step S582, Step S586, or Step S588, the original instructional announcement is not being performed, and the routine therefore performs no action in Step S594 and advances to Step S596. The routine also advances to Step S596 when it has been detected in Step S572 that an operation for stopping the instructional announcement has been performed manually.

In Step S596, the operation of Step S572 or the detection of Step S576 are recorded as history corresponding to guidance stoppage, and the routine advances to Step S592. The history recorded in Step S596 is checked in Step S542 of FIG. 151, and when these histories have been detected, the routine immediately arrives at step S562 from step S542 in FIG. 151 as previously described, and the instructional display and instructional announcement are no longer performed.

Ninety-eighth Embodiment

FIG. 153 is a cross-sectional view and a block view related to a ninety-eighth embodiment according to an aspect of the present invention, and is configured as a stereo headphone system 9481. The ninety-eighth embodiment is based on the ninety-first embodiment of FIG. 141, and therefore descriptions of elements common to both are omitted and focus is placed on the description of the elements being added. In the block view of FIG. 153(A), a right-ear cartilage conduction unit 8524 and a left-ear cartilage conduction unit 8526, which are provided with a passage hole 8524*a* and a passage hole 8526*a*, respectively, in the center, can be connected to an external output jack 9446 of a mobile music player 9484 by a plug 9485. An amplifier, a power source, and the like are not provided between the plug 9485 and the right-ear cartilage conduction unit 8524 and the left-ear cartilage conduction unit 8526, and the right-ear cartilage conduction unit 8524 and the left-ear cartilage conduction unit 8526 a driven by the output power of the external output jack 9446 so as to produce the required cartilage conduction.

The mobile music player 9484 outputs a stereo sound source to the right-ear cartilage conduction unit 8524 and the left-ear cartilage conduction unit 8526 in the same manner as the sound signal source unit 8584 of FIG. 141. The mobile music player 9484 is provided with a short-range data communication unit 9487 based on Bluetooth (registered trademark) or the like, and is linked with an external ordinary mobile telephone. When an incoming call signal is received in the external ordinary mobile telephone, the input signal to the stereo amplifier 8540 is switched from the music signal from the acoustic processing circuit 8538 to the incoming call signal of an incoming call sound source 9466, and notification of the incoming call is provided. The short-range data communication unit 9487 receives a call operation signal or a response to a call, and stops output from the stereo amplifier 8540 to the left-ear cartilage conduction unit 8526 using a switch 8540*a*. An ordinary mobile telephone can thereby be brought to the left ear for a call by air conduction from the passage hole 8526*a*. In FIG. 153, only a configuration for stopping output to the left-ear cartilage conduction unit 8526 is shown for simplification, but it is possible to provide a similar configuration for stopping output to the right-ear cartilage conduction unit 8524 and setting in advance the output of the right-ear cartilage conduction unit 8524 or the left-ear cartilage conduction unit 8526 to be stopped, and thereby stop output from the cartilage conduction unit of the one ear side that is brought to the ear during ordinary mobile telephone usage, to carry out a call by air conduction without by obstructed thereby.

The ninety-eighth embodiment of FIG. 153 can be given an even simpler configuration as required. First, the shutter 8558 and the shutter drive unit 8557 described in the ninety-first embodiment of FIG. 141 can be omitted, and doing so further simplifies the configuration of the right-ear cartilage conduction unit 8524 and the left-ear cartilage conduction unit 8526 having the passage holes 8524*a* and 8526*a*. In this case, in accordance therewith, the shutter control unit 9439 of the mobile music player 9484 (corresponding to the shutter control unit 8539, the noise detection unit 8538, and the manually-operated unit 8509 of the ninety-first embodiment of FIG. 141) are also omitted. It is furthermore possible to also omit the short-range data communication unit 9487, the incoming call sound source 9466, and the switch 8540*a*. This is because the right-ear cartilage conduction unit 8524 and the left-ear cartilage conduction unit 8526 of the ninety-eighth embodiment of FIG. 153 have passage holes 8524*a* and 8526*a*, respectively, and since sound in the area can be heard by air conduction from the passage holes 8524*a* and 8526*a* while listening to music by cartilage conduction, having the user concentrate on a desired sound allows the user to be aware of an incoming call of an external mobile telephone, and it is not impossible to bring an ordinary mobile telephone to the ear for a call. In contrast, since the ears are covered or blocked using, e.g., ordinary stereo headphones or stereo earphones, it is not possible to be aware of incoming call sounds from an external mobile telephone, and the headphone or earphone of at least one of the ears must be removed in order to carry out a call using an ordinary mobile telephone.

FIG. 153(C) is a side view of a modification of the ninety-eighth embodiment. FIG. 153(A), and FIG. 153(B), which is an enlarged view of the principal components thereof, are a configuration for bringing the right-ear cartilage conduction unit 8524 and the left-ear cartilage conduction unit 8526 into contact with the entrance to the external auditory meatus 30*a* using the head arm, and FIG. 153(C) is a configuration for fitting the cartilage conduction unit 9424 into the space between the inner side of the tragus 32 and the anthelix 28*a*. Only the right ear 28 is illustrated for simplicity, but FIG. 153(C) is also a stereo type. As is clear from FIG. 153(C), the cartilage conduction unit 9424 for the right ear of the modification has a passage hole 9424*a* that substantially matches the entrance of the external auditory meatus 30*a*.

FIG. 154 is a table showing measurement values of the ninety-eighth embodiment. Measurements were carried out by connecting the stereo cartilage unit in the modification of FIG. 153(C) to the mobile music player 9484 of FIG. 153(A). The "Output Voltage (mVrms)" shown in FIG. 154 is the root-mean-square value (the half-wave peak height when viewed with an oscillograph divided by the square root) of when the output of the external output jack 9446 in an unloaded state is measured using a voltmeter while the volume of the stereo amplifier 8540 is modified. Measurement was carried out by generating a pure sound of 1 kHz. As is clear from FIG. 154, the root-mean-square value of the maximum output of the mobile music player 9484 of the ninety-eighth embodiment is one volt.

The "Vibration Acceleration (dB)" of FIG. 154 is the vibration acceleration on the outer side of the tragus when the cartilage conduction unit 9424 is connected to the mobile music player 9484 having an output capacity such as that described above and vibrations are transmitted from the inner side of the tragus. The decibel reference value in FIG. 154 is $10^{-6}$ m/sec$^2$. This is also a measurement of the vibration acceleration obtained while generating a pure sound of 1 kHz from the stereo amplifier 8540 and modifying the volume. The vibration source of the cartilage conduction unit 9424 used for measurement was a 0.8-μF piezoelectric bimorph element, and a voltage substantially equal to the voltage of the external output jack 9446 measured in an unloaded state can be deemed to be inputted to the piezoelectric bimorph element in a connected state.

The "Psychological Responses" of FIG. 154 were obtained from a study of healthy subjects using, as an example, the manner in which measurement values such as those noted above sound to an actual person (these results must be judged with consideration given to variability in individual differences). As shown in "Psychological Responses" of FIG. 154, the audible threshold value when a pure sound of 1 kHz is generated from the stereo amplifier 8540 is 14.6 dB and corresponds to a volume level of 25 of the stereo amplifier 8540 (in this case, it can be considered that an effective voltage of about 3.3 mV substantially equivalent to the output voltage from the stereo amplifier 8540 is inputted to the piezoelectric bimorph element). Therefore, a pure sound of 1 kHz produced by cartilage conduction can be heard as a larger noise when the input voltage is increased above this level.

Next, music (pop music) was outputted from the stereo amplifier 8540 and the level that can be comfortably heard by cartilage conduction (a state perceived as being not too loud and not too quiet) was studied. As shown in "Psychological Responses" of FIG. 154, the subjects responded that music can be comfortably heard when the volume level of the stereo amplifier 8540 is set to 4 (in this case, it can be considered that an effective voltage of about 400 mV substantially equal to the output voltage from the stereo amplifier 8540 is inputted to the piezoelectric bimorph element).

It is possible to consider that comfortably listening to music is possible with a combination of a sound source device having a maximum output to the exterior of 500 mVrms or more and a cartilage conduction unit that achieves a vibration acceleration of 50 dB (reference value=$10^{-6}$ m/sec$^2$) or more to the rear surface side of the tragus when there is input of 200 mVrms by connection to an external output of the sound source device.

FIG. 155 is a circuit diagram showing the details of a combination circuit of a voltage booster circuit and an analog output amplifier that can be used in the seventy-fourth embodiment and the seventy-fifth embodiment shown in FIG. 114 and FIG. 115. The circuit shown in FIG. 115 can be used as a part of an IC of the driver circuit 7003 in the seventy-fourth embodiment or the driver circuit 7103 in the seventy-fifth embodiment, and may be constituted as a stand-alone IC. In FIG. 155, identical components have been assigned the same reference numerals as in FIGS. 114 and 115, and a description thereof is omitted.

In the seventy-fourth embodiment and the seventy-fifth embodiment, a charge pump circuit is illustrated as the voltage booster circuit 7054, but a switching regulator is used as the voltage booster circuit unit in the circuit of FIG. 155. Specifically, the voltage booster circuit in FIG. 155 is composed of a switching regulator configured from a switching control unit 7054*b*, an inductance 7054*c*, a diode 7054*d*, a capacitor 7054*e*, and the like. An output voltage of 15 volts is generated in an output unit 7054*f* on the basis of the voltage fed from a power management circuit 7053. Also, a reference voltage output unit 7054*g* divides the voltage of the output unit 7054*f* using 100 kΩ resistances to generate a reference voltage 7054*g* for amplifier output.

Also, 15 volts of the output unit 7054*f* is applied to the power supply (VCC) of an analog amplifier unit 7040. The reference voltage 7054*g* is applied to a non-inverted input of CH1 of the analog amplifier unit 7040. An audio signal from the acoustic processing unit 7038 (corresponding to the AD conversion circuit 7138*a*, the digital acoustic processing circuit 7138, and the DA conversion circuit 7138*b* in the case of the seventy-fifth embodiment) is inputted to the inverted inputs of CH2 and CH4 of the analog amplifier unit 7040. An audio signal is outputted from the outputs of CH2 and CH4 of the analog amplifier unit 7040, and drives the piezoelectric bimorph element 7013. An enable signal from the control terminal 7003*a* is inputted to the enable terminals (ENB) of the switching control unit 7054*b* and analog amplifier unit 7040, the switching control unit 7054*b* and the analog amplifier unit 7040 are set in an active state when the piezoelectric bimorph element 7013 is driven, and the functioning of the switching control unit 7054*b* and the analog amplifier unit 7040 are stopped when vibrations of the piezoelectric bimorph element 7013 are stopped (videoconferencing mode and the like).

Ninety-ninth Embodiment

FIG. 156 is a diagram of the system of a ninety-ninth embodiment according to an aspect of the present invention. The ninety-ninth embodiment is configured as a headset 9581, which is an outgoing-talk/incoming-talk unit for a mobile telephone, in the same manner as the eighty-ninth embodiment of FIG. 139, and constitutes a mobile telephone system together with an ordinary mobile telephone 1401. The ninety-ninth embodiment of FIG. 156 has much in common with the eighty-ninth embodiment of FIG. 139, and therefore parts that are in common have been given like reference numerals, and a description thereof has been omitted.

The ninety-ninth embodiment of FIG. 156 differs from the eight-ninth embodiment of FIG. 139 in that an elongation unit 9582*b* for making contact with the front side (the opposite side of the entrance 232 to the external auditory meatus) of the tragus 32 is provided to the ear-hooking unit 9582. As shown in FIG. 156(A), the rear inner edge 9582*a* of the ear-hooking unit 9582 thereby makes contact with the rear part (the mastoid process side of the auricle attachment region) of the outer side 1828 of the cartilage of the base of the ear 28, the elongation unit 9582*b* makes contact with the front side of the tragus 32, and the cartilage around the entrance 232 to the external auditory meatus is sandwiched between the two.

This state is significant in two ways. First, the configuration is such that the cartilage of the ear is sandwiched from the outer side of the ear 28 in front of and behind the entrance 232 to the external auditory meatus as described above, and wearing is therefore stable and the ear-hooking unit 9582 makes stable contact with suitable pressure on the rear part (the mastoid process side of the auricle attachment region) of the outer side 1828 of the cartilage of the base of the ear 28 and the front side of the tragus 32. In other words, the elongation unit 9582*b* serves as a support for bringing the rear inner edge 9582*a* of the ear-hooking unit 9582 into contact with the rear part (the mastoid process side of the auricle attachment region) of the outer side 1828 of the cartilage of the base of the ear 28, and conversely, the rear inner edge 9582*a* of the ear-hooking unit 9582 serves as a support for bringing the elongation unit 9582*b* into contact with the front side of the tragus 32. Additionally, since the ear 28 is sandwiched between from the front and rear on the outer side, there is nothing covering the entrance 232 to the external auditory meatus. Therefore, it is obvious that air-conducted sound from the exterior is not obstructed from entering the ear, and, e.g., even if it appears that the ear is covered as in the ninety-eighth embodiment of FIG. 153, as long as there is a passage hole, it is possible to avoid trouble with persons who are not aware of the fact that air-conducted sound from the exterior can be sufficiently heard, and to avoid contradictions with regulations or the like that do not envision such a fact.

Second, the rear part (the mastoid process side of the auricle attachment region) of the outer side 1828 of the cartilage of the base of the right ear 28 and the front side of the tragus 32 are both locations in which good cartilage conduction can be obtained, and contact parts for sandwiching the ear 28 from the front and rear in order to ensure holding both pressure function as cartilage conduction parts. In other words, the vibrations of piezoelectric bimorph element 8325 transmitted to the holding part 8325*a* shown in FIG. 156(B) are conducted through the ear-hooking unit 9582 itself and are transmitted to the rear inner edge 9582*a* and elongation unit 9582*b* thereof. That vibrations are transmitted from the holding part 8325*a* to the elongation unit 9582*b* can be understood from the fact that, e.g., vibrations of the right-ear cartilage conduction unit 6124 are transmitted to the left-ear cartilage conduction unit 6126 via the linking unit 6127 in the sixty-fifth embodiment of the FIG. 97. In other words, the portion between the rear inner edge 9582*a* and the elongation unit 9582*b* in the ear-hooking unit 9582 constitutes the linking unit for transmitting vibrations therebetween.

As shown in FIG. 156(B), the direction of vibrations of the piezoelectric bimorph element 8325 is the direction that crosses the center axis of the entrance 232 to the external auditory meatus as indicated by the arrow 8325*b* (corresponding to the substantially anterior-posterior direction of the face). In an embodiment of the mobile telephone, the direction of vibrations of the piezoelectric bimorph element 8325 is advantageously set to be the direction along the center axis of the entrance 232 to the external auditory meatus (corresponding to the lateral direction of the face and the direction in which sound enters from the exterior), whether the mobile telephone is brought to the ear in a state such as FIG. 2 or whether the mobile telephone is brought to the ear in a state such as FIG. 21. However, when vibrations from the rear part (the mastoid process side of the auricle attachment region) of the outer side 1828 of the cartilage of the base of the ear 28 and the front side or the like of the tragus 32 are to be transmitted in the manner described above, it is advantageous to set the direction of vibrations of the piezoelectric bimorph element 8325 to be the direction that crosses the center axis of the entrance 232 to the external auditory meatus (corresponding to the substantially anterior-posterior direction of the face).

FIG. 157 is a side view of the ear-hooking unit in the various modifications of the ninety-ninth embodiment shown in FIG. 156. As shown in FIG. 156(A), the ninety-ninth embodiment is configured so that the rear inner edge 9582*a* of the ear-hooking unit 9582 makes contact with the rear part (the mastoid process side of the auricle attachment region) of the outer side 1828 of the cartilage of the base of the ear 28, the elongation unit 9582*b* makes contact with the front side of the tragus 32, and the cartilage around the entrance 232 to the external auditory meatus is sandwiched by the two. In this case, the distance between the front side of the tragus 32 and the rear part of the outer side 1828 of the cartilage of the base of the ear 28 differs depending on age, sex, and other individual differences. Therefore, in the ninety-ninth embodiment, the configuration is such that a plurality of sizes is prepared and customers select a size that fits. In contrast, the modification of FIG. 157 is configuration so that the distance is variable, allowing use by anyone.

Described more specifically, FIG. 157(A) is a first modification of the ninety-ninth embodiment, and the ear-hooking unit 9582 overall is composed of an elastic body 9582*c*. The elongation unit 9582*b* can thereby elastically open as indicated by the arrow 9582*d*, and the ear-hooking unit 9582 can be fitted so that the rear inner edge 9582*a* of the ear-hooking unit 9582 makes contact with the rear part (the mastoid process side of the auricle attachment region) of the outer side 1828 of the cartilage of the base of the ear 28, and the elongation unit 9582*b* makes contact with the front side of the tragus 32. As described in the fifth embodiment of FIG. 11 to the tenth embodiment of FIG. 19 and elsewhere, the use of an elastic material that has acoustic impedance approximating that of ear cartilage allows vibrations to be transmitted by the elastic body to the elongation unit 9582*b*.

FIG. 157(B) is a second modification of the ninety-ninth embodiment. The ear-hooking unit 9582 overall is composed of a material having ordinary hardness and has a soft structure 9582*f* for narrowing or otherwise reducing the space between the rear part 9582*e* and the elongation unit 9582*b*, and the elongation unit 9582*b* can thereby be elastically opened as indicated by the arrow 9582*d*. Also, the soft structure 9582*f* is a linking unit for transmitting vibrations. The soft structure 9582*f* is filled with an elastic body 9582*g* in order to reinforce the soft structure 9582*f* and obtain a smooth appearance.

FIG. 157(C) is a third modification of the ninety-ninth embodiment. The ear-hooking unit 9582 overall is composed of a material having ordinary hardness, the rear part 9582*e* and the elongation unit 9582*b* are rotatably linked with a rotating shaft 9582*h*, and adding a spring to the rotating shaft 9582*h* portion endows the elongation unit 9582*b* with elasticity in the clockwise direction as viewed above the drawing. The elongation unit 9582*b* can thereby elastically open as indicated by the arrow 9582*d*. Also, the joining part produced by the rotating shaft 9582*h* serves as a linking part for transmitting vibrations.

FIG. 157(D) is a fourth modification of the ninety-ninth embodiment and has essentially the same configuration as the third modification of FIG. 157(C), so the principal components are illustrated in an enlarge fashion. The fourth modification of FIG. 157(D) is configured so that the rotating shaft 9582*i* can be rotatably adjusted with a slotted screwdriver, this rotation makes it possible to adjust, in the clockwise direction as viewed from above the drawing, the strength of the elasticity of the elongation unit 9582*b* produced by the spring. Adjustment can thereby be carried out so that a suitable contact pressure can be obtained regardless of individual differences. An indicator 9582*j* is provided to the rotating shaft 9582*i*, and the indicator is aligned with a scale 9582*k*, whereby contact pressure can be visually confirmed. This allows the contact pressure on either ear to be adjusted, and by aligning the indicator 9582*j* to the same scale 9582*k* as the firstly adjusted ear, the contact pressure on the left and right can be adjusted so as to be the same when audio information is to be heard in stereo by cartilage conduction by wearing the same ear-hooking units on the left and right ears. Naturally, it is also possible to make adjustments so that the left and right contact pressures are different in accordance with preference. In this case as well, the scale 9582*k* and the indicator 9582*j* serve as adjustment references.

The various features of each of the embodiments described above are not limited to individual embodiments, but rather can be substituted or combined, as appropriate, with features from other embodiments. For example, when vibrations are to be transmitted from the mastoid process side of the auricle attachment region or the front side of the tragus, or elsewhere, providing a configuration in which the direction of vibration of the cartilage conduction vibration source is the direction that crosses the center axis of the entrance to the external auditory meatus (corresponding to the substantially anterior-posterior direction of the face) is not limited to the case in which the cartilage vibration source is the piezoelectric bimorph element 8325 as in the ninety-ninth embodiment, and such a configuration is also advantageous when an electromagnetic vibrator is used as the cartilage conduction vibration source.

One-hundredth Embodiment

FIG. 158 perspective view and a cross-sectional view of a one-hundredth embodiment according to an aspect of the present invention, and is configured as a mobile telephone 9601. Excluding the structure and arrangement of the cartilage conduction vibration source composed of a piezoelectric bimorph element, the one-hundredth embodiment is the same as the forty-sixth embodiment shown in FIG. 69, and illustration other than the required portions will be omitted the description, and the same reference numerals are used for the common portions in the illustration portions, omitting descriptions unless necessary.

As shown in FIG. 158(A), elastic body units 4263*a*, 4263*b*, 4263*c*, and 4263*d* that serve as protectors are provided to the mobile telephone 9601 of the one-hundredth embodiment in the same manner as the forty-sixth embodiment of FIG. 69. Also, the inner side of the elastic body units 4263*a*, 4263*b* in the upper two corners double as units for holding a piezoelectric bimorph module 9625, and the outer side of the elastic body units 4263*a*, 4263*b* double as cartilage conduction units that make contact with the ear cartilage.

The mobile telephone 9601 of the one-hundredth embodiment differs from the forty-sixth embodiment of FIG. 69 in terms of the structure of the piezoelectric bimorph module 9625 held on the inner side of the elastic body units 4263*a*, 4263*b* in the upper two corners. As shown in FIG. 158(B), in the piezoelectric bimorph module 9625, the two ends of a metal plate 9697 protrudingly extend outward from a package unit 9625*a*. These extended two end parts of the metal plate 9697 are bent parts 9697*a*, 9697*b* and support parts 9697*c*, 9697*d*. A vibration unit 9625*b* and a circuit unit 9636 are sealed inside the package unit 9625*a*. Also, the package unit 9625*a* has a minimum required thickness for protecting the vibration unit 9625*b* and the circuit unit 9636, and the vibration unit 9625*b* of the piezoelectric bimorph module 9625 has an extremely thin shape. Thus, the piezoelectric bimorph module 9625 of the one-hundredth embodiment is a module component in which circuit portions have been sealed in a package. The piezoelectric bimorph module 9625 is a thin component in the longitudinal direction of the mobile telephone 9601 as described above, and as shown in the cross section of the support part 9697*d* of FIG. 158(C), the metal plate 9697 and the vibration unit 9625*b* are given adequate width in the vertical direction, ensuring the vibration power and strength of the metal plate 9697.

The piezoelectric bimorph module 9625 is configured so as to be supported by a metal plate 9697 bent in the manner described above, and holding the support parts 9697*c*, 9697*d* in substantially the center of the inner side of the elastic body units 4263*a*, 4263*b* in the manner shown in FIG.

158(B) makes it possible to bring the thin package unit 9625*a* including the vibration unit 9625*b* into an arrangement near to the front surface side (the GUI display unit 3405 side) of the upper part of the mobile telephone 9601, and to ensure layout space 9601*a* for arranging other components in the upper part of the mobile telephone 9601. Even when the metal plate 9697 has such a bent structure, vibrations of the vibration unit 9625*b* are transmitted from the support parts 9697*c*, 9697*d*, which are the end parts of the metal plate, to the elastic body units 4263*a*, 4263*b*, respectively, and the elastic body units 4263*a*, 4263*b* can be made to function as suitable cartilage conduction units. Acoustic characteristics for cartilage conduction are designed on the basis of the behavior of the vibration of the structure overall in which both ends of the piezoelectric bimorph module 9625 are supported on such elastic body units 4263*a*, 4263*b*. Acoustic characteristics are adjusted as required using an equalizer function of the circuit unit 9636 as described below.

Since the vibration unit 9625*b* becomes closer to the ear when the package unit 9625*a* is brought into an arrangement near to the front surface side of the upper part of the mobile telephone 9601, air-conducted sound generated from the vibration unit 9625*b* can be heard better from the front surface side of the upper part of the mobile telephone 9601, and in the event that conventional listening is used in conformance with FIG. 137(B), the voice of another party can be heard together with air conduction. When designing with such an intention, a hole for passing air-conducted sound may be provided to the front surface side of the upper part of the mobile telephone 9601.

Depending on the design of the mobile telephone 9601, the piezoelectric bimorph module 9625 may be in an upside down arrangement to thereby allow the package unit 9625*a* to be brought into an arrangement close to the rear surface side of the upper part of the mobile telephone 9601, and this configuration also ensures layout space for arranging other components in the upper part of the mobile telephone 9601. This arrangement allows for a layout in which the package unit 9625*a* does not interfere with an in-camera or other component arranged on the front surface side of the mobile telephone 9601.

FIG. 159 is a schematic cross-sectional view and a circuit diagram showing the details of the structure of the piezoelectric bimorph of the one-hundredth embodiment shown in FIG. 158. The same reference numerals are used for the same portions as in FIG. 158, omitting descriptions unless necessary. FIG. 159(A) is a schematic cross-sectional view for describing the structure of principal components of the piezoelectric bimorph module 9625, and the intermediate portion of the vibration unit 9625*b* constituting a majority of the length has the same structure as the two end portions, and a description thereof is omitted in the interest of saving space in the enlarged drawing. The vibration unit 9625*b* shown in FIG. 158 corresponds to piezoelectric ceramic plates 9698, 9699 laminated to both sides of the metal plate 9697 in FIG. 159. The piezoelectric ceramic plates 9698, 9699 are extremely thin in the anterior-posterior direction of the mobile telephone 9601, yet the support part 9697*d* of the metal plate 9697 shown in FIG. 158(C) has adequate thickness in the vertical direction.

The circuit unit 9636 is insulated and mounted on the metal plate 9697, the metal plate 9697 serving as a shared electrode of the piezoelectric ceramic plates 9698, 9699 is connected to the circuit unit, and opposing electrodes 9698*a*, 9699*a* of the piezoelectric ceramic plates 9698, 9699 are collectively connected to the circuit unit. An insulated through-hole 9697*e* is provided in the metal plate 9697 in order to connect the opposing electrode 9698*a* to the opposing electrode 9698*b*. The package unit 9625*a* covers these structures with a minimum required thickness for protection, and the piezoelectric bimorph module 9625 has an extremely thin shape. Four terminals 9636*a* (for power supply and sound signal input) extend from the circuit unit 9636 and are exposed from the package unit 9625*a*. Collectively arranging the four terminals 9636*a* inside (the side to which the bent parts 9697*a*, 9697*b* extend) the piezoelectric bimorph module 9625 as shown in FIG. 159(A) is advantageous in terms of mounting.

FIG. 159(B) is a circuit diagram of the circuit unit 9636, and the four terminals 9636*a* of FIG. 159(A) correspond to power supply terminals Vcc, G and sound signal input terminals IN1, IN2, respectively in FIG. 159(B). The power supply terminal Vcc and ground terminal G supply power voltage to an acoustic processing circuit 9638 and a voltage booster circuit 9654, and the voltage booster circuit 9654 supplies boosted power to an amplifier 9640. The acoustic processing circuit 9638 is provided with an EEPROM 9638*a* for storing constants or processing tables for equalization for obtaining vibrations as an adequate cartilage conduction vibration source. These constants or processing tables are essentially written to the EEPROM 9638*a* at the time of shipment of the piezoelectric bimorph module 9625, but may also be written after having been assembled in the mobile telephone 9601. Sound signals inputted from the input terminals IN1, IN2 to the acoustic processing circuit 9638 are inputted to the amplifier 9640 after acoustic processing, and are each outputted from the output terminals OUT1, OUT2 of the amplifier 9640 to the metal plate 9697 serving as the shared electrode and the opposing electrodes 9698*a*, 9699*a*.

Figures 160A, 160B, 160C, 160D, 160E:
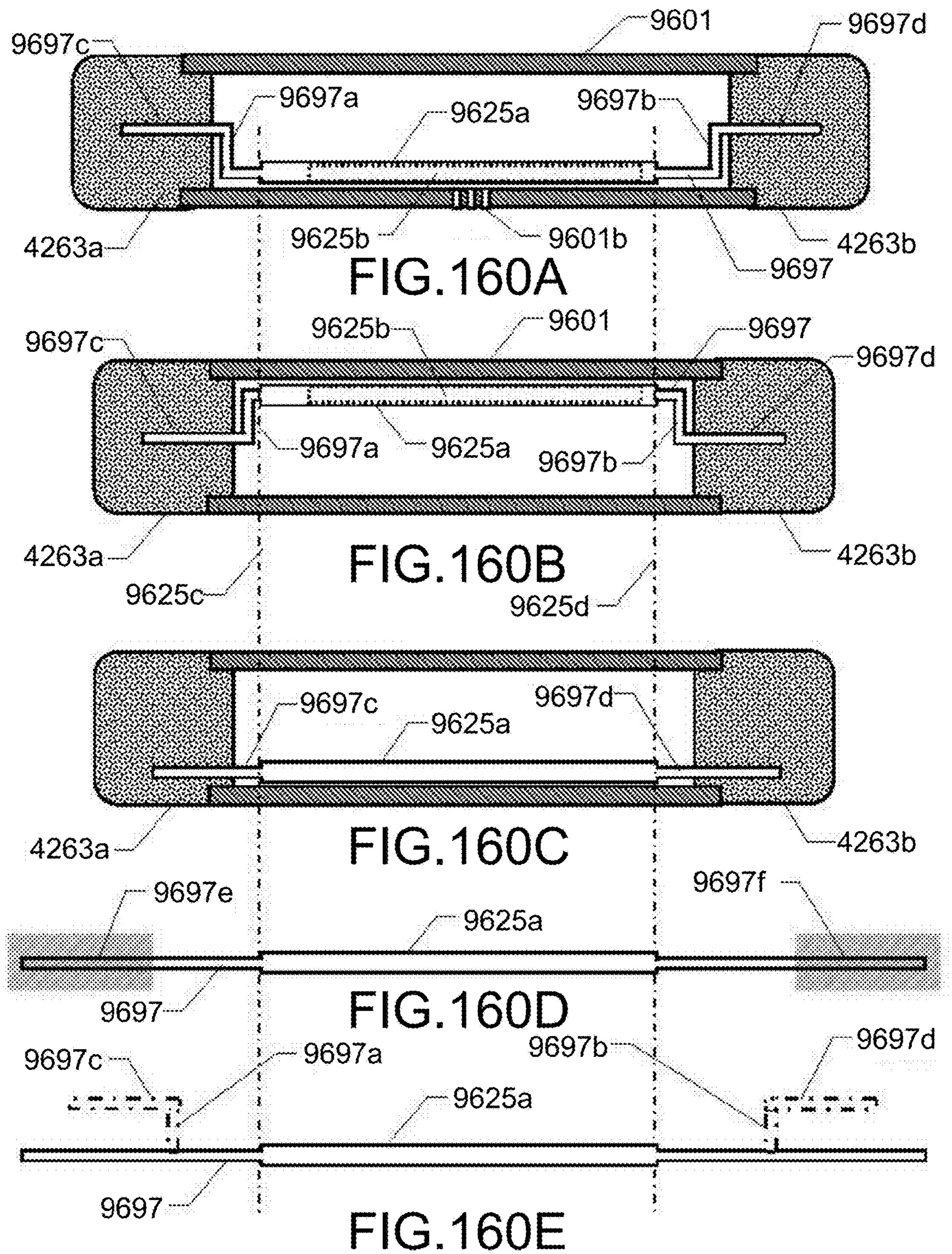

FIG. 160 is cross-sectional view for describing the configuration for mass-producing the piezoelectric bimorph module in the one-hundredth embodiment. The same reference numerals are used for the same portions as FIG. 158, a description having been omitted unless necessary. The portions already described in FIG. 158 are not depicted and not assigned reference numerals in order to avoid complexity. FIG. 160(A) and FIG. 160(B) conceptually show the same structure as FIG. 158(A), but in terms of actual dimensions, the mobile telephone 9601 shown in FIG. 160(A) has greater width than the mobile telephone 9601 shown in FIG. 160(B). (In FIG. 160(B), an example is shown in which the package unit 9625*a* is brought into an arrangement near the rear surface side of the upper part of the mobile telephone 9601, but since the structure as a piezoelectric bimorph module 9625 does not vary, the arrangement is not currently related to the description below. The arrangement is later described separately.)

As described above, the mobile telephones 9601 in FIG. 160(A) and FIG. 160(B) have different widths, but the length and internal configuration of the package unit 9625*a* are mutually shared, as indicated by the dashed lines 9625*c*, 9625*d*. Standardizing the package unit 9625*a* in this manner allows compatibility with various mobile telephones by merely modifying the length of the metal plate 9697 protruding from the package unit 9625*a*, and the bent state of the bent parts 9697*a*, 9697*b* and the support parts 9697*c*, 9697*d*. In FIG. 160(A) and FIG. 160(B), the mobile telephone 9601 shows as an example the case in which the widths are different, but even if the widths in terms of external appearance are the same, the size of the of the elastic bodies 4263*a*, 4263*b* may be different depending on the mobile telephone. In this case as well, standardizing the package unit 9625*a* in the manner described above allows compatibility with elastic bodies 4263*a*, 4263*b* having various sizes by merely modifying the length of the metal plate 9697 and the bent state of the bent parts 9697*a*, 9697*b* and the support parts 9697*c*, 9697*d*.

It was described above that a hole may be provided for passing air-conducted sound to the front surface side of the upper part of the mobile telephone 9601 in order to hear air-conducted sound generated from the vibration unit 9625*b* when listening in a conventional manner in conformity with FIG. 137(B). As an example of such a case, FIG. 160(A) illustrates, for reference, a design in which a hole 9601*b* for air-conduced sound transit is provided near the vibration unit 9625*b*. The hole 9601*b* may be the same as that provided for an ordinary air conduction speaker.

Herein, the arrangement of FIG. 160(B) will be supplemented. As previously described, depending on the design of the mobile telephone 9601, the package unit 9625*a* can be brought into an arrangement near the rear surface side of the upper part of the mobile telephone 9601 by placing the piezoelectric bimorph module 9625 in an upside-down arrangement. FIG. 160(B) is used for specifically showing this arrangement, and in this case, available space can be ensured on the front surface side (the GUI display unit 3405 side) of the upper part of the mobile telephone 9601 as illustrated in the drawing. This arrangement allows for a layout in which the package unit 9625*a* does not interfere with an in-camera or other component arranged on the front surface side of the mobile telephone 9601.

FIG. 160(C) shows an arrangement in which the thin package unit 9625*a* including the vibration unit 9625*b* is brought near to the front surface side (the GUI display unit 3405 side) of the upper part of the mobile telephone 9601 without bending the metal plate 9697 protruding from the package unit 9625*a* in the piezoelectric bimorph module 9625 in which the length of the package unit 9625*a* is the same as that described above. Such a design is also possible as long as it is permitted by the position of the package unit 9625*a* and the support mechanism produced by the elastic bodies 4263*a*, 4263*b*. Thus, the configuration for standardizing the package unit 9625*a* can be made compatible with various mobile telephones regardless of whether the metal plate 9697 is bent. In the case of a support such as in FIG. 160(C), when the mobile telephone 9601 is narrow and the metal plate 9697 is too long, the two ends thereof may be cut, as appropriate.

FIG. 160(D) and FIG. 160(E) shown standardized articles of the piezoelectric bimorph module 9625 in which the package unit 9625*a* described above has been standardized, and the package unit 9625*a* as well as the metal plate 9697 protruding from the package unit 9625*a* can be mass produced to the same length. In this case, the metal plate 9697 protruding from the package unit 9625*a* is made sufficiently long so as to be compatible with various mobile telephones with consideration also given to the case of bending. In the case that the metal plate 9697 is not to be bent, it is possible to cut off the unnecessary portions 9697*e*, 9697*f* of the metal plate 9697 in a subsequent step to provide customization in accordance with customer needs, as shown in FIG. 160(D). On the other hand, when the metal plate 9697 is to be bent, it is possible to cut off the unnecessary portions of the metal plate 9697 and bend the bent parts 9697*a*, 9697*b* and the support parts 9697*c*, 9697*d* in a subsequent step to provide customization in accordance with customer needs, as shown in FIG. 160(E). Depending on customer needs, it is also possible to provide an un-machined standardized article in the states shown in FIG. 160(D) and FIG. 160(E).

The various features of each of the embodiments described above are not to be restricted to the individual embodiments, but rather can be substituted or combined with other embodiments, as appropriate. For example, the one-hundredth embodiment shows the case in which the piezoelectric bimorph module is supported at both ends by elastic bodies at both corners of the upper part of the mobile telephone, and the feature in which the piezoelectric bimorph module shown in the one-hundredth embodiment is arranged near the front surface or the back surface of the mobile telephone to provide space is not limited to the case in which the piezoelectric bimorph module is supported at both ends, and it is also useful when the piezoelectric bimorph module is supported by hard support part or supported in a cantilever configuration. Also, the feature of the thin circuit-integrated module shown in the one-hundredth embodiment and the standardization thereof is no limited to the one-hundredth embodiment, and can also be applied to various embodiments.

One-hundred First Embodiment

FIG. 161 is a block view related to a one-hundred first embodiment according to an aspect of the present invention, and is configured as a mobile telephone based on cartilage conduction. The detailed configuration is the same as the embodiments described above, portions not directly related to the description are shown in rough block form in order to avoid complexity in FIG. 161, and a detailed description thereof is omitted.

The one-hundred first embodiment of FIG. 161 has an application processor 9739 and a power management circuit 9753 in an ordinary mobile telephone 9701. The application processor 9739 controls the principal components 9745 of a mobile telephone as well as the mobile telephone 9701 overall. The power management circuit 9753 supplies power to the mobile telephone 9701 overall in coordination with the application processor 9739. An analog output amplifier 9740 drives a piezoelectric bimorph element 9725 that serves as a cartilage conduction vibration source on the basis of sound output outputted from the application processor 9739 and processed in an acoustic processing circuit 9738. The power management circuit 9753 supplies drive power to the analog output amplifier 9740 via a voltage booster circuit 9754. The details of such a configuration are the essentially same as the seventy-second embodiment shown in FIG. 107, and the seventy-fourth embodiment to the seventy-sixth embodiment shown in FIG. 114 to FIG. 116, and elsewhere.

The one-hundred first embodiment of FIG. 161 furthermore has a low-pass filter 9740*a* provided between the analog output amplifier 9740 and the piezoelectric bimorph element 9725, the low-pass filter being used for allowing signals in a sound frequency region for driving the piezoelectric bimorph element 9725 to pass and cutting impact pulses in the high-frequency region that are produced by the piezoelectric bimorph element 9725 due to impacts caused by dropping or the like of the mobile telephone 9701.

The piezoelectric bimorph element 9725 is provided to a corner part 9701*d*, which is an advantageous location for making contact with the tragus and other ear cartilage, in the same manner as other embodiments. However, the corner part 9701*d* is also a location that easily experiences direction impacts due to dropping or the like, as previously described. The piezoelectric bimorph element 9725 deforms in accordance with applied voltage, can therefore be used as an output element for generating cartilage conduction vibration by application of a sound signal 9725*a* using this property, and can conversely also function as a voltaic element for generating voltage when deformation is applied from the exterior. The analog output amplifier 9740 is liable to be destroyed when impact pulses in a high-frequency range are generated from the piezoelectric bimorph element 9725 by dropping and other impacts and the impact pulses flow back to the output of the analog output amplifier 9740.

The low-pass filter 9740*a* is provided between the analog output amplifier 9740 and the piezoelectric bimorph element 9725 in order to prevent such situations, and when an impact pulse 9725*b* in a high-frequency region is generated from the piezoelectric bimorph element 9725, it is prevented from being transmitted to the analog output amplifier 9740, as indicated by the imaginary line 9725*c* were the low-pass filter 9740*a* not be present. As described above, the low-pass filter 9740*a* allows sound signals 9725*a* in the sound frequency range for driving the piezoelectric bimorph element 9725 to pass.

Generally, the sampling frequency of an AD converter in a mobile telephone is 8 kHz, and that which can be quantized is up to 4 kHz, and therefore, sound signals that are used are kept to about 3.4 kHz. Also, the transmission efficiency of the vibrations is reduced from around 3 kHz across a high-frequency region in the frequency characteristics of ear cartilage, as described in FIG. 132 and elsewhere. Therefore, by using a low-pass filter 9740*a* that allows sound signals of specifically about 4 kHz or less, there is no problem in driving the piezoelectric bimorph element 9725 and it is possible cut impact pulses 9725*b* in a high-frequency range that are generated from the piezoelectric bimorph element 9725 by dropping and other impacts.

The sampling frequency in a PHS or IP telephone is 16 kHz, and quantization up to 8 kHz is possible, so sound signals that are used are about 7 kHz. Also, as previously described, cartilage conduction in a broad sense may be defined as conduction in which direct vibrations as well as cartilage-air conduction contribute to vibration of the tympanic membrane, and in actuality, in a state in which the external auditory meatus occlusion effect has not occurred, the frequency range of sound that can be heard by direct air conduction from the piezoelectric bimorph element 9725 can be increased. In this case, the piezoelectric bimorph element 9725 is configured to vibrate in a region up to about 7 kHz that can be used in a PHS or an IP telephone. In the future, a cartilage conduction in a broad sense that includes a direct air conduction component is anticipated even in a mobile telephone from improvements in data communication rates, and in this case as well, it is possible to consider causing the piezoelectric bimorph element 9725 to vibrate in a region up to about 7 kHz. Therefore, a low-pass filter 9740*a* that specifically passes about 8 kHz or less is used in order to adapt to such a case. Such a configuration would pose no problem for driving the piezoelectric bimorph element 9725 using a sound signal having sampling frequency of 16 kHz. Since an impact pulse 9725*b* is generated in a high-frequency region from the piezoelectric bimorph element 9725 by dropping or other impact, the impact pulse has a higher frequency region than the above-stated range as a principal component, and it is possible to essentially cut out such a component.

FIG. 162 is a block view of a first modification of the one-hundred first embodiment shown in FIG. 161, the same reference numerals are used for the same portions as in FIG. 161, and a description thereof is omitted. The first modification in FIG. 162 is provided with a tap detection unit 9742 for using the piezoelectric bimorph element 9725 as an impact input element for detecting a tap on the mobile telephone 9701. Such a configuration was described in the twenty-seventh embodiment, which called on FIG. 41 to FIG. 43. In other words, tapping (touching) any portion of the display screen or the case of the mobile telephone 9701 with a finger makes it possible to perform determinative input for a GUI operation such as a "click" of a mouse or the like in a personal computer.

The tap detection unit 9742 detects an impact 9725*d* of a tap by a finger via the low-pass filter 9740*a*, and this is transmitted to the application processor 9739, whereby determinative input of a GUI operation is performed. Accordingly, the low-pass filter 9740*a* allows the band of the sound signal 9725*a* and the principal frequency band of the impact 9725*d* produced by the tap of a finger to pass, and selectively cuts the impact pulse 9725*b* of dropping or the like, which is in a higher principal frequency band than the sound signals and tapping.

FIG. 163 is a block view of a second modification of the one-hundred first embodiment shown in FIG. 161, the same reference numerals are used for the same portions as in FIG. 161 and FIG. 162, and a description thereof is omitted. In the second modification in FIG. 163, the position in which the tap detection unit 9742*a* is provided is different from the first modification of FIG. 162, and the impact 9725*d* of a tap by a finger is directly detected without going through the low-pass filter 9740*a*. The same applied to a feature in which determinative input of a GUI operation is performed by transmitting the impact 9725*d* of a detected tap to the application processor 9739. The 9740*a* in this case allows the band of the sound signal 9725*a* to pass in the same manner as the embodiment of FIG. 161, and selectively cuts the impact pulse 9725*b* of dropping or the like, which is in a higher principal frequency band than the sound signals and tapping.

So as to avoid errant detection of impact by collision as the tap of a finger, a tap detection unit 9742*a* in the second modification of FIG. 163 is provided with: an intensity discrimination unit 9742*b* for discriminating the intensity of an impact from the piezoelectric bimorph element 9725, and eliminating impacts having a predetermined intensity or greater, deeming such to be cause by dropping; and a spectrum discrimination unit 9742*c* for discriminating a difference in spectrum in a collision with a floor, a wall, or the like and an impact of tapping with a finger, and eliminating the former which have a high ratio of high-frequency components at a predetermined level or higher.

An advantageous example of the low-pass filter 9740*a* using the one-hundred first embodiment and the modifications thereof in FIG. 161 to FIG. 163 is a RC filter composed of a resistor and a capacitor or a LC filter composed of an inductance component and a capacitor. In these embodiments and modifications thereof, a low-pass filter 9740*a* is used for impact pulses 9725*b* in the high-frequency region generated by the piezoelectric bimorph element 9725 due to dropping or other impacts, but there is no limitation imposed by the above-described configuration as long as the configuration serves as backflow prevention means for preventing backflow of voltaic power produced by the impact to the piezoelectric bimorph element 9725 to the analog output amplifier 9740.

In the one-hundred first embodiment and modifications thereof in FIG. 161 to FIG. 163, the settings of the cartilage conduction unit and the cause of a collision to the piezoelectric bimorph element 9725 were described for only the right-side corner in the drawing, but in the same manner as the other embodiments, in actuality, the settings of the cartilage conduction unit and the cause of a collision to the piezoelectric bimorph element 9725 are advantageously applied to both left and right corners. In this case, the arrangement of the piezoelectric bimorph element 9725 may be a center part between the two corners as noted in the forty-sixth embodiment of FIG. 69 and elsewhere, or may be a corner on one side as noted in the sixty-fourth embodiment of FIG. 96 and elsewhere. In either case, the cause of collision can be both left and right corners. Furthermore, the one-hundred first embodiment and the modifications thereof can be applied to cases in which a piezoelectric bimorph element is arranged in both left and right corners as noted in the sixty-eighth embodiment of FIG. 100, and in this case, the left and right piezoelectric bimorph elements can be mutually independently controlled. Therefore, low-pass filters would be provided between the piezoelectric bimorph element and the output part of the analog output amplifier, respectively, of each corner.

FIG. 164 is a partially cutaway detailed circuit diagram of when the feature of the one-hundred first embodiment of FIG. 161 has been applied to the combination circuit composed of a boosted-voltage unit and an analog output amplifier unit shown in FIG. 155. In other words, a majority of FIG. 164 is the same as FIG. 155, the entire boosted-voltage unit and a portion of the analog output amplifier unit is therefore omitted from the drawing, the same reference numerals are used for the same portions, and a description has been omitted unless needed.

FIG. 164(A) shows the case in which the low-pass filter 9740*a* of FIG. 161 is disposed between the analog amplifier unit 7040 (corresponding to the analog output amplifier 9740 of FIG. 161) and the piezoelectric bimorph element 7013 (corresponding to the piezoelectric bimorph element 9725 of FIG. 161), and the low-pass filter 9740*a* is a RC filter composed of a resistor and a capacitor. It is apparent in FIG. 164(A) that the RC filter is disposed between a first terminal of the piezoelectric bimorph element 7013 and OUT2, which is the output of CH2 of the analog amplifier unit 7040, and between a second terminal of the piezoelectric bimorph element 7013 and OUT3, which is the output CH4 of the analog amplifier unit 7040.

In similar fashion, FIG. 164(B) shows the case in which the low-pass filter 9740*a* is a LC filter composed of an inductance component and a capacitor. It is apparent in FIG. 164(B) that the LC filter is disposed between a first terminal of the piezoelectric bimorph element 7013 and OUT2, which is the output of CH2 of the analog amplifier unit 7040, and between a second terminal of the piezoelectric bimorph element 7013 and OUT3, which is the output CH4 of the analog amplifier unit 7040.

One-hundred Second Embodiment

FIG. 165 is a block view related to a one-hundred second embodiment according to an aspect of the present invention, and is configured as a cartilage conduction vibration source device for a mobile telephone. The one-hundred second embodiment has much in common with the eighty-second embodiment of FIG. 122, the same reference numerals are therefore used for the same portions, and a description has been omitted unless needed. The one-hundred second embodiment of FIG. 165 differs from the eighty-second embodiment of FIG. 122 in terms of the configuration of a digital acoustic processing circuit 9838 in a driver circuit 9803.

Described more specifically, in the digital acoustic processing circuit 9838 of FIG. 165, the digital sound signal outputted from an application processor 9839 is outputted to an external auditory meatus occlusion effect equalizer 9838*a*, a broad-sense cartilage conduction equalizer 9838*b*, and an air conduction equalizer 9838*c*. A switching circuit 9538*d* inputs any of the outputs to the DA converter 7138*c* on the basis of an instruction from the application processor 9839. The output of the air conduction equalizer 9838*c* is transmitted to a speaker 9851 via a switch 9851*a* on the basis of an instruction from the application processor 9839. The switch 9851*a* is ordinarily open, but is closed when the piezoelectric bimorph element 7013 is not to be allowed to vibrate, and outputs the voice of another party during videoconferencing as well as incoming call sounds and various guidance.

The broad-sense cartilage conduction equalizer 9838*b* is selected in a state in which the mobile telephone is in contact with the ear cartilage when the external auditory meatus is in the unoccluded state. As previously described, strictly speaking, cartilage conduction in the broad sense is composed of cartilage-air conduction, cartilage conduction, and direct air conduction, and cartilage-air conduction and direct air conduction are essentially dominant. As a rule of thumb, cartilage-air conduction predominates in low-pitched regions, while direct air conduction predominates in high-pitched regions; at 500 Hz, substantially all conduction is cartilage-air conduction, while at 4000 Hz, substantially all conduction is direct air conduction.

The broad-sense cartilage conduction equalizer 9838*b* equalizes the sound signal so that vibrations are produced in the piezoelectric bimorph element 7013, the vibrations having flat frequency characteristics of sound pressure in the external auditory meatus as a result of cartilage conduction in the broad sense as described above. When a measurement is taken of only the direct air conduction sound of the piezoelectric bimorph element 7013, which is made to vibrate by equalization by the digital acoustic processing circuit 9838, the direct air conduction sound has emphasized equalization in high-pitched regions.

Next, the air conduction equalizer 9838*c* equalizes the sound signal so that vibrations are produced in the piezoelectric bimorph element 7013, the vibrations having flat frequency characteristics of sound pressure as a result of only a direct air conduction component. Specifically, the frequency characteristics of when sound pressure of air-conducted sound produced by the cartilage conduction unit 9824 is directly measured or of when the sound pressure inside the external auditory meatus is measured while the cartilage conduction unit 9824 is not allowed to make contact with the ear cartilage, such frequency characteristics are equalized to as to be flat. This means that equalization is carried out for evaluating that the cartilage conduction unit 9824 is functioning normally as a conventional air conduction speaker. The cartilage conduction unit 9824 is brought into contact with the ear cartilage when external auditory meatus is in the unoccluded state, in a state in which the piezoelectric bimorph element 7013 is being made to vibrate with equalization produced by the air conduction equalizer 9838*c*, and when the sound pressure inside the external auditory meatus (i.e., when measured in a state of broad-sense cartilage conduction), equalization is insufficient in high-pitched regions.

Furthermore, the external auditory meatus occlusion effect equalizer 9838*a* equalizes the frequency characteristics of sound pressure inside the external auditory meatus when the external auditory meatus occlusion effect (same as the "earplug bone conduction effect") is occurring. In this case, this is essentially equalization that gives consideration almost exclusively to the characteristics of cartilage conduction. In a state in which the piezoelectric bimorph element 7013 is being made to vibrate with equalization produced by the air conduction equalizer 9838*c*, when the pressing force is reduced while the cartilage conduction unit 9824 is kept in contact with the ear cartilage to open the entrance to the external auditory meatus, and the sound pressure inside the external auditory meatus is measured (i.e., when measured in a state of broad-sense cartilage conduction), equalization is insufficient in high-pitched regions.

When the broad-sense cartilage conduction equalizer 9838*b* or the air conduction equalizer 9838*c* is being made to function, a structure in which vibrations of the electromagnetic vibrator 8225 are transmitted from the upper frame 8227 to the front panel 8201*a* and the upper edge part of the front panel 8201*a* is made to vibrate in a relatively wide surface area is advantageous as a structure for generating sufficient direct air-conducted sound from the piezoelectric bimorph element 7013, as in the manner of the eighty-eighth embodiment shown in FIG. 136 to FIG. 138. In the manner of a modification of the one-hundredth embodiment shown in FIG. 160(A), a configuration in which the vibration unit 9625*b* is brought to the front surface side of the upper part of the mobile telephone and arranged near the ear, and a hole 9601*b* for air-conducted sound transit is provided near the vibration unit 9625*b* is also advantageous for generating sufficient direct air-conducted sound.

Equalization by the external auditory meatus occlusion effect equalizer 9838*a*, the broad-sense cartilage conduction equalizer 9838*b*, and the air conduction equalizer 9838*c* is set, not in relation to the characteristics of the piezoelectric bimorph element 7013 alone, but so that the generation of cartilage conduction and air conduction achieve target values in a state in which these equalizers have been joined with the cartilage conduction unit 9824 (set in a corner of a mobile telephone) and incorporated into a mobile telephone.

FIG. 166 is a flowchart showing the function of the application processor 9839 in the one-hundred second embodiment of FIG. 165. To provide a description of the function of the driver circuit 9803, the flow of FIG. 123 illustrates an abstraction of the operation, focusing on related functions, and the application processor 9839 also contains typical mobile telephone functions and other operations not represented in the flow of FIG. 166. The flow of FIG. 166 begins when a main power source of the mobile telephone is turned on; and in step S602 an initial startup and a check of each unit function are performed and a screen display on the display unit of the mobile telephone is started. Next, in step S604, the functions of the cartilage conduction unit and the outgoing-talk unit of the mobile telephone are turned off, and routine advances to Step S606.

In Step S606, a check is performed to determine whether an air conduction test mode has been set. If an air conduction test mode setting has not been detected, the routine advances to Step S608, and a check is performed to determine whether a call is being carried out by the mobile telephone based on a response from another party to a call request or based on an incoming call from another party. If the mobile telephone is in a call state, the routine advances to Step S610, the cartilage conduction unit and the outgoing-talk unit are turned on, and the routine advances to Step S612.

In Step S612, a check is performed to determine whether an air conduction mode has been set, and if this mode has not been set, the routine advances to Step S614. In Step S614, a check is performed to determine whether the external auditory meatus occluding effect (earplug bone conduction effect) is present, and if such is not the case, the routine advances to Step S616 where a waveform inversion signal of one's own voice is not applied, and the routine proceeds to step S618. The presence or absence of the waveform inversion signal of one's own voice has been described in Step S52 to Step S56 in the flow of FIG. 10, and a detailed description is therefor omitted. In Step S618, the broad-sense cartilage conduction equalizer 9838*b* is selected and the routine advances to Step S620.

On the other hand, when the external auditory meatus occluding effect has been detected in Step S614, the routine proceeds to Step S622, the waveform inversion signal of one's own voice is added, the external auditory meatus occlusion effect equalizer 9838*a* is selected in Step S624, and the routine proceeds to Step S620. When it has been detected that the air conduction mode has been set in Step S612, the routine proceeds to Step S626, the air conduction equalizer 9838*c* is selected, and the routine proceeds to Step S620.

In Step S620, a check is performed to determine whether a call has been cut off, and if such is not the case, the routine returns to Step S612, and Step S612 to Step S626 are repeated as long as the call has not be cut off. It is thereby possible to modify the selection of the external auditory meatus occlusion effect equalizer 9838*a*, the broad-sense cartilage conduction equalizer 9838*b*, and the air conduction equalizer 9838*c* in accordance with changes in conditions and settings even during a call. On the other hand, when it has been detected that a call has been cut off in Step S620, the routine advances to Step S628, the functions of the cartilage conduction unit and the outgoing-talk unit of the mobile telephone are turned off, and the routine proceeds to Step S630.

On the other hand, when it has been detected Step S606 that the air conduction test mode has been set, the routine proceeds to Step S632 and selects the air conduction equalizer 9838*c*. Next, in Step S634, the cartilage conduction unit is turned on, the routine proceeds to Step S636, and air conduction test processing is carried out. Air conduction test processing is processing that causes sound signals of various frequencies to be automatically generated in sequence on the basis of predetermined sound source data, and causes the piezoelectric bimorph element 7013 to vibrate on the basis of the equalization of the air conduction equalizer 9838*c*. Direct air conduction generated from the cartilage conduction unit is measured using a microphone or the like to thereby test whether equalization of the air conduction equalizer 9838*c* is optimal. When air conduction test processing ends, the routine proceeds to Step S638, the cartilage conduction unit is turned off, and the routine proceeds to Step S630. Also, when a call state is not detected in S608, the routine immediately proceeds to Step S630.

In Step S630, a check is performed to determine whether the main power of the mobile telephone has been turned off, and if the main power has not be turned off, the routine returns to Step S606 and repeats Step S606 to Step S638 in accordance with conditions as long as it is not detected in Step S630 that the main power has been turned off. Conversely, the flow ends when it has been detected in step S630 that the main power has been turned off Next, the equalizer function in the digital acoustic processing circuit 9838 in the one-hundred second embodiment of FIG. 165 and FIG. 166 will be described using FIG. 167. In the same manner as FIG. 132 in the eighty-sixth embodiment, FIG. 167(A) to FIG. 167(C) are, respectively, an image depiction of the frequency characteristics of the piezoelectric bimorph element, an image depiction of the frequency characteristics of the vibrational acceleration level of ear cartilage when the piezoelectric bimorph element has been brought into contact with ear cartilage, and an image depiction of the equalization of the drive output to the piezoelectric bimorph element.

Figure 167A:
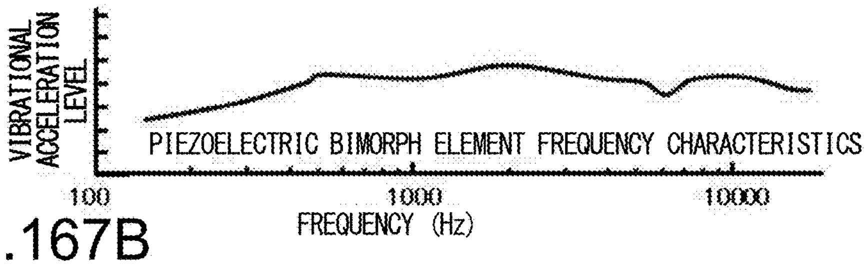
Figure 167B:
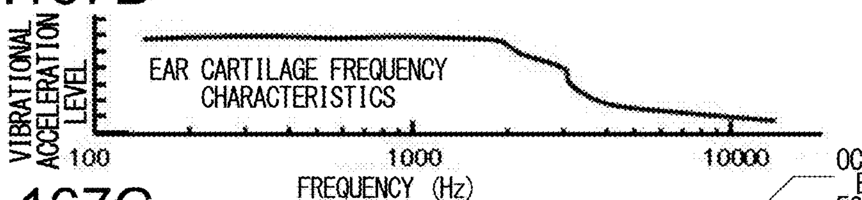

FIG. 167(A) is the same drawing as FIG. 132(A) and shows that the frequency characteristics of the piezoelectric bimorph element are substantially flat until about 10 kHz. Also, FIG. 167(B) is the same drawing as FIG. 132(B) and shows that the frequency characteristics of the vibrational acceleration level of ear cartilage of when the piezoelectric bimorph element has been brought into contact with ear cartilage will present a high vibrational acceleration level comparable to a bandwidth of 1 to 2 kHz, even in a bandwidth of 1 kHz or less in which the vibrations of the piezoelectric bimorph element as the vibration source are relatively weak, yet will present a reduced vibrational acceleration level from about 3 kHz to a high-frequency bandwidth.

Figure 167C:
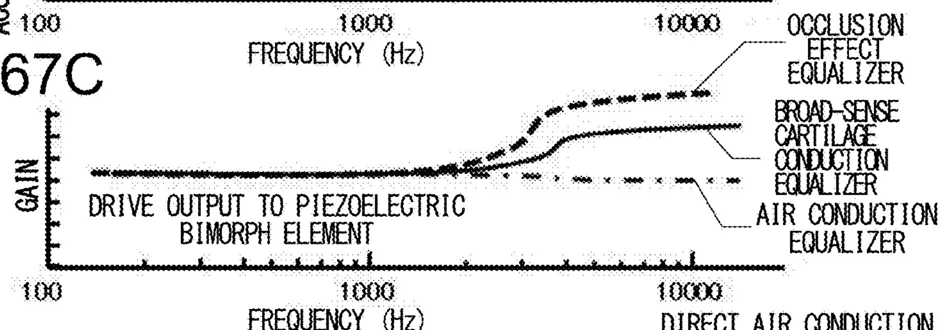

In contrast, in the image depiction of the equalization of the drive output of the piezoelectric bimorph element of FIG. 167(C), the image of the change in gain produced by the frequency of the external auditory meatus occlusion effect equalizer 9838*a* is indicated by a broken line, the image of the change in gain produced by the frequency of the broad-sense cartilage conduction equalizer 9838*b* is indicated by a solid line, and the image of the change in gain produced by the frequency of the air conduction equalizer 9838*c* is shown by the dot-dash line.

Figure 167D:
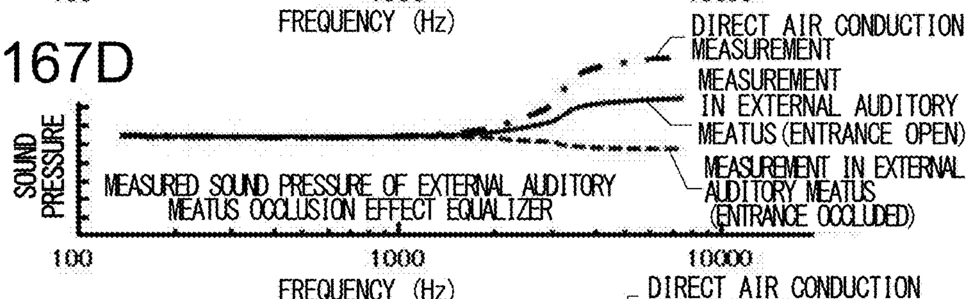

FIG. 167(D) shows an image of the sound pressure measured when equalization is carried out by the external auditory meatus occlusion effect equalizer 9838*a* shown by the broken line in FIG. 167(C). As shown by the broken line in FIG. 167(D), the sound pressure is substantially flat, as intended, inside the external auditory meatus while measured with the entrance of the external auditory meatus in an occluded state. In contrast, in this equalization, the sound pressure inside the external auditory meatus while measured with the entrance of the external auditory meatus in an unoccluded state is excessive in the high range measured outside of the ear, as shown by the solid line in FIG. 167(D). Also, in this equalization, the sound pressure of only direct air conduction while measured outside of the ear is even more excessive in the high range, as shown by the dot-dash line in FIG. 167(D).

Figure 167E:
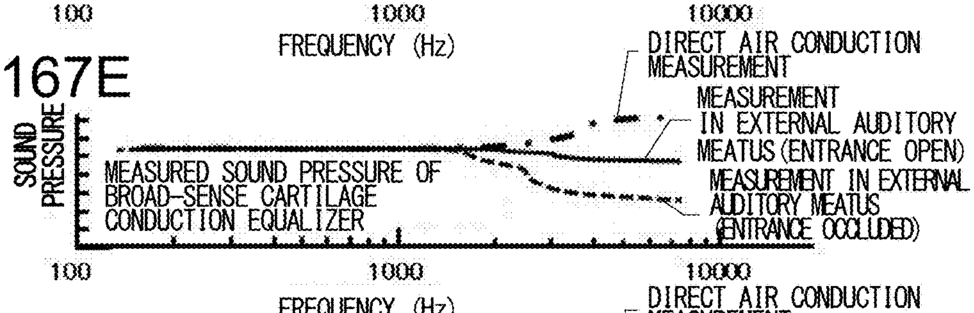

FIG. 167(E) shows an image of the sound pressure measured when equalization is carried out by the broad-sense cartilage conduction equalizer 9838*b* indicated by the solid line in FIG. 167(C). As shown by the solid line in FIG. 167(E), the sound pressure is substantially flat, as intended, inside the external auditory meatus while measured with the entrance of the external auditory meatus in an unoccluded state. In contrast, in this equalization, the sound pressure inside the external auditory meatus while measured with the entrance of the external auditory meatus in an occluded state is insufficient in the high range, as shown by the broken line in FIG. 167(E). In contrast, in this equalization, the sound pressure of only direct air conduction measured outside of the ear is excessive in the high range, as shown by the dot-dash line in FIG. 167(E).

Figure 167F:
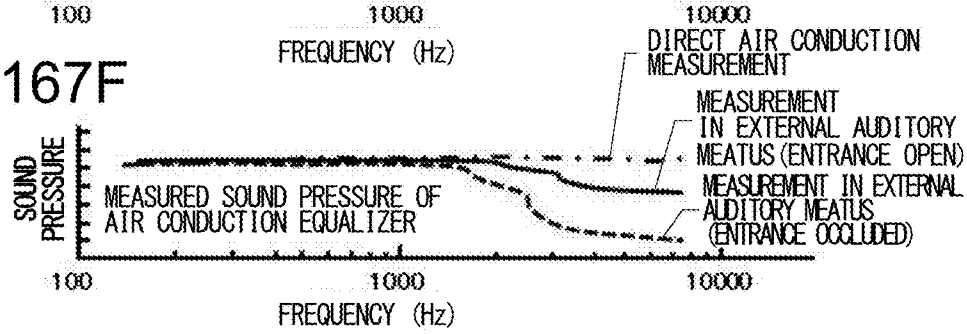

FIG. 167(F) shows an image of the sound pressure measured when equalization is carried out by the air conduction equalizer 9838*c* indicated by the dot-dash line in FIG. 167(C). As shown by the dot-dash line in FIG. 167(F), the sound pressure is substantially flat, as intended, for direction air conduction while measured outside the ear. In contrast, in this equalization, the sound pressure inside the external auditory meatus while measured with the entrance of the external auditory meatus in an unoccluded state is insufficient in the high range, as shown by the solid line in FIG. 167(F). Also, in this equalization, the sound pressure of inside the external auditory meatus while measured with the entrance of the external auditory meatus in an occluded state is even more insufficient in the high range, as shown by the dot-dash line in FIG. 167(F).

The graph shown in FIG. 167 conceptually shows a general trend in order to avoid complexity and facilitate understanding. In actuality, narrow areas of insufficient and excessive sound pressure occur in relation to equalization based on middle-range and low-range portions in the call frequency bandwidth of a mobile telephone. However, since such narrow areas of insufficient and excessive sound pressure occur when equalization is carried out using either state as a reference, there is no meaning to restricting the frequency characteristics of equalization being used as a reference, and performing equalization in accordance with a general trend as shown in FIG. 167 is being realistic.

As noted above, the measurement values of FIG. 167(D) to (F) are not characteristics based on the vibrations of the piezoelectric bimorph element 7013 alone, but are the result of measuring the state in which cartilage conduction and air conduction are generated with the piezoelectric bimorph element 7013 joined to the cartilage conduction unit 9824 and incorporated into a mobile telephone. Therefore, the gain setting in FIG. 167(C) is set with the goal of obtaining measurement values of FIG. 167(D) to (F) in a state in which the piezoelectric bimorph element 7013 has been joined to the cartilage conduction unit 9824 and incorporated in a mobile telephone.

The region in which the intended flat sound pressure in FIG. 167(D) to (F) is to be obtained is at least 300 Hz to 3.4 kHz when the sampling frequency is 8 kHz. The range is at least 300 Hz to 7 kHz when the sampling frequency is 16 kHz.

Implementation of the features of the present invention described above is not limited to the aspects in the embodiments described above, and the features can be implemented in other embodiments as well, wherever it is possible to benefit from the advantages thereof. For example, in the one-hundred second embodiment of FIG. 165, the speaker 9851 and the piezoelectric bimorph element 7013 of when the air conduction equalizer 9838*c* has been selected assume the frequency characteristics of an air-conduction speaker, and dual use is therefore made of the air conduction equalizer 9838*c*. However, the piezoelectric bimorph element 7013 and the speaker 9851 have different structures, and when the frequency characteristics are to be obtained for an optimal air conduction speaker, a dedicated equalizer may be used for the speaker 9851 without making dual use of the air conduction equalizer 9838*c*. One-hundred third embodiment FIG. 168 is a perspective view and a cross-sectional view of a one-hundred third embodiment according to an aspect of the present invention, and is configured as a mobile telephone 9901. The one-hundred third embodiment has much in common with the eighty-eighth embodiment; therefore the same reference numerals are used for the corresponding portions and a description thereof is omitted unless required. The internal configuration of the mobile telephone 9901 can be understood by using, e.g., the fifty-fifth embodiment of FIG. 84 and other embodiments, and a description thereof is omitted. The one-hundred third embodiment of FIG. 168 is different from the eighty-eighth embodiment of FIG. 136 in that an electromagnetic air-conduction speaker 9925 is dually used as a cartilage conduction vibration source. In the eighty-eighth embodiment of FIG. 136 as well, the configuration is such that the electromagnetic vibrator 8225 serving as a cartilage conduction vibration source causes the upper edge part of the front panel 8201*a* to vibrate over a relatively wide surface area, and an air-conducted sound at a required level can be generated in an ordinary mobile telephone; and the configuration is such that both cartilage conduction and air-conducted sound can be generated. Conversely, in the one-hundred third embodiment of FIG. 168, first, the configuration is such that an ordinary mobile telephone can be caused to generate an air-conducted sound at a predetermined level using an electromagnetic air-conduction speaker 9925, and the configuration is such that the vibrations thereof are also used and transmitted to the cartilage conduction units 8224 and 8226, whereby both cartilage conduction and generation of air-conducted sound are made possible.

Describing the one-hundred third embodiment more specifically on the basis of FIG. 168, the front panel 8201*a* is provided with a hole 9901*b* for air-conducted sound transit from the electromagnetic air-conduction speaker 9925, thus constituting an ordinary incoming-talk unit, as shown in FIG. 168(A). It is apparent in FIG. 168(B), which is a view along the cross section B1-B1 of FIG. 168(A), that a hanging part 8227*a* is provided to the center part on the inner side of the upper frame 8227, and this constitutes a seating for providing the electromagnetic air-conduction speaker 9925. In order for the electromagnetic air-conduction speaker 9925 to generate an air-conducted sound, the counteraction of the vibrations reactions are transmitted to the upper frame 8227 and the cartilage conduction units 8224 and 8226 are made to vibrate.

In FIG. 168(C), which is a top view of FIG. 168(A), the hanging part 8227*a* on the inside and the electromagnetic air-conduction speaker 9925 provided therewith as a seating are indicated by a broken line. The electromagnetic air-conduction speaker 9925 is not in contact with any component other than the hanging part 8227*a*, and the counteraction of the vibrations thereof are thereby transmitted to only the upper frame 8227 via the hanging part 8227*a*. In FIG. 168(C), the hole 9901*b* for air-conducted sound transit provided in front of the electromagnetic air-conduction speaker 9925 in the front panel 8201*a* is also illustrated by a broken line.

FIG. 168(D), which is a view along the cross section B2-B2 shown in FIG. 168(A) to FIG. 168(C), shows that the hanging part 8227*a* is integrally formed with the upper frame 8227, and that the electromagnetic air-conduction speaker 9925 is provided using the hanging part 8227*a* as a seating. The hole 9901*b* for air-conducted sound transit is shown to be provided to the front panel 8201*a* in a location in front of the electromagnetic air-conduction speaker 9925. Furthermore, it is apparent in FIG. 168D as well that the electromagnetic air-conduction speaker 9925 is not in contact with any component other than the hanging part 8227*a*.

FIG. 168(E) is a view along the cross section B3-B3 shown in FIG. 168(B), and illustrates the hanging part 8227*a* inside, the electromagnetic air-conduction speaker 9925 provided therewith as a seating, and a hole 9901*b* for air-conducted sound transit provided to the front panel 8201*a* in a location in front of the electromagnetic air-conduction speaker 9925.

FIG. 169 is an enlarged cross-sectional view of the principal elements of the one-hundred third embodiment shown in FIG. 168(D), and shows the internal structure and holding structure of the electromagnetic air-conduction speaker 9925. FIG. 169 has much in common with the forty-eighth embodiment of FIG. 73; therefore the same reference numerals are used for the corresponding portions and a description thereof is omitted unless required. The electromagnetic air-conduction speaker 9925 in one-hundred third embodiment of FIG. 169 is different from the electromagnetic vibrating element 4324*a* in the forty-eighth embodiment of FIG. 73 in that, firstly, the structure is configured so as to function as an electromagnetic air-conduction speaker in the manner described above, and the counteraction of the vibrations are used for cartilage conduction.

The internal structure and holding structure of the electromagnetic air-conduction speaker 9925 in the one-hundred third embodiment is described in detail below with reference to FIG. 169. The electromagnetic air-conduction speaker 9925 is largely divided into two portions. First, as the first portion, a yoke 4324*h* for holding a magnet 4324*f* and a central magnetic pole 4324*g* is anchored to and supported by the hanging part 8227*a*. A top plate 4324*j*, which has a gap, is anchored to this structure.

On the other hand, as the second portion, a voice coil 4324*m* is wrapped around a voice coil bobbin anchored to a vibration plate 9924, and penetrates into the gap of the top plate 4324*j*. A weight ring 9924*n* for increasing the inertia of the vibration plate 9924*k* overall is provided around the vibration plate 9924*k*. The integral structure of the second portion contains the vibration plate 9924*k*, the voice coil bobbin anchored thereto, the voice coil 4324*m*, and the weight ring 9924*n*, and is connected in a state suspended midair to the yoke 4324*h* of the first portion by a damper 9924*i* In this a configuration, when an audio signal is inputted into the voice coil 4323*m*, relative movement occurs between the first portion composed of the yoke 4324*h* and the like and the second portion composed of the vibration plate 9924*k* and the like; the vibration plate 9924*k* thereby vibrates and an air-conducted sound is generative by way of the hole 9901*b* for air-conducted sound transit. On the other hand, the first portion composed of the yoke 4324*h* also vibrates due to the counteraction of the vibrations of the second portion composed of the vibration plate 9924*k* and the like, and these vibrations are transmitted from the upper frame 8227 to the cartilage conduction units 8224 and 8226 via the hanging part 8227*a*. In the manner described above, using the counteraction of the vibrations of the electromagnetic air-conduction speaker 9925 for generating air-conducted sound as the vibration source for cartilage conduction is a configuration that allows both cartilage conduction and the generation of air-conducted sound.

One-hundred Fourth Embodiment

FIG. 170 is a perspective view and a cross-sectional view of a one-hundred fourth embodiment according to an aspect of the present invention, and is configured as a mobile telephone 10001. The one-hundred fourth embodiment has much in common with the sixty-fifth embodiment of FIG. 97; therefore the same reference numerals are used for the corresponding portions and a description thereof is omitted unless required. The internal configuration of the mobile telephone 10001 can be understood by using, e.g., the fifty-fifth embodiment of FIG. 84 and other embodiments, and a description thereof is omitted. The one-hundred fourth embodiment of FIG. 170 differs from the sixty-fifth embodiment of FIG. 97 in that the piezoelectric bimorph element 2525 is configured as an air conduction speaker and is dually used also as a cartilage conduction vibration source. In other words, the approach used in one-hundred third embodiment of FIG. 169 can also be applied to the case of an air conduction speaker.

Describing the one-hundred fourth embodiment more specifically on the basis of FIG. 170, a hole 10001*b* for air-conducted sound transit is provided to the upper part of the front surface of the mobile telephone 10001, as shown in FIG. 170(A). This is the same as the one-hundred third embodiment of FIG. 169. It is apparent from FIG. 170(B), which is a view along the cross section B1-B1 of FIG. 170(A), one end 2525*c* of the piezoelectric bimorph element 2525 is held by the right-ear cartilage conduction unit 6124. As a result, the other end 2525*b* of the piezoelectric bimorph element 2525 is a free vibration end, yet a vibration plate 10024*k* for efficiently generating air-conducted sound is attached thereto. In FIG. 170(B), the hole 10001*b* for air-conducted sound transit shown in FIG. 170(A) is illustrated by an imaginary line for reference in order to understand the positional relationship. Thus, the vibration plate 10024*k* vibrates in the vicinity inside the hole 10001*b* for air-conducted sound transit. On the other hand, the one end 2525*c* of the piezoelectric bimorph element 2525 is held by the right-ear cartilage conduction unit 6124 as described above, and the right-ear cartilage conduction unit 6124 therefore vibrates in good fashion due to the counteraction of the vibrations of the free end. Vibrations of the right-ear cartilage conduction unit 6124 are furthermore transmitted to the left-ear cartilage conduction unit 6126 as well by way of the linking unit 6127. These points are the same as the sixty-fifth embodiment shown in FIG. 97. In the one-hundred fourth embodiment of FIG. 170 as well, the above-described structure supports the air conduction speakers using the cartilage conduction structure in the same manner as the one-hundred third embodiment of FIG. 168, whereby the counteraction of the vibrations of the air conduction speaker for generating air-conducted sound is used as a cartilage conduction vibration source. The piezoelectric bimorph element 2525 is supported by the cartilage conduction unit alone as described above and does not contact the other constituent elements of the mobile telephone 10001, so the vibrations thereof are transmitted only to the cartilage conduction unit.

In FIG. 170(C), which is a top view of FIG. 170(A), the vibration plate 10024*k* attached to the free vibration end 2525*b* of the piezoelectric bimorph element 2525 and the hole 10001*b* for air-conducted sound transit are illustrated by an imaginary line. In FIG. 170(D), which is a view along the cross section B2-B2 shown in FIG. 170(A) to FIG. 170(C), the vibration plate 10024*k* is illustrated by an imaginary line for reference in order to show the positional relationship with the piezoelectric bimorph element 2525. It is apparent from FIG. 170(C) and FIG. 170(D) that the piezoelectric bimorph element 2525 is arranged nearer to the front surface side of the mobile telephone 10001 than the sixty-fifth embodiment of FIG. 97 so that the vibration plate 10024*k* can vibrate in the vicinity inside the hole 10001*b* for air-conducted sound transit. In FIG. 170(D), reference illustration of the hole 10001*b* for air-conducted sound transit is omitted in order to avoid drawing complexity.

The various features of each of the present invention described above are not limited to the above embodiments, and may be implements in other embodiments. For example, in FIG. 160(A) shown as a cross-sectional view for describing the configuration for mass production of the piezoelectric bimorph module in the one-hundredth embodiment, a design is illustrated in which the hole 9601*b* for air-conducted sound transit is provided near the vibration unit 9625*b*. Also, in the structure of FIG. 160(A), the support parts 9697*c* and 9697*d* of the metal plate 9697, which are at both ends of the piezoelectric bimorph module 9625, are supported by the inner side of the elastic body units 4263*a*, 4263*b*, and since there is not contact with the other constituent elements of the mobile telephone 9601, the vibrations thereof are transmitted only to the cartilage conduction unit. Therefore, a structure such as that of FIG. 160(A) may be considered to be a modification of the one-hundred third embodiment shown in FIG. 168 or the one-hundred fourth embodiment shown in FIG. 170. In the structure of FIG. 160(A), the width of the metal plate 9697 to the rear of the hole 9601*b* for air-conducted sound transit may be increased and the surface area for functioning as a vibration plate for generating air-conducted sound may be increased, provided that space allows, in order to more efficiently generate air-conducted sound that passes through the mobile telephone 9601.

One-hundred Fifth Embodiment

FIG. 171 is a block view related to a one-hundred fifth embodiment according to an aspect of the present invention, and is configured as a system composed of a mobile telephone 11001 and a stereo headset 11081*a*, 11081*b* capable of short-range communication therewith. The left headset 11081*a* and the right headset 11081*b*, which are a stereo headset, can be constantly worn on the left and right ears. In other words, the stereo headset 11081*a*, 11081*b* in the one-hundred fifth embodiment has a configuration in which the ear hole 232 can be used in an unoccluded state in the manner of the eighty-ninth embodiment of FIG. 139 to the ninety-second embodiment, the ninety-eighth embodiment, and the ninety-ninth embodiment of FIG. 142, FIG. 153, and FIG. 156, and noise of the external environment does not become difficult to hear in comparison with an unworn state, even when the system is constantly worn on both ears as a stereo headset. Therefore, for example, there is no increase of danger in not hearing a vehicle horn or the like, and it is possible to enjoy conversation with people nearby while wearing the stereo headset.

The a block view of the one-hundred fifth embodiment of FIG. 171 has much in common with the eighty-seventh embodiment of FIG. 135; therefore the same reference numerals are used for the corresponding portions and a description thereof is omitted unless required. For simplification, the internal configuration of the, e.g., telephone function unit 45 is omitted from the drawing in FIG. 171. The internal structure of the right headset 11081*b* is omitted for simplification. Other than lacking a call microphone 11023, the configuration is that same as the left headset 11081*a*.

The one-hundred fifth embodiment of FIG. 171 differs from the eighty-seventh embodiment of FIG. 135 in that consideration is given to music enjoyment as a purpose for constantly wearing the stereo headset 11081*a*, 11081*b*, and adaptation to various conditions brought about by use with the ear hole 232 in an unoccluded state. First, a digital music player unit 11084 is provided in the mobile telephone 11001 side, and output is possible from an external earphone jack 11046 via an audio input/output unit 11040. The audio input/output unit 11040 is capable of outputting a call audio signal from the telephone function unit 45 and song signals from the music player unit 11084, from a wireless short-range communication unit 1446 to the left headset 11081*a* and the right headset 11081*b*.

An equalizer 11036 of the audio input/output unit 11040 performs cartilage conduction equalization adapted for driving the cartilage conduction vibration unit 1626 or the like in the left headset 11081*a* and the right headset 11081*b* by control carried out by a control unit 11039 when a call audio signal from the telephone function unit 45 is outputted from the short-range communication unit 1446. On the other hand, when a song signal from the music player unit 11084 is outputted from the short-range communication unit 1446 to the left headset 11081*a* and the right headset 11081*b*, the equalizer 11036 of the audio input/output unit 11040 increases the contribution of the air conduction component over cartilage conduction equalization by control carried out by a control unit 11039, and high-pitched regions required for music enjoyment is supplemented by direct air-conducted sound from the cartilage conduction vibration unit 1626 or the like.

The equalizer 11036 of the audio input/output unit 11040 furthermore monitors the magnitude of variation (e.g., variation in intensity of sound between fortissimo and pianissimo) in the audio signal of a song in progress in the output from the music player unit 11084, and when the audio signal falls to a predetermined level or lower (the intensity of the sound in the song migrates to the piano side), equalization is varied temporarily in accordance with the progress of the song so that the cartilage conduction component become relatively greater in the mixture ratio between the cartilage conduction component and the direct air conduction component.

The above-described control is significant in two ways. The first is a countermeasure to noise of a fixed intensity that does not vary in magnitude in terms of the audio signal in a song. This noise is inconspicuous in the forte (fortissimo) region of a song, but is conspicuous in the piano (pianissimo) region. Therefore, the mixture ratio of the air conduction component is increased in the forte region to achieve good music quality, the cartilage conduction component, which is good in the low-pitched regions, is used in the piano region, and the cartilage conduction component is increased in a relative fashion.

The second is a countermeasure to variation in the frequency characteristics of hearing in relation to the magnitude of sound. In terms of the variation in the frequency characteristics of hearing, it is known that audibility in the low-pitched regions worsens in commensurate fashion to lower magnitude sound, as indicated by, e.g., the "Fletcher and Munson equal-loudness curve." However, as described above, the air conduction component is increased in a relative manner in the forte region and the cartilage conduction component is increased in the piano region, whereby the cartilage conduction component, which is good in the low-pitched regions, is increased in the piano region to offset a reduction in audibility.

The audio input/output unit 11040 outputs an incoming-call melody or other incoming-call sound to the left headset 11081*a* and the right headset 11081*b* in alternating fashion, e.g., every second when an incoming-call sound from the telephone function unit 45 is outputted from the short-range communication unit 1446 by control carried out by the control unit 11039. An incoming-call sound is thereby easy to perceive because the incoming-call sound can be hear in alternating fashion from the left and right every second, even when the incoming-call sound is superimposed on the song being enjoyed. The incoming-call sound may be superimposed on the signal of the song being enjoyed, but it is also possible to mute the song signal to the headset on the side outputting the incoming-call sound. In this case, the incoming-call sound and the song signal can be heard in alternating fashion every second from the left and right headsets.

In the further case that a call sound signal from the telephone function unit 45 is to be outputted from the short-range communication unit 1446 and a three-party call is initiated, control is carried out by the control unit 11039 to, e.g., send the voice of a first party to the left headset 11081*a* and send the voice of the second party to the right headset 11081*b*. The voice of two other people can thereby be separately heard from the left and right ears. The details of the various functions of the mobile telephone 11001 side noted above are later described.

On the other hand, the left headset 11081*a* has a passive mode and an independent mode. In the passive mode, the sound in an equalized state as received by the short-range communication unit 1487*a* is sent to the mixer unit 1636 and the cartilage conduction vibration unit 1626 is driven. In this case, the equalizer 8238 essentially does not perform any action. In independent mode, the equalizer 8238 ordinarily performs cartilage conduction equalization by control carried out by a control unit 11039*a*. When the control unit 11039*a* has detected that the sound signal received by the short-range communication unit 1487*a* is music, the equalizer 8238 performs equalization for increasing the contribution of the air conduction component over that used during cartilage conduction equalization, and the signal is sent to the mixer unit 1636 to thereby drive the cartilage conduction vibration unit 1626. The call microphone 11023 has directivity centered about the direction of the mouth of the wearer of the left headset 11081*a*, the audio of the wearer is picked up and sent from the short-range communication unit 1487*a* to the mobile telephone 11001 and is then passed onto to the telephone function unit 45.

An ambient sound microphone 11038 in the left headset 11081*a* has wide-angle directivity centered about the direction incoming to the ear of the wearer. Noise in the area picked up by such an ambient sound microphone 11038 is inverted by a waveform inverter 1640 and inputted to the mixer unit 1636. In addition to a song signal for enjoyment, a vibration component in which noise in the area has been waveform-inverted is thereby generated in the cartilage conduction vibration unit 1626. This vibration component arrives at the tympanic membrane by cartilage conduction and air-conducted sound and offsets noise in the area that has arrived by direct air conduction at the tympanic membrane. It is thereby possible to prevent music or the like being enjoyed from being difficult to hear due to noise in the area which may possibly arrive at the tympanic membrane because the system is used with the ear hole in an unoccluded state.

However, when such offsetting of ambient sound in the area is constantly carried out, the significance of using a configuration in which the ear hole is left in an unoccluded state to be able hear external sounds is reduced by half. Therefore, in the one-hundred fifth embodiment, offsetting of ambient sound described above is stopped by control carried out by the control unit 11039*a* when either of the following conditions has occurred. The first condition occurs when the ambience sound picked up by the ambient sound microphone 11038 has rapidly increased, and at this time, offsetting of ambient sound is stopped. This is designed to ensure that there is no danger in which, e.g., vehicle horns, and other emergency sounds in the area go unheard. The second condition occurs when a human voice at a predetermined volume level or higher has been detected by the ambient sound microphone 11038, and at this time, offsetting of ambient sound is stopped. This is designed to ensure that, e.g., conversation with people in the area can be enjoyed and smooth communication can take place while the stereo headset is being worn and music or the like is being enjoyed. However, in relation to the second condition, excluding cases in which an incoming-call sound is being received or the mobile telephone 11001 has a call in progress, offsetting of ambient sound is continued in such cases. This is done with the idea of obtaining understanding of people in the area when a suitable response is not made to initiation of conversation from people in the area under such conditions, and priority is given to avoiding call obstruction and situations in which the user is unaware of an incoming call to the mobile telephone 11001.

In the one-hundred fifth embodiment of FIG. 171, the configuration is such that the left headset 11081*a* and the right headset 11081*b* each receive audio signals from the mobile telephone 11001, and the processing described above is carried out independently in the respective control units 11039*a* (the drawing of which is omitted in the right headset 11081*b*). Therefore, the right headset 11081*b* can be understood in accordance with the left headset 11081*a*, and a description thereof is omitted. The details of the various functions of the left headset 11081*a* side noted above are later described.

FIG. 172 is an expanded system block view of the one-hundred fifth embodiment of FIG. 171. The mobile telephone and the left and right stereo headset are essentially the same as in FIG. 171, and therefore, the same reference numerals are used and a drawing of the internal configuration of the mobile telephone 11001 is omitted. Also, in relation to the headset in FIG. 172, the block names are left first headset 11081*a* and right first headset 11081*b* in order to distinguish from other later-described stereo headsets.

In the expanded system shown in FIG. 172, a dedicated mobile music player 11084*b* having a short-range communication unit 1446*b* is added. The left headset 11081*a* and the right headset 11081*b* are capable of intercommunication in the same manner as FIG. 171, are capable of receiving song signals from the mobile music player 11084*b*, and perform the operations described in FIG. 171, including processing of song signals from the mobile music player 11084*b*, when an incoming-call signal is received from the mobile telephone 11001 or a call is started while enjoying music. When the mobile music player 11084*b* is in an ordinary configuration, the left first headset 11081*a* and the right first headset 11081*b* are in independent mode, and the equalizer 8238 is mainly operating. In a system such as FIG. 172, when the left first headset 11081*a* and the right first headset 11081*b* are in independent mode, a system configuration is possible even when the mobile telephone 11001 is an ordinary mobile telephone that does not have a cartilage conduction equalization function. When the mobile music player 11084*b* has the same equalizer 11036 and control unit 11039 thereof for cartilage conduction as in the mobile telephone 11001, the left first headset 11081*a* and the right first headset 11081*b* function in the passive mode.

A call/sound source server 11084*c* having a short-range communication unit 1446*c* is furthermore added to the expanded system in FIG. 172. The left first headset 11081*a* and the right first headset 11081*b* are capable of intercommunication with the mobile telephone 11001 and the mobile music player 11084*b*, and are capable of communicating with the call/sound source server 11084*c* as well. When communicating with such a call/sound source server 11084*c*, the left first headset 11081*a* and the right first headset 11081*b* are in the independent mode and the equalizer 8238 is mainly operating. The call/sound source server 11084*c* has the same telephone call functions and music playback functions are that in the mobile telephone 11001, and when provided with the equalizer 11036 and the control unit 11039 thereof for cartilage conduction, the left first headset 11081*a* and the right first headset 11081*b* function in passive mode.

The call/sound source server 11084*c* is capable of distributing call, music, and other sound sources to a plurality of headsets within short-range communication distance, and as an example thereof, a left second headset 11081*c* and the right second headset 11081*d* capable of communication with the short-range communication unit 1446*c* are illustrated in FIG. 172. The details of the configuration of the left second headset 11081*c* and the right second headset 11081*d* are the same as those of the left first headset 11081*a* and the right first headset 11081*b*, and a description is therefor omitted.

FIG. 173 is a flowchart of the operation of the control unit 11039 of the mobile telephone 11001 in the one-hundred fifth embodiment of FIG. 171. The flow of FIG. 173 begins when a main power source is turned on by the operation unit 9; and in step S642, an initial startup and a check of each unit function are performed. Next, in Step S644, a check is performed to determine whether the headset mode (a mode for outputting an audio signal of the mobile telephone 11001 to the left first headset 11081*a* and the right first headset 11081*b*) has been set, and if the headset mode has been set, the routine proceeds to Step S646. In Step S646, a check is performed to determine whether the music player is on and a music sound signal is being outputted.

When it has been detected that the music player is on in Step S646, the routine advances to Step S648, an instruction is issued for an equalization setting in which the air conduction component is increased over cartilage conduction equalization, and the routine proceeds to Step S650. Insufficiency in high-pitched regions of the frequency characteristics of cartilage conduction is thereby supplemented, and music replay approximate to the original sound is achieved. In Step S650, a check is performed to determine whether the music sound signal has dropped to a predetermined level or lower (the intensity of the sound in the song migrates to the piano side). If such is the case, the routine proceeds to Step S652, an instruction is issued for temporarily correcting equalization in which the cartilage conduction component is increased in a relative manner by a predetermined ratio, and the routine proceeds to Step S654. As described above, this has significance as a noise countermeasure in the region where sound is small and as a countermeasure against reduction of audibility in low-pitched regions.

On the other hand, when it has been detected in Step S650 that the music sound signal has not dropped to a predetermined level or lower (the intensity of the sound in the song migrates to the forte side), the routine proceeds directly to Step S654, and the equalization setting in which the air conduction component was increased in Step S648 is maintained. Supplementation of high-pitched regions by the air conduction component is carried out in the region in which the volume is high, and music replay approximate to the original sound is achieved. Also, when it has not been detected that the music player is on in Step S646, the routine advances to Step S656, an instruction for a cartilage conduction equalization setting is issued, and the routine proceeds to Step S654. As described below, Step S646 to Step S656 are repeated at high speed, and it is therefore possible to adapt to variations in the magnitude of the sound between the forte side and the piano side midway through a song.

For simplification, Step S650 to Step S652 above have a single criterion for determining the predetermined level and variation of equalization has two stages depending on whether the cartilage conduction component is to be increased by a predetermined ratio or not. In actuality, the configuration is such that judgment level and the increase ratio of the cartilage conduction component have a plurality of stages, or that variation is continuous without any stages. In this case, variation in equalization is carried out using a table for determining the judgment level and the increase ratio of the cartilage conduction component. However, the data in the table is obtained by combining two types of tables, which are prepared in accordance with the significance of noise countermeasures having the fixed intensity noted above and in accordance with "Fletcher and Munson equal-loudness curves," and ultimate change in equalization is determined thereby.

In Step S654, a check is performed to determine whether there has been an incoming call to the mobile telephone. If there is an incoming call, the routine proceeds to Step S658 and an incoming-call sound is generated. If music is playing at this time, the incoming-call sound is superimposed on the music sound signal. As described above, in lieu of such superimposition, the song signal may be muted while the incoming-call sound is being generated. Next, processing is carried out for causing only the incoming-call sound to be outputted in alternating fashion every predetermined length of time (e.g., one second) to the left second headset 11081*c* and the right first headset 11081*b*. The incoming-call sound superimposed on the song being enjoyed (or alone) as described above can thereby be heard in alternating fashion from the left first headset 11081*a* and the right first headset 11081*b*.

Next, in Step S662, a check is performed to determine whether an operation has been performed for initiating a call in response to an incoming call (if music is being played back, replay is also interrupted by this operation). If an operation to initiate a call has not been detected, the flow returns to Step S658. Step S658 to Step S662 are thereafter repeated as long as a call has not been initiated, and alternating output of the incoming-call sound from the left first headset 11081*a* and the right first headset 11081*b* is continued. On the other hand, when a call start operation is detected in Step S662, the flow proceeds to Step S664 and cartilage conduction equalization is instructed.

In Step S666, a check is performed to determine whether there is a third-party call, and if such is the case, the routine advances to Step S668, and the received voices of the other two parties are separated. The routine then proceeds to Step S670 and performs processing for distributing and outputting the separated voices to the left first headset 11081*a* and the right first headset 11081*b*, and the routine proceeds to Step S672. The voices of the other two parties can thereby be separated and heard from the left and right ears as described above. On the other hand, when a three-party call is not confirmed in Step S666, the routine proceeds directly to Step S672. In Step S672, a check is performed to determine whether an operation for ending a call has been performed (if music was being played back, replay is also restarted by this operation). If the call has not ended, the routine returns to Step S666, and Step S666 to Step S672 are thereafter repeated until a call end operation is detected, and during this interval, if there is a switch between a three-party call and an ordinary two-party call, the switch is handled by the routine. On the other hand, when an operation for ending a call is detected in Step S672, the routine proceeds to Step S674.

On the other hand, when the headset mode is not detected in Step S644, the routine proceeds to Step S676 and performs ordinary mobile telephone processing, and the routine proceeds to Step S674. The specific content of Step S676 is variously described in the other embodiments, and a description is therefore omitted. When an incoming call to the telephone is not detected in Step S654, the routine proceeds directly to Step SS674. In this case, music reply is continued in the manner described below.

In Step S674, a check is performed to determine whether the main power has been turned off, and if the main power is off, the flow returns to Step S644. Step S644 to Step S676 is repeated as long as the main power is not turned off. In this repetition, Step S644 to Step S652 are repeated at high speed when there is no incoming call to the telephone in Step S654 or after a call end has been detected in Step S672, and it is possible to handle cancellation of the headset mode and turning the music player on and off. When neither has occurred, music replay is continued, and it is possible to adapt to variations in sound magnitude between the forte side and the piano side midway through a song. On the other hand, the flow ends when the main power is detected to have been turned off in Step S674.

FIG. 174 is a flowchart of the operation of the control unit 11039*a* of the headset in the one-hundred fifth embodiment of FIG. 171. The flow of FIG. 174 begins when a main power source is turned on by the operation unit 1409; and in step S682 an initial startup and a check of each unit function are performed. Next, in Step S684, an instruction is issued to make a short-range communication connection with the mobile telephone 11001, and the routine proceeds to Step S686. When a short-range communication has been established on the basis of the instruction in Step S684, the left second headset 11081*c* and the mobile telephone 11001 thereafter remain constantly connected as long as the main power is not turned off. In Step S686, a check is performed to determine whether a short-range communication has been established with the mobile telephone 11001, and when communication has been confirmed to be established, the routine proceeds to Step S688.

In Step S688, the ambient sound microphone 11038 is turned on, the routine advances to Step S690, and an instruction is issued to subject the ambient sound picked up by the ambient sound microphone 11038 to waveform inversion and superimpose the inverted waveform on the sound signal from the mobile telephone 11001. When the ambient sound microphone 11038 has already been turned on when the routine arrives at Step S688, no action is performed in this step and the routine proceeds to Step S690. When an instruction has already been issued to superimpose the waveform-inverted signal of the ambient sound when the routine arrives at Step S690, no action is performed in this step and the routine proceeds to Step S692. Raw ambient noise that enters the ears thereby is offset by the waveform-inverted ambient noise outputted from the cartilage conduction vibration unit 1626.

Next, in Step S692, a check is performed to determine whether the mode is the independent mode, and if the mode is the independent mode, a check is performed to determine whether a song sound signal is being received in Step S694. When reception of a song sound signal is not detected, the routine advances to Step S696, sets the cartilage conduction equalization, and the routine arrives at Step S698. On the other hand, when reception of a song sound signal is not detected in Step S694, the routine proceeds to Step S700, equalization for increasing the air conduction component in a relative manner is set, and the routine arrives at Step S698. When the mode is not detected to be the independent mode in Step S692, the mode must be the passive mode, and since an equalized sound signal will be received from the mobile telephone 11001, the routine proceeds directly to Step S698 without performing modification of equalization on the left second headset 11081*c* side.

In Step S698, a check is performed to determine whether a rapid increase in ambient sound has been detected by the ambient sound microphone 11038. If there has been no rapid increase in ambient sound, the routine advances to Step S702, and a check is performed to determine whether an incoming-call sound is being received from the mobile telephone 11001. If an incoming-call sound is not being received, the routine advances to Step S704, a check is performed to determine whether a call is in progress, and if a call is not in progress, the routine arrives at Step S706. That the routine has arrived at Step S706 indicates that a song is being enjoyed or that no sound signal is being received from the mobile telephone 11001.

In Step S706, a check is performed to determine whether a human voice at a predetermined level or higher has been detected by the ambient sound microphone 11038 with the assumption the above-described state holds true. Detection of whether the sound is a human voice is made by verifying, e.g., frequency components unique to a human voice and variation patterns in volume and pitch. When a human voice at a predetermined level or higher has been detected in Step S706, the routine advances to Step S708, an instruction is issued to stop superimposition of a waveform-inverted signal of ambient sound instructed in Step S690, and the routine returns to Step S692. If an instruction to stop superimposition of a waveform-inverted signal of ambient sound has already been issued when the routine arrives at Step S708, no action is performed in this step and the routine returns to Step S692.

On the other hand, when receipt of an incoming-call sound has been detected in Step S702, when a call is detected to be in progress in Step S704, or when a human voice has not been detected at a predetermined level or higher in Step S706, in any of these cases, the routine proceeds to Step S710, an instruction is issued to subject the ambient noise to waveform inversion and to superimpose the inverted waveform in the same manner as Step S690, and the routine proceeds to Step S712. When superimposition of the waveform-inverted signal of ambient sound has already been instructed when the routine arrives at Step S710, no action is performed in this step, and the routine proceeds to Step S712. Also, when it is not confirmed in Step S686 that short-rand communication has been established, the routine proceeds directly to Step S712.

In Step S712, a check is performed to determine whether the main power has been turned off, and if the main power has not be turned off, the routine returns to Step S686. Steps S686 to Step S712 are thereafter repeated as long as the main power is not detected in Step S712 to have been turned off. Modification of the independent mode and passive mode, modification of the cartilage conduction equalization setting, and modification of superimposition and stopping superimposition of the waveform-inverted signal of ambient sound are thereby carried out in accordance with variation in conditions. On the other hand, the flow ends when it has been detected in Step S712 that the main power has been turned off The various features shown in the embodiments of the present invention are not necessarily unique to each embodiment, and the features of each embodiment can be used with modifications, as appropriate, and can be used in combination, wherever it is possible to benefit from the advantages thereof. For example, in lieu of stopping the waveform-inverted signal of ambient sound in Step S708 in the flowchart of FIG. 174, it is possible to input the ambient sound (in this case, rapidly increased ambient sound or human voice) picked up by the ambient sound microphone 11038 to the mixer unit 1636 without performing waveform inversion, and to add this to the unaltered voice and then output the human voice from the cartilage conduction vibration unit 1626 as well. It is thereby possible to be more readily aware of vehicle horns, initiation of conversation from people in the area, and other situations.

Furthermore, in the one-hundred fifth embodiment shown in FIG. 171 to FIG. 174, the configuration is such that the left headset 11081*a* and the right headset 11081*b* receive audio signals from the mobile telephone 11001, and the above-described processing is carried out in their respective control units. However, in lieu of such a configuration of one-hundred fifth embodiment, it is also possible to use a configuration in which the left headset 11081*a* receives and sends, and performs overall control of equalization, ambient sound offsetting, and the like. In this case, the right headset 11081*b* is configured to merely receive drive signals from the left headset 11081*a* and to solely cause the cartilage conduction unit to vibrate without direct intercommunication with the mobile telephone 11001. Also, in this case, in reverse from the description above, it is apparent that it is also possible to use a configuration in which the right headset 11081*b* receives and sends, and performs overall control; and the left headset 11081*a* is configured to merely receive drive signals and to solely cause the cartilage conduction unit to vibrate.

Also, in the one-hundred fifth embodiment shown in FIG. 171 to FIG. 174, the ambient sound microphone 11038 is provided to the left headset 11081*a* side, and control for modification of superimposition of the waveform-inverted signal of ambient sound or stoppage thereof is carried out on the left headset 11081*a* side in order to accurately pick up ambient sound directed at the ear. However, the specific configuration of such control is not limited to the embodiments. For example, in order to simplify the configuration of the headset side, it is possible to use configuration in which the ambient sound microphone 11038 is provided to the mobile telephone 11001 side, control for modification of superimposition of the waveform-inverted signal of ambient sound or stoppage thereof is carried out on mobile telephone 11001 side, and only resulting sound signals are sent to the headset side. Such a configuration assumes that substantially all ambient sound entering the ear can be ascertained even when the ambient sound microphone 11038 is provided to the mobile telephone 11001 side. It is also possible to use a configuration in which the ambient sound microphone 11038 alone is provided to the headset 11081*a* side, and information about the picked-up sound is sent to the mobile telephone 11001 side to have control for modification of superimposition of the waveform-inverted signal of ambient sound or stoppage thereof carried out on the mobile telephone 11001 side in order to accurately pick up ambient sound directed at the ear.

In the one-hundred fifth embodiment shown in FIG. 171 to FIG. 174, a configuration was described in which the cartilage conduction vibration unit is located in the headset, but the feature in which the mixture ratio between the cartilage conduction component and the direct air conduction component is temporarily varied on the basis of the magnitude of change in the sound signal as described in, e.g., the one-hundred fifth embodiment can also be implemented in the case that the cartilage conduction vibration unit is provided to the mobile telephone (e.g., the upper corner part) as in other embodiments.

In the one-hundred fifth embodiment shown in FIG. 171 to FIG. 174, an example was shown for varying the mixture ratio between the cartilage conduction component and the direct air conduction component in accordance with the progress of a song on the basis of the change in magnitude of the sound signal. However, this feature is not limited to such an embodiment. For example, it is also possible to use a configuration in which the mixture ratio of the cartilage conduction component and the direct air conduction component is varied in accordance with the average volume. It is furthermore possible to use a configuration in which both configurations are used, i.e. a configuration for varying the mixture ratio of the cartilage conduction component and the direct air conduction component in accordance with the average volume and a configuration for varying the mixture ratio between the cartilage conduction component and the direct air conduction component on the basis of the change in magnitude of the sound signal.

In the one-hundred fifth embodiment shown in FIG. 171 to FIG. 174, a configuration is used in which communication between the mobile telephone 11001, the mobile music player 11084*b*, the call/sound source server 11084*c*, and the headsets 11081*a* to 11081*d* is carried out by wireless short-range communication, but communication therebetween may also be carried out by wired communication using a cable or the like.

One-hundred Sixth Embodiment

FIG. 175 is a block view related to a one-hundred sixth embodiment according to an aspect of the present invention, and is configured as a mobile telephone 12001. The block view of one-hundred sixth embodiment in FIG. 175 has much in common with the configuration of the eighty-sixth embodiment of FIG. 131 and elsewhere, and therefore the same reference numerals as in FIG. 131 are used for the same portions, and a description thereof is omitted unless particularly required. For simplification, the internal configuration of, e.g., the telephone function unit 45 and the display unit 205 is omitted from the drawing in FIG. 175. The drive functions of the cartilage conduction vibration unit 228 are brought together as a drive unit 12038. Furthermore, for simplification, the configuration that does not directly relate to the description of the one-hundred sixth embodiment is omitted from the drawing. However, the one-hundred sixth embodiment may be provided with other configurations omitted from the description and omitted from the drawing in FIG. 175, and may be implemented in combination with the various features of other embodiments.

The one-hundred sixth embodiment of FIG. 175 differs from the eighty-sixth embodiment of FIG. 131 in that the configuration is provided with a microphone 12023 (generically referred to as a later-described first microphone 12023*a*, a second microphone 12023*b*, a directivity-switching unit 12023*c*, and the like) capable of switching directivity is provided, and the directivity of the microphone 12023 can be switched in harmony with the cartilage conduction function and various other functions of the mobile telephone 12001. In order to describe this difference, the microphone 223 illustrated in the block of the telephone function unit 45 in FIG. 131 is illustrated outside the telephone function unit 45 in FIG. 175. A detailed description will proceed below with focus on the directivity switching of the microphone 12023.

The directivity-switchable microphone 12023 in the one-hundred sixth embodiment is endowed with sharp directivity by having a first microphone 12023*a* and a second microphone 12023*b*, which have no directivity, arranged in proximity at a predetermined distance from each other, and sounds from other than a target direction can be reduced using the phase difference or the like of the first microphone 12023*a* and the second microphone 12023*b* using the directivity-switching unit 12023*c*. The directivity-switching unit 12023*c* varies the phase difference processing, whereby the sharpness of the directivity and the direction of directivity can be adjusted. Examples of such a directivity-switchable microphone 12023 are described in JP-A 6-30494, JP-A 2011-139462, and elsewhere. The directivity-switching unit 12023*c* of the present invention, ordinary stereo audio processing can be carried out on the basis of the output information of the first microphone 12023*a* and the second microphone 12023*b* when the directivity is to be widened by reducing or completely avoiding phase difference processing.

In the one-hundred sixth embodiment, the sharpness of the directivity and the direction of directivity of the microphone 12023 is automatically adjusted in coordination with the various functions of the mobile telephone 12001 using a directivity-switchable microphone 12023 such as that described above. The main information source for this automatic adjustment is the acceleration sensor 49 and various mode switching of the mobile telephone 12001.

FIG. 176 is a schematic view for describing an image of the automatic adjustment of the direction of directivity and the sharpness of directivity of the directivity-switchable microphone 12023 in the one-hundred sixth embodiment of FIG. 175. FIGS. 176(A) and (B) show the manner in which the direction of directivity is automatically switched to the left and right in accordance with the tilt of the mobile telephone 12001 on the basis of the detection of gravitational acceleration by the acceleration sensor 49. FIG. 176(A) shows the state in which the right-side cartilage conduction unit 12024 as viewed from the front surface is brought against the right ear 28 when the mobile telephone 12001 is held with the right hand. FIG. 176(A) shows the face being viewed from the side, and an outline of the mobile telephone 12001 is illustrated as an imaginary line in order to show the positional relationship between the first microphone 12023*a* and the second microphone 12023*b*, which cannot be seen from the back surface. In this state, the mobile telephone 12001 is tilted right and downward as viewed from the front surface (illustrated as left downward in FIG. 176(A) as viewed from the back surface), and the control unit 12039 issues an instruction to the directivity-switching unit 12023*c* and automatically adjusts the directivity 12023*d* of the microphone 12023 to a rightward narrow angle (illustrated as leftward in FIG. 176(A) as viewed from the back surface) in accordance with the output of the acceleration sensor 49 for detecting the tilt. The directivity 12023*d* of the microphone 12023 is thereby directed toward the mouth of the user and the voice of the user of the mobile telephone 12001 is almost exclusively picked up without ambient sounds in other directions being picked up.

Figure 176A:
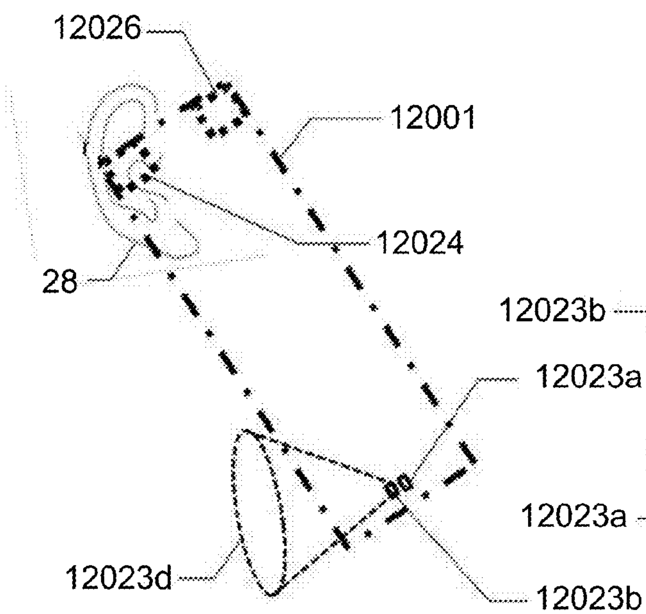
Figure 176B:
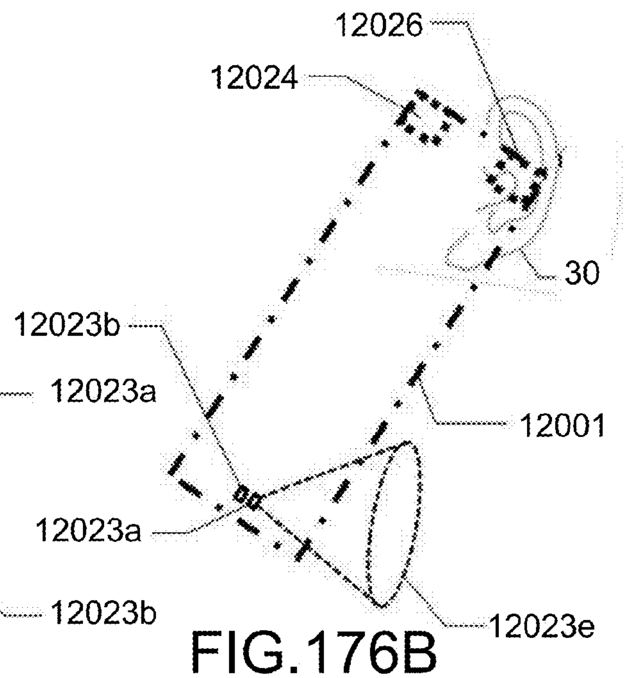

In contrast, FIG. 176(B) shows the state in which the left-side cartilage conduction unit 12026 as viewed from the front surface is brought against the left ear 30 when the mobile telephone 12001 is held with the left hand. In this state, the mobile telephone 12001 is tilted left and downward as viewed from the front surface, and the control unit 12039 issues an instruction to the directivity-switching unit 12023*c* and automatically adjusts the directivity 12023*e* of the microphone 12023 to a leftward narrow angle (illustrated as rightward in FIG. 176(B) in accordance with the output of the acceleration sensor 49 for detecting the tilt. The directivity 12023*e* of the microphone 12023 is thereby directed toward the mouth of the user and the voice of the user of the mobile telephone 12001 is almost exclusively picked up without ambient sounds in other directions being picked up.

Figure 176C:
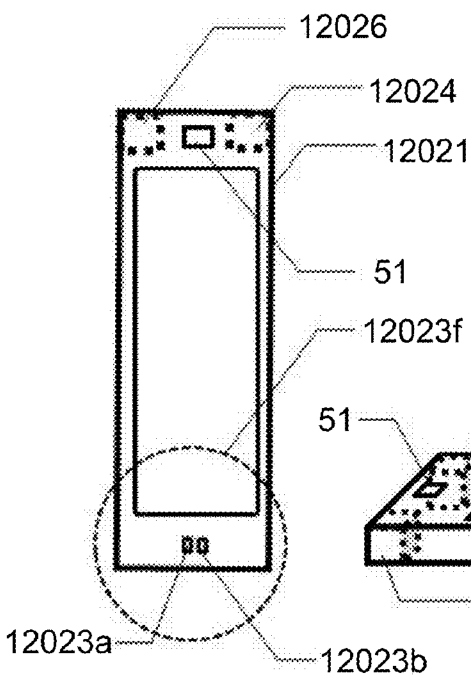

FIG. 176(C) shows a state in which the mobile telephone 12001 is being used in the videoconferencing mode. Vibration output to the left and right cartilage conduction units 12024, 12026 is not carried out in the videoconferencing mode, and audio is outputted from the air conduction speaker 51. In this state, the mobile telephone 12001 is not tilted as viewed from the front surface. The control unit 12039 issues an instruction to the directivity-switching unit 12023*c* in response to the setting of the videoconferencing mode, and automatically adjusts the directivity 12023*f* of the microphone 12023 to a center narrow angle. The directivity 12023*f* of the microphone 12023 is thereby directed toward the front surface, and the voice of the user directed to the mobile telephone 12001 is almost exclusively picked up without ambient sounds in other directions being picked up. The configuration may be such that the main information source for automatic adjusting the directivity 12023*f* of the microphone 12023 to a center narrow angle using the control unit 12039 is the output of the acceleration sensor 49 for detecting that the mobile telephone 12001 is not tilted left or right, instead of the videoconferencing mode setting. Furthermore, in lieu of this configuration, it is also possible to detect the videoconferencing state by detecting that the upper part of the mobile telephone 12001 has not been brought to the ear, using a configuration which conforms to, e.g., the pair of infrared light-emitting units 19, 20 and the shared infrared light proximity sensor 21 described in the first embodiment of FIG. 1.

Figure 176D:
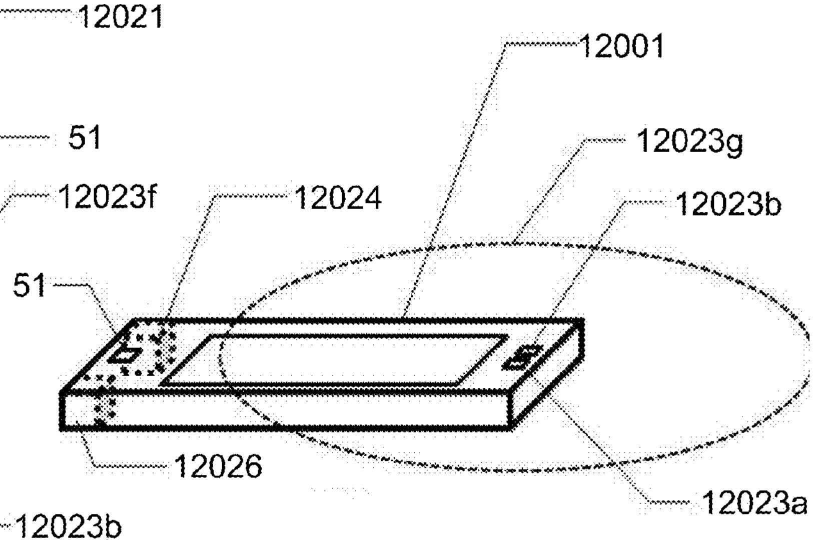

FIG. 176(D) shows a state in which the mobile telephone 12001 is being used in the speaker mode and has been placed on a desk or the like so as to be horizontal. Vibration output to the left and right cartilage conduction units 12024, 12026 is not carried out in the speaker mode, and audio is outputted from the air conduction speaker 51. Such usage is advantageous for carrying out a conference call or at other times in which a single mobile telephone 12001 is surrounded by a plurality of people. The control unit 12039 issues an instruction to the directivity-switching unit 12023*c* by detection of the state of horizontal placement based on the output of the acceleration sensor 49 and the setting of the speaker mode, and the directivity 12023*g* of the microphone 12023 is automatically adjusted to a center wide angle. The microphone 12023 is thereby set to be substantially without directivity and is capable of picking up the voices of the entire a plurality of people surrounding the desk on which the mobile telephone 12001 is placed. At this time, the directivity-switching unit 12023*c* reduces or completely avoids phase difference processing for cancelling out audio from outside the directivity range, and ordinary stereo audio processing is carried out on the basis of the output information of the first microphone 12023*a* and the second microphone 12023*b*. It is thereby possible to discriminate each of the directions of the voices of the plurality of people surrounding the mobile telephone 12001. It is also possible to assess that the mobile telephone is in the speaker mode by detecting that the upper part of the mobile telephone 12001 has not been brought to the ear by making use of a configuration that conforms to the infrared light proximity sensor 21 shown in the first embodiment of FIG. 1, in the same manner as detection of the videoconferencing state described above, in addition to the use of mode setting information.

FIG. 177 is a flowchart of the operation of the control unit 12039 of the mobile telephone 12001 in the one-hundred sixth embodiment of FIG. 175 and FIG. 176. The flow of FIG. 177 begins when a main power source is turned on, and in step S722, an initial startup and a check of each unit function are performed. Next, in step S724, the directivity of the microphone 12023 is set to a center narrow angle, and the routine proceeds to Step S726. In Step S726, a check is performed to determine whether a call operation has been performed using the mobile telephone 12001, and there has been no operation, the routine advances to Step S728, and a check is performed to determine whether there has been an incoming call to the mobile telephone 12001. If there has been an incoming call, the routine proceeds to Step S730. Also, when a call operation has been detected in Step S726, the routine proceeds to Step S730.

In Step S730, a check is performed to determine whether there has been a response by another party to the call operation or a call has been started by an operation to receive an incoming call, and if a call has been started, the routine proceeds to Step S732. Also, if a call start cannot be detected, the routine returns to Step S726, and thereafter Step S726 to Step S730 are repeated to await a call start as long as the call operation or incoming call continue.

When a call start is detected in Step S730, the routine advances to Step S732, a check is performed to determine whether the videoconferencing mode has been set. If there is not videoconferencing, the routine advances to Step S734, and a check is performed to determine whether the mode is the speaker call mode. If the mode is not the speaker mode, the routine proceeds to Step S736, and a check is performed to determine whether the mobile telephone 12001 is tilted to the left at a predetermined angle or greater. If a predetermined leftward tilt or greater is not detected, the routine proceeds to Step S738, and a check is performed to determine whether the mobile telephone 12001 is tilted to the right at a predetermined angle or greater. If a predetermined rightward tilt or greater is not detected, the routine proceeds to Step S740, the directivity of the microphone 12023 is set to a center narrow angle, and the routine proceeds to Step S742. At this time, if the directivity has been set to a center narrow angle, no action is performed in this step, and the routine proceeds to Step S742. In the mobile telephone 12001 which uses cartilage conduction, rather than the center part of the upper edge of the mobile telephone, the upper corner of the mobile telephone is brought to the ear. Therefore, the tilt during use is greater than that of an ordinary mobile telephone and the microphone 12023 tends to be set at a distance from the mouth. Therefore, a configuration for switching the directivity between left and right to allow for right hand use and left hand use as described above is particularly useful.

On the other hand, in Step S736, when it has been detected that the mobile telephone 12001 is tilted leftward at a predetermined angle or greater, the routine proceeds to Step S744, the directivity of the microphone 12023 is set to a leftward narrow angle, and the routine proceeds to Step S742. At this time, if the directivity has already been set to a leftward narrow angle, no action is performed in this step, and the routine proceeds to Step S742. In contrast, when it has been detected in Step S738 that the mobile telephone 12001 is tilted rightward at a predetermined angle or greater, the routine proceeds to Step S746, the directivity of the microphone 12023 is set to a rightward narrow angle, and the routine proceeds to Step S742. At this time as well, if the directivity has already been set to a rightward narrow angle, no action is performed in this step, and the routine proceeds to Step S742.

When it has been detected in Step S732 that the videoconferencing mode has been set, the routine proceeds to Step S748, the directivity of the microphone 12023 is set to a center narrow angle, and the routine proceeds to Step S742. At this time as well, if the directivity has already been set to a center narrow angle, no action is performed in this step, and the routine proceeds to Step S742. Furthermore, when it has been detected in Step S734 that the speaker call mode has been set, the routine advances to Step S750, and a check is performed to determine whether the mobile telephone is in a state of horizontal placement on the basis of the output of the acceleration sensor 49. If such is the case, the routine proceeds to Step S752, the directivity of the microphone 12023 is set to a center narrow angle, the routine advances to Step S754, stereo processing is instructed, and the routine proceeds to Step S742. At this time as well, if the directivity has already been set to a center narrow angle, no action is performed in Step S752, the stereo processing instruction is continued in Step S754, and the routine proceeds to Step S742. On the other hand, when a state of horizontal placement is not detected in Step S750, the routine proceeds to Step S748, the directivity of the microphone 12023 is set to a center narrow angle, and the routine proceeds to Step S742. At this time as well, if the directivity has already been set to a center narrow angle, no action is performed in Step S748, and the routine proceeds to Step S742.

In Step S742, a check is performed to determine whether a call end operation has been performed. If no call end operation has been performed, the routine returns to Step S732. Step S732 to Step S754 are thereafter repeated as long as no call end operation is detected in Step S742, and the directivity is automatically switched so as to adapt to changes in various conditions during a call. On the other hand, when a call end operation has been detected in Step S742, the routine proceeds to Step S756. When an incoming call has not been detected in Step S728, the state corresponds to the lack of a call operation and an incoming call, and the routine therefore proceeds to Step S758. In Step S758, processing for handing an audio input operation using the microphone 12023 is carried out, and the routine proceeds to Step S756. When the routine arrives at audio input-handling processing of Step S758, the directivity of the microphone 12023 is set to a center narrow angle in Step S724, and the voice of audio input instructions of the user facing the mobile telephone 12001 is therefore almost exclusively picked up without ambient sounds in other directions being picked up.

In Step S756, a check is performed to determine whether the main power of the mobile telephone 12001 has been turned off, and if the main power has not been turned off, the routine returns to Step S724. Step S724 to Step S756 are thereafter repeated as long as the main power is not detected in Step S756 to have been turned off, and adaptation is made to changes in various conditions of the mobile telephone 12001. In other words, the flow ends when the main power is not detected in Step S756 to have been turned off Implementation of the features of the present invention described above is not limited to the aspects in the embodiments described above, and implementation is also possible using other aspects where it is possible to benefit from the advantages thereof. For example, the configuration for automatically switching between left and right directivity by detection of rightward tilt and leftward tilt of the mobile telephone in the one-hundred sixth embodiment, and the configuration for automatically adjusting the directivity and the direction of directivity in accordance with various conditions are not limited to mobile telephones that use cartilage conduction, and may also be used in mobile telephones which perform incoming talk using an ordinary speaker.

In the one-hundred sixth embodiment, assessment of left-hand use or right-hand use is detected by tilt detection carried out by the acceleration sensor, but assessment of left-hand use and right-hand use is not limited thereto. For example, it is also possible to detect whether the left corner part or the right corner part of the upper part of the mobile telephone has been brought to the ear by using a configuration the conforms to the pair of infrared light-emitting units 19, 20 and the shared infrared light proximity sensor 21 shown in the first embodiment of FIG. 1. It is furthermore possible to assess left-hand use or right-hand use by providing a contact sensor in the back surface or elsewhere of the mobile telephone, and using the fact that the contact conditions of the hand are different in the case of left-hand holding and right-hand holding.

One-hundred Seventh Embodiment

FIG. 178 is a perspective view and cross-sectional view related to a one-hundred seventh embodiment according to an aspect of the present invention, and is configuration as a mobile telephone 13001. The one-hundred seventh embodiment has much in common with the one-hundred third embodiment of FIG. 168, and therefore parts that are in common have been given like reference numerals, and a description thereof has been omitted unless there is a particular need. The internal configuration of the mobile telephone 13001 is the same as the fifty-seventh embodiment and therefore FIG. 87 will be invoked. The one-hundred seventh embodiment of FIG. 178 is different from the one-hundred third embodiment of FIG. 168 in relation to the cartilage conduction vibration source; an electromagnetic air-conduction speaker 9925 is used in the one-hundred third embodiment whereas a piezoelectric bimorph element 13025 is used in the one-hundred seventh embodiment. Also, a characteristic structure that is different from the other embodiments as described below is used for supporting the piezoelectric bimorph element 13025. In the one-hundred seventh embodiment, the piezoelectric bimorph element 13025 is strictly the vibration source of the cartilage conduction units 8224 and 8226, which is different from the one-hundred third embodiment, and air-conducted sound is generated incidentally by vibration of the upper end part of the front panel 8201*a*. Concerning this point, the one-hundred seventh embodiment of FIG. 178 is approximate to the eighty-eighth embodiment of FIG. 136.

The one-hundred seventh embodiment is described in detail below with reference to FIG. 178. FIG. 178(A) is a perspective view showing the external appearance of the mobile telephone 13001 of the one-hundred seventh embodiment, and a hole 9901*b* for air-conducted sound transit such as in the one-hundred third embodiment of FIG. 168 is not provided.

Next, the arrangement and support structure of the piezoelectric bimorph element 13025 will be described with reference to FIG. 178(B), which is a view along the cross section B1-B1 of FIG. 178(A). As described above, the one-hundred seventh embodiment has the piezoelectric bimorph element 13025 as a vibration source. In terms of the support thereof, the piezoelectric bimorph element 13025 is arranged vertically at an intermediate point of the cartilage conduction units 8224 and 8226, the upper-side end is inserted into a hanging part 8227*c* of the upper frame 8227 and is supported in a cantilever manner. The other end of the piezoelectric bimorph element 13025 on the lower side freely vibrates, and the counteraction thereof is transmitted from the hanging part 8227*c* to the cartilage conduction units 8224 and 8226. The vibration direction thereof is the direction perpendicular to the front panel 8201*a* (the direction perpendicular to the plane of the drawing in FIG. 178).

The internal hanging part 8227*c* and the piezoelectric bimorph element 13025 inserted therein are shown by a broken line in FIG. 178(C), which is a top surface view of FIG. 178(A). It is apparent from FIG. 178(C) that the hanging part 8227*c* is arranged nearer to the back panel 8201*b*, and that the piezoelectric bimorph element 13025 vibrates near the back panel 8201*b* without being in contact with other components other than the hanging part 8227*c*. The piezoelectric bimorph element 13025 thereby vibrates without occupying space near the front panel 8201*a* in the upper part of the mobile telephone 13001 where many members are arranged. The counteractions of the vibrations of the piezoelectric bimorph element 13025 are transmitted only to the upper frame 8227 via the hanging part 8227*c*.

FIG. 178(D), which is a view along the cross section B2-B2 of FIG. 178(A) to FIG. 178(C), shows that the hanging part 8227*c* is integrated with the upper frame 8227, the hanging part 8227*c* is provided near to the back panel 8201*b*, and the free end of the piezoelectric bimorph element 13025 inserted therein vibrates in the direction perpendicular to the front panel 8201*a* as indicated by the arrow 13025*a*. In FIG. 168(D), it is apparent that the free end of the piezoelectric bimorph element 13025 vibrates without being in contact with other components other than the hanging part 8227*c*, and the counteractions of the vibrations thereof are transmitted only to the upper frame 8227 via the hanging part 8227*c*.

FIG. 178(E) is a view along the cross section B3-B3 shown in FIG. 178(B), the internal hanging part 8227*c* and the piezoelectric bimorph element 13025 inserted therein are shown by a broken line in FIG. 178(C). The piezoelectric bimorph element 13025 in the one-hundred seventh embodiment vibrates without occupying space near the front panel 8201*a* in the upper part of the mobile telephone 13001 where many members are arranged, and is therefore thinly configured in the direction of vibration, as shown in FIGS. 178(A) to (D). Such a thin piezoelectric bimorph element 13025 is supported in a cantilever manner vertically nearer the back panel 8201*b* at an intermediate point of the cartilage conduction units 8224 and 8226, whereby vibrations can be uniformly transmitted to the cartilage conduction unit 8224 and 8226 without greatly occupying space in the upper part of the mobile telephone 13001.

The one-hundred seventh embodiment shown in FIG. 178 is furthermore configured in view of making use of cartilage conduction in a frequency range of 4 kHz or higher. Matter that will serve as a base therefor is described below.

As previously described, the graph showing the measurement data of a mobile telephone in FIG. 79 shows that when the mobile telephone is brought into contact with the ear cartilage around the entrance part of the external auditory meatus with a contact pressure of 250 gram-force (the sound pressure of normal use), the sound pressure 1 cm into the external auditory meatus from the entrance part to the external auditory meatus increases by at least 10 dB in the main frequency band (500 Hz to 2300 Hz) of speech in comparison with a non-contact state. (See a comparison of the non-contact state indicated by a solid line in FIG. 79 and the contact state at 250 gram-force indicated by the dot-dash line.) In contrast, the difference in sound pressure between the non-contact state and the contact state at 250 gram-force becomes relatively smaller in higher frequency bands (e.g., 2300 Hz to 7 kHz). However, according to FIG. 79, an increase in sound pressure in the contact state at 250 gram-force in comparison with the non-contact state is readily apparent even in higher frequency bands. This circumstance is the same in a comparison of the non-contact state (solid line) and the sound pressure at a contact pressure of 500 gram-force (dot-dash line) in which the external auditory meatus is occluded, and although not as dramatic as the main frequency band (500 Hz to 2300 Hz) of speech, an increase in sound pressure in the contact state at 500 gram-force in comparison with the non-contact state is readily apparent even in higher frequency bands (e.g., 2300 Hz to 7 kHz). In particular, direct air-conducted sound is not present because the external auditory meatus is occluded in a contact pressure of 500 gram-force, and the increase in sound pressure from the non-contact state is due to cartilage conduction.

As previously noted, in terms of changes in the frequency characteristics of hearing, it is known that audibility in the low-pitched regions is worsened as the sound is reduced. FIG. 179 shows this fact and is referred to as a "Fletcher and Munson equal-loudness curve." It is apparent from FIG. 179 that when, e.g., 100 Hz and 1 kHz are compared, equal loudness can be obtained on the equal-loudness curve of 100 phon at a sound pressure level of about 100 decibels. However, it is apparent according to the equal-loudness curve of 40 phon that 1 kHz is 40 dB, but 100 Hz is 60 dB, and in order to obtain the same loudness as 1 kHz at 100 Hz, an extra 20 db of sound pressure is required. In other words, audibility is worsened as the equal-loudness curve rises above the point that intersects the horizontal axis, and audibility is improved therebelow. It is apparent that an increase in sound pressure in the relatively low-frequency region in FIG. 79 is advantageous in terms of supplementing a reduction in human audibility in a region in which sound is low such as in FIG. 179.

On the other hand, in a relatively high-frequency region (e.g., 4 kHz to 10 kHz) as shown in FIG. 179, the audibility of humans is maintained at a relatively good level even when the sound is reduced (admitting the fact that audibility is reduced from the high-frequency side due to aging). When consideration is given to such characteristics of human audibility, a sound pressure increase by cartilage conduction in the high-frequency band (e.g., 2300 Hz to 7 kHz) in accordance with the experiment results of FIG. 79 shows that practical sound transmission is possible by cartilage conduction, not only in the main frequency band (500 Hz to 2300 Hz) of speech, but also in higher frequency regions (e.g., 4 kHz to 10 kHz). In reality, when the cartilage conduction unit is driven with a pure tone and brought into contact with ear cartilage in a state in which an earplug is used to eliminate the effect of direct air-conducted sound, it was found that sound can be satisfactorily heard by cartilage conduction at least at 7 kHz. Furthermore, in an experiment with young subjects, an increase in sound pressure is clearly heard by change from a non-contact state to a contact state, even at 10 kHz, and it was confirmed that cartilage conduction occurs even at such a frequency.

The one-hundred seventh embodiment shown in FIG. 178 is configured so as to make use of cartilage conduction across the frequency region of 4 kHz and higher with acknowledgement of the above, and specifically, equalization is performed with consideration given to the characteristics of cartilage conduction in the region 300 Hz to 7 kHz. Also, when the external earphone jack 8246 is used, wide-band equalization (e.g., equalization in the region of 20 Hz to 20 kHz) is performed with consideration given to the playback of a music source.

The one-hundred seventh embodiment shown in FIG. 178 expands the frequency band that makes use of cartilage conduction to 7 kHz as described above. Cartilage conduction can be used even in a frequency band of 7 kHz or higher as described above, but the reason for using a setting of 7 kHz is to give priority to protecting privacy and to reducing annoyance to the surroundings, which are advantages of cartilage conduction. Human audibility as shown in FIG. 179 remains high in relation to still small sounds in the high-frequency band of 7 kHz or higher. On the other hand, the high-frequency band of 7 Hz or higher is a region that is heard as a raspy sound and is unpleasant to the surrounding even when the sound is small. Therefore, the piezoelectric bimorph element is not allowed to vibrate in a frequency band of this region, and unpleasant air-conducted sound is prevented from being produced in the surroundings even with a small amount of sound leakage.

Currently, in a call by a typical mobile telephone, a frequency band of 3.4 kHz or greater is not used, but as described above, the sampling frequency in PHS and IP telephones is 16 kHz, and can be quantized to 8 kHz. Therefore, audio signals at about 7 kHz are used. Also, broad-sense cartilage conduction in which consideration is also given to the direct air conduction component is anticipated in a mobile telephone as well in view of future improvements in the data communication rates, and in this case as well, it is believed that the piezoelectric bimorph element 13025 will be made to vibrate in a region up to about 7 kHz. In such conditions, the configuration shown in the one-hundred seventh embodiment would be very useful.

A detailed description is provided below, and the block view of one-hundred seventh embodiment is the same as the fifty-seventh embodiment, and FIG. 87 will therefore be invoked. However, the functions of the application processor 5339 and the functions of the control unit 5321 for controlling the analog front end 5336 and the cartilage conduction acoustic signal processing unit 5338 by instructions from the application processor are different from those of the fifty-seventh embodiment. Specifically, in FIG. 87, the sound signals provided by the earphone jack 5313 (corresponding to the earphone jack 8246 in FIG. 178) and the equalization of the sound signal provided to the amplifier 5340 for driving the piezoelectric bimorph element 5325 (corresponding to the piezoelectric bimorph element 13025 in FIG. 178) are different from the fifty-seventh embodiment as noted above.

FIG. 180 is a flowchart showing the functions the application processor 5339 (which calls on FIG. 87) in the one-hundred seventh embodiment. The flow of FIG. 180 illustrates an abstraction of the operation with focus on the functions of the application processor 5339 related to control of the analog front end 5336 and the cartilage conduction acoustic signal processing unit 5338 in FIG. 87. The application processor 5339 also contains typical mobile telephone functions and the like not notated in the flow of FIG. 180. The application processor 5339 is also capable of achieving the various functions shown in other various embodiments, and these functions are omitted from the drawing and the description in FIG. 180 in order to avoid complexity.

The flow of FIG. 180 begins when a main power source of the mobile telephone 13001 is turned on; in Step S762 an initial startup and a check of each unit function are performed and a screen display on the display unit 8205 of the mobile telephone 13001 is started. Subsequently, in Step S764, the function of the piezoelectric bimorph element 13025, the amplifier 5340 and other cartilage conduction units related to the driving thereof, and the outgoing-talk unit 8223 of the mobile telephone 13001 are turned off, and the routine proceeds to Step S766.

In Step S766, a check is performed to determine whether an ear phone or the like has been inserted into the external earphone jack 8246. If an insertion into the external earphone jack 8246 has been detected, the routine advances to Step S768, and a check is performed to determine whether there is an ongoing call state. If there is an ongoing call state, the routine advances to Step S770, the functions of the cartilage conduction unit and the outgoing talk unit are turned on, and the routine advances to Step S772. In Step S772, equalization is carried out with consideration given to the characteristics of cartilage conduction, in Step S774, equalization is carried out in the frequency band of 300 Hz to 7 kHz, and the routine proceeds to Step S776. The reason for dividing Step S772 and Step S774 is to functionally separate and describe the case in which an ear phone is inserted into the external earphone jack 8246 to perform a telephone call as later-described, and the case in which equalization is carried out in the frequency band of 300 Hz to 7 kHz without consideration given to the characteristics of cartilage conduction. In reality, when the cartilage conduction is turned on, Step S772 and Step S774 are executed as integrated equalization.

In Step S776, a check is performed to determine whether the entrance of the external auditory meatus is being occluded, and if not, the routine advances to Step S778, and the routine advances to Step S780 without adding the waveform-inversion signal of one's own voice. The check of whether the entrance to the external auditory meatus is being occluded is made possible by processing that deems or otherwise concludes that the external auditory meatus is occluded by an ear phone by, e.g., using the output of the pressure sensor 242 described in the fourth embodiment of FIG. 9, or detecting that an ear phone plug has been connected to the external earphone jack 8246. The addition or non-addition of the waveform-inversion signal of one's own voice is described in Step S52 to Step S56 in the flow of FIG. 10, so the details thereof are omitted. On the other hand, when it has been detected in Step S776 that the entrance to the external auditory meatus is being occluded, the routine proceeds to Step S782, the waveform-inversion signal of one's own voice is added, and the routine proceeds to Step S780.

In Step S780, a check is performed to determine whether a call has been cut off, and if not, the routine returns to Step S776, and Step S776 to Step S780 are thereafter repeated as long as the call has not been cut off. The waveform-inversion signal of one's own voice can thereby be modified in response to changes in settings and conditions even during a call. On the other hand, when it has been detected in Step S780 that a call has been cut off, the routine advances to Step S784, the functions of the cartilage conduction unit and the outgoing-talk unit are turned off, and the routine proceeds to Step S786. When an ongoing call state is not detected in Step S768, the routine proceeds directly to Step S784. If the functions of the cartilage conduction unit and the outgoing-talk unit are already in an off state when the routine arrives at Step S784, no action is performed in Step S784, and the routine proceeds to Step S786.

In contrast, when insertion into the external earphone jack 8246 has been detected in Step S766, the routine proceeds to Step S788, the cartilage conduction is turned off, and the routine proceeds to Step S790. If the cartilage conduction unit is already in an off state at this time, no action is performed in Step S788, and the routine proceeds to Step S790. In Step S790, a check is performed to determine whether there is an ongoing call state. If an ongoing call state exists, the routine advances to Step S792, the function of the outgoing-talk unit is turned on, and the routine advances to Step S774. The voice from the other party of the call outputted from the external earphone jack 8246 can thereby be heard, and the call for sending one's own voice from the outgoing-talk unit is made possible. Also, by proceeding to Step S774, equalization is performed in the frequency band of 300 Hz to 7 kHz, and the routine thereafter enters the same flow as used during cartilage conduction. In this case, the routine has not passed through Step S772, and equalization is therefore carried out in the frequency band of 300 Hz to 7 kHz without consideration given to the characteristics of cartilage conduction. In the case that Step S776 uses a method for assessing whether to deem that the external auditory meatus to be in an occluded state using the fact that an external earphone is being used, the flow, when having arrived at Step S776 by way of Step S792, almost exclusively takes a route that arrives at Step S780 by way of Step S776 to Step S782. It is thereby possible to reduce the discomfort of hearing one's own voice during earphone usage.

On the other hand, when an ongoing call state is not detected in Step S790, music data is being outputted from the external earphone jack 8246, and therefore, wide-band equalization (e.g., 20 Hz to 20 kHz) is performed in Step S794, and the routine proceeds to Step S796. In Step S796, music data playback or other music enjoyment processing is carried out, and if the processing ends, the routine proceeds to Step S786.

In Step S786, a check is performed to determine whether the main power of the mobile telephone has been turned off, and if the main power has not been turned off, the routine returns to Step S766, and Step S766 to Step S796 is thereafter repeated in accordance with the conditions as long as the main power is not detected in Step S786 to have been turned off. In contrast, the flow ends when the main power is detected in Step S786 to have been turned off. One-hundred eighth embodiment FIG. 181 is a cross-sectional view relating to a one-hundred eighth embodiment and a modification thereof according to an aspect of the present invention, and is configured as a mobile telephone 14001 or a mobile telephone 15001. The one-hundred eighth embodiment and modification thereof has much in common with the one-hundred seventh embodiment of FIG. 178, and therefore parts that are in common have been given like reference numerals, and a description thereof has been omitted unless there is a particular need. There is no difference from the one-hundred seventh embodiment in terms of the external appearance, and therefore FIG. 178(A) shall be invoked and the illustration of the perspective view in FIG. 181 is omitted. The one-hundred eighth embodiment of FIG. 181 differs from the one-hundred seventh embodiment of FIG. 178 in that the piezoelectric bimorph element 14025 or 15025 is arranged in a horizontal orientation in the one-hundred eighth embodiment and the modification thereof, whereas the piezoelectric bimorph element is arranged in a vertical orientation in the one-hundred seventh embodiment.

FIG. 181(A) in the one-hundred eighth embodiment corresponds to a view along the cross section B1-B1 of FIG. 178(A) (invoking the one-hundred seventh embodiment). It is apparent in FIG. 181(A) that a hanging part 8227*d* from the upper frame 8227 is provided to an intermediate point of the cartilage conduction units 8224 and 8226 in the one-hundred eighth embodiment as well. However, the piezoelectric bimorph element 14025 is arranged in a horizontal orientation, and the right-side end in the drawing is inserted into the hanging part 8227*d* and thereby supported in a cantilever state. The other lefts-side end of the piezoelectric bimorph element 14025 in the drawing freely vibrates, and the counteractions thereof are transmitted from the hanging part 8227*d* to the cartilage conduction units 8224 and 8226. The direction of vibration is the direction perpendicular to the front panel 8201*a* (the direction perpendicular to the plane of the drawing in FIG. 181) in the same manner as the one-hundred seventh embodiment.

The internal hanging part 8227*d* and the piezoelectric bimorph element 13025 inserted therein are shown by a broken line in FIG. 181(B), which corresponds to a top surface view of FIG. 178(A) (invoking one-hundred seventh embodiment). It is apparent from FIG. 181(B) that the hanging part 8227*d* is arranged nearer to the back panel 8201*b*, and that the piezoelectric bimorph element 14025 vibrates near the back panel 8201*b* without being in contact with other components other than the hanging part 8227*d*, in the same manner as the one-hundred seventh embodiment. The piezoelectric bimorph element 14025 thereby vibrates without occupying space near the front panel 8201*a* in the upper part of the mobile telephone 14001 where many members are arranged, in the same manner as the one-hundred seventh embodiment. In the one-hundred eighth embodiment as well, the counteractions of the vibrations of the piezoelectric bimorph element 14025 are transmitted only to the upper frame 8227 via the hanging part 8227*d*.

FIG. 181(C), which is a view along the cross section B2-B2 shown in FIGS. 181(A) and (B), shows that the hanging part 8227*d* is integrated with the upper frame 8227, and that the hanging part 8227*d* is provided near the back panel 8201*b*, in the same manner as the one-hundred seventh embodiment.

FIG. 181(D) to FIG. 181(F) show a modification of the one-hundred eighth embodiment. FIG. 181(D) corresponds to a view along the cross section B1-B1 of FIG. 178(A) (invoking the one-hundred seventh embodiment), and shows that two hanging parts 8227*e* and 8227*f* hanging from the upper frame 8227 are provided at an equidistant interval from an intermediate point of the cartilage conduction units 8224 and 8226. The piezoelectric bimorph element 15025 is arranged in a horizontal orientation in the same manner as in the one-hundred eighth embodiment, and the two hanging parts 8227*e* and 8227*f* are each inserted from inside and are supported at both ends rather than being supported in a cantilever fashion as in the one-hundred eighth embodiment. In order to achieve such a support, it is possible to use an assembled structure in which, e.g., at least one of the hanging part 8227*e* and the hanging part 8227*f* is made to be removable from the upper frame 8227, the two ends of the piezoelectric bimorph element 15025 is inserted between the hanging parts 8227*e* and 8227*f*, and the hanging parts 8227*e* and 8227*f* are thereafter integrally attached to the upper frame 8227. In the case of such a two-end support arrangement, the center portion of the piezoelectric bimorph element 15025 vibrates freely, and the counteractions thereto are transmitted from the hanging parts 8227*e* and 8227*f* to the cartilage conduction units 8226 and 8224, respectively. The direction of vibration is the direction perpendicular to the front panel 8201*a* (the direction perpendicular to the plane of the drawing in FIG. 181) in the same manner as the one-hundred eighth embodiment.

The internal two hanging parts 8227*e*, 8227*f* and the piezoelectric bimorph element 15025 inserted therein are shown by a broken line in FIG. 181(E), which corresponds to a top surface view of FIG. 178(A) (invoking the one-hundred seventh embodiment). It is apparent from FIG. 181(E) that the two hanging parts 8227*e* and 8227*f* are arranged nearer to the back panel 8201*b* in the same manner as the one-hundred eighth embodiment, and the piezoelectric bimorph element 15025 vibration near the back panel 8201*b* without being in contact with any component other than the hanging parts 8227*e* and 8227*f*. The piezoelectric bimorph element 15025 thereby vibrates without occupying space near the front panel 8201*a* in the upper part of the mobile telephone 15001 where many members are arranged, in the same manner as the one-hundred eighth embodiment. In the modification of the one-hundred eighth embodiment as well, the counteractions of the vibrations of the piezoelectric bimorph element 15025 are transmitted only to the upper frame 8227 via the hanging parts 8227*e* and 8227*f*

FIG. 181(F), which is a view along the cross section B2-B2 shown in FIGS. 181(D) and (E), shows that the hanging parts 8227*e*, 8227*f* are integrated with the upper frame 8227, and that the hanging parts 8227*e*, 8227*f* are provided near the back panel 8201*b*, in the same manner as the one-hundred seventh embodiment. In the modification, there are two hanging parts 8227*e* and 8227*f*, and in FIG. 181(F), the cross section B2-B2 corresponding to the hanging part 8227*f* portion is therefore representatively shown.

The various features shown in the preceding embodiments are not necessarily unique to the respective embodiments, and the features the embodiments may be combined or rearranged, as appropriate, with the features of other embodiments wherever it is possible to benefit from the advantages thereof. The specific individual configurations in the respective embodiments may also be substituted with other equivalent means. For example, in the one-hundred seventh embodiment of FIG. 178, the one-hundred eighth embodiment of FIG. 181, and the modification thereof, there is shown a configuration in which an end part of the piezoelectric bimorph element is inserted into the hole of the hanging part, but the support of the piezoelectric bimorph element is not limited to such a configuration, and it is also possible to use a configuration in which, e.g., the end part of the piezoelectric bimorph element is bonded to the hanging part.

Also, in the one-hundred seventh embodiment of FIG. 178, the configuration in which the piezoelectric bimorph element 13025 is arranged nearer to the back panel 8201*b* and is made to vibrate without occupying space near the front panel 8201*a* in the upper part of the mobile telephone 13001 where many members are arranged is not limited to the piezoelectric bimorph element being used as a cartilage conduction vibration source, but also has other usefulness. For example, when an electromagnetic vibrator is used as the cartilage conduction vibration source, the same advantages can be enjoyed by arranging the electromagnetic vibrator near the back panel.

Furthermore, in the present invention, the configuration in which air-conducted sound equalization is carried out across a wide band to 20 kHz for the earphone jack and cartilage conduction equalization is carried out to 7 kHz in the cartilage conduction vibration source is not limited to the use of a piezoelectric bimorph element as the cartilage conduction vibration source as shown in the one-hundred seventh embodiment of FIG. 178, and the configuration is useful when other cartilage conduction vibration sources are used. For example, this feature is useful when an electromagnetic vibrator is used as the cartilage conduction vibration source.

One-hundred Ninth Embodiment

FIG. 182 is a schematic view of a one-hundred ninth embodiment according to an aspect of the present invention, and is configured as a stereo earphone. FIG. 182(A) is a front view (corresponding to the side surface of the face) of the right-ear earphone worn on the right ear 28. A drawing of the face other than the right ear 28 is omitted for simplicity. Also, the stereo earphone in the present embodiment and thereafter will be described for only the right ear for simplicity, but the embodiments may be provided with a left-ear earphone having the same configuration, and the right-ear earphone and the left-ear earphone may be connected to an external output stereo mini-jack of a mobile telephone or a mobile music terminal by a stereo mini-plug. In FIG. 182(A), the configuration of the right-ear earphone is indicated by a broken line in order to show the relationship with the structure of the ear.

Figure 182A:
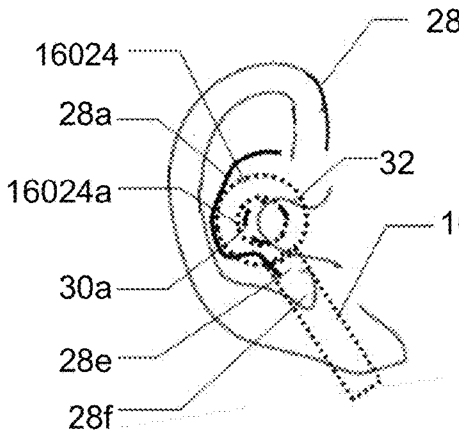

It is apparent in FIG. 182(A) that a cartilage conduction unit 16024 of the right-ear earphone is wedged into the space between the inner side of the tragus 32 and the anthelix 28*a*. Also, a passage hole 16024*a* that substantially matches the entrance to the external auditory meatus 30*a* is provided to the cartilage conduction unit 16024. The cartilage conduction unit 16024 is composed of an elastic body having strong resiliency and conforms to personal differences in the width of the wearing space between the inner side of the tragus 32 and the anthelix 28*a* by deformation of wearing, and the cartilage conduction unit 16024 is designed not to fall from the wearing space due to the resiliency that accompanies deformation. The ear cartilage itself also slightly deforms due to wearing, and the cartilage conduction unit 16024 is held by the resiliency thereof. Therefore, the cartilage conduction unit 16024 has an elastic body structure that is firmer than the ear cartilage itself A sheath 16024*b* is anchored to the cartilage conduction unit 16024, and the piezoelectric bimorph element (not shown in FIG. 182(A)) is accommodated therein. The piezoelectric bimorph element is capable of vibrating so as to avoid contact with the inner wall of the sheath 16024*b* as described below, and the upper end part thereof is anchored to the cartilage conduction unit 16024. The sheath 16024*b* is capable of being hooked on the intertragic notch 28*f* from the cavum conchae 28*e* to hang down below the ear 28. In FIG. 182(A), the sheath 16024*b* is illustrated so as to be tilted down to the right and hanging in the drawing, but may also hang substantially vertically downward due to personal difference in the shape of the ear. The details of the ear structure are described in FIG. 80, and the manner in which the cartilage conduction unit 16024 of the earphone and the sheath 16024*b* is accommodated in the ear can therefore be better understood with reference thereto.

Figure 182B:
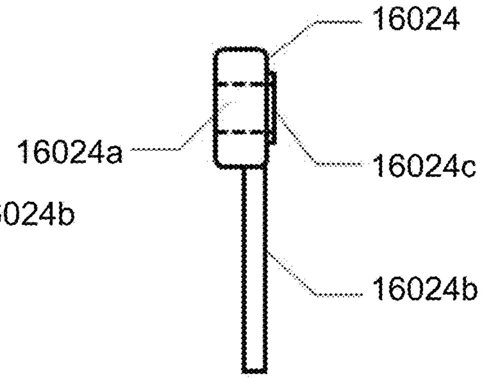

FIG. 182(B) is a side view of the earphone and the left side in the drawing corresponds to the entrance to the external auditory meatus 30*a*. Illustration of the ear is omitted for simplicity. It is apparent in FIG. 182(B) that the cartilage conduction unit 16024 has a greater thickness protruding in the direction of the entrance to the external auditory meatus 30*a* than does the sheath 16024*b* so as to be accommodated in the space between the inner side of the tragus 32 and the anthelix 28*a*. Also, the cartilage conduction unit 16024 has a ring-like edge 16024*c* on the right side (the opposite side from the entrance to the external auditory meatus 30*a*) in the drawing around the passage hole 16024*a*.

Figure 182D:
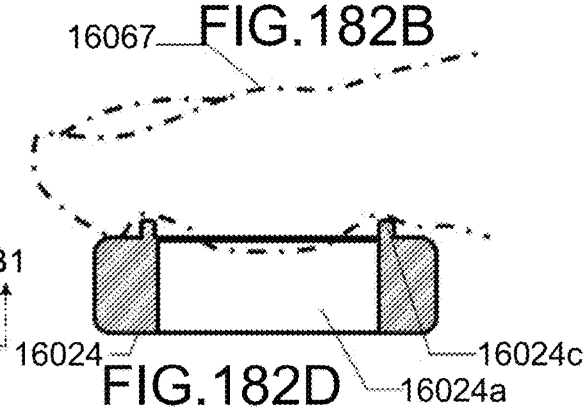
Figure 182C:
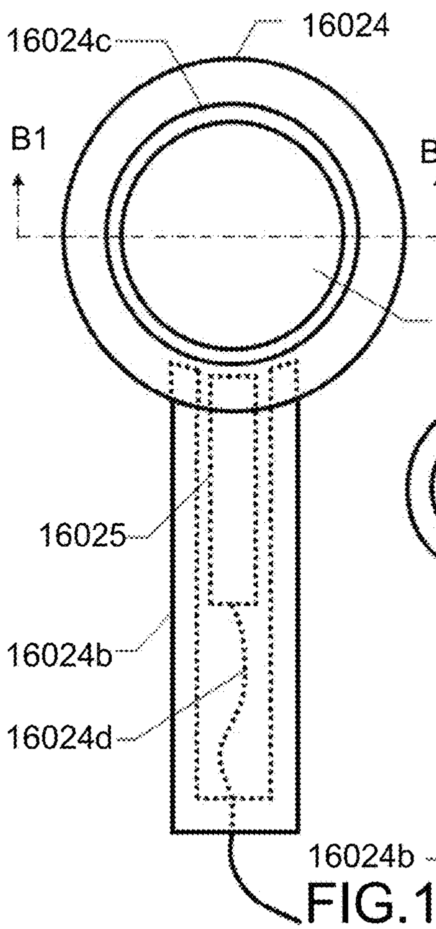

FIG. 182(C) is an enlarged view of the front surface of the earphone, and shows the manner in which the ring-like edge 16024*c* is provided to the periphery of the passage hole 16024*a*. It is apparent in FIG. 182(C) that the sheath 16024*b* is embedded in and anchored to the lower part of the cartilage conduction unit 16024. The upper end of the piezoelectric bimorph element 16025 is furthermore direction embedded in and anchored to the lower part of the cartilage conduction unit 16024 without contact with the inner wall of the sheath 16024*b*. On the other hand, the lower end of the piezoelectric bimorph element 16025 is capable of freely vibrating inside the sheath 16024*b*, the counteractions thereof are transmitted to the cartilage conduction unit 16024, and good cartilage conduction to the ear cartilage is produced. Also, a connection cable 16024*d* is drawn out from the lower end of the piezoelectric bimorph element 16025, and this is passed through the lower end of the sheath 16024*b* and connected to a stereo mini-plug.

FIG. 182(D) is a view along the cross section B1-B1 of FIG. 182(C) and shows the manner in which the ring-like edge 16024*c* provided to the periphery of the passage hole 16024*a* protrudes to the outer side (the upper side in the drawing). The one-hundred ninth embodiment is configured so that music or the like can be enjoyed by cartilage conduction essentially without blocking external sounds by using a widely opened passage hole 16024*a*. It is thereby possible to be readily aware of vehicle horns and other danger sounds when music is being enjoyed outdoors, and smooth communication can take place in immediate response to being spoken to by people in the surroundings. When there is a desire to temporarily occlude the external auditory meatus to concentration on music enjoyment, the cartilage conduction unit 16024 is lightly pressed to the ear with the body of a finger 16067 from the exterior while the earphone is being worn, as shown in FIG. 182(D). The contact pressure between the cartilage conduction unit 16024 and the ear cartilage is thereby increased, volume is increased, and the ring-like edge 16024*c* lightly bites into the body of the finger 16067 to efficiently occlude the passage hole 16024*a*, as shown in FIG. 182(D). Since these are stereo earphones, it is obvious that the earphones of both ears are to be pressed in the manner described above in order to achieve an occluded state of the external auditory meatus.

Figure 182E:
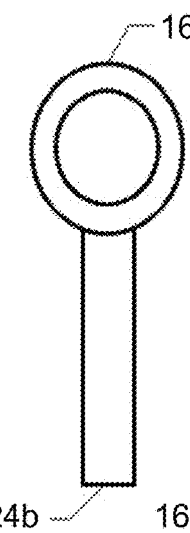
Figure 182F:
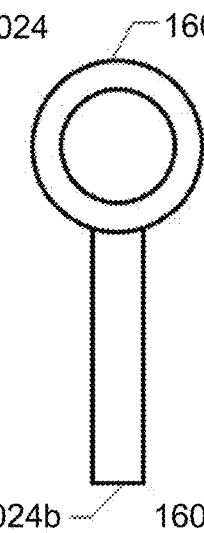
Figure 182G:
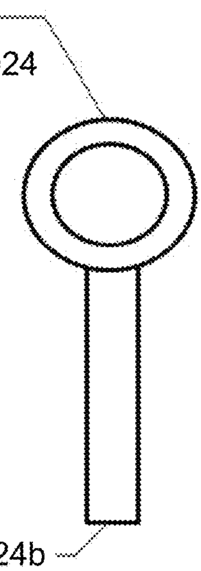

FIGS. 182(E), (F), and (G) show FIG. 182(C) in a simplified form, and show the manner in which the cartilage conduction unit 16024 deforms. FIG. 182(F) is a standard state, FIG. 182(E) shows a state in which the cartilage conduction unit 16024 is firmly pressed and deformed from the left and right when being worn by a person having narrow wearing space to the left and right between the inner side of the tragus 32 and the anthelix 28*a*. On the other hand, FIG. 182(G) shows the state in which the cartilage conduction unit 16024 is firmly pressed and deformed from above and below when worn by a person having a narrow wearing space in the vertical direction. FIGS. 182(E), (F), and (G) show simplified typical examples, and the cartilage conduction unit 16024 can be freely deformed in accordance with personal differences in the shape of the wearing space.

One-hundred Tenth Embodiment

Figures 183A, 183B, 183C, 183D, 183E:
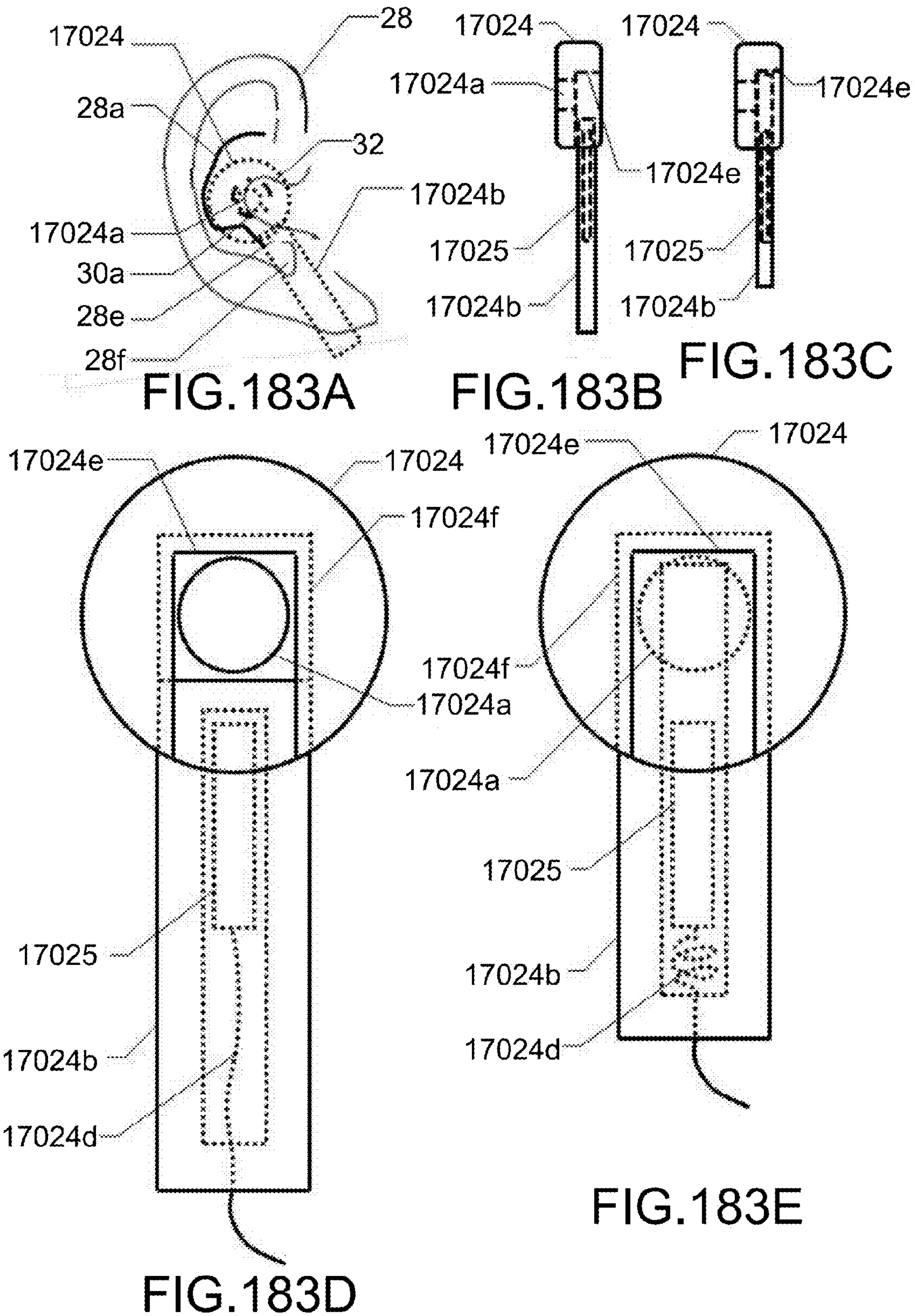

FIG. 183 is a schematic view of a one-hundred tenth embodiment according to an aspect of the present invention, and is configured as a stereo earphone. The one-hundred tenth embodiment of FIG. 183 has much in common with the one-hundred ninth embodiment of FIG. 182, and therefore the same parts have been given the same reference numerals, and a description thereof has been omitted. The one-hundred tenth embodiment differs from one-hundred ninth embodiment in that the configuration is such that a sheath 17024*b* is capable of sliding up and down with respect to a cartilage conduction unit 17024, whereby a passage hole 17024*a* can be opened and closed. The passage hole 17024*a* is configured to be relatively small as shown in FIG. 183(A) in order to facilitate opening and closing. External sounds can read the tympanic membrane from the external auditory meatus even with a small gap, and there is no problem even when the passage hole 17024*a* is small. The cartilage conduction unit 17024 stably guides the sheath 17024*b* and avoids deformation, and it therefore composed of a hard material, which is different from the one-hundred ninth embodiment. In the case of the one-hundred tenth embodiment, accommodation of personal differences in the shape and size of the wearing space assumes deformation of the cartilage itself FIGS. 183(B) and (C) are side views of an earphone and can be understood in the same manner as FIG. 182(B). In FIGS. 183(B) and (C), a piezoelectric bimorph element 17025 is noted as a broken line in order to describe the relationship with the movement of the sheath 17024*b*. Also, the outer side (the right side facing the drawing) of the passage hole 17024*a* is a window 17024*e* through which the sheath 17024*b* enters and exits, and when the sheath 17024*b* is lowered, the window 17024*e* is open and is in essentially the same state as the one-hundred ninth embodiment of FIG. 182. On the other hand, when the sheath 17024*b* is raised in the manner of FIG. 183(C), the window 17024*e* is occluded, the passage hole 17024*a* is thereby blocked, and the external auditory meatus is therefore in an occluded state. Thus, in the one-hundred tenth embodiment, the sheath 17024*b* is lowered and raised to thereby allow use with the external auditory meatus in an unoccluded state and the external auditory meatus in an occluded state. Switching between the states of FIGS. 183(B) and (C) can also be carried out prior to wearing the earphone on the ear, but the sheath 17024*b* can be lower and raised to switch the state while the earphone is being worn.

FIG. 183(D) is an enlarged view of the front surface of the earphone and corresponds to the external auditory meatus in the unoccluded state of FIG. 183(B). The sheath 17024*b* is configured so as to be capable of moving up and down inside the cartilage conduction unit 17024 along a guide groove 17024*f* provided to the periphery of the window 17024*e*. The upper end of the piezoelectric bimorph element 17025 is directly embedded in and anchored to the lower part of the cartilage conduction unit 17024 without making contact with the inner wall of the sheath 17024*b*. The lower end of the piezoelectric bimorph element 17025 is the same as in the one-hundred ninth embodiment in being capable of freely vibrating inside the sheath 17024*b*. In such a configuration, the piezoelectric bimorph element 17025 is stably joined to the cartilage conduction unit 17024 and transmits the vibrations thereof even when the sheath 17024*b* is moved up or down.

FIG. 183(E) is an enlarged view of the front surface of the same earphone as FIG. 183(D), and corresponds to the external auditory meatus in the occluded state of FIG. 183(C). The sheath 17024*b* slides upward along the guide groove 17024*f* and forms a state that covers the window 17024*e*. The passage hole 17024*a* is also blocked thereby, as indicated by the broken line. In this state as well, the piezoelectric bimorph element 17025 is stably joined with the cartilage conduction unit 17024 and vibrates without making contact with the inner wall of the sheath 17024*b*, and the vibrations thereof are transmitted to the cartilage conduction unit 17024. A connection cable 17024*d* is folded in a spiral in the state of FIG. 183(E).

One-hundred Eleventh Embodiment

FIG. 184 is a schematic view of a one-hundred eleventh embodiment of an aspect of the present invention, and is configured as a stereo earphone. The one-hundred eleventh embodiment of FIG. 184 has much in common with the one-hundred ninth embodiment of FIG. 182, and therefore the same parts have been given the same reference numerals, and a description thereof has been omitted. The one-hundred eleventh embodiment differs from one-hundred ninth embodiment in that the passage hole 17024*a* is not provided, and wearing is performed by insertion into the entrance to the external auditory meatus 30*a* rather than the space between the inner side of the tragus 32 and the anthelix 28*a*. For this reason, a cartilage conduction unit 18024 is configured to be relatively small, as shown in FIG. 184(A).

Also, the one-hundred eleventh embodiment is essentially configured for use with the external auditory meatus in the occluded state, and the cartilage conduction unit 18024 is deformed to form a gap between the inner wall of the entrance to the external auditory meatus 30*a* as later described in order to temporarily form an unoccluded state of the external auditory meatus. As previously described, external sounds can reach the tympanic membrane from the external auditory meatus even with a small gap.

Figure 184A:
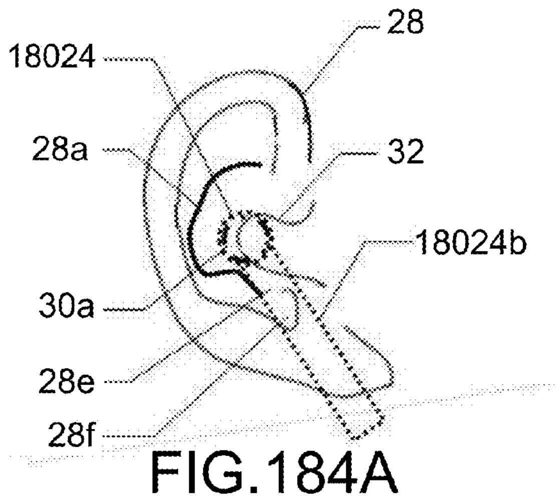
Figure 184B:
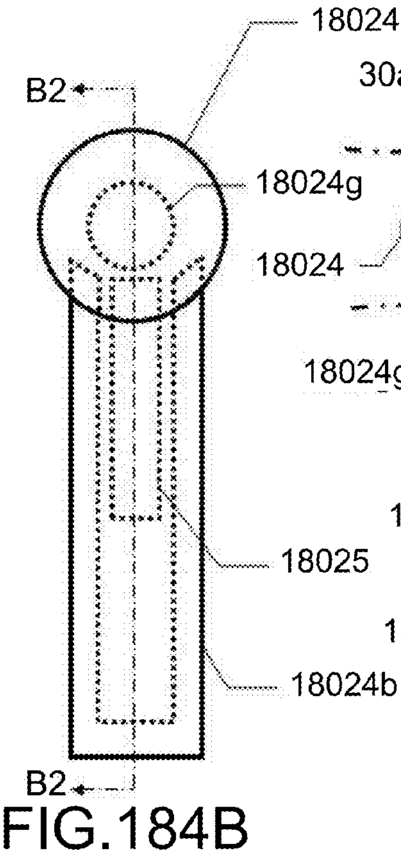

FIG. 184(B) is an enlarged view of the front surface of the earphone. In similar fashion to the one-hundred ninth embodiment, the sheath 18024*b* is embedded in and anchored to the lower part of the cartilage conduction unit 18024. Furthermore, the upper end of a piezoelectric bimorph element 18025 is directly embedded in and anchored to the lower part of the cartilage conduction unit 18024 without making contact with the inner wall of the sheath 18024*b*. In similar fashion to the one-hundred ninth embodiment, the lower end of the piezoelectric bimorph element 18025 is capable of freely vibrating inside the sheath 18024*b*, the counteractions thereof are transmitted to the cartilage conduction unit 18024, and satisfactory cartilage conduction to the ear cartilage is produced. In the one-hundred eleventh embodiment as described above, the cartilage conduction unit 18024 is deformed to form a gap between the inner wall of the entrance to the external auditory meatus 30*a* in order to temporarily achieve an unoccluded state in the external auditory meatus. The cartilage conduction unit 18024 has a hollow part 18024*g* in order to facilitate this deformation. In similar fashion to the one-hundred ninth embodiment, a connection cable is drawn out from the lower end of the piezoelectric bimorph element 18025, and this is passed through the lower end of the sheath 18024*b* and connected to a stereo mini-plug, yet this is omitted from the drawing for simplicity.

Figure 184C:
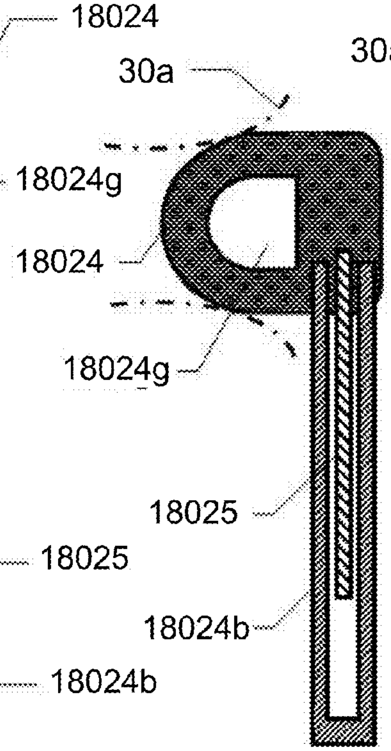

FIGS. 184(C) and (D) are views along the cross section B2-B2 of FIG. 184(B). FIG. 184(C) shows a normal usage state, and the cartilage conduction unit 18024 is inserted into the entrance to the external auditory meatus 30*a* and forms an occluded state in the external auditory meatus. Also, in FIG. 184(C), the cross-sectional structure of the hollow part 18024*g* is shown. In FIG. 184(C), the piezoelectric bimorph element 18025 is illustrated to vibrate in the direction (in direction of vibration) along the external auditory meatus without making contact with the inner wall of the sheath 18024*b*. Although not shown, such a structure is also common to the one-hundred ninth embodiment of FIG. 182 and the one-hundred tenth embodiment of FIG. 183.

Figure 184D:
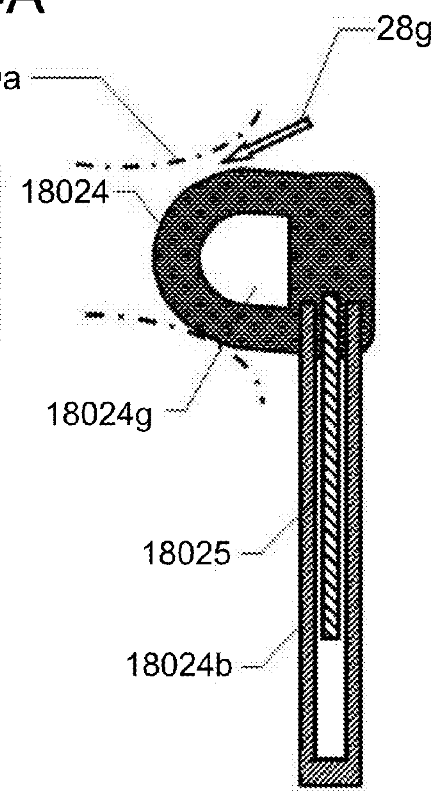

FIG. 184(D) shows the case in which the external auditory meatus is temporarily placed in an unoccluded state, and shows the state in which the cartilage conduction unit 18024 has been deformed by pulling the sheath 18024*b* downward or pressing the upper part of the cartilage conduction unit 18024 downward. A gap is thereby formed between the upper part inner wall of the entrance to the external auditory meatus 30*a* and the upper part of the cartilage conduction unit 18024, and external sounds that pass though this gap as indicated by the arrow 28*g* are able to reach the tympanic membrane from the external auditory meatus. The hollow part 18024*g* facilitates deformation of the cartilage conduction unit 18024 such as that in FIG. 184(D). The cartilage conduction unit 18024 is pressed downward, thereby promoting deformation of the lower part inner wall of the entrance to the external auditory meatus 30*a* and forming a gap between the upper part inner wall of the entrance to the external auditory meatus 30*a* and the upper part of the cartilage conduction unit 18024.

One-hundred Twelfth Embodiment

FIG. 185 is a schematic view of a one-hundred twelfth embodiment of an aspect of the present invention, and is configured as a stereo earphone. The one-hundred twelfth embodiment of FIG. 185 has much in common with the one-hundred eleventh embodiment of FIG. 184, and therefore the same parts have been given the same reference numerals, and a description thereof has been omitted. The one-hundred twelfth embodiment differs from the one-hundred eleventh embodiment in that a cartilage conduction unit 19024 is accommodated without deformation in the cavum conchae 28*e* in order to achieve an unoccluded state in the external auditory meatus. The lower part of the cavum conchae 28*e* (above the intertragic notch 280 is particularly advantageous as the location for accommodation, as shown in FIGS. 185(B) and (D). Satisfactory cartilage conduction can be produced even with the cartilage conduction unit 19024 accommodated in the cavum conchae 28*e*, and cartilage conduction can be implemented with the external auditory meatus in an unoccluded state in the same manner as the one-hundred ninth embodiment of FIG. 182.

Figure 185A:
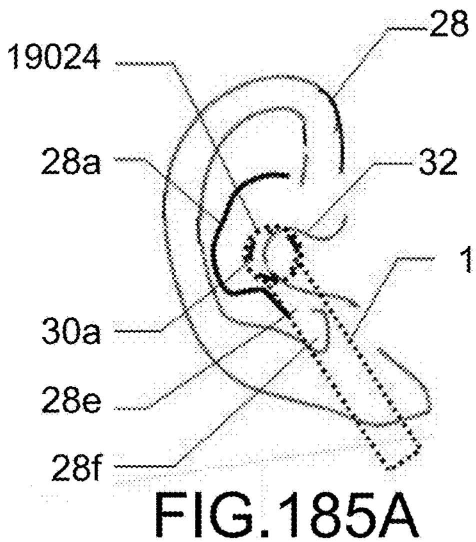
Figure 185B:
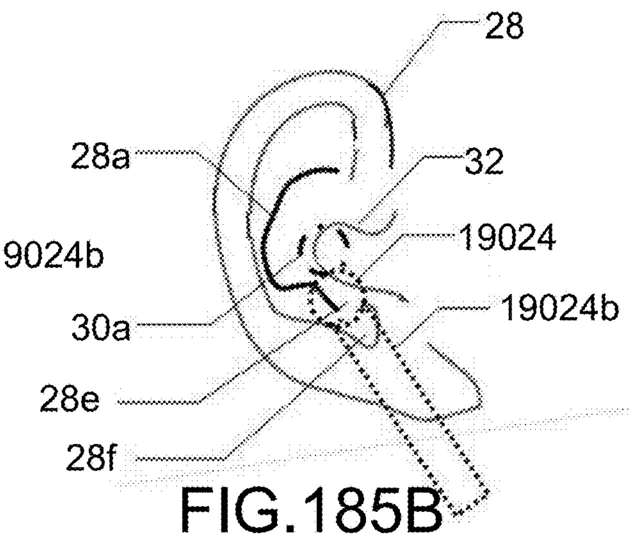

FIG. 185(A) shows a state in which the cartilage conduction unit 19024 has been inserted into the entrance to the external auditory meatus 30*a* in the one-hundred twelfth embodiment as described above, and cartilage conduction is implemented with the external auditory meatus in an occluded state. In contrast, FIG. 185(B) shows the state in which the cartilage conduction unit 19024 has been removed from the entrance to the external auditory meatus 30*a* and accommodated in the cavum conchae 28*e*, and cartilage conduction is implemented with the external auditory meatus in an unoccluded state. The cartilage conduction unit 19024 is configured with a spherical shape in order to facilitate sliding of the cartilage conduction unit 19024 between the state of FIG. 185(A) and the state of FIG. 185(B), and to avoid imparting pain. Also, the cartilage conduction unit 19024 is composed of a hard material because deformation is not envisioned. However, in lieu thereof, it is also possible to use an elastic material in the same manner as the one-hundred ninth embodiment of FIG. 182.

Figure 185C:
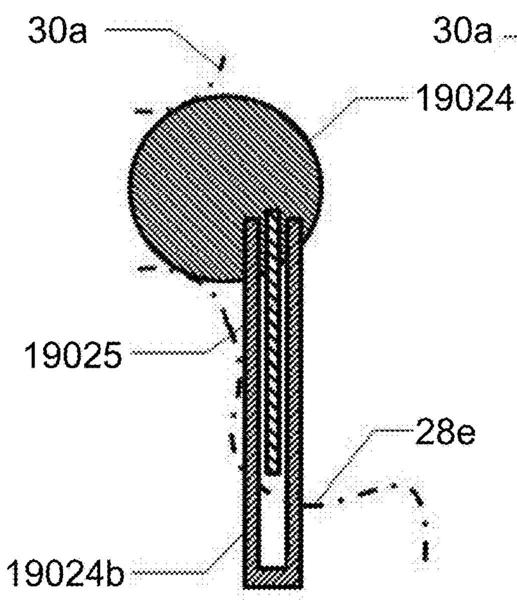
Figure 185D:
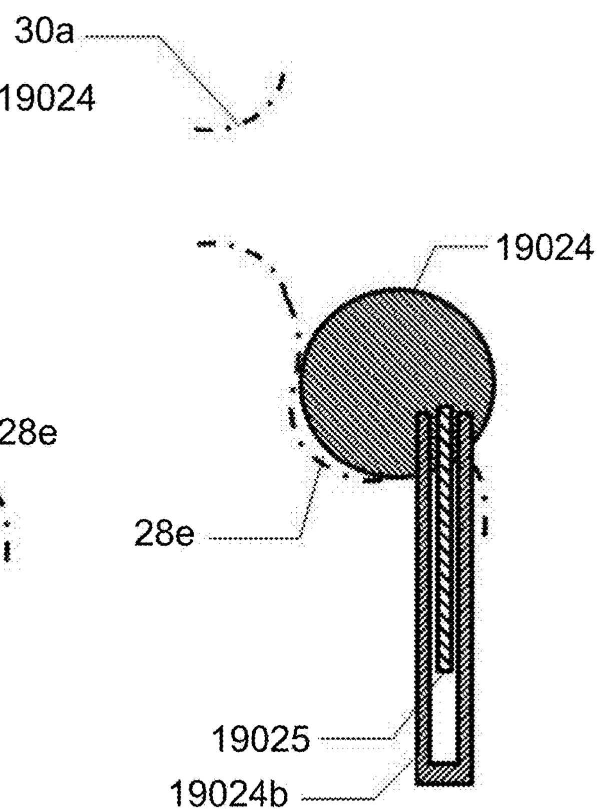

FIGS. 185(C) and (D) are cross-sectional views corresponding to the states of FIGS. 185(A) and (B), respectively, and are views as seen from the same sectioned planes as FIGS. 184(C) and (D). In FIG. 185(C), it is apparent that the cartilage conduction unit 19024 is inserted into the entrance to the external auditory meatus 30*a*, and the cartilage conduction is being implemented with the external auditory meatus in an occluded state. In contrast, it is apparent in FIG. 185(D) that the cartilage conduction unit 19024 withdrawn from the entrance to the external auditory meatus 30*a* is accommodated in the anthelix 28*a*, and cartilage conduction is being implemented with the external auditory meatus in the unoccluded state. Also, a piezoelectric bimorph element 19025 vibrates without making contact with the inner wall of a sheath 19024*b*, and the structure thereof is the same as that in the one-hundred ninth embodiment of FIG. 182 to the one-hundred eleventh embodiment of FIG. 184, as shown in FIGS. 185(C) and (D).

The various features shown in each of the embodiments described above are not unique to individual embodiments, but the features of each embodiment can be substituted or combined, as appropriate, with features from other embodiments, wherever it is possible to make use of the advantages thereof. Also, the specific individual configurations in the embodiments can also be substituted with other equivalent means. For example, in the one-hundred tenth embodiment of FIG. 183, the configuration is such that the piezoelectric bimorph element 17025 is anchored to the cartilage conduction unit 17024 and the sheath **17024*b* slides up and down. The sheath 17024*b* functions as a branch part that serves as a knob when the cartilage conduction unit 17024 is to be attached or detached, but it is also possible to use a configuration in which the piezoelectric bimorph element 17025 itself is used as such a branch part, and the passage hole is opened and closed by sliding the piezoelectric bimorph element 17025** itself up and down.

The cartilage conduction unit 19024 of the one-hundred twelfth embodiment of FIG. 185 is spherically configuration, but it is also possible to use a chamfered cylindrical shape or another shape. Furthermore, the cartilage conduction unit 17024 in the one-hundred tenth embodiment of FIG. 183 is composed of a hard material, but it is also possible for the guide groove **17024*f* of the cartilage conduction unit 17024 to be composed of a rigid body and for the cartilage conduction unit 17024** to be composed of an elastic body.

One-hundred Thirteenth Embodiment

FIG. 186 is a schematic view of a one-hundred thirteenth embodiment of an aspect of the present invention, and is configured as a stereo earphone. The one-hundred thirteenth embodiment of FIG. 186 has much in common with the one-hundred ninth embodiment of FIG. 182, and therefore the same parts have been given the same reference numerals, and a description thereof has been omitted. The one-hundred thirteenth embodiment differs from one-hundred ninth embodiment in that a passage hole **20024*a* in a cartilage conduction unit 20024 is provided rearward when the cartilage conduction unit is worn on the ear, whereby the portion in contact with the inner side of the tragus 32 in the cartilage conduction unit 20024 is made to be a thick portion 20024*h*, and a piezoelectric bimorph element 20025 and a sheath 20024*b* are held by the thick portion 20024*h*. Also, in the one-hundred thirteenth embodiment of FIG. 186, the direction of vibration of the piezoelectric bimorph element 20025 is differ from the one-hundred ninth embodiment of FIG. 182** as later described.

Figures 186A, 186B, 186C:
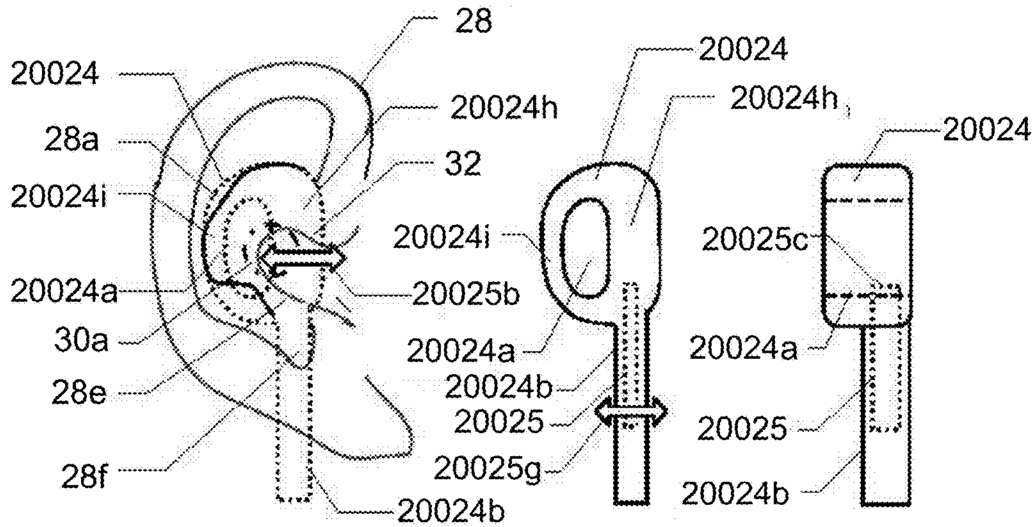

FIG. 186(A) is a front view of the right-ear earphone mounted on the right ear 28 and shows an outline of the configuration described above. The right-ear earphone is illustrated as a broken line to make the relationship between the two readily apparent. It is apparent from the drawing that the entire right-ear stereo earphone is shaped in the form of the letter "q" and fits the shape of the right ear 28, and the sheath **20024*b* hangs down below the right ear 28 from the cavum conchae 28*e* across to the intertragic notch 28*f***.

Describing the shape of the cartilage conduction unit 20024 in greater detail with reference to FIG. 186(A), the thick portion **20024*h* has a rectilinear outer shape to adapt to the relatively flat inner side of the tragus 32, and improves the close adhesion to the inner side of the tragus 32. In contrast, the external shape of a thin portion 20024*i* rearward of the cartilage conduction unit 20024 is arcuate to adapt to the curved inner side of the anthelix 28*a*, and improves the close adhesion to the inner side of the anthelix 28*a*. In the same manner as the one-hundred ninth embodiment, the cartilage conduction unit 20024 is composed of an elastic body having strong resiliency, and conforms to personal differences in the width of the wearing space between the inner side of the tragus 32 and the anthelix 28*a* by deformation of wearing, and the cartilage conduction unit 20024 is designed not to fall from the wearing space due to the resiliency that accompanies deformation. In this case, rearward of the thin portion 20024*i* is a thin portion 20024*i*, and therefore deformation is facilitated for accommodating personal differences. In FIG. 186(A), illustration of the piezoelectric bimorph element 20025 arranged inside the sheath 20024*b* is omitted for simplicity, but the vibration direction is set to be the direction that transverses the entrance to the external auditory meatus 30*a* in the manner indicated by the arrow 20025*b* (the direction substantially perpendicular to the center axis of the external auditory meatus). In the one-hundred ninth embodiment of FIG. 182, the direction of vibration of the piezoelectric bimorph element 16025 is set to be substantially parallel to the center axis of the external auditory meatus FIG. 186(B) is a front view of the right-ear earphone in a state worn on the right ear 28 in the same manner as FIG. 186(A), but the right ear 28 is omitted from the drawing and the configuration of the right-ear earphone is indicated by a solid line to facilitate understanding. The same reference numerals are assigned to the same portions, and a description is omitted unless required. In FIG. 186(B), the piezoelectric bimorph element 20025 arranged inside the sheath 20024*b* is illustrated with a broken line. The upper end part of the piezoelectric bimorph element 20025 is held by the thick portion 20024*h*, and the lower end part freely vibrates without making contact with the sheath 20024*b* inside the sheath 20024*b*, as described in detail below. The direction of vibration is parallel to the surface of the drawing as indicated by the arrow 20025*g*. Therefore, the counteractions of the vibrations are transmitted to the cartilage conduction unit 20024, and the vibrations in the direction that transverses the entrance to the external auditory meatus 30*a* as indicated by the arrow 20025*b* in FIG. 186(A) are transmitted to the tragus 32 as well as the ear cartilage around the entrance to the external auditory meatus 30*a***.

FIG. 186(C) is a side view of the earphone and can be understood in the same manner as FIG. 182(B). The piezoelectric bimorph element 20025 can be inserted relatively deeply into and supported by the cartilage conduction unit 20024 by using the thick portion **20024*h*, as shown in FIG. 186(B). The depth thereof can be set so that the holding end 20025*c* of the piezoelectric bimorph element 20025 reaches further above the lower end of the passage hole 20024*a* (the inner edge thereof is indicated by a broken line), as shown in FIG. 186(C). Support of the piezoelectric bimorph element 20025 is ensured thereby. The piezoelectric bimorph element 20025 has a thin structure in the direction of vibration. Therefore, the thickness of the sheath 20024*b* can be reduced (in comparison with FIG. 186(B) and FIG. 186(C)) in the wearing direction on the right ear 28 by setting the direction of vibration to be the direction that transverses the entrance to the external auditory meatus 30*a*, as indicated by the arrow 20025*b* in FIG. 186(A), and the sheath 20024*b* can be worn so as to hang down below the right ear 28 from the anthelix 28*a* across to the intertragic notch 28*f*, even in a person having a narrow intertragic notch 28*f* Reducing the thickness of the sheath 20024*b* which functions as a branch part in this manner in the wearing direction on the right ear 28, wearing that fits the shape of the right ear 28** is possible regardless of personal differences.

Figures 186D, 186E:
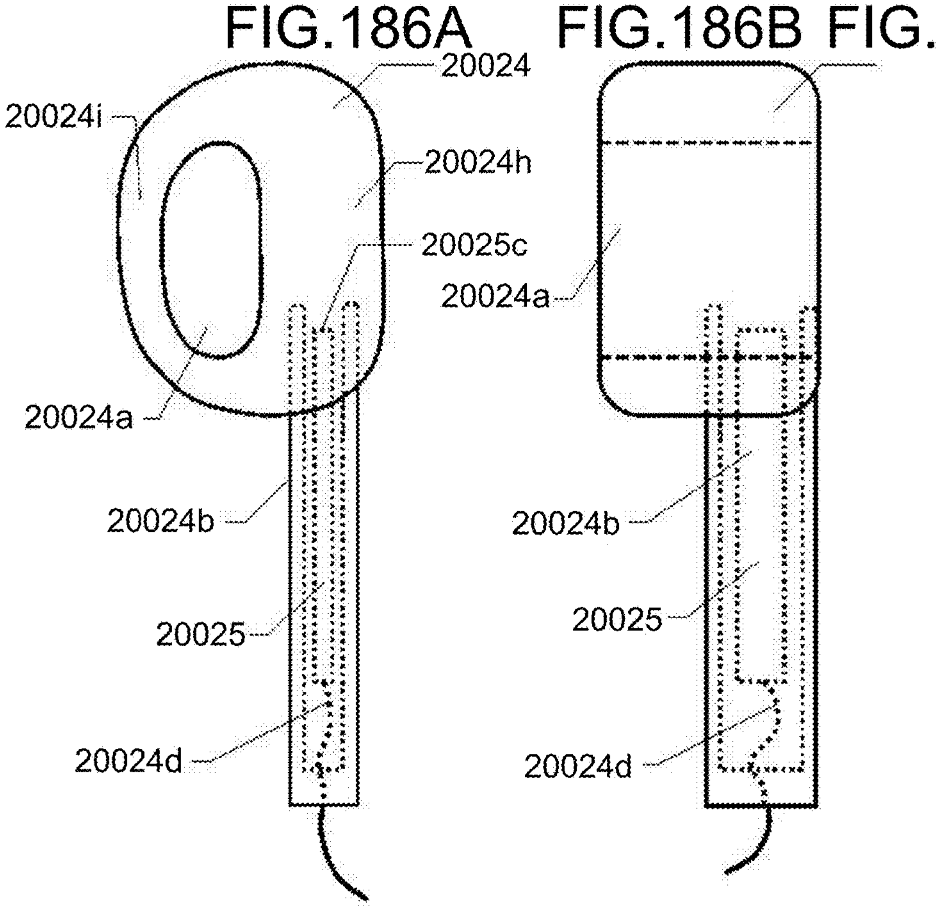

FIG. 186(D) is an enlarged view of the front surface of the earphone. It is apparent from the drawing that the sheath **20024*b* is embedded in and anchored to the lower part of the cartilage conduction unit 20024, but it is also possible to make use of the thick portion 20024*h* and embed the sheath relatively deeper in the lower part of the cartilage conduction unit 20024, and to have the depth set so that the upper end of the sheath 20024*b* reaches further above the lower end of the passage hole 20024*a*. As described above, the piezoelectric bimorph element 20025 can also be relatively deeply embedded in and supported by using the thick portion 20024***h* so that the holding end 20025*c* reaches above the lower end of the passage hole 20024*a*. The upper end of the piezoelectric bimorph element 20025 is directly embedded in and anchored to the thick portion 20024*h* without making contact with the inner wall of the sheath 20024*b* in the same manner as the one-hundred ninth embodiment of FIG. 182. Also, the lower end of the piezoelectric bimorph element 20025 can freely vibrate inside the sheath 20024*b* without making contact with the inner wall of the sheath 20024*b*, the counteractions thereof are transmitted to the cartilage conduction unit 20024, and satisfactory cartilage conduction can be generated in the ear cartilage. A connection cable 20024*d* is drawn out from the lower end of the piezoelectric bimorph element 20025, and the connection cable passes through the lower end of the sheath 20024*b* and is connected to a stereo mini-plug.

FIG. 186(E) is an enlarged side view of the earphone, and is an enlarged view of FIG. 186(C). The same reference numerals are used for the same parts as FIG. 186(D), and a description thereof has been omitted unless otherwise required. The upper end of the piezoelectric bimorph element 20025 is directly embedded in and anchored to the thick portion 20024*h* without making contact with the inner wall of the sheath 20024*b* as shown in FIG. 186(D) as well. The lower end of the piezoelectric bimorph element 20025 is capable of freely vibrating inside the sheath 20024*b* without making contact with the inner wall of the sheath 20024*b*. In a comparison of FIG. 186(D) and FIG. 186, it is readily apparent that setting the direction of vibration of the piezoelectric bimorph element 20025 to be the direction that transverses the entrance to the external auditory meatus 30*a* makes it possible to reduce the thickness in the direction in which the sheath 20024*b* is worn on the right ear 28.

One-hundred Fourteenth Embodiment

FIG. 187 is a schematic view of a one-hundred fourteenth embodiment of an aspect of the present invention, and is configured as a stereo earphone. The one-hundred fourteenth embodiment of FIG. 187 has much in common with the one-hundred thirteenth embodiment of FIG. 186, and therefore the same parts have been given the same reference numerals, and a description thereof has been omitted. To avoid complexity in FIG. 187, the piezoelectric bimorph element 20025, the internal structure of the sheath 20025*b*, and the like are omitted from the drawing, and the same applies to FIG. 186. The one-hundred fourteenth embodiment of FIG. 187 differs from one-hundred thirteenth embodiment of FIG. 186 only in external appearance, and features the addition of a guide hook 20024*j* to the sheath 20024*b*.

Figure 187A:
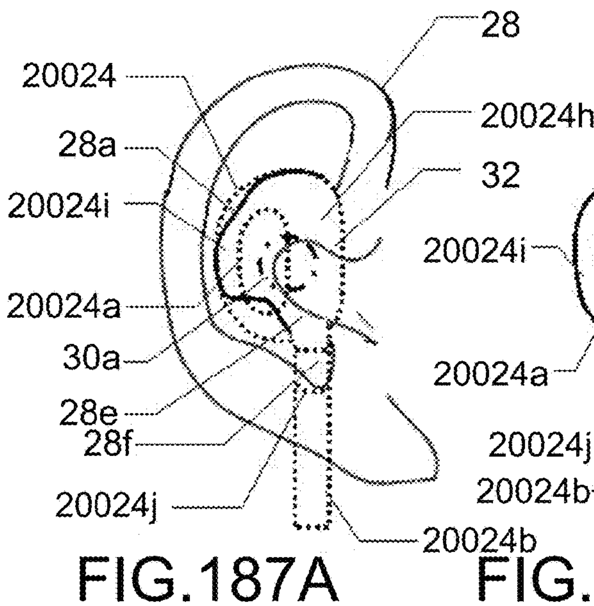
Figure 187B:
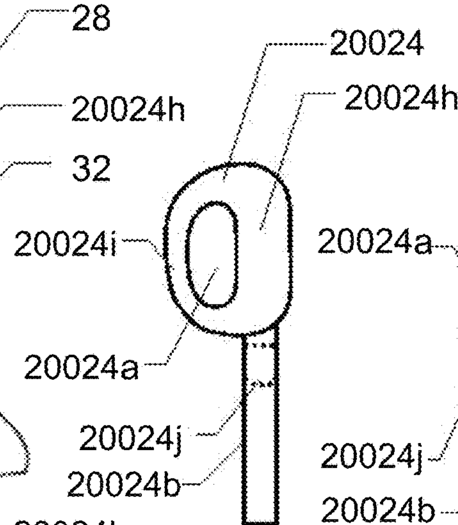

FIGS. 187(A) and (B), in similar fashion to FIGS. 186(A) and (B), are front views of the right-ear earphone in a state worn on the right ear 28, and as shown in the drawings, the guide hook 20024*j* is provided in a position that corresponds to the intertragic notch 28*f* on the inner side (the ear side) of the sheath 20024*b*. The guide hook 20024*j* stably positions the sheath 20024*b* in the intertragic notch 28*f* during wearing, the sheath 20024*b* is snugly fitted with close adhesion to the intertragic notch 28*f*, and the right-ear earphone is not liable to fall out from the cavum conchae 28*e*.

Figure 187C:
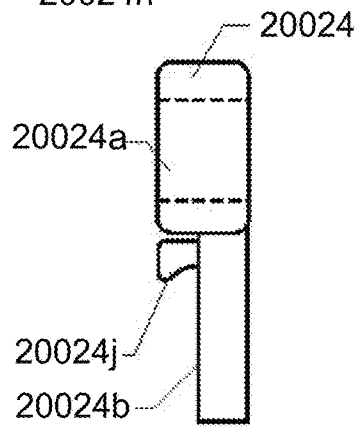
Figure 187D:
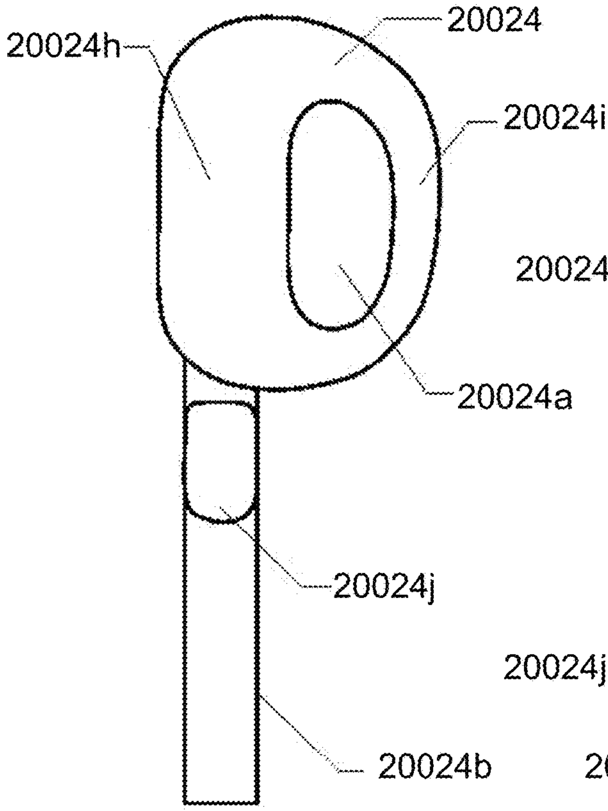
Figure 187E:
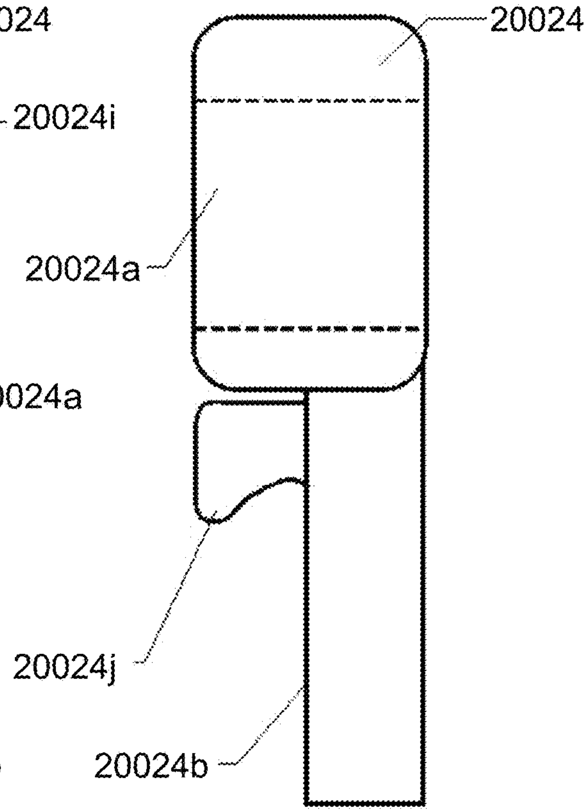

FIG. 187(C) shows a side view of the earphone in the same manner as FIG. 186(C). As shown in the drawing, the guide hook 20024*j* is provided to the ear side for wearing and in a position that cannot be seen from the outer side in a worn state. FIG. 187(D) is an enlarged view of the front surface of the earphone, and the guide hook 20024*j* on the inner is illustrated so as to be rotated 180 degrees from FIG. 187(B) and made visible. FIG. 187(E) is an enlarged side view of the earphone and is an enlargement of FIG. 187(C).

One-hundred Fifteenth Embodiment

FIG. 188 is a schematic view of a one-hundred fifteenth embodiment of an aspect of the present invention, and is configured as a stereo earphone. The one-hundred fifteenth embodiment of FIG. 188 has much in common with the one-hundred twelfth embodiment of FIG. 185, and therefore the same parts have been given the same two least-significant digits of the reference numerals, and a description thereof has been omitted. The one-hundred fifteenth embodiment differs from the one-hundred twelfth embodiment in that a cartilage conduction unit 21024 is used in a state constantly accommodated in the lower part of the cavum conchae 28*e*, and switching between the occluded state and the unoccluded state of the external auditory meatus is carried out by movement of a movable earplug part 21024*k* connected by a lever 21024*m* to the cartilage conduction unit 21024. In similar fashion to the one-hundred twelfth embodiment, satisfactory cartilage conduction is generated even when the cartilage conduction unit 21024 is accommodated in the cavum conchae 28*e*, and it is thereby possible implement cartilage conduction with the external auditory meatus in the occluded state and the unoccluded state.

FIG. 188(A) is a front view of the right-ear earphone worn on the right ear 28 in the same manner as FIG. 185(A), and the right-ear earphone is illustrated with a broken line so as to facilitate understanding of the two. In FIG. 188(A), the movable earplug part 21024*k* retracts from the entrance to the external auditory meatus 30*a* so as to be in contact with the inner wall of the anthelix 28*a* to achieve an unoccluded state of the external auditory meatus. At this time, the movable earplug part 21024*k* makes contact with the inner wall of the anthelix 28*a* and the bottom wall of the cavum conchae 28*e*, and functions as an auxiliary cartilage conduction unit for conducting vibrations transmitted from the cartilage conduction unit 21024 to ear cartilage via the lever 21024*m*. Furthermore, the movable earplug part 21024*k* makes contact with the inner wall of the anthelix 28*a* and the bottom wall of the cavum conchae 28*e*, whereby wearing is stabilized and the right-ear earphone is made unlikely to fall out.

In contrast, FIG. 188(B) shows a state in which the movable earplug part 21024*k* is moved by clockwise rotation of the lever 21024*m* and inserted into the entrance to the external auditory meatus 30*a* to produce an occluded state of the external auditory meatus. An occluded effect is thereby produced in the external auditory meatus, and external noise is blocked. FIG. 188(C) and FIG. 188(D) correspond to FIG. 188(A) and FIG. 188(B), respectively, and are front views in which the configuration of the right-ear earphone is indicated by a solid to facilitate understand and the right ear 28 is omitted from the drawing.

FIG. 188(E) and FIG. 188(F) are side views of the earphone corresponding to FIG. 188(C) and FIG. 188(D), respectively. In FIG. 188(E) showing the unoccluded state of the external auditory meatus, the movable earplug part 21024*k* is retracted, and external sounds can enter from the entrance to the external auditory meatus 30*a* as indicated by the arrow 28*g* and reach the tympanic membrane. In contrast, in FIG. 188(F) showing the occluded state of the external auditory meatus, the movable earplug part 21024*k* is inserted into the entrance to the external auditory meatus 30*a*, and an occluded effect is produced in the external auditory meatus and external noise is blocked. The orientation of vibrations of the piezoelectric bimorph element 21025 in the one-hundred fifteenth embodiment of FIG. 188 is the same as the one-hundred thirteenth embodiment of FIG. 186. Also, the internal structure of the sheath 21024*b* is the same as the one-hundred thirteenth embodiment of FIG. 186, but is omitted from the drawing to avoid complexity.

One-hundred Sixteenth Embodiment

FIG. 189 is a schematic view of a one-hundred sixteenth embodiment of an aspect of the present invention, and is configured as a stereo earphone. The one-hundred sixteenth embodiment of FIG. 189 has much in common with the one-hundred fifteenth embodiment of FIG. 188, and therefore the same parts have been given the same two least-significant digits of the reference numerals, and a description thereof has been omitted. The one-hundred sixteenth embodiment differs from the one-hundred fifteenth embodiment in that a movable earplug part 22024*k* for switching between an occluded state and an unoccluded state in the external auditory meatus is not a rotating type using a lever, but is rather a bending type in which the elasticity of an elastic support part 22024*m* is used.

Figures 189A, 189C, 189E:
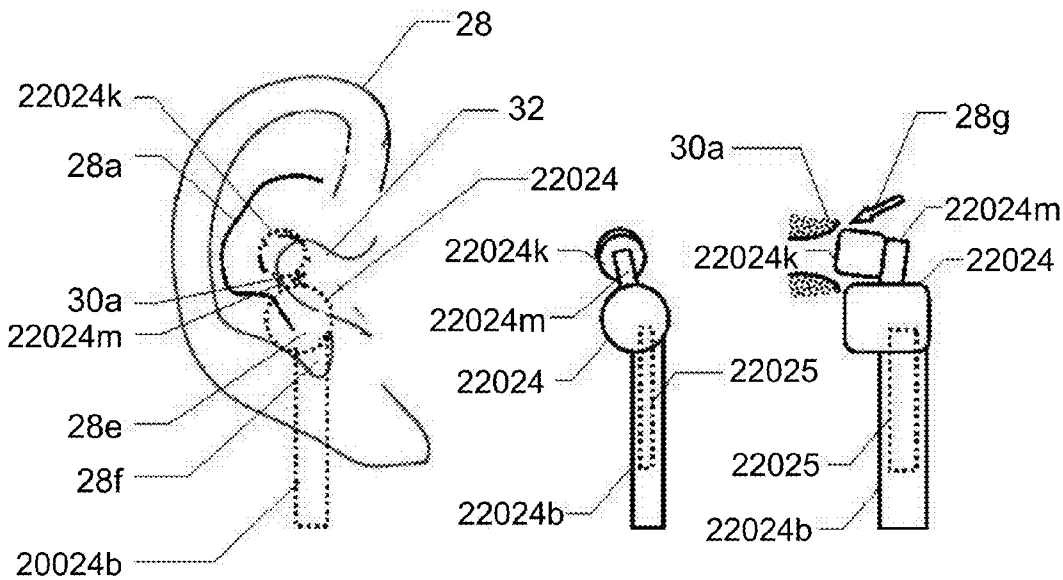

FIG. 189(A) is a front view of the right-ear earphone worn on the right ear 28 in the same manner as FIG. 188(A), and the right-ear earphone is illustrated with a broken line so as to facilitate understanding of the two. In FIG. 189(A), the movable earplug part 22024*k* is in a state positioned with a slight gap opened in front of the entrance to the external auditory meatus 30*a*, and the external auditory meatus is in an unoccluded state. In this state, external air-conducted sound enters from the slight gap into the entrance to the external auditory meatus 30*a*. Furthermore, the air-conducted sound generated by vibration of the movable earplug part 22024*k* reaches the tympanic membrane from the entrance to the external auditory meatus 30*a*, and the movable earplug part functions as an auxiliary audio output unit for mainly supplementing the high-pitched regions.

Figures 189B, 189D, 189F:
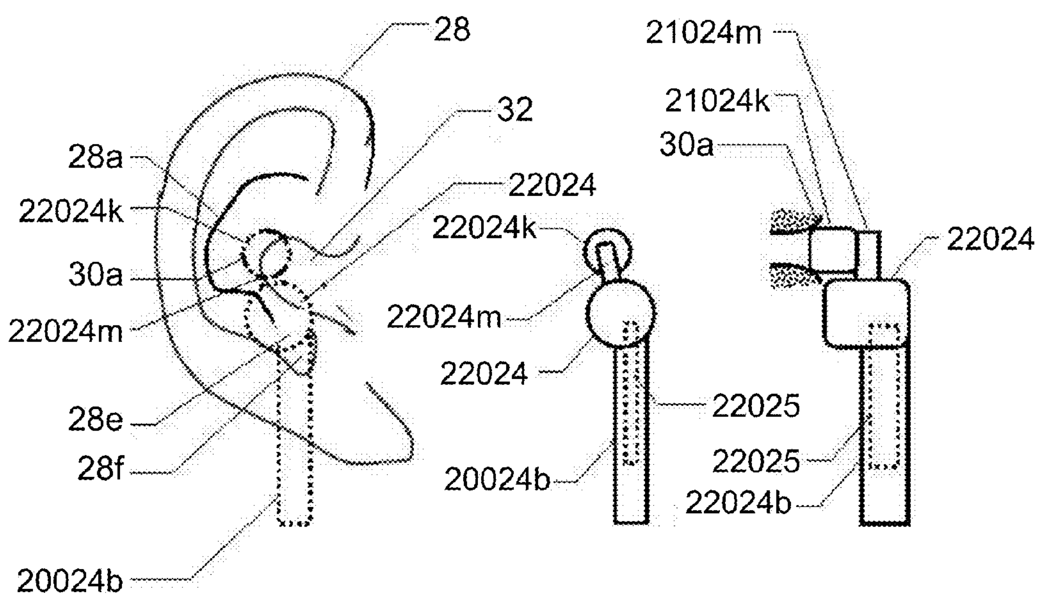

In contrast, FIG. 189(B) shows a state in which the movable earplug part 22024*k* is slightly bent by the elasticity of the elastic support part 22024*m* and is inserted into the entrance to the external auditory meatus 30*a*, producing an occluded state in the external auditory meatus. An occluded effect is thereby produced in the external auditory meatus, and external noise is blocked. FIG. 189(C) and FIG. 189(D) correspond to FIG. 189(A) and FIG. 189(B), respectively, and are front views in which the configuration of the right-ear earphone is indicated by a solid to facilitate understand and the right ear 28 is omitted from the drawing.

FIG. 189(E) and FIG. 189(F) are side views of the earphone corresponding to FIG. 189(C) and FIG. 189(D), respectively, and switching between the unoccluded state and the occluded state in the external auditory meatus is made more readily apparent than the front views. More specifically described, in FIG. 189(E) showing the unoccluded state of the external auditory meatus, the movable earplug part 22024*k* is retracted from the entrance to the external auditory meatus 30*a* leaving open a slight gap, and external sounds can enter from the entrance to the external auditory meatus 30*a* as indicated by the arrow 28*g* and reach the tympanic membrane. Furthermore, as described above, air-conducted sound from the movable earplug part 22024*k* reaches the tympanic membrane from the entrance to the external auditory meatus 30*a*, supplementing cartilage conduction from a cartilage conduction unit 22024. In contrast, in FIG. 188(F) showing the occluded state of the external auditory meatus, the movable earplug part 22024*k* is inserted into the entrance to the external auditory meatus 30*a*, and an occluded effect is produced in the external auditory meatus and external noise is blocked. The orientation of vibrations of a piezoelectric bimorph element 22025 in the one-hundred sixteenth embodiment of FIG. 189 is the same as the one-hundred thirteenth embodiment of FIG. 186. Also, the internal structure of the sheath 22024*b* is the same as the one-hundred thirteenth embodiment of FIG. 186, but is omitted from the drawing to avoid complexity.

The implementation of the features of the present invention described above are not limited to the aspects in the embodiments, implementation is also possible using other aspects whenever the benefits thereof can be utilized. For example, in the configuration of the one-hundred sixteenth embodiment of FIG. 189, the movable earplug part 22024*k* and the cartilage conduction unit 22024 are connected by a elastic support part 22024*m*, but in lieu thereof, it is also possible to use a configuration in which the movable earplug part 22024*k*, the cartilage conduction unit 22024, and the elastic support part 22024*m* are all integrally molded using an elastic material. Also, in the configuration of the one-hundred fifteenth embodiment of FIG. 187, a guide hook 20024*j* is position below the cartilage conduction unit 20024, but in lieu thereof, it is also possible to use a configuration in which the lower part of the cartilage conduction unit 20024 is partially notched and the guide hook 20024*j* may enter into the notched portion. However, in this case as well, the guide hook 20024*j* is supported by the sheath 20024*b* or integrally molded with the sheath 20024*b*.

One-hundred Seventeenth Embodiment

FIG. 190 is a schematic view of a one-hundred seventeenth embodiment of an aspect of the present invention, and is configured as a stereo earphone. The one-hundred seventeenth embodiment of FIG. 190 has much in common with the one-hundred thirteenth embodiment of FIG. 186, and therefore the same parts have been given the same reference numerals, and a description thereof has been omitted. A portion of the drawing in FIG. 186 is omitted in FIG. 190 to avoid complexity. The one-hundred seventeenth embodiment of FIG. 190 differs from the one-hundred thirteenth embodiment of FIG. 186 in that the configuration is such that a slit 23024*a* is provided in place of a passage hole, whereby music or the like can be enjoyed by cartilage conduction without blocking external sounds. The slit 23024*a* is also significant as a structure for supporting a sheath 23024*b* on the cartilage conduction unit 23024 in a later-described manner. Furthermore, the one-hundred seventeenth embodiment of FIG. 190 has an adhesive sheet 23024*i* for affixing the cartilage conduction unit 23024 to the cavum conchae 28*e* to prevent falling, and an earplug part 23024*k* for occluding the entrance to the external auditory meatus 30*a* as required.

FIG. 190(A) is a front view of the right-ear earphone worn on the right ear 28 in the same manner as FIG. 186, and shows an outline of the configuration described above. In FIG. 190(A) as well, the right-ear earphone is illustrated as a broken line to make the relationship between the two readily apparent.

FIG. 190(B) is a front view of the right-ear earphone in a state worn on the right ear 28 in the same manner as FIG. 190(A), and the right-ear earphone is illustrated with a broken line and the right ear 28 is omitted from the drawing so as to facilitate understanding of the configuration. The same reference numerals are used for the same parts, and a description thereof is omitted unless otherwise required. In FIG. 190(B), the adhesive sheet 23024*i* and the earplug part 23024*k* arranged on the ear side (the reverse side of the plane of the drawing) are illustrated with a broken line. It is apparent from FIG. 190(B) with reference to the right ear 28 of FIG. 190(A) that the adhesive sheet **23024*i* is provided in a position of close adhesion to the cavum conchae 28*e* rearward of the entrance to the external auditory meatus 30*a*. Since the adhesive sheet 23024*i* is not provided to the earplug part 23024*k*, the earplug part 23024*k* can be readily removed from the entrance to the external auditory meatus 30*a*. The wearing and removal of the earplug part 23024*k* can be performed using the elasticity of the ear cartilage, the earplug part 23024*k* can be pressed into the entrance to the external auditory meatus 30*a* to occlude the entrance to the external auditory meatus, and the earplug part 23024*k* can be removed from the entrance to the external auditory meatus 30*a* to create a slight gap and direction external sounds into the external auditory meatus. In the case of the latter, the cartilage conduction unit 23024 is closely adheres to the cavum conchae 28*e* due to the adhesive sheet 23024*i*, even when the earplug part 23024*k* is loose from the entrance to the external auditory meatus 30*a*. The wearing and removal operation of the earplug part 23024*k* can be performed by pinching the sheath 23024*b***.

FIG. 190(C) is an enlarged view of FIG. 190(B). It is apparent from the drawing that the right side of the drawing of the slit **23024*a* is a connection part 23024*h*, and a holding end 23025*c* of a piezoelectric bimorph element 23025 is inserted therein. By providing the slit 23024*a*, the sheath 23024*b* is inserted from the exterior so as to cover the connection part 23024*h*. Inserting the piezoelectric bimorph element 23025 inside the connection part 23024*h* in this manner holds the piezoelectric bimorph element 23025 in the cartilage conduction unit 23024, and by inserting the sheath 23024*b* over the outer side so as to cover the connection part 23024*h* makes it possible to reliably join the sheath 23024*b* to the cartilage conduction unit 23024, and protects the piezoelectric bimorph element 23025 without contact with the inner side of the sheath 23024*b***.

FIG. 190(D) is an enlarged side view of the right-ear earphone, the left side in the drawing corresponds to the entrance to the external auditory meatus **30*a* side, the front side as viewed from the plane of the drawing is the occipital side in the worn state, and the back side as viewed from the plane of the drawing is the face side in the worn state. It is apparent from FIG. 190(D) that the adhesive sheet 23024*i* is provided in a position for closely adhering to the cavum conchae 28*e* rearward of the entrance to the external auditory meatus 30*a*. The adhesive sheet 23024*i* can be repeatedly affixed to the cavum conchae 28*e*, and can be peeled away from the cartilage conduction unit 23024** and replaced with a new one when the adhesive force is reduced or the adhesive sheet becomes soiled. It is possible to use, e.g., “Opsite Gentle Roll” (registered trademark) or the like, which is a roll film the uses a silicone adhesive.

FIG. 191 is a conceptual perspective view of the one-hundred seventeenth embodiment shown in FIG. 190, and illustrates the structure being rotated 180 degrees from the state in FIG. 190(C) so that the earplug part **23024*k* and the adhesive sheet 23024*i* on the inner side can be seen. In FIG. 191, the parts are simplified and illustrated as being rectangular parallelepiped or columnar for convenience of description of the structural relationship, but the actual external appearance of the cartilage conduction unit 23024 and earplug part 23024*k* and the contour of the adhesive sheet 23024*i* of the one-hundred seventeenth embodiment are as shown in FIG. 190 and have a chamfered smoothness so as to be contoured in contact with the ear cartilage and the entrance to the external auditory meatus 30*a***.

FIG. 191(A) shows a disassembled state prior to the sheath **23024*b* being inserted over the connection part 23024*h* in order to show the particular relationship between the connection part 23024*h* and the piezoelectric bimorph element 23025 and sheath 23024*b*. It is apparent from FIG. 191(A) that the piezoelectric bimorph element 23025 is first inserted into the connection part 23024*h*. The piezoelectric bimorph element 23025 is thereby held by the cartilage conduction unit 23024. The sheath 23024*b* is mounted over the outer side of the connection part 23024*h* so as to cover the connection part, whereby the sheath 23024*b* is joined to the cartilage conduction unit 23024. At this point, the connection cable 23024*d* is drawn out from the hold 23024*n* to the lower part of the sheath 23024*b*. The sheath 23024*b* can thereby be reliably joined to the cartilage conduction unit 23024, and the piezoelectric bimorph element 23025 can be protected without being in contact with the sheath 23024*b*. For reference, FIG. 191(B) shows a downscaled perspective view of the completely assembled form obtained by inserting the sheath 23024*b* over the outer side of the connection part 23024*h*. One-hundred eighteenth embodiment FIG. 192 is a cross-sectional schematic view of a one-hundred eighteenth embodiment of an aspect of the present invention, and is configured as a stereo earphone. The one-hundred eighteenth embodiment of FIG. 192 has much in common with the one-hundred eleventh embodiment of FIG. 184, and therefore the same parts have been given the same reference numerals, and a description thereof has been omitted. A portion of the drawing in FIG. 184 is omitted in FIG. 192 to avoid complexity. The one-hundred eighteenth embodiment of FIG. 192 differs from the one-hundred eleventh embodiment of FIG. 184 in that a projecting part 24024*p* is formed on the surface of a cartilage conduction unit 24024 composed of an elastic body, and the stereo earphone can be stably worn with the external auditory meatus in an unoccluded state without manually pressing and pulling in the manner shown in FIG. 184**(D) in the one-hundred eleventh embodiment to thereby temporarily form an unoccluded state in the external auditory meatus.

Figure 192A:
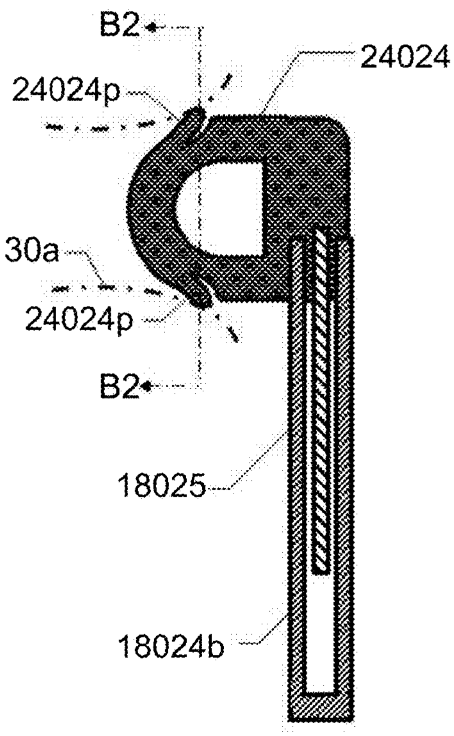

FIG. 192(A) shows the state in which the cartilage conduction unit 24024 has been inserted so that the distal end of the projecting part **24024*p* lightly contact s the entrance to the external auditory meatus 30*a* in a natural no-load state. In this state, the cartilage conduction unit 24024 is stably worn in the entrance to the external auditory meatus 30*a* due to friction caused by contact with the distal end of the entrance to the external auditory meatus 30*a* and repulsion-restorative force produced by the slight elastic deformation thereof. Also, the projecting part 24024*p* projects in a manner inclined outward and upward so as to widen outward due to the frictional force between the entrance to the external auditory meatus 30*a* and the distal end of the cartilage conduction unit 24024 when force is applied in the dislodging direction thereof, and therefore has a structure that is more unlikely to fall out. FIG. 192(B) is a view along the cross section B2-B2 in FIG. 192(A), and shows that the distal end of the projecting part 24024*p* and the entrance to the external auditory meatus 30*a* are in contact with each other, and that external sounds can enter from the gap between the entrance to the external auditory meatus 30*a* and the cartilage conduction unit 24024 in other portions as indicated by the arrow 28*g*** and reach the tympanic membrane.

Figure 192C:
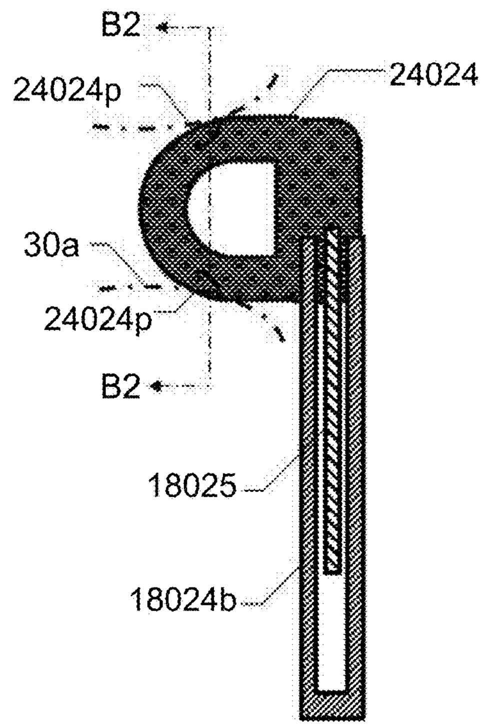
Figure 192B:
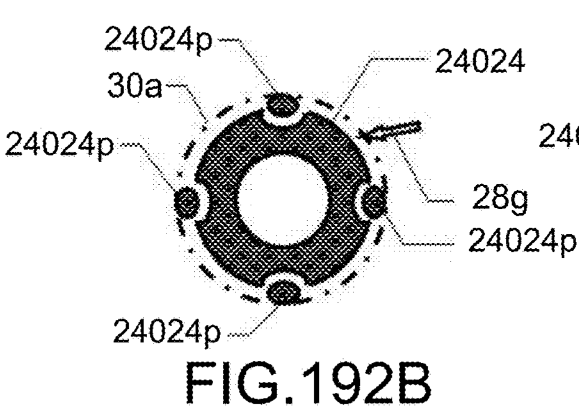
Figure 192D:
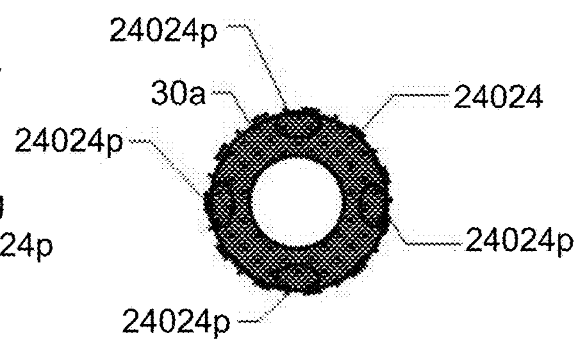

FIG. 192(C) shows the state in which the cartilage conduction unit 24024 has been firmly pressed by the entrance to the external auditory meatus **30*a*, and shows that the projecting part 24024***p* is pressed down and embedded in the surface of the cartilage conduction unit 24024, and that the cartilage conduction unit 24024 is in contact with the entrance to the external auditory meatus 30*a* around entire periphery thereof. FIG. 192(D) is a view along the cross section B2-B2 in FIG. 192(C), and shows that the entrance to the external auditory meatus 30*a* is occluded by the cartilage conduction unit 24024 being in contact with the entrance to the external auditory meatus 30*a* around the entire periphery thereof. Naturally, the cartilage conduction unit 24024 can be stably worn in the entrance to the external auditory meatus 30*a* in this state as well.

In this manner, in the one-hundred eighteenth embodiment of FIG. 192, the insertion state between the state of FIGS. 192(A) and (C) and the state of FIGS. 192(B) and (D) is changed without temporarily forming an unoccluded state in the external auditory meatus by manually pressing and pulling in the manner of FIG. 184(D) in the one-hundred eleventh embodiment, whereby the stereo earphone can be stably worn with the external auditory meatus in an unoccluded state and the external auditory meatus in an occluded state.

One-hundred Nineteenth Embodiment

FIG. 193 is a schematic view and a block view according to an aspect of a one-hundred nineteenth embodiment of the present invention, and is configured as a stereo earphone and a headset body connected thereto. The stereo earphone in the one-hundred nineteenth embodiment of FIG. 193 has much in common with the one-hundred thirteenth embodiment of FIG. 186, and the headset body has much in common with the headset body of the eighty-ninth embodiment of FIG. 139. Therefore, the same parts have been given the same reference numerals, and a description thereof has been omitted. Being mostly unrelated, a portion of the drawing in FIG. 193 is omitted. The one-hundred nineteenth embodiment of FIG. 193 differs from the one-hundred thirteenth embodiment and the eighty-ninth embodiment in that one end of a low-band piezoelectric bimorph element 25025*a* and an intermediate-to-high-band piezoelectric bimorph element 25025*b* is supported in a shared cartilage conduction unit 25024 and the other ends are capable of freely vibrating, and the low-band piezoelectric bimorph element 25025*a* and the intermediate-to-high-band piezoelectric bimorph element 25025*b* are driven from separate channels that have been separately equalized.

As previously described, in the example of measurement data shown in FIG. 79, a comparison of sound pressure in the non-contact state indicated by the solid line and the sound pressure at a contact pressure of 250 force-grams indicated by the dot-dash line shows that the sound pressure in the external auditory meatus at a depth of 1 cm from the entrance to the external auditory meatus is increased by at least 10 dB by contact in the main frequency band (50 Hz to 2300 Hz) of speech.

In the audio field of stereo earphones and the like, a sound quality that covers a higher frequency band is preferred, and in view of the change in sound pressure in the non-contact state and the sound pressure at a contact pressure of 250 force-grams in the example of measurement data shown in FIG. 79, an increase in sound pressure of at least 5 dB is observed even at about 3 kHz to 7 kHz. FIG. 79 is, at best, an example of measurement data and a strict quantitative evaluation has no significance, but FIG. 79 does indicate that at least for cartilage conduction, there are sensitivity characteristics that cover a higher frequency region and not just the main frequency band of speech.

The one-hundred nineteenth embodiment of FIG. 193 is a configuration made in view of the characteristics of cartilage conduction as described above. In addition to a first sheath 25024*b*, a second sheath 25024*q* is provided to the cartilage conduction unit 25024, as shown in FIG. 193(A), and one end of the low-band piezoelectric bimorph element 25025*a* and the intermediate-to-high-band piezoelectric bimorph element 25025*b* is held in the cartilage conduction unit 25024 so that there is no contact with the inner surface of the first sheath 25024*b* as well as the second sheath 25024*q*, respectively, as shown in FIG. 193(B). The length of the low-band piezoelectric bimorph element 25025*a* is greater than that of the intermediate-to-high-band piezoelectric bimorph element 25025*b*.

The first sheath 25024*b* is accommodated in the intertragic notch 28*f*, as shown in FIG. 193(A), the second sheath 25024*q* is in a position for accommodation in the incisura anterior 28*h* (see structural diagram of the ear of FIG. 80(A)), and positioning and perception of stability is enhances when the cartilage conduction unit 25024 is worn in a manner straddling the tragus 32. Forward of the incisura anterior 28*h* and below the crus of the tragus is open space in terms of the structure of the ear and is therefore suitable for providing the second sheath 25024*q*.

As shown in the block view of FIG. 193(C), the audio output from the acoustic processing circuit 8338 is separated into a low-band signal and an intermediate-to-high band signal, and each are equalized and amplified in a low-band equalizer/amplifier 25040*a* and an intermediate-to-high band equalizer/amplifier 20540*b* using respectively separate channels. The signals from the low-band equalizer/amplifier 25040*a* and the intermediate-to-high band equalizer/amplifier 20540*b* are connected to the low-band piezoelectric bimorph element 25025*a* and the intermediate-to-high-band piezoelectric bimorph element 25025*b*, respectively, by a first channel connection part 25046*a* and a second channel connection part 25046*b*, and drive the piezoelectric bimorph elements. One end of the low-band piezoelectric bimorph element 25025*a* and the intermediate-to-high-band piezoelectric bimorph element 25025*b* is held by a shared cartilage conduction unit 25024, and the cartilage conduction unit 25024 therefore conducts the physically mixed vibrations to the ear cartilage by cartilage conduction. Audio signals in at least the band of about 200 Hz to 7 kHz (see the example of measurement data shown in FIG. 79), which can be covered by cartilage conduction, can be heard by cartilage conduction. When such relatively wide-band cartilage conduction is to be implemented, the one-hundred nineteenth embodiment of FIG. 193 increases the degree of freedom of a piezoelectric bimorph element and the equalizer adapted thereto and facilitates obtainment of better sound quality by dividing the bandwidth to be handled by two piezoelectric bimorph elements having different lengths.

As described above, an example for configuring a cartilage conduction vibration unit using a plurality of cartilage conduction vibration sources is also shown in FIG. 94(D). Specifically, an example is described in which, in the cordless handset 5881*c* of the third modification of the sixty-second embodiment in FIG. 94(D), the low-end piezoelectric bimorph element 2525*g* and the high-end piezoelectric bimorph element 2525*h* are directly affixed to the inner side of the cartilage conduction unit 5824*c* so as to be in contact with the vibration surface side of the piezoelectric bimorph elements, and the vibrations of the piezoelectric bimorph element 2525*g* and the piezoelectric bimorph element 2525*h* are directly transmitted to the cartilage conduction unit 5824*c*, whereby a plurality of cartilage conduction vibration sources having different frequency characteristics are made to function in a complementary fashion to improve the frequency characteristics of cartilage conduction.

The implementation of the features of the present invention described above is not to be limited to the aspects in the above embodiments, and the invention can be implemented using other aspects as well, wherever it is possible to benefit from the advantages thereof. Embodiments in which an adhesive sheet is used is not limited to a configuration such as the one-hundred seventeenth embodiment shown in FIGS. 189 and 190. For example, in the one-hundred twelfth embodiment shown in FIG. 185, it is possible to provide an adhesive sheet at least the surface of the hemisphere of the ear cartilage contact side of the cartilage conduction unit 19024, to adhere the cartilage conduction unit 19024 to the entrance to the external auditory meatus 30*a* in the state of FIGS. 185(A) and (C), and adhere the cartilage conduction unit 19024 to the cavum conchae 28*e* in the state of FIGS. 185(B) and (D).

An example of a configuration for enjoying music or the like by cartilage conduction without blocking external sounds is not limited to providing a slit 23024*a* such as in the one-hundred seventeenth embodiment shown in FIGS. 189 and 190. In other words, it is also possible to provide a larger hole in lieu of parallel groove-shaped slits such as in the one-hundred seventeenth embodiment for introducing external sounds, as long as the shape allows the piezoelectric bimorph element 23025 to be inserted inside the connection part 23024*h* and allows the sheath 23024*b* to be provided so as to cover the connection part 23024*h* from the outside. The configuration of the sheath 23024*b* for covering, from the outside, the connection part 23024*h* into which the piezoelectric bimorph element 23025 has been inserted is also not limited to inserted from the bottom as in the one-hundred seventeenth embodiment, and it is also possible to use a configuration in which the connection part 23024*h* is wedged in from two sides, the front and back or the left and right.

Furthermore, in implementation of relatively wide-band cartilage conduction in the one-hundred nineteenth embodiment of FIG. 193, the bands are divided in the equalizer for two piezoelectric bimorph elements having differing lengths, but it is also possible to implement cartilage conduction for audio that included a main frequency band for speech, which is about 3 kHz to 7 kHz, by devising a single cartilage conduction vibration source and equalizer.

The features in the various embodiments described above are not limited to being used in each of the individual embodiments, and the features can be combined to form a single embodiment. For example, the feature of the adhesive sheet and the earplug part shown in FIG. 190 can be used in the one-hundred nineteenth embodiment of FIG. 193 as well. In this case, a slit or the like illustrated in FIG. 190 is used in place of the passage hole illustrated in FIG. 193 in the one-hundred nineteenth embodiment. Also, the configuration in which the piezoelectric bimorph element 23025 is inserted into the connection part 23024*h* and the sheath 23024*b* is covered thereon as shown in the one-hundred seventeenth embodiment of FIG. 190 can also be used as the configuration of first sheath 25024*b* as well as the second sheath 25024*q* in the one-hundred nineteenth embodiment of FIG. 193.

One-hundred Twentieth Embodiment

FIG. 194 is a schematic view of a one-hundred twentieth embodiment of an aspect of the present invention, and is configured as a stereo earphone. FIG. 194(A) is a front view (corresponding to the side surface of the face) of the right-ear earphone worn on the right ear 28. Illustration of the face other than the right ear 28 is omitted for simplicity, a description related only to the right ear is provided, and a description of the left-ear earphone, which has the same configuration, is omitted. In the same manner as the one-hundred ninth embodiment of FIG. 182 and elsewhere, the right-ear earphone and the left-ear earphone can be connected to the stereo mini jack for external output of a mobile telephone or a mobile music terminal by a stereo mini-plug. In the one-hundred twentieth embodiment of FIG. 194, the cartilage conduction unit is worn on ear cartilage using an adhesive sheet in the same manner as the one-hundred seventeenth embodiment of FIG. 190, but the cartilage conduction unit is worn on the inner side of the ear cartilage in the one-hundred seventeenth embodiment, whereas the cartilage conduction unit is worn on the outer side of the ear cartilage in the one-hundred twentieth embodiment.

Described more specifically, the cartilage conduction unit 23024 closely adheres to the cavum conchae 28*e*, which is on the inner side of the ear, as shown in FIG. 190(A) in the one-hundred seventeenth embodiment. (For convenience of description in FIG. 190(A), the cartilage conduction unit 23024 is shown with a broken line, and the cartilage conduction unit 23024 in the worn state can be seen from the side surface of the face.) In contrast, in the one-hundred twentieth embodiment, a cartilage conduction unit 26024 for the right-ear earphone is made to closely adhere to the ear cartilage using an adhesive sheet on back part of the outer side 1828 of auricle attachment part, which is the base of the ear 28, as is apparent in FIG. 194(A). As a result, in the worn state, most of the cartilage conduction unit 26024 is hidden (a broken line in the drawing) on the reverse side of the auricle in the right ear 28, and the lower end part is visible from the auricle, as shown in FIG. 194(A).

In such a wearing style of the cartilage conduction unit 26024, there is no portion covering the auricle, and the ear hole is open. Also, cartilage conduction is transmitted with good efficiency in a state in which the cartilage conduction unit 26024 has been retracted downward, even though the cartilage conduction unit 26024 is arranged on the outer side of the ear cartilage. Therefore, when glasses are worn, the cartilage conduction unit 26024 can be prevented from interfering with the bows of the glasses, allowing use regardless of whether glasses are being worn.

Figure 194A:
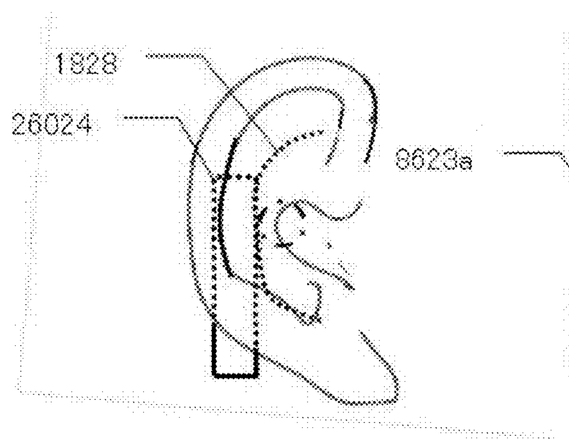
Figure 194B:
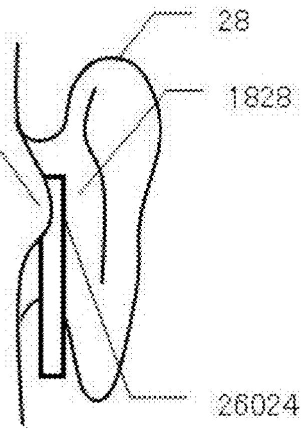

FIG. 194(B) is a view of the right ear 28 as seen from the back side of the head, the appearance in which the cartilage conduction unit 26024 of the right-ear earphone is made to closely adhere to the ear cartilage so as to be wedged between the temporal bone mastoid process 8623*a* and the outer side 1828 of the auricle attachment part, which is the base of the right ear 28. An adhesive sheet is provided to the cartilage conduction unit 26024, bonding to the rear part of the outer side 1828 of the auricle attachment part prevents falling off.

Figure 194C:
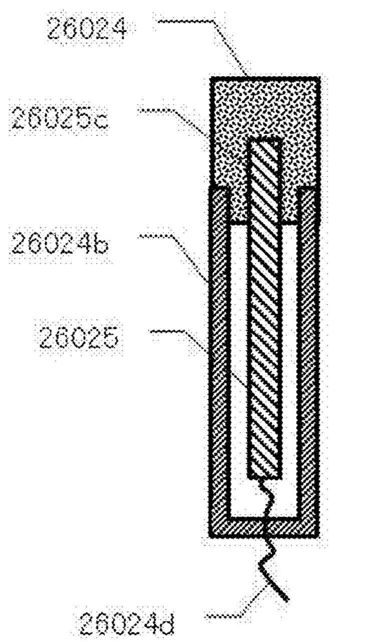

FIG. 194(C) is a front cross-sectional view of the earphone as seen from the orientation corresponding to FIG. 194(A). A structure is apparent from the cross-sectional view of FIG. 194(C) in which the upper part of the cartilage conduction unit 26024 is composed of an elastic body material, and a sheath 26024*b* composed of a hard material covers the cartilage conduction unit. The upper end 26025*c* of a piezoelectric bimorph element 26025 is directly embedded in and anchored to the upper part elastic body of the cartilage conduction unit 26024 without being in contact with the inner wall of the sheath 26024*b*. On the other hand, the lower end of the piezoelectric bimorph element 26025 is capable of freely vibrating inside the sheath 26024*b*, the counteractions thereof are transmitted to the upper part elastic body of the cartilage conduction unit 26024, and good cartilage conduction to the bonded ear cartilage is produced. A connection cable 26024*d* is drawn out from the lower end of the piezoelectric bimorph element 26025, and this is passed through the lower end of the sheath 26024*b* and connected to a stereo mini-plug. This internal structure is the same as the one-hundred eighty-second embodiment of FIG. 182 and elsewhere.

Figure 194D:
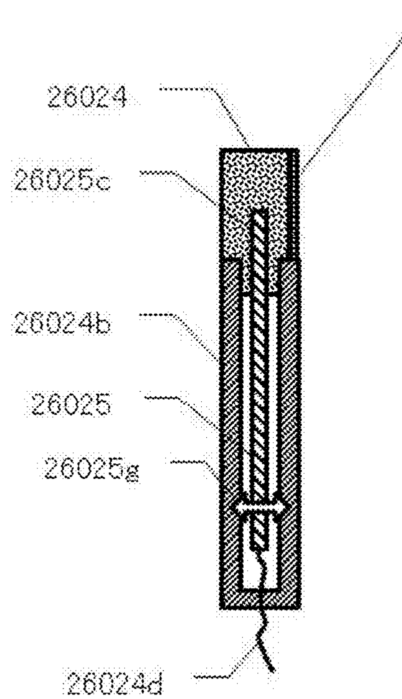

FIG. 194(D) is a cross-sectional view rotated 90 degrees from the cross-sectional view of FIG. 194(C), and is a view as seen from the orientation corresponding to FIG. 194(C). The arrow 26025*g* indicates the direction of vibration of the piezoelectric bimorph element 26025, the direction being parallel to the plane of the drawing, i.e., the direction along the external auditory meatus. An adhesive sheet 26024*i* is provided to the auricle side of the upper part elastic body of the cartilage conduction unit 26024, and the cartilage conduction unit 26024 is thereby bonded to the auricle side of the base of the right ear 28. The adhesive sheet 26024*i* is replaceable and can be peeled away from the upper part elastic body of the cartilage conduction unit 26024, and a new adhesive sheet can be reapplied when attachment to and removal from the right ear 28 has exceeded a predetermined number of times and the adhesive force has weakened.

Figure 194E:
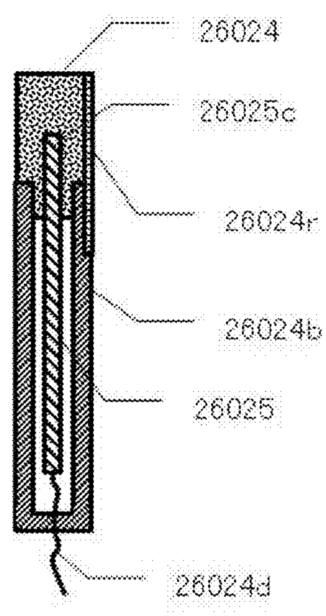

FIG. 194(E) shows a modification of the one-hundred twentieth embodiment, and is a cross-sectional view of the cartilage conduction unit 26024 as seen from the same direction as FIG. 194(D). In the modification, the range over which an adhesive sheet 26024*r* is provided extends to not only the upper part elastic body of the cartilage conduction unit 26024, but also to the sheath 26024*b* therebelow.

One-hundred Twenty-first Embodiment

FIG. 195 is a schematic view of a one-hundred twenty-first embodiment of an aspect of the present invention, and is configured as a stereo earphone. The relationship with the ear in the one-hundred twenty-first embodiment of FIG. 195 is the same as the one-hundred twentieth embodiment of FIG. 194 and is therefore omitted from the drawing. The structure thereof also has much in common with the one-hundred twentieth embodiment, and the same parts have been given the same reference numerals, and a description thereof has been omitted unless otherwise required. The one-hundred twenty-first embodiment of FIG. 195 differs from the one-hundred twentieth embodiment of FIG. 195 in the external shape of the upper part elastic body of a cartilage conduction unit 27024 and the shape of an adhesive sheet 27024*i*; and a sheath 27024*b* and as well as other structures and the internal structure are the same as the one-hundred twentieth embodiment.

Figure 195A:
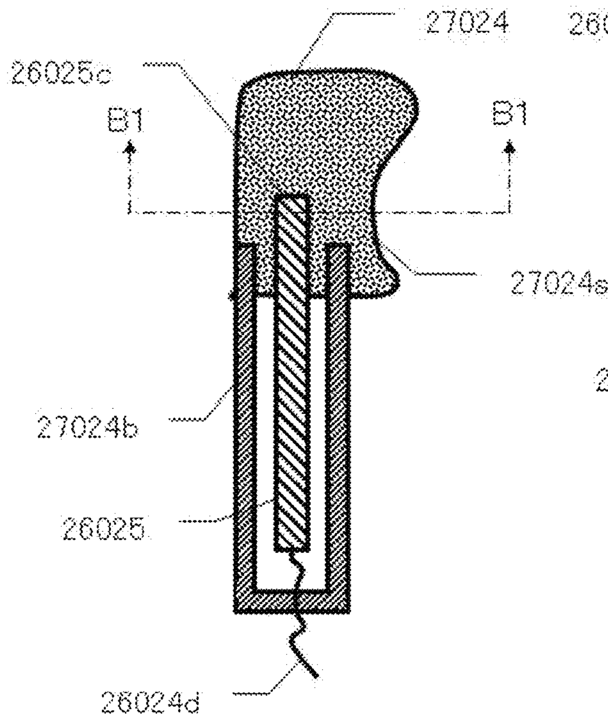
Figure 195B:
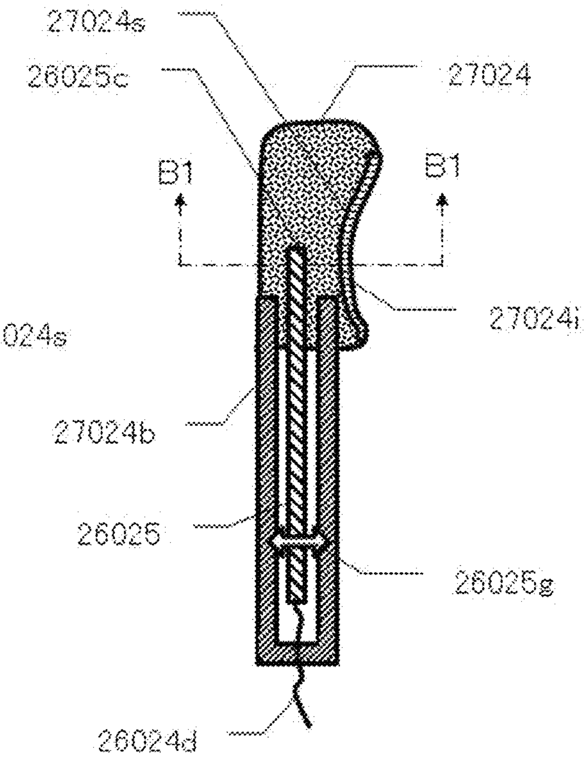

FIG. 195(A) is a cross-sectional view as seen from the orientation corresponding to FIG. 194(C) of the one-hundred twentieth embodiment, and the upper part elastic body portion of the cartilage conduction unit 27024 has a surface curvature referred to as a curved surface 27024*s* configured so as to fit the periphery of the base of the right ear 28. FIG. 195(B) is cross-sectional view as seen from the orientation corresponding to FIG. 194(D) of the one-hundred twentieth embodiment, and the curved surface 27024*s* of the upper part elastic body portion of the cartilage conduction unit 27024 is shaped to fit the outer side of the auricle in the vicinity of the attachment part. The adhesive sheet 27024*i* is also affixed in a curve shape in accompaniment therewith. The adhesive sheet 27024*i* is replaceable in similar fashion to the one-hundred twentieth embodiment.

Figure 195C:
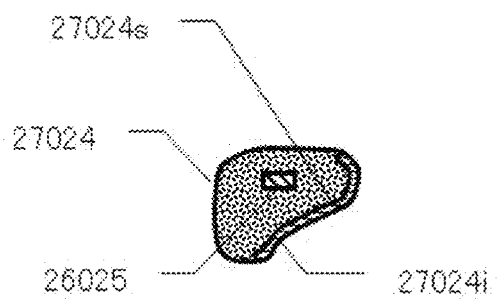
Figure 195D:
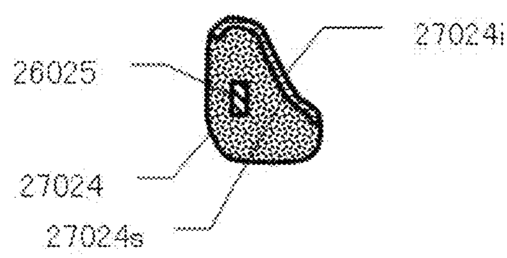

FIGS. 195(C) and (D) show a view along the cross section B1-B1 in the orientation of FIGS. 195(A) and (B), respectively. It is apparent from FIGS. 195(C) and (D) that the curved surface 27024*s* has a shape that fits into the gap formed between the temporal bone mastoid process 8623*a* and the rear part of the outer side 1828 of the auricle attachment part, which is the base of the right ear 28. The adhesive sheet 27024*i* is also provided not only to the auricle side but also to the distal end portion in the fitting-in direction. The adhesive sheet 27024*i* is not provided to the temporal bone mastoid process 8623*a* side facing the auricle, but is configured so as to avoid interfering with the freedom of transmitting vibrations to the auricle side, and prevents unpleasantness of the base of the auricle and the temporal bone mastoid process 8623*a* bonding together.

One-hundred Twenty-second Embodiment

FIG. 196 is a schematic view of a one-hundred twenty-second embodiment of an aspect of the present invention, and is configured as a stereo earphone. The one-hundred twenty-second embodiment of FIG. 196 has much in common with the one-hundred twentieth embodiment of FIG. 194, and therefore the same parts have been given the same two least-significant digits and appended letters of the reference numerals, and a description thereof has been omitted unless otherwise required. The one-hundred twenty-second embodiment of FIG. 196 differs from the one-hundred twentieth embodiment of FIG. 194 in that the upper elastic body portion of the cartilage conduction unit is bent in relation to the sheath.

Figure 196A:
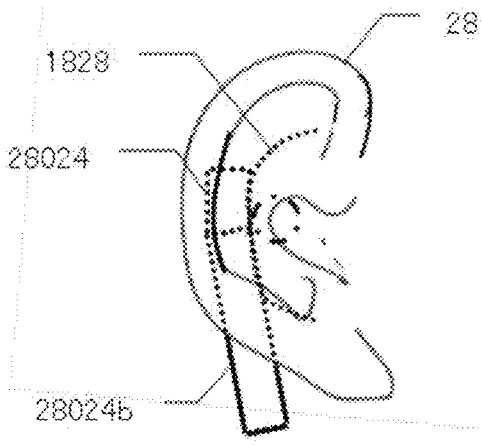

FIG. 196(A) is a front view (corresponding to the substantially anterior-posterior direction of the face) of the right-ear earphone corresponding to FIG. 194(A) of the one-hundred twentieth embodiment. It is apparent from FIG. 196(A) that in a cartilage conduction unit 28024 of the right-ear earphone, the upper elastic body portion is bent in relation to a sheath 28024*b*, and this bending is such that the entire cartilage conduction unit 28024 better fits around the base of the right ear 28. FIG. 196(B) is a cross-sectional view corresponding to FIG. 194(C) of the one-hundred twentieth embodiment. An upper end 28025*c* of a piezoelectric bimorph element 28025 is embedded in and anchored to the upper elastic body of the cartilage conduction unit 28024 in an inclined manner. In contrast, the sheath 28024*b* composed of a hard material is inclined and made to cover the upper elastic body of the cartilage conduction unit 28024 so that the piezoelectric bimorph element 28025 does not make contact with the inner wall thereof.

Figure 196C:
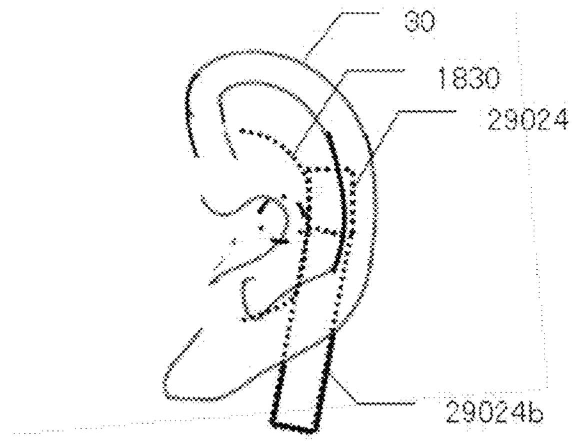
Figure 196B:
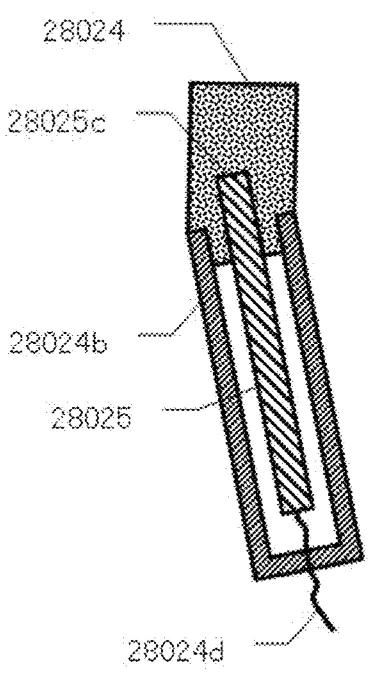
Figure 196D:
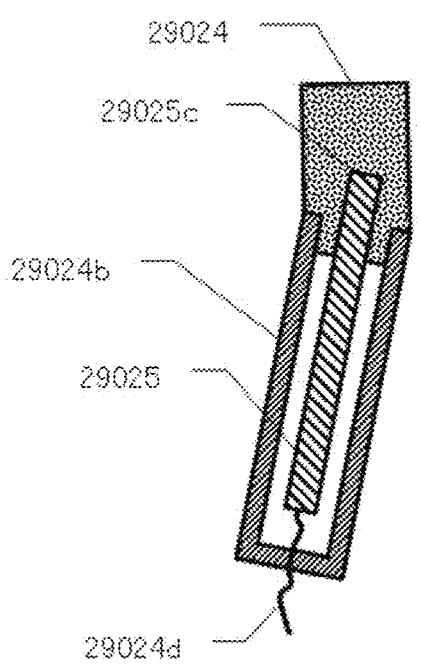

FIG. 196(C) is a front view showing the left-ear earphone together with the left ear 30, and is a symmetrical illustration that conforms to the right-ear earphone in FIG. 196(A). It is apparent from FIG. 196(C) that in a cartilage conduction unit 29024 of the left-ear earphone as well, the upper elastic body portion is bent in relation to a sheath 29024*b*, and the entire cartilage conduction unit 28024 better fits around the base of the left ear 30 by the bending. FIG. 196(D) is a cross-sectional view of the cartilage conduction unit 29024 in the left-ear earphone of FIG. 196(C), and is a symmetrical illustration that conforms to the right-ear earphone in FIG. 196(B). The internal structure thereof is the same as that of the cartilage conduction unit 28024 for the right-ear earphone, except that the bent direction is reverse, and therefore a description is omitted.

In the one-hundred twenty-second embodiment, an adhesive sheet (not shown) is provided to the forward side of the upper elastic body portion as viewed from the plane of the drawing in the right-ear cartilage conduction unit 28024 of FIG. 196(B) and the left-ear cartilage conduction unit 29024 of FIG. 196(D). The right-ear cartilage conduction unit 28024 and the left-ear cartilage conduction unit 29024 are thereby bonded to the base portion of the reverse side of the auricle of the right ear 28 and the left ear 30, respectively. Thus, in the one-hundred twenty-second embodiment, the bent direction and the placement direction of the adhesive sheet are symmetrical between the right-ear cartilage conduction unit 28024 and the left-ear cartilage conduction unit 29024, and the right-ear earphone and the left-ear earphone can be bonded to the right ear 28 and the left ear 30, respectively, without mutually confusing the two.

In the same manner as the one-hundred twenty-second embodiment, in the one-hundred twenty-first embodiment of FIG. 195 as well, the curved surface 27024*s* is symmetrical between the right-ear cartilage conduction unit 27024 and the left-ear cartilage conduction unit (not shown), and in accordance therewith, the shape of the adhesive sheet 27024*i* is also symmetrical in the right-ear cartilage conduction unit and the left-ear cartilage conduction unit. Therefore, in the one-hundred twenty-first embodiment of FIG. 195 as well, the right-ear earphone and the left-ear earphone can be bonded to the right ear 28 and the left ear (not shown), respectively, without mutually confusing the two. Also, in the one-hundred twenty-first embodiment, the curved surface 27024*s* is symmetrical between the right-ear cartilage conduction unit and the left-ear cartilage conduction unit, and the adhesive sheet 27024*i* can be reaffixed without confusing the adhesive sheet for right ear and the left ear when the adhesive sheet is to be replaced.

One-hundred Twenty-third Embodiment

FIG. 197 is a schematic view of a one-hundred twenty-third embodiment of an aspect of the present invention, and is configured as a stereo earphone. The one-hundred twenty-third embodiment of FIG. 197 has much in common with the one-hundred twentieth embodiment of FIG. 194, and therefore the same parts have been given the same two least-significant digits and appended letters of the reference numerals, and a description thereof has been omitted unless otherwise required. The one-hundred twenty-third embodiment of FIG. 197 differs from the one-hundred twentieth embodiment of FIG. 194 in terms of the direction of vibration of a piezoelectric bimorph element 30025.

Figure 197A:
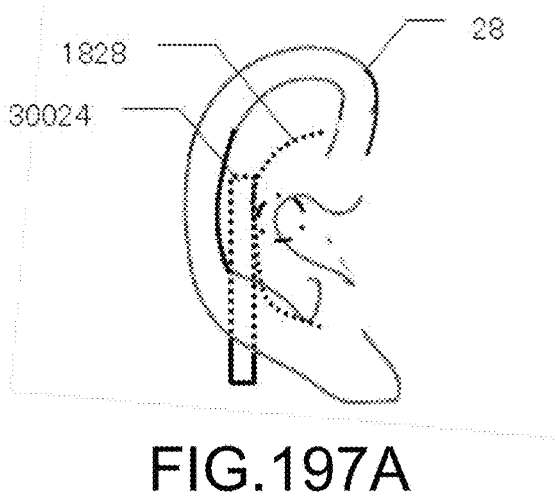
Figure 197B:
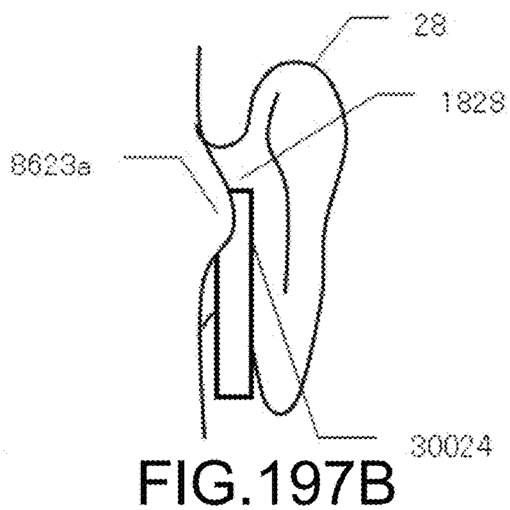
Figure 197C:
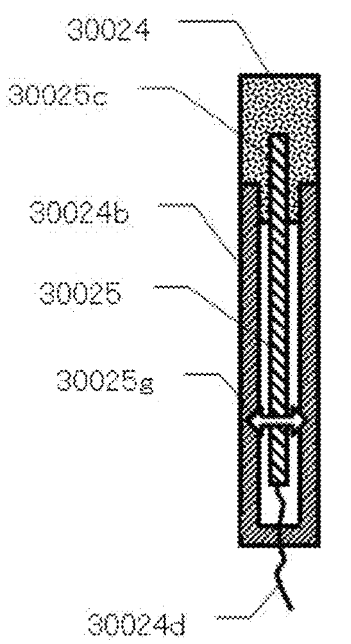
Figure 197D:
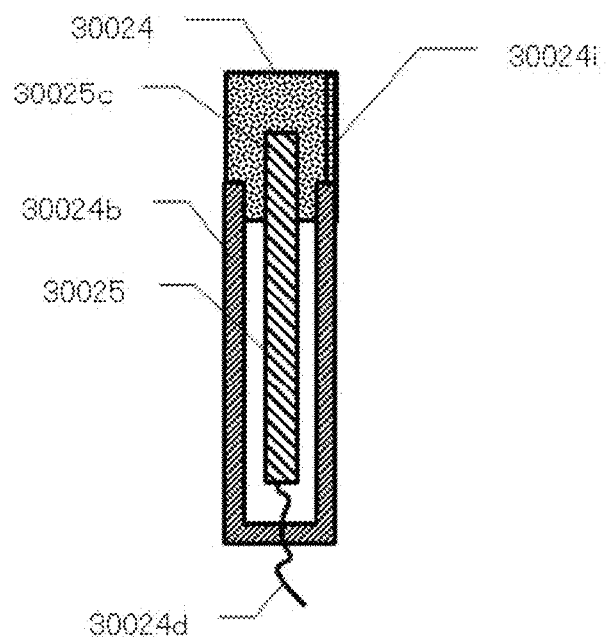

FIGS. 197(A) to (C) of the one-hundred twenty-third embodiment correspond to FIG. 194(A) to (C), respectively, of the one-hundred twentieth embodiment. However, the direction of vibration of the piezoelectric bimorph element 30025 is parallel to the plane of the drawing, i.e., the direction that transverses the external auditory meatus, as indicated by the arrow 30025*g* in FIG. 197(C). An adhesive sheet 30024*i* is provided to the auricle side of the upper elastic body of a cartilage conduction unit 30024, as shown in FIG. 197(D), and the cartilage conduction unit 30024 is bonded to the auricle side of the base of the right ear 28 in similar fashion to the one-hundred twentieth embodiment. In the one-hundred twenty-third embodiment as well, the adhesive sheet 30024*i* can be replaced and can be peeled away from the upper part elastic body of the cartilage conduction unit 26024, and a new adhesive sheet can be reapplied when attachment to and removal from the right ear 28 has exceeded a predetermined number of times and the adhesive force has weakened.

The various features shown each of the embodiments described above are not limited to being used in individual embodiments, but various modifications can be made wherever it is possible to make use of the advantages thereof, and the features may be combined into a single embodiment. For example, in the one-hundred twentieth embodiment to one-hundred twenty-third embodiment shown in FIG. 194 to FIG. 197, it is possible for the upper elastic body portion of the cartilage conduction unit to be composed of a hard material. Also, the one-hundred twenty-first embodiment shown in FIG. 195 and the one-hundred twenty-second embodiment shown in FIG. 196 may be combined, a curved surface may be provided to the upper elastic body portion of the cartilage conduction unit, and the upper elastic body portion of the cartilage conduction unit may be bent in relation to the sheath.

One-hundred Twenty-fourth Embodiment

FIG. 198 is a schematic view related to a one-hundred twenty-fourth embodiment according to an aspect of the present invention, and is configured as a stereo earphone 31081. The stereo headphones 31081 has a right-ear audio output part 31024 and a left-ear audio output part 31026. The right-ear audio output part 31024 and the left-ear audio output part 31026 have ear pads 31024*a* and 31026*a*, respectively, composed of an elastic body, and electromagnetic vibrators 31025*a* and 31025*b*, respectively, are embedded therein. Furthermore, air conduction-generating electromagnetic speakers 31024*b* and 31026*b* are provided to the right-ear audio output part 31024 and the left-ear audio output part 31026, respectively, in the portions surrounded by the ear pads 31024*a* and 31026*a*. In accordance with above configuration, the ear pad 31024*a* and the electromagnetic vibrator 31025*a* constitute a right-ear cartilage conduction unit that makes contact with the inner side of the auricle of the right ear. Similarly, the ear pad 31026*a* and the electromagnetic vibrator 31025*b* constitute a left-ear cartilage conduction unit that makes contact with the inner side of the auricle of the left ear. Thus, the one-hundred twenty-fourth embodiment is configured so as to use both a cartilage conduction unit and an air conduction speaker, and the frequency characteristics of the air conduction speaker reinforce the cartilage conduction unit, which is good in low-pitched regions.

FIG. 199 is an enlarged cross-sectional view of the right-ear audio output part 31024 and a block view of the internal configuration of the one-hundred twenty-fourth embodiment shown in FIG. 198. The stereo headphones 31081 receive audio signals from a mobile music player, a mobile telephone, or the like by using a short-range communication unit 31087 provided to the right-ear audio output part 31024. Also, the stereo headphones 31081 is capable of operating in any of a "normal mode," a "noise-cancelling mode," and an "ambient sound introduction mode" in accordance with a setting made by operation of an operation unit 31009.

In the "normal mode," an audio signal inputted from the short-range communication unit 31087 is sent from a control unit 31039 to a cartilage conduction equalizer 31083*a*, and based on the output thereof, the electromagnetic vibrator 31025*a* is driven by a cartilage conduction drive unit 31040*a*. At the same time, the audio signal inputted from the short-range communication unit 31087 is sent from the control unit 31039 to an air conduction equalizer 31038*b*, and based on the output thereof, the electromagnetic speaker 31024*b* is driven by an air conduction drive unit 31040*b*. The frequency characteristics of the air conduction speaker thereby reinforce the cartilage conduction unit, which is good in the low-pitched regions. In particular, when an external auditory meatus occlusion effect is produced by close adhesion between the auricle and the ear pad 31024*a*, low-pitched regions can be enhanced.

In the "noise-cancelling mode," ambient sounds picked up from an ambient sound microphone 31038 are inverted in phase and mixed by the control unit 31039, are sent from the air conduction equalizer 31038*b* to the air conduction drive unit 31040*b*, and are audio-outputted from the electromagnetic speaker 31024*b*. The phase-inverted ambient sound signal cancels the ambient sound that has directly penetrated the external auditory meatus from the exterior. The ambient sound is not included in the audio signal produced by cartilage conduction, and therefore the ambient sound picked up from the ambient sound microphone 31038 is not sent to the cartilage conduction equalizer 31038*a*.

When headphones are being used, e.g., on the streets outdoors, the "ambient sound introduction mode" is used for preventing accidents or the like caused by unawareness of the sound of a vehicle approaching from the rear, preventing unawareness of being spoken to during headphone usage resulting in rude interactions with other parties, and for allowing ambient sound to be heard during headphone usage. Cartilage conduction is used in the present invention, and therefore audio sounds generated in the external auditory meatus can be satisfactorily heard at the same time when ambient sounds are introduced. Specifically, in the "ambient sound introduction mode," ambient sounds picked up from the ambient sound microphone 31038 are mixed by the control unit 31039 without being phase-inverted, and are sent from the air conduction equalizer 31038*b* to the air conduction drive unit 31040*b*. The ambient sounds picked up from the ambient sound microphone 31038 are not sent to the cartilage conduction equalizer 31038*a* and only an audio signal can be heard. An audio signal can thereby be heard by cartilage conduction while ambient sounds are electrically introduced without a passage hole or the like being structurally provided.

The details of the configuration of the electromagnetic vibrator 31025*a* are the same as those of the electromagnetic vibrating element 4324*a* of the forty-eighth embodiment shown in FIG. 73, and a description is therefore omitted. The details of the configuration of the electromagnetic speaker 31024*b* are the same as those of the electromagnetic air-conduction speaker 9925 of the one-hundred third embodiment shown in FIG. 169, and a description is therefore omitted.

The left-ear audio output part 31026 has the same configuration as that of the right-ear audio output part 31024 shown in FIG. 199, except for a power source unit 31048, the operation unit 31009, the short-range communication unit 31087, and the ambient sound microphone 31038, and is therefore omitted from the drawing. The cartilage conduction equalizer and the air conduction equalizer of the left-ear audio output part 31026 are connected to the control unit 31039 of the right-ear audio output part 31024 via a signal line between the left-ear audio output part 31026 and the right-ear audio output part 31024. The power source unit 31048 supplies power to the stereo headphones 31081 overall, and therefore, power is not only supplied to the right-ear audio output part 31024, but also to the left-ear audio output part 31026 via a signal line between the left-ear audio output part 31026 and the right-ear audio output part 31024.

FIG. 200 is a flowchart showing the operation of the control unit 31039 of the one-hundred twenty-fourth embodiment in FIG. 199. The flow begins when a main power source is turned on by the operation unit 31009. In step S792, an initial startup and a check of each unit function are performed. Subsequently, the cartilage conduction drive unit 31040*a* is turned on in step S794, the air conduction drive unit 31040*b* is turned on in step 796, and the routine proceeds to Step S798.

In Step S798, a check is performed to determine whether the "normal mode" has been set, and if not, this means that the "noise-cancelling mode" or the "surrounding sound introduction mode (ambient sound introduction mode)" has been set, and the routine therefore advances to Step S800, the ambient sound microphone 31038 is turned on, and the routine advances to Step S802. When the routine has arrived at Step S800 and the ambient sound microphone 31038 is already on, no action is performed in Step S800, and the routine proceeds to Step S802. In Step S802, a check is performed to determine whether the "noise-cancelling mode" has been set, and if so, the routine advances to Step S804, processing for inverting the input signal picked up by the ambient sound microphone 31038 is carried out, and in Step S806, volume adjustment processing for noise cancellation is performed. This volume adjustment sets a volume that conforms to the magnitude of the ambient sound assumed to arrive at the entrance to the external auditory meatus from the exterior. Subsequently, the input signal from the ambient sound microphone 31038 processed in Step S808 is mixed with the air conduction audio signal, and the routine proceeds to Step S812. As described above, the processed input signal from the ambient sound microphone 31038 is not mixed with the audio signal for cartilage conduction.

On the other hand, in Step S802, when it has been confirmed that the "noise-cancelling mode" is not set, this means that the "surrounding sound introduction mode" is set and the routine advances to Step S810, and the volume adjustment processing is carried out for introducing surrounding sound to the input signal pickup up by the ambient sound microphone 31038. Volume adjustment is set to a magnitude that does not mask the audio signal produced by cartilage conduction. Next, the routine advances to Step S808, the processed input signal from the ambient sound microphone 31038 is mixed with the air conduction audio signal, and the routine proceeds to Step S812. As described above, in this case as well, the processed input signal from the ambient sound microphone 31038 is not mixed with the audio signal for cartilage conduction.

In contrast to the above, in Step S798, when it has been confirmed that the "normal mode" is set, the routine advances to Step S814, the ambient sound microphone 31038 is turned off, and the routine proceeds directly to Step S812. When the routine arrives at Step S814 and the ambient sound microphone 31038 is already off, no action is performed in Step S814, and the routine proceeds to Step S812. In Step S812, a check is performed to determine whether the power has been turned off by the operation unit 31009, and if the power is not off, the routine returns to Step S794, and Step S794 to Step S814 are thereafter repeated as long as the power is not turned off. In this repetition, if the cartilage conduction drive unit 31040*a* and the air conduction drive unit 31040*b* are already on, no action is performed in Step S794 and Step S796, and the routine proceeds to Step S798. On the other hand, when it has been confirmed in Step S812 that the power has been turned off, the flow ends.

One-hundred Twenty-fifth Embodiment

FIG. 201 is an enlarged cross-sectional view and a block view of the internal configuration related to a one-hundred twenty-fifth embodiment according to an aspect of the present invention. The one-hundred twenty-fifth embodiment is also configured as stereo headphones, and the overall configuration can be understood in accordance with FIG. 198 and is omitted from the drawing. FIG. 201 shows an enlarged cross-sectional view of a right-ear audio output unit 32024 and a block view of the internal configuration. Also, the one-hundred twenty-fifth embodiment has much in common with the one-hundred twenty-fourth embodiment shown in FIG. 199, and therefore the same reference numerals are used for the same parts and a description thereof has been omitted unless otherwise required.

The one-hundred twenty-fifth embodiment of FIG. 201 differs from the one-hundred twenty-fourth embodiment of FIG. 199 in that the vibrations of an electromagnetic speaker 32024*b* are used as a cartilage conduction vibration source. Specifically, the electromagnetic speaker 32024*b* is supported by a vibration conductor 32027, and the vibration conductor 32027 is embedded in and supported by the ear pad 31024*a*.

In accordance with such a configuration, relative movement is generated between a first portion composed of the yoke 4324*h* or the like and a second portion composed of the vibration plate 9924*k* or the like when an audio signal is inputted from a drive unit 32040, in the same manner as the one-hundred third embodiment of FIG. 169, and since the vibration plate 9924*k* is made to vibrate thereby, an air-conducted sound is generated from the electromagnetic speaker 32024*b*. On the other hand, the first portion composed of the yoke 4324*h* also vibrates due to the counteraction of the vibrations of the second portion composed of the vibration plate 9924*k* or the like, and these vibrations are transmitted from the vibration conductor 32027 to the ear pad 31024*a*. In the manner noted above, using the counteractions of vibrations of the electromagnetic speaker 32024*b* for generating air-conducted sound as the vibration source of cartilage conduction, it is possible to use both cartilage conduction and generation of air-conducted sound. In accompaniment therewith, there is a single drive control pathway from a control unit 32039 to the drive unit 32040 via an equalizer 32038.

One-hundred Twenty-sixth Embodiment

FIG. 202 is an enlarged cross-sectional view and a block view of the internal configuration relating to a one-hundred twenty-sixth embodiment of an aspect of the present invention. The one-hundred twenty-sixth embodiment is also configured as stereo headphones, and the overall configuration can be understood in accordance with FIG. 198 and is omitted from the drawing. FIG. 202 shows an enlarged cross-sectional view of a right-ear audio output unit 33024 and a block view of the internal configuration. Also, the one-hundred twenty-sixth embodiment has much in common with the one-hundred twenty-fifth embodiment shown in FIG. 201, and therefore the same reference numerals are used for the same parts and a description thereof has been omitted unless otherwise required.

The one-hundred twenty-sixth embodiment of FIG. 202 differs from the one-hundred twenty-fifth embodiment of FIG. 201 in that, rather than an electromagnetic speaker, a piezoelectric bimorph element 33024*a* is used as the shared vibration source for air conduction and cartilage conduction. The structure of the piezoelectric bimorph element 33024*a* is the same as, e.g., the forty-first embodiment of FIG. 64, and a description is therefore omitted. In the one-hundred twenty-sixth embodiment of FIG. 202, both ends of the piezoelectric bimorph element 33024*a* are embedded in and supported by the inner edge of the facing ear pad 31024*a*. Furthermore, a vibration plate 33027 is provided in the center part of the piezoelectric bimorph element 33024*a*.

In accordance with such a configuration, the center part of the piezoelectric bimorph element 33024*a* vibrates with support at both ends of the ear pad 31024*a*, whereby the vibration plate 33027 vibrates and air-conducted sound is generated. On the other hand, vibrations are transmitted to the ear pad 31024*a* from both ends of the piezoelectric bimorph element 33024*a* by the counteractions of the vibrations of the center part. In the manner noted above, using the counteractions of vibrations of the electromagnetic speaker 33024*a* for generating air-conducted sound as the vibration source of cartilage conduction, it is possible to use both cartilage conduction and generation of air-conducted sound.

One-hundred Twenty-seventh Embodiment

FIG. 203 is an enlarged cross-sectional view and a block view of the internal configuration relating to a one-hundred twenty-seventh embodiment of an aspect of the present invention. The one-hundred twenty-seventh embodiment is also configured as stereo headphones, and the overall configuration can be understood in accordance with FIG. 198 and is omitted from the drawing. FIG. 203 shows an enlarged cross-sectional view of a right-ear audio output unit 34024 and a block view of the internal configuration. Also, the one-hundred twenty-seventh embodiment has much in common with the one-hundred twenty-sixth embodiment shown in FIG. 202, and therefore the same reference numerals are used for the same parts and a description thereof has been omitted unless otherwise required.

The one-hundred twenty-seventh embodiment of FIG. 203 differs from the one-hundred twenty-sixth embodiment of FIG. 202 in that one end of a piezoelectric bimorph element 34024*a* serving as a shared vibration source for air conduction and cartilage conduction is embedded in and supported by the inner edge of the ear pad 31024*a*, and the other end is capable of freely vibrating. A vibration plate 34027 is provided to this freely vibrating end.

In accordance with such a configuration, the freely vibrating end of the piezoelectric bimorph element 34024*a* vibrates with support at the other end by the ear pad 31024*a*, whereby the vibration plate 33027 vibrates and air-conducted sound is generated. On the other hand, vibrations are transmitted to the ear pad 31024*a* from the other end of the piezoelectric bimorph element 34024*a* by the counteractions of the vibrations of the freely vibrating end. In the manner noted above, using the counteractions of vibrations of the electromagnetic speaker 34024*a* for generating air-conducted sound as the vibration source of cartilage conduction, it is possible to use both cartilage conduction and generation of air-conducted sound in the same manner as the one-hundred twenty-sixth embodiment of FIG. 202.

The implementation of the features of the present invention described above is not to be limited to the aspects in the above embodiments, and implementation is also possible using other aspects as well, wherever it is possible to benefit from the advantages thereof. Also, the various features of different embodiments can be combined, as appropriate. For example, in the one-hundred twenty-fourth embodiment shown in FIG. 199, introduction of ambient sound is determined by electrically switching, but it is also possible use a configuration in which a passage hole is provided in the manner of the ninety-first embodiment shown in FIG. 141 and the passage hole is mechanically opened and closed.

(One-hundred Twenty-eighth Embodiment)

FIG. 204 is a system configuration diagram of a one-hundred twenty-eighth embodiment according to an aspect of the present invention. The one-hundred twenty-eighth embodiment is configured as a mobile telephone system comprising a mobile telephone 35601 and a touch pen-type handset 35001, of which the latter has a cartilage conduction unit 35024 and is used also for touch panel input. The two can communicate with each other by near-field communication using a radio wave 6585 of a communication system such as Bluetooth™ The mobile telephone system of the one-hundred twenty-eighth embodiment has much in common with the sixty-ninth embodiment in FIG. 101; therefore, common parts are identified by the same reference numerals as in FIG. 101, and no overlapping description will be repeated unless necessary.

The touch pen-type handset 35001 of the one-hundred twenty-eighth embodiment shown in FIG. 204 allows touch pen input by touches with the touch pen unit 35001*a* on a touch panel provided in a large-screen display unit 205 of the mobile telephone 35601. Moreover, as mentioned above, the touch pen-type handset 35001 has, at its upper end, the cartilage conduction unit 35024 and, in a lower part, a microphone 35023, and thus can be used as a wireless handset. When using it as a handset, a user hears sound from the other side with the cartilage conduction unit 35024 put on the tragus or the like, and speaks to the microphone 35023 located near the mouth. In this way, the advantages of cartilage conduction can be exploited in a similar manner as in other embodiments.

The touch pen-type handset 35001 of the one-hundred twenty-eighth embodiment includes a near-field communication unit 6546 for communication with the mobile telephone 35601, and is controlled comprehensively by a control unit 6539. An incoming-call vibrator 6525 makes the touch pen-type handset 35001, as in a state stuck in a chest pocket, vibrate to notify an incoming call. Using vibration of the cartilage conduction unit 35024 as an incoming-call vibrator eliminates the need to provide the incoming-call vibrator 6525 as a vibration source.

An operation unit 6509 includes a call start button 6509*a* operated to start an outgoing call or to respond to an incoming call, a call end button 6509*b* for ending a call, and a select button 5609*c* for selecting a call destination. A display unit 6505 includes a plurality of indicator lamps 6505*a*, 6505*b*, and 6505*c*.

When starting an outgoing call, each time a user presses the select button 5609*c*, one after the next of the indicator lamps 6505*a*, 6505*b*, and 6505*c* is lit, one at a time, so that, by selecting which lamp to light, the user can select one of previously set call destinations. The selection causes the corresponding data, such as a telephone number, stored in a storage unit 6537 (see FIG. 205) to be read out, in preparation for a call originating operation. When the user chooses to originate a call to a call destination other than the previously set ones, he can call up a telephone directory on the large-screen display unit 205 of the main body of the mobile telephone 35601 and then touch an entry on the list with the touch pen unit 35001*a* to select a call destination. Having thus selected a call destination, the user can start a call by pressing the call start button 6509*a*. The number of previously set call destinations can be increased by adopting, in addition to the patterns in which only one of the indicator lamps 6505*a*, 6505*b*, and 6505*c* is lit respectively, also patterns in which two of them are lit together, namely in combinations of 6505*a* and 6505*b*, 6505*b* and 6505*c*, and 6505*a* and 6505*c* respectively.

On the other hand, when an incoming call is received from a previously set call destination, the lamps are lit in one of the above-mentioned patterns. Thus, based on the pattern in which the lamps are lit, the user can know who is calling. When an incoming call is received from a call destination other than the previously set ones, this is indicated with all the indicator lamps 6505*a*, 6505*b*, and 6505*c* lit. To check out who is calling, the user can see an indication on the large-screen display unit 205 of the main body of the mobile telephone 35601.

To previously set a call destination, the user calls up a telephone directory on the large-screen display unit 205 of the main body of the mobile telephone 35601, and operates the select button 5609*c* to select the pattern to be assigned. The user then touches with the touch pen unit 35001*a* a telephone number in the telephone directory which the user wants to set (e.g., "Ishida" 35205 shown on the large-screen display unit 205), and then presses the call start button 6509*a* and the call end button 6509*b* simultaneously to fix the setting. In this way, the data, such as the telephone number, received from the near-field communication unit 6546 is stored in the storage unit 6537, in association with a display pattern of the indicator lamps 6505*a*, 6505*b*, and 6505*c*, which function as the display unit 6505.

FIG. 205 is a system block diagram of the one-hundred twenty-eighth embodiment shown in FIG. 204. FIG. 205 too has much in common with FIG. 102, which shows the sixty ninth embodiment; therefore, common parts are identified by the same reference numerals as in FIG. 102, and no overlapping description will be repeated unless necessary. Likewise, such parts as are shown also in FIG. 204 are identified by the same reference numerals, and no overlapping description will be given unless necessary. In FIG. 205, in explanation of the one-hundred twenty-eighth embodiment, a touch panel 35068 is illustrated in the large-screen display unit 205 of the mobile telephone 35601, and a control unit is assigned the reference numeral 35239. In the touch pen-type handset 35001, a sound processing unit 35040 processes an audio signal collected by the microphone 35023 and transmits the result from the near-field communication unit 6546 to the mobile telephone 35601; the sound processing unit 35040 also makes a drive unit 35039 vibrate the cartilage conduction unit 35024 based on an audio signal, conveying the sound from the other side, that is transmitted from the mobile telephone 35601 and received by the near-field communication unit 6546.

Here, a supplemental description will be given of the relationship between the touch panel 35068 in the large-screen display unit 205 of the mobile telephone 35601 and the touch pen-type handset 35001. With no touch input for a predetermined period, the large-screen display unit 205 enters a power-saving state, turning off a backlight (not shown) and disabling the touch panel 35068. The power-saving state occurs in a so-called standby state, i.e., a state in which the mobile telephone 35601 is put in a bag or in a pocket. When an incoming call is received in the power-saving state, the incoming-call vibrator 6525 of the touch pen-type handset 35001 vibrates, and in addition the touch pen-type handset 35001 functions to permit a user to engage in the call without taking out the mobile telephone 35601.

On the other hand, when the large-screen display unit 205 is not in the power-saving state, and thus the backlight is lit and the touch panel 35068 is in an operating state, touch input is possible by touches with the touch pen-type handset 35001. When an incoming call is received in this state, basically the user engages in the call by using the main body of the mobile telephone 35601. Even in this case, if, due to ambient noise or the like, the user finds difficulty engaging in the call, he can, by manual operation, switch to use the touch pen-type handset 35001.

FIG. 206 is a flow chart showing the function of the control unit 35239 of the mobile telephone 35601 of the one-hundred twenty-eighth embodiment. The flow in FIG. 206 focuses on operation for functions for coordination with the touch pen-type handset 35001 on receiving an incoming call and functions for inputting a telephone directory entry to the touch pen-type handset 35001 for setting a call destination; in reality, the mobile telephone 35601 involves operation of the control unit 35239 other than that shown in the flow in FIG. 206. The control unit 35239 can additionally perform any of the functions described in connection with other various embodiments, but these functions too are omitted from illustration and description to avoid complication.

The flow in FIG. 206 starts when the main power to the mobile telephone 35601 is turned on. In Step S822, a start-up procedure is gone through, checks are made on the functions of different blocks, and display is started on the large-screen display unit 205 of the mobile telephone 35601. Next, in Step S824, whether or not an incoming call is being received is checked. If an incoming call is being received, then, in Step S826, whether or not the touch panel 35068 is in the power-saving state is checked. If not, then, in Step S827, whether or not an incoming videophone call is being received is checked. If not, then in Step S828, the incoming call is indicated with a ringtone from the main body of the mobile telephone 35601, or by the incoming-call vibrator. Then, in Step S830, a responding operation on the operation unit 209 of the main body of the mobile telephone 35601 is waited for, and when a responding operation is done, the flow advances to Step S832.

In Step S832, based on an operation on the operation unit 209 of the mobile telephone 35601, or based on receipt of a signal representing an operation on the operation unit 6509 of the touch pen-type handset 35001, it is checked whether or not a manual operation for selecting the touch pen-type handset 35001 has been done. If no operation for selecting the touch pen-type handset 35001 is detected, then, in Step S834, a microphone 223 and an earphone 213 of the main body of the mobile telephone 35601 are turned on, and communication by the main body of the mobile telephone 35601 is started. Next, in Step S836, whether or not an operation for ending a call is done is checked, and if an operation for ending a call is detected, the flow advances to Step S838. On the other hand, if, in Step S836, no operation for ending a call is detected, the flow returns to Step S832 so that thereafter, so long as no operation for ending a call is detected, Step S832 through S836 are repeated. During the repetition, if the microphone 223 and the earphone 213 of the mobile telephone 35601 p are already on, nothing is done in Step S834.

On the other hand, if, in Step S826, the touch panel 35068 is detected being in the power-saving state, or if, in Step S827, an incoming videophone call is detected, then, in Step S840, the incoming call is indicated by the incoming-call vibrator 6525 of the touch pen-type handset 35001. Then, in Step S842, a responding operation on the operation unit 6509 (call start button 6509*a*) of the touch pen-type handset 35001 is waited for, and when a responding operation is done, the flow advances to Step S844.

In Step S844, the microphone 223 and the earphone 213 of the main body of the mobile telephone 35601 are turned off, and then, in Step S846, the microphone 35023 of the touch pen-type handset 35001 is turned on. Further, in Step S848, the cartilage conduction unit 35024 is turned on. Then, in Step S850, an operation on the operation unit 6509 (call end button 6509*b*) is waited for, and when an operation for ending the call is done, the flow advances to Step S838.

Incidentally, during the above-mentioned repetition of Steps S832 through S836, if, in Step S832, a manual operation for selecting the touch pen-type handset 35001 is detected, then the flow advances to Step S844, so that the call that has been conducted on the main body of the mobile telephone 35601 is thereafter switched to a call conducted on the touch pen-type handset 35001. In this way, when a user finds difficulty engaging in a call on the main body of the mobile telephone 35601, at any time during the call, he can switch to the touch pen-type handset 35001.

In Step S838, it is checked whether or not a touch with the touch pen-type handset 35001 has been made on a telephone directory in a state where, with a view to previously setting a call destination, the telephone directory is displayed on the large-screen display unit 205 of the mobile telephone 35601 and an indicator pattern to be assigned is selected with the select button 5609*c*. If such a touch is detected, the flow proceeds to Step S852, namely "Input Phone Directory Entry To Handset". This process involves, among others, detecting a touched position, identifying a selected call destination, transmitting an identified telephone directory entry to the touch pen-type handset 35001, and fixing a setting by detecting simultaneous pressing of the call start button 6509*a* and the call end button 6509*b*. To set a plurality of call destinations, a user can then touch the next call destination and repeat the same process. On completion of the process in Step S838, the flow advances to Step S854. If, in Step S838, no touch for input of a telephone directory entry is detected, the flow advances directly to Step S854.

In Step S854, whether or not the main power to the touch pen-type handset 35001 has been turned off is checked, and if not, the flow returns to Step S824 so that thereafter, so long as the main power is not detected having been turned off in Step S854, Step S824 through S854 are repeated. On the other hand, if, in Step S854, the main power is detected having been turned off, the flow ends.

Though omitted from FIG. 206 to avoid complication, if, in Step S830 or S842, no responding operation is done for a predetermined period or longer, or if response is refused and an operation for ending a call is done, the flow jumps to Step S838.

While the flow in FIG. 206 focuses on functions for handling an incoming call, functions for handling an outgoing call are basically similar. Specifically, reading Step S824 as "Outgoing Call?" and reading each of Steps S830 and S842 as "Other Side Responded" will enable one to understand the functions for handling an outgoing call. For the handling of an outgoing call, Steps S828 and S840, namely incoming call notification, are omitted.

(One-hundred Twenty-ninth Embodiment)

FIG. 207 is a system configuration diagram of a one-hundred twenty-ninth embodiment according to an aspect of the present invention. The one-hundred twenty-ninth embodiment is configured as a mobile telephone system comprising a mobile telephone 35601 and a clinical thermometer-type handset 36001, of which the latter has a cartilage conduction unit 35024 and is used also for touch panel input. The two can communicate with each other by near-field communication using a radio wave 6585 of a communication system such as Bluetooth™. The mobile telephone system of the one-hundred twenty-ninth embodiment has much in common with the one-hundred twenty-eighth embodiment shown in FIG. 204; therefore, common parts are identified by the same reference numerals as in FIG. 204, and no overlapping description will be repeated unless necessary. The detailed configuration of the system is similar to that in the block diagram in FIG. 205, which shows the one-hundred twenty-eighth embodiment.

The one-hundred twenty-ninth embodiment shown in FIG. 207 differs from the one-hundred twenty-eighth embodiment in FIG. 204 in that the handset that is usable also for touch panel input is configured as a clinical thermometer-type handset 36001 that is flat. On a flat face, a small display screen 66505 is provided as a display unit. The small display screen 66505 provides clear display of the other side's telephone number, etc. The display of the telephone number, etc. can be used to allow selection of a call destination for an outgoing call, to indicate an incoming call, or to check a telephone directory entry to be set as a call destination. The small display screen 66505 can further be used to display explanations of various methods of use, such as a method of use as a cartilage conduction handset, and to indicate the power drain status of a power supply unit 6548, etc.

The features of the present invention in the embodiments described above are not limited to those specific embodiments; they can be implemented in any other embodiment so long as they provide their advantages. Various features from different embodiments can be implemented in any appropriate combination. For example, the clinical thermometer-type handset 36001 of the one-hundred twenty-ninth embodiment shown in FIG. 207 provides a configuration that is useful even when its touch pen function is not used. The touch pen-type handset 35001 and the clinical thermometer-type handset 36001 in the one-hundred twenty-eighth embodiment in FIG. 204 and the one-hundred twenty-ninth embodiment in FIG. 207 respectively, of which both are also usable for touch panel input, can be configured such that they can be stored inside a body of, or inside a cover for covering, the mobile telephone 35601.

The touch pen-type handset 35001 and the clinical thermometer-type handset 36001 in the one-hundred twenty-eighth embodiment in FIG. 204 the one-hundred twenty-ninth embodiment in FIG. 207 respectively, of which both are also usable for touch panel input, can be furnished with not only functions for handling outgoing and incoming calls but also functions of an independent telephone, like the ultra-compact mobile telephone 6501 in the sixty ninth embodiment shown in FIG. 101. Conversely, the one-hundred twenty-eighth embodiment shown in FIG. 204 and the one-hundred twenty-ninth embodiment shown in FIG. 207 can be simplified by omitting the microphone 35023, in which case sound can be collected by the microphone 223 of the mobile telephone 35601. Although the advantages of cartilage conduction cannot be obtained, even with a configuration where the cartilage conduction unit is replaced with an ordinary air-conduction speaker, it is possible to obtain the benefits of a handset that doubles as a touch pen.

(One-hundred Thirtieth Embodiment)

FIG. 208 is a schematic diagram of a one-hundred thirtieth embodiment according to one aspect of the present invention, which is configured as stereo earphones. The stereo earphones are configured symmetrically left to right to have two similarly configured units. Therefore, only one unit will be described below as an "earphone". FIG. 208(A) is an exterior front view of the earphone as seen from an inner side thereof (the side attached to an ear), where major components that are invisible from outside are indicated by broken lines. The earphone of the one-hundred thirtieth embodiment, like that of the one-hundred ninth embodiment in FIG. 182 for instance, has a cartilage conduction unit 36024 which is formed of an elastic member with strong resilience and of which a lower part is coupled to a sheath part 36024*b*. An upper end part of a piezoelectric bimorph element 36025 is embedded directly in, and firmly fixed to, the lower part of the cartilage conduction unit 36024 inside the sheath part 36024*b* without touching its inner wall. Through a hole in a lower part of the sheath part 36024*b*, a connection cable 36024*d* is led out.

The cartilage conduction unit 36024 in the earphone of the one-hundred thirtieth embodiment in FIG. 208 is, in a similar manner as shown in FIG. 182(A) in connection with the one-hundred ninth embodiment, held in a space between the inner side of the tragus and the antihelix. Here, the sheath part 36024*b* hangs down below the ear, that is, in a similar manner as shown in FIG. 182(A), from the cavum conchae through the intertragic notch.

The one-hundred thirtieth embodiment in FIG. 208 differs from the one-hundred ninth embodiment in FIG. 182 and other embodiments in that, inside the cartilage conduction unit 36024, a ring-shaped vibration plate (diaphragm) 36027 for generating air conduction sound is arranged which vibrates without making contact with the cartilage conduction unit 36024, and in that the vibration plate 36027 is supported directly on the upper end of the piezoelectric bimorph element 36025 which penetrates the lower part of the cartilage conduction unit 36024. In FIG. 208(A), an inner passage hole 36024*a* and an outer passage hole 36024*c*, the latter having a smaller diameter than the former, are visibly illustrated. As mentioned above, the vibration plate 36027 is invisible from outside.

FIG. 208(B) is a sectional view of a part in FIG. 208(A) where the piezoelectric bimorph element 36025 is located (a sectional view along line B1-B1 in later-described FIG. 208(C), which is a sectional view 90 degrees rotated from FIG. 2080(B)), and there, such parts as are shown also in FIG. 208(A) are identified by the same reference numerals. As will be clear from FIG. 208(B), a lower part of the cartilage conduction unit 36024 is extended to form a connection part 36024*h*, and the sheath part 36024*b* is fitted around the connection part 36024*h* so as to cover it. This permits the sheath part 36024*b* to securely couple with the cartilage conduction unit 36024. On the other hand, an upper end part of the piezoelectric bimorph element 36025 is inserted inside the connection part 36024*h* so as to penetrate it. This protects the piezoelectric bimorph element 36025, and permits a lower end part of the piezoelectric bimorph element 36025 to vibrate inside the sheath part 36024*b* without making contact with it. Thus, a reaction of the vibration of the lower part of the piezoelectric bimorph element 36025 conducts to the cartilage conduction unit 36024, achieving satisfactory cartilage conduction.

As indicated by dash-and-dot lines in FIG. 208(B), inside the cartilage conduction unit 36024, the vibration plate 36027 is arranged which vibrates without touching the unit, and is supported on an inner side (the side attached to the ear) of the upper end of the piezoelectric bimorph element 36025 which penetrates the connection part 36024*h*. The reason that the vibration plate 36027 is ring-shaped is to direct outside sound to the earhole. Thus, as the piezoelectric bimorph element 36025 vibrates, the vibration plate 36027 generates air-conduction sound. In this way, middle- to low-register sound is mainly covered by cartilage conduction, high-register sound is mainly covered by air-conduction sound from the vibration plate 36027.

As mentioned above, FIG. 208(C) is a sectional view 90 degrees rotated from FIG. 208(B), and there, such parts as are shown also in FIGS. 208(A) and (B) are identified by the same reference numerals. In FIG. 208(C), the left side is the side attached to the ear (inner side). As will be clear from FIG. 208(C), in a cavity inside the cartilage conduction unit 36024, the vibration plate 36027 is arranged which vibrates without touching the unit's inner wall, and is supported directly on the upper end of the piezoelectric bimorph element 36025 which penetrates the connection part 36024*h*. As will be clear from FIG. 208(C), compared with the diameter of the inner passage hole 36024*a* facing the ear, the diameter of the outer passage hole 36024*c* facing outside is smaller. Thus, the inner passage hole 36024*a*, which is located on the earhole side of the vibration plate 36027, is wider open than the outer passage hole 36024*c*, which is located outward of the vibration-conducting plate 36027. This permits the air-conduction sound from the vibration plate 36027 to be effectively directed to the earhole. To that end, the inner passage hole 36024*a* is preferably given as large a diameter as possible so long as no problem arises in terms of mechanical strength or protection of the vibration plate. On the other hand, the outer passage hole 36024*c* is preferably given as small a diameter as possible so long as no problem arises in terms of introduction of outside sound. In FIG. 208(C), to avoid complication, the connection cable 36024*d* is omitted from illustration.

As mentioned above, the vibration plate 36027 is ring-shaped so as not to prevent the outside sound that has entered through the outer passage hole 36024*c* from passing through the inner passage hole 36024*a* into the earhole. However, so long as, inside the cavity in the cartilage conduction unit 36024, a gap through which the outside sound that has entered through the outer passage hole 36024*c* can pass on to the inner passage hole 36024*a* (e.g., a gap between the circumference of the vibration plate 36027 and the inner wall of the cavity) can be secured, the vibration plate 36027 does not have to be ring-shaped but may be disc-shaped, with no hole. In a case where a hole is provided to allow passage of outside sound, its position is not limited to at the center of the vibration plate, nor is its shape limited to circular; more than one hole may be provided, and a large number of holes may be provided in a honeycomb array.

(One-hundred Thirty-first Embodiment)

FIG. 209 is a schematic diagram of a one-hundred thirty-first embodiment according to one aspect of the present invention, which is configured as stereo earphones. FIGS. 209(A) to (C) showing the one-hundred thirty-first embodiment have very much in common with FIGS. 208(A) to (C) showing the one-hundred thirtieth embodiment; therefore, common parts are identified by the same reference numerals, and no overlapping description will be repeated unless necessary.

The one-hundred thirty-first embodiment in FIG. 209 differs from the one-hundred thirtieth embodiment in FIG. 208 is that, as will be clear from FIG. 209(C), the vibration plate 37027 is held in close contact with the inner side of a part of the cartilage conduction unit 37024 around the outer passage hole 37024*c*, via a soft material 37024*t*. As in the one-hundred thirtieth embodiment in FIG. 208, the vibration plate 37027 makes contact with the upper end of the piezoelectric bimorph element 36025 penetrating the connection part 36024*h* to achieve direct conduction of the plate's vibration.

The configuration of the one-hundred thirty-first embodiment in FIG. 209 may slightly restrict the freedom of the vibration plate 37027 to vibrate, but, owing to the vibration plate 37027 being supported also on the cartilage conduction unit 37024, offers increased structural strength, making the earphones, when dropped by mistake, less prone to breakage as by the vibration plate 37027 coming off the piezoelectric bimorph element 36025.

In the configuration of the one-hundred thirty-first embodiment in FIG. 209, so long as no problem arises in terms of the restriction on the freedom of the vibration plate 37027 to vibrate, the vibration plate 37027 may be held in close contact directly with the inner side of a part of the cartilage conduction unit 37024 around the outer passage hole 37024*c*, i.e., without the soft material 37024*t* interposed. In that case, the degree of elasticity of the cartilage conduction unit 37024 is determined based on a tradeoff between how well the cartilage conduction unit 37024 should, when worn, maintain its shape to achieve satisfactory cartilage conduction and how far the freedom of the vibration plate 37027 to vibrate can be restricted. On the other hand, reducing the thickness of the outer passage hole 37024*c* helps alleviate the degree of restriction on the freedom of the vibration plate 37027 to vibrate.

(One-hundred Thirty-second Embodiment)

FIG. 210 is a schematic diagram of a one-hundred thirty-second embodiment according to one aspect of the present invention, which is configured as stereo earphones. FIGS. 210(A) to (C) showing the one-hundred thirty-second embodiment have very much in common with FIGS. 208(A) to (C) showing the one-hundred thirtieth embodiment; therefore, common parts are identified by the same reference numerals, and no overlapping description will be repeated unless necessary.

A first difference of the one-hundred thirty-second embodiment in FIG. 210 from the one-hundred thirtieth embodiment in FIG. 208 is that, as will be clear from FIG. 210(B), the cartilage conduction unit 38024 and the sheath part 38024*b* are formed integrally out of a hard material. A second difference of the one-hundred thirty-second embodiment from the one-hundred thirtieth embodiment is that a lower end part of the piezoelectric bimorph element 38025 is supported on the inner side of a lower end part of the sheath part 38024*b* so that an upper end part of the piezoelectric bimorph element 38025 can vibrate freely inside the sheath part 38024*b* without making contact with the inner wall of the sheath part 38024*b* or of the cartilage conduction unit 38024. The vibration plate 38027 is supported on an upper end part of the piezoelectric bimorph element 38025 which can thus vibrate freely. The vibration plate 38027 thus vibrates inside the cavity in the cartilage conduction unit 38024 to generate air-conduction sound. In the one-hundred thirty-second embodiment, the cartilage conduction unit 38024 is formed of a hard material, and accordingly the cartilage conduction unit 38024 itself (e.g., the front face around the inner passage hole 36024*a*) generates air-conduction sound, augmenting high-register sound. On the other hand, due to the air-conduction sound generated by the sheath part 38024*b* and the cartilage conduction unit 38024, sound is more likely to leak in the ambience.

A third difference of the one-hundred thirty-second embodiment from the one-hundred thirtieth embodiment is that, as will be clear from FIG. 210(C), at an entrance part of the inner passage hole 36024*a* and the outer passage hole 36024*c* respectively, protective meshes 38024*u* and 38024*v* are provided. This makes it possible, without preventing passage of outside sound, to prevent entry of foreign matter into the cavity in the cartilage conduction unit 38024 and the resulting inconveniences such as failure of the vibration plate 38027 etc. As will be clear from FIG. 210(A), the protective mesh 38024*u* is visible from outside. In a case where the outer passage hole 36024*c* is sufficiently small, the protective mesh 38024*v* may be omitted. With a configuration in which a protective mesh 38024*u* is provided at the inner passage hole 38024*a* to protect the cavity in the cartilage conduction unit 38024, the inner passage hole 36024*a* can be given a diameter larger than that of the vibration plate 38027; for example, a bullhorn-like shape can be adopted to effectively direct the air-conduction sound from the vibration plate 38027 to the earhole.

A structure in which a protective mesh is provided at an entrance part of a passage hole is not limited to the one-hundred thirty-second embodiment; a protective mesh may be provided in the one-hundred thirtieth and one-hundred thirty-first embodiments described previously, and also in any of the embodiments described later. In that case, if the cartilage conduction unit is formed of an elastic member, the protective mesh too is given an elastic structure.

(One-hundred Thirty-third Embodiment)

FIG. 211 is a schematic diagram of a one-hundred thirty-third embodiment according to one aspect of the present invention, which is configured as stereo earphones. FIGS. 211(A) to (C) showing the one-hundred thirty-third embodiment have very much in common with FIGS. 208(A) to (C) showing the one-hundred thirtieth embodiment; therefore, common parts are identified by the same reference numerals, and no overlapping description will be repeated unless necessary.

A first difference of the one-hundred thirty-third embodiment in FIG. 211 from the one-hundred thirtieth embodiment in FIG. 208 is that, as shown in FIGS. 211(B) and (C), an upper end part of the piezoelectric bimorph element 39025 is supported on (without penetrating) the connection part 39024*h* of the cartilage conduction unit 39024, which is an elastic member, and in addition a lower end part of the piezoelectric bimorph element 39025 is supported on the inner side of a lower end part of the sheath part 39024*b*. While anchoring the lower end part of the piezoelectric bimorph element 39025 results in different vibration characteristics, the upper end part now has a steady fulcrum for vibration; this increases the amplitude of the cartilage conduction unit 39024.

A second difference of the one-hundred thirty-third embodiment in FIG. 211 from the one-hundred thirtieth embodiment in FIG. 208 is that, as shown in FIGS. 211(B) and (C), a part of the sheath part 39024*b* constitutes an extension part 39024*w* which penetrates the cartilage conduction unit 39024 upward, and the vibration plate 39027 is supported on the extension part 39024*w*. Supporting a lower end part of the piezoelectric bimorph element 39025 permits the vibration of the sheath part 39024*b* to conduct; this is exploited to make the vibration plate 39027 vibrate inside the cavity in the cartilage conduction unit 39024; the air-conduction sound generated as a result helps augment high-register sound.

In the one-hundred thirtieth to one-hundred thirty-third embodiments, a piezoelectric bimorph element is used as a vibration source for the cartilage conduction unit and the vibration plate. However, the vibration source is not limited to a piezoelectric bimorph element; instead, an electromagnetic vibrating element such as the electromagnetic vibrating element 4324*a* in the forty-eighth embodiment in FIG. 73 may be adopted and arranged in the cavity in the cartilage conduction unit. In that case, as in the one-hundred twenty-fifth embodiment in FIG. 201, of a pair of members constituting an electromagnetic vibrating element that vibrate relative to each other, one (e.g., the part constituting the voice coil bobbin 4324*k* in FIG. 73) is used to make the vibration plate vibrate, and the other (e.g., the part constituting the yoke 4324*h* in FIG. 73), which receives a reaction from the former, is held inside the cavity in the cartilage conduction unit to obtain cartilage conduction. Also in a case where an electromagnetic vibrating element is adopted as a vibration source, a gap is secured between the electromagnetic vibrating element and the inner wall of the cavity in the cartilage conduction unit so as not to prevent the outside sound that has entered through the outer passage hole from passing through the inner passage hole into the earhole.

The various features of the present invention in the embodiments described above are not limited to those specific embodiments; they can be implemented in any other embodiment so long as they provide their advantages. Features from different embodiments can be combined into a single embodiment. For example, the protective mesh in the one-hundred thirty-second embodiment in FIG. 210 can be adopted in the one-hundred twenty-fourth to one-hundred twenty-seventh embodiments shown in FIGS. 198 to 203. A configuration in which, as in the one-hundred thirty-second embodiment in FIG. 210, the cartilage conduction unit is formed of a hard material can be adopted also, for example, the one-hundred thirtieth embodiment in FIG. 208. However, in the one-hundred thirtieth embodiment, which is so configured that the vibration of the piezoelectric bimorph element is not conducted to the sheath part, a layer of a vibration insulating material, like the elastic body 5165*a* adopted in the fifty-fifth embodiment in FIG. 83, is interposed between the cartilage conduction unit and the sheath part.

(One-hundred Thirty-fourth Embodiment)

FIG. 212 is a system configuration diagram of a one-hundred thirty-fourth embodiment according to one aspect of the present invention. The one-hundred thirty-fourth embodiment is configured as a mobile telephone system comprising a mobile telephone 35601 and a wrist watch-type handset 40001, and the two can communicate with each other by near-field communication using a radio wave 6585 of a communication system such as Bluetooth™. The mobile telephone system of the one-hundred thirty-fourth embodiment has much in common with the one-hundred twenty-eighth embodiment in FIG. 204; therefore, common parts are identified by the same reference numerals as in FIG. 204, and no overlapping description will be repeated unless necessary.

In the one-hundred thirty-fourth embodiment shown in FIG. 212, the wrist watch-type handset 40001 includes a watch body 40001*a* and a belt part 40001*b*. The watch body 40001*a* includes a watch display unit 40005, which displays time in an ordinary fashion and also displays various kinds of information as will be described later. The watch display unit 40005 includes a variable-directivity microphone 40023, which will be described later, and a speaker 40013. Thus, even with the mobile telephone 35601 put in a pocket for instance, near-field communication with the mobile telephone 35601 permits a user to conduct a call while viewing the wrist watch-type handset 40001. The watch display unit 40005 further includes a camera unit 40017, which can shoot the face of the user himself viewing the watch display unit 40005, while the face of the person at the other side is displayed on the watch display unit 40005. Thus, user can conduct a videophone session. In a videophone session, the directivity of the variable-directivity microphone 40023 is so set as to collect sound from in front of the watch display unit 40005.

The watch display unit 40005 further includes a display-side cartilage conduction unit 40024*a*, which conducts vibration for cartilage conduction to the surface of the watch display unit 40005. Thus, by putting the watch display unit 40005 on an ear in a posture as will be described later, a user can hear sound from the other side by cartilage conduction. At this time, the directivity of the variable-directivity microphone 40023 is so switched as to collect sound from the direction of the elbow of the arm (typically, the left arm) on which the wrist watch-type handset 40001 is worn, and thus the user can conduct a call in the posture described later. The variable-directivity microphone 40023 achieves the switching of directivity with a configuration as in the one-hundred sixth embodiment in FIG. 176.

On the other hand, the belt part 40001*b* includes a belt-side cartilage conduction unit 40024*b*, which conducts vibration for cartilage conduction to the entire belt part 40001*b*. Thus, by putting the belt part 40001*b* to an ear in another posture as will be described later, the user can hear sound from the other side by cartilage conduction, and can conduct a call in a similar manner as described above. Vibration conducts from the belt part 40001*b* to the wrist, and thus even without putting the belt part 40001*b* directly on the ear, by putting the hand to which the vibration conducts (such as the palm or the forefinger) on the ear cartilage, the user can hear the other side by cartilage conduction. Along the belt part 40001*b*, an antenna 6545*a* of the near-field communication unit is provided so as to be wound around the wrist.

FIG. 213 shows screens that are displayed on the watch display unit 40005 in the one-hundred thirty-fourth embodiment shown in FIG. 212 to present explanations of postures for conducting a call. These screens are displayed every time the power switch of the wrist watch-type handset 40001 is turned on; if this is annoying, a setting is also possible such that their display is skipped. FIG. 213(A) shows a posture for a videophone session, explaining a posture in which a user can conduct a videophone session while viewing the watch display unit 40005 with the wrist watch-type handset 40001 put in a pocket for instance.

FIG. 213(B) illustrates a posture for a cartilage conduction call, showing a posture in which a user raises the arm on which he is wearing the wrist watch-type handset 40001 across the face to put the watch display unit 40005 on the ear on the opposite side. In FIG. 213(B), the user is wearing the wrist watch-type handset 40001 on his left arm, and thus puts the watch display unit 40005 on the right ear. In this call-conducting posture, vibration conducts from the inner passage hole 36024*a* to the ear cartilage, and thus the user can hear sound from the other side by satisfactory cartilage conduction; the user can also deliver his voice, which is collected by the variable-directivity microphone 40023 having its directivity so switched as to collect sound from the direction of the elbow, to the other side. Taking this posture turns off the camera unit 40017, the speaker 40013, and the watch display unit 40005. The automatic turning-off here is achieved by an acceleration sensor 40049 (see FIG. 215) detecting the postures shown in FIGS. 213(A) and (B).

FIG. 214 shows screens presenting explanations of other call-conducting postures that are displayed on the watch display unit 40005 in a similar manner as those in FIG. 213. FIG. 214(A) shows a posture which results from the user rotating the wrist by 90 degrees from the posture in FIG. 213(B) to bring up the watch display unit 40005 and in which the user puts the belt part 40001*b* to the ear. In this posture, the watch display unit 40005 does not touch the ear, and thus its surface is saved from being soiled with sebum or the like. In this posture, vibration conducts from the sheath part 36024*b* to the ear cartilage. In a similar manner as described above, the voice of the user himself is collected by the variable-directivity microphone 40023 that has its directivity so switched as to collect sound from the direction of the elbow.

FIG. 214(B) shows a call-conducting posture in which a user puts one arm, as if a pillow, behind the head and in which the user puts the palm side of the belt part 40001*b* on the ear on the same side as the arm on which he is wearing the wrist watch-type handset 40001 (in the diagram, the left arm on the left ear). In this posture, vibration conducts from the belt-side cartilage conduction unit 40024*b* via the belt part 40001*b* to the ear cartilage. In a similar manner as described above, the voice of the user himself is collected by the variable-directivity microphone 40023 that has its directivity so switched as to collect sound from the direction of the elbow.

FIG. 214(C) shows a call-conducting posture in which, at the ear on the same side as the hand on which a user is wearing the wrist watch-type handset 40001, the hand (in the diagram, the forefinger) is put on the ear cartilage (in the diagram, the user puts the forefinger on the tragus to stop the earhole so that the external auditory meatus is closed). In this posture, vibration conducts from the belt-side cartilage conduction unit 40024*b* via the belt part 40001*b* to the wrist and then to the ear cartilage. In a similar manner as described above, the voice of the user himself is collected by the variable-directivity microphone 40023 that has its directivity so switched as to collect sound from the direction of the elbow.

The diagrams illustrating call-conducting postures in FIGS. 213 and 214 are not only displayed on the watch display unit 40005 as described above, but can also be offered to users, along with the wrist watch-type handset 40001 as a commercial product, in a form shown in an instruction manual attached to the wrist watch-type handset 40001 when this is marketed as a commercial product, or in a form distributed via a medium for advertising the wrist watch-type handset 40001. Accordingly, these distinctive methods of use which are offered along with the wrist watch-type handset 40001 also constitute part of the present invention.

FIG. 215 is a system block diagram of the one-hundred thirty-fourth embodiment shown in FIGS. 212 to 214. FIG. 215 has much in common with FIG. 205 showing the one-hundred twenty-eighth embodiment; therefore, common parts are identified by the same reference numerals, and no overlapping description will be repeated unless necessary. Likewise, such parts as are shown also in FIG. 212 in connection with the one-hundred thirty-fourth embodiment are identified by the same reference numerals, and no overlapping description will be repeated unless necessary.

As shown in FIG. 215, the wrist watch-type handset 40001 of the one-hundred thirty-fourth embodiment includes a watch function unit 35039 for the ordinary watch function. An acceleration sensor 40049 detects upward movement of the wrist watch-type handset 40001 from (A) to (B) in FIG. 213, and downward movement of the wrist watch-type handset 40001 from (B) to (A) in FIG. 213, to automatically switch the camera unit 40017, the speaker 40013, and the watch display unit 40005.

A power supply unit 6548 of the wrist watch-type handset 40001 and a power supply unit 1448 of the mobile telephone 35601 are both capable of contactless charging via contactless charging units 6548*a* and 1448*a* respectively. They share information about each other's charging status by near-field communication to secure coordination between the wrist watch-type handset 40001 and the mobile telephone 35601. Moreover, a GPS unit 40038 detects the movement of the user who is wearing the wrist watch-type handset 40001, and every time it does, it checks whether or not the wrist watch-type handset 40001 is left behind without being carried around, in order to secure coordination between the wrist watch-type handset 40001 and the mobile telephone 35601. Specifically, the GPS unit 40038 checks whether or not the user moves out of the near-field communication range.

A drive unit 35036 drives both a display-side cartilage conduction unit 40024*a* and a belt-side cartilage conduction unit 40024*b* to cope with either hearing posture. A configuration is also possible which permits switching such that only one of the display-side cartilage conduction unit 40024*a* and the belt-side cartilage conduction unit 40024*b* vibrates, by finely discriminating postures, or by manual operation. In response to an instruction from a control unit 40039, a sound processing unit 40040 switches between vibration generation for cartilage conduction by the drive unit 35036 and air-conduction sound generation by the speaker 40013. In response to an instruction from the control unit 40039 via the sound processing unit 40040, the variable-directivity microphone 40023 switches its directivity.

An incoming-call vibrator 6525 is provided in the belt part 40001*b*; instead, the vibration of the belt-side cartilage conduction unit 40024*b* can be used to obtain a configuration that does not require a separate vibration source.

FIG. 216 is a flow chart showing the function of the control unit 40039 of the wrist watch-type handset 40001 of the one-hundred thirty-fourth embodiment. The flow in FIG. 216 focuses on operation for functions related to cartilage conduction, and in reality the wrist watch-type handset 40001 involves operation of the control unit 40039 other than that shown in the flow in FIG. 216, for ordinary wrist watch functions among others. The control unit 40039 can additionally perform any of the functions described in connection with other various handsets, but these functions too are omitted from illustration and description to avoid complication.

The flow in FIG. 216 starts when the main power to the wrist watch-type handset 40001 is turned on. In Step S862, a start-up procedure is gone through, checks are made on the functions of different blocks, and ordinary watch display is started on the watch display unit 40005. Next, in Step S864, the methods of use shown in FIGS. 213 and 214 are displayed in a slide show. On completion of the explanation of the methods of use, then, in Step S866, whether or not the GPS unit 40038 has detected user movement is checked.

If no user movement has been detected, then, in Step S868, it is checked whether or not a scheduled time (e.g., once every five seconds) has arrived at which to secure coordination between the wrist watch-type handset 40001 and the mobile telephone 35601. If so, the flow advances to Step S870. On the other hand, if, in Step S866, the GPS unit 40038 has detected user movement, the flow advances directly to Step S870. In Step S870, whether or not the mobile telephone 35601 has moved out of the near-field communication range is checked, and if it is inside the near-field communication range, the flow advances to Step S872. In Step S872, near-field communication is conducted with the mobile telephone 35601 to check the power status of the wrist watch-type handset 40001 which is steadily displayed on the watch display unit 40005 and to transmit the result to the mobile telephone 35601. The transmitted information is displayed on the large-screen display unit 205 of the mobile telephone 35601. Then, in Step S874, information about the power status of the mobile telephone 35601 is received by near-field communication, and the result is displayed on the watch display unit 40005, the flow then advancing to Step S876. On the other hand, if, in Step S868, a scheduled time has not yet arrived, the flow advances directly to Step S876.

In Step S876, by near-field communication, it is checked whether or not the mobile telephone 35601 has received an incoming call, or whether or not the other side has responded to a call originating operation on the operation unit 6509 of the wrist watch-type handset 40001. If either is the case, it means that the mobile telephone 35601 has started to conduct a call with the other side; thus, then, in Step S878, the displaying of the other side's face on the watch display unit 40005, the shooting of the user's own face by the camera unit 40017, and the generation of air-conduction sound by the speaker 40013 are all turned on, and the directivity of the variable-directivity microphone 40023 is set to frontward of the watch display unit 40005, the flow then advancing to Step S880. At this time, the display-side cartilage conduction unit 40024*a* and the belt-side cartilage conduction unit 40024*b* are off. In this way, when a call is started, first, a videophone mode is in effect. If the call is not for a videophone session but for a sound-only session, out of what has been mentioned just above, the displaying of the other side's face and the turning-on of the camera unit 40017 are omitted.

In Step S880, it is checked whether or not the acceleration sensor 40049 detects upward movement of the wrist watch-type handset 40001 from (A) to (B) in FIG. 213. If such movement is detected, then, in Step S882, the displaying of the other side's face on the watch display unit 40005, the shooting of the user's own face by the camera unit 40017, and the generation of air-conduction sound by the speaker 40013 are all turned off, and instead the display-side cartilage conduction unit 40024*a* and the belt-side cartilage conduction unit 40024*b* are turned on. Moreover, the directivity of the variable-directivity microphone 40023 is set to toward the elbow, and the flow advances to Step S884.

In Step S884, it is checked whether or not the acceleration sensor 40049 detects downward movement of the wrist watch-type handset 40001 from (B) to (A) in FIG. 213. If such movement is detected, then, in Step S878, the videophone mode is restored. On the other hand, if, in Step S884, no downward movement is detected (typically, this state persists so long as a cartilage conduction call continues), then, in Step S886, whether or not the call has been disconnected is checked. If the call has not been disconnected, the flow returns to Step S880. Thereafter, until the call is detected having been disconnected in Step S886, Steps S878 through S886 are repeated so that change in posture is coped with by switching between a cartilage conduction call and a videophone call. On the other hand, if, in Step S886, the call is detected having been disconnected, the flow advances to Step S888. If, in Step S876, no call is detected having been started, the flow advances directly to Step S888.

In Step S888, it is checked whether or not a mobile telephone search operation has been performed on the operation unit 6509. This operation is performed when, for example, a user about to go out cannot find the mobile telephone 35601. When the operation is performed, then, in Step S890, communication is conducted with the mobile telephone 35601 by near-field communication so that an instruction signal is transmitted to the mobile telephone 35601 to make it sound a ringtone (or vibrate the vibrator). The flow then advances to Step S892.

On the other hand, if, in Step S870, the mobile telephone 35601 is detected having moved outside the near-field communication range, then, in Step S894, a warning indicating that the mobile telephone 35601 is not being carried around is displayed, and the flow then advances to Step S892. By various means as described above, coordination between the wrist watch-type handset 40001 and the mobile telephone 35601 is secured.

In Step S892, whether or not the main power to the wrist watch-type handset 40001 has been turned off is checked, and if not, then, back in Step S866, so long as thereafter the main power is not detected having been turned off, Steps S866 through Steps S892 are repeated. On the other hand, if, in Step S892, the main power is detected having been turned off, the flow ends.

The various features of the present invention in the embodiments described above are not limited to those specific embodiments; they can be implemented in any other embodiment so long as they provide their advantages. Features from different embodiments can be combined into a single embodiment. For example, the various means for coordination between the wrist watch-type handset 40001 and the mobile telephone 35601 shown in FIGS. 212 to 216 can be applied to a wrist watch-type handset 40001 that does not adopt cartilage conduction.

(One-hundred Thirty-fifth Embodiment)

FIG. 217 is a system configuration diagram of a one-hundred thirty-fifth embodiment according to one aspect of the present invention. The one-hundred thirty-fifth embodiment is configured as a mobile telephone system comprising a mobile telephone 35601 and an ID name tag-type handset 41001, and the two can communicate with each other by near-field communication using a radio wave 6585 of a communication system such as Bluetooth™. The mobile telephone system of the one-hundred thirty-fifth embodiment has much in common with the one-hundred thirty-fourth embodiment shown in FIG. 212; therefore, common parts are identified by the same reference numerals as in FIG. 212, and no overlapping description will be repeated unless necessary.

The ID name tag-type handset 41001 in the one-hundred thirty-fifth embodiment shown in FIG. 217 functions as a non-contact IC card which is used as an unlocking card for entry into a building, and simultaneously functions as a name tag that has, at the surface, an ID data display unit 41005, comprising a reflective liquid crystal display, on which a photo 41001*a* and the name 41001*b* of the owner are displayed. It is typically used in a form suspended from the neck via a neck strap 41001*c*. As shown in FIG. 217, what is displayed is upright as seen from a person present in front of the owner. As will be described later, what is displayed is inverted upside down when the owner himself views it.

The ID name tag-type handset 41001 further includes a speaker 41013, a microphone 41023, and a camera unit 41017; by near-field communication with the mobile telephone 35601, it functions as a videophone handset for the mobile telephone 35601. In that case, the face of the other side is displayed inverted upside down compared with in the case shown in FIG. 217. Use as a videophone terminal will be described in detail later.

The ID name tag-type handset 41001 further includes, in a corner part, a cartilage conduction unit 41024. With the cartilage conduction unit 41024 put in contact with the tragus, the ID name tag-type handset 41001 functions as a handset that allows calls by cartilage conduction as in other embodiments. For talk transmission, the variable-directivity microphone 41023, which is used in videophone calls, is shared. In the one-hundred thirty-fifth embodiment, the cartilage conduction unit 41024 is arranged in a bottom part of the ID name tag-type handset 41001 when this is suspended from the neck. This makes it easy to bring it up to put the cartilage conduction unit 41024 on the tragus, and when it is put on the tragus, it does not interfere with the neck strap 41001*c*.

The ID name tag-type handset 41001 further includes an incoming-call vibrator 6525, which, by near-field communication using a radio wave 6585 with the mobile telephone 35601, receives an incoming-call signal and vibrates. The neck strap 41001*c* is formed of a material with a good vibration-conducting property, and is connected to the incoming-call vibrator 6525. With this configuration, the vibration of the incoming-call vibrator 6525 conducts via the neck strap 41001*c* to the skin at the back of the neck, and thus a user can clearly feel an incoming call. The neck strap 41001*c* is tense under the weight of the ID name tag-type handset 41001, and thus it effectively conducts the vibration of the incoming-call vibrator 6525 to the neck.

FIG. 218 is an enlarged view of the ID name tag-type handset 41001 shown in FIG. 217; such parts as are shown also in FIG. 217 are identified by the same reference numerals, and no overlapping description will be repeated unless necessary. Like FIG. 217, FIG. 218(A) shows the ID name tag-type handset 41001 in a state suspended from the neck, where what is displayed is all upright as seen from a person present in front. Though omitted from illustration in FIG. 217, an operation unit 6509 permits the ID name tag-type handset 41001 to be turned on for power, switched and set in different ways, fed with input, and otherwise controlled.

In addition to what has been described in reference to FIG. 217, the ID data display unit 41005 has a charge status indicator 41001*d* for the battery of the ID name tag-type handset 41001. Moreover, the ID data display unit 41005 has a charge status indicator 41001*e* for the battery of the mobile telephone 35601 and an incoming-call mode indicator 41001*f* which indicates whether the mobile telephone 35601 is set to a ringtone mode or a vibration mode with respect to an incoming call. FIG. 218 shows a state where the ringtone mode is in effect. When the mobile telephone 35601 is set to the vibration mode, the incoming-call mode indicator 41001*f* changes to a heart-like icon as will be described later. The data to be displayed about the mobile telephone 35601 is transmitted from the mobile telephone 35601 by near-field communication. By showing various indications so that these are visible to a person present in front in this way, when the person notices the battery running out or the vibration mode not being in effect, he can warn the user.

FIG. 218(B) shows a state in which a user has brought up the ID name tag-type handset 41001 while flipping it toward himself so that the user himself can view it. At this time, the neck strap 41001*c* is brought down. In FIG. 218(B), it appears as if the components including the cartilage conduction unit 41024 are all rotated by 180 degrees parallel to the plane of the diagram from what is shown in FIG. 218(A), this is not the case. Whereas FIG. 218(A) shows a state as seen from a person present in front, FIG. 218(B) shows a state as seen from the owner. It is thus not that the ID name tag-type handset 41001 itself can be flipped by 180 degrees parallel to the ID data display unit 41005 when switched from the state in FIG. 218(A) to the state in FIG. 218(B).

For the reason stated above, if, for the sake of discussion, the owner brings up the ID name tag-type handset 41001 while flipping it toward himself with the display state in FIG. 218(A) maintained, what is displayed, including the owner's photo 41001*a* and name 41001*b*, is all displayed inverted. To avoid that, in the state in FIG. 208(B), each segment of what is displayed on the ID data display unit 41005 is rotated by 180 degrees and rearranged by image processing. As a result, even when the owner has brought up the ID name tag-type handset 41001 while flipping it toward himself so that the owner himself can view it, he can view what is displayed, including the owner's photo 41001*a* and name 41001*b*, upright, and can, while viewing the display, operate the operation unit 6509 to change settings or enter data.

FIG. 219 shows the ID name tag-type handset 41001 in a state where the owner himself is viewing it in a similar manner as in FIG. 218(B). Such parts as are shown also in FIG. 218(B) are identified by the same reference numerals, and no overlapping description will be repeated unless necessary. FIG. 219(A) shows a state where a mail message 41001*g* is being displayed. In FIG. 219(A), the mobile telephone 35601 has been set to the vibration mode, with the result that the incoming-call mode indicator 41001*f* has changed to a heart-like icon. FIG. 219(B) shows a state where the other side's face is being displayed in the videophone mode.

FIG. 220 is a system block diagram of the one-hundred thirty-fourth embodiment shown in FIGS. 212 to 214. FIG. 220 has much in common with FIG. 215, which is a system block diagram of the one-hundred thirty-fourth embodiment; therefore, common parts are identified by the same reference numerals as in FIG. 215, and no overlapping description will be repeated unless necessary. Likewise, such parts as are also shown in FIGS. 217 to 219 in connection with the one-hundred thirty-fifth embodiment are identified by the same reference numerals, and no overlapping description will be repeated unless necessary.

In FIG. 220, by communication via a card antenna 41001*j*, a non-contact IC card function unit 41001*i* makes the ID name tag-type handset 41001 function as a non-contact IC card. Thus, with a touch on a building entry authorization unit with the ID name tag-type handset 41001, the owner can unlock a lock or is otherwise authorized to enter a building. Also, via a near-field communication unit 6546, the non-contact IC card function unit 41001*i* can cooperate with the payment clearance function of the mobile telephone 35601 to make the ID name tag-type handset 41001 function as a payment clearance card. With a touch on a payment clearance unit with the ID name tag-type handset 41001, the owner can clear a payment or the like via the mobile telephone 35601.

In FIG. 220, a neck strap connection part 41001*k* is a part to which the neck strap 41001*c* for conducting incoming-call vibration to the neck is connected and to which the vibration of the incoming-call vibrator 6525 is conducted. Thus, the vibration conducted from the incoming-call vibrator 6525 to the neck strap connection part 41001*k* is then conducted to the neck strap 41001*c*, permitting the owner to feel an incoming call at the back of the neck.

Furthermore, in FIG. 220, an acceleration sensor 41049 detects gravitational acceleration; it discriminates whether the non-contact IC card function unit 41001*i* is in the position in FIG. 218(A) or in the position in FIG. 218(B) to invert what is displayed upside down and adjust its layout. The acceleration sensor 41049 also detects whether the non-contact IC card function unit 41001*i* is in the position in FIG. 218(A) and is being used as a videophone or is brought farther up to so that the cartilage conduction unit 41024 is put in contact with the tragus. Based on the output of the acceleration sensor 41049, the sound processing unit 41040 switches between generating air-conduction sound from the speaker 41013 based on an audio signal or vibrating the cartilage conduction unit 41024 via the drive unit 35036. The control unit 41039 controls the entire ID name tag-type handset 41001 including the above-described functions according to programs stored in the storage unit 6537.

FIG. 221 is a flow chart showing the function of the control unit 41039 of the ID name tag-type handset 41001 in the one-hundred thirty-fifth embodiment. The flow in FIG. 221 focuses on operation for functions related to cartilage conduction, and in reality the ID name tag-type handset 41001 involves operation of the control unit 41039 other than that shown in the flow in FIG. 221, for ordinary ID name tag functions among others. The control unit 41039 can additionally perform any of the functions described in connection with other various embodiments, but these functions too are omitted from illustration and description to avoid complication.

The flow in FIG. 221 starts when the main power to the ID name tag-type handset 41001 is turned on. In Step S902, a start-up procedure is gone through, checks are made on the functions of different blocks, and display of ID data (the photo 41001*a* and the name 41001*b*) is started on the ID data display unit 41005. Next, in Step S904, the top/bottom direction of each item of what is being displayed, such as the ID data, is set to that in the suspended state in FIG. 218(A). Then, in Step S906, the charge status indicator 41001*d* for the battery of the ID name tag-type handset 41001, the charge status indicator 41001*e* for the battery of the mobile telephone 35601, and the incoming-call mode indicator 41001*f* are displayed so as to be visible from a person present in front. The flow then advances to Step S908.

In Step S908, it is checked whether or not an incoming-call signal has been transmitted from the mobile telephone 35601 by near-field communication, and if so, then, in Step S910, the incoming-call vibrator 6525 is turned on. This causes vibration to conduct via the neck strap connection part 41001*k* to the neck strap 41001*c*, and the owner can feel the incoming call at the back of the neck. Next, in Step S912, it is checked whether or not an operation responding to the incoming call has been done on the operation unit 6509, or whether or not the other side has stopped originating the call and the incoming-call signal from the mobile telephone 35601 has ceased to be transmitted, is checked. If neither is the case, then, back in Step S910, so long as, in Step S912, neither state is thereafter detected, Steps S910 and S912 are repeated. On the other hand, if, in Step S912, either state is detected, then, in Step S914, the incoming-call vibrator 6525 is turned off, and the flow advances to Step S916. If, in Step S908, no incoming-call signal is detected, the flow advances directly to Step S916.

In Step S916, it is checked whether or not the acceleration sensor 40049 has detected a change in the state of the ID name tag-type handset 41001 from the state in FIG. 218(A) to the brought-up position in FIG. 2218(B). If the brought-up position is detected, then, in Step S918, the top/bottom direction of what is being displayed is changed from that in FIG. 218(A) to that for the brought-up state in FIG. 218(B), and the ID name tag-type handset 41001 is set to an ordinary call mode using the microphone 41023 and the speaker 41013, the flow then advancing to Step S920. In the ordinary call mode, the cartilage conduction unit 41024 is off. On the other hand, if, in Step S916, the brought-up position is not detected, the flow advances directly to Step S920.

In Step S920, based on the output of the acceleration sensor 40049, it is checked whether or not the ID name tag-type handset 41001 has been brought farther up from the state in FIG. 218(B) into a cartilage conduction position in which the cartilage conduction unit 41024 is put in contact with the tragus. If the cartilage conduction position is detected, then, in Step S922, the cartilage conduction unit 41024 is turned on and the speaker 41013 is turned off, the flow then advancing to Step S924. Moreover, in Step S922, if the backlight (not shown) for the reflective liquid crystal display provided in the ID data display unit 41005 is on, it is turned off. On the other hand, if, in Step S920, the cartilage conduction position is not detected, the flow advances directly to Step S924.

In Step S924, it is checked whether or not the acceleration sensor 40049 has detected a return to the suspended position in FIG. 218(A). If the suspended position is detected, then, in Step S926, the top/bottom direction of what is being displayed is changed from that in FIG. 218(B) to that in the suspended position in FIG. 218(A), and the ID name tag-type handset 41001 is set to the ordinary call mode using the microphone 41023 and the speaker 41013, the flow then advancing to Step S928. On the other hand, if, in Step S924, the suspended state is not detected, the flow advances directly to Step S928.

In Step S928, it is checked whether or not a touch with the ID name tag-type handset 41001 has been made on a building entry authorization unit or on a payment clearance unit. If so, then, in Step S930, the corresponding process is performed according to the above-described functions of the non-contact IC card function unit 41001*i*, and the flow advances to Step S932. On the other hand, if, in Step S928, no touch is detected on a building entry authorization unit or on a payment clearance unit, the flow advances directly to Step S932.

In Step S932, whether or not the main power to the ID name tag-type handset 41001 has been turned off is checked, and if not, back in Step S908, so long as the main power is thereafter detected having been turned off, Steps S908 through S932 are repeated. In this way, although having the functions of a handset and a non-contact IC card, the ID name tag-type handset 41001 ordinarily functions as an ID name tag suspended from the neck, continuing to display the photo 41001*a* and the name 41001*b* on the ID data display unit 41005.

The various features of the present invention in the embodiments described above are not limited to those specific embodiments; they can be implemented in any other embodiment so long as they provide their advantages. Features from different embodiments can be combined into a single embodiment. For example, although the embodiment shown in FIGS. 217 to 221 is configured as a handset that is coordinated with a mobile telephone, its features can be applied to a name tag, or a non-contact IC card, with no handset capabilities.

(One-hundred Thirty-sixth Embodiment)

FIG. 222 comprises a perspective view and sectional views of a one-hundred thirty-sixth embodiment according to one aspect of the present invention, which is configured as a mobile telephone 42001. The one-hundred thirty-sixth embodiment has much in common with the one-hundred seventh embodiment in FIG. 178 (described with complementary reference to the eighty-eighth embodiment in FIG. 136); therefore, common parts are identified by the same reference numerals, and no overlapping description will be repeated unless necessary. As in the one-hundred seventh embodiment, FIG. 222(A) is a front perspective view of the one-hundred thirty-sixth embodiment. The mobile telephone 42001 has a casing that is composed of a metal frame held between a front plate 8201*a* made of plastic or the like and a back plate 8201*b* formed of plastic. The metal frame divides into a top frame 8227, a right frame 8201*c*, a bottom frame 8201*d*, and a left frame 8201*e* (not shown in FIG. 222(A)), and insulating members 42001*f* are inserted between every two adjacent ones of them. In this configuration, the front plate 8201*a*, the back plate 8201*b*, and the top frame 8227 constitute a casing top face portion.

The outer sides of opposite corner parts of the top frame 8227 are coated by, by bonding thereto of, a right-ear cartilage conduction unit 42024 and a left-ear cartilage conduction unit 42026, and the top face of the top frame 8227 is coated by, by bonding thereto of, a linking unit 42027, which links together the right-ear cartilage conduction unit 42024 and the left-ear cartilage conduction unit 42026. The right-ear cartilage conduction unit 42024, the left-ear cartilage conduction unit 42026, and the linking unit 42027 are made of an elastic member having an acoustic impedance close to that of the ear cartilage. The front plate 8201*a*, the back plate 8201*b*, and the top frame 8227 have a different acoustic impedance from the right-ear cartilage conduction unit 42024, the left-ear cartilage conduction unit 42026 and the linking unit 42027, so that it is difficult for the vibration of the latter three to conduct to the former three.

Figure 222C:
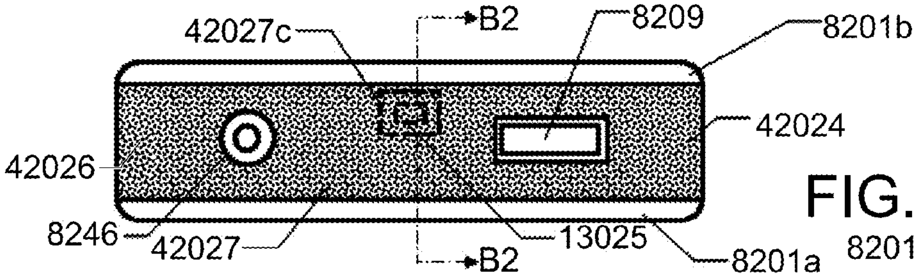
Figure 222D:
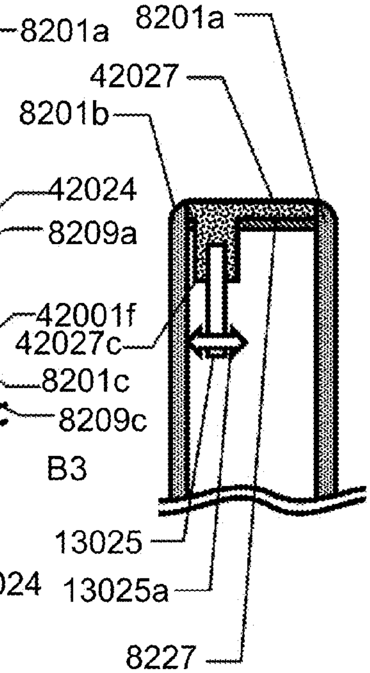
Figure 222B:
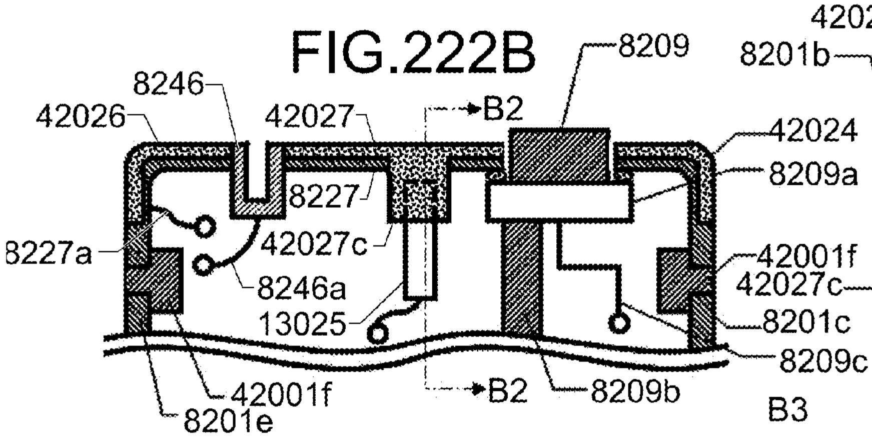
Figure 222A:
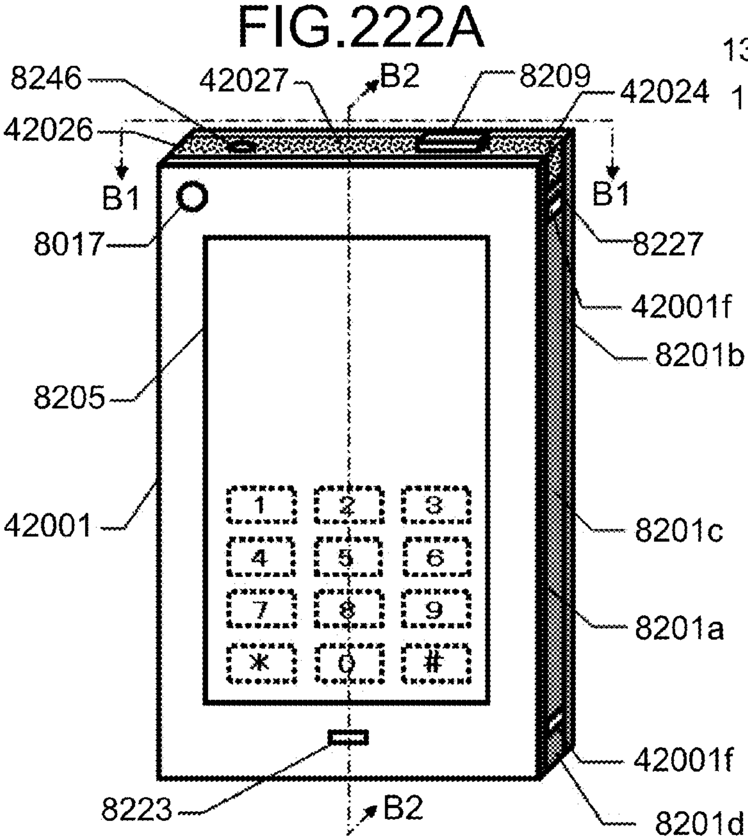

FIG. 222(B) is a sectional view along line B1-B1 in FIG. 222(A); common parts are identified by the same reference numerals, and no overlapping description will be repeated unless necessary. As will be clear from FIG. 222(B), on the bottom of the linking unit 42027, an extension part 42027*c* is provided which penetrates through an opening in the top frame 8227 into the mobile telephone 42001. One, upper, end of a piezoelectric bimorph element 13025 is inserted into the extension part 42027*c* so as to be supported at one end (in a cantilever fashion). This permits the other, lower, end of the piezoelectric bimorph element 13025 to vibrate freely, and a reaction is transmitted to the extension part 42027*c*. The extension part 42027*c* is molded integrally with, with the same elastic member as, the linking unit 42027, and thus its vibration is efficiently transmitted via the linking unit 42027 to each of the right-ear cartilage conduction unit 42024 and the left-ear cartilage conduction unit 42026. The vibration direction is perpendicular to the front plate 8201*a* (perpendicular to the plane of FIG. 222).

With the configuration described above, by putting the right-ear cartilage conduction unit 42024 or the left-ear cartilage conduction unit 42026 in contact with the ear cartilage, it is possible to obtain satisfactory cartilage conduction. As described above, the piezoelectric bimorph element 13025 is supported only by the extension part 42027*c*, which has an acoustic impedance close to that of the ear cartilage, and vibration is transmitted via the linking unit 42027, which is molded integrally with the extension part 42027*c*, to the right-ear cartilage conduction unit 42024 or the left-ear cartilage conduction unit 42026 and then to the ear cartilage. This achieves efficient cartilage conduction. On the other hand, the piezoelectric bimorph element 13025 does not make contact with the top frame 8227, the front plate 8201*a*, or the back plate 8201*b*, and thus vibration does not conducts directly to these. Moreover, the top frame 8227, the front plate 8201*a*, and the back plate 8201*b* have a different acoustic impedance from the elastic member forming the right-ear cartilage conduction unit 42024 and the left-ear cartilage conduction unit 42026, and thus the vibration of the elastic member is shut out. With these features, the generation of air-conduction sound by the vibration of the front plate 8201*a* and the back plate 8201*b* is suppressed. Furthermore, the linking unit 42027, the right-ear cartilage conduction unit 42024, and the left-ear cartilage conduction unit 42026 are bonded to the top frame 8227, and thus vibration in the direction perpendicular to their surfaces is suppressed. Thus, also the generation of air-conduction sound from the linking unit 42027, the right-ear cartilage conduction unit 42024, and the left-ear cartilage conduction unit 42026 themselves is suppressed.

Moreover, the outer sides of the opposite corner parts of the top frame 8227 are coated by the elastic members forming the right-ear cartilage conduction unit 42024 and the left-ear cartilage conduction unit 42026 respectively, and thus those two corner parts are protected from impact when the mobile telephone 42001 is dropped. Furthermore, the piezoelectric bimorph element 13025 is supported only by an elastic member, which thus serves as a shock-absorbing member and protects the piezoelectric bimorph element 13025 from destruction by impact such as when the mobile telephone 42001 is dropped.

In FIG. 222(B), which is a sectional view along line B1-B1 in FIG. 222(A), it appears as if the linking unit 42027 is divided by an external earphone jack 8246 and a power switch 8209; in FIG. 222(C), which is a top view of FIG. 222(A), it is seen that the right-ear cartilage conduction unit 42024, the left-ear cartilage conduction unit 42026, and the linking unit 42027 are formed continuously and integrally out of the elastic member. In FIG. 222(C), the extension part 42027*c* and the piezoelectric bimorph element 13025 inserted into it, which are both housed inside, are indicated by broken lines.

FIG. 222(D), which is a sectional view along line B2-B2 shown in FIGS. 222(A) to 222(C), shows that the extension part 42027*c* is integral with the linking unit 42027, and that the free end of the piezoelectric bimorph element 13025 inserted in it vibrates in the direction perpendicular to the front plate 8201*a* as indicated by arrows 13025*a*. Moreover, in FIG. 222(D), it is seen that the free end of the piezoelectric bimorph element 13025 vibrates without making contact with other than the extension part 42027*c*, and that a reaction of the vibration conducts via the extension part 42027*c* only to the linking unit 42027.

(One-hundred Thirty-seventh Embodiment)

FIG. 223 comprises sectional views of a one-hundred thirty-seventh embodiment according to one aspect of the present invention and a modified example thereof, which is configured as a mobile telephone 43001 and a mobile telephone 44001 respectively. The one-hundred thirty-seventh embodiment and its modified example have much in common with one-hundred thirty-sixth embodiment in FIG. 222; therefore, common parts are identified by the same reference numerals, and no overlapping description will be repeated unless necessary. In exterior appearance, the one-hundred thirty-seventh embodiment is no different from the one-hundred thirty-sixth embodiment; therefore, in this aspect, FIG. 222(A) is to be referred to for a complement, and FIG. 223 comprises no perspective view. The one-hundred thirty-seventh embodiment in FIG. 223 differs from the one-hundred thirty-sixth embodiment in FIG. 222 in that, whereas in the one-hundred thirty-sixth embodiment the piezoelectric bimorph element 13025 is arranged vertically, in the one-hundred thirty-seventh embodiment or its modified example, a piezoelectric bimorph element 43025 or 44025, respectively, is arranged horizontally.

FIG. 223(A) corresponds to a sectional view of the one-hundred thirty-seventh embodiment along line B1-B1 in FIG. 222(A). As will be clear from FIG. 223(A), also in the one-hundred thirty-seventh embodiment, under a linking unit 43027 which links together a right-ear cartilage conduction unit 43024 and a left-ear cartilage conduction unit 43026, there is provided an extension part 43027*c* which penetrates through a hole provided in a top frame 8227 into the mobile telephone 43001. However, the piezoelectric bimorph element 43025 is arranged horizontally, and has one, right, end thereof inserted in the extension part 43027*c* so that the piezoelectric bimorph element 43025 is supported at one end. Thus, the other end, i.e., the left end in the drawing, of the piezoelectric bimorph element 43025 vibrates freely, and a reaction is conducted via the extension part 43027*c* and then via the linking unit 43027 to each of the right-ear cartilage conduction unit 43024 and the left-ear cartilage conduction unit 43026. As in the one-hundred thirty-sixth embodiment, the vibration direction is perpendicular to the front plate 8201*a* (perpendicular to the plane of FIG. 223(A).

In FIG. 223(B), which corresponds to a top view of FIG. 222(A) (showing the one-hundred thirty-sixth embodiment referred to for a complement), it is seen that, in the one-hundred thirty-seventh embodiment, as in the one-hundred thirty-sixth embodiment, the right-ear cartilage conduction unit 43024, the left-ear cartilage conduction unit 43026, and the linking unit 43027 are molded continuously and integrally out of an elastic member. Moreover, as in FIG. 222(C), in FIG. 223(B), the extension part 43027*c* and the piezoelectric bimorph element 43025 inserted in it horizontally, which are housed inside, are indicated by broken lines. In FIG. 223(C), which is a sectional view along line B2-B2 shown in FIGS. 223(A) and 223(B), it is seen that, as in the one-hundred thirty-sixth embodiment, in the one-hundred thirty-seventh embodiment, the extension part 43027*c* is integral with the linking unit 43027.

As in the one-hundred thirty-sixth embodiment, also in the one-hundred thirty-seventh embodiment, the piezoelectric bimorph element 43025 is supported only by the extension part 43027*c*, and vibration is conducted via the linking unit 43027 formed integrally with it to the right-ear cartilage conduction unit 43024 or the left-ear cartilage conduction unit 43026 and then to the ear cartilage. This achieves efficient cartilage conduction. Moreover, vibration does not conduct from the piezoelectric bimorph element 43025 directly to the top frame 8227, the front plate 8201*a*, and the back plate 8201*b*. In addition, owing to a difference in acoustic impedance, the vibration of the elastic member is shut out from the top frame 8227, the front plate 8201*a*, and the back plate 8201*b*, and this suppresses generation of air-conduction sound by the vibration of the front plate 8201*a* and the back plate 8201*b*. Moreover, owing to the bonding to the top frame 8227, generation of air-conduction sound from the linking unit 43027, the right-ear cartilage conduction unit 43024, and the left-ear cartilage conduction unit 43026 themselves is suppressed. Owing to the coating by the elastic member constituting the right-ear cartilage conduction unit 43024 and the left-ear cartilage conduction unit 43026, the two corner parts are protected from impact when the mobile telephone 43001 is dropped, and owing to the shock absorbing property of the elastic member, the piezoelectric bimorph element 43025 is prevented from destruction as when the mobile telephone 43001 is dropped.

FIGS. 223(D) to 223(F) show a modified example of the one-hundred thirty-seventh embodiment. FIG. 223(D) corresponds to a sectional view along line B1-B1 in FIG. 222(A) (showing the one-hundred thirty-sixth embodiment referred to for a complement). As shown in FIG. 223(D), in the modified example, at equal distances from the mid point between the right-ear cartilage conduction unit 44024 and the left-ear cartilage conduction unit 44026, two extension parts 44027*e* and 44027*f* are provided which extend from the linking unit 44027 through two openings formed in the top frame 8227 into the mobile telephone 44001. The piezoelectric bimorph element 44025 is arranged horizontally, and is here supported at both ends by being inserted in the two extension parts 44027*e* and 44027*f* from inward, instead of being supported at one end as in the one-hundred thirty-seventh embodiment. This type of support can be achieved, for example, by inserting opposite ends of the piezoelectric bimorph element 44025 into the extension parts 44027*e* and 44027*f* while the interval between these is being widened by exploiting their elasticity. With the piezoelectric bimorph element 44025 supported at opposite ends in this way, a middle part thereof vibrates freely, and a reaction is conducted via the extension parts 44027*e* and 44027*f* and then via the linking unit 44027 to each of the right-ear cartilage conduction unit 44024 and the left-ear cartilage conduction unit 44026. As in the one-hundred thirty-seventh embodiment, the vibration direction is perpendicular to the front plate 8201*a* (perpendicular to the plane of FIG. 223(D)).

In FIG. 223(E), which corresponds to a top view of FIG. 222(A) (showing the one-hundred thirty-sixth embodiment referred to for a complement), it is seen that, also in the modified example of the one-hundred thirty-seventh embodiment, as in the one-hundred thirty-seventh embodiment in FIG. 223(A), the right-ear cartilage conduction unit 44024, the left-ear cartilage conduction unit 44026, and the linking unit 44027 are molded continuously and integrally out of an elastic member. Moreover, as in FIG. 223(B), also in FIG. 223(E), the two extension parts 44027*e* and 44027*f* and the piezoelectric bimorph element 44025 supported horizontally by being held between them, which are all housed inside, are indicated by broken lines. In FIG. 223(F), which is a sectional view along line B2-B2 shown in FIGS. 223(D) and 223(E), it is seen that, as in the one-hundred thirty-seventh embodiment, also in its modified example, the extension part 44027*f* is integral with the linking unit 44027.

Also in the modified example of the one-hundred thirty-seventh embodiment, the piezoelectric bimorph element 44025 is supported only by the two extension parts 44027*e* and 44027*f*, and vibration is conducted via the linking unit 44027 formed integrally with them to the right-ear cartilage conduction unit 44024 or the left-ear cartilage conduction unit 44026 and then to the ear cartilage. Thus, efficient cartilage conduction is achieved likewise. Also achieved likewise are suppression of generation of air-conduction sound by the vibration of the front plate 8201*a* and the back plate 8201*b*, and suppression of generation of air-conduction sound from the linking unit 44027, the right-ear cartilage conduction unit 44024, and the left-ear cartilage conduction unit 44026 themselves. Further achieved likewise are, in case the mobile telephone 44001 is dropped, protection of the two corner parts by the elastic member, and protection of the piezoelectric bimorph element 44025 itself by the elastic member's shock-absorbing property.

(One-hundred Thirty-eighth Embodiment)

FIG. 224 comprises a perspective view and sectional views of a one-hundred thirty-eighth embodiment according to one aspect of the present invention, which is configured as a mobile telephone 45001. The one-hundred thirty-eighth embodiment has much in common with the one-hundred thirty-sixth embodiment in FIG. 222; therefore, common parts are identified by the same reference numerals, and no overlapping description will be repeated unless necessary. A first difference of the one-hundred thirty-eighth embodiment in FIG. 224 from the one-hundred thirty-sixth embodiment in FIG. 222 is that, whereas in the one-hundred thirty-sixth embodiment, the piezoelectric bimorph element 13025 is supported vertically at one end, in the one-hundred thirty-eighth embodiment, the piezoelectric bimorph element 45025 is entirely bonded horizontally. A second difference is that a cartilage conduction unit is arranged so as to cover opposite corner parts of the top face of the mobile telephone 45001. A specific description follows.

Like FIG. 222(A) showing the one-hundred thirty-sixth embodiment, FIG. 224(A) is a front perspective view of the one-hundred thirty-eighth embodiment. The following description focuses on features that are different from the one-hundred thirty-sixth embodiment. The top face, front and rear faces, and side faces of opposite top corner parts of the mobile telephone 45001 (parts of the front plate 8201*a*, back plate 8201*b*, and top frame 8227 corresponding to those corners) are entirely covered by a right-ear cartilage conduction unit 45024 and a left-ear cartilage conduction unit 45026 respectively. The so shaped right-ear and left-ear cartilage conduction units 45024 and 45026 respectively coat the opposite top corner parts of the mobile telephone 45001 by being bonded to them. The top face of the top frame 8227 is coated by a linking unit 45027 which links together the right-ear and left-ear cartilage conduction units 45024 and 45026 as described above. As in the one-hundred thirty-sixth embodiment, also in the one-hundred thirty-eighth embodiment, the right-ear cartilage conduction unit 45024, the left-ear cartilage conduction unit 45026, and the linking unit 45027 are molded integrally out of an elastic member having an acoustic impedance similar to that of the ear cartilage.

FIG. 224(B) corresponds to a sectional view along line B1-B1 in FIG. 224(A). As will be clear from FIG. 224(B), also in the one-hundred thirty-eighth embodiment, on the bottom of the linking unit 45027 which links together the right-ear cartilage conduction unit 45024 and the left-ear cartilage conduction unit 45026, there is provided an extension part 45027*c* which penetrates through a hole provided in the top frame 8227 into the mobile telephone 45001. The piezoelectric bimorph element 45025 is supported horizontally by being entirely bonded to the front face of the extension part 45027*c*. Thus, as the entire piezoelectric bimorph element 45025 vibrates, the extension part 45027*c* vibrates, and this vibration is conducted via the linking unit 45027 to each of the right-ear cartilage conduction unit 45024 and the left-ear cartilage conduction unit 45026. As in the one-hundred thirty-sixth embodiment, the vibration direction is perpendicular to the front plate 8201*a* (perpendicular to the plane of FIG. 224(B)).

FIG. 224(C) is a top view of FIG. 224(A), and there it is seen that, as in the one-hundred thirty-sixth embodiment, the right-ear cartilage conduction unit 45024, the left-ear cartilage conduction unit 45026, and the linking unit 45027 are molded continuously and integrally out of an elastic member. Moreover, as in FIG. 222(C), also in FIG. 224(C), the extension part 45027*c* and the piezoelectric bimorph element 45025 entirely affixed horizontally to it, which are housed inside, are indicated by broken lines. In FIG. 224(D), which is a sectional view along line B2-B2 shown in FIGS. 224(A) to 224(C), it is seen that, as in the one-hundred thirty-sixth embodiment, also in the one-hundred thirty-eighth embodiment, the extension part 45027*c* is integral with the linking unit 45027. Already in the one-hundred thirty-sixth and one-hundred thirty-seventh embodiments, the piezoelectric bimorph element is arranged near the back plate 8201*b* to achieve a configuration where a space is secured near the front plate 8201*a* in a top part of the mobile telephone 45001 where a large number of members are arranged. In particular in the one-hundred thirty-eighth embodiment, the piezoelectric bimorph element 45025 is entirely affixed horizontally to the extension part 45027*c*, and thus, as will be clear from FIG. 224(D), it is possible to more efficiently secure a space near the front plate 8201*a* in a top part of the mobile telephone 45001.

Also in the one-hundred thirty-eighth embodiment, the piezoelectric bimorph element 45025 is supported only by the extension part 45027*c*, and vibration is transmitted via the linking unit 45027 molded integrally with it to the right-ear cartilage conduction unit 45024 or the left-ear cartilage conduction unit 45026 and then to the ear cartilage.

Thus, efficient cartilage conduction is achieved likewise. Also achieved likewise are suppression of generation of air-conduction sound by the vibration of the front plate 8201*a* and the back plate 8201*b*, and suppression of generation of air-conduction sound from the linking unit 45027, the right-ear cartilage conduction unit 45024, and the left-ear cartilage conduction unit 45026 themselves. Further achieved likewise are, in case the mobile telephone 45001 is dropped, protection of the two corner parts by the elastic member, and protection of the piezoelectric bimorph element 45025 itself by the elastic member's shock-absorbing property.

Moreover, in the one-hundred thirty-eighth embodiment, as will be clear from FIG. 224(A), the right-ear cartilage conduction unit 45024 and the left-ear cartilage conduction unit 45026 are arranged so as to cover corner parts of the top face of the mobile telephone 45001. This results in an increased area of contact with the ear cartilage, and helps achieve more efficient cartilage conduction. The structure is thus one of those structures which are suitable to protect corner parts.

(One-hundred Thirty-ninth Embodiment)

FIG. 225 comprises a perspective view and sectional views of a one-hundred thirty-ninth embodiment according to one aspect of the present invention, which is configured as a mobile telephone 46001. The one-hundred thirty-ninth embodiment too has much in common with the one-hundred thirty-sixth embodiment in FIG. 222; therefore, common parts are identified by the same reference numerals, and no overlapping description will be repeated unless necessary. The one-hundred thirty-ninth embodiment in FIG. 225 differs from the one-hundred thirty-sixth embodiment in FIG. 222 in that, whereas in the one-hundred thirty-sixth embodiment, the piezoelectric bimorph element 13025 is supported vertically at one end, in the one-hundred thirty-ninth embodiment, as in the one-hundred thirty-eighth embodiment, a piezoelectric bimorph element 46025 is entirely bonded horizontally. However, in the one-hundred thirty-ninth embodiment, unlike in the one-hundred thirty-eighth embodiment, the vibration direction of the piezoelectric bimorph element 46025 is perpendicular to the top frame 8227 (the up/down direction in the mobile telephone 46001).

Like FIG. 222(A) showing the one-hundred thirty-sixth embodiment, FIG. 225(A) is a front perspective view of the one-hundred thirty-ninth embodiment. There is no difference in exterior appearance, and therefore no overlapping description will be repeated. FIG. 225(B) corresponds to a sectional view along line B1-B1 in FIG. 225(A). As will be clear from FIG. 225(B), in the one-hundred thirty-ninth embodiment, part of a bottom part of a linking unit 46027 that links together a right-ear cartilage conduction unit 46024 and a left-ear cartilage conduction unit 46026 constitutes an exposed part 46027*c* which is exposed through an opening formed in the top frame 8227. The piezoelectric bimorph element 46025 is supported by being entirely bonded horizontally to the bottom face of the exposed part 46027*c*. Its vibration direction is perpendicular to the top frame 8227 (the up/down direction in the mobile telephone 46001) as indicated by arrows 46025*a*. Thus, as in the one-hundred thirty-eighth embodiment, also in the one-hundred thirty-ninth embodiment, as the entire piezoelectric bimorph element 46025 vibrates, the exposed part 46027*c* vibrates, and this vibration is conducted via the linking unit 46027 to each of the right-ear cartilage conduction unit 46024 and the left-ear cartilage conduction unit 46026.

FIG. 225(C) is a top view of FIG. 225(A), and there it is seen that, as in the one-hundred thirty-sixth embodiment, the right-ear cartilage conduction unit 46024, the left-ear cartilage conduction unit 46026, and the linking unit 46027 are molded continuously and integrally out of an elastic member. Moreover, the exposed part 46027*c* and the piezoelectric bimorph element 46025 entirely affixed horizontally to it from behind, which are housed inside, are indicated by broken lines. Also in FIG. 225(D), which is a sectional view along line B2-B2 shown in FIGS. 225(A) to 225(C), it is seen how the exposed part 46027*c* is exposed through the opening provided in the top frame 8227 and how the piezoelectric bimorph element 46025 is affixed to it so as to point upward. Moreover, as will be understood from FIGS. 225(B) and 225(D), in the one-hundred thirty-ninth embodiment, the vibration direction of the piezoelectric bimorph element 46025 is, as indicated by arrows 46025*a*, perpendicular to the top frame 8227 (the direction upward from the mobile telephone 46001 with respect to the ear cartilage). This is one of those arrangements which require the least space inside the mobile telephone 46001, and is suitable to introduce a cartilage conduction structure in a top part of the mobile telephone 46001 where a large number of members are arranged.

Also in the one-hundred thirty-ninth embodiment, the piezoelectric bimorph element 46025 is affixed to the exposed part 46027*c* so as to be supported only by the linking unit 46027, and vibration is conducted via the right-ear cartilage conduction unit 46024 or the left-ear cartilage conduction unit 46026 integrally molded to it to the ear cartilage. This achieves efficient cartilage conduction. Moreover, also in the one-hundred thirty-ninth embodiment, as in the embodiments described previously, generation of air-conduction sound resulting from vibration of the front plate 8201*a* or the back plate 8201*b*, and generation of air-conduction sound from the linking unit 46027 and from the right-ear cartilage conduction unit 46024 and the left-ear cartilage conduction unit 46026 themselves, are both suppressed. Also obtained likewise are the benefits of, in case the mobile telephone 46001 is dropped, protection the two corner parts being protected by the elastic member, and the piezoelectric bimorph element 46025 itself being protected by the elastic member's shock-absorbing property.

(One-hundred Fortieth Embodiment)

FIG. 226 comprises a perspective view and sectional views of a one-hundred fortieth embodiment according to one aspect of the present invention, which is configured as a mobile telephone 47001. The one-hundred fortieth embodiment too has much in common with the one-hundred thirty-sixth embodiment in FIG. 222; therefore, common parts are identified by the same reference numerals, and no overlapping description will be repeated unless necessary. A first difference of the one-hundred fortieth embodiment in FIG. 226 from the one-hundred thirty-sixth embodiment in FIG. 222 is that, whereas in the one-hundred thirty-sixth embodiment, the piezoelectric bimorph element 13025 is supported vertically at one end, in the one-hundred fortieth embodiment, a piezoelectric bimorph element 47025 is entirely bonded horizontally to the reverse side of a linking unit 47027 so as to have the same vibration direction as in the one-hundred thirty-ninth embodiment. A second difference is that the linking unit 47027 which links together the right-ear cartilage conduction unit 47024 and the left-ear cartilage conduction unit 47026 and to which the piezoelectric bimorph element 47025 is bonded over an entire surface thereof is located under the top frame 8227, and does not appear in the exterior appearance of the mobile telephone 47001. A third difference is that inner middle parts of the right-ear cartilage conduction unit 47024 and the left-ear cartilage conduction unit 47026 connect, respectively via openings provided in opposite corner parts of the linking unit 47027, to the linking unit 47027 inside the mobile telephone 47001 so as to be integral with it. This structure will be described in detail below.

FIG. 226(A) is a front perspective view of the one-hundred fortieth embodiment. There, as described above, unlike in FIG. 222(A) showing the one-hundred thirty-sixth embodiment, the linking unit 47027 which links together the right-ear cartilage conduction unit 47024 and the left-ear cartilage conduction unit 47026 is located under the top frame 8227, and does not appear in the exterior appearance of the mobile telephone 47001.

FIG. 226(B) corresponds to a sectional view along line B1-B1 in FIG. 226(A). As will be clear from FIG. 226(B), in the one-hundred fortieth embodiment, the right-ear cartilage conduction unit 47024 and the left-ear cartilage conduction unit 47026 are, via openings formed such that part of the top frame 8227 penetrates middle parts of opposite corner parts respectively, formed integrally with the linking unit 47027 inside the mobile telephone 47001. The linking unit 47027 is bonded to the reverse side of the top frame 8227. The piezoelectric bimorph element 47025 is supported by being entirely bonded horizontally to the bottom face of the linking unit 47027. Its vibration direction is, as in the one-hundred thirty-ninth embodiment, perpendicular to the top frame 8227 (in the up/down direction in the mobile telephone 47001). Thus, the vibration of the entire piezoelectric bimorph element 47025 conducts to the linking unit 47027, and this vibration is conducted to each of the right-ear cartilage conduction unit 47024 and the left-ear cartilage conduction unit 47026.

FIG. 226(C) is a top view of the FIG. 226(A). As described above, the linking unit 47027, which integrally links together the right-ear cartilage conduction unit 47024 and the left-ear cartilage conduction unit 47026, does not appear in the exterior appearance. Moreover, the piezoelectric bimorph element 47025 entirely affixed to the linking unit 47027 housed inside is indicated by broken lines. Also indicated by broken lines are the corner parts 8227*a* and 8227*b* of the top frame 8227 excluding the openings formed so as to penetrate their middle parts to introduce the right-ear cartilage conduction unit 47024 into the mobile telephone 47001, and the corner parts 8227*c* and 8227*d* of the top frame 8227 excluding the openings formed so as to penetrate their middle parts to introduce the left-ear cartilage conduction unit 47026 into the mobile telephone 47001. The structure around here will be further described later.

Also in FIG. 226(D), which is a sectional view along line B2-B2 shown in FIGS. 226(A) to 226(C), it is seen how the linking unit 47027 is affixed to the bottom side of the top frame 8227 and how the piezoelectric bimorph element 47025 is affixed to it so as to point upward. Moreover, as will be clear from FIGS. 226(B) and 226(D), in the one-hundred fortieth embodiment, as in the one-hundred thirty-ninth embodiment, the vibration direction of the piezoelectric bimorph element 47025 is perpendicular to the top frame 8227. This is one those arrangements which require the least space inside the mobile telephone 47001, and is suitable to introduce a cartilage conduction structure in a top part of the mobile telephone 47001 where a large number of members are arranged.

FIG. 226(E) is a partial sectional view near the right-ear cartilage conduction unit 47024 at another section parallel to FIG. 226(B). The partial sectional view in FIG. 226(E) shows a section near where the front end face of the top frame 8227 abuts the front plate 8201*a*, avoiding an opening through which a power switch 8209 appearing in the sectional view in FIG. 226(B) is inserted and an opening through which the right-ear cartilage conduction unit 47024 is connected to the linking unit 47027. As will be clear from the FIG. 226(E), in the part other than the opening formed so as to penetrate a middle part to lead the right-ear cartilage conduction unit 47024 into the mobile telephone 47001, the top-face and side-face parts of the top frame 8227 are continuous in the corner part 8227*b*, and the right-ear cartilage conduction unit 47024 is provided so as to cover the so configured corner part 8227*b* of the top frame 8227. A section near where the rear end face of the top frame 8227 abuts the back plate 8201*b* is similar to that shown in FIG. 226(E). While FIG. 226(E) shows the structure around the right-ear cartilage conduction unit 47024, the structure around the left-ear cartilage conduction unit 47026 is similar.

Also in the one-hundred fortieth embodiment configured as described above, the piezoelectric bimorph element 47025 is affixed to the linking unit 47027 so as to be supported only by the linking unit 47027, and vibration conducts via the right-ear cartilage conduction unit 47024 or the left-ear cartilage conduction unit 47026 integrally molded to it to the ear cartilage. This achieves efficient cartilage conduction. Moreover, also in the one-hundred fortieth embodiment, as in the embodiments described previously, generation of air-conduction sound resulting from vibration of the front plate 8201*a* or the back plate 8201*b*, or of the top frame 8227, is suppressed. The linking unit 47027 is located inward of the top frame 8227, and thus hardly contributes to generation of air-conduction sound. Also obtained as in the embodiments described previously are the benefits of, in case the mobile telephone 47001 is dropped, the two corner parts being protected by the elastic member, and the piezoelectric bimorph element 47025 itself being protected by the elastic member's shock-absorbing property.

(One-hundred Forty-first Embodiment)

FIG. 227 comprises a perspective view and sectional views of a one-hundred forty-first embodiment according to one aspect of the present invention, which is configured as a mobile telephone 48001. The one-hundred forty-first embodiment too has much in common with the one-hundred thirty-sixth embodiment in FIG. 222; therefore, common parts are identified by the same reference numerals, and no overlapping description will be repeated unless necessary. A first difference of the one-hundred forty-first embodiment in FIG. 227 from the one-hundred thirty-sixth embodiment in FIG. 222 is that, whereas in the one-hundred thirty-sixth embodiment a piezoelectric bimorph element 13025 is used as a cartilage conduction vibration source, in the one-hundred forty-first embodiment, as in the eighty-eighth embodiment in FIG. 136 for instance, an electromagnetic vibrating element 48025 is used as a cartilage conduction vibration source. A second difference is that the right-ear cartilage conduction unit 48024 and the left-ear cartilage conduction unit 48026 are arranged to cover opposite corner parts of the top face of the mobile telephone 48001 and, continuous with them, the linking unit 48027 too is arranged to cover the top-face part of the mobile telephone 48001. A more specific description follows.

Figures 227A, 227B, 227C, 227D:
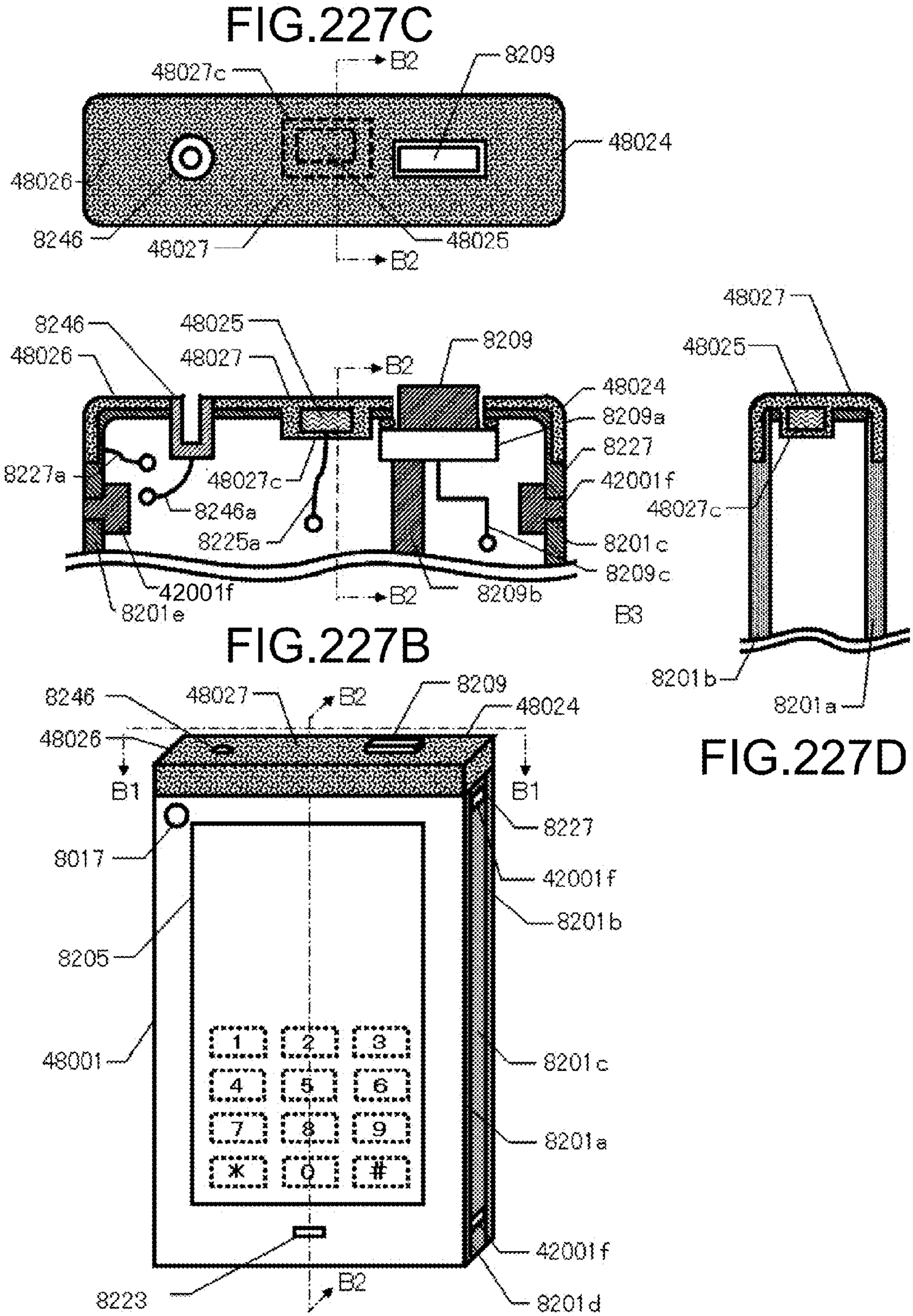

FIG. 227(A) is a front perspective view of the one-hundred forty-first embodiment. As described above, in the one-hundred forty-first embodiment, unlike in FIG. 222(A) showing the one-hundred thirty-sixth embodiment, a configuration is adopted in which the right-ear cartilage conduction unit 48024, the left-ear cartilage conduction unit 48026, and the linking unit 48027 which links them together are configured such that they as a whole cover the top-face part of the mobile telephone 48001.

FIG. 227(B) corresponds to a sectional view along line B1-B1 in FIG. 227(A). As will be clear from FIG. 227(B), as in the one-hundred thirty-sixth embodiment, on the bottom of the linking unit 48027, which links together the right-ear cartilage conduction unit 48024 and the left-ear cartilage conduction unit 48026, there is provided an extension part 48027*c* which penetrates through an opening provided in the top frame 8227 to extend into the mobile telephone 48001. The electromagnetic vibrating element 48025 is supported by being embedded in the extension part 48027*c*. Thus, the vibration of the electromagnetic vibrating element 48025 conducts to the extension part 48027*c*, and this vibration is conducted via the linking unit 48027 to each of the right-ear cartilage conduction unit 48024 and the left-ear cartilage conduction unit 48026. In the one-hundred forty-first embodiment, the linking unit 48027 is formed broadly to cover the top-face part of the mobile telephone 48001, and this results in a broader conduction path for vibration. Moreover, even with the middle of the top-face part of the mobile telephone 48001 put on the ear cartilage as with a common mobile telephone, the vibration of the linking unit 48027 conducts to the ear cartilage, and thus cartilage conduction is achieved. In this way, in the one-hundred forty-first embodiment, the linking unit 48027 too acts as a cartilage conduction unit.

FIG. 227(C) is a top view of FIG. 227(A), and there it is seen that, as described above, the right-ear cartilage conduction unit 48024, the left-ear cartilage conduction unit 48026, and the linking unit 48027, which are formed integrally, as a whole cover the top-face part of the mobile telephone 48001. The extension part 48027*c* and the electromagnetic vibrating element 48025 embedded in it, which are housed inside, are indicated by broken lines. Also in FIG. 227(D), which is a sectional view along line B2-B2 shown in FIGS. 227(A) to 227(C), it is seen that the linking unit 48027 and the extension part 48027*c* are formed integrally.

Also in the one-hundred forty-first embodiment, the electromagnetic vibrating element 48025 as a cartilage conduction vibration source is embedded in the extension part 48027*c* so as to be supported only by the linking unit 48027, and vibration is conducted via the right-ear cartilage conduction unit 48024 or the left-ear cartilage conduction unit 48026 integrally molded to it to the ear cartilage. This achieves efficient cartilage conduction. Moreover, also in the one-hundred forty-first embodiment, as in the embodiments described previously, generation of air-conduction sound resulting from vibration of the front plate 8201*a* or the back plate 8201*b*, and generation of air-conduction sound from the linking unit 48027, the right-ear cartilage conduction unit 48024, and the left-ear cartilage conduction unit 48026 themselves, are both suppressed. Also obtained likewise are the benefits of, in case the mobile telephone 48001 is dropped, the two corner parts being protected by the elastic member, and the electromagnetic vibrating element 48025 itself as a cartilage conduction vibration source being protected by the elastic member's shock-absorbing property.

The features of the present invention in the embodiments described above are not limited to those specific embodiments; they can be implemented in any other embodiment so long as they provide their advantages. For example, the specific features described in connection with the one-hundred thirty-sixth to one-hundred forty-first embodiments are not necessarily unique to the respective embodiments, but features from different embodiments can be implemented in combination. For example, the configuration of the right-ear cartilage conduction unit 48024, the left-ear cartilage conduction unit 48026, and the linking unit 48027 in the one-hundred forty-first embodiment, where they together cover the entire top-face part of the mobile telephone 48001, can be adopted in the one-hundred thirty-sixth embodiment. Conversely, the configuration of the right-ear cartilage conduction unit 45024, the left-ear cartilage conduction unit 45026, and the linking unit 45027 in the one-hundred thirty-eighth embodiment can be adopted in the one-hundred forty-first embodiment.

In a case where, as in the one-hundred forty-first embodiment in FIG. 227, a cartilage conduction vibration source is supported by being embedded in the linking unit 48027, provided that the cartilage conduction vibration source is sufficiently thinner than the linking unit 48027, the cartilage conduction vibration source may be supported on the outer side (top side) of the top frame 8227 with no opening formed in the top frame 8227. Also with this structure, owing to the cartilage conduction vibration source being embedded in the linking unit 48027, the cartilage conduction vibration source can be supported so as not to make contact with the casing top-face part of the mobile telephone 48001 (the top frame 8227). In a case where a cartilage conduction vibration source is embedded in the linking unit, as the cartilage conduction vibration source, not only an electromagnetic vibrating element as in the one-hundred forty-first embodiment but also a piezoelectric bimorph element as in other embodiments can be adopted. Conversely, in the one-hundred thirty-sixth to one-hundred fortieth embodiments, as the cartilage conduction vibration source, an electromagnetic vibrating element as in the one-hundred forty-first embodiment can be adopted.

(One-hundred Forty-second Embodiment)

FIG. 228 comprises a perspective view and sectional views of a one-hundred forty-second embodiment according to one aspect of the present invention, which is configured as a mobile telephone 49001. The one-hundred forty-second embodiment has much in common with the one-hundred fortieth embodiment in FIG. 226; therefore, common parts are identified by the same reference numerals, and no overlapping description will be repeated unless necessary. The one-hundred forty-second embodiment in FIG. 228 differs from the one-hundred fortieth embodiment in FIG. 226 in that a piezoelectric bimorph element 47025 is supported on a linking unit 47027 via a hard vibration-conducting plate 49027 having a good vibration-conducting property. This will be described below in detail.

As shown in FIG. 228(A), which is a front perspective view, the exterior appearance of the one-hundred forty-second embodiment is the same as the exterior appearance of the one-hundred fortieth embodiment shown in FIG. 226(A), and therefore no overlapping description will be repeated. FIG. 228(B) corresponds to a sectional view along line B1-B1 in FIG. 228(A). As will be clear from FIG. 228(B), in the one-hundred forty-second embodiment, a hard vibration-conducting plate 49027 which has a better vibration-conducting property than the linking unit 47027 is affixed to the reverse side of the linking unit 47027 which is an elastic member, and the piezoelectric bimorph element 47025 is supported by being affixed to the reverse side of the hard vibration-conducting plate 49027. As will be understood from FIG. 228(B), opposite ends of the hard vibration-conducting plate 49027 are extended along the reverse side of the linking unit 47027 and are inserted into the right-ear cartilage conduction unit 47024 and the left-ear cartilage conduction unit 47026 respectively. Although in FIG. 228

(B) the hard vibration-conducting plate 49027 appears to be discontinuous on the way from the piezoelectric bimorph element 47025 to the left-ear cartilage conduction unit 47026, this is because the illustrated section passes through the hole that is formed in the hard vibration-conducting plate 49027 to avoid contact with an external earphone jack 8246. Except for the hole, the hard vibration-conducting plate 49027 is continuous from the piezoelectric bimorph element 47025 to the left-ear cartilage conduction unit 47026. Likewise, the hard vibration-conducting plate 49027 is not discontinuous on the way from the piezoelectric bimorph element 47025 to the right-ear cartilage conduction unit 47024. Except for the hole that is formed in the hard vibration-conducting plate 49027 to avoid a power switch 8209, the hard vibration-conducting plate 49027 is continuous from the piezoelectric bimorph element 47025 to the right-ear cartilage conduction unit 47024.

With the configuration described above, the vibration of the piezoelectric bimorph element 47025 is conducted to the right-ear cartilage conduction unit 47024 and the left-ear cartilage conduction unit 47026 not only via the linking unit 47027 but also via the hard vibration-conducting plate 49027. As will be described in detail below, the hard vibration-conducting plate 49027 makes contact only with the right-ear cartilage conduction unit 47024 and the left-ear cartilage conduction unit 47026, and does not conduct vibration directly to the front plate 8201*a*, the back plate 8201*b*, and the top frame 8227. Even when the mobile telephone 49001 is dropped and impact is applied from outside to the front plate 8201*a*, the back plate 8201*b*, and the top frame 8227, owing to the interposition of the linking unit 47027, the right-ear cartilage conduction unit 47024, and the left-ear cartilage conduction unit 47026, which are elastic members, between the hard vibration-conducting plate 49027 and the piezoelectric bimorph element 47025 supported on it, the impact is alleviated, and the piezoelectric bimorph element 47025 is prevented from destruction.

FIG. 228(C) is a top view of FIG. 228(A). As indicated by broken lines, the hard vibration-conducting plate 49027 is inserted in each of the right-ear cartilage conduction unit 47024 and the left-ear cartilage conduction unit 47026 without making contact with the front plate 8201*a* or the back plate 8201*b*. Moreover, the hard vibration-conducting plate 49027 has a hole 49027*a* so as not to make contact with the external earphone jack 8246. Moreover, the hard vibration-conducting plate 49027 has a rectangular hole so as not to make contact with the power switch 8209. Thus, the vibration that has been conducted from the piezoelectric bimorph element 47025, which is indicated by broken lines, to the hard vibration-conducting plate 49027 is transmitted directly only to the linking unit 47027, the right-ear cartilage conduction unit 47024, and the left-ear cartilage conduction unit 47026.

Also in FIG. 228(D), which is a sectional view along line B2-B2 shown in FIGS. 228(A) to 228(C), it is seen that the hard vibration-conducting plate 49027 does not make contact with the front plate 8201*a* or the back plate 8201*b*. FIG. 228(E) shows a section near where the front end face of the top frame 8227 makes contact with the front plate 8201*a*, near the right-ear cartilage conduction unit 47024, at another section parallel to FIG. 228(B). Also in FIG. 228(E), it is seen that no section of the hard vibration-conducting plate 49027 appears near where it makes contact with the front plate 8201*a*, and that the hard vibration-conducting plate 49027 does not make contact with the front plate 8201*a*.

Through precise measurement of the frequency characteristics of the sound pressure inside the external auditory meatus ascribable to cartilage conduction, it has been observed that, when a cartilage conduction unit is in contact with the ear cartilage, depending on conditions, a valley appears around 1.5 kHz where the pressure level is low. The valley appears especially when there is a large direct air-conduction sound component that originates in the cartilage conduction unit and enters the external auditory meatus through its entrance.

In the one-hundred forty-second embodiment in FIG. 228, as described above, via the hard vibration-conducting plate 49027, the vibration of the piezoelectric bimorph element 47025 is conducted to the right-ear cartilage conduction unit 47024 and the left-ear cartilage conduction unit 47026, and in addition the hard vibration-conducting plate 49027 is arranged so as not to make contact with the front plate 8201*a* in order to suppress generation of air-conduction sound from the front plate 8201*a*. Thus, when the right-ear cartilage conduction unit 47024 or the left-ear cartilage conduction unit 47026, which is a corner part of the mobile telephone 49001, is put somewhere around the entrance of the external auditory meatus, cartilage conduction occurs from the right-ear cartilage conduction unit 47024 or the left-ear cartilage conduction unit 47026, which constitutes the top and side faces of the corner part, to the ear cartilage, augmenting the cartilage air-conduction sound component while diminishing the direct air-conduction sound component from the front plate 8201*a* constituting the front face of the corner part and facing the entrance of the external auditory meatus. A configuration like this where vibration is conducted from the top and side faces of a corner part of the mobile telephone 49001 to the ear cartilage while direct air-conduction sound from the front face of the corner part is suppressed is beneficial to preventing a valley of sound pressure appearing around 1.5 kHz as mentioned above.

(One-hundred Forty-third Embodiment)

FIG. 229 comprises a perspective view and sectional views of a one-hundred forty-third embodiment according to one aspect of the present invention, which is configured as a mobile telephone 50001. The one-hundred forty-third embodiment has much in common with the one-hundred forty-second embodiment in FIG. 228; therefore, common parts are identified by the same reference numerals, and no overlapping description will be repeated unless necessary. The one-hundred forty-third embodiment in FIG. 229 differs from the one-hundred forty-second embodiment in FIG. 228 in that no linking unit 47027 is provided and a hard vibration-conducting plate 49027 which supports a piezoelectric bimorph element 50025 and which has a good vibration-conducting property is supported only by the right-ear cartilage conduction unit 47024 and the left-ear cartilage conduction unit 47026. This will be described below.

Figures 229A, 229B, 229C, 229D, 229E:
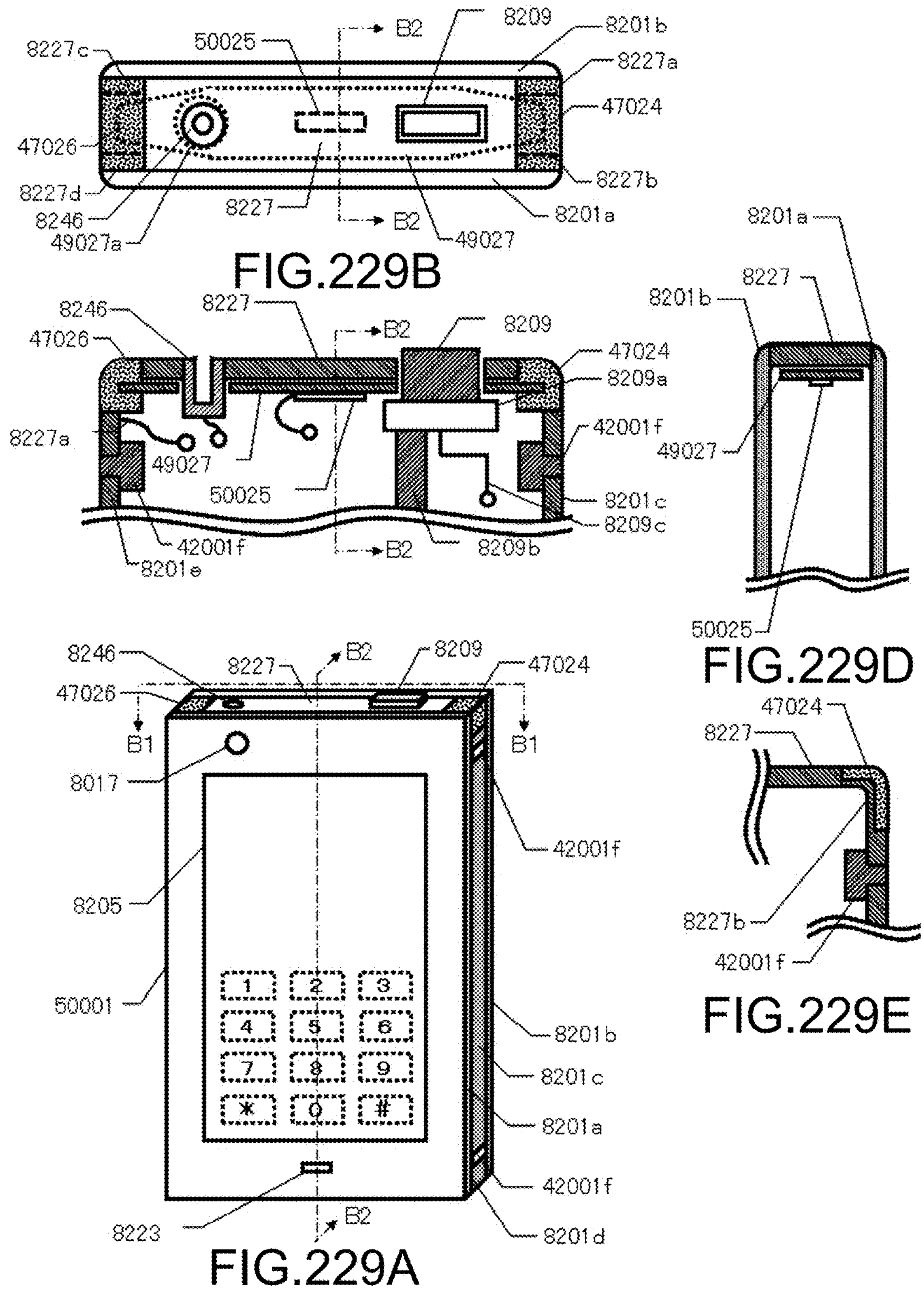

The exterior view in FIG. 229(A) is the same as FIG. 228(A), which shows the exterior appearance of the one-hundred forty-second embodiment. As will be clear from FIG. 229(B), which is a sectional view along line B1-B1 in FIG. 229(A), in the one-hundred forty-third embodiment, no linking unit 47027 is provided, and the right-ear cartilage conduction unit 47024 and the left-ear cartilage conduction unit 47026 are provided separately in corner parts respectively. The hard vibration-conducting plate 49027, which supports the piezoelectric bimorph element 50025, floats off the top frame 8227, and is supported only by the right-ear cartilage conduction unit 47024 and the left-ear cartilage conduction unit 47026. As in the one-hundred forty-second embodiment, in the one-hundred forty-third embodiment, the hard vibration-conducting plate 49027 is formed of a material having a better vibration-conducting property than the right-ear cartilage conduction unit 47024 and the left-ear cartilage conduction unit 47026. In the one-hundred forty-third embodiment, as in the one-hundred forty-second embodiment, vibration does not directly conduct from the hard vibration-conducting plate 49027 to the front plate 8201*a*, the back plate 8201*b*, or the top frame 8227. Also as in the one-hundred forty-second embodiment, when impact is applied from outside to the front plate 8201*a*, the back plate 8201*b*, or the top frame 8227, it is alleviated by the right-ear cartilage conduction unit 47024 and the left-ear cartilage conduction unit 47026, which are elastic members, and the piezoelectric bimorph element 50025 is prevented from destruction.

As will be understood from FIG. 229(C), which is a top view of FIG. 229(A), also in the one-hundred forty-third embodiment, the hard vibration-conducting plate 49027 is supported by the right-ear cartilage conduction unit 47024 and the left-ear cartilage conduction unit 47026 from opposite sides without making contact with the front plate 8201*a*, the back plate 8201*b*, the external earphone jack 8246, or the power switch 8209. As will be understood from FIG. 229 (C), in the one-hundred forty-third embodiment, to obtain well-balanced vibration even with the hard vibration-conducting plate 49027 floating off the top frame 8227, the piezoelectric bimorph element 50025 is arranged at about the middle of the top face.

Also in FIG. 229(D), which is a sectional view along line B2-B2 shown in FIGS. 229(A) to 229(C), it is seen that the hard vibration-conducting plate 49027 does not make contact with the front plate 8201*a* or the back plate 8201*b*, and that it floats off the top frame 8227. Also in FIG. 229(E), which is a sectional view similar to FIG. 228(E) showing the one-hundred forty-second embodiment, it is seen that the hard vibration-conducting plate 49027 does not make contact with the front plate 8201*a*.

(One-hundred Forty-forth Embodiment)

FIG. 230 is a schematic diagram of a one-hundred forty-forth embodiment according to one aspect of the present invention, which is configured as stereo earphones. FIG. 230(A) to (C) showing the one-hundred forty-forth embodiment have much in common with FIGS. 209(A) the (C) showing the one-hundred thirty-first embodiment. Therefore, common parts are identified by the same reference numerals, and no overlapping description will be given unless necessary. However, the following should be noted: in the one-hundred forty-forth embodiment, there is provided no vibration plate (diaphragm) as in the one-hundred thirty-first embodiment, and the basic configuration here is rather a simple one where, as in the one-hundred ninth embodiment in FIG. 182, a passage hole 51024*a* is formed in a cartilage conduction unit 51024 formed of an elastic member.

One feature of the one-hundred forty-forth embodiment in FIG. 230 is that, as will be clear from a sectional view in FIG. 230(C), a hard-material layer 51027 is affixed to the face (in FIG. 230(A), the front face) of the earphone which faces the entrance of the external auditory meatus when the earphone is worn and to the inner face of the passage hole 51024*a*. In FIG. 230, for the sake of emphasis, the hard-material layer 51027 is illustrated to be extremely thick; in reality, it is a layer that is formed to be comparatively thin. The hard-material layer 51027 serves to make the acoustic impedance of the front face of the cartilage conduction unit 51024 and the inner face of the passage hole 51024*a* different from that of the cylindrical side circumferential face of the cartilage conduction unit 51024, and to suppress vibration of these faces. As a result, when the earphone is worn on the ear, the contact between the cylindrical side circumferential face of the cartilage conduction unit 51024 and the cartilage around the entrance of the external auditory meatus yields a satisfactory air-conduction sound component, and simultaneously suppresses the direct air-conduction sound component from the front face of the cartilage conduction unit 51024 and the inner face of the passage hole 51024*a*. This configuration is useful to preventing the previously mentioned valley of sound pressure occurring around 1.5 kHz.

The above-described features of the present invention are not limited to the embodiments specifically described above, but can be implemented in any other embodiment so long as they provide their benefits. For example, in the one-hundred forty-second embodiment shown in FIG. 228, the piezoelectric bimorph element 50025 may be arranged at about the middle of the top face as in the one-hundred forty-third embodiment.

Although in the one-hundred forty-forth embodiment shown in FIG. 230, the hard-material layer is affixed to the face that faces the entrance of the external auditory meatus when the earphone is worn and to the inner face of the passage hole, the hard-material layer may instead be affixed to only one of those faces. The direct air-conduction sound component from the front face of the cartilage conduction unit or from the inner face of the passage hole may be suppressed by any other means than affixation of a hard-material layer. For example, as for the front face, it is possible to adopt a means such as giving it a structure different from the cylindrical side circumferential face which makes contact with the ear cartilage (e.g., giving the part in contact with the ear cartilage a smooth surface and the other part a coarse surface, or adopting a two-part structure where a front-face part is separated across a gap such that its surface does not vibrate even when the interior vibrates). For the inner face of the passage hole, it is possible to adopt a means such as giving it directivity pointing outside the external auditory meatus.

(One-hundred Forty-fifth Embodiment)

FIG. 231 comprises a perspective view, sectional views, a top view, and a side view of a one-hundred forty-fifth embodiment according to one aspect of the present invention, which is configured as a mobile telephone 52001. The one-hundred forty-fifth embodiment has much in common with the one-hundred seventh embodiment in FIG. 178; therefore, common parts are identified by the same reference numerals, and no overlapping description will be repeated unless necessary. The one-hundred forty-fifth embodiment in FIG. 231 differs from the one-hundred seventh embodiment in FIG. 178 in the structure with which the top frame 8227 is fitted. Specifically, an elastic member 52065 is provided not only between the top frame 8227 and the right and left frames 8201*c* and 8201*e* but also between the top frame 8227 and the front and back plates 8201*a* and 8201*b*, making it difficult for the vibration of the top frame 8227 to conduct to other casing segments. The piezoelectric bimorph element 50025 as a vibration source is, for example, a compact one as in the one-hundred forty-third embodiment in FIG. 229, and is affixed directly to the inner side of the top frame 8227.

Figure 231C:
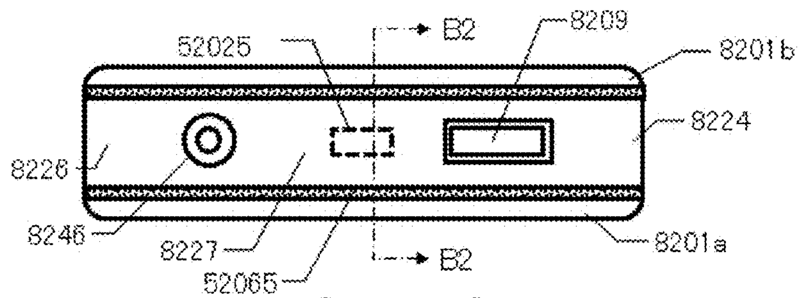
Figure 231B:
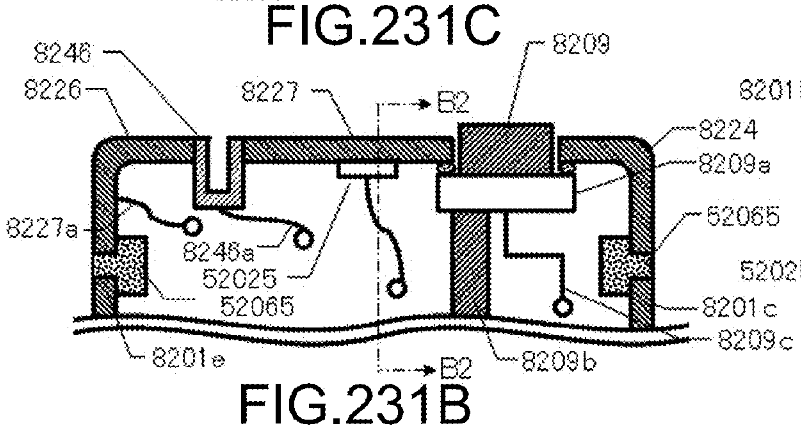
Figure 231D:
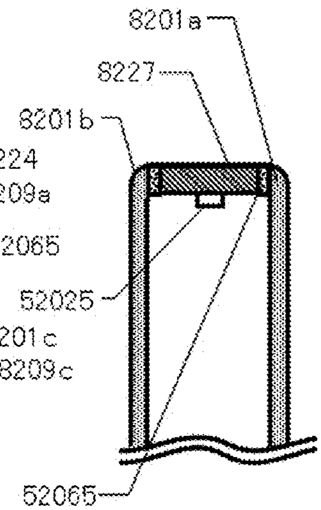
Figure 231A:
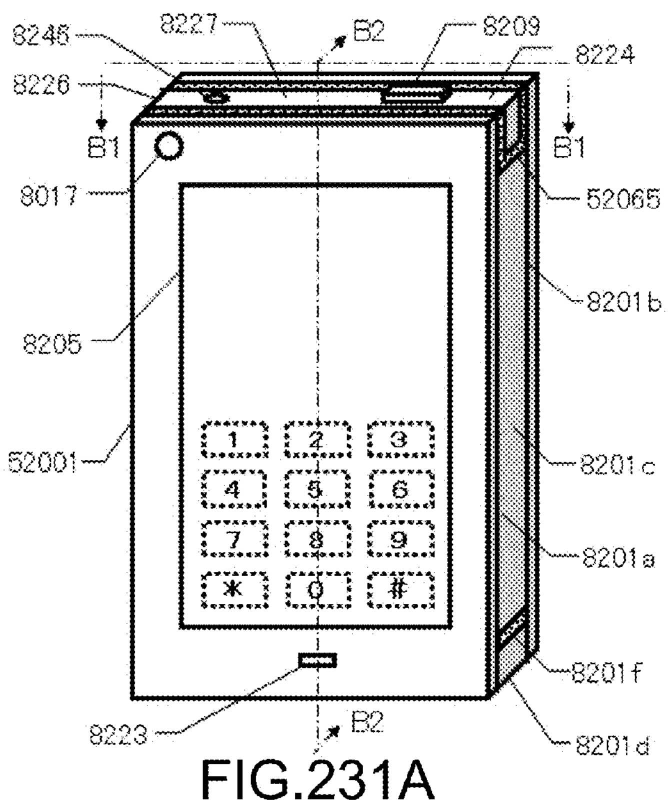
Figure 231E:
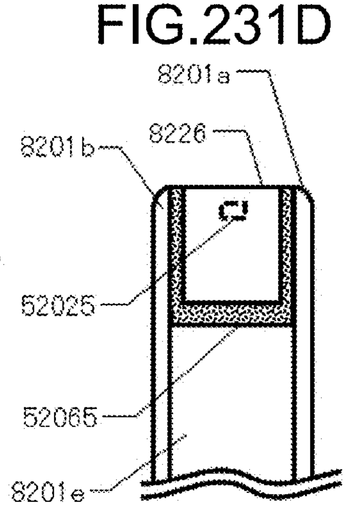

A perspective view in FIG. 231(A) shows the above-described structure. The elastic member 52065 is provided around the circumference of the top frame 8227 so as to be interposed between it and each of the right frame 8201*c*, the left frame 8201*e*, the front plate 8201*a*, and the back plate 8201*b*. Thus, the vibration of the top frame 8227 is less prone to conduct to those frames and plates.

As will be clear from FIG. 231(B), which is a sectional view along line B1-B1 in FIG. 231(A), the compact piezoelectric bimorph element 50025 is affixed directly to the inner face of the top frame 8227. In FIG. 231(C), which is a top view, it is seen that the elastic member 52065 is interposed between the top frame 8227 and each of the front and back plates 8201*a* and 8201*b*. Also in FIG. 231(D), which is a sectional view along line B2-B2 in FIGS. 231(A) to 231(C), it is seen that the elastic member 52065 is interposed between the top frame 8227 and each of the front and back plates 8201*a* and 8201*b* so that these do not make direct contact with each other. Furthermore, in FIG. 231(E), which is a left side view of FIG. 231(A), it is seen that the elastic member 52065 is interposed between a left corner part 8226 of the top frame 8227 and each of the left frame 8201*e* and the front and back plates 8201*a* and 8201*b* so that these do not make direct contact with each other.

(One-hundred Forty-sixth Embodiment)

FIG. 232 comprises a perspective view and top views of a one-hundred forty-sixth embodiment according to one aspect of the present invention, which is configured as a mobile telephone 53001. The one-hundred forty-sixth embodiment has much in common with the one-hundred forty-second embodiment in FIG. 228; therefore, common parts are identified by the same reference numerals, and no overlapping description will be repeated unless necessary. Sectional views too are largely common, and therefore overlapping illustration and description will be omitted. The one-hundred forty-sixth embodiment in FIG. 232 differs from the one-hundred forty-second embodiment in FIG. 228 in that it has a means for switching air-conduction sound generation like the one in the forty-ninth embodiment in FIG. 74. However, its specific configuration here differs greatly, as will be described below.

As shown in a perspective view in FIG. 232(A), a slot 53027*a* is provided in the top frame 8227 so that an air-conduction sound generation switching operation unit 53027*b* is slidable along the slot 53027*a*. FIG. 232(A) shows a state where no air-conduction sound is generated. In this state, the one-hundred forty-sixth embodiment functions in the same way as the one-hundred forty-second embodiment in FIG. 228. On the other hand, sliding the air-conduction sound generation switching operation unit 53027*b* leftward along the slot 53027*a* brings into effect a state where air-conduction sound is generated. In this state, air-conduction sound fulfilling a predetermined standard of the mobile telephone is generated from a top part of the front plate 8201*a*. The air-conduction sound generation switching operation unit 53027*b* is configured to be stably held in either position by an unillustrated click mechanism.

FIG. 232(B) is a top view of the mobile telephone 53001 in the state where no air-conduction sound is generated. As will be clear from FIG. 232(B), in a part of the hard vibration-conducting plate 49027 near the front plate 8201*a*, a notch 49027*a* is provided, and at a position corresponding to the notch 49027*a*, a movable wedge 53027 is provided. The movable wedge 53027 is configured to be slidable along with the air-conduction sound generation switching operation unit 53027*b*, and in the state in FIG. 232(B), the movable wedge 53027 is apart from the notch 49027*a*. Thus, the vibration of the top frame 8227 does not conduct to the front plate 8201*a*.

FIG. 232(C) is a top view of the mobile telephone 53001 in the state where air-conduction sound is generated. As will be clear from FIG. 232(C), the movable wedge 53027 moves leftward along with the air-conduction sound generation switching operation unit 53027*b*, and wedges between the notch 49027*a* and the top frame 8227. Thus, the vibration of the top frame 8227 conducts to the front plate 8201*a*, and the entire front plate 8201*a* (in particular, a top part put on the ear) vibrates to generate predetermined air-conduction sound.

Even in the state shown in FIG. 232(C), with a corner put on the ear cartilage, a call can be conducted by cartilage conduction. In this case, the direct air-conduction sound resulting from the vibration of a corner part of the front plate 8201*a* enters the earhole, and thus the heard sound has a high-frequency component added to the direct air-conduction sound. Accordingly, the switching configuration of the one-hundred forty-sixth embodiment can be applied to frequency characteristics switching based on language, which will be described later.

As described above, like the one-hundred forty-second embodiment in FIG. 228, the one-hundred forty-sixth embodiment in FIG. 232 allows calls by cartilage conduction, and in addition, as necessary, also allows calls by air-conduction sound as conventionally practiced. Thus, a standard for common mobile telephones can be met. Moreover, a user can, as he likes, usually use the mobile telephone in the state in FIG. 232(C) as an ordinary one, switching to the state in FIG. 232(B) when outside noise is so loud that he finds difficulty hearing in the ordinary state, or conversely when the ambience is so quiet that he wants to prevent the sound that leaks by air conduction from sounding annoying or revealing personal information. As shown in FIGS. 232 (B) and (C), for efficient air-conduction sound generation, the piezoelectric bimorph element 50025 is arranged closer to the front plate 8201*a*.

(One-hundred Forty-seventh Embodiment)

FIG. 233 is a block diagram showing a one-hundred forty-seventh embodiment according to one aspect of the present invention, which is configured as a mobile telephone. The block diagram showing the one-hundred forty-seventh embodiment has much in common with the block diagram of the cartilage conduction vibration source device of the eighty-second embodiment shown in FIG. 122; therefore, the configuration of the latter is partly shared here, with common parts identified by the same reference numerals and overlapping description omitted. A feature of the embodiment in FIG. 233 is that it is provided with a means for performing switching based on a difference in language in the cartilage conduction that is exploited in a call conducted on the mobile telephone.

For example, between Japanese and English, vowels and consonants contribute to the language in different degrees. It is believed that, in Japanese, in which vowels contribute in a high degree, more information is distributed in a comparatively low frequency range; by contrast, in English, in which consonants contribute in a high degree, more information is distributed in a comparatively high frequency range. It is believed that, also in Chinses, more information is distributed in a comparatively high frequency range.

To cope with such a difference, in the one-hundred forty-seventh embodiment, a drive circuit 54003 for a piezoelectric bimorph element 7013 is provided with a digital sound processing circuit 54038, and the piezoelectric bimorph element 7013 is made to vibrate for cartilage conduction in different frequency ranges for different languages. Specifically, the digital sound processing circuit 54038 is provided with a Japanese-language equalizer 54038*a*, a standard equalizer 54038*b*, and an English-language equalizer 54038*c*, and these are switched appropriately by a switching unit 54038*d* which is controlled by an application processor 54039 so that an output from one of them is fed to a DA conversion circuit 7138*c*. Here, "Japanese" and "English" in the Japanese-language equalizer 54038*a* and the English-language equalizer 54038*c* are simply representative of particular types of languages; for example, the English-language equalizer 54038*c* can be used also for Chinese, which is believed to have more information distributed in a comparatively high frequency range. The standard equalizer 54038*b* is intermediate between the two equalizers. Cartilage conduction occurs more easily at comparatively low frequencies. Accordingly, the Japanese-language equalizer 54038*a* reduces the sound volume to somewhat below the standard while slightly cutting down components in a high-frequency range; the English-language equalizer 54038*c* raises the sound volume to above the standard and thereby augments components in a high-frequency range while attenuating components in a low-frequency range.

The application processor 54039 controls the common mobile telephone functions, and in addition controls the switching unit 54038*d* according to different conditions. Specifically, Based on an equalizer switching operation done on the manual operation unit 54009, the application processor 54039 feeds a switching control signal to the switching unit 54038*d*. An operation on the manual operation unit 54009 overrides switching based on any other condition, and therefore whenever a user finds a result of automatic switching, described later, inappropriate, he can change it manually.

The manual operation unit 54009 further allows manual switching of the display language on the display unit 41005. Based on a display language switching operation, the application processor 54039 controls a display driver 54041 to switch the display language on the display unit 41005. In coordination with the display language switching operation on the display unit 41005, the application processor 54039 feeds a switching control signal to the switching unit 54038*d*. Conversely, the application processor 54039 can switch the display language in coordination with an equalizer switching operation when this is done manually. Whether to enable or disable the coordination can be set previously.

The application processor 54039 also feeds a switching control signal to the switching unit 54038*d* based on a change in language region detected by a GPS unit 54049. The application processor 54039 also feeds a switching control signal to the switching unit 54038*d* based on a result of inference by an incoming-call language inferring sound analyzer 50039*a* which analyzes incoming-call sound from a telephone function unit 54045. The incoming-call language inferring sound analyzer 50039*a* performs its function by, for example, checking whether or not the incoming-call sound contains particular consonants or vowels, particular words, or the like through matching with previously stored standard sound element patterns, and analyzing the intonation and rhythm of the incoming-call sound. Based on one or a combination of those criteria, the incoming-call language inferring sound analyzer 50039*a* infers the incoming-call language and calculates the probability to confirm the inference if sufficiently probable. The incoming-call language inferring sound analyzer 50039*a* is not necessarily intended to infer one language, but is intrinsically intended to decide which of the Japanese-language equalizer 54038*a*, the standard equalizer 54038*b*, and the English-language equalizer 54038*c* to adopt. When the probability of the inference is so low that the incoming-call language cannot be determined, no change is made from the currently set equalizer; or in such a case, the standard equalizer 54038*b* may be adopted.

FIG. 234 is a flow chart showing the operation of the application processor 54039 in the one-hundred forty-seventh embodiment in FIG. 233. The flow in FIG. 234 is intended to illustrate mainly the control for language switching and thus focuses on operation for functions related to it; in reality, the application processor 54039 involves operation other than that shown in FIG. 234, such as the functions of an common mobile telephone. The flow in FIG. 234 starts when the main power to the mobile telephone is turned on. In Step S942, as to the language equalizer and the display language, initial settings are put into effect. The initial settings can be previously selected by a user. For example, in a case where the mobile telephone is used by a Japanese user in Japan, the Japanese-language equalizer 54038*a* can be selected, and the display language on the display unit 41005 is set to Japanese.

Next, in Step S944, it is checked whether or not a manual operation for switching the equalizer has been done. If no such operation has been done, then, in Step S946, it is checked whether or not a mode in which the language equalizer is changed automatically is previously set. If the automatic change mode is set, then, in Step S948, it is checked whether or not a manual operation for switching the display language has been done. If no manual operation for switching the display language has been done, then, in Step S950, it is checked, based on a detection signal from the GPS unit 54049, whether or not, as a result of movement of the mobile telephone, a geographical change has occurred from the currently set language region to another language region. If no geographical change in language region has occurred, the flow advances to Step S952.

In Step S952, the incoming-call language inferring sound analyzer 50039*a* performs the incoming-call language inferring process. The content is as described above with reference to the block diagram in FIG. 233. On completion of the incoming-call language inferring process, in Step S954, whether or not the inference of a language in Step S954 has been confirmed. If the inference has been confirmed, then, in Step S956, it is checked whether or not a change has occurred from the currently set language to the inferred language. If a change to the inferred language is recognized, then the flow advances to Step S958. On the other hand, also if, in Step S950, a change in GPS language region has been detected, the flow advances to Step S958. If, in Step S948, a display language switching manual operation is detected, then first, in Step S960, switching to the display language reflecting the manual operation is performed, and then the flow advances to Step S958.

In Step S958, it is checked whether or not a predetermined time (e.g., 30 minutes) has passed after the equalizer switching manual operation on the manual operation unit 54009. If the predetermined time has passed, then, in Step S962, language equalizer switching is performed, and the flow then advances to Step S964. The function in Step S962 includes not performing switching even when the language has been changed if the applicable language equalizer has remained unchanged.

In Step S964, the display language is switched. Unlike with the equalizer, as for the display language, when the language changes, the display language is switched. Here, the aim of switching the display language always in coordination with the switching of the language equalizer in the automatic language equalizer change mode is to notify a user that the language equalizer has been changed automatically to prompt the user, if he finds the result inappropriate, to correct manually. As described above, when the language has changed, the display language is switched to that language. However, as for the equalizer, even when a change occurs between languages with similar frequency ranges, the equalizer is not switched. For example, when a change from English to Chinese occurs, the display language is changed but the equalizer is not switched: the English-language equalizer is used with both languages. On completion of the display language switching in Step S964, the flow advances to Step S966.

On the other hand, if, in Step S954, the language inference is not confirmed, or if, in Step S956, the inferred language is not different from the currently set one, or if, in Step S958, the predetermined time has not passed after the equalizer switching manual operation on the manual operation unit 54009, the flow advances to Step S966. A supplementary description of the significance of Step S958 will now be given. For discussion's sake, if Step S958 is not provided, even if a user takes the trouble to manually corrects the equalizer as he likes, when the flow, repeated as will be described later, goes through Step S960, S950, or S956, the automatic change function there automatically restores the equalizer setting before the correction. Owing to the provision of Step S958 as described above, even when automatic equalizer change is going to be performed as the flow goes through Step S960, S950, or S956, the language equalizer is not switched until the predetermined time passes, but the flow advances directly to Step S966. Thus, once the equalizer is switched manually in Step S944, the result of the manual switching is maintained for the predetermined time thereafter.

If, in Step S944, an equalizer switching manual operation has been done (in practice, for the convenience of a user who does not know which equalizer to use for which language, a user is only required to switch the language; accordingly, even when a user does a switching operation, a common language equalizer may continue to be used), the flow advances to Step S968, where the language equalizer is switched, and then the flow advances to Step S970. The operation in Step S968 includes continuing to use the same language equalizer even if a language switching operation is done as described above.

In Step S970, it is checked whether or not a coordinating mode is set in which display switching is coordinated with language switching for equalizer switching. If the coordinating mode is detected to be set, then the flow advances to Step S972, where the display language is switched, and then the flow advances to Step S966. On the other hand, if, in Step S970, the coordinating mode is not detected to be set, the flow advances directly to Step S966. This is because, for example when a Japanese user has received an incoming call in English, switching the equalizer may be appropriate but it is not always necessary to change the display language to English. Moreover, unlike with automatic switching, with manual switching, the user himself knows how the switching works, and therefore it is not necessary to change the display language and notify him of the change of equalizer.

If, in Step S946, the automatic language equalizer change mode is not detected to be previously set, the flow advances directly to Step S966.

In Step S966, it is checked whether or not the main power to the mobile telephone has been turned off. If the main power is not detected to have been turned off, the flow returns to Step S944, and thereafter, so long as the main power is not turned off, Steps S944 through S972 are repeated to cope with various situational changes related to language switching. On the other hand, if, in Step S966, the main power is detected to have been turned off, the flow ends.

(One-hundred Forty-eighth Embodiment)

FIG. 235 comprises a perspective view and top views of a one-hundred forty-eighth embodiment according to one aspect of the present invention, which is configured as a mobile telephone 54001. The one-hundred forty-eighth embodiment has much in common with the one-hundred forty-sixth embodiment in FIG. 232; therefore, common parts are identified by the same reference numerals, and no overlapping description will be repeated unless necessary. The one-hundred forty-eighth embodiment in FIG. 235 has a switching configuration different from the one in the one-hundred forty-sixth embodiment in FIG. 232. Moreover, the switching configuration here is suitable for switching for coping with different languages in cartilage conduction as discussed in connection with the one-hundred forty-seventh embodiment in FIGS. 233 and 234. However, the switching here is achieved mechanically, rather than by means of circuits, namely equalizers, as in the one-hundred forty-seventh embodiment.

As shown in a perspective view in FIG. 235(A), due to the switching in the one-hundred forty-eighth embodiment being achieved by means of an internal mechanism, its exterior appearance is substantially the same as in the one-hundred forty-third embodiment in FIG. 229. FIGS. 232(B) and 232(C) are top views of the mobile telephone 53001, respectively showing different coupling states of a flexible vibration-conducting plate 54027 with the right-ear and left-ear cartilage conduction units 47024 and 47026.

Specifically, FIG. 235(B) shows a state where the coupling between the vibration-conducting plate 54027 and the right-ear and left-ear cartilage conduction units 47024 and 47026 is comparatively shallow. That is, the vibration-conducting plate 54027 has, at opposite ends thereof, movable coupling parts **54027*a* and 54027*b* which move by exploiting the elasticity of the vibration-conducting plate 54027, and these movable coupling parts 54027*a* and 54027*b*, each in a state retracted inward, fit in holes 47024*a* and 47026*a* formed in the right-ear and left-ear cartilage conduction units 47024 and 47026 respectively. Thus, the depth over which the movable coupling parts 54027*a* and 54027*b* fit in is comparatively small. In other words, the vibration of the vibration-conducting plate 54027 is conducted at a position comparatively far away from the surface of the right-ear and left-ear cartilage conduction units 47024 and 47026 which make contact with the ear cartilage, and thus the thickness over which the vibration has to conduct across the elastic cartilage conduction unit is accordingly large. To allow free in-and-out movement of the vibration-conducting plate 54027 relative to the right-ear and left-ear cartilage conduction units 47024 and 47026, the movable coupling parts 54027*a* and 54027*b* of the vibration-conducting plate 54027 is not bonded to the linking unit 47027**, and is slidable relative to it.

By contrast, FIG. 235(C) shows a state where the coupling between the vibration-conducting plate 54027 and the right-ear and left-ear cartilage conduction units 47024 and 47026 is comparatively deep. That is, in FIG. 235(C), the movable coupling parts **54027*a* and 54027*b*, each in a state protruded outward, fit in the holes 47024*a* and 47026*a* formed in the right-ear and left-ear cartilage conduction units 47024 and 47026. Thus, the depth over which the movable coupling parts 54027*a* and 54027*b* fit in is comparatively large. In other words, the vibration of the vibration-conducting plate 54027 is conducted at a position comparatively close to the surface of the right-ear and left-ear cartilage conduction units 47024 and 47026** which make contact with the ear cartilage, and thus the thickness over which the vibration has to conduct across the elastic cartilage conduction unit is accordingly small.

As described above, in the one-hundred forty-eighth embodiment, the length of the elastic cartilage conduction unit that conducts the vibration of the vibration-conducting plate 54027 is changed mechanically so as to change the frequency characteristics of the vibration that reaches the surface of the cartilage conduction unit between FIG. 238(B) and FIG. 235(C). This structure is useful for mechanically changing the frequency characteristics of cartilage conduction according to language.

As mentioned previously, the switching mechanism in the one-hundred forty-sixth embodiment shown in FIG. 232, too, can change the level of the air-conduction sound component that enters the earhole by choosing whether or not to vibrate the front plate. Thus, this structure too is useful for mechanically changing the frequency characteristics of cartilage conduction according to language.

The above-described features of the present invention are not limited to the embodiment specifically described above, but can be implemented in any other embodiment so long as they provide their benefits. For example, although the one-hundred forty-sixth embodiment shown in FIG. 232 is described on the basis of the one-hundred forty-second embodiment in FIG. 228, it may instead be configured on the basis of the one-hundred forty-third embodiment in FIG. 229.

Although the one-hundred forty-seventh and one-hundred forty-eighth embodiments shown in FIGS. 233 to 235 are each configured as a single mobile telephone that is capable of changing frequency characteristics according to language, they may each be configured, instead, so as to provide a plurality of separate mobile telephones having different frequency characteristics corresponding to different languages, in which case each mobile telephone does not need to change frequency characteristics.

(One-hundred Forty-ninth Embodiment)

FIG. 236 comprises a perspective view, sectional views, a top view, and a side view of a one-hundred forty-ninth embodiment according to one aspect of the present invention, which is configured as a mobile telephone 55001. The one-hundred forty-ninth embodiment has much in common with the one-hundred forty-fifth embodiment in FIG. 231; therefore, common parts are identified by the same reference numerals, and no overlapping description will be repeated unless necessary. The one-hundred forty-ninth embodiment in FIG. 236 differs from the one-hundred forty-fifth embodiment in FIG. 231 in the structure with which the top frame 8227 is fitted and in the arrangement of a front camera and an infrared proximity sensor.

Specifically, an elastic member 52065 which serves as a vibration-absorbing member is interposed between the top frame 8227 and each of the right frame 8201*c*, the left frame 8201*e*, and the back plate 8201*b*. This makes it difficult for the vibration of the top frame 8227 to conduct to the latter three. On the other hand, the top frame 8227 makes direct contact with the front plate 8201*a*, so that the vibration of the top frame 8227 conducts to a top part of the front plate 8201*a*. This design has two meanings. For one thing, as will be described later, the vibration of a ridge part between the front plate 8201*a* and the top frame 8227 can be conducted to the ear cartilage efficiently. For another thing, without the provision of a talk receiver relying on air conduction, such as a speaker, a top part of the front plate 8201*a* over a comparatively large area vibrates to generate air-conduction sound with a level required in common mobile telephones.

In the one-hundred forty-ninth embodiment, a piezoelectric bimorph element 52025 as a vibration source is a compact, thin one as in the one-hundred forty-fifth embodiment in FIG. 231, and is affixed directly to the inner face of the top frame 8227. The vibration direction is perpendicular to the top face. With this configuration, in the one-hundred forty-ninth embodiment, a front camera 55017 and an infrared proximity sensor (an infrared light-emitter 55020 and an infrared proximity sensor 55021) are arranged at the middle of a top part of the mobile telephone 55001.

A perspective view in FIG. 236(A) shows the above structure, and there it is seen that the top frame 8227 makes direct contact with the front plate 8201*a*. Thus, the vibration of the top frame 8227 conducts to a top part of the front plate 8201*a*. At the middle of the top part of the front plate 8201*a*, the front camera 55017 is arranged which can shoot the operator viewing the large-screen display unit 8205 during a videophone session and which can be used to shoot the operator himself. With the front camera 55017 arranged at the middle of a top part of the front plate 8201*a* in this way, a user can shoot his own face from right in front. This arrangement of the front camera 55017 is made possible by the structure where a space is secured inside a top part of the mobile telephone 55001 by omitting a speaker as is arranged in an common mobile telephone and in addition by affixing, as a vibration source, a compact, thin piezoelectric bimorph element 52025 directly to the inner face of the top frame 8227.

Also arranged at the middle of a top part of the front plate 8201*a* is a proximity sensor unit comprising the infrared light-emitter 55020 and the infrared proximity sensor 55021. The aim is to detect the mobile telephone 55001 being put on the ear. With a proximity sensor unit arranged at the middle of the top part of the front plate 8201*a* in this way, irrespective of whether a right corner part 8224 is put on the cartilage of the right ear or a left corner part 8226 is put on the left ear, the contact can reliably be detected. On detecting the contact, it is possible, for example, to put out the backlight of the large-screen display unit 8205 and turn off the function of the touch panel. This arrangement of the proximity sensor unit too is made possible by the structure where a space is secured inside a top part of the mobile telephone 55001 by omitting a speaker as is arranged in an common mobile telephone and in addition by affixing, as a vibration source, a compact, thin piezoelectric bimorph element 52025 directly to the inner face of the top frame 8227.

As will be clear from FIG. 236(B), which is a sectional view along B1-B1 in FIG. 236(A), the compact piezoelectric bimorph element 52025 is affixed directly to the inner face of the top frame 8227. Moreover, as indicated by broken lines, the front camera 55017 is arranged in the space secured by omitting a speaker as is arranged in an common mobile telephone and in addition by affixing a compact, thin piezoelectric bimorph element 52025 directly to the inner face of the top frame 8227. The proximity sensor unit too is arranged in the middle space secured as described above, but to avoid complication, it is omitted from illustration. The vibration direction of the piezoelectric bimorph element 52025 is, as indicated by arrows 52025*a*, perpendicular to the top face of the mobile telephone 55001.

In FIG. 236(C), which is a top view, it is seen that the top frame 8227 and the front plate 8201*a* make direct contact with each other with no elastic member 52065 interposed. Also in FIG. 236(D), which is a sectional view along line B2-B2 of FIG. 236(A) or 236(B), it is seen that the top frame 8227 and the front plate 8201*a* make direct contact with each other, and that the front camera 55017 is arranged in the space secured at the middle of a top part inside the mobile telephone 55001. Also in FIG. 236(E), which is a left side view of FIG. 236(A), it is seen that a left corner part 8226 of the top frame 8227 and the front plate 8201*a* make direct contact with each other.

In the one-hundred forty-ninth embodiment, owing to the configuration described above, the vibration of the piezoelectric bimorph element 52025 perpendicular to the top face of the mobile telephone 55001 conducts to the entire top frame 8227. Thus, as described in connection with the previous embodiments, with the right corner part 8224 put near the tragus of the right ear cartilage, or with the left corner part 8226 put near the tragus of the left ear cartilage, cartilage conduction can be obtained comfortably and efficiently in a way that fits the shape of the ear. A ridge part in a top front part of the mobile telephone 55001 between the front plate 8201*a* and the upper frame 8227 vibrates vigorously; thus, even when the mobile telephone 55001 is held such that a middle part of a top part of the mobile telephone 55001 is located in front of the external auditory meatus as with conventional mobile telephones, satisfactory cartilage conduction is obtained from the ridge part to the auricle. Moreover, also the air-conduction sound resulting from the vibration of the top part of the front plate 8201*a* enters the external auditory meatus. This air-conduction sound has a sound volume that meets a speaker standard for common mobile telephones. Even when the ridge part in the top front part of the mobile telephone 55001 is put on the auricle, by using it in a manner as will be described later, it is possible to produce a closed external auditory meatus effect.

The touch panel function of the large-screen display unit 8205 in the one-hundred forty-ninth embodiment can be exploited to achieve volume control by GUI. Specifically, a touch panel operation can invoke a volume adjustment mode, in which the sound volume can be adjusted through the touching of volume-up and -down operation parts that are displayed. By such volume adjustment performed through touch panel operation, the sound volume can be raised such that the air-conduction sound generated from the front plate 8201*a* has a level that meets a measurement standard for an ordinary speaker. On the other hand, when the mobile telephone 55001 of the one-hundred forty-ninth embodiment is used by exploiting cartilage conduction, the sound volume can be lowered such that the generated air-conduction sound has a level lower than a measurement standard for an ordinary speaker. Thus, the mobile telephone 55001 of the one-hundred forty-ninth embodiment allows volume adjustment covering two ranges as described above.

More specifically, through volume adjustment operation as described above, the mobile telephone 55001 can adjust the intensity of the vibration of the piezoelectric bimorph element 52025 for cartilage conduction at least between a first intensity (strong vibration) and a second intensity (weak vibration). Moreover, with the vibration that conducts from the top frame 8227, to which the piezoelectric bimorph element 52025 is affixed, to the front plate 8201*a*, air-conduction sound whose volume changes with the intensity of the vibration of the piezoelectric bimorph element 52025 is generated from a top part of the front plate 8201*a*. The above-mentioned first intensity of vibration is an intensity sufficient to generate, from the top part of the front plate 8201*a*, air-conduction sound with a volume that is necessary in a measurement method conforming to a standard for common mobile telephones (a measurement method in which the intensity of air-conduction sound collected by a predetermined microphone at a predetermined distance from the part of a mobile telephone at which it is put on the ear, the measurement target typically being air-conduction sound at a predetermined distance from a speaker). On the other hand, the above-mentioned second intensity of vibration is an intensity insufficient to generate, from the top part of the front plate 8201*a*, air-conduction sound with the volume that is necessary in the measurement method conforming to the standard for common mobile telephones, and is such that the sound pressure inside the external auditory meatus as measured at a depth of 1 cm from the entrance of the external auditory meatus with the top part of the mobile telephone 55001 in contact with the ear cartilage is higher than the sound pressure inside the external auditory meatus as measured likewise at a depth of 1 cm from the entrance of the external auditory meatus with the top part of the mobile telephone out of contact with but close to the entrance of the external auditory meatus with the vibration at the first intensity. This results from the effect of cartilage conduction.

FIG. 237 shows a method for using the one-hundred forty-ninth embodiment in FIG. 236 for cartilage conduction, comprising side views of the right ear and top views of the head, all being schematic. In FIG. 237(A), as in other embodiments, a right corner part 8224 is put on the ear cartilage near the tragus 32 of the right ear 28. In this method of reception, the corner part of the mobile telephone 55001 fits the shape of the right ear 28. In this method of use, in a noisy environment, a user's natural motion to increase the pressure on the right ear 28 for better reception causes the tragus 32 to close the external auditory meatus, and owing to this closed external auditory meatus effect, target sound is augmented while outside sound is blocked.

Figure 237A:
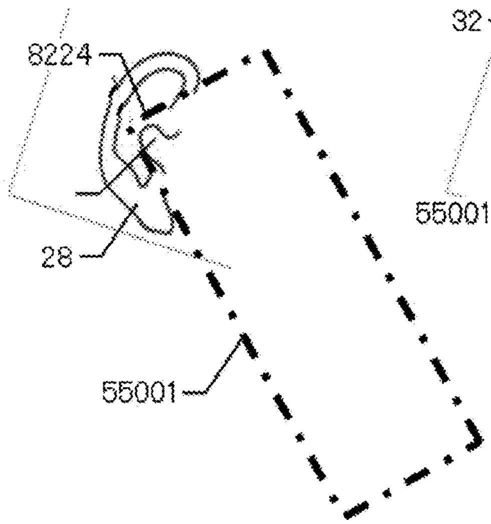
Figure 237B:
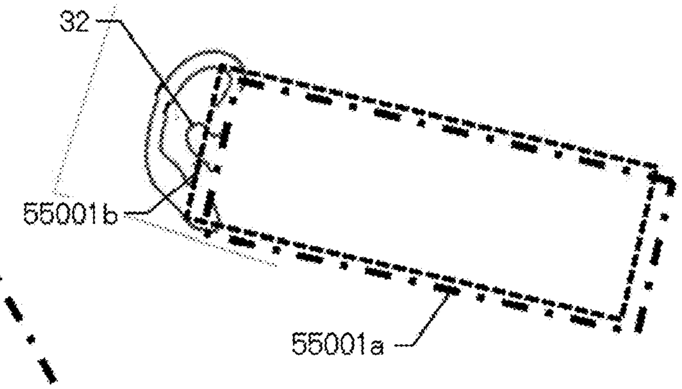

On the other hand, FIG. 237(B) shows another method of use in which the mobile telephone 55001 is put on the right ear 28 with the face pointing frontward, wherein the mobile telephone 55001 is held transversely, roughly horizontally, such that a middle part of a ridge part of a top front part of the mobile telephone 55001 is put on a base part of the tragus 32 (a front edge part of the entrance of the external auditory meatus) from in front of the right ear 28. In the method of use shown in FIG. 237(B), when the mobile telephone 55001 is put on the right ear 28 with the user in a forward inclined posture as often seen during an ordinary call, the mobile telephone 55001 held in the right hand has a natural inclination, making its use comfortable to the user. When the method of use in FIG. 237(B) is adopted, and a middle part of the mobile telephone 55001 is put on the right ear 28, the mobile telephone 55001 does not cover the right ear 28, and thus the tragus is not flattened. Thus, the middle part of the ridge part can be put on the cartilage in a front edge part of the entrance of the external auditory meatus (the base of the tragus 32). The display screen is then prevented from being soiled by contact with the auricle or cheek. This position of the mobile telephone 55001*a* is indicated by a dash-and-dot line in FIG. 237(B). In this method of use, in an environment with loud noise, the mobile telephone 55001 can be pressed slightly further rearward. The tragus 32 is then pressed and bent to close the external auditory meatus, producing a closed external auditory meatus effect. This position of the mobile telephone 55001*b* is indicated by a broken line in FIG. 237(B). A closed external auditory meatus effect can be produced without flattening the auricle.

Figure 237C:
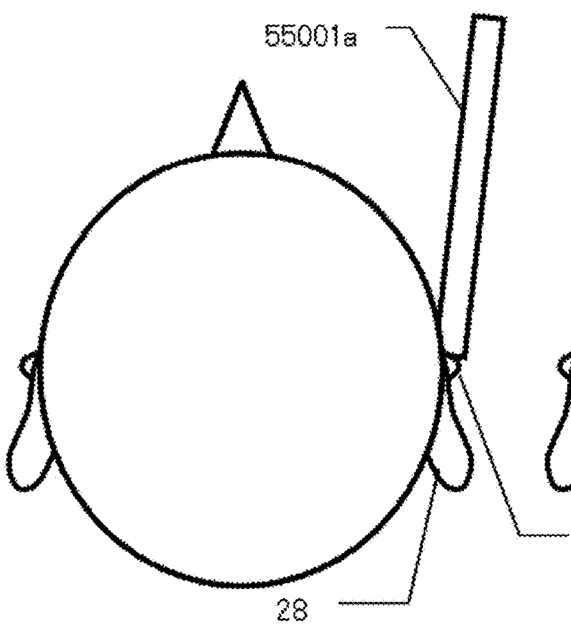
Figure 237D:
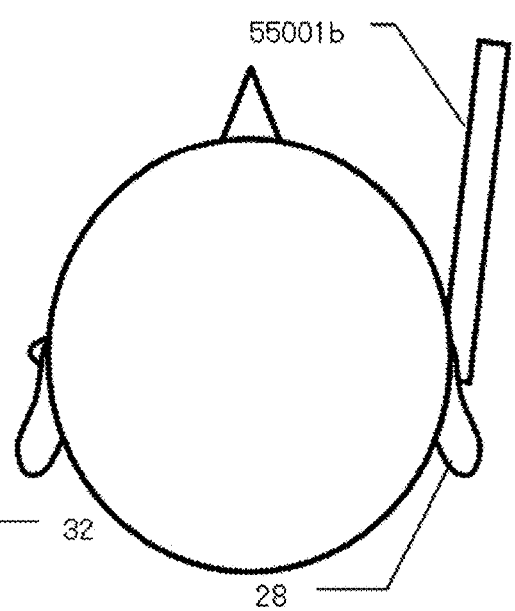

On the other hand, FIG. 237(C) is a schematic diagram of the head as seen from above, showing a state corresponding to the position of the mobile telephone 55001*a* in FIG. 237(A). It is seen that the mobile telephone 55001*a* is put on the base of the tragus 32. FIG. 237(D) shows a state corresponding to the position of the mobile telephone 55001*b* in FIG. 237(B). It is seen that the mobile telephone 55001*a* is pressed further rearward so that the tragus 32 bends rearward to close the external auditory meatus. As described above, according to the one-hundred forty-ninth embodiment, it is possible to perform cartilage conduction reception, and cartilage conduction reception accompanied by a closed external auditory meatus effect, with a mobile telephone held in a manner closer to a conventional manner (but more comfortable in that the auricle is not covered and is not flattened).

FIG. 238 comprises perspective views of a mobile telephone, showing examples of explanations of methods of its use in the one-hundred forty-ninth embodiment shown in FIG. 237. FIG. 238(A) shows an explanation of right-ear reception using a corner part shown in FIG. 237(A), which is similar to that in FIG. 150(C) showing the ninety-seventh embodiment. Specifically, on the large-screen display unit 8205, the right corner part 8224 is graphically indicated, and a guidance message is displayed saying "To hear, put this corner on the right earhole". The display may be accompanied by similar guidance sounded from a videophone speaker. Likewise, FIG. 238(B) shows an explanation of left-ear reception using a corner part. On the large-screen display unit 8205, the left corner part 8226 is indicated graphically, and a guidance message is displayed saying "To hear, put this corner on the left earhole". As with the guidance for the right ear, the display here may be accompanied by similar sounded guidance. As with switching between FIGS. 150(C) and (D) in the ninety-seventh embodiment, switching between FIGS. 237(A) and (B) is performed automatically by detecting the inclination of the mobile telephone.

On the other hand, FIG. 238(C) shows an explanation of reception using the middle part of the ridge of the top part shown in FIG. 237(B). Specifically, on the large-screen display unit 8205, the middle of the top part of the mobile telephone is indicated graphically, and a guidance message is displayed saying "To hear, put the top end in front of the earhole from ahead". In addition, a message is displayed saying "You can hear well without covering the ear" to mention the distinctive feature of the present invention. As in FIGS. 238(A) and (B), the display may be accompanied by similar guidance sounded from a videophone speaker.

FIG. 238(D) shows an explanation that is called up automatically in an environment with loud noise and is displayed alternately with the one in FIG. 238(C) at time intervals of about three seconds. The explanation contains a graphical indication of the direction in which to press further, and a message saying "In noisy surroundings, press the phone further back to close the earhole so that you can hear louder with less outside sound".

In cases where, as in FIG. 238, methods of use are indicated graphically on the large-screen display unit 8205, a better understanding will be achieved by displaying not only explanations in text but also schematic diagrams showing methods of use as in FIG. 237.

(One-hundred Fiftieth Embodiment)

FIG. 239 comprises a perspective view, sectional views, and a top view of a one-hundred fiftieth embodiment according to one aspect of the present invention, which is configured as a mobile telephone 56001. The one-hundred fiftieth embodiment has much in common with the one-hundred forty-ninth embodiment in FIG. 236; therefore, common parts are identified by the same reference numerals, and no overlapping description will be repeated unless necessary. The one-hundred fiftieth embodiment in FIG. 239 differs from the one-hundred forty-ninth embodiment in FIG. 236 chiefly in casing structure.

Specifically, the casing of the mobile telephone 56001 is composed of a box-shaped case 56227, which is open at the front, and a front plate 56201, which fits in the case 56227 to cover its front. As in the one-hundred forty-ninth embodiment, a piezoelectric bimorph element 52025 as a vibration source is affixed to the inner side of the top face of the case 56227. Here, the case 56227 makes direct contact with the front plate 56201, and thus the vibration of the top face of the case 56227 conducts to a top part of the front plate 56201. As a result, as in the one-hundred forty-ninth embodiment, the vibration of a ridge part between the front plate 56201 and a top part of the case 56227 conducts to the ear cartilage efficiently. Moreover, even without the provision of a talk receiver relying on air conduction, such as a speaker, the top part of the front plate 56201 over a comparatively large area vibrates to generate air-conduction sound with a level required in common mobile telephones.

Also in the one-hundred fiftieth embodiment, as in the one-hundred forty-ninth embodiment, the piezoelectric bimorph element 52025 as a vibration source is a compact, thin one, and is, as mentioned above, affixed directly to the inner side of the top face of the case 56227. Its vibration direction is, as in the one-hundred forty-ninth embodiment, perpendicular to the top face. With this configuration, also in the one-hundred fiftieth embodiment, a front camera 56017 and a proximity sensor unit 56019 can be arranged at the middle of a top part of the mobile telephone 56001.

A perspective view in FIG. 239(A) shows the structure described above, and there it is seen that the case 56227 makes direct contact with the front plate 56201. Thus, the vibration of the top part of the case 56227 conducts to the top part of the front plate 56201. At the middle of the top part of the front plate 56201, the proximity sensor unit 56019 is arranged, which comprises an infrared light-emitter 56020 and an infrared proximity sensor 56021 that are integrated into a unit. With the proximity sensor unit 56019 arranged at the middle of the top part of the front plate 56201 in this way, as in the one-hundred forty-ninth embodiment, irrespective of whether the right corner part 8224 is put on the cartilage of the right ear or the left corner part 8226 is put on the left ear, the contact is detected reliably. This arrangement of the proximity sensor unit 56019 is made possible by the structure where a space is secured inside a top part of the mobile telephone 56001 by omitting a speaker as is arranged in an common mobile telephone and in addition by affixing, as a vibration source, a compact, thin piezoelectric bimorph element 52025 directly to the inner side of the top face of the case 56227.

Near the middle of the top part of the front plate 56201, the front camera 56017 is arranged. Thus, roughly as in the one-hundred forty-ninth embodiment, a user can shoot his own face from right in front. This arrangement of the front camera 56017, too, is made possible by the structure where a space is secured inside a top part of the mobile telephone 56001 by omitting a speaker as is arranged in an common mobile telephone and in addition by affixing, as a vibration source, a compact, thin piezoelectric bimorph element 52025 directly to the inner side of the top face of the case 56227.

As will be clear from FIG. 239(B), which is a sectional view along line B1-B1 in FIG. 239(A), as in the one-hundred forty-ninth embodiment, the compact piezoelectric bimorph element 52025 is affixed directly to the inner side of the top face of the case 56227. As indicated by a broken line, the proximity sensor unit 56019 is arranged in the middle space secured by omitting a speaker as is arranged in an common mobile telephone and in addition by affixing a compact, thin piezoelectric bimorph element 52025 directly to the inner side of the top face of the case 56227. As for the front camera 56017 arranged near the middle, to avoid complication, it is omitted from illustration. The vibration direction of the piezoelectric bimorph element 52025 is, as indicated by arrows 52025*a*, perpendicular to the top face of the mobile telephone 56001 as in the one-hundred forty-ninth embodiment.

In FIG. 239(C), which is a top view, it is seen that the front plate 56201 makes direct contact with, and fits in, the front of the case 56227. Also in FIG. 239(D), which is a sectional view along line B2-B2 in FIGS. 239(A) to 239(C), it is seen that the front plate 56201 makes direct contact with the front of the case 56227, and that the proximity sensor unit 56019 is arranged in the middle space secured in the top part inside the mobile telephone 56001.

In the one-hundred fiftieth embodiment configured as described above, as in the one-hundred forty-ninth embodiment, the vibration of the piezoelectric bimorph element 52025 perpendicular to the top face of the mobile telephone 56001 conducts to the entire top frame 56227. Thus, as described in connection with the previous embodiments, with the right corner part 8224 put near the tragus of the right ear cartilage, or with the left corner part 8226 put near the tragus of the left ear cartilage, cartilage conduction can be obtained comfortably and efficiently in a way that fits the shape of the ear. A ridge part in a top front part of the mobile telephone 56001 between the front plate 56201 and the top face of the case 56227 vibrates vigorously. Thus, even when the mobile telephone 56001 is held such that a middle part of a top part of the mobile telephone 56001 is located in front of the external auditory meatus as with conventional mobile telephones, satisfactory cartilage conduction is obtained from the ridge part to the auricle. Moreover, also the air-conduction sound resulting from the vibration of the top part of the front plate 56201 enters the external auditory meatus. As in the one-hundred forty-ninth embodiment, this air-conduction sound has a sound volume that meets a speaker standard for common mobile telephones. Even when the ridge part in the top front part of the mobile telephone 56001 is put on the auricle, by using it in the manner described with reference to FIG. 237 showing the one-hundred forty-ninth embodiment, it is possible to produce a closed external auditory meatus effect. Also in the one-hundred fiftieth embodiment, explanations of methods of use as shown in FIG. 238 can be displayed.

The above-described features of the present invention are not limited to the embodiment specifically described above, but can be implemented in any other embodiment so long as they provide their benefits. Also, features from different embodiments can be implemented in intermingled manners. For example, the arrangement of the front camera and the proximity sensor unit in the one-hundred forty-ninth and one-hundred fiftieth embodiments is not limited to those specific embodiments, but may be adopted in any other embodiment. As to how to make good use of the space secured by omitting an ordinary speaker or other vibration source from a front-face part of a mobile telephone, various layouts can be adopted for components, like a front camera and a proximity sensor unit, that benefit from being arranged at the middle.

As for explanations of methods of use like those shown in FIGS. 238(C) and (D) and diagrammatic explanations like those shown in FIG. 237, these can be presented not only on the display surface of products themselves as in the embodiment but also in instruction manuals attached to products, in catalogs of products, or via various advertising media or the like including electronic media available on the Internet or the like.

Methods of use like those shown in FIG. 237(B) to (D) and FIGS. 238(C) and (D) are not limited to configurations where, as in the one-hundred forty-ninth and one-hundred fiftieth embodiments, comparatively loud air-conduction sound is generated as well, but are useful also in mobile telephones configured to suppress generation of air-conduction sound as in the one-hundred forty-fifth embodiment in FIG. 231.

<Summary>

The following is a description summarizing the various technical features that have been disclosed in the present specification.

<First Technical Feature>

A first technical feature disclosed in the present specification provides a mobile telephone in which the upper part of the mobile telephone is provided with a cartilage conduction vibration unit that makes contact with ear cartilage. It is thereby possible to provide a mobile telephone which makes use of the excellent performance exhibited by ear cartilage in regard to transmitting audio information, and which can be used without a sense of discomfort from pressure or insertion into the ear, the user experience being similar to that of the normal state of a telephone call.

According to a specific feature, the cartilage conduction vibration unit is configured so as not to protrude from the outer wall of the mobile telephone. It is thereby possible to achieve a shape whose absence of awkward protruding parts caused by the arrangement of the cartilage conduction vibration unit compromises neither the function nor the aesthetics of the mobile telephone.

According to a more specific feature, the cartilage conduction vibration unit is arranged at an upper part corner on the ear side of the mobile telephone. It is thereby possible to achieve an arrangement where the cartilage conduction vibration unit does not protrude from the outer wall of the mobile telephone, by which natural contact with the ear cartilage can be realized.

According to an even more specific feature, the cartilage conduction vibration unit is arranged on one of the upper part corners on the ear side of the mobile telephone that faces diagonally downward in the usage posture. It is thereby possible for the cartilage conduction vibration unit to be brought into contact with the ear cartilage in a state that is awkward neither to the person making the telephone call nor to onlookers, due to the posture approximating the normal state of a telephone call, in which the mobile telephone is held by hand and brought up against the ear. Such a posture is doubly suitable, due to being suitable for making contact with the tragus and due to the tragus being particularly highly effective in terms of cartilage conduction.

According to another specific feature, there are two of the cartilage conduction vibration units provided to the upper part of the mobile telephone. Such a configuration is suitable by virtue of there being more effective contact with the ear cartilage. The two cartilage conduction vibration units can, for example, be configured such that one is made to vibrate in accordance with whether the right ear or the left ear is being used, thus providing support for switching between holding with the left and right hand.

According to a further specific feature, a sensor for detecting which of the two cartilage conduction vibration units is in contact with the ear is provided to the upper part of the mobile telephone, and one of the two cartilage conduction vibration units is made to vibrate in accordance with the output of the sensor. Alternatively, a gravitational acceleration detection unit is instead provided, one of the two cartilage conduction vibration units being made to vibrate in accordance with the direction of gravitational acceleration detected by the gravitational acceleration detection unit. The elements described above may also be used concurrently to detect when the hand holding the mobile telephone is switched.

According to another feature, in a mobile telephone having a videoconferencing function, the functions of the cartilage conduction vibration unit are prohibited whenever the videoconferencing function is in operation. The cartilage conduction vibration unit can thereby be prevented from functioning without purpose in the state where the mobile telephone is not to be brought up against the ear.

According to yet another feature, a folding structure is included, the functions of the cartilage conduction vibration unit being prohibited in a folded state in a case where the cartilage conduction vibration unit is arranged at a position at which contact with the ear cartilage becomes impossible in the folded state. The cartilage conduction vibration unit can thereby be prevented from functioning without purpose in the state where the mobile telephone cannot be held up against the ear.

According to another feature, there is provided an audio output device, comprising: an audio output unit; a controller for simultaneously outputting audio information to the audio output unit and the cartilage conduction vibration unit; and a phase adjustment unit for phase-adjusting the phase of an audio signal being outputted to the audio output unit and the cartilage conduction vibration unit. It is thereby possible to prevent the adverse event caused when the same audio information is transmitted by two systems, i.e., bone conduction and air vibration from the external auditory meatus.

According to another feature, there is provided an audio output device, comprising: a bone conduction vibration unit, an environment noise microphone; and a phase adjustment unit for inverting the phase of, and then outputting to the cartilage conduction vibration unit, audio information that has been picked up by the environment noise microphone. It thereby becomes possible to cancel out the environment noise from the environment noise and useful audio information conducted by air vibration from the external auditory meatus.

<Second Technical Feature>

A second technical feature disclosed in the present specification provides a mobile telephone having cartilage conduction vibration unit, which includes a cartilage conduction vibration source, as well as a cartilage conductor for guiding the vibration of the cartilage conduction vibration source to the upper part of the mobile telephone in contact with the ear cartilage. It is thereby possible to provide a mobile telephone that makes use of the excellent performance exhibited by ear cartilage in regard to transmitting audio information, and which can be used without a sense of discomfort from pressure or insertion into the ear, the user experience approximating that of the normal state of a telephone call. Furthermore, according to the configuration of the cartilage conduction vibration unit described above, the vibration of the cartilage conduction vibration source is guided by the cartilage conductor to a desired position, which is advantageous in that a greater amount of freedom is provided for the layout of the cartilage conduction vibration source itself and in that the cartilage conduction vibration unit can be installed on a mobile telephone lacking any available extra space.

According to a specific feature, the cartilage conduction vibration source and the cartilage conductor are configured so as not to protrude from an outer wall of the mobile telephone. It is thereby possible to achieve a shape whose absence of awkward protruding parts caused by the arrangement of the cartilage conduction vibration unit compromises neither the function nor the aesthetics of the mobile telephone. According to an even more specific feature, the end part of the cartilage conductor is arranged at an upper part corner of the ear side of the mobile telephone. It is thereby possible to achieve an arrangement where the cartilage conduction vibration units do not protrude from the outer wall of the mobile telephone, by which a natural contact with the ear cartilage can be realized. According to a further specific feature, the end part of the cartilage conductor is arranged on one of the upper part corners on the ear side of the mobile telephone that faces diagonally downward during the usage posture. It is thereby possible for the cartilage conduction vibration unit to be brought into contact with the ear cartilage in a state that is awkward neither to the person making the telephone call nor to onlookers, due to the posture approximating the normal state of a telephone call, in which the mobile telephone is held by hand and brought up against the ear. Such a posture is doubly suitable, because it is suitable for contact with the tragus and also because the tragus is particularly highly effective in terms of cartilage conduction.

According to another specific feature, the two ends of the end parts of the cartilage conductor are arranged at both corners of the upper part on the ear side of the mobile telephone. Such a configuration is suitable by virtue of there being more effective contact with the ear cartilage. One of the two ends of the end parts of the cartilage conductor can, for example, be brought into contact with the ear cartilage as appropriate, in accordance with whether the right ear or the left ear is being used, thus providing support for readily switching between holding the mobile telephone with the left and right hand.

According to another feature, there is provided a mobile telephone comprising: a cartilage conduction vibration unit brought into contact with ear cartilage; a gravitational acceleration detection unit; and a controller for prohibiting the cartilage conduction vibration unit from vibrating whenever the gravitational acceleration detection unit detects that the mobile telephone is in a stationary state. It is thereby possible to prevent the cartilage conduction vibration unit from uselessly vibrating and generating a distracting sound when, for example, the mobile telephone is placed on a desk or the like with the cartilage conduction vibration unit facing down.

According to a specific feature, the mobile telephone includes a sensor for detecting the presence or absence of an object in proximity with the cartilage conduction vibration unit, where the controller causes the cartilage conduction vibration unit to vibrate in accordance with whether the sensor detects an object in proximity, and prohibits the cartilage conduction vibration unit from vibration, irrespective of whether the sensor detects an object in proximity, whenever the gravitational acceleration detection unit detects that the mobile telephone is in a stationary state. The sensor for detecting the presence or absence of an object in proximity is a useful configuration for detecting when the mobile telephone has been brought up against the ear and causing the cartilage conduction vibration unit to vibrate, but when, for example, the mobile telephone has been placed on a desk or the like, there is the potential for this state to be falsely confirmed as contact to the ear and for the cartilage conduction vibration unit to be made to vibrate. Herein, the aforesaid specific feature can prevent the generation of uncomfortable sound due to the vibration of the cartilage conduction vibration unit based on such false confirmation.

According to another feature, there is provided a mobile telephone comprising: a cartilage conduction vibration unit to be brought into contact with ear cartilage; an audio input unit; a phase inverter for phase-inverting audio information inputted from the audio input unit; and a controller for outputting, from the cartilage conduction vibration unit, the audio information having been phase-inverted by the phase inverter. It is thereby possible to appropriately minimize any discomfort based on one's own voice during a conversation by mobile telephone in the state where the cartilage conduction vibration unit has been brought into contact with the ear cartilage.

According to a specific feature, the mobile telephone includes an acoustics adjustment unit, where the controller outputs, from the cartilage conduction vibration unit, audio information that has been acoustically adjusted by the acoustics adjustment unit and also phase-inverted by the phase inverter. It is thereby possible to more appropriately minimize any discomfort that is based on one's own voice during a conversation by mobile telephone.

According to another specific feature, the mobile telephone includes a contact state detection unit for detecting the state where the cartilage conduction vibration unit is in contact with the ear cartilage, where the controller determines whether or not to output, from the cartilage conduction vibration unit, audio information that has been phase-inverted by the phase inverter in accordance with the state detected by the contact state detection unit. It is thereby possible to more appropriately control the discomfort that is based on one's own voice in accordance with the state where the mobile telephone is in contact with the ear cartilage.

According to a more specific feature, the contact state detection unit detects when the cartilage conduction vibration unit is in contact with the ear cartilage in the state where the ear hole is blocked by the mobile telephone being in contact with the ear cartilage, the earplug bone conduction effect thus occurring, where the controller outputs, from the cartilage conduction vibration unit, audio information that has been phase-inverted by the phase inverter in accordance with a detection that the cartilage conduction vibration unit is in contact with the ear cartilage in the state where the earplug bone conduction effect occurs. The earplug bone conduction effect, which occurs due to the ear hole being blocked, achieves a listening status with dual effects, in which audio information from the cartilage conduction vibration unit is conducted by even louder sound and in which environmental noise is obstructed. However, the earplug bone conduction effect is meanwhile accompanied by the discomfort of one's own voice through bone conduction from the vocal cords. The aforesaid feature is advantageous in attenuating such discomfort of one's own voice.

According to another feature, there is provided a piezoelectric element control device comprising: a conduction vibration unit that includes a piezoelectric element and transmits vibration of the piezoelectric element by being brought into contact with a body to which conduction is directed; a signal output unit for outputting conduction vibration information to the piezoelectric element; and a pressure detection unit for detecting, through the piezoelectric element, changes in the contact pressure between the conduction vibration unit and the body to which conduction is directed. By such a configuration, the piezoelectric element can serve a dual purpose as an output element for contact vibration and also as a contact pressure sensor, and conduction vibration can be outputted in accordance with a variety of circumstances. Such a piezoelectric element control device is configured as a mobile telephone, the body to which conduction is directed being the ear cartilage, and is suitable for detecting the state where the cartilage conduction vibration unit is in contact with the ear cartilage depending on the pressure changes sensed by the piezoelectric element.

<Third Technical Feature>

A third technical feature disclosed in the present specification provides a mobile telephone comprising a cartilage conduction vibration source and a conductor for guiding the vibration of the cartilage conduction vibration source to the ear cartilage, wherein the conductor is an elastic body. It is thereby possible to effectively listen to the audio information from the cartilage conduction vibration source, and possible to achieve softer contact with the ear.

According to a specific feature, the conductor is sized so as to contact the ear cartilage at a plurality of points. Effective cartilage conduction can thereby be obtained.

According to another specific feature, the conductor is sized so as to contact the ear cartilage and block the external auditory meatus. It is thereby possible to effectively listen to audio information from the cartilage conduction vibration source, and effectively reduce exterior noise.

According to another specific feature, the conductor has at least a surface area approximating that of the ear lobe. It is thereby possible to effectively listen to audio information from the cartilage conduction vibration source, and block the external auditory meatus in a natural manner according to need.

According to another specific feature, the conductor has an acoustic impedance approximating the acoustic impedance of ear cartilage. Audio information from the cartilage conduction vibration source can accordingly be effectively guided to the ear cartilage.

According to another specific feature, the conductor is configured as a cover for the mobile telephone. According to such a configuration, housing the mobile telephone in the cover makes it possible to effectively listen to audio information from the cartilage conduction vibration source in a natural manner.

According to a more specific feature, the mobile telephone includes an outgoing-talk unit (microphone), and the cover of the mobile telephone includes Larsen effect prevention means between the conduction vibration source and the outgoing-talk unit. It is thereby possible to prevent the Larsen effect while also possible to effectively listen to the audio information from the cartilage conduction vibration source. According to another more specific feature, the mobile telephone includes an outgoing-talk unit, and the cover of the mobile telephone includes an air conduction unit in the vicinity of the outgoing-talk unit. It is thereby possible to listen to the voice of the other party, which is generated by the bone conduction vibration source, while also sending one's own voice from the outgoing-talk unit, and also thereby possible to have a two-way conversation in a natural manner, even while the mobile telephone remains housed in the cover.

According to another specific feature, the conductor is configured as a grip unit of the mobile telephone. It is thereby possible to introduce, to the mobile telephone, an elastic body for effectively guiding the audio information of the conductor, in a manner that is in harmony with the other functions of the mobile telephone.

According to another feature, there is provided a mobile telephone comprising: a cartilage conduction vibration source serving as an incoming-talk unit; a conduction vibration source serving as an incoming-talk unit; and a shared outgoing-talk unit. It is thereby possible to provide a mobile telephone permitting a two-way conversation in accordance with the environment of the telephone call. Specifically, providing the shared outgoing-talk unit to an end part of the mobile telephone is useful for the aforesaid configuration.

According to another feature, there is provided a mobile telephone comprising: a cartilage conduction vibration source; and a conductor for guiding vibration of the cartilage conduction vibration source to the ear cartilage; wherein the conductor is sized so as to contact the ear cartilage at a plurality of points; is sized so as to contact the ear cartilage and block the external auditory meatus; has at least a surface area approximating that of an ear lobe; or has an acoustic impedance approximating the acoustic impedance of the ear cartilage. Any of these features or a combination thereof makes it possible to listen effectively to sound information using the cartilage conduction vibration source.

<Fourth Technical Feature>

A fourth technical feature disclosed in the present specification provides a mobile telephone comprising: a cartilage conduction vibration source; a mobile telephone body; an anti-impact cushioning part provided between the mobile telephone body and the cartilage conduction vibration source; and a conductor for guiding the vibration of the cartilage conduction vibration source to the ear cartilage. A vibration source resistant to impact can thereby be employed in a mobile telephone as the cartilage conduction vibration source. According to a specific feature, the conductor is an elastic body. It is thereby possible to cushion impact on the mobile telephone body and additionally impact from outside the conductor, and also thereby possible to obtain effective cartilage conduction. According to another specific feature, a vibration source resistant to impact and suitable as a cartilage conduction vibration source includes a piezoelectric bimorph element.

According to another specific feature, the anti-impact cushioning part and the conductor are configured so as to enclose the cartilage conduction vibration source. It is thereby possible to effectively cushion the cartilage conduction vibration source while also rendering the cartilage conduction more effective, rather than compromising the efficacy of cartilage conduction. According to yet another specific feature, the conductor and the anti-impact cushioning part are composed of the same material. According to a further specific feature, the cartilage conduction vibration source is inserted into and integrally molded with the conductor and anti-impact cushioning part. It is thereby made possible to provide a practical configuration by which cushioning efficacy and favorable cartilage conduction efficacy can be simultaneously achieved. According to another specific feature, the conductor and anti-impact cushioning part are joined sandwiching the cartilage conduction vibration source. It is thereby made possible to provide another practical configuration by which cushioning efficacy and favorable cartilage conduction efficacy can be simultaneously achieved.

According to yet another feature, the conductor is sized so as to contact the ear cartilage at a plurality of points. According to another specific feature, the conductor is sized so as to contact the ear cartilage and block the external auditory meatus. According to yet another specific feature, the conductor has at least a surface area approximating that of the ear lobe. According to another specific feature, the conductor has an acoustic impedance approximating the acoustic impedance of the ear cartilage. These features make it possible to render cartilage conduction more effective and to reduce exterior noise in accordance with need, while simultaneously cushioning the cartilage conduction vibration source.

According to another feature, there is provided a mobile telephone comprising: a cartilage conduction vibration source; a conductor for guiding the vibration of the cartilage conduction vibration source to the ear cartilage; and a resonator for converting the vibration of the cartilage conduction vibration source to air conduction. It is thereby made possible to create a dual use for the cartilage conduction vibration source and to simultaneously obtain both favorable cartilage conduction from the conductor and air conduction from the resonator; it is also thereby possible to effectively listen to sound information.

According to a specific feature, the conductor is a rigid body. Cartilage conduction conducts differently depending on the amount of force pushing on the cartilage, and a state of effective conduction can be obtained by increasing the amount of force that is pushing, but this means that when it is difficult to hear the incoming sound, a natural behavior such as increasing the force pushing the mobile telephone against the ear can be utilized to adjust the volume. Such a function also makes it possible to more effectively adjust the volume through adjusting the force that is pushing, due to the conductor being constituted of a rigid body.

According to another specific feature, the resonator is an elastic body. The resonator thereby creates cartilage conduction through contact with the tragus or other part of the ear cartilage, and sound from the outer surface of the resonator, which resonates according to the vibration of the cartilage conduction vibration source, is conducted to the tympanic membrane from the external auditory meatus as sound waves. It is thereby possible to effectively listen to sound.

According to another specific feature, the resonator is sized so as to contact the ear cartilage at a plurality of points. According to another specific feature, the resonator is sized so as to contact the ear cartilage and block the external auditory meatus. According to yet another specific feature, the resonator has an acoustic impedance approximating the acoustic impedance of the ear cartilage. These features make it possible to render cartilage conduction more effective and to reduce exterior noise in accordance with need.

According to another specific feature, the resonator constitutes the incoming-talk unit of the mobile telephone by air conduction. It is thereby made possible to create a dual use for the cartilage conduction vibration source and constitute a typical incoming-talk unit, and also possible to listen to sound in a natural posture, on the basis of the vibration of the cartilage conduction vibration source, without the incoming-talk unit being provided separately.

According to another feature, there is provided a mobile telephone comprising: a cartilage conductor for conducting vibration for cartilage conduction to ear cartilage; a resonator for generating sound waves to be conducted to the tympanic membrane through the external auditory meatus by air conduction; and a shared vibration source having a dual purpose as a vibration source for the cartilage conductor and the resonator. It is thereby made possible to create a dual use for the shared vibration source and constitute a cartilage conduction output unit and a typical incoming-talk unit, and also possible to listen to sound in a natural posture, on the basis of the vibration of the shared vibration source, without the incoming-talk unit being provided separately.

According to a specific feature, a suitable example of the vibration source includes a piezoelectric bimorph element. It is thereby possible to provide a vibration source suitable for generating favorable cartilage conduction and suitable for a typical incoming-talk unit for generating sound to be conducted to the tympanic membrane from the external auditory meatus.

<Fifth Technical Feature>

A fifth technical feature disclosed in the present invention provides a mobile telephone comprising: a display surface; a side surface relative to the display surface; and a cartilage conduction vibration unit provided to the side surface and capable of coming into contact of the ear cartilage. The display surface can thereby be prevented from making contact with the ear, cheek, or other body part and from becoming fouled when the cartilage conduction vibration unit is brought into contact with the ear cartilage.

According to a specific feature, cartilage conduction vibration units are provided to each of both side surfaces of the display surface. The cartilage conduction vibration unit can thereby be brought into contact with the right ear or the left ear from the state where the display screen is being viewed, without the need to switch the hand holding the mobile telephone. According to a further specific feature, there is provided an incoming-talk unit which is used consistently in any case where either of the cartilage conduction vibration units is being used.

According to another specific feature, the incoming-talk unit is provided nearer to the side surface to which the cartilage conduction vibration unit is provided. In such a case, merely providing the cartilage conduction vibration unit to the side surface on a single side allows for the cartilage conduction vibration unit to be brought into contact with the right ear or the left ear by the mobile telephone being turned over. According to a further specific feature, the cartilage conduction vibration unit and the incoming-talk unit form an incoming/outgoing talk unit, which can be inserted into and removed from the mobile telephone. The ability to insert or remove such an incoming/outgoing talk unit allows for flexible usage. According to a further specific feature, the incoming/outgoing-talk unit is configured so as to be capable of short-range wireless communication or so as to be capable of wired communication with the mobile telephone.

According to another specific feature, an auxiliary holding unit is provided to the side surface of the side opposite the side surface to which the cartilage conduction vibration unit is provided. The mobile telephone can thereby be more readily held when the cartilage conduction vibration unit is brought into contact with the ear cartilage, and the display surface can thereby be prevented from becoming fouled by fingerprints or the like due to being held during a telephone call. According to a more specific feature, the auxiliary holding unit is configured so as to be extensible from the side surface, in order to prevent the compactness of the mobile telephone from being compromised when the auxiliary holding unit is not needed.

According to another feature, there is provided a mobile telephone comprising: a display surface; a cartilage conduction vibration unit which can be brought into contact with the ear cartilage; a detection unit for detecting when the cartilage conduction vibration unit has been contacted with the ear cartilage; and a display controller for changing the display of the display unit to a privacy protection display on the basis of the detection by the detection unit.

The feature above makes it possible to prevent another person from catching a glance of a display relating to the call destination or other form of private information during a telephone call. Such a configuration is suitable for when the state becomes such that the display surface is no longer hidden by the posture of the mobile telephone when the cartilage conduction vibration unit is brought into contact with the ear cartilage. An example of a privacy protection display is a predetermined display not containing any private information or a state where nothing is displayed. According to a more specific feature, the display unit is turned on during the privacy protection display, and the display unit is turned off in order to conserve power whenever the detection by the detection unit continues for a predetermined period of time or longer.

According to another feature, there is provided a mobile telephone system which includes: a mobile telephone body; and an incoming/outgoing-talk unit, which can be inserted into or removed from the mobile telephone body, and which includes an incoming-talk unit and a cartilage conduction vibration unit that can be brought into contact with the ear cartilage.

The feature above makes it possible to enable cartilage conduction in the state where the incoming/outgoing-talk unit is incorporated into the mobile telephone body as well as cartilage conduction in the state where the incoming/outing-talk unit is separated therefrom, and also makes it possible to provide a system permitting flexible usage in accordance with the circumstances. According to a specific feature, the incoming/outgoing-talking unit is configured so as to be capable of short-range wireless communication or so as to be capable of wired communication with the mobile telephone body.

According to another feature, there is provided an incoming/outgoing-talk unit for a mobile telephone including a cartilage conduction vibration unit which can be brought into contact with the ear cartilage, an incoming-talk unit, and a unit for communicating with the mobile telephone. Such an incoming/outgoing-talk unit is not only suitable for constituting a mobile telephone system by being combined with a specific mobile telephone, but also assumes a configuration suitable for serving as an incoming/outgoing-talk accessory for a general mobile telephone having a communication unit. According to a specific feature, the incoming/outgoing-talk unit is configured in a pencil shape in which the cartilage conduction vibration unit and the incoming-talking unit are arranged in the vicinity of both ends. According to another specific feature, the communication unit is configured as a short-range wireless communication unit. According to yet another feature, the communication unit is configured so as to include a cable for wired communication with the mobile telephone.

According to another specific feature, the communication unit transmits, to the mobile telephone, information relating to the state of contact between the cartilage conduction vibration unit and the ear cartilage. It is thereby made possible for information specific to the usage of the cartilage conduction vibration unit to be transmitted to the mobile telephone, and it is also thereby possible for there to be a favorable link with the mobile telephone.

<Sixth Technical Feature>

A sixth technical feature disclosed in the present specification provides an incoming/outgoing talk unit for a mobile telephone comprising: an ear-attachment unit; a cartilage conduction vibration unit for making contact with the ear cartilage in the state of attachment by the attachment unit; an outgoing-talk unit; and a short-range wireless communication unit for use with the mobile telephone. This makes it possible to achieve an incoming/outgoing-talk unit suitable for a mobile telephone. An example of suitable ear cartilage in the above is the tragus, by which typically audio information can be transmitted without the ear hole being blocked.

According to a specific feature, the incoming/outgoing-talk unit includes a movable unit that is movable relative to the attachment unit, and the cartilage conduction vibration unit is held to the movable unit. According to a further specific feature, the movable unit can be moved in order to alter the state where the cartilage conduction vibration unit is in contact with the cartilage.

According to another specific feature, the short-range wireless communication unit transmits, to the mobile telephone, information relating to the position of the movable unit. The mobile telephone is thereby able to transmit appropriate audio information to the incoming/outgoing-talk unit. According to a more specific feature, the short-range wireless communication unit transmits, to the mobile telephone, information relating to the position of the movable unit relative to the attachment unit.

According to another feature, the cartilage conduction vibration unit is held via an elastic body. It is thereby possible to cushion an impact against the cartilage conduction vibration unit and also to allow the cartilage conduction vibration unit to move. According to a further specific feature, the cartilage conduction vibration unit is contained and held in the elastic body. This makes it possible to achieve greater cushioning for the cartilage conduction vibration unit.

According to a more specific feature, the aforesaid elastic body containing the cartilage conduction vibration unit has an acoustic impedance approximating the acoustic impedance of the ear cartilage. Cushioning for the cartilage conduction vibration unit and suitable cartilage conduction via the elastic body are thereby rendered possible.

According to another specific feature, the cartilage conduction vibration source includes a piezoelectric bimorph element. Suitable cartilage conduction vibration is thereby provided. Being held by the aforesaid elastic body is beneficial for the cushioning of such a piezoelectric bimorph element.

According to another specific feature, a phase inverter for phase-inverting audio information inputted from the outgoing-talk unit and a controller for outputting, from the cartilage conduction vibration unit, audio information that has been phase-inverted by the phase inverter are positioned in the incoming/outgoing-talk unit. It is thereby possible to provide a highly versatile incoming/outgoing-talk unit making use of the advantages specific to cartilage conduction. According to a further specific feature, an acoustics adjustment unit is provided to the incoming/outgoing-talk unit, and the aforesaid controller outputs, from the cartilage conduction vibration unit, audio information that has been acoustically adjusted by the acoustics adjustment unit and phase-inverted by the phase inverter. More appropriate control is thereby made possible.

According to a more specific feature, a contact state detection unit for detecting the state where the cartilage conduction vibration unit is in contact with the ear cartilage is provided to the incoming/outgoing-talk unit, and the controller determines whether or not to output, from the cartilage conduction unit, audio information that has been phase-inverted by the phase inverter, in accordance with the state detected by the contact state detection unit. Appropriate control is thereby made possible.

According to another specific feature, the attachment unit is an ear-hooking unit, and the incoming/outgoing-talk unit is configured as a headset. The various features described above are suitable for constituting such a headset.

According to another specific feature, the attachment unit is the temple of a pair of eyeglasses, and the incoming/outgoing-talk unit is configured as a pair of eyeglasses. The various features described above are suitable for constituting such a pair of eyeglasses. According to a more specific feature, the cartilage conduction vibration unit can be moved relative to the temple of the eyeglasses. It is thereby possible to withdraw the incoming/outgoing-talk unit whenever a two-way conversation is not being held.

<Seventh Technical Feature>

A seventh technical feature disclosed in the present specification provides an incoming-talk unit which includes: an ear-attachment unit; and a cartilage conduction vibration unit for conduction cartilage conduction from the outer side of the ear cartilage in the state of attachment by the attachment unit. It is thereby possible to listen to audio information without the external auditory meatus being blocked in both a natural state and a normal state. There are conventionally known eyeglasses-type and other types of bone conduction incoming-talk devices for listening to audio information without the external auditory meatus being blocked, but in the case of using bone conduction, the bone at the front or the rear of the ear must be tightly tucked in by the portion of the inner side or other part of the temple of the eyeglasses, which results in pain and renders long-term usage unbearable. An incoming-talk unit provided with the feature above will not have such a problem, it being possible to listen comfortably to audio information while experiencing a sensation similar to that of ordinary eyeglasses. According to a specific feature, the ear cartilage to which the cartilage conduction is to be conducted is the base of the ear. The outer side of the cartilage of the base of the ear, being close to the inner entrance of the external auditory meatus, is suitable for transmitting sound to the tympanic membrane by generating air conduction to the interior of the external auditory meatus from the cartilage around the entrance to the external auditory meatus, and for direct conduction to the inner ear through the cartilage According to another specific feature, the attachment unit is the temple of eyeglasses. In such a case, the vibration of the cartilage conduction vibration unit can be conducted from the outer side of the ear cartilage through the natural operation of hooking on the eyeglasses. Accordingly, there is no need to clamp down on the bones of the face with the temples of the eyeglasses, as is done in the case of bone conduction. According to a more specific feature, the cartilage conduction vibration unit can be inserted into or removed from the temple of the eyeglasses. It is thereby made possible to conduct cartilage conduction from the outer side of the ear cartilage merely by having the cartilage conduction vibration unit worn on the temple of ordinary eyeglasses, even though the eyeglasses may not be specially designed so as to be provided with the cartilage conduction vibration unit.

According to a further specific feature, the incoming-talk unit includes a pair of fitting parts which can each be fitted to the pair of temples of the eyeglasses, and cartilage conduction vibration units are fitted to the temples of the eyeglasses by the fitting parts being fitted. According to a more specific feature, the pair of fitting parts are connected by a glass cord, thus obtaining the practical advantages of a harmonious design and loss prevention. According to a more specific feature, the fitting parts are elastic bodies, thus achieving a degree of freedom in the fitting.

According to a further specific feature, one of the aforesaid pair of fitting parts is a dummy. Given that the cartilage conduction vibration unit is fitted only to one ear, a fitting part need only be fitted to one temple, but that alone will be enough to change the thickness of the temple, giving rise to the concern that the eyeglasses will tilt. Therefore, the dummy fitting part is fitted to the other temple, whereby it is possible to maintain the balance of the eyeglasses when the cartilage conduction vibration units are fitted.

According to another specific feature, the cartilage conduction vibration unit is arranged on one of the pair of fitting parts, and a power source is arranged at the other. It is thereby possible to arrange the cartilage conduction vibration unit and the related constituent elements in a limited space while the left and right temples are also balanced. It is further possible to connect the pair of fitting parts with a glass cord having a dual purpose for creating an electric connection between the two, whereby a plurality of constituent elements can be divided to the left and right temples while a harmonious design and also a mutual electric connection can be maintained.

According to another further specific feature, cartilage conduction vibration units are arranged at both of the pair of fitting parts. It is thereby possible to listen to audio information stereophonically while achieving a balance between the left and right temples. According to another feature, the cartilage conduction vibration units can also be arranged directly on both of the pair of temples of the eyeglasses.

According to another specific feature, the incoming-talk unit is provided with: a detection unit for detecting when the ear cartilage are deformed due to the ear being covered; an outgoing-talk unit; a phase inverter for phase-inverting audio information inputted from the outgoing-talk unit; and a controller for outputting, from the cartilage conduction vibration unit, the audio information that has been phase-inverted by the phase inverter in accordance with the detection by the detection unit. It is thereby possible to attenuate the discomfort of one's own voice when the ear is covered in order to listen to louder audio information and the earplug bone conduction effect is produced, while also obstructing exterior noise.

According to another specific feature, the attachment unit is an ear-hooking unit. In such a case, even a person who does not require eyeglasses can listen to audio information in a natural state and a normal state without the external auditory meatus being blocked.

According to another feature, there is provided an incoming-talk unit for 3D viewing, comprising: a 3D viewing adjustment unit; a temple including a unit for adjusting contact with the temple of eyeglasses for adjusting vision when fitted over eyeglasses for adjusting vision; and an audio information output unit provided to the temple. It is thereby possible to appropriately listen to audio information both in a case where the incoming-talk unit for 3D viewing is fitted directly without eyeglasses, and also in a case where the same is fitted over eyeglasses for adjusting vision.

According to a specific feature, the audio information output unit is a cartilage conduction vibration unit. According to a further specific feature, the cartilage conduction vibration unit conducts cartilage conduction from the outer side of the ear cartilage. The aforesaid contact adjustment unit allows for the vibration of the cartilage conduction vibration unit to be effectively transmitted from the outer side of the ear cartilage in particular when the incoming-talk unit for 3D viewing is fitted over the eyeglasses for adjusting vision.

<Eighth Technical Feature>

An eighth technical feature disclosed in the present specification provides a mobile telephone comprising: a cartilage conduction vibration source for guiding an audio signal to the ear cartilage; and a low-frequency source for guiding, to the cartilage conduction vibration source, a low-frequency vibration signal of a lower signal than the audio signal. The vibration source can thereby be given a dual purpose for cartilage conduction and low-frequency vibration, and the cost of the vibration source and thereby be reduced.

According to a specific feature, a mobile telephone is provided with a touch detection unit for detecting touch by a finger, wherein the low-frequency source introduces, to the cartilage delivery vibration source, the low-frequency vibration signal in response to a detection of touch by the touch detection unit, and transmits the low-frequency vibration of the cartilage delivery vibration source to the finger touching. A suitable example of such a touch detection unit is a touch panel provided to a display screen.

According to another specific feature, the cartilage conduction vibration source serves a dual purpose as the touch detection unit. The cartilage conduction vibration source can thereby serve to guide audio signals to the ear cartilage, to output low frequencies, and to detect touch, and the cost of the vibration source can also thereby be reduced. This feature is suitable for a case where a contact-free motion sensor for detecting movement in the vicinity of the display screen is provided.

According to another specific feature, a delay lasting a predetermined period of time after the detection by the touch detection unit is allowed to pass, and the low-frequency vibration signal is introduced to the cartilage conduction vibration source. Feedback for a touch result can thereby be provided to the finger touching, without confusion.

According to another specific feature, a vibration insulation material for preventing the transmission of audio signals is interposed between the cartilage conduction vibration source and an outer wall part for outwardly conduction the vibration of the cartilage conduction vibration source, which is made to vibrate by the introduction of a low-frequency vibration signal having a low frequency. The leakage of audio signals to the outer wall part and elsewhere, the generation of unneeded air conduction, and other defects can thereby be prevented.

According to a further specific feature, the vibration insulation material prevents the transmission of vibration having a frequency at or above a predetermined frequency, and permits the transmission of vibration at or below the predetermined frequency. An audio signal thereby enables a low-frequency vibration to be relayed to the outer wall part from the cartilage conduction vibration source even while there is obstruction. According to another further specific feature, a low-frequency signal of the low-frequency source is configured so as to include the resonance frequency of the vibration insulation material. An audio signal can thereby cause the vibration insulation material to resonate for a low-frequency vibration even while there is obstruction, whereby the low-frequency vibration can be transmitted to the outer wall part from the cartilage conduction vibration source.

According to another specific feature, a switching unit for switching between introducing an audio signal and introducing a low-frequency signal of a low frequency is provided to the cartilage conduction vibration source. The cartilage conduction vibration source can thereby be appropriately applied to a plurality of objectives.

According to another specific feature, there is provided an audio signal output device for a mobile telephone characterized by comprising: eyeglass lenses; eyeglass temples; cartilage conduction vibration units for conducting cartilage conduction from the outer side of the ear cartilage, which are arranged at the eyeglass temples; a sound signal source unit for transmitting output to the cartilage conduction vibration units; and a unit for communicating with the mobile telephone. Diverse links with the mobile telephone are thereby made possible. According to a further specific feature, incoming-talk units are provided to the eyeglass temples; as an example of a more specific feature, the incoming-talk units are configured as bone conduction microphones. Such configurations are appropriately used for eyeglass temples naturally brought up against the face when the eyeglasses are worn, and permit two-way conversation.

According to another feature, there is provided a sound signal output device which includes: eyeglass lenses; eyeglass temples; cartilage conduction vibration units for conducting cartilage conduction from the outer side of the ear cartilage, which are arranged at the eyeglass temples; and a sound signal source unit for transmitting output to the cartilage conduction vibration units. A person wearing the eyeglasses can thereby enjoyably receive sound signals of the sound signal source unit in a natural state. According to a specific feature thereof, the eyeglass temples are a pair, and the cartilage conduction vibration units are arranged at each of both of the pair of eyeglass temples, and the output of the sound signal source unit is transmitted to each of the cartilage conduction vibration units. A pair of temples originally provided to eyeglasses can thereby be utilized and stereo sound signals can be enjoyably received without the ear being blocked.

According to another feature, there is provided a sound signal output device for a mobile telephone characterized by comprising: eyeglass lenses; eyeglass temples; cartilage conduction vibration units for conducting cartilage conduction from the outer side of the ear cartilage, which are arranged at the eyeglass temples; bone conduction microphones arranged at the eyeglass temples; and a unit for communicating with the mobile telephone. It is thereby possible to provide an incoming/outgoing-talk unit suitable for a mobile telephone for a person who wears eyeglasses.

<Ninth Technical Feature>

A ninth technical feature disclosed in the present specification provides a mobile telephone characterized by comprising: a cartilage conduction vibration source having a primary vibration direction, the cartilage conduction vibration source being adapted to guide an audio signal to the ear cartilage; a holding structure for avoiding the primary vibration direction and for holding the cartilage conduction vibration source; and an audio signal input unit for inputting an audio signal to the cartilage conduction vibration source. An audio signal can thereby be effectively guided to the ear cartilage, and useless vibration of the cartilage conduction vibration source can be prevented from being conducted to the mobile telephone.

According to a specific feature, the mobile telephone is provided with a vibration output structure for guiding, to the outer surface of the mobile telephone, vibration in the primary vibration direction of the cartilage conduction vibration source. An audio signal can thereby be effectively guided to the ear cartilage from the cartilage conduction vibration. More specifically, the vibration output structure is an opening part provided to the mobile telephone.

According to a further specific feature, there is a vibration conduction unit connected to the surface of the primary conduction vibration direction of the cartilage conduction vibration source and exposed from the opening part. An audio signal can thereby be effectively guided to the ear cartilage from the cartilage conduction vibration without the design of the outer surface of the mobile telephone being compromised.

According to another specific feature, an elastic body is provided between the vibration conduction unit and the opening part. Useless vibration of the cartilage conduction vibration source can thereby be prevented from being conducted to the mobile telephone without the design of the outer surface of the mobile telephone being compromised.

According to another specific feature, an output structure is provided to the upper corner parts of the mobile telephone. An audio signal can thereby be effectively guided from the cartilage conduction vibration to the tragus or other part of the ear cartilage due to the natural manner in which the mobile telephone is held.

According to another specific feature, the output structure is provided to the side surface parts of the mobile telephone. An audio signal can thereby be effectively guided from the cartilage conduction vibration to the tragus or other part of the ear cartilage even while contact with the cheek or the like can be prevented from fouling the display surface or other element of the mobile telephone.

According to a specific feature, the cartilage conduction vibration source is a piezoelectric bimorph element, where a hold in accordance with the structure and vibration properties of the piezoelectric bimorph element makes it possible to effectively guide an audio signal to the ear cartilage and to prevent useless vibration of the cartilage conduction vibration source from being conducted to the mobile telephone.

According to a more specific feature, the primary vibration direction is avoided and the middle part of the cartilage conduction vibration source is held. It is thereby possible to effectively guide an audio signal to the ear cartilage, and also to prevent useless vibration of the cartilage conduction vibration source from being conducted to the mobile telephone.

According to another feature, there is provided a mobile telephone characterized by comprising: a cartilage conduction vibration source having a primary vibration surface and an outer surface substantially orthogonal thereto, the cartilage conduction vibration source being adapted to guide an audio signal to the ear cartilage; a holding structure for holding the cartilage conduction vibration source at a ridge between the primary vibration surface and the outer surface; and an audio signal input unit for inputting an audio signal to the cartilage conduction vibration source. An audio signal can thereby be effectively guided to the ear cartilage, and also useless vibration of the cartilage conduction vibration source can be prevented from being conducted to the mobile telephone.

According to another feature, there is provided a mobile telephone characterized by comprising: a cartilage conduction vibration source for guiding an audio signal to the ear cartilage; a holding structure having a concave and convex surface for holding the cartilage conduction vibration source; and an audio signal input unit for inputting an audio signal to the cartilage conduction vibration source. An audio signal can thereby be effectively guided to the ear cartilage, and also useless vibration of the cartilage conduction vibration source can be prevented from being conducted to the mobile telephone.

<Tenth Technical Feature>

A tenth technical feature disclosed in the present specification provides a vibration element characterized in that an electrode is provided to the middle part of the longitudinal direction. The vibration element can thereby be electrically connected at the middle part of the longitudinal direction, and both ends of the vibration element can thereby be released from the burden of an electrical connection. According to a specific feature, the vibration element includes: a metal sheet; piezoelectric ceramic sheets provided to both sides of the metal sheet; and a resin for covering the periphery thereof, wherein the electrode includes a first electrode pulled out to the surface of the resin from the middle part of the longitudinal direction of the metal sheet, and a second electrode pulled out to the surface of the resin in the vicinity of the first electrode from each of the piezoelectric ceramic sheets.

According to another specific feature, the electrodes are pulled out on the surface of the vibration direction of the vibration element. According to another specific feature, the electrodes are pulled from the surface of the resin in the direction substantially orthogonal to the metal sheet and the piezoelectric ceramic sheets. According to yet another specific feature, the resin of the vibration element includes a primary vibration direction surface substantially parallel to the metal sheet and the piezoelectric ceramic sheets and also a non-vibration direction surface substantially orthogonal thereto, and the electrodes are pulled out from such a primarily vibration direction surface of the resin. According to another specific feature, the electrodes are pulled out to the surface of the resin upon being curved substantially 90° within the resin. These features are suitable for support the vibration element from the non-vibration direction.

According to another specific feature, there is provided a mobile telephone in which the above-described vibration element is supported on the middle part of the longitudinal direction. This makes it possible to achieve a mobile telephone capable of transmitting the vibration from both ends of the vibration element to the ear cartilage and the like by, for example, cartilage conduction. According to a more specific feature, the vibration element is sandwiched and supported at the middle part of the longitudinal direction from the direction substantially parallel to the metal sheet and piezoelectric ceramic sheets of the piezoelectric bimorph elements. It is thereby made possible to hold the vibration element in the state where less vibration is conducted to the mobile telephone.

According to a more specific feature of the mobile telephone described above, vibration conductors are provided to both ends of the vibration element. According to a further specific feature, the vibration conductors are provided to the vicinity of the corners of the mobile telephone. Vibration can thereby be readily conducted to the ear cartilage.

According to another specific feature of the mobile telephone described above, the vibration conductors are provided to the side surfaces of the mobile telephone. The front surface of the mobile telephone, to which a display surface or the like is provided, can thereby be prevented from becoming fouled due to contact with the cheek. According to a more specific feature, the vibration conductors assume a long shape along the side surfaces of the mobile telephone. It is thereby possible to obviate the need to strictly select the position to be held against the ear and to permit contact at many points.

According to another feature, there is provided a mobile telephone that is guarded at the corners of the outer wall of the body, the mobile telephone including vibration units provided in the vicinity of the corners. The corners of the outer wall of the mobile telephone are suitable for obtaining cartilage conduction by being held up against the ear cartilage, but are conversely also always susceptible to collision with an external unit. According to the configuration described above, cartilage conduction to, for example, the tragus or other part of the ear cartilage is made readily possible while there is also a guard against collision from an external unit.

According to another feature, there is provided a mobile telephone including a pair of vibration conductors having a long shape along the side surfaces of the mobile telephone, each of the vibration conductors being provided so as to be substantially orthogonal to both ends of the longitudinal direction of the vibration element. It is thereby possible to make use of the vibration of both ends of the vibration element and to use the long regions of the two side surfaces of the mobile telephone as vibration sources for cartilage conduction.

According to yet another feature, there is provided a mobile telephone having a pair of vibration elements having a long shape, each of which elements provided along the two side surfaces of the mobile telephone. It is thereby possible to use the long regions of the two side surfaces of the mobile telephone as vibration sources for cartilage conduction while also independently controlling the respective vibrations of both sides.

According to yet another feature, there is provided a mobile telephone including: a vibration element having a long shape provided along one side surface of the mobile telephone, and a holding unit provided to the side surface of the side opposite the side surface to which the vibration element is provided. It is thereby possible to clearly understand which side is the cartilage conduction vibration source.

There is provided a mobile telephone including: a vibration element provided to the vicinity of a top side of the mobile telephone; and an elastic vibration conductor for covering the vibration element and forming the top side of the mobile telephone. Cartilage conduction can thereby be obtained from contact with the ear irrespective of being the front surface, rear surface, or side surface in the vicinity of the top side of the mobile telephone.

<Eleventh Technical Feature>

An eleventh technical feature disclosed in the present specification provides a mobile telephone comprising a cartilage conduction vibration unit supported inside a chassis structure and is adapted to conduct cartilage conduction vibration to the surface of the chassis structure. It is thereby possible to hold up any place of the surface of the mobile telephone against the ear cartilage and listen to sound by cartilage conduction. There is also greater freedom in the manner in which the cartilage conduction vibration unit is held, and the holding structure is also simplified.

According to a specific feature, the surface of the chassis structure has a surface to made to vibrate, and the cartilage conduction vibration unit is held within the chassis structure such that the primary vibration direction thereof is in the direction substantially orthogonal to the surface made to vibrate. Vibration can thereby be effectively conducted to the surface made to vibrate intended for cartilage conduction. According to a more specific feature, the cartilage conduction vibration unit has a piezoelectric bimorph element including a metal sheet, the metal sheet being held in the direction substantially parallel to the surface made to vibrate. The main vibration direction of the cartilage conduction vibration unit can thereby be made to be the direction substantially orthogonal to the surface to be vibrated.

According to a further specific feature, the mobile telephone includes a display surface, and the cartilage conduction vibration unit is held such that the primary vibration direction thereof is substantially orthogonal to the display surface. The display surface on the mobile telephone or the rear surface thereof can thereby be made to vibrate effectively, and it is thereby possible to bring the mobile telephone up against the ear cartilage over a broad range. According to a further specific feature, the display surface has a touch panel operation surface, and the cartilage conduction vibration unit has a dual purpose as a vibration source for feedback for the sensation of touch panel operation.

According to another specific feature, the cartilage conduction vibration unit is held such that the primary vibration direction thereof is in the direction substantially orthogonal to a side surface of the mobile telephone. The side surface of the mobile telephone can thereby be made to vibrate effectively, and effective cartilage conduction can thereby be obtained even while the display surface is prevented from coming into contact with the cheek and becoming fouled.

According to another feature, there is included an impact detection surface, wherein the cartilage conduction vibration unit is held within the chassis structure such that the primary vibration direction thereof is in the direction substantially orthogonal to the impact detection surface. The cartilage conduction vibration unit can thereby be given the dual purpose of effectively detecting impact.

According to another feature, the cartilage conduction vibration unit has a dual purpose as a vibration source for providing notification of an incoming call. In such a case, because the vibration of the cartilage conduction vibration unit is conducted to all locations on the surface of the mobile telephone, effective notification of an incoming call can be provided.

According to another feature, the cartilage conduction vibration unit is held rigidly within the chassis structure. According to a further specific feature, the cartilage conduction vibration unit is held directly to the chassis structure. These features simplify the holding structure of the cartilage conduction vibration unit and are suitable for effectively transmitting vibration.

According to another feature, the mobile telephone includes a horizontal stationary state detection unit, the vibration of the cartilage conduction vibration unit being stopped whenever a horizontal stationary state has been detected. It is thereby possible to prevent the occurrence of uncomfortable vibration noise at times such as when the mobile telephone is placed on a desk during a telephone call.

According to further specific feature, the mobile telephone includes a touch panel operation surface, wherein the cartilage conduction vibration unit has a dual purpose as a vibration source for feedback for the sensation of a touch panel operation, and the vibration for feedback for the sensation of a touch panel operation in the cartilage conduction vibration unit is not stopped even when the horizontal stationary state is detected. According to another specific feature, the cartilage conduction vibration unit serves a dual purpose for an impact detection function, and the impact detection function in the cartilage conduction vibration unit is not stopped even when the horizontal stationary state is detected. These features are suitable for smooth GUI operation.

According to another further specific feature, the cartilage conduction vibration unit serves a dual purpose as a vibration source for providing notification of an incoming call, and the vibration for providing notification of an incoming call in the cartilage conduction vibration unit is not stopped even when the horizontal stationary state is detected. This feature is suitable for accurately providing notification of an incoming call.

<Twelfth Technical Feature>

A twelfth technical feature disclosed in the present specification provides a mobile telephone comprising: a chassis structure having a display surface; and a cartilage conduction vibration unit supported in the chassis structure so as to have a primary vibration surface inclined relative to the display surface. Vibration for cartilage conduction can thereby be conducted to the chassis structure from the direction of incline relative to the display surface.

According to a specific feature, the chassis structure includes an inclined surface parallel to the primary vibration surface. The inclined surface can thereby be brought into contact with the ear cartilage to obtain effective cartilage conduction even while fouling due to the display surface coming into contact with the cheek can be prevented, and a vibration component from the display surface or back surface of the mobile telephone can thereby also be obtained. According to a more specific feature, the chassis structure has a side surface orthogonal to the display surface, wherein an inclined plane is provided between the side surface and the surface parallel to the display surface. The inclined surface can thereby be provided with a design in which a box-type mobile telephone is beveled.

According to another specific feature, the chassis structure has a cylindrical surface containing the cartilage conduction vibration unit. It is thereby possible to obtain cartilage conduction by bringing the ear cartilage up against the cylindrical surface and a desired position on the display surface or back surface, and also possible thereby to bring the cylindrical surface into contact with the ear cartilage to effectively obtain cartilage conduction in the state where the display surface is not in contact with the face.

According to yet another specific feature, the chassis structure includes a side surface orthogonal to the display surface, and the vibration of the primary vibration surface in the cartilage conduction vibration unit is transmitted to a side surface and to the surface parallel to the display surface. It is thereby possible to obtain cartilage conduction in any case where either the side surface or the surface parallel to the display surface is brought into contact with the ear cartilage.

According to another specific feature, the chassis structure has an upper surface orthogonal to the display surface, and the vibration of the primary vibration surface in the cartilage conduction vibration unit is transmitted to the surface parallel to the display surface and to the upper surface. It is thereby possible to obtain cartilage conduction in any case where either the upper surface or the surface parallel to the display surface is brought into contact with the ear cartilage. In such a case, the vibration of the upper surface is suitable for contact in the state where the mobile telephone is pushed up against the ear cartilage while bringing the display surface into contact with the face is being avoided, and also for obtaining the earplug bone conduction effect by pushing stronger to block the external auditory meatus with the tragus. An example of the incline of the primary vibration surface in the cartilage conduction vibration unit is the range of about 30° to 60° relative to the display surface.

According to another specific feature, the vibration of both sides of a pair of opposing primary vibration surfaces in the cartilage conduction vibration unit is transmitted to the chassis structure. The vibration of the pair of primary vibration surfaces of the cartilage conduction vibration unit is thereby effectively utilized. According to further specific feature, the chassis structure has a side surface or upper surface orthogonal to the display surface, and the vibration of both sides of the primary vibration surfaces in the cartilage conduction vibration unit is respectively transmitted to the side surface or upper surface and to the surface parallel to the display surface. The vibration of the pair of primary vibration surfaces of the cartilage conduction vibration unit is thereby utilized as vibration sources having opposite directions. The positions to which the vibration of the pair of primary vibration surfaces is transmitted may be mutually opposing portions of the primary vibration surfaces, but the configuration may also be such that the vibration is respectively transmitted to the side surface or upper surface and to the surface parallel to the display surface from mutually crossing positions.

According to another feature, there is provided a mobile telephone comprising: a chassis structure, and a cartilage conduction vibration unit in which vibration is unrestrictedly permitted in a part of the primary vibration surface and in which another part of the primary vibration surface is supported within the chassis structure. It is thereby possible for the vibration of the cartilage conduction vibration unit to be effectively transmitted to the chassis structure while a loss in the freedom of vibration thereof is avoided.

According to a specific feature, the primary vibration surface at the middle part of the cartilage conduction vibration unit is supported in the chassis structure, and vibration is unrestrictedly permitted in the primary vibration surface at both end parts of the cartilage conduction vibration unit. The middle part at which support occurs may be the middle part of the cartilage conduction vibration unit, but when the behavior during the implementation of the cartilage conduction vibration unit lacks left-right symmetry, in order to compensate therefor, the configuration may also be such that the primary vibration surface is supported in the chassis structure at an off-center middle part.

According to another specific feature, a plurality of portions of the primary vibration surface of the cartilage conduction vibration unit is supported in the chassis structure. According to a more specific feature, the configuration is such that the primary vibration surfaces at both end parts of the cartilage conduction vibration unit are each supported in the chassis structure, and vibration is unrestrictedly permitted at the primary vibration surface in the middle part of the cartilage conduction vibration unit.

According to yet another feature, there is provided a mobile telephone comprising: a chassis structure; and a cartilage conduction vibration unit supported within the chassis structure by the interposition of a vibration conduction elastic body between the primary vibration surfaces. It is thereby possible for the vibration of the cartilage conduction vibration unit to be effectively transmitted to the chassis structure while a loss in the freedom of vibration thereof is avoided.

<Thirteenth Technical Feature>

A thirteenth technical feature disclosed in the present specification provides a mobile telephone configured such that a part of the cartilage conduction vibration unit is supported on the inside of the chassis in the vicinity of a corner part of the chassis and another part vibrates unrestrictedly, whereby the vibration of the cartilage conduction vibration unit is transmitted to the corner part of the chassis. The corner part can thereby effectively be made to vibrate while a structure in which the corner part would be susceptible to collision is avoided.

According to a specific feature, the cartilage conduction vibration unit is supported on the inside of the upper surface of the chassis at the vicinity of the corner part of the chassis. According to another specific feature, the cartilage conduction vibration unit is supported on the inside of a side surface of the chassis in the vicinity of the corner part of the chassis. According to yet another feature, the cartilage conduction vibration unit is supported on the inside of the front surface of the chassis in the vicinity of the corner part of the chassis. The features above can also be combined as appropriate, in terms of the manner in which the cartilage conduction vibration unit is supported.

According to another specific feature, the cartilage conduction vibration unit has an electrical terminal and is supported such that the vicinity of the electrical terminal vibrates unrestrictedly. The cartilage conduction vibration unit can thereby be supported at a position of the chassis closer to the inside of the corner part and the display surface at the corner part can thereby effectively be made to vibrate, without there being any hindrance to the presence of the electrical terminal.

According to another specific feature, the cartilage conduction vibration unit is supported such that the primary vibration direction thereof is perpendicular to the upper surface of the chassis. According to yet another feature, the cartilage conduction vibration unit is supported such that the primary vibration direction thereof is perpendicular to a side surface of the chassis. These features make it possible to adopt a configuration such that the vibration is more effective closer to the upper surface or closer to the side surface of the corner part of the chassis. According to yet another specific feature, the cartilage conduction vibration unit is supported such that the primary vibration thereof is perpendicular to the front surface of the chassis. It is thereby possible to adopt a configuration such that the vibration is more effective closer to the front surface of the corner part of the chassis. According to yet another feature, the cartilage conduction vibration unit is supported such that the primary vibration direction thereof is inclined relative to the front surface of the chassis. It is thereby possible allocate vibration components to the front surface and to the surface orthogonal thereto.

According to another feature, a circuit for the cartilage conduction vibration unit is supported on the inside of the chassis as a vibration unit integrated with the cartilage conduction vibration unit. It is thereby possible to configure the entirety of the cartilage conduction vibration unit and the circuit related thereto as a vibration unit.

According to a more specific feature, the cartilage conduction vibration unit has an electrical terminal, and the circuit for the cartilage conduction vibration unit is arranged in the vicinity of the electrical terminal. It is thereby possible to make effective use of the space in the vicinity of the electrical terminal to configure the vibration unit. According to a more specific feature, the portion of the vibration unit in the vicinity of the electrical terminal is supported. The portion to which the electrical terminal is not provided can thereby be made to unrestrictedly vibrate.

According to another feature, there is provided a mobile telephone configured such that the part of the cartilage conduction vibration unit to which the electrical terminal is not provided is supported on the inside of the chassis, and the other part to which the electrical terminal is provided is made to unrestrictedly vibrate, whereby the vibration of the cartilage conduction vibration unit is transmitted to the exterior of the chassis. The cartilage conduction vibration unit can thereby be supported at a position of the chassis closer to the inside of the corner part and the display surface at the corner part can thereby effectively be made to vibrate, without there being any hindrance to the presence of the electrical terminal.

According to another feature, there is provided a vibration unit characterized by the integration of a cartilage conduction vibration unit having an electrical unit with a circuit for the cartilage conduction vibration unit arranged in the vicinity of the electrical terminal. It is thereby possible to make effective use of the space in the vicinity of the electrical terminal to configure the vibration unit.

According to a specific feature, the circuit has an amplifier for the cartilage conduction vibration unit. The cartilage conduction vibration unit can thereby be effectively supported without the use of the space around the cartilage conduction vibration unit, and the cartilage conduction vibration unit can also thereby be made to vibration efficiently According to a specific feature, the circuit has an adjustment unit to electrically compensate for the variances of the cartilage conduction vibration unit. The cartilage conduction vibration unit can thereby be effectively supported without the use of the space around the cartilage conduction vibration unit, and performance can also thereby be maintained relative to the variances in the cartilage conduction vibration unit.

<Fourteenth Technical Feature>

A fourteenth technical feature disclosed in the present specification provides a mobile telephone in which a part of the cartilage conduction vibration unit is supported by the inside of an elastic body, and the outside of the elastic body is arranged at a corner part of the chassis. The freedom of the cartilage conduction vibration unit to vibrate can thereby be ensured, and the vibration thereof can thereby be efficiently guided to the corner part of the chassis for cartilage conduction by contact with the ear.

According to a specific feature, in the mobile telephone, the other part of the cartilage conduction vibration unit is supported by the inside of a second elastic body, and the outside of the second elastic body is arranged at another corner part of the chassis. The cartilage conduction vibration unit can thereby be more reliably supported while the freedom of the cartilage conduction vibration unit to vibrate can be ensured, and also the respective vibrations from both of the support units can thereby be efficiently guided to the corner parts of the chassis for cartilage conduction by contact with the ear.

According to a further specific feature, in the mobile telephone, the cartilage conduction vibration unit is shaped to have two end parts, the two end parts of the cartilage conduction vibration unit each being supported on the insides of the elastic body and second elastic body, and the outsides of the elastic body and the second elastic body are each arranged at opposite corner parts of the chassis. The two end parts of the cartilage conduction vibration unit can thereby be reliably supported and the freedom of both end parts to vibrate can be ensured to a certain degree by the support of the elastic bodies, and also the vibration of both ends can thereby be transmitted for cartilage conduction from either of the opposite corner parts of the chassis.

According to another technical feature, the cartilage conduction vibration unit has an electrical terminal, and one of either of the elastic body or the second elastic body includes an electrical terminal and supports the cartilage conduction vibration unit. It is thereby possible to reliably support the electrical terminal, including the connective wiring thereof, and the cartilage conduction vibration unit even while the freedom thereof to vibrate is ensured to a certain degree, and also thereby possible to also transmit vibration for cartilage conduction from the portion at which the electrical terminal is found.

According to another specific feature, the cartilage conduction vibration unit is eccentric between a corner part and another corner part. It is thereby possible to provide compensation for the imbalance of the cartilage conduction vibration unit, and also the layout of the various parts inside the mobile telephone can be designed with a greater degree of freedom.

According to another specific feature, the elastic body is formed with a material having an acoustic impedance approximating that of the ear cartilage. Effective cartilage conduction can thereby be obtained even while the freedom to vibrate is ensured.

According to another specific feature, in the mobile telephone, elastic bodies are also arranged at two other corner parts of the chassis where the cartilage conduction vibration unit is not arranged and are configured together with the elastic body at the corner part of the chassis where the cartilage conduction vibration unit is arranged so as to attenuate collision from the exterior unit to the four corners of the mobile telephone. The elastic bodies can thereby be given a dual purpose also as protectors for attenuating collision to the corner parts. This feature makes use of the elastic bodies at the corner parts for the dual objectives of appropriately making use of the corner parts of the mobile telephone to make contact with the ear for cartilage conduction and also protecting the corner parts of the mobile telephone, which are susceptible to collision. According to another specific feature, when the cartilage conduction vibration unit is supported such that the primary vibration direction thereof is orthogonal to the front surface of the chassis, the mobile telephone can be brought into contact with the ear for cartilage conduction without any change in the level of comfort experienced with a normal telephone call.

According to another feature, there is provided a mobile telephone in which a very slight stepped concavity is provided to the surface of the mobile telephone and the cartilage conduction vibration unit is arranged on the base surface of the concavity. It is thereby possible to protect the cartilage conduction vibration unit from a collision to the mobile telephone from an external unit, and also thereby possible to use the elastic deformation thereof to readily bring the cartilage conduction vibration unit into contact with the ear cartilage. According to a specific feature, the arrangement is such that the vibration surface of the cartilage conduction vibration unit is positioned on the base surface of the concavity, thus achieving efficient cartilage conduction. According to a more specific feature, a protective layer is provided to the vibration surface; wherever possible, the ear cartilage is brought into direct contact with the vibration surface, and damage to the vibration surface is prevented. According to another specific feature, the concavity is provided to a side surface of the mobile telephone, whereby the advantages of having the concavity can suitably be enjoyed.

According to another feature, there is provided a mobile telephone provided with a plurality of cartilage conduction vibration units having primary vibration surfaces which are not mutually parallel. Effective cartilage conduction is thereby possible in a plurality of directions. According to a specific feature, the primary vibration surface of one of the plurality of cartilage conduction vibration units is substantially parallel to a side surface of the mobile telephone, and the primary vibration surface of another one of the plurality of cartilage conduction vibration units is substantially parallel to the front surface of the mobile telephone. Cartilage conduction from the side surface, which is very advantageous, is thereby possible, as is cartilage conduction from the front surface, which is no less comfortable than when a mobile telephone is normally used.

According to another specific feature, an arrangement is employed in which the cartilage conduction vibration units are mutually parallel in the longitudinal direction. According to yet another specific feature, an arrangement is employed in which the cartilage conduction vibration units are not mutually parallel in the longitudinal direction.

<Fifteenth Technical Feature>

A fifteenth technical feature disclosed in the present specification provides a mobile telephone comprising: a plurality of elastic bodies arranged at each of a plurality of corner parts of the chassis; and cartilage conduction vibration units provided to each of the plurality of elastic bodies. There is thereby provided a mobile telephone in which the corner parts of the mobile telephone can be brought up against the ear cartilage for cartilage conduction and in which the cartilage conduction vibration units arranged at the corner parts can be protected from collision with an external unit.

According to a specific feature, the cartilage conduction vibration units are provided to the elastic bodies so as not to be exposed at the outer surfaces of the mobile telephone. According to a more specific feature, each of the cartilage conduction vibration units is embedded in the elastic bodies. According to yet another specific feature, each of the cartilage conduction vibration units is provided to the insides of the elastic bodies.

According to another specific feature, the plurality of cartilage conduction vibration units provided to each of the elastic bodies is given respectively different vibration directions. It is thereby possible to obtain favorable cartilage conduction whenever an elastic body is held to the ear cartilage from different directions. According to a more specific feature, the cartilage conduction vibration units can be controlled mutually independently.

According to another specific feature, the cartilage conduction vibration units provided to the elastic bodies are electromagnetic vibrators. An electromagnetic vibrator, similarly with respect to a piezoelectric bimorph element, is an example of an element suitable for providing a vibration source in the cartilage conduction vibration units.

According to another feature, there is provided a mobile telephone comprising elastic bodies arranged on the chassis and cartilage conduction vibration units provided to the elastic bodies, wherein the elastic bodies and the cartilage conduction vibration units are configured as replaceable unit parts. It is thereby also possible, among other possibilities, to facilitate replacing the elastic bodies and cartilage conduction vibration units, and to provide a product having different cartilage conduction vibration units while other parts are essentially the same.

According to another feature, there is provided a mobile telephone comprising: a plurality of cartilage conduction vibration units provided to the chassis and given different vibration directions; and a controller for independently controlling each of the plurality of cartilage conduction vibration units. It is thereby possible to obtain favorable cartilage conduction whenever an elastic body is held to the ear cartilage from different directions. According to a more specific feature, the plurality of provided cartilage conduction vibration units is controlled in accordance with the posture of the mobile telephone, and control in accordance with the direction in which an elastic body is held against the ear becomes possible.

According to another feature, there is provided a mobile telephone comprising: elastic bodies arranged on the chassis and including unrestrictedly vibrating parts where vibration is not controlled; and cartilage conduction vibration units provided to the unrestrictedly vibrating parts of the elastic bodies. The vibration of the cartilage conduction vibration units is thereby more favorably transmitted to the elastic bodies.

According to a specific feature, the unrestrictedly vibrating parts are elongated parts elongated to the inside of the chassis. It is thereby possible to appropriately hold the cartilage conduction vibration units within the mobile telephone even while vibration can be favorably transmitted.

According to a specific feature, the unrestrictedly vibrating parts face a window unit provided to the chassis. The vibration of the cartilage conduction vibration units can thereby be favorably transmitted via the window unit. According to a more specific feature, the unrestrictedly vibrating parts cover the window unit and have a rear surface facing the window unit, the cartilage conduction vibration units being provided to the rear surface. The vibration of the cartilage conduction vibration units provided to the inside of the mobile telephone can thereby be favorably transmitted to the elastic bodies via the window unit.

According to another feature, there is provided a mobile telephone comprising: elastic bodies arranged on a chassis; cartilage conduction vibration units provided to the elastic units; and balancers provided to the cartilage conduction vibration units. It is thereby possible to adjust the acoustic properties of the cartilage conduction vibration units transmitted to the elastic bodies.

<Sixteenth Technical Feature>

A sixteenth technical feature disclosed in the present specification provides a mobile telephone comprising: a cartilage conduction vibration unit; an air conduction generation unit; and selection means for making a selection between a state for generating, and a state for not generating, vibration from the air conduction generation unit. A variety of different uses are thereby made possible, and the ability to select the state for not generating vibration from the air conduction generation unit permits usage adapted to take the surroundings into consideration and/or adapted for privacy protection. The air conduction generation unit may also be configured so as to have a hollow box structure, according to need, in a case where there is a desire for vigorously generated air conduction.

According to a specific feature, the air conduction generation unit is configured such that the air conduction generation unit is made to vibrate by the transmission of the vibration of the cartilage conduction vibration unit, and the transmission of vibration from the cartilage conduction vibration unit is cut off whenever the selection means is used to select the state for not generating vibration from the air conduction generation unit. It is thereby made possible to select between a state for generating, and a state for not generating, vibration from the air conduction generation unit using the cartilage conduction vibration unit as a vibration source.

According to a more specific feature, the mobile telephone includes a vibration conductor for relaying the vibration of the cartilage conduction vibration unit to the air conduction vibration unit, and the relay of vibration to the air conduction generation unit is cut off whenever the selection means is used to select the state for not generating vibration from the air conduction generation unit. In the case where such a vibration conductor is employed, it becomes possible to select between a state for generating, and a state for not generating, vibration from the air conduction generation unit even though the cartilage conduction vibration unit and the air conduction generation unit are affixed together.

According to another specific embodiment, there is a sliding function by which the selection means can slide between a position for generating, and a position for not generating, the vibration from the air conduction generation unit. According to yet another specific feature, there is a rotation function by which the selection means can be rotated between a position for generating, and a position for not generating, the vibration from the air conduction generation unit. In the cases where a mobile function is employed, it is also possible to configure such that at least a part of at least one of either the cartilage conduction vibration unit or the air conduction generation unit can be moved by the selection means.

According to another specific feature, the air conduction generation unit includes a vibration source, and the selection means stops the generation of vibration from the vibration source of the air conduction generation unit in the state for not generating the vibration from the air conduction generation unit. It is thereby possible to select whether or not air conduction is to be generated even in a configuration lacking moveable parts.

According to another specific feature, there is an environmental noise detection unit, and the selection means automatically selects the state for not generating the vibration from the air conduction generation unit whenever the environmental noise detected by the environmental noise detection unit is at or below a predetermined loudness. It is thereby possible to automatically select a state adapted to take the surroundings into consideration and/or adapted for privacy protection in the state where the surroundings are silent.

According to another feature, there is provided a mobile telephone comprising: an audio generation unit; a pressure sensor for detecting pressure on the audio generation unit; and an automatic adjustment unit for automatically changing the state of audio generated from the audio generation unit on the basis of the pressure detected by the pressure sensor. It is thereby possible to automatically change the state of audio generated from the audio generation unit on the basis of the natural operation of pressing the audio generation unit up against the ear. According to a specific feature, the audio generation unit is an air conduction speaker. According to another specific feature, the automatic adjustment unit automatically adjusts the volume or acoustics of the audio generated from the audio generation unit.

According to another specific feature, the automatic adjustment unit changes the state of audio generated in one direction from an initial state and maintains the changed state in accordance with an increase in pressure from the pressure sensor, and returns the state of audio generated to the initial state in accordance with a predetermined reduction or greater reduction in pressure from the pressure sensor. It is thereby possible to change the state of audio generated on the basis of a natural operation, and also to avoid an unintentional change in the state of audio generated. According to another specific feature, the automatic adjustment unit automatically changes the state of audio generated from the audio generation unit when a change in pressure from the pressure sensor continues for a predetermined period of time or longer, and does not respond to a change in pressure that does not meet the predetermined period of time. It is thereby possible to avoid an unintentional change in the state of audio generated.

According to another feature, there is provided a mobile telephone characterized by comprising a right ear audio generation unit, and a left ear audio generation unit arranged at a different position than that of the right ear audio generation unit. It is thereby possible to achieve a natural posture for holding the mobile telephone up against the ear. According to a specific feature, the right ear audio generation unit and the left ear audio generation unit are each arranged at two corner parts at the upper part of the mobile telephone. According to another specific feature, a large-screen display unit is arranged on the same surface on which the right ear audio generation unit and the left ear audio generation unit are arranged. According to another specific feature, each of the right ear audio generation unit and the left ear audio generation unit air conduction speakers.

According to another feature, there is provided a mobile telephone in which a large-screen display unit is provided, and air conduction speakers are provided to the corner parts at the upper part of the surface to which the large-screen display unit is provided. It is thereby possible to achieve a natural posture for effectively holding the air conduction speakers against the ear even while interference between the large-screen display unit and the face is avoided.

<Seventeenth Technical Feature>

A seventeenth technical feature disclosed in the present specification provides a mobile telephone comprising: a pair of cartilage conduction vibration units; a sound source signal unit; and drive units for driving each of the pair of cartilage conduction vibration units in a mutually phase-inverted waveform on the basis of a sound source signal from the sound source signal unit. It is thereby possible to obtain cartilage conduction by contact with each of the pair of cartilage conduction vibration units, and also thereby possible to substantially eliminate air conduction that is based on the vibration of the pair of cartilage conduction vibration units.

According to a specific feature, the pair of cartilage conduction vibration units is provided to each of the pair of corner parts at the upper part of the mobile telephone, which are suitable for contact against the ear cartilage. According to a further specific feature, elastic body units are provided to the pair of corner parts, and the pair of cartilage conduction vibration units is supported on the elastic body units. It is thereby possible to protect the cartilage conduction vibration units from collision with an external unit.

According to a further specific feature, the outer surface of the elastic body units is beveled so as to have a smoothly convex shape, thus achieving suitable contact with the ear cartilage. According to another specific feature, the cartilage conduction vibration units include a piezoelectric bimorph element or an electromagnetic vibrator.

According to another specific feature, the drive units are capable of switching between a mode for driving each of the pair of cartilage conduction vibration units in mutually inverted waveforms on the basis of a sound source signal from the sound source signal unit, and a mode for driving each of the pair of cartilage conduction vibration units in mutually identical waveforms on the basis of a sound source signal from the sound source signal unit. It is thereby possible to switch between eliminating and increasing air conduction.

According to yet another specific feature, there is an environmental noise detection unit, and the drive units drive each of the pair of the cartilage conduction vibration units in mutually inverted waveforms on the basis of a sound source signal from the sound source signal unit whenever the environmental noise detected by the environmental noise detection unit is at or below a predetermined loudness. It is thereby possible to automatically eliminate air conduction when the environment is silent.

According to yet another specific feature, it is possible to adjust the balance for driving each of the pair of cartilage conduction vibration units in mutually inverted waveforms on the basis of a sound source signal from the sound source signal unit. It is thereby possible to effectively eliminate air conduction and also to regulate the state where air conduction is eliminated.

According to yet another feature, the drive units are capable of driving only one of the pair of cartilage conduction vibration units. It is thereby possible to avoid driving uselessly when there is no need to eliminate air conduction.

According to a more specific feature, the mobile telephone includes an environmental noise detection unit, and the drive units drive each of the pair of cartilage conduction vibration units in mutually inverted waveforms on the basis of a sound source signal from the sound source signal unit whenever the environmental noise detected by the environmental noise detection unit is at or below a predetermined loudness, and drive only one of the pair of cartilage conduction vibration units whenever the environmental noise detected by the environmental noise detection unit is at or above a predetermined loudness. It is thereby possible to cause only the cartilage conduction vibration unit that is in contact with the ear cartilage to vibrate, and in such a state to cause the other cartilage conduction vibration unit to vibrate in an inverted waveform and automatically eliminate air conduction when the environment becomes silent.

According to another feature, there is provided a mobile telephone in which the cartilage conduction vibration units are provided to the pair of corner parts at the upper part of the mobile telephone, and the outer surface of the corner parts is beveled so as to have a smoothly convex shape. It is thereby made possible to make contact with the ear cartilage without incurring substantial pain and also possible to comfortably listen by cartilage conduction with the corner parts appropriately fitted to the cartilage around the external auditory meatus.

According to another feature, there is provided a mobile telephone comprising: a pair of cartilage conduction vibration units; a sound source signal unit; drive units capable of driving each of the pair of cartilage conduction vibration units on the basis of a sound source signal from the sound source signal unit; a selection unit for selecting a cartilage conduction vibration unit to be driven by a drive unit; and a controller for controlling the waveform inversion of the sound source signal from the sound source signal unit. The pair of cartilage conduction vibration units can thereby be used to achieve a variety of different forms of cartilage conduction.

<Eighteenth Technical Feature>

An eighteenth technical feature disclosed in the present specification provides a mobile telephone comprising a surface of the outer wall and a vibration source arranged inward from the surface of the outer wall, wherein when the vibration of the vibration source is transmitted to the surface of the outer wall, and the surface of the outer wall is brought into contact with at least a part of the ear cartilage around the entrance part of the external auditory meatus without making contact with the auricular helix, the sound pressure inside the external auditory meatus at about 1 cm from the entrance part of the external auditory meatus has an increase of at least 10 dB over that in the non-contact state. A mobile telephone in which it is possible to listen to sound by cartilage conduction can thereby be provided.

According to another feature, there is provided a mobile telephone comprising an surface of the outer wall and a vibration source arranged inward from the surface of the outer wall, wherein when the vibration of the vibration source is transmitted to the surface of the outer wall, and the surface of the outer wall is brought into contact with at least a part of the ear cartilage around the entrance part of the external auditory meatus without making contact with the auricular helix, the sound pressure inside the external auditory meatus at about 1 cm from the entrance part of the external auditory meatus changes by at least 5 dB due to the change in contact pressure. A mobile telephone by which the volume can be changed by a change in contact pressure during cartilage conduction can thereby be provided.

According to another feature, there is provided a mobile telephone comprising an surface of the outer wall and a vibration source arranged inward from the surface of the outer wall, wherein when the vibration of the vibration source is transmitted to the surface of the outer wall, and the entrance part of the external auditory meatus is occluded by the surface of the outer wall being brought into contact with at least a part of the ear cartilage around the entrance part of the external auditory meatus without contact being made with the auricular helix, the sound pressure in the external auditory meatus at about 1 cm from the entrance part of the external auditory meatus has an increase of at least 20 dB compared to the non-contact state. A mobile telephone by which it is possible to listen to sound by the earplug bone conduction effect during cartilage conduction can thereby be provided.

According to the specific features above, the sound pressure that is increased or changed is at 1,000 Hz.

According to yet another feature, the increase or change in sound pressure is in a state where the output of the vibration source is not changed. The sound pressure is thereby increased or changed without the volume being altered.

According to another specific feature, the state where the surface of the outer wall is brought into contact with at least a part of the ear cartilage around the entrance part of the external auditory meatus without making contact with the auricular helix is a state where the surface of the outer wall is brought into contact with the outside of the tragus. According to a more specific feature, the state where the sound pressure in the external auditory meatus at about 1 cm from the entrance part of the external auditory meatus is increased by at least 10 dB when the surface of the outer wall is brought into contact with at least a part of the ear cartilage around the entrance part of the external auditory meatus without making contact with the auricular helix, compared to the non-contact state, is one where the contact pressure of the surface of the outer wall against the outside of the tragus is 250 g.

According to another specific feature, the vibration source is arranged such that the vibration thereof is transmitted to the surface of the corner parts of the outer wall, and the state where the surface of the outer wall is brought into contact with at least a part of the ear cartilage around the entrance part of the external auditory meatus without making contact with the auricular helix is a state where the surface of the corner parts of the outer wall is brought into contact with the outside of the tragus. It is thereby possible to achieve contact suitable for obtaining cartilage conduction in the mobile telephone.

According to a more specific feature, the corner parts of the outer wall are constituted of a different material from the other portions of the outer wall. According to another more specific feature, the vibration source is either held inside the outer wall at the corner parts of the outer wall or is held inside the corner parts of the outer wall.

According to another feature, there is provided a mobile telephone comprising a surface of an outer wall, a vibration source arranged inward from the surface of the outer wall, and volume adjustment means, the vibration of the vibration source being transmitted to the surface of the outer wall and sound being listened to by the contact of the surface of the outer wall with at least a part of the ear cartilage around the entrance part of the external auditory meatus without contact with the auricular helix, wherein: in a room where the noise level (the A-weighted sound pressure level) is 45 dB or less, the mobile telephone being brought into proximity with the entrance part of the external auditory meatus and the surface of the outer wall being arranged so as to not be in contact, the volume is minimized and pure sound at 1,000 HZ is generated from the vibration source, and also narrow-band noise (⅓ octave-band noise) at a marginal level where the pure sound at 1,000 Hz is masked and cannot be heard is generated from a loudspeaker at a position separated from the entrance part of the external auditory meatus by 1 m. When the narrow-band noise at 1,000 Hz is subsequently increased by 10 dB from the marginal level, bringing the surface of the outer wall into contact with at least a part of the ear cartilage around the entrance part of the external auditory meatus without making contact with the auricular helix makes it possible to listen to pure sound at 1,000 Hz without the need to adjust or change the volume adjusting means. A mobile telephone in which the volume can be changed by a change in contact pressure during cartilage conduction can thereby be provided.

According to another feature, there is provided a mobile telephone comprising a surface of an outer wall, a vibration source arranged inward from the surface of the outer wall, and volume adjustment means, the vibration of the vibration source being transmitted to the surface of the outer wall and sound being listened to by the contact of the surface of the outer wall with at least a part of the ear cartilage around the entrance part of the external auditory meatus without contact with the auricular helix, wherein: in a room where the noise level (the A-weighted sound pressure level) is 45 dB or less, the mobile telephone being brought into proximity with the entrance part of the external auditory meatus and the surface of the outer wall being arranged so as to not be in contact, the volume is minimized and pure sound at 1,000 HZ is generated from the vibration source, and also narrow-band noise (⅓ octave-band noise) at a marginal level where the pure sound at 1,000 Hz is masked and cannot be heard is generated from a loudspeaker at a position separated from the entrance part of the external auditory meatus by 1 m. When the narrow-band noise at 1,000 Hz is subsequently increased by 20 dB from the marginal level, bringing the surface of the outer wall into contact with at least a part of the ear cartilage around the entrance part of the external auditory meatus without making contact with the auricular helix to occlude the entrance part of the external auditory meatus makes it possible to listen to pure sound at 1,000 Hz without the need to adjust or change the volume adjusting means.

<Nineteenth Technical Feature>

A nineteenth technical feature disclosed in the present specification provides a sound output device in which the vibration of a vibration source arranged inward from the surface of an outer wall is transmitted to the surface of the outer wall, and sound is listened to by the contact of the surface of the outer wall with at least a part of the ear cartilage around the entrance part of the external auditory meatus, wherein the vibration source causes there to be generated, from the surface of the outer wall, air conduction of a frequency characteristic trending inversely with respect to the frequency characteristic during cartilage conduction. It is thereby possible for the frequency characteristic during cartilage conduction and the frequency characteristic of the vibration source to be complementary to each other and, as a result, for the frequency characteristic of the sound reaching the tympanic membrane to approach flatness.

According to a specific feature, the average air conduction generated by the vibration source from the surface of the outer wall from 500 Hz to 1 kHz is 5 dB less than the average air conduction generated by the vibration source from the surface of the outer wall from 1 kHz to 2.5 kHz.

According to another specific feature, the sound output device is provided with an equalizer for correcting the frequency characteristic in consideration of the frequency characteristic specific to cartilage conduction in regard to the vibration source is driven by a sound source signal of the sound source signal output unit. It is thereby made possible for frequency characteristic of the sound reaching the tympanic membrane to approach flatness in consideration of the frequency characteristic of the cartilage conduction.

According to a more specific feature, the equalizer corrects for the frequency characteristic, which is different from when the external auditory meatus is in an open state, when the vibration source is driven in the state where the external auditory meatus is occluded. It is thereby made possible for the frequency characteristic of the sound reaching the tympanic membrane to approach flatness in consideration of the frequency characteristic of cartilage conduction during the state where the earplug bone conduction effect occurs.

According to another specific feature, there is a low-pass filter for correcting the frequency characteristic in consideration of the frequency characteristic specific to cartilage conduction in terms of the manner in which the vibration source is driven by a sound source signal of the sound source signal output unit. According to a further specific feature, the low-pass filter trims frequencies at 2.5 kHz and higher when the sound output device is used in a mobile telephone. In yet another specific feature, the low-pass filter trims frequencies at 10 kHz and higher when the sound output device is used in an audio device. Concern can thereby be given to the surroundings during, for example, silence.

According to another feature, there is provided a sound output device which includes a sound source signal output unit for outputting a sound source signal, a surface of an outer wall, a vibration source arranged inward from the surface of the outer wall and driven by the sound source signal from the sound source signal output unit, and an air conduction generation unit drive by the sound source signal from the sound source signal output unit, wherein the air conduction generated by the transmission of the vibration of the vibration source to the surface of the outer wall has a different frequency characteristic from that of the air conduction generated form the air conduction generation unit, it being possible to listen to sound by direct air conduction generated from the air conduction generation unit or by air conduction through cartilage conduction when the surface of the outer wall is brought into contact with at least a part of the ear cartilage around the entrance part of the external auditory meatus. The uncomfortable change in acoustics depending on the manner in which sound is being listened to can thereby be attenuated.

According to another feature, there is provided a sound output device which includes a sound source signal output unit for outputting a sound source signal, a surface of an outer wall, a vibration source arranged inward from the surface of the outer wall and driven by the sound source signal from the sound source signal output unit, and an air conduction generation unit drive by the sound source signal from the sound source signal output unit, wherein the frequency characteristic of the drive signal when the vibration source is driven by the sound source signal is different from the frequency characteristic of the drive signal when the air conduction generation unit is driven by the sound source signal, it being possible to listen to sound by direct air conduction generated from the air conduction generation unit or by air conduction through cartilage conduction when the surface of the outer wall is brought into contact with at least a part of the ear cartilage around the entrance part of the external auditory meatus. The uncomfortable change in acoustics depending on the manner in which sound is being listened to can thereby be attenuated.

According to another feature, there is provided a sound output device which includes a vibration source arranged inward from the surface of an outer wall, a sound source signal output unit for outputting a sound source signal, and an equalizer for correcting the frequency characteristic in consideration of the frequency characteristic specific to cartilage conduction in regard to the vibration source being driven by the sound source signal of the sound source signal unit, wherein the vibration of the vibration source is transmitted to the surface of the outer wall, and the surface of the outer wall is brought into contact with at least a part of the ear cartilage around the entrance part of the external auditory meatus, whereby it is possible to listen to sound. It is thereby possible for consideration to be given to the frequency characteristic during cartilage conduction and, as a result, for the frequency characteristic of sound reaching the tympanic membrane to approach flatness. According to a specific feature, the equalizer corrects for the frequency characteristic, which is different from when the external auditory meatus is in an open state, in regard to driving of the vibration source in the state where the external auditory meatus is occluded. According to a more specific feature, the sound output device is provided with a detection unit for detecting whether or not the external auditory meatus is in an occluded state, and the equalizer automatically switches to the state where the frequency characteristic is corrected, on the basis of the detection by the detection unit. According to another more specific feature, the sound output device is provided with a low-pass filter for correcting the frequency characteristic in consideration of the frequency characteristic specific to cartilage conduction in regard to driving of the vibration source by the sound source signal of the sound source signal unit, and, when the equalizer corrects the frequency characteristic in the state where the external auditory meatus is occluded, the state is considered not to be silent, and the low-pass filter is made not to function.

According to another feature, there is provided a sound output device which includes a vibration source arranged inward from the surface of an outer wall, a sound source signal output unit for outputting a sound source signal, and a low-pass filter for correcting the frequency characteristic in consideration of the frequency characteristic specific to cartilage conduction in regard to driving of the vibration source by the sound source signal of the sound source signal output unit, wherein the vibration of the vibration source is transmitted to the surface of the outer wall, and the surface of the outer wall is brought into contact with at least a part of the ear cartilage around the entrance part of the external auditory meatus, whereby it is possible to listen to sound. Concern can thereby be given to the surroundings during, for example, silence. According to a specific feature, it is possible to switch between whether or not the low-pass filter is made to function. It is thereby possible to provide support for times of silence and to properly use an emphasis on acoustics. According to a more specific feature, the sound output device is provided with an environmental noise detection unit for detecting environmental noise, and there is an automatic switch for whether or not the low-pass filter is made to function, on the basis of the detection results from the environmental detection unit.

According to another feature, there is provided a sound output device which includes a vibration source arranged inward from the surface of an outer wall, and a sound source signal output unit for outputting a sound source signal, wherein the vibration of the vibration source is transmitted to the surface of the outer wall, and the surface of the outer wall is brought into contact with at least a part of the ear cartilage around the entrance part of the external auditory meatus, whereby it is possible to listen to sound; the sound output device being characterized in that the frequency characteristic is different when the external auditory meatus is in an occluded state and when the external auditory meatus is in an open state, in regard to driving of the vibration source by the sound source signal of the sound source signal output unit. It is thereby possible to reduce the discomfort arising from the presence or absence of the earplug bone conduction effect.

<Twentieth Technical Feature>

A twentieth technical feature disclosed in the present specification provides a mobile telephone comprising: a cartilage conduction vibration source; an outer surface having no localized projections; a cartilage contact unit on the outer surface, to which the vibration of the cartilage conduction vibration source is transmitted such that the amplitude or the acceleration of the vibration reaches a maximum; and a cartilage non-contact unit on the outer surface exhibiting an amplitude or acceleration of vibration less than that at the cartilage contact unit. The vibration energy of the cartilage conduction vibration source is thereby concentrated on the cartilage contact unit and the dispersion to the cartilage non-contact unit is thereby reduced. The usage of the mobile telephone will also not be hindered, because the cartilage contact unit is set to the outer surface having no localized projections.

According to another feature, there is provided a mobile telephone comprising: a cartilage conduction vibration source; an outer surface; a cartilage contact unit on the outer surface, which is set to a position removed from both the central up-down axis and central left-right axis of the outer surface and to which the vibration of the cartilage conduction vibration source is transmitted such that the amplitude or the acceleration of the vibration reaches a maximum; and a cartilage non-contact unit on the outer surface exhibiting an amplitude or acceleration of vibration less than that at the cartilage contact unit. Because the cartilage contact unit is set to a position removed from both the central up-down axis and the central left-right axis of the outer surface, the resulting arrangement is suitable for contact with the ear cartilage at the entrance part of the external auditory meatus.

According to a specific feature, the cartilage contact unit is set to a corner part of the upper part of the mobile telephone. The resulting configuration is thereby suitable for bringing the surface of the outer wall into contact with at least a part of the ear cartilage around the entrance part of the external auditory meatus without making contact with the auricular helix.

According to a more specific feature, cartilage contact units are set in each of the pair of corner parts at the upper part of the mobile telephone. It is thereby possible to concentrate the vibration energy of the cartilage conduction vibration source on the ear cartilage both when the mobile telephone is held up against the right ear and when the mobile telephone is held up against the left ear.

According to another specific feature, the amplitude or the acceleration of vibration in the cartilage non-contact unit is ¼ or less the acceleration of vibration in the cartilage contact unit. The vibration energy of the cartilage conduction vibration source can thereby be concentrated on the cartilage contact unit and the dispersion to the cartilage non-contact unit can thereby be reduced.

According to another specific feature, the amplitude or the acceleration of vibration in the cartilage non-contact unit reduces monotonically as the distance from the cartilage contact unit increases. The vibration energy of the cartilage conduction vibration source can thereby be concentrated on the cartilage contact unit and the dispersion to the cartilage non-contact unit can thereby be reduced.

According to another feature, there is provided a mobile telephone comprising: a cartilage conduction vibration source; a chassis; a cartilage contact unit for holding the cartilage conduction vibration source so as not to be in contact with the chassis; and an anti-vibration material interposed between the cartilage contact unit and the chassis of the mobile telephone. The vibration energy of the cartilage conduction vibration source can thereby be concentrated on the cartilage contact unit.

According to a more specific feature, the aforesaid cartilage contact unit is constituted of a hard material, and the aforesaid anti-vibration material is constituted of an elastic body. The vibration energy of the cartilage conduction vibration source can thereby be concentrated on the cartilage contact unit.

As another element for concentrating the vibration energy of the cartilage conduction vibration source onto the cartilage contact unit, it is also suitable: to avoid the primary vibration direction of the cartilage conduction vibration source and support the same on the chassis of the mobile telephone; to reduce the surface area of contact between the cartilage contact unit and the chassis of the mobile telephone supporting the same; to limit the position at which the cartilage conduction vibration source is held to the vicinity of the cartilage contact unit; to make the cartilage contact material of a different material from that of the chassis of the mobile telephone; and the like. In addition to the cases of the independent usage of such elements, it is also possible to employ an appropriate combination of a plurality of elements.

According to another feature, there is provided a mobile telephone comprising: a cartilage conduction vibration source; a T-coil; and a controller for preventing the cartilage conduction vibration source from vibrating whenever the T-coil is being used. The greater discomfort that occurs compared to listening to sound using the T-coil is thereby prevented, and the unnecessary consumption of power by cartilage conduction when the T-coil is operating is thereby prevented. In the description above, in a preferred configuration, to prevent accidental conflation where cartilage conduction is turned off in tandem when the T-coil is turned on by a mistaken operation, the T-coil will not turn on unless a special operation is intentionally done.

<Twenty-first Technical Feature>

A twenty-first technical feature disclosed in the present specification provides a mobile telephone comprising: a telephone function unit; a cartilage conduction vibration unit; an application processor for controlling the telephone function unit; a power management unit for supplying a plurality of different voltages to the telephone function unit; a drive circuit for driving the cartilage conduction vibration unit on the basis of the power supplied from the power management; and a controller for controlling the power management unit and the drive circuit on the basis of an instruction from the application processor. The cartilage conduction vibration unit can thereby be driven directly, and power voltage can be supplied to the cartilage conduction vibration unit integratedly with the supply of power voltage to the various constituent elements inside the mobile telephone, other integrated forms of control also being possible as well. According to a more specific feature, the power management unit, the drive circuit, and the controller are configured as a single-chip integrated circuit.

According to another specific feature, the drive circuit has a boosted-voltage circuit, and the integrated circuit has a connective terminal for external attachment of a condenser for the boosted-voltage circuit. The cartilage conduction vibration element (piezoelectric bimorph) can thereby be driven without the need to add a separate chip for the boosted-voltage circuit.

According to another specific feature, the mobile telephone is controlled by a controller and has a cartilage conduction acoustic signal processing for an audio signal for driving the cartilage conduction vibration unit. It is thereby possible to integrate the control of the power management with the control for acoustic processing. Accordingly, the mobile telephone can be endowed with a suitable cartilage conduction function merely by a normal audio signal being inputted to the integrated IC and the cartilage conduction vibration unit being connected to the integrated IC. According to a more specific feature, the power management unit, the drive circuit, the controller, and the cartilage conduction acoustic signal processing unit are configured as a single-chip integrated circuit.

According to another specific feature, the mobile telephone includes a speaker, a microphone, and an analog front-end unit by which the speaker and microphone are connected, the analog front-end unit being controlled by the controller. The output of audio signals can thereby be collectively switched and adjusted. Specifically, the transfer of digital control signals between the integrated IC and the application processor, the digital control signals relating to the functions of the overall mobile telephone inclusive of the functions of the cartilage conduction vibration unit, can be integrated with the transfer of analog audio signals between the integrated IC and the application processor. According to a more specific feature, the analog front-end unit switches between driving the cartilage conduction vibration unit and driving the speaker on the basis of the control by the controller. According to another more specific feature, the power management unit, the drive circuit, the controller, the cartilage conduction acoustic signal processing unit, and the analog front-end unit are configured as a single-chip integrated circuit.

According to another feature, there is provided a mobile telephone comprising: a telephone function unit; a cartilage conduction vibration unit; an application processor for controlling the telephone function unit; a power management unit for supplying a plurality of different voltages to the telephone function unit; a cartilage conduction acoustic signal processing unit for an audio signal for driving the cartilage conduction vibration unit; and a controller for controlling the power management unit and the cartilage conduction acoustic signal processing unit on the basis of an instruction from the application processor. The control for acoustic processing relating to cartilage conduction can thereby be integrated with the control for power management. According to a specific feature, the power management unit, the cartilage conduction acoustic signal processing unit, and the controller are configured as a single-chip integrated circuit.

According to another specific feature, the mobile telephone has a speaker, a microphone, and an analog front-end unit by which the speaker and microphone are connected, the analog front-end unit being controlled by the controller. The output of audio signals can thereby be collectively switched and adjusted. According to a more specific feature, the analog front-end unit switches between driving the cartilage conduction vibration unit and driving the speaker on the basis of the control by the controller. According to yet another more specific feature, the power management unit, the cartilage conduction acoustic signal processing unit, the controller, and the analog-front end unit are configured as a single-chip integrated circuit.

According to another feature, there is provided a single-chip integrated circuit which includes: a power management unit for supplying a plurality of different voltages for telephone functions; a connecting part by which a cartilage conduction vibration element, which is one of the constituent elements of the cartilage conduction vibration unit, is connected; a drive circuit for driving the cartilage conduction vibration unit on the basis of the power supplied from the power management; and a controller for controlling the power management unit and the drive circuit on the basis of digital data from an external unit. The cartilage conduction vibration unit can thereby be driven directly, and power voltage can be supplied to the cartilage conduction vibration unit integratedly with the supply of power voltage to the various constituent elements inside the mobile telephone, it being possible to also integrate the control thereof.

According to a specific feature, the drive circuit has a boosted-voltage circuit, and the integrated circuit has a connective terminal for external attachment of a condenser for the boosted-voltage circuit. The cartilage conduction vibration element (piezoelectric bimorph) can thereby be driven merely by the single-chip integrated circuit.

According to another specific feature, the single-chip integrated circuit is controlled by the controller and has a cartilage conduction acoustic signal processing unit for an audio signal for driving the cartilage conduction vibration unit. It is thereby possible to integrate the control of the power management with the control for acoustic processing. According to another specific feature, the single-chip integrated circuit includes a connecting part for the speaker, a connecting part for the microphone, and an analog front-end unit connected to each of the connecting parts, the analog front-end unit being controlled by the controller. According to a more specific feature, the analog front-end unit switches between driving the cartilage conduction vibration unit and driving the speaker on the basis of the control by the controller.

According to another feature, there is provided a single-chip integrated circuit which includes: a power management unit for supplying a plurality of different voltages for telephone functions; a connecting part by which a cartilage conduction vibration element, which is one of the constituent elements of the cartilage conduction vibration unit, is connected; an audio signal acoustic processing unit for an audio signal for driving the cartilage conduction vibration unit; and a controller for controlling the power management unit and the cartilage conduction acoustic signal processing unit on the basis of digital data from an external unit. According to a specific feature, the single-chip integrated circuit includes a connecting part for the speaker, a connecting part for the microphone, and an analog front-end unit connected to each of the connecting parts, the analog front-end unit being controlled by the controller. According to a more specific feature, the analog front-end unit switches between driving the cartilage conduction vibration unit and driving the speaker on the basis of the control by the controller.

<Twenty-second Technical Feature>

A twenty-second technical feature disclosed in the present specification provides a mobile telephone comprising: a cartilage conduction vibration source provided inside a chassis; and an elastic body integrally affixed to and covered by the exterior of the chassis. The vibration of the chassis of the mobile telephone is thereby suppressed and sound leakage due to the generation of air conduction sound is thereby attenuated. According to a specific feature, the mobile telephone has a cartilage conduction unit for conducting the vibration of the cartilage conduction vibration source and for making contact with the ear cartilage, it being thus possible to listen to sound by cartilage conduction even while sound leakage to the surroundings due to the generation of air conduction sound is attenuated.

According to a more specific feature, the cartilage conduction unit is an elastic body. The elastic body has an acoustic impedance approximating that of ear cartilage, wherefore it is possible to listen to sound by cartilage conduction even when sound leakage to the surroundings due to the generation of air conduction sound is attenuated. According to a further specific feature, the cartilage conduction unit can be an elastic body integrally affixed to and covered by the exterior of the chassis. More specifically, the cartilage conduction unit can be connected with an elastic body integrally affixed to and covered by the exterior of the chassis.

According to another specific feature, the cartilage conduction unit is a rigid body, and the elastic body also covers the cartilage conduction unit. Sound leakage to the surroundings due to the generation of air conduction sound can thereby be attenuated even while favorable cartilage conduction is obtained. According to a more specific feature, the cartilage conduction unit is supported on the chassis via a vibration isolation material, and the transmission of vibrations to the chassis is attenuated. According to a further specific feature, the vibration isolation material is an elastic body of the same material as the elastic body integrally affixed to and covered by the exterior of the chassis.

According to another specific feature, the cartilage conduction vibration source is supported on the cartilage conduction unit in a state of non-contact with the chassis, and the direct transmission of vibration from the cartilage conduction vibration source to the chassis is avoided. In the case where priority is given to structural simplicity, it is also possible for the cartilage conduction vibration source to be supported on the chassis. The chassis will then have greater vibration, but such vibration can be attenuated by the elastic body integrally affixed to and covered by the exterior of the chassis.

According to another feature, there is provided a mobile telephone comprising: an elastic body integrally affixed to and covered by the exterior of the chassis, and a cartilage conduction vibration source supported by the elastic body in a state of non-contact with the chassis. It is thereby possible to attenuate sound leakage to the surroundings due to the generation of air conduction sound even while avoiding the direct transmission of vibration from the cartilage conduction vibration source to the chassis, and to listen to sound by cartilage conduction.

According to a specific feature, the cartilage conduction vibration source is supported on the inside of the elastic body, and the outside of the elastic body at the part supporting the cartilage conduction vibration source serves as a cartilage conduction unit for making contact with the ear cartilage. According to a further specific feature, the cartilage conduction vibration source is supported on the inside of the elastic body via a rigid support unit.

According to another specific feature, the mobile telephone has a support structure for supporting the internal configuration of the mobile telephone on the chassis from the inside such that the weight thereof vibrates integrally. The vibration from the interior and the exterior of the chassis of the mobile telephone can thereby be suppressed.

According to another feature, there is provided a mobile telephone comprising: a cartilage conduction vibration source provided to the interior of a chassis; and a support structure for supporting the internal configuration of the mobile telephone on the chassis from the inside such that the weight thereof vibrates integrally. The vibration of the chassis of the mobile telephone is thereby suppressed and sound leakage due to the generation of air conduction sound is thereby attenuated. Internal configurations contributing to the above include a battery.

According to a specific feature, the mobile telephone has a finely subdividing structure for finely subdividing surplus space of the interior of the chassis. The vibration of the chassis of the mobile telephone can thereby be suppressed and the air inside the chassis prevented from resonating, and the generation of air conduction sound can thereby be attenuated.

According to another feature, there is provided a mobile telephone comprising: a cartilage conduction vibration source provided to the interior of a chassis, and a finely subdividing structure for finely subdividing the surplus space of the interior of the chassis. The air inside the chassis can thereby be prevented from resonating, and the generation of air conduction sound can thereby be attenuated. An example of a finely subdividing structure is a barrier wall. Another example of a finely subdividing structure is a nonwoven cloth packed inside the chassis.

[Twenty-third Technical Feature]

A twenty-third technical feature disclosed in the present specification provides a sound output device having: a chassis; a cartilage conduction unit defining a convex face shape on the chassis surface; and a cartilage conduction vibration source for transmitting vibration to the cartilage conduction unit. In so doing, the cartilage conduction unit arranged touching the ear is naturally accommodated within the ear, affording contact with the ear cartilage over a wide surface area.

The ear-contacting part of an ordinary telephone handset has a concave face in order to form a closed space to the front of the ear; however, the handset for cartilage conduction according to the present invention conversely has a convex face, providing a natural shape that readily conforms to the ear in the aforedescribed manner.

According to a specific feature, the cartilage conduction unit has a convex face shape fitting into a depression of ear having the external auditory meatus opening as the bottom. According to a more specific feature, the cartilage conduction unit has a convex face shape, the apex of which enters the external auditory meatus opening. According to a yet more specific feature, the cartilage conduction unit has a conical shape. According to another yet more specific feature, the cartilage conduction unit has a spherical face shape.

According to another specific feature, the cartilage conduction vibration source transmits vibration from the inside of a cartilage conduction unit which is situated inside the chassis. In so doing, desired vibration can be propagated to a cartilage conduction unit defining a convex face shape at the chassis surface. Optionally, a space to the inside of the cartilage conduction unit defining a convex face shape can be utilized when situating the cartilage conduction vibration source.

According to a more specific feature, a support part is furnished for the purpose of supporting the cartilage conduction vibration source, and transmitting vibration thereof to the inside of a cartilage conduction unit. In so doing, support of the cartilage conduction vibration source and transmission of vibration to the inside of the cartilage conduction unit can be achieved.

According to a more specific feature, the support part supports a center part of the cartilage conduction vibration source. According to another more specific feature, the support part supports an end part of the cartilage conduction vibration source. In so doing, effective vibration of the cartilage conduction vibration source and transmission thereof can be achieved.

According to another specific feature, the sound output device is configured as a handset of a land-line telephone. In the present invention, the configuration of a cartilage conduction unit defining a convex face shape at the chassis surface is suitable for implementation in a handset of a land-line telephone.

According to another specific feature, a stereo audio output device is configured from a pair of sound output devices. In this way, a configuration of a cartilage conduction unit defining a convex face shape at the chassis surface is suited to sound output from a stereo audio output device.

According to another feature, there is provided a sound output device having a cartilage conduction unit defining a convex face of conical shape, and a cartilage conduction vibration source for transmitting vibration to a cartilage conduction unit. This conical shape is configured on the presumption that a conical side face will contact the entire circumference of the external auditory meatus opening in satisfactory fashion when the distal end thereof is inserted into the external auditory meatus opening; the depth to which the cone is inserted into the external auditory meatus opening does not have a large influence on cartilage conduction, and a state of constant satisfactory contact of the cartilage conduction unit against the entire circumference of the external auditory meatus can be achieved, regardless of individual differences in the size of the external auditory meatus opening. By employing such a pair of sound output devices which wrap around from the left and right to respectively press against the external auditory meatus opening of each ear, a satisfactory configuration for a stereo audio device can be achieved.

According to another feature, there is provided a sound output device having a cartilage conduction unit, and cartilage conduction vibration sources including a plurality of vibration sources having different frequency characteristics, for transmitting vibration to the cartilage conduction unit. By employing a plurality of cartilage conduction vibration sources of different frequency characteristics in complementary fashion in this way, the frequency characteristics of the cartilage conduction unit can be improved. An example of a plurality of vibration sources employed in complementary fashion is a combination of a low-end element and a high-end element.

[Twenty-fourth Technical Feature]

A twenty-fourth technical feature disclosed in the present specification provides a mobile telephone having a right-ear cartilage conduction unit, a left-ear cartilage conduction unit, a linking unit for linking the right-ear cartilage conduction unit and the left-ear cartilage conduction unit, and a cartilage conduction vibration source for transmitting vibration to the right-ear cartilage conduction unit or to the left-ear cartilage conduction unit. This linking unit has various useful functions.

According to a specific feature, the linking unit provides rigid joining of the right-ear cartilage conduction unit and the left-ear cartilage conduction unit. In so doing, the relative positional relationship of the right-ear cartilage conduction unit and the left-ear cartilage conduction unit can be stabilized, and the right-ear cartilage conduction unit and the left-ear cartilage conduction unit attached to a mobile telephone in a stable manner. According to a more specific feature, the right-ear cartilage conduction unit, the left-ear cartilage conduction unit, and the linking unit are provided as a practical component integrally formed from a hard material.

According to another specific feature, a vibration isolating part is furnished between the right-ear cartilage conduction unit, the left-ear cartilage conduction unit, and the linking unit, and the chassis of the mobile telephone. This vibration isolating part is useful in reducing sound leakage to the surrounding area arising from air conduction occurring when vibration is transmitted to the chassis. According to a more specific feature, the vibration isolating part is formed of an elastomer material. Typically, higher vibration isolating effect is obtained with a vibration isolating part that is softer and thicker, but on the other hand, doing so makes the hold on the right-ear cartilage conduction unit and the left-ear cartilage conduction unit unstable. In accordance with this feature, by providing a rigid joint between the right-ear cartilage conduction unit and the left-ear cartilage conduction unit through the linking unit, the relative positions of both can be maintained, and both can be attached in more stable fashion to the chassis.

According to another specific feature, the linking unit transmits vibration between the right-ear cartilage conduction unit and the left-ear cartilage conduction unit. Various useful functions can be obtained by doing so. According to a more specific feature, a cartilage conduction vibration source is joined to either the right-ear cartilage conduction unit or the left-ear cartilage conduction unit, and the linking unit transmits vibration of the cartilage conduction vibration source from the right-ear cartilage conduction unit or the left-ear cartilage conduction unit, whichever has the cartilage conduction vibration source joined thereto, to the unjoined unit. In so doing, useful cartilage conduction can also be obtained from the cartilage conduction unit to which the cartilage conduction vibration source is not joined.

According to another more specific feature relating to transmission of vibration between the right-ear cartilage conduction unit and the left-ear cartilage conduction unit by the linking unit, the cartilage conduction vibration source includes a first vibration source and a second vibration source respectively joined to the right-ear cartilage conduction unit and the left-ear cartilage conduction unit, and the linking unit mixes vibration of the first vibration source and the second vibration source. According to another more specific feature, drive signals of mutually inverted waveform are presented to the first vibration source and the second vibration source, and the vibrations thereof are mixed, whereby generation of air-conducted sound through transmission of vibration to the chassis can be reduced.

According to another specific feature, the right-ear cartilage conduction unit, the left-ear cartilage conduction unit, and the linking unit are exposed at the mobile telephone surface. In so doing, the cartilage conduction structure can be concentrated at the mobile telephone surface, facilitating the layout of components inside the mobile telephone, as well as obtaining good cartilage conduction through contact from the outside.

According to a separate feature, the right-ear cartilage conduction unit and the left-ear cartilage conduction unit are exposed at the mobile telephone surface, while the linking unit is not exposed at the mobile telephone surface. In so doing, good cartilage conduction through contact of the right-ear cartilage conduction unit and the left-ear cartilage conduction unit from the outside can be obtained, and a high degree of freedom in linkage of the two can be achieved.

According to another specific feature, the linking unit links the right-ear cartilage conduction unit and the left-ear cartilage conduction unit while bypassing the internal configuration of the mobile telephone. The layout of components inside the mobile telephone can be facilitated thereby. An example of a configuration of the mobile telephone is an in-camera. In this case, the right-ear cartilage conduction unit, the left-ear cartilage conduction unit, and the in-camera, which are all preferably situated in an upper part of the mobile telephone, can be laid out with no interference.

According to another specific feature, the right-ear cartilage conduction unit and the left-ear cartilage conduction unit are respectively situated at two corners in an upper part of the mobile telephone. In so doing, contact against the ear cartilage in a natural manner can be achieved regardless of whether the mobile telephone is held in the right hand or held in the left hand, the aforedescribed preferred placement being achievable through the linking unit linking the right-ear cartilage conduction unit and the left-ear cartilage conduction unit.

According to another specific feature, there is provided a mobile telephone having a cartilage conduction unit, a cartilage conduction vibration source of elongated shape joined at one end to the cartilage conduction unit, and a weight attached to the other end of the cartilage conduction vibration source. The weight is not supported by any part other than this other end, and the inertia afforded by the load thereof is imparted to the other end of the cartilage conduction vibration source.

[Twenty-fifth Technical Feature]

A twenty-fifth technical feature disclosed in the present specification provides an incoming-talk unit for a mobile telephone, having a cartilage conduction unit capable of contacting ear cartilage, an incoming call vibrator, and a short-range communication unit for communicating with the mobile telephone. In so doing, it is possible to be notified of and answer an incoming call while the mobile telephone remains stowed, for example, in a purse or the like; and during videoconferencing or the like, the risk of bothering others, or loss of privacy, due to the other caller's voice escaping to the surrounding area, can be prevented. According to a specific feature, the unit has a cartilage conduction vibration source for the cartilage conduction unit, and vibration of the cartilage conduction vibration source is employed concomitantly as a vibration source for the incoming call vibrator.

According to a specific feature, the incoming-talk unit is further with an outgoing-talk unit. Use as an outgoing-talk/incoming-talk unit is possible thereby. In cases of a compact configuration of such an outgoing-talk/incoming-talk unit, the outgoing-talk unit is preferably a bone conduction microphone. According to a more specific feature, the bone conduction microphone is situated at a location contacting the cheekbone when the cartilage conduction unit is placed in contact against the ear cartilage.

According to another specific feature, there is provided a mobile telephone having a cartilage conduction unit capable of contacting ear cartilage, an outgoing-talk unit, a telephone function unit, and a short-range communication unit for communicating with a mobile telephone, capable of independently making calls through the cartilage conduction unit, the outgoing-talk unit, and the telephone function unit, and provided with a cartilage conduction unit and an outgoing-talk unit through communication via the short-range communication unit, and capable of being used as an outgoing-talk/incoming-talk unit for another mobile telephone. In so doing, the various advantages afforded by cartilage conduction can be utilized during in calls made using another, ordinary mobile telephone. In this case, with a view to reasonable use in combination with another mobile telephone, it is preferable for the mobile telephone provided with the aforedescribed features to be configured as an ultra-compact mobile telephone.

According to a specific feature, the mobile telephone provided with the aforedescribed features has an incoming call vibrator, the mobile telephone being capable of being used as an incoming call vibrator unit for another mobile telephone, by being operated as an incoming call vibrator via the short-range communication unit. According to a more specific feature, the incoming call vibrator is set up so as to perform different incoming call vibration when there is an incoming call to the telephone function unit, versus when there is an incoming call to the other mobile telephone, transmitted by the short-range communication unit.

According to another specific feature, the mobile telephone provided with the aforedescribed features has a display unit, the display unit producing a different display when there is an incoming call to the telephone function unit, versus when there is an incoming call to the other mobile telephone, transmitted by the short-range communication unit. According to another specific feature, the mobile telephone provided with the aforedescribed features has an operating unit, and call answering is initiated through an identical operation performed by the operating unit, when there is an incoming call to the telephone function unit, and when there is an incoming call to the other mobile telephone, transmitted by the short-range communication unit.

According to a specific feature, there is provided a mobile telephone that comprises a first section and second section which are separable, the first section being furnished with an outgoing-talk unit, a telephone function unit, and a short-range communication unit for communicating with the second section, and the second section being furnished with a cartilage conduction unit capable of contacting ear cartilage and a short-range communication unit for communicating with the first section, and that functions as an integrated mobile telephone when the first section and the second section are joined, while when the second section is separated from the first section, the second section functions as a remote incoming-talk unit for short-range communication with the first section. In so doing, while the first section is kept stowed, for example, in a purse or the like, it is possible to receive incoming calls through the separated second section, as well as to prevent the risk of bothering others, or loss of privacy, due to the other caller's voice escaping to the surrounding area, during videoconferencing or the like.

According to a specific feature, the second section is furnished with an incoming call vibrator, and when the second section is separated from the first section, the second section functions as a remote incoming call vibrator for the first section. In so doing, it is possible to be notified of and answer incoming calls while keeping the separated second section on the body, for example, in a pocket or the like. According to a specific feature, the unit has a cartilage conduction vibration source for the cartilage conduction unit, and vibration of the cartilage conduction vibration source is employed concomitantly as a vibration source for the incoming call vibrator.

According to a specific feature, the first section and the second section are respectively furnished with an operating unit for performing a call answer operation, the operating unit of the second section being disabled when the first section and the second section are joined. According to another specific feature, the first section is furnished with an incoming-talk unit, the incoming-talk unit being disabled when the first section and the second section are joined. According to yet another specific feature, the second section is furnished with an outgoing-talk unit, the outgoing-talk unit being disabled when the first section and the second section are joined. According to a more specific feature, the outgoing-talk unit of the second section is a bone conduction microphone.

According to another specific feature, the first section and the second section are respectively furnished with charging means for performing charging of the second section from the first section. In so doing, when the first section is being charged while the first section and the second section are in the joined state, charging of the second section can take place simultaneously as well. According to a more specific feature, the device is configured such that the charging means detects whether or not the first section and the second section are in the joined state, and automatically switches between enabling and disabling functions of the aforedescribed units.

According to yet another specific feature, an elastic body is anchored to either the first section or the second section, and the first section or the second section is detachably attached to the other via the elastic body. In so doing, utilizing the separable configuration for the first section and the second section, vibration from the cartilage conduction unit of the second section is not readily propagated to the first section when the two are joined. According to a more specific feature, the elasticity of the elastic body is utilized for detachable attachment of the first section and the second section.

[Twenty-sixth Technical Feature]

A twenty-sixth technical feature disclosed in the present specification provides a mobile telephone having a telephone function unit, a cartilage conduction unit, a cartilage conduction vibration source for vibrating the cartilage conduction unit, a power supply unit for supplying power to the cartilage conduction vibration source, and a power supply control unit for providing a supply of power to the power supply unit when the cartilage conduction unit is in a state able to contact ear cartilage, while halting the supply of power to the power supply unit when the cartilage conduction unit is in a state of non-contact with ear cartilage. Efficient supply of power to the cartilage conduction vibration source is possible thereby.

According to a specific feature, the mobile telephone has a power switch, and the state of non-contact of the cartilage conduction unit with ear cartilage refers to a state immediately following turning on of the power switch. According to another specific feature, the mobile telephone has a speaker for outputting sound during videoconferencing, and the state of non-contact of the cartilage conduction unit with ear cartilage refers to the videoconferencing mode state.

According to yet another specific feature, the state of non-contact of the cartilage conduction unit with ear cartilage refers to a non-talk state. More specifically, the power supply control unit initiates supply of power to the power supply unit in response to a call initiation signal, and halts the supply of power to the power supply unit in response to a call termination signal.

According to a more specific feature, the call initiation signal is an incoming call signal. According to another more specific feature, the call initiation signal is a call request signal. According to another more specific feature, the call termination signal is a call disconnect signal.

According to another specific feature, the power supply unit is a voltage booster circuit. According to another specific feature, the cartilage conduction vibration source is a piezoelectric bimorph element. These features are more preferable when combined.

According to yet another specific feature, the mobile telephone has an amplifier for providing a call signal to the cartilage conduction vibration source, and the power supply unit supplies power to this amp. According to a more specific feature, a muting circuit is inserted between the cartilage conduction vibration source and the amplifier, and muting is performed by the muting circuit, for predetermined time intervals before and after initiation and termination of supply of power to the power supply unit. More specifically, the power supply control unit initiates muting by the muting circuit, in response to call initiation signals and call termination signals. According to another specific feature, in the aforedescribed configurations, the power supply unit and the power supply control unit are preferably configured as a one-chip integrated circuit.

According to another feature, there is provided a mobile telephone having a telephone function unit, a cartilage conduction unit, a cartilage conduction vibration source for vibrating the cartilage conduction unit, a power supply unit for supplying power to the cartilage conduction vibration source, an amplifier for providing a call signal to the cartilage conduction vibration source, and a muting circuit inserted between the cartilage conduction vibration source and the amplifier, for muting for a predetermined time interval, and a muting control unit for initiating muting by the muting circuit, in response to call initiation signals and call termination signals. In so doing, it is possible to control power supply in such a way that popping noises are not produced by the cartilage conduction vibration source at initiation and termination of a call.

According to a specific feature, the call initiation signal is an incoming call signal. According to another more specific feature, the call initiation signal is a call request signal. According to another specific feature, the call termination signal is a call disconnect signal.

According to another specific feature, the mobile telephone has a power supply control unit that initiates or halts the supply of power to the power supply unit during intervals of muting by the muting circuit. According to another specific feature, in the aforedescribed configurations, the power supply unit, the power supply control unit, and the muting circuit are preferably configured as a one-chip integrated circuit.

According to another specific feature, in the aforedescribed configuration the power supply unit is a voltage booster circuit. According to another specific feature, the cartilage conduction vibration source is a piezoelectric bimorph element. These features are more preferable when combined.

[Twenty-seventh Technical Feature]

A twenty-seventh technical feature disclosed in the present specification provides a mobile telephone in which a cartilage conduction unit for touching ear cartilage is furnished to a mobile telephone upper part, and a videoconferencing in-camera is furnished to a mobile telephone lower part. In so doing, the cartilage conduction unit and the videoconferencing in-camera can be situated effortlessly. According to a specific feature, the mobile telephone has a display screen, and the videoconferencing in-camera is furnished to the opposite side from the cartilage conduction unit with the display screen therebetween.

According to a more specific feature, the display screen is rectangular, and the videoconferencing in-camera is situated such that a direction perpendicular to the lengthwise sides of the display screen is a vertical direction. In so doing, image capture can take place in a satisfactory manner, while holding the mobile telephone in landscape mode oriented so that the lengthwise sides of the display screen are horizontal. According to another more specific feature, the display screen is rectangular, and the videoconferencing in-camera is furnished to the mobile telephone lower part and biased towards a location positioned to the upper side when the mobile telephone is held oriented so that the lengthwise sides of the display screen are horizontal. In so doing, the face of the user can be captured from above while holding the mobile telephone in landscape mode.

According to yet another specific feature, the mobile telephone has orientation detection means for detecting the orientation of the mobile telephone, and image auto-rotation means for rotating an image on the display screen by 90 degrees, on the basis of the orientation detection means, and is moreover furnished with misoperation prevention means for preventing misoperation of the image auto-rotation means on the basis of the videoconferencing in-camera being situated such that a direction perpendicular to the lengthwise sides of the display screen is a vertical direction. In so doing, confusion as to which way an image is pointing can be avoided, while the videoconferencing in-camera is situated such that a direction perpendicular to the lengthwise sides of the display screen is a vertical direction.

According to yet another specific feature, the mobile telephone has a piezoelectric bimorph element as the vibration source for the cartilage conduction unit, the piezoelectric bimorph element being adapted to detect the impact of a finger applied to the cartilage conduction unit while the mobile telephone is held in an orientation such that the lengthwise sides of the display screen are horizontal, thereby serving concomitantly as an operation input during videoconferencing. In so doing, the piezoelectric bimorph element can be effectively utilized as a vibration source for the cartilage conduction unit while held in landscape orientation.

According to yet another specific feature, the mobile telephone has a piezoelectric bimorph element as the vibration source for the cartilage conduction unit, vibration of the piezoelectric bimorph element being concomitantly employed to provide notification that videoconferencing is in progress, through vibration transmitted to a hand holding the mobile telephone with the lengthwise sides of the display screen horizontal. In so doing, the piezoelectric bimorph element can be effectively utilized as a vibration source for the cartilage conduction unit while held in landscape orientation.

According to another specific feature, a light-emitting unit is furnished in proximity to the videoconferencing in-camera, and the line of sight is directed towards the videoconferencing in-camera by emission of light from the light-emitting unit. In so doing, smooth videoconferencing at a natural line of sight can be achieved.

According to another feature, there is provided a mobile telephone that has a videoconferencing in-camera, and a main camera for capturing images from the opposite side in relation to the videoconferencing in-camera, and that during videoconferencing transmits an image from the main camera and an image from the videoconferencing in-camera. In so doing, it is possible to transmit images having richer information content.

According to another feature, there is provided a mobile telephone that has a videoconferencing in-camera, a main camera for capturing images from the opposite side relative to the videoconferencing in-camera, and a display screen, and that, during videoconferencing, displays on the display screen an image from the main camera and a received image from the videoconferencing in-camera. More accurate image transmission is possible thereby.

According to another feature, there is provided a mobile telephone that has a videoconferencing in-camera and a display screen, and that, during videoconferencing, displays on the display screen a received image from the videoconferencing in-camera, and a received image taken from the opposite side in relation to the videoconferencing in-camera. In so doing, it is possible to transmit images having richer information content.

According to another feature, there is provided a mobile telephone that has a videoconferencing in-camera, a main camera for capturing images from the opposite side relative to the videoconferencing in-camera, and a display screen, and that, during videoconferencing, displays on the display screen an image from the main camera and a received image taken from the opposite side in relation to the videoconferencing in-camera. In so doing, videoconferencing in which the callers share what they are looking at with one another are possible.

[Twenty-eighth Technical Feature]

A twenty-eighth technical feature disclosed in the present specification provides a cartilage conduction vibration source device having a sound signal input unit for inputting a sound signal, an acoustic processing unit for acoustic processing, for purposes of cartilage conduction vibration, of the sound signal input from the sound signal input unit, a power source input unit, a voltage booster circuit unit for boosting an input voltage to the power source input unit, and an amplifier unit supplied with power by the voltage booster circuit unit, for outputting a processed signal processed by the acoustic processing unit, to the cartilage conduction vibration source as a drive signal. In so doing, it is possible for the cartilage conduction vibration source to be readily driven in a manner suited to cartilage conduction, by input of an ordinary sound signal and driving by an ordinary power source.

According to a specific feature, the sound signal input unit inputs an analog signal from an audio signal output unit, the acoustic processing unit and the amplifier unit are constituted by analog circuits, and an analog drive signal is output to the cartilage conduction vibration source. In so doing, the cartilage conduction vibration source can be readily driven in a manner suited to cartilage conduction, on the basis of sound output for an ordinary speaker.

According to another specific feature, the sound signal input unit inputs an analog signal from an audio signal output unit, the acoustic processing unit is constituted by an AD conversion circuit, a digital acoustic processing circuit, and a DA conversion circuit, and the amp circuit is constituted by an analog circuit which outputs the output of the DA conversion circuit to the cartilage conduction unit as an analog drive signal. In so doing, driving of the cartilage conduction vibration source in a manner suited to cartilage conduction on the basis of sound output for an ordinary speaker can be accomplished at low cost.

According to another specific feature, the sound signal input unit inputs a digital signal from the audio signal output unit, the acoustic processing unit is constituted by a digital acoustic processing circuit and a DA conversion circuit, and the amp circuit is constituted by an analog circuit which outputs the output of the DA conversion circuit to the cartilage conduction unit as an analog drive signal. In so doing, driving of the cartilage conduction vibration source in a manner suited to cartilage conduction on the basis of ordinary digital sound output can be accomplished at low cost, and with a simple configuration.

According to another specific feature, the sound signal input unit inputs a digital signal from the audio signal output unit, the acoustic processing unit is constituted by a digital acoustic processing circuit, and the amp circuit is constituted by an analog circuit which outputs the output of the digital acoustic processing circuit to the cartilage conduction unit as a digital drive signal. In so doing, driving of the cartilage conduction vibration source in a manner suited to cartilage conduction on the basis of ordinary digital sound output can be accomplished by a digital circuit only.

According to another specific feature, there is provided a cartilage conduction vibration source device having a vibration source module to which a digital drive signal is input, and in which a low pass filter for the digital drive signal and a piezoelectric bimorph element serving as a cartilage conduction vibration source are integrated. The low pass filter is necessary in cases in which the piezoelectric bimorph element is driven by digital drive signals, but merely by using the aforedescribed vibration source module, driving of the cartilage conduction vibration source in a manner suited to cartilage conduction can be accomplished without the burden entailed by having to make preliminary adjustment of the low-pass filter.

According to another specific feature, there is provided a cartilage conduction vibration source device having a sound signal output unit for outputting an analog sound signal, an analog sound signal input unit for inputting an analog sound signal, an analog acoustic processing unit for acoustic processing, for purposes of cartilage conduction vibration, of a sound signal input from the analog sound signal input unit, an analog amplifier unit for outputting an analog processed signal processed by the analog acoustic processing unit, to the cartilage conduction vibration source as a drive signal, and a cartilage conduction vibration source driven by the analog drive signal. In so doing, a suitable cartilage conduction vibration source can be realized through analog circuits.

According to another specific feature, there is provided a cartilage conduction vibration source device having a sound signal output unit for outputting an analog sound signal, an analog sound signal input unit for inputting an analog sound signal, an AD conversion circuit for converting a sound signal input from the analog sound signal input unit to a digital signal, a digital acoustic processing unit for acoustic processing, for purposes of cartilage conduction vibration, of the output of the AD conversion circuit, a DA conversion circuit for converting a processed signal processed by the digital acoustic processing unit to an analog signal, an analog amplifier unit for outputting the output of the DA conversion circuit to the cartilage conduction vibration source as an analog drive signal, and a cartilage conduction vibration source driven by the analog drive signal. In so doing, a suitable cartilage conduction vibration source can be realized at controlled cost, on the basis of analog sound output.

According to another specific feature, there is provided a cartilage conduction vibration source device having a sound signal output unit for outputting a digital sound signal, a digital sound signal input unit for inputting a digital sound signal, a digital acoustic processing unit for acoustic processing, for purposes of cartilage conduction vibration, of a sound signal input from the digital sound signal input unit, a DA conversion circuit for converting a processed signal processed by the digital acoustic processing unit to an analog signal, an analog amplifier unit for outputting the output of the DA conversion circuit to the cartilage conduction vibration source as an analog drive signal, and a cartilage conduction vibration source driven by the analog drive signal. In so doing, a suitable cartilage conduction vibration source can be realized at controlled cost, on the basis of digital sound output.

According to another feature, there is provided a cartilage conduction vibration source device having a sound signal output unit for outputting a digital sound signal, a digital sound signal input unit for inputting a digital sound signal, a digital acoustic processing unit for acoustic processing, for purposes of cartilage conduction vibration, of a sound signal input from the digital sound signal input unit, a digital amplifier unit for outputting a processed signal processed by the digital acoustic processing unit to the cartilage-conduction vibration source as a digital drive signal, a low-pass filter for the digital drive signal, and a cartilage-conduction vibration source driven by a drive signal having passed through the low-pass filter. In so doing, a suitable cartilage conduction vibration source can be realized through digital circuits. In this case, it is possible to integrate the low-pass filter and the cartilage-conduction vibration source and provide these as a vibration source module.

[Twenty-ninth Technical Feature]

A twenty-ninth technical feature disclosed in the present specification provides a mobile telephone having a chassis, a cartilage conduction unit differing in acoustic impedance from the chassis and connected to the chassis, a cartilage-conduction vibration source for transmitting vibration to the cartilage conduction unit, and a load connection unit for connecting a load of an internal structure load to the chassis in proximity to the cartilage conduction unit in the chassis. In so doing, vibration of the chassis is suppressed in proximity to the cartilage conduction unit, which corresponds to an entrance section for vibration transmission, and by avoiding connection of the cartilage conduction unit and the chassis at closely approximating acoustic impedance, it is possible to ensure some degree of freedom in vibration of the cartilage conduction unit and obtain satisfactory cartilage conduction.

According to a specific feature, the load connection unit connects the load of the internal structure over a small cross-sectional area to the chassis. In so doing, it is possible for the load connection location to be specifically concentrated in proximity to the cartilage conduction unit, which corresponds to an entrance section for vibration transmission, and it is possible to effectively suppress chassis vibration.

According to another specific feature, the cartilage conduction unit and the chassis are connected via a vibration isolating material. In so doing, the effect of avoiding connection of the cartilage conduction unit and the chassis at closely approximating acoustic impedance can be enhanced. According to a more specific feature, a section situated away from the load connection unit is furnished with another load connection unit for connecting a load of an internal structure to the chassis. In so doing, the internal structure is reliably held through a simple configuration.

According to another specific feature, the cartilage conduction unit and the chassis are connected directly. In so doing, the number of parts is reduced, and the holding structure for the cartilage conduction unit and the chassis is simple. According to a more specific feature, the cartilage conduction unit is configured from an elastic body of greatly different acoustic impedance from the chassis.

According to another specific feature, the internal structure is held to the chassis via a lower vibration isolating material, in a section away from the load connection unit. In so doing, it is possible for the internal structure to be held in reliable fashion without diminishing the effect of specifically concentrating the load connection location to one in proximity to the cartilage conduction unit, which corresponds to an entrance section for vibration transmission.

According to another specific feature, the load-connected internal structure is a cell. The cell constitutes a large proportion of the load in a mobile telephone, and is moreover a coherent section, and therefore load connection is preferred. According to a more specific feature, the load connection part is furnished to a holder for holding the cell while avoiding a center section thereof. In so doing, it is possible for the load of the cell to be specifically concentrated in suitable fashion at a location in proximity to the cartilage conduction unit. Furthermore, as the center part of the cell swells with the passage of time during use, in order to avoid this, the configuration of the holder is preferably one that avoids the center section. According to another specific feature, it is possible for the internal structure to be a frame structure than includes a cell holding unit.

According to another feature, there is provided a mobile telephone having a chassis, a vibration isolating material connected to the chassis, a cartilage conduction unit connected to the chassis via the vibration isolating material, a cartilage-conduction vibration source for transmitting vibration to the cartilage conduction unit, and a load connection unit for connecting a load of an internal structure to the chassis in proximity to the cartilage conduction unit on the chassis. In so doing, vibration of the chassis can be suppressed, without diminishing good cartilage conduction capability, in the manner described previously.

In cases in which the cartilage conduction unit connected to the chassis via the vibration isolating material in the aforedescribed manner, it is possible for the chassis and the cartilage conduction unit to be made of materials of equal acoustic impedance. In so doing, the materials for the mobile telephone are more readily procured, and reduction in cost thereof is possible.

According to another feature, there is provided a mobile telephone having an internal structure, a cartilage conduction unit connected to the internal structure, a cartilage-conduction vibration source for transmitting vibration to the cartilage conduction unit, and a chassis connected to the internal structure via the vibration isolating material. In so doing, in the first instance, an internal structure constituting most of the load in the mobile telephone is connected to the cartilage conduction unit thus suppressing transmission of vibration, and moreover, the internal structure is connected, via the vibration isolating material, to the chassis which represents a relatively small proportion of the load, thus suppressing vibration of the chassis, which defines the outer surfaces of the mobile telephone.

According to a specific feature, the cartilage conduction unit is connected to the internal structure via the vibration isolating material. According to another specific feature, the cartilage conduction unit is an elastic body. According to these features, good cartilage conduction can be ensured, while suppressing vibration of the chassis.

[Thirtieth Technical Feature]

A thirtieth technical feature disclosed in the present specification provides a cartilage-conduction vibration source device having a sound signal input unit for inputting a sound signal, an acoustic processing unit for variable processing, for purposes of cartilage conduction, of a sound signal input from the sound signal input unit, a control signal input unit for inputting a control signal for purposes of variable processing in the acoustic processing unit, and an amplifier unit for outputting a processed signal processed by the acoustic processing unit to a cartilage-conduction vibration source as a drive signal. In so doing, it is possible to drive the cartilage-conduction vibration source for purposes of cartilage conduction, in an appropriate manner according to changes in conditions.

According to a specific feature, the acoustic processing unit modifies acoustic processing in such a way that the drive signal output to the cartilage-conduction vibration source differs in frequency characteristics, according to whether a sound has arrived via a communication unit or the sound has not arrived via the communication unit. In so doing, the cartilage-conduction vibration source can be driven in a manner that increases the contribution of direct air conduction in cartilage conduction for sounds not arriving via the communication unit, relative to sounds arriving via the communication unit.

According to another specific feature, the acoustic processing unit modifies acoustic processing in such a way that the drive signal output to the cartilage-conduction vibration source differs in frequency characteristics for a normal individual, versus a person with conductive hearing loss. In so doing, the cartilage-conduction vibration source can be driven in a manner that increases the contribution of cartilage bone conduction in cartilage conduction for a person with conductive hearing loss, relative to a normal individual.

According to another specific feature, the acoustic processing unit modifies acoustic processing in such a way that the drive signal output to the cartilage-conduction vibration source differs in frequency characteristics in cases in which the external auditory meatus entrance is unoccluded, versus cases in which the entrance is occluded. In so doing, the cartilage-conduction vibration source can be driven in a manner that halts the contribution of direct air conduction in cartilage conduction in cases in which the external auditory meatus entrance is occluded.

According to another specific feature, the acoustic processing unit has a plurality of acoustic processing units, the contributions of the plurality of acoustic processing units to the drive signal being modified on the basis of a control signal. In so doing, acoustic processing optimized for each conduction element of cartilage conduction can be respectively devised, and variable acoustic processing controlled through modification of these contributions.

According to a specific feature, there is provided a cartilage-conduction vibration source device having a sound signal input unit for inputting a sound signal, a plurality of acoustic processing units for processing, for purposes of cartilage conduction, of a sound signal input from the sound signal input unit, and an amplifier unit for outputting a processed signal processed by the plurality of acoustic processing units and synthesized, to a cartilage-conduction vibration source as a drive signal. In so doing, acoustic processing can take place through synthesis of acoustic processing optimized for each conduction element of cartilage conduction.

According to a specific feature, the plurality of acoustic processing units have a first acoustic processing unit for carrying out acoustic processing on the basis of the frequency characteristics of cartilage bone conduction from the cartilage-conduction vibration source, and a second acoustic processing unit for carrying out acoustic processing on the basis of the frequency characteristics of direct air conduction from the cartilage-conduction vibration source.

According to another feature, there is provided a cartilage-conduction vibration source device having a sound signal input unit for inputting a sound signal, an acoustic processing unit for processing, for purposes of cartilage conduction, of a sound signal input from the sound signal input unit, and an amplifier unit for outputting a processed signal processed by the acoustic processing unit to a cartilage-conduction vibration source as a drive signal, the amplifier unit having a gain adjustment unit for adjusting gain according to input signal level, such that the output level is brought to a predetermined drive signal level for the cartilage-conduction vibration source. In so doing, the capabilities of the cartilage-conduction vibration source can be utilized to maximum effect, to achieve appropriate cartilage conduction.

According to a specific feature, there is provided a mobile telephone having the aforedescribed cartilage-conduction vibration source device. According to a more specific feature, the mobile telephone is configured as a mobile device having a combination large-screen display unit/touch screen. According to a more specific feature, a cartilage conduction unit is furnished to a distal end of an extendable and retractable holder joined to the mobile telephone body by a universal joint.

According to another feature, there is provided a mobile telephone configured as a mobile device, having a combination large-screen display unit/touch screen furnished to the body thereof, and a sound output unit furnished to a distal end of an extendable and retractable holder joined to the body by a universal joint. In so doing, calling is possible through a simple operation while viewing the large screen. According to a specific feature, the sound output unit is a cartilage conduction unit.

[Thirty-first Technical Feature]

A thirty-first technical feature disclosed in the present specification provides a mobile telephone accessory device having an input unit for an external sound signal output by a mobile telephone, a cartilage conduction unit for vibrating on the basis of an external sound signal input from the input unit, and a support unit for supporting the cartilage conduction unit on the mobile telephone. In so doing, an ordinary mobile telephone can be transformed into a cartilage conduction mobile telephone.

According to a specific feature, the holder unit is a soft cover sheathing the mobile telephone, the cartilage conduction unit being situated in an upper corner of the soft cover. In so doing, an ordinary mobile telephone can be transformed into a cartilage conduction mobile telephone by being sheathed with the soft cover.

According to a more specific feature, the soft cover is configured to be thicker in an upper portion, a cartilage-conduction vibration source being situated in one corner of the upper section, whereby when the mobile telephone is sheathed in the soft cover, the one corner of the thick section where the cartilage-conduction vibration source is situated is supported as a cartilage conduction unit on the mobile telephone. In so doing, the soft cover can be configured as a suitable mobile telephone accessory device.

According to a more specific feature, an external earphone plug for insertion of an external output jack of a mobile telephone is situated as an input unit, within the other corner of the thick section of the soft cover. In so doing, there can be configured a mobile telephone accessory device that suitably utilizes the external output of an ordinary mobile telephone.

According to a more specific feature, the external earphone plug is situated in the other corner of the thick section where the external output jack of the mobile telephone is insertable prior to sheathing the mobile telephone in the soft cover. In so doing, the mobile telephone can be sheathed by the soft cover, while easily making connection to an external output from the mobile telephone.

According to another more specific feature, the soft cover has a drive unit for driving the cartilage-conduction vibration source, on the basis of a sound signal input from the input unit. In so doing, the cartilage-conduction vibration source can be driven in a suitable manner, on the basis of an external output from the mobile telephone. According to more specific feature, the soft cover has a power supply unit for supplying power to the drive unit. Suitable cartilage conduction on the basis of an external output from the mobile telephone can be accomplished thereby.

According to another more specific feature, the cartilage-conduction vibration source is an electromagnetic vibrator. In doing, there can be obtained a cartilage-conduction vibration source that is easily assembled into the soft cover.

According to another feature, there is provided a mobile telephone having a cartilage conduction vibration unit situated in one upper corner sandwiched between a front face and a rear face, and capable of transmitting vibration from the front face side to the rear face side, and a microphone having symmetrical directionality with respect to the front face side and the rear face side. In so doing, it is possible to make calls in suitable fashion, with the single cartilage conduction vibration unit placed against either the right ear or the left ear.

According to a specific feature, the microphone is situated on a side face between the front face and the rear face. According to another specific feature, the microphone is situated on a bottom face between the front face and the rear face. These features respectively facilitate placement of a microphone having symmetrical directionality with respect to the front face side and the rear face side.

According to another specific feature, the microphone is furnished to a lower corner which is situated in proximity to the side directly below the upper corner furnished with the cartilage conduction vibration unit. In so doing, the microphone can pick up sound in proximity to mouth, both in the case of placing the single cartilage conduction vibration unit against the right ear, and the case of placing it against the left ear.

(Thirty-second Technical Feature)

A thirty-second technical feature disclosed in the present specification provides a mobile telephone having a sound signal source unit for outputting a sound signal, an equalizer for applying correction to a sound signal output from the sound signal source unit, doing so on the basis of the vibration frequency characteristics of ear cartilage, and a cartilage-conduction vibration source vibrated by the sound signal corrected by the equalizer. In so doing, there can be provided a cartilage conduction mobile telephone incorporating a medical aspect relating to vibration transmission in ear cartilage.

According to a specific feature, the equalizer performs correction to boost the gain at the high end within the frequency band at which the cartilage-conduction vibration source is vibrated. This configuration incorporates the medical knowledge that, in the frequency characteristics of vibration transmission in ear cartilage, vibrational acceleration is low at the high end within the frequency band at which the cartilage-conduction vibration source is vibrated.

According to a more specific feature, with the external auditory meatus in the occluded state, the equalizer performs correction to boost the gain at the high end within the frequency band at which the cartilage-conduction vibration source is vibrated, to a level higher than the gain when the external auditory meatus is in the unoccluded state. This configuration is based on the medical knowledge that, during cartilage conduction with the external auditory meatus in the unoccluded state, the direct air conduction component is quite large at the high end within the frequency band at which the cartilage-conduction vibration source is vibrated. The configuration moreover takes into account the fact that this direct air conduction component disappears with the external auditory meatus in the occluded state.

According to a more specific feature, the mobile telephone has a detection unit for detecting pressing of the mobile telephone against the ear cartilage, and when the output of the detection unit is at or above a predetermined level, the equalizer performs correction to boost the gain at the high end within the frequency band at which the cartilage-conduction vibration source is vibrated, to a level higher than the gain when the external auditory meatus is in the unoccluded state. In so doing, equalization switching can take place in suitable fashion.

According to another more specific feature, the mobile telephone has a detection unit for detecting environment noise, and when the output of the detection unit is above a predetermined level, the equalizer performs correction to boost the gain at the high end within the frequency band at which the cartilage-conduction vibration source is vibrated, to a level higher than the gain when the external auditory meatus is in the unoccluded state. This configuration is designed so that equalization switching takes place on the assumption that, when environment noise is above a predetermined level, the user will press the mobile telephone against the ear cartilage to the extent that the external auditory meatus entrance is occluded.

According to a more specific feature, the equalizer performs correction to boost the gain at the high end within the frequency band at which the cartilage-conduction vibration source is vibrated, to a level higher than the gain when the external auditory meatus is in the unoccluded state, doing so on the basis of a moving average output of a detection unit. In so doing, equalization switching can takes place in a smooth manner while preventing misoperation.

According to a more specific feature, when determined on the basis of the output of the detection unit that the external auditory meatus is obstructed, the equalizer performs correction to rapidly boost the gain at the high end within the frequency band at which the cartilage-conduction vibration source is vibrated, to a level higher than the gain when the external auditory meatus is in the unoccluded state; while halting correction to boost the gain, when output changes of the detection unit have been ascertained multiple times during a decision that the external auditory meatus is unoccluded. This configuration is designed to perform equalization rapidly when the external auditory meatus is occluded, due to the fact that under this condition sounds audible through the external auditory meatus occlusion effect are louder, and changes in sound quality tend to be more noticeable; as well as to prevent excessive equalization switching due to misoperation when the external auditory meatus is unoccluded.

According to another specific feature, the mobile telephone has an external sound output unit or a short-range wireless communication unit, and the equalizer performs correction to boost the gain at the high end within the frequency band at which the cartilage-conduction vibration source is vibrated, to a level higher than the gain in sound output from these external output means. This configuration uses equalization appropriate to ordinary air conduction as a benchmark, but incorporates a medical aspect relating to the frequency characteristics of vibration transmission in ear cartilage.

According to another specific feature, there is provided a mobile telephone accessory device having an input unit for input of a sound signal output from a mobile telephone, an equalizer for applying correction to a sound signal from the input unit, doing so on the basis of vibration transmission frequency characteristics of ear cartilage, and a cartilage-conduction vibration source vibrated by the sound signal corrected by the equalizer. In so doing, there can be provided an accessory device for a mobile telephone, in which sound output that uses equalization appropriate to ordinary air conduction as a benchmark is input from the mobile telephone, and on the basis thereof, cartilage conduction incorporating a medical aspect relating to vibration transmission in ear cartilage is achieved.

According to a specific feature, the equalizer performs correction to boost the gain at the high end within the frequency band at which the cartilage-conduction vibration source is vibrated. Input of sound signals from the mobile telephone to the accessory device may be carried out through a wired connection, or through wireless short-range communication means such as short-range wireless or infrared communication.

(Thirty-third Technical Feature)

A thirty-third technical feature disclosed in the present specification provides a mobile telephone in which elastic bodies are interposed between an upper edge part of the mobile telephone including both upper corners, and other sections of the mobile telephone, and a cartilage-conduction vibration source is furnished inside the upper edge part, such that there is substantially no contact thereof with other sections of the mobile telephone. In so doing, the upper edge of the mobile telephone including both upper corners of the mobile telephone can be vibrated efficiently.

According to a specific feature, the cartilage-conduction vibration source is furnished to the inside center of the upper edge part. In so doing, both upper corners of the mobile telephone can be vibrated efficiently, and an upper edge center part can be vibrated efficiently as well.

According to another specific feature, the upper edge part is an upper frame of the mobile telephone. In so doing, the upper edge of the mobile telephone including both upper corners of the mobile telephone can be vibrated efficiently, in a manner consistent with the configuration of the mobile telephone. According to a more specific feature, a front face panel of the mobile telephone contacts the upper frame of the mobile telephone. In so doing, suitable cartilage conduction from a front face upper part of the mobile telephone may be obtained in a manner consistent with the configuration of the mobile telephone.

According to a more specific feature, the mobile telephone is furnished with two side frames situated with elastic bodies interposed in relation to the upper frame, and contacting the front face panel. In so doing, vibration of the lower front face panel is effectively suppressed.

According to a more specific feature, a section of the front face panel contacting the upper frame is at least partially thinner than sections contacting the two side frames. In so doing, vibration of the lower front face panel is effectively suppressed.

According to another specific feature, the upper edge part gives rise to cartilage conduction through ear cartilage, when either of the two upper corners is placed in contact with the ear cartilage. In so doing, it is possible take advantage of cartilage conduction when using the mobile telephone.

According to another specific feature, the upper edge part gives rise to cartilage conduction through ear cartilage when a center part thereof is placed in contact with the ear cartilage. In so doing, cartilage conduction may be obtained during use as an ordinary mobile telephone.

According to another specific feature, the upper edge part is configured to produce predetermined air-conducted sound. In so doing, the air-conducted sound required of an ordinary mobile telephone can be obtained, without furnishing an ordinary speaker.

According to another specific feature, the upper edge part is furnished with an external earphone jack which vibrates together with the upper edge part. According to a more specific feature, when detected that an external earphone plug has been inserted into the external earphone jack, vibration of the cartilage-conduction vibration source is prohibited. According to another specific feature, an in-camera is situated in proximity to the upper edge part, and when a mode for using the in-camera is detected, vibration of the cartilage-conduction vibration source is prohibited. According to another specific feature, the upper edge part is furnished with a window through which a power switch can move up or down without contacting the upper edge part.

According to another feature, there is provided a mobile telephone having an antenna, and a cartilage-conduction vibration source furnished to the antenna, for concomitantly employing the antenna as a cartilage conduction unit. In so doing, suitable cartilage conduction can be obtained from a front face upper part of the mobile telephone in a manner consistent with the configuration of the mobile telephone.

(Thirty-fourth Technical Feature)

A thirty-fourth technical feature disclosed in the present specification provides a listening device having a cartilage conduction unit for contacting the outside of the base of the ear, and a cartilage-conduction vibration source for propagation of vibration to the cartilage conduction unit. In so doing, the external auditory meatus entrance region is completely free, and so entry of sounds, such as a car horn, into the ear in an emergency situation is unimpeded, nor is there the discomfort associated with inserting an earphone or the like into the external auditory meatus entrance. An external auditory meatus occluding effect can readily be obtained, for example, by covering the ear with the hand in order to enhance the cartilage conduction effect, whereby increased volume and blockage of outside noise can be achieved.

According to a specific feature, the listening device provided with the aforedescribed features has an ear-hook unit for linear contact while hooked around the outside of the base of the ear, the inner edge of the ear-hook unit functioning as the cartilage conduction unit. In so doing, suitable holding of the cartilage conduction unit, and satisfactory cartilage conduction, can be achieved.

According to a more specific feature, the ear-hook unit is configured of elastic material having acoustic impedance close to that of ear cartilage. In so doing, satisfactory cartilage conduction and a comfortable fit to the outside of the base of the ear can be achieved.

According to another specific feature, the cartilage-conduction vibration source is situated in proximity to a section closest to the external auditory meatus entrance, at the outside of the cartilage of the base of ear. In so doing, vibration of the cartilage-conduction vibration source can generate air-conducted sound from the external auditory meatus inner wall through the agency of the cartilage surrounding the external auditory meatus opening, which is then transmitted to the eardrum.

According to a more specific feature, a piezoelectric bimorph element is employed as the cartilage-conduction vibration source, adopting a configuration in which one end of the piezoelectric bimorph element is supported by the cartilage conduction unit in proximity to a section closest to the external auditory meatus entrance, at the outside of the cartilage of the base of ear, and the other end side of the piezoelectric bimorph element does not contact the cartilage conduction unit. According to a more specific feature, an electromagnetic vibrator is employed as the cartilage-conduction vibration source, the electromagnetic vibrator being situated in proximity to a section closest to the external auditory meatus entrance, at the outside of the cartilage of the base of ear.

According to another more specific feature, the device has a microphone, and a vibration transmission prevention means is devised between the microphone and the cartilage conduction unit contacting the outside of the base of the ear. In so doing, the effects of vibration of the cartilage conduction unit on the microphone can be reduced, in cases in which the listening device of the present invention is applied to an outgoing-talk/incoming-talk device for the purpose of making calls.

According to another more specific feature, the vibration transmission prevention means involves configuring the microphone, a power supply unit, and a short-range communication unit for communication with the mobile telephone as separate body from the cartilage conduction unit, the cartilage-conduction vibration source of the cartilage conduction unit and the separate body being connected by flexible cable. According to another more specific feature, a microphone, a power supply unit having a cell, a short-range communication unit for communication with the mobile telephone, and the cartilage conduction unit are configured as an integrated body, the vibration transmission prevention means being realized by situating the cell between the microphone and the cartilage conduction unit in order to suppress vibration due to the load of the cell.

According to another feature, there is provided a listening device having a cartilage conduction unit having a passage hole at the center, for insertion into the external auditory meatus entrance, a shutter for opening and closing the passage hole, and a shutter drive unit for driving opening and closing of the shutter by a signal from the outside. In so doing, appropriate external auditory meatus occluding effect can be obtained automatically, or by a manual operation, without the need to push the cartilage conduction unit or block the ear with the hand.

According to a specific feature, the listening device has a parameter detection unit, and the shutter drive unit drives opening or closing of the shutter through a signal from the parameter detection unit. The parameter detection unit, for example, detects outside noise, and when the outside noise is above a predetermined level, generates a signal to occlude the shutter, or when the outside noise is below a predetermined level, generates a signal to unocclude the shutter. According to another specific feature, the listening device has a manually-operated unit, and the shutter drive unit drives opening or closing of the shutter through an operation signal generated by operation of the manually-operated unit.

According to another feature, there is provided a listening device having an external auditory meatus insertion unit having a passage hole at the center, for insertion into the external auditory meatus entrance, a shutter for opening and closing the passage hole, and a shutter drive unit for driving opening and closing of the shutter by a signal from the outside. In so doing, appropriate external auditory meatus occluding effect can be obtained automatically, or by a manual operation, without the need to push the cartilage conduction unit or block the ear with the hand.

(Thirty-fifth Technical Feature)

A thirty-fifth technical feature disclosed in the present specification provides an outgoing-talk/incoming-talk device having a cartilage conduction unit for contacting the mastoid side of the region of attachment of the auricle, and a contact microphone. In so doing, the outgoing-talk/incoming-talk device can be worn compactly on the head, making it possible, for example, for a helmet or the like to be worn from above.

According to a specific feature, the outgoing-talk/incoming-talk device has a cell, the contact microphone being isolated from the cartilage conduction unit by the cell. In so doing, propagation of vibration of the cartilage conduction unit to the contact microphone is suppressed by the cell, making it possible for the contact microphone to be used in suitable fashion. According to another specific feature, the outgoing-talk/incoming-talk device is furnished with canceling means for canceling vibration of the cartilage conduction unit picked up by the contact microphone. In so doing, it is possible for the contact microphone to be used in suitable fashion.

According to another specific feature, the contact microphone is furnished in proximity to the cartilage conduction unit. In so doing, the outgoing-talk/incoming-talk device can be accommodated compactly in a space behind the ear, making it possible, for example, for a helmet or the like to be worn from above.

According to a more specific feature, the contact microphone is situated contacting an area in proximity to the mastoid. According to another more specific feature, the contact microphone is situated contacting an area in proximity to the lower jaw. According to another more specific feature, the contact microphone is situated contacting an area in proximity to the mastoid side of a sternomastoid muscle. With each of these features, suitable voice pickup of can be achieved with the contact microphone in a compact arrangement in proximity to the cartilage conduction unit.

According to another specific feature, the device has a wireless communication capable of wireless communication with external equipment. In so doing, the outgoing-talk/incoming-talk device can be given a compact configuration, making it possible, for example, for a helmet or the like to be worn from above.

According to another specific feature, cartilage conduction units are furnished so as to respectively contact the mastoid side of the region of attachment of the auricle in each ear. In so doing, stereo listening becomes possible, and the constituent elements of the outgoing-talk/incoming-talk device can be apportioned among both ears, enhancing compactness of the device.

According to a more specific feature, the outgoing-talk/incoming-talk device is furnished with a support unit for supporting cartilage conduction units which are furnished for both ears and linked thereto. According to a more specific feature, the contact microphone is furnished to the support unit. According to a specific feature, the contact microphone is situated so as to pick up vibration of the sternomastoid muscle.

According to another specific feature, the contact microphone is furnished asymmetrically with respect to cartilage conduction units furnished for both ears, and mutually different canceling is performed on the respective vibrations of the cartilage conduction units picked up by the contact microphone.

According to another specific feature, cells are respectively situated in proximity to cartilage conduction units furnished for both ears. In so doing, there can be realized an outgoing-talk/incoming-talk device in which the cells, which occupy considerable volume, are situated in a compact arrangement, making it possible, for example, for a helmet or the like to be worn from above.

According to another feature, there is furnished an outgoing-talk/incoming-talk device having a cartilage conduction unit for contacting the mastoid side of the region of attachment of the auricle, and a cover unit for covering an area in proximity to the external auditory meatus entrance. In so doing, sounds obtained through cartilage conduction unit can be heard at higher volume. According to a specific feature, the cover unit is a helmet.

<Thirty-sixth Technical Feature>

A thirty-sixth technical feature disclosed in the present specification provides a mobile telephone having a touch panel/large-screen display unit, an external earphone jack, and a controller for disabling the touch panel functions of the touch panel/large-screen display unit when call-related functions are in operation, excluding videoconferencing when the external earphone jack is in use. It is thereby possible to prevent accidental operation of the touch panel also when the external earphone jack is being used.

According to a specific feature, the controller disables the touch panel functions of the touch panel/large-screen display unit on the basis of an incoming call response operation. It is thereby possible to implement both required operation of the touch panel and prevent of accidental operation. According to a more specific feature, the controller disables the touch panel functions of the touch panel/large-screen display unit after a predetermined time from the incoming call response operation. It is thereby possible to disable the touch panel functions suitable to a passive operation such as an incoming call response.

According to a more specific feature, the controller disables the touch panel functions of the touch panel/large-screen display unit on the basis of a call start. It is thereby possible to implement both operation required by the touch panel and prevent accidental operation.

According to a more specific feature, the controller disables the touch panel functions of the touch panel/large-screen display unit on the basis of an incoming call response operation or a call start, and has a different process for disabling in accordance with which action the disabling is based.

In accordance with another specific feature, the controller enables the touch panel functions of the touch panel/large-screen display unit on the basis of a call cutoff operation using other than the touch panel. It is thereby possible to implement both operation using the touch panel as well as prevention of accidental operation.

In accordance with another specific feature, the controller disables the touch panel functions of the touch panel/large-screen display unit when call-related functions, excluding videoconferencing, are operating in a state in which the external earphone jack is not being used. It is thereby possible to implement both required operation using the touch panel as well as prevention of accidental operation, regardless of the existence of use of the external earphone jack.

In accordance with a more specific feature, the controller disables the touch panel functions of the touch panel/large-screen display unit when call-related functions, excluding videoconferencing, are operating, by using means that differs between when the external earphone jack is being used and not being used. It is thereby possible to perform control suitable for use and non-use of the earphone jack.

In accordance with another specific feature, the controller disables the touch panel functions of the touch panel/large-screen display unit when call-related functions, excluding videoconferencing, are operating, by using shared means when the external earphone jack is being used and not being used. It is thereby possible to implement both required operation using the touch panel as well as prevention of accidental operation using a simple configuration.

In accordance with another specific feature, the shared means disables the touch panel functions of the touch panel/large-screen display unit on the basis of an incoming call response operation or a call start, and enables the touch panel functions of the touch panel/large-screen display unit on the basis of a call cutoff operation other than by the touch panel.

In yet another specific feature, the shared means is a proximity sensor and disables the touch panel functions of the touch panel/large-screen display unit on the basis of detection of proximity to the ear by the proximity sensor.

<Thirty-seventh Technical Feature>

A thirty-seventh technical feature disclosed in the present specification provides a mobile telephone having a cartilage conduction unit, a power supply switch, and a description unit for describing the method for using the cartilage conduction function, the description lasting for a predetermined time starting from when the power supply switch is turned on. A user who is unaware of the cartilage conduction function can thereby use the function without confusion.

In accordance with another feature, there is a provided a mobile telephone having a cartilage conduction unit, a call operation unit, and a description unit for starting a description of the method for using the cartilage conduction function when the call operation unit has been operated. A user who is unaware of the cartilage conduction function can thereby use the function without confusion. In accordance with a specific feature, the description unit stops description when another party has responded to a call.

In accordance with another feature, there is provided a mobile telephone having a cartilage conduction unit, and a description unit for starting a description of the method for using the cartilage conduction function when there is an incoming call. A user who is unaware of the cartilage conduction function can thereby use the function without confusion. In accordance with a specific feature, the mobile telephone has an incoming call response operation unit, and the description unit stops description when the incoming call response operation unit has been operated.

In accordance with the specific features above, the mobile telephone has a stop operation unit capable of arbitrarily stopping the description by the description unit. In accordance with a more specific feature, the description unit does not provide description after the stop operation unit has been operated.

In accordance with another specific feature, the mobile telephone has a normal-usage detection unit for detecting that the cartilage conduction function is being used correctly, and the description unit stops description when the normal-usage detection unit has detected correct usage. In accordance with a more specific feature, the description unit does not provide description after the normal-usage detection unit has detected correct usage.

In accordance with another specific feature, the mobile telephone has a display unit, and the description unit displays the description on the display unit.

In accordance with another specific feature, the mobile telephone has a proximity sensing unit, and the description unit outputs a description announcement from the cartilage conduction unit which the proximity sensing unit detects the mobile telephone to be proximate to the ear.

In accordance with another specific feature, the mobile telephone has a tilt detection unit, and the description unit provides a description for right-hand use at a first tilt and for left-hand use at a second tilt.

In accordance with another feature, there is provided a listening device having a sound source device having a maximum output to the exterior of 500 mVrms or more, and a pair of cartilage conduction units for use with both ears that achieves a vibration acceleration of 50 dB (reference value=$10^{-6}$ m/sec$^2$) or more to the rear surface side of the tragus when there is input of 200 mVrms by connection to an external output of the sound source device, wherein the cartilage conduction units are each provided with a passage hole for introducing air-conducted sound from the exterior to the entrance to the external auditory meatus.

In accordance with a specific feature, the sound source device has a controller for responding to an incoming call to an external mobile telephone and stopping output to the pair of cartilage conduction units.

<Thirty-eighth Technical Feature>

A thirty-eighth technical feature disclosed in the present specification provides a cartilage conduction vibration source device having a sound signal input unit for inputting a sound signal, an acoustic processing unit for acoustic processing, for purposes of cartilage conduction vibration, of the sound signal input from the sound signal input unit, a power source input unit, a voltage booster circuit unit for boosting an input voltage to the power source input unit, and an amplifier unit for outputting a processed signal processed by the acoustic processing unit to the cartilage conduction vibration source as a drive signal, the amplifier unit being supplied with power by the voltage booster circuit unit. It is thereby possible for an advantageous cartilage conduction vibration source to be readily driven in a manner suited to cartilage conduction, by input of an ordinary sound signal and driving by an ordinary power source. In accordance with a specific feature, the sound signal input unit receives input of an analog signal from the sound signal output unit; the acoustic processing unit and the amplifier unit are composed of an analog circuit, and the analog drive signal is outputted to a cartilage conduction vibration source. The cartilage conduction vibration source can thereby be readily and advantageously driven for cartilage conduction based on sound output for an ordinary speaker. In accordance with another specific feature, the sound signal input unit receives input of an analog signal from the sound signal output unit; the acoustic processing unit is composed of an AD conversion circuit, a digital acoustic processing circuit, and a DA conversion circuit; and the amplifier circuit is composed of an analog circuit and outputs the output of the DA conversion circuit to the cartilage conduction vibration source as an analog drive signal. The cartilage conduction vibration source can thereby advantageously driven at low cost for cartilage conduction based on sound output for an ordinary speaker. In accordance with another specific feature, the sound signal input unit receives input of a digital signal from the sound signal output unit; the acoustic processing unit is composed of a digital acoustic processing circuit; and the amplifier circuit is composed of a digital circuit and outputs the output of the digital acoustic processing circuit to the cartilage conduction vibration source as a digital drive signal. The cartilage conduction vibration source can thereby advantageously driven using only a digital circuit for cartilage conduction based on ordinary digital sound output. In accordance with another specific feature, an amplifier unit and a switching generator in the form of an IC are used as the voltage booster circuit.

In accordance with another feature, there is provided a cartilage conduction vibration source device for receiving input of a digital drive signal, and having a vibration source module integrally composed of a low-pass filter for the drive signal and a piezoelectric bimorph element serving as a cartilage conduction vibration source. A low-pass filter is required when the piezoelectric bimorph element is driven using a digital drive signal, but it is possible to drive a cartilage conduction vibration source suitable for cartilage conduction without the burden of preparing and adjusting a low-pass filter by merely using the above-described vibration source module.

In accordance with another feature, there is provided a cartilage conduction vibration source device having: an audio signal output unit for outputting an analog audio signal; an analog audio signal input unit for receiving input of an analog audio signal; an analog acoustic processing unit for acoustic processing of audio signals inputted from the analog audio signal input unit to produce cartilage conduction vibrations; an analog amplifier unit for outputting the analog processing signal processed in the analog acoustic processing unit to the cartilage conduction vibration source as a drive signal; and a cartilage conduction vibration source driven by the analog drive signal. An advantageous cartilage conduction vibration source is thereby implemented by an analog circuit.

In accordance with another feature, there is provided a cartilage conduction vibration source device having: an audio signal output unit for outputting an analog audio signal; an analog audio signal input unit for receiving input of an analog audio signal; an AD conversion circuit for converting an audio signal inputted from the analog audio signal input unit into a digital signal; a digital acoustic processing unit for acoustic processing of the output of the AD conversion circuit to produce cartilage conduction vibrations; a DA conversion circuit for converting processed signals processed by the digital acoustic processing unit into an analog signal; an analog amplifier unit for outputting the output of the DA conversion circuit to the cartilage conduction vibration source as a drive signal; and a cartilage conduction vibration source driven by the analog drive signal. An advantageous cartilage conduction vibration source is thereby implemented as lower cost on the basis of analog audio output.

In accordance with another feature, there is provided a cartilage conduction vibration source device having: an audio signal output unit for outputting a digital audio signal; a digital audio signal input unit for receiving input of a digital audio signal; a digital acoustic processing unit for acoustic processing of an audio signal inputted from the digital audio signal input unit to produce cartilage conduction vibrations; a DA conversion circuit for converting processed signals processed by the digital acoustic processing unit into an analog signal; an analog amplifier unit for outputting the output of the DA conversion circuit to the cartilage conduction vibration source as a drive signal; and a cartilage conduction vibration source driven by the analog drive signal. An advantageous cartilage conduction vibration source is thereby implemented as lower cost on the basis of digital audio output.

In accordance with another feature, there is provided a cartilage conduction vibration source device having: an audio signal output unit for outputting a digital audio signal; a digital audio signal input unit for receiving input of a digital audio signal; a digital acoustic processing unit for acoustic processing of an audio signal inputted from the digital audio signal input unit to produce cartilage conduction vibrations; a digital amplifier unit for outputting processed signals processed by the digital acoustic processing unit to the cartilage conduction vibration source as digital drive signals; a low-pass filter for digital drive signals; and a cartilage conduction vibration source driven by the drive signals that have passed through the low-pass filter. An advantageous cartilage conduction vibration source is thereby implemented by a digital circuit. In this case, the low-pass filter and the cartilage conduction vibration source can be integrated together and provided as a vibration source module.

In accordance with another feature, there is provided a listening device having: a cartilage conduction vibration source for vibrating in a direction that crosses the center axis of the entrance of the external auditory meatus; and a cartilage conduction unit for transmitting the vibrations of a cartilage conduction vibration source to ear cartilage. It is thereby possible to generate cartilage-air conduction with good efficiency in the external auditory meatus. In accordance with another specific feature, the configuration described above is useful when the configuration is such that the cartilage conduction unit makes contact with the mastoid process side of the auricle attachment region. In accordance with another specific feature, the configuration described above is useful when the configuration is such that the cartilage conduction unit is in contact with the front side of the tragus.

In accordance with another feature, there is provided a listening device having: an ear-wearing structure for sandwiching the ear with a first cartilage conduction unit that makes contact with the mastoid process side of the auricle attachment region and a second cartilage conduction unit for making contact with the front side of the tragus; and a cartilage conduction vibration source for transmitting vibrations to the first and second cartilage conduction unit. Stable wearing of the listening device on the ear is thereby ensured by contact of the first and second cartilage conduction units for good cartilage conduction. In accordance with a specific feature, the wearing structure has a linking part for transmitting vibrations between the first cartilage conduction unit and the second cartilage conduction unit. Vibration transmission to the first and second cartilage conduction units is thereby possible even using a single cartilage conduction vibration source. In accordance with another specific feature, the cartilage conduction vibration source for transmitting vibrations to the first and second cartilage conduction units vibrates in a direction crosswise to the center axis of the entrance to the external auditory meatus.

In accordance with another specific feature, the wearing structure is configured so that the distance between first cartilage conduction unit and the second cartilage conduction unit is variable. It is thereby possible to achieve advantageous contact with ear cartilage without dependency on personal differences. In accordance with a further specific feature, the wearing structure has a spring property for bringing the second cartilage conduction unit closer to the first cartilage conduction unit.

In accordance with a further specific feature, a stereo listening device having a pair of the listening devices as described above for the left and right ears, wherein the wearing structure in each of the pair of listening devices has an adjustment unit for adjusting the strength of the spring property, and visible display unit for achieving balance in the spring property of the pair of listening devices. It is thereby possible to adjust, in a simple manner, the balance of the stereo listening device adapted to personal differences.

<Thirty-ninth Technical Feature>

A thirty-ninth technical feature disclosed in the present specification provides a mobile telephone having a cartilage conduction unit and a cartilage conduction vibration source set in each corner of the upper part of the mobile telephone, and the two ends of the cartilage conduction vibration source are supported by the cartilage conduction unit so that the center part of the cartilage conduction vibration source is between the front surface and the back surface and arranged near one or the other surface without being in contact with either surface. Vibrations of the cartilage conduction vibration source are thereby transmitted with good efficiency to the cartilage conduction unit, the amount of space that the center part of the cartilage conduction vibration source occupies between the front surface and the back surface of the mobile telephone is reduced, and arrangement of other components in the upper part of the mobile telephone is facilitated.

In accordance with a specific feature, the center part of the cartilage conduction vibration source is bent from both ends so as to be near the front surface or the back surface of the mobile telephone. It is thereby possible bring the center part of the cartilage conduction vibration source near to the front surface or the back surface while comfortably supporting both ends of the cartilage conduction unit.

In accordance with another specific feature, the direction of vibration of the cartilage conduction vibration source is the direction crosswise to the front surface and back surface of the mobile telephone. Satisfactory cartilage conduction can thereby be achieved in the cartilage conduction unit, and the amount of space that the center part of the cartilage conduction vibration source occupies between the front surface and the back surface of the mobile telephone is readily reduced. In accordance with a more specific feature, the cartilage conduction vibration source has a metal plate supported at two ends substantially parallel to the front surface and back surface of the mobile telephone by the cartilage conduction unit, and a piezoelectric ceramic disposed on both sides of the metal plate. It is thereby possible to implement a vibration direction of the cartilage conduction vibration source that is crosswise to the front surface and back surface of the mobile telephone.

In accordance with a further specific feature, a piezoelectric ceramic is not provided to the two end parts of the metal plate, and the two end parts are bent. It is thereby possible to bring the center part of the cartilage conduction vibration source provided with a piezoelectric ceramic near to the front surface and back surface of the mobile telephone while comfortably supporting the two ends of the metal plate.

In accordance with another specific feature, a circuit for driving the piezoelectric ceramic is disposed on the metal plate. In accordance with a further specific feature, a circuit for driving the piezoelectric ceramic is disposed on the inner side of the bend of the metal plate. Mounting of the cartilage conduction vibration source circuit can thereby be facilitated. In a more specific feature, the circuit has a voltage booster circuit, an amplifier, a pair of power source terminals, and a pair of drive signal input terminals.

In accordance with another specific feature, a center part of the cartilage conduction vibration source is arranged near the front surface of the mobile telephone, and an air-conducted sound transit part for allowing passage of air-conducted sound generated by the cartilage conduction vibration source is provided to the front surface of the mobile telephone. It is thereby possible to hear sound mainly produced by air-conducted sound to carry out a mobile telephone call by bringing the center of the upper part of the mobile telephone to the ear.

In accordance with another feature, there is provided as cartilage conduction vibration source device characterized in having a metal plate, and a piezoelectric ceramic arranged on both sides of the metal plate leaving both ends of the metal plate, the two ends of the metal plate being bent. When such a cartilage conduction vibration source device is mounted in a mobile telephone, the center part of the cartilage conduction vibration source provided with the piezoelectric ceramic can be brought close to the obverse surface or the reverse surface of the mobile telephone while comfortably supporting the two ends of the metal plate. In accordance with a more specific feature, a circuit for driving the piezoelectric ceramic is provided to the inner side of the bending on the metal plate. In accordance with a further specific feature, the circuit has a voltage booster circuit, an amplifier, a pair of power source terminals, and a pair of drive signal input terminals.

In accordance with another feature, there is provided a cartilage conduction vibration source device having a cartilage conduction vibration source, a circuit for driving the cartilage conduction vibration source, a pair of power source terminals, and a pair of drive signal input terminals, these being integrally modularized. Good cartilage conduction can be implemented without adding other circuitry. In accordance with a more specific feature, the circuit includes an acoustic processing circuit, a voltage booster circuit, and an amplifier. Cartilage conduction vibration with consideration given to the characteristics of cartilage conduction can thereby be implemented without adding other circuitry.

In accordance with another feature, there is provided a cartilage conduction vibration source device having a metal plate, and a piezoelectric ceramic arranged on both sides of the metal plate leaving both ends of the metal plate, the two ends of the metal plate having surplus length. A shared cartilage conduction vibration source device can thereby be mounted in various mobile telephones. In accordance with a specific feature, the surplus length is used for bending the two ends of the metal plate. In accordance with another specific feature, the surplus length is used for cutting the two ends of the metal plate.

In accordance with another feature, there is provided a cartilage conduction vibration source device having a metal plate, and a piezoelectric ceramic arranged on both sides of the metal plate leaving both ends of the metal plate, the piezoelectric ceramic having the same structure as another cartilage conduction vibration source, and the two ends of the metal plate being different from another cartilage conduction vibration source. In accordance with such a configuration, the piezoelectric ceramic portion is shared to make mass production possible, and the two end portions of the metal plate can be readily customized for mounting in various mobile telephones. In accordance with a specific feature, the two ends of the metal plate are bent so as to be different from another cartilage conduction vibration source. In accordance with another specific feature, the two ends of the metal plate have different lengths from another cartilage conduction vibration source.

<Fortieth Technical Feature>

The fortieth technical feature disclosed in the present specification, there is provided a mobile telephone having: a cartilage conduction unit set in each corner of the upper part of the mobile telephone; a piezoelectric bimorph element serving as a vibration source of the cartilage conduction unit; an analog output amplifier for outputting audio signals to the piezoelectric bimorph element; and backflow prevention means for preventing voltaic power produced by an impact to the piezoelectric bimorph element to the analog output amplifier, the backflow prevention means being disposed between the analog output amplifier and the piezoelectric bimorph element. The corners of the mobile telephone are used as cartilage conduction units, the corners being advantageous for abutting against the tragus and other ear cartilage and are locations which are prone to receiving direct impact when dropped, and in the case that the piezoelectric bimorph element is used as the vibration source thereof, it is thereby possible to prevent the analog output amplifier from being broken by an impact pulse produced by the piezoelectric bimorph element due to drop impact or the like.

In accordance with a specific feature, the backflow prevention means has a filter for allowing the audio signal band to pass and cutting a band produced by an impact to the piezoelectric bimorph element. An RC filter, an LC filter, or the like is advantageous as such a filter.

In accordance with a more specific feature, the filter is a low-pass filter that cuts a frequency band at or higher than the audio signal band. In accordance with a further specific feature, the low-pass filter cuts a frequency band of 8 kHz or higher. In accordance with a further specific feature, the low-pass filter cuts a frequency band of 4 kHz or higher.

In accordance with another specific feature, the mobile telephone has a tap detection unit for detecting an impact to the piezoelectric bimorph element due to a finger tap, and the backflow prevention means allows passage of impacts to the piezoelectric bimorph element due to a finger tap.

In accordance with a further specific feature, the backflow prevention means has a filter for allowing passage of an audio signal band and an impact to the piezoelectric bimorph element due to a finger tap and cutting a band produced by an impact to the piezoelectric bimorph element.

In accordance with a more specific feature, the filter is a low-pass filter that cuts a frequency band at or above the audio signal band and a band produced by an impact to the piezoelectric bimorph element due to a finger tap.

In accordance with a further specific feature, the mobile telephone has a tap detection unit for detecting an impact to the piezoelectric bimorph element due to a finger tap, and the tap detection unit detects an impact to the piezoelectric bimorph element due to a finger tap without going through the backflow prevention means. In accordance with a further specific feature, the tap detection unit has a discrimination unit for discriminating between an impact to the piezoelectric bimorph element due to a finger tap and a collision impact to the piezoelectric bimorph element.

In accordance with another feature, there is provided a mobile telephone having: a cartilage conduction unit set in each corner of the upper part of the mobile telephone; a piezoelectric bimorph element serving as a vibration source of the cartilage conduction unit; an analog output amplifier for outputting audio signals to the piezoelectric bimorph element; a tap detection unit for detecting an impact to the piezoelectric bimorph element due to a finger tap; a filter for allowing passage of an impact to the piezoelectric bimorph element due to a finger tap and cutting a band produced by a collision impact to the piezoelectric bimorph element, the filter being disposed between the analog output unit, and the tap detection unit and piezoelectric bimorph element. It is thereby possible to prevent errant detection when the piezoelectric bimorph element serving as a vibration source of the cartilage conduction unit is dually used to detect finger taps.

In accordance with another feature, there is provided a mobile telephone having: a cartilage conduction unit set in each corner of the upper part of the mobile telephone; a piezoelectric bimorph element serving as a vibration source of the cartilage conduction unit; an analog output amplifier for outputting audio signals to the piezoelectric bimorph element; and a tap detection unit for discriminating and detecting between an impact to the piezoelectric bimorph element due to a finger tap and a collision impact to the piezoelectric bimorph element. It is thereby possible to prevent errant detection when the piezoelectric bimorph element serving as a vibration source of the cartilage conduction unit is dually used to detect finger taps.

In accordance with another feature, there is provided mobile telephone having a piezoelectric bimorph element, and a tap detection unit for detecting an impact to the piezoelectric bimorph element due to a finger tap, the tap detection unit including a discrimination unit for discriminating between an impact to the piezoelectric bimorph element due to a finger tap and a collision impact to the piezoelectric bimorph element. It is thereby possible to prevent errant detection when the piezoelectric bimorph element is used for detecting finger taps.

<Forty-first Technical Feature>

The forty-first technical aspect disclosed in the present specification provides a mobile telephone having: a sound signal source unit for outputting an audio signal; a cartilage conduction vibration source vibrated by the audio signal from the sound signal source unit; a cartilage conduction unit to which vibrations of the cartilage conduction vibration source are transmitted; and an equalizer for equalizing the audio signal so that the sound pressure in the external auditory meatus produced by direct air conduction and cartilage conduction generated by the cartilage conduction unit is substantially flat in a predetermined frequency region. It is thereby possible to hear satisfactory audio produced by broad-sense cartilage conduction.

In accordance with a specific feature, the high-band-side end of the predetermined frequency region is 3.4 kHz or higher. In accordance with another specific feature, the high-band-side end of the predetermined frequency region is 7 kHz or higher. In accordance with yet another specific feature, the low-band-side end of the predetermined frequency region is 300 Hz or lower.

In accordance with another specific feature, in the equalization performed by the equalizer, the direct air-conducted sound generated by the cartilage conduction unit is excessive in the high-band portion of the predetermined frequency region. In accordance with a further specific feature, in the equalization performed by the equalizer, the direct air-conducted sound generated by the cartilage conduction unit is excessive in the high-band portion greater than about 3 kHz.

In accordance with another feature, there is provided a mobile telephone having: a sound signal source unit for outputting an audio signal; a cartilage conduction vibration source vibrated by the audio signal from the sound signal source unit; a cartilage conduction unit to which vibrations of the cartilage conduction vibration source are transmitted; and an equalizer for equalizing the audio signal so that the direct air-conducted sound generated by the cartilage conduction unit is substantially flat in a predetermined frequency region. A mobile telephone capable of cartilage conduction and in which expected air-conducted sound can be generated is thereby provided.

In accordance with another feature, in the equalization performed by the equalizer, the sound pressure in the external auditory meatus produced by direct air conduction and cartilage conduction generated by the cartilage conduction unit is reduced in the high-range portion in the predetermined frequency region. In accordance with a more specific feature, in the equalization performed by the equalizer, the sound pressure in the external auditory meatus produced by direct air conduction and cartilage conduction is reduced in a high-range portion higher than about 3 kHz.

In accordance with another feature, there is provided a mobile telephone having: a sound signal source unit for outputting an audio signal; a cartilage conduction vibration source vibrated by the audio signal from the sound signal source unit; a cartilage conduction unit to which vibrations of the cartilage conduction vibration source are transmitted; and an equalizer for equalizing the audio signal so that the external auditory meatus sound pressure produced by cartilage conduction generated by the cartilage conduction unit when the entrance to the external auditory meatus is occluded is substantially flat in a predetermined frequency region. It is thereby possible to hear satisfactory audio when an external auditory meatus occluding effect has occurred.

In accordance with another feature, in the equalization performed by the equalizer, the sound pressure in the external auditory meatus produced by direct air conduction and cartilage conduction generated by the cartilage conduction unit is reduced in a high-range portion in the predetermined frequency region.

In accordance with another feature, there is provided a mobile telephone having: a sound signal source unit for outputting an audio signal; a cartilage conduction vibration source vibrated by the audio signal from the sound signal source unit; a cartilage conduction unit to which vibrations of the cartilage conduction vibration source are transmitted; and an equalizer capable of switching between equalization of the audio signal in which the sound pressure in the external auditory meatus produced by air conduction and cartilage conduction generated by the cartilage conduction unit is flat in the predetermined frequency region, and equalization in which the direct air-conducted sound generated by the cartilage conduction unit is substantially flat in the predetermined frequency region. It is thereby possible to provide a mobile telephone in which satisfactory audio produced by broad-sense cartilage conduction can be heard and expected air-conducted sound can be generated.

In accordance with another feature, there is provided a mobile telephone having: a sound signal source unit for outputting an audio signal; a cartilage conduction vibration source vibrated by the audio signal from the sound signal source unit; a cartilage conduction unit to which vibrations of the cartilage conduction vibration source are transmitted; and an equalizer capable of switching between equalization of the audio signal in which the sound pressure in the external auditory meatus produced by direct air-conducted sound and cartilage-conducted sound generated by the cartilage conduction unit is flat in the predetermined frequency region, and equalization in which the external auditory meatus sound pressure produced by cartilage-conducted sound generated by the cartilage conduction unit when the entrance to the external auditory meatus is occluded is substantially flat in a predetermined frequency region. It is thereby possible to hear satisfactory audio when the external auditory meatus is occluded or unoccluded.

In accordance with another feature, there is provided a mobile telephone having: a sound signal source unit for outputting an audio signal; a cartilage conduction vibration source vibrated by the audio signal from the sound signal source unit; a cartilage conduction unit to which vibrations of the cartilage conduction vibration source are transmitted; and control unit for generating from the cartilage conduction unit direct air-conducted sound and cartilage-conducted sound in which the sound pressure in the external auditory meatus is substantially flat in the predetermined frequency region, and generating direct air-conducted sound which is substantially flat in the predetermined frequency region, the air-conducted sound being generated from the cartilage conduction unit in the outer part of the ear. It is thereby possible to provide a mobile telephone in which satisfactory audio produced by broad-sense cartilage conduction can be heard and an expected air-conducted sound can be generated by a single cartilage conduction vibration source.

<Forty-second Technical Feature>

The forty-second technical aspect disclosed in the present specification provides a mobile telephone having: a sound signal source unit for outputting an audio signal; an air conduction speaker vibrated by the audio signal from the sound signal source unit; a cartilage conduction unit; and a support structure for supporting the air conduction speaker and transmitting vibrations thereof to the cartilage conduction unit.

In accordance with the above configuration, first, a required air-conducted sound can be generated by the air conduction speaker in an ordinary mobile telephone, and the vibrations of the air conduction speaker can also be used and transmitted to the cartilage conduction unit, whereby both cartilage conduction and the generation of air-conducted sound are possible.

In accordance with a specific feature, the support structure transmits the counteractions of vibrations generated by the air conduction speaker for air-conducted sound to the cartilage conduction unit. It is thereby possible to use the vibration energy of the air conduction speaker with good efficiency.

In accordance with a more specific feature, the cartilage speaker has a first portion and a second portion, air-conducted sound is generated from the first portion by relative movement between the first portion and the second portion, and the second portion is supported by a support structure, whereby the vibrations of the second portion are transmitted to the cartilage conduction unit. It is thereby possible to transmit the counteractions of the vibrations generated by the air conduction speaker for air-conducted sound to the cartilage conduction unit. In accordance with a further specific feature, the first portion and the second portion are weight distributed so that air-conducted sound is generated and cartilage conduction as counteractions thereof occurs.

In accordance with another specific feature, the air conduction speaker is an electromagnetic speaker, the first portion is a vibration plate, and the second portion is a holding portion for holding the vibration plate so as to allow vibration. It is thereby possible to configure a mobile telephone using an electromagnetic speaker.

In accordance with another more specific feature, the air conduction speaker is a piezoelectric bimorph-type speaker, the first portion is the freely vibrating portion of the piezoelectric bimorph, and the second portion is the support portion of the piezoelectric bimorph. It is thereby possible to configure a mobile telephone using a piezoelectric bimorph-type air conduction speaker.

In accordance with another specific feature, the support structure supports the air conduction speaker so that the air conduction speaker does not make contact with other constituent elements of the mobile telephone. It is thereby possible to prevent dispersion of vibration energy to unneeded portions, and to implement cartilage conduction with good efficiency using the generation of air-conducted sound at a required level and the vibrations of the air conduction speaker.

In accordance with another specific feature, a cartilage conduction unit is arranged in an upper corner of the mobile telephone. It is thereby possible to configure a practical mobile telephone that makes use of the characteristics of cartilage conduction while also using the vibrations of an air conduction speaker. In accordance with a further specific feature, the air conduction speaker is arranged in the center of the upper part of the mobile telephone. It is thereby possible to conduct a call on a mobile telephone using conventional air-conducted sound.

In accordance with another specific feature, a hole for air-conducted sound transit is provided near the air conduction speaker. It is thereby possible to generate air-conducted sound at a required level with good efficiency and to implement cartilage conduction that also uses the vibrations of an air conduction speaker.

In accordance with another specific feature, the configuration has an upper frame, the two ends of the upper frame are cartilage conduction units, and the center part of the upper frame is an air conduction speaker support structure. It is thereby possible to use the structure of the upper frame of a mobile telephone to generate air-conducted sound at a required level and implement cartilage conduction with good efficiency. In accordance with a further specific feature, a seating part for an air conduction speaker is provided as an air conduction speaker support structure in the center part of the upper frame.

<Forty-third Technical Feature>

The forty-third technical aspect disclosed in the present specification has a sound signal output device having: a sound signal source unit for a cartilage conduction unit; and a frequency characteristics modification unit for modifying the mixture ratio of a direct air conduction component and a cartilage conduction component generated by the cartilage conduction unit, in accordance with the magnitude of change in the sound signal from the sound signal source unit. Listening that is adapted to changes in the magnitude of the sound signal from the sound signal source unit is thereby possible.

In accordance with a specific feature, the frequency characteristics modification unit relatively increases the mixture ratio of the cartilage conduction component in relation to the direct air conduction component when the sound signal from the sound signal source unit becomes smaller. It is thereby possible to reduce noise when the sound signal from the sound signal source unit has become smaller, and to adapt to a reduction in audibility of low-pitched regions when the sound signal from the sound signal source unit has become smaller.

In accordance with another specific feature, the frequency characteristics modification unit varies the mixture ratio of the direct air conduction component and the cartilage conduction component generated by the cartilage conduction unit in accordance with the temporal change in the magnitude of the sound signal. Listening adapted to changes in the magnitude of the sound signal while, e.g., a song is playing is thereby made possible. In accordance with another specific feature, the frequency characteristics modification unit varies the mixture ratio of the direct air conduction component and the cartilage conduction component generated by the cartilage conduction unit in accordance with the average magnitude of the sound signal. Listening adapted to the average volume is thereby possible.

In accordance with another specific feature, the configuration has a signal sending unit, and the output of the frequency characteristics modification unit is sent from the signal sending unit to an external cartilage conduction unit. In accordance with another specific feature, the sound signal output unit is configured as a mobile telephone and the external cartilage conduction unit is configured as a listening device for a mobile telephone. In accordance with another specific feature, the sound signal output unit is configured as a mobile music player, and the external cartilage conduction unit is configured as a listening device for a mobile music player.

In accordance with another feature, there is provided a sound signal output unit having: an audio call sound signal source unit for a cartilage conduction unit; a song sound signal source unit for the cartilage conduction unit; and a frequency characteristics modification unit for varying the mixture ratio of the direct air conduction component and the cartilage conduction component generated by the cartilage conduction unit using the sound signal from the audio call sound signal source unit and the sound signal from the music sound signal source unit. It is thereby possible to obtain a mixture ratio of the direct air conduction component and the cartilage conduction component suitable for the audio call sound signal source unit and the music sound signal source unit. In accordance with a specific feature, the frequency characteristics modification unit relatively increases the mixture ratio of the direct air conduction component in relation to the cartilage conduction component in the sound signal from the music sound signal source unit than in the sound signal from the audio call sound signal source unit.

In accordance with another feature, there is provided a sound signal output device configured as a mobile telephone and having: a sound signal source unit for incoming call sounds; a sound signal source unit for songs; and a signal sending unit for sending sound signals from the sound signal source unit for songs to an external stereo listening device, and sending sound signals from the sound signal source unit for incoming call sounds in alternating fashion to external left and right stereo listening devices. It is thereby possible to control incoming call sounds with high attention-attracting effect using the fact that the device is a stereo listening device. In accordance with another feature, the stereo listening device is worn on both ears without blocking the ear holes.

In accordance with another feature, there is provided a sound signal output device configured as a mobile telephone and having: a sound signal source unit for call sounds; a sound signal source unit for songs; and a signal sending unit for sending sound signals from the sound signal source unit for songs to an external stereo listening device, and, in relation to sound signals from the sound signal source unit for call sounds, distributing and sending the sound signals from different parties to external left and right stereo listening devices. It is thereby possible to carry out a call without confusion using the fact that the device is a stereo listening device. In accordance with another feature, the stereo listening device is worn on both ears without blocking the ear holes.

In accordance with another feature, there is provided a stereo listening device worn on both ears without block the ear holes, the stereo listening device having: a sound source signal output unit; an ambient sound detection unit; an ambient sound-cancelling unit for inverting the waveform of ambient sound detected by the detection unit and superimposing the inverted waveform on the sound signal from the sound source signal output unit; and a control unit for stopping the function of the ambient sound-cancelling unit in predetermined conditions. Ambient sound can thereby be heard from unblocked ear holes when required and stereo listening unobstructed by unneeded ambient sound is possible, even though the stereo listening device is worn on both ears. In accordance with another feature, the stereo listening device has a cartilage conduction unit driven by the sound signals of sound source signal output unit in which ambient sound has been inverted in waveform and superimposed.

In accordance with another specific feature, a predetermined condition is a rapid increase in the ambient sound detected by the detection unit. It is thereby possible to prevent the danger of being unaware of, e.g., vehicle horns and the like. In accordance with another specific feature, a predetermined condition is a human voice being at a predetermined level or higher as detected by the detection unit. It is thereby possible to prevent the rudeness of being unaware of being spoken to by people nearby.

In accordance with another specific feature, the stereo listening device has a receiver for receiving sound signals from a mobile telephone, and when the receiver is receiving an incoming call sound or a call sound, the control unit does not stop the function of the ambient sound-cancelling unit even when the detection unit detects a human voice at a predetermined level or higher. It is thereby possible to give priority being unaware of an incoming call or focusing on a call during a call.

<Forty-fourth Technical Feature>

The forty-fourth technical aspect disclosed in the present specification provides a mobile telephone that has a directivity-variable microphone and that automatically switches the directivity of the directivity-variable microphone to the left or right depending on whether the mobile telephone is being held in the left hand or the right hand. It is thereby possible to orient the directivity of the microphone in the direction of the mouth of a user and to pick up the voice of the user without being affected by noise in the area, whether the mobile telephone is being held in the left hand or the right hand.

In accordance with a specific feature, the mobile telephone has a cartilage conduction unit provided to both corners in the upper part of the mobile telephone, the directivity of the directivity-variable microphone is automatically switched depending on which cartilage conduction unit has been brought to an ear. In a mobile telephone that uses cartilage conduction, an upper corner of the mobile telephone is brought the ear rather than the center part of the upper end of the mobile telephone, and the tilt during usage is thereby greater than that of an ordinary mobile telephone, and since the microphone tends to be away from the mouth, the configuration is useful in that the directivity of the directivity-variable microphone is automatically switched to the left or right depending on which cartilage conduction unit is brought to the ear.

In accordance with another specific feature, the configuration has a tilt detection unit for detecting the tilt of the mobile telephone, and the directivity of the directivity-variable microphone is automatically switched to the left or right in accordance with the tilt detection of the tilt detection unit. In accordance with a yet another specific feature, the configuration has an air conduction speaker, and the orientation of the directivity of the directivity-variable microphone is automatically switched to the center when the air conduction speaker is used. In accordance with a further specific feature, the directivity of the directivity-variable microphone is automatically switched to a wide angle when the mobile telephone is in a horizontal state.

In accordance with another feature, the configuration has a directivity-variable microphone and cartilage conduction unit provided to both corners in the upper part of the mobile telephone, and the directivity of the directivity-variable microphone is automatically switched to the left or right depending on which cartilage conduction unit is brought to the ear. It is thereby possible to orient the directivity of the microphone in the direction of the mouth of a user and to pick up the voice of the user without being affected by noise in the area, no matter which cartilage conduction unit has been brought to the ear.

In accordance with another feature, there is provided a mobile telephone having a directivity-variable microphone and a tilt detection unit for detecting the tilt of the mobile telephone, the orientation of the directivity of the directivity-variable microphone being automatically switched in response to the detection of the tilt detection unit. It is thereby possible to obtain directivity of the microphone oriented in accordance with the tilt of the mobile telephone.

In accordance with another feature, there is provided a mobile telephone having a directivity-variable microphone and tilt detection unit for detecting the tilt of the mobile telephone, the sharpness of the directivity of the directivity-variable microphone being automatically switched in response to the tilt detection of the tilt detection unit. It is thereby possible to obtain directivity of the microphone having a sharpness that corresponds to the tilt of the mobile telephone.

In accordance with another feature, there is provided a mobile telephone having a proximity sensor for detecting whether the directivity-variable microphone and the mobile telephone has been brought to the ear, the orientation of the directivity of the directivity-variable microphone being automatically switched in response to the detection of the proximity sensor depending on whether the mobile telephone has been brought to the ear. It is thereby possible to obtain directivity of the microphone having an orientation that corresponds to whether the mobile telephone has been brought to the ear.

In accordance with another feature, there is provided a mobile telephone having a proximity sensor for detecting whether the directivity-variable microphone and the mobile telephone has been brought to the ear, the sharpness of the directivity of the directivity-variable microphone being automatically switched in response to the detection of the proximity sensor depending on whether the mobile telephone has been brought to the ear. It is thereby possible to obtain directivity of the microphone having sharpness that corresponds to whether the mobile telephone has been brought to the ear.

In accordance with another feature, there is provided a mobile telephone having a directivity-variable microphone, and an air conduction speaker and cartilage conduction unit provided to both corners in the upper part of the mobile telephone, the directivity of the directivity-variable microphone be automatically switched depending on whether the cartilage conduction unit is to be used or the air conduction speaker is to be used. It is thereby possible to obtain directivity of the microphone that corresponds to whether the mobile telephone has been brought to the ear in correspondence to whether the cartilage conduction unit is to be used or whether the air conduction speaker is to be used.

In accordance with another feature, there is provided a mobile telephone having a directivity-variable microphone, stereo audio input being processed on the basis of the output of the directivity-variable microphone when the directivity of the directivity-variable microphone is set to a wide angle. It is thereby possible to use the output of the directivity-variable microphone in the stereo audio input when the directivity of the directivity-variable microphone is set to a wide angle.

<Forty-fifth Technical Feature>

The forty-fifth technical aspect disclosed in the present specification provides a mobile telephone having: an upper edge part including both corners of the upper part of the mobile telephone where the cartilage conduction units are located, and an elongated piezoelectric bimorph element supported at least at one end by a support part of the inner-side center of upper edge part and used for vibrating essentially without contact with the other portions of the mobile telephone, the vibration of the support part being transmitted from the upper edge part to both corners. It is thereby possible to cause the piezoelectric bimorph element to efficiently vibrate while the vibrations thereof are equally transmitted to the cartilage conduction units in both corners.

In accordance with a specific feature, the piezoelectric bimorph element is supported by the support part at one end in the direction that intersects the upper edge part. It is thereby possible to provide an arrangement in which space in not occupied in the direction parallel to the upper edged part even though an elongated piezoelectric bimorph element is used. In accordance with a more specific feature, the piezoelectric bimorph element is supported by the support part at one end perpendicular to the upper edge.

In accordance with another specific feature, the piezoelectric bimorph element is supported by the support part at least at one end in the direction parallel to the upper edge part. This configuration is useful when ensuring the piezoelectric bimorph element does not occupy space below the upper edge part. In accordance with another specific feature, the piezoelectric bimorph element is configured so that one end is supported by the support part, and the other end freely vibrates. In accordance with another more specific feature, the piezoelectric bimorph element is configured so that both ends are supported by a pair of support parts provided in the inner-side center of the upper edge part, and the center portion freely vibrates.

In accordance with another specific feature, the mobile telephone has an obverse surface plate, and the piezoelectric bimorph element vibrates in the direction perpendicular to the surface plate. It is thereby possible for vibrations in the direction perpendicular to the obverse surface plate to be transmitted to both corners, and for satisfactory cartilage conduction to the ear cartilage to be implemented. In accordance with another specific feature, the mobile telephone has a back surface plate, and the piezoelectric bimorph element is arranged nearer to the obverse surface plate. It is thereby possible for the piezoelectric bimorph element to be arranged so as to occupy no space near the obverse surface plate of the upper part of the mobile telephone. In accordance with a further specific feature, the mobile telephone is configured so as to have an elastic body interposed between the upper edge part and other portions, and so that the vibration energy to the cartilage conduction unit is not scattered to other portions of the mobile telephone.

In accordance with another specific feature, an earphone jack is provided to the upper edge part. In accordance with further specific feature, a control unit is provided for performing different equalization in the output to the earphone jack and in the output of the piezoelectric bimorph element. It is thereby possible to perform equalization optimal for output to the earphone jack and output for cartilage conduction. In accordance with a further specific feature, the control unit performs air-conducted sound equalization across a wide range to 20 kHz for the earphone jack, and performs cartilage conduction equalization to 7 kHz for the piezoelectric bimorph element. In accordance with a further specific feature, the control unit performs equalization up to 7 kHz for the earphone jack when a call is carried out through the earphone jack.

In accordance with another specific feature, the configuration has determination means for determining the occluded state of the external auditory meatus and superimposing a signal for cancelling one's own voice on the output audio when the determination means has determined that the external auditory meatus is in an occluded state. Discomfort of hearing one's own voice when the external auditory meatus is occluded can be reduced. In accordance with a further specific feature, when the determination means has deemed the external auditory meatus to be in an occluded state when a call is carried out through the earphone jack, a signal for cancelling one's own voice is superimposed on the output audio to the earphone jack.

In accordance with another feature, there is provided a mobile telephone characterized in having an upper edge part the includes the both upper part corners of the mobile telephone where the cartilage conduction units are located, a back surface plate, and a cartilage conduction vibration source supported by nearer to the back surface plate of the inner-side center of the upper edge part, the vibrations of the support part being transmitted to both corners from the upper edge part. It is thereby possible for the cartilage conduction vibration source to be arranged without occupying space near the obverse surface plate of the upper part of the mobile telephone.

In accordance with another feature, there is provided a mobile telephone having a cartilage conduction unit, an earphone jack, and a control unit for performing different equalization in the output of the audio signal to the earphone jack and in the output of the audio signal to the cartilage conduction unit. It is thereby possible to perform suitable equalization in the output to the earphone jack and the output for cartilage conduction.

In accordance with a specific feature, the control unit performs air-conducted sound equalization across a broad range to 20 kHz in the output of the audio signal to the earphone jack, and performs cartilage conduction equalization up to 7 kHz in the output of the audio signal to the cartilage conduction unit. It is thereby possible to perform broad-range equalization with consideration given to playback of a music source when the earphone jack is used, and to give priority to protecting privacy and reducing nuisance to the surroundings, which are advantages of cartilage conduction, and prevent generation of unpleasant air-conducted sound in the surroundings even when there is slight sound leakage of so-called raspy sounds or the like in the output of the audio signal to the cartilage conduction unit.

In accordance with another feature, there is provided a mobile telephone having an earphone jack, a signal for cancelling one's own voice being superimposed on the output audio to the earphone jack when a call has been carried out via the earphone jack. It is thereby possible to reduce discomfort of hearing one's own voice when the external auditory meatus is occluded by usage of an earphone or the like.

<Forty-sixth Technical Feature>

The forty-sixth technical aspect disclosed in the present specification provides a stereo earphone characterized in being provided with a pair of earphones having a cartilage conduction unit composed of an elastic body provided with a passage hole, and a branch part serving as a vibration source, the branch part being connected at one end to the cartilage conduction unit. It is thereby possible to implement a stereo earphone that adapts to the shape of the ear and other personal differences and that is capable of being used for enjoyment of music or the like by satisfactory cartilage conduction with the external auditory meatus in an unoccluded state In accordance with a specific feature, the configuration has a ring-like edge at the outer periphery of the passage hole. The passage hole can thereby be readily occluded using the body of a finger to press on the earphone, and an occluded state of the external auditory meatus can be achieved.

In accordance with another specific feature, the branch part has a sheath connected to the cartilage conduction unit, and the piezoelectric bimorph serving as a vibration source is connected to the cartilage conduction unit inside the sheath without being in contact with the inner wall thereof. The branch part can thereby function as a knob when the earphone is to be worn or removed, and no force is applied to the piezoelectric bimorph during wearing or removal. In accordance with a further specific feature, the sheath is configured so as to be capable of sliding with respect to the cartilage conduction unit to open and close the passage hole. The piezoelectric bimorph slides, yet is stably connected to the cartilage conduction unit.

In accordance with another feature, there is provided a stereo earphone provided with a pair of earphones having a cartilage conduction unit composed of a deformable elastic body and a branch part serving as a vibration source, one end being connected to the cartilage conduction unit. It is thereby possible to readily switch the external auditory meatus from an occluded state to an unoccluded state by deformation of the cartilage conduction unit.

In accordance with specific feature, the branch part has a sheath connected to the cartilage conduction unit, and the piezoelectric bimorph serving as a vibration source is connected to the cartilage conduction unit inside the sheath without being in contact with the inner wall thereof. No force is thereby applied to the piezoelectric bimorph during deformation. In accordance with a further specific feature, the elastic body has a hollow part that facilitates elastic deformation.

In accordance with another feature, there are provided stereo earphones characterized in being provided with a pair of earphones having a cartilage conduction unit composed provided with a passage hole, and a branch part serving as a vibration source, one end being slidably connected to the cartilage conduction unit, the passage hole being configured to open and closed by the sliding of the branch part. Provided thereby are stereo earphones that can be used to switch the external auditory meatus from an occluded state to an unoccluded state.

In accordance with a specific feature, the branch part has a sheath connected to the cartilage conduction unit, the piezoelectric bimorph serving as a vibration source is connected to the cartilage conduction unit inside the sheath without being in contact with the inner wall thereof, and the passage is opened and closed by the sliding of the sheath. The piezoelectric bimorph itself is thereby stably joined to the cartilage conduction unit without sliding when the passage hold is opened and closed.

In accordance with another feature, there are provided stereo earphones characterized in being provided with a pair of earphones having: a cartilage conduction unit which has a shape that allows insertion into the entrance to the external auditory meatus and allows accommodation in the cavum conchae; and a vibration source connected to the cartilage conduction unit. The external auditory meatus can thereby be readily switched between an occluded state and an unoccluded state. In accordance with specific feature, the vibration source is a branch part, one end of which is connected to the cartilage conduction unit. The branch part is used as a knob and the external auditory meatus can thereby be readily switched between an occluded state and an unoccluded state.

In accordance with a specific feature, the branch part has a sheath connected to the cartilage conduction unit, and the piezoelectric bimorph serving as a vibration source is connected to the cartilage conduction unit inside the sheath without being in contact with the inner wall thereof. Force is thereby not applied to the piezoelectric bimorph even when the branch part is used as a knob.

In accordance with another feature, there is proposed a method for using a cartilage conduction earphone for switching the external auditory meatus between an occluded state and an unoccluded state by inserting the cartilage conduction unit in the entrance to the external auditory meatus or accommodating the cartilage conduction unit in the cavum conchae. It is thereby possible to use the stereo earphones when the external auditory meatus is in an occluded state or an unoccluded state by making use of the structure of the ear.

<Forty-seventh Technical Feature>

The forty-seventh technical aspect disclosed in the present specification provides stereo earphones characterized in being provided with a pair of earphones having: a cartilage conduction unit; and a branch part serving as a vibration source, one end being connected to the cartilage conduction unit and the thickness in the ear hole direction being less than the thickness in the direction orthogonal thereto. It is thereby possible for even a person having a narrow intertragic notch to wear the earphone so that the branch part hangs downward from the lower part of the cavum conchae to the intertragic notch, and the earphone can be fitted to the shape of the ear and worn regardless of personal differences.

In accordance with a specific feature, the branch part has a sheath connected to the cartilage conduction unit, and the piezoelectric bimorph serving as a vibration source is connected to the cartilage conduction unit inside the sheath without being in contact with the inner wall thereof. In accordance with a further specific feature, the direction of vibration of the piezoelectric bimorph is the direction that transverses the entrance to the external auditory meatus. Since the piezoelectric bimorph vibrates in the direction of low thickness, this setting of the direction of vibration is suitable for configuring the branch part, which has a thickness in the ear hole direction that is less than the thickness in the direction orthogonal thereto.

In accordance with another specific feature, the cartilage conduction unit has a passage hole formed in the direction of the ear hole, and a support part for holding the upper end of the piezoelectric bimorph further above the lower end of the passage hole. In accordance with a further specific feature, the cartilage conduction unit has a thick part at the periphery of the passage hole, and the thick part is a support part. Support of the piezoelectric bimorph serving as the vibration source is thereby ensured. In accordance with a further specific feature, the thick part is provided to the tragus side. Cartilage conduction can thereby be implemented with good efficiency.

In accordance with another feature, there are provided stereo earphones characterized in being provided with a pair of earphones having: a cartilage conduction unit capable of being accommodated in the cavum conchae; a branch part serving as a vibration source with one end being connected to the cartilage conduction unit, and a movable earplug part supported above the cartilage conduction unit. The movable earplug part can thereby be moved between a position inserted into the entrance to the external auditory meatus and a position removed from the entrance to the external auditory meatus while the cartilage conduction unit is accommodated in the cavum conchae, and it is possible to readily switch between listening by cartilage conduction that does not interfere with hearing external sounds and cartilage conduction with the external auditory meatus in an occluded state. The cartilage conduction unit is preferably accommodated in the lower part of the cavum conchae.

In accordance with another feature, the movable earplug part makes contact with the inner wall of the anthelix in a position removed from the entrance to the external auditory meatus. It is thereby possible to stably accommodate the cartilage conduction unit in the cavum conchae when listening by cartilage conduction that does not interfere with hearing external sounds. In accordance with a more specific feature, the movable earplug part is supported in the cartilage conduction unit by a movable lever.

In accordance with another specific feature, the movable earplug part is positioned near the entrance to the external auditory meatus in a position removed from the entrance to the external auditory meatus. It is thereby possible to make use of the movable earplug part as an auxiliary vibration part for generating air conduction for listening by cartilage conduction that does not interfere with hearing external sounds. In accordance with a more specific feature, the movable earplug part is supported in the cartilage conduction unit by an elastic body. In accordance with a further specific feature, the cartilage conduction unit and movable earplug part are integrally molded together using an elastic material.

In accordance with another feature, there are provided stereo earphones characterized in being provided with a pair of earphones having: a cartilage conduction unit having a passage hole formed through in the ear hole direction and a thick part at the periphery of the passage hole; and branch part serving as a vibration source, one end being connected to the cartilage conduction unit by the thick part further above the lower end of the passage hole. Reliable support of the branch part is thereby made possible. In accordance with a specific feature, the branch part has a sheath connected to the thick part and supports the piezoelectric bimorph serving as a vibration source on the thick part so that the upper end of the piezoelectric bimorph comes further above the lower end of the passage hole without being in contact with the inner wall thereof. It is thereby possible to reliably support the upper end of the piezoelectric bimorph. In accordance with another specific feature, the thick part is provided to the tragus side.

In accordance with another feature, there are provided stereo earphones characterized in being provided with a pair of earphones having: a cartilage conduction unit having a passage hole formed through the ear hole direction and a thick part on the tragus side of the passage hole; and a branch part serving as a vibration source supported by the thick part. It is thereby possible to reliably support the branch part serving as a vibration source while making it possible to listen by cartilage conduction with good efficiency without interfering with hearing external sounds through the passage hole.

In accordance with another feature, there are provided stereo earphones characterized in being provided with a pair of earphones having: a cartilage conduction unit; and a branch part serving as a vibration source, one end being connected to the cartilage conduction unit and the direction of vibration being in the direction that transverses the entrance to the external auditory meatus. It is thereby possible for vibrations substantially orthogonal to the direction of the external auditory meatus to be transmitted to, e.g., the inner side of the tragus or other ear cartilage.

In accordance with another feature, there are provided stereo earphones characterized in being provided with a pair of earphones having: a branch part serving as a vibration source, one end being connected to the cartilage conduction unit; and a guide part provided to the branch part and used for directing the branch part to the intertragic notch. It is thereby possible to stably position the branch part in the intertragic notch when the earphone is worn, and to make the branch part wedge into the intertragic notch with close adhesion so that the earphone is less liable to fall out from the cavum conchae.

<Forty-eighth Technical Feature>

The forty-eighth technical aspect disclosed in the present specification provides stereo earphones characterized in being provided with a pair of earphones having a cartilage conduction unit and an adhesive sheet provided to the contact part of the cartilage conduction unit and the ear cartilage. It is thereby possible to prevent the cartilage conduction unit from falling away from the ear cartilage and to implement satisfactory cartilage conduction In accordance with another feature, the adhesive sheet is provided to the portion where the cartilage conduction unit makes contact with the cavum conchae. The cartilage conduction unit can thereby be adhered to the ear cartilage with good efficiency using the adhesive sheet. In accordance with a more specific feature, an earplug part is provided in a position in which the adhesive sheet is not provided in the cartilage conduction unit. It is thereby possible to arbitrarily select a state in which the external auditory meatus is occluded by the earplug part and a state in which external sounds enter through the gap between earplug part and the entrance to the external auditory meatus, and regardless of this selection, the adhesion of the cartilage conduction unit can be maintained by the adhesive sheet.

In accordance with another different specific feature, the cartilage conduction unit has an earplug part, and the adhesive sheet is provided to the earplug part. In accordance therewith, it is possible to arbitrarily select a state in which the earplug part is adhered to the entrance to the external auditory meatus and a state in which the earplug part is removed from the entrance to the external auditory meatus and made to adhere to the cavum conchae and the like.

In accordance with another feature, there are provided stereo earphones characterized in being provided with a pair of earphones having: a cartilage conduction unit capable of being worn in the entrance to the external auditory meatus; and a plurality of elastic projection parts provided to the cartilage conduction unit so as to be capable of making contact with the entrance to the external auditory meatus. It is thereby possible to prevent the cartilage conduction unit from falling away from the ear cartilage.

In accordance with a specific feature, the elastic projection parts are in contact with the entrance to the external auditory meatus in a first worn state in the entrance to the external auditory meatus to thereby create a gap between the cartilage conduction unit and the entrance to the external auditory meatus, and are embedded in the cartilage conduction unit in a second worn state in the entrance to the external auditory meatus to create a state in which the external auditory meatus is occluded by the cartilage conduction unit. It is thereby possible to arbitrarily select a state in which the entrance to the external auditory meatus is occluded by the cartilage conduction unit, and a state in which external sounds enter through a gap between the cartilage conduction unit and the entrance to the external auditory meatus, and it is possible to prevent the cartilage conduction unit from falling out from the entrance to the external auditory meatus regardless of the selection.

In accordance with another feature, there are provided stereo earphones characterized in being provided with a pair of earphones having: a cartilage conduction unit; a branch part serving as a vibration source, one end being connected to the cartilage conduction unit; and an additional branch part serving as an additional vibration source, one end being connected to the cartilage conduction unit. It is thereby possible to implement cartilage conduction in a state in which the vibrations of the two vibration sources have been physically mixed in a shared cartilage conduction unit.

In accordance with a specific feature, the branch part is arranged so as to fit into the intertragic notch and so that the additional branch part fits into the incisura anterior. The branch part and the additional branch part thereby straddle the tragus, and the positioning and perception of stability is enhanced when the cartilage conduction unit is worn.

In accordance with another specific feature, the branch part has a sheath connected to the cartilage conduction unit, the piezoelectric bimorph element serving as a vibration source is connected to the cartilage conduction unit inside the sheath without being in contact with the inner wall thereof, the additionally branch part has an additional sheath connected to the cartilage conduction unit, and the piezoelectric bimorph element serving as an additional vibration source is connected to the cartilage conduction unit inside the additional sheath without being in contact with the inner wall thereof. It is thereby possible to effective protect and support two vibration sources.

In accordance with another specific feature, audio signals differently equalized in the vibration source and the additional vibration source are inputted from different channels, respectively. The vibration source and equalization can thereby be apportioned and cartilage conduction of the audio signals can be implemented using effective frequency characteristics.

In accordance with another feature, there are provided stereo earphones characterized in being provided with a pair of earphones having: a cartilage conduction unit having a connection part; a piezoelectric bimorph element supported by the connection part; and a sheath connected to the cartilage conduction unit by covering the connection part from the outer side and used for protecting the piezoelectric bimorph element so that there is no contact with the inner wall. This is a useful configuration for connecting the piezoelectric bimorph to the cartilage conduction unit and protecting the piezoelectric bimorph element with the sheath.

<Forty-ninth Technical Feature>

The forty-ninth technical aspect disclosed in the present specification provides earphones characterized in having a cartilage conduction unit in close adhesion with the rear outer side of the base of the auricle. It is thereby possible to provide an earphone that does not have a portion for covering the auricle and is capable of a listening style in which the ear hole is open.

In accordance with another feature, the cartilage conduction unit is made to closely adhere to the auricle while avoiding the outer-side area above the base of the auricle. Cartilage conduction can thereby be transmitted with good efficiency regardless where the cartilage conduction unit is arranged on the outer side of the ear cartilage, the cartilage conduction unit can be prevented from interfering with the bows of glasses when glasses are being worn, and the configuration is advantageous in that use is allowed regardless of whether glasses are being worn.

In accordance with another specific feature, the cartilage conduction unit is made to closely adhere to the base of the auricle facing the mastoid process of the temporal bone. Stable wearing and cartilage conduction with good efficiency are thereby possible.

In accordance with a more specific feature, the cartilage conduction unit has a shape that fits and wedges into the gap formed between the base of the auricle and the mastoid process of the temporal bone. In accordance with another specific feature, the cartilage conduction unit has a shape that fits around the base auricle. In accordance with yet another specific feature, the cartilage conduction unit has a shape that fits the outer side of the auricle near the base of the auricle.

In accordance with another specific feature, the cartilage conduction unit is bent so as to fit around the base of the auricle. Advantageous wearing on the outer side of the auricle is thereby made possible even when the earphone is elongated. In accordance with another specific feature, the cartilage conduction unit has an adhesive sheet provided so as to closely adhere to the rear outer side of the base of the auricle. In accordance with yet another feature, stereo earphones provided with a pair of earphones are constituted. In accordance with a further specific feature, the pair of earphones has a symmetrical shape so as to fit the reverse sides of the left and right of the auricles.

In accordance with another feature, there is provided an earphone characterized in having a cartilage conduction unit and an adhesive sheet provided to the cartilage conduction unit so as to closely adhere to the outer side of the auricle. Stable wearing and cartilage conduction with good efficiency are thereby possible on the outer side of the auricle. In accordance with a specific feature, the cartilage conduction unit is made to closely adhere to the auricle while avoiding the outer-side area above the base of the auricle.

In accordance with another specific feature, stereo earphones provided with a pair of earphones are constituted. Stereo earphones in a state in which both ears are open are thereby provided.

In accordance with another specific feature, the pair of earphones has a symmetrical shape so as to fit the reverse sides of the left and right of the auricles. Advantageous wearing is thereby possible without confusion of left and right.

In accordance with further specific feature, the adhesive sheets of the pair of earphones have mutually symmetrical shapes. It is thereby possible to prevent left-right confusion when the adhesive sheet is replaced.

In accordance with another feature, there is provided an earphone characterized in having a pair of earphones having a cartilage conduction unit that closely adheres to the outer side of the auricle, and the pair of earphones has mutually symmetrical shapes. Provided thereby are stereo earphones in which left and right ears are open and in which wearing is possible without left-right confusion. In accordance with a specific feature, the cartilage conduction unit is made to closely adhere to the auricle while avoiding the outer-side area above the left and right bases of the auricles.

<Fiftieth Technical Feature>

The fiftieth technical aspect disclosed in the present specification provides stereo headphones having: a speaker for generating air-conducted sound, an ear pad for making contact with the auricle; and a cartilage conduction vibration source for transmitting vibrations using the ear pad as a cartilage conduction vibration source. Audio listening enhanced in the high-pitched regions to the low-pitched regions is made possible thereby.

In accordance with a specific feature, cartilage conduction vibration source is capable of independently controlling the speaker. In accordance with further specific feature, the cartilage conduction unit and the speaker are driven using audio signals that have been differently equalized. Control that makes use of the features of cartilage conduction and air conduction can thereby be carried out.

In accordance with another more specific feature, the headphones have an ambient sound microphone. Ambient sound picked up from the ambient sound microphone are inverted in phase and outputted from the speaker, yet are not outputted from the cartilage conduction vibration source. Noise cancellation of ambient sounds that makes use of the features of cartilage conduction and air conduction can thereby be carried out.

In accordance with another more specific feature, the headphones have an ambient sound microphone, and ambient sound picked up from the ambient sound microphone are outputted from the speaker without being inverted in phase, and are not outputted from the cartilage conduction vibration source. Ambient sounds can thereby be introduced while making use of the features of cartilage conduction and air conduction. In accordance with a further specific feature, it is possible to select whether ambient sounds picked up from the ambient sound microphone are to be outputted from the speaker without being inverted in phase.

In accordance with another specific feature, the headphones are provided with transmitting means for transmitting the vibrations of the speaker to the ear pad as a cartilage conduction vibration source. Audio listening enhanced by air conduction and cartilage conduction is thereby made possible on the basis of a shared vibration source that makes use of the configuration of the headphones. In accordance with a more specific feature, the speaker is supported by the ear pad to form transmitting means.

In accordance with another more specific feature, the headphones have a piezoelectric bimorph element, the center part of the piezoelectric bimorph element is used as a speaker, and both ends of the piezoelectric bimorph element are each supported by the ear pad. In accordance with another more specific feature, the headphones have a piezoelectric bimorph element, one end of the piezoelectric bimorph element is used as the speaker and the other end of the piezoelectric bimorph element is supported by the ear pad. In accordance with these features, audio listening with enhanced air conduction and cartilage conduction is possible using the configuration of the headphones and the configuration of the piezoelectric bimorph.

In accordance with another feature, there are provided stereo headphones having a speaker for generating air-conducted sound, a cartilage conduction vibration source, and an ambient sound microphone, ambient sounds picked up from the ambient sound microphone being inverted in phase and outputted from the speaker, yet not being outputted from the cartilage conduction unit. Noise cancellation of ambient sounds that makes use of the features of cartilage conduction and air conduction can thereby be carried out.

In accordance with another feature, there are provided stereo headphones having an audio output unit and an ambient sound microphone, the stereo headphones being capable of outputting ambient sounds picked up by the ambient sound microphone from audio output init without being inverted in phase, and selecting whether ambient sounds picked up by the ambient sound microphone are to be outputted from the audio output unit without being inverted in phase or not. The conditions for hearing ambient sounds can thereby be arbitrarily implemented even when the headphones are in use. In accordance with a specific feature, the headphones furthermore has a cartilage conduction vibration source, and ambient sounds picked up from the ambient sound microphone are outputted from the audio output unit without being inverted in phase, and in this process, are not outputted from the cartilage conduction unit. Ambient sounds can thereby be introduced while making use of the features of cartilage conduction and air conduction.

In accordance with another feature, there are provided stereo headphones having an audio output unit and an ambient sound microphone, the stereo headphones being capable of selecting whether ambient sounds picked up from the ambient sound microphone are to be inverted in phase and outputted from the audio output unit, or are to be outputted from the audio output unit without being inverted in phase. It is thereby possible to more effectively make use of the ambient sound microphone. In accordance with a specific feature, the headphones have a cartilage conduction vibration source, and ambient sounds picked up from the ambient sound microphone are to be outputted from the audio output unit, or are not to be outputted from the cartilage conduction unit. It is thereby possible to carry out control that matches the traits of ambient sounds and cartilage conduction.

In accordance with another feature, there are provided stereo headphones having a speaker for generating air-conducted sound, a cartilage conduction vibration source, and an ambient sound microphone, ambient sounds picked up from the ambient sound microphone being outputted from the speaker, yet not being outputted from the cartilage conduction unit. It is thereby possible to carry out control that matches the traits of ambient sounds and cartilage conduction.

<Fifty-first Technical Feature>

According to the fifty-first technical feature disclosed herein, a handset has: a data-input touch pen unit for data input on a touch panel of a mobile telephone; a communication unit for near-field wireless communication with the mobile telephone; an audio output unit for output of an audio signal received by the communication unit; and an audio input unit for input of an audio signal transmitted from the communication unit. Thus, the data-input touch pen unit that is useful for input on the touch panel can be used also as a handset, so as to be more valuable as an accessory.

According to a more specific feature, the data-input touch pen unit that doubles as a handset is provided with an incoming-call notifying unit. Thus, for example, with the main body of the mobile telephone kept in a bag or the like, a user can recognize an incoming call by vibration or the like of the handset stuck in a chest pocket or the like, and can proceed to conduct a call by using the handset.

According to another specific feature, the audio output unit comprises a cartilage conduction unit. Thus, it is possible to provide a handset that exploits the properties of cartilage conduction. With this feature, even with a slim data-input touch pen unit, a user can hear sound reliably by cartilage conduction.

According to a more specific feature, the cartilage conduction unit doubles as the incoming-call notifying unit. Thus, the vibration function of cartilage conduction can be used for incoming-call notification.

According to another specific feature, the handset is provided with a display unit that displays an identification of the call destination. According to a more specific feature, the handset has a flat shape, and the display unit can display text that identifies the call destination, and is provided on a the flat face of the flat shape. Thus, it is possible to provide a mobile telephone accessory, serving both as a data-input touch pen unit and as a handset, that offers more information so as to be convenient to use.

According to another specific feature, the handset has a call destination storage unit. Through selection by a touch with the data-input touch pen unit, call destination data is received from the mobile telephone via the near-field wireless communication unit, and is stored in the call destination storage unit. Thus, it is possible to provide a handset that is more convenient to use when a user conducts a call, for example, with the main body of the mobile telephone kept in a bag or the like.

According to another specific feature, a configuration is adopted in which, when the touch panel of the mobile telephone is in a power-saving state, the audio output unit and the audio input unit are in an enabled state. Thus, the function of the handset and the function of the main body of the mobile telephone can be harmonized without confusion. According to a more specific feature, when the touch panel of the mobile telephone is in a state capable of accepting input, the audio output unit and the audio input unit are disused.

According to another specific feature, a configuration is adopted in which, when the mobile telephone is in a videophone session, the audio output unit and the audio input unit are in an enabled state. Thus, the function of the handset and the function of the main body of the mobile telephone can be harmonized without confusion.

According to another feature, a handset has: a data-input touch pen unit for data input on a touch panel of a mobile telephone; a communication unit for near-field wireless communication with the mobile telephone; and a cartilage conduction unit for output of an audio signal received by the communication unit. Thus, it is possible to configure a handset that exploits the properties of cartilage conduction. Even with a slim data-input touch pen unit, a user can hear sound reliably by cartilage conduction even in a noisy environment.

According to another feature, a handset has: a data-input touch pen unit for data input on a touch panel of a mobile telephone; a communication unit for near-field wireless communication with the mobile telephone; and an audio output unit for output of an audio signal received by the communication unit. The handset has a flat shape, and on a flat face of the flat shape, a display unit is provided that can display text that identifies the call destination. Thus, it is possible to provide a mobile telephone accessory, serving both as a data-input touch pen unit and as a handset, that offers more information so as to be convenient to use.

<Fifty-second Technical Feature>

According to the fifty-second technical feature disclosed herein, stereo earphones comprise a pair of earphones each having: a cartilage conduction unit held in a space between the inner side of the tragus and the antihelix; a vibration plate arranged in a cavity inside the cartilage conduction unit for generation of air-conduction sound; and a vibration source for conduction of vibration to the cartilage conduction unit and to the vibration plate.

With the above configuration, it is possible to provide a stereo earphones that offer high-quality sound by exploiting both cartilage conduction and air conduction owing to a structure held between the inner side of the tragus and the antihelix According to a specific feature, in the cavity inside the cartilage conduction unit, a soft material for supporting the vibration plate is provided. Thus, it is possible to provide stereo earphones that do not interfere with the vibration of the vibration plate and that are less prone to breakage.

According to another specific feature, in the cartilage conduction unit, a passage hole is provided through which outside sound is directed to the earhole. The vibration plate is arranged in the cavity inside the cartilage conduction unit so as not to close the passage hole. Thus, it is possible to provide earphones that, by exploiting both cartilage conduction and air conduction, can direct outside sound to the earhole.

According to a more specific feature, the passage hole is wider open in a part inward of the vibration plate in a state worn on the ear, than in a part outward of the vibration plate. Thus, air-conduction sound can be directed to the earhole effectively.

According to another more specific feature, in the open part of the passage hole inward of the vibration plate in a state worn on the ear, a protector is provided which allows passage of sound but prevents entry of foreign matter. Thus, it is possible to prevent breakage of the internal structure resulting from entry of foreign matter. This is useful when the open part inward of the vibration plate is enlarged with a view to directing air-conduction sound to the earhole effectively. According to a more specific feature, also in the open part of the passage hole outward of the vibration plate in a state worn on the ear, a protector is provided which allows passage of sound but prevents entry of foreign matter.

According to another specific feature, a sheath part is provided which is connected to the cartilage conduction unit. The vibration source is a piezoelectric bimorph element that is arranged inside the sheath part such that at least a middle part of the piezoelectric bimorph element does not make contact with the inner wall of the sheath part. The vibration of the piezoelectric bimorph element is conducted to the cartilage conduction unit and to the vibration plate. Thus, it is possible to provide stereo earphones that can achieve cartilage conduction and generate air-conduction sound effectively by using the piezoelectric bimorph element as a vibration source.

According to a more specific feature, the cartilage conduction unit comprises an elastic member, and the sheath part comprises a hard material that is connected to the elastic member. The cartilage conduction unit is supported such that the piezoelectric bimorph element does not make contact with the inner wall of the hard material. Thus, it is possible to provide stereo earphones that can achieve cartilage conduction and generate air-conduction sound effectively with little leakage of sound. According to a still more specific feature, the vibration unit is supported on the piezoelectric bimorph element so as not to make direct contact with the cartilage conduction unit.

According to another more specific feature, the cartilage conduction unit comprises an elastic member, and the sheath part comprises a hard material that is connected to the elastic member. One end of the piezoelectric bimorph element is supported on the cartilage conduction unit, and the other end of the piezoelectric bimorph element is supported on the sheath part, so that a middle part of the piezoelectric bimorph element does not make contact with the inner wall of the hard material. Thus, the sheath part can be used as a fulcrum for the vibration of the cartilage conduction unit comprising the elastic member. According to a still more specific feature, the vibration unit is supported on an extension part that is extended from the sheath part to the cavity inside the cartilage conduction unit. Thus, the vibration of the sheath part can be used to generate air-conduction sound.

According to another more specific feature, one end of the piezoelectric bimorph element is supported on the sheath part, and the vibration plate is supported on the other end of the piezoelectric bimorph element. Thus, while cartilage conduction is achieved, air-conduction sound can be generated effectively. According to a still more specific feature, the cartilage conduction unit comprises a hard material.

<Fifty-third Technical Feature>

According to the fifty-third technical feature disclosed herein, a wrist watch-type handset has a cartilage conduction unit for achieving cartilage conduction by contact with the ear cartilage. Thus, it is possible to provide a convenient-to-use handset that exploits cartilage conduction.

For the wrist watch-type handset above, a call-conducting method is proposed in which a user obtains cartilage conduction by holding the arm on which the wrist watch is worn across the face so that the wrist watch makes contact with the ear on the opposite side. Thus, call-conducting is possible in a natural posture. According to a specific feature, the wrist watch-type handset has a display unit, which is brought into contact with the ear. According to another specific feature, the wrist watch-type handset has a belt part which is wound around the wrist, which is brought into contact with the ear.

In another call-conducting method proposed for the wrist watch-type handset above, a user obtains cartilage conduction by bringing the palm-side face of the wrist watch into contact with the ear on the same side as the arm on which the wrist watch is worn.

In yet another call-conducting method proposed, a user obtains cartilage conduction by brining the arm on which the wrist watch is worn into contact with the ear.

Also proposed is a wrist watch-type handsets that is offered along with information about call-conducting methods as described above. Thus, a user can understand different call-conducting methods with the wrist watch-type handset correctly. Specifically, a wrist watch-type handset has a means for displaying information about call-conducting methods. In another specific example, a wrist watch-type handset is offered along with an instruction providing medium that contains information about call-conducting methods. In yet another specific example, a wrist watch-type handset is offered along with an advertising medium that contains information about call-conducting methods.

According to another feature, a wrist watch-type handset has: a cartilage conduction unit for achieving cartilage conduction by contact with the ear cartilage; and a display unit for displaying information about a call-conducting method using the cartilage conduction unit.

According to another feature, a wrist watch-type handset has: a cartilage conduction unit for achieving cartilage conduction by contact with the ear cartilage; and a microphone having directivity pointing from the wrist to the elbow. Thus, it is possible to provide a handset that is effective in the proposed call-conducting postures.

According to another feature, a wrist watch-type handset has: a near-field communication unit for communication with a mobile telephone; and a means for exchanging information about each other's power status for coordination with the mobile telephone. Thus, it is possible to achieve coordination between the mobile telephone and the wrist watch-type handset, and thus to avoid a situation where the function of either is unavailable.

According to another feature, a wrist watch-type handset has: a near-field communication unit for communication with a mobile telephone; and a means for checking the feasibility of communication with the mobile telephone by the near-field communication unit for coordination with the mobile telephone. Thus, it is possible to achieve coordination between the mobile telephone and the wrist watch-type handset, and thus to avoid a situation where the function of either is unavailable.

According to another feature, a wrist watch-type handset has: a near-field communication unit for communication with a mobile telephone; and a means for sending to the mobile telephone a signal for checking the location of the mobile telephone for coordination with the mobile telephone. Thus, it is possible to achieve coordination between the mobile telephone and the wrist watch-type handset, and thus to avoid a situation where the function of either is unavailable.

<Fifty-fourth Technical Feature>

According to the fifty-fourth technical feature disclosed herein, a handset has: a cartilage conduction unit for achieving cartilage conduction by contact with the ear cartilage; and a name tag display unit. Thus, it is possible to conduct a call by cartilage conduction using a name tag which a user wears all the time.

According to a specific feature, the display unit inverts what it is displaying upside down according to the position of the handset. According to another specific feature, the handset has a near-field communication unit for communication with a mobile telephone. According to another specific feature, the handset has a neck strap part. When the handset is suspended via the neck strap part, the cartilage conduction unit is located under the name tag display unit. According to a more specific feature, the handset has an incoming-call vibration source. The neck strap part is connected to the handset such that the handset can be suspended from the neck, and conducts the vibration of the incoming-call vibration source to the neck. According to another specific feature, the incoming-call vibration source is activated by an incoming-call signal from the mobile telephone, and the name tag display unit displays whether or not the mobile telephone is set to a silent mode. According to another specific feature, the name tag display unit displays the charge status of the mobile telephone. According to another specific feature, the handset has the function of a non-contact IC card.

According to another feature, a handset has: an incoming-call vibration source that is activated by an incoming-call signal from a mobile telephone; and a display unit that displays whether or not the mobile telephone is set to a silent mode. Thus, it can be indicated to a person present in front that the mobile telephone is set to a silent mode. According to a specific feature, a name tag can be displayed on the display unit to present information to other people. According to another specific feature, the handset has a neck strap part.

According to another feature, a handset has: an incoming-call vibration source that is activated by an incoming-call signal from a mobile telephone; and a display unit that displays the charge status of the mobile telephone. Thus, the charge state of the mobile telephone can be indicated to a person present in front.

According to another feature, a handset has an incoming-call vibration source that is activated by an incoming-call signal from a mobile telephone, and has the function of a non-contact IC card. Thus, it is possible to provide a handset that has both the function of a non-contact IC card and the function of an incoming-call vibration function.

According to another feature, a handset has a cartilage conduction unit for achieving cartilage conduction by contact with the ear cartilage, and has the function of a non-contact IC card. Thus, it is possible to conduct calls by cartilage conduction using the function of a non-contact IC card.

According to another feature, a handset has: an incoming-call vibration source that is activated by an incoming-call signal from a mobile telephone; and a neck strap part connected to the incoming-call vibration source. The vibration of the incoming-call vibration source is conducted to the neck. Thus, it is possible to recognize an incoming call reliably.

According to another feature, a name tag has: an incoming-call vibration source that is activated by an incoming-call signal from a mobile telephone; and a neck strap part connected to the incoming-call vibration source. The vibration of the incoming-call vibration source is conducted to the neck. Thus, it is possible to recognize an incoming call reliably by use of the name card suspended via the neck strap.

According to another feature, a name tag has a name tag display unit. The top/bottom direction of what is displayed on the name tag display unit can be inverted according to a user's posture. Thus, a user can easily view information directed to himself by use of the name tag which displays information for other people.

According to another feature, a non-contact IC card has: a non-contact IC card function unit; an incoming-call vibration source that is activated by an incoming-call signal from a mobile telephone; and a neck strap part connected to the incoming-call vibration source. The vibration of the incoming-call vibration source is conducted to the neck. Thus, it is possible to recognize an incoming call reliably by use of the non-contact IC card.

<Fifty-fifth Technical Feature>

According to the fifty-fifth technical feature disclosed herein, a mobile telephone has: a pair of cartilage conduction units arranged at opposite top corners respectively and having an acoustic impedance close to that of the ear cartilage, for achieving cartilage conduction by contact with the ear cartilage; a linking unit having an acoustic impedance close to that of the ear cartilage, for linking together the pair of cartilage conduction units; a casing top-face part for supporting, while having a different acoustic impedance from, the pair of cartilage conduction units and the linking unit; and a cartilage conduction vibration source supported on the linking unit without making contact with the casing top-face part. Thus, with either of the pair of cartilage conduction units put in contact with the ear cartilage, satisfactory cartilage conduction is achieved. In addition, owing to the difference in acoustic impedance, conduction of the vibration of the cartilage conduction vibration source to the casing can be suppressed. Moreover, the above feature is useful for arranging a structure for cartilage conduction without occupying too much space inside the casing top-face part, which tends to be congested with components.

According to another specific feature, the linking unit is bonded to the casing top-face part. Thus, the linking unit is supported reliably, and vibration in the direction perpendicular to the surface is suppressed by the casing top-face part. Accordingly, even with the linking unit supported outward of the casing top-face part so as to be exposed outside, air-conduction sound is prevented from being generated from the surface of the linking unit.

According to another specific feature, the linking unit is supported outward of the casing top-face part. According to a more specific feature, the casing top-face part has an opening, and the cartilage conduction vibration source is supported in the opening, inward of the surface of the casing top-face part. Thus, despite the linking unit being located outward of the casing top-face part, the cartilage conduction vibration source can be supported inward of the surface of the casing top-face part without making contact with the casing top-face part.

According to another specific feature, the cartilage conduction vibration source is embedded in the linking unit. Thus, the cartilage conduction vibration source can be supported on the linking unit without making contact with the casing top-face part.

According to another specific feature, the casing top-face part has an opening, and the cartilage conduction vibration source is supported inward of the linking unit, near the opening. Also with an opening provided in the casing top-face part so that the cartilage conduction vibration source is supported inward of the linking unit in this way, the cartilage conduction vibration source can be supported without making contact with the casing top-face part.

According to a more specific feature, the entire cartilage conduction vibration source is bonded to the linking unit. This configuration is particularly useful for arranging a structure for cartilage conduction without occupying too much space inside a casing top-face part, which tends to be congested with components. According to another specific feature, the cartilage conduction vibration source has an elongated shape. Of the cartilage conduction vibration source, at least one end is supported on the linking unit, and at least a central part vibrates freely.

According to another specific feature, the linking unit is supported inward of the casing top-face part, and is linked to the pair of cartilage conduction units through openings provided in the opposite corners respectively, With this configuration, where the linking unit is located inward of the casing top-face part, the vibration of the linking unit hardly contributes to generation of air-conduction sound.

According to another specific feature, the pair of cartilage conduction units covers at least the top face, the front face, and the side face of the top corner parts. With this configuration, owing to an increased contact area between the cartilage conduction units and the ear cartilage, more efficient cartilage conduction can be achieved. In addition, the so designed cartilage conduction units provide one of those structures which are suitable to protect the corner parts as when the mobile telephone is dropped. According to another specific feature, the linking unit covers at least the front face of the casing top-face part. Thus, the linking unit has a broader conduction path. Moreover, even with the middle of the top-face part put on the ear cartilage as with a common mobile telephone, the vibration of the linking unit conducts to the ear cartilage. Thus, cartilage conduction is achieved, with the linking unit too acting as a cartilage conduction unit.

According to another feature, a mobile telephone has: a cartilage conduction unit having an acoustic impedance close to that of the ear cartilage, for achieving cartilage conduction by contact with the ear cartilage; a casing top-face part for supporting, while having a different acoustic impedance from, the cartilage conduction unit; a cartilage conduction vibration source arranged inward of the casing top-face part, for conducting cartilage conduction vibration to the cartilage conduction unit; and a linking unit supported on the casing top-face part and supporting, inward of it, the cartilage conduction vibration source such that this does not make contact with the casing top-face part, the linking unit being linked to the cartilage conduction unit through an opening provided in the casing top-face part, the linking unit having an acoustic impedance close to that of the ear cartilage. Thus, with the cartilage conduction unit put in contact with the ear cartilage, satisfactory cartilage conduction can be achieved. In addition, owing to the difference in acoustic impedance, conduction of the vibration of the cartilage conduction vibration source to the casing can be suppressed. Moreover, the above feature is useful for arranging a structure for cartilage conduction without occupying too much space inside the casing top-face part, which tends to be congested with components. According to a specific feature, the linking unit is supported outward of the casing top-face part, and supports the cartilage conduction vibration source inward of the casing top-face part such that this does not make contact with the casing top-face part. According to another specific feature, the linking unit is supported inward of the casing top-face part, supports the cartilage conduction vibration source such that this does not make contact with the casing top-face part, and is linked to the cartilage conduction unit through the opening.

According to a specific feature, the cartilage conduction unit and the linking unit are elastic members. An elastic member is suitable as a material having an acoustic impedance close to that of the ear cartilage. With this configuration, the corner parts are protected from impact when the mobile telephone is dropped. In addition, owing to the cartilage conduction vibration source being supported only by an elastic member, this serves as a shock-absorbing material, and prevents the cartilage conduction vibration source from being destroyed by impact as when the mobile telephone is dropped. According to another specific feature, the cartilage conduction vibration source is a piezoelectric bimorph element. According to another specific feature, the cartilage conduction vibration source is an electromagnetic vibrating element.

<Fifty-sixth Technical Feature>

According to the fifty-sixth technical feature disclosed herein, a mobile telephone has: a pair of cartilage conduction units arranged in opposite top corners, respectively, of the mobile telephone and having an acoustic impedance close to that of the ear cartilage, for achieving cartilage conduction by contact with the ear cartilage; a vibration-conducting member formed of a material having a better vibration-conducting property than the pair of cartilage conduction units, the vibration-conducting member being supported, at opposite ends, on the pair of cartilage conduction units; and a cartilage conduction vibration source supported on the vibration-conducting member. Thus, it is possible to provide a mobile telephone that offers satisfactory cartilage conduction while suppressing generation of air-conduction sound.

According to another feature, a mobile telephone has: a pair of cartilage conduction units arranged in opposite top corners, respectively, of the mobile telephone, for achieving cartilage conduction by contact with the ear cartilage; a vibration-conducting member formed of a material having a better vibration-conducting property than the pair of cartilage conduction units, the vibration-conducting member being supported, at opposite ends, on the pair of cartilage conduction units; and a cartilage conduction vibration source supported on the vibration-conducting member. Thus, it is possible to provide a mobile telephone that offers satisfactory cartilage conduction while suppressing generation of air-conduction sound and that can protect the cartilage conduction vibration source from impact from outside.

According to a specific feature, the vibration-conducting member is configured so as not to make contact with a casing top-face part of the mobile telephone. Thus, generation of air-conduction sound can be prevented effectively. More specifically, there is provided a linking unit either having an acoustic impedance close to that of the ear cartilage or formed of an elastic member, for linking together the pair of cartilage conduction units, so that the vibration-conducting member is supported also on the linking unit. Still more specifically, the linking unit is supported inward of the casing top-face part of the mobile telephone. Or a structure is adopted where the vibration-conducting member floats off the casing top-face part of the mobile telephone.

According to another specific feature, the vibration-conducting member is configured so as not to make contact with the front face and the rear face of the casing of the mobile telephone. Thus, generation of air-conduction sound from the front face and the rear face of the casing is suppressed. According to a more specific feature, the front face and the rear face of the casing of the mobile telephone are formed of a hard material.

According to another specific feature, the vibration-conducting member is configured so as not to make contact with an earphone jack provided in the casing top-face part of the mobile telephone. Thus, the vibration-conducting member can be arranged such that no air-conduction sound is generated from an earphone jack or the like that is exposed on the outer wall from inside the mobile telephone.

According to another specific feature, the vibration-conducting member is configured so as not to make contact with a power switch provided in the casing top-face part of the mobile telephone. Thus, the vibration-conducting member can be arranged such that no air-conduction sound is generated from a power switch or the like that is exposed on the outer wall from inside the mobile telephone.

According to another specific feature, the cartilage conduction vibration source is arranged in a middle part of a top-face part of the casing of the mobile telephone. Thus, the cartilage conduction vibration source can be vibrated in a well-balanced manner, and its vibration can be conducted to the cartilage conduction unit.

According to another feature, a mobile telephone has: a pair of cartilage conduction units arranged in opposite top corners, respectively, of the mobile telephone, for achieving cartilage conduction by contact with the ear cartilage; and a cartilage conduction vibration source for conducting vibration to the pair of cartilage conduction units. Generation of air-conduction sound from the front face of the mobile telephone at the opposite corners is suppressed compared with that from the top face and the side face of the mobile telephone at the opposite corners. Thus, the direct air-conduction sound component that enters the external auditory meatus from the cartilage conduction unit can be reduced.

According to another feature, an earphone has: a cartilage conduction unit for achieving cartilage conduction by contact with the ear cartilage; and a cartilage conduction vibration source for conducting vibration to the cartilage conduction unit. Generation of air-conduction sound from the face of the cartilage conduction unit that, when worn, faces the external auditory meatus is suppressed compared with that from the circumferential face of the cartilage conduction unit that makes contact with the ear cartilage. Thus, the direct air-conduction sound component that enters the external auditory meatus from the cartilage conduction unit can be reduced. According to a specific feature, the cartilage conduction unit has a passage hole through which air-conduction sound is passed from outside to the external auditory meatus. Generation of air-conduction sound from the inner face of the passage hole is suppressed compared with that from the side circumferential face of the cartilage conduction unit.

According to another feature, an earphone has: a cartilage conduction unit for achieving cartilage conduction by contact with the ear cartilage and for passing therethrough air-conduction sound from outside to the external auditory meatus; and a cartilage conduction vibration source for conducting vibration to the cartilage conduction unit. Generation of air-conduction sound from the inner face of the passage hole is suppressed compared with that from the side circumferential face of the cartilage conduction unit. Thus, the direct air-conduction sound component that enters the external auditory meatus from the cartilage conduction unit can be reduced.

<Fifty-seventh Technical Feature>

According to the fifty-seventh technical feature disclosed herein, a mobile telephone has a front wall, a rear wall, a top wall partly continuous with a side face, and a side wall, and includes: a vibration-absorbing material provided between the top wall and each of the front wall, the rear wall, and the side wall; and a cartilage conduction vibration source provided on the inner side of the top wall. Opposite corner parts of the top wall partly continuous with the side face serve as a cartilage conduction unit. Thus, it is possible to provide a cartilage conduction mobile telephone with suppressed generation of air-conduction sound.

According to a specific configuration, the front wall, the rear wall, the top wall, and the side wall are formed of a hard material. According to another specific configuration, the cartilage conduction vibration source is a piezoelectric bimorph element. According to yet another specific configuration, the cartilage conduction vibration source is affixed to the inner side of the top face.

According to another feature, a mobile telephone has: a front wall; a pair of cartilage conduction units arranged at opposite top corners, respectively, of the mobile telephone; a vibration-conducting member for conducting vibration to the pair of cartilage conduction units; a cartilage conduction vibration source supported on the vibration-conducting member; a vibration-absorbing material for supporting the vibration-conducting member such that this does not make contact with the front wall; and a switching unit for switching whether or not to conduct the vibration of the vibration-conducting member to the front wall. Thus, it is possible to provide a compactly-designed cartilage conduction mobile telephone that generates little air-conduction sound. As necessary, it is also possible to generate air-conduction sound as required in a common mobile telephone.

According to a specific configuration, the cartilage conduction unit has an acoustic impedance close to that of the ear cartilage. According to another specific feature, the switching unit can be operated from outside the mobile telephone.

According to a specific configuration, the mobile telephone has a linking unit formed of an elastic member for linking together the pair of cartilage conduction units, and the vibration-conducting member is supported also on the linking unit. According to another specific configuration, the vibration-conducting member floats off the casing top-face part.

According to another feature, a mobile telephone has a cartilage conduction unit, and determines the frequency characteristics of an audio signal for driving the cartilage conduction unit based on the language of the audio signal. Thus, it is possible to provide a mobile telephone that can deal with different languages. According to a specific feature, the frequency characteristics of the audio signal is changed by an electric circuit. According to another specific feature, the frequency characteristics of the audio signal is changed mechanically.

According to another specific feature, the frequency characteristics of the audio signal can be changed either by manual operation or by an automatic means, and a change by manual operation is given priority over a change by the automatic means. Thus, it is possible to provide a mobile telephone that prevents operation unintended by the user. According to a more specific feature, a change by the automatic means is invalidated for a predetermined period after a change by manual operation.

According to another specific feature, the mobile telephone has a display unit, and switches the display language on the display unit based on language. Even when the display language is switched between languages having similar frequency characteristics, the frequency characteristics of the audio signal for driving the cartilage conduction vibration source are not changed. Thus, the display language and the frequency characteristics can be changed in an intelligent manner. According to another specific feature, the mobile telephone has a display unit, and automatically changes the frequency characteristics of the audio signal for driving the cartilage conduction vibration source based on the switching of the display language on the display unit. Thus, the frequency can be changed automatically based on the change of the display language, both being related to language.

According to another specific feature, the mobile telephone has a location detecting unit, and automatically changes the frequency characteristics of the audio signal for driving the cartilage conduction vibration source based on the detected location. Thus, the frequency can be changed automatically based on the language region in which the mobile telephone is located.

According to another specific feature, the mobile telephone has an incoming-call sound analyzing unit, and the frequency can be changed automatically based on the language inferred by the incoming-call sound analyzing unit.

<Fifty-eighth Technical Feature>

According to the fifty-eighth technical feature disclosed herein, a mobile telephone has an adjusting means for adjusting the intensity of the vibration for cartilage conduction that results from contact with the ear cartilage at least between a first intensity and a second intensity. The mobile telephone generates air-conduction sound whose volume changes with change of the intensity of the vibration. The first intensity of vibration is an intensity sufficient to generate air-conduction sound with a volume needed in a measurement method conforming to a standard for a common mobile telephone. The second intensity is an intensity insufficient to generate air-conduction sound with the volume needed in the measurement method conforming to the standard for a common mobile telephone, and the sound pressure inside the external auditory meatus as measured with the mobile telephone in contact with the ear cartilage with the vibration at the second intensity is higher than the sound pressure inside the external auditory meatus as measured with the mobile telephone out of contact with but close to the entrance of the external auditory meatus with the vibration at the first intensity. Thus, it is possible to provide a mobile telephone that conforms to a standard for a common mobile telephone and that in addition achieves effective cartilage conduction.

According to a specific feature, the mobile telephone has a front wall, a rear wall, a top wall, and a side wall, wherein a vibration source for the vibration is arranged on the inner side of the top wall, and the air-conduction sound is generated by conducting vibration from the top wall to the front wall. Thus, effective cartilage conduction and air-conduction sound generation can be achieved.

According to a more specific feature, the vibration source has a thin shape, vibrates in the direction perpendicular to the thin shape, and is affixed to the inner side of the top wall in the direction parallel to the thin shape. Thus, a space is secured for arranging various components in a top part of the mobile telephone.

According to a more specific feature, the vibration source is arranged at the middle, in the left/right direction, of the top wall. A front camera is arranged at the middle, in the left/right direction, of the inner side of the top wall. According to another specific feature, a proximity sensor unit is arranged at the middle, in the left/right direction, of the inner side of the top wall. In the arrangements described above, the vibration source is preferably a piezoelectric bimorph element.

According to another specific feature, the rear wall, the top wall, and the side wall constitute an integral box-shaped casing, which, when combined with the front wall, permits vibration to conduct from the top wall to the front wall. Thus, cartilage conduction and air-conduction sound generation are possible with a practical casing structure.

According to another feature, a mobile telephone has a front wall, a rear wall, a top wall, and a side wall, wherein a cartilage conduction vibration source that has a thin shape and that vibrates in the direction perpendicular to the thin shape is affixed to the middle, in the left/right direction, of the inner side of the top wall in the direction parallel to the thin shape, and a front camera is arranged at the middle, in the left/right direction, of the inner side of the top wall. Thus, a user can shoot his own face from in front when conducting a videophone session or when shooting himself According to another feature, a mobile telephone has a front wall, a rear wall, a top wall, and a side wall, wherein a cartilage conduction vibration source that has a thin shape and that vibrates in the direction perpendicular to the thin shape is affixed to the middle, in the left/right direction, of the inner side of the top wall in the direction parallel to the thin shape, and a proximity sensor unit is arranged at the middle, in the left/right direction, of the inner side of the top wall. Thus, in a case where a corner part is used as a cartilage conduction unit, irrespective of whether a right corner part is put on the right ear cartilage or a left corner part is put on the left ear cartilage, contact of the mobile telephone can be detected reliably. In these configurations, the vibration source is preferably a piezoelectric bimorph element.

According to another feature, a mobile telephone has a front wall, a rear wall, a top wall, and a side wall, and includes: a cartilage conduction vibration source arranged on the inner side of the top wall; and a explanation unit for explaining a method of use in which the top wall is used as a cartilage conduction unit when, with a user's face pointing ahead, the mobile telephone is held transversely, roughly horizontally, and is put on a front edge part of the entrance of the external auditory meatus. According to a more specific feature, the explanation unit explains a method of use in which the top wall is used as a pressing part for bending the tragus to close the entrance of the external auditory meatus when, with a user's face pointing ahead, the mobile telephone is moved rearward. Thus, the mobile telephone can be used properly by exploiting the top wall.

According to another feature, in a method for using a mobile telephone having a front wall, a rear wall, a top wall, and a side wall and including a cartilage conduction vibration source arranged on the inner side of the top wall, the top wall is used as a cartilage conduction unit when, with a user's face pointing ahead, the mobile telephone is held transversely, roughly horizontally, and is put on a front edge part of the entrance of the external auditory meatus. According to a specific feature, in the above method of use, the top wall is used as a pressing part for bending the tragus to close the entrance of the external auditory meatus when, with a user's face pointing ahead, the mobile telephone is moved rearward. Thus, the mobile telephone can be used by exploiting the top wall effectively.

According to another feature, an explanation medium explains a method of use of a mobile telephone as described above. The explanation medium is, for example, one or a combination of a display unit of a mobile telephone, a speaker of a mobile telephone, an instruction manual of a mobile telephone, a pamphlet of a mobile telephone, and a means for advertising a mobile telephone. Thus, the mobile telephone can be used by exploiting the top wall.

INDUSTRIAL APPLICABILITY

The various inventions disclosed in the present specification can be applied to incoming-talk devices such as mobile telephones, telephone handsets and other audio output devices, handsets (talk-receiver/transmitters) or talk-receivers for mobile telephones, cartilage conduction vibration source devices or cartilage conduction source vibration devices for a mobile telephone, mobile telephone soft covers, headsets, soft covers and other mobile telephone auxiliary devices, and headsets used as mobile telephones, as well as headsets used as mobile telephones and other outgoing talk/incoming talk devices; and also mobile telephones, mobile music terminals, and other sound signal output devices, and listening devices, outgoing talk/incoming talk devices, headsets for receiving sound signals of these sound signal output devices, stereo earphones or earphones, wrist watch-type handsets, or name plates and non-contact IC cards.

LIST OF REFERENCE SIGNS

35501*a* Input touch pen unit
6546 Communication unit
35024 Sound output unit
35023 Sound input unit
65325 Incoming-call notifying unit
35024 Cartilage conduction unit
6505, 6505*a*, 6505*b*, 6505*c*, 65505 Display unit
36001 Handset having a flat shape
6537 Call destination storage unit
36024, 37024, 38024, 39024 Cartilage conduction unit
36027, 37027, 38027, 39027 Vibration plate
36025, 38025, 39025 Vibration source
37024*t* Soft material
36024*a*, 36024*c* Passage hole
38024*u*, 38024*v* Protective part
36024*b*, 38024*b*, 3902*b* Sheath part
36025, 38025, 39025 Piezoelectric bimorph element
39024*w* Extension part
40024*a*, 40024*b* Cartilage conduction unit
40005 Display unit
40001*b* Belt part
40023 Microphone having directivity
35601 Mobile telephone
6546 Near-field communication unit
6548, 14483 Power supply unit
41024 Cartilage conduction unit
41005 Name tag display unit
6546 Near-field communication unit
41001*c* Neck strap
6525 Incoming-call vibration source
6546 Near-field communication unit
41001*f* Silent incoming-call notification indicator
41001*e* Charge status indicator
41001*i*, 41001*j* Non-contact IC card function unit
42024, 42026, 43024, 43026, 44024, 44026, 45024, 45026, 46024, 46026, 47024, 447026, 8024, 48026 Cartilage conduction unit
42027, 43027, 44027, 45027, 46027, 47027, 48027 Linking unit
8227 Casing top-face part
13025, 43025, 44025, 45025, 46025, 47025, 48025 Cartilage conduction vibration source
42027*c*, 43027*c*, 44027*e*, 44027*f*, 45027*c*, 46027*c*, 48027*c* Extension part of linking unit penetrating through passage hole, or exposed part exposed through passage hole
47024, 47026 Cartilage conduction unit connecting through passage hole to linking unit
47024, 447026 Cartilage conduction unit
49027 Vibration-conducting member

47025, 50025 Cartilage conduction vibration source
8227 Casing top-face part
47027 Linking unit
8201*a* Front face of casing
8201*b* Rear face of casing
8246 Earphone jack
8209 Power switch
51024 Cartilage conduction unit
36025 Cartilage conduction vibration source
51024*a* Passage hole
8201*a* Front wall
8201*b* Rear wall
8224 Top wall partly continuous with side face
8201*c*, 8201*e* Side wall
47027, 2065 Vibration-absorbing material
7013, 47025, 52025, 53025 Cartilage conduction vibration source
49027 Vibration-conducting member
53027 Switching unit
47027 Linking unit
54038*a* to 54038*d*, 54027*a*, 54027*b* Frequency characteristics changing means
54005 Display unit
54049 Location detecting unit
50039*a* Incoming-call sound analyzing unit
8205 Adjusting means
8201*a* Front wall
8201*b* Rear wall
8201*c*, 8201*e* Side wall
53025 Vibration source
56017, 56017 Front camera
55020, 55021, 56019 Piezoelectric bimorph element
52025 Piezoelectric bimorph element
8227, 56227 Cartilage conduction unit
32 Tragus
8205 Explanation unit
8205 Explanation medium

The invention claimed is:

1. A mobile telephone of a box shape having a front wall, a rear wall, a top wall partly continuous with a side face, and a side wall, the mobile telephone comprising:

a vibration-absorbing member between the top wall and each of the rear wall and the side wall; and a cartilage conduction vibration source on an inner side of the top wall, wherein opposite box-corner parts of the top wall partly continuous with the side face each serve as a cartilage conduction unit, wherein the cartilage conduction vibration source is supported so as not to make contact with the front wall, wherein the mobile telephone further comprises a switching unit for switching whether or not to conduct vibration of the cartilage conduction vibration source to the front wall, and wherein the rear wall, the top wall, and the side wall constitute an integral box-shaped casing, which, when combined with the front wall, permits vibration to conduct from the top wall to the front wall.

2. The mobile telephone of claim 1, wherein: the vibration-absorbing member is arranged between the top wall and the front wall.

3. The mobile telephone of claim 1, wherein the front wall, the rear wall, the top wall, and the side wall are formed of a hard material.

4. The mobile telephone of claim 1, wherein the cartilage conduction vibration source is a piezoelectric bimorph element.

5. The mobile telephone of claim 1, wherein the cartilage conduction vibration source is affixed to the inner side of the top wall.

6. The mobile telephone of claim 1, wherein the cartilage conduction vibration source is arranged at a middle, in a left/right direction, of the top wall, and the mobile telephone further comprises: a front camera at the middle, in the left/right direction, of the top wall, on the inner side thereof.

7. The mobile telephone of claim 1, wherein the cartilage conduction vibration source is arranged at a middle, in a left/right direction, of the top wall, and the mobile telephone further comprises: a proximity sensor unit at a middle, in the left/right direction, of the inner side of the top wall.

8. The mobile telephone of claim 1, wherein the top wall serves as a cartilage conduction unit when, with a user's face pointing ahead, the mobile telephone is held transversely, roughly horizontally, and is put on a front edge part of an entrance of an external auditory meatus.

9. The mobile telephone of claim 8, wherein the top wall serves as a pressing part for bending a tragus to close the entrance of the external auditory meatus when, with the user's face pointing ahead, the mobile telephone is moved rearward.

10. The mobile telephone of claim 8, further comprising: a explanation unit for explaining a method of use when the top wall serves as the cartilage conduction unit.

11. A mobile telephone of a box shape having a front wall, a rear wall, a top wall partly continuous with a side face, and a side wall, the mobile telephone comprising:

a vibration-absorbing member between the top wall and each of the rear wall and the side wall;

a cartilage conduction vibration source that has a thin shape, that vibrates in a direction perpendicular to the thin shape, and that is affixed to a middle, in a left/right direction, of an inner side of the top wall in a direction parallel to the thin shape, wherein opposite box-corner parts of the top wall partly continuous with the side face each serve as a cartilage conduction unit, and wherein the cartilage conduction vibration source is supported so as not to make contact with the front wall; and a front camera arranged at the middle, in the left/right direction, of the inner side of the top wall.

12. The mobile telephone of claim 11, wherein the rear wall, the top wall, and the side wall constitute an integral box-shaped casing, which, when combined with the front wall, permits vibration to conduct from the top wall to the front wall.

13. A mobile telephone of a box shape having a front wall, a rear wall, a top wall partly continuous with a side face, and a side wall, the mobile telephone comprising:

a vibration-absorbing member between the top wall and each of the rear wall and the side wall;

a cartilage conduction vibration source that has a thin shape, that vibrates in a direction perpendicular to the thin shape, and that is affixed to a middle, in a left/right direction, of an inner side of the top wall in a direction parallel to the thin shape, wherein opposite box-corner parts of the top wall partly continuous with the side face each serve as a cartilage conduction unit, and wherein the cartilage conduction vibration source is supported so as not to make contact with the front wall; and a proximity sensor unit arranged at the middle, in the left/right direction, of the inner side of the top wall.

* * * * *